US010254956B2

(12) United States Patent
Chaudhri et al.

(10) Patent No.: US 10,254,956 B2
(45) Date of Patent: Apr. 9, 2019

(54) DEVICES, METHODS, AND GRAPHICAL USER INTERFACES FOR MESSAGING

(71) Applicant: Apple Inc., Cupertino, CA (US)

(72) Inventors: Imran A. Chaudhri, San Francisco, CA (US); Freddy A. Anzures, San Francisco, CA (US); Tiffany S. Jon, Cupertino, CA (US); Chanaka G. Karunamuni, San Francisco, CA (US); Nicholas V. King, San Francisco, CA (US); Wan Si Wan, Sunnyvale, CA (US); Darin B. Adler, Los Gatos, CA (US); Justin N. Wood, Los Altos, CA (US); Roberto Garcia, Cupertino, CA (US); Soin Shedlosky, San Jose, CA (US); Bethany Bongiorno, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 182 days.

(21) Appl. No.: 15/272,430

(22) Filed: Sep. 22, 2016

(65) Prior Publication Data

US 2017/0336948 A1 Nov. 23, 2017

Related U.S. Application Data

(60) Provisional application No. 62/349,114, filed on Jun. 12, 2016, provisional application No. 62/349,116,
(Continued)

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0412* (2013.01); *G06F 3/0481* (2013.01);
(Continued)

(58) Field of Classification Search
None
See application file for complete search history.

(56) References Cited

U.S. PATENT DOCUMENTS 7,343,561 B1 3/2008 Stochosky et al.
7,571,213 B2 8/2009 Walkush et al.
(Continued)

FOREIGN PATENT DOCUMENTS

CN 105119812 A 12/2015
DE 202015003860 10/2015
(Continued)

OTHER PUBLICATIONS

Aube, "No UI Is The New UI", 24. http://techcrunch.com/2015/11/11/no-ui-is-the-new-ui#.uqjwxj:bXE2, Nov. 11, 2015, 13 pages.
(Continued)

*Primary Examiner* — Hua Lu
(74) *Attorney, Agent, or Firm* — Morgan, Lewis & Bockius LLP

(57) ABSTRACT

The device displays a messaging user interface on a display, the messaging user interface including a conversation transcript, a plurality of electronic stickers, and a message-input area. While displaying the messaging user interface, the device detects a first user input while a focus selector is at a first location in the messaging user interface that corresponds to a first electronic sticker in the plurality of electronic stickers. In response, the device places and displays the first electronic sticker in the conversation transcript. While the first electronic sticker is displayed in the conversation transcript: the device detects a second user input
(Continued)

while a focus selector is at a second location in the messaging user interface that corresponds to the first electronic sticker in the conversation transcript. In response, the device changes the position, size, and/or rotation of the first electronic sticker in the conversation transcript.

39 Claims, 618 Drawing Sheets

Related U.S. Application Data filed on Jun. 12, 2016, provisional application No. 62/339,078, filed on May 19, 2016, provisional application No. 62/338,502, filed on May 18, 2016.

(51) Int. Cl.

| | |
|---|---|
| ***G06F 3/0481*** | (2013.01) |
| ***G06F 3/0482*** | (2013.01) |
| ***G06F 3/0485*** | (2013.01) |
| ***G06T 11/60*** | (2006.01) |
| ***H04L 12/58*** | (2006.01) |
| ***H04N 5/232*** | (2006.01) |
| ***H04M 1/725*** | (2006.01) |
| ***G06F 3/041*** | (2006.01) |
| ***G06F 3/0484*** | (2013.01) |
| ***G06T 13/00*** | (2011.01) |
| ***G06F 17/22*** | (2006.01) |
| ***G06Q 10/10*** | (2012.01) |
| *G06F 3/16* | (2006.01) |
| *G06T 3/40* | (2006.01) |
| *G06Q 10/02* | (2012.01) |

(52) U.S. Cl.

CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04886* (2013.01); *G06F 17/2288* (2013.01); *G06Q 10/107* (2013.01); *G06T 11/60* (2013.01); *G06T 13/00* (2013.01); *H04L 51/04* (2013.01); *H04L 51/046* (2013.01); *H04L 51/16* (2013.01); *H04L 51/18* (2013.01); *H04L 51/22* (2013.01); *H04M 1/72547* (2013.01); *H04N 5/23216* (2013.01); *H04N 5/23293* (2013.01); *G06F 3/16* (2013.01); *G06F 2203/04105* (2013.01); *G06F 2203/04803* (2013.01); *G06F 2203/04808* (2013.01); *G06Q 10/02* (2013.01); *G06T 3/40* (2013.01); *H04M 1/72552* (2013.01); *H04M 2250/22* (2013.01)

(56) References Cited

U.S. PATENT DOCUMENTS

| | | | | |
|---|---|---|---|---|
| 8,375,320 | B2 | 2/2013 | Kotler et al. | |
| 9,298,355 | B1 | 3/2016 | Beausoleil et al. | |
| 2004/0137884 | A1 | 7/2004 | Engstrom et al. | |
| 2006/0041629 | A1 | 2/2006 | Lira | |
| 2006/0132457 | A1 | 6/2006 | Rimas-Ribikauskas et al. | |
| 2006/0161868 | A1 | 7/2006 | Van Dok et al. | |
| 2006/0294189 | A1 | 12/2006 | Natarajan et al. | |
| 2008/0081698 | A1 | 4/2008 | Wormald et al. | |
| 2008/0235285 | A1* | 9/2008 | Della Pasqua | G06Q 10/107 |
| 2009/0193088 | A1 | 7/2009 | Cervantes et al. | |
| 2010/0058244 | A1 | 3/2010 | Wang | |
| 2010/0153844 | A1 | 6/2010 | Hwang et al. | |
| 2010/0241968 | A1* | 9/2010 | Tarara | G06F 3/0481 715/751 |
| 2012/0072856 | A1* | 3/2012 | Park | H04L 51/043 715/752 |
| 2012/0190388 | A1* | 7/2012 | Castleman | H04L 51/04 455/466 |
| 2013/0055112 | A1 | 2/2013 | Joseph et al. | |
| 2013/0093833 | A1 | 4/2013 | Al-Asaaed et al. | |
| 2013/0297317 | A1 | 11/2013 | Lee et al. | |
| 2013/0332543 | A1 | 12/2013 | Shin et al. | |
| 2014/0006343 | A1 | 1/2014 | Allison | |
| 2014/0047358 | A1 | 2/2014 | Park et al. | |
| 2014/0085487 | A1* | 3/2014 | Park | G06F 3/04883 348/207.1 |
| 2014/0173460 | A1* | 6/2014 | Kim | H04L 51/18 715/753 |
| 2014/0229165 | A1 | 8/2014 | Lee | |
| 2014/0279418 | A1* | 9/2014 | Rubinstein | G06Q 40/00 705/39 |
| 2014/0340470 | A1* | 11/2014 | Perez | H04N 5/23238 348/36 |
| 2014/0365923 | A1 | 12/2014 | Lee et al. | |
| 2015/0050993 | A1 | 2/2015 | Blayer et al. | |
| 2015/0058754 | A1 | 2/2015 | Rauh | |
| 2015/0067496 | A1* | 3/2015 | Missig | G06F 3/016 715/702 |
| 2015/0082201 | A1* | 3/2015 | Sung | H04L 51/04 715/753 |
| 2015/0088699 | A1* | 3/2015 | Rubinstein | G06Q 40/00 705/27.2 |
| 2015/0095801 | A1* | 4/2015 | Kim | H04L 51/04 715/752 |
| 2015/0121255 | A1* | 4/2015 | Lee | G06Q 10/10 715/758 |
| 2015/0268766 | A1* | 9/2015 | Kim | G06F 3/044 345/174 |
| 2015/0268780 | A1* | 9/2015 | Kim | G06F 3/0412 345/174 |
| 2015/0268826 | A1* | 9/2015 | Langholz | G06F 3/04845 715/752 |
| 2015/0281145 | A1* | 10/2015 | Ji | G06Q 10/10 715/758 |
| 2015/0312184 | A1* | 10/2015 | Langholz | H04L 51/04 715/753 |
| 2015/0331550 | A1 | 11/2015 | Wang et al. | |
| 2015/0334075 | A1* | 11/2015 | Wang | G07C 13/00 715/752 |
| 2015/0350141 | A1 | 12/2015 | Yang et al. | |
| 2016/0014059 | A1 | 1/2016 | Rathod | |
| 2016/0027443 | A1 | 1/2016 | Terrell, II et al. | |
| 2016/0034977 | A1 | 2/2016 | Bhaowal et al. | |
| 2016/0043974 | A1 | 2/2016 | Purcell et al. | |
| 2016/0050165 | A1 | 2/2016 | Thomas et al. | |
| 2016/0062574 | A1 | 3/2016 | Anzures et al. | |
| 2016/0092035 | A1* | 3/2016 | Crocker | H04L 51/10 715/752 |
| 2016/0094504 | A1 | 3/2016 | Cinar et al. | |
| 2016/0117299 | A1 | 4/2016 | Hynes | |
| 2016/0117665 | A1* | 4/2016 | Davis | G06Q 20/223 705/39 |
| 2016/0164811 | A1* | 6/2016 | Guthery | G10L 15/26 705/14.69 |
| 2016/0202889 | A1* | 7/2016 | Shin | G06F 3/04847 715/758 |
| 2016/0334972 | A1* | 11/2016 | Cheng | G06F 3/04845 |
| 2017/0060354 | A1* | 3/2017 | Luo | H04L 51/10 |
| 2017/0083174 | A1* | 3/2017 | Tobens, III | G06F 3/0482 |
| 2017/0102912 | A1 | 4/2017 | Jambulingam et al. | |

FOREIGN PATENT DOCUMENTS

| | | | |
|---|---|---|---|
| EP | 2 475 137 | A2 | 7/2012 |
| EP | 2 544 431 | A1 | 1/2013 |
| EP | 2 712 165 | A1 | 3/2014 |
| EP | 2 779 708 | A1 | 9/2014 |
| EP | 2 806 620 | A1 | 11/2014 |
| EP | 2 879 037 | A1 | 6/2015 |
| EP | 2 940 570 | A1 | 11/2015 |
| EP | 2 988 568 | A1 | 2/2016 |

(56) References Cited

FOREIGN PATENT DOCUMENTS

| | | | |
|---|---|---|---|
| KR | 20120107836 | A | 10/2012 |
| WO | WO 2011/085248 | A1 | 7/2011 |
| WO | WO 2012/061318 | A1 | 5/2012 |
| WO | WO 2012/178121 | A1 | 12/2012 |
| WO | WO 2015/050966 | A1 | 4/2015 |
| WO | WO 2015/090137 | A1 | 6/2015 |
| WO | WO 2015/167589 | A1 | 11/2015 |
| WO | WO 2015/175240 | A1 | 11/2015 |
| WO | WO 2015/183756 | A1 | 12/2015 |

OTHER PUBLICATIONS

Buhr et al., "You Can Now Order Ubers (And Soon Lyfts) in Facebook Messenger to Prove You're On Your Way", http://techcrunch.com/2015/12/16/facebook-messenger-transportation/#.yzzjjjr:g3wc, Dec. 16, 2015, 10 pages.

Chaykowski, "Facebook and Uber Team Up to Bring Ride-Hailing to Messenger", https://wwvv.forbes.com/sites/kathleenchaykowski/2015/12/16/facebook-and-uber-team-up-to-bring-ride-hailing-to-messenger/#35a69d174905, Dec. 16, 2015, 6 pages.

Clark, "Emoji Now Has an Autocomplete to Get Annoyed With", http://www.adweek.com/socialtimes/now-emoji-autocomplete-get-annoyed/204764.

Constine, "Facebook Messenger Hits 800M Users: 2016 Strategy and Predictions", 25. http://techcrunch.com/2016/01/07/beyond-messaging/#.fu0nsbh:hTbz, Jan. 7, 2016, 12 pages.

Constine, "Facebook Payments in Messenger Demo Video", https://www.youtube.com/watch?v=0czclezYB_8, Mar. 17, 2015, 2 pages.

Eadicicco, "Google's New iPhone Keyboard Solves a Big Problem With Texting", http://fortune.com/2016/05/12/googlei-phone-keyboard-texting/, May 12, 2016, 2 pages.

Funny Status, "I Wish I Could Just 'Like' A Text So I Don't Have to Respond", Feb. 17, 2013, 5 pages.

Goel, "Facebook Announces a Payments Feature for Its Messenger App", https://www.nytimes.com/2015/03/18/technology/facebook-announces-a-payments-feature-for-its-messenger-app.html?_r=0, Mar. 17, 2015, 4 pages.

Google, "Quick Search", 27. https://play.google.com/store/apps/details?id=com.startapp.quicksearchbox&hl=en, Jun. 7, 2017, 4 pages.

imTranslator, "Translate Facebook", http://about.imtranslator.net/translate-facebook/, Sep. 5, 2014, 6 pages.

imTranslator, "Translate Facebook with Pop-up Bubble", http://about.imtranslator.net/translate-facebook-with-pop-up-bubble/, Sep. 5, 2014, 9 pages.

Isaac et al., "Facebook and Uber Follow Asian Rivals in Plan to Enhance Messenger App", https://www.nytimes.com/2015/12/17/technology/facebook-and-uber-follow-asian-rivals-in-plan-to-enhance-messenger-app.html?-r=0, Dec. 16, 2015, 4 pages.

Krug, "News Feed FYI: What the Reactions Launch Means for News Feed", 30. http://newsroom.fb.com/news/2016/02/news-feed-fyi-what-the-reactions-launch-means-for-news-feed/, Feb. 24, 2016, 2 pages.

Krug, "Reactions Now Available Globally", 31. http://newsroom.fb.com/news/2016/02/reactions-now-available-globally/, Feb. 24, 2016, 3 pages.

Larson, "How to Customize Facebook Messenger with Chat Colors and Emoji", https://www.dailydot.com/debug/customize-messenger-color-bubbles/, Dec. 24, 2015, 6 pages.

Lim, "14 Google Hangouts Hidden Animated Emojis", http://www.hongkiat.com/blog/google-hangout-animated-emojis/, 2017, 8 pages.

Literati Labs, Inc., "Keymoji: Emoji Keyboard", 21. https://itunes.apple.com/us/app/keymoji-emoji-chat/id886476394?mt=8, Apr. 13, 2017, 2 pages.

Marcus, "Here's to 2016 with Messenger", 26. http://newsroom.fb.com/news/2016/01/heres-to-2016-with-messenger/, Jan. 7, 2016, 5 pages.

McAlone, "Epic Slide Deck from Former Yahoo Board Member Lays Out the Furture of Tech and Media", 7. http://www.businessinsider.com/michael-wolf-predicts-what-will-happen-in-the-tech-industry-in-2016-2015-10?op=1, Oct. 21, 2015, 138 pages.

"Minuum for iPhone", http://minuum.com/minuum-for-iPhone/, 2015, 4 pages.

Newton, "Facebook Rolls Out Expanded Like Button Reactions Around the World", https://www.theverge.com/2016/2/24/11094374/facebook-reactions-like-button, Feb. 24, 2016, 5 pages.

Singh, "Introducing Emoji Autocomplete", Venmo, http://blog.venmo.com/hf2t3h4x98p5e13z82p18j66ngcmry/2015/5/14/introducing-emoji-autocomplete, May 14, 2015, 2 pages.

Smith (GottaBeMobile): "Facebook Reactions: Meet the New Facebook Like Button", YouTube, https://www.youtube.com/watch?v=Wn5571R8u0g, Feb. 24, 2016, 2 pages.

Sullivan, "Slash's Mobile Keyboard Makes It an Interesting Player in The Messaging Wars", https://www.fastcompany.com/3055205/slashs-mobile-keyboard-makes-it-an-interesting-player-in-the-messaging-wars, Jan. 7, 2016, 10 pages.

Tabuchi, "No Time to Text? Say It With Stickers", https://wwwnytimes.com/2014/05/26/technology/no-time-to-text-apps-turn-to-stickers.html?_r=0, May 25, 2014, 6 pages.

Viber Media S.a.r.l., "Viber for IOS", https://www.viber.com/products/iphone, 2017, 3 pages.

Walker, "The Six Stages of Facebook Reaction Grief", http://gizmodo.com/the-six-stages-of-facebook-reaction-grief-1761086520, Feb. 24, 2016, 7 pages.

Weinberger, "The Next Big Thing in Computing is Called 'ChatOps,' and it's Already Happening Inside Slack", http://www.businessinsider.com/chatops-blockspring-atlassian-and-ibm-push-the-api-market-2015-11, Nov. 5, 2015, 5 pages.

Weinberger, "Why Apple Should be Scared of Facebook's and Google's Messaging Apps", 32. http://www.businessinsider.com/apple-versus-google-and-facebook-messaging-2015-12, Dec. 22, 2015, 4 pages.

Wikipedia, "WeChat", https://en.wikipedia.org/wiki/WeChat, Jan. 21, 2011, 7 pages.

Wortham, "What Silicon Valley Can Learn From Seoul", https://www.nytimes.com/2015/06/07/magazine/what-silicon-valley-can-learn-from-seoul.html?_r=0, Jun. 2, 2015, 6 pages.

Office Action, dated Feb. 17, 2017, received in U.S. Appl. No. 15/272,399, 13 pages.

Final Office Action, dated Jul. 28, 2017, received in U.S. Appl. No. 15/272,399, 19 pages.

Office Action, dated Jun. 23, 2017, received in Danish Patent Application No. 201670636, which corresponds with U.S. Appl. No. 15/272,399, 4 pages.

Office Action, dated Jun. 27, 2016, received in Danish Patent Application No. 201670641, which corresponds with U.S. Appl. No. 15/272,399, 4 pages.

Office Action, dated Aug. 31, 2017, received in Danish Patent Application No. 201670642, which corresponds with U.S. Appl. No. 15/272,399, 4 pages.

Office Action, dated Sep. 14, 2017, 2017, received in Danish Patent Application No. 201670647, which corresponds with U.S. Appl. No. 15/272,399, 4 pages.

Office Action, dated May 15, 2017, received in Danish Patent Application No. 201670648, which corresponds with U.S. Appl. No. 15/272,399, 2 pages.

Office Action, dated Aug. 24, 2017, received in Danish Patent Application No. 201670648, which corresponds with U.S. Appl. No. 15/272,399, 3 pages.

Office Action, dated Mar. 13, 2017, received in Danish Patent Application No. 201670649, which corresponds with U.S. Appl. No. 15/272,399, 2 pages.

Office Action, dated Apr. 21, 2017, received in Danish Patent Application No. 201670649, which corresponds with U.S. Appl. No. 15/272,399, 2 pages.

Grant, dated Jul. 13, 2017, received in Danish Patent Application No. 201670649, which corresponds with U.S. Appl. No. 15/272,399, 2 pages.

Office Action, dated Mar. 7, 2017, received in Danish Patent Application No. 201670650, which corresponds with U.S. Appl. No. 15/272,399, 3 pages.

(56) References Cited

OTHER PUBLICATIONS

Office Action, dated Aug. 23, 2017, received in Danish Patent Application No. 201670650, which corresponds with U.S. Appl. No. 15/272,399, 3 pages.
Office Action, dated Jul. 11, 2017, received in Danish Patent Application No. 201670652, which corresponds with U.S. Appl. No. 15/272,399, 4 pages.
Office Action, dated Jul. 6, 2017, received in Danish Patent Application No. 201670653, which corresponds with U.S. Appl. No. 15/272,399, 5 pages.
International Search Report and Written Opinion, dated Sep. 15, 2017, received in International Patent Application No. PCT/US2017/033395, which corresponds with U.S. Appl. No. 15/272,399, 16 pages.
Benjamin, "How to Use Facebook Sticker in iMessage Conversations," https://www.youtube.com/watch?v=XKCbtPEOIVc, Feb. 20, 2015, 6 pages.
Facebook Messenger 2013, "How to Send Stickers on Facebook Messenger?", https://www.youtube.com/watch?v=r8FsDQQxjHk, Jan. 20, 2016, 2 pages.
Facebook Messenger 2013, "How to Send Stickers and Photos in Messages," https://www.youtube.com/watch?v=qJz82aTrICg, Sep. 7, 2013, 3 pages.
OSXDaily, "Access and Use Emoji in Mac OS X," https://web.archive.org/web/20160415075948/http://osxdaily.com/2011/08/20/emoji-mac-os-x-lion, Aug. 20, 2011, 10 pages.
Snapchat App 2014, "How To Resize and Rotate Emojis/Text on Snapchat," https://www.youtube.com/watch?v=OErPIFWY3W0, Dec. 23, 2014, 3 pages.
Skype Messenger, "7 Skype Tips for Power Users," http://web.archive.org/web/20131008122153/http://www.howtogeek.com/173448/7-skype-tips-for-power-users, Oct. 8, 2013, 5 pages.
Wiki, "How to Resize Emoji on Snapchat," https://web.archive.org/web/20160505072758/http://www.wikihow.com/Resize-Emoji-on-Snapchat, May 5, 2016, 3 pages.
Office Action, dated Sep. 6, 2016, received in Danish Patent Application No. 201670636, which corresponds with U.S. Appl. No. 15/272,399, 1 page.
Office Action (Search Report), dated Jan. 12, 2017, received in Danish Patent Application No. 201670641, which corresponds with U.S. Appl. No. 15/272,399, 7 pages.
Office Action (Search Report), dated Jan. 16, 2017, received in Danish Patent Application No. 201670647, which corresponds with U.S. Appl. No. 15/272,399, 9 pages.
Office Action and Search Report, dated Oct. 20, 2016, received in Danish Patent Application No. 201670648, which corresponds with U.S. Appl. No. 15/272,399, 8 pages.
Office Action and Search Report, dated Oct. 28, 2016, received in Danish Patent Application No. 201670649, which corresponds with U.S. Appl. No. 15/272,399, 8 pages.
Intention to Grant, dated Dec. 16, 2016, received in Danish Patent Application No. 201670649, which corresponds with U.S. Appl. No. 15/272,399, 2 pages.
Office Action (Search Report), dated Oct. 14, 2016, received in Danish Patent Application No. 201670650, which corresponds with U.S. Appl. No. 15/272,399, 11 pages.
Office Action (Search Report), dated Dec. 14, 2016, received in Danish Patent Application No. 201670652, which corresponds with U.S. Appl. No. 15/272,399, 7 pages.
Office Action (Search Report), dated Dec. 14, 2016, received in Danish Patent Application No. 201670653, which corresponds with U.S. Appl. No. 15/272,399, 6 pages.
Office Action (Search Report), dated Dec. 19, 2016, received in Danish Patent Application No. 201670654, which corresponds with U.S. Appl. No. 15/272,399, 9 pages.
European Search Report, dated Jul. 27, 2018, received in European Patent Application No. 18167254.4, which corresponds with U.S. Appl. No. 15/272,419, 6 pages.
Notice of Allowance, dated Dec. 20, 2017, received in U.S. Appl. No. 15/272,399, 8 pages.
Office Action, dated Jun. 6, 2018, received in Danish Patent Application No. 201670641, which corresponds with U.S. Appl. No. 15/272,399, 5 pages.
Office Action, dated Jun. 13, 2018, received Danish Patent Application No. 201670642, which corresponds with U.S. Appl. No. 15/272,399, 3 pages.
Office Action, dated Jul. 5, 2018, received in Danish Patent Application No. 201670647, which corresponds with U.S. Appl. No. 15/272,399, 4 pages.
Office Action, dated Feb. 20, 2018, received in Danish Patent Application No. 201670648, which corresponds with U.S. Appl. No. 15/272,399, 2 pages.
Notice of Allowance, dated Mar. 26, 2018, received in Danish Patent Application No. 201670648, which corresponds with U.S. Appl. No. 15/272,399, 2 pages.
Patent, dated May 22, 2018, received in Danish Patent Application No. 201670648, which corresponds with U.S. Appl. No. 15/272,399, 3 pages.
Patent, dated Jan. 2, 2018, received in Danish Patent Application No. 201670649, which corresponds with U.S. Appl. No. 15/272,399, 4 pages.
Office Action, dated Feb. 27, 2018, received in Danish Patent Application No. 201670650, which corresponds with U.S. Appl. No. 15/272,399, 2 pages.
Notice of Allowance, dated Jun. 7, 2018, received in Danish Patent Application No. 201670650, which corresponds with U.S. Appl. No. 15/272,399, 2 pages.
Office Action, dated Feb. 14, 2018, received in Danish Patent Application No. 201670651, which corresponds with U.S. Appl. No. 15/272,399, 3 pages.
Office Action, dated Feb. 26, 2018, received in Danish Patent Application No. 201670653, which corresponds with U.S. Appl. No. 15/272,399, 4 pages.
Office Action, dated Dec. 19, 2016, received in Danish Patent Application No. 201670654, which corresponds with U.S. Appl. No. 15/272,399, 9 pages.
Office Action, dated Apr. 18, 2018, received in Danish Patent Application No. 201670655, which corresponds with U.S. Appl. No. 15/272,399, 4 pages.
Office Action, dated Jul. 2, 2018, received in Chinese Patent Application No. 201810396354.0, which corresponds with U.S. Appl. No. 15/272,429, 2 pages.
Office Action, dated May 24, 2018, received in European Patent Application No. 17728317.3, which corresponds with U.S. Appl. No. 15/272,421, 3 pages.
Office Action, dated Mar. 13, 2018, received in Korean Patent Application No. 20187003537, which corresponds with U.S. Appl. No. 15/272,421, 2 pages.
Office Action, dated Jul. 2, 2018, received in Chinese Patent Application No. 201810396289.1, which corresponds with U.S. Appl. No. 15/272,424, 3 pages.
Office Action, dated Jul. 3, 2018, received in U.S. Appl. No. 15/272,429, 25 pages.
Office Action, dated Oct. 12, 2018, received in Danish Patent Application No. 201670651, which corresponds with U.S. Appl. No. 15/272,399, 2 pages.
Office Action, dated Sep. 6, 2018, received in European Patent Application No. 18167254.4, which corresponds with U.S. Appl. No. 15/272,419, 6 pages.
Office Action, dated Oct. 31, 2018, received in Danish Patent Application No. 201670652, which corresponds with U.S. Appl. No. 15/272,399, 5 pages.

* cited by examiner

Figure 5N
9:26 PM
Genevive
5052
5057
5056
Can I get a ridiculous|up with you?
5046-1
Q W E R T Y U I O P
A S D F G H J K L
Z X C V B N M
X
123
5054 space
return

Figure 5Q
5074
Can I get a ride up with you?
5046-2
5076
Can I get a ridiculous up with you?
5046-1
5078
5080
Edit
5082
Done

Figure 5U
9:26 PM
Max
We won the bout!
5004
5104
5106
5002
5100
5102
Congratulations!
The
To
Q W E R T Y U I O P
A S D F G H J K L
Z X C V B N M
123
space
return
ITD
ITL
ITH
IT0

Figure 5V
9:26 PM
Max
We won the bout!
Congratulations!
5008
5102
The
To
Q W E R T Y U I O P
A S D F G H J K L
Z X C V B N M
123
space
return
ITD
ITL
ITH
IT0

Figure 5W
9:26 PM
Wendy
We won the bout!
Congratulations!
5008
5102
The
To
Q W E R T Y U I O P
A S D F G H J K L
Z X C V B N M
X
123
space
return

Figure 5X
9:26 PM
Max
We won the bout!
Congratulations!
The
To
Q W E R T Y U I O P
A S D F G H J K L
Z X C V B N M
123
space
return
5104
5108-1
$IT_D$
$IT_L$
$IT_H$
$IT_0$

Figure 5Y
9:26 PM
Max
We won the bout!
Congratulations!
The
To
Q W E R T Y U I O P
A S D F G H J K L
Z X C V B N M
123
space
return
5108-2
$IT_D$
$IT_L$
$IT_H$
$IT_0$

Figure 6E:
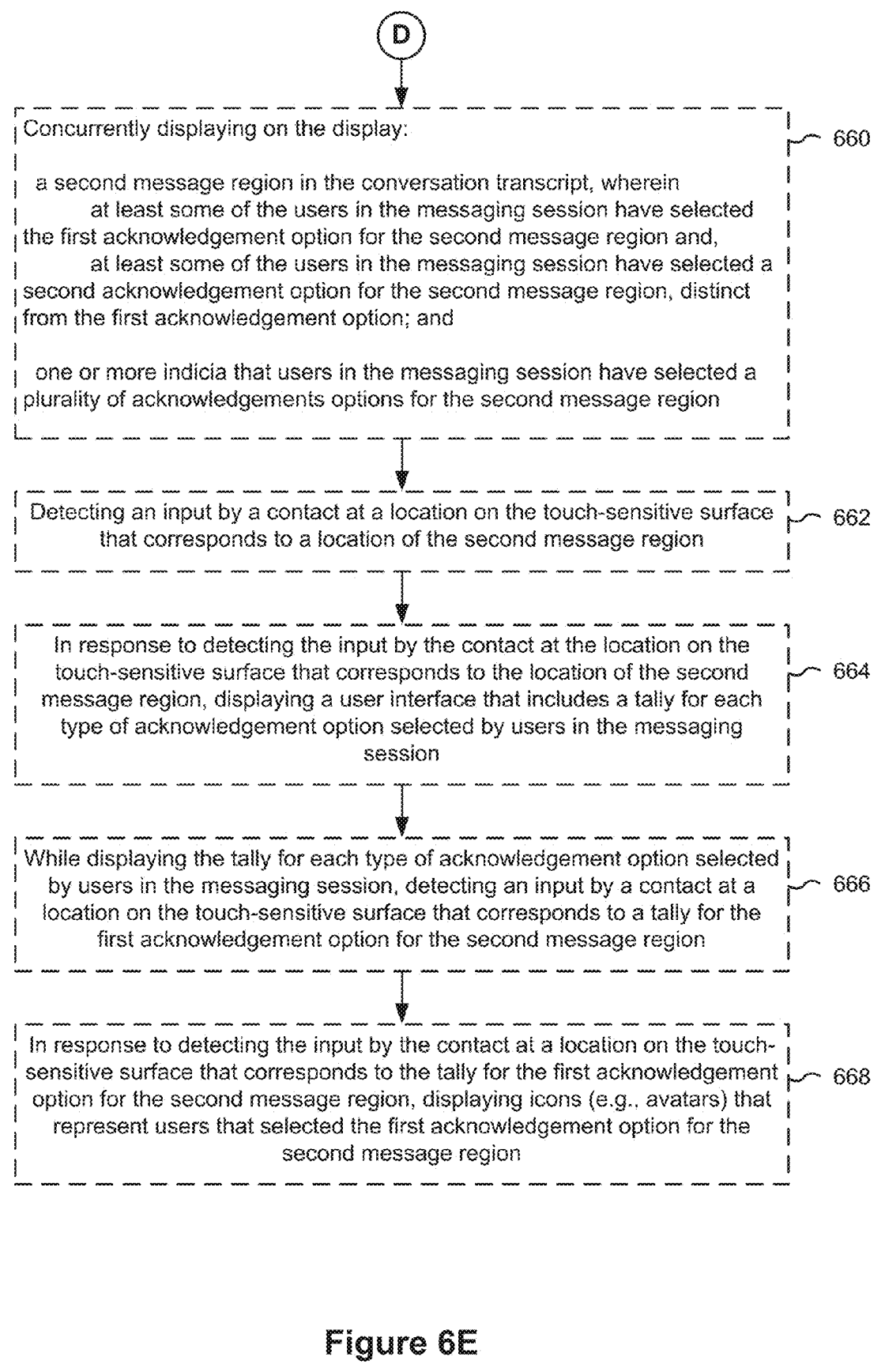

D

Concurrently displaying on the display:

a second message region in the conversation transcript, wherein at least some of the users in the messaging session have selected the first acknowledgement option for the second message region and, at least some of the users in the messaging session have selected a second acknowledgement option for the second message region, distinct from the first acknowledgement option; and one or more indicia that users in the messaging session have selected a plurality of acknowledgements options for the second message region

660

Detecting an input by a contact at a location on the touch-sensitive surface that corresponds to a location of the second message region

662

In response to detecting the input by the contact at the location on the touch-sensitive surface that corresponds to the location of the second message region, displaying a user interface that includes a tally for each type of acknowledgement option selected by users in the messaging session

664

While displaying the tally for each type of acknowledgement option selected by users in the messaging session, detecting an input by a contact at a location on the touch-sensitive surface that corresponds to a tally for the first acknowledgement option for the second message region

666

In response to detecting the input by the contact at a location on the touch-sensitive surface that corresponds to the tally for the first acknowledgement option for the second message region, displaying icons (e.g., avatars) that represent users that selected the first acknowledgement option for the second message region

Figure 8B:
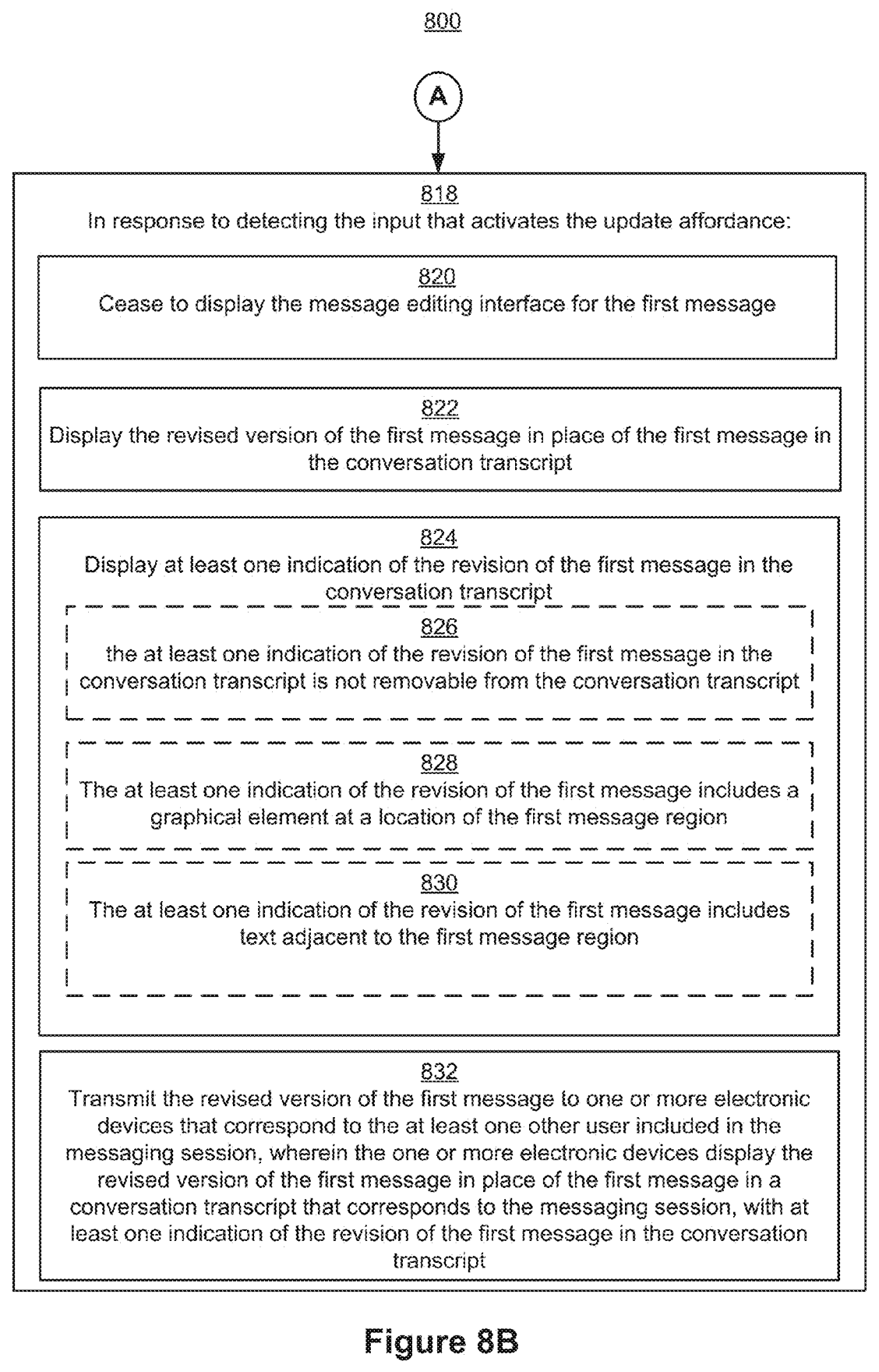

818
In response to detecting the input that activates the update affordance:

820
Cease to display the message editing interface for the first message

822
Display the revised version of the first message in place of the first message in the conversation transcript 824
Display at least one indication of the revision of the first message in the conversation transcript 826
the at least one indication of the revision of the first message in the conversation transcript is not removable from the conversation transcript 828
The at least one indication of the revision of the first message includes a graphical element at a location of the first message region 830
The at least one indication of the revision of the first message includes text adjacent to the first message region 832
Transmit the revised version of the first message to one or more electronic devices that correspond to the at least one other user included in the messaging session, wherein the one or more electronic devices display the revised version of the first message in place of the first message in a conversation transcript that corresponds to the messaging session, with at least one indication of the revision of the first message in the conversation transcript

Figure 8C:
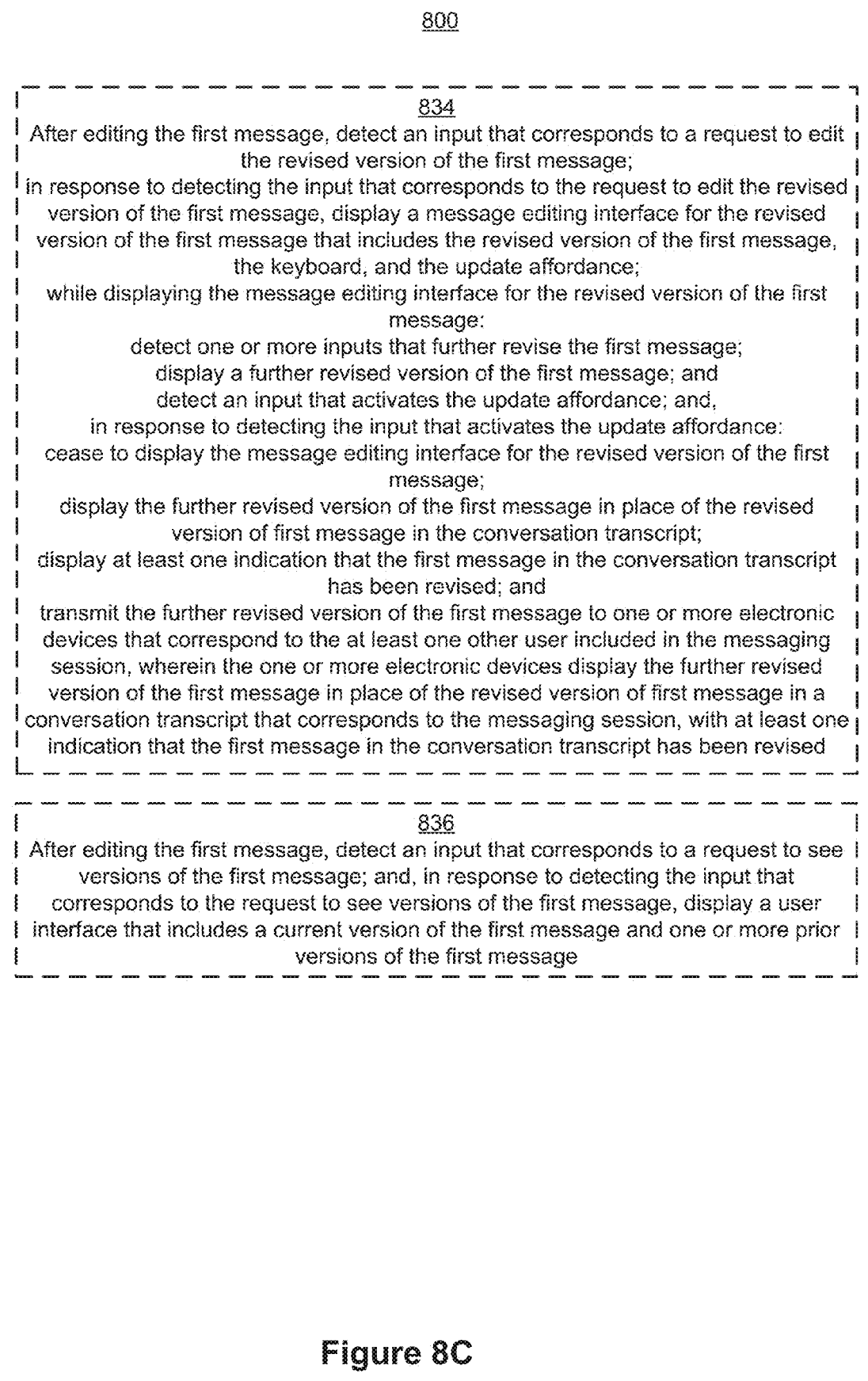

After editing the first message, detect an input that corresponds to a request to edit the revised version of the first message;

in response to detecting the input that corresponds to the request to edit the revised version of the first message, display a message editing interface for the revised version of the first message that includes the revised version of the first message, the keyboard, and the update affordance;

while displaying the message editing interface for the revised version of the first message:

detect one or more inputs that further revise the first message;

display a further revised version of the first message; and detect an input that activates the update affordance; and, in response to detecting the input that activates the update affordance:

cease to display the message editing interface for the revised version of the first message;

display the further revised version of the first message in place of the revised version of first message in the conversation transcript;

display at least one indication that the first message in the conversation transcript has been revised; and transmit the further revised version of the first message to one or more electronic devices that correspond to the at least one other user included in the messaging session, wherein the one or more electronic devices display the further revised version of the first message in place of the revised version of first message in a conversation transcript that corresponds to the messaging session, with at least one indication that the first message in the conversation transcript has been revised

836

After editing the first message, detect an input that corresponds to a request to see versions of the first message; and, in response to detecting the input that corresponds to the request to see versions of the first message, display a user interface that includes a current version of the first message and one or more prior versions of the first message

Figure 10A:
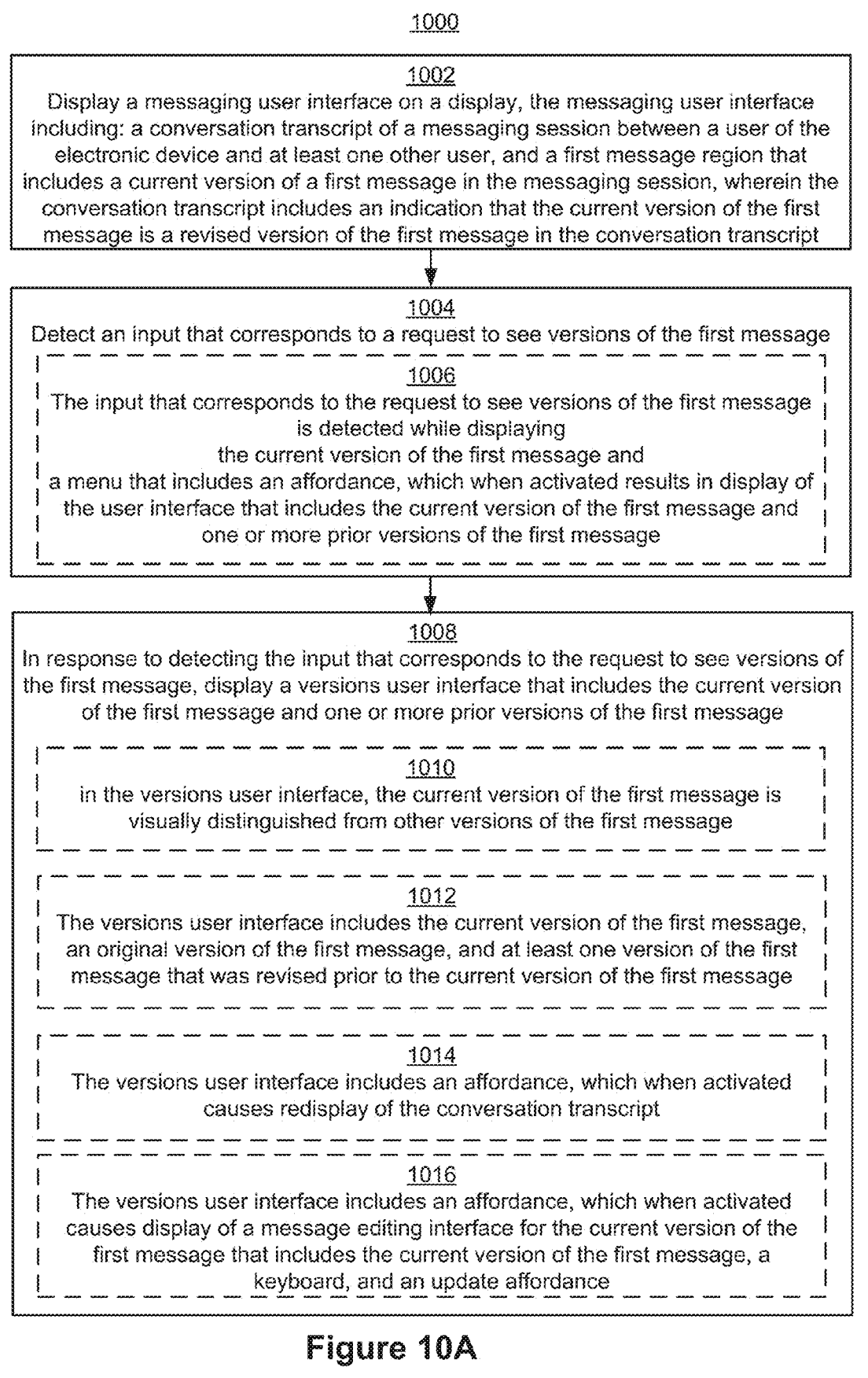

1002
Display a messaging user interface on a display, the messaging user interface including: a conversation transcript of a messaging session between a user of the electronic device and at least one other user, and a first message region that includes a current version of a first message in the messaging session, wherein the conversation transcript includes an indication that the current version of the first message is a revised version of the first message in the conversation transcript 1004
Detect an input that corresponds to a request to see versions of the first message 1006
The input that corresponds to the request to see versions of the first message is detected while displaying
the current version of the first message and
a menu that includes an affordance, which when activated results in display of the user interface that includes the current version of the first message and one or more prior versions of the first message 1008
In response to detecting the input that corresponds to the request to see versions of the first message, display a versions user interface that includes the current version of the first message and one or more prior versions of the first message 1010
in the versions user interface, the current version of the first message is visually distinguished from other versions of the first message 1012
The versions user interface includes the current version of the first message, an original version of the first message, and at least one version of the first message that was revised prior to the current version of the first message 1014
The versions user interface includes an affordance, which when activated causes redisplay of the conversation transcript 1016
The versions user interface includes an affordance, which when activated causes display of a message editing interface for the current version of the first message that includes the current version of the first message, a keyboard, and an update affordance

Figure 10B:
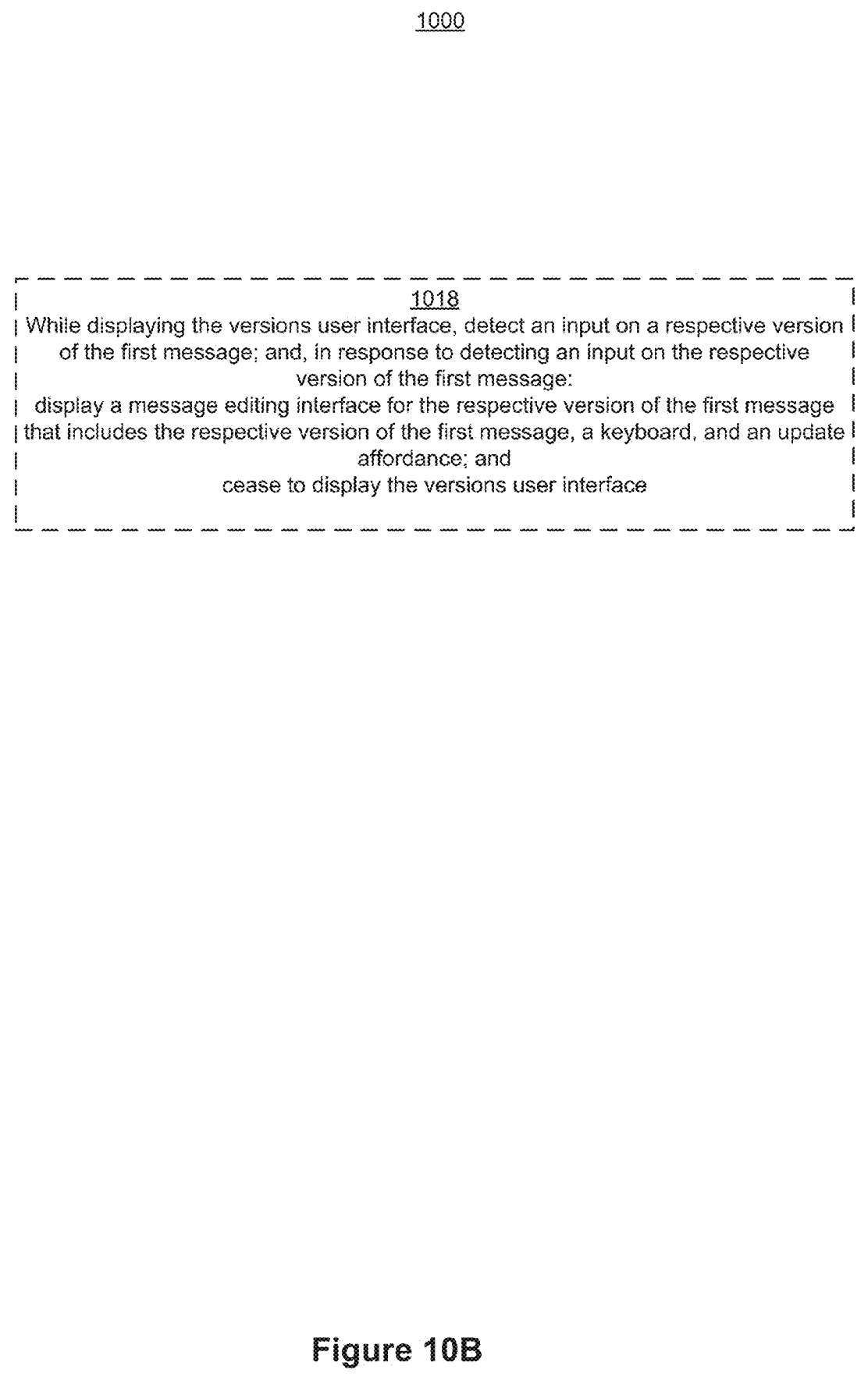

1018
While displaying the versions user interface, detect an input on a respective version of the first message; and, in response to detecting an input on the respective version of the first message:
display a message editing interface for the respective version of the first message that includes the respective version of the first message, a keyboard, and an update affordance; and
cease to display the versions user interface

Figure 12A:
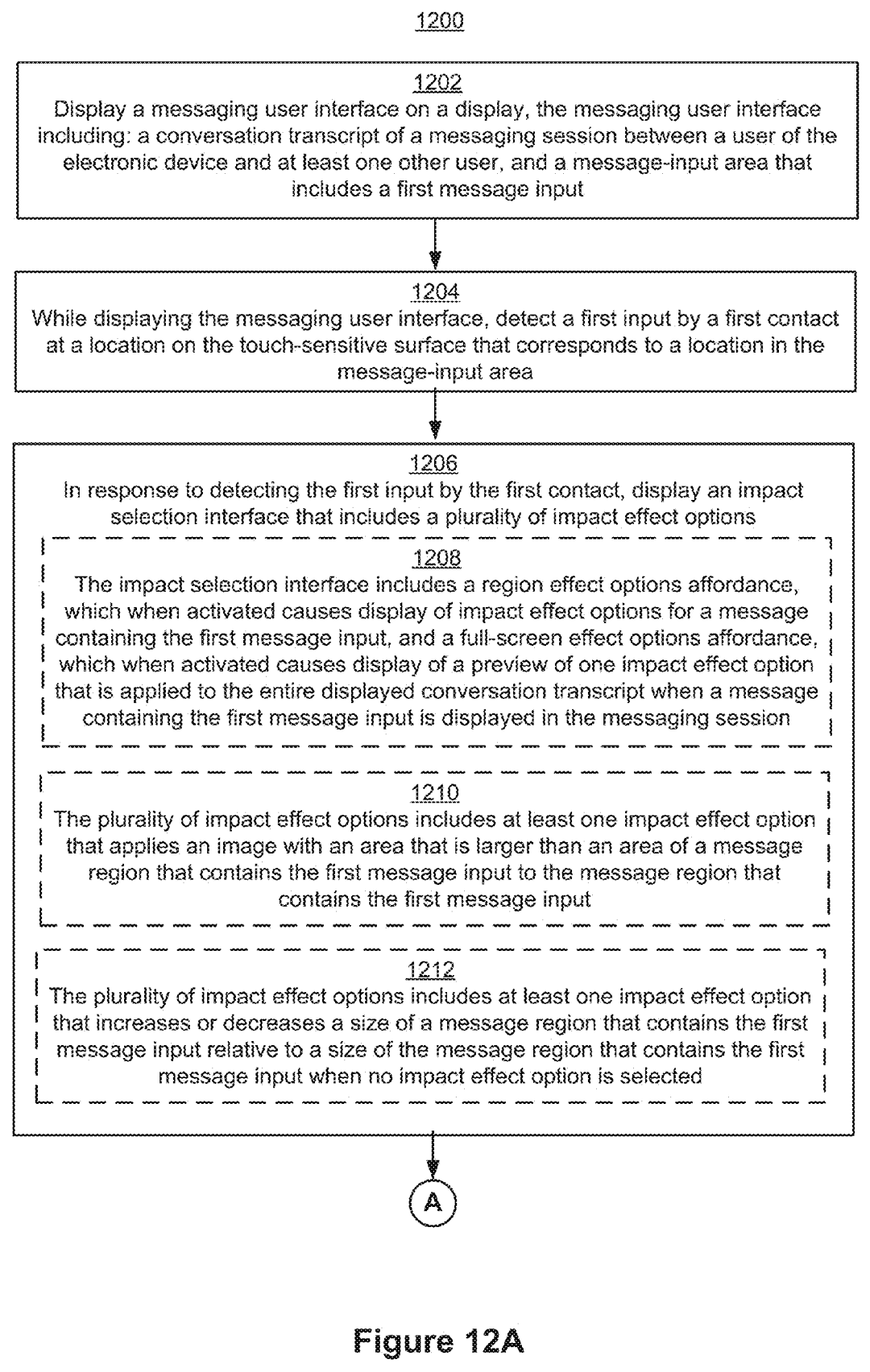

1202
Display a messaging user interface on a display, the messaging user interface including: a conversation transcript of a messaging session between a user of the electronic device and at least one other user, and a message-input area that includes a first message input 1204
While displaying the messaging user interface, detect a first input by a first contact at a location on the touch-sensitive surface that corresponds to a location in the message-input area 1206
In response to detecting the first input by the first contact, display an impact selection interface that includes a plurality of impact effect options 1208
The impact selection interface includes a region effect options affordance, which when activated causes display of impact effect options for a message containing the first message input, and a full-screen effect options affordance, which when activated causes display of a preview of one impact effect option that is applied to the entire displayed conversation transcript when a message containing the first message input is displayed in the messaging session 1210
The plurality of impact effect options includes at least one impact effect option that applies an image with an area that is larger than an area of a message region that contains the first message input to the message region that contains the first message input 1212
The plurality of impact effect options includes at least one impact effect option that increases or decreases a size of a message region that contains the first message input relative to a size of the message region that contains the first message input when no impact effect option is selected

Figure 12C:
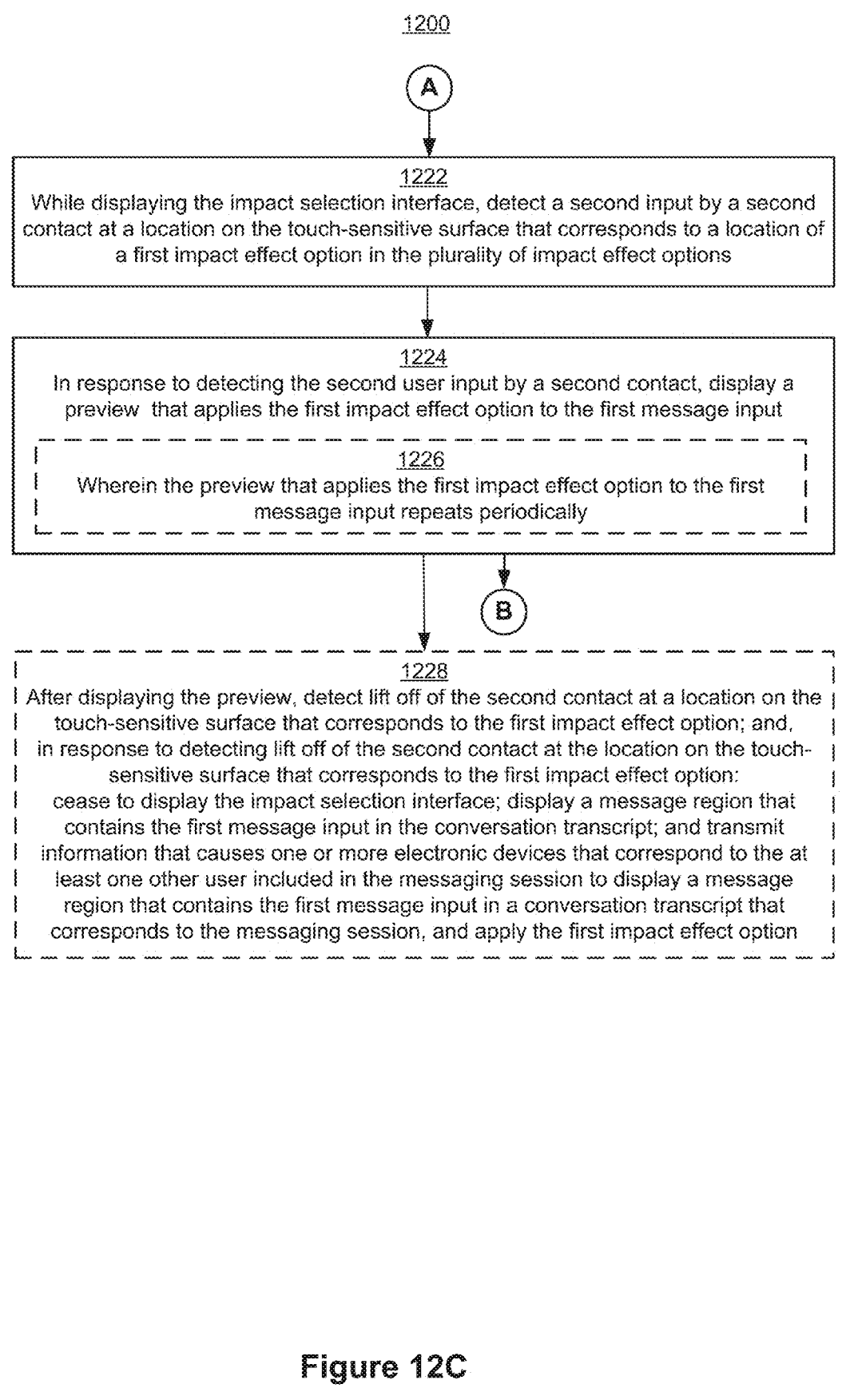

1222
While displaying the impact selection interface, detect a second input by a second contact at a location on the touch-sensitive surface that corresponds to a location of a first impact effect option in the plurality of impact effect options 1224
In response to detecting the second user input by a second contact, display a preview that applies the first impact effect option to the first message input 1226
Wherein the preview that applies the first impact effect option to the first message input repeats periodically

B

1228
After displaying the preview, detect lift off of the second contact at a location on the touch-sensitive surface that corresponds to the first impact effect option; and, in response to detecting lift off of the second contact at the location on the touch-sensitive surface that corresponds to the first impact effect option: cease to display the impact selection interface; display a message region that contains the first message input in the conversation transcript; and transmit information that causes one or more electronic devices that correspond to the at least one other user included in the messaging session to display a message region that contains the first message input in a conversation transcript that corresponds to the messaging session, and apply the first impact effect option

Figure 12D:
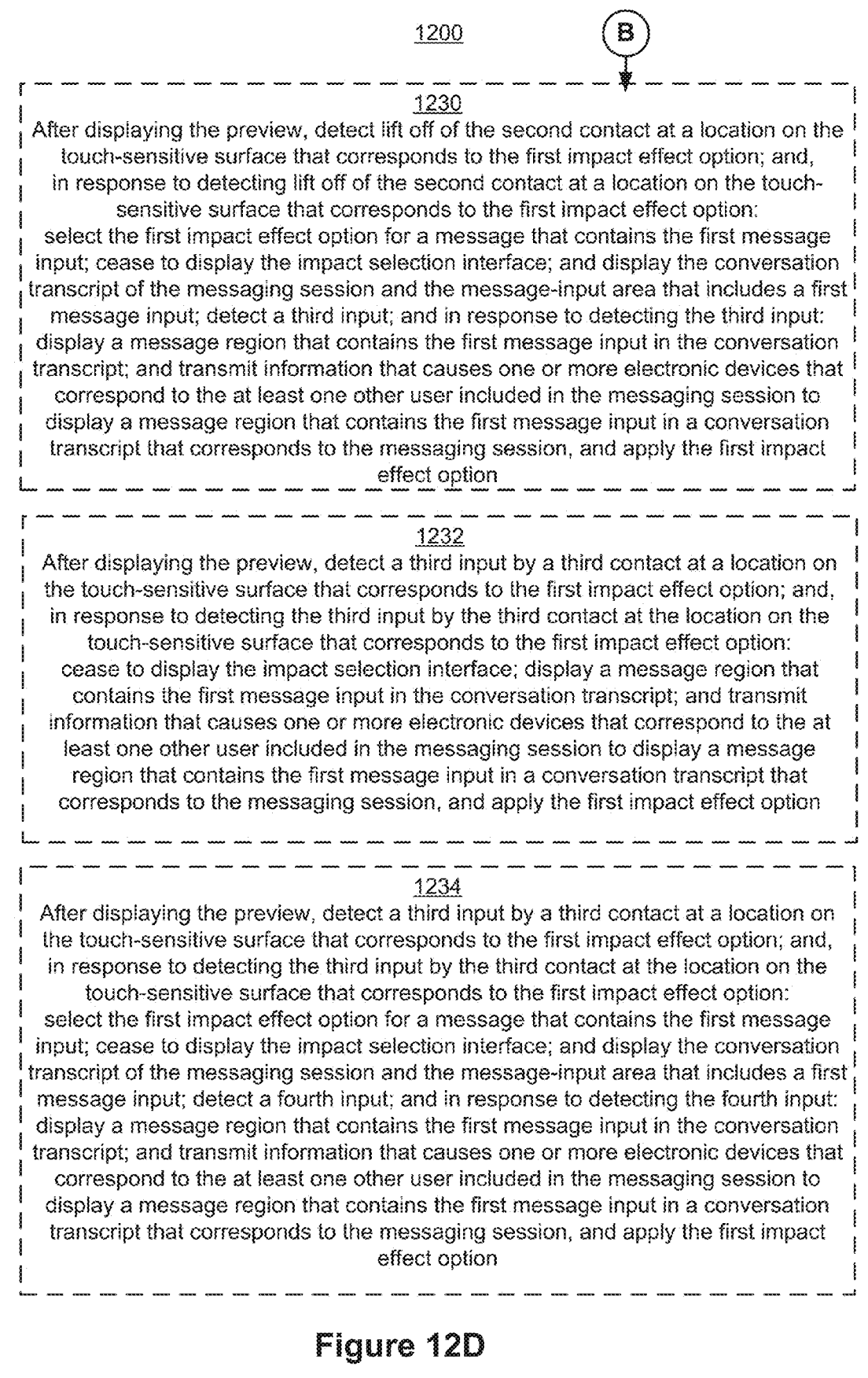

1230
After displaying the preview, detect lift off of the second contact at a location on the touch-sensitive surface that corresponds to the first impact effect option; and, in response to detecting lift off of the second contact at a location on the touch-sensitive surface that corresponds to the first impact effect option: select the first impact effect option for a message that contains the first message input; cease to display the impact selection interface; and display the conversation transcript of the messaging session and the message-input area that includes a first message input; detect a third input; and in response to detecting the third input: display a message region that contains the first message input in the conversation transcript; and transmit information that causes one or more electronic devices that correspond to the at least one other user included in the messaging session to display a message region that contains the first message input in a conversation transcript that corresponds to the messaging session, and apply the first impact effect option 1232
After displaying the preview, detect a third input by a third contact at a location on the touch-sensitive surface that corresponds to the first impact effect option; and, in response to detecting the third input by the third contact at the location on the touch-sensitive surface that corresponds to the first impact effect option: cease to display the impact selection interface; display a message region that contains the first message input in the conversation transcript; and transmit information that causes one or more electronic devices that correspond to the at least one other user included in the messaging session to display a message region that contains the first message input in a conversation transcript that corresponds to the messaging session, and apply the first impact effect option 1234
After displaying the preview, detect a third input by a third contact at a location on the touch-sensitive surface that corresponds to the first impact effect option; and, in response to detecting the third input by the third contact at the location on the touch-sensitive surface that corresponds to the first impact effect option: select the first impact effect option for a message that contains the first message input; cease to display the impact selection interface; and display the conversation transcript of the messaging session and the message-input area that includes a first message input; detect a fourth input; and in response to detecting the fourth input: display a message region that contains the first message input in the conversation transcript; and transmit information that causes one or more electronic devices that correspond to the at least one other user included in the messaging session to display a message region that contains the first message input in a conversation transcript that corresponds to the messaging session, and apply the first impact effect option

Figure 12E:
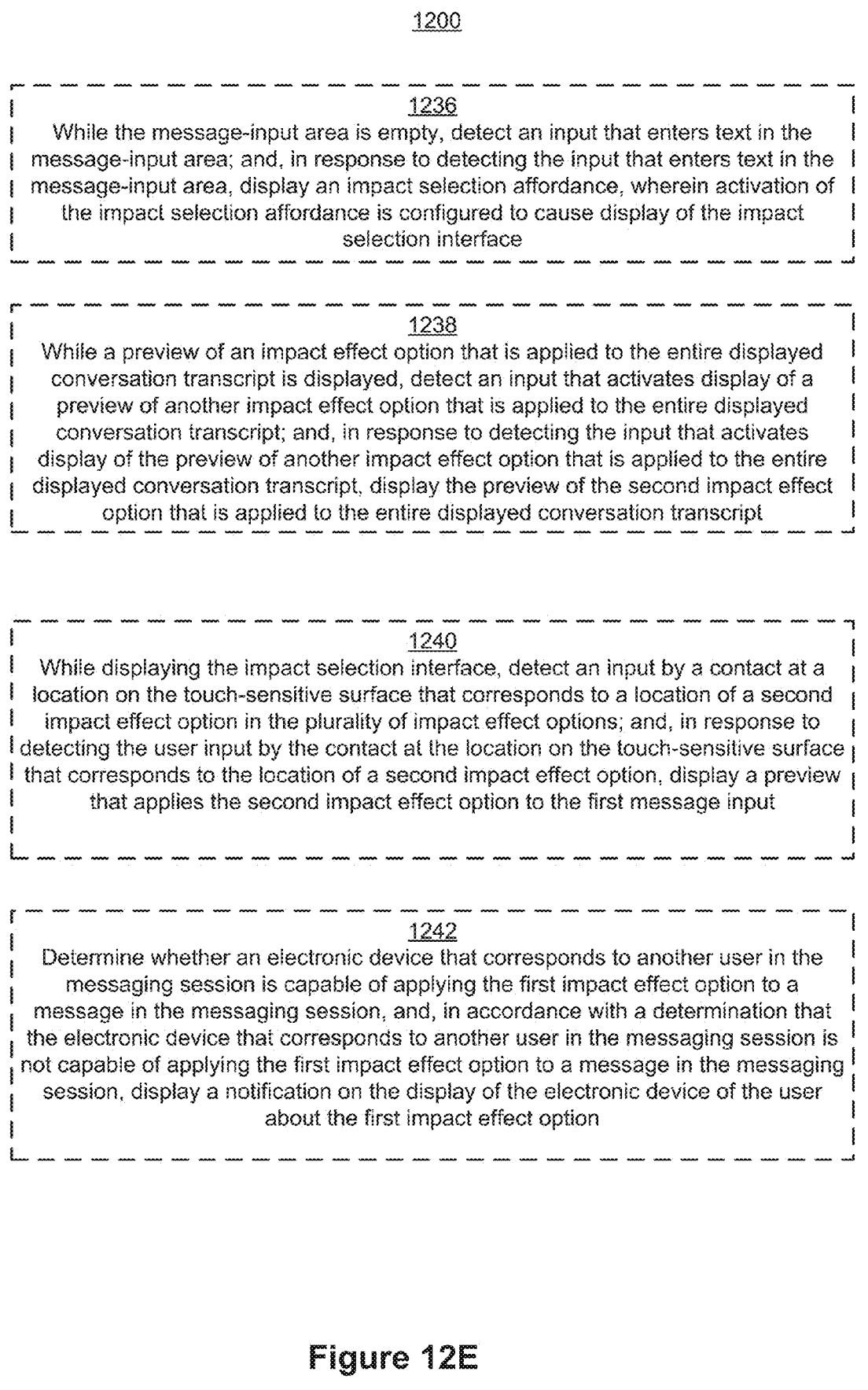

1236
While the message-input area is empty, detect an input that enters text in the message-input area; and, in response to detecting the input that enters text in the message-input area, display an impact selection affordance, wherein activation of the impact selection affordance is configured to cause display of the impact selection interface 1238
While a preview of an impact effect option that is applied to the entire displayed conversation transcript is displayed, detect an input that activates display of a preview of another impact effect option that is applied to the entire displayed conversation transcript; and, in response to detecting the input that activates display of the preview of another impact effect option that is applied to the entire displayed conversation transcript, display the preview of the second impact effect option that is applied to the entire displayed conversation transcript 1240
While displaying the impact selection interface, detect an input by a contact at a location on the touch-sensitive surface that corresponds to a location of a second impact effect option in the plurality of impact effect options; and, in response to detecting the user input by the contact at the location on the touch-sensitive surface that corresponds to the location of a second impact effect option, display a preview that applies the second impact effect option to the first message input 1242
Determine whether an electronic device that corresponds to another user in the messaging session is capable of applying the first impact effect option to a message in the messaging session, and, in accordance with a determination that the electronic device that corresponds to another user in the messaging session is not capable of applying the first impact effect option to a message in the messaging session, display a notification on the display of the electronic device of the user about the first impact effect option

Figure 14B:
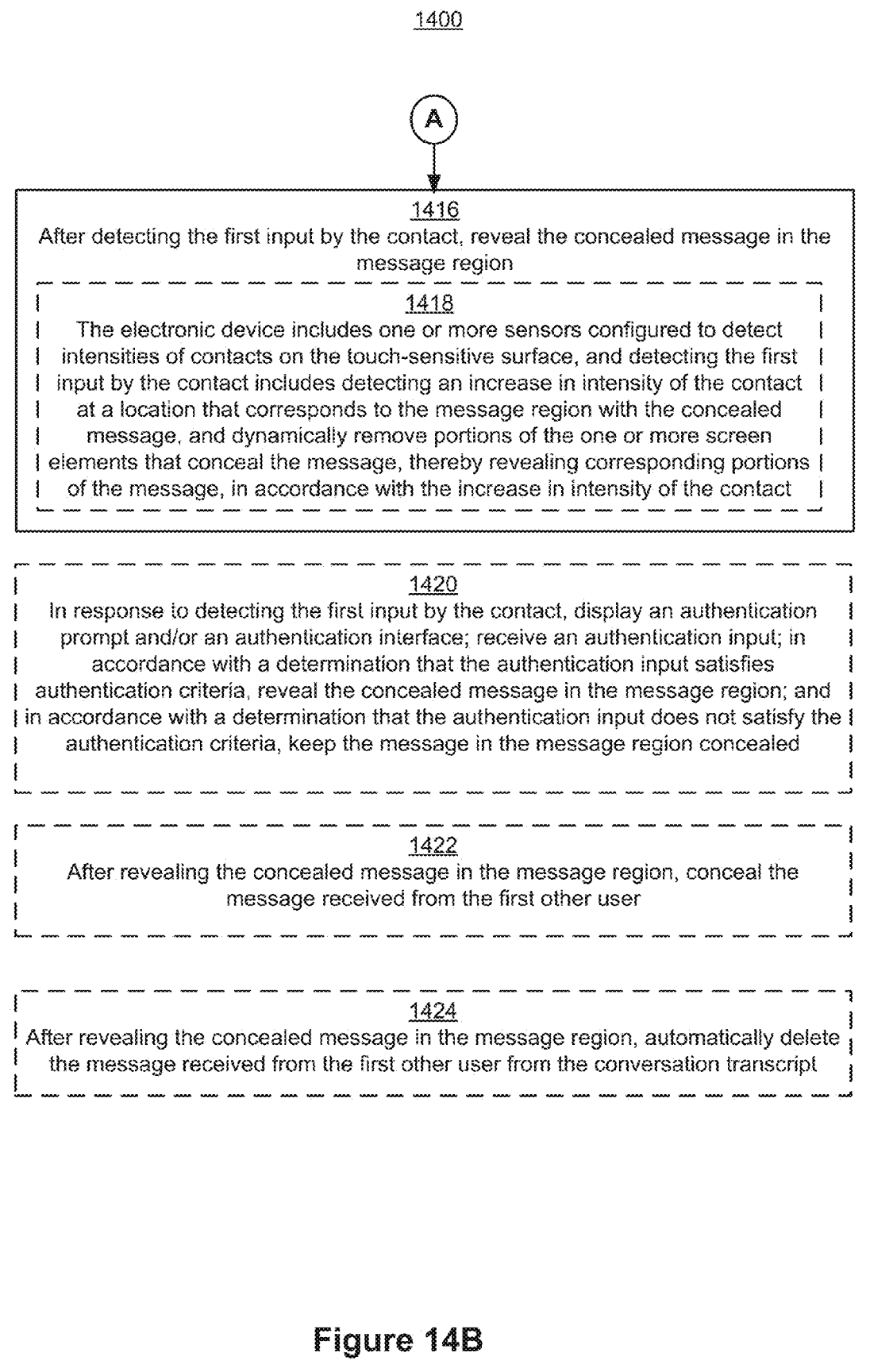

1416
After detecting the first input by the contact, reveal the concealed message in the message region 1418
The electronic device includes one or more sensors configured to detect intensities of contacts on the touch-sensitive surface, and detecting the first input by the contact includes detecting an increase in intensity of the contact at a location that corresponds to the message region with the concealed message, and dynamically remove portions of the one or more screen elements that conceal the message, thereby revealing corresponding portions of the message, in accordance with the increase in intensity of the contact 1420
In response to detecting the first input by the contact, display an authentication prompt and/or an authentication interface; receive an authentication input; in accordance with a determination that the authentication input satisfies authentication criteria, reveal the concealed message in the message region; and in accordance with a determination that the authentication input does not satisfy the authentication criteria, keep the message in the message region concealed 1422
After revealing the concealed message in the message region, conceal the message received from the first other user 1424
After revealing the concealed message in the message region, automatically delete the message received from the first other user from the conversation transcript

Figure 16C:
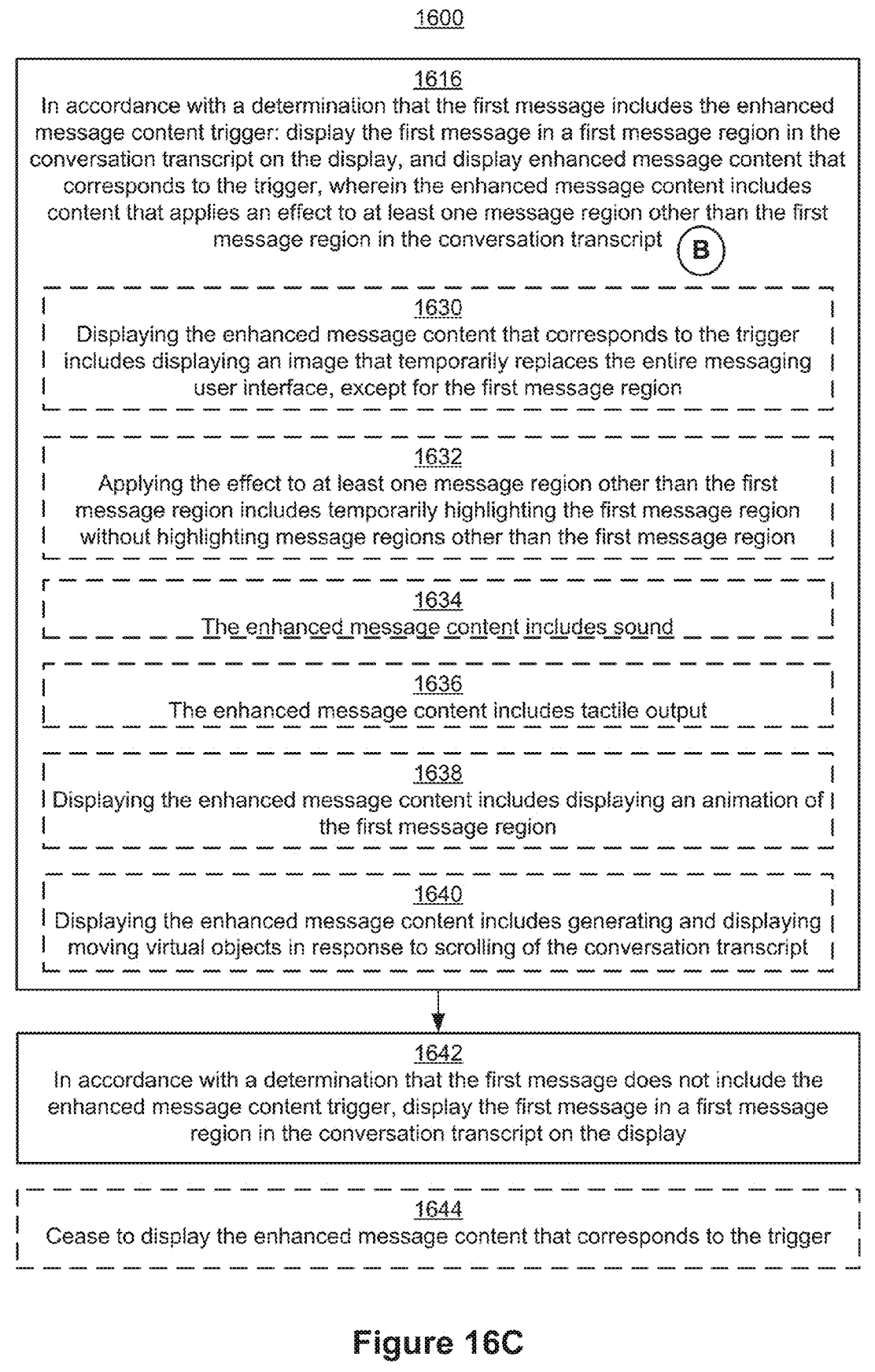

1616
In accordance with a determination that the first message includes the enhanced message content trigger: display the first message in a first message region in the conversation transcript on the display, and display enhanced message content that corresponds to the trigger, wherein the enhanced message content includes content that applies an effect to at least one message region other than the first message region in the conversation transcript (B)

1630
Displaying the enhanced message content that corresponds to the trigger includes displaying an image that temporarily replaces the entire messaging user interface, except for the first message region 1632
Applying the effect to at least one message region other than the first message region includes temporarily highlighting the first message region without highlighting message regions other than the first message region 1634
The enhanced message content includes sound 1636
The enhanced message content includes tactile output 1638
Displaying the enhanced message content includes displaying an animation of the first message region 1640
Displaying the enhanced message content includes generating and displaying moving virtual objects in response to scrolling of the conversation transcript 1642
In accordance with a determination that the first message does not include the enhanced message content trigger, display the first message in a first message region in the conversation transcript on the display 1644
Cease to display the enhanced message content that corresponds to the trigger

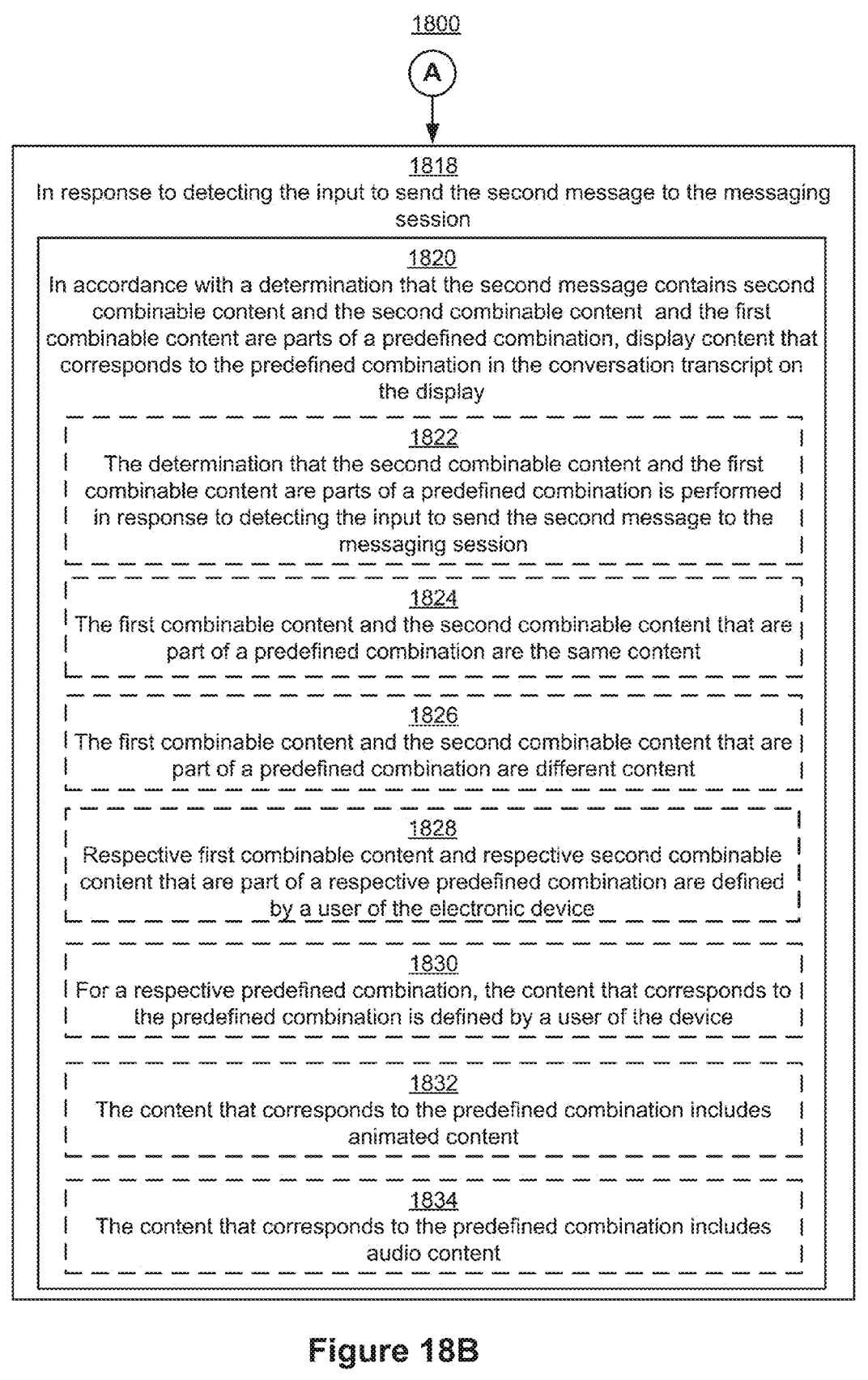

1818
In response to detecting the input to send the second message to the messaging session 1820
In accordance with a determination that the second message contains second combinable content and the second combinable content and the first combinable content are parts of a predefined combination, display content that corresponds to the predefined combination in the conversation transcript on the display 1822
The determination that the second combinable content and the first combinable content are parts of a predefined combination is performed in response to detecting the input to send the second message to the messaging session 1824
The first combinable content and the second combinable content that are part of a predefined combination are the same content 1826
The first combinable content and the second combinable content that are part of a predefined combination are different content 1828
Respective first combinable content and respective second combinable content that are part of a respective predefined combination are defined by a user of the electronic device 1830
For a respective predefined combination, the content that corresponds to the predefined combination is defined by a user of the device 1832
The content that corresponds to the predefined combination includes animated content 1834
The content that corresponds to the predefined combination includes audio content

Figure 18B

Portable Multifunction Device 100

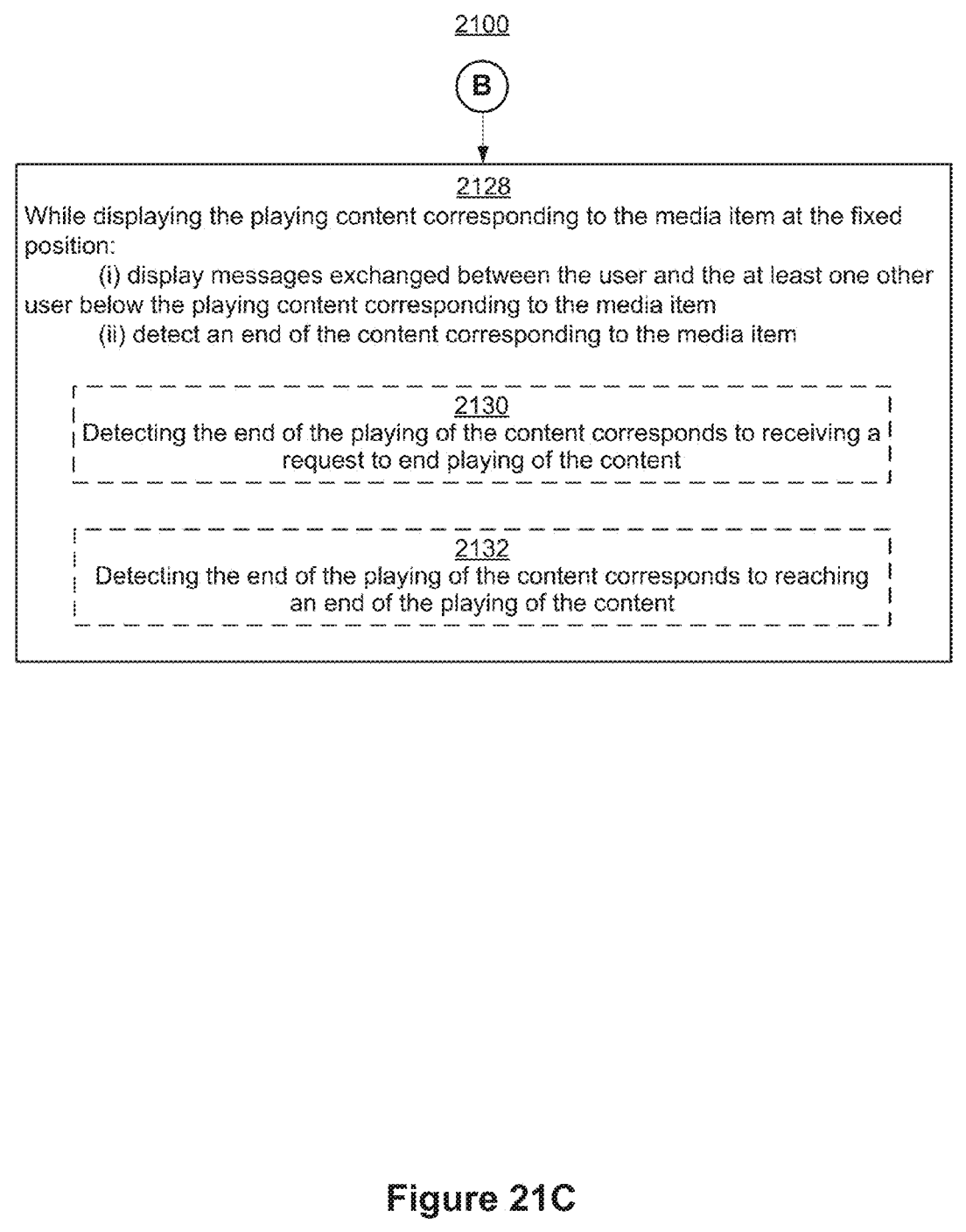

2100

B

2128
While displaying the playing content corresponding to the media item at the fixed position:
(i) display messages exchanged between the user and the at least one other user below the playing content corresponding to the media item
(ii) detect an end of the content corresponding to the media item 2130
Detecting the end of the playing of the content corresponds to receiving a request to end playing of the content 2132
Detecting the end of the playing of the content corresponds to reaching an end of the playing of the content

Figure 21C

Figure 23I
Portable Multifunction Device 100
2312
Thank yo
Done
Label
2309
keyboard icon
CONGRATS!!!
Some text

Figure 23M
2320
2312
2318
Done
Thank you
Label: thank you
Delete
100
Thank you
2309
keyboard icon
CONGRATS!!!
Some text

Figure 23O
Display of Second Electronic Device 2360
9:41 AM
100%
Tiffany
to take the girls to school.
Sorry to ask for your help on such short notice, hope it wasn't too much trouble.
No problem, I just dropped off Katie and Emily at school – they loved getting to ride in together.
2322
iMessage
The
I'm
Q W E R T Y U I O P
A S D F G H J K L
Z X C V B N M
123
space
return

Figure 23P
9:41 AM
100%
Tiffany
to take the girls to school.
Sorry to ask for your help on such short notice, hope it wasn't too much trouble.
No problem, I just dropped off Katie and Emily at school – they loved getting to ride in together.
iMessage
The
I'm
Q W E R T Y U I O P
A S D F G H J K L
Z X C V B N M
123
space
return

Display of Second Electronic Device 2360

2322

Figure 23Q
Display of Second Electronic Device 2360
9:41 AM
100%
Tiffany
Sorry to ask for your help on such short notice, hope it wasn't too much trouble.
No problem, I just dropped off Katie and Emily at school - they loved getting to ride in together.
2324
iMessage
The
I'm
Q W E R T Y U I O P
A S D F G H J K L
Z X C V B N M
123
space
return

Figure 23R
Display of Second Electronic Device 2360
9:41 AM
100%
Tiffany
Sorry to ask for your help on such short notice, hope it wasn't too much trouble.
No problem, I just dropped off Katie and Emily at school ... they loved getting to ride in together.
2324
iMessage
Q W E R T Y U I O P
A S D F G H J K L
Z X C V B N M
123
space
return

Display of Second Electronic Device 2360

2324

Display of Second Electronic Device 2360

Close-up of 2324

Display of Second Electronic Device 2360

Close-up of 2324

Portable Multifunction Device 100

Portable Multifunction Device 100

Figure 24A:
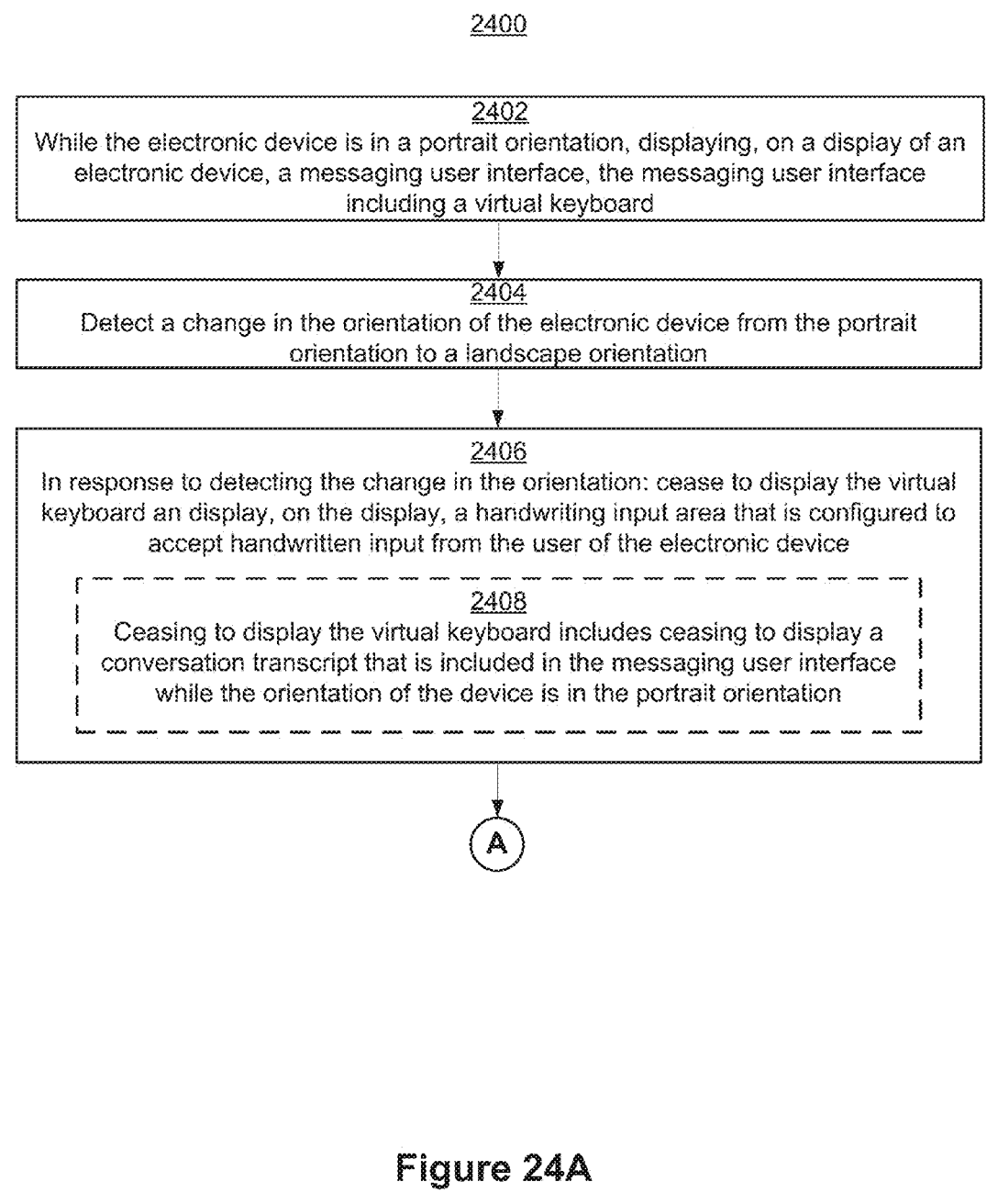

2400

2402
While the electronic device is in a portrait orientation, displaying, on a display of an electronic device, a messaging user interface, the messaging user interface including a virtual keyboard 2404
Detect a change in the orientation of the electronic device from the portrait orientation to a landscape orientation 2406
In response to detecting the change in the orientation: cease to display the virtual keyboard an display, on the display, a handwriting input area that is configured to accept handwritten input from the user of the electronic device 2408
Ceasing to display the virtual keyboard includes ceasing to display a conversation transcript that is included in the messaging user interface while the orientation of the device is in the portrait orientation

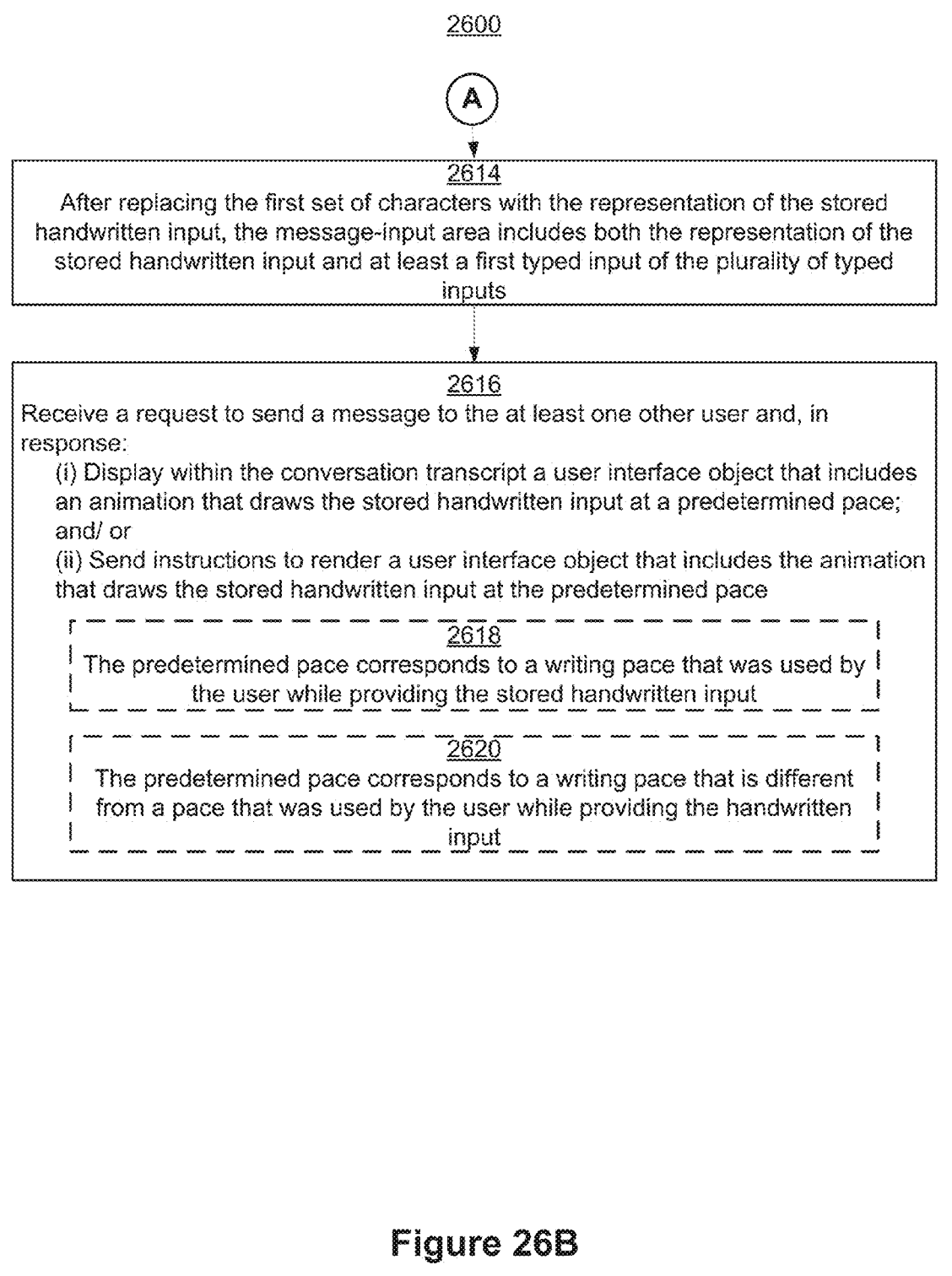

2614
After replacing the first set of characters with the representation of the stored handwritten input, the message-input area includes both the representation of the stored handwritten input and at least a first typed input of the plurality of typed inputs 2616
Receive a request to send a message to the at least one other user and, in response:
(i) Display within the conversation transcript a user interface object that includes an animation that draws the stored handwritten input at a predetermined pace; and/ or
(ii) Send instructions to render a user interface object that includes the animation that draws the stored handwritten input at the predetermined pace 2618
The predetermined pace corresponds to a writing pace that was used by the user while providing the stored handwritten input 2620
The predetermined pace corresponds to a writing pace that is different from a pace that was used by the user while providing the handwritten input

Figure 26B

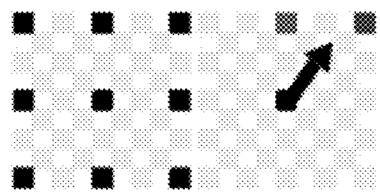
Table 4
Given two overlapping segments: (SA)
(SB) minus (SC) equals (SD)
```
DIFF = min(NEW_SEGMENT + PREVIOUS_SEGMENT, 1.0) - PREVIOUS_SEGMENT;
```
Table 5
```
ALPHA = min(DIFF + PREVIOUS_ALPHA, 1.0);
```
Table 6
Figure 28C

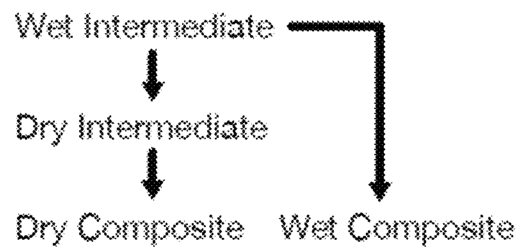
Table 1
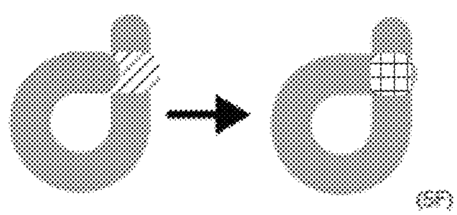
Table 7
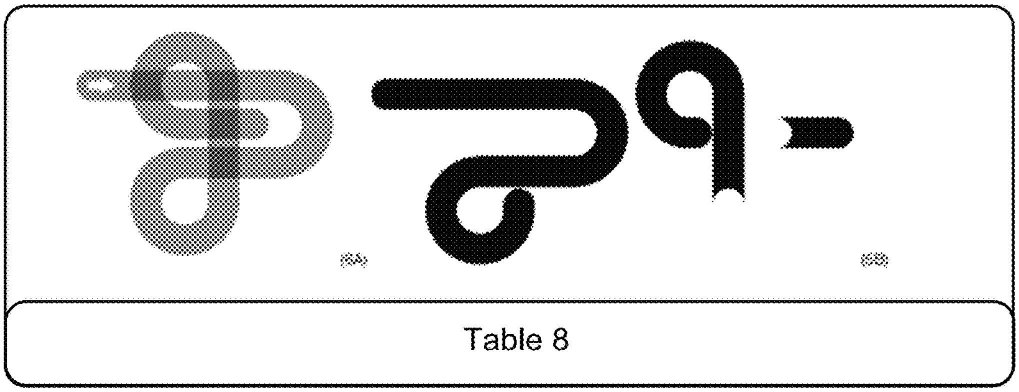
Table 8
Figure 28D

Figure 31A:
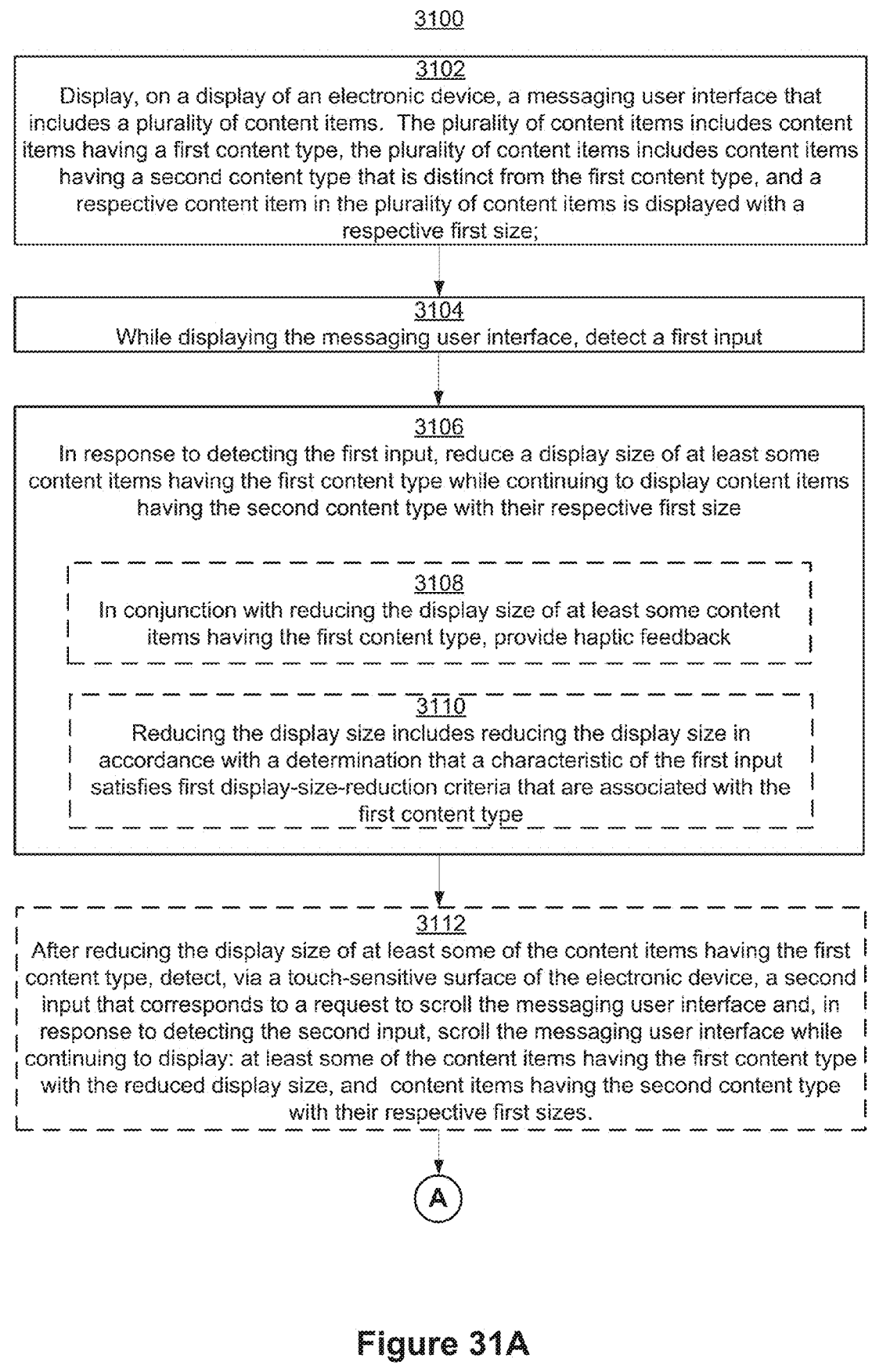

3100

3102
Display, on a display of an electronic device, a messaging user interface that includes a plurality of content items. The plurality of content items includes content items having a first content type, the plurality of content items includes content items having a second content type that is distinct from the first content type, and a respective content item in the plurality of content items is displayed with a respective first size;

3104
While displaying the messaging user interface, detect a first input

3106
In response to detecting the first input, reduce a display size of at least some content items having the first content type while continuing to display content items having the second content type with their respective first size 3108
In conjunction with reducing the display size of at least some content items having the first content type, provide haptic feedback 3110
Reducing the display size includes reducing the display size in accordance with a determination that a characteristic of the first input satisfies first display-size-reduction criteria that are associated with the first content type 3112
After reducing the display size of at least some of the content items having the first content type, detect, via a touch-sensitive surface of the electronic device, a second input that corresponds to a request to scroll the messaging user interface and, in response to detecting the second input, scroll the messaging user interface while continuing to display: at least some of the content items having the first content type with the reduced display size, and content items having the second content type with their respective first sizes.

Figure 33A:
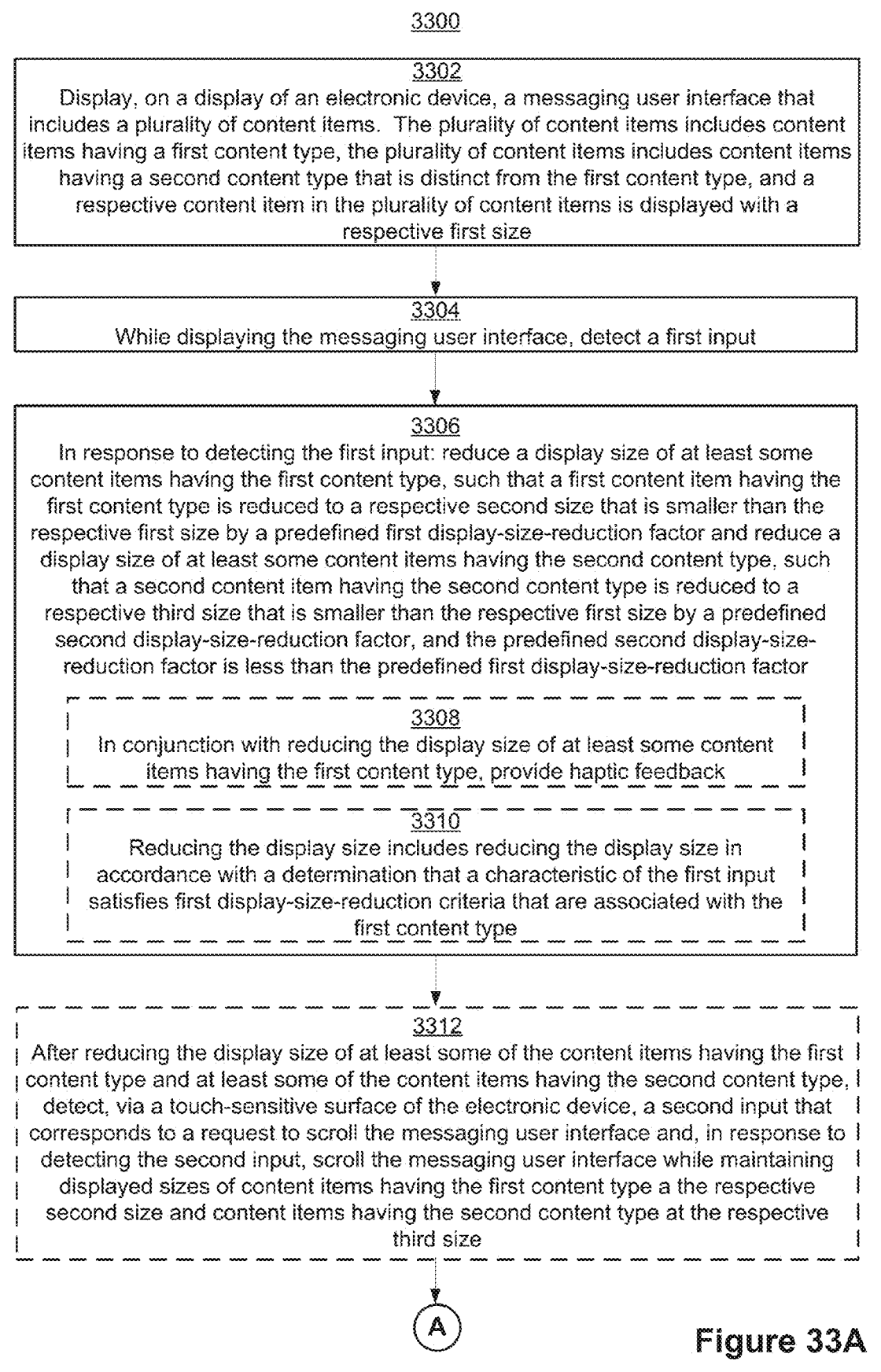

3302
Display, on a display of an electronic device, a messaging user interface that includes a plurality of content items. The plurality of content items includes content items having a first content type, the plurality of content items includes content items having a second content type that is distinct from the first content type, and a respective content item in the plurality of content items is displayed with a respective first size 3304
While displaying the messaging user interface, detect a first input 3306
In response to detecting the first input: reduce a display size of at least some content items having the first content type, such that a first content item having the first content type is reduced to a respective second size that is smaller than the respective first size by a predefined first display-size-reduction factor and reduce a display size of at least some content items having the second content type, such that a second content item having the second content type is reduced to a respective third size that is smaller than the respective first size by a predefined second display-size-reduction factor, and the predefined second display-size-reduction factor is less than the predefined first display-size-reduction factor 3308
In conjunction with reducing the display size of at least some content items having the first content type, provide haptic feedback 3310
Reducing the display size includes reducing the display size in accordance with a determination that a characteristic of the first input satisfies first display-size-reduction criteria that are associated with the first content type 3312
After reducing the display size of at least some of the content items having the first content type and at least some of the content items having the second content type, detect, via a touch-sensitive surface of the electronic device, a second input that corresponds to a request to scroll the messaging user interface and, in response to detecting the second input, scroll the messaging user interface while maintaining displayed sizes of content items having the first content type a the respective second size and content items having the second content type at the respective third size

Figure 39F
206
Portable Multifunction Device 100-1
Speaker 111
Optical Sensor 164
Proximity Sensor 166
3500
208
208
402
9:45 AM 404
42%
406
Abe
3747
3749
Sounds good; I'll add to the pizza.
3753
It's your turn to pay.
3755
3502
You ordered a pizza
3702
3842
3520
3908
Cold Weather Stickers
3914
3906
3908
3910
3627
Winter is approaching
3904
Touch Screen 112
Microphone 113
Accelerometer(s) 168
204

Figure 42B:
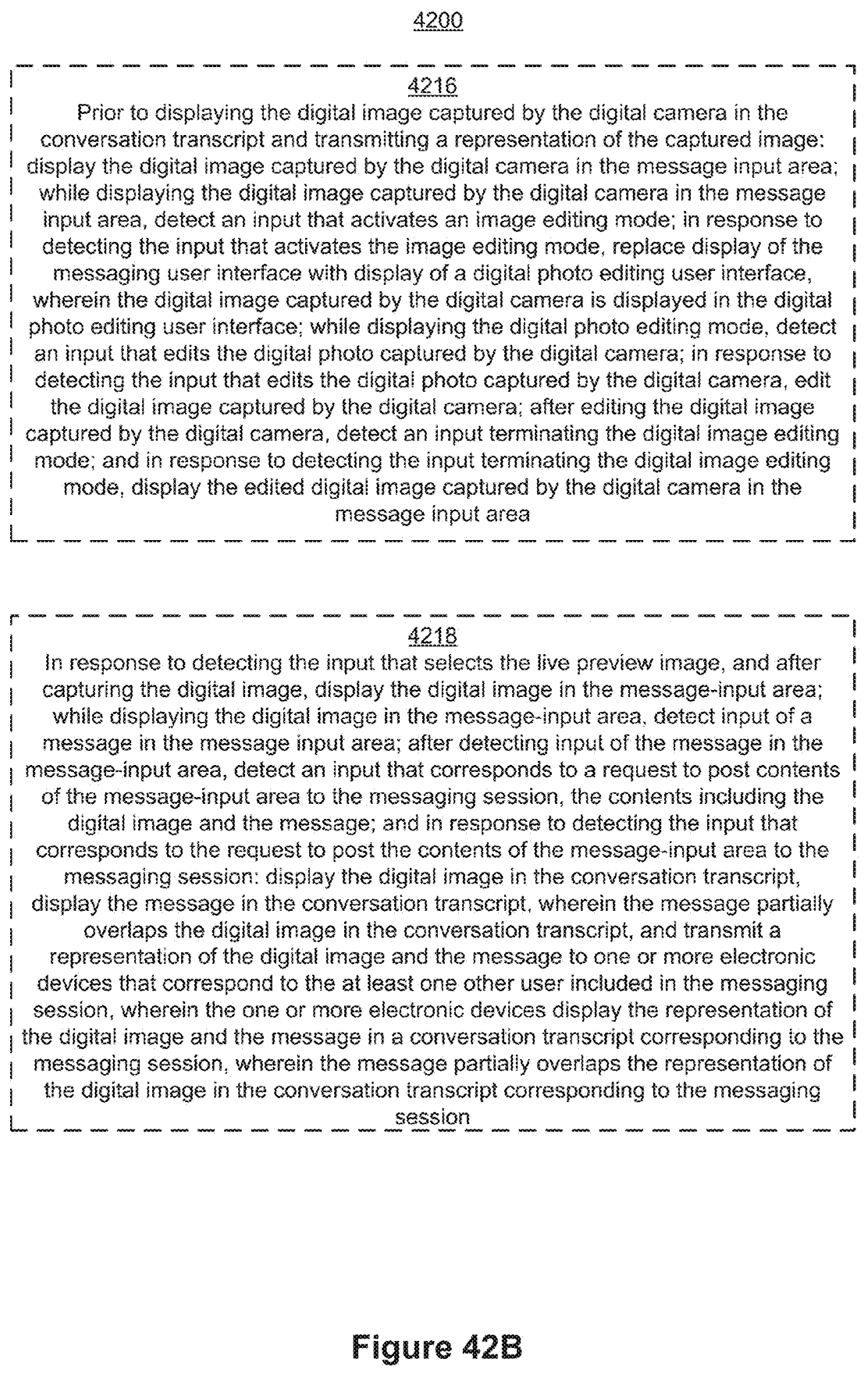

4216
Prior to displaying the digital image captured by the digital camera in the conversation transcript and transmitting a representation of the captured image: display the digital image captured by the digital camera in the message input area; while displaying the digital image captured by the digital camera in the message input area, detect an input that activates an image editing mode; in response to detecting the input that activates the image editing mode, replace display of the messaging user interface with display of a digital photo editing user interface, wherein the digital image captured by the digital camera is displayed in the digital photo editing user interface; while displaying the digital photo editing mode, detect an input that edits the digital photo captured by the digital camera; in response to detecting the input that edits the digital photo captured by the digital camera, edit the digital image captured by the digital camera; after editing the digital image captured by the digital camera, detect an input terminating the digital image editing mode; and in response to detecting the input terminating the digital image editing mode, display the edited digital image captured by the digital camera in the message input area 4218
In response to detecting the input that selects the live preview image, and after capturing the digital image, display the digital image in the message-input area; while displaying the digital image in the message-input area, detect input of a message in the message input area; after detecting input of the message in the message-input area, detect an input that corresponds to a request to post contents of the message-input area to the messaging session, the contents including the digital image and the message; and in response to detecting the input that corresponds to the request to post the contents of the message-input area to the messaging session: display the digital image in the conversation transcript, display the message in the conversation transcript, wherein the message partially overlaps the digital image in the conversation transcript, and transmit a representation of the digital image and the message to one or more electronic devices that correspond to the at least one other user included in the messaging session, wherein the one or more electronic devices display the representation of the digital image and the message in a conversation transcript corresponding to the messaging session, wherein the message partially overlaps the representation of the digital image in the conversation transcript corresponding to the messaging session

Figure 42C:
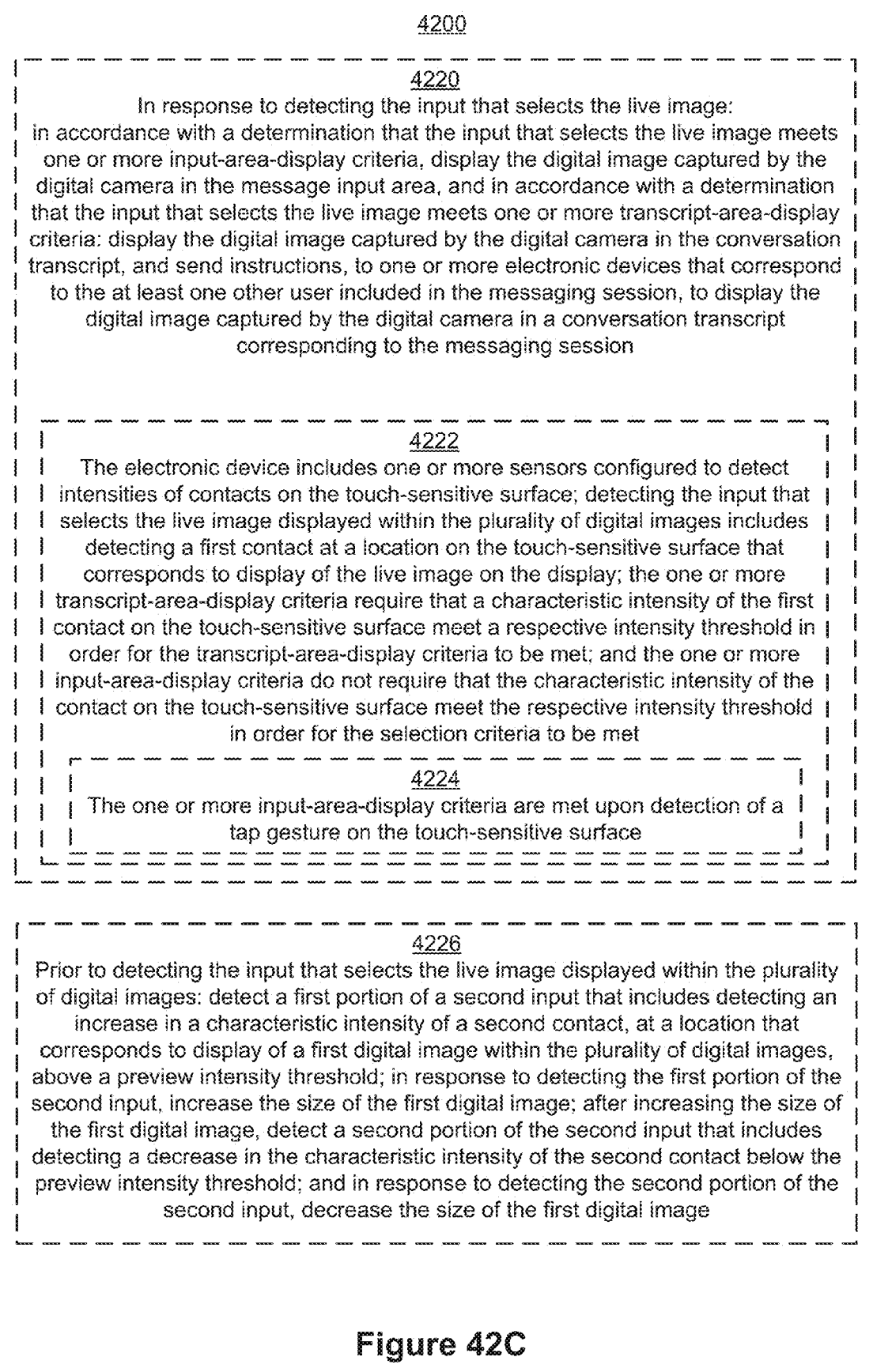

4220
In response to detecting the input that selects the live image: in accordance with a determination that the input that selects the live image meets one or more input-area-display criteria, display the digital image captured by the digital camera in the message input area, and in accordance with a determination that the input that selects the live image meets one or more transcript-area-display criteria: display the digital image captured by the digital camera in the conversation transcript, and send instructions, to one or more electronic devices that correspond to the at least one other user included in the messaging session, to display the digital image captured by the digital camera in a conversation transcript corresponding to the messaging session 4222
The electronic device includes one or more sensors configured to detect intensities of contacts on the touch-sensitive surface; detecting the input that selects the live image displayed within the plurality of digital images includes detecting a first contact at a location on the touch-sensitive surface that corresponds to display of the live image on the display; the one or more transcript-area-display criteria require that a characteristic intensity of the first contact on the touch-sensitive surface meet a respective intensity threshold in order for the transcript-area-display criteria to be met; and the one or more input-area-display criteria do not require that the characteristic intensity of the contact on the touch-sensitive surface meet the respective intensity threshold in order for the selection criteria to be met 4224
The one or more input-area-display criteria are met upon detection of a tap gesture on the touch-sensitive surface 4226
Prior to detecting the input that selects the live image displayed within the plurality of digital images: detect a first portion of a second input that includes detecting an increase in a characteristic intensity of a second contact, at a location that corresponds to display of a first digital image within the plurality of digital images, above a preview intensity threshold; in response to detecting the first portion of the second input, increase the size of the first digital image; after increasing the size of the first digital image, detect a second portion of the second input that includes detecting a decrease in the characteristic intensity of the second contact below the preview intensity threshold; and in response to detecting the second portion of the second input, decrease the size of the first digital image

Figure 42D:
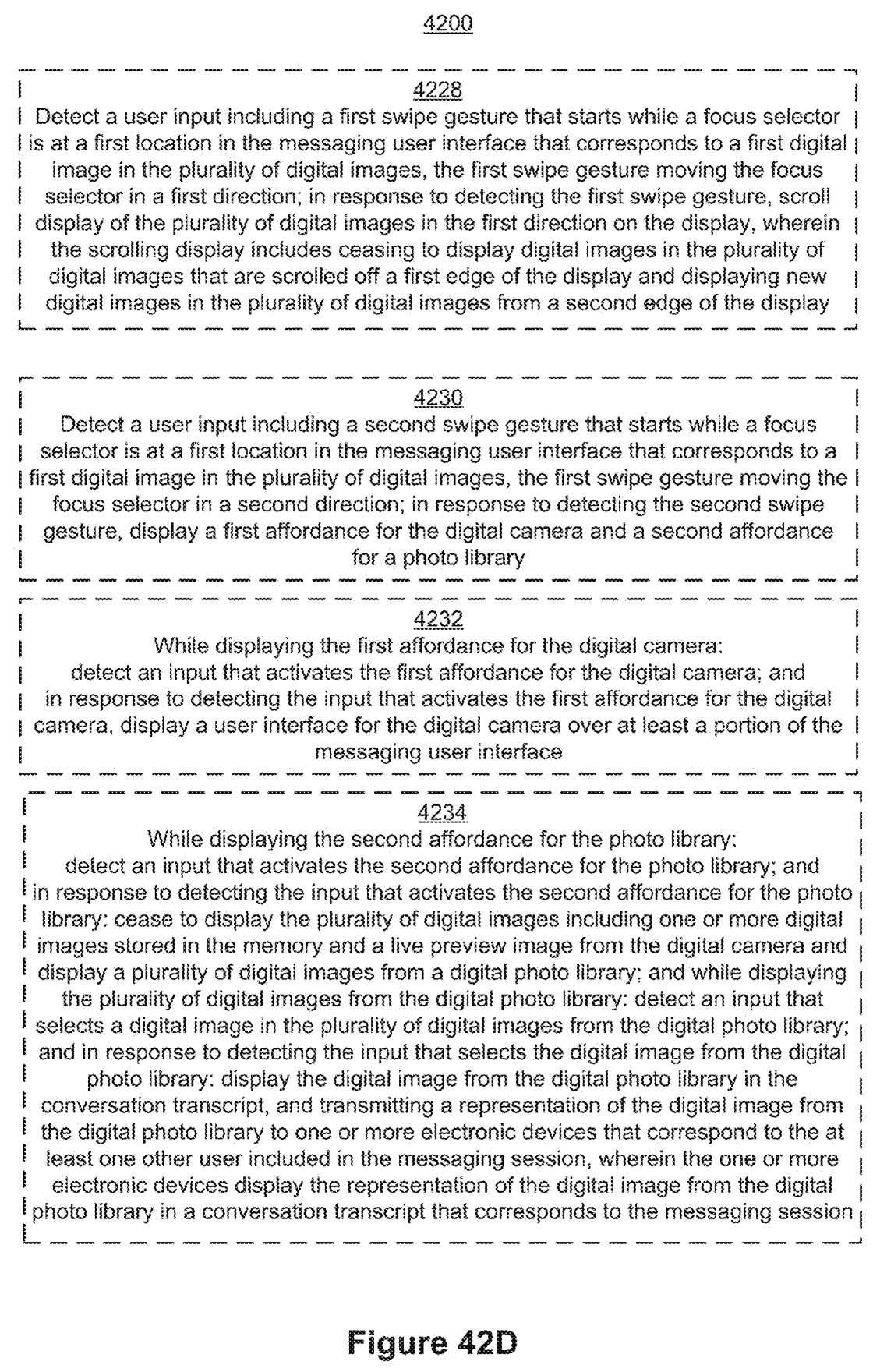

4228
Detect a user input including a first swipe gesture that starts while a focus selector is at a first location in the messaging user interface that corresponds to a first digital image in the plurality of digital images, the first swipe gesture moving the focus selector in a first direction; in response to detecting the first swipe gesture, scroll display of the plurality of digital images in the first direction on the display, wherein the scrolling display includes ceasing to display digital images in the plurality of digital images that are scrolled off a first edge of the display and displaying new digital images in the plurality of digital images from a second edge of the display 4230
Detect a user input including a second swipe gesture that starts while a focus selector is at a first location in the messaging user interface that corresponds to a first digital image in the plurality of digital images, the first swipe gesture moving the focus selector in a second direction; in response to detecting the second swipe gesture, display a first affordance for the digital camera and a second affordance for a photo library 4232
While displaying the first affordance for the digital camera:
detect an input that activates the first affordance for the digital camera; and
in response to detecting the input that activates the first affordance for the digital camera, display a user interface for the digital camera over at least a portion of the messaging user interface 4234
While displaying the second affordance for the photo library:
detect an input that activates the second affordance for the photo library; and
in response to detecting the input that activates the second affordance for the photo library: cease to display the plurality of digital images including one or more digital images stored in the memory and a live preview image from the digital camera and display a plurality of digital images from a digital photo library; and while displaying the plurality of digital images from the digital photo library: detect an input that selects a digital image in the plurality of digital images from the digital photo library; and in response to detecting the input that selects the digital image from the digital photo library: display the digital image from the digital photo library in the conversation transcript, and transmitting a representation of the digital image from the digital photo library to one or more electronic devices that correspond to the at least one other user included in the messaging session, wherein the one or more electronic devices display the representation of the digital image from the digital photo library in a conversation transcript that corresponds to the messaging session

Figure 44A:
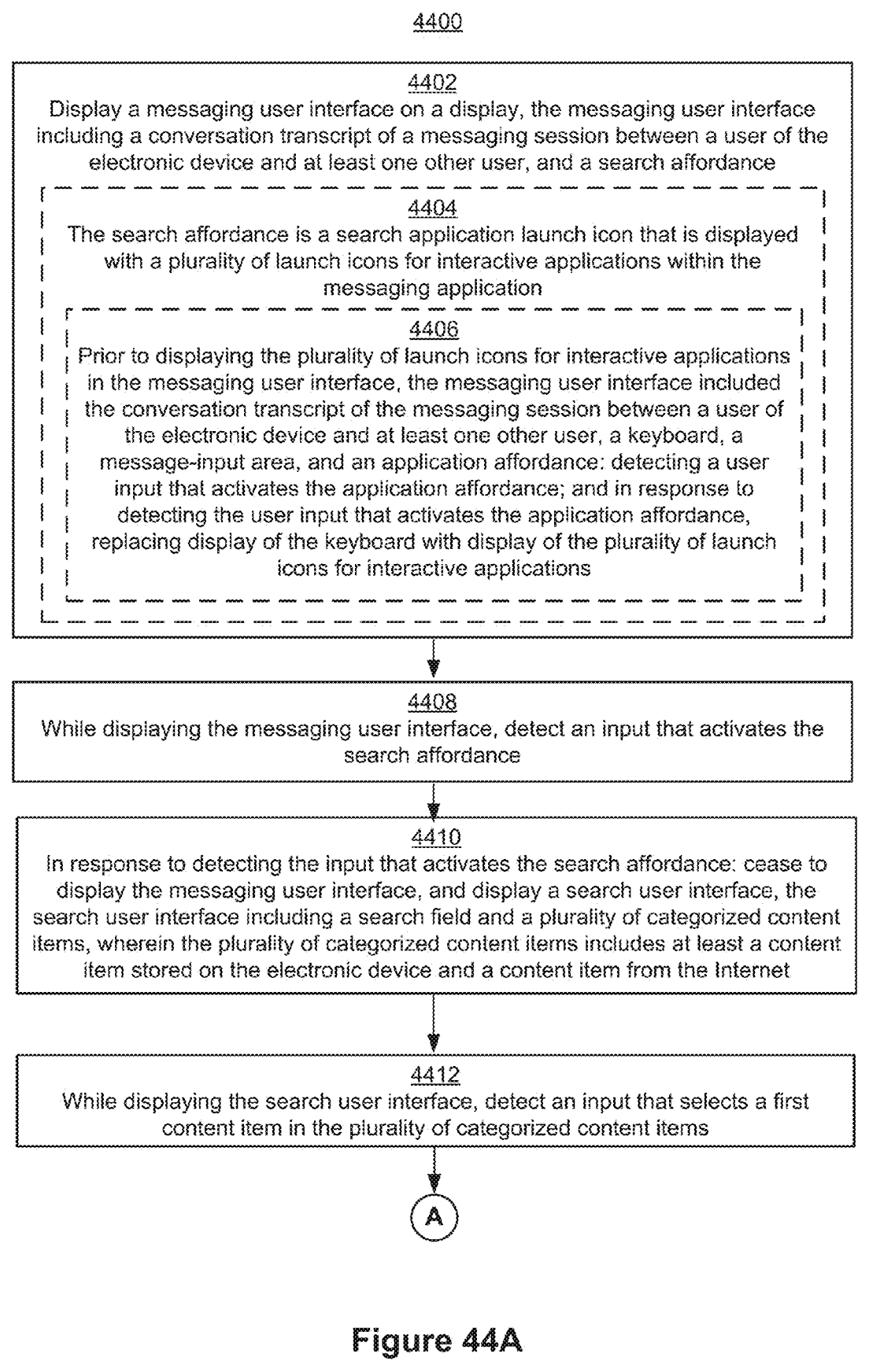

4402
Display a messaging user interface on a display, the messaging user interface including a conversation transcript of a messaging session between a user of the electronic device and at least one other user, and a search affordance 4404
The search affordance is a search application launch icon that is displayed with a plurality of launch icons for interactive applications within the messaging application 4406
Prior to displaying the plurality of launch icons for interactive applications in the messaging user interface, the messaging user interface included the conversation transcript of the messaging session between a user of the electronic device and at least one other user, a keyboard, a message-input area, and an application affordance: detecting a user input that activates the application affordance; and in response to detecting the user input that activates the application affordance, replacing display of the keyboard with display of the plurality of launch icons for interactive applications 4408
While displaying the messaging user interface, detect an input that activates the search affordance 4410
In response to detecting the input that activates the search affordance: cease to display the messaging user interface, and display a search user interface, the search user interface including a search field and a plurality of categorized content items, wherein the plurality of categorized content items includes at least a content item stored on the electronic device and a content item from the Internet 4412
While displaying the search user interface, detect an input that selects a first content item in the plurality of categorized content items

Figure 44C:
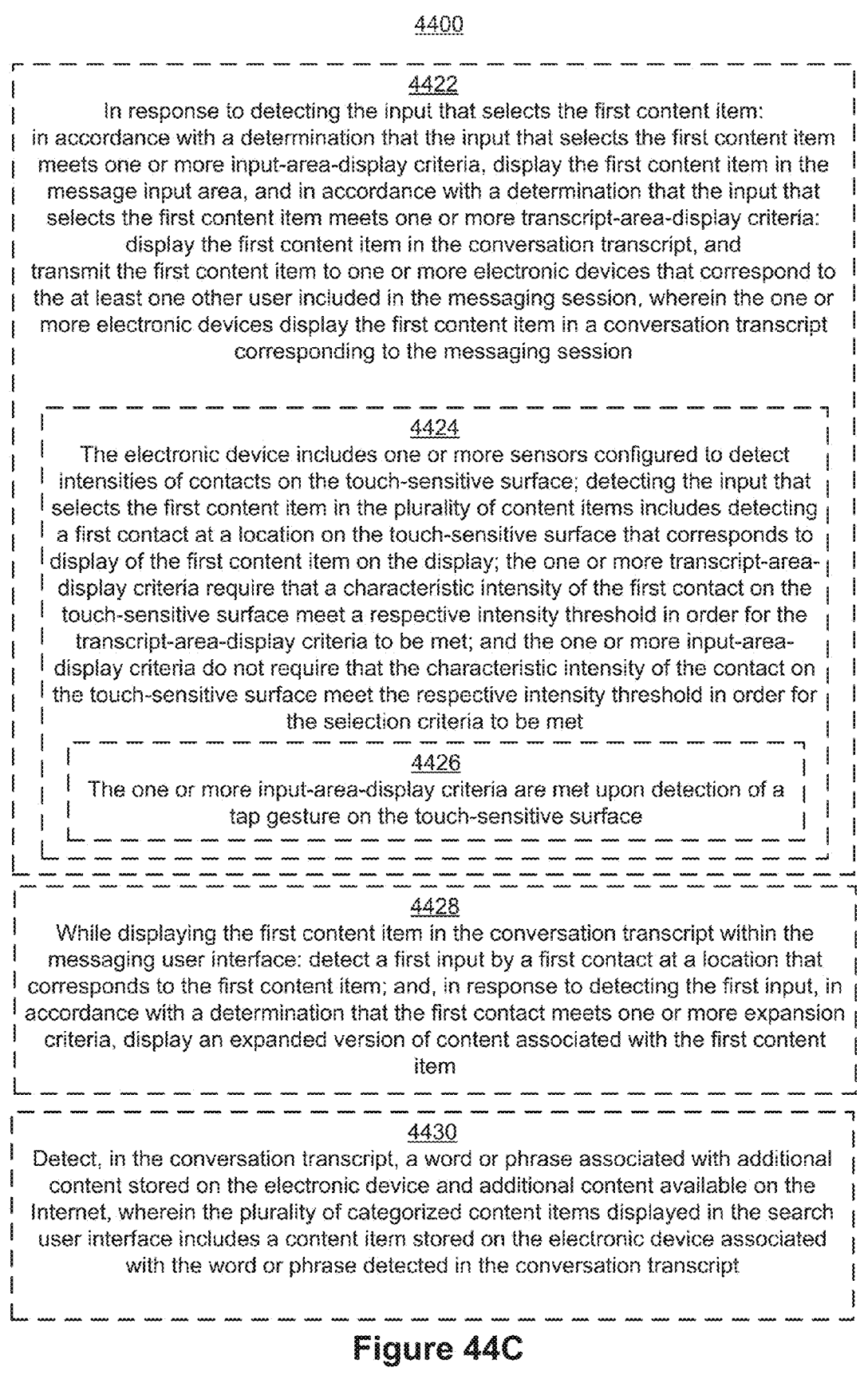

4422
In response to detecting the input that selects the first content item: in accordance with a determination that the input that selects the first content item meets one or more input-area-display criteria, display the first content item in the message input area, and in accordance with a determination that the input that selects the first content item meets one or more transcript-area-display criteria: display the first content item in the conversation transcript, and transmit the first content item to one or more electronic devices that correspond to the at least one other user included in the messaging session, wherein the one or more electronic devices display the first content item in a conversation transcript corresponding to the messaging session 4424
The electronic device includes one or more sensors configured to detect intensities of contacts on the touch-sensitive surface; detecting the input that selects the first content item in the plurality of content items includes detecting a first contact at a location on the touch-sensitive surface that corresponds to display of the first content item on the display; the one or more transcript-area-display criteria require that a characteristic intensity of the first contact on the touch-sensitive surface meet a respective intensity threshold in order for the transcript-area-display criteria to be met; and the one or more input-area-display criteria do not require that the characteristic intensity of the contact on the touch-sensitive surface meet the respective intensity threshold in order for the selection criteria to be met 4426
The one or more input-area-display criteria are met upon detection of a tap gesture on the touch-sensitive surface 4428
While displaying the first content item in the conversation transcript within the messaging user interface: detect a first input by a first contact at a location that corresponds to the first content item; and, in response to detecting the first input, in accordance with a determination that the first contact meets one or more expansion criteria, display an expanded version of content associated with the first content item 4430
Detect, in the conversation transcript, a word or phrase associated with additional content stored on the electronic device and additional content available on the Internet, wherein the plurality of categorized content items displayed in the search user interface includes a content item stored on the electronic device associated with the word or phrase detected in the conversation transcript

Figure 44D:
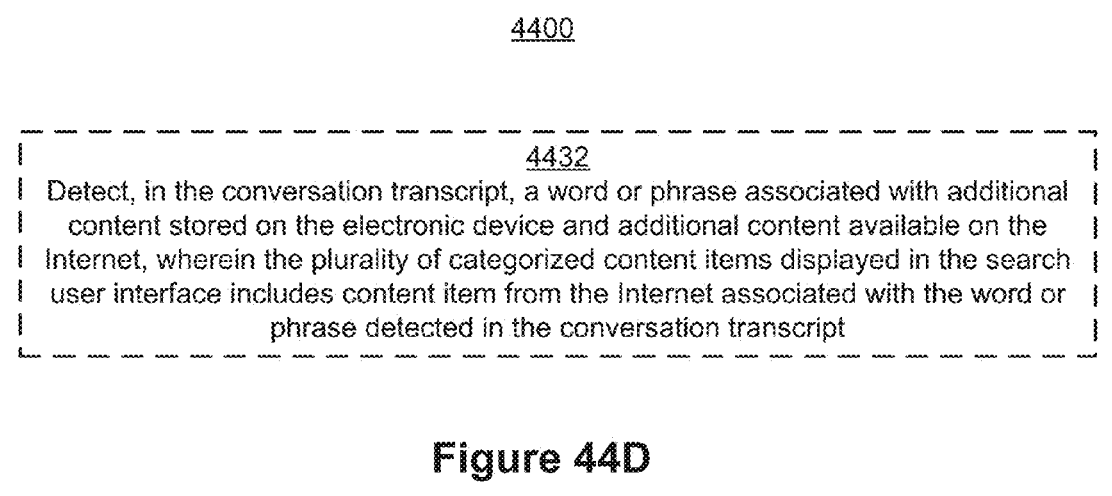

4432
Detect, in the conversation transcript, a word or phrase associated with additional content stored on the electronic device and additional content available on the Internet, wherein the plurality of categorized content items displayed in the search user interface includes content item from the Internet associated with the word or phrase detected in the conversation transcript

Figure 46A:
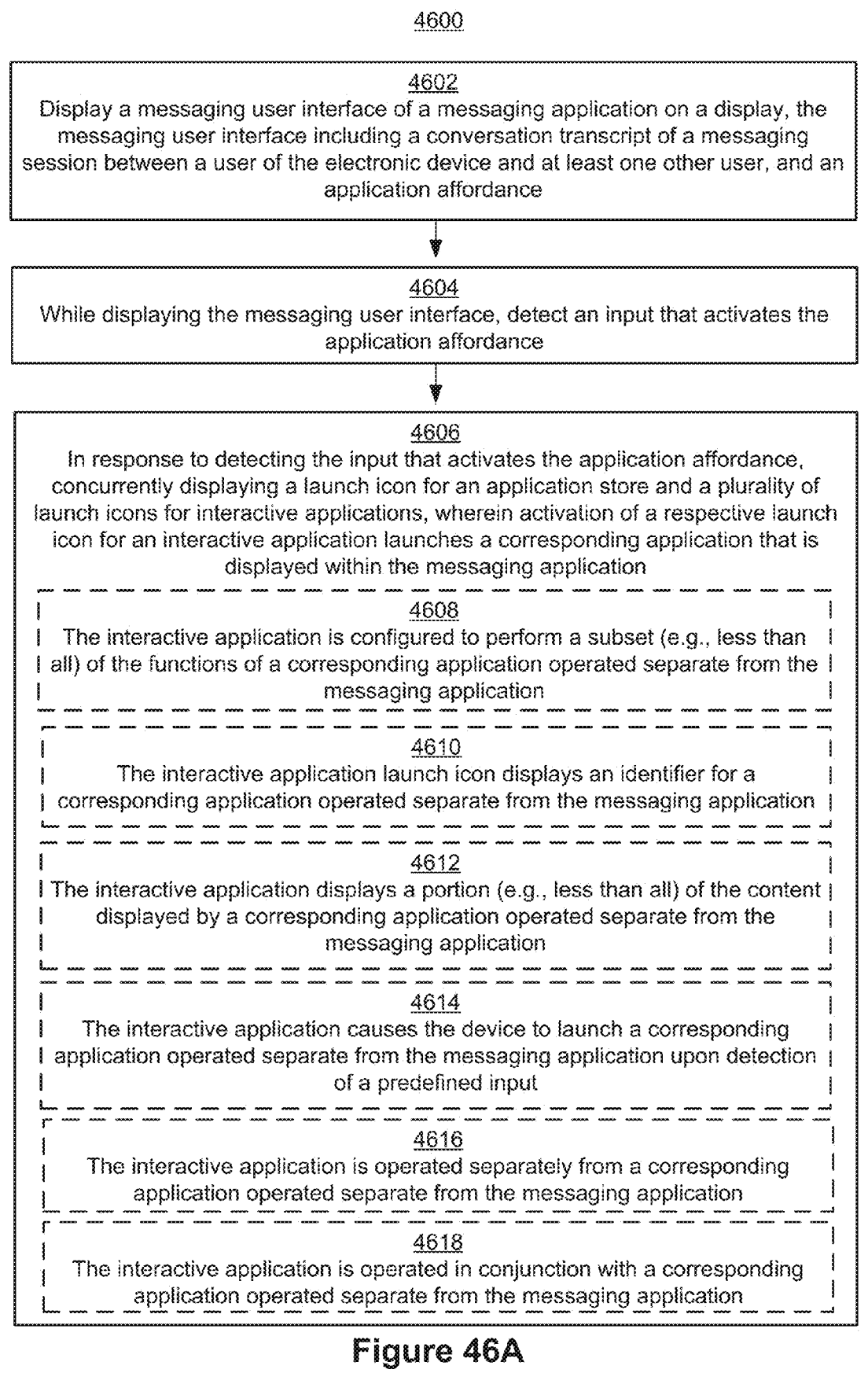

4602
Display a messaging user interface of a messaging application on a display, the messaging user interface including a conversation transcript of a messaging session between a user of the electronic device and at least one other user, and an application affordance 4604
While displaying the messaging user interface, detect an input that activates the application affordance 4606
In response to detecting the input that activates the application affordance, concurrently displaying a launch icon for an application store and a plurality of launch icons for interactive applications, wherein activation of a respective launch icon for an interactive application launches a corresponding application that is displayed within the messaging application 4608
The interactive application is configured to perform a subset (e.g., less than all) of the functions of a corresponding application operated separate from the messaging application 4610
The interactive application launch icon displays an identifier for a corresponding application operated separate from the messaging application 4612
The interactive application displays a portion (e.g., less than all) of the content displayed by a corresponding application operated separate from the messaging application 4614
The interactive application causes the device to launch a corresponding application operated separate from the messaging application upon detection of a predefined input 4616
The interactive application is operated separately from a corresponding application operated separate from the messaging application 4618
The interactive application is operated in conjunction with a corresponding application operated separate from the messaging application

Figure 46B:
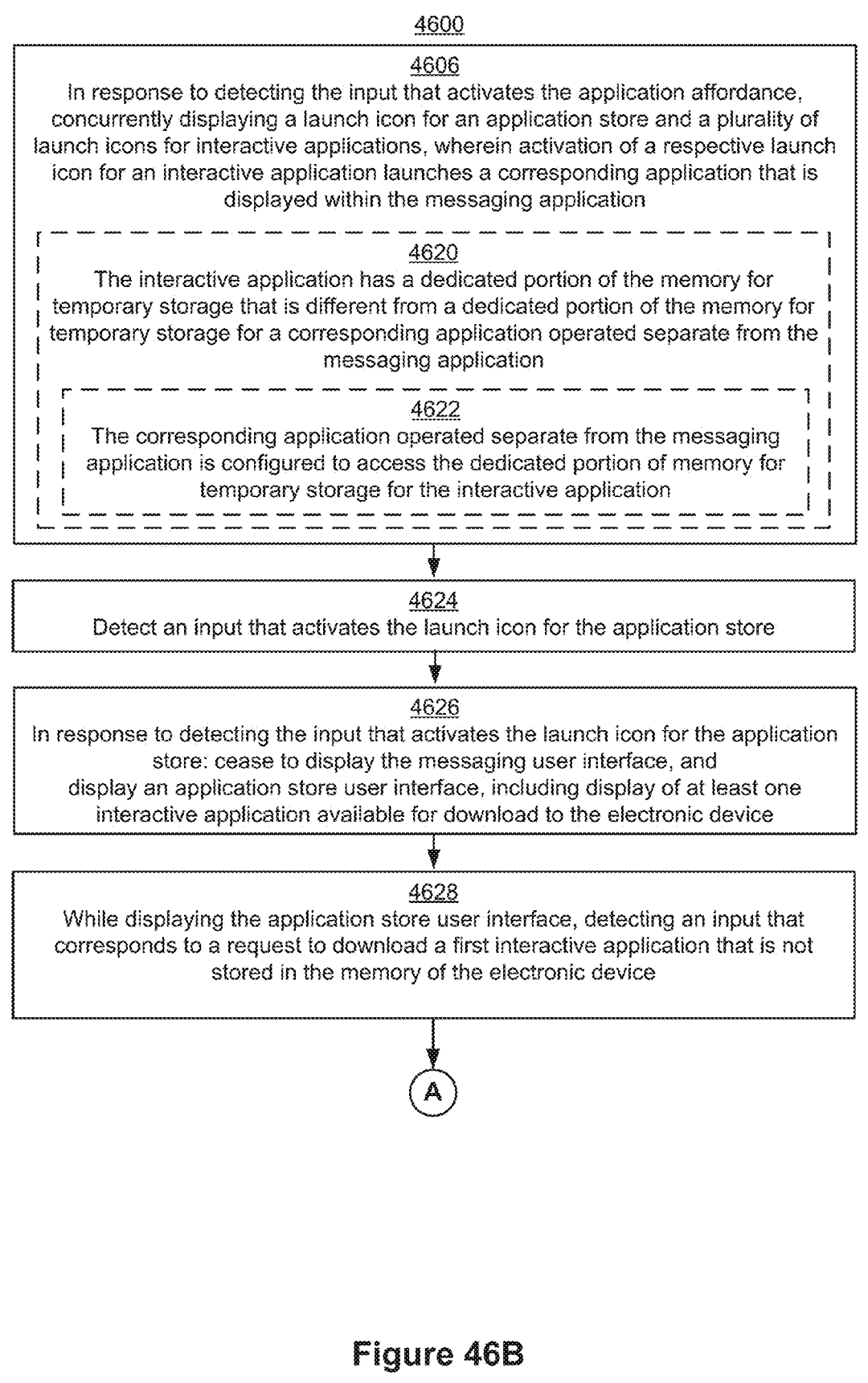

4606
In response to detecting the input that activates the application affordance, concurrently displaying a launch icon for an application store and a plurality of launch icons for interactive applications, wherein activation of a respective launch icon for an interactive application launches a corresponding application that is displayed within the messaging application 4620
The interactive application has a dedicated portion of the memory for temporary storage that is different from a dedicated portion of the memory for temporary storage for a corresponding application operated separate from the messaging application 4622
The corresponding application operated separate from the messaging application is configured to access the dedicated portion of memory for temporary storage for the interactive application 4624
Detect an input that activates the launch icon for the application store 4626
In response to detecting the input that activates the launch icon for the application store: cease to display the messaging user interface, and
display an application store user interface, including display of at least one interactive application available for download to the electronic device 4628
While displaying the application store user interface, detecting an input that corresponds to a request to download a first interactive application that is not stored in the memory of the electronic device

Figure 46C:
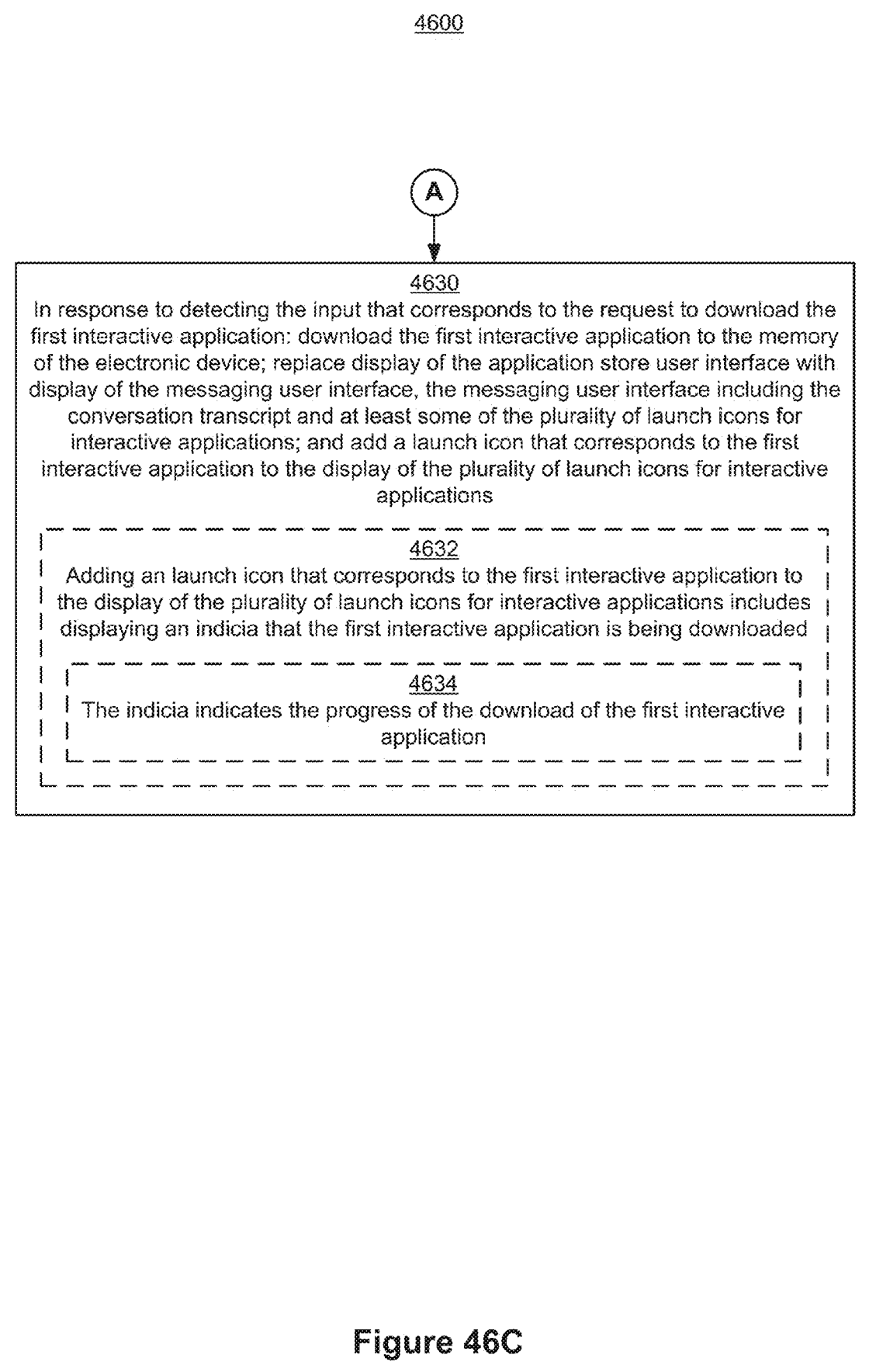

4630
In response to detecting the input that corresponds to the request to download the first interactive application: download the first interactive application to the memory of the electronic device; replace display of the application store user interface with display of the messaging user interface, the messaging user interface including the conversation transcript and at least some of the plurality of launch icons for interactive applications; and add a launch icon that corresponds to the first interactive application to the display of the plurality of launch icons for interactive applications 4632
Adding an launch icon that corresponds to the first interactive application to the display of the plurality of launch icons for interactive applications includes displaying an indicia that the first interactive application is being downloaded 4634
The indicia indicates the progress of the download of the first interactive application

Figure 48A:
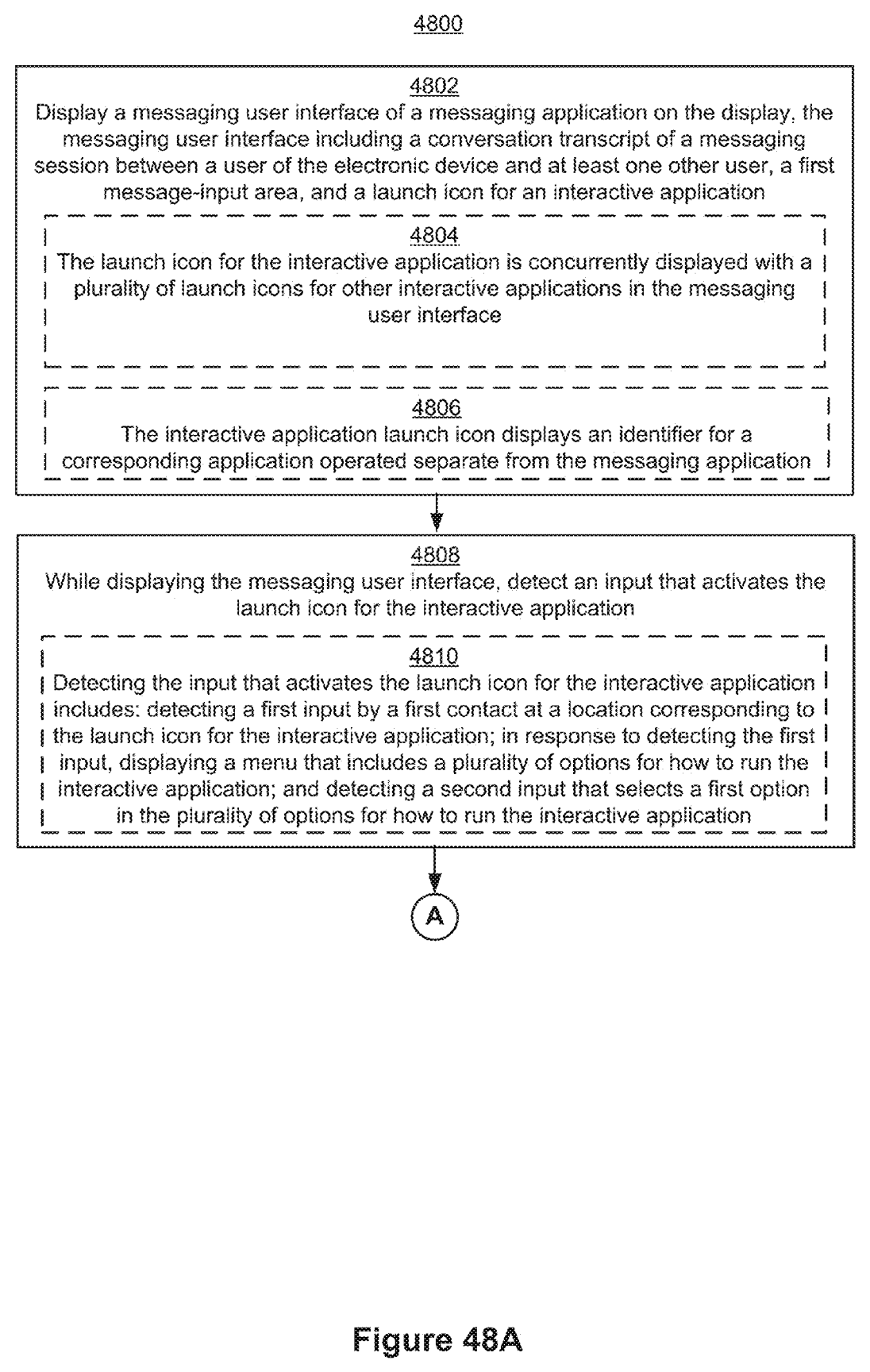

4802
Display a messaging user interface of a messaging application on the display, the messaging user interface including a conversation transcript of a messaging session between a user of the electronic device and at least one other user, a first message-input area, and a launch icon for an interactive application 4804
The launch icon for the interactive application is concurrently displayed with a plurality of launch icons for other interactive applications in the messaging user interface 4806
The interactive application launch icon displays an identifier for a corresponding application operated separate from the messaging application 4808
While displaying the messaging user interface, detect an input that activates the launch icon for the interactive application 4810
Detecting the input that activates the launch icon for the interactive application includes: detecting a first input by a first contact at a location corresponding to the launch icon for the interactive application; in response to detecting the first input, displaying a menu that includes a plurality of options for how to run the interactive application; and detecting a second input that selects a first option in the plurality of options for how to run the interactive application

Figure 48B:
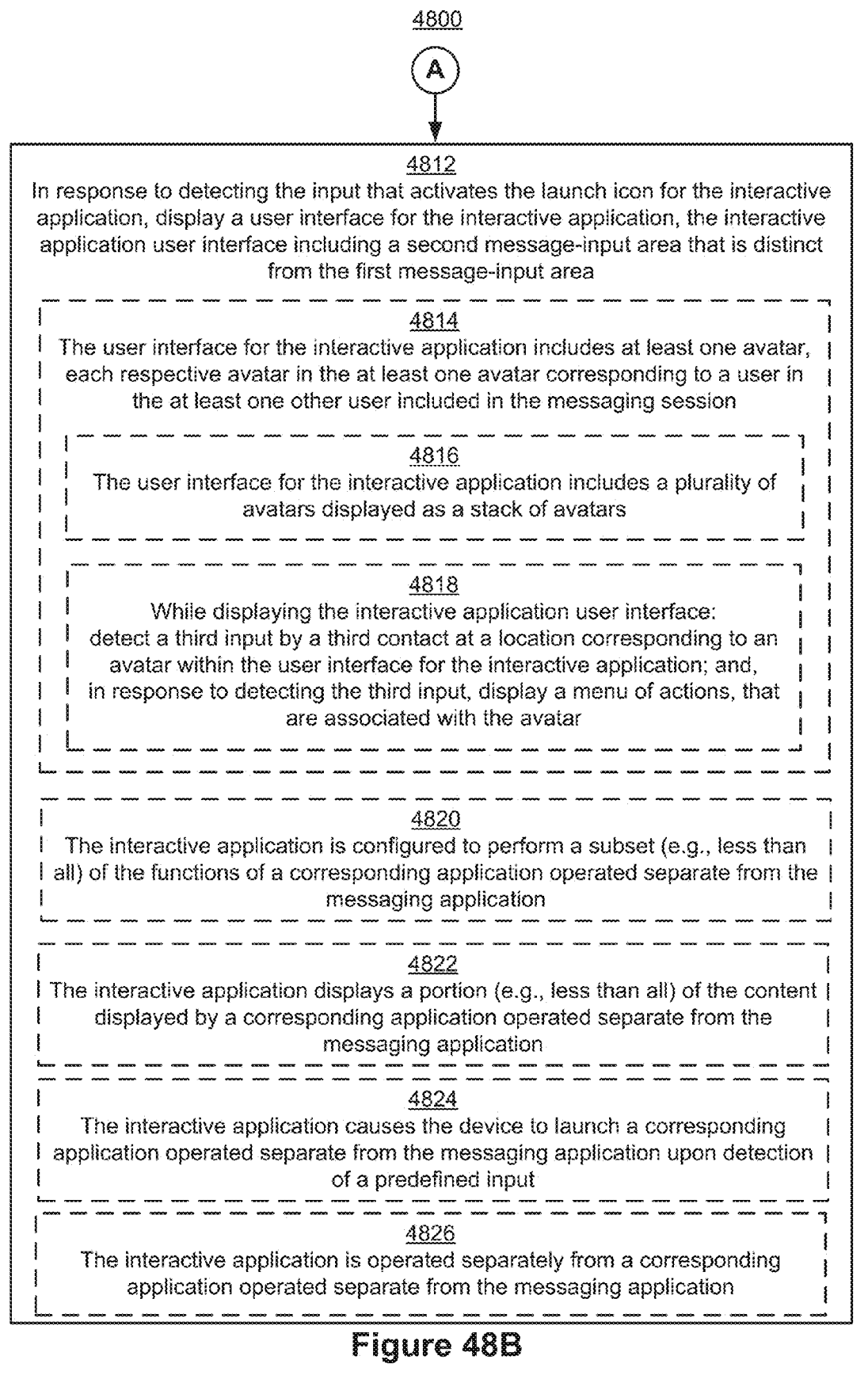

4812
In response to detecting the input that activates the launch icon for the interactive application, display a user interface for the interactive application, the interactive application user interface including a second message-input area that is distinct from the first message-input area 4814
The user interface for the interactive application includes at least one avatar, each respective avatar in the at least one avatar corresponding to a user in the at least one other user included in the messaging session 4816
The user interface for the interactive application includes a plurality of avatars displayed as a stack of avatars 4818
While displaying the interactive application user interface:
detect a third input by a third contact at a location corresponding to an avatar within the user interface for the interactive application; and,
in response to detecting the third input, display a menu of actions, that are associated with the avatar 4820
The interactive application is configured to perform a subset (e.g., less than all) of the functions of a corresponding application operated separate from the messaging application 4822
The interactive application displays a portion (e.g., less than all) of the content displayed by a corresponding application operated separate from the messaging application 4824
The interactive application causes the device to launch a corresponding application operated separate from the messaging application upon detection of a predefined input 4826
The interactive application is operated separately from a corresponding application operated separate from the messaging application

Figure 48D:
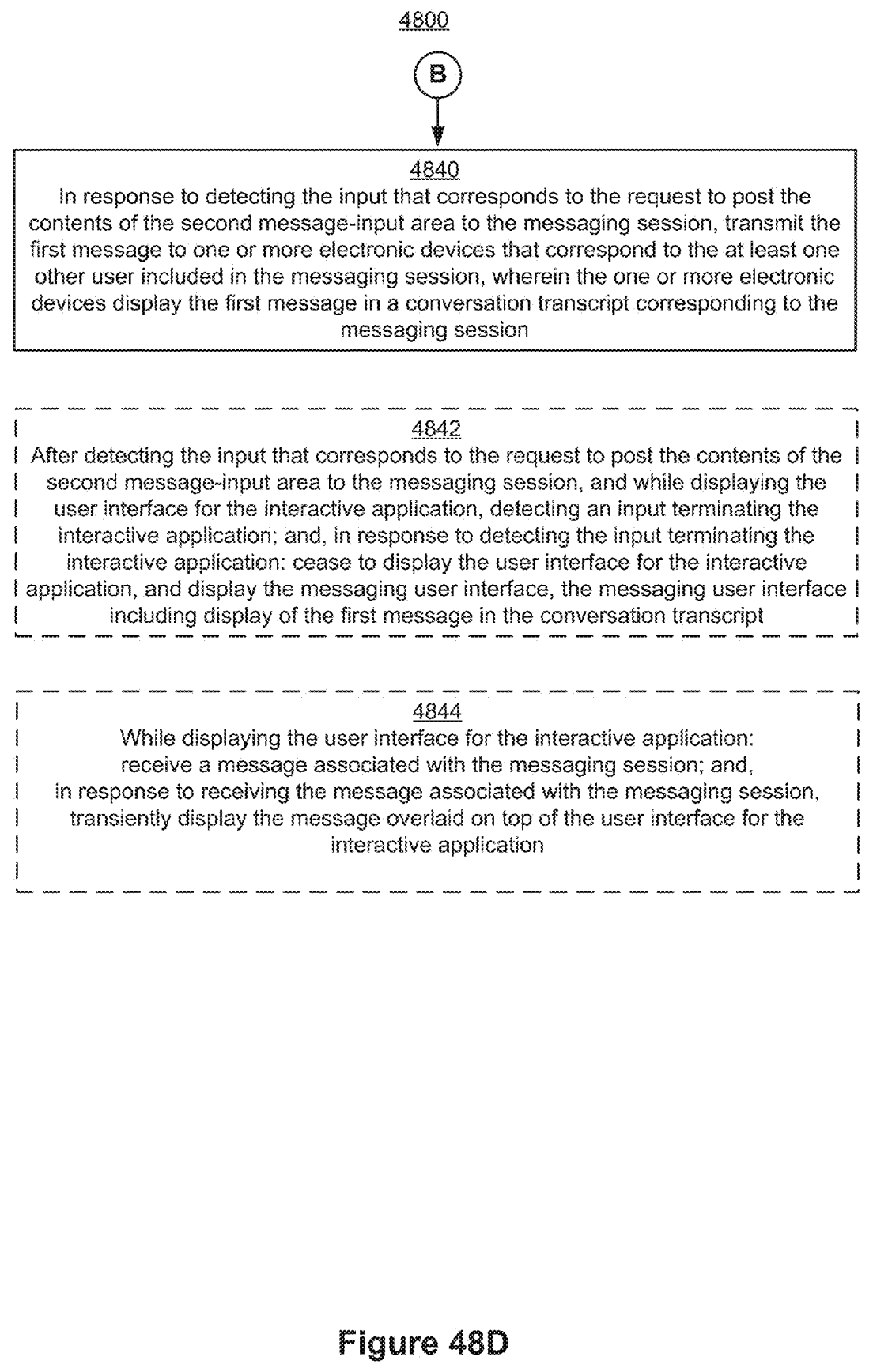

4840
In response to detecting the input that corresponds to the request to post the contents of the second message-input area to the messaging session, transmit the first message to one or more electronic devices that correspond to the at least one other user included in the messaging session, wherein the one or more electronic devices display the first message in a conversation transcript corresponding to the messaging session 4842
After detecting the input that corresponds to the request to post the contents of the second message-input area to the messaging session, and while displaying the user interface for the interactive application, detecting an input terminating the interactive application; and, in response to detecting the input terminating the interactive application: cease to display the user interface for the interactive application, and display the messaging user interface, the messaging user interface including display of the first message in the conversation transcript 4844
While displaying the user interface for the interactive application:
receive a message associated with the messaging session; and,
in response to receiving the message associated with the messaging session, transiently display the message overlaid on top of the user interface for the interactive application

Figure 50A:
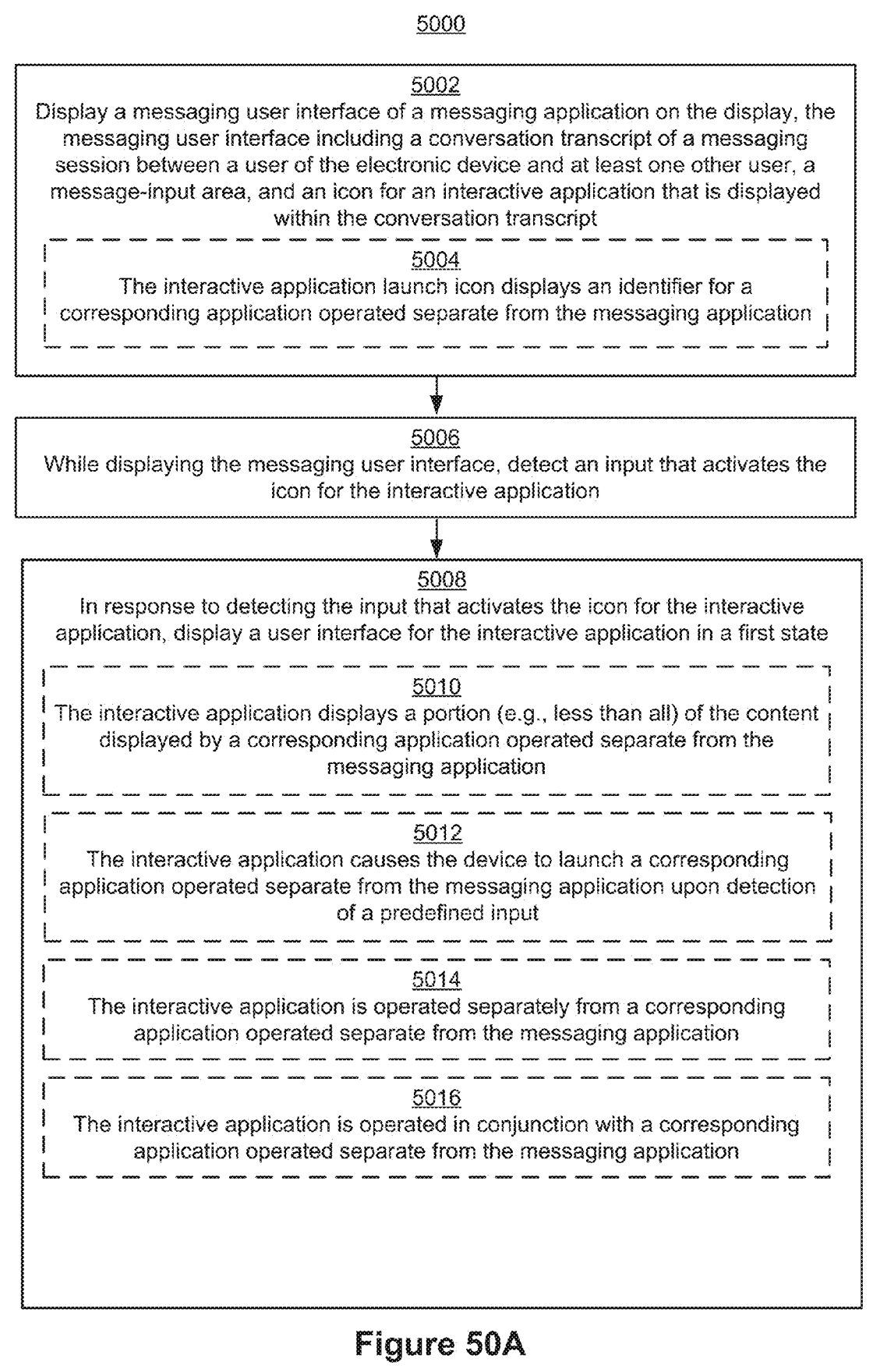

5002
Display a messaging user interface of a messaging application on the display, the messaging user interface including a conversation transcript of a messaging session between a user of the electronic device and at least one other user, a message-input area, and an icon for an interactive application that is displayed within the conversation transcript 5004
The interactive application launch icon displays an identifier for a corresponding application operated separate from the messaging application 5006
While displaying the messaging user interface, detect an input that activates the icon for the interactive application 5008
In response to detecting the input that activates the icon for the interactive application, display a user interface for the interactive application in a first state 5010
The interactive application displays a portion (e.g., less than all) of the content displayed by a corresponding application operated separate from the messaging application 5012
The interactive application causes the device to launch a corresponding application operated separate from the messaging application upon detection of a predefined input 5014
The interactive application is operated separately from a corresponding application operated separate from the messaging application 5016
The interactive application is operated in conjunction with a corresponding application operated separate from the messaging application

Figure 50B:
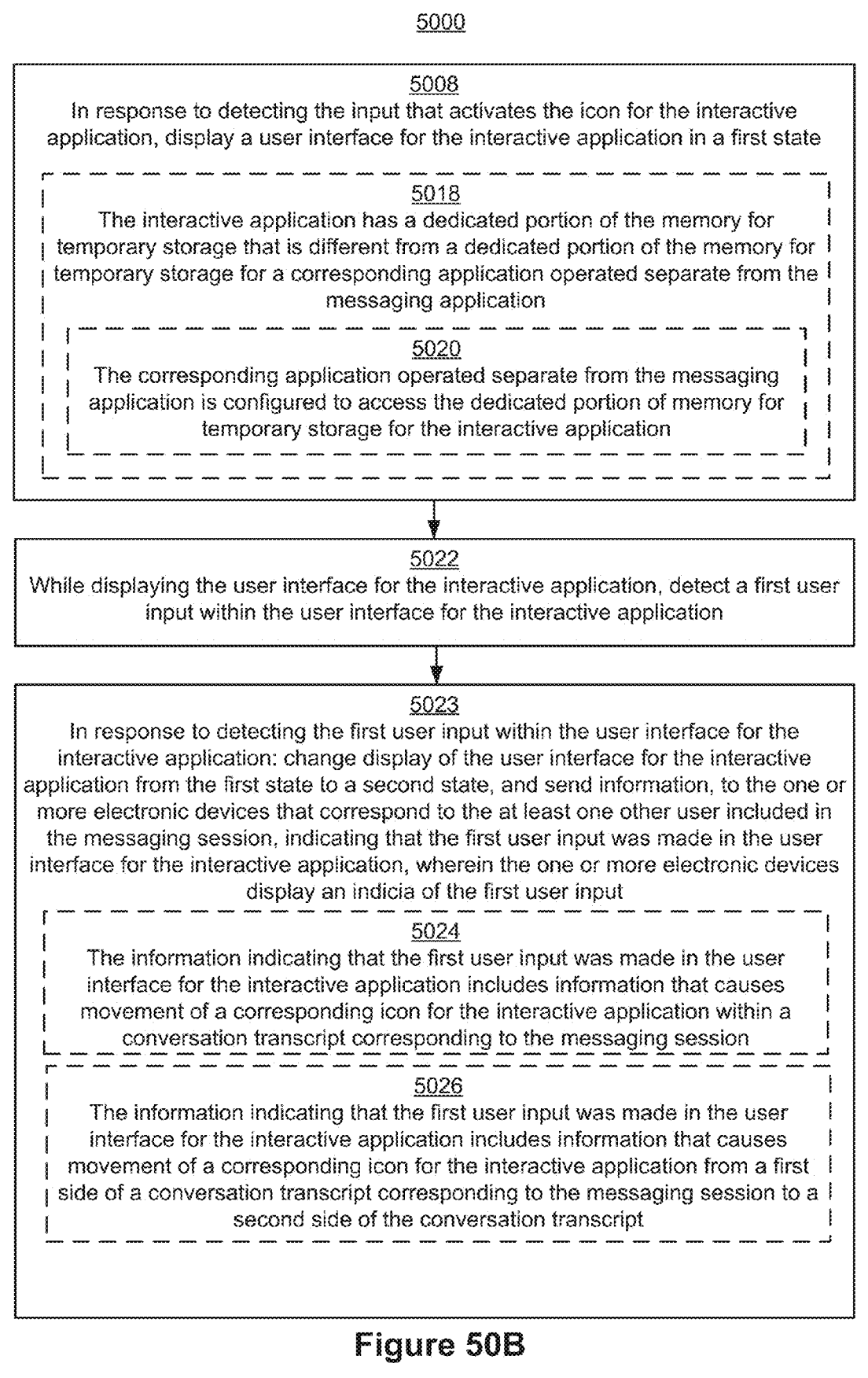

5008
In response to detecting the input that activates the icon for the interactive application, display a user interface for the interactive application in a first state 5018
The interactive application has a dedicated portion of the memory for temporary storage that is different from a dedicated portion of the memory for temporary storage for a corresponding application operated separate from the messaging application 5020
The corresponding application operated separate from the messaging application is configured to access the dedicated portion of memory for temporary storage for the interactive application 5022
While displaying the user interface for the interactive application, detect a first user input within the user interface for the interactive application 5023
In response to detecting the first user input within the user interface for the interactive application: change display of the user interface for the interactive application from the first state to a second state, and send information, to the one or more electronic devices that correspond to the at least one other user included in the messaging session, indicating that the first user input was made in the user interface for the interactive application, wherein the one or more electronic devices display an indicia of the first user input 5024
The information indicating that the first user input was made in the user interface for the interactive application includes information that causes movement of a corresponding icon for the interactive application within a conversation transcript corresponding to the messaging session 5026
The information indicating that the first user input was made in the user interface for the interactive application includes information that causes movement of a corresponding icon for the interactive application from a first side of a conversation transcript corresponding to the messaging session to a second side of the conversation transcript

Figure 50C:
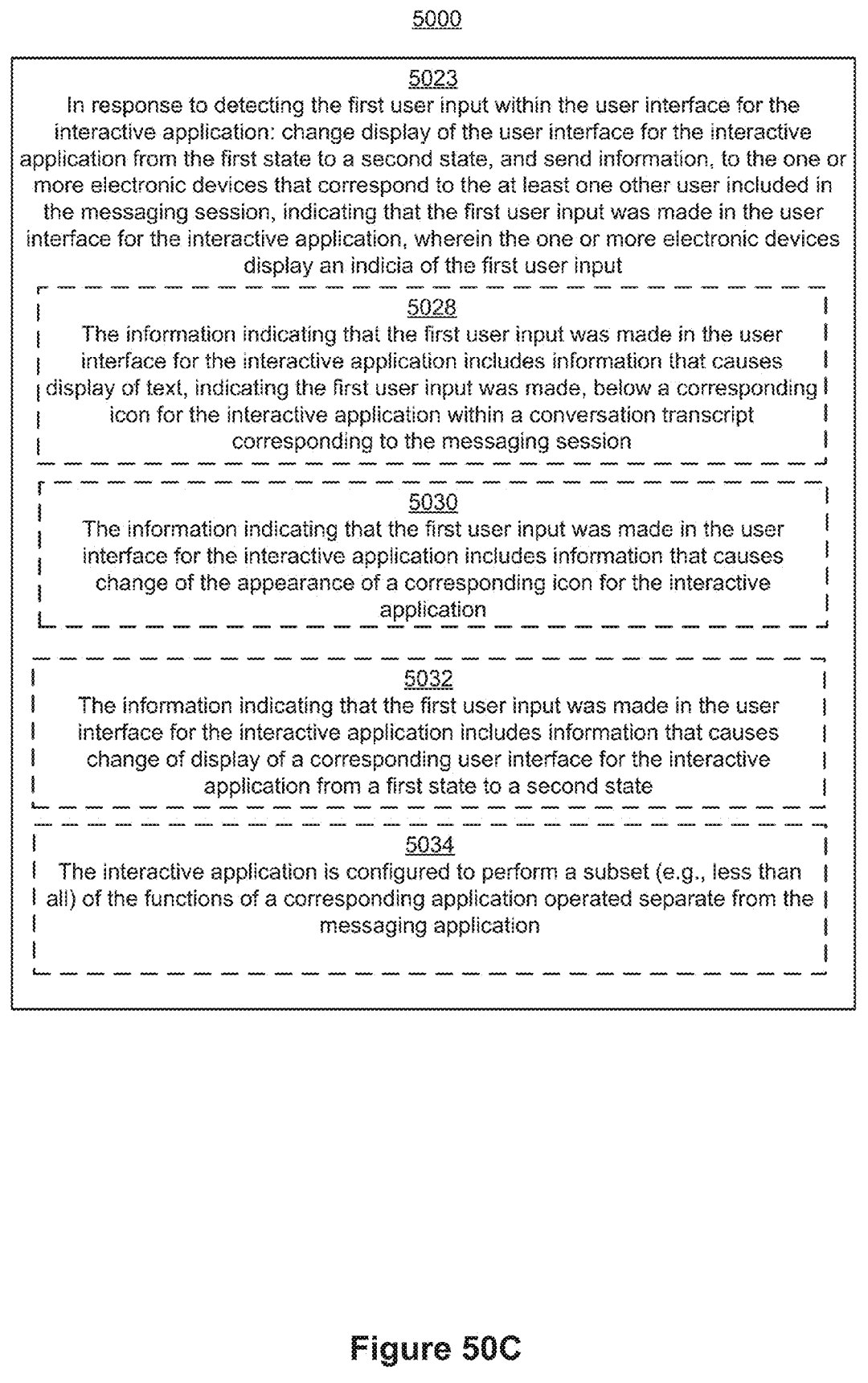

5023
In response to detecting the first user input within the user interface for the interactive application: change display of the user interface for the interactive application from the first state to a second state, and send information, to the one or more electronic devices that correspond to the at least one other user included in the messaging session, indicating that the first user input was made in the user interface for the interactive application, wherein the one or more electronic devices display an indicia of the first user input 5028
The information indicating that the first user input was made in the user interface for the interactive application includes information that causes display of text, indicating the first user input was made, below a corresponding icon for the interactive application within a conversation transcript corresponding to the messaging session 5030
The information indicating that the first user input was made in the user interface for the interactive application includes information that causes change of the appearance of a corresponding icon for the interactive application 5032
The information indicating that the first user input was made in the user interface for the interactive application includes information that causes change of display of a corresponding user interface for the interactive application from a first state to a second state 5034
The interactive application is configured to perform a subset (e.g., less than all) of the functions of a corresponding application operated separate from the messaging application

Figure 52A:
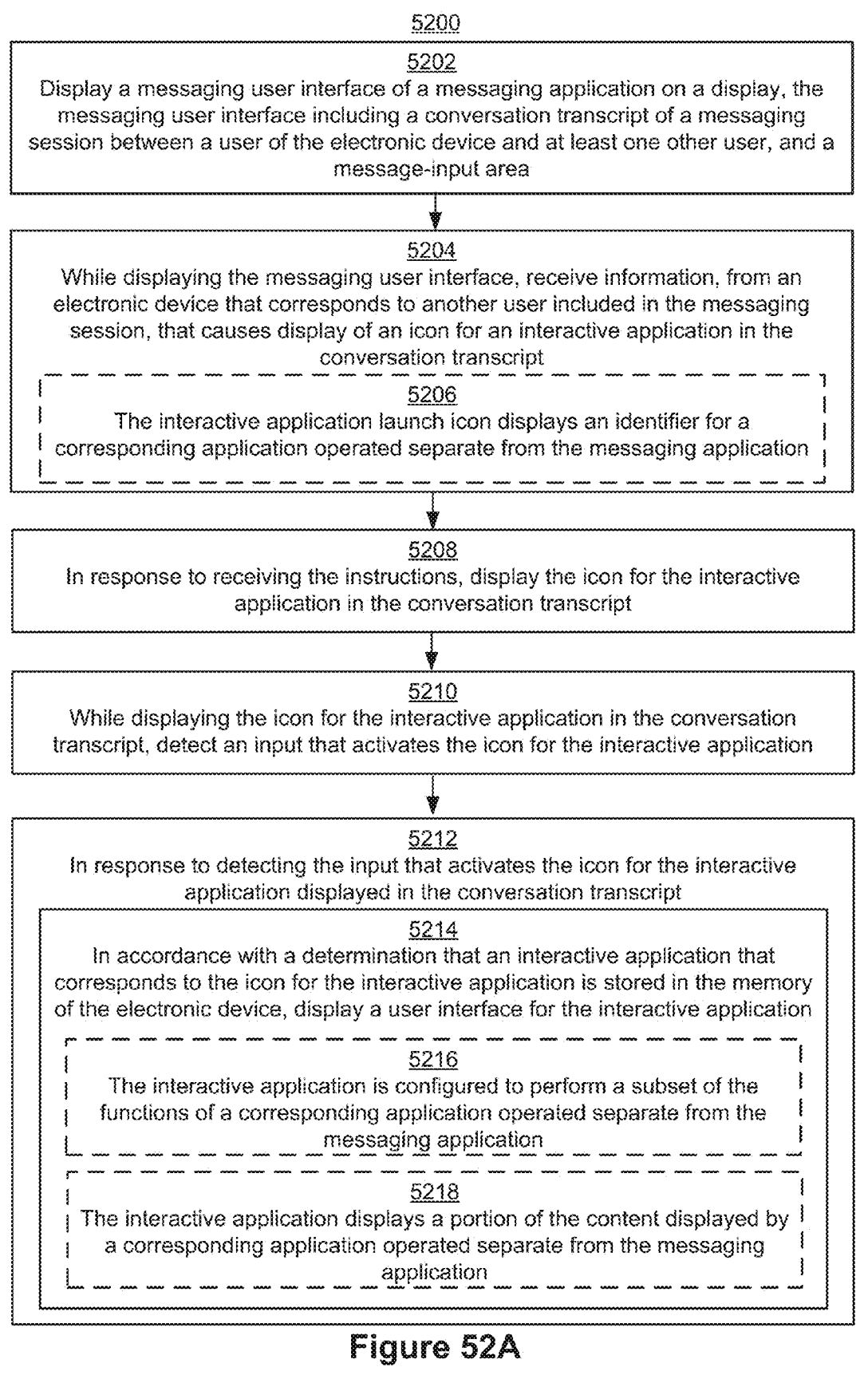

5202
Display a messaging user interface of a messaging application on a display, the messaging user interface including a conversation transcript of a messaging session between a user of the electronic device and at least one other user, and a message-input area 5204
While displaying the messaging user interface, receive information, from an electronic device that corresponds to another user included in the messaging session, that causes display of an icon for an interactive application in the conversation transcript 5206
The interactive application launch icon displays an identifier for a corresponding application operated separate from the messaging application 5208
In response to receiving the instructions, display the icon for the interactive application in the conversation transcript 5210
While displaying the icon for the interactive application in the conversation transcript, detect an input that activates the icon for the interactive application 5212
In response to detecting the input that activates the icon for the interactive application displayed in the conversation transcript 5214
In accordance with a determination that an interactive application that corresponds to the icon for the interactive application is stored in the memory of the electronic device, display a user interface for the interactive application 5216
The interactive application is configured to perform a subset of the functions of a corresponding application operated separate from the messaging application 5218
The interactive application displays a portion of the content displayed by a corresponding application operated separate from the messaging application

Figure 52B:
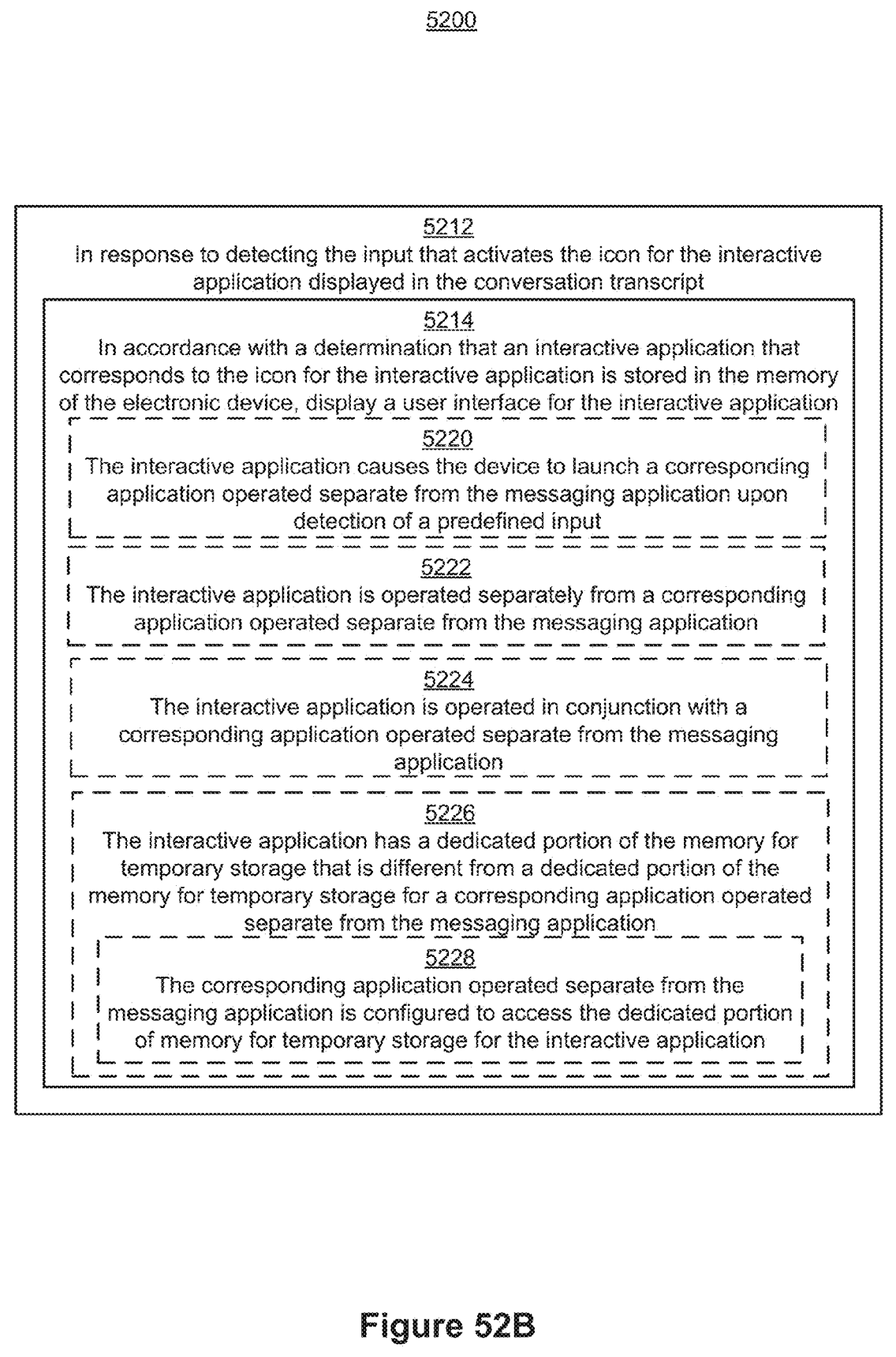

5212
In response to detecting the input that activates the icon for the interactive application displayed in the conversation transcript 5214
In accordance with a determination that an interactive application that corresponds to the icon for the interactive application is stored in the memory of the electronic device, display a user interface for the interactive application 5220
The interactive application causes the device to launch a corresponding application operated separate from the messaging application upon detection of a predefined input 5222
The interactive application is operated separately from a corresponding application operated separate from the messaging application 5224
The interactive application is operated in conjunction with a corresponding application operated separate from the messaging application 5226
The interactive application has a dedicated portion of the memory for temporary storage that is different from a dedicated portion of the memory for temporary storage for a corresponding application operated separate from the messaging application 5228
The corresponding application operated separate from the messaging application is configured to access the dedicated portion of memory for temporary storage for the interactive application

Figure 52C:
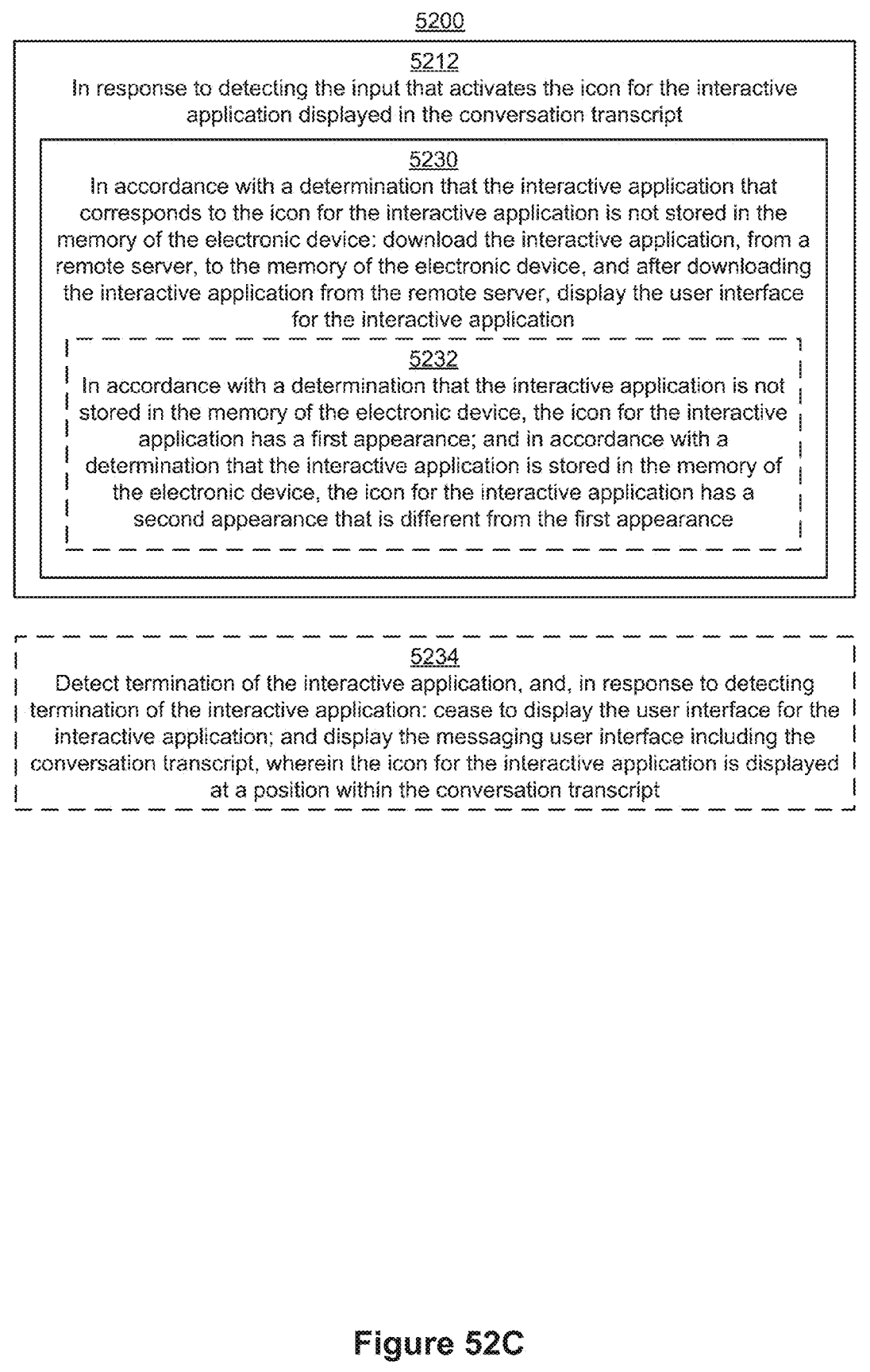

5212
In response to detecting the input that activates the icon for the interactive application displayed in the conversation transcript 5230
In accordance with a determination that the interactive application that corresponds to the icon for the interactive application is not stored in the memory of the electronic device: download the interactive application, from a remote server, to the memory of the electronic device, and after downloading the interactive application from the remote server, display the user interface for the interactive application 5232
In accordance with a determination that the interactive application is not stored in the memory of the electronic device, the icon for the interactive application has a first appearance; and in accordance with a determination that the interactive application is stored in the memory of the electronic device, the icon for the interactive application has a second appearance that is different from the first appearance 5234
Detect termination of the interactive application, and, in response to detecting termination of the interactive application: cease to display the user interface for the interactive application; and display the messaging user interface including the conversation transcript, wherein the icon for the interactive application is displayed at a position within the conversation transcript

Figure 54A:
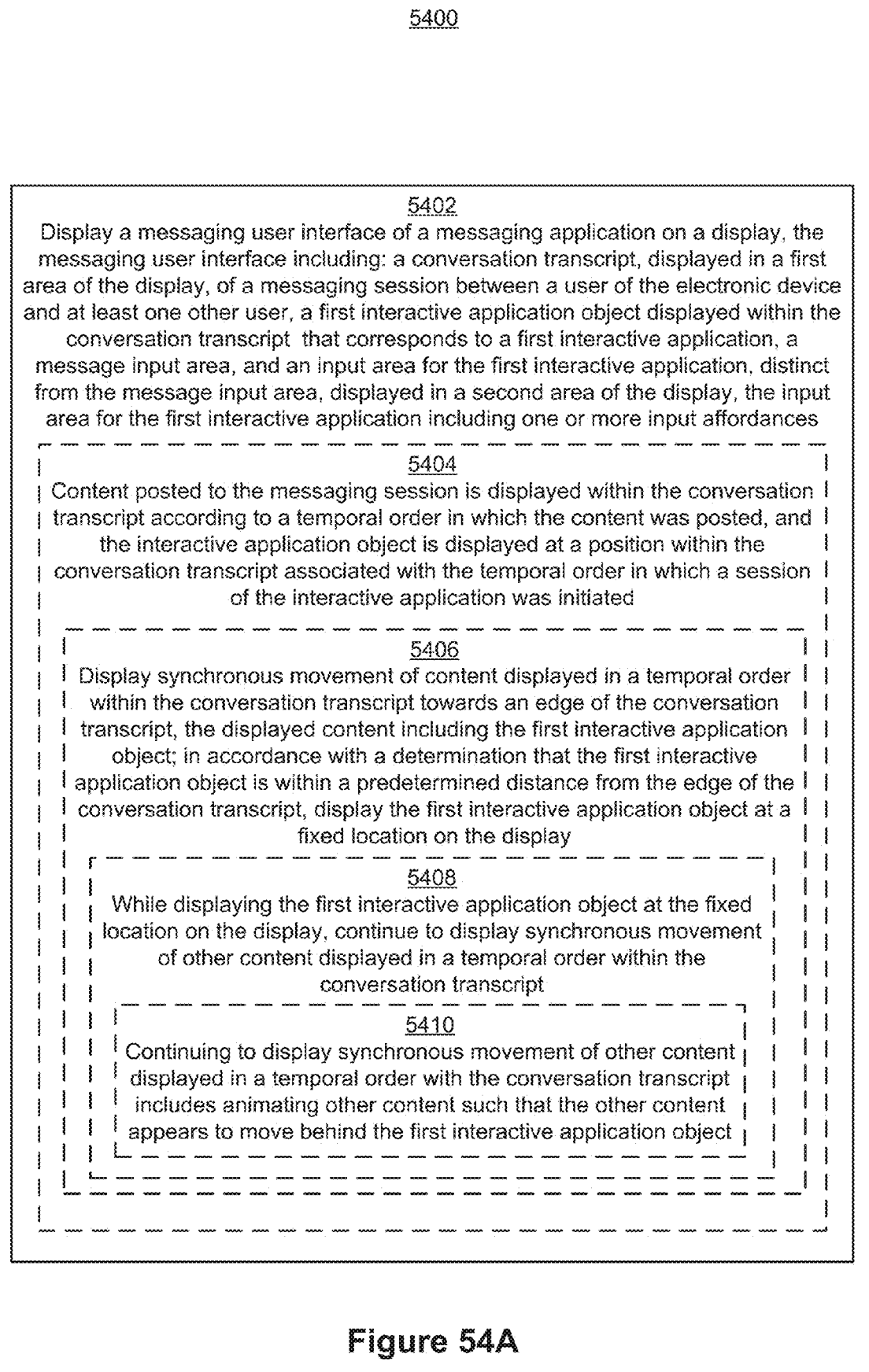

5402
Display a messaging user interface of a messaging application on a display, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances 5404
Content posted to the messaging session is displayed within the conversation transcript according to a temporal order in which the content was posted, and the interactive application object is displayed at a position within the conversation transcript associated with the temporal order in which a session of the interactive application was initiated 5406
Display synchronous movement of content displayed in a temporal order within the conversation transcript towards an edge of the conversation transcript, the displayed content including the first interactive application object; in accordance with a determination that the first interactive application object is within a predetermined distance from the edge of the conversation transcript, display the first interactive application object at a fixed location on the display 5408
While displaying the first interactive application object at the fixed location on the display, continue to display synchronous movement of other content displayed in a temporal order within the conversation transcript 5410
Continuing to display synchronous movement of other content displayed in a temporal order with the conversation transcript includes animating other content such that the other content appears to move behind the first interactive application object

Figure 54B:
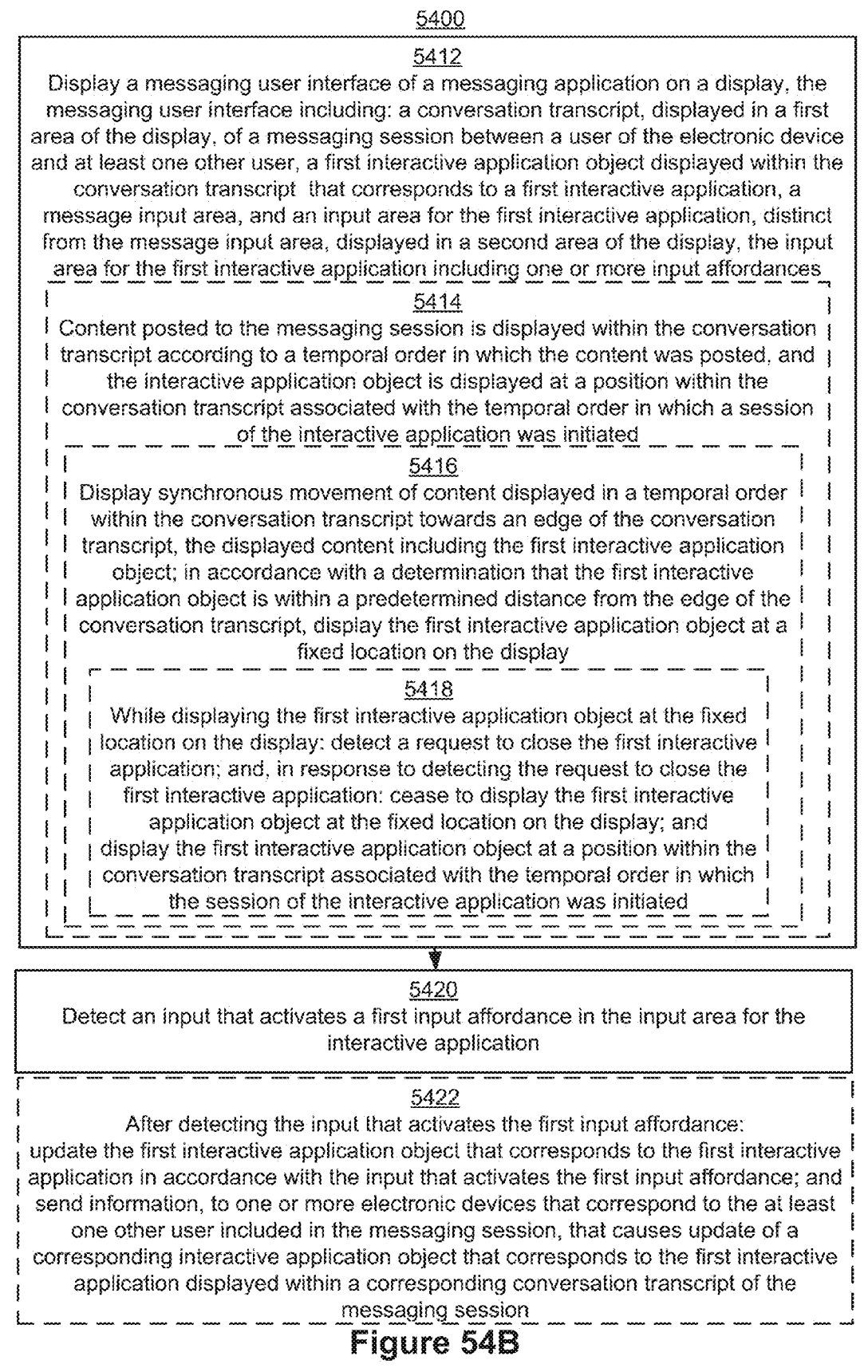

5412
Display a messaging user interface of a messaging application on a display, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances 5414
Content posted to the messaging session is displayed within the conversation transcript according to a temporal order in which the content was posted, and the interactive application object is displayed at a position within the conversation transcript associated with the temporal order in which a session of the interactive application was initiated 5416
Display synchronous movement of content displayed in a temporal order within the conversation transcript towards an edge of the conversation transcript, the displayed content including the first interactive application object; in accordance with a determination that the first interactive application object is within a predetermined distance from the edge of the conversation transcript, display the first interactive application object at a fixed location on the display 5418
While displaying the first interactive application object at the fixed location on the display: detect a request to close the first interactive application; and, in response to detecting the request to close the first interactive application: cease to display the first interactive application object at the fixed location on the display; and display the first interactive application object at a position within the conversation transcript associated with the temporal order in which the session of the interactive application was initiated 5420
Detect an input that activates a first input affordance in the input area for the interactive application 5422
After detecting the input that activates the first input affordance: update the first interactive application object that corresponds to the first interactive application in accordance with the input that activates the first input affordance; and send information, to one or more electronic devices that correspond to the at least one other user included in the messaging session, that causes update of a corresponding interactive application object that corresponds to the first interactive application displayed within a corresponding conversation transcript of the messaging session

Figure 54C:
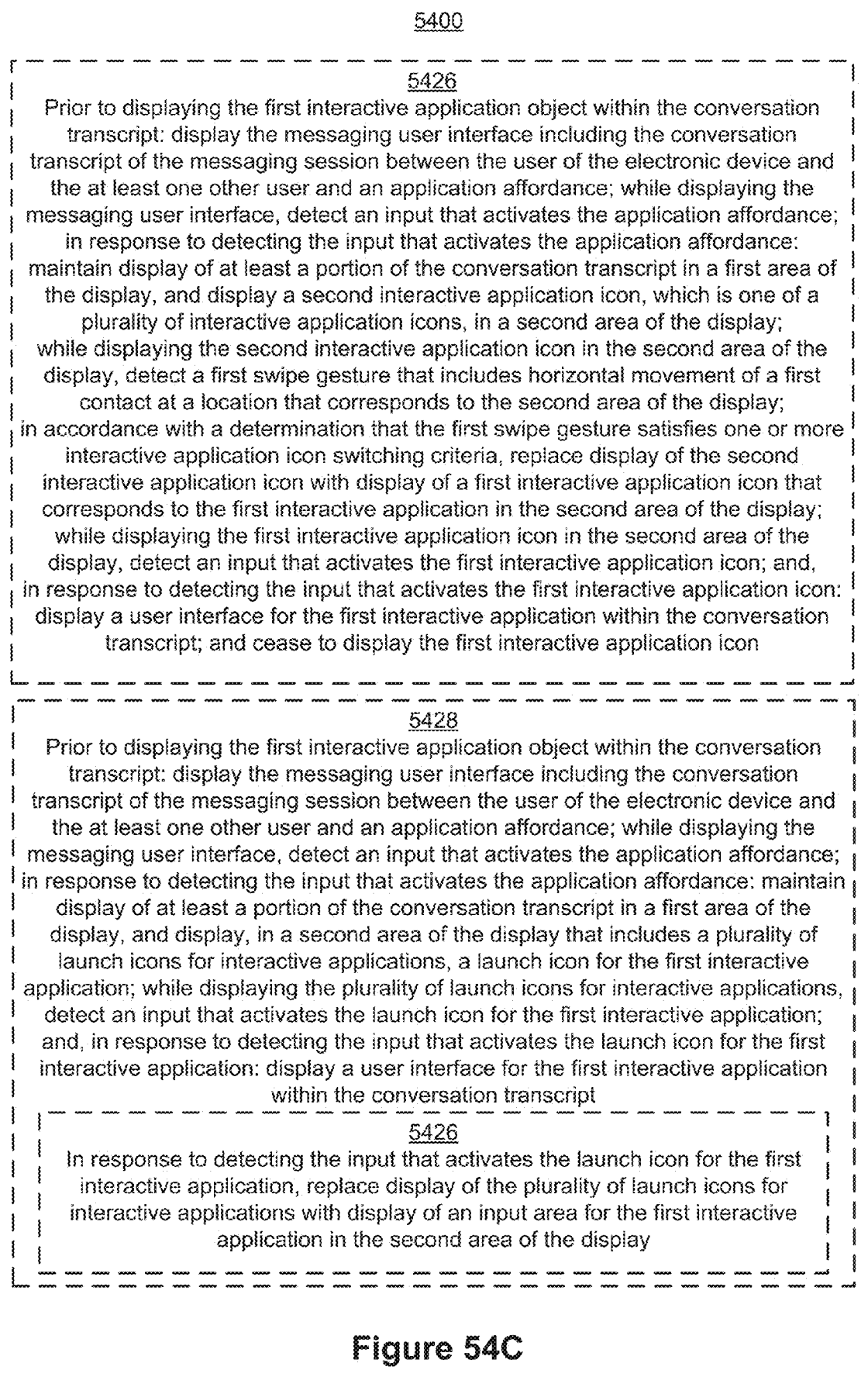

5426
Prior to displaying the first interactive application object within the conversation transcript: display the messaging user interface including the conversation transcript of the messaging session between the user of the electronic device and the at least one other user and an application affordance; while displaying the messaging user interface, detect an input that activates the application affordance; in response to detecting the input that activates the application affordance: maintain display of at least a portion of the conversation transcript in a first area of the display, and display a second interactive application icon, which is one of a plurality of interactive application icons, in a second area of the display; while displaying the second interactive application icon in the second area of the display, detect a first swipe gesture that includes horizontal movement of a first contact at a location that corresponds to the second area of the display; in accordance with a determination that the first swipe gesture satisfies one or more interactive application icon switching criteria, replace display of the second interactive application icon with display of a first interactive application icon that corresponds to the first interactive application in the second area of the display; while displaying the first interactive application icon in the second area of the display, detect an input that activates the first interactive application icon; and, in response to detecting the input that activates the first interactive application icon: display a user interface for the first interactive application within the conversation transcript; and cease to display the first interactive application icon 5428
Prior to displaying the first interactive application object within the conversation transcript: display the messaging user interface including the conversation transcript of the messaging session between the user of the electronic device and the at least one other user and an application affordance; while displaying the messaging user interface, detect an input that activates the application affordance; in response to detecting the input that activates the application affordance: maintain display of at least a portion of the conversation transcript in a first area of the display, and display, in a second area of the display that includes a plurality of launch icons for interactive applications, a launch icon for the first interactive application; while displaying the plurality of launch icons for interactive applications, detect an input that activates the launch icon for the first interactive application; and, in response to detecting the input that activates the launch icon for the first interactive application: display a user interface for the first interactive application within the conversation transcript 5426
In response to detecting the input that activates the launch icon for the first interactive application, replace display of the plurality of launch icons for interactive applications with display of an input area for the first interactive application in the second area of the display

Figure 56A:
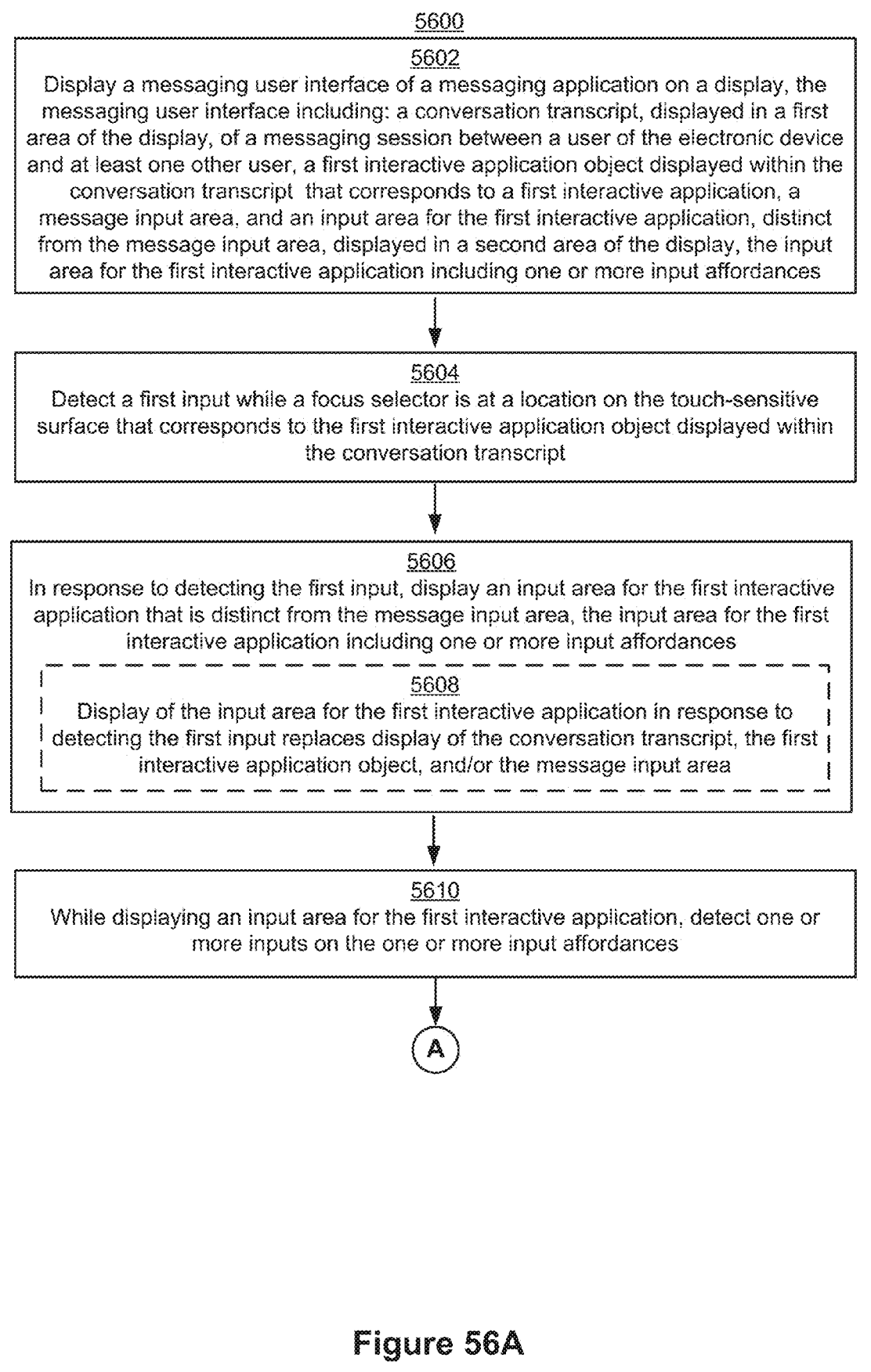

5602
Display a messaging user interface of a messaging application on a display, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances

↓

5604
Detect a first input while a focus selector is at a location on the touch-sensitive surface that corresponds to the first interactive application object displayed within the conversation transcript

↓

5606
In response to detecting the first input, display an input area for the first interactive application that is distinct from the message input area, the input area for the first interactive application including one or more input affordances 5608
Display of the input area for the first interactive application in response to detecting the first input replaces display of the conversation transcript, the first interactive application object, and/or the message input area

↓

5610
While displaying an input area for the first interactive application, detect one or more inputs on the one or more input affordances

Figure 56B:
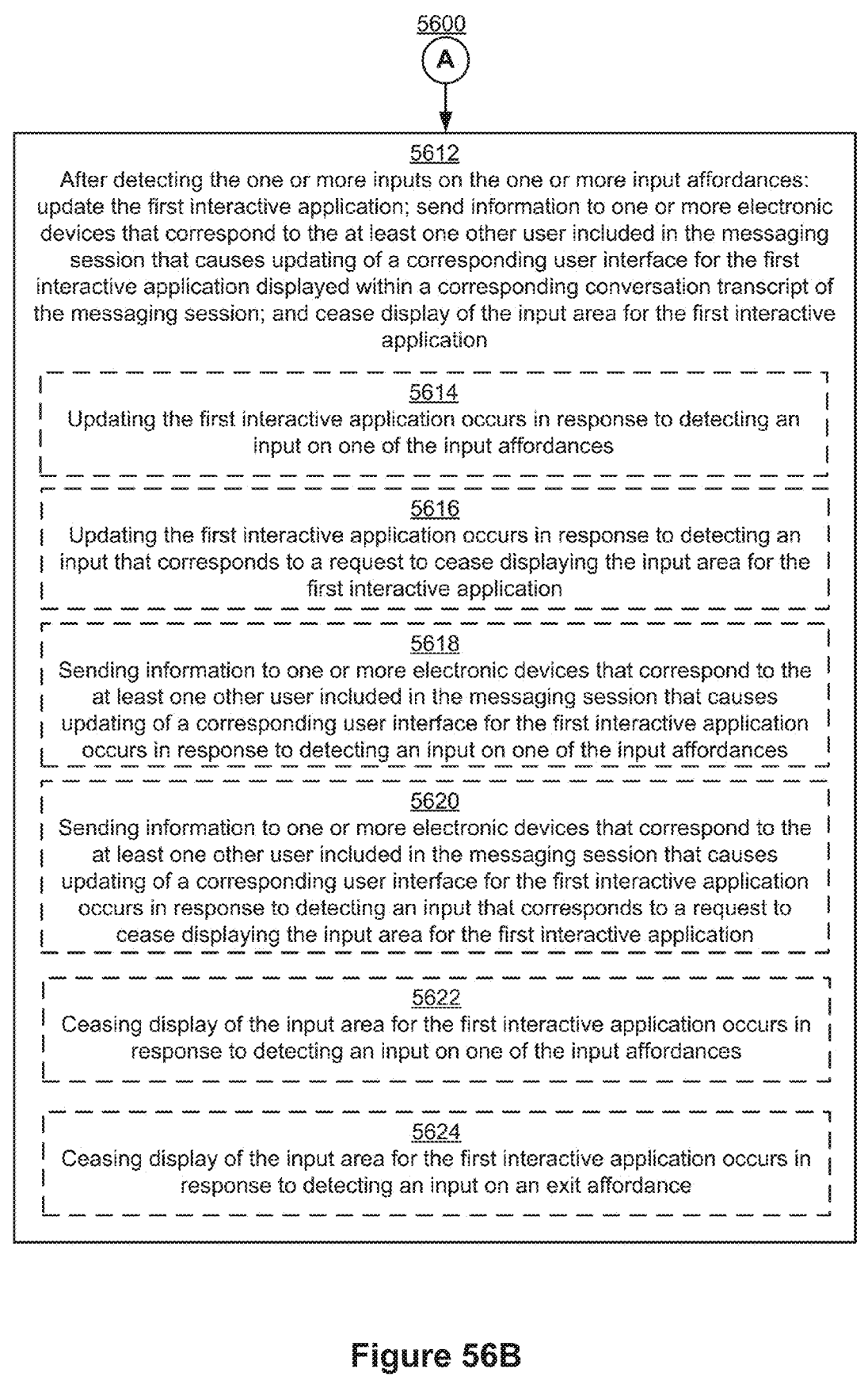

5612
After detecting the one or more inputs on the one or more input affordances: update the first interactive application; send information to one or more electronic devices that correspond to the at least one other user included in the messaging session that causes updating of a corresponding user interface for the first interactive application displayed within a corresponding conversation transcript of the messaging session; and cease display of the input area for the first interactive application 5614
Updating the first interactive application occurs in response to detecting an input on one of the input affordances 5616
Updating the first interactive application occurs in response to detecting an input that corresponds to a request to cease displaying the input area for the first interactive application 5618
Sending information to one or more electronic devices that correspond to the at least one other user included in the messaging session that causes updating of a corresponding user interface for the first interactive application occurs in response to detecting an input on one of the input affordances 5620
Sending information to one or more electronic devices that correspond to the at least one other user included in the messaging session that causes updating of a corresponding user interface for the first interactive application occurs in response to detecting an input that corresponds to a request to cease displaying the input area for the first interactive application 5622
Ceasing display of the input area for the first interactive application occurs in response to detecting an input on one of the input affordances 5624
Ceasing display of the input area for the first interactive application occurs in response to detecting an input on an exit affordance

Figure 58:
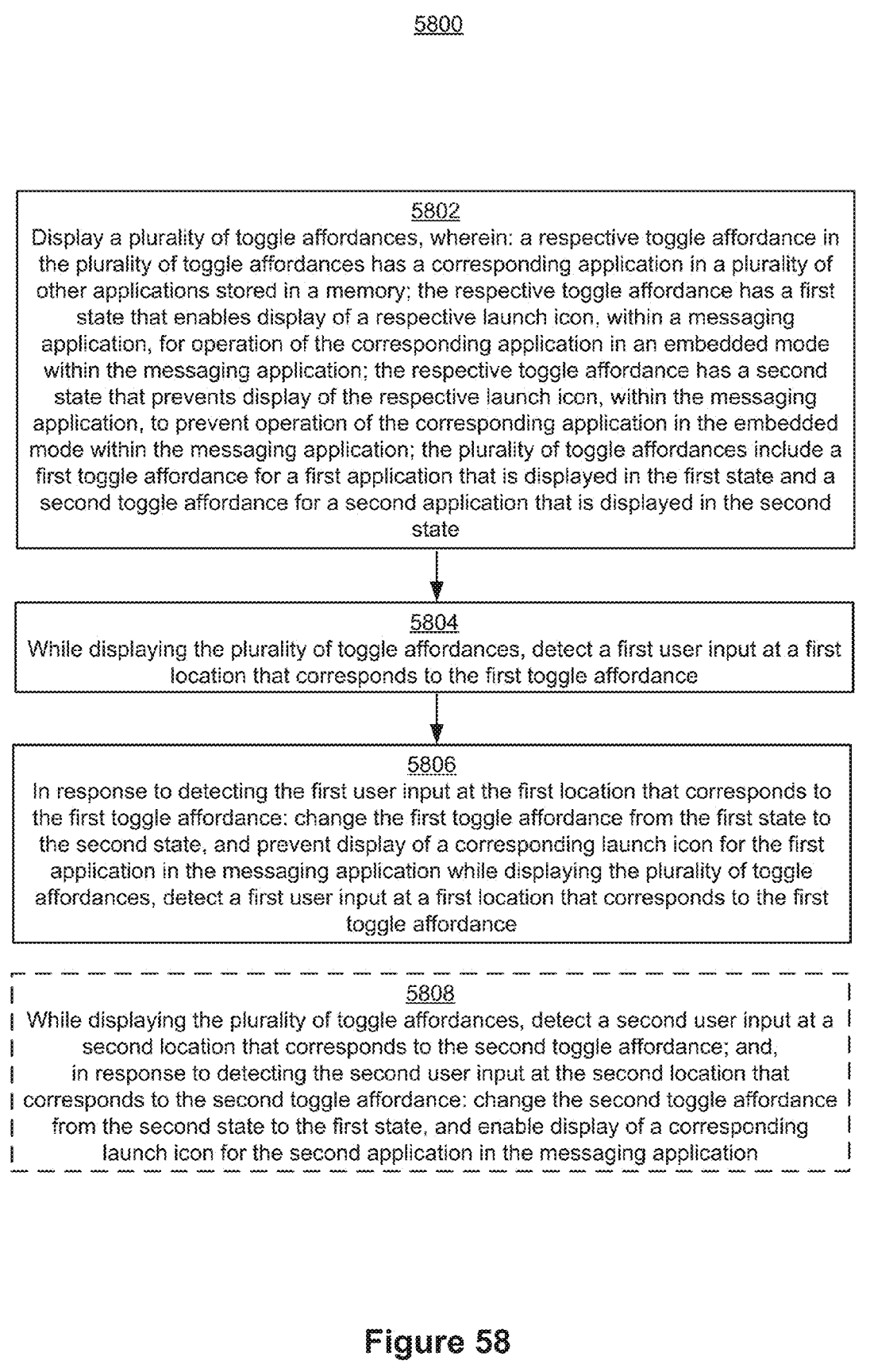

5802
Display a plurality of toggle affordances, wherein: a respective toggle affordance in the plurality of toggle affordances has a corresponding application in a plurality of other applications stored in a memory; the respective toggle affordance has a first state that enables display of a respective launch icon, within a messaging application, for operation of the corresponding application in an embedded mode within the messaging application; the respective toggle affordance has a second state that prevents display of the respective launch icon, within the messaging application, to prevent operation of the corresponding application in the embedded mode within the messaging application; the plurality of toggle affordances include a first toggle affordance for a first application that is displayed in the first state and a second toggle affordance for a second application that is displayed in the second state

↓

5804
While displaying the plurality of toggle affordances, detect a first user input at a first location that corresponds to the first toggle affordance

↓

5806
In response to detecting the first user input at the first location that corresponds to the first toggle affordance: change the first toggle affordance from the first state to the second state, and prevent display of a corresponding launch icon for the first application in the messaging application while displaying the plurality of toggle affordances, detect a first user input at a first location that corresponds to the first toggle affordance 5808
While displaying the plurality of toggle affordances, detect a second user input at a second location that corresponds to the second toggle affordance; and, in response to detecting the second user input at the second location that corresponds to the second toggle affordance: change the second toggle affordance from the second state to the first state, and enable display of a corresponding launch icon for the second application in the messaging application

Figure 60A:
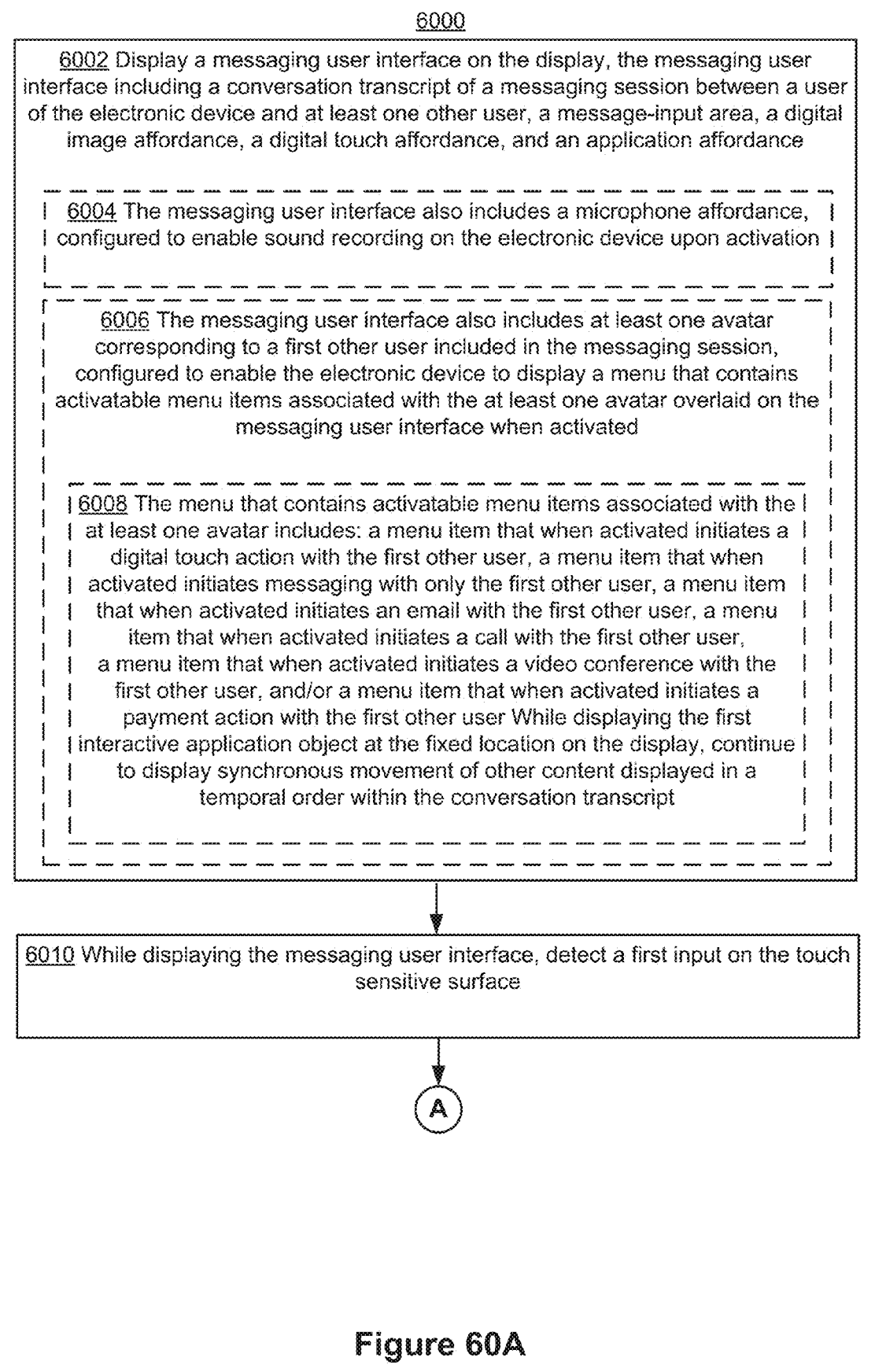

6002 Display a messaging user interface on the display, the messaging user interface including a conversation transcript of a messaging session between a user of the electronic device and at least one other user, a message-input area, a digital image affordance, a digital touch affordance, and an application affordance 6004 The messaging user interface also includes a microphone affordance, configured to enable sound recording on the electronic device upon activation 6006 The messaging user interface also includes at least one avatar corresponding to a first other user included in the messaging session, configured to enable the electronic device to display a menu that contains activatable menu items associated with the at least one avatar overlaid on the messaging user interface when activated 6008 The menu that contains activatable menu items associated with the at least one avatar includes: a menu item that when activated initiates a digital touch action with the first other user, a menu item that when activated initiates messaging with only the first other user, a menu item that when activated initiates an email with the first other user, a menu item that when activated initiates a call with the first other user, a menu item that when activated initiates a video conference with the first other user, and/or a menu item that when activated initiates a payment action with the first other user While displaying the first interactive application object at the fixed location on the display, continue to display synchronous movement of other content displayed in a temporal order within the conversation transcript 6010 While displaying the messaging user interface, detect a first input on the touch sensitive surface

6012 In response to detecting the first input: in accordance with a determination that the first input is made while a focus selector is at a location in the messaging user interface that corresponds to the digital image affordance, display a plurality of digital images within the messaging user interface; in accordance with a determination that the first input is made while a focus selector is at a location in the messaging user interface that corresponds to the digital canvas affordance, display a digital drawing canvas within the messaging user interface; and In accordance with a determination that the first input is made while a focus selector is at a location in the messaging user interface that corresponds to the application affordance, display one or more launch icons for an application within the messaging user interface 6014 Displaying the plurality of digital images within the messaging user interface includes: in accordance with a determination that the messaging user interface included display of a keyboard at the time the first input was detected, replacing display of the keyboard with the display of the plurality of digital images, the plurality of digital images including a live preview image from the digital camera; and in accordance with a determination that the messaging user interface did not include display of a keyboard at the time the first input was detected, displaying the conversation transcript in a first area of the display and displaying the plurality of digital images in a second area of the display, the plurality of digital images including a live preview image from the digital camera 6016 While displaying the plurality of digital images, detect an input that selects a digital image in the plurality of digital images; and after detecting the input that selects a digital image in the plurality of digital images: display the selected digital image in the conversation transcript; and transmit a representation of the selected digital image to one or more electronic devices that correspond to the at least one other user included in the messaging session, wherein the one or more electronic devices display the representation of the selected digital image in a conversation transcript that corresponds to the messaging session 6018 Detect an input that selects the live image displayed within the plurality of digital images; and, in response to detecting that input that selects the live image, capture a digital image with the digital camera, while maintaining display of the conversation transcript 6020 After capturing the digital image: display the digital image captured by the digital camera in the conversation transcript, and transmit a representation of the captured digital image to one or more electronic devices that correspond to the at least one other user included in the messaging session, wherein the one or more electronic devices display the representation of the captured digital image in a conversation transcript that corresponds to the messaging session

6012 In response to detecting the first input: in accordance with a determination that the first input is made while a focus selector is at a location in the messaging user interface that corresponds to the digital image affordance, display a plurality of digital images within the messaging user interface; in accordance with a determination that the first input is made while a focus selector is at a location in the messaging user interface that corresponds to the digital canvas affordance, display a digital drawing canvas within the messaging user interface; and In accordance with a determination that the first input is made while a focus selector is at a location in the messaging user interface that corresponds to the application affordance, display one or more launch icons for an application within the messaging user interface 6022 Displaying the digital drawing canvas within the messaging user interface includes: in accordance with a determination that the messaging user interface included display of a keyboard at the time the first input was detected, replacing display of the keyboard with the display of the digital drawing canvas; and in accordance with a determination that the messaging user interface did not include display of a keyboard at the time the first input was detected, displaying the conversation transcript in a first area of the display and displaying the plurality of digital touch actions in a second area of the display 6024 Displaying the one or more launch icons for an application within the messaging user interface includes: in accordance with a determination that the messaging user interface included display of a keyboard at the time the first input was detected, replacing display of the keyboard with the display of the one or more launch icons for an application; and in accordance with a determination that the messaging user interface did not include display of a keyboard at the time the first input was detected, displaying the conversation transcript in a first area of the display and displaying the one or more launch icons for an application in a second area of the display 6026 While displaying the one or more launch icons for an application, detect an input that activates a launch icon in the one or more launch icons for an application; and after detecting the input that activates the launch icon in the one or more launch icons for an application: display a first input area for an application corresponding to the activated launch icon the application that is distinct from the message input area, the input area for the first interactive application including one or more input affordances; display a first application object within the conversation transcript that corresponds to the application corresponding to the activated launch icon; and transmit a representation of a second application object that corresponds to the application corresponding to the activated launch icon to one or more electronic devices that correspond to the at least one other user included in the messaging session, wherein the one or more electronic devices display the representation of the second application object in a conversation transcript that corresponds to the messaging session

Figure 60D:
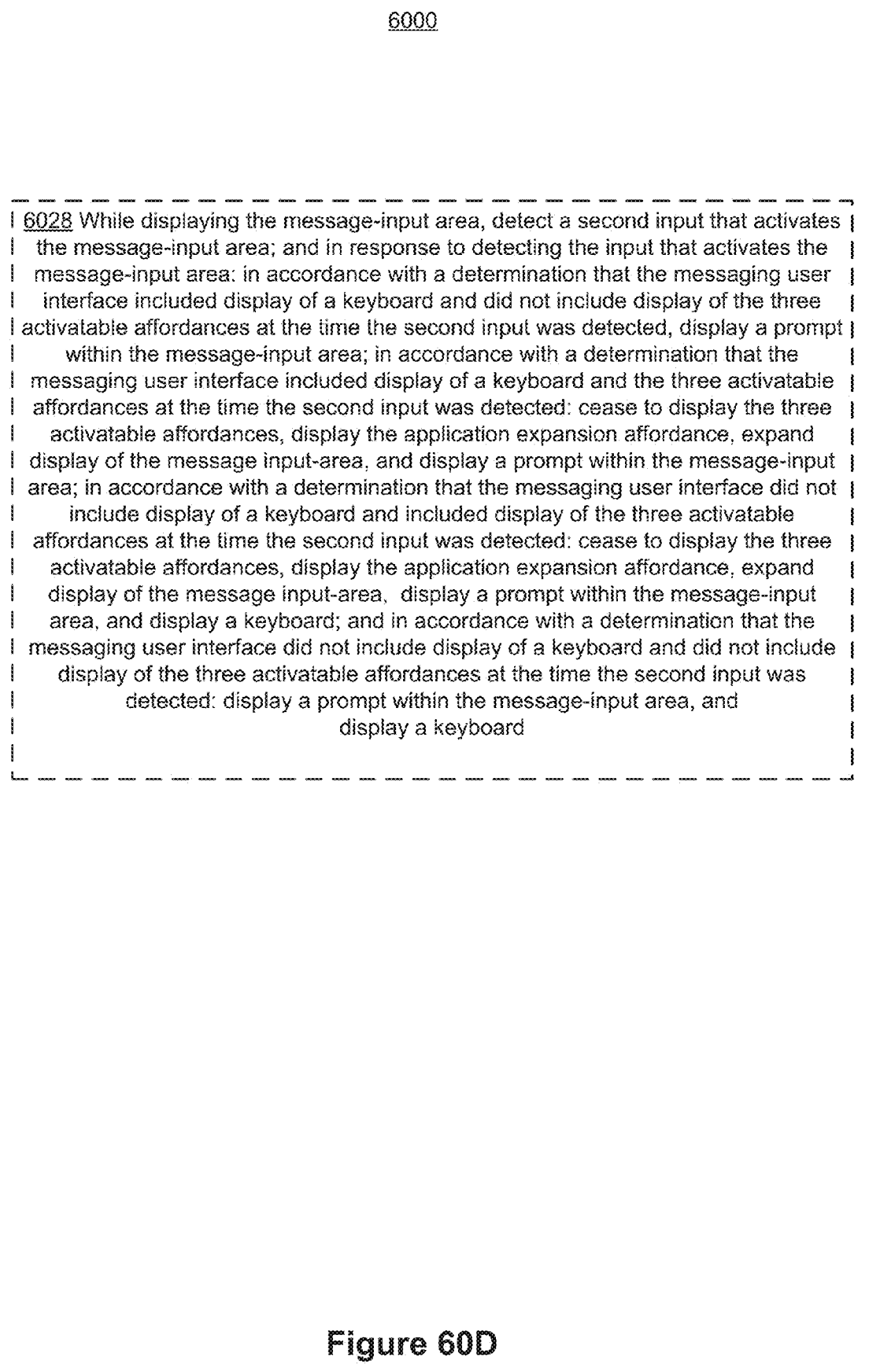

6028 While displaying the message-input area, detect a second input that activates the message-input area; and in response to detecting the input that activates the message-input area: in accordance with a determination that the messaging user interface included display of a keyboard and did not include display of the three activatable affordances at the time the second input was detected, display a prompt within the message-input area; in accordance with a determination that the messaging user interface included display of a keyboard and the three activatable affordances at the time the second input was detected: cease to display the three activatable affordances, display the application expansion affordance, expand display of the message input-area, and display a prompt within the message-input area; in accordance with a determination that the messaging user interface did not include display of a keyboard and included display of the three activatable affordances at the time the second input was detected: cease to display the three activatable affordances, display the application expansion affordance, expand display of the message input-area, display a prompt within the message-input area, and display a keyboard; and in accordance with a determination that the messaging user interface did not include display of a keyboard and did not include display of the three activatable affordances at the time the second input was detected: display a prompt within the message-input area, and display a keyboard

Figure 62B:
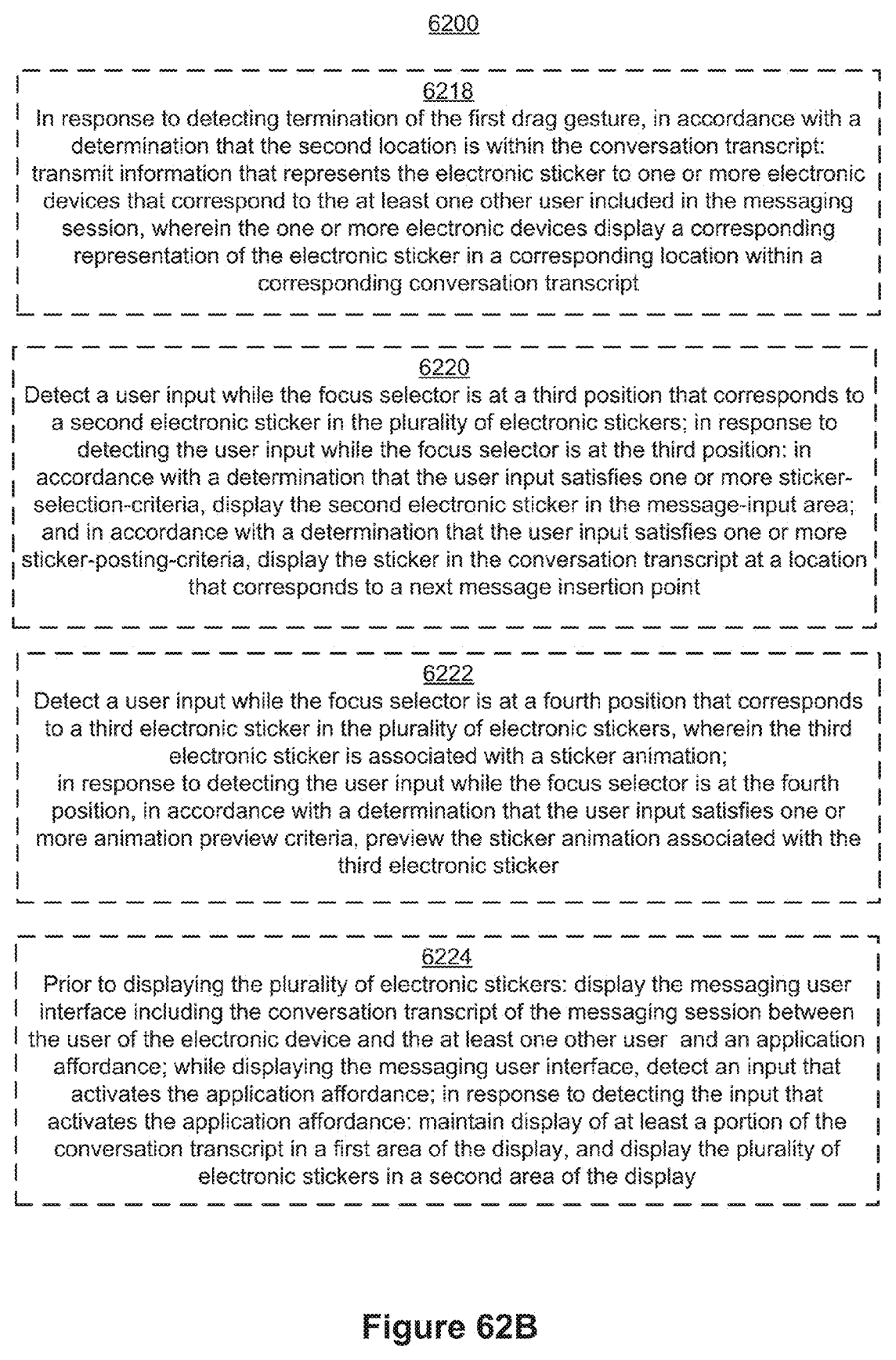

6218
In response to detecting termination of the first drag gesture, in accordance with a determination that the second location is within the conversation transcript: transmit information that represents the electronic sticker to one or more electronic devices that correspond to the at least one other user included in the messaging session, wherein the one or more electronic devices display a corresponding representation of the electronic sticker in a corresponding location within a corresponding conversation transcript 6220
Detect a user input while the focus selector is at a third position that corresponds to a second electronic sticker in the plurality of electronic stickers; in response to detecting the user input while the focus selector is at the third position: in accordance with a determination that the user input satisfies one or more sticker-selection-criteria, display the second electronic sticker in the message-input area; and in accordance with a determination that the user input satisfies one or more sticker-posting-criteria, display the sticker in the conversation transcript at a location that corresponds to a next message insertion point 6222
Detect a user input while the focus selector is at a fourth position that corresponds to a third electronic sticker in the plurality of electronic stickers, wherein the third electronic sticker is associated with a sticker animation;
in response to detecting the user input while the focus selector is at the fourth position, in accordance with a determination that the user input satisfies one or more animation preview criteria, preview the sticker animation associated with the third electronic sticker 6224
Prior to displaying the plurality of electronic stickers: display the messaging user interface including the conversation transcript of the messaging session between the user of the electronic device and the at least one other user and an application affordance; while displaying the messaging user interface, detect an input that activates the application affordance; in response to detecting the input that activates the application affordance: maintain display of at least a portion of the conversation transcript in a first area of the display, and display the plurality of electronic stickers in a second area of the display

Figure 62C:
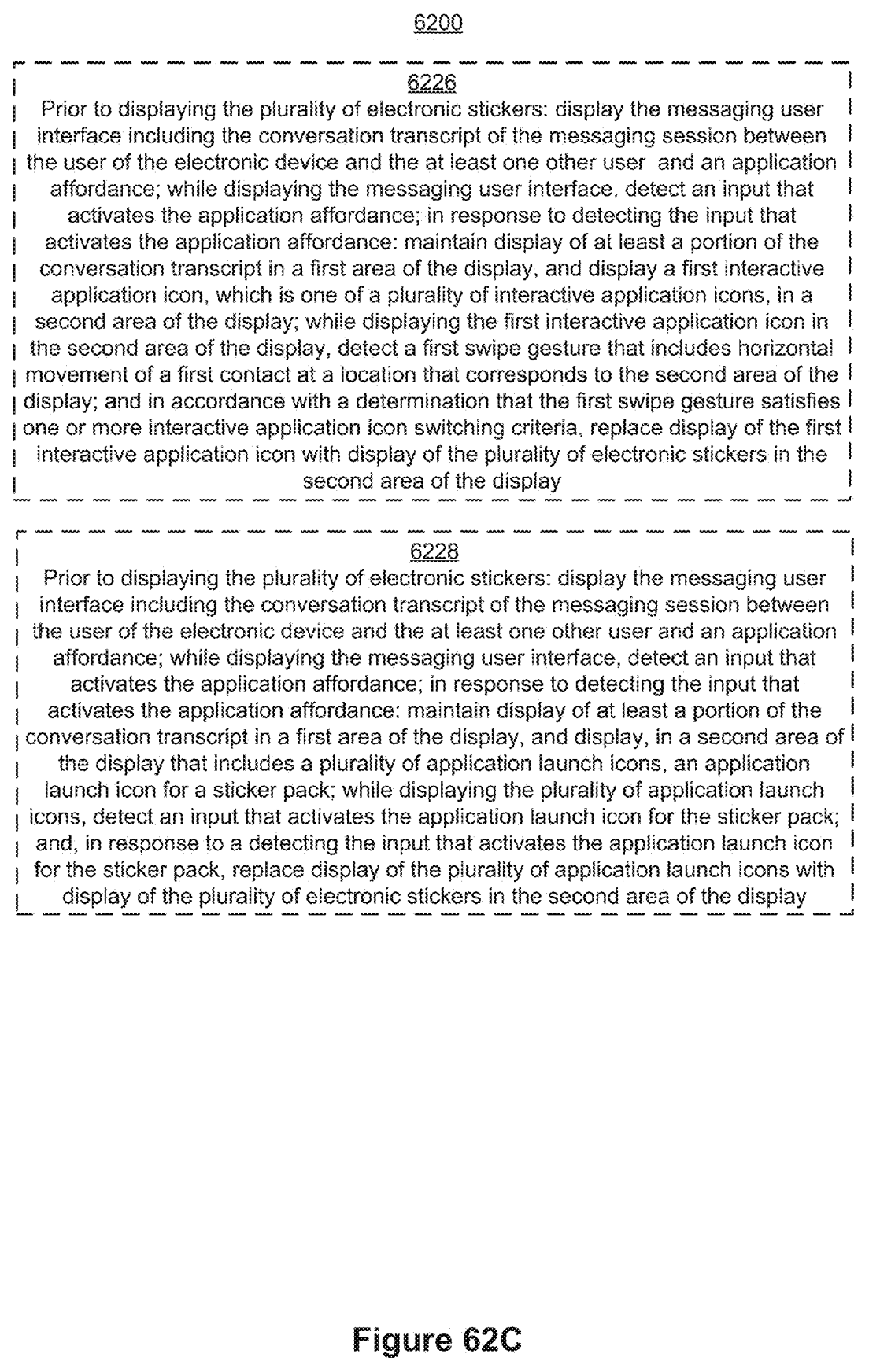

6226
Prior to displaying the plurality of electronic stickers: display the messaging user interface including the conversation transcript of the messaging session between the user of the electronic device and the at least one other user and an application affordance; while displaying the messaging user interface, detect an input that activates the application affordance; in response to detecting the input that activates the application affordance: maintain display of at least a portion of the conversation transcript in a first area of the display, and display a first interactive application icon, which is one of a plurality of interactive application icons, in a second area of the display; while displaying the first interactive application icon in the second area of the display, detect a first swipe gesture that includes horizontal movement of a first contact at a location that corresponds to the second area of the display; and in accordance with a determination that the first swipe gesture satisfies one or more interactive application icon switching criteria, replace display of the first interactive application icon with display of the plurality of electronic stickers in the second area of the display 6228
Prior to displaying the plurality of electronic stickers: display the messaging user interface including the conversation transcript of the messaging session between the user of the electronic device and the at least one other user and an application affordance; while displaying the messaging user interface, detect an input that activates the application affordance; in response to detecting the input that activates the application affordance: maintain display of at least a portion of the conversation transcript in a first area of the display, and display, in a second area of the display that includes a plurality of application launch icons, an application launch icon for a sticker pack; while displaying the plurality of application launch icons, detect an input that activates the application launch icon for the sticker pack; and, in response to a detecting the input that activates the application launch icon for the sticker pack, replace display of the plurality of application launch icons with display of the plurality of electronic stickers in the second area of the display

Figure 64B:
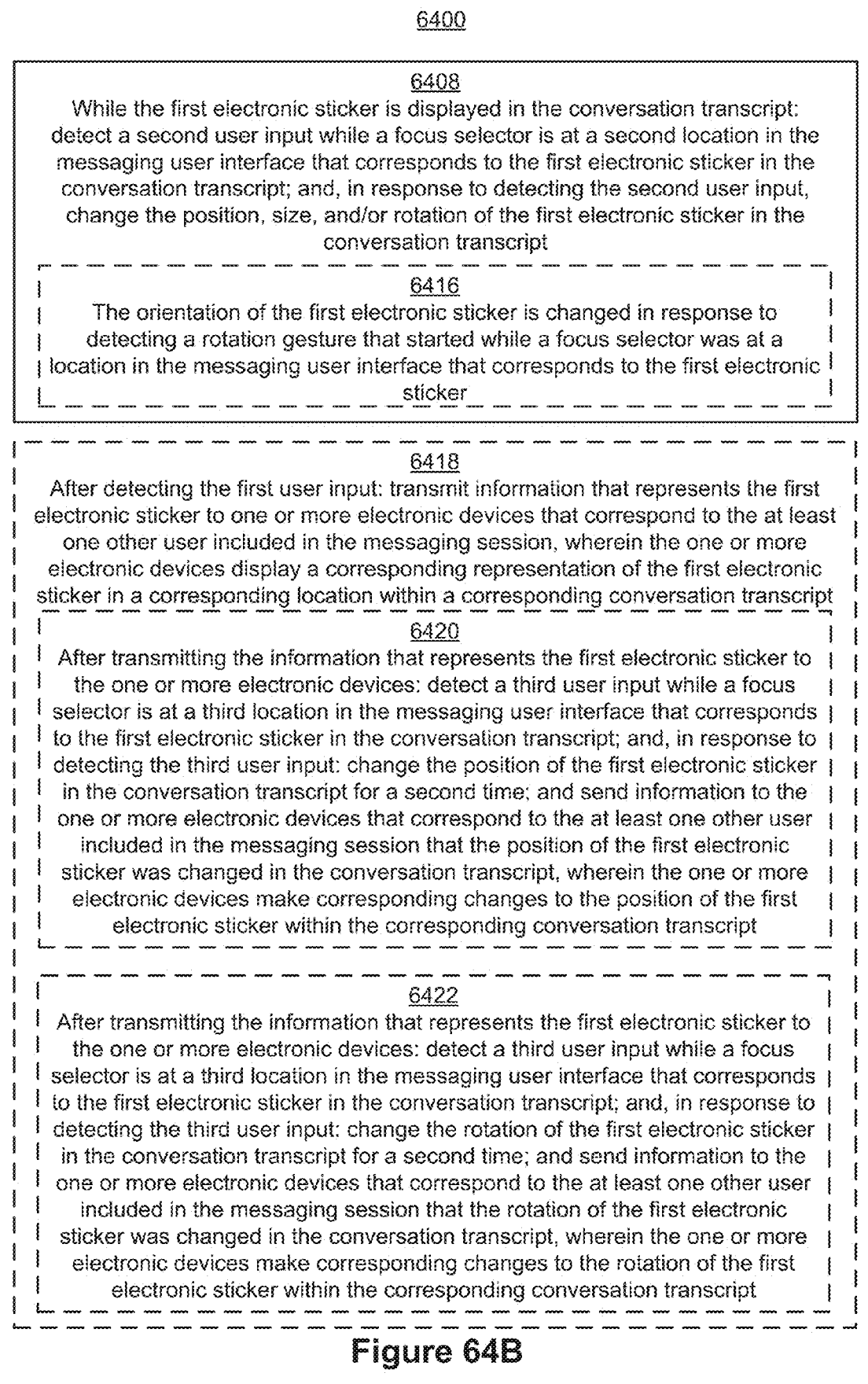

6408
While the first electronic sticker is displayed in the conversation transcript: detect a second user input while a focus selector is at a second location in the messaging user interface that corresponds to the first electronic sticker in the conversation transcript; and, in response to detecting the second user input, change the position, size, and/or rotation of the first electronic sticker in the conversation transcript 6416
The orientation of the first electronic sticker is changed in response to detecting a rotation gesture that started while a focus selector was at a location in the messaging user interface that corresponds to the first electronic sticker 6418
After detecting the first user input: transmit information that represents the first electronic sticker to one or more electronic devices that correspond to the at least one other user included in the messaging session, wherein the one or more electronic devices display a corresponding representation of the first electronic sticker in a corresponding location within a corresponding conversation transcript 6420
After transmitting the information that represents the first electronic sticker to the one or more electronic devices: detect a third user input while a focus selector is at a third location in the messaging user interface that corresponds to the first electronic sticker in the conversation transcript; and, in response to detecting the third user input: change the position of the first electronic sticker in the conversation transcript for a second time; and send information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript 6422
After transmitting the information that represents the first electronic sticker to the one or more electronic devices: detect a third user input while a focus selector is at a third location in the messaging user interface that corresponds to the first electronic sticker in the conversation transcript; and, in response to detecting the third user input: change the rotation of the first electronic sticker in the conversation transcript for a second time; and send information to the one or more electronic devices that correspond to the at least one other user included in the messaging session that the rotation of the first electronic sticker was changed in the conversation transcript, wherein the one or more electronic devices make corresponding changes to the rotation of the first electronic sticker within the corresponding conversation transcript

Figure 64C:
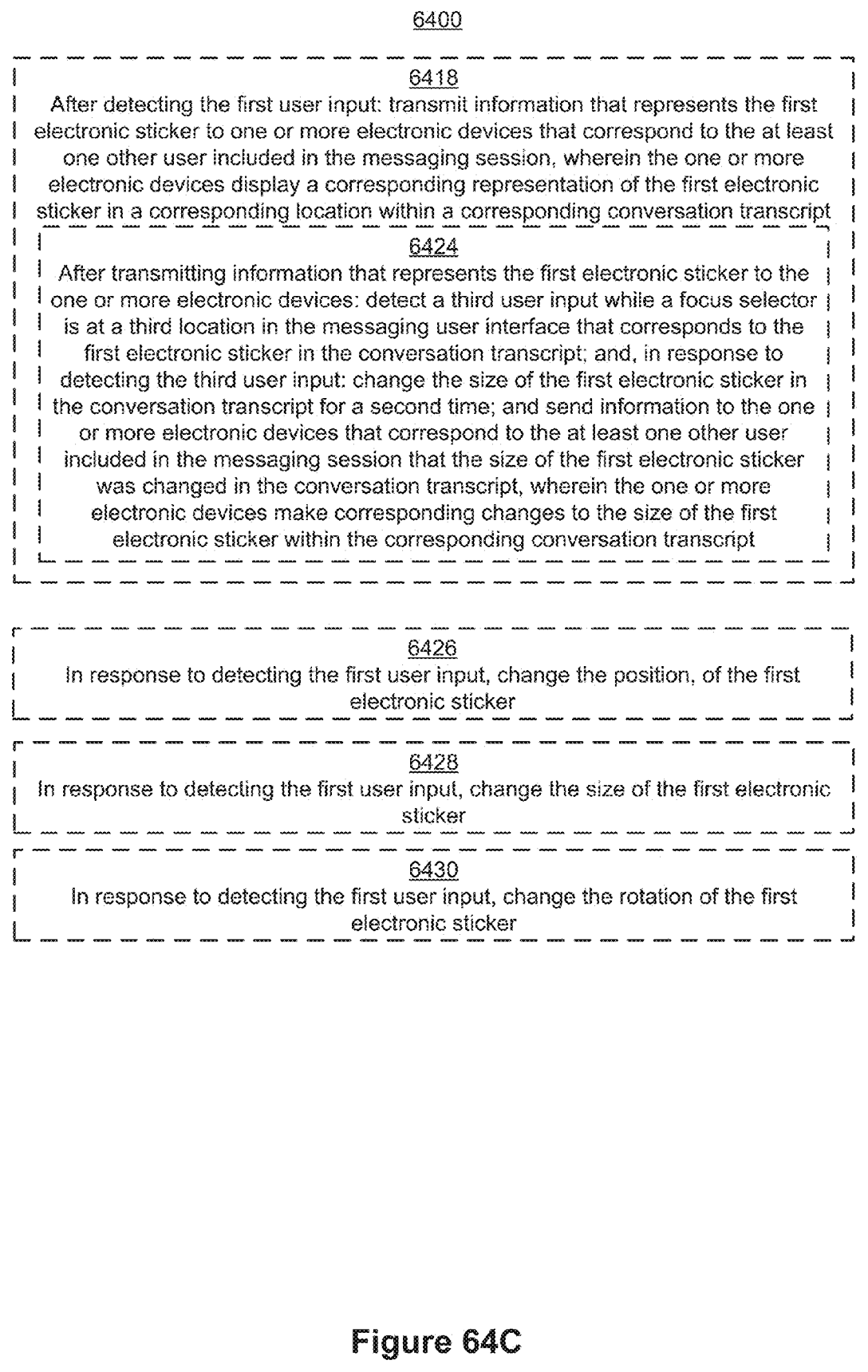

6418
After detecting the first user input: transmit information that represents the first electronic sticker to one or more electronic devices that correspond to the at least one other user included in the messaging session, wherein the one or more electronic devices display a corresponding representation of the first electronic sticker in a corresponding location within a corresponding conversation transcript 6424
After transmitting information that represents the first electronic sticker to the one or more electronic devices: detect a third user input while a focus selector is at a third location in the messaging user interface that corresponds to the first electronic sticker in the conversation transcript; and, in response to detecting the third user input: change the size of the first electronic sticker in the conversation transcript for a second time; and send information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript 6426
In response to detecting the first user input, change the position, of the first electronic sticker 6428
In response to detecting the first user input, change the size of the first electronic sticker 6430
In response to detecting the first user input, change the rotation of the first electronic sticker

Figure 66:
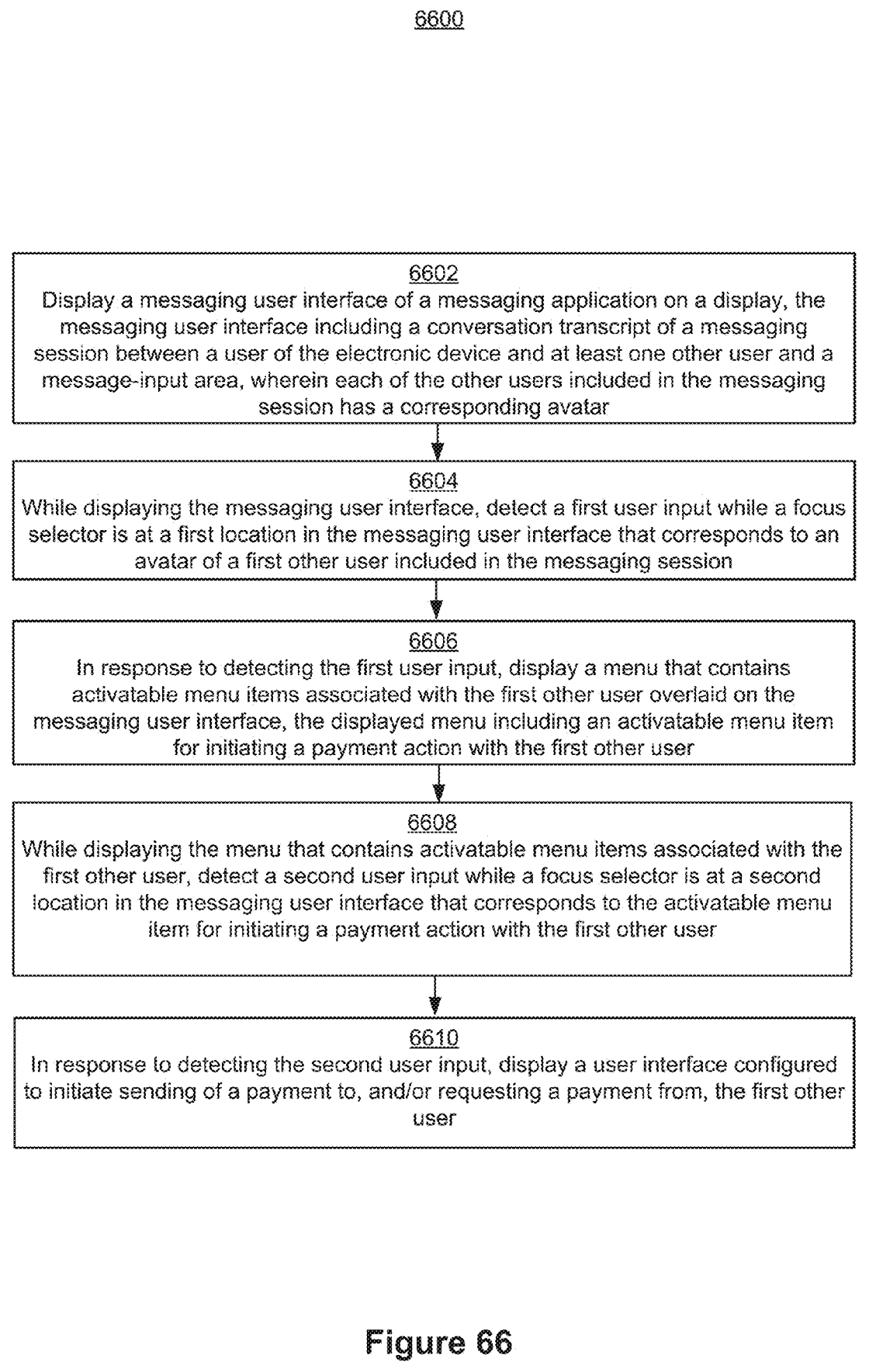

6602
Display a messaging user interface of a messaging application on a display, the messaging user interface including a conversation transcript of a messaging session between a user of the electronic device and at least one other user and a message-input area, wherein each of the other users included in the messaging session has a corresponding avatar

↓

6604
While displaying the messaging user interface, detect a first user input while a focus selector is at a first location in the messaging user interface that corresponds to an avatar of a first other user included in the messaging session

↓

6606
In response to detecting the first user input, display a menu that contains activatable menu items associated with the first other user overlaid on the messaging user interface, the displayed menu including an activatable menu item for initiating a payment action with the first other user

↓

6608
While displaying the menu that contains activatable menu items associated with the first other user, detect a second user input while a focus selector is at a second location in the messaging user interface that corresponds to the activatable menu item for initiating a payment action with the first other user

↓

6610
In response to detecting the second user input, display a user interface configured to initiate sending of a payment to, and/or requesting a payment from, the first other user

Figure 68A:
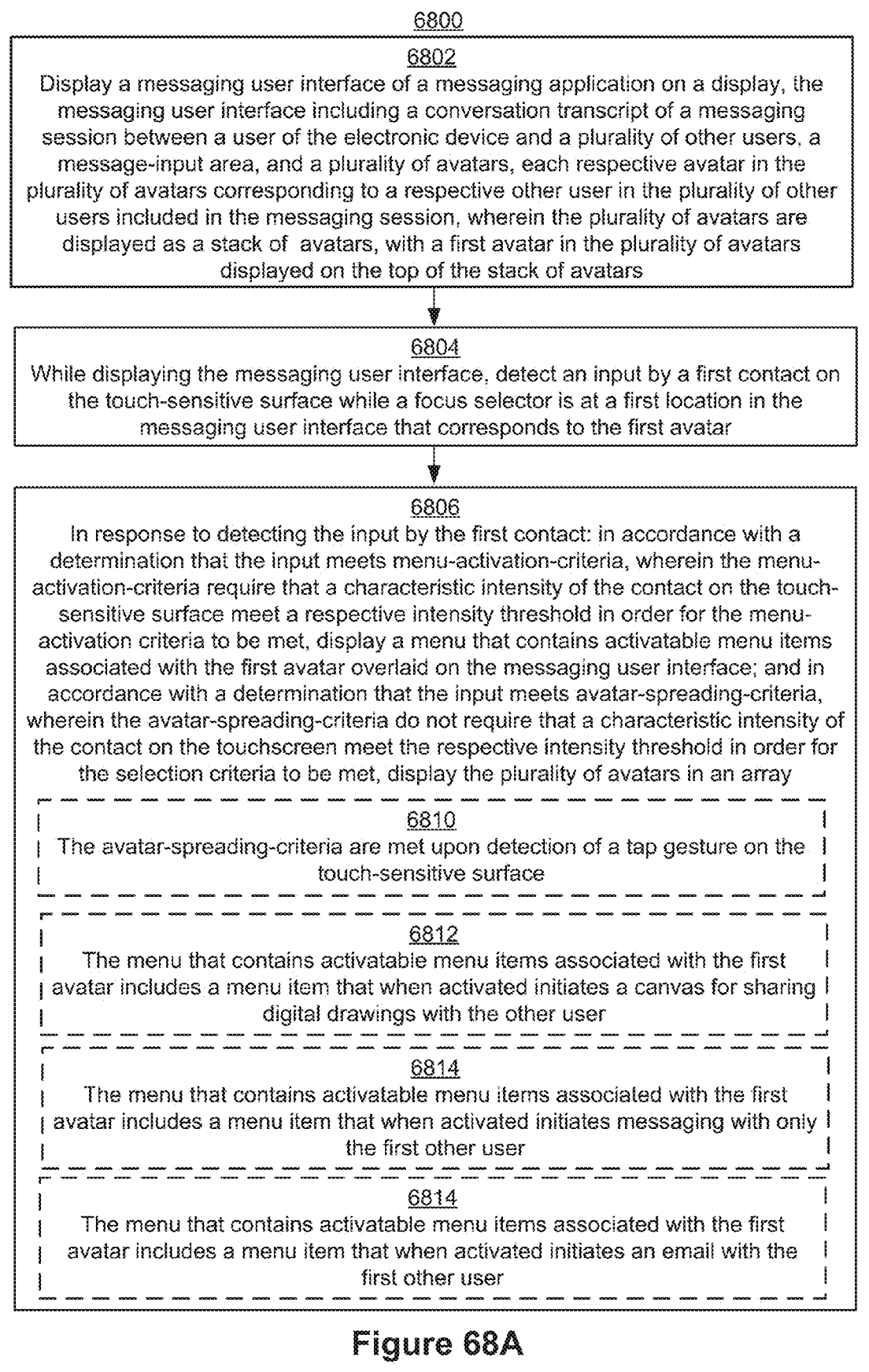

6802
Display a messaging user interface of a messaging application on a display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars

↓

6804
While displaying the messaging user interface, detect an input by a first contact on the touch-sensitive surface while a focus selector is at a first location in the messaging user interface that corresponds to the first avatar

↓

6806
In response to detecting the input by the first contact: in accordance with a determination that the input meets menu-activation-criteria, wherein the menu-activation-criteria require that a characteristic intensity of the contact on the touch-sensitive surface meet a respective intensity threshold in order for the menu-activation criteria to be met, display a menu that contains activatable menu items associated with the first avatar overlaid on the messaging user interface; and in accordance with a determination that the input meets avatar-spreading-criteria, wherein the avatar-spreading-criteria do not require that a characteristic intensity of the contact on the touchscreen meet the respective intensity threshold in order for the selection criteria to be met, display the plurality of avatars in an array 6810
The avatar-spreading-criteria are met upon detection of a tap gesture on the touch-sensitive surface 6812
The menu that contains activatable menu items associated with the first avatar includes a menu item that when activated initiates a canvas for sharing digital drawings with the other user 6814
The menu that contains activatable menu items associated with the first avatar includes a menu item that when activated initiates messaging with only the first other user 6814
The menu that contains activatable menu items associated with the first avatar includes a menu item that when activated initiates an email with the first other user

Figure 68B:
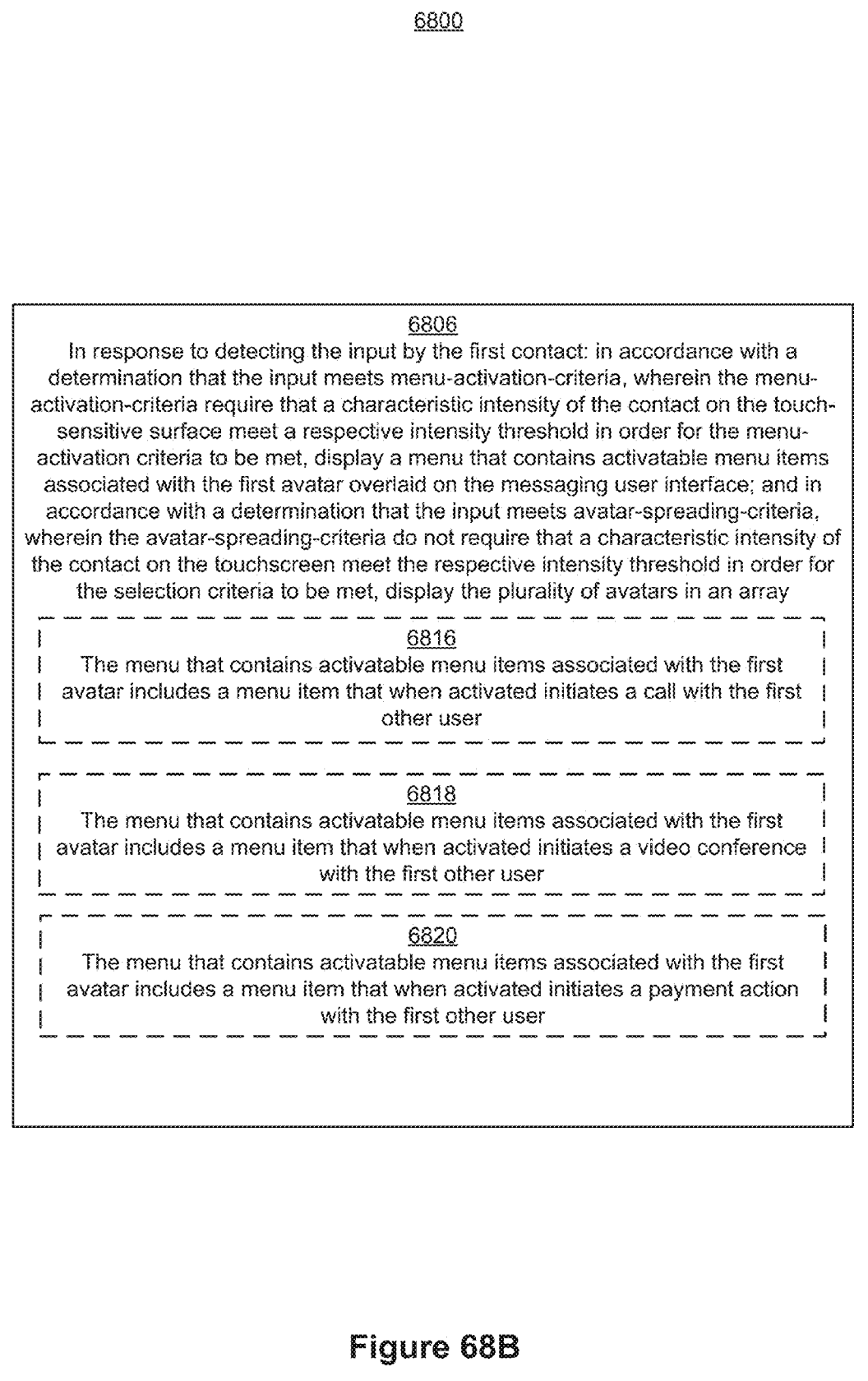

6806
In response to detecting the input by the first contact: in accordance with a determination that the input meets menu-activation-criteria, wherein the menu-activation-criteria require that a characteristic intensity of the contact on the touch-sensitive surface meet a respective intensity threshold in order for the menu-activation criteria to be met, display a menu that contains activatable menu items associated with the first avatar overlaid on the messaging user interface; and in accordance with a determination that the input meets avatar-spreading-criteria, wherein the avatar-spreading-criteria do not require that a characteristic intensity of the contact on the touchscreen meet the respective intensity threshold in order for the selection criteria to be met, display the plurality of avatars in an array 6816
The menu that contains activatable menu items associated with the first avatar includes a menu item that when activated initiates a call with the first other user 6818
The menu that contains activatable menu items associated with the first avatar includes a menu item that when activated initiates a video conference with the first other user 6820
The menu that contains activatable menu items associated with the first avatar includes a menu item that when activated initiates a payment action with the first other user

Figure 70A:
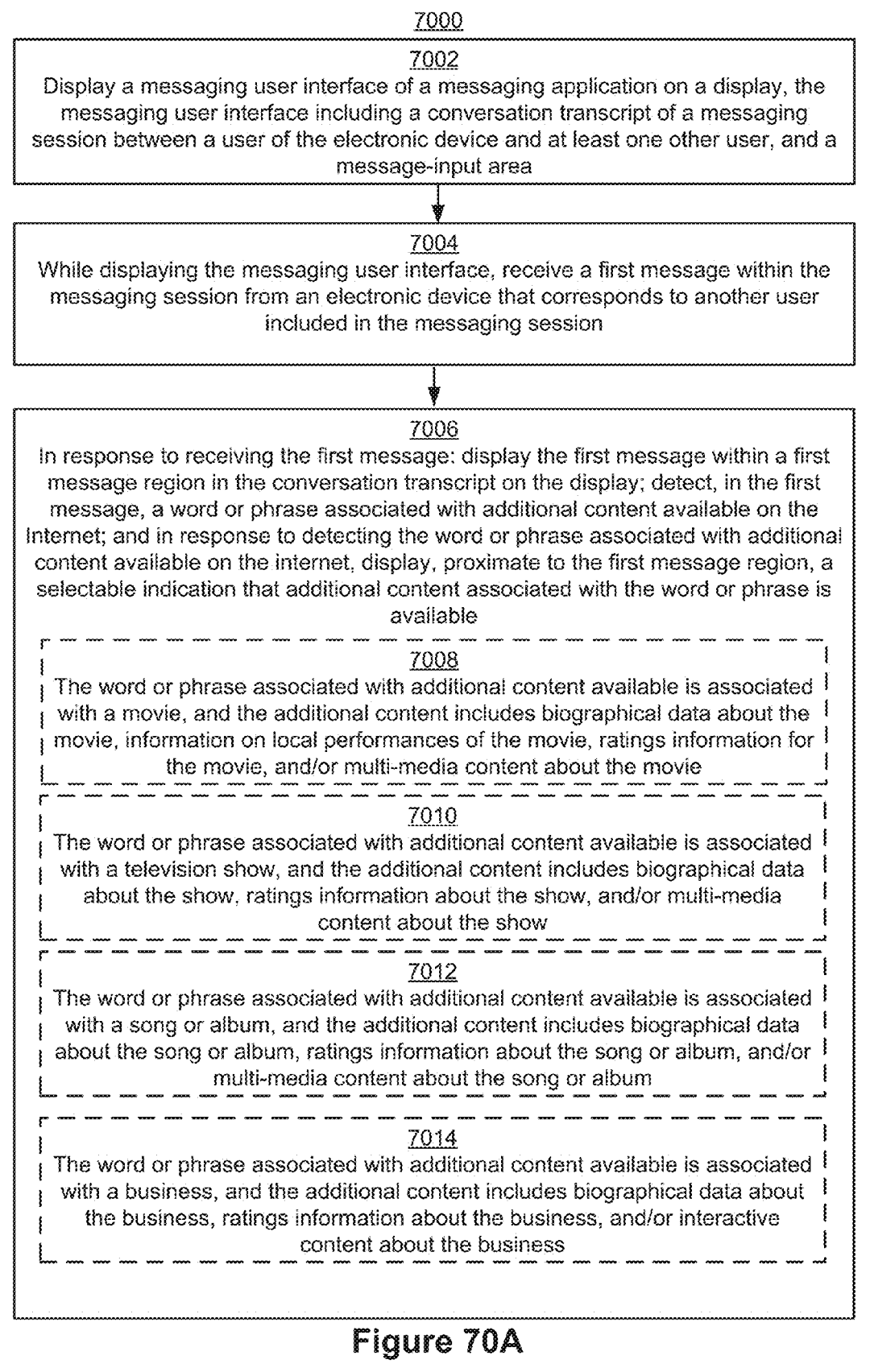

7002
Display a messaging user interface of a messaging application on a display, the messaging user interface including a conversation transcript of a messaging session between a user of the electronic device and at least one other user, and a message-input area 7004
While displaying the messaging user interface, receive a first message within the messaging session from an electronic device that corresponds to another user included in the messaging session 7006
In response to receiving the first message: display the first message within a first message region in the conversation transcript on the display; detect, in the first message, a word or phrase associated with additional content available on the Internet; and in response to detecting the word or phrase associated with additional content available on the internet, display, proximate to the first message region, a selectable indication that additional content associated with the word or phrase is available 7008
The word or phrase associated with additional content available is associated with a movie, and the additional content includes biographical data about the movie, information on local performances of the movie, ratings information for the movie, and/or multi-media content about the movie 7010
The word or phrase associated with additional content available is associated with a television show, and the additional content includes biographical data about the show, ratings information about the show, and/or multi-media content about the show 7012
The word or phrase associated with additional content available is associated with a song or album, and the additional content includes biographical data about the song or album, ratings information about the song or album, and/or multi-media content about the song or album 7014
The word or phrase associated with additional content available is associated with a business, and the additional content includes biographical data about the business, ratings information about the business, and/or interactive content about the business

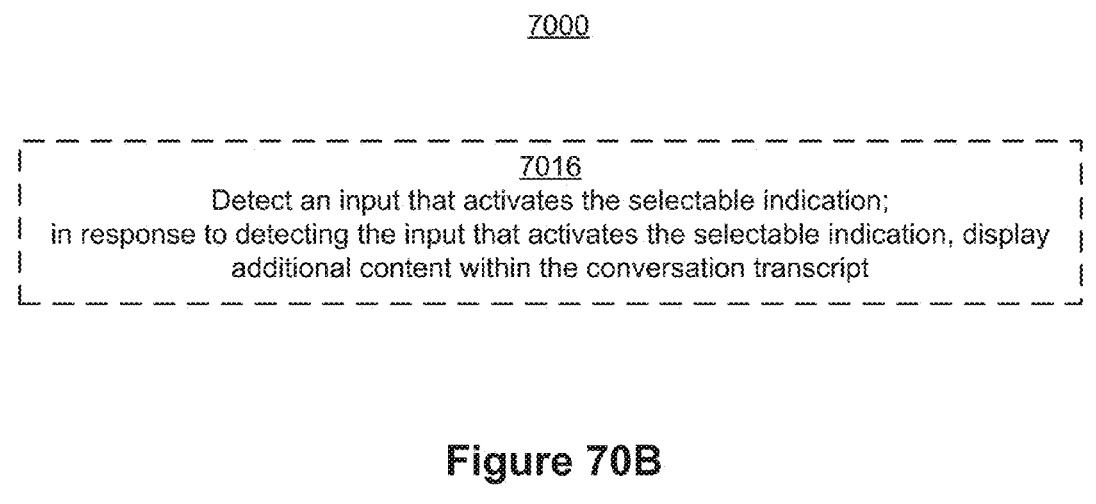

7016
Detect an input that activates the selectable indication;
in response to detecting the input that activates the selectable indication, display additional content within the conversation transcript

Figure 70B

DEVICES, METHODS, AND GRAPHICAL USER INTERFACES FOR MESSAGING

RELATED APPLICATIONS

This application claims priority to: (1) U.S. Provisional Application Ser. No. 62/349,114, filed Jun. 12, 2016, entitled "Devices, Methods, and Graphical User Interfaces for Messaging"; (2) U.S. Provisional Application Ser. No. 62/349,116, filed Jun. 12, 2016, entitled "Playback of Handwritten Message"; (3) U.S. Provisional Application Ser. No. 62/339,078, filed May 19, 2016, entitled "Devices, Methods, and Graphical User Interfaces for Messaging"; and (4) U.S. Provisional Application Ser. No. 62/338,502, filed May 18, 2016, entitled "Devices, Methods, and Graphical User Interfaces for Messaging," which are all incorporated by reference herein in their entireties.

TECHNICAL FIELD

This relates generally to electronic devices with touch-sensitive surfaces, including but not limited to electronic devices with touch-sensitive surfaces that send and receive messages, such as instant messages.

BACKGROUND

The use of touch-sensitive surfaces as input devices for computers and other electronic computing devices has increased significantly in recent years. Exemplary touch-sensitive surfaces include touchpads and touch-screen displays. Such devices are often used to send messages, such as instant messages, between users using messaging applications.

But current messaging applications have numerous drawbacks and limitations. For example, they are limited in their ability to easily: acknowledge messages; edit previously sent messages; express what a user is trying to communicate; display private messages; synchronize viewing of content between users; incorporate handwritten inputs; quickly locate content in a message transcript; integrate a camera; integrate search and sharing; integrate interactive applications; integrate stickers; make payments; interact with avatars; and make suggestions.

SUMMARY

Accordingly, there is a need for electronic devices with improved methods and interfaces for messaging. Such methods and interfaces optionally complement or replace conventional methods for messaging. Such methods and interfaces change the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for applying an acknowledgement to a message region in a conversation transcript. Such methods and interfaces may complement or replace conventional methods for applying an acknowledgement to a message region in a conversation transcript. Such methods and interfaces reduce the number, extent, and/or the nature of the inputs from a user and produce a more efficient human-machine interface.

In accordance with some embodiments, a method of applying an acknowledgement to a message region in a conversation transcript displayed on a display of an electronic device includes, displaying a messaging user interface (e.g., of a messaging application) on the display, where the messaging user interface includes a conversation transcript of a messaging session between a user of the electronic device and at least one other user (e.g., of another electronic device). The method further includes receiving a first message within the messaging session from an electronic device (e.g., a second electronic device) that corresponds to another user included in the messaging session, and in response to receiving the first message, displaying the first message in a first message region in the conversation transcript on the display. The electronic device detects a first input by a first contact at a location on the touch-sensitive surface that corresponds to a location of the first message region in the conversation transcript, and in response to detecting the first input, displays an acknowledgement selection affordance at a location in the messaging interface that corresponds to the first message region, where the acknowledgement selection affordance displays a plurality of acknowledgement options. Next, the method includes detecting a second input by a second contact at a location on the touch-sensitive surface that corresponds to a location of a first acknowledgement option in the acknowledgement selection affordance, and in response to detecting the second input, applying the first acknowledgement option to the first message region.

In accordance with some embodiments, an electronic device includes a display unit configured to display a messaging user interface on the display unit, the messaging user interface including a conversation transcript of a messaging session between a user of the electronic device and at least one other user, a touch-sensitive surface unit configured to detect contacts; and a processing unit coupled with the display unit and the touch-sensitive surface unit. The processing unit configured to: receive a first message within the messaging session from an electronic device that corresponds to another user included in the messaging session; and in response to receiving the first message, display the first message in a first message region in the conversation transcript on the display unit. The processing unit is further configured to detect a first input by a first contact at a location on the touch-sensitive surface unit that corresponds to a location of the first message region in the conversation transcript; and in response to detecting the first input, display an acknowledgement selection affordance at a location in the messaging interface that corresponds to the first message region, wherein the acknowledgement selection affordance displays a plurality of acknowledgement options. The processing unit is further configured to detect a second input by a second contact at a location on the touch-sensitive surface unit that corresponds to a location of a first acknowledgement option in the acknowledgement selection affordance; and, in response to detecting the second input, apply the first acknowledgement option to the first message region.

Thus, electronic devices with displays and touch-sensitive surfaces are provided with improved methods and interfaces for applying an acknowledgement to a message region in a conversation transcript, thereby increasing the effectiveness, efficiency, and user satisfaction with such devices. Such methods and interfaces may complement or replace conventional methods for applying an acknowledgement to a message region in a conversation transcript.

There is a need for electronic devices with improved methods and interfaces for editing sent messages. Such methods and interfaces may complement or replace conventional methods for editing sent messages. Such methods and interfaces reduce the number, extent, and/or the nature of the inputs from a user and produce a more efficient human-machine interface.

In accordance with some embodiments, a method of editing messages, performed at an electronic device (e.g., a first electronic device) having one or more processors, memory, a touch-sensitive surface, and a display, includes displaying a messaging user interface on the display. The messaging user interface includes a conversation transcript of a messaging session between a user of the electronic device and at least one other user, and a first message region that includes a first message in the messaging session that was sent from the electronic device of the user to the at least one other user in the messaging session. The method further includes detecting a first input that corresponds to a request to edit the first message, and in response to detecting the first input, displaying a message editing interface for the first message that includes the first message, a keyboard, and an update affordance, and while displaying the message editing interface for the first message, detecting one or more inputs that revise the first message, displaying a revised version of the first message; and detecting an input that activates the update affordance.

The method further includes, in response to detecting the input that activates the update affordance: ceasing to display the message editing interface for the first message; displaying the revised version of the first message in place of the first message in the conversation transcript; displaying at least one indication of the revision of the first message in the conversation transcript; and transmitting the revised version of the first message to one or more electronic devices that correspond to the at least one other user included in the messaging session, wherein the one or more electronic devices display the revised version of the first message in place of the first message in a conversation transcript that corresponds to the messaging session, with at least one indication of the revision of the first message in the conversation transcript.

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, and a first message region that includes a first message in the messaging session that was sent from the electronic device of the user to the at least one other user in the messaging session. The processing unit is configured to: detect a first input that corresponds to a request to edit the first message; and in response to detecting the first input, display a message editing interface for the first message that includes the first message, a keyboard, and an update affordance. The processing unit is further configured, while displaying the message editing interface for the first message, to detect one or more inputs that revise the first message; display a revised version of the first message; and detect an input that activates the update affordance; and, in response to detecting the input that activates the update affordance: cease to display the message editing interface for the first message; display the revised version of the first message in place of the first message in the conversation transcript; display at least one indication of the revision of the first message in the conversation transcript; and transmit the revised version of the first message to one or more electronic devices that correspond to the at least one other user included in the messaging session. The one or more electronic devices display the revised version of the first message in place of the first message in a conversation transcript that corresponds to the messaging session, with at least one indication of the revision of the first message in the conversation transcript.

Thus, electronic devices with displays and touch-sensitive surfaces are provided with improved methods and interfaces for editing sent messages, thereby increasing the effectiveness, efficiency, and user satisfaction with such devices. Such methods and interfaces may complement or replace conventional methods for editing sent messages in a messaging application.

There is a need for electronic devices with improved methods and interfaces for displaying versions of a sent message. Such methods and interfaces may complement or replace conventional methods for displaying versions of a sent message. Such methods and interfaces reduce the number, extent, and/or the nature of the inputs from a user and produce a more efficient human-machine interface.

In accordance with some embodiments, a method, performed at an electronic device having one or more processors, memory, a touch-sensitive surface, and a display, includes displaying a messaging user interface on the display, the messaging user interface including: a conversation transcript of a messaging session between a user of the electronic device and at least one other user, and a first message region that includes a current version of a first message in the messaging session, wherein the conversation transcript includes an indication that the current version of the first message is a revised version of the first message in the conversation transcript. The method further includes detecting an input that corresponds to a request to see versions of the first message; and, in response to detecting the input that corresponds to the request to see versions of the first message, displaying a versions user interface that includes the current version of the first message and one or more prior versions of the first message.

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, and a first message region that includes a current version of a first message in the messaging session, wherein the conversation transcript includes an indication that the current version of the first message is a revised version of the first message in the conversation transcript. The processing unit is configured to detect an input that corresponds to a request to see versions of the first message; and, in response to detecting the input that corresponds to the request to see versions of the first message, display a versions user interface that includes the current version of the first message and one or more prior versions of the first message.

Thus, electronic devices with displays and touch-sensitive surfaces are provided with improved methods and interfaces for displaying versions of a sent message, thereby increasing the effectiveness, efficiency, and user satisfaction with such devices. Such methods and interfaces may complement or replace conventional methods for displaying versions of a sent message in a messaging application.

There is a need for electronic devices with improved methods and interfaces for selecting an impact effect for a message. Such methods and interfaces may complement or replace conventional methods for selecting an impact effect for a message. Such methods and interfaces reduce the number, extent, and/or the nature of the inputs from a user and produce a more efficient human-machine interface.

In accordance with some embodiments, a method, performed at an electronic device having one or more processors, memory, a touch-sensitive surface, and a display, includes displaying a messaging user interface on the display, the messaging user interface including a conversation transcript of a messaging session between a user of the electronic device and at least one other user, and a message-input area that includes a first message input. The method further includes, while displaying the messaging user interface, detecting a first input by a first contact at a location on the touch-sensitive surface that corresponds to a location in the message-input area; in response to detecting the first input by the first contact, displaying an impact selection interface that includes a plurality of impact effect options; while displaying the impact selection interface, detecting a second input by a second contact at a location on the touch-sensitive surface that corresponds to a location of a first impact effect option in the plurality of impact effect options; and, in response to detecting the second user input by a second contact, displaying a preview that applies the first impact effect option to the first message input.

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, and a message-input area that includes a first message input. The processing unit is configured to: while displaying the messaging user interface, detect a first input by a first contact at a location on the touch-sensitive surface unit that corresponds to a location in the message-input area; and in response to detecting the first input by the first contact, display an impact selection interface that includes a plurality of impact effect options. The processing unit is further configured to: while displaying the impact selection interface, detect a second input by a second contact at a location on the touch-sensitive surface unit that corresponds to a location of a first impact effect option in the plurality of impact effect options; and, in response to detecting the second user input by a second contact, display a preview that applies the first impact effect option to the first message input.

Thus, electronic devices with displays and touch-sensitive surfaces are provided with improved methods and interfaces for selecting an impact effect for a message, thereby increasing the effectiveness, efficiency, and user satisfaction with such devices. Such methods and interfaces may complement or replace conventional methods for selecting an impact effect for a message in a messaging application.

There is a need for electronic devices with improved methods and interfaces for concealing and revealing a message. Such methods and interfaces may complement or replace conventional methods for concealing and revealing a message. Such methods and interfaces reduce the number, extent, and/or the nature of the inputs from a user and produce a more efficient human-machine interface.

In accordance with some embodiments, a method, performed at an electronic device having one or more processors, memory, a touch-sensitive surface, and a display, includes displaying a messaging user interface on the display, the messaging user interface including a conversation transcript of a messaging session between a user of the electronic device and at least one other user, including a first other user, and a message region in the conversation transcript for a message received from the first other user, the message region including one or more screen elements that conceal the message received from the first other user. The method further includes detecting a first input by a contact at a location on the touch-sensitive surface that corresponds to the message region with the concealed message; and, in response to detecting the first input by the contact, revealing the concealed message in the message region.

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, including a first other user, and a message region in the conversation transcript for a message received from the first other user, the message region including one or more screen elements that conceal the message received from the first other user. The processing unit is further configured to: detect a first input by a contact at a location on the touch-sensitive surface unit that corresponds to the message region with the concealed message; and, reveal the concealed message in the message region in response to detecting the first input by the contact.

Thus, electronic devices with displays and touch-sensitive surfaces are provided with improved methods and interfaces for concealing and revealing a message, thereby increasing the effectiveness, efficiency, and user satisfaction with such devices. Such methods and interfaces may complement or replace conventional methods for concealing and revealing a message in a messaging application.

There is a need for electronic devices with improved methods and interfaces for displaying enhanced message content in a messaging application. Such methods and interfaces may complement or replace conventional methods for displaying enhanced message content in a messaging application. Such methods and interfaces reduce the number, extent, and/or the nature of the inputs from a user and produce a more efficient human-machine interface.

In accordance with some embodiments, a method, performed at an electronic device having one or more processors, memory, a touch-sensitive surface, and a display, includes displaying a messaging user interface on the display, the messaging user interface including a conversation transcript of a messaging session between a user of the electronic device and at least one other user, including a first other user, receiving a first message within the messaging session from an electronic device that corresponds to the first other user included in the messaging session, and determining whether the first message includes an enhanced message content trigger. The method further includes, in accordance with a determination that the first message includes the enhanced message content trigger, displaying the first message in a first message region in the conversation transcript on the display, and displaying enhanced message content that corresponds to the trigger, wherein the enhanced message content includes content that applies an effect to at least one message region other than the first message region in the conversation transcript. The method also includes, in accordance with a determination that the first message does not include the enhanced message content trigger, displaying the first message in a first message region in the conversation transcript on the display (e.g., without the enhanced message content).

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, including a first other user. The processing unit is configured to receive a first message within the messaging session from an electronic device that corresponds to the first other user included in the messaging session, and determine whether the first message includes an enhanced message content trigger. The processing unit is further configured to, in accordance with a determination that the first message includes the enhanced message content trigger, display the first message in a first message region in the conversation transcript on the display unit, and display enhanced message content that corresponds to the trigger, wherein the enhanced message content includes content that applies an effect to at least one message region other than the first message region in the conversation transcript. In addition, the processing unit is configure to, in accordance with a determination that the first message does not include the enhanced message content trigger, display the first message in a first message region in the conversation transcript on the display unit.

Thus, electronic devices with displays and touch-sensitive surfaces are provided with improved methods and interfaces for displaying enhanced message content in a messaging application, thereby increasing the effectiveness, efficiency, and user satisfaction with such devices. Such methods and interfaces may complement or replace conventional methods for displaying enhanced message content in a messaging application.

There is a need for electronic devices with improved methods and interfaces for displaying combinable content in a messaging application. Such methods and interfaces may complement or replace conventional methods for displaying combinable content in a messaging application. Such methods and interfaces reduce the number, extent, and/or the nature of the inputs from a user and produce a more efficient human-machine interface.

In accordance with some embodiments, a method, performed at an electronic device having one or more processors, memory, a touch-sensitive surface, and a display, includes displaying a messaging user interface on the display, the messaging user interface including a conversation transcript of a messaging session between a user of the electronic device and at least one other user, including a first other user, and a message input area. The method further includes receiving a first message within the messaging session from an electronic device that corresponds to the first other user included in the messaging session, wherein the first message includes first combinable content, in response to receiving the first message, displaying the first message in a first message region in the conversation transcript on the display, receiving input of a second message in the message-input area, and while the second message is displayed in the message-input area, detecting an input to send the second message to the messaging session. The method further includes, in response to detecting the input to send the second message to the messaging session: in accordance with a determination that the second message contains second combinable content and the second combinable content and the first combinable content are parts of a predefined combination, displaying content that corresponds to the predefined combination in the conversation transcript on the display; and in accordance with a determination that the second message does not contain second combinable content that forms a predefined combination with the first combinable content, displaying the second message in a second message region in the conversation transcript on the display (e.g., without displaying content that corresponds to a predefined combination in the conversation transcript on the display).

In accordance with some embodiments, an electronic device includes a display unit configured to display a messaging user interface on the display unit, a touch-sensitive surface unit configured to detect contacts, and a processing unit coupled with the display unit and the touch-sensitive surface unit. The messaging user interface includes a conversation transcript of a messaging session between a user of the electronic device and at least one other user, including a first other user, and a message input area. The processing unit is configured to: receive a first message within the messaging session from an electronic device that corresponds to the first other user included in the messaging session, wherein the first message includes first combinable content; in response to receiving the first message, display the first message in a first message region in the conversation transcript on the display unit; receive input of a second message in the message-input area; and while the second message is displayed in the message-input area, detect an input to send the second message to the messaging session. The processing unit is further configured to, in response to detecting the input to send the second message to the messaging session: in accordance with a determination that the second message contains second combinable content and the second combinable content and the first combinable content are parts of a predefined combination, display content that corresponds to the predefined combination in the conversation transcript on the display unit; and in accordance with a determination that the second message does not contain second combinable content that forms a predefined combination with the first combinable content, display the second message in a second message region in the conversation transcript on the display unit (i.e., without displaying content that corresponds to a predefined combination in the conversation transcript on the display).

Thus, electronic devices with displays and touch-sensitive surfaces are provided with improved methods and interfaces for displaying combinable content in a messaging application, thereby increasing the effectiveness, efficiency, and user satisfaction with such devices. Such methods and interfaces may complement or replace conventional methods for displaying combinable content in a messaging application.

There is a need for electronic devices with improved methods and interfaces for synchronizing media presentation in a messaging application. Such methods and interfaces optionally complement or replace conventional methods for synchronizing media presentation in a messaging application. Such methods and interfaces produce more efficient human-machine interfaces by allowing users to easily view media content in a synchronized fashion directly within a messaging application (and without having to be co-located with another user viewing the media content and without having to use inefficient techniques to enable synchronized viewing). For battery-operated devices, such methods and interfaces increase user satisfaction with their devices, conserve power, and increase the time between battery charges. Furthermore, allowing users to easily view media content in a synchronized fashion directly within a messaging application enhances the operability of the device and makes the user-device interface (e.g., in the messaging application) more efficient (e.g., by allowing for efficient synchronized viewing of media items) which, additionally, reduces power usage and improves battery life of the device by enabling the user to use the device more quickly and efficiently.

In accordance with some embodiments, a method is performed at an electronic device with a display and a touch-sensitive surface. The method includes: displaying, on the display, a messaging user interface, the messaging user interface including a conversation transcript of a messaging session between a user of the first electronic device and at least one other user. In some embodiments, the conversation transcript includes a representation of a media item that is displayed at a chronological position within the conversation transcript, and the messaging session is configured to allow synchronized viewing of the media item by the user at the first electronic device and the at least one other user at a second electronic device that is distinct from the first electronic device. The method also includes: receiving a first request for synchronized viewing of the media item within the messaging user interface. In response to receiving the first request, the method includes: initiating playing of content corresponding to the media item while the representation of the media item is displayed at the chronological position within the conversation transcript. After initiating playing of the content corresponding to the media item, the method includes: displaying the playing content corresponding to the media item at a fixed position within the messaging user interface that is different than the chronological position. While displaying the playing content corresponding to the media item at the fixed position, the method includes: displaying messages exchanged between the user and the at least one other user below the playing content corresponding to the media item; and detecting an end of the content corresponding to the media item. In response to detecting the end of the content corresponding to the media item, the method includes: ceasing to display the content corresponding to the media item at the fixed position.

In accordance with some embodiments, an electronic device (e.g., electronic device 2200, FIG. 22) includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to (or one or more components thereof, such as the units 2210-2216 shown in FIG. 22 are configured to) display, on the display, a messaging user interface, the messaging user interface including a conversation transcript of a messaging session between a user of the first electronic device and at least one other user. In some embodiments, the conversation transcript includes a representation of a media item that is displayed at a chronological position within the conversation transcript, and the messaging session is configured to allow synchronized viewing of the media item by the user at the first electronic device and the at least one other user at a second electronic device that is distinct from the first electronic device. The processing unit is also configured to: receive a first request for synchronized viewing of the media item within the messaging user interface and, in response to receiving the first request, initiate playing of content corresponding to the media item while the representation of the media item is displayed at the chronological position within the conversation transcript. After initiating playing of the content corresponding to the media item, the processing unit is configured to: display the playing content corresponding to the media item at a fixed position within the messaging user interface that is different than the chronological position. While displaying the playing content corresponding to the media item at the fixed position, the processing unit is configured to: display messages exchanged between the user and the at least one other user below the playing content corresponding to the media item and detect an end of the content corresponding to the media item. In response to detecting the end of the content corresponding to the media item, the processing unit is configured to: cease to display the content corresponding to the media item at the fixed position.

Thus, electronic devices with displays and touch-sensitive surfaces are provided with faster, more efficient methods and interfaces for viewing media content in a synchronized fashion within a messaging application, thereby increasing the effectiveness, efficiency, operability, and user satisfaction with such devices. Such methods and interfaces may complement or replace conventional methods for viewing media in a messaging application.

There is a need for electronic devices with improved methods and interfaces for using handwriting inputs in a messaging application. Such methods and interfaces optionally complement or replace conventional methods for entering messages in a messaging application. Such methods and interfaces help improve user satisfaction with their devices and produce more efficient human-machine interfaces by allowing users, e.g., to simply rotate their device in order to begin entering handwritten inputs. Such methods and interfaces also produce more efficient human-machine interfaces by allowing for auto-replacing of typed inputs with handwritten inputs and by allowing users to intuitively create keyboards with handwritten characters as keys, thus improving operability of the devices. For battery-operated devices, such methods and interfaces conserve power and increase the time between battery charges. Furthermore, allowing users to simply rotate their devices in order to begin entering handwritten inputs, auto-replacing typed inputs, and creating keyboards with handwritten characters as keys all contribute to enhancing the operability of the devices and making the user-device interfaces (e.g., in the messaging application) more efficient (e.g., by allowing users to easily customize their message content with handwritten inputs) which, additionally, reduces power usage and improves battery life of the device by enabling the user to use the device more quickly and efficiently. For example, the user need not leave the messaging application, open and use a different application to input or locate handwritten inputs, and then return to use those inputs in the messaging application. Instead, the user simple provides and/or selects custom handwritten inputs directly within the messaging application.

In accordance with some embodiments, a method is performed at an electronic device with a display and a touch-sensitive surface. The method includes: while the electronic device is in a portrait orientation, displaying, on the display, a messaging user interface, the messaging user interface including a virtual keyboard. The method also includes: detecting a change in the orientation of the electronic device from the portrait orientation to a landscape orientation; and, in response to detecting the change in the orientation of the electronic device: ceasing to display the virtual keyboard and displaying, on the display, a handwriting input area that is configured to accept handwritten input from a user of the electronic device.

In accordance with some embodiments, an electronic device includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: while the electronic device is in a portrait orientation, display, on the display, a messaging user interface, the messaging user interface including a virtual keyboard; detect a change in the orientation of the electronic device from the portrait orientation to a landscape orientation; and, in response to detecting the change in the orientation of the electronic device: cease to display the virtual keyboard; and display, on the display, a handwriting input area that is configured to accept handwritten input from a user of the electronic device.

In accordance with some embodiments, a method is performed at an electronic device with a display and a touch-sensitive surface. The method includes: displaying, on the display: a messaging user interface, the messaging user interface including a conversation transcript of a messaging session between a user of the electronic device and at least one other user, a virtual keyboard, and a message-input area. The method also includes: receiving, at the virtual keyboard, a plurality of typing inputs. While receiving the plurality of typing inputs, the method includes: determining whether one or more typing inputs of the plurality of typing inputs match a stored sequence of characters that is associated with stored handwritten input from the user. In accordance with a determination that the one or more typing inputs match the stored sequence of characters, the method includes: displaying at a first location, proximate to a first set of characters that is displayed within the message-input area, a selectable representation of the stored handwritten input. In some embodiments, the first set of characters is displayed within the message-input area and includes characters that correspond to the one or more typing inputs that match the stored sequence of characters. The method also includes: detecting, via the touch-sensitive surface, a selection of the selectable representation of the stored handwritten input; and, in response to detecting the selection of the selectable representation of the stored handwritten input: ceasing to display the selectable representation of the stored handwritten input at the first location; and replacing display, within the message-input area, of the first set of characters that correspond to the one or more typing inputs with display of a representation of the stored handwritten input.

In accordance with some embodiments, an electronic device includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: display, on the display: a messaging user interface, the messaging user interface including a conversation transcript of a messaging session between a user of the electronic device and at least one other user, a virtual keyboard, and a message-input area. The processing unit is configured to: receive, at the virtual keyboard, a plurality of typing inputs; while receiving the plurality of typing inputs, determine whether one or more typing inputs of the plurality of typing inputs match a stored sequence of characters that is associated with stored handwritten input from the user; in accordance with a determination that the one or more typing inputs match the stored sequence of characters, display at a first location, proximate to a first set of characters that is displayed within the message-input area, a selectable representation of the stored handwritten input, and the first set of characters is displayed within the message-input area and includes characters that correspond to the one or more typing inputs that match the stored sequence of characters; detect, via the touch-sensitive surface, a selection of the selectable representation of the stored handwritten input; and, in response to detecting the selection of the selectable representation of the stored handwritten input: cease to display the selectable representation of the stored handwritten input at the first location; and replace display, within the message-input area, of the first set of characters that correspond to the one or more typing inputs with display of a representation of the stored handwritten input.

In accordance with some embodiments, a method is performed at an electronic device with a display and a touch-sensitive surface. The method includes: detecting, via the touch-sensitive surface, a first input; in response to detecting the first input, presenting, on the display, a keyboard preparation user interface; while presenting the keyboard preparation user interface, receiving, via the touch-sensitive surface, handwritten inputs that correspond to a predefined set of training characters; after receiving the handwritten inputs, detecting a second input that corresponds to a request to display a messaging user interface that includes a message-input area and a virtual keyboard with a plurality of keys, wherein a first key of the plurality of keys is associated with a first handwritten input of the received handwritten inputs; in response to detecting the second input, displaying the messaging user interface that includes the message-input area and the virtual keyboard with the plurality of keys; receiving, via the touch-sensitive surface, a selection of the first key; and in response to receiving the selection of the first key, outputting a representation of the first handwritten input within the message-input area.

In accordance with some embodiments, an electronic device includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: detect, via the touch-sensitive surface, a first input; in response to detecting the first input, present, on the display, a keyboard preparation user interface; while presenting the keyboard preparation user interface, receive, via the touch-sensitive surface, handwritten inputs that correspond to a predefined set of training characters; after receiving the handwritten inputs, detect a second input that corresponds to a request to display a messaging user interface that includes a message-input area and a virtual keyboard with a plurality of keys, wherein a first key of the plurality of keys is associated with a first handwritten input of the received handwritten inputs; in response to detecting the second input, display the messaging user interface that includes the message-input area and the virtual keyboard with the plurality of keys; receive, via the touch-sensitive surface, a selection of the first key; and in response to receiving the selection of the first key, output a representation of the first handwritten input within the message-input area.

Thus, electronic devices with displays, touch-sensitive surfaces and optionally one or more sensors to detect intensities of contacts with the touch-sensitive surface are provided with faster, more efficient methods and interfaces for handwriting messages, thereby increasing the effectiveness, efficiency, and user satisfaction with such devices. Such methods and interfaces may complement or replace conventional methods for composing and submitting messages.

There is a need for electronic devices with improved methods and interfaces for quickly locating different types of content in a messaging application. Such methods and interfaces optionally complement or replace conventional methods. Such methods and interfaces produce more efficient human-machine interfaces by allowing users to simply utilize a simple gesture in order to quickly scale down display sizes for content in a messaging application, so that users are able to quickly locate desired content (e.g., users can scale down all text-only content in order to quickly locate emojis, photos, videos, or other types of content that may have been received a long time ago). For battery-operated devices, such methods and interfaces conserve power and increase the time between battery charges (e.g., by allowing users to quickly locate desired content). Furthermore, allowing users to quickly locate desired content enhances the operability of the devices and makes user-device interfaces (e.g., in the messaging application) more efficient (e.g., by allowing users to easily locate desired content in a potentially large and difficult to search conversation transcript) which, additionally, reduces power usage and improves battery life of the device by enabling the user to use the device more quickly and efficiently (e.g., the user need not scroll through pages and pages of content in the conversation transcript and can instead simply provide intuitive gestures to easily scale down content so that desired content is easily located).

In accordance with some embodiments, a method is performed at an electronic device with a display and a touch-sensitive surface. The method includes: displaying, on the display, a messaging user interface that includes a plurality of content items. In some embodiments, the plurality of content items includes content items having a first content type, the plurality of content items includes content items having a second content type that is distinct from the first content type, and a respective content item in the plurality of content items is displayed with a respective first size. While displaying the messaging user interface, the method includes: detecting, via the touch-sensitive surface, a first input. In response to detecting the first input, the method includes: reducing a display size of at least some content items having the first content type while continuing to display content items having the second content type with their respective first size.

In accordance with some embodiments, an electronic device includes a display unit configured to display a user interface, a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: display, on the display, a messaging user interface that includes a plurality of content items. In some embodiments, the plurality of content items at least includes content items having a first content type, the plurality of content items at least includes content items having a second content type that is distinct from the first content type, and a respective content item in the plurality of content items is displayed with a respective first size. While displaying the messaging user interface, the processing unit is configured to: detect, via the touch-sensitive surface, a first input and, in response to detecting the first input, reduce a display size of at least some content items having the first content type while continuing to display content items having the second content type with their respective first size.

In accordance with some embodiments, a method is performed at an electronic device with a display and a touch-sensitive surface. The method includes: displaying, on the display, a messaging user interface that includes a plurality of content items. In some embodiments, the plurality of content items includes content items having a first content type, the plurality of content items includes content items having a second content type that is distinct from the first content type, and a respective content item in the plurality of content items is displayed with a respective first size. While displaying the messaging user interface, the method includes: detecting, via the touch-sensitive surface, a first input and, in response to detecting the first input, the method includes: reducing a display size of at least some content items having the first content type, such that a first content item having the first content type is reduced to a respective second size that is smaller than the respective first size by a predefined first display-size-reduction factor; and reducing a display size of at least some content items having the second content type, such that a second content item having the second content type is reduced to a respective third size that is smaller than the respective first size by a predefined second display-size-reduction factor. In some embodiments, the predefined second display-size-reduction factor is less than the predefined first display-size-reduction factor.

In accordance with some embodiments, an electronic device includes a display unit configured to display a user interface and a touch-sensitive surface unit to receive contacts, one or more sensor units to detect intensities of contacts with the touch-sensitive surface unit; and a processing unit coupled with the display unit, the touch-sensitive surface unit, and the one or more sensor units. The processing unit is configured to: display, on the display, a messaging user interface that includes a plurality of content items. In some embodiments, the plurality of content items includes content items having a first content type, the plurality of content items includes content items having a second content type that is distinct from the first content type, and a respective content item in the plurality of content items is displayed with a respective first size. While displaying the messaging user interface, the processing unit is configured to: detect, via the touch-sensitive surface, a first input. In response to detecting the first input, the processing unit is configured to: reduce a display size of at least some content items having the first content type, such that a first content item having the first content type is reduced to a respective second size that is smaller than the respective first size by a predefined first display-size-reduction factor; and reduce a display size of at least some content items having the second content type, such that a second content item having the second content type is reduced to a respective third size that is smaller than the respective first size by a predefined second display-size-reduction factor. In some embodiments, the predefined second display-size-reduction factor is less than the predefined first display-size-reduction factor.

Thus, electronic devices with displays, touch-sensitive surfaces and optionally one or more sensors to detect intensities of contacts with the touch-sensitive surface are provided with fast and efficient methods and interfaces for quickly locating different types of content in a messaging application, thereby increasing the effectiveness, efficiency, and user satisfaction with such devices.

There is a need for electronic devices with improved methods and interfaces for sharing images (e.g., photos) in message conversations. Such methods and interfaces may complement or replace conventional methods for sharing images (e.g., photos) in message conversations. Such methods and interfaces reduce the number, extent, and/or the nature of the inputs from a user and produce a more efficient human-machine interface.

In accordance with some embodiments, a method is performed at an electronic device with a display, a digital camera, a touch-sensitive surface and memory. The method includes displaying a messaging user interface on the display, the messaging user interface including a conversation transcript of a messaging session between a user of the electronic device and at least one other user, a keyboard, a message-input area, and a digital image affordance. The method further includes, while displaying the messaging user interface, detecting an input that activates the digital image affordance. The method further includes in response to detecting the input that activates the digital image affordance, replacing display of the keyboard with display of a plurality of digital images, the plurality of digital images including one or more digital images stored in the memory and a live preview image from the digital camera. The method further includes detecting an input that selects the live image displayed within the plurality of digital images. The method further includes, in response to detecting that input that selects the live image, capturing a digital image with the digital camera, while maintaining display of the conversation transcript.

In accordance with some embodiments, an electronic device includes a display unit configured to display user interfaces, a digital camera unit configured to capture images, a touch-sensitive surface unit, a memory unit, and a processing unit coupled to the display unit, the digital camera unit, the touch-sensitive surface unit and the memory unit. The processing unit is configured to: display a messaging user interface on the display unit, the messaging user interface including a conversation transcript of a messaging session between a user of the electronic device and at least one other user, a keyboard, a message-input area, and a digital image affordance. The processing unit is further configured to, while displaying the messaging user interface, detect an input that activates the digital image affordance. The processing unit is further configured to, in response to detecting the input that activates the digital image affordance, replace display of the keyboard with display of a plurality of digital images, the plurality of digital images including one or more digital images stored in the memory unit and a live preview image from the digital camera unit. The processing unit is further configured to detect an input that selects the live image displayed within the plurality of digital images. The processing unit is further configured to, in response to detecting that input that selects the live image, capture a digital image with the digital camera unit, while maintaining display of the conversation transcript.

Thus, electronic devices with displays and touch-sensitive surfaces are provided with improved methods and interfaces for sharing images (e.g., photos) in message conversations, thereby increasing the effectiveness, efficiency, and user satisfaction with such devices. Such methods and interfaces may complement or replace conventional methods for sharing images (e.g., photos) in message conversations.

There is a need for electronic devices with improved methods and interfaces for searching and sharing content (e.g., content from the Internet and locally stored content) in message conversations. Such methods and interfaces may complement or replace conventional methods for searching and sharing content in message conversations. Such methods and interfaces reduce the number, extent, and/or the nature of the inputs from a user and produce a more efficient human-machine interface.

In accordance with some embodiments, a method is performed at an electronic device with a display and a touch-sensitive surface. The method includes displaying a messaging user interface on the display, the messaging user interface including a conversation transcript of a messaging session between a user of the electronic device and at least one other user, and a search affordance. The method further includes, while displaying the messaging user interface, detecting an input that activates the search affordance. The method further includes, in response to detecting the input that activates the search affordance: ceasing to display the messaging user interface, and displaying a search user interface, the search user interface including a search field and a plurality of categorized content items, wherein the plurality of categorized content items includes at least a content item stored on the electronic device and a content item from the Internet. The method further includes, while displaying the search user interface, detecting an input that selects a first content item in the plurality of categorized content items. The method further includes, after detecting the input that selects the first content item in the plurality of categorized content items: ceasing to display the searching user interface, displaying the first content item in the conversation transcript within the messaging user interface, and transmitting the first content item to one or more electronic devices that correspond to the at least one other user included in the messaging session, wherein the one or more electronic devices display the first content item in a conversation transcript that corresponds to the messaging session.

In accordance with some embodiments, an electronic device includes a display unit configured to display user interfaces, a touch-sensitive surface unit, a memory unit, and a processing unit coupled to the display unit, the touch-sensitive surface unit, and the memory unit. The processing unit is configured to: display a messaging user interface on the display unit, the messaging user interface including a conversation transcript of a messaging session between a user of the electronic device and at least one other user, and a search affordance. The processing unit is further configured to, while displaying the messaging user interface, detect an input that activates the search affordance. The processing unit is further configured to, in response to detecting the input that activates the search affordance: cease to display the messaging user interface, and display a search user interface, the search user interface including a search field and a plurality of categorized content items, wherein the plurality of categorized content items includes at least a content item stored on the electronic device and a content item from the Internet. The processing unit is further configured to, while displaying the search user interface, detect an input that selects a first content item in the plurality of categorized content items. The processing unit is further configured to, after detecting the input that selects the first content item in the plurality of categorized content items: cease to display the searching user interface, display the first content item in the conversation transcript within the messaging user interface, and transmit the first content item to one or more electronic devices that correspond to the at least one other user included in the messaging session, wherein the one or more electronic devices display the first content item in a conversation transcript that corresponds to the messaging session.

Thus, electronic devices with displays and touch-sensitive surfaces are provided with improved methods and interfaces for searching sharing content in message conversations, thereby increasing the effectiveness, efficiency, and user satisfaction with such devices. Such methods and interfaces may complement or replace conventional methods for sharing content in conversations.

There is a need for electronic devices with improved methods and interfaces for adding an interactive application to a messaging application. Such methods and interfaces may complement or replace conventional methods for adding an interactive application to a messaging application. Such methods and interfaces reduce the number, extent, and/or the nature of the inputs from a user and produce a more efficient human-machine interface.

In accordance with some embodiments, a method is performed at an electronic device having one or more processors, memory, a touch-sensitive surface, and a display. The method includes: displaying a messaging user interface of a messaging application on the display, the messaging user interface including a conversation transcript of a messaging session between a user of the electronic device and at least one other user, and an application affordance; while displaying the messaging user interface, detecting an input that activates the application affordance; in response to detecting the input that activates the application affordance, concurrently displaying a launch icon for an application store and a plurality of launch icons for interactive applications, wherein activation of a respective launch icon for an interactive application launches a corresponding application that is displayed within the messaging application; detecting an input that activates the launch icon for the application store; in response to detecting the input that activates the launch icon for the application store: ceasing to display the messaging user interface, and displaying an application store user interface, including display of at least one interactive application available for download to the electronic device; while displaying the application store user interface, detecting an input that corresponds to a request to download a first interactive application that is not stored in the memory of the electronic device; and, in response to detecting the input that corresponds to the request to download the first interactive application: downloading the first interactive application to the memory of the electronic device; replacing display of the application store user interface with display of the messaging user interface, the messaging user interface including the conversation transcript and at least some of the plurality of launch icons for interactive applications; and adding a launch icon that corresponds to the first interactive application to the display of the plurality of launch icons for interactive applications.

In accordance with some embodiments, an electronic device includes a display unit configured to display user interfaces; a touch-sensitive surface unit configured to detect contacts; and a processing unit coupled with the display unit and the touch-sensitive surface unit. The processing unit is configured to: enable display of a messaging user interface of a messaging application on the display unit, the messaging user interface including a conversation transcript of a messaging session between a user of the electronic device and at least one other user, and an application affordance; while displaying the messaging user interface, detect an input that activates the application affordance; in response to detecting the input that activates the application affordance, concurrently enable display of a launch icon for an application store and a plurality of launch icons for interactive applications, wherein activation of a respective launch icon for an interactive application launches a corresponding application that is displayed within the messaging application; detect an input that activates the launch icon for the application store; in response to detecting the input that activates the launch icon for the application store: cease to display the messaging user interface, and enable display of an application store user interface, including display of at least one interactive application available for download to the electronic device; while displaying the application store user interface, detect an input that corresponds to a request to download a first interactive application that is not stored in the memory of the electronic device; and, in response to detecting the input that corresponds to the request to download the first interactive application: download the first interactive application to the memory of the electronic device; replace display of the application store user interface with display of the messaging user interface, the messaging user interface including the conversation transcript and at least some of the plurality of launch icons for interactive applications; and add a launch icon that corresponds to the first interactive application to the display of the plurality of launch icons for interactive applications.

Thus, electronic devices with displays and touch-sensitive surfaces are provided with improved methods and interfaces for adding an interactive application to a messaging application, thereby increasing the effectiveness, efficiency, and user satisfaction with such devices. Such methods and interfaces may complement or replace conventional methods for adding an interactive application to a messaging application.

There is a need for electronic devices with improved methods and interfaces for posting messages. Such methods and interfaces may complement or replace conventional methods for posting messages. Such methods and interfaces reduce the number, extent, and/or the nature of the inputs from a user and produce a more efficient human-machine interface.

In accordance with some embodiments, a method is performed at an electronic device having one or more processors, memory, a touch-sensitive surface, and a display. The method includes: displaying a messaging user interface of a messaging application on the display, the messaging user interface including a conversation transcript of a messaging session between a user of the electronic device and at least one other user, a first message-input area, and a launch icon for an interactive application; while displaying the messaging user interface, detecting an input that activates the launch icon for the interactive application; in response to detecting the input that activates the launch icon for the interactive application, displaying a user interface for the interactive application, the interactive application user interface including a second message-input area that is distinct from the first message-input area; while displaying the interactive application user interface, detecting input of a first message in the second message-input area; in response to detecting the input of the first message in the second message-input area, displaying the first message in the second message-input area; while displaying the first message in the second message-input area, detecting an input that corresponds to a request to post the contents of the second message-input area to the messaging session; and, in response to detecting the input that corresponds to the request to post the contents of the second message-input area to the messaging session, transmitting the first message to one or more electronic devices that correspond to the at least one other user included in the messaging session, wherein the one or more electronic devices display the first message in a conversation transcript corresponding to the messaging session.

In accordance with some embodiments, an electronic device includes a display unit configured to display user interfaces; a touch-sensitive surface unit configured to detect contacts; and a processing unit coupled with the display unit and the touch-sensitive surface unit. The processing unit is configured to: enable display of a messaging user interface of a messaging application on the display unit, the messaging user interface including a conversation transcript of a messaging session between a user of the electronic device and at least one other user, a first message-input area, and a launch icon for an interactive application; while displaying the messaging user interface, detect an input that activates the launch icon for the interactive application; in response to detecting the input that activates the launch icon for the interactive application, enable display of a user interface for the interactive application, the interactive application user interface including a second message-input area that is distinct from the first message-input area; while displaying the interactive application user interface, detect input of a first message in the second message-input area; in response to detecting the input of the first message in the second message-input area, enable display of the first message in the second message-input area; while displaying the first message in the second message-input area, detect an input that corresponds to a request to post the contents of the second message-input area to the messaging session; and, in response to detecting the input that corresponds to the request to post the contents of the second message-input area to the messaging session, transmit the first message to one or more electronic devices that correspond to the at least one other user included in the messaging session, wherein the one or more electronic devices display the first message in a conversation transcript corresponding to the messaging session.

Thus, electronic devices with displays and touch-sensitive surfaces are provided with improved methods and interfaces for posting messages, thereby increasing the effectiveness, efficiency, and user satisfaction with such devices. Such methods and interfaces may complement or replace conventional methods for posting messages.

There is a need for electronic devices with improved methods and interfaces for using an interactive application within a messaging application. Such methods and interfaces may complement or replace conventional methods for using an interactive application within a messaging application. Such methods and interfaces reduce the number, extent, and/or the nature of the inputs from a user and produce a more efficient human-machine interface.

In accordance with some embodiments, a method is performed at an electronic device having one or more processors, memory, a touch-sensitive surface, and a display. The method includes: displaying a messaging user interface of a messaging application on the display, the messaging user interface including a conversation transcript of a messaging session between a user of the electronic device and at least one other user, a message-input area, and an icon for an interactive application that is displayed within the conversation transcript; while displaying the messaging user interface, detecting an input that activates the icon for the interactive application; in response to detecting the input that activates the icon for the interactive application, displaying a user interface for the interactive application in a first state; while displaying the user interface for the interactive application, detecting a first user input within the user interface for the interactive application; and, in response to detecting the first user input within the user interface for the interactive application: changing display of the user interface for the interactive application from the first state to a second state, and sending information, to the one or more electronic devices that correspond to the at least one other user included in the messaging session, indicating that the first user input was made in the user interface for the interactive application, wherein the one or more electronic devices display an indicia of the first user input.

In accordance with some embodiments, an electronic device includes a display unit configured to display user interfaces; a touch-sensitive surface unit configured to detect contacts; and a processing unit coupled with the display unit and the touch-sensitive surface unit. The processing unit is configured to: enable display of a messaging user interface of a messaging application on the display unit, the messaging user interface including a conversation transcript of a messaging session between a user of the electronic device and at least one other user, a message-input area, and an icon for an interactive application that is displayed within the conversation transcript; while displaying the messaging user interface, detect an input that activates the icon for the interactive application; in response to detecting the input that activates the icon for the interactive application, enable display of a user interface for the interactive application in a first state; while displaying the user interface for the interactive application, detect a first user input within the user interface for the interactive application; and, in response to detecting the first user input within the user interface for the interactive application: change display of the user interface for the interactive application from the first state to a second state, and send information, to the one or more electronic devices that correspond to the at least one other user included in the messaging session, indicating that the first user input was made in the user interface for the interactive application, wherein the one or more electronic devices display an indicia of the first user input.

Thus, electronic devices with displays and touch-sensitive surfaces are provided with improved methods and interfaces for using an interactive application within a messaging application, thereby increasing the effectiveness, efficiency, and user satisfaction with such devices. Such methods and interfaces may complement or replace conventional methods for using an interactive application in a messaging application.

There is a need for electronic devices with improved methods and interfaces for using an interactive application in a messaging application. Such methods and interfaces may complement or replace conventional methods for using an interactive application in a messaging application. Such methods and interfaces reduce the number, extent, and/or the nature of the inputs from a user and produce a more efficient human-machine interface.

In accordance with some embodiments, a method is performed at an electronic device having one or more processors, memory, a touch-sensitive surface, and a display. The method includes: displaying a messaging user interface of a messaging application on the display, the messaging user interface including a conversation transcript of a messaging session between a user of the electronic device and at least one other user, and a message-input area; while displaying the messaging user interface, receiving instructions, from an electronic device that corresponds to another user included in the messaging session, to display an icon for an interactive application in the conversation transcript; in response to receiving the instructions, displaying the icon for the interactive application in the conversation transcript; while displaying the icon for the interactive application in the conversation transcript, detecting an input that activates the icon for the interactive application; and, in response to detecting the input that activates the icon for the interactive application displayed in the conversation transcript: in accordance with a determination that an interactive application that corresponds to the icon for the interactive application is stored in the memory of the electronic device, displaying a user interface for the interactive application, and in accordance with a determination that the interactive application that corresponds to the icon for the interactive application is not stored in the memory of the electronic device: downloading the interactive application, from a remote server, to the memory of the electronic device, and after downloading the interactive application from the remote server, displaying the user interface for the interactive application.

In accordance with some embodiments, an electronic device includes a display unit configured to display user interfaces; a touch-sensitive surface unit configured to detect contacts; and a processing unit coupled with the display unit and the touch-sensitive surface unit. The processing unit is configured to: enable display of a messaging user interface of a messaging application on the display unit, the messaging user interface including a conversation transcript of a messaging session between a user of the electronic device and at least one other user, and a message-input area; while displaying the messaging user interface, receive instructions, from an electronic device that corresponds to another user included in the messaging session, to display an icon for an interactive application in the conversation transcript; in response to receiving the instructions, enable display of the icon for the interactive application in the conversation transcript; while displaying the icon for the interactive application in the conversation transcript, detect an input that activates the icon for the interactive application; and, in response to detecting the input that activates the icon for the interactive application displayed in the conversation transcript: in accordance with a determination that an interactive application that corresponds to the icon for the interactive application is stored in the memory of the electronic device, enable display of a user interface for the interactive application, and in accordance with a determination that the interactive application that corresponds to the icon for the interactive application is not stored in the memory of the electronic device: download the interactive application, from a remote server, to the memory of the electronic device, and after downloading the interactive application from the remote server, enable display of the user interface for the interactive application.

Thus, electronic devices with displays and touch-sensitive surfaces are provided with improved methods and interfaces for using an interactive application in a messaging application, thereby increasing the effectiveness, efficiency, and user satisfaction with such devices. Such methods and interfaces may complement or replace conventional methods for using an interactive application in a messaging application.

There is a need for electronic devices with improved methods and interfaces for using an interactive application in a messaging application. Such methods and interfaces may complement or replace conventional methods for using an interactive application in a messaging application. Such methods and interfaces reduce the number, extent, and/or the nature of the inputs from a user and produce a more efficient human-machine interface.

In accordance with some embodiments, a method is performed at an electronic device with a display and a touch-sensitive surface. The method includes, displaying a messaging user interface of a messaging application on the display, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances; and; detecting an input that activates a first input affordance in the input area for the interactive application.

In accordance with some embodiments, an electronic device includes a display unit and a touch-sensitive surface unit, and a processing unit coupled with the display unit and the touch-sensitive surface unit. The processing unit is configured to: enable display of a messaging user interface of a messaging application on the display unit, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances; and; detect an input that activates a first input affordance in the input area for the interactive application.

Thus, electronic devices with displays and touch-sensitive surfaces are provided with improved methods and interfaces for using an interactive application in a messaging application, thereby increasing the effectiveness, efficiency, and user satisfaction with such devices. Such methods and interfaces may complement or replace conventional methods for using an interactive application in a messaging application.

There is a need for electronic devices with improved methods and interfaces for using an interactive application in a messaging application. Such methods and interfaces may complement or replace conventional methods for using an interactive application in a messaging application. Such methods and interfaces reduce the number, extent, and/or the nature of the inputs from a user and produce a more efficient human-machine interface.

In accordance with some embodiments, a method is performed at an electronic device with a display and a touch-sensitive surface. The method includes, displaying a messaging user interface of a messaging application on the display, the messaging user interface including: a conversation transcript of a messaging session between a user of the electronic device and at least one other user, a first interactive application object displayed within the conversation transcript that corresponds to a first interactive application, and a message input area. The method further includes detecting a first input while a focus selector is at a location on the touch-sensitive surface that corresponds to the first interactive application object displayed within the conversation transcript; in response to detecting the first input, displaying an input area for the first interactive application that is distinct from the message input area, the input area for the first interactive application including one or more input affordances; while displaying an input area for the first interactive application, detecting one or more inputs on the one or more input affordances; after detecting the one or more inputs on the one or more input affordances: updating the first interactive application; sending information to one or more electronic devices that correspond to the at least one other user included in the messaging session that causes updating of a corresponding user interface for the first interactive application displayed within a corresponding conversation transcript of the messaging session; and ceasing display of the input area for the first interactive application.

In accordance with some embodiments, an electronic device includes a display unit and a touch-sensitive surface unit, and a processing unit coupled with the display unit and the touch-sensitive surface unit. The processing unit is configured to: enable display of a messaging user interface of a messaging application on the display unit, the messaging user interface including: a conversation transcript of a messaging session between a user of the electronic device and at least one other user, a first interactive application object displayed within the conversation transcript that corresponds to a first interactive application, and a message input area. The processing unit is further configured to: detect a first input while a focus selector is at a location on the touch-sensitive surface unit that corresponds to the first interactive application object displayed within the conversation transcript; in response to detecting the first input, enable display of an input area for the first interactive application that is distinct from the message input area, the input area for the first interactive application including one or more input affordances; while displaying an input area for the first interactive application, detect one or more inputs on the one or more input affordances; after detecting the one or more inputs on the one or more input affordances: update the first interactive application; send information to one or more electronic devices that correspond to the at least one other user included in the messaging session that causes updating of a corresponding user interface for the first interactive application displayed within a corresponding conversation transcript of the messaging session; and cease display of the input area for the first interactive application.

Thus, electronic devices with displays and touch-sensitive surfaces are provided with improved methods and interfaces for using an interactive application in a messaging application, thereby increasing the effectiveness, efficiency, and user satisfaction with such devices. Such methods and interfaces may complement or replace conventional methods for using an interactive application in a messaging application.

There is a need for electronic devices with improved methods and interfaces for enabling use of an interactive application in a messaging application. Such methods and interfaces may complement or replace conventional methods for enabling use of an interactive application in a messaging application. Such methods and interfaces reduce the number, extent, and/or the nature of the inputs from a user and produce a more efficient human-machine interface.

In accordance with some embodiments, a method is performed at an electronic device with a display and a touch-sensitive surface, where a messaging application and a plurality of other applications are stored in the memory, and a respective application in the plurality of other applications has a normal mode for normal operation on the electronic device and an embedded mode for operation within the messaging application on the electronic device. The method includes: displaying a plurality of toggle affordances, where a respective toggle affordance in the plurality of toggle affordances has a corresponding application in the plurality of other applications stored in the memory; the respective toggle affordance has a first state that enables display of a respective launch icon, within the messaging application, for operation of the corresponding application in the embedded mode within the messaging application; the respective toggle affordance has a second state that prevents display of the respective launch icon, within the messaging application, to prevent operation of the corresponding application in the embedded mode within the messaging application; the plurality of toggle affordances include a first toggle affordance for a first application that is displayed in the first state and a second toggle affordance for a second application that is displayed in the second state. While displaying the plurality of toggle affordances, the method further includes: detecting a first user input at a first location that corresponds to the first toggle affordance; and, in response to detecting the first user input at the first location that corresponds to the first toggle affordance: changing the first toggle affordance from the first state to the second state, and preventing display of a corresponding launch icon for the first application in the messaging application.

In accordance with some embodiments, an electronic device includes a display unit and a touch-sensitive surface unit, and a processing unit coupled with the display unit and the touch-sensitive surface unit, where a messaging application and a plurality of other applications are stored in memory of the electronic device, and a respective application in the plurality of other applications has a normal mode for normal operation on the electronic device and an embedded mode for operation within the messaging application on the electronic device. The processing unit is configured to: enable display of a plurality of toggle affordances, where a respective toggle affordance in the plurality of toggle affordances has a corresponding application in the plurality of other applications stored in the memory, the respective toggle affordance has a first state that enables display of a respective launch icon, within the messaging application, for operation of the corresponding application in the embedded mode within the messaging application; the respective toggle affordance has a second state that prevents display of the respective launch icon, within the messaging application, to prevent operation of the corresponding application in the embedded mode within the messaging application; the plurality of toggle affordances include a first toggle affordance for a first application that is displayed in the first state and a second toggle affordance for a second application that is displayed in the second state. The processing unit is further configured to: while displaying the plurality of toggle affordances, detect a first user input at a first location that corresponds to the first toggle affordance; and, in response to detecting the first user input at the first location that corresponds to the first toggle affordance: change the first toggle affordance from the first state to the second state, and prevent display of a corresponding launch icon for the first application in the messaging application.

Thus, electronic devices with displays and touch-sensitive surfaces are provided with improved methods and interfaces for enabling use of an interactive application in a messaging application, thereby increasing the effectiveness, efficiency, and user satisfaction with such devices. Such methods and interfaces may complement or replace conventional methods for enabling use of an interactive application in a messaging application.

There is a need for electronic devices with improved methods and interfaces for navigating within a messaging application. Such methods and interfaces may complement or replace conventional methods for navigating within a messaging application. Such methods and interfaces reduce the number, extent, and/or the nature of the inputs from a user and produce a more efficient human-machine interface.

In accordance with some embodiments, a method is performed at an electronic device with a display, a touch-sensitive surface, and a digital camera. The method includes: displaying a messaging user interface on the display, the messaging user interface including a conversation transcript of a messaging session between a user of the electronic device and at least one other user, a message-input area, a digital image affordance, a digital touch affordance, and an application affordance; while displaying the messaging user interface, detecting a first input on the touch sensitive surface; in response to detecting the first input: in accordance with a determination that the first input is made while a focus selector is at a location in the messaging user interface that corresponds to the digital image affordance, displaying a plurality of digital images within the messaging user interface; in accordance with a determination that the first input is made while a focus selector is at a location in the messaging user interface that corresponds to the digital canvas affordance, displaying a digital drawing canvas within the messaging user interface; and in accordance with a determination that the first input is made while a focus selector is at a location in the messaging user interface that corresponds to the application affordance, displaying one or more launch icons for an application within the messaging user interface.

In accordance with some embodiments, an electronic device includes a display unit, a touch-sensitive surface unit, a digital camera unit, and a processing unit coupled with the display unit, the touch-sensitive surface unit, and the digital camera unit. The processing unit is configured to: enable display of a messaging user interface on the display unit, the messaging user interface including a conversation transcript of a messaging session between a user of the electronic device and at least one other user, a message-input area, a digital image affordance, a digital touch affordance, and an application affordance. The processing unit is further configured to: while displaying the messaging user interface, detect a first input on the touch sensitive surface; in response to detecting the first input: in accordance with a determination that the first input is made while a focus selector is at a location in the messaging user interface that corresponds to the digital image affordance, enable display of a plurality of digital images within the messaging user interface; in accordance with a determination that the first input is made while a focus selector is at a location in the messaging user interface that corresponds to the digital canvas affordance, enable display of a digital drawing canvas within the messaging user interface; and in accordance with a determination that the first input is made while a focus selector is at a location in the messaging user interface that corresponds to the application affordance, enable display of one or more launch icons for an application within the messaging user interface.

Thus, electronic devices with displays and touch-sensitive surfaces are provided with improved methods and interfaces for navigating within a messaging application, thereby increasing the effectiveness, efficiency, and user satisfaction with such devices. Such methods and interfaces may complement or replace conventional methods for navigating within a messaging application.

There is a need for electronic devices with improved methods and interfaces for placing an electronic sticker in a conversation transcript. Such methods and interfaces may complement or replace conventional methods for placing an electronic sticker in a conversation transcript. Such methods and interfaces reduce the number, extent, and/or the nature of the inputs from a user and produce a more efficient human-machine interface.

In accordance with some embodiments, a method is performed at an electronic device with at an electronic device having one or more processors, memory, a touch-sensitive surface, and a display. The device displays a messaging user interface of a messaging application on the display, the messaging user interface including a conversation transcript of a messaging session between a user of the electronic device and at least one other user, a plurality of electronic stickers, and a message-input area. While displaying the messaging user interface, the device detects a first drag gesture that starts while a focus selector is at a first location in the messaging user interface that corresponds to a first electronic sticker in the plurality of electronic stickers, the first drag gesture moving the focus selector in a first direction. The device moves the first electronic sticker in the first direction in accordance with the movement of the first drag gesture. The device detects termination of the first drag gesture while the focus selector is at a second location in the messaging user interface. In response to detecting termination of the first drag gesture: in accordance with a determination that the second location is within the conversation transcript, the device places the electronic sticker in the conversation transcript at a location based on the second location. In accordance with a determination that the second location in not within the conversation transcript, the device ceases to display the electronic sticker at the second location on the display.

In accordance with some embodiments, an electronic device includes a display unit configured to display user interfaces; a touch-sensitive surface unit configured to detect contacts; and a processing unit coupled with the display unit and the touch-sensitive surface unit. The processing unit is configured to: enable display of a messaging user interface of a messaging application on the display unit, the messaging user interface including a conversation transcript of a messaging session between a user of the electronic device and at least one other user, a plurality of electronic stickers, and a message-input area. While displaying the messaging user interface, the processing unit is configured to detect a first drag gesture that starts while a focus selector is at a first location in the messaging user interface that corresponds to a first electronic sticker in the plurality of electronic stickers, the first drag gesture move the focus selector in a first direction. The processing unit is configured to move the first electronic sticker in the first direction in accordance with the movement of the first drag gesture. The processing unit is configured to detect termination of the first drag gesture while the focus selector is at a second location in the messaging user interface. In response to detecting termination of the first drag gesture: in accordance with a determination that the second location is within the conversation transcript, the processing unit is configured to place the electronic sticker in the conversation transcript at a location based on the second location, and in accordance with a determination that the second location in not within the conversation transcript, the processing unit is configured to cease to display the electronic sticker at the second location on the display unit.

Thus, electronic devices with displays and touch-sensitive surfaces are provided with improved methods and interfaces for placing an electronic sticker in a conversation transcript, thereby increasing the effectiveness, efficiency, and user satisfaction with such devices. Such methods and interfaces may complement or replace conventional methods for placing an electronic sticker in a conversation transcript.

There is a need for electronic devices with improved methods and interfaces for changing characteristics of an electronic sticker in a conversation transcript for a messaging user interface. Such methods and interfaces may complement or replace conventional methods for changing characteristics of an electronic sticker in a conversation transcript for a messaging user interface. Such methods and interfaces reduce the number, extent, and/or the nature of the inputs from a user and produce a more efficient human-machine interface.

In accordance with some embodiments, a method is performed at an electronic device with one or more processors, memory, a touch-sensitive surface, and a display. The device displays a messaging user interface of a messaging application on the display, the messaging user interface including a conversation transcript of a messaging session between a user of the electronic device and at least one other user, a plurality of electronic stickers, and a message-input area. While displaying the messaging user interface, the device detects a first user input while a focus selector is at a first location in the messaging user interface that corresponds to a first electronic sticker in the plurality of electronic stickers. In response to detecting the first user input, the device places and displays the first electronic sticker in the conversation transcript. While the first electronic sticker is displayed in the conversation transcript: the device detects a second user input while a focus selector is at a second location in the messaging user interface that corresponds to the first electronic sticker in the conversation transcript. In response to detecting the second user input, the device changes the position, size, and/or rotation of the first electronic sticker in the conversation transcript.

In accordance with some embodiments, there is an electronic device with a display unit configured to display user interfaces; a touch-sensitive surface unit configured to detect contacts; and a processing unit coupled with the display unit and the touch-sensitive surface unit. The processing unit enables display of a messaging user interface of a messaging application on the display unit, the messaging user interface including a conversation transcript of a messaging session between a user of the electronic device and at least one other user, a plurality of electronic stickers, and a message-input area. While displaying the messaging user interface, the processing unit detects a first user input while a focus selector is at a first location in the messaging user interface that corresponds to a first electronic sticker in the plurality of electronic stickers. In response to detecting the first user input, the processing unit places and enables display of the first electronic sticker in the conversation transcript. While the first electronic sticker is displayed in the conversation transcript, the processing unit detects a second user input while a focus selector is at a second location in the messaging user interface that corresponds to the first electronic sticker in the conversation transcript. In response to detecting the second user input, the device changes the position, size, and/or rotation of the first electronic sticker in the conversation transcript.

Thus, electronic devices with displays and touch-sensitive surfaces are provided with improved methods and interfaces for changing characteristics of an electronic sticker in a conversation transcript for a messaging user interface, thereby increasing the effectiveness, efficiency, and user satisfaction with such devices. Such methods and interfaces may complement or replace conventional methods for changing characteristics of an electronic sticker in a conversation transcript for a messaging user interface.

There is a need for electronic devices with improved methods and interfaces for initiating payments through a messaging application. Such methods and interfaces may complement or replace conventional methods for initiating payments through a messaging application. Such methods and interfaces reduce the number, extent, and/or the nature of the inputs from a user and produce a more efficient human-machine interface.

In accordance with some embodiments, a method is performed at an electronic device with one or more processors, memory, a touch-sensitive surface, and a display. The device displays a messaging user interface of a messaging application on the display, the messaging user interface including a conversation transcript of a messaging session between a user of the electronic device and at least one other user and a message-input area, wherein each of the other users included in the messaging session has a corresponding avatar. While displaying the messaging user interface, the device detects a first user input while a focus selector is at a first location in the messaging user interface that corresponds to an avatar of a first other user included in the messaging session. In response to detecting the first user input, the device displays a menu that contains activatable menu items associated with the first other user overlaid on the messaging user interface, the displayed menu including an activatable menu item for initiating a payment action with the first other user. While displaying the menu that contains activatable menu items associated with the first other user, the device detects a second user input while a focus selector is at a second location in the messaging user interface that corresponds to the activatable menu item for initiating a payment action with the first other user. In response to detecting the second user input, the device displays a user interface configured to initiate sending of a payment to, and/or requesting a payment from, the first other user.

In some embodiments, there is an electronic device, with a display unit configured to display user interfaces; a touch-sensitive surface unit configured to detect contacts; and a processing unit coupled with the display unit and the touch-sensitive surface unit. The processing unit enables display of a messaging user interface of a messaging application on the display unit, the messaging user interface including a conversation transcript of a messaging session between a user of the electronic device and at least one other user and a message-input area, wherein each of the other users included in the messaging session has a corresponding avatar. While displaying the messaging user interface, the processing unit detects a first user input while a focus selector is at a first location in the messaging user interface that corresponds to an avatar of a first other user included in the messaging session. In response to detecting the first user input, the processing unit enables display of a menu that contains activatable menu items associated with the first other user overlaid on the messaging user interface, the displayed menu including an activatable menu item for initiating a payment action with the first other user. While displaying the menu that contains activatable menu items associated with the first other user, the processing unit detects a second user input while a focus selector is at a second location in the messaging user interface that corresponds to the activatable menu item for initiating a payment action with the first other user. In response to detecting the second user input, the processing unit enables display of a user interface configured to initiate sending of a payment to, and/or requesting a payment from, the first other user.

Thus, electronic devices with displays and touch-sensitive surfaces are provided with improved methods and interfaces for initiating payments through a messaging application, thereby increasing the effectiveness, efficiency, and user satisfaction with such devices. Such methods and interfaces may complement or replace conventional methods for initiating payments through messaging applications.

There is a need for electronic devices with improved methods and interfaces for selectively activating menus in a messaging session. Such methods and interfaces may complement or replace conventional methods for selectively activating menus in a messaging session. Such methods and interfaces reduce the number, extent, and/or the nature of the inputs from a user and produce a more efficient human-machine interface.

In accordance with some embodiments, a method is performed at an electronic device with one or more processors, memory, a touch-sensitive surface, one or more sensors to detect intensities of contacts with the touch-sensitive surface, and a display. The device displays a messaging user interface of a messaging application on the display, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the device detects an input by a first contact on the touch-sensitive surface while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface meet a respective intensity threshold in order for the menu-activation criteria to be met, the device displays a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the device displays the plurality of avatars in an array.

In accordance with some embodiments, there is an electronic device, including a display unit configured to display user interfaces; a touch-sensitive surface unit configured to detect contacts; and a processing unit coupled with the display unit and the touch-sensitive surface unit. The processing unit enables display of a messaging user interface of a messaging application on the display unit, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the processing unit detects an input by a first contact on the touch-sensitive surface unit while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface unit meet a respective intensity threshold in order for the menu-activation criteria to be met, the processing unit enables display of a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the processing unit enables display of the plurality of avatars in an array.

Thus, electronic devices with displays and touch-sensitive surfaces are provided with improved methods and interfaces for selectively activating menus in a messaging session, thereby increasing the effectiveness, efficiency, and user satisfaction with such devices. Such methods and interfaces may complement or replace conventional methods for selectively activating menus in a messaging session.

There is a need for electronic devices with improved methods and interfaces for providing a selectable link to access additional content for a word or phrase in a message. Such methods and interfaces may complement or replace conventional methods for providing a selectable link to access additional content for a word or phrase in a message. Such methods and interfaces reduce the number, extent, and/or the nature of the inputs from a user and produce a more efficient human-machine interface.

In accordance with some embodiments, a method is performed at an electronic device with one or more processors, memory, a touch-sensitive surface, and a display. The device displays a messaging user interface of a messaging application on the display, the messaging user interface including a conversation transcript of a messaging session between a user of the electronic device and at least one other user, and a message-input area. While displaying the messaging user interface, the device receives a first message within the messaging session from an electronic device that corresponds to another user included in the messaging session. In response to receiving the first message, the device displays the first message within a first message region in the conversation transcript on the display. The device detects, in the first message, a word or phrase associated with additional content available on the Internet; and in response to detecting the word or phrase associated with additional content available on the internet, the device displays, proximate to the first message region, a selectable indication that additional content associated with the word or phrase is available.

In some embodiments, there is an electronic device, including a display unit configured to display user interfaces; a touch-sensitive surface unit configured to detect contacts; and a processing unit coupled with the display unit and the touch-sensitive surface unit. The processing unit enables display of a messaging user interface of a messaging application on the display unit, the messaging user interface including a conversation transcript of a messaging session between a user of the electronic device and at least one other user, and a message-input area. While displaying the messaging user interface, the processing unit receives a first message within the messaging session from an electronic device that corresponds to another user included in the messaging session. In response to receiving the first message: the processing unit enables display of the first message within a first message region in the conversation transcript on the display unit. The processing unit detects, in the first message, a word or phrase associated with additional content available on the Internet. In response to detecting the word or phrase associated with additional content available on the internet, the processing unit enables display of, proximate to the first message region, a selectable indication that additional content associated with the word or phrase is available.

Thus, electronic devices with displays and touch-sensitive surfaces are provided with improved methods and interfaces for providing a selectable link to access additional content for a word or phrase in a message, thereby increasing the effectiveness, efficiency, and user satisfaction with such devices. Such methods and interfaces may complement or replace conventional methods for providing a selectable link to access additional content on the word or phrase in a message.

In accordance with some embodiments, an electronic device includes a display, a touch-sensitive surface, optionally one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensities of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensities of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensities of contacts with the touch-sensitive surface, includes means for performing or causing performance of the operations of any of the methods described herein.

Thus, electronic devices with displays, touch-sensitive surfaces and optionally one or more sensors to detect intensities of contacts with the touch-sensitive surface are provided with faster, more efficient methods and interfaces for messaging, thereby increasing the effectiveness, efficiency, and user satisfaction with such devices. Such methods and interfaces may complement or replace conventional methods for messaging.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5U-5BF illustrate exemplary user interfaces for applying an impact effect option to a message input or message region.

FIGS. 5BG-5CA illustrate exemplary user interfaces for interacting with concealed messages.

FIGS. 5CB-5CW illustrate exemplary user interfaces for triggering enhanced message content and applying an effect to a messaging user interface when a message includes an enhanced message content trigger.

FIGS. 5CX-5DC illustrate exemplary user interfaces for detecting and responding to combinable content in separate messages.

FIGS. 5DD-5DI illustrate exemplary user interfaces for selecting a message region type or shape.

FIGS. 5DJ-5DQ illustrate exemplary user interfaces for displaying and selecting automatically suggested emoji while composing a message.

FIGS. 6A-6E are flow diagrams of a process for applying an acknowledgement to a message region in a conversation transcript, in accordance with some embodiments.

FIGS. 8A-8C are flow diagrams of a process for editing a previously sent message in a messaging session, in accordance with some embodiments.

FIGS. 10A-10B are flow diagrams of a process for editing a previously sent message in a messaging session, in accordance with some embodiments.

FIGS. 12A-12E are flow diagrams of a process for applying an impact effect option to a message input, in accordance with some embodiments.

FIGS. 14A-14B are flow diagrams of a process for interacting with concealed messages, in accordance with some embodiments.

FIGS. 16A-16C are flow diagrams of a process for applying an effect to a messaging user interface when a message includes an enhanced message content trigger, in accordance with some embodiments.

FIG. 18A-18C are flow diagrams of a process for detecting combinable content in a messaging user interface and displaying content corresponding to a predetermined combination when the combinable content is detected, in accordance with some embodiments.

FIGS. 21A-21C are flow diagrams illustrating a method of presenting synchronized media content in a messaging application, in accordance with some embodiments.

FIGS. 24A-24C are flow diagrams illustrating a method of providing and presenting user-specific handwritten inputs in a messaging application, in accordance with some embodiments.

FIGS. 26A-26B are flow diagrams illustrating a method of providing and presenting user-specific handwritten inputs in a messaging application, in accordance with some embodiments.

FIGS. 28C-28D contains Tables 1, and 4-8 which include two interdependent rendering pipelines that present the lifecycle of the appearance of ink on screen (Table 1), an illustration of Specular Wetness techniques (Table 4), overlapping line segments provided in conjunction with particular handwritten inputs (Table 5), an equation showing consistent alpha coverage along edges (Table 6), an equation used to help with the blending techniques (Table 7) and an example of a final composite (Table 8), in accordance with some embodiments.

FIGS. 31A-31B are flow diagrams illustrating a method of quickly locating different types of content in a messaging application, in accordance with some embodiments.

FIGS. 33A-33B are flow diagrams illustrating a method of quickly locating different types of content in a messaging application, in accordance with some embodiments.

FIGS. 42A-42D are flow diagrams illustrating a method of capturing and posting digital images within a messaging application in accordance with some embodiments.

FIGS. 44A-44D are flow diagrams illustrating a method of searching for and sharing multimedia content within a messaging application in accordance with some embodiments.

FIGS. 46A-46C are flow diagrams illustrating a method 4600 of adding an interactive application to a messaging application in accordance with some embodiments.

FIGS. 48A-48D are flow diagrams illustrating a method of posting messages to a messaging session from a user interface other than the user interface for the messaging application in accordance with some embodiments.

FIGS. 50A-50C are flow diagrams illustrating a method of using an interactive application in a messaging application in accordance with some embodiments.

FIGS. 52A-52C are flow diagrams illustrating a method of using an interactive application in a messaging application in accordance with some embodiments.

FIGS. 54A-54C are flow diagrams illustrating a method of using an interactive application in a messaging application in accordance with some embodiments.

FIGS. 56A-56B are flow diagrams illustrating a method of using an interactive application in a messaging application in accordance with some embodiments.

FIG. 58 is a flow diagram illustrating a method of enabling use of an interactive application in a messaging application in accordance with some embodiments.

Figure 60B:
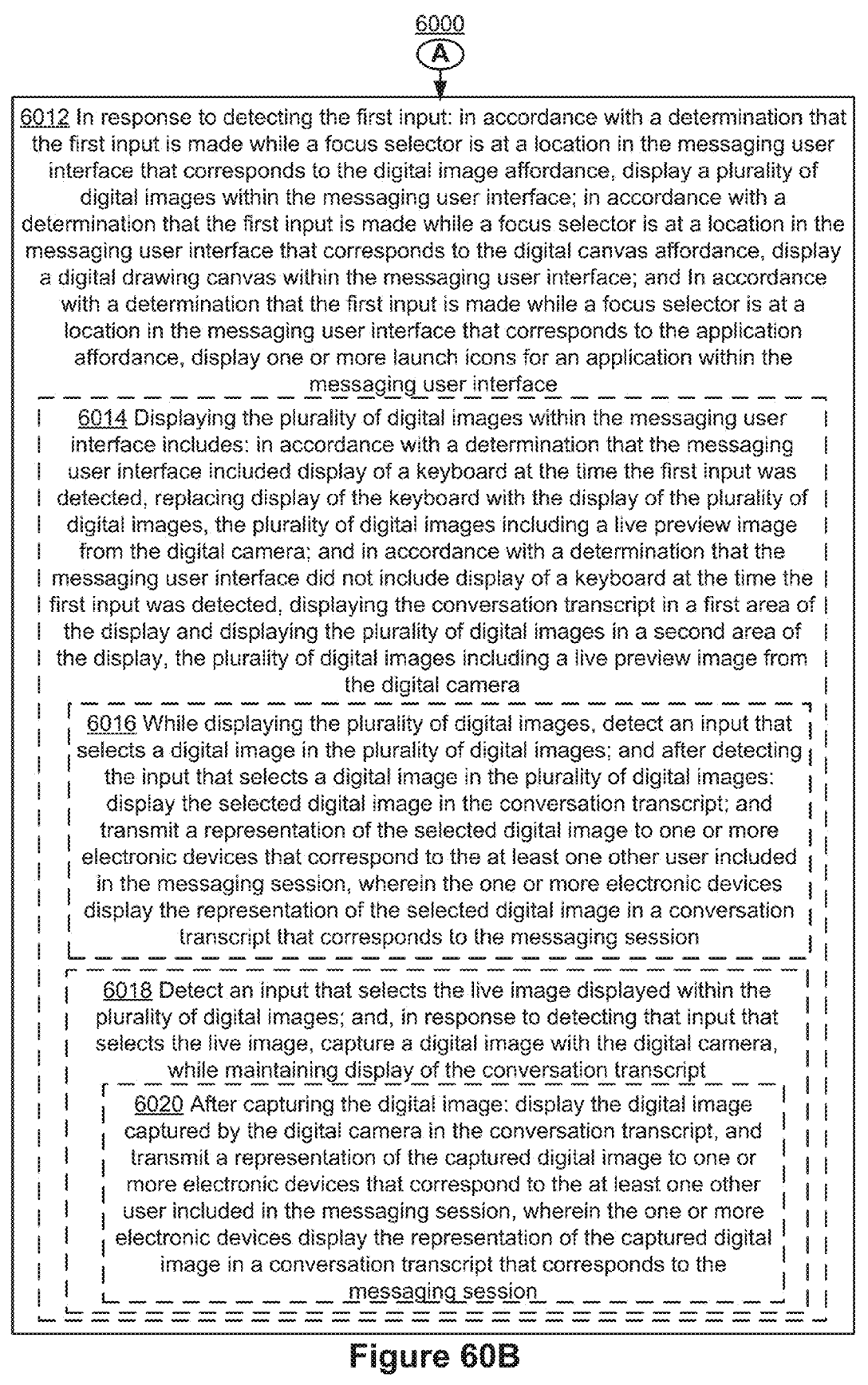
Figure 60C:
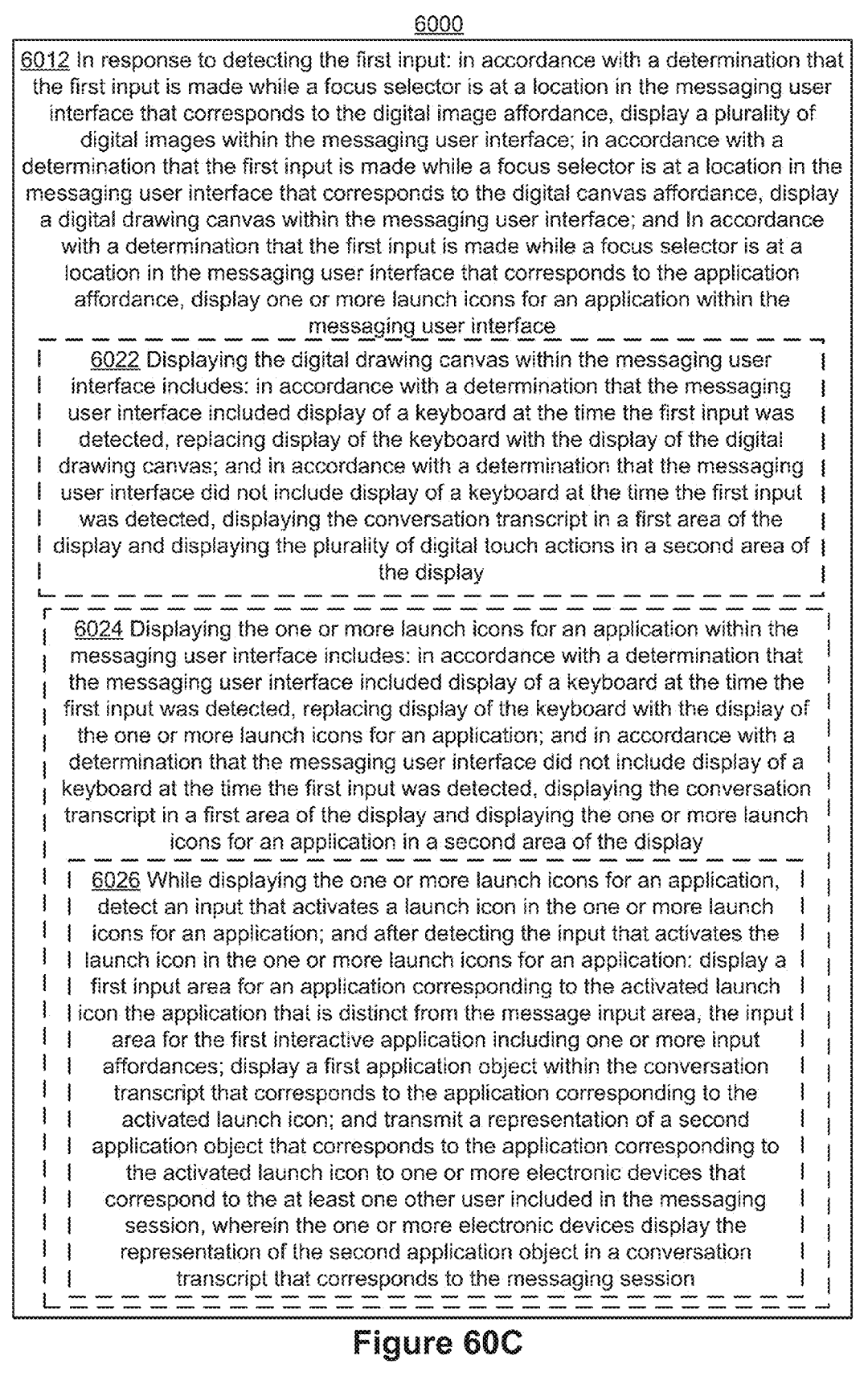

FIGS. 60A-60D are flow diagrams illustrating a method of navigating within a messaging application having associated applications in accordance with some embodiments.

FIGS. 62A-62C are flow diagrams illustrating a method of adding a sticker to a messaging transcript in accordance with some embodiments.

FIGS. 64A-64C are flow diagrams illustrating a method 6400 of modifying display of electronic stickers in a messaging application in accordance with some embodiments.

FIG. 66 is a flow diagram illustrating a method of making payments from a messaging application in accordance with some embodiments.

FIGS. 68A-68B are flow diagrams illustrating a method 6800 of interacting with a single user included in a group messaging session in accordance with some embodiments.

FIGS. 70A-70B are flow diagrams illustrating a method 7000 of displaying additional information in a messaging session in accordance with some embodiments.

DESCRIPTION OF EMBODIMENTS

Figure 1A:
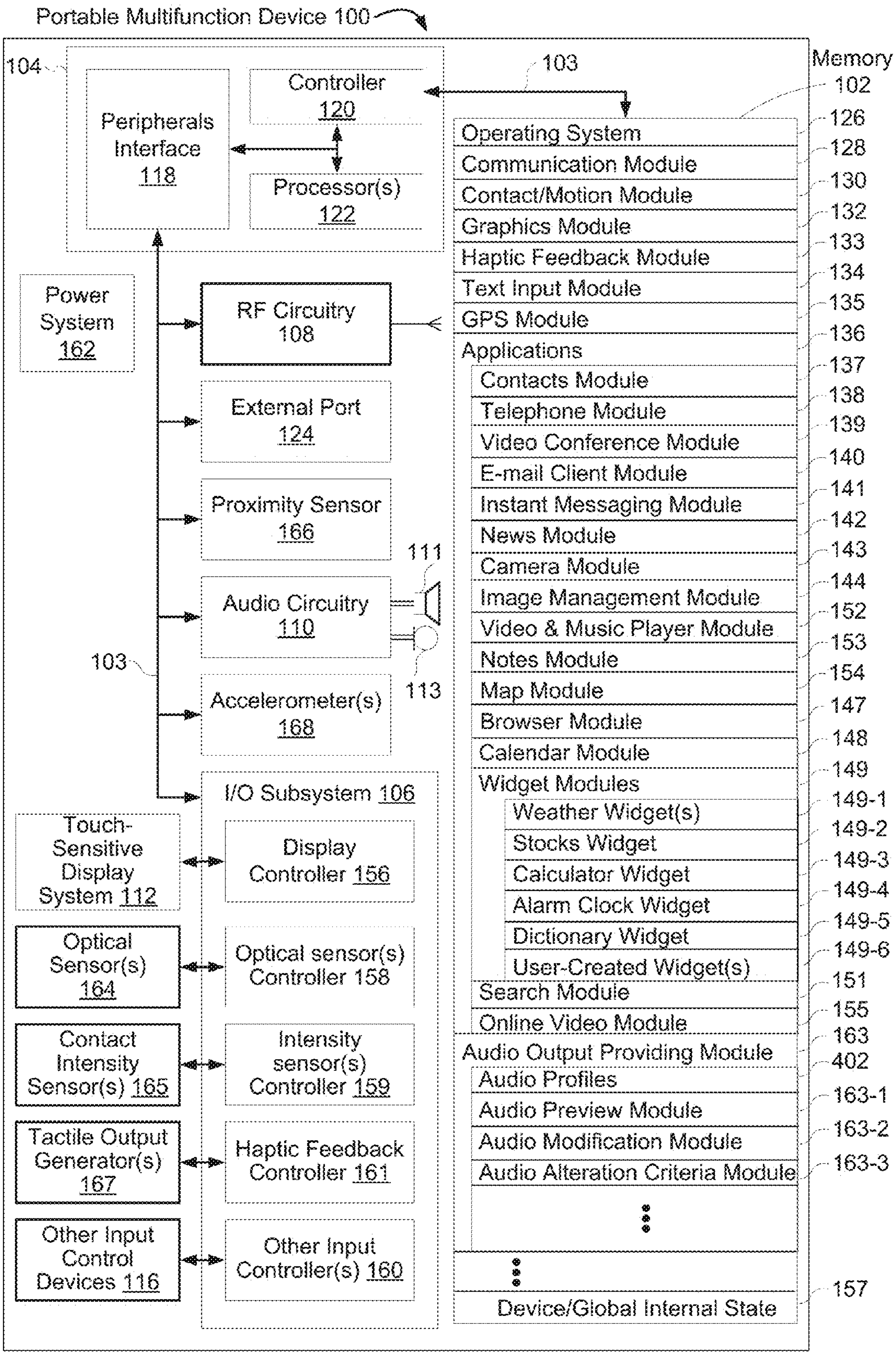
FIG. 1A is a block diagram illustrating a portable multifunction device with a touch-sensitive display in accordance with some embodiments.

The methods, devices, and GUIs described herein improve messaging in multiple ways. For example, they make it easier to: acknowledge messages; edit previously sent messages; express what a user is trying to communicate; display private messages; synchronize viewing of content between users; incorporate handwritten inputs; quickly locate content in a message transcript; integrate a camera; integrate search and sharing; integrate interactive applications; integrate stickers; make payments; interact with avatars; and make suggestions.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

In addition to a messaging application, the device typically supports a variety of other applications, such as one or more of the following: a note taking application, a drawing application, a presentation application, a word processing application, a website creation application, a disk authoring application, a spreadsheet application, a gaming application, a telephone application, a video conferencing application, an e-mail application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
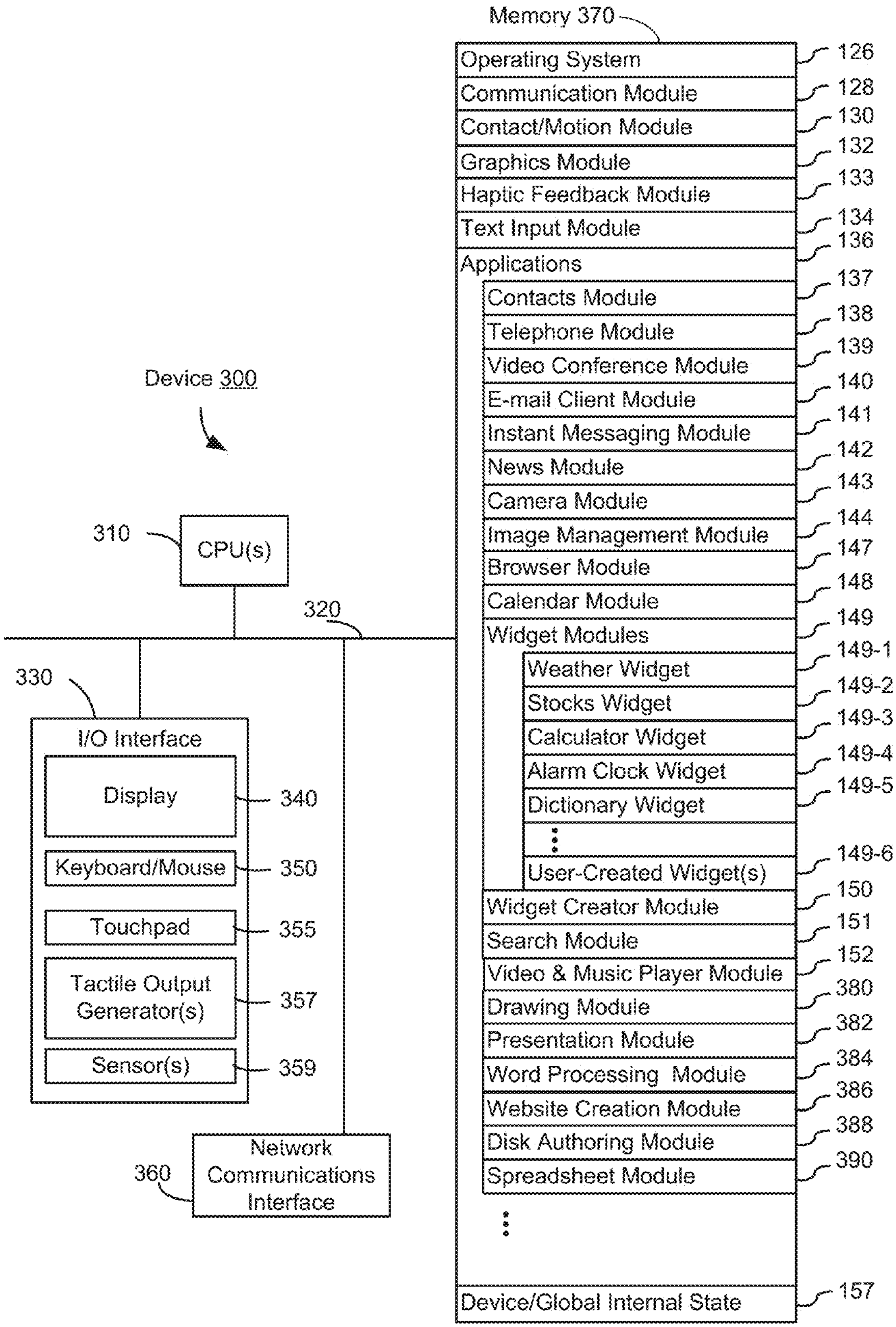
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, to view received instant messages, and to perform the functions of the messaging application described in greater detail below. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
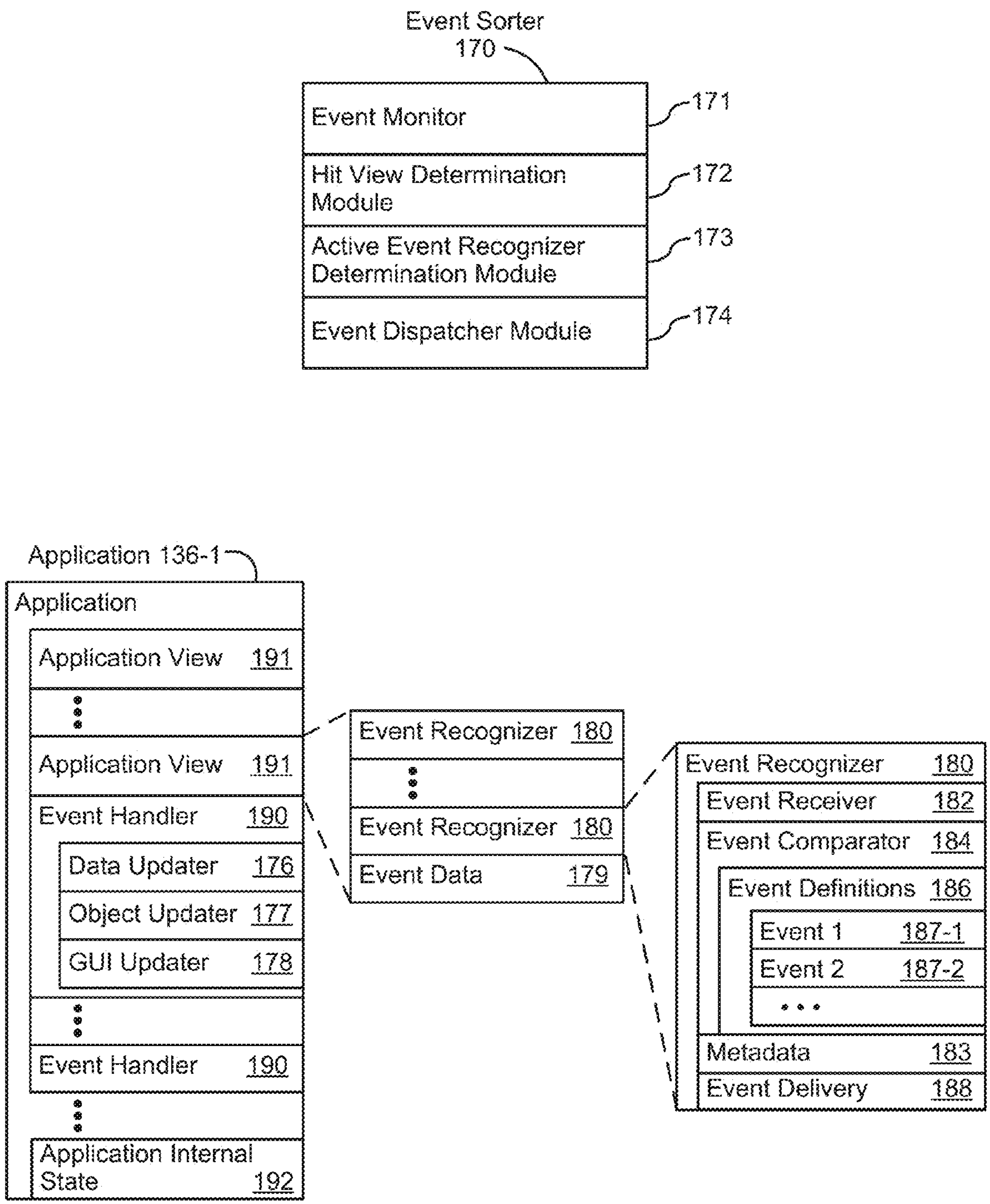
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
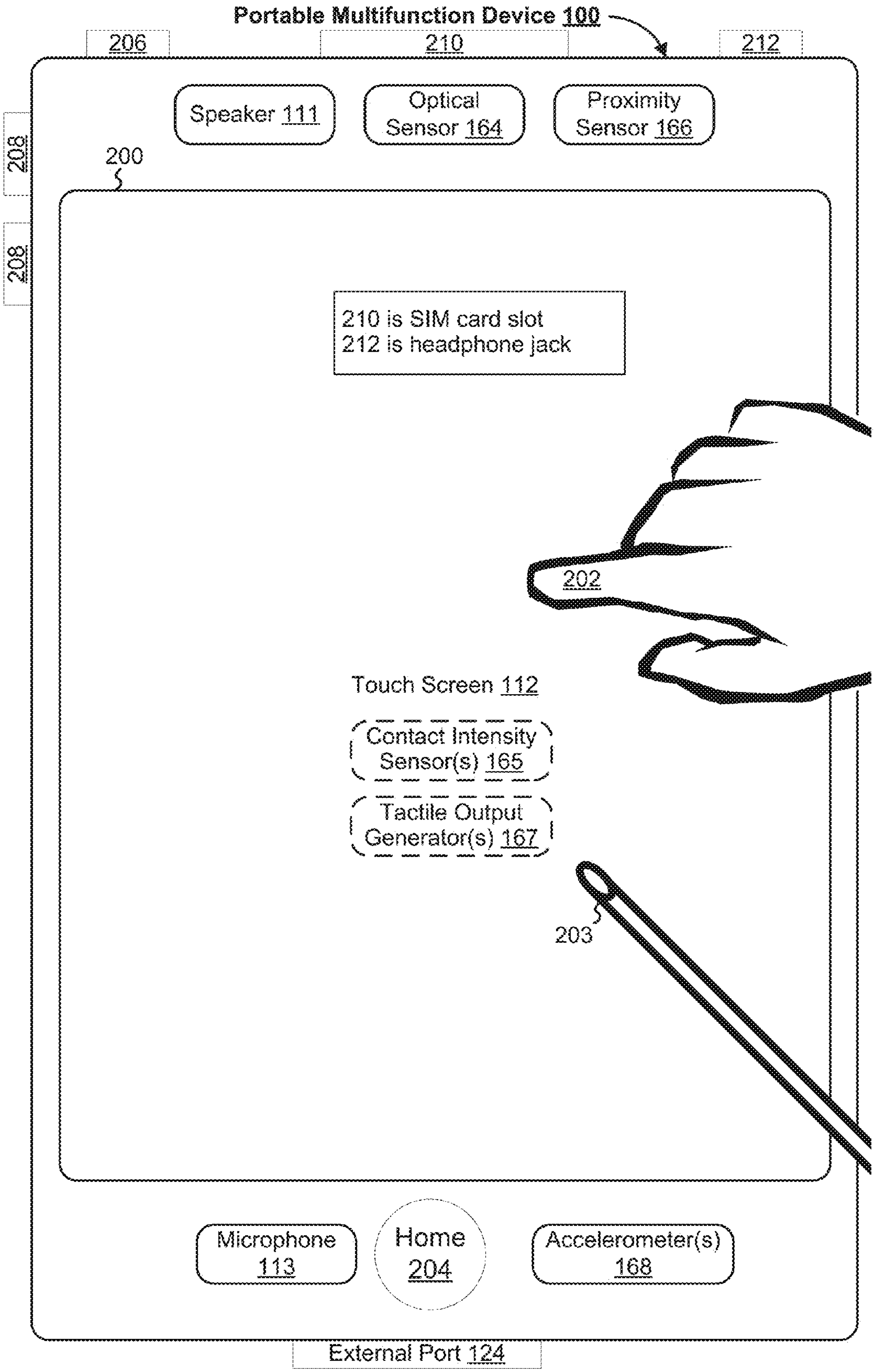
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
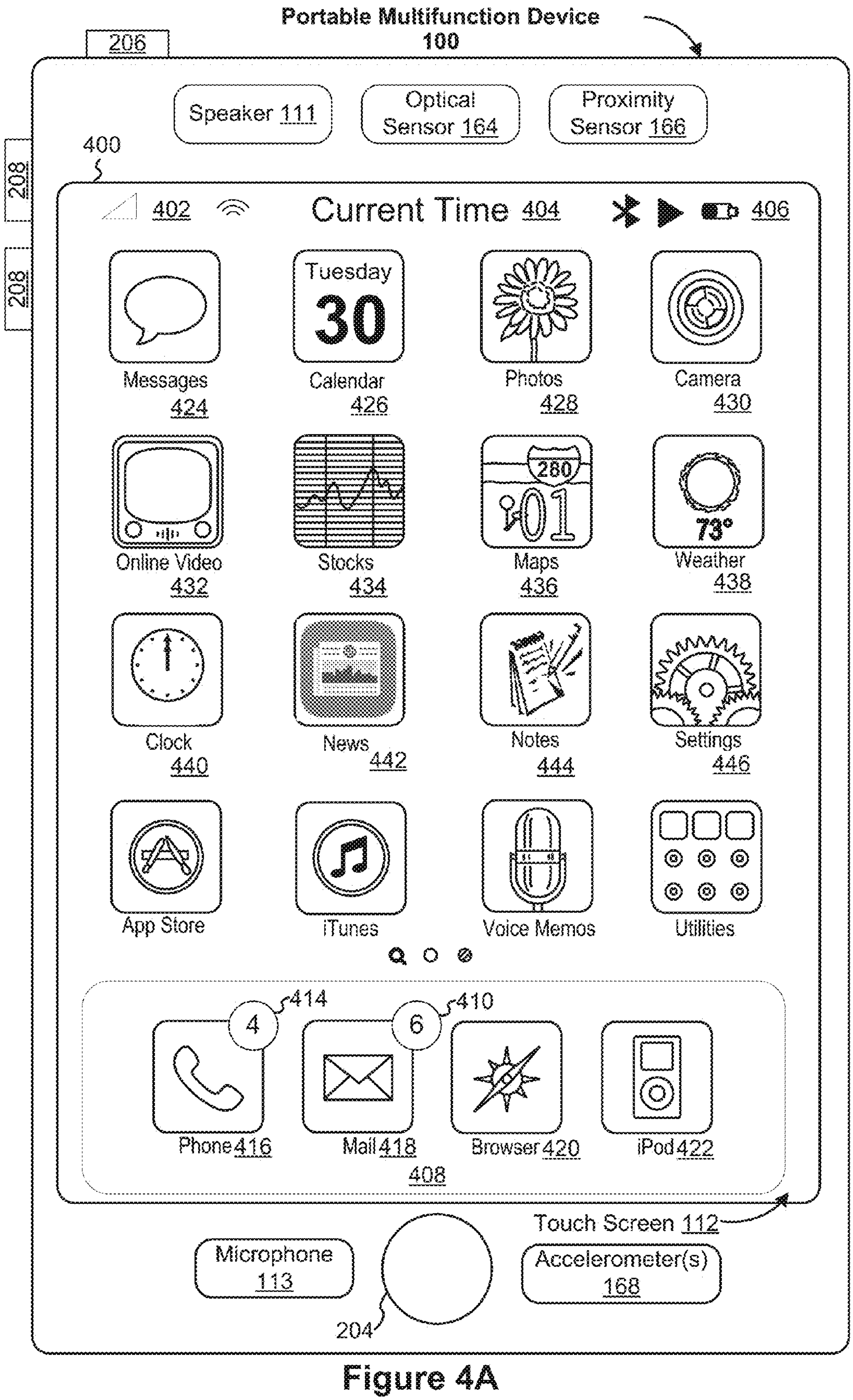
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
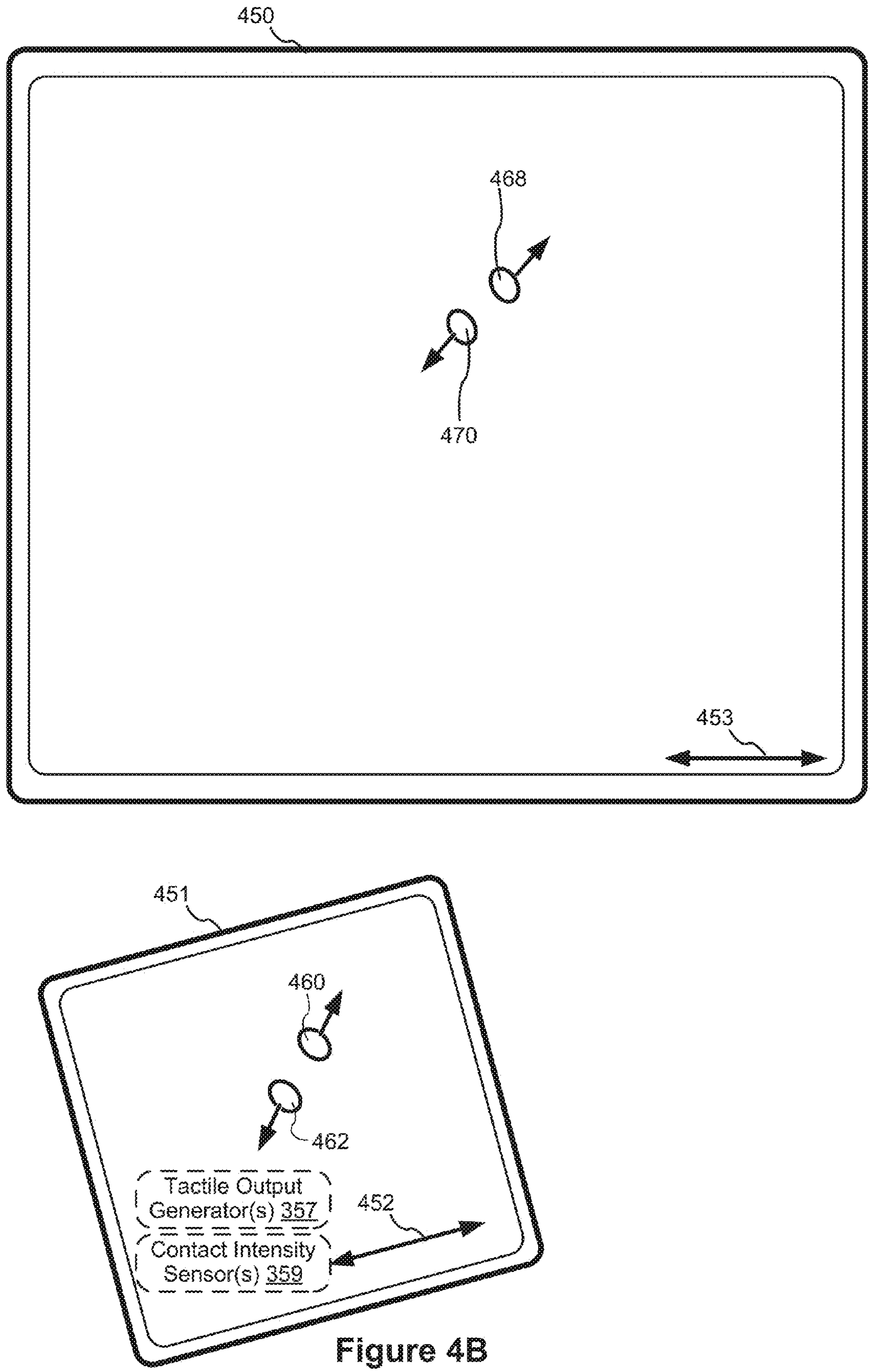
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term “focus selector” is an input element that indicates a current part of a user interface with which a user is interacting. In some implementations that include a cursor or other location marker, the cursor acts as a “focus selector,” so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a “focus selector,” so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user’s intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term “intensity” of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has “clicked” on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse “click” threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click “intensity” parameter).

As used in the specification and claims, the term “characteristic intensity” of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
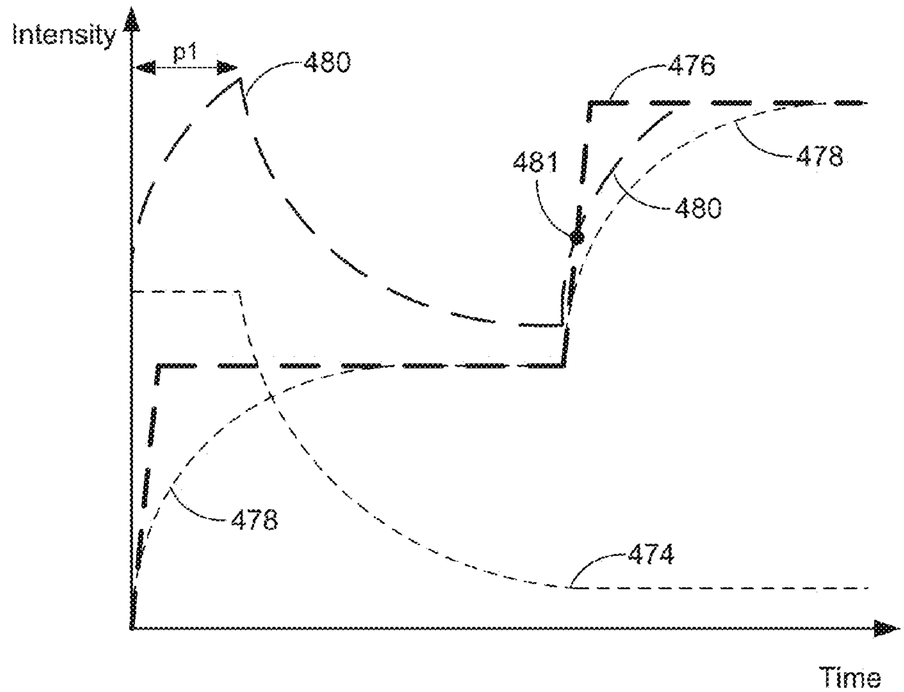
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
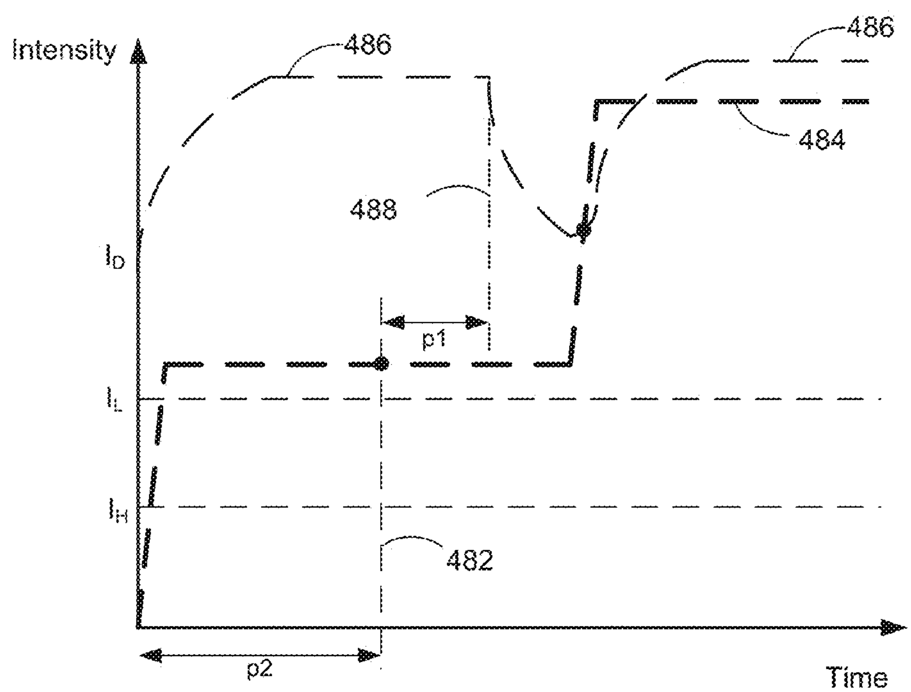

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
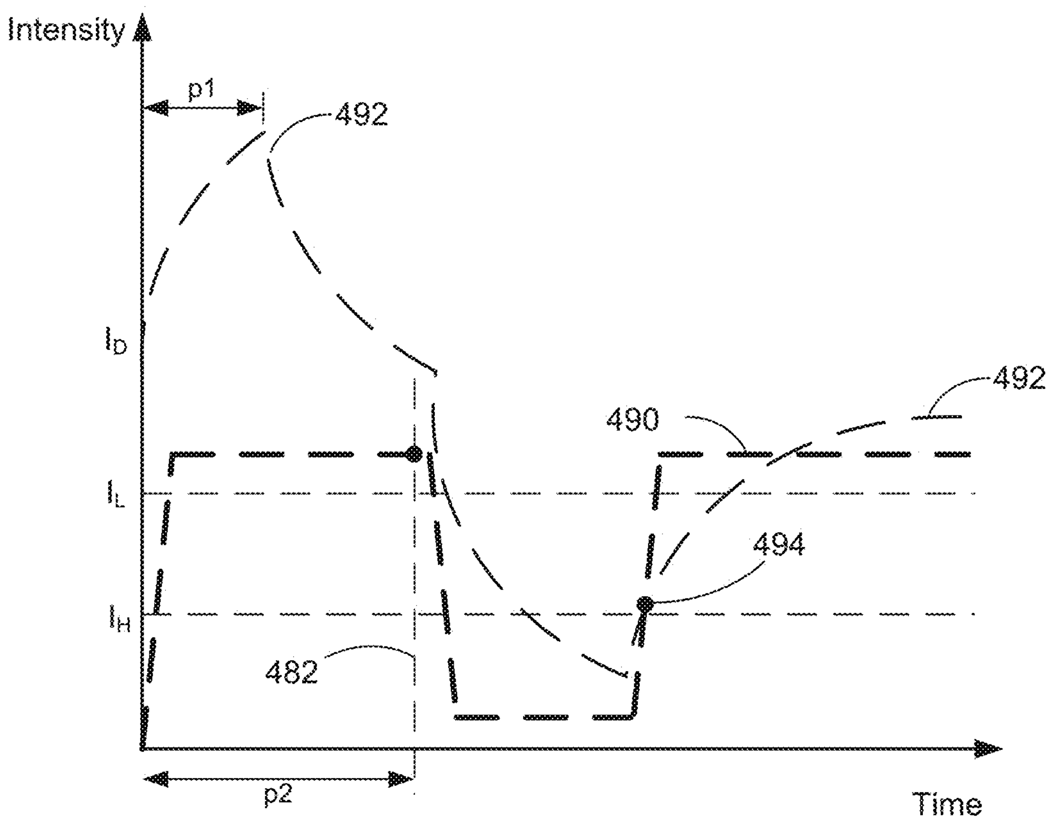

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

These user interfaces and associated processes provide new, improved ways to:

acknowledge messages;

edit previously sent messages;

display an edit history for a previously sent message;

apply impact effect options to a message (e.g., to express what a user is trying to communicate);
display private messages using "invisible ink";
display enhanced message interface content (e.g., "full screen moments");
display content (e.g., "magic moments") that corresponds to particular combinations of content in two separate messages;
build message bubbles;
suggest emojis
synchronize viewing of content between users;
incorporate handwritten inputs;
selectively scrunch content in a message transcript;
integrate a camera;
integrate search and sharing;
integrate interactive applications;
integrate stickers;
make payments;
interact with avatars; and
make suggestions.

Figure 5A:
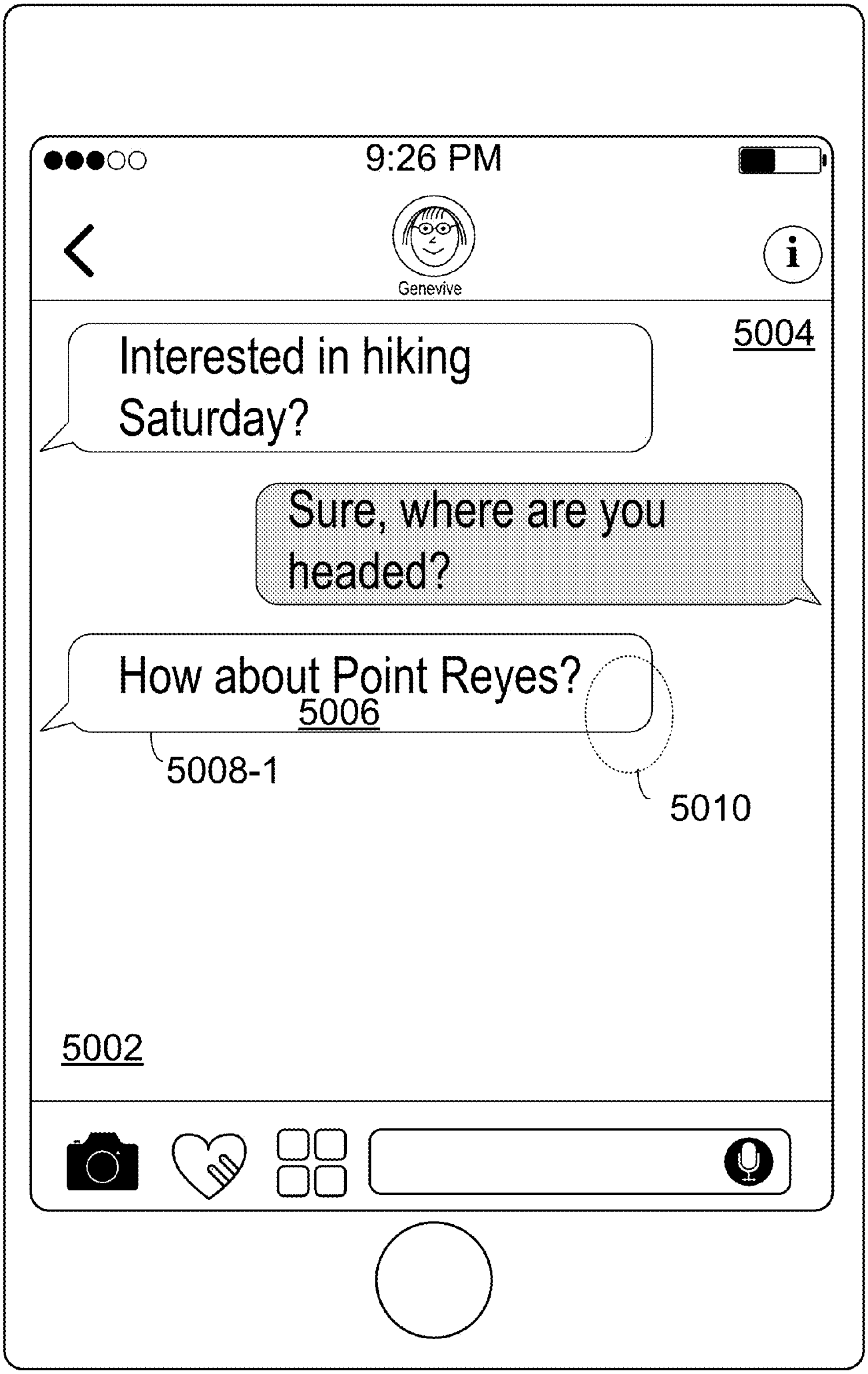
FIGS. 5A-5K illustrate exemplary user interfaces for displaying message transcripts and message acknowledgments.

FIGS. 5A-5K illustrate exemplary user interfaces for displaying message transcripts and message acknowledgments in accordance with some embodiments. In particular, FIG. 5A illustrates a messaging user interface 5002 of a messaging user interface (e.g., for a messaging application), displayed on the display of an electronic device, sometimes called the first electronic device to help distinguish it from other electronic devices in communication with the first electronic device. The first electronic device also includes a touch-sensitive surface and one or more sensors, such as in a touch-screen display or trackpad, configured to detect intensities of contacts on the touch-sensitive surface.

Figure 5B:
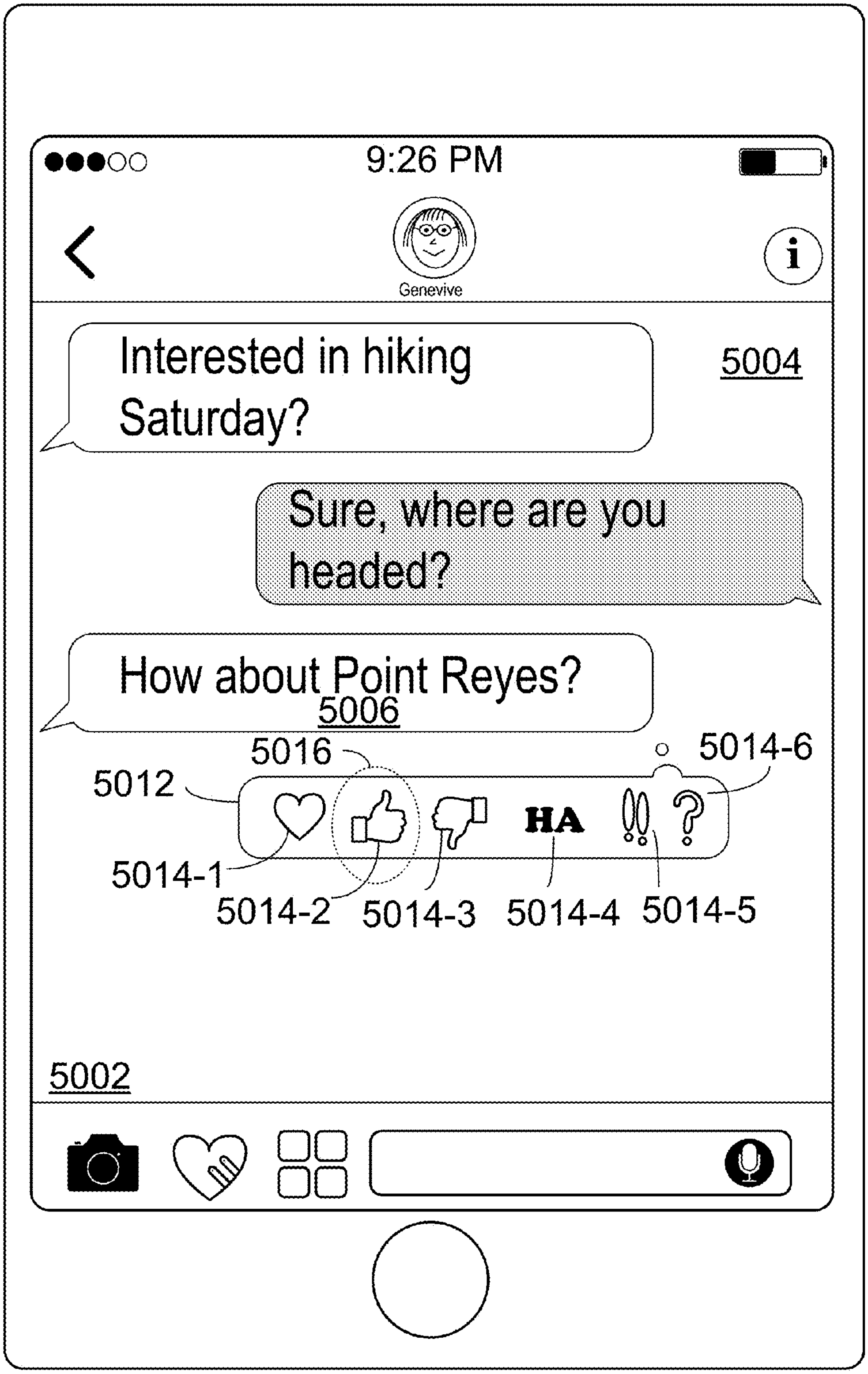
Figure 5C:
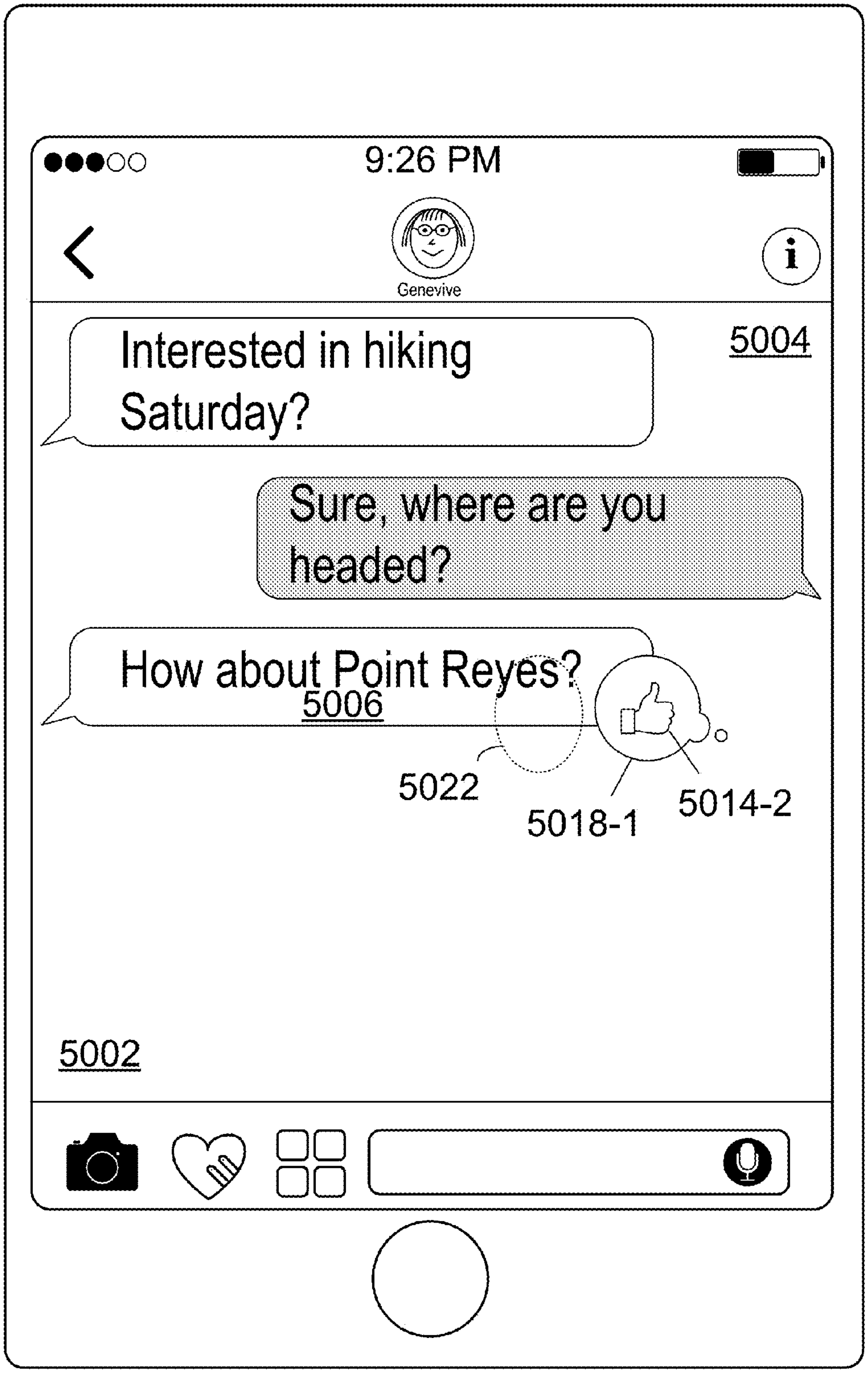
Figure 5D:
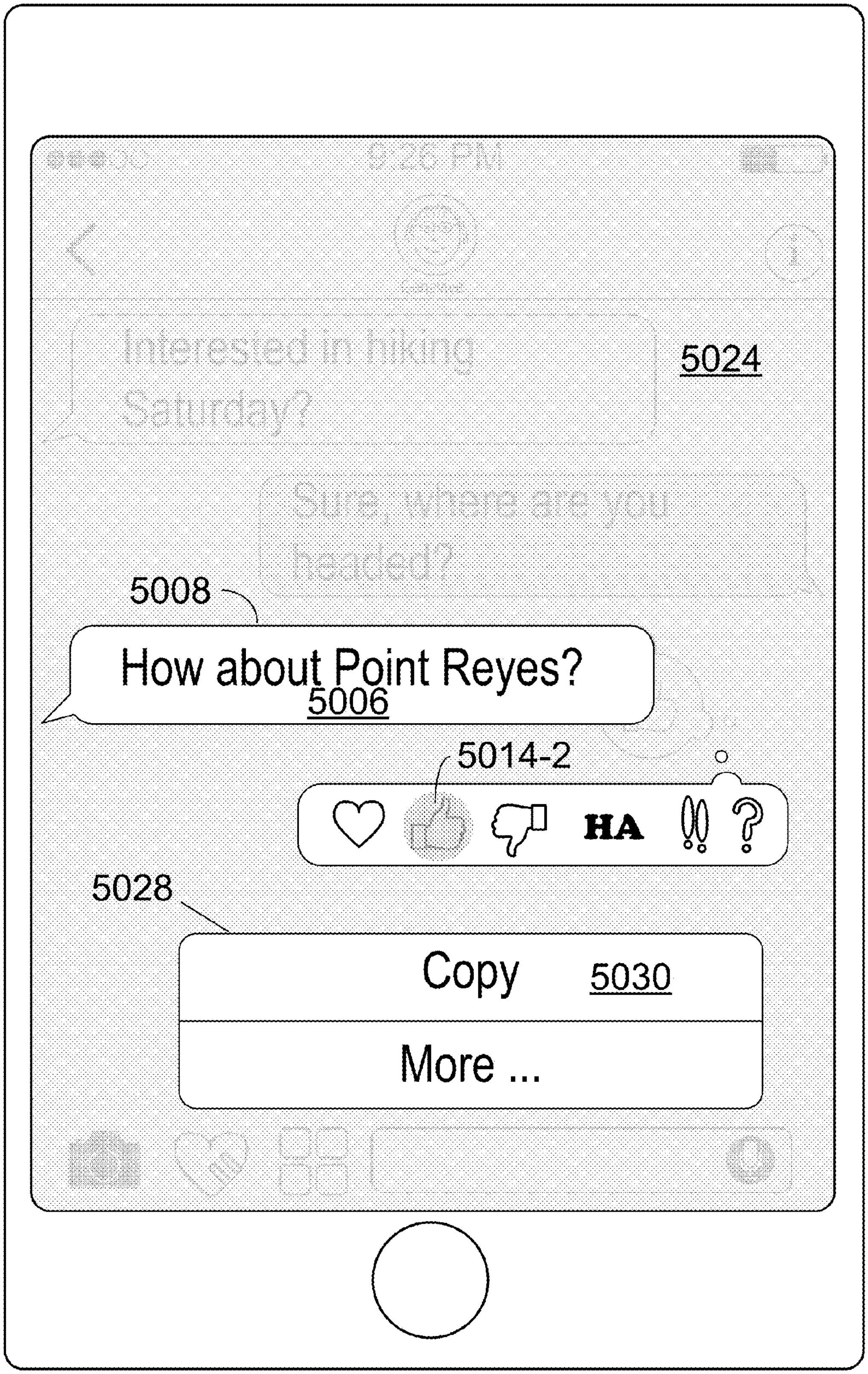

The messaging user interface 5002, as shown in FIG. 5A, includes a conversation transcript 5004 of a messaging session between a user (e.g., Genevive) of the electronic device and at least one other user (e.g., Isaac) of another electronic device). The conversation transcript 5004 in this example includes multiple messages, each in a respective message region 5008. A first input with a first contact 5010 at the location on the touch-sensitive surface corresponding to a first message 5006. In response to detecting the first input 5010, the electronic device displays an acknowledgement selection affordance 5012, FIG. 5B, at a location in the messaging interface that corresponds to the first message region. In this example, the acknowledgement selection affordance displays a plurality of acknowledgement options: 5014-1 (heart), 5014-2 (thumbs up), 5014-3 (thumbs down), 5014-4 ("HA"), 5014-5 ("!!") and 5014-6 ("?"). Other embodiments may include fewer, additional or different acknowledgment options. The electronic device responds to receiving a second input 5106 by a second contact (e.g., a tap gesture, light press gesture, deep press gesture, or lift off) on a respective acknowledgment option (or a hit region corresponding to the respective acknowledgment option), such as option 5014-2 (thumbs up), to select respective acknowledgment option and apply it to the first message 5006 or first message region 5008-1, as shown in FIG. 5C. The selected acknowledgment option, in this example option 5014-2, is displayed in a respective acknowledgement region 5018. As shown in FIG. 5H, the electronic device(s) of other user(s) (in this example, Isaac) participating in the messaging session (sometimes called a conversation) display the same selected acknowledgment option proximate for the first message region.

To edit the selected acknowledgement option, the user make a third input by a third contact 5022, as shown in FIG. 5C. Upon detecting the third input by the third contact, the electronic device displays an acknowledgement editing interface 5024, as shown in FIG. 5D. Optionally, the acknowledgement editing interface is displayed on top of and/or in place of the conversation transcript. Optionally the currently selected acknowledgment option, in this example option 5014-2, is visually distinguished from the other available acknowledgement options in the acknowledgement editing interface 5024, as shown in FIG. 5D.

Figure 5E:
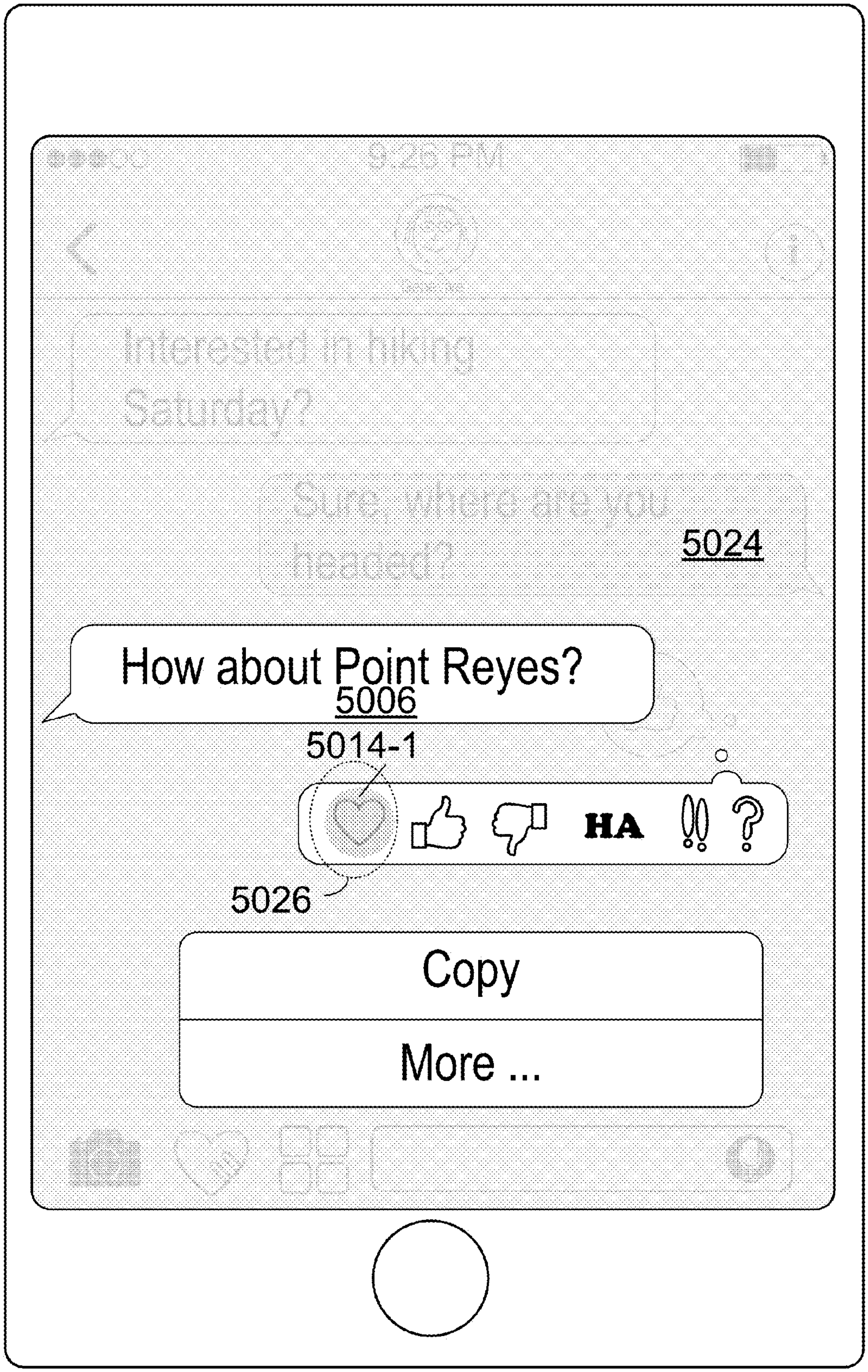
Figure 5F:
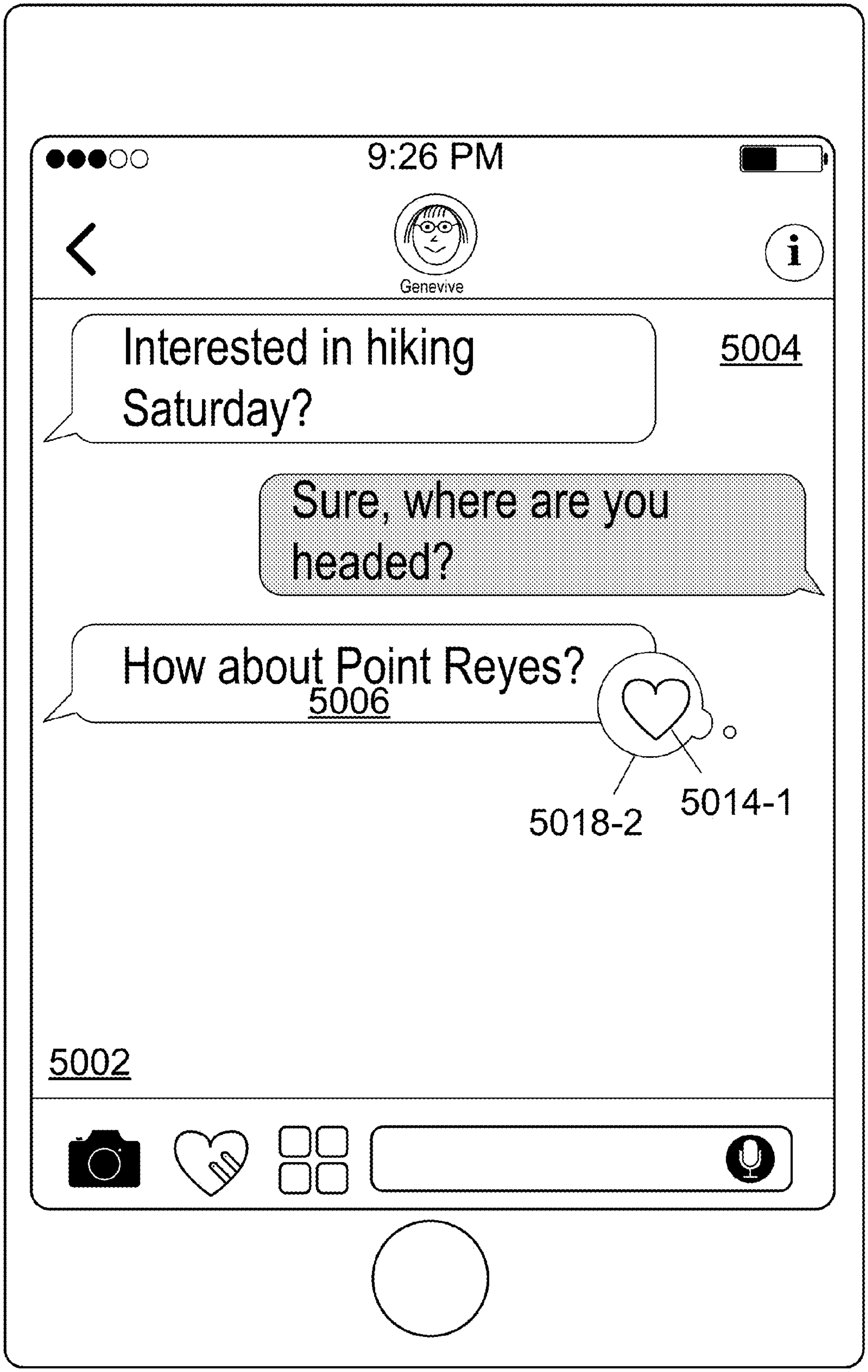

FIG. 5E shows an input, contact 5026, selecting a different, second acknowledgement option 5014-1, and FIG. 5F shows a message region in a conversation transcript with the edited acknowledgment (i.e., with second acknowledgement option 5014-1 displayed instead of first acknowledgement option 5014-2).

Figure 5G:
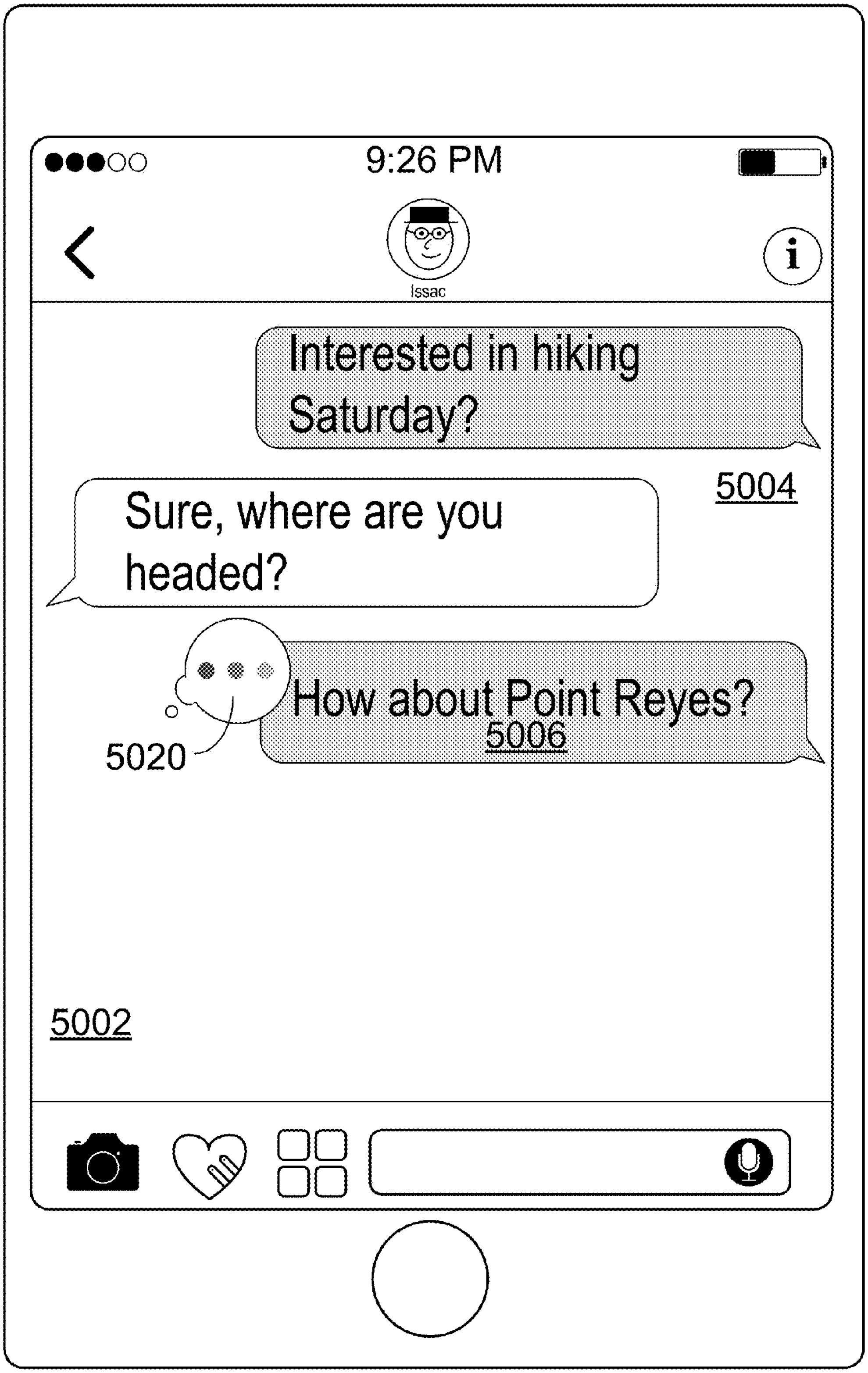
Figure 5H:
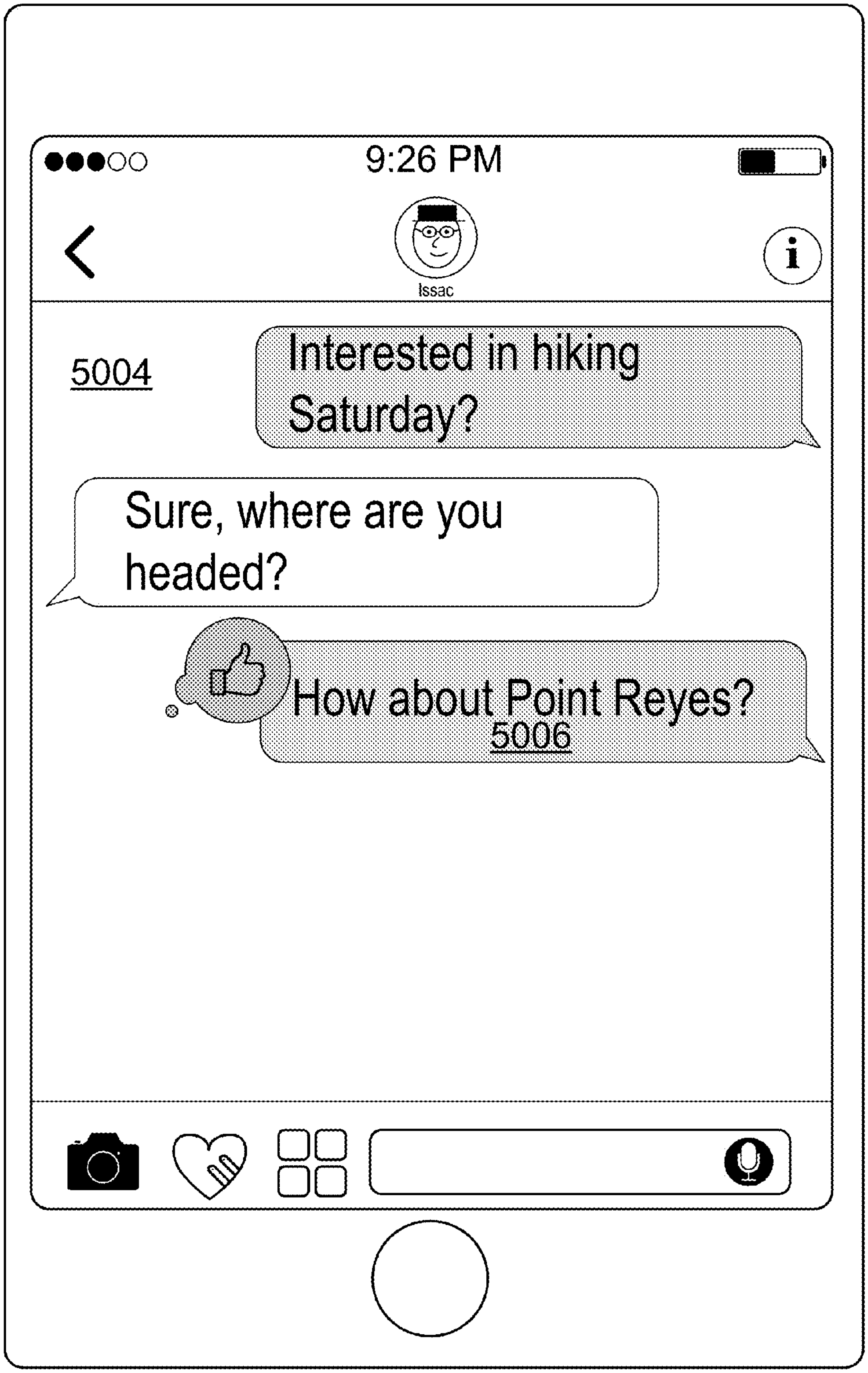

In some embodiments, while the user of the first electronic device is using the acknowledgement editing interface 5024 to edit a previously selected acknowledgment option for the first message region, the electronic device of another user in the messaging session displays an acknowledgement-preparation indicator 5020, as shown in FIG. 5G, proximate (e.g., near, adjacent or partially overlapping) the first message region in the conversation transcript 5004 displayed by that electronic device.

Figure 5I:
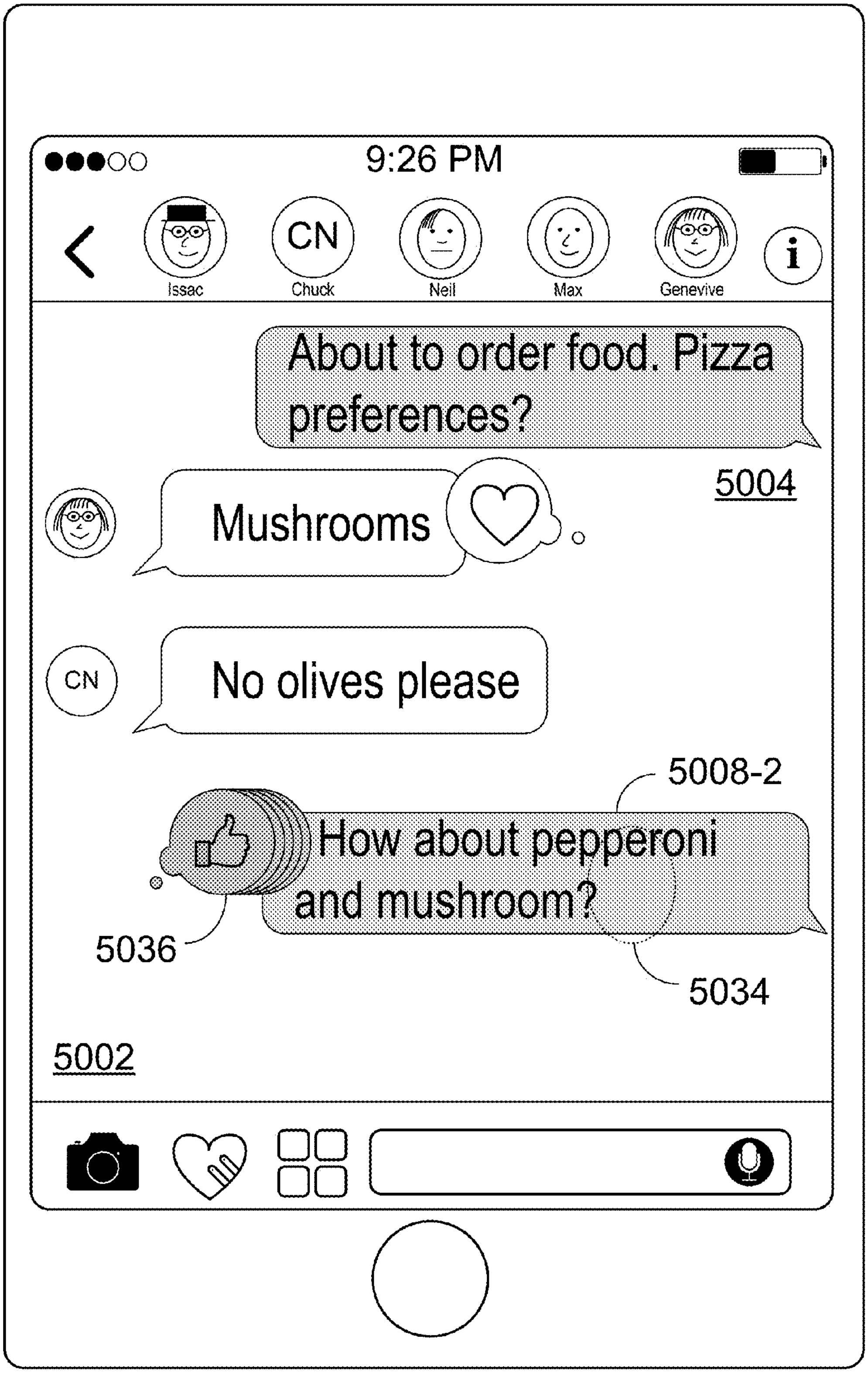

Different users in the same messaging session may select different acknowledgment options for the same message or message region. In some embodiments, as shown in FIG. 5I, the electronic device displays, in the conversation transcript, an indicia 5036, that users in the messaging session have selected a plurality of acknowledgements options for the second message region. In the example shown in Figure SI, indicia 5036 is a stack of overlapping acknowledgement option icons, but could alternatively be a plurality of individual acknowledgement option icons. As shown in FIG. 5I, indicia 5036 is optionally adjacent to and/or partially overlapping the second message region 5008-02.

Figure 5J:
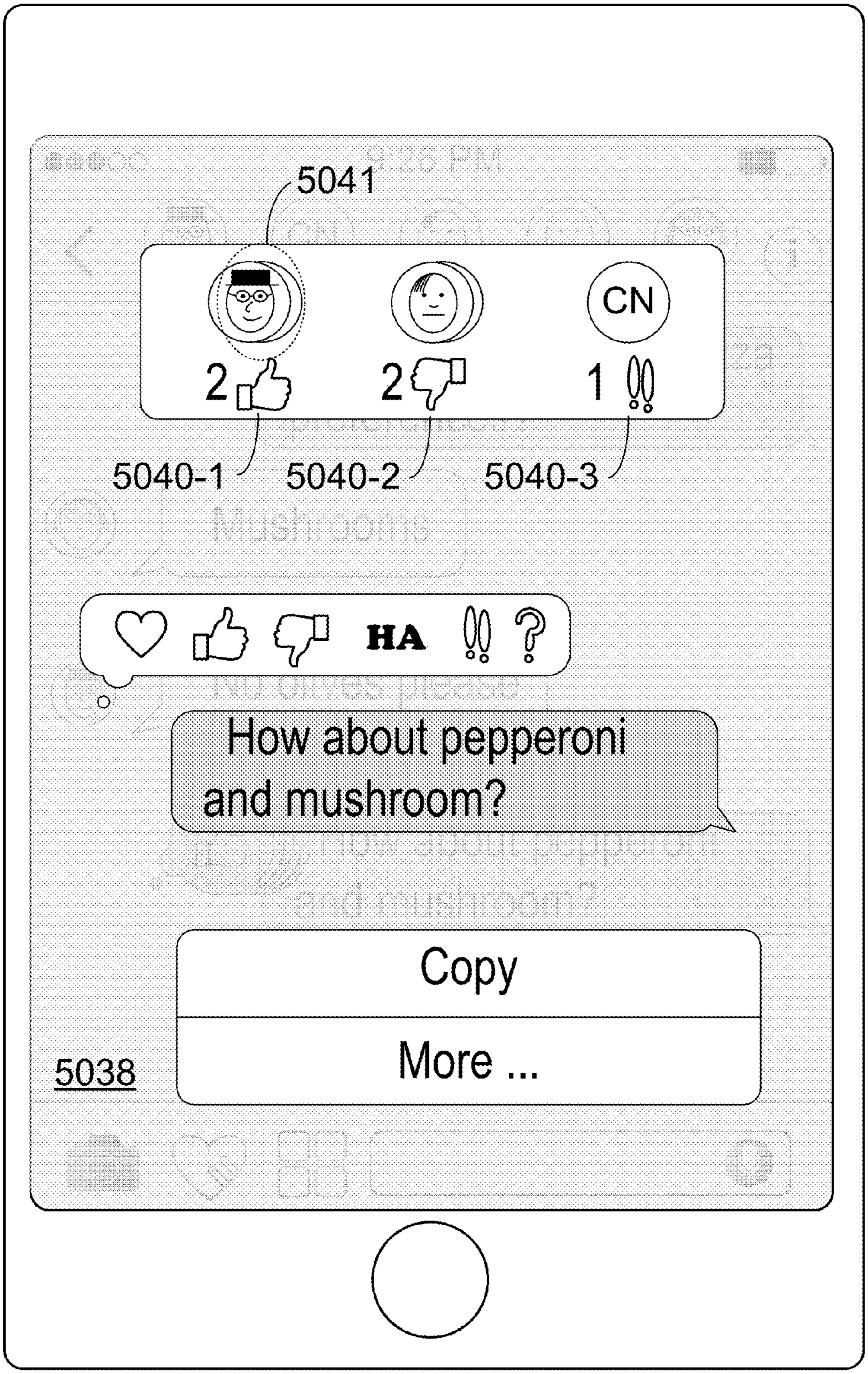

FIG. 5J shows an example of a user interface that includes a tally for each type of acknowledgement option selected by the users in the messaging session. For example, as shown in FIG. 5J, the user interface includes tallies 5040-1, 5040-2, 5040-3 for three distinct acknowledgement options selected by users in the messaging session. In some embodiments, the user messaging interface shown in FIG. 5J is displayed by the electronic device in response to detecting an input by a contact (e.g., contact 5034, FIG. 5I) at a location on the touch-sensitive surface that corresponds to a location of the message region having indicia 5036, which indicates that multiple user in the messaging session have selected acknowledgement options for the same message (or corresponding message region).

Figure 5K:
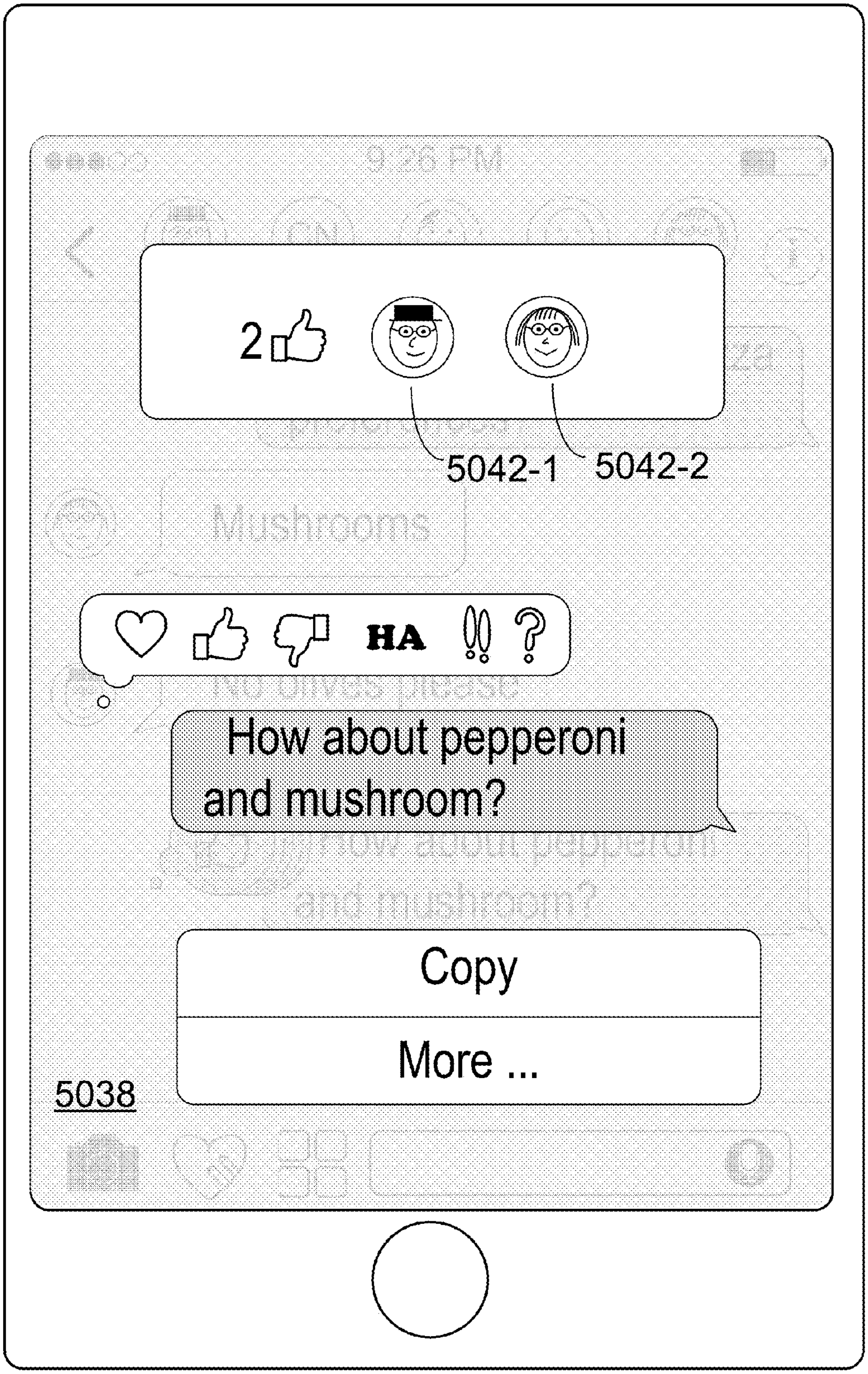

By selecting one of the tallies 5040, a user can see the users who selected any particular acknowledgement option. The electronic device, in response to an input by a contact (e.g., contact 5041, as shown in FIG. 5J) at a location on the touch-sensitive surface that corresponds to the tally 5040 for a particular acknowledgement option for a respective message region, displays icons 5042 (e.g., avatars) that represent users that selected the particular acknowledgement option for the respective message region, as shown in FIG. 5K.

Figure 5L:
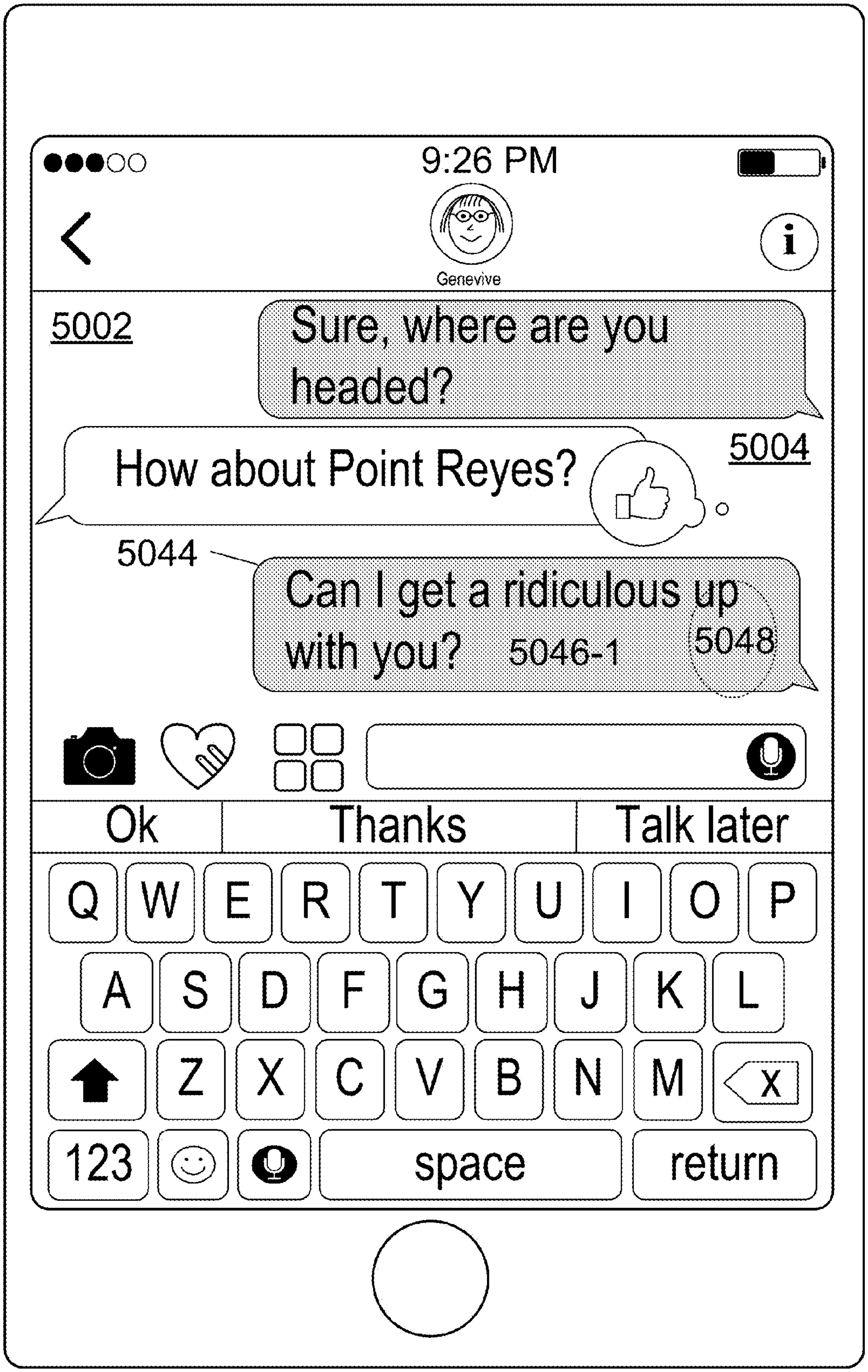
FIGS. 5L-5T illustrate exemplary user interfaces for editing previously sent messages while displaying a message transcript.

FIGS. 5L-5T illustrate exemplary user interfaces for editing previously sent messages while displaying a message transcript. FIG. 5L shows a messaging user interface 5002 of a messaging application on the display of an electronic device. The messaging user interface 5002 includes a conversation transcript 5004 of a messaging session between a user of the electronic device and at least one other user, and a first message region 5044 that includes a first message 5046-1 that was sent from the electronic device of the user to the at least one other user in the messaging session.

Figure 5M:
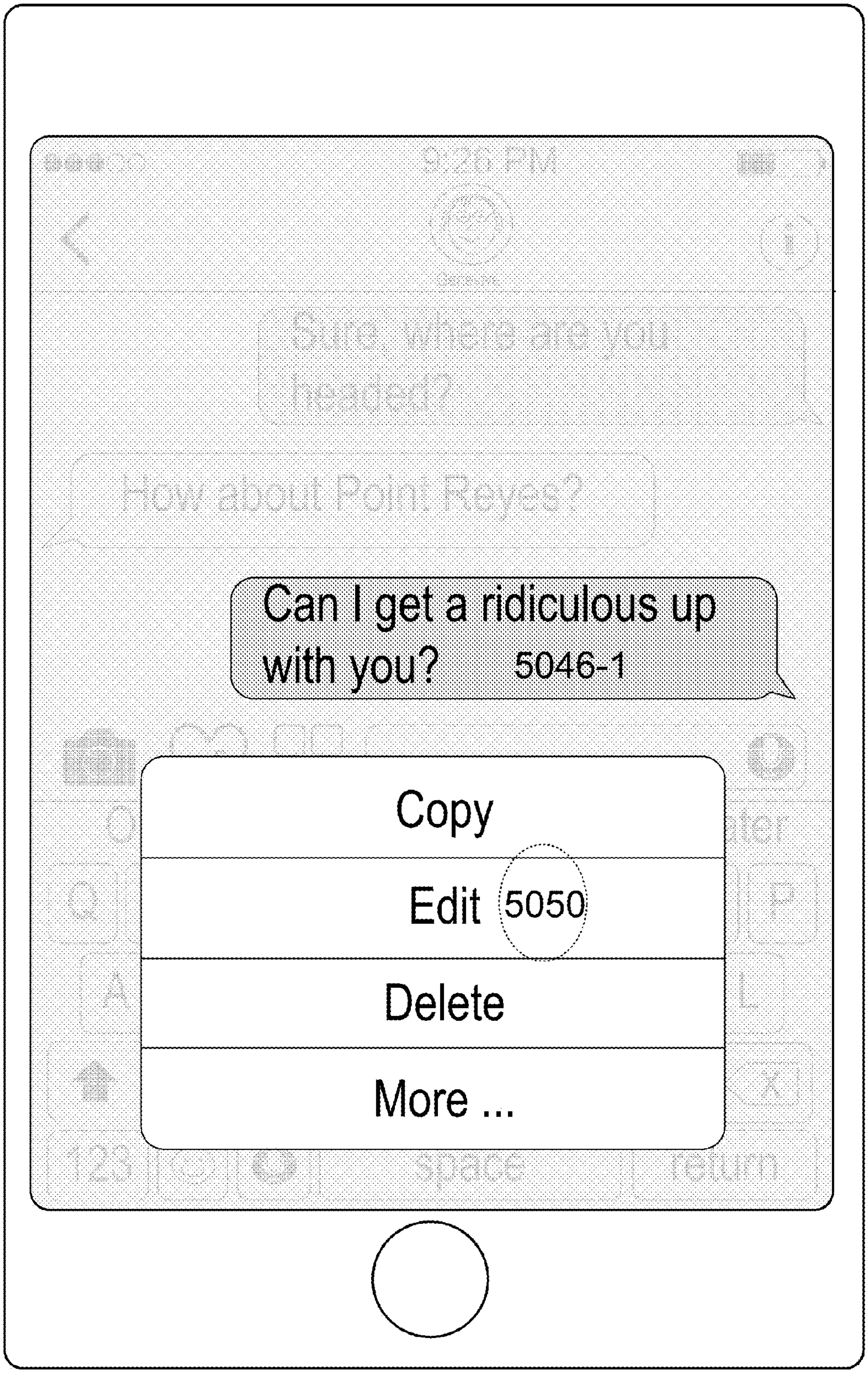
Figure 5N:

The first message 5046-1 can be edited, despite the fact that it has already been sent. To initiate the editing of the first message, the user selects the first message with a predefined touch input 5048 (e.g., a tap gesture, long press gesture, light press gesture, or deep press gesture) on the first message or the message region for the first message. In some embodiments, the electronic device, in response to detecting the input 5048, displays a menu interface, such as the one shown in FIG. 5M. Alternatively, the electronic device, in response to detecting the input 5048, displays a message editing interface 5022, as shown in FIG. 5N. In some embodiments, a first input gesture (e.g., a tap gesture) on the first message is used to transition to the menu interface (e.g., as shown in FIG. 5M), while a second input gesture (e.g., a deep press) is used to transition to the message editing interface 5052, FIG. 5N. From the menu interface, as shown in FIG. 5M, a user can transition the messaging application to the message editing interface 5022, shown in FIG. 5N, by a touch input 5050 (FIG. 5M) that selects an edit option in the menu interface.

The message editing interface 5052, FIG. 5N, for editing a respective message, such as first message 5046-1, includes a keyboard 5054, and an update affordance 5056. While displaying the message editing interface 5052 for the respective message, the electronic device detects one or more inputs, such as input 5057 shown in FIG. 5N, that revise the respective message, displays a revised version of the message, and detects an input that activates the update affordance (e.g., for sending the updated message to the one or more other electronic devices of the one or more other participants in the messaging session.

Figure 5O:
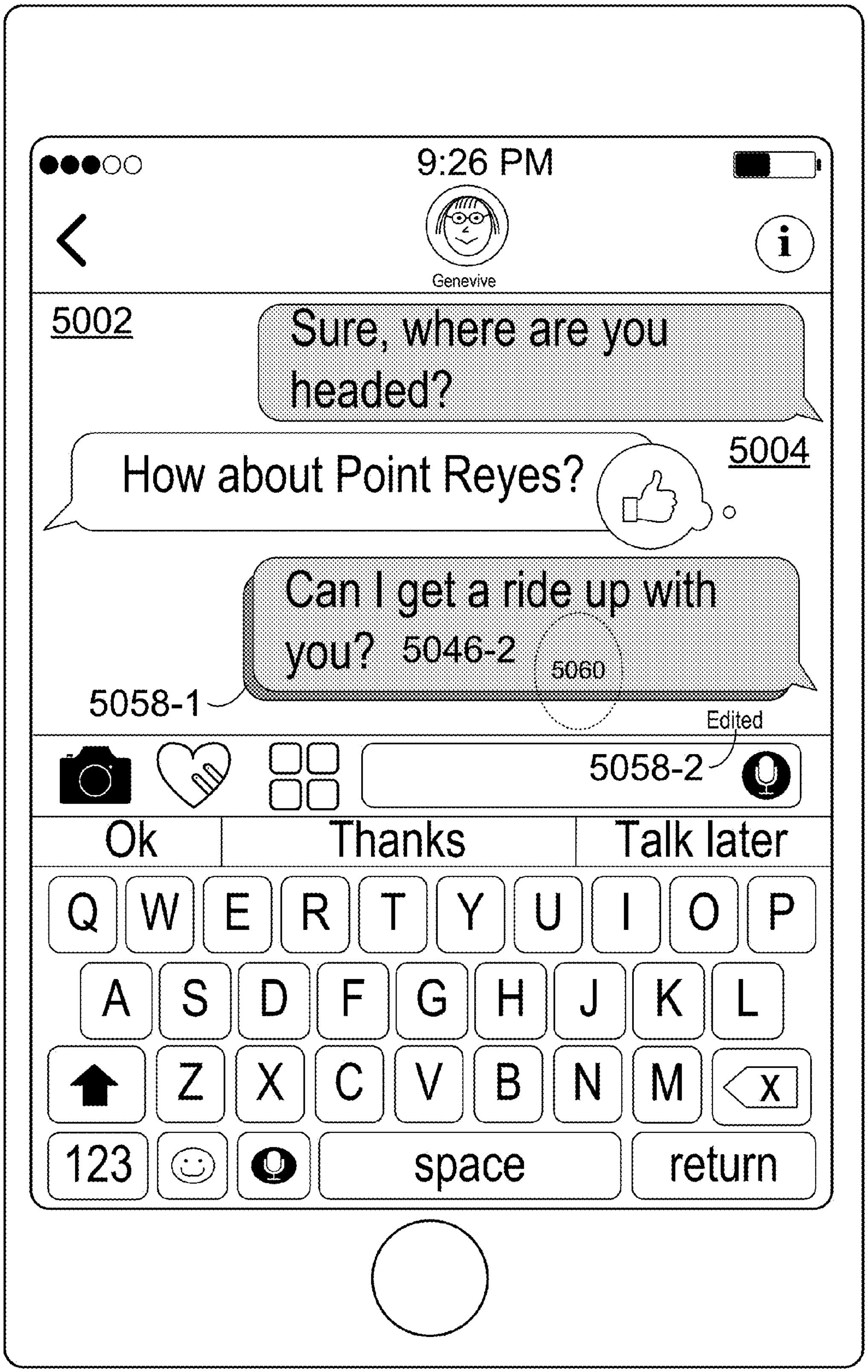

FIG. 5O shows the conversation transcript 5004 after message 5046 has been updated. Because the conversation transcript 5004 includes an edited message, the edited message includes one or more indications 5058 that a particular message was revised after the original version of the message was sent to the other participant(s) in the messaging session. In FIG. 5O, there are two such indications of revision: indication 5058-1 is a shadow region behind the message region; indication 5058-2 is text (e.g., "Edited") displayed below the message region that contains the revised version of the message.

An edited or revised message can be edited yet again. The electronic device, in response to an input (e.g., input 5060, FIG. 5O) that corresponds to a request to edit the revised version 5046-2) of a message, displays a message editing interface for the revised version of the message, as shown in FIG. 5R. The message editing interface, as shown in FIG. 5R, includes the message 5046-2 to be edited, a keyboard, and an update affordance (which is optionally not shown until at least one revision has been made to the message).

A participant in the messaging session can request to see all version, or two or more versions, of an edited message. For example, in response to a predefined input 5060, FIG. 5O, on an edited message, the electronic device displays the user interface shown in FIG. 5P, in which display of the conversation transcript is suppressed except for the revised version of the first message 5046-2, and a menu 5062 or list of editing options. In this example, the displayed menu 5062 includes a copy affordance 5064 (for copying the message selected by input 5060), a show edits affordance 5066 (for showing edits to the message selected by input 5060), a delete affordance 5068 (for deleting the message selected by input 5060, or alternatively for undoing all edits made to the message selected by input 5060), and a display more options affordance 5070. In the example shown in FIG. 5P, input 5072 (e.g., a tap gesture) is detected at the location on the touch-sensitive surface that corresponds to the location of the "show edits" affordance 5066, which when activated, displays a user interface 5074 (FIG. 5Q) that includes current version 5046-1 of the first message as well as a prior version 5046-2, as shown in FIG. 5Q. A further input, 5076 or 5078, in the user interface of FIG. 5Q, selects a version of the message to edit. For example, the selected version is highlighted, and then a touch input on Edit (5080) would initiate editing of the selected version of the message. Alternatively, a touch input on Done (5082) terminates the editing of the selected version of the message.

Figure 5P:
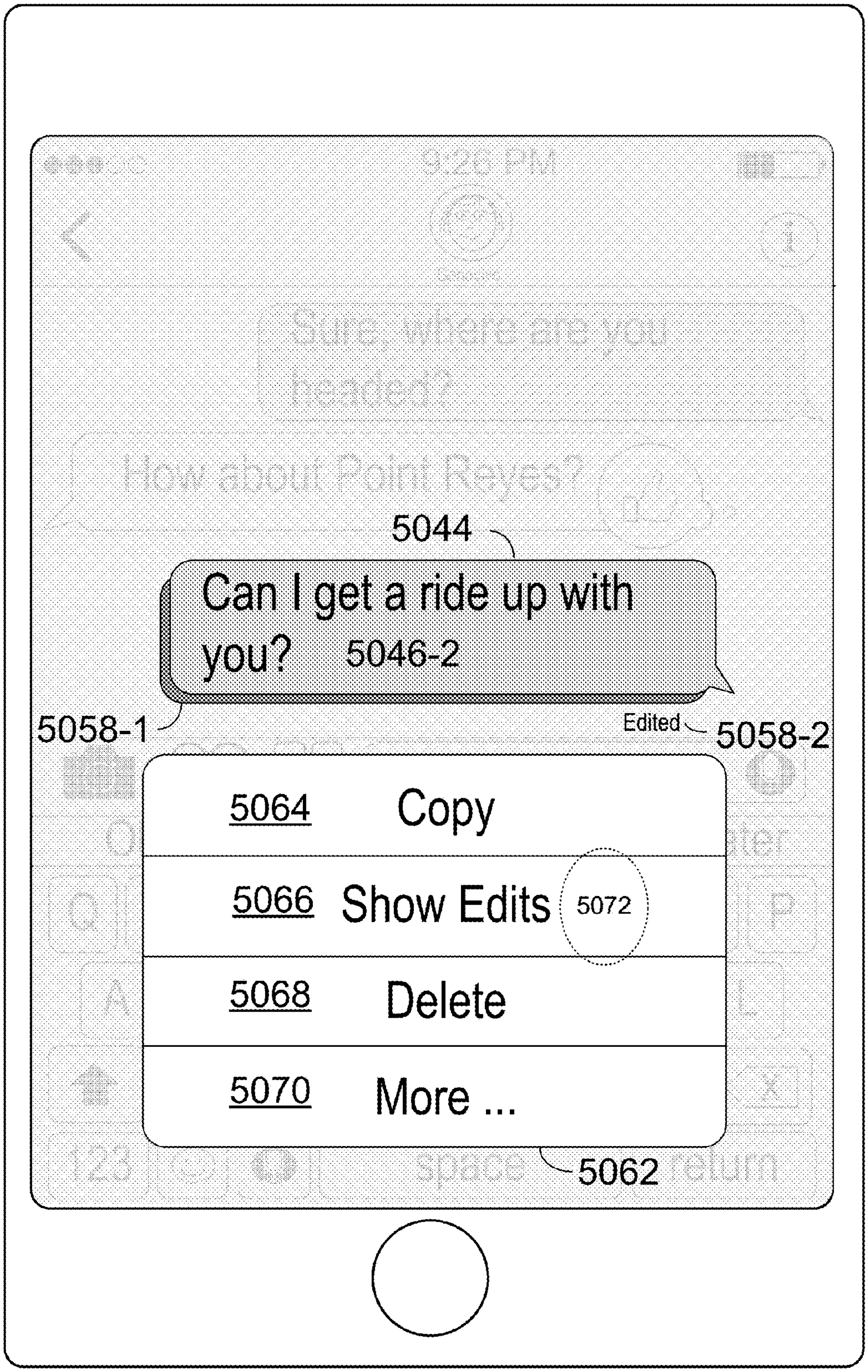
Figure 5Q:
Figure 5R:
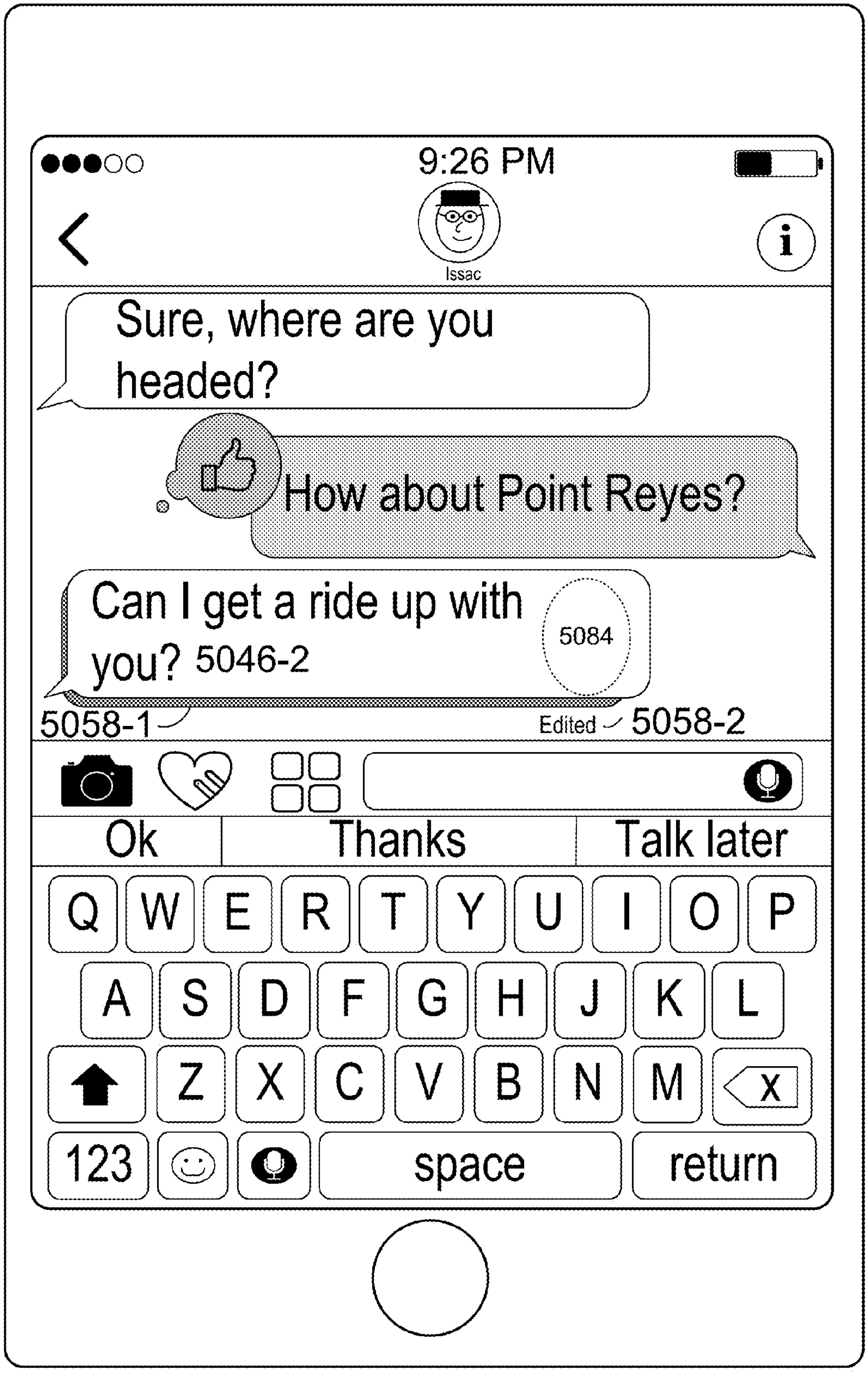
Figure 5S:
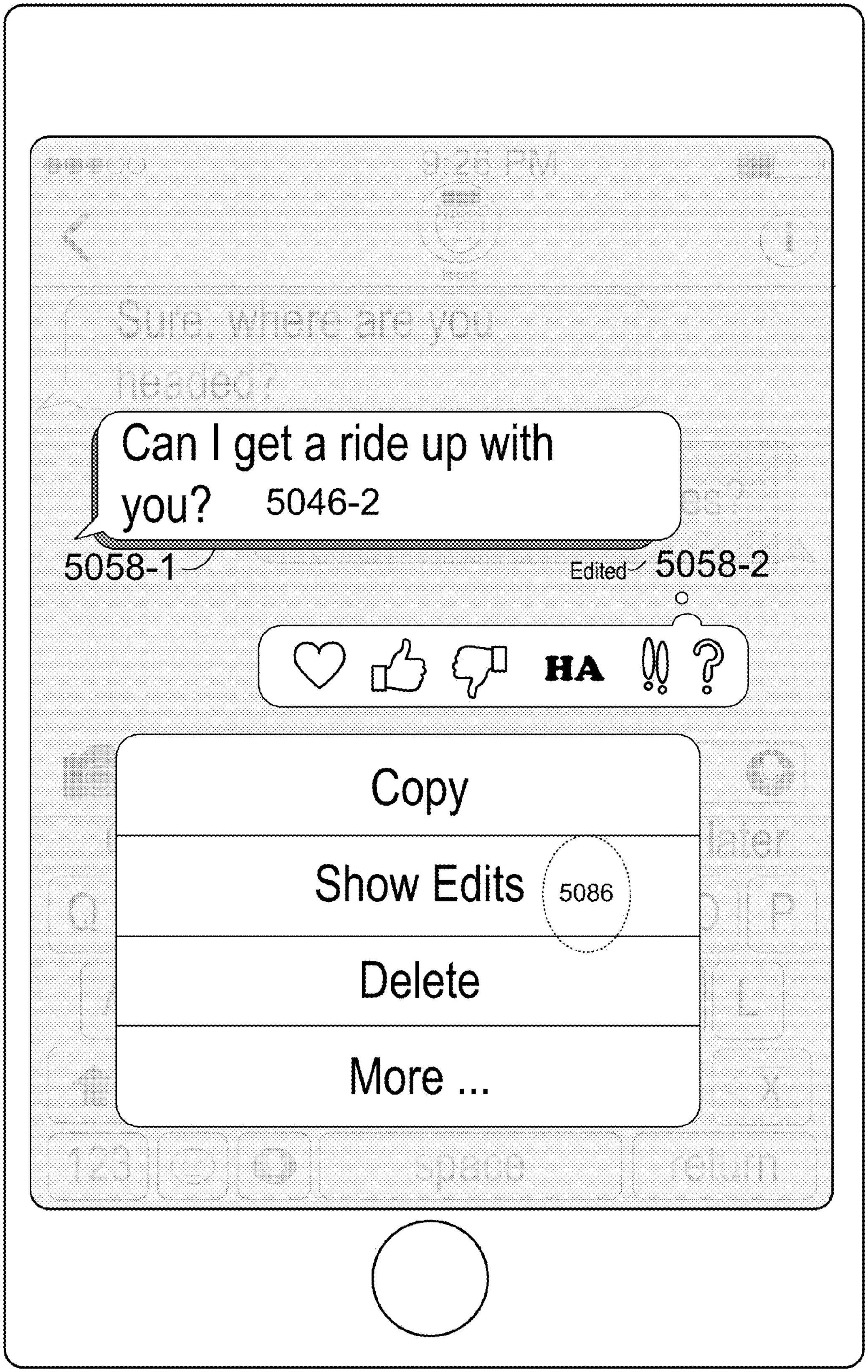
Figure 5T:
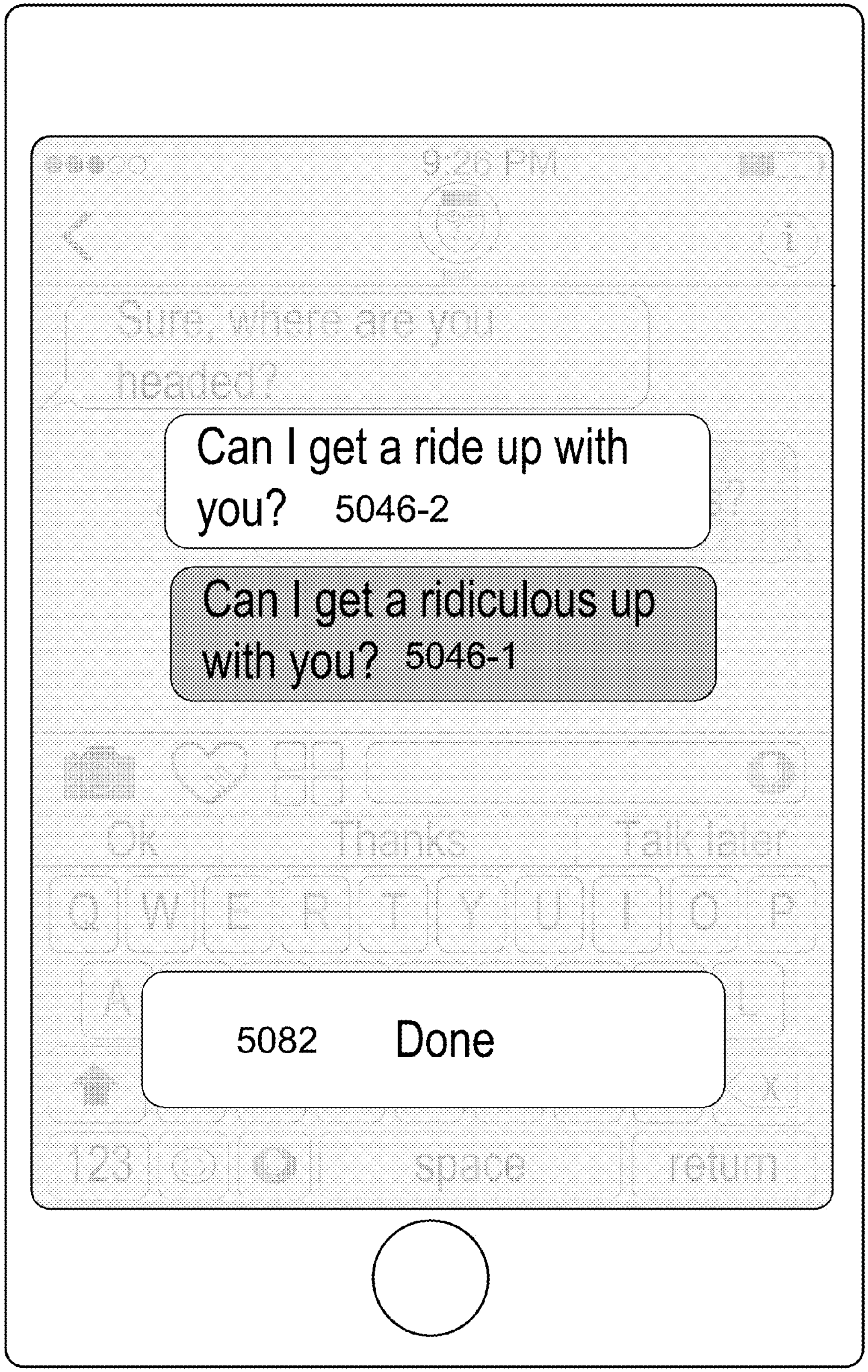

An alternative to the edit menu interface shown in FIG. 5P is the edit menu interface shown in FIG. 5S, which includes the selected message (selected in response to input 5060, FIG. 5O), and a menu that includes an affordance (e.g., a "show edits" option, 5086), which when activated results in display of the user interface shown in FIG. 5T, which includes the current version 5046-2 of the selected message and one or more prior versions of the selected message (e.g., version 5046-1).

Figure 5U:

FIGS. 5U-5BF illustrate exemplary user interfaces for applying an impact effect option to a message input or message region. FIG. 5U illustrates a messaging user interface 5002 having a conversation transcript 5004 of a messaging session between a user (Wendy, in this example) of the electronic device and at least one other user (e.g., Max, in this example, a user of another electronic device), and a message-input area 5100 that includes first message input 5102 (e.g., text, stickers, images, and/or other graphics entered by a user of the electronic device in the message-input area, but not yet sent to the at least one other user in the messaging session). In FIG. 5U, first message input 5102 has not yet been sent.

Figure 5V:
Figure 5W:

In some embodiments, to trigger the activation of an impact selection interface 5110, FIG. 5AA, first input 5102, by a first contact at a location on the touch-sensitive surface that corresponds to a location in the message-input area 5100, includes a particular gesture (e.g., a swipe gesture) received at the message-input area 5100. In this example, the message-input area includes an impact selection affordance 5104 and the location of the contact 5106 of the first input corresponds to the impact selection affordance. In some embodiments, impact selection affordance 5104 is a multi-purpose affordance, and a second gesture (e.g., a tap) on the same affordance 5104 is used to send the message 5102 in message input area 5100. The electronic device, upon detecting an input that includes the second gesture on affordance 5104, sends message 5102 and transitions to the user interface shown in FIG. 5V. Similarly, after message 5102 is sent, the electronic device of the other user receives that message and shows the user interface shown in FIG. 5W.

Figure 5X:
Figure 5Y:
Figure 5Z:
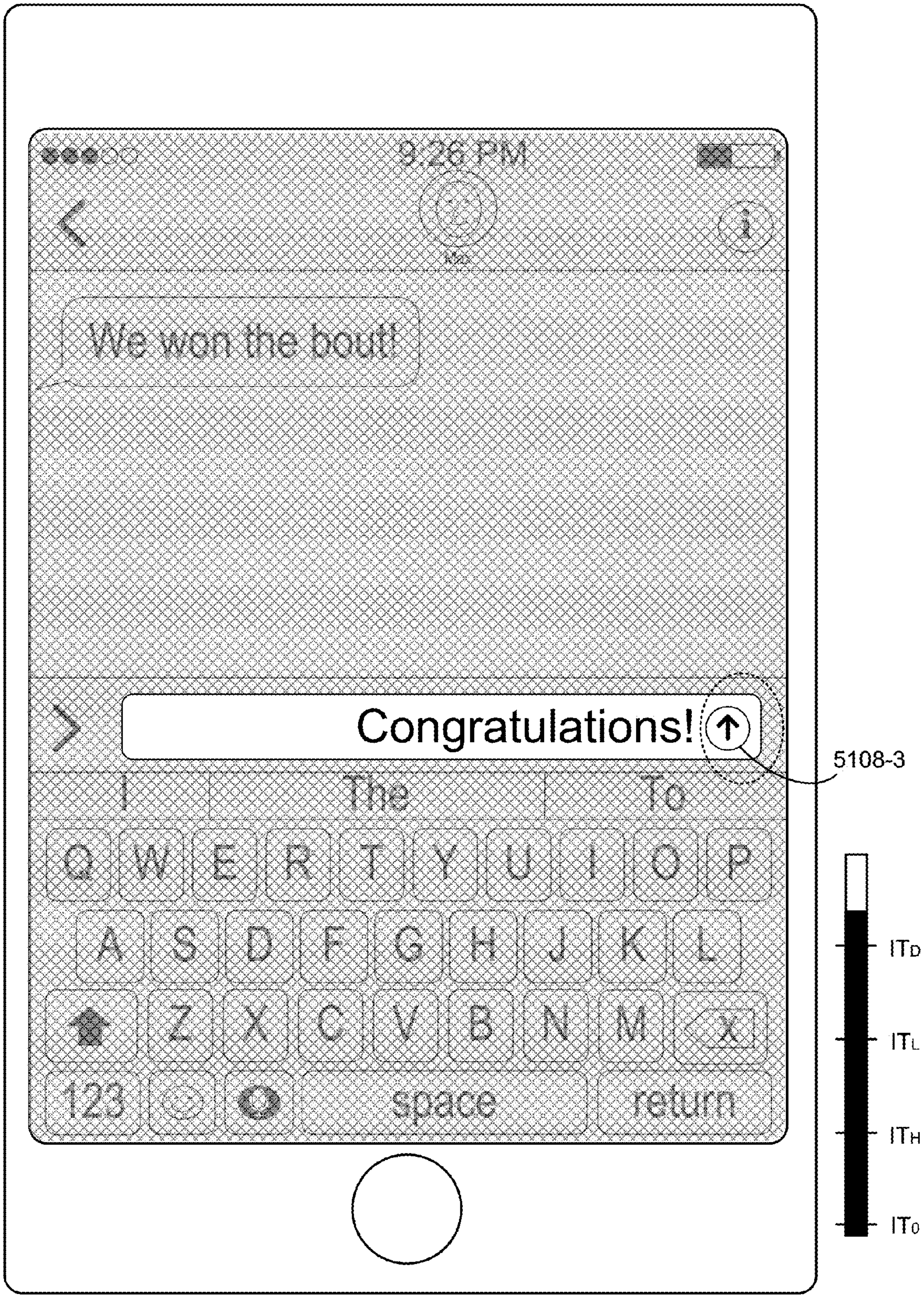
Figure 5A:
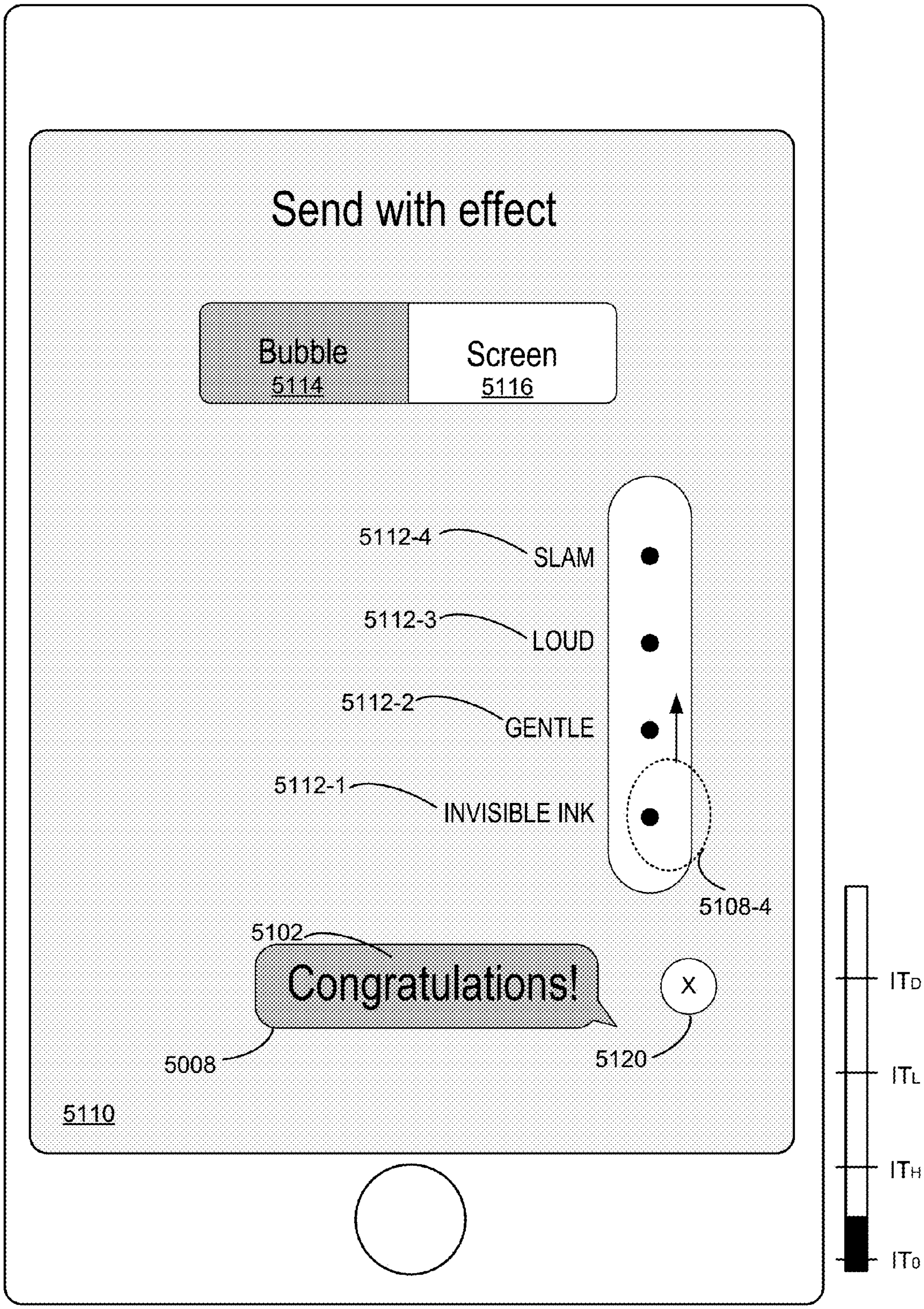
Figure 5A:
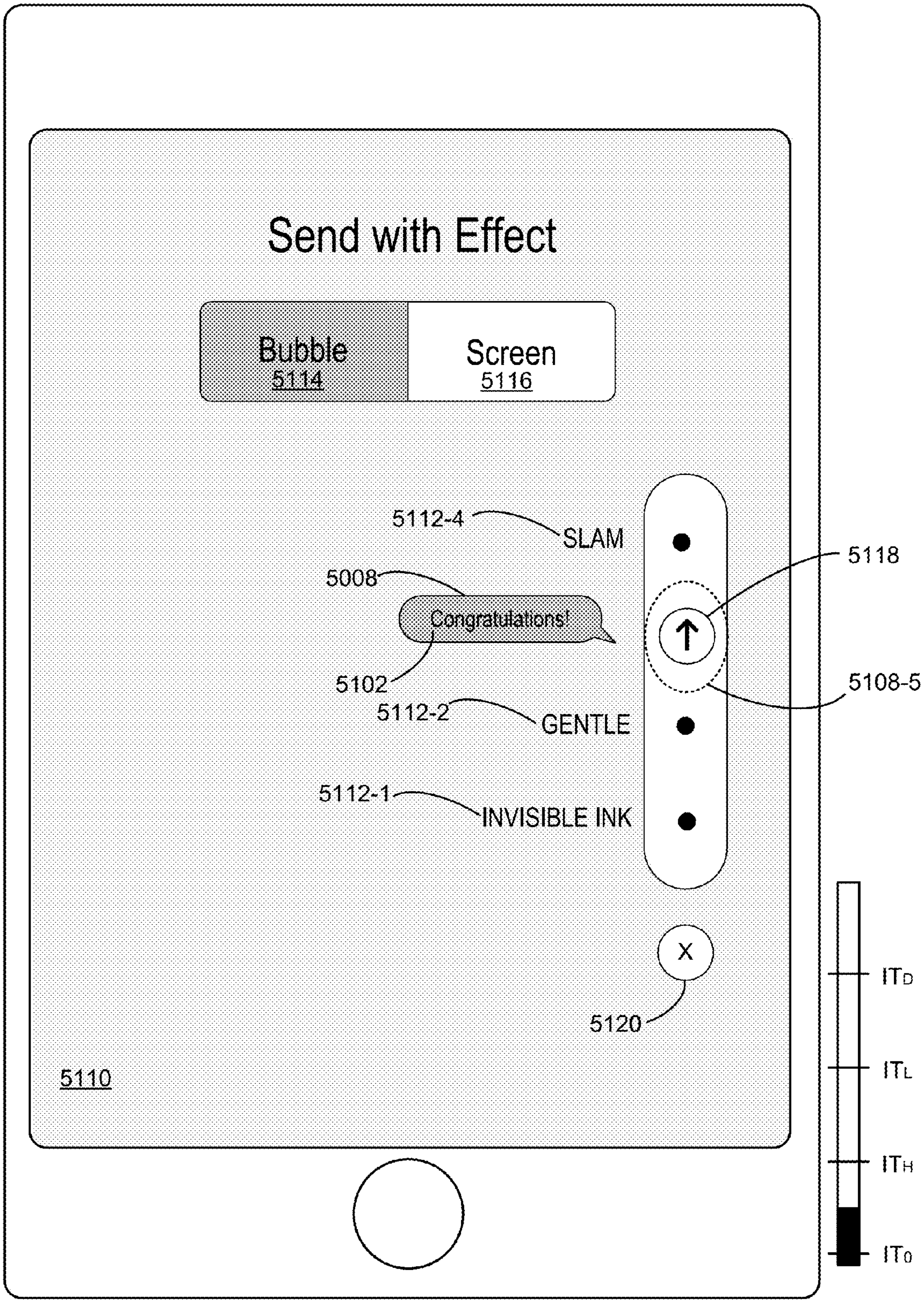
Figure 5A:
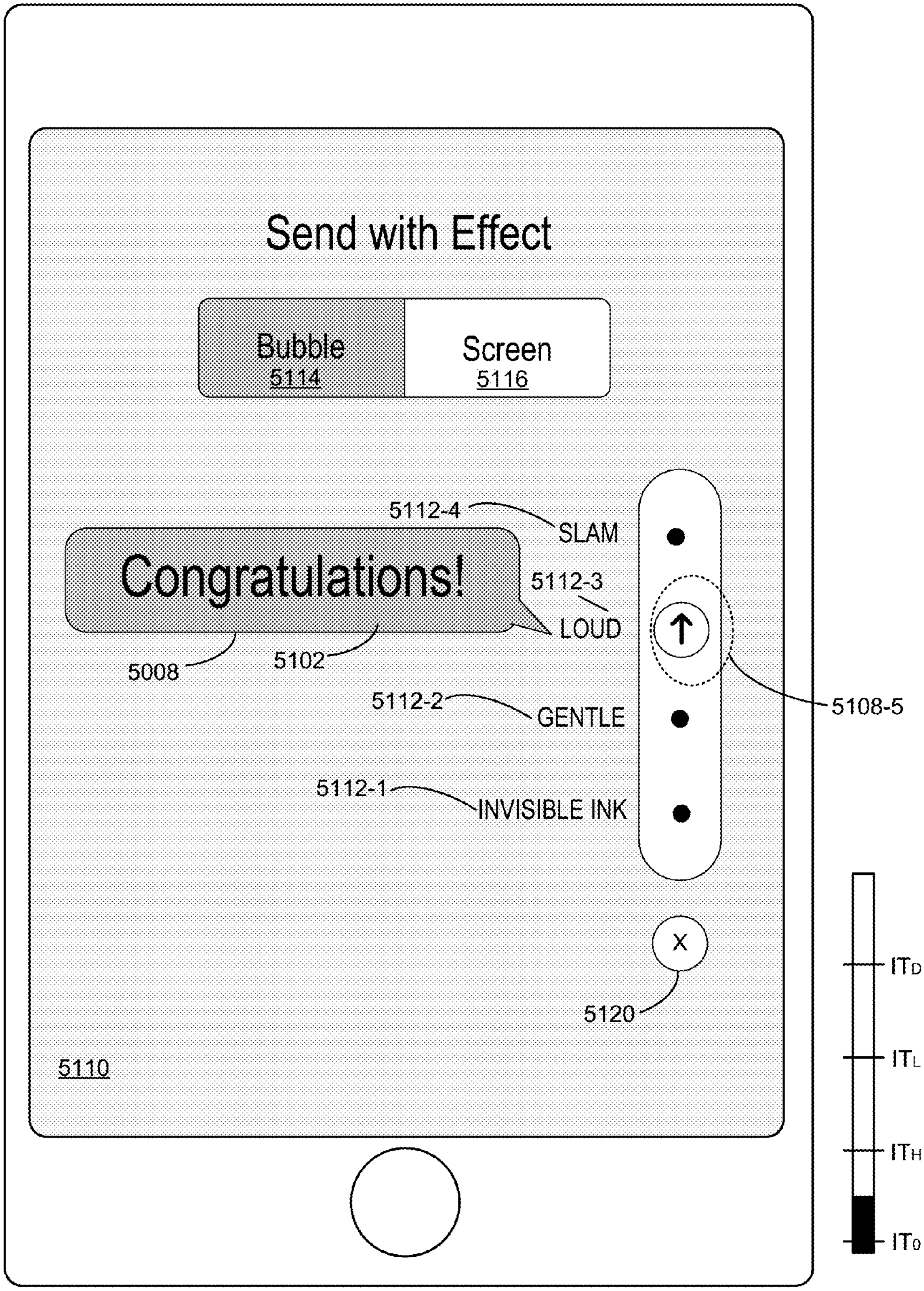
Figure 5A:
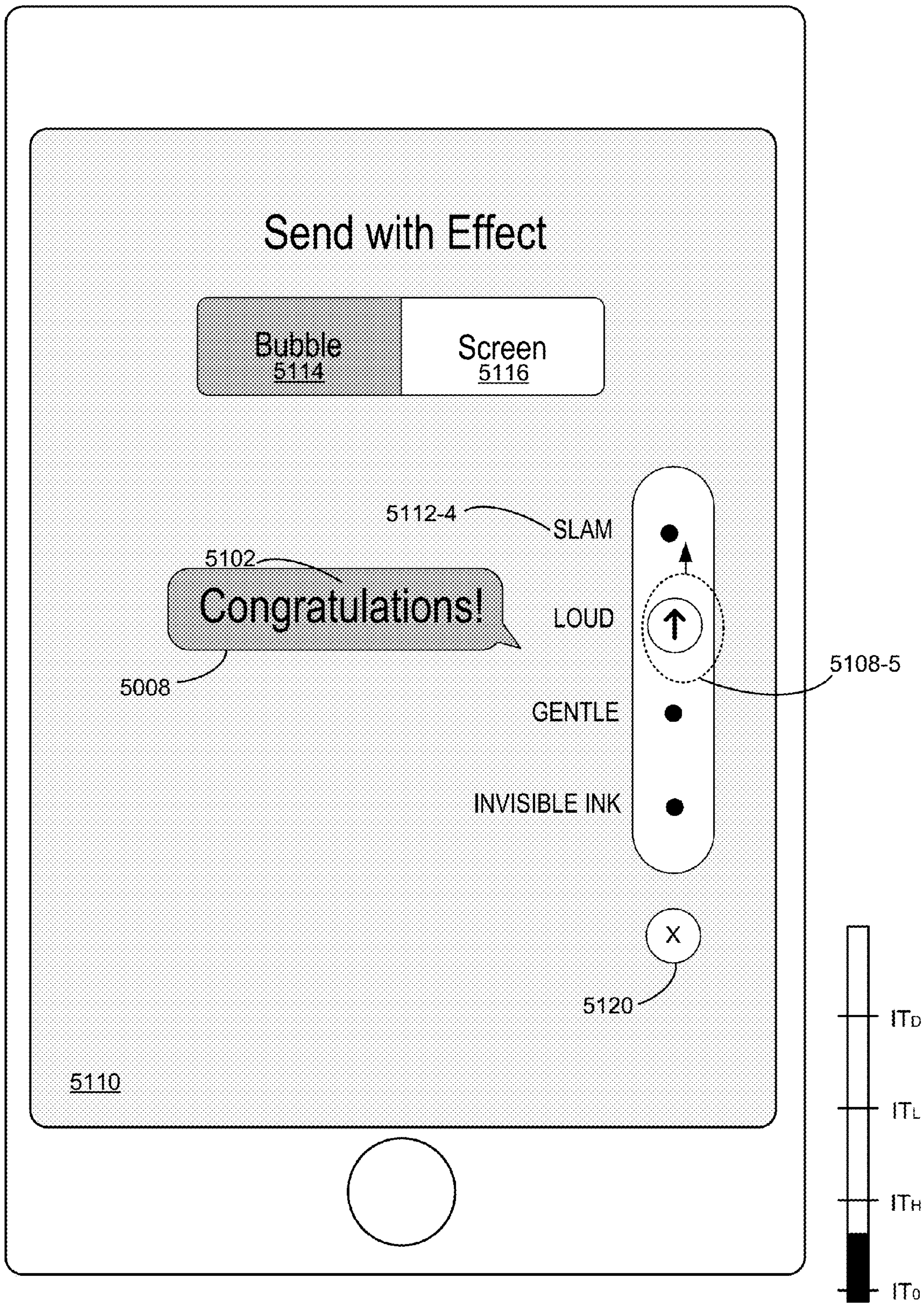
Figure 5A:
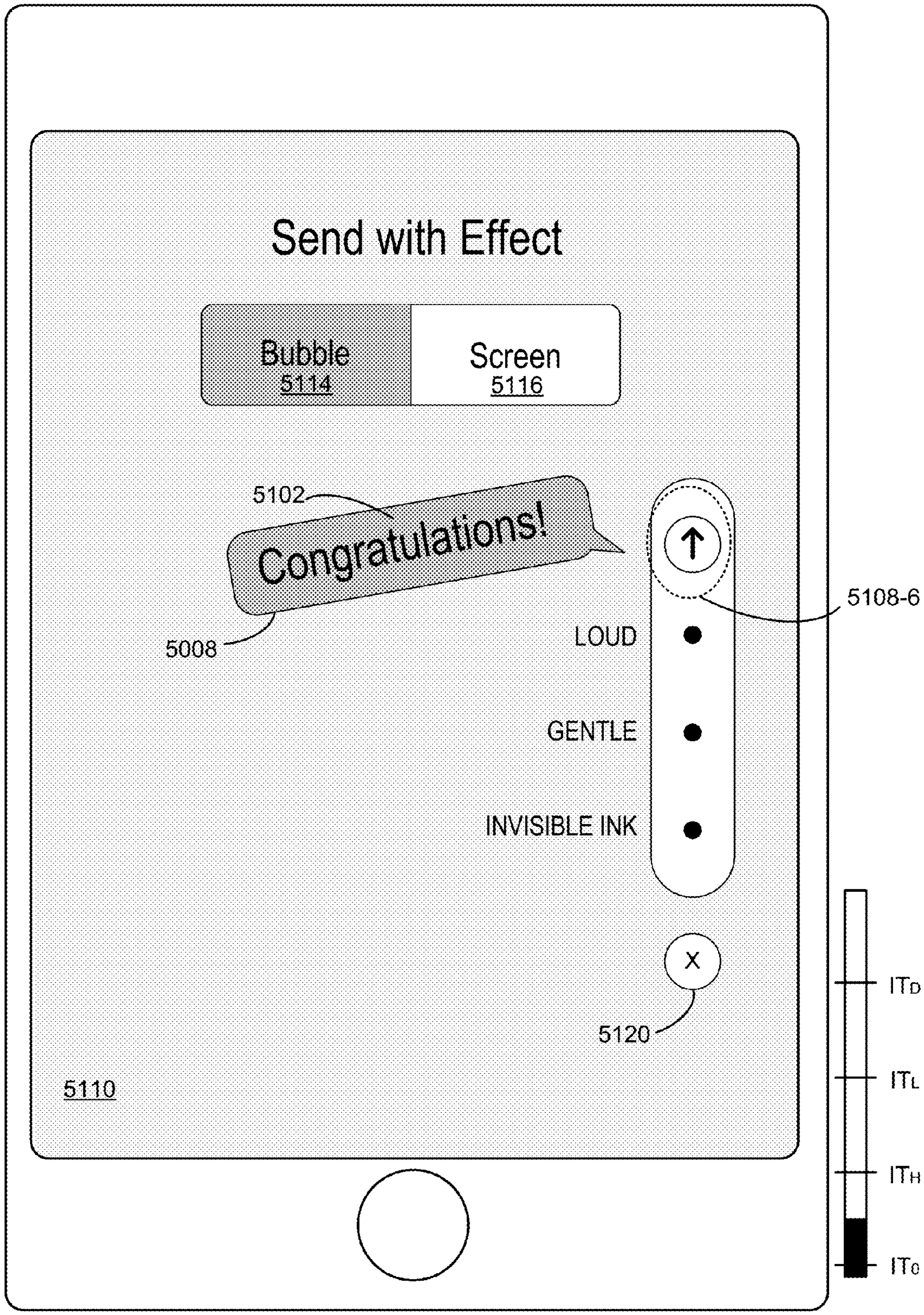
Figure 5A:
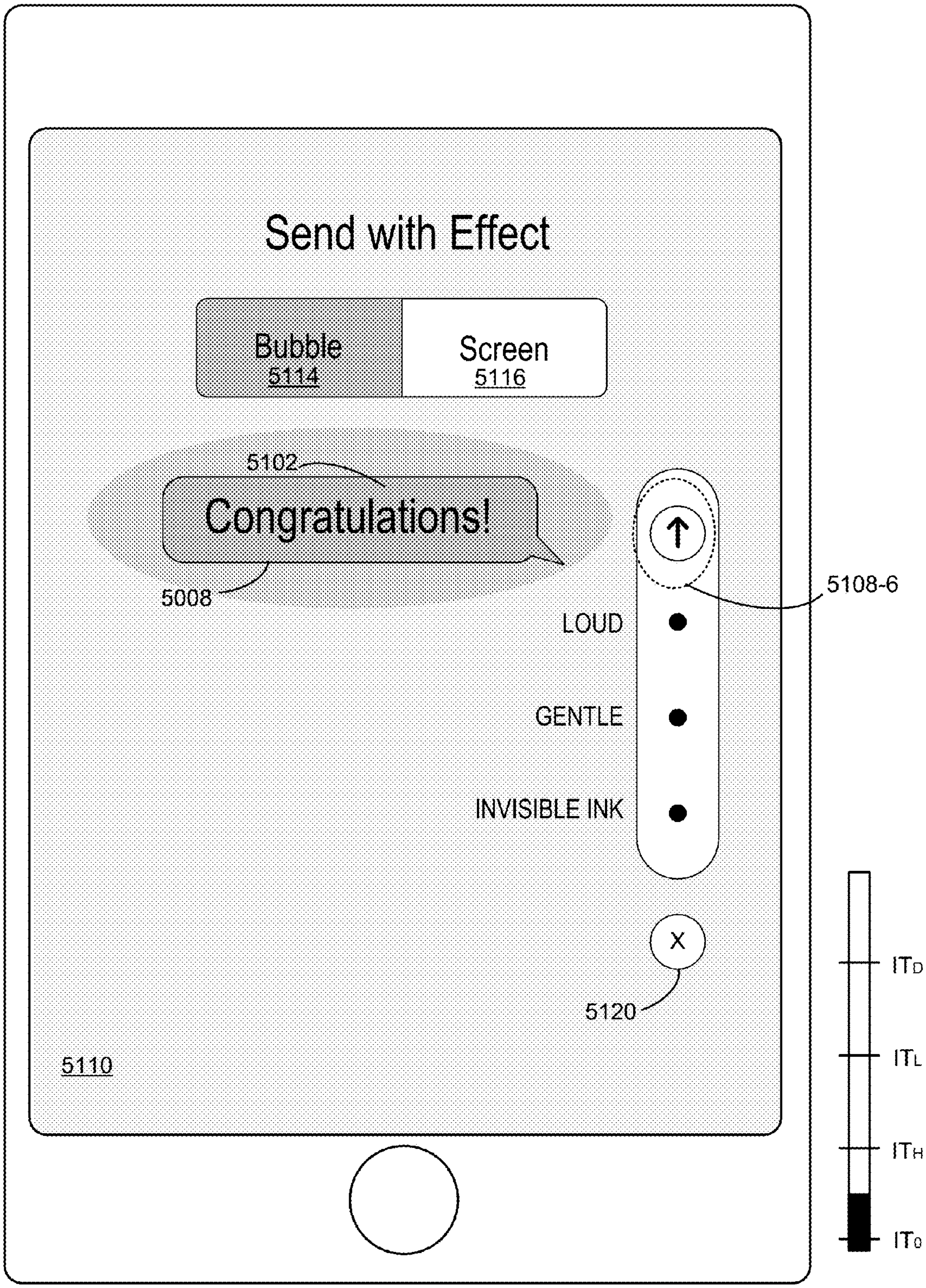
Figure 5A:
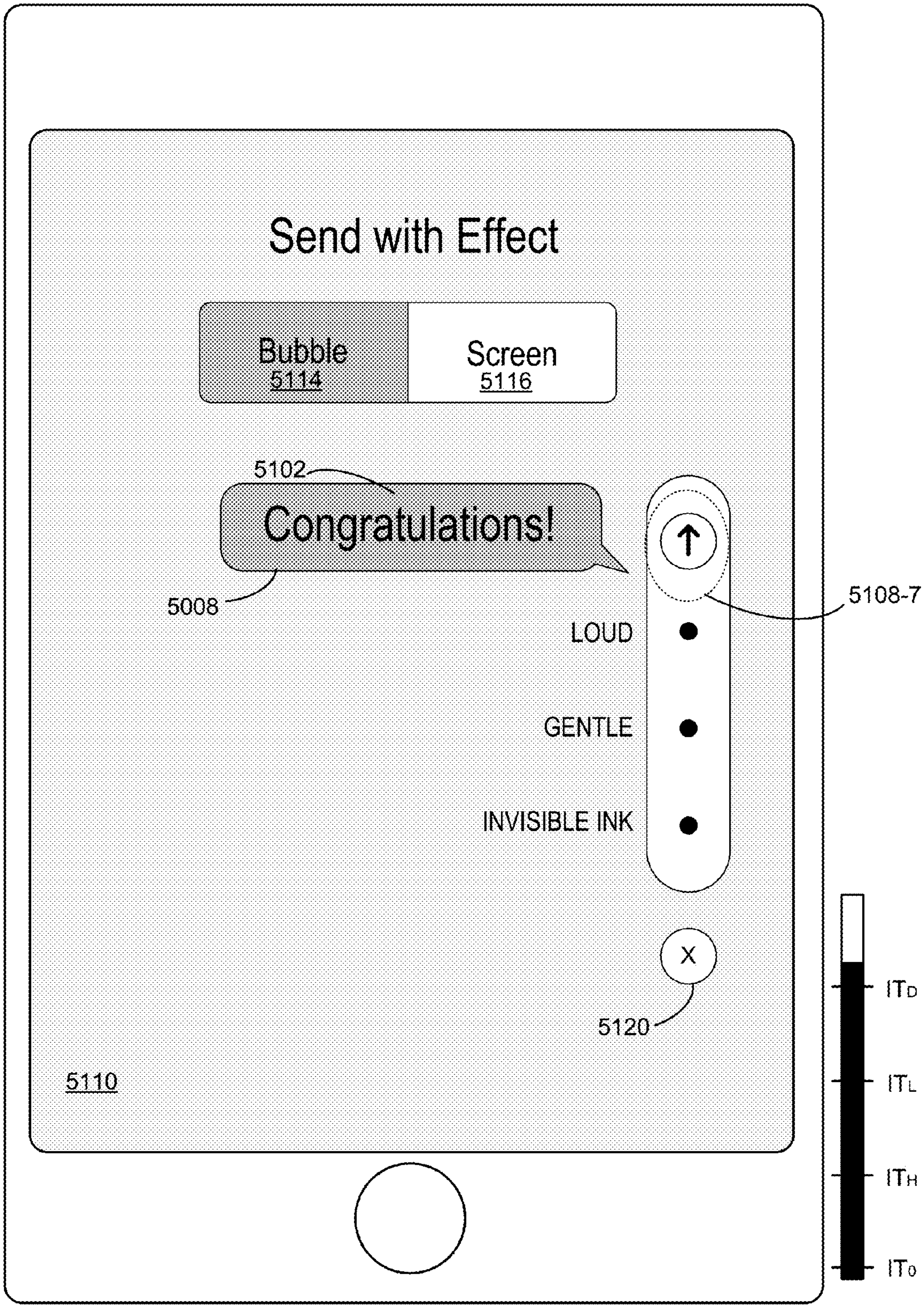
Figure 5A:
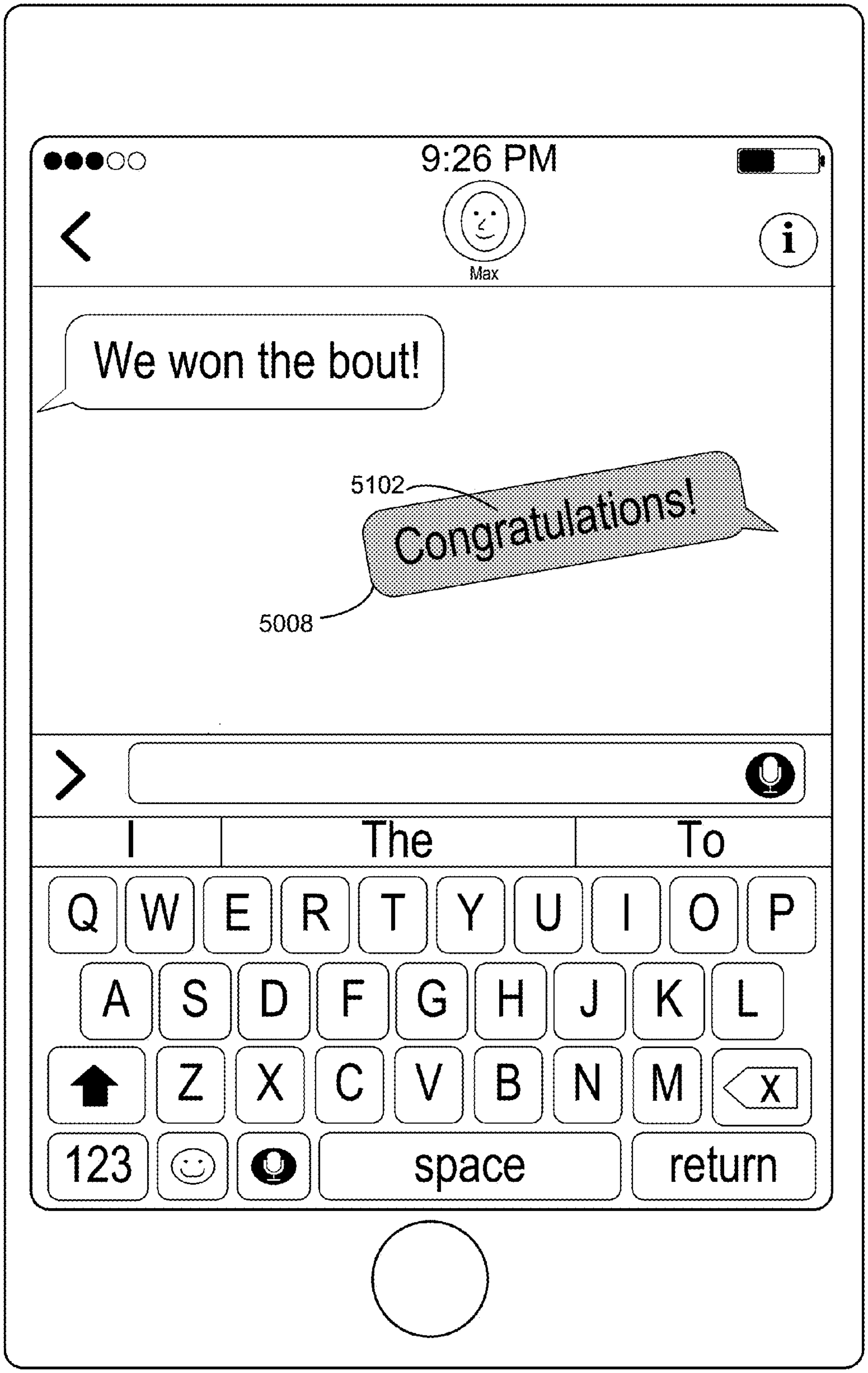
Figure 5A:
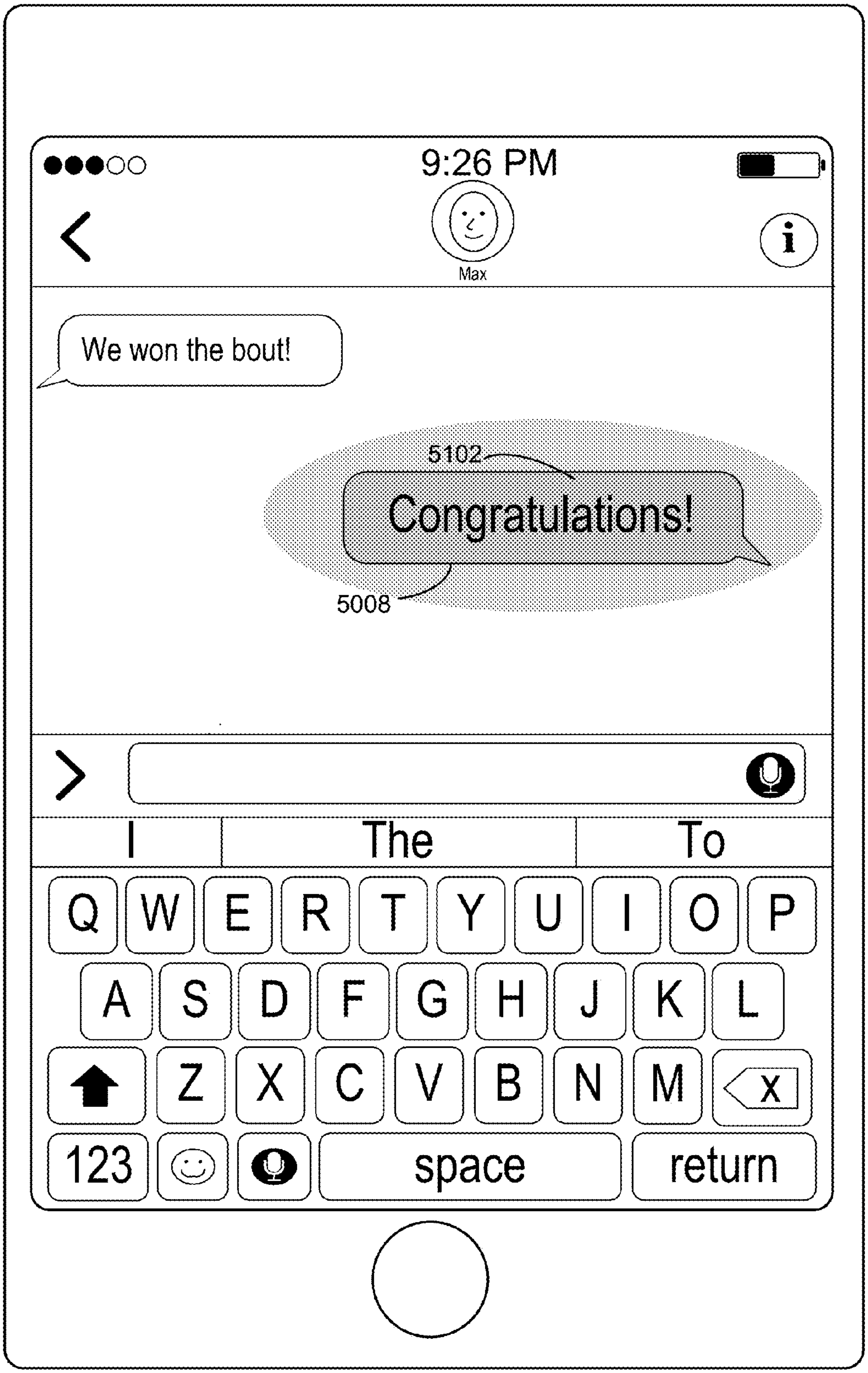
Figure 5A:
Figure 5A:
Figure 5A:
Figure 5A:
Figure 5A:
Figure 5A:
Figure 5A:
Figure 5A:
Figure 5A:
Figure 5A:
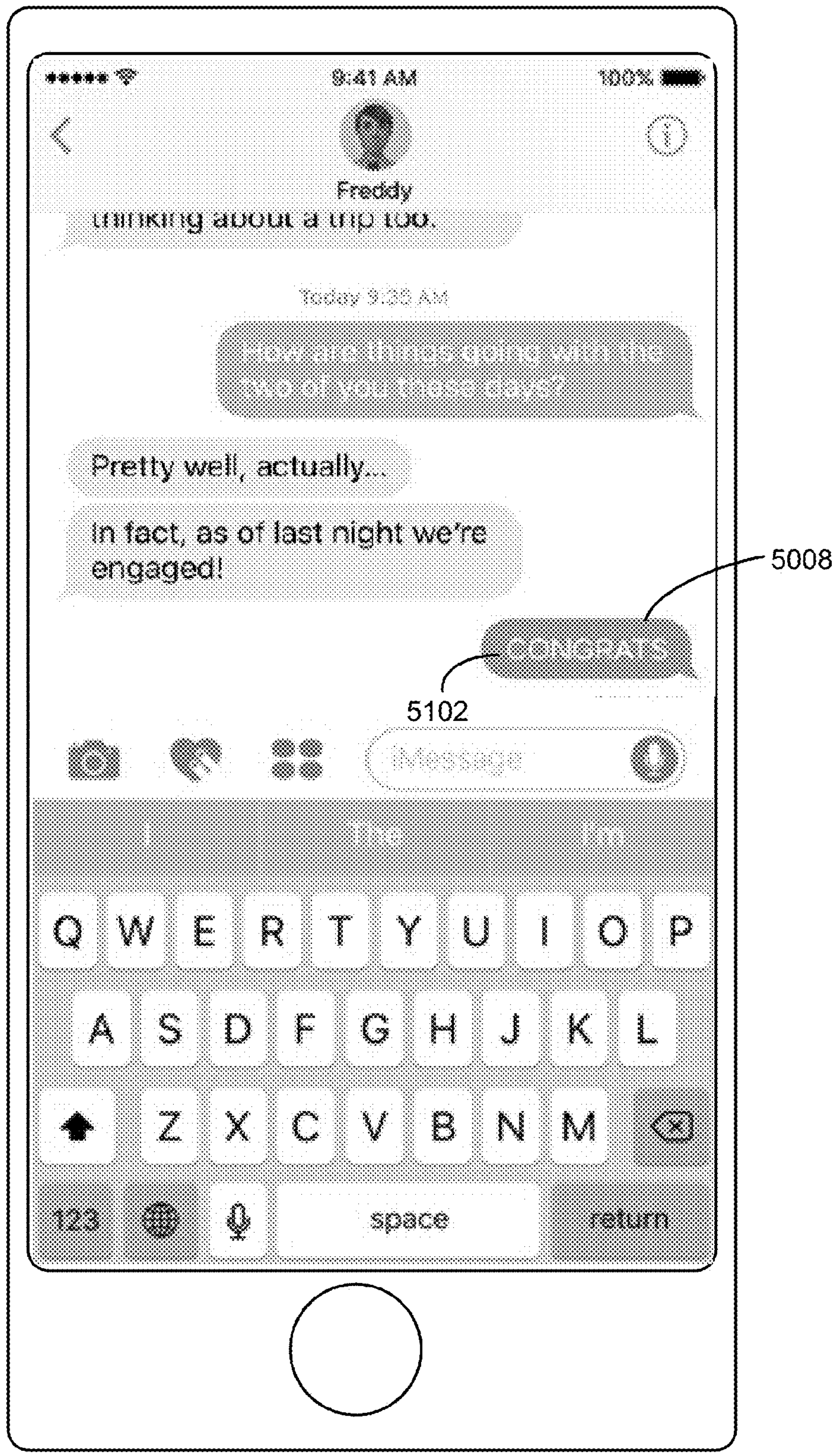
Figure 5A:
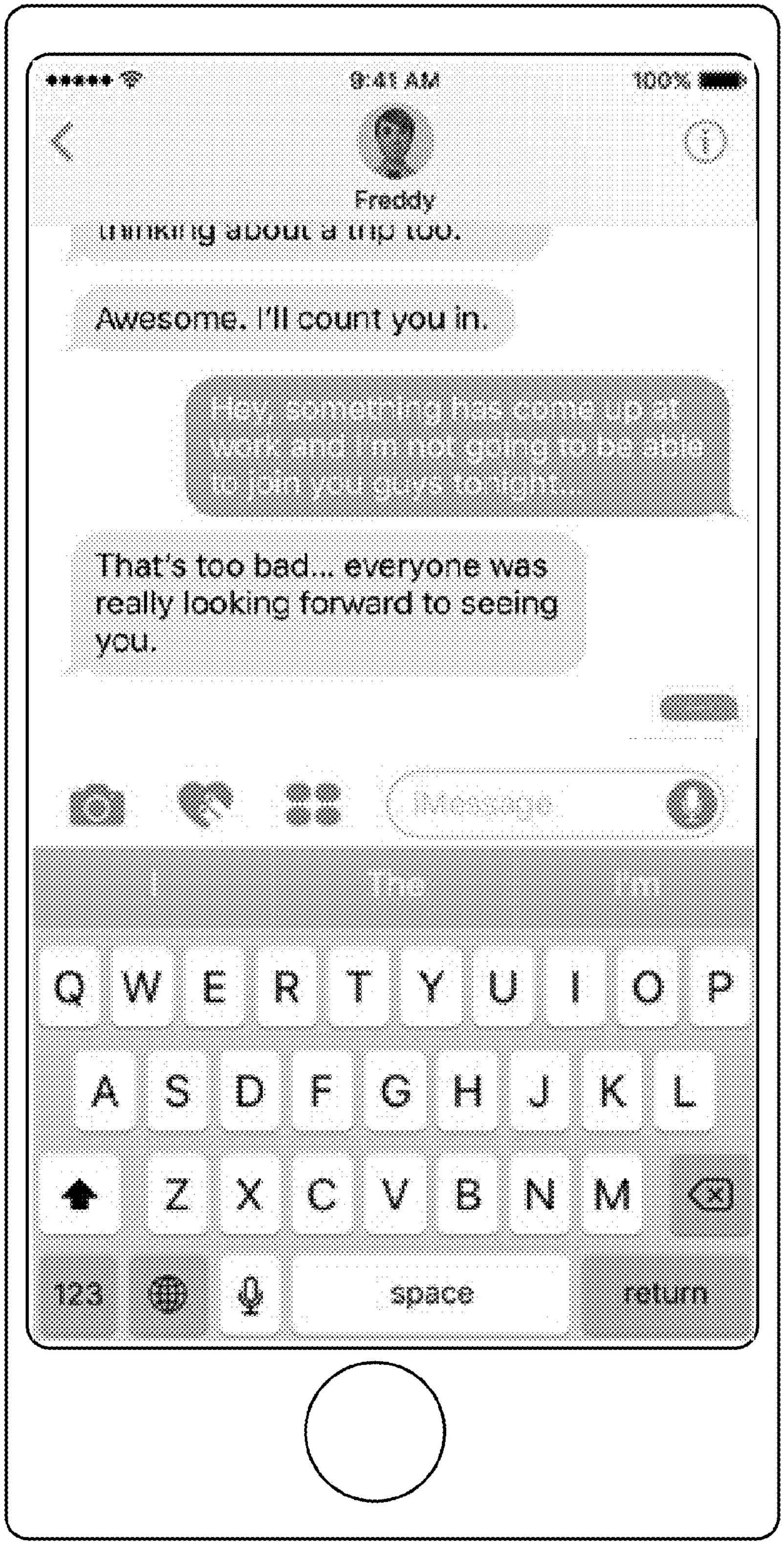
Figure 5A:
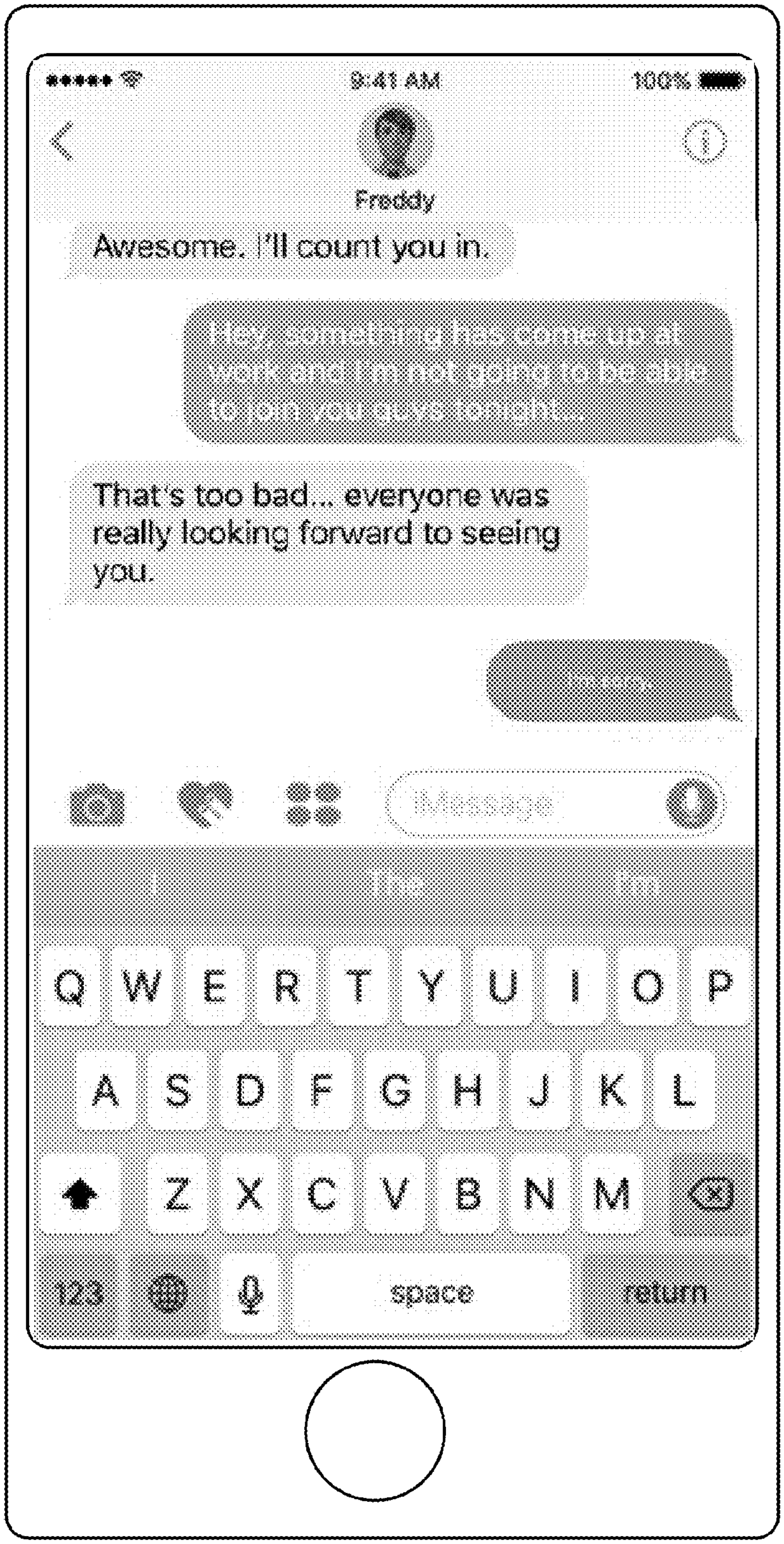
Figure 5A:
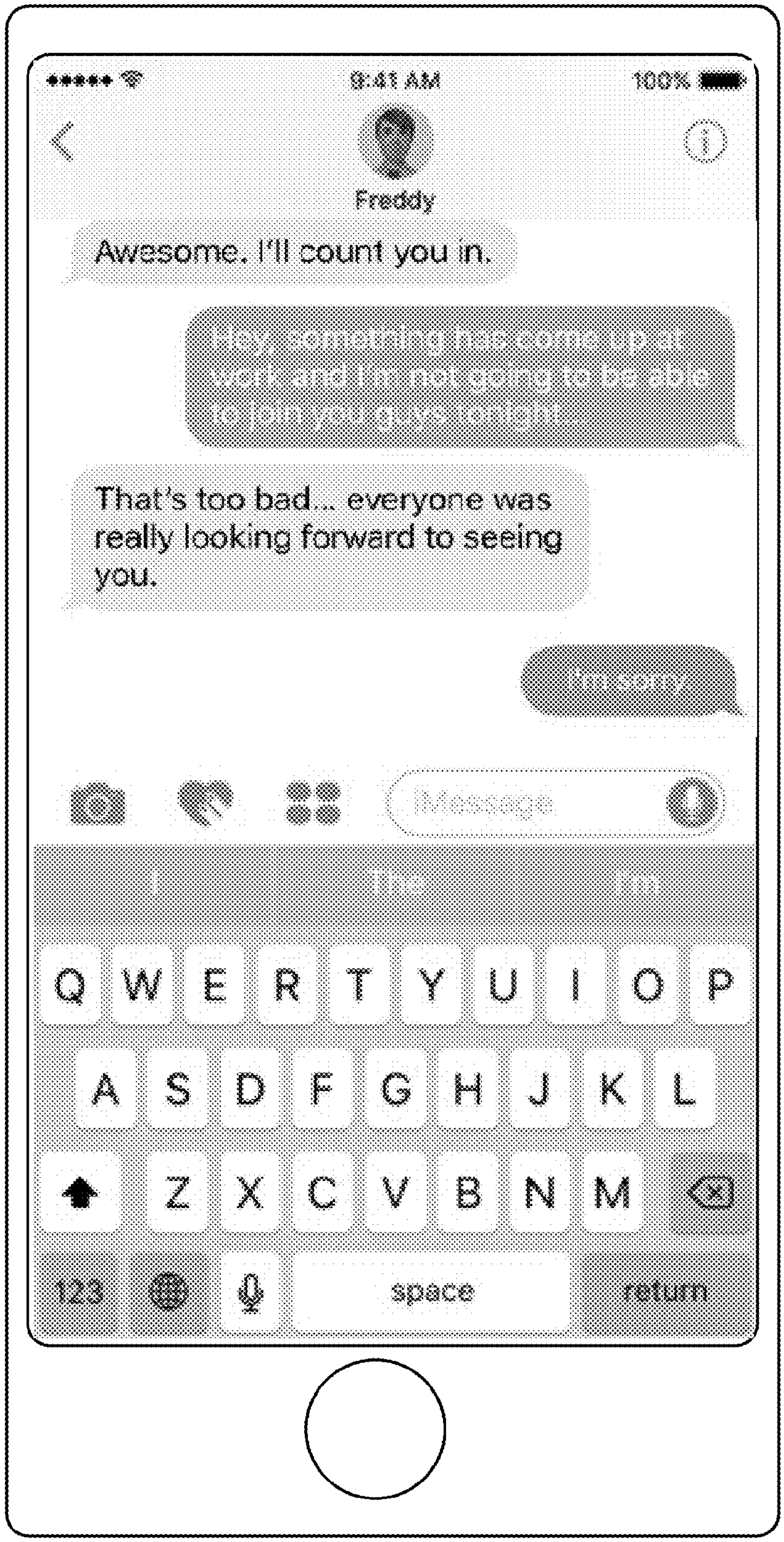
Figure 5A:
Figure 5A:
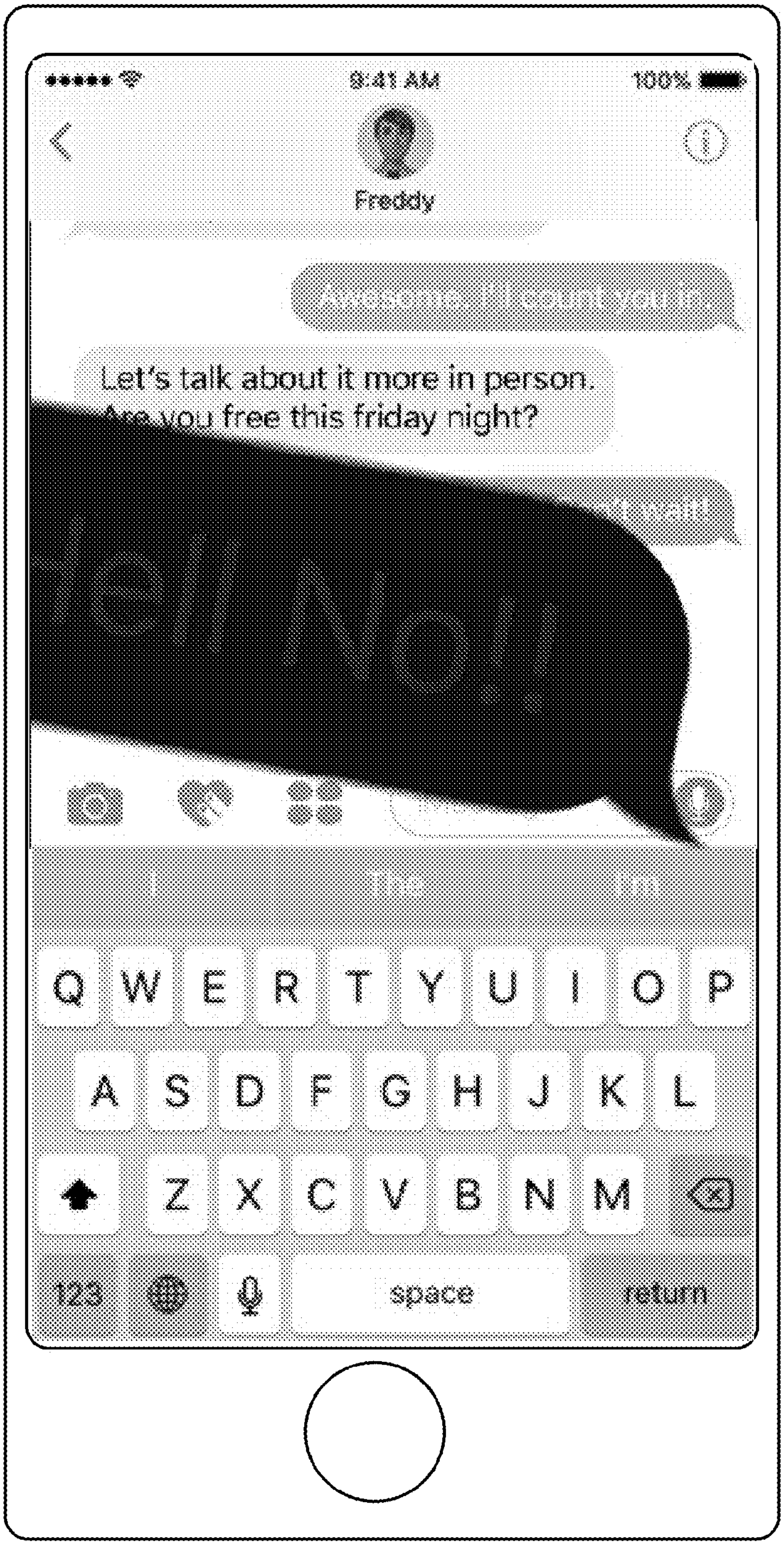
Figure 5A:
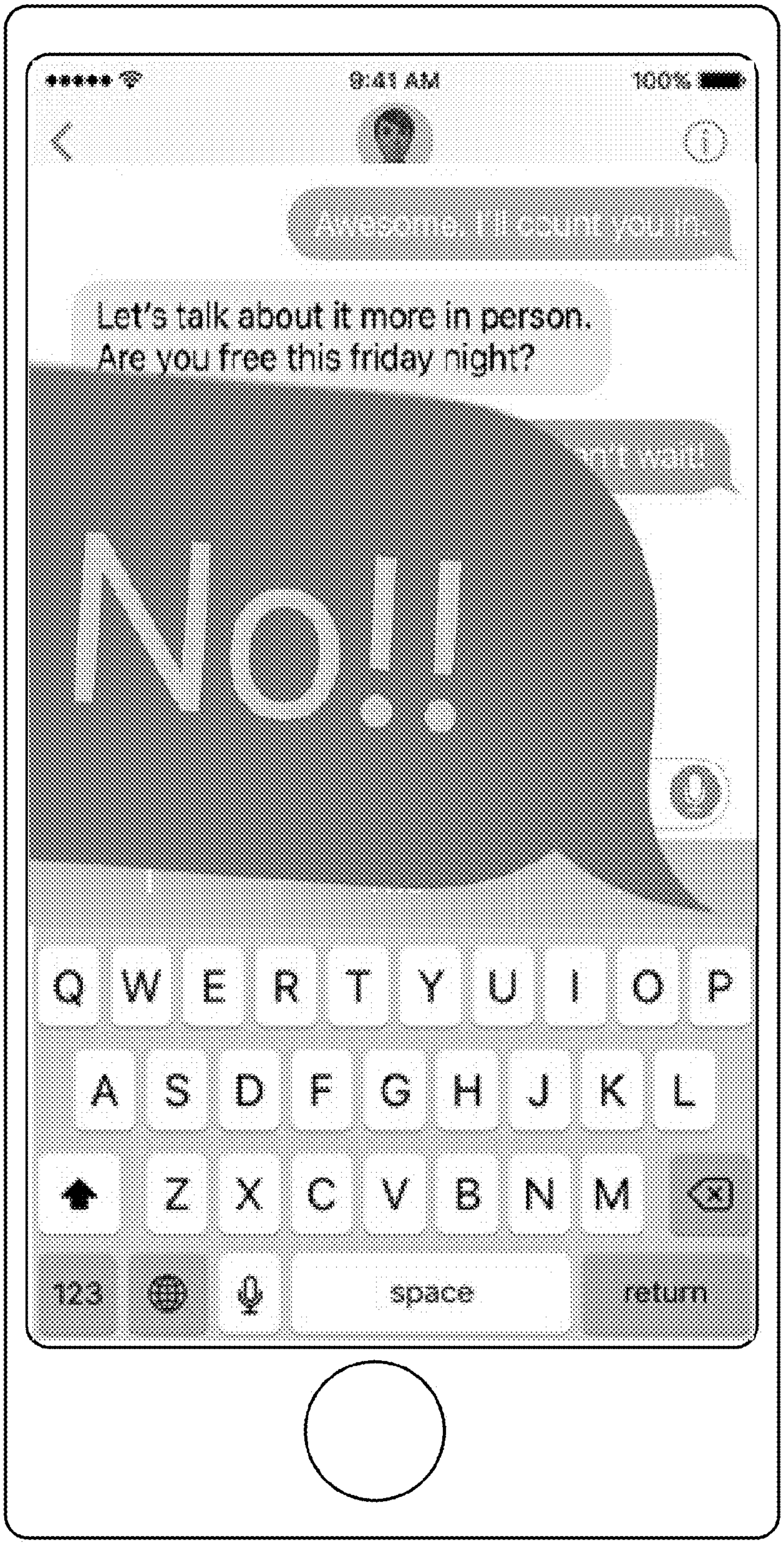
Figure 5A:
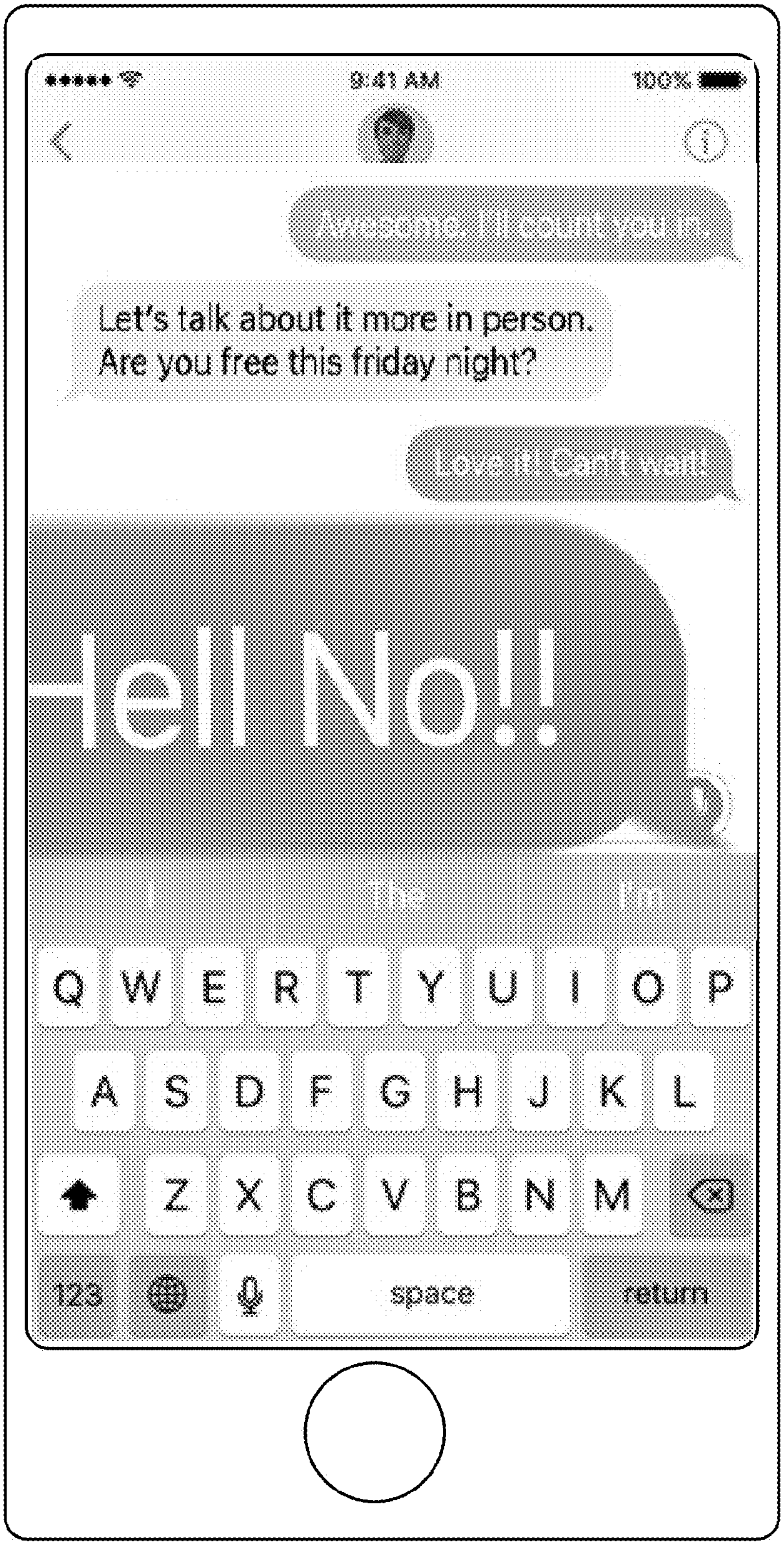
Figure 5B:
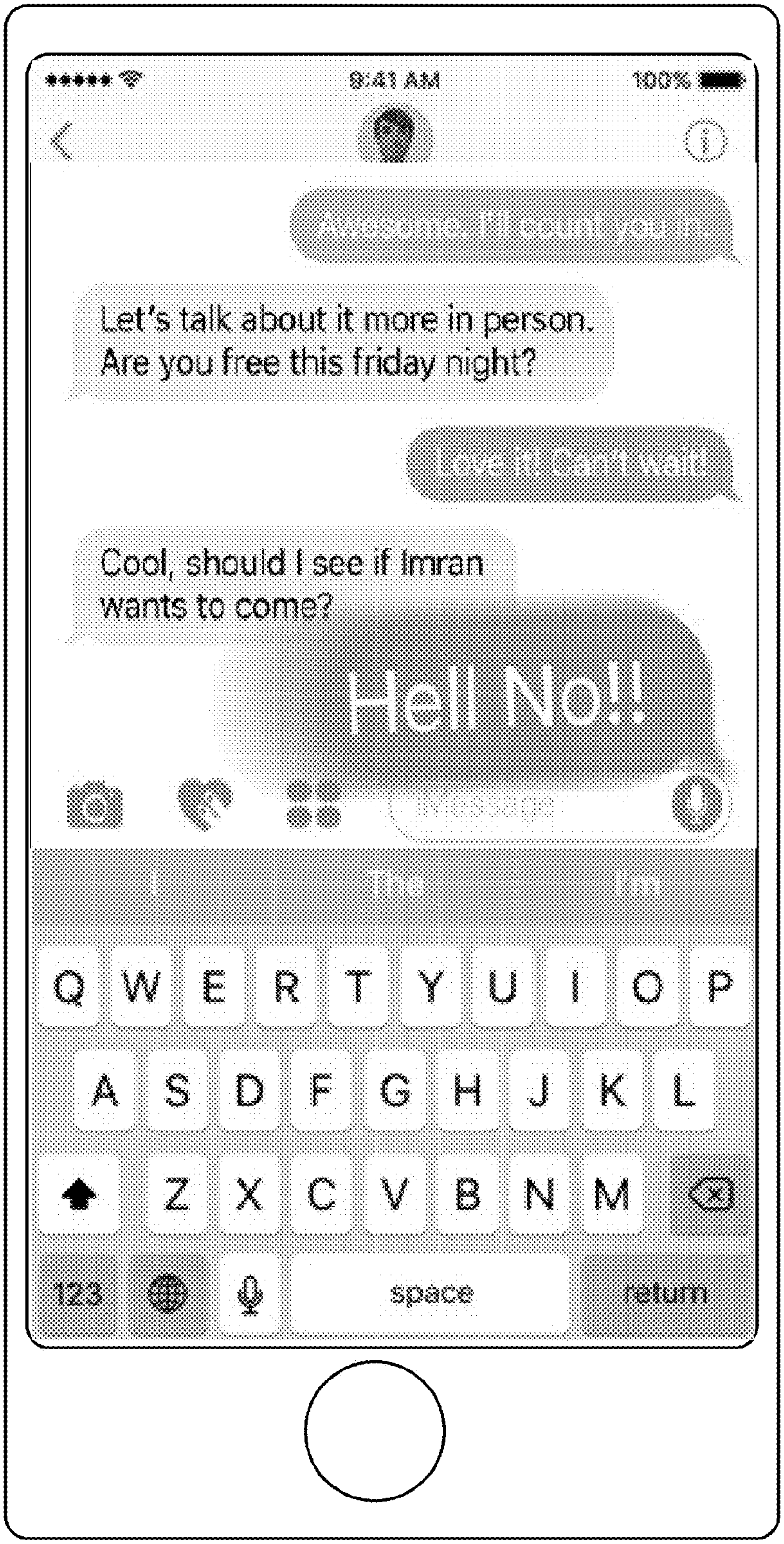
Figure 5B:
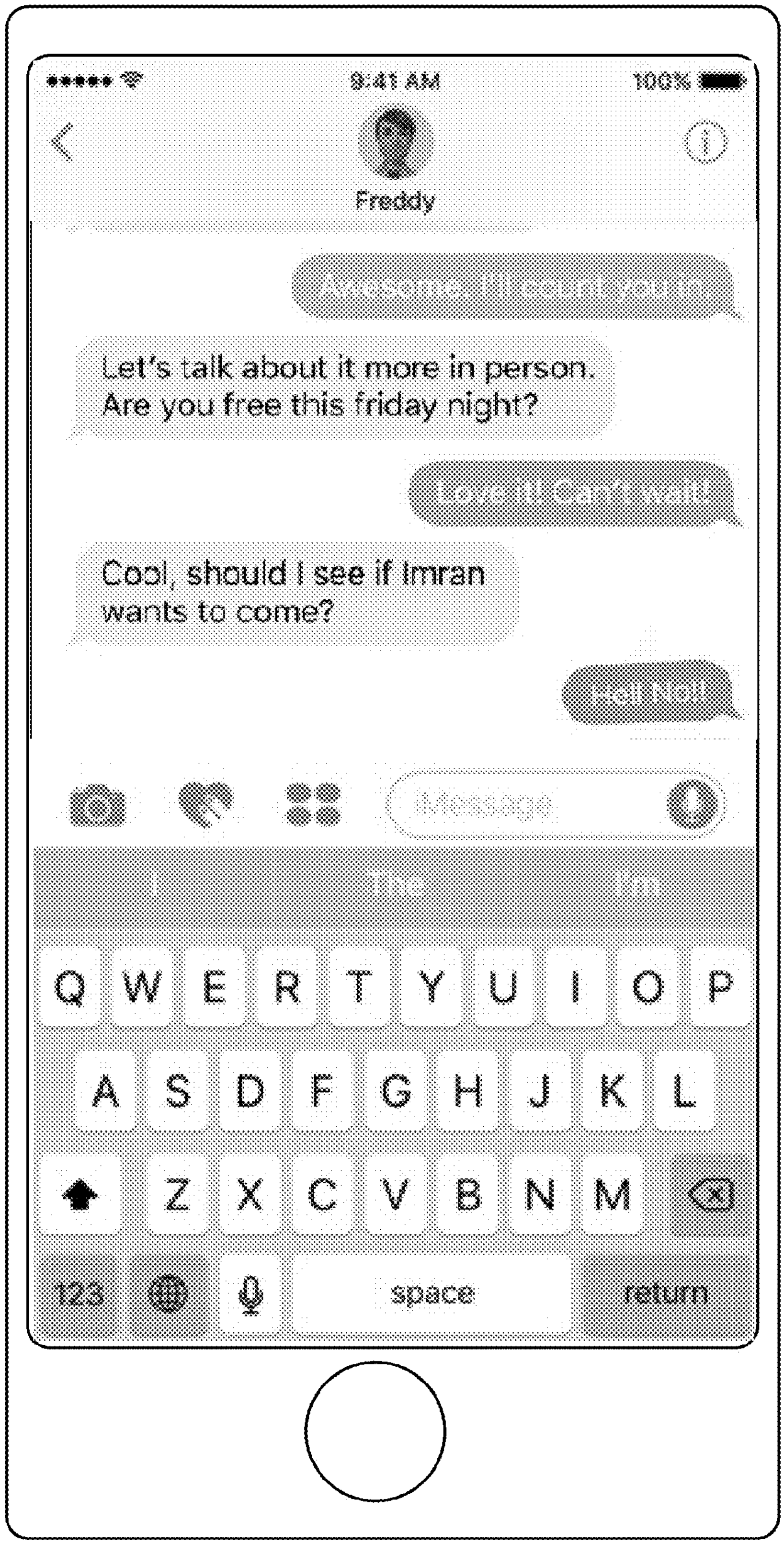
Figure 5B:
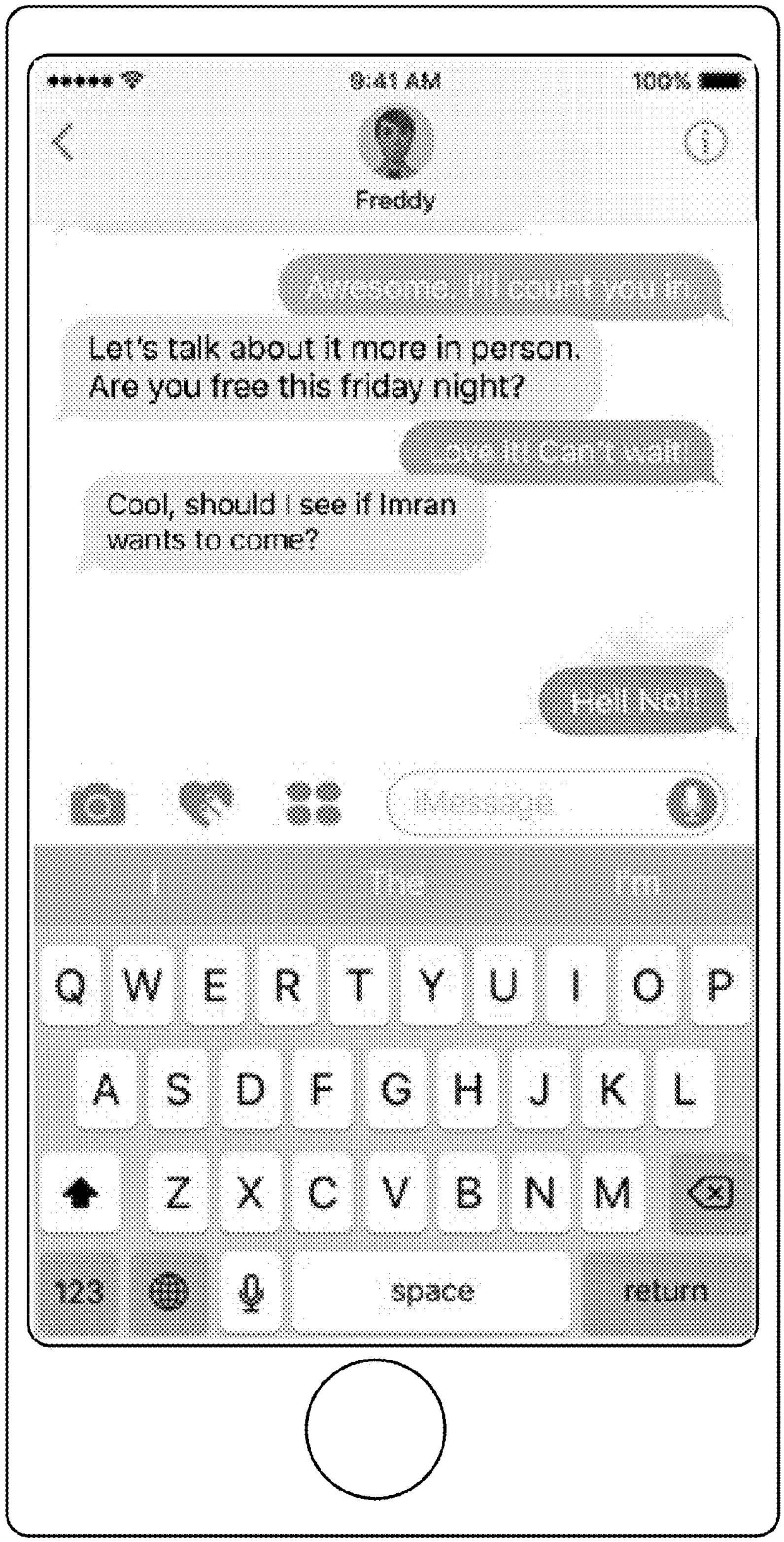
Figure 5B:
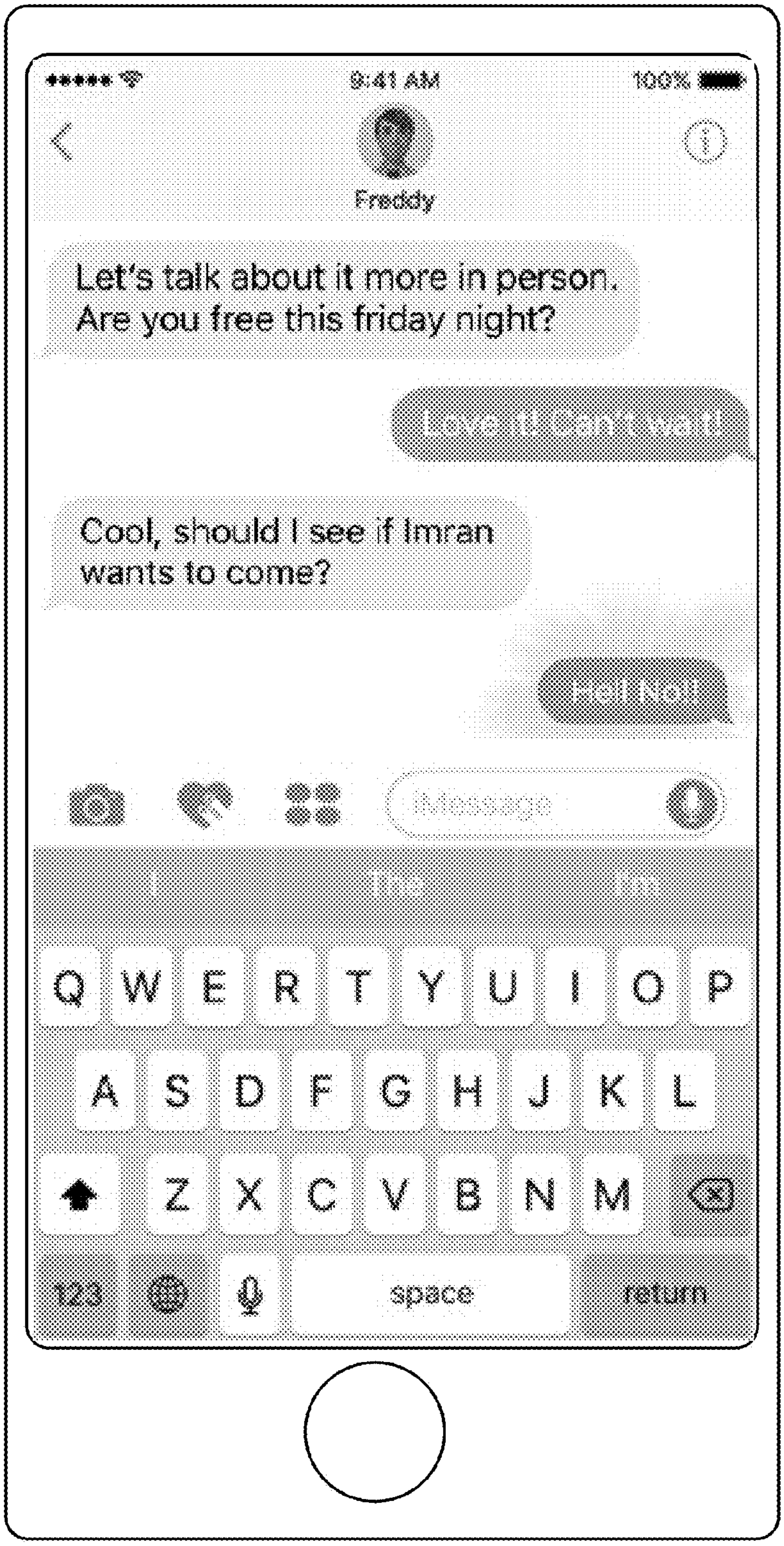
Figure 5B:
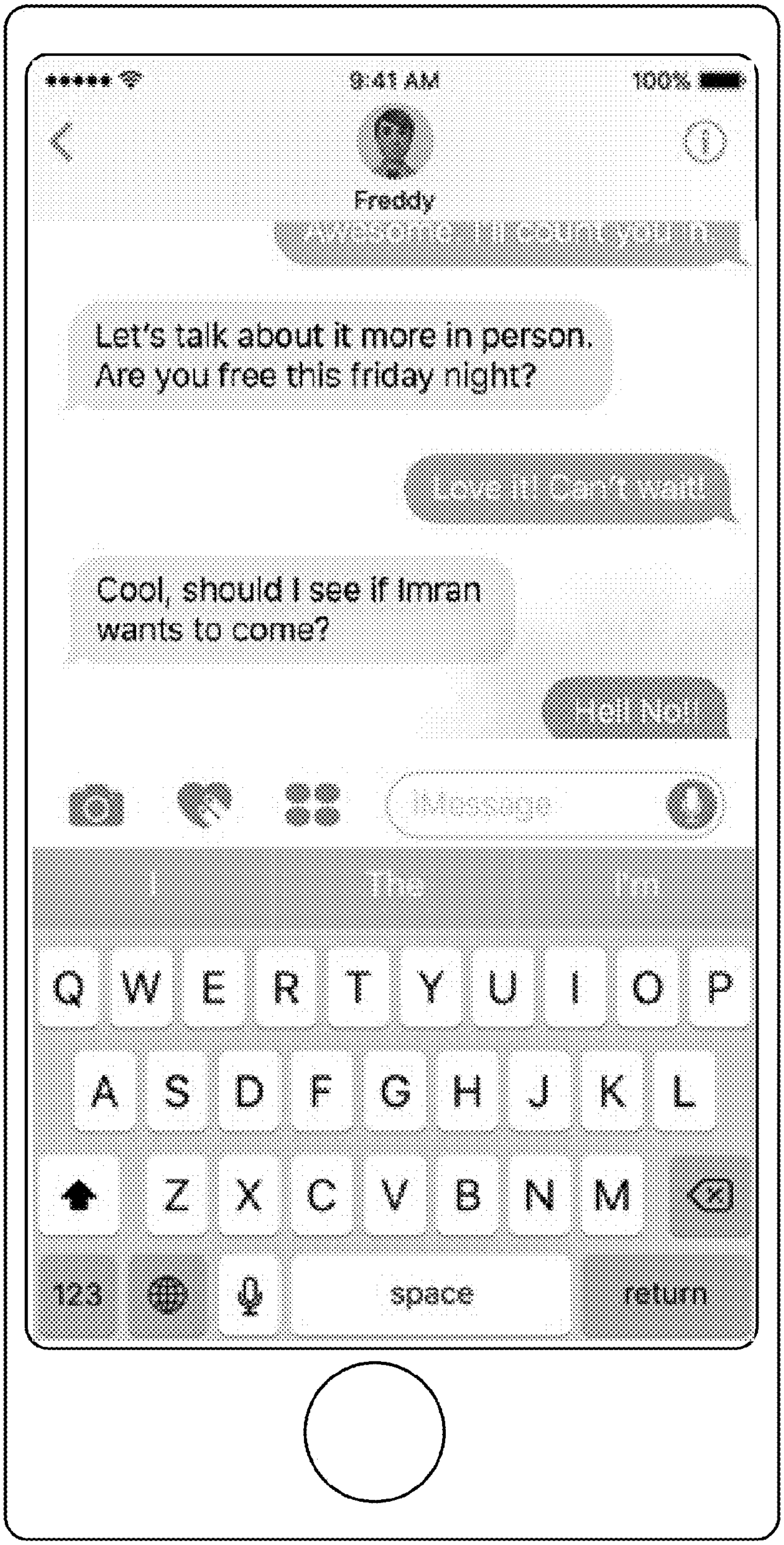
Figure 5B:
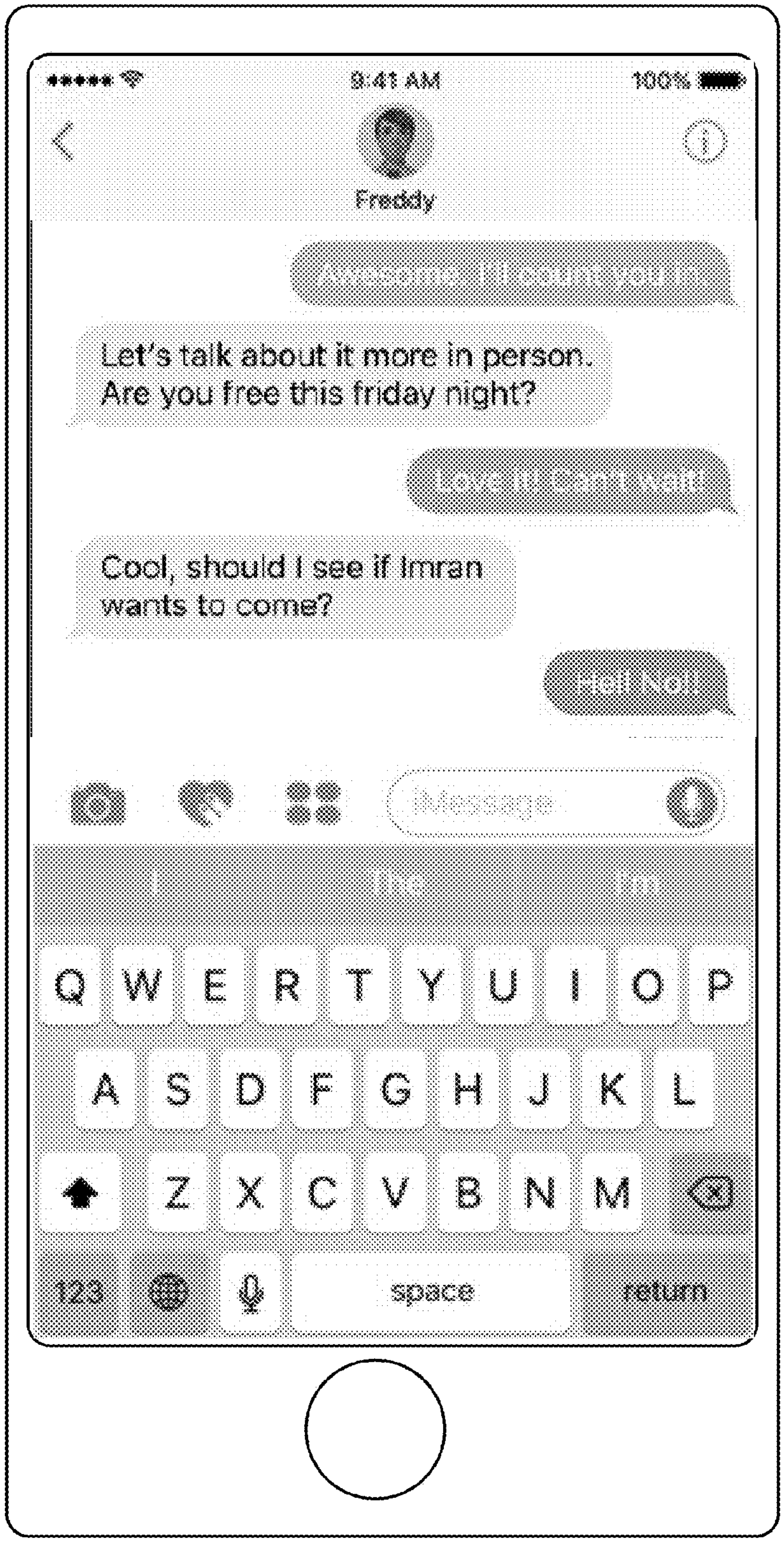
Figure 5B:
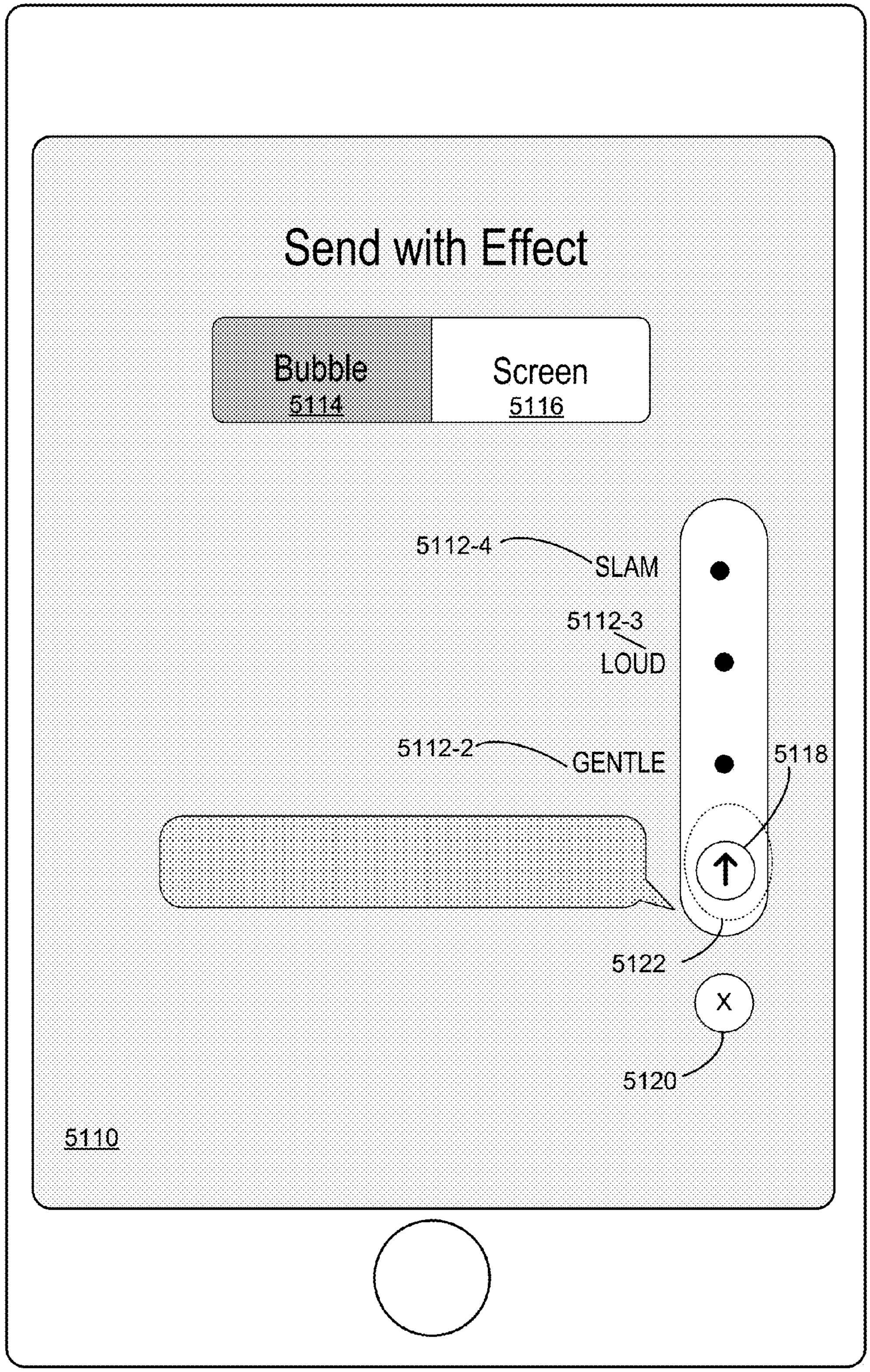
Figure 5B:
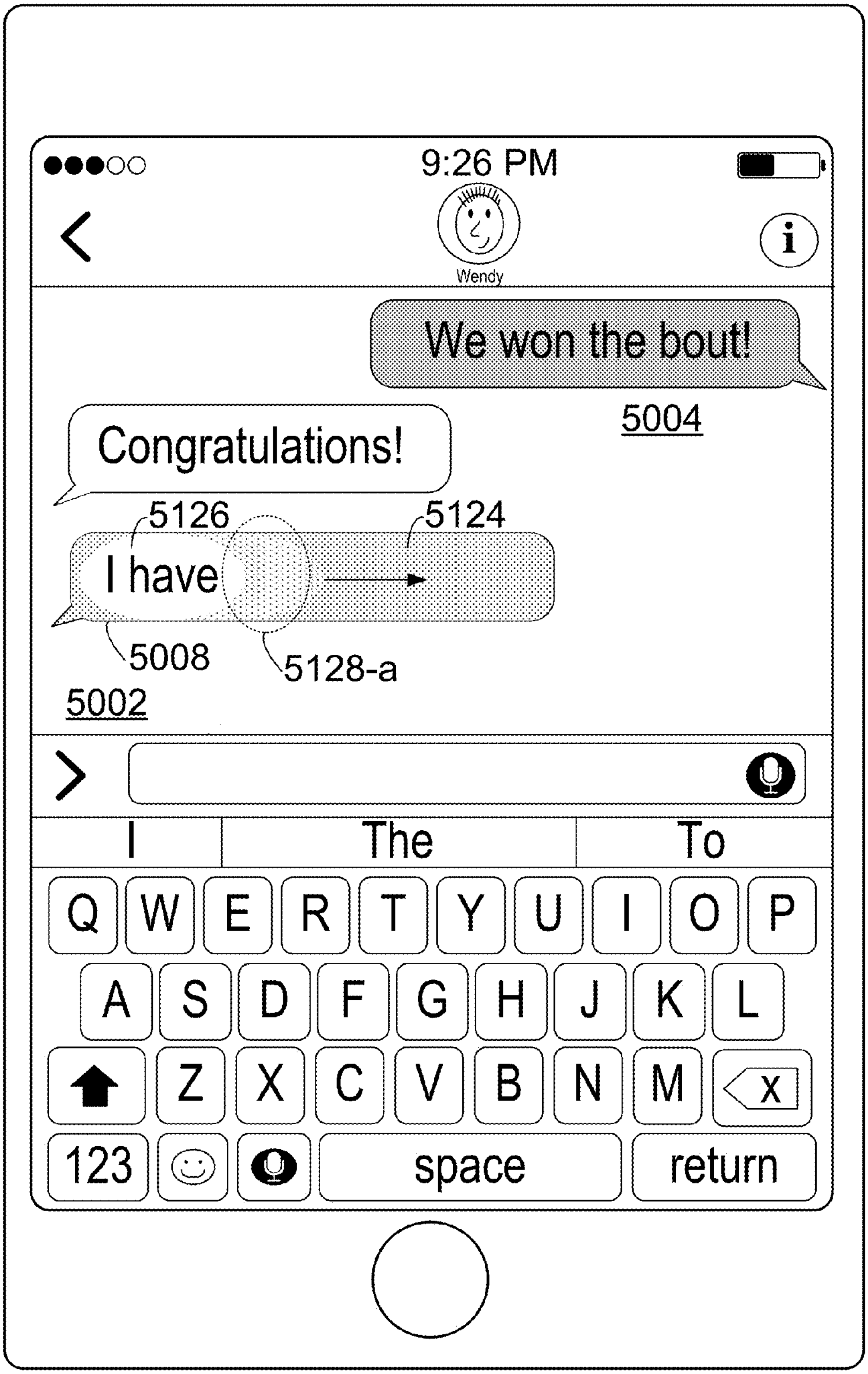
Figure 5B:
Figure 5B:
Figure 5B:
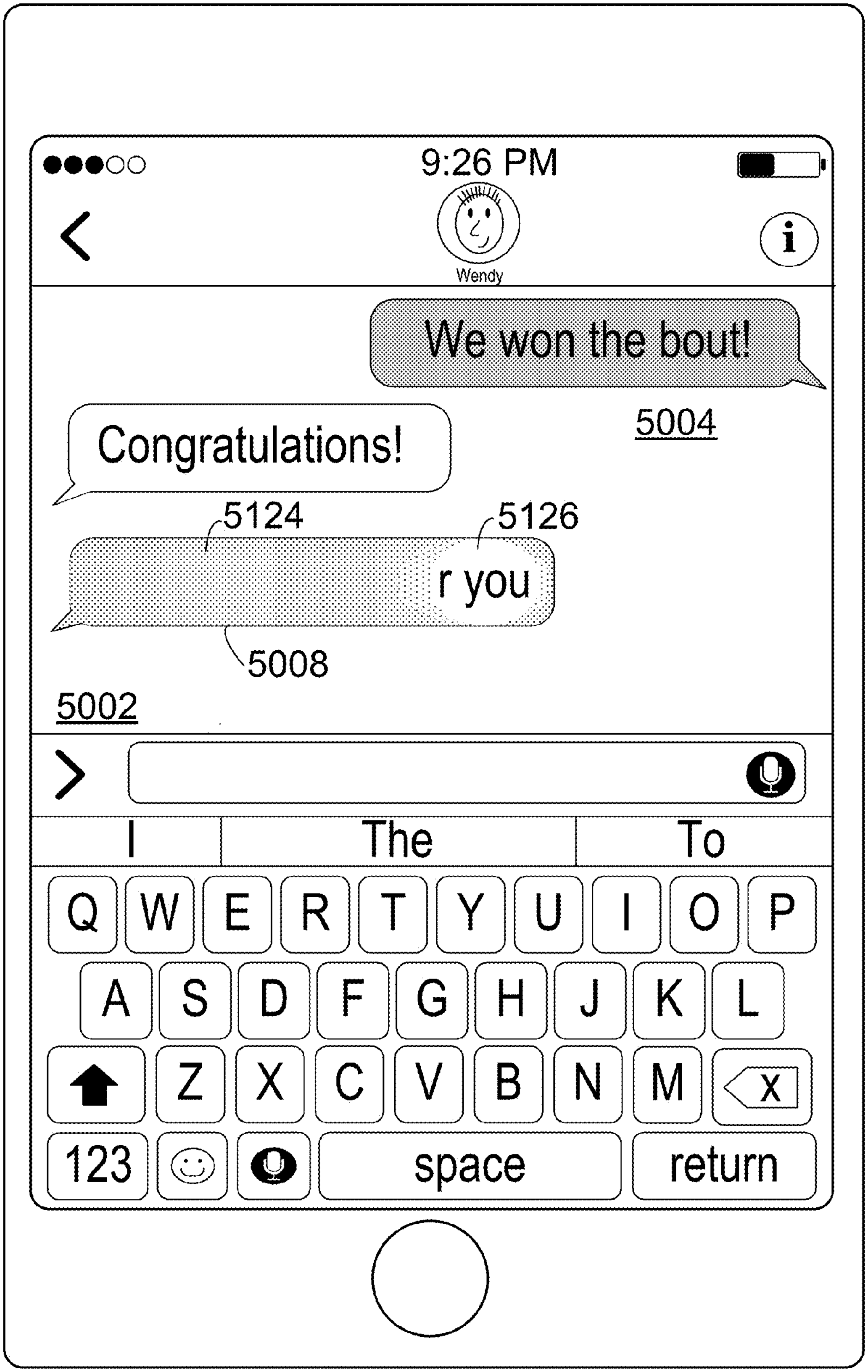
Figure 5B:
Figure 5B:
Figure 5B:
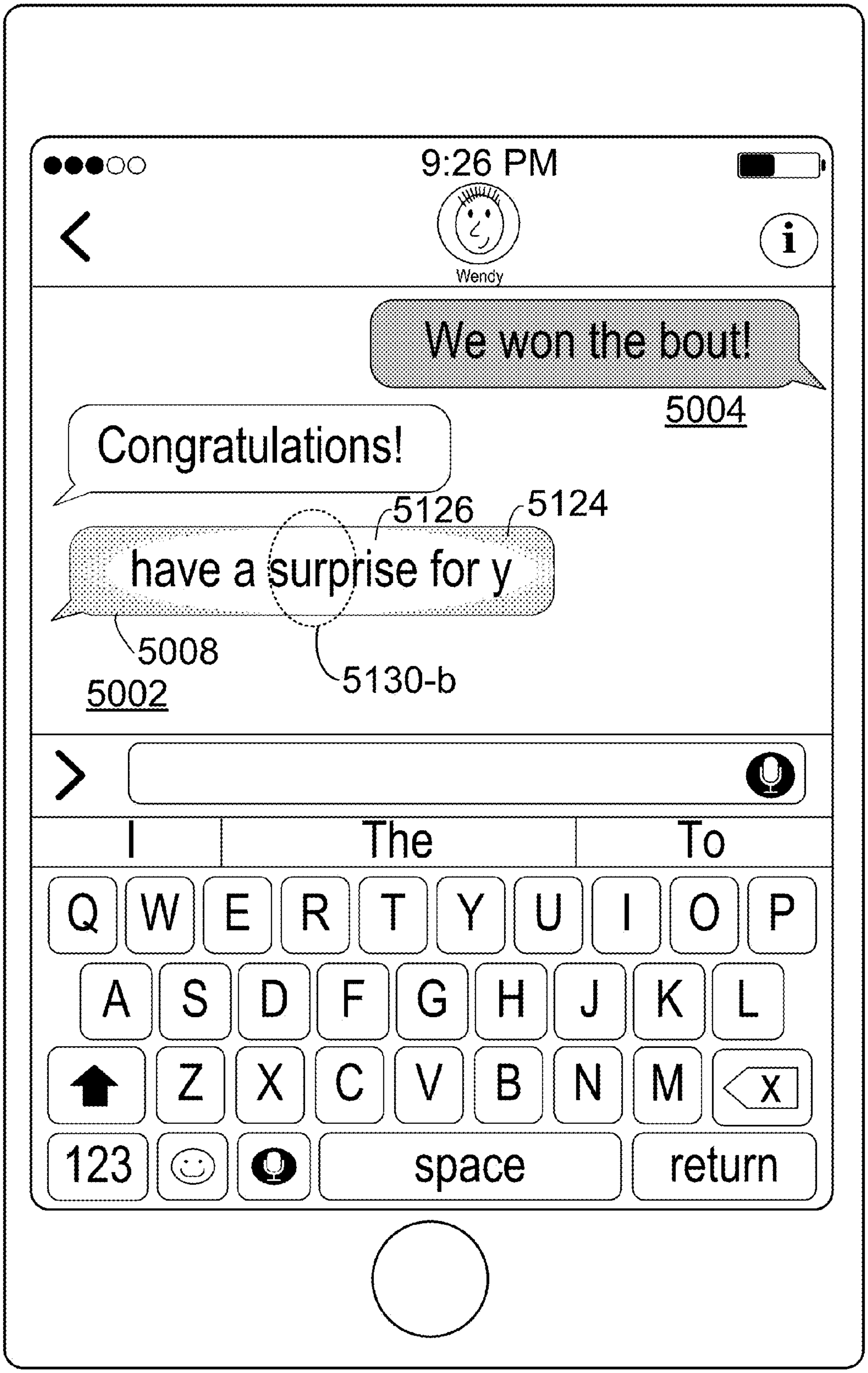
Figure 5B:
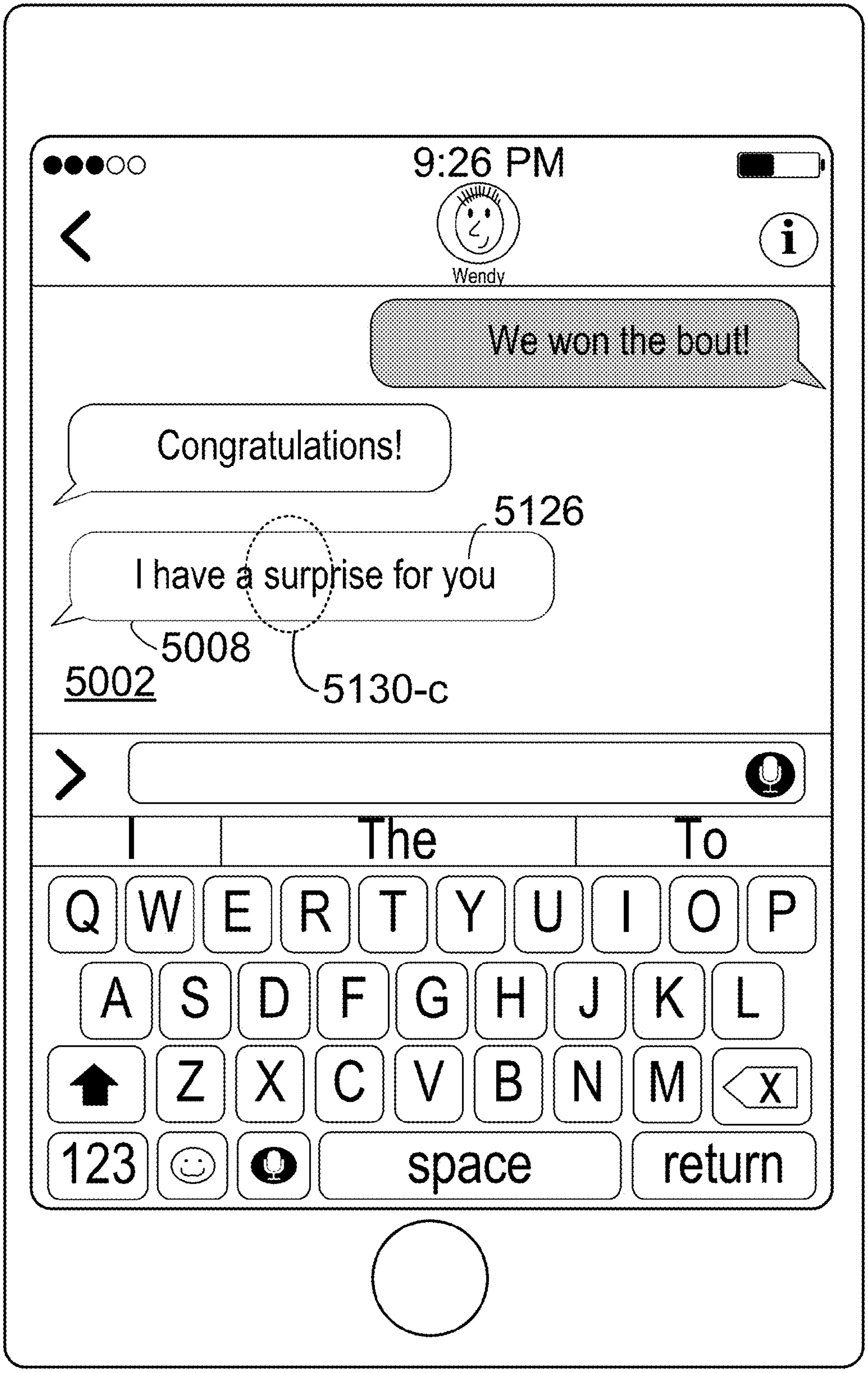
Figure 5B:
Figure 5B:
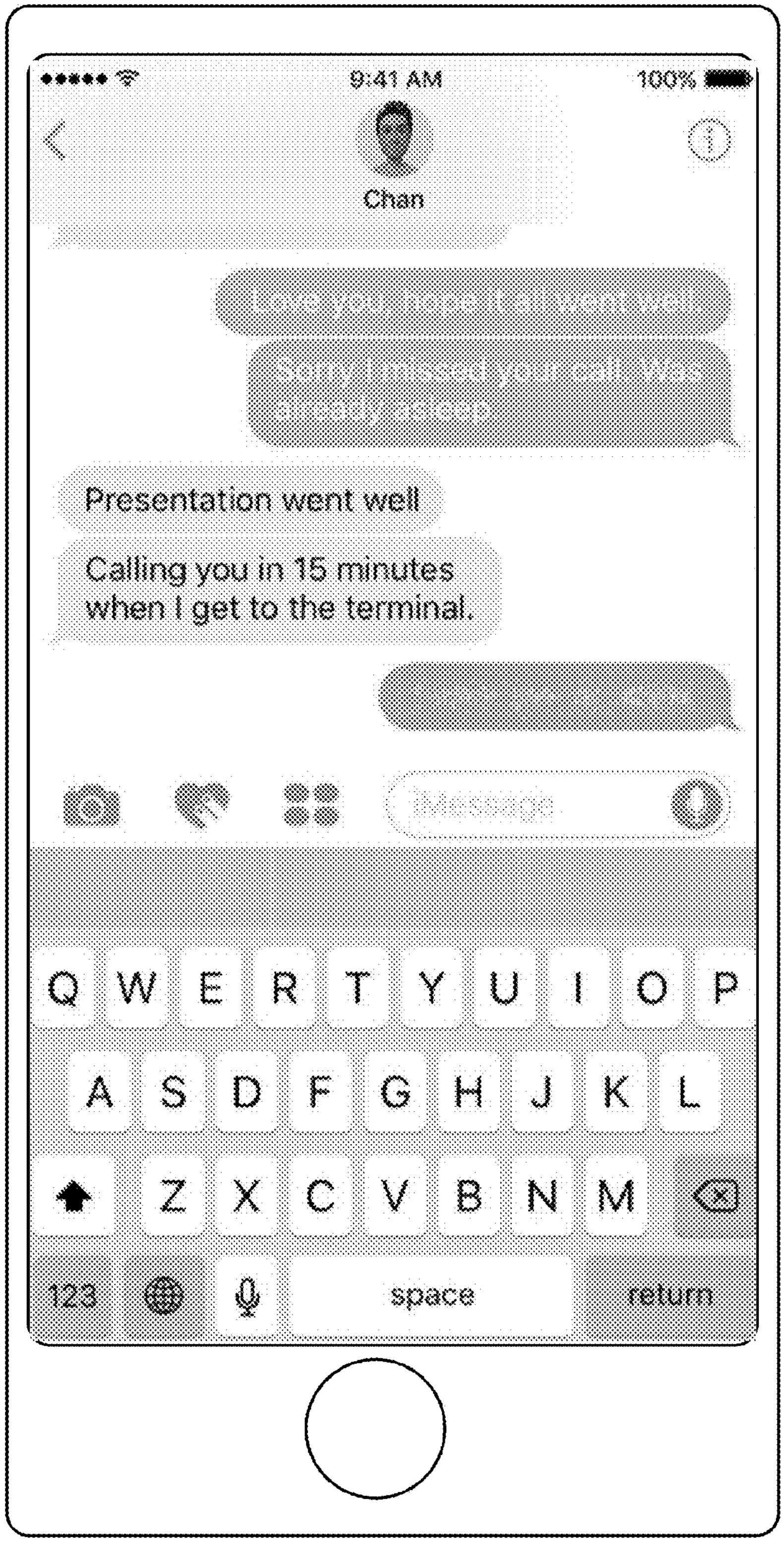
Figure 5B:
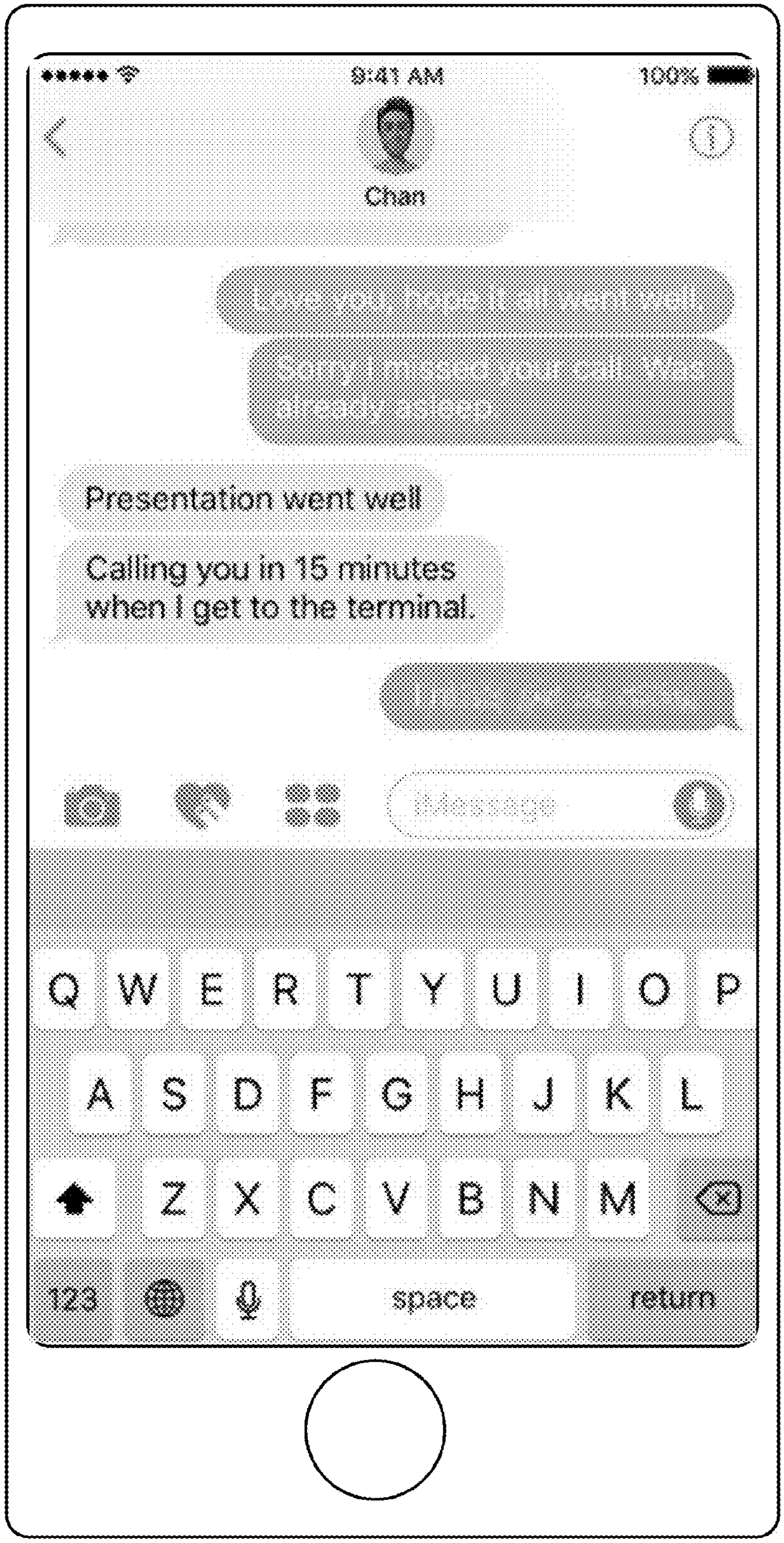
Figure 5B:
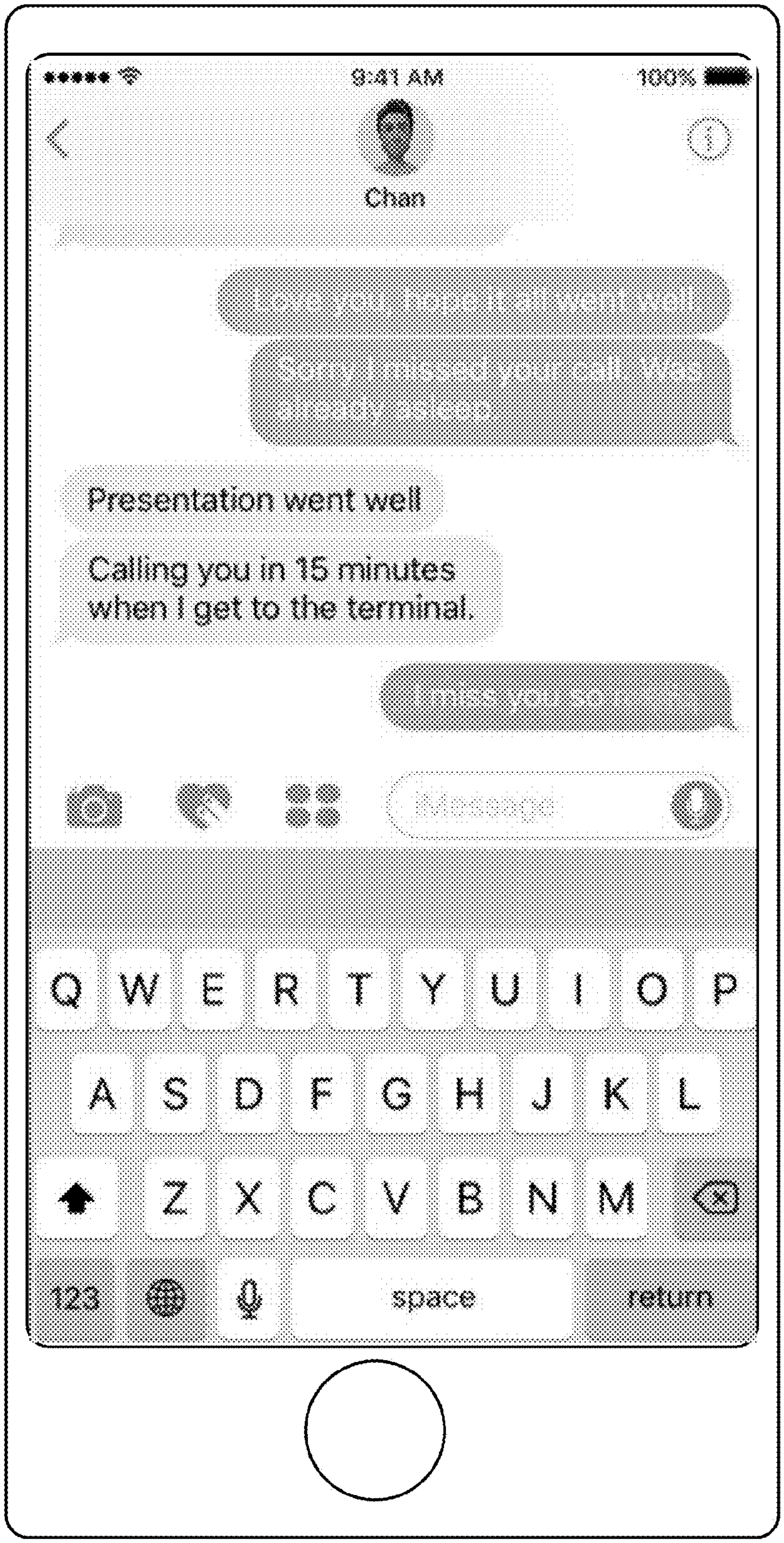
Figure 5B:
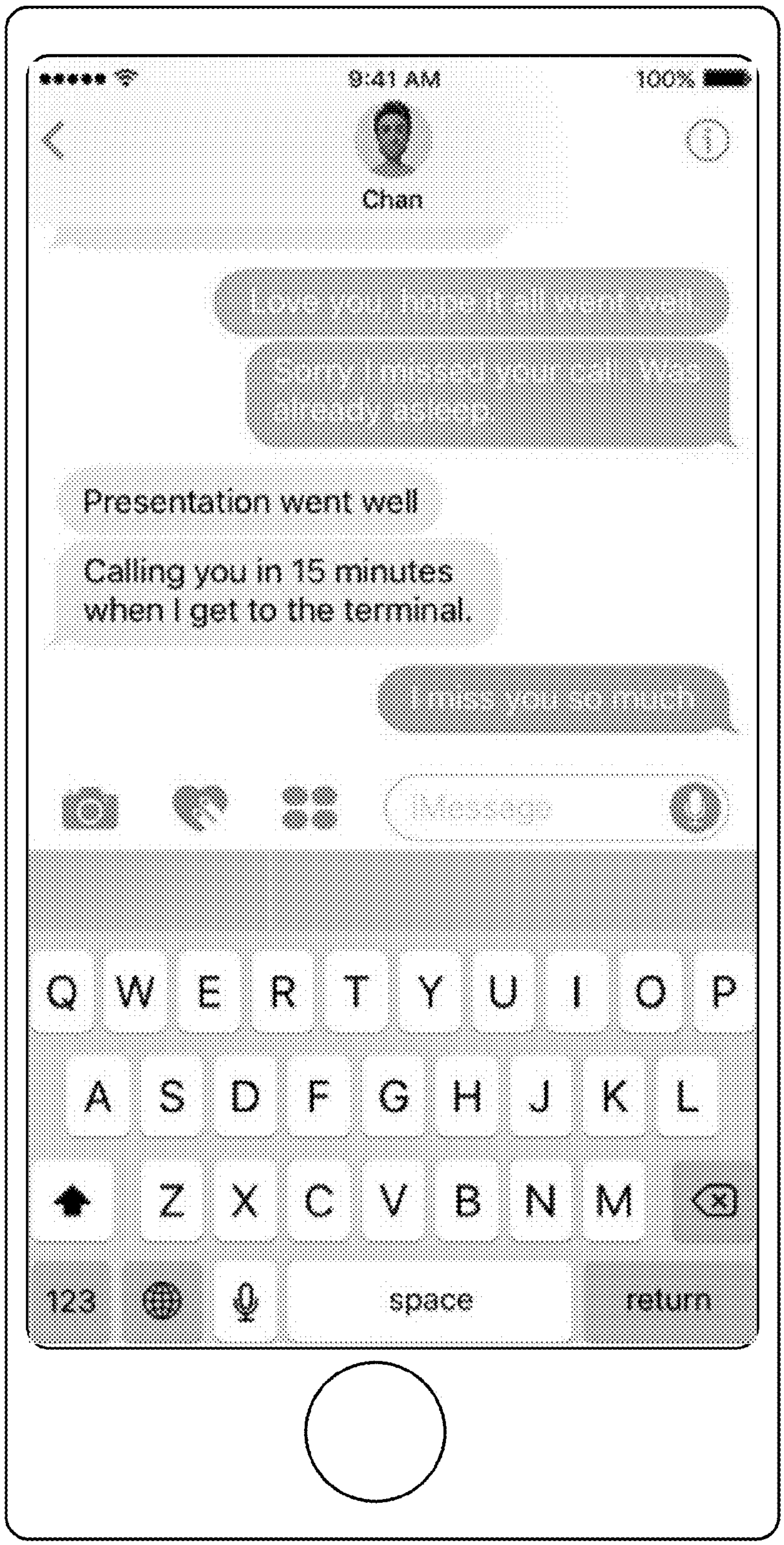
Figure 5B:
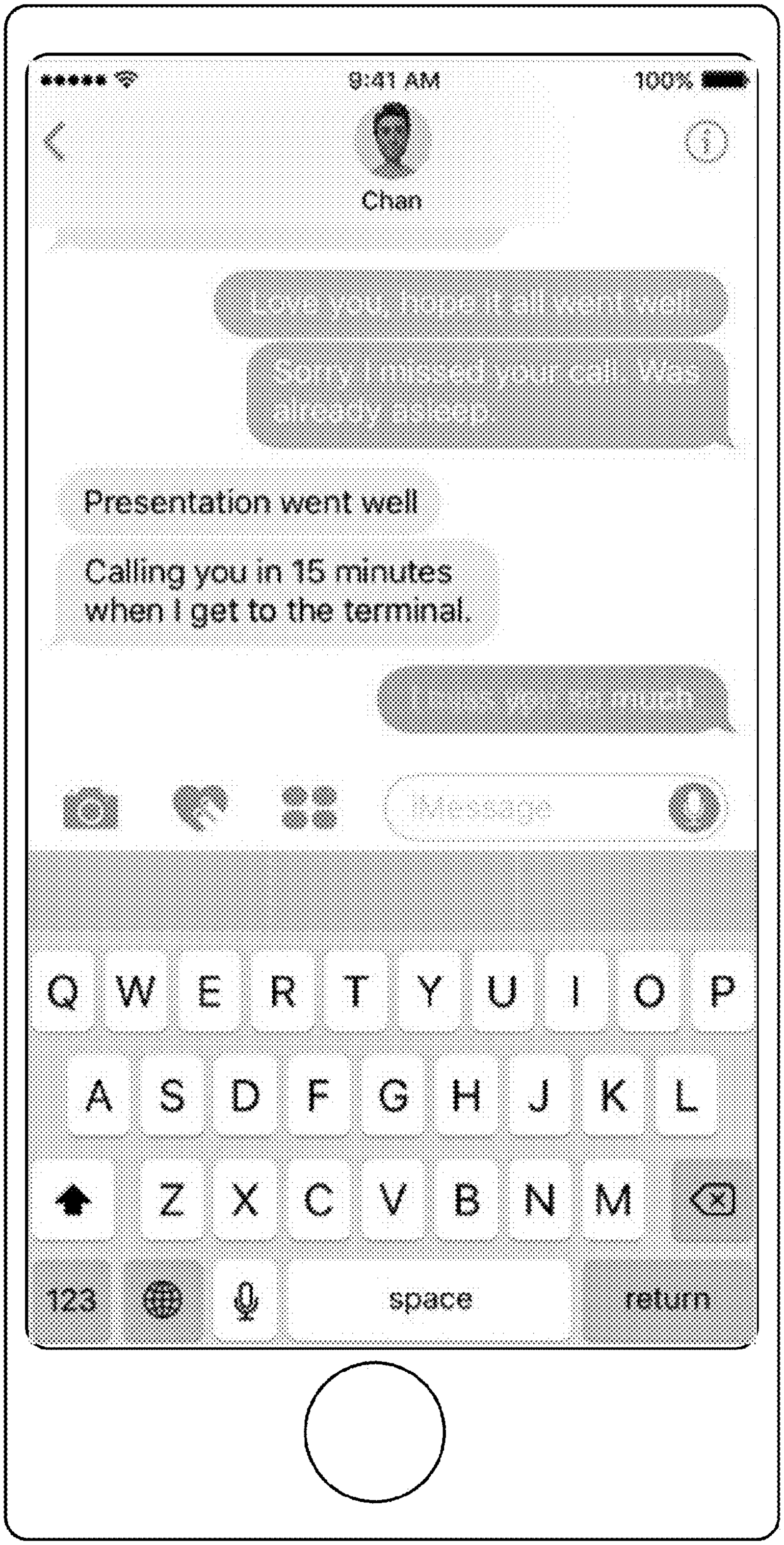
Figure 5B:
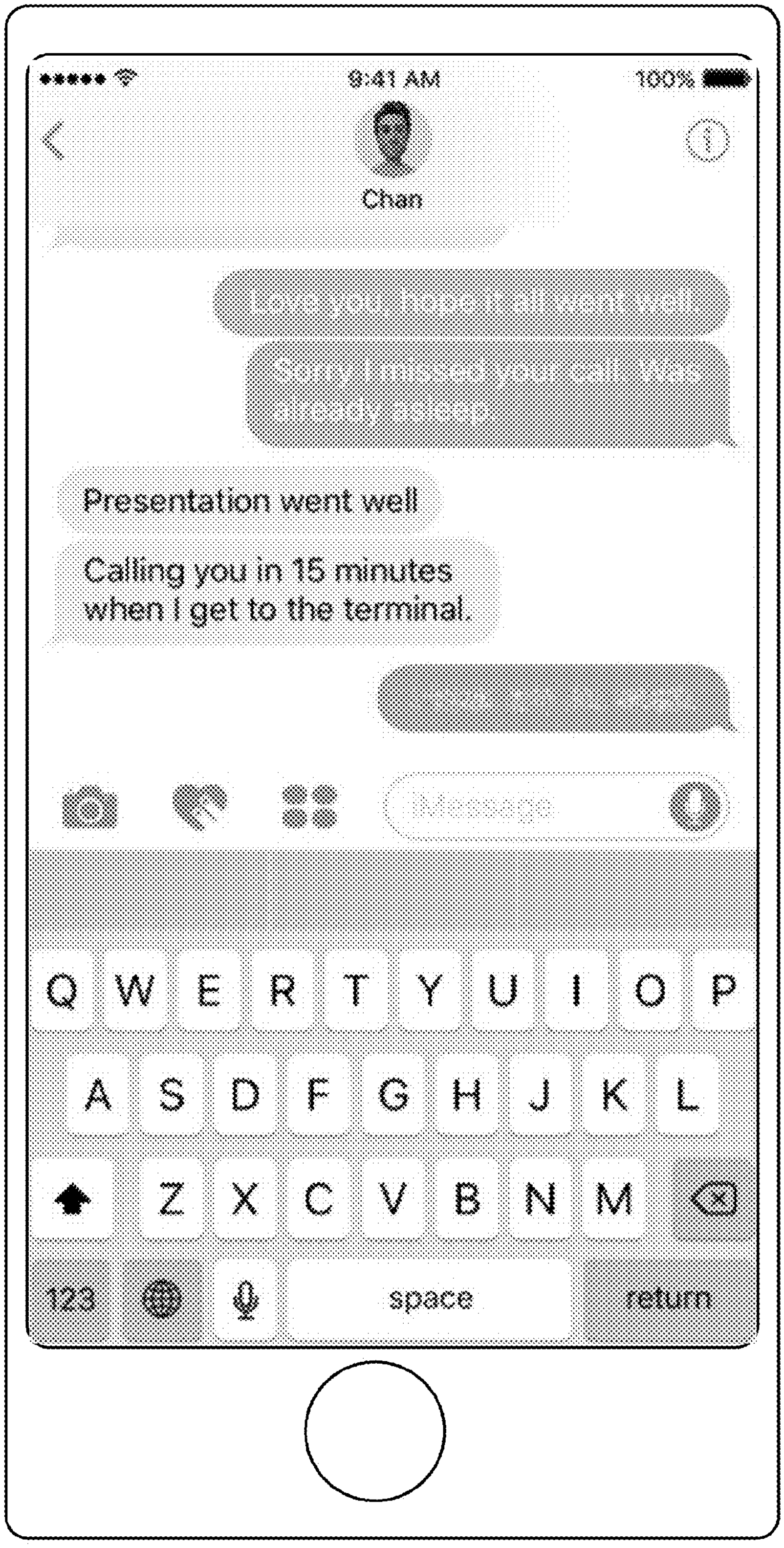
Figure 5B:
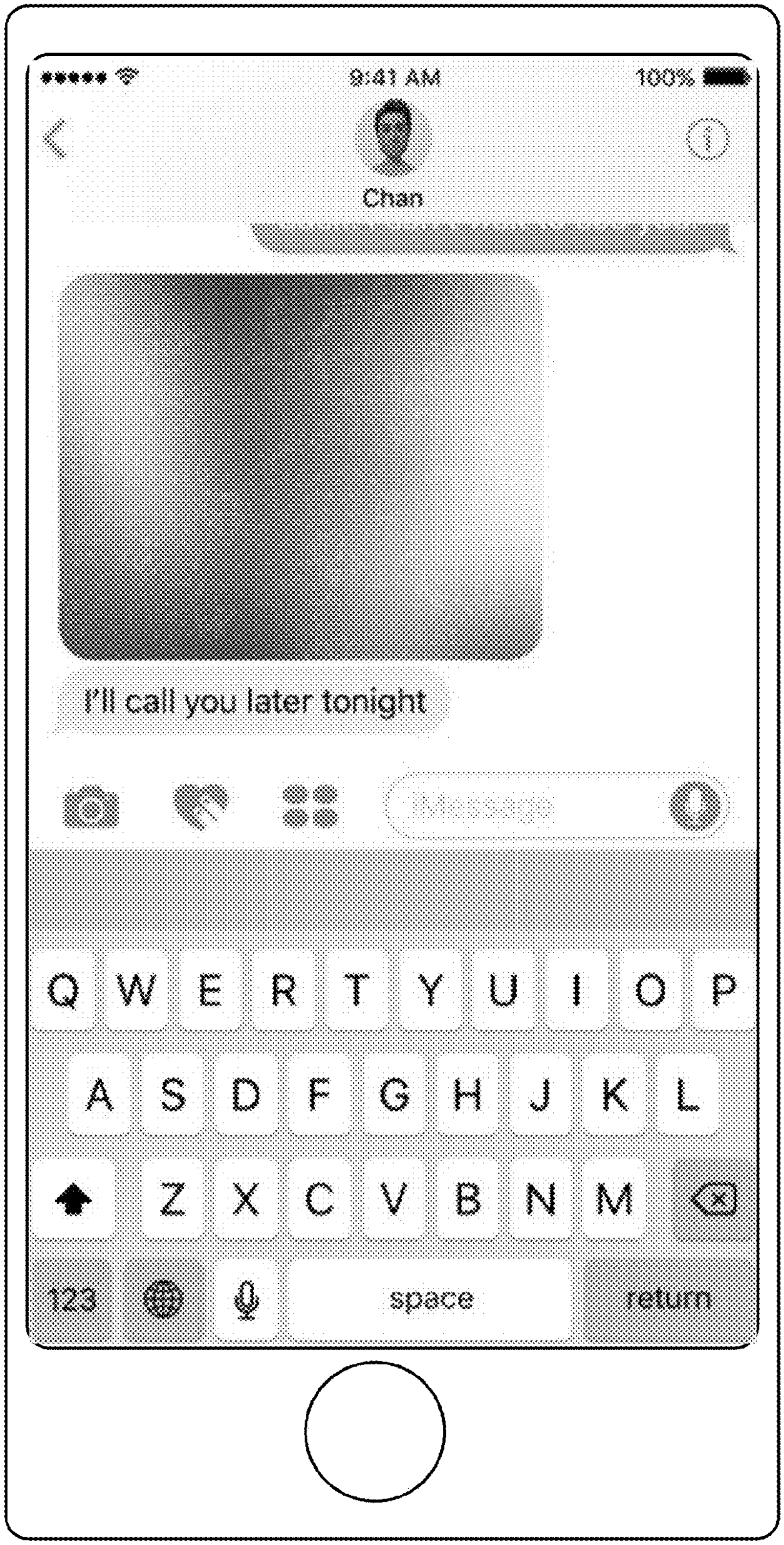
Figure 5B:
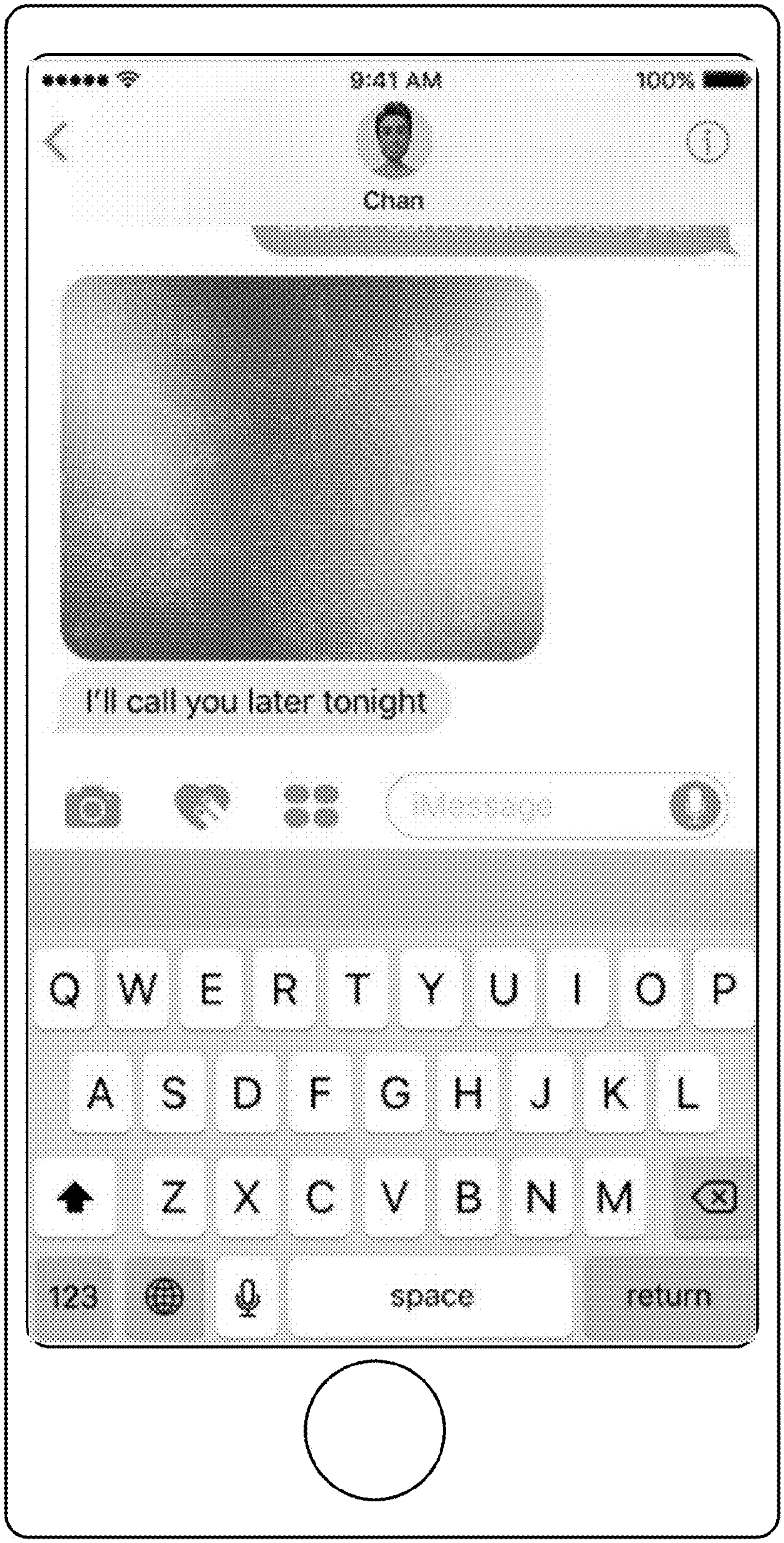
Figure 5B:
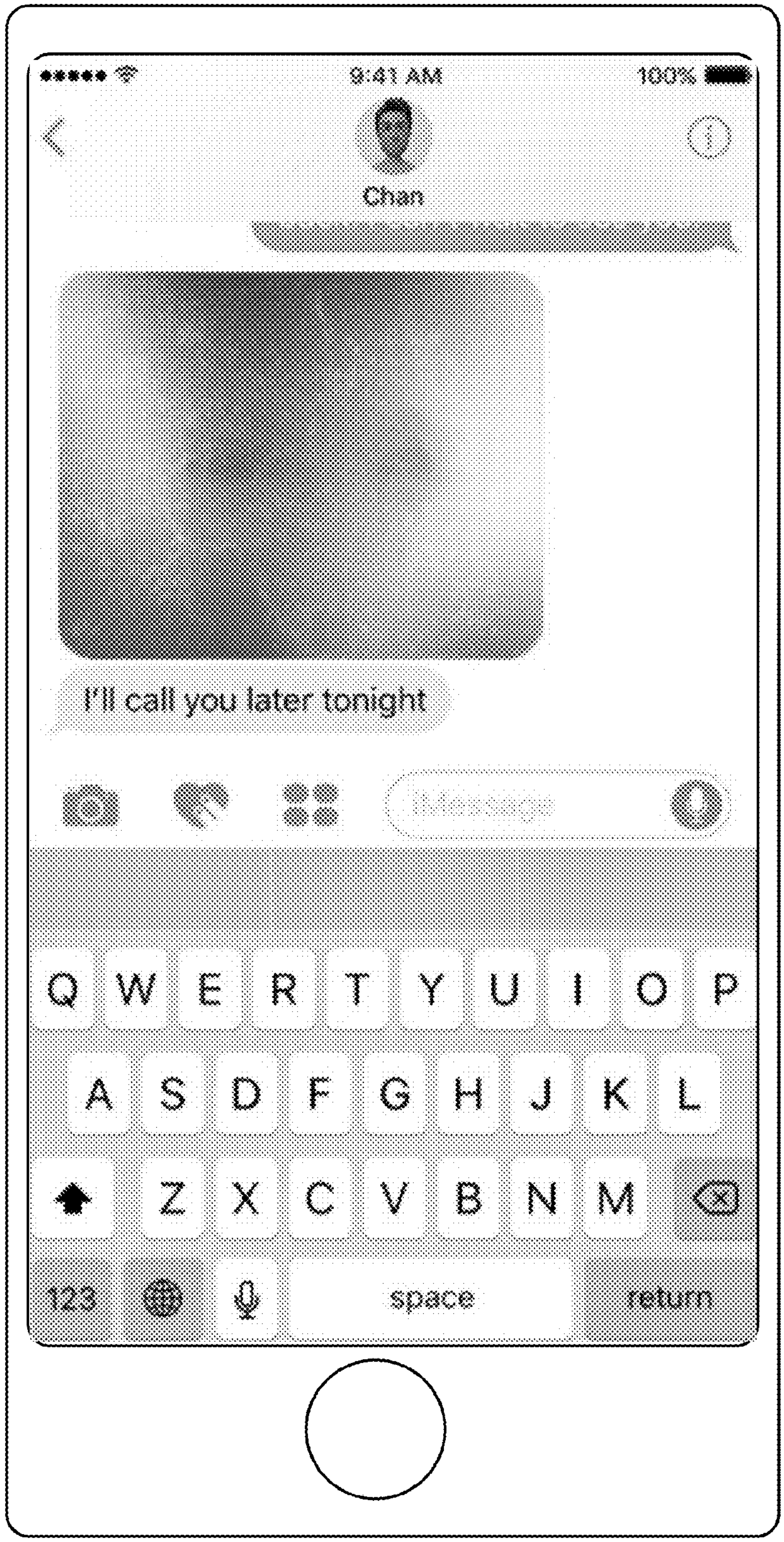
Figure 5B:
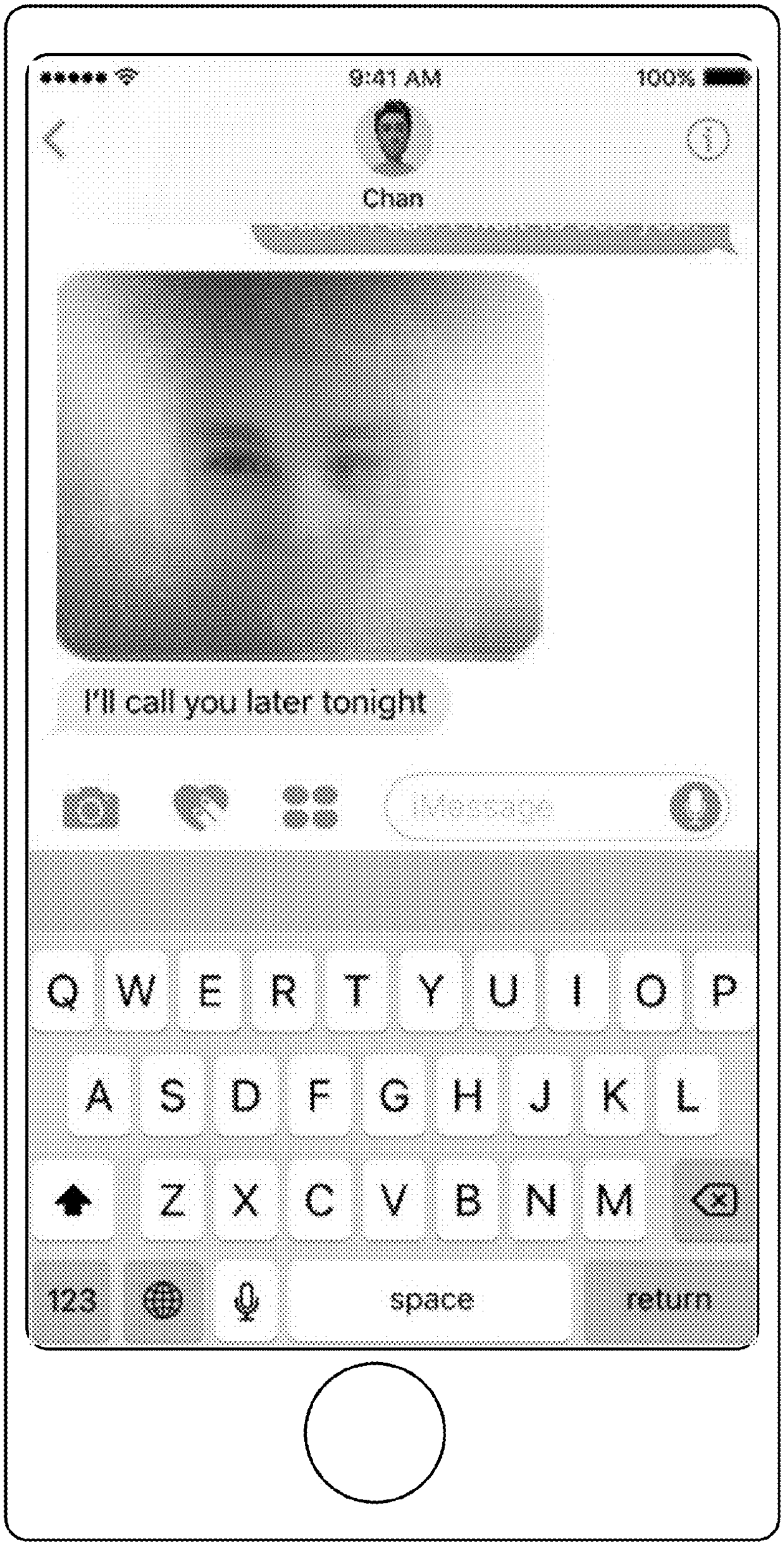
Figure 5C:
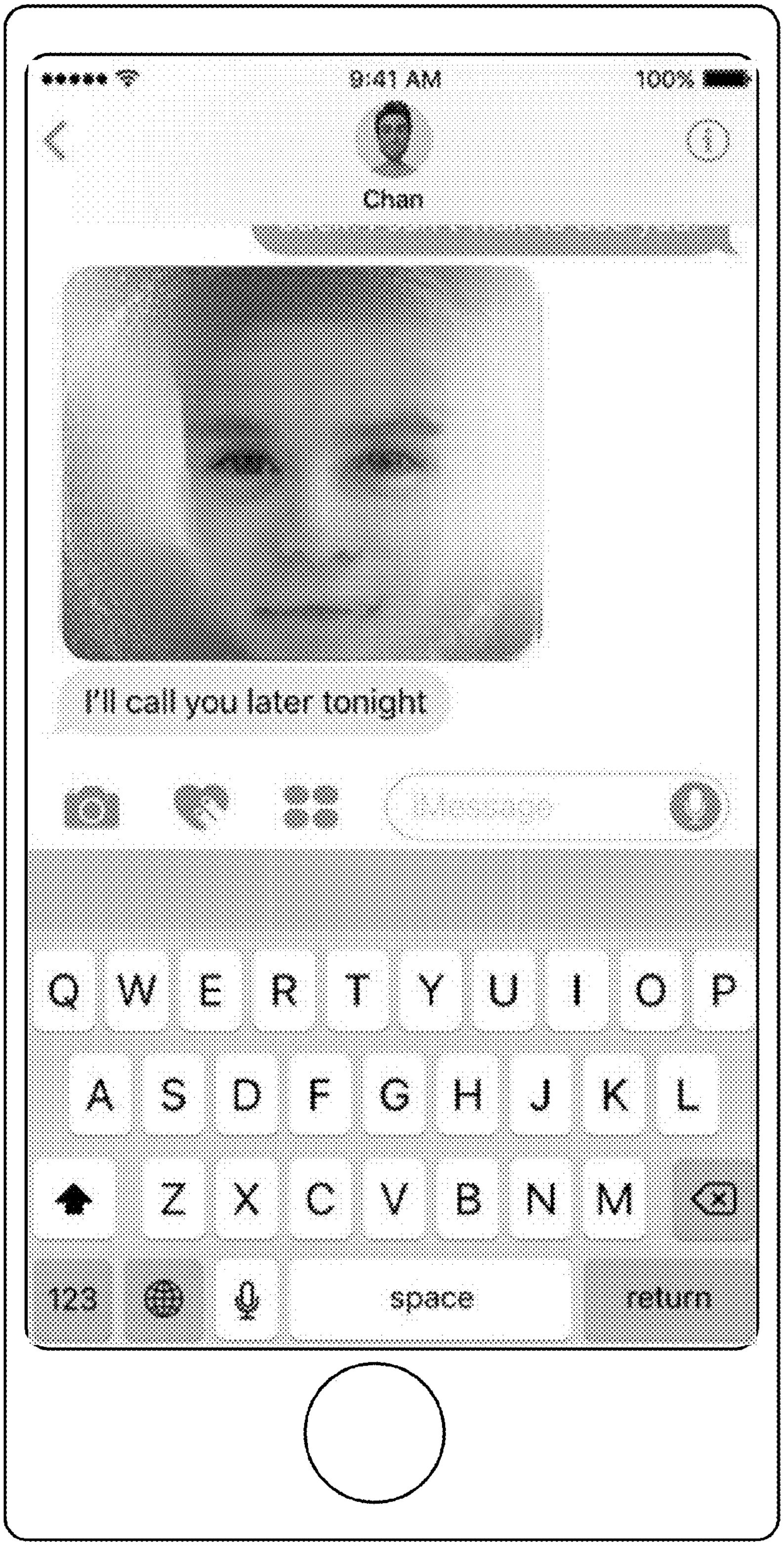
Figure 5C:
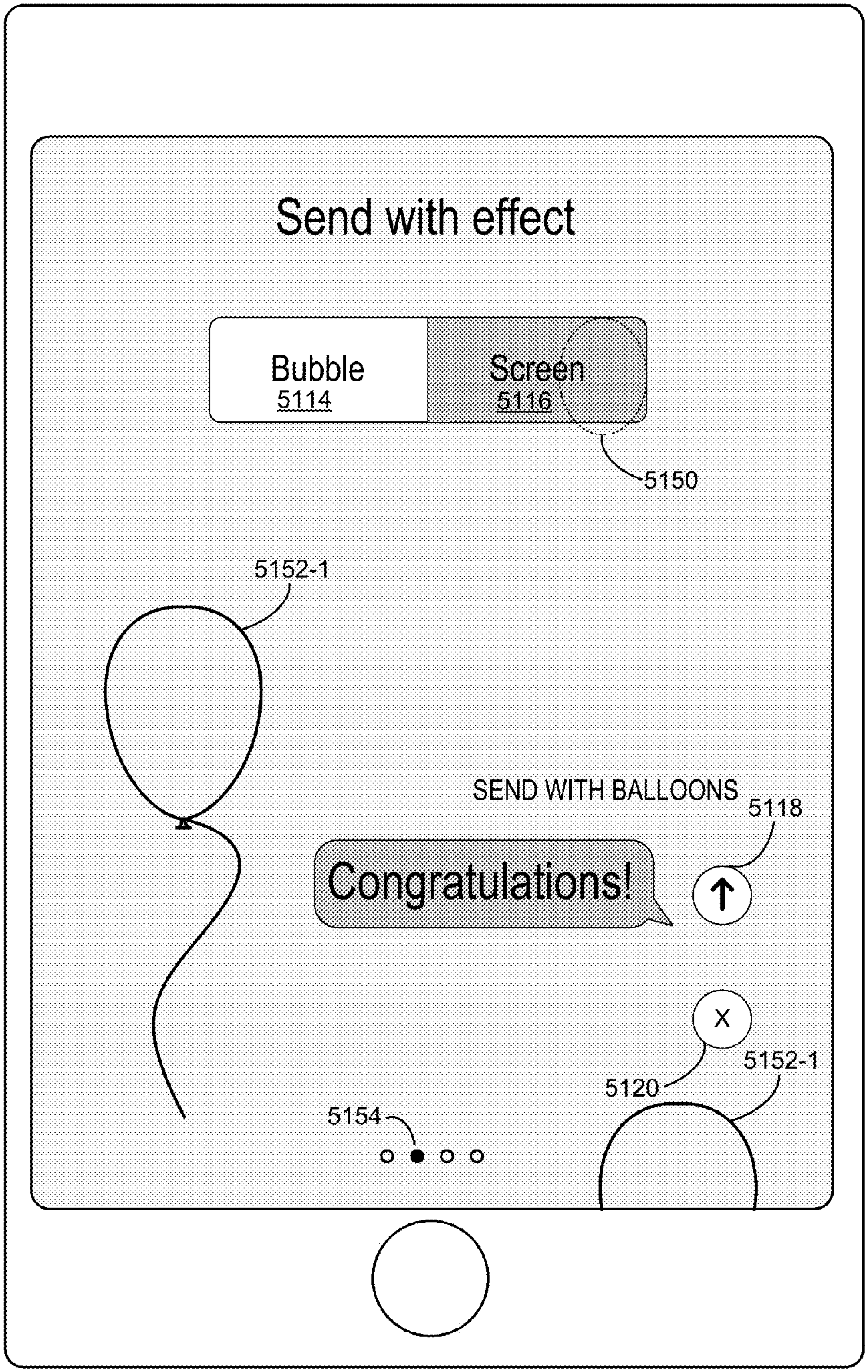
Figure 5C:
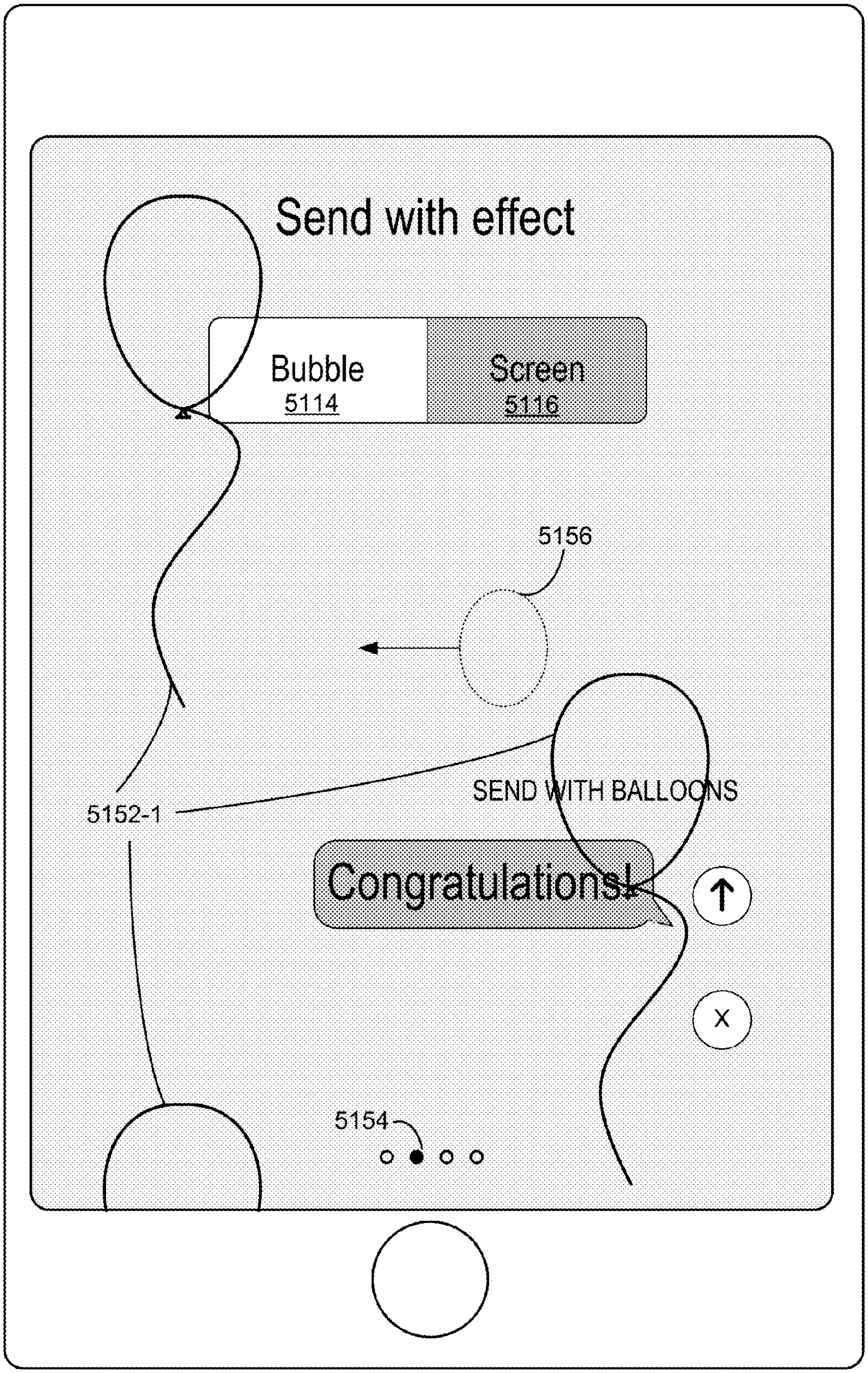
Figure 5C:
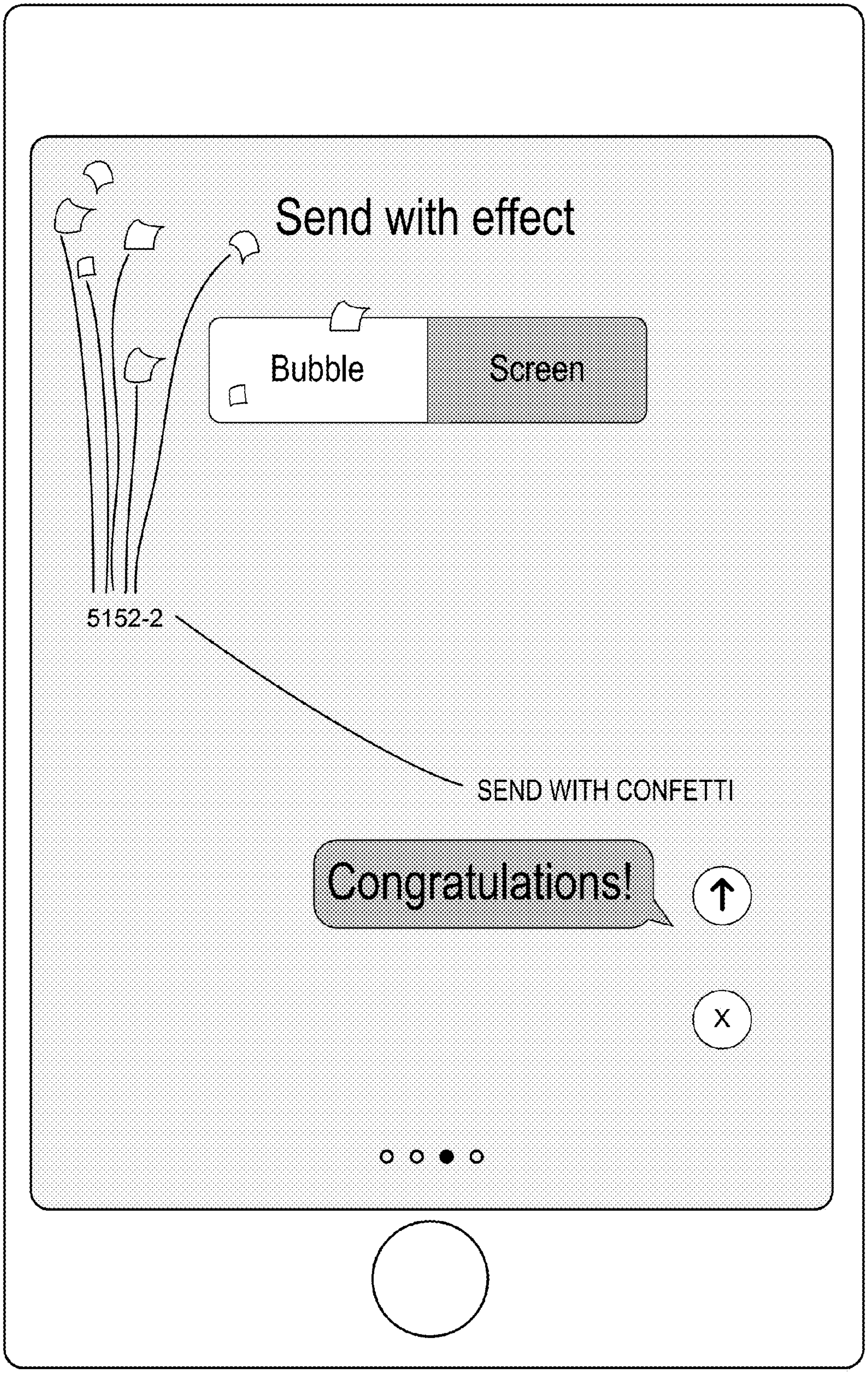
Figure 5C:
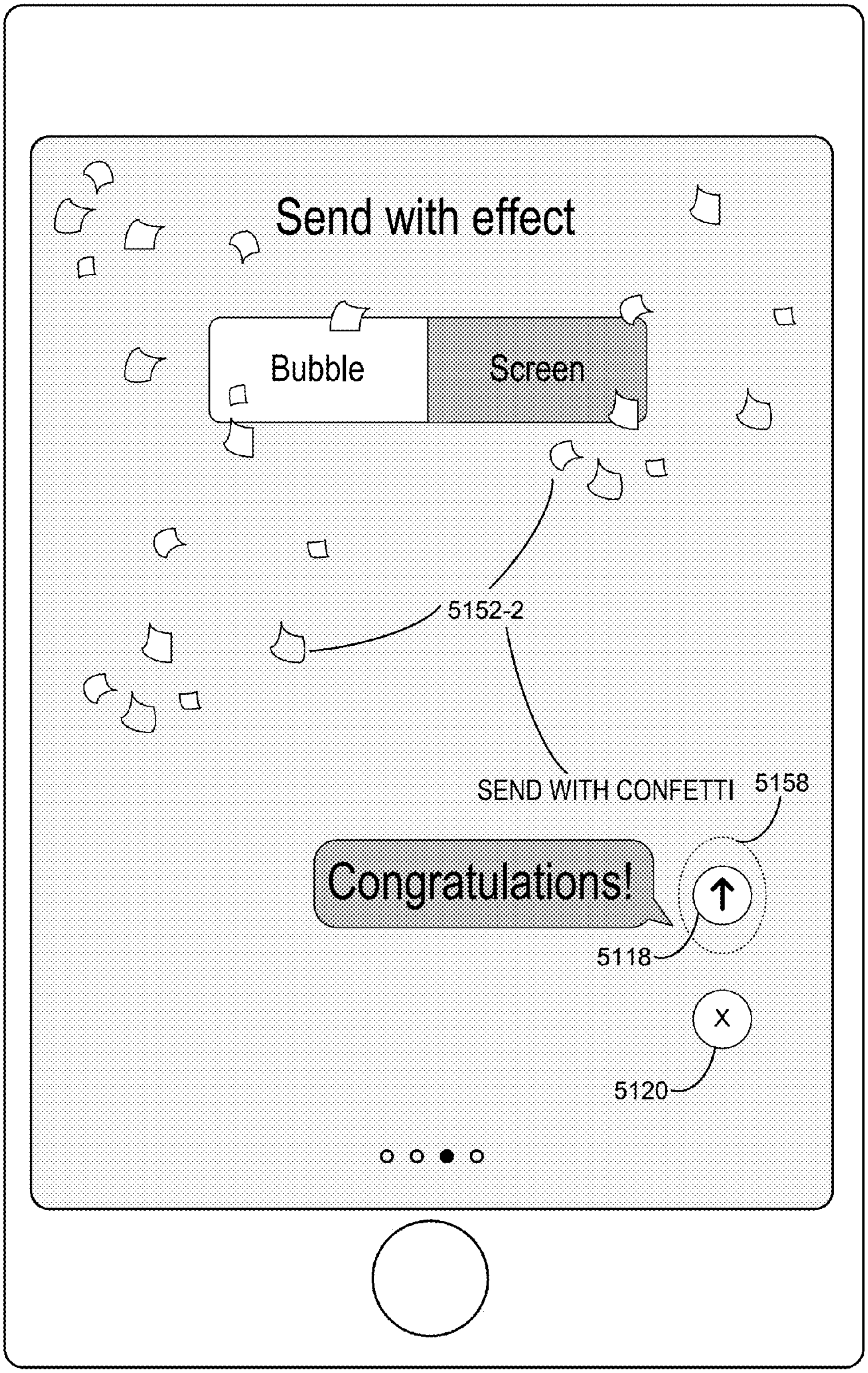
Figure 5C:
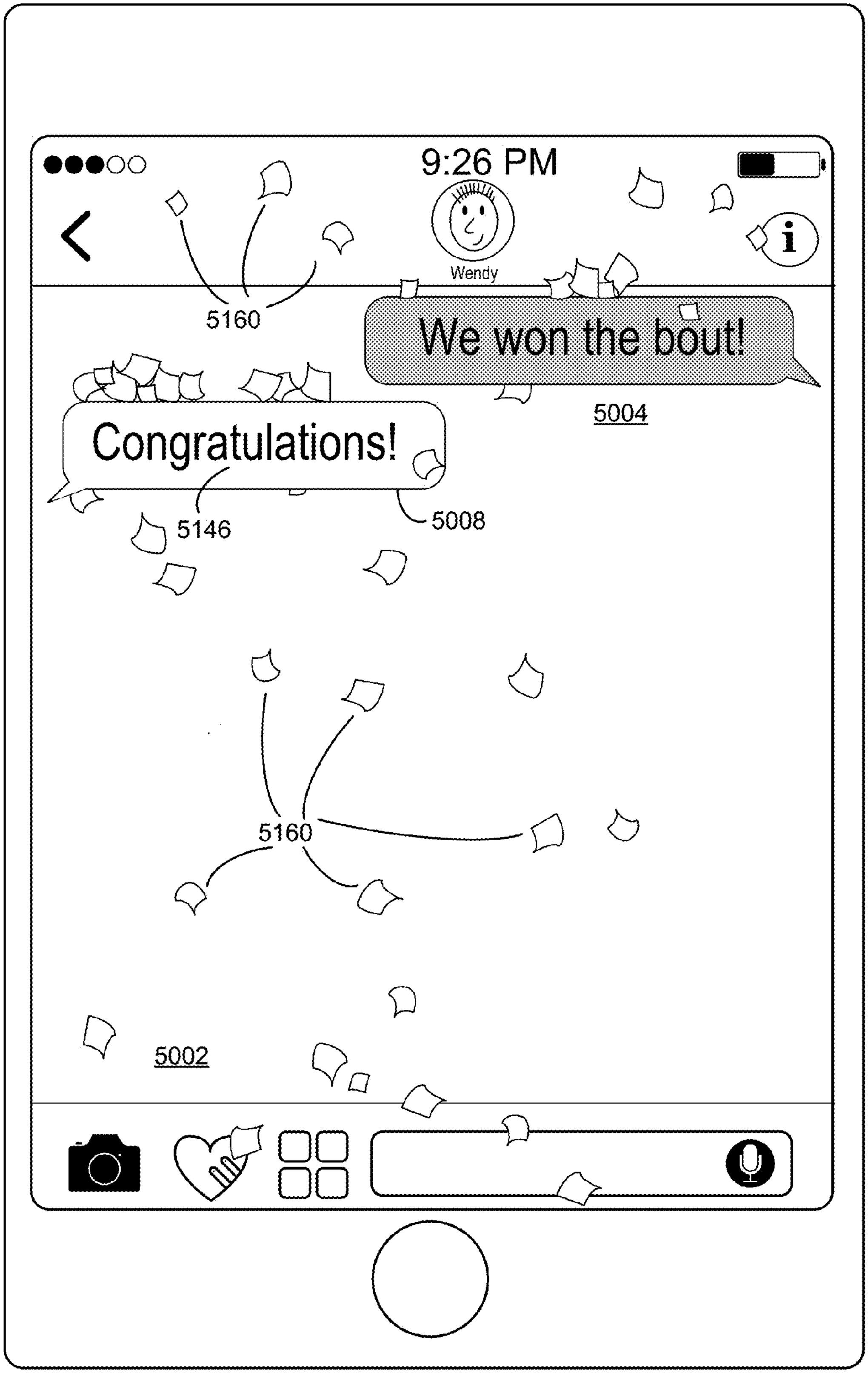
Figure 5C:
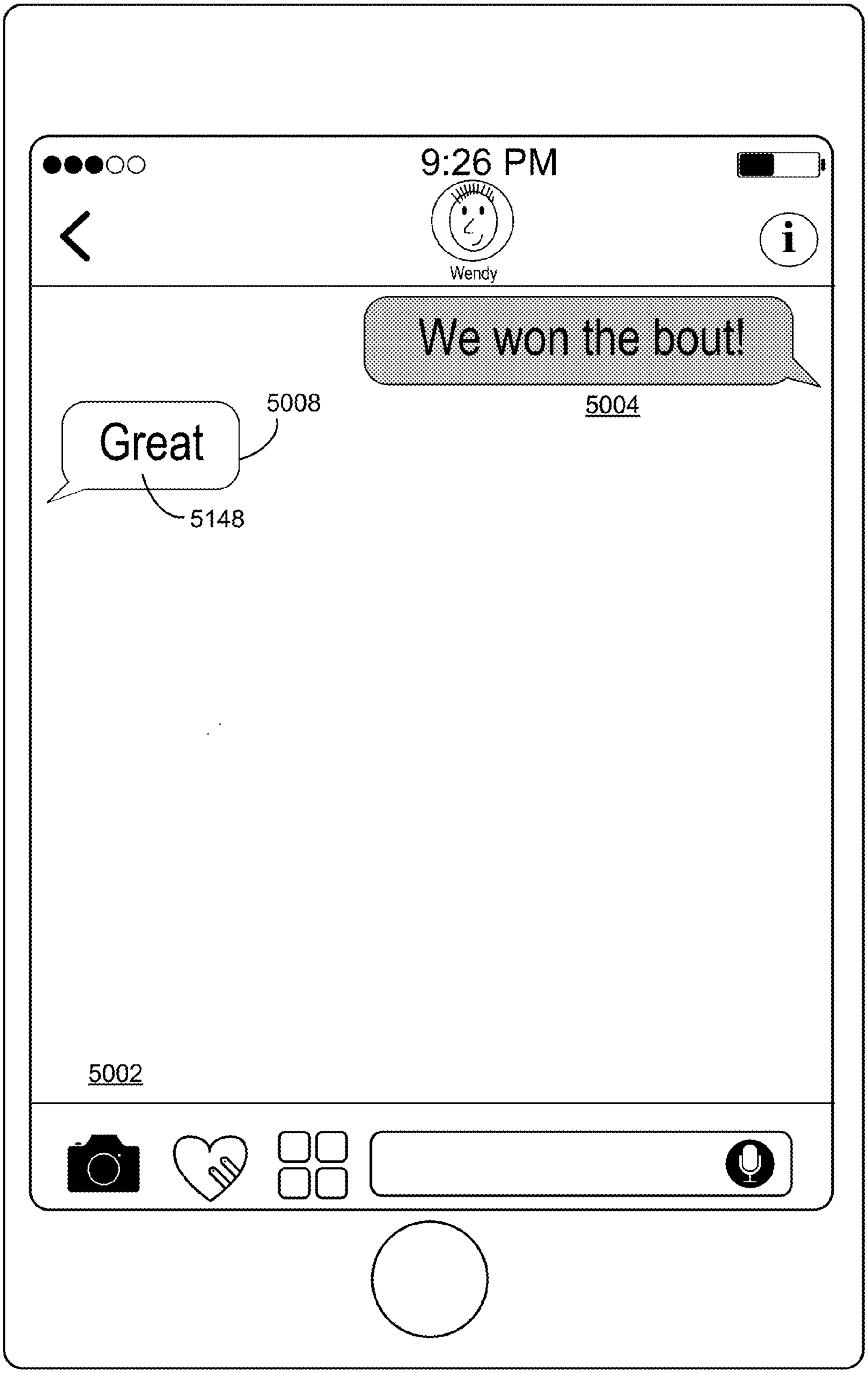
Figure 5C:
Figure 5C:
Figure 5C:
Figure 5C:
Figure 5C:
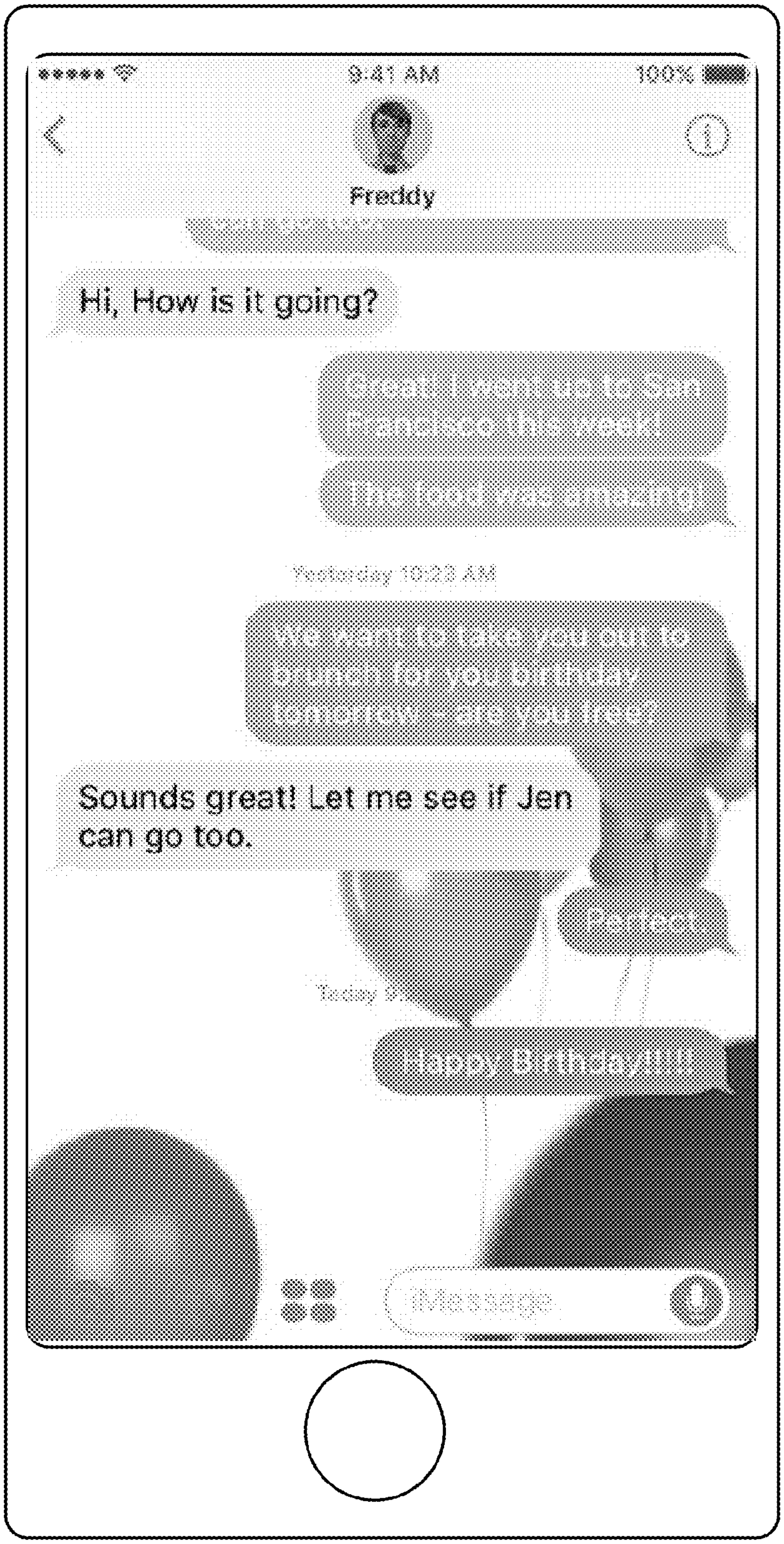
Figure 5C:
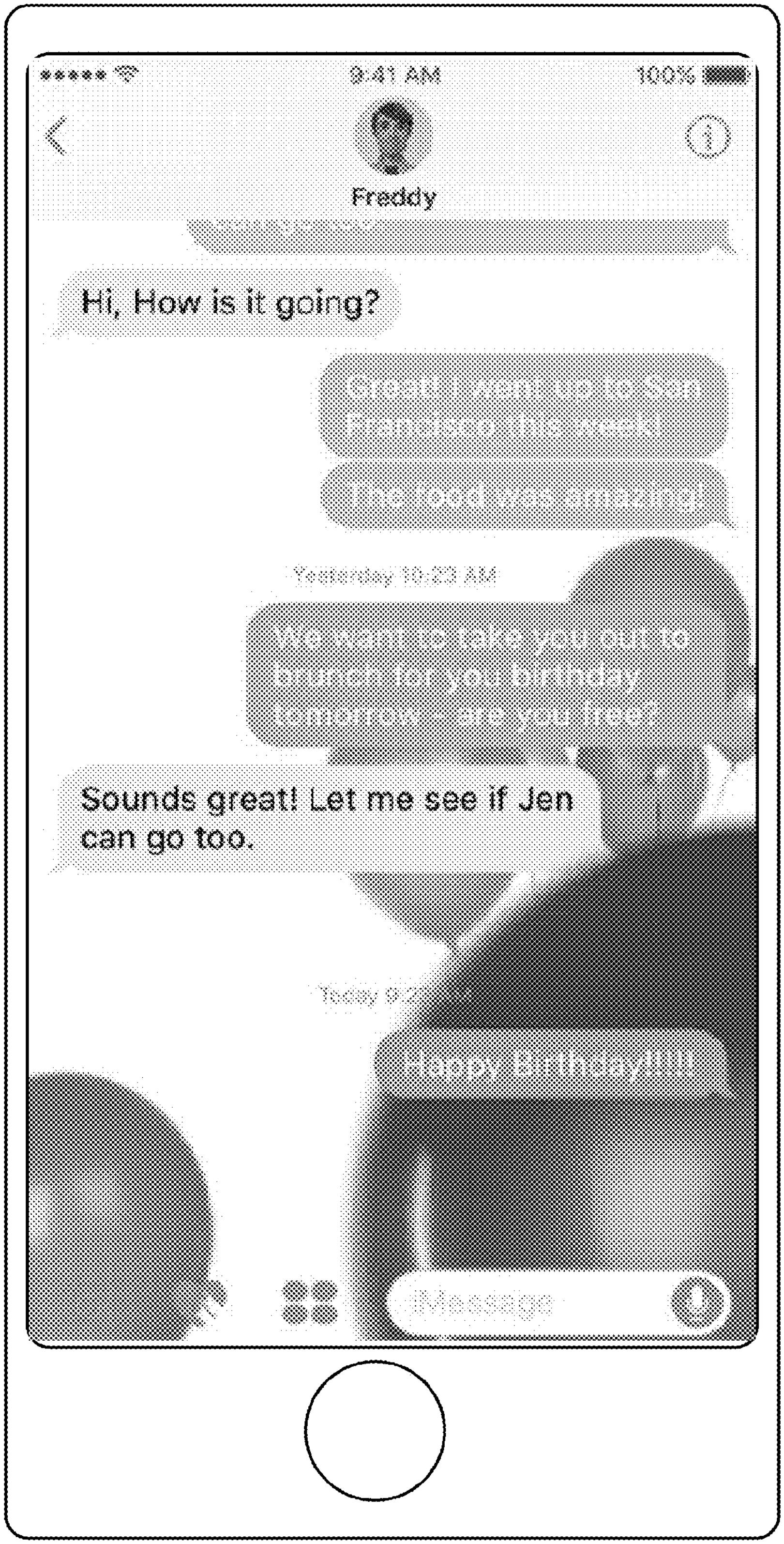
Figure 5C:
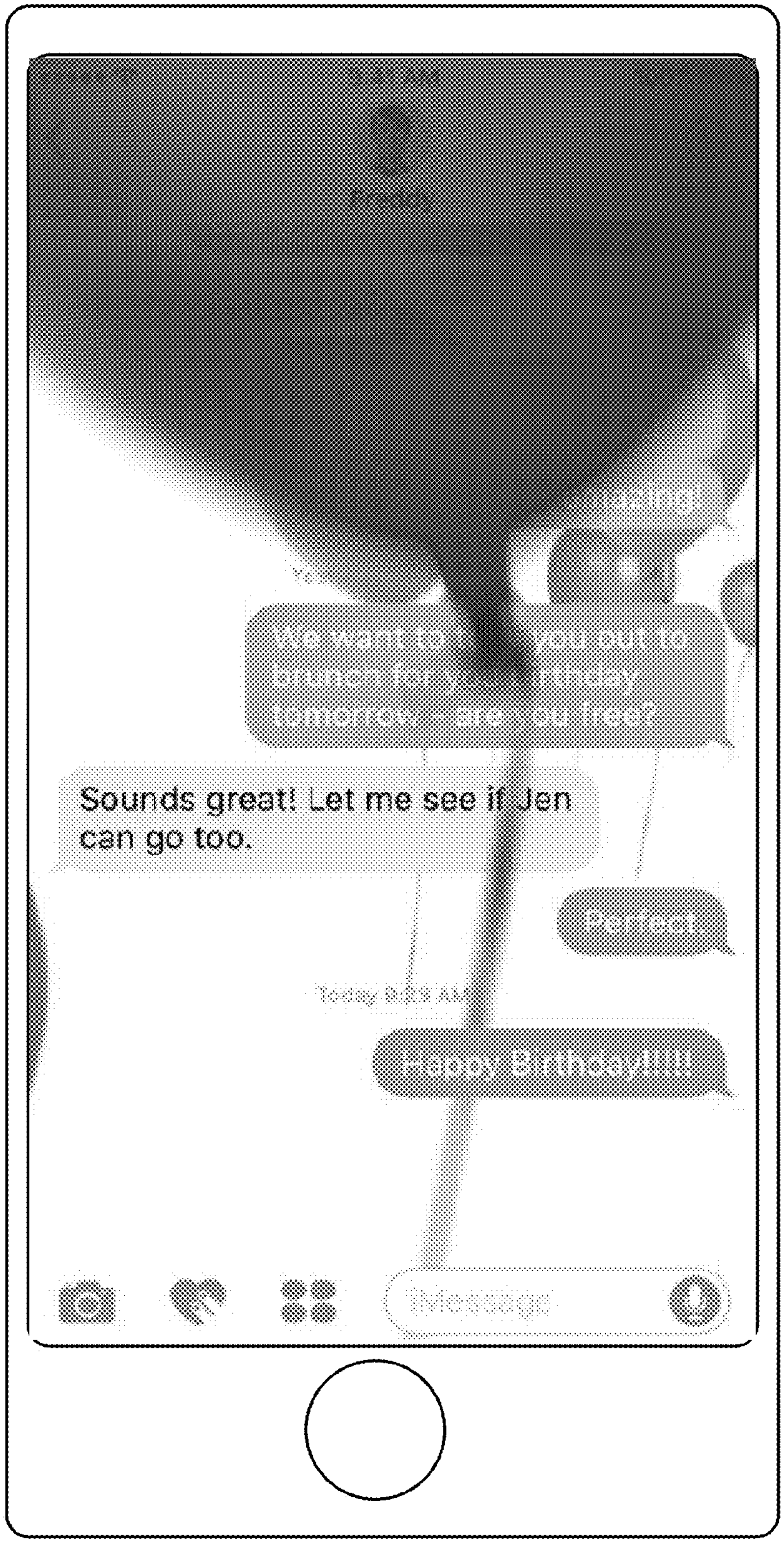
Figure 5C:
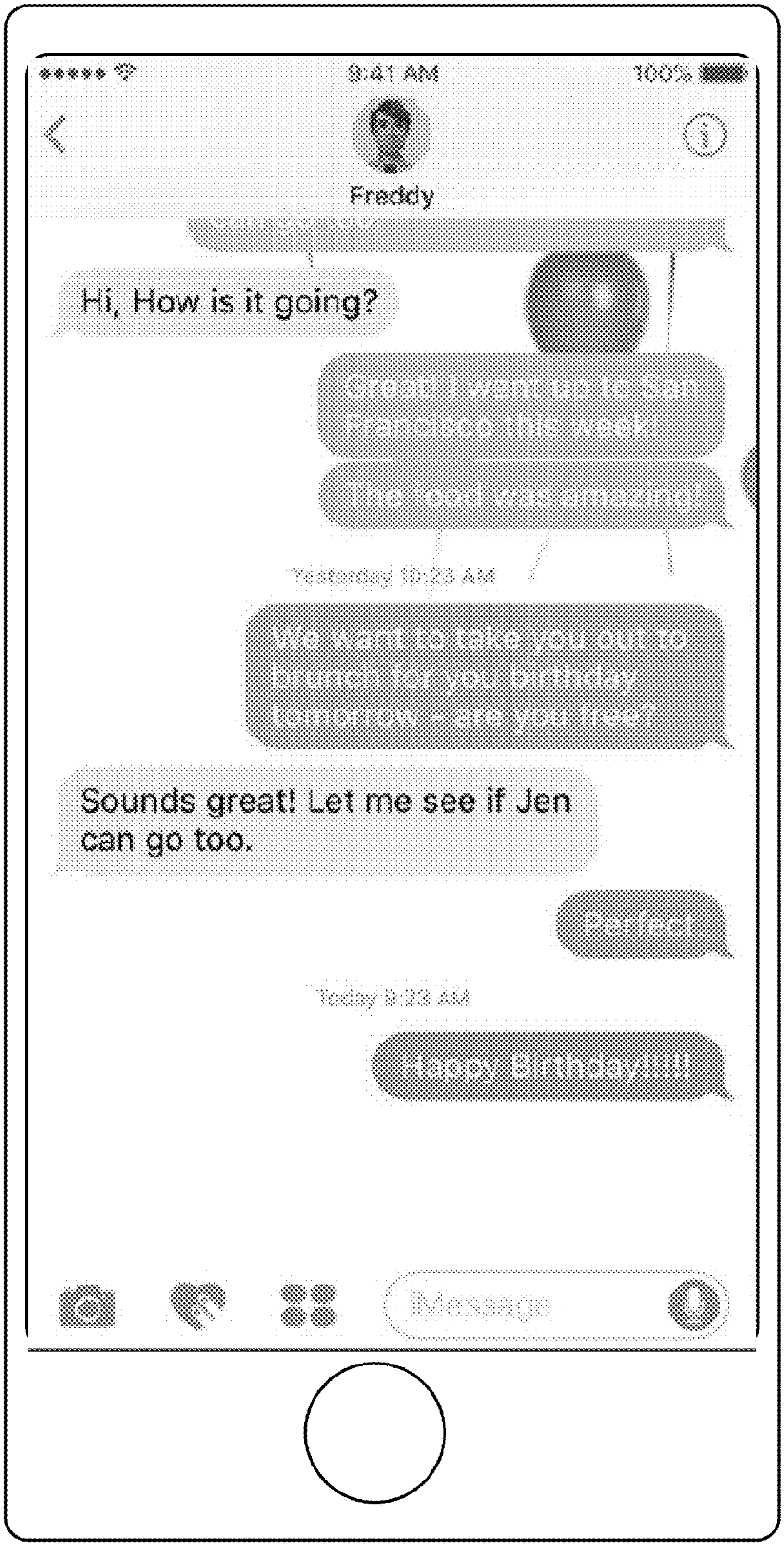
Figure 5C:
Figure 5C:
Figure 5C:
Figure 5C:
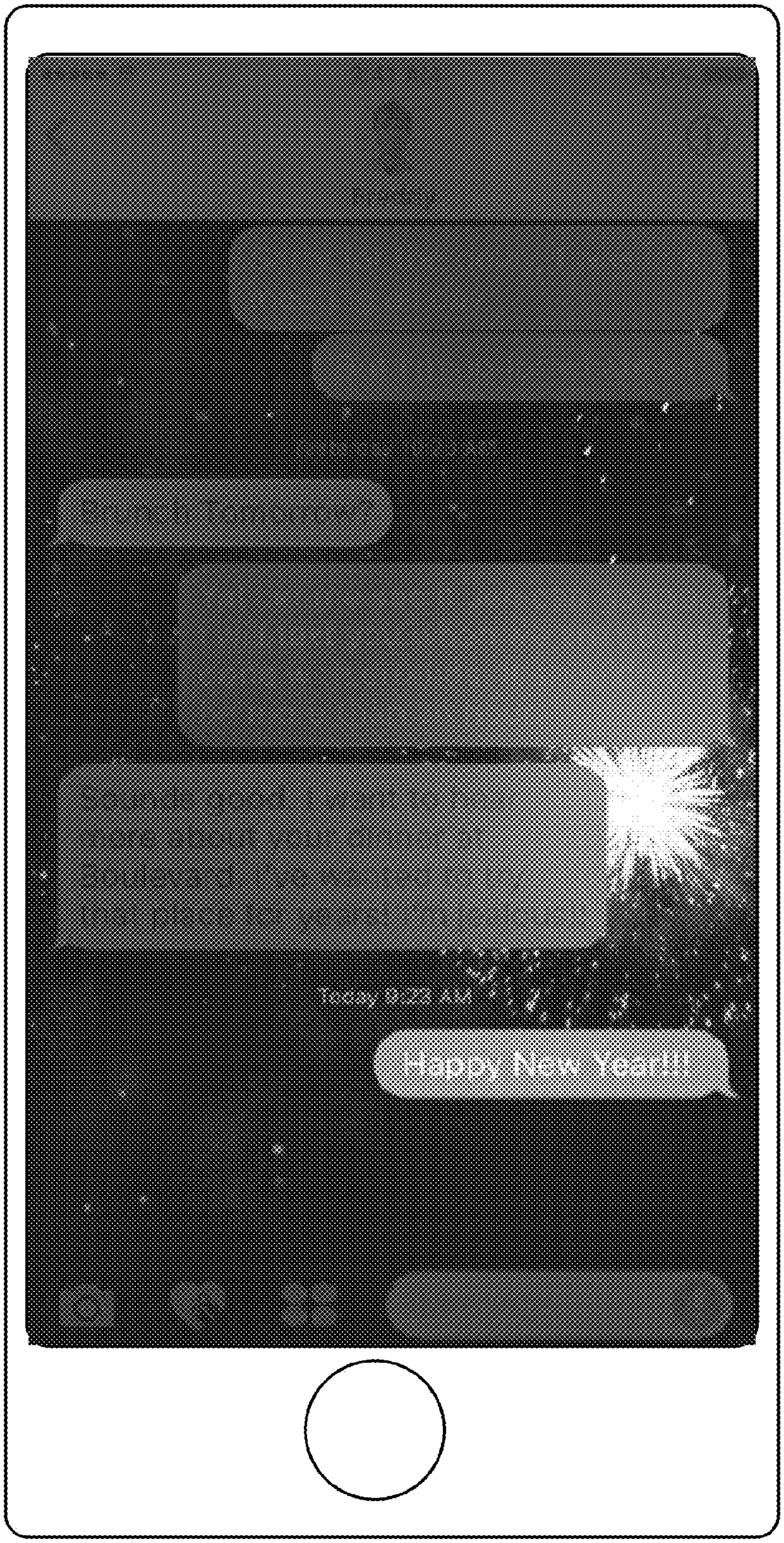
Figure 5C:
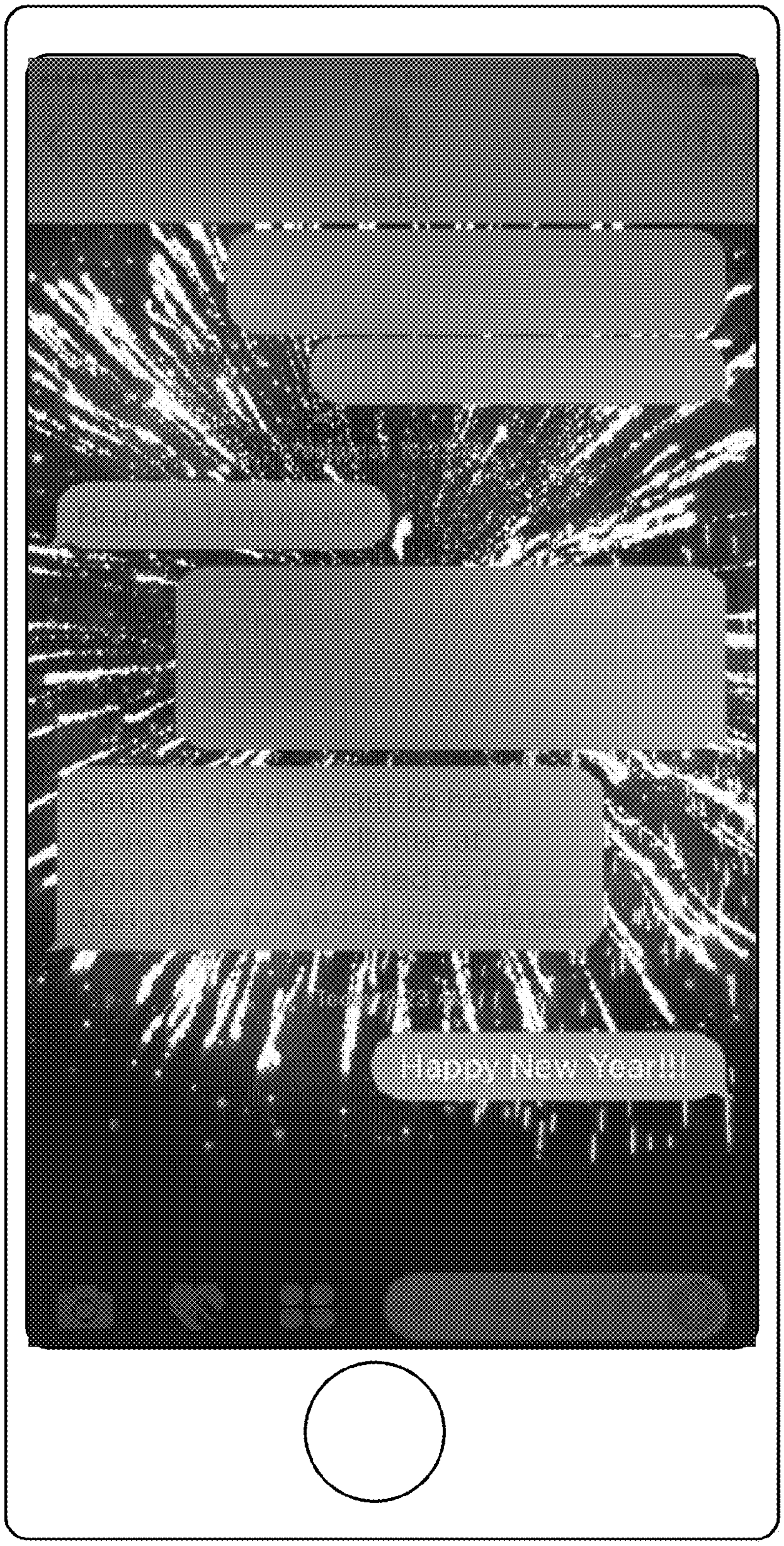
Figure 5C:
Figure 5C:
Figure 5C:
Figure 5C:
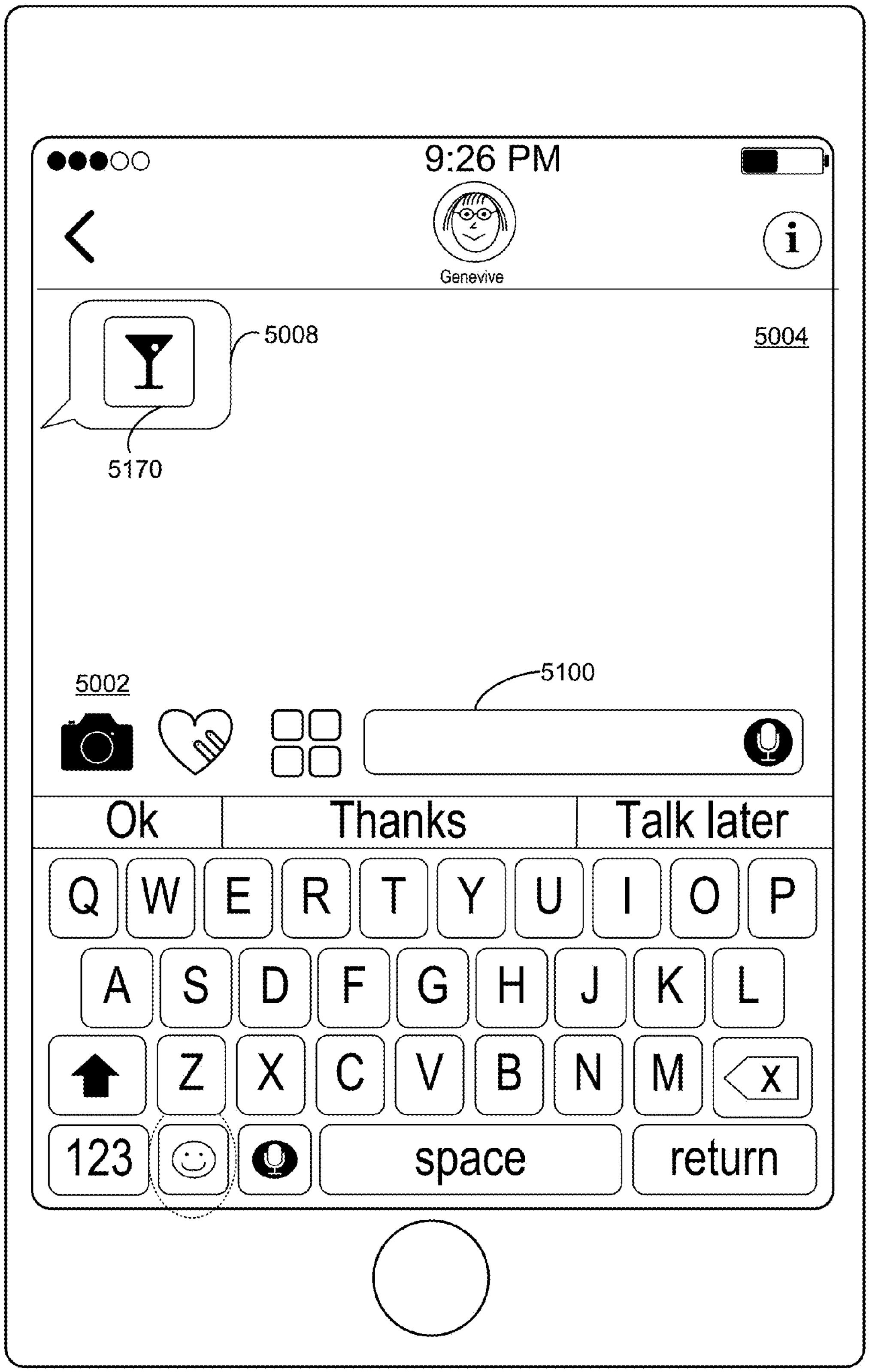
Figure 5C:
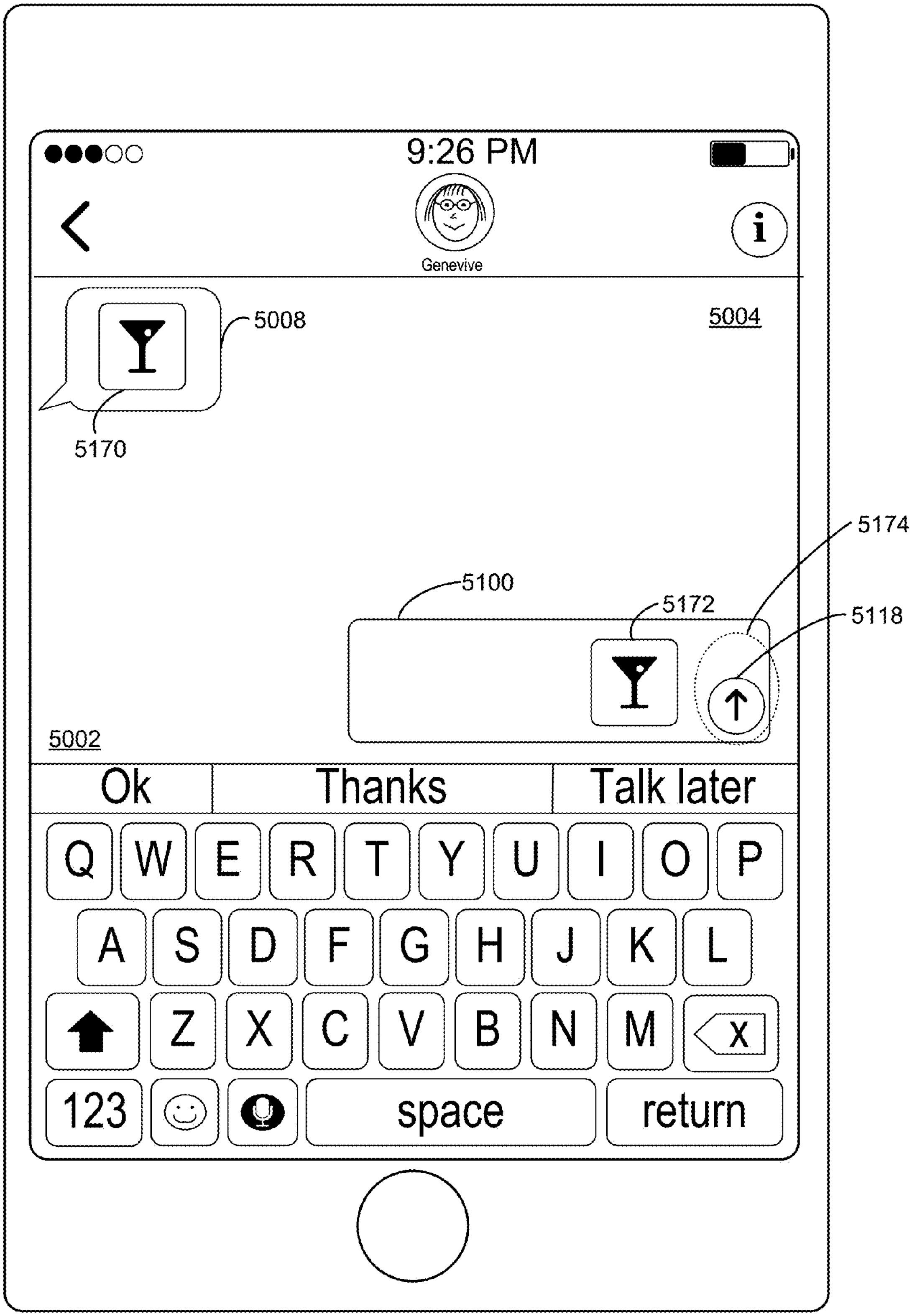
Figure 5C:
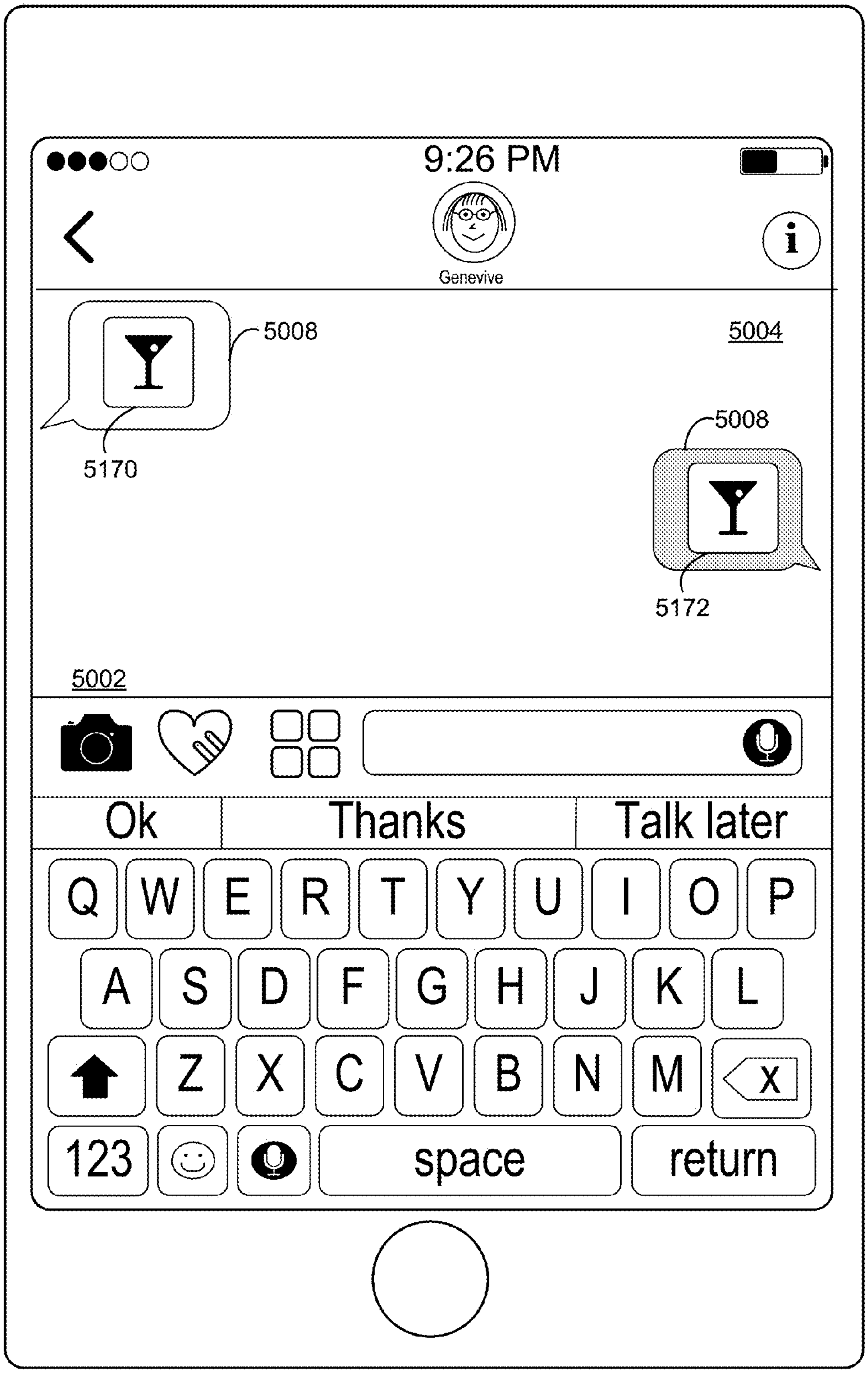
Figure 5D:
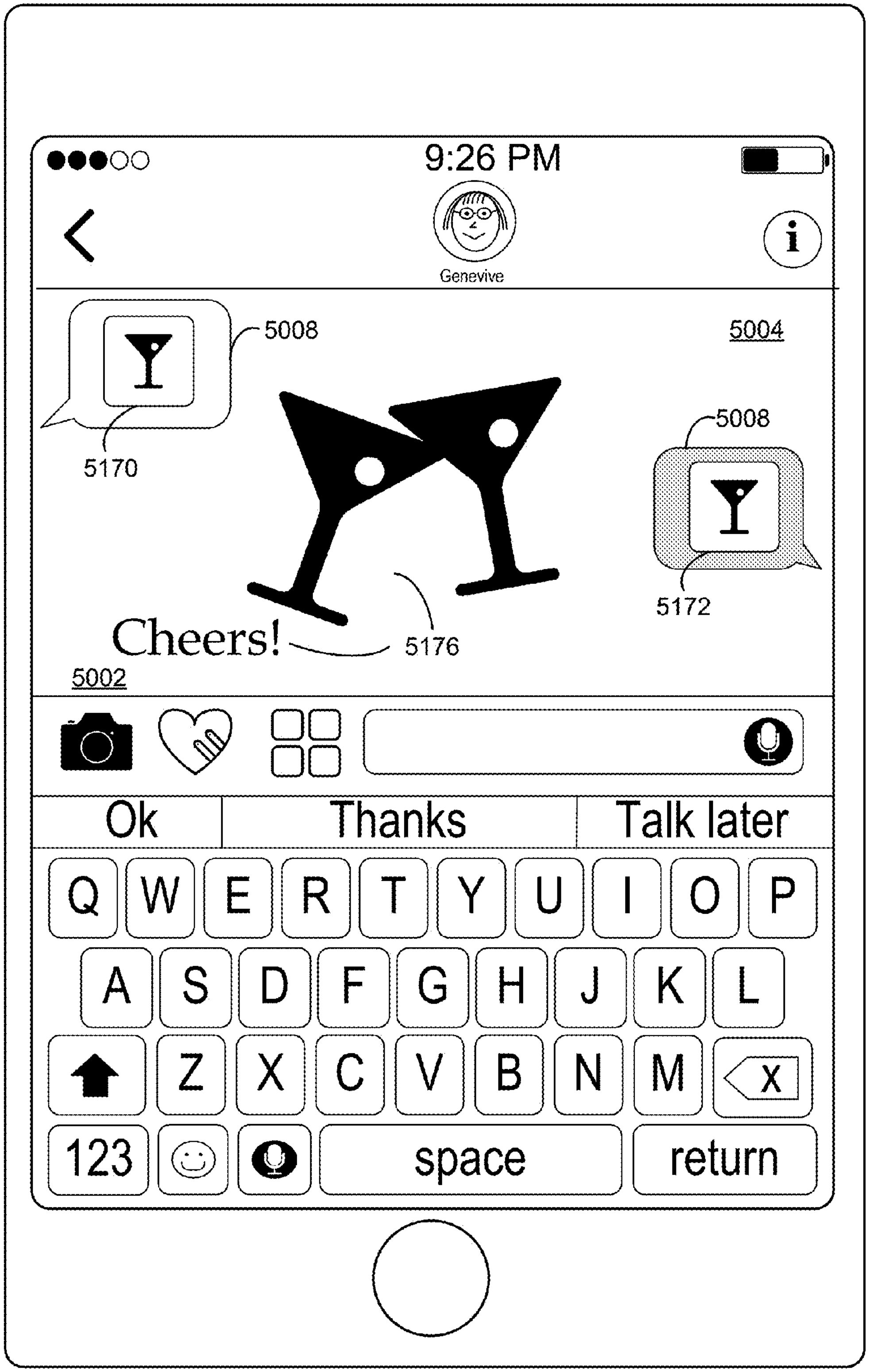
Figure 5D:
Figure 5D:
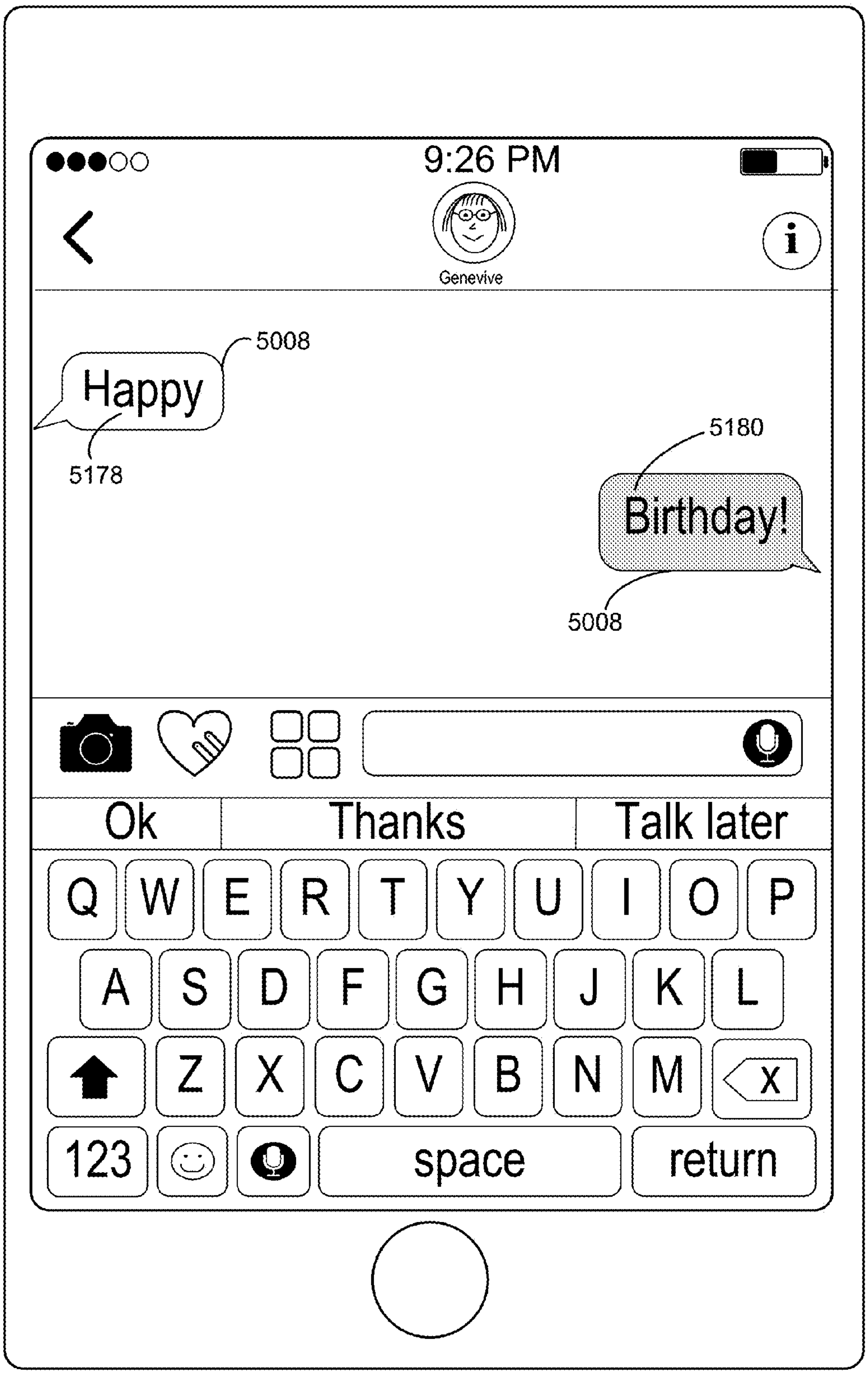
Figure 5D:
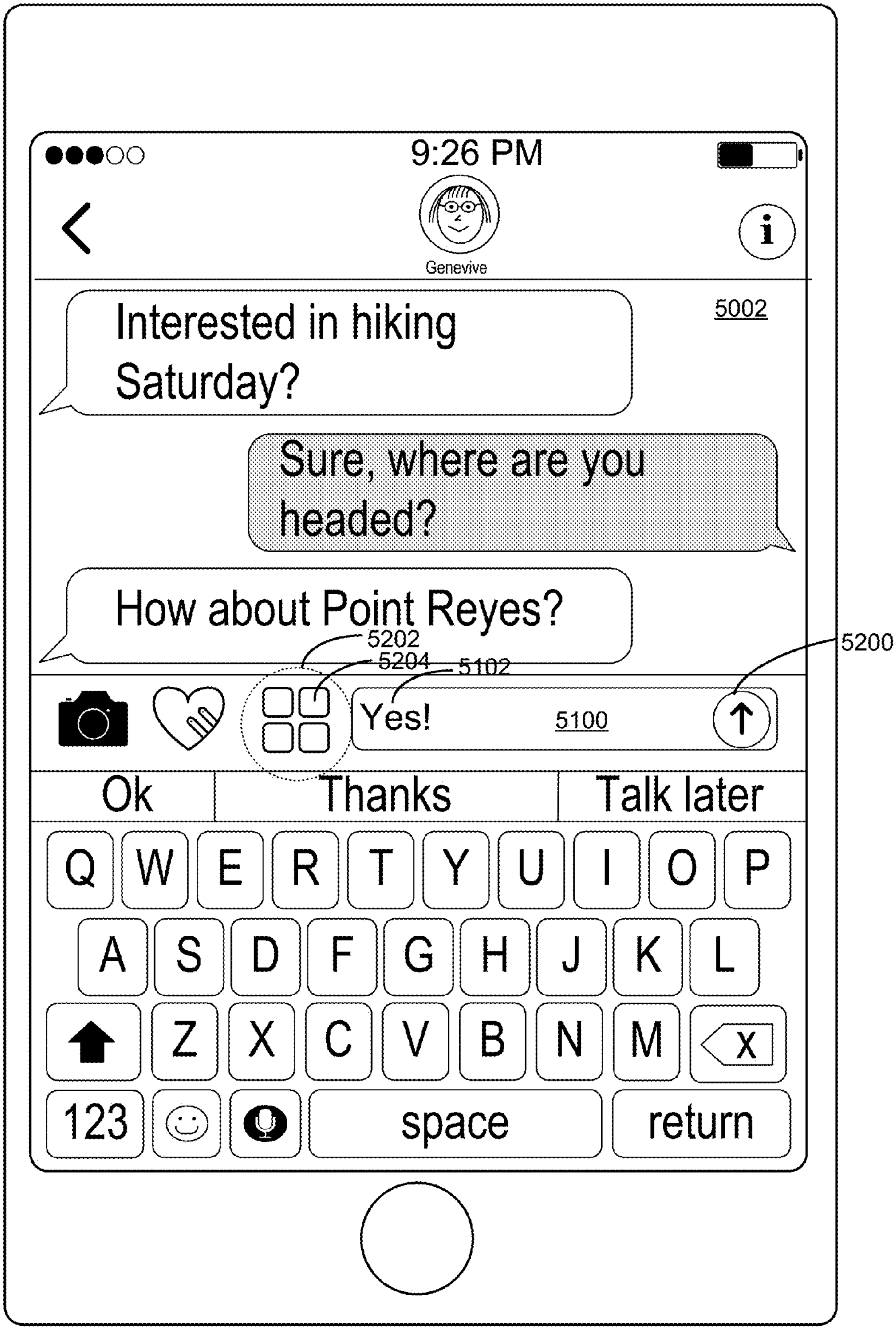
Figure 5D:
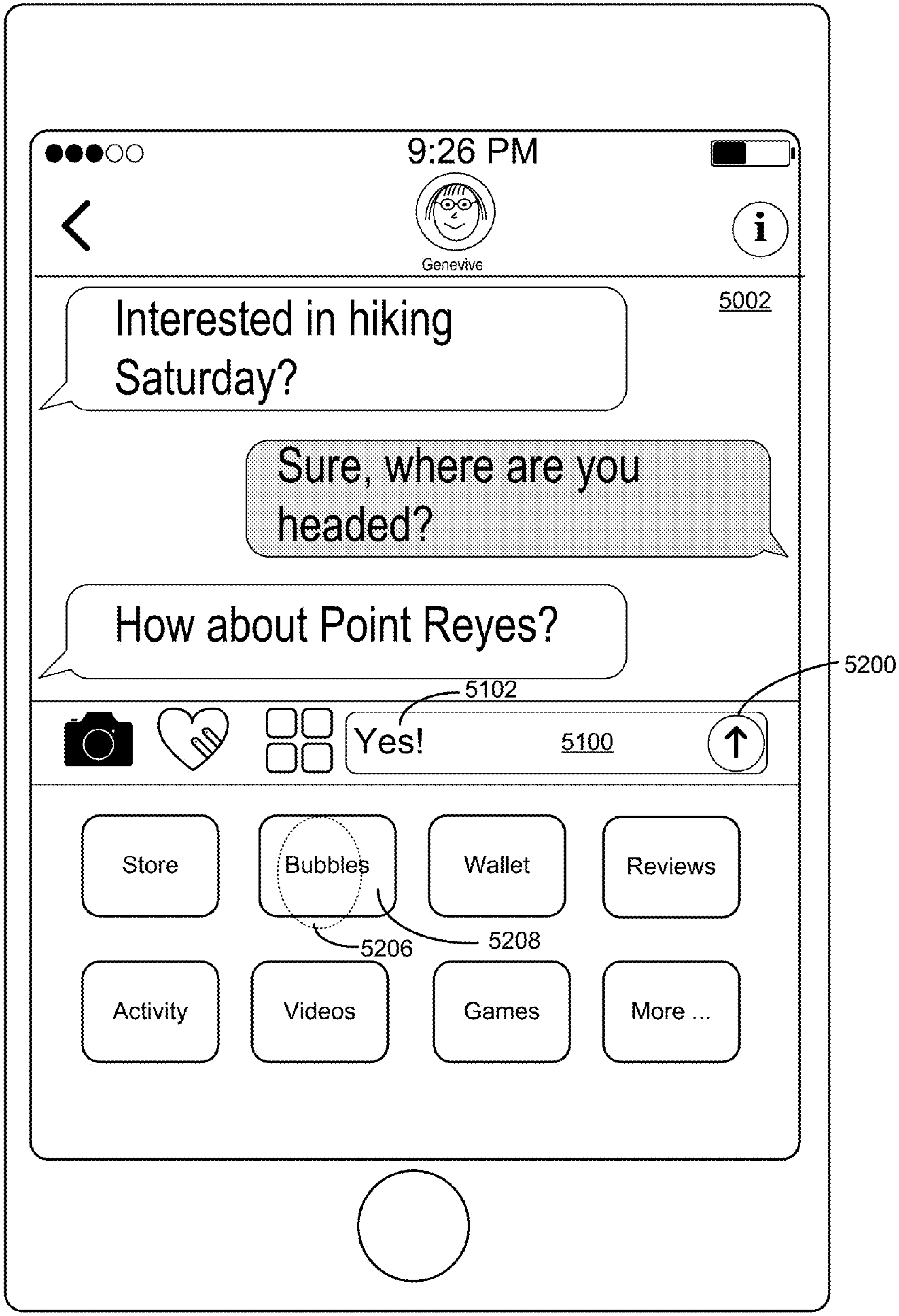
Figure 5D:
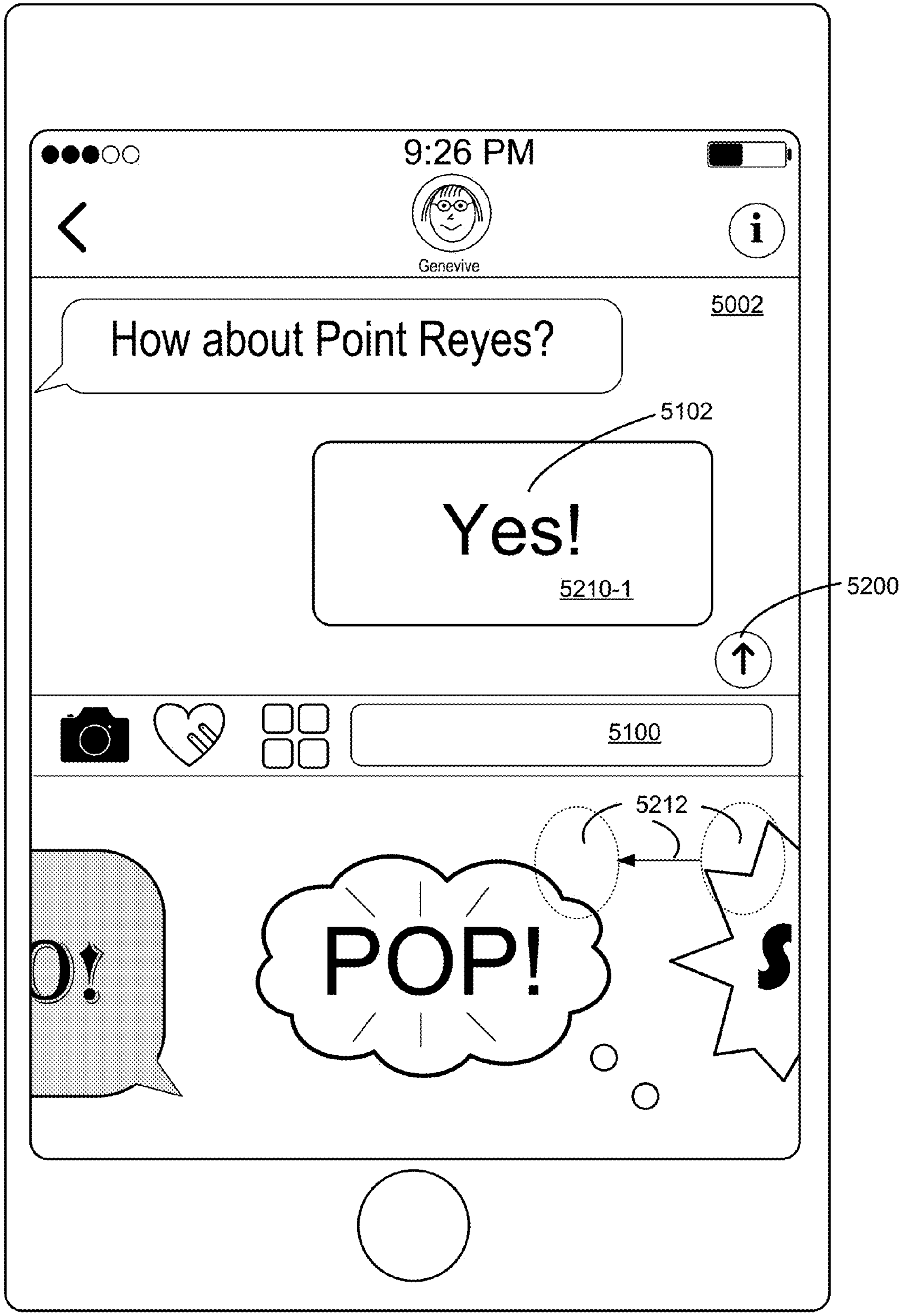
Figure 5D:
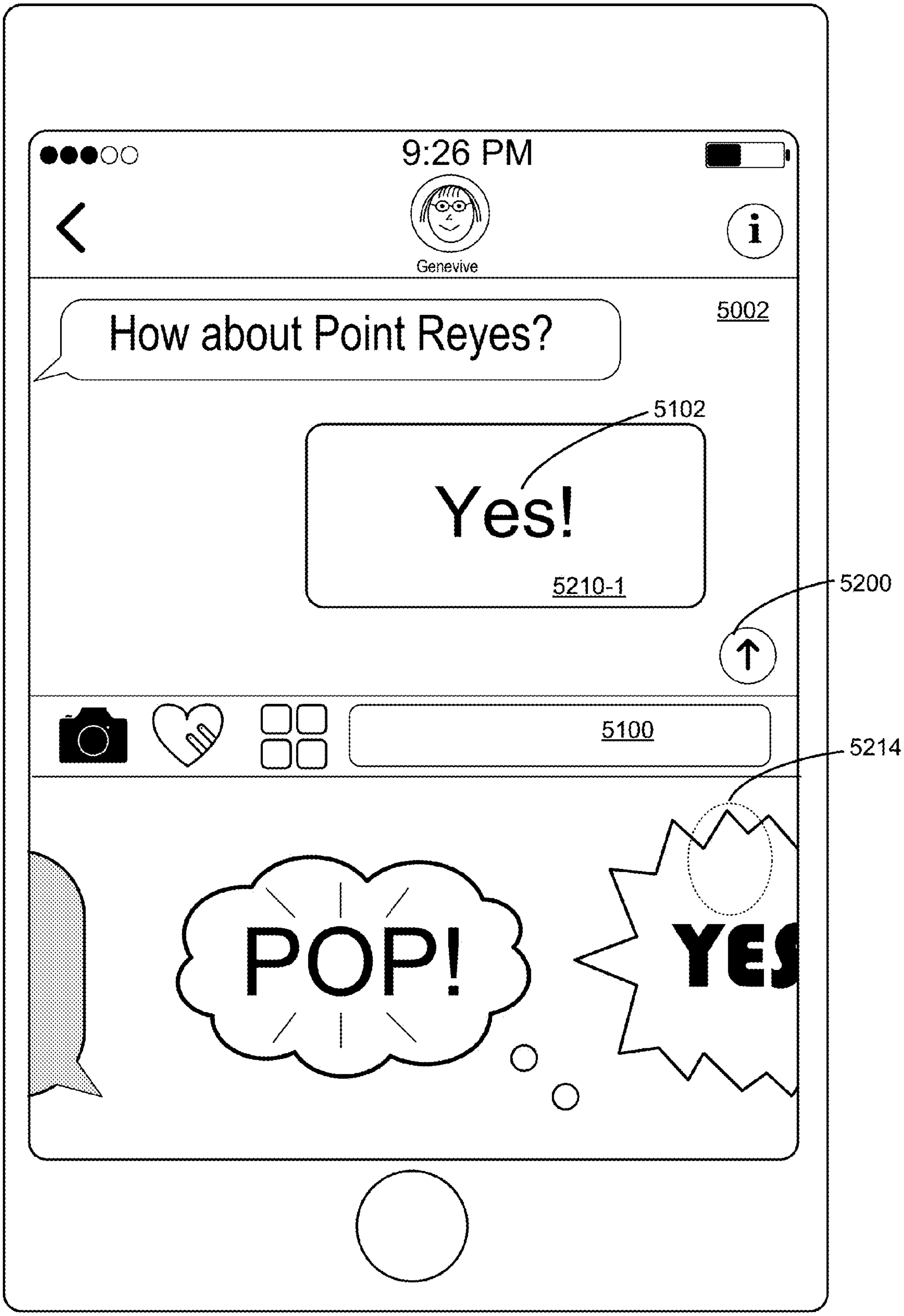
Figure 5D:
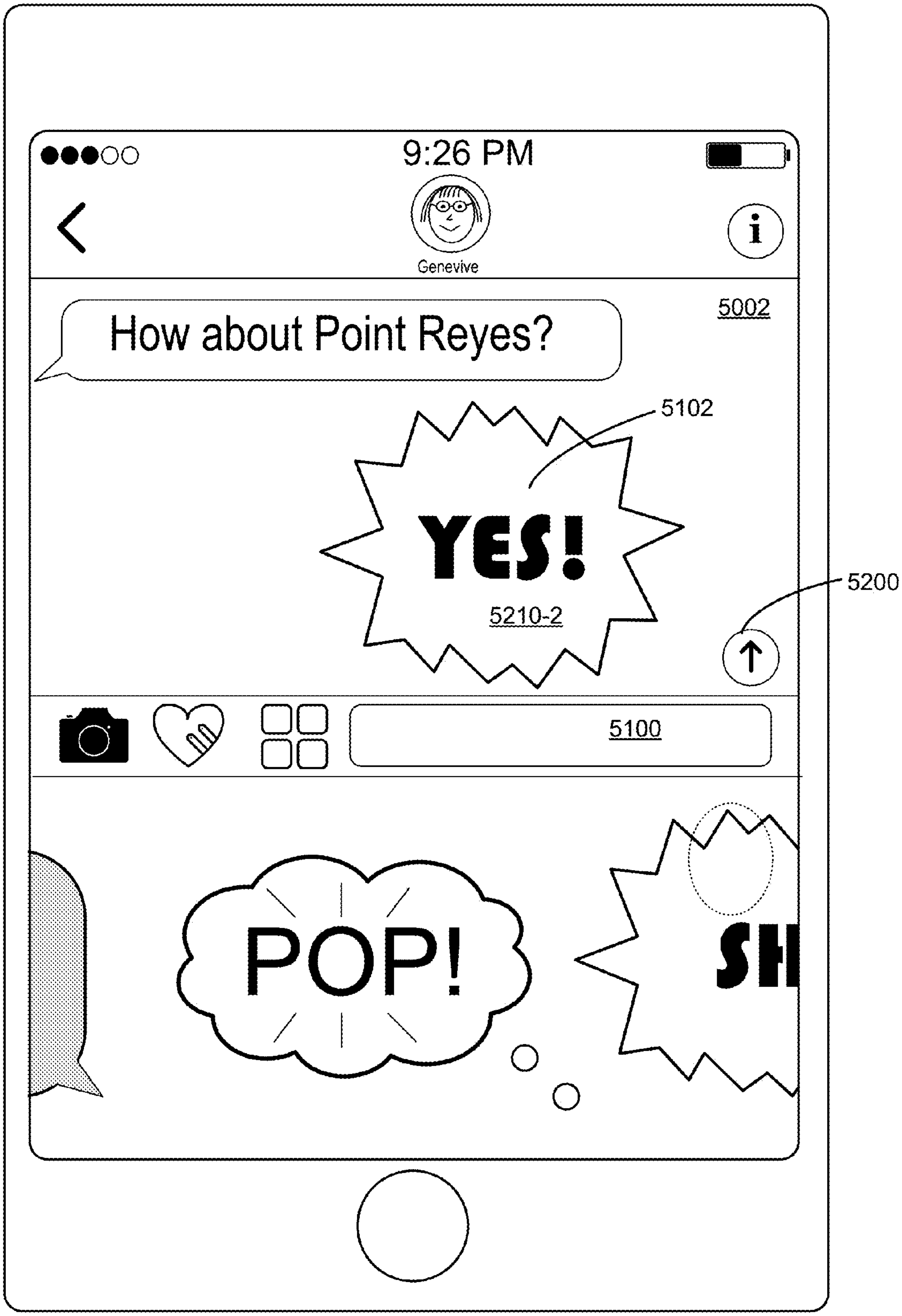
Figure 5D:
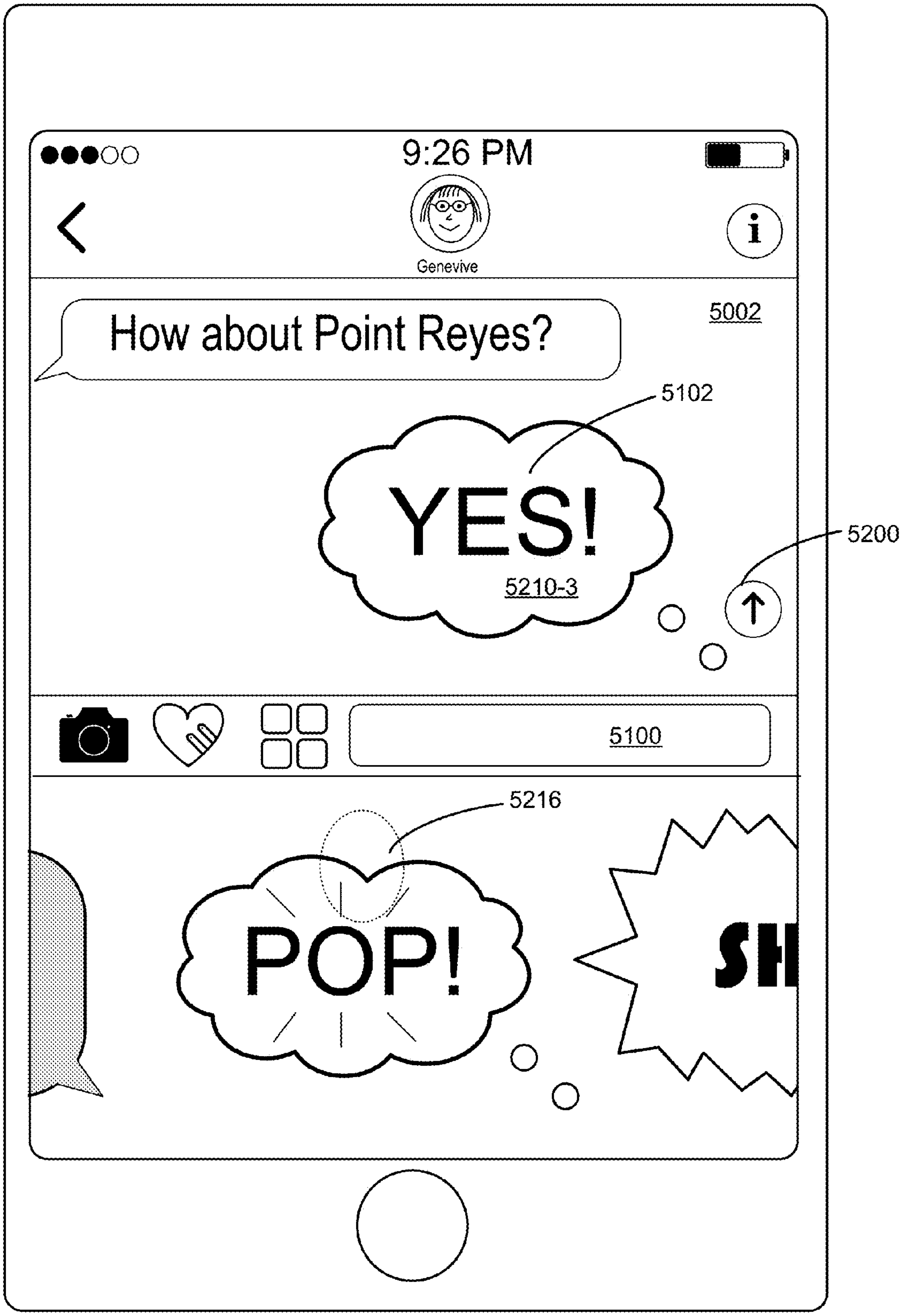
Figure 5D:
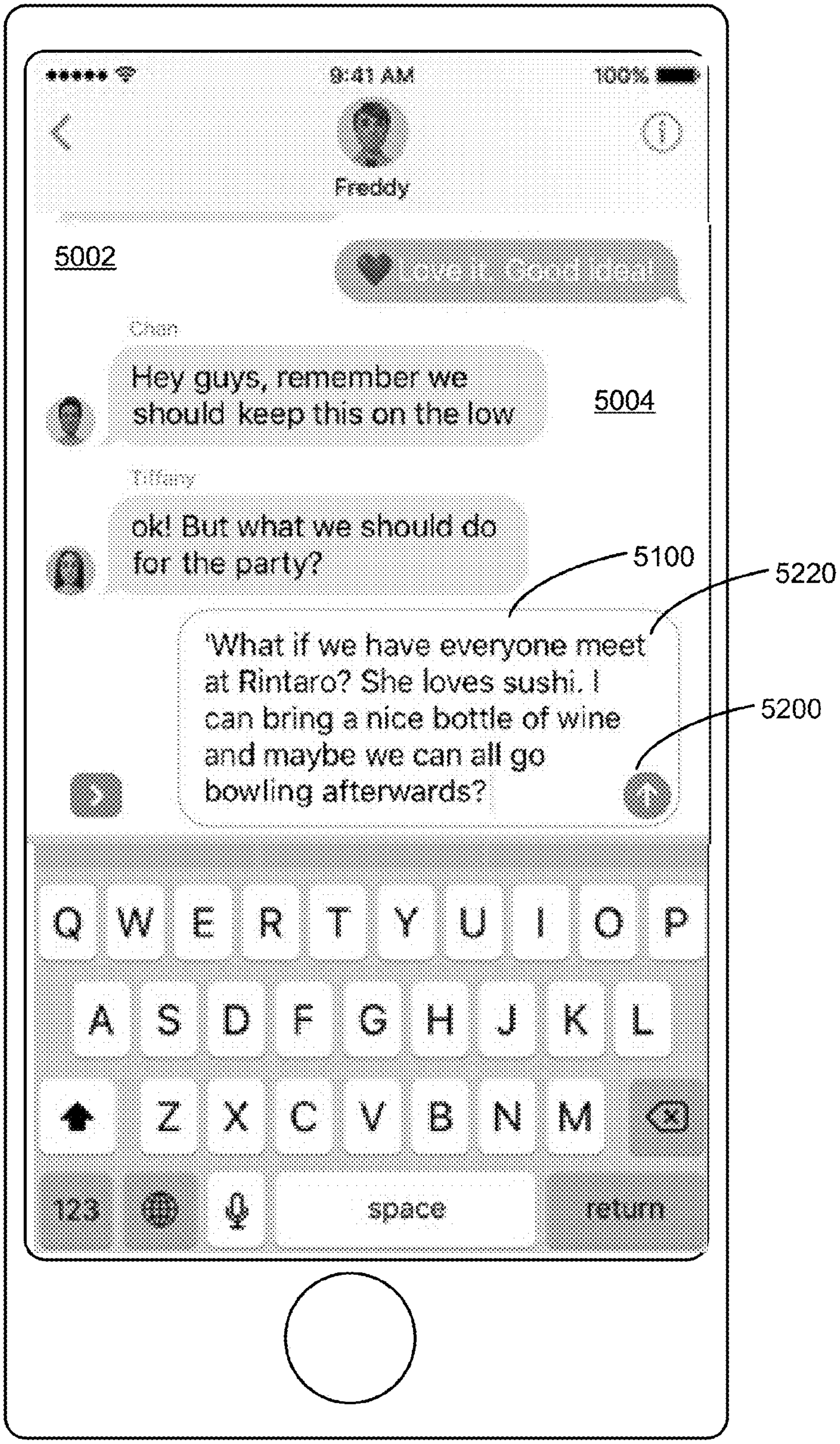
Figure 5D:
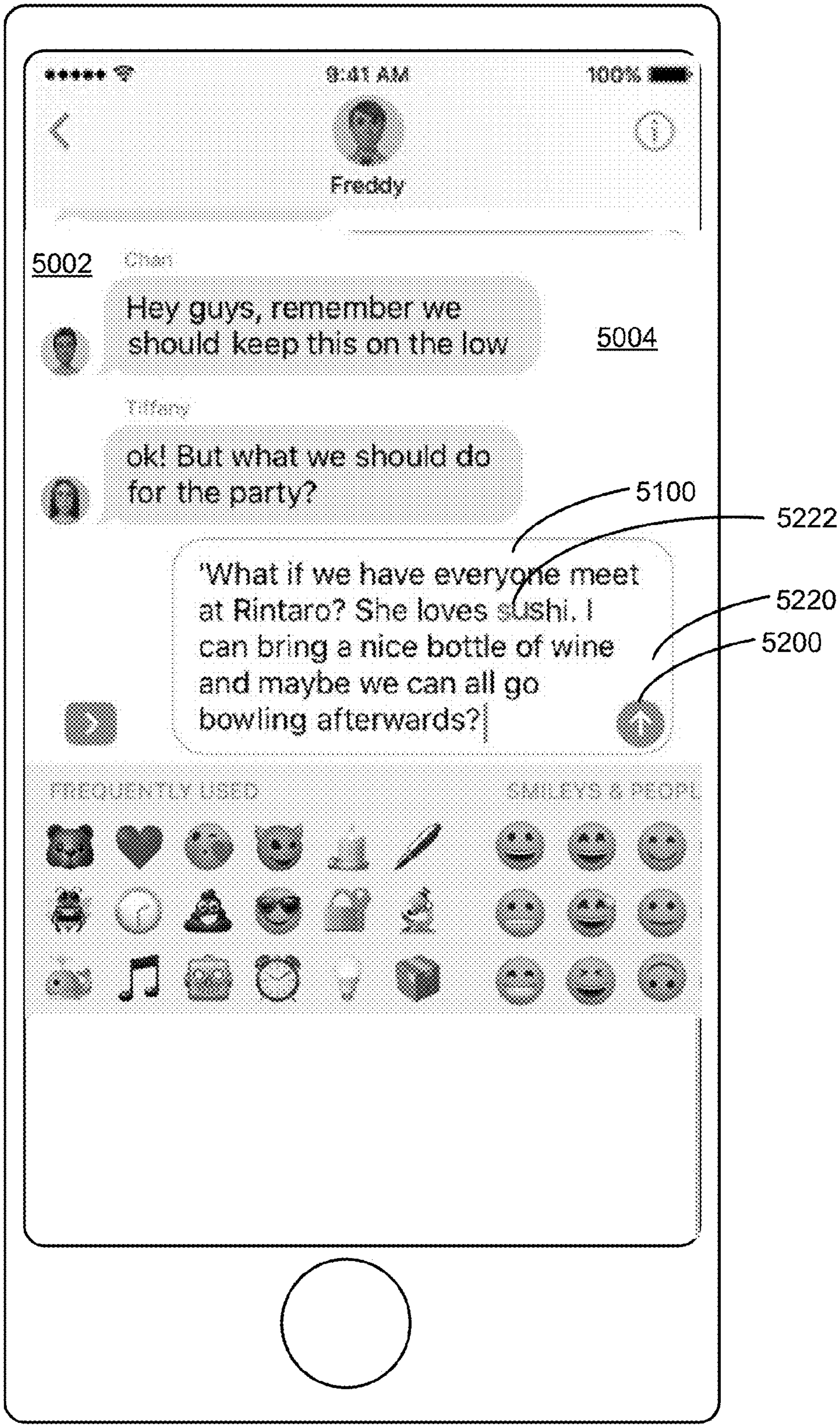
Figure 5D:
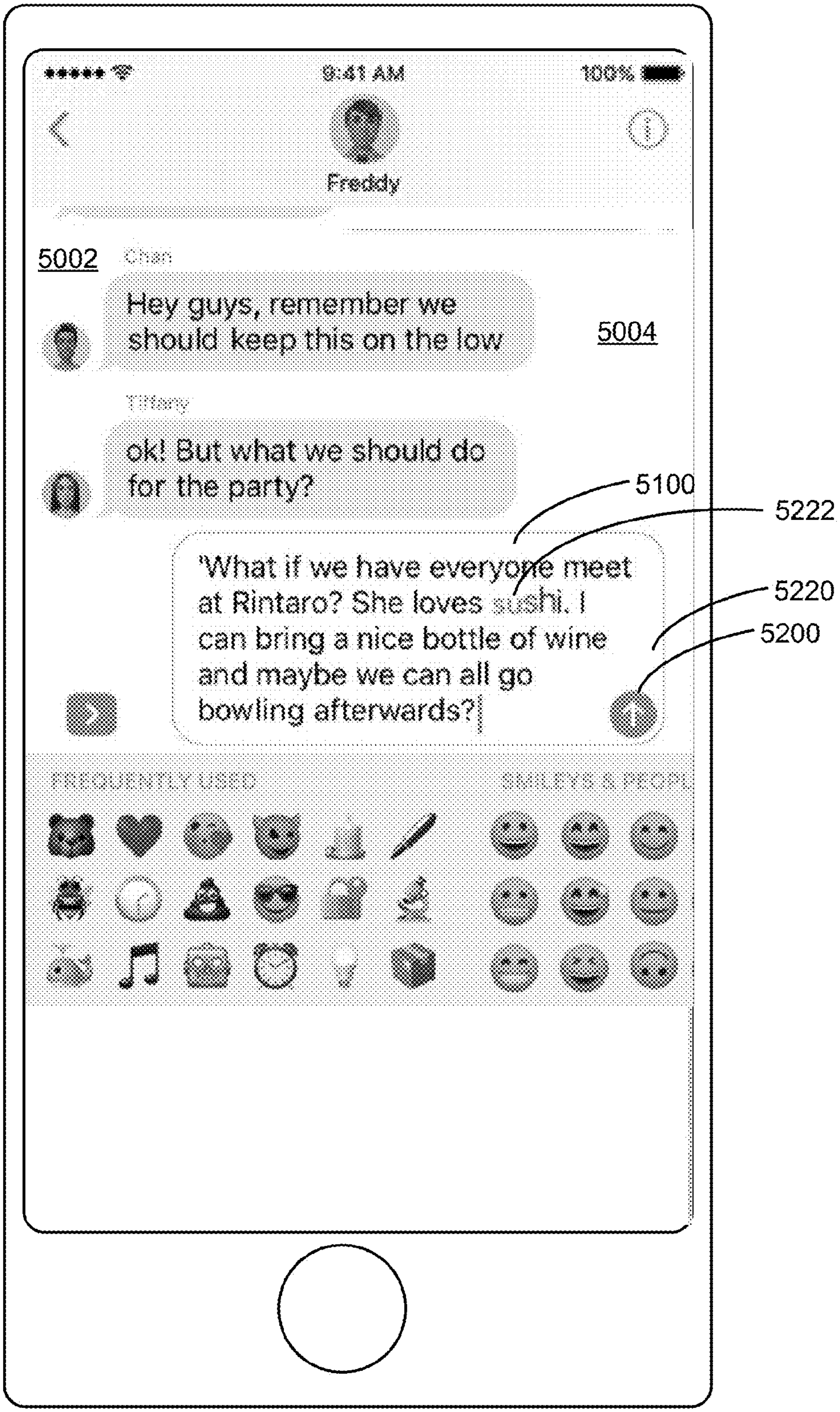
Figure 5D:
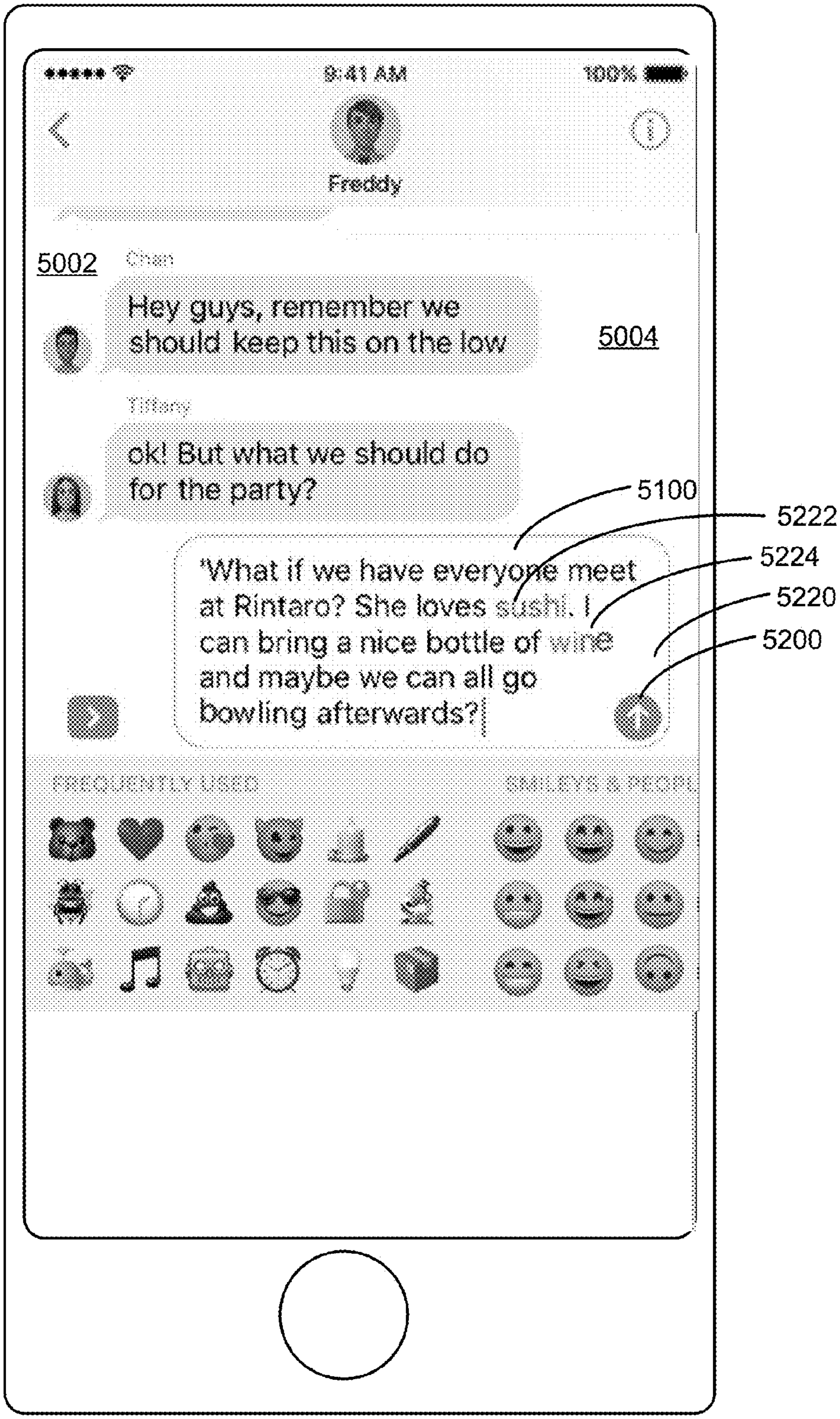
Figure 5D:
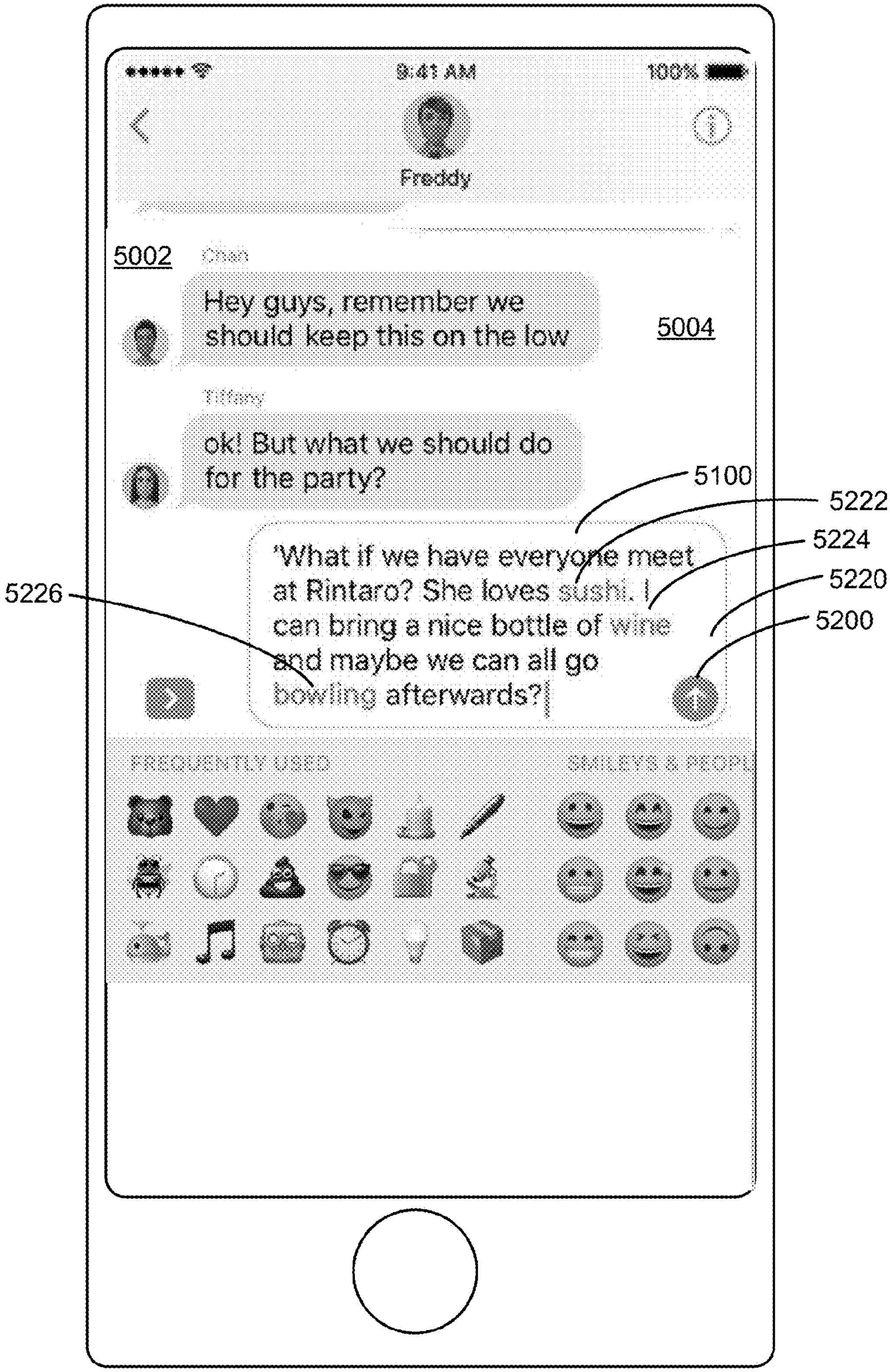
Figure 5D:
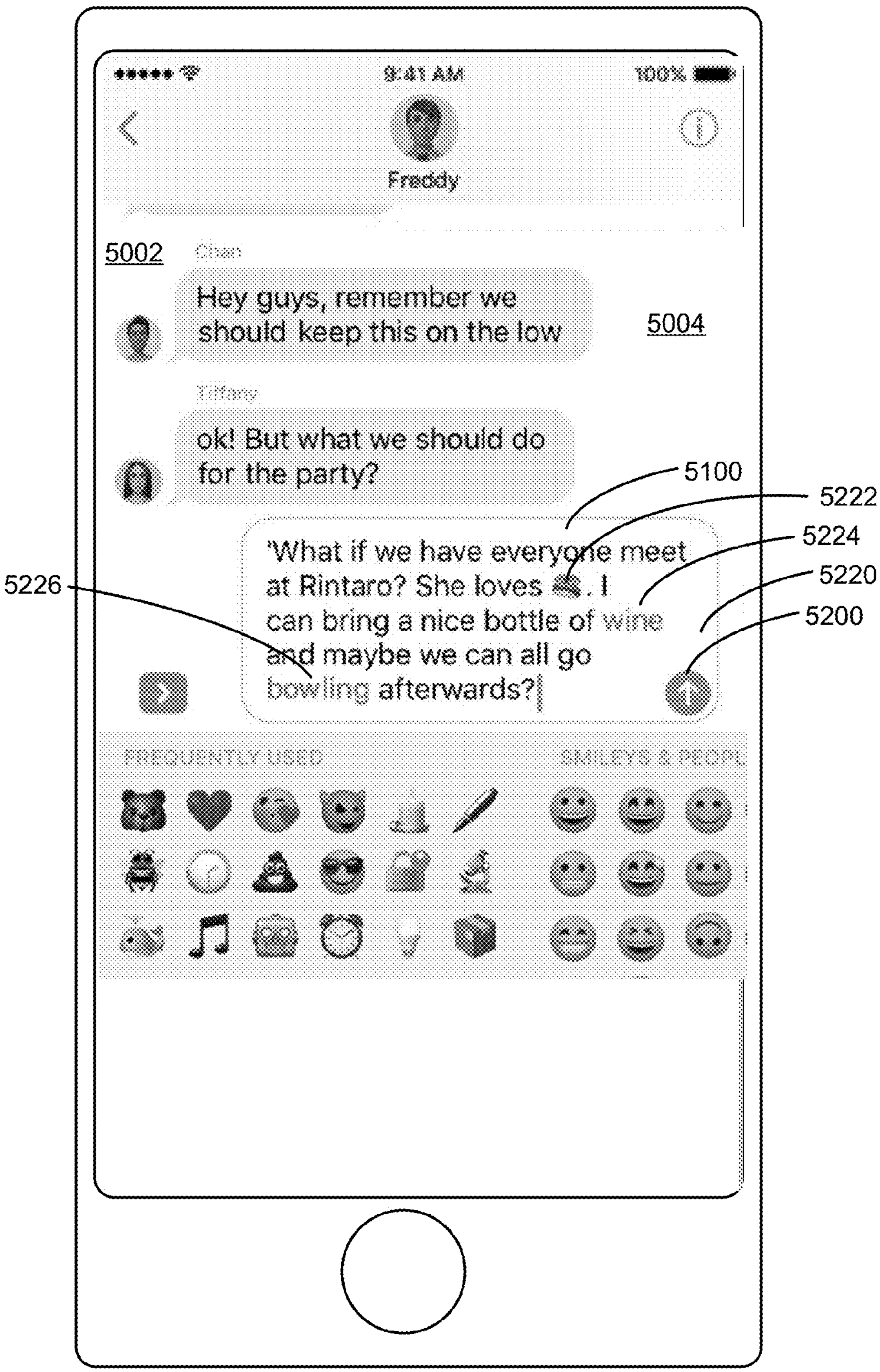
Figure 5D:
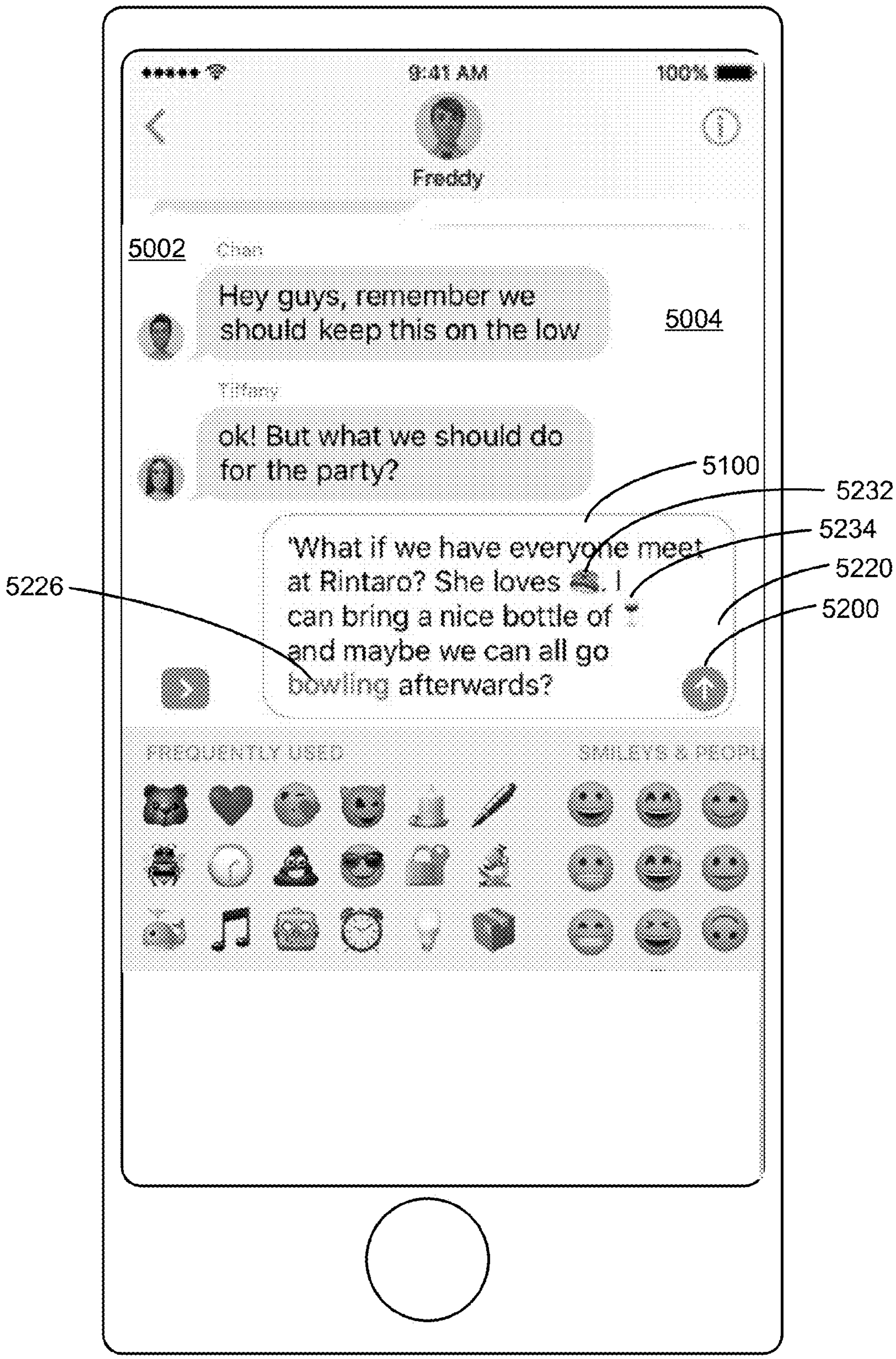
Figure 5D:
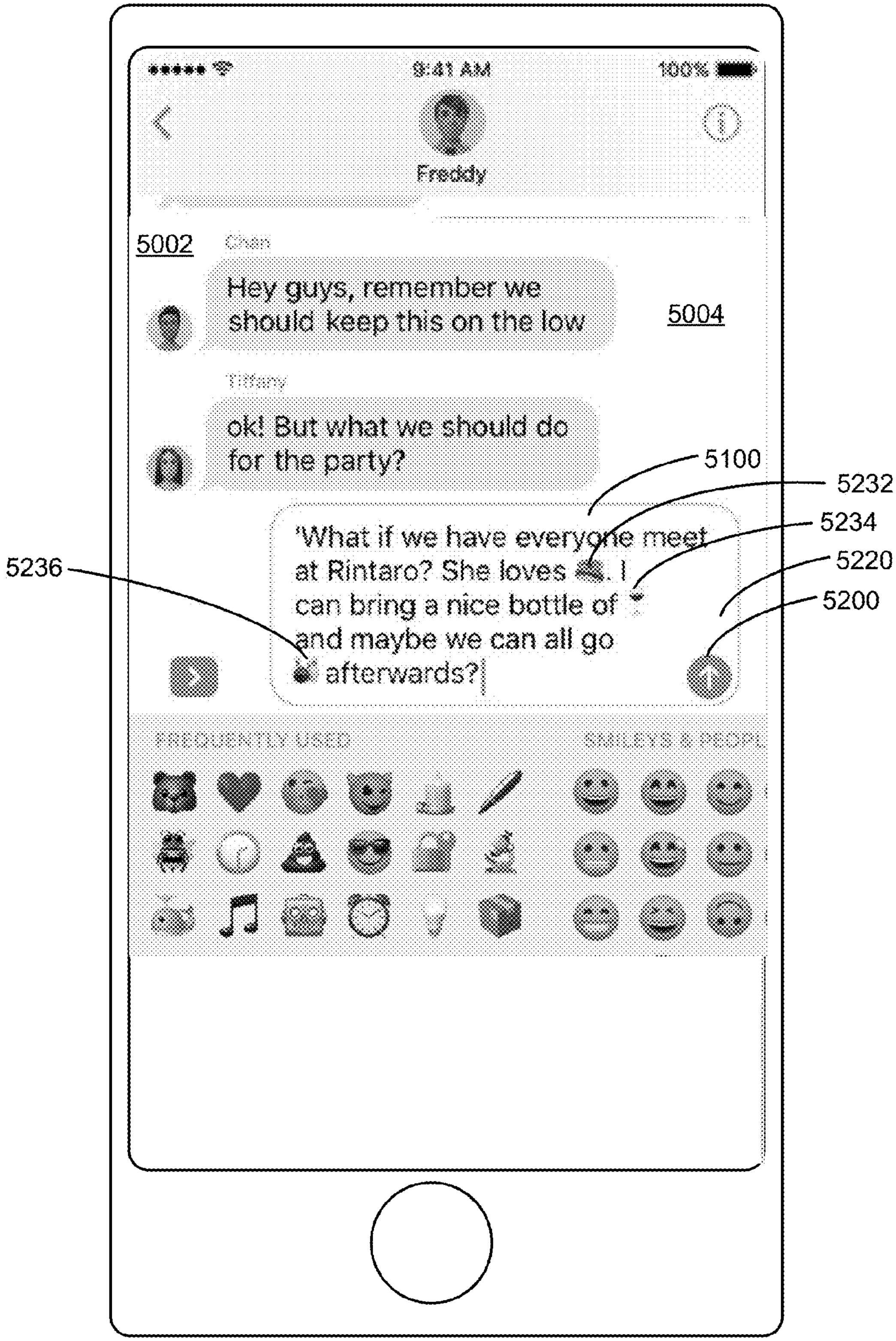
Figure 6A:
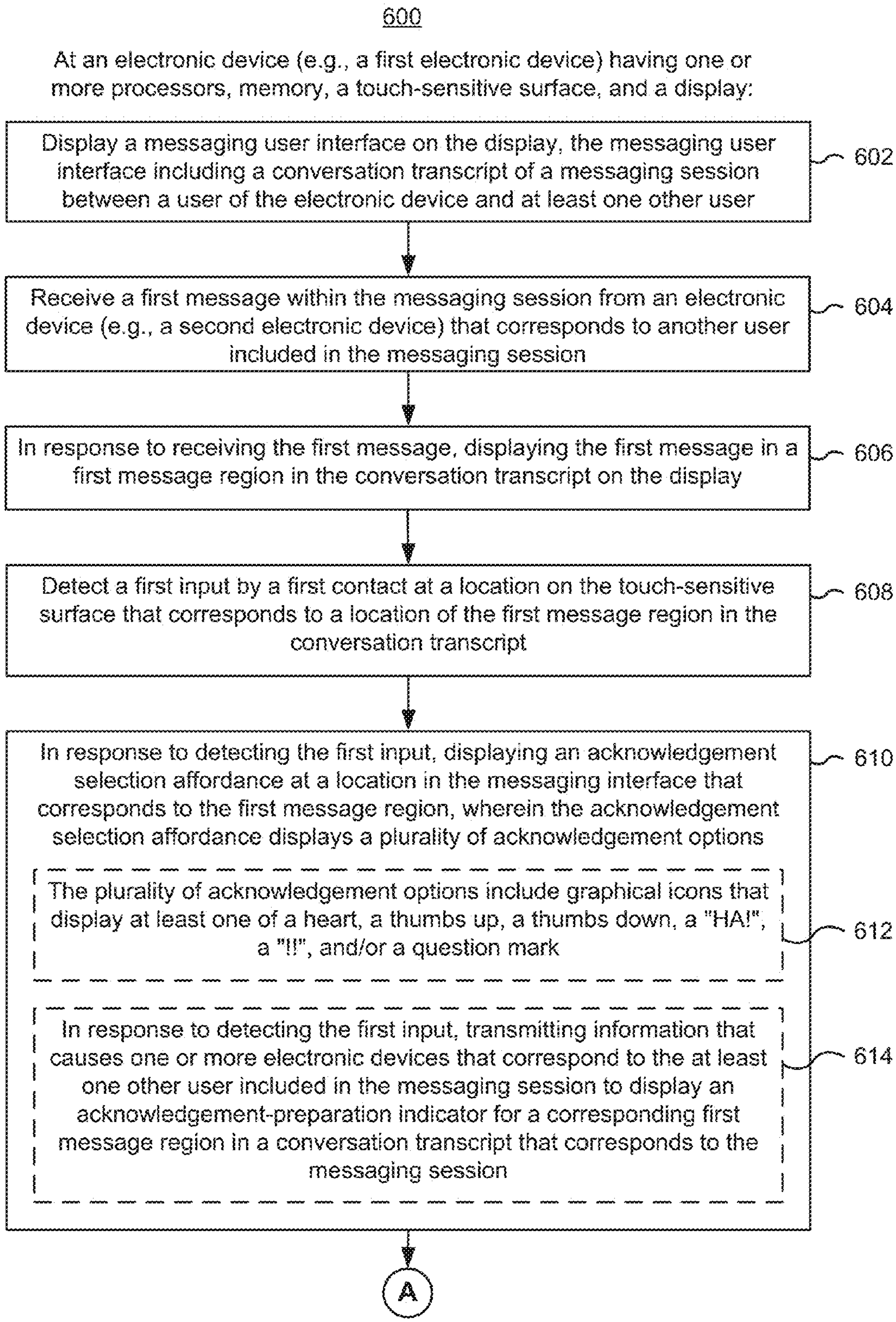
Figure 6B:
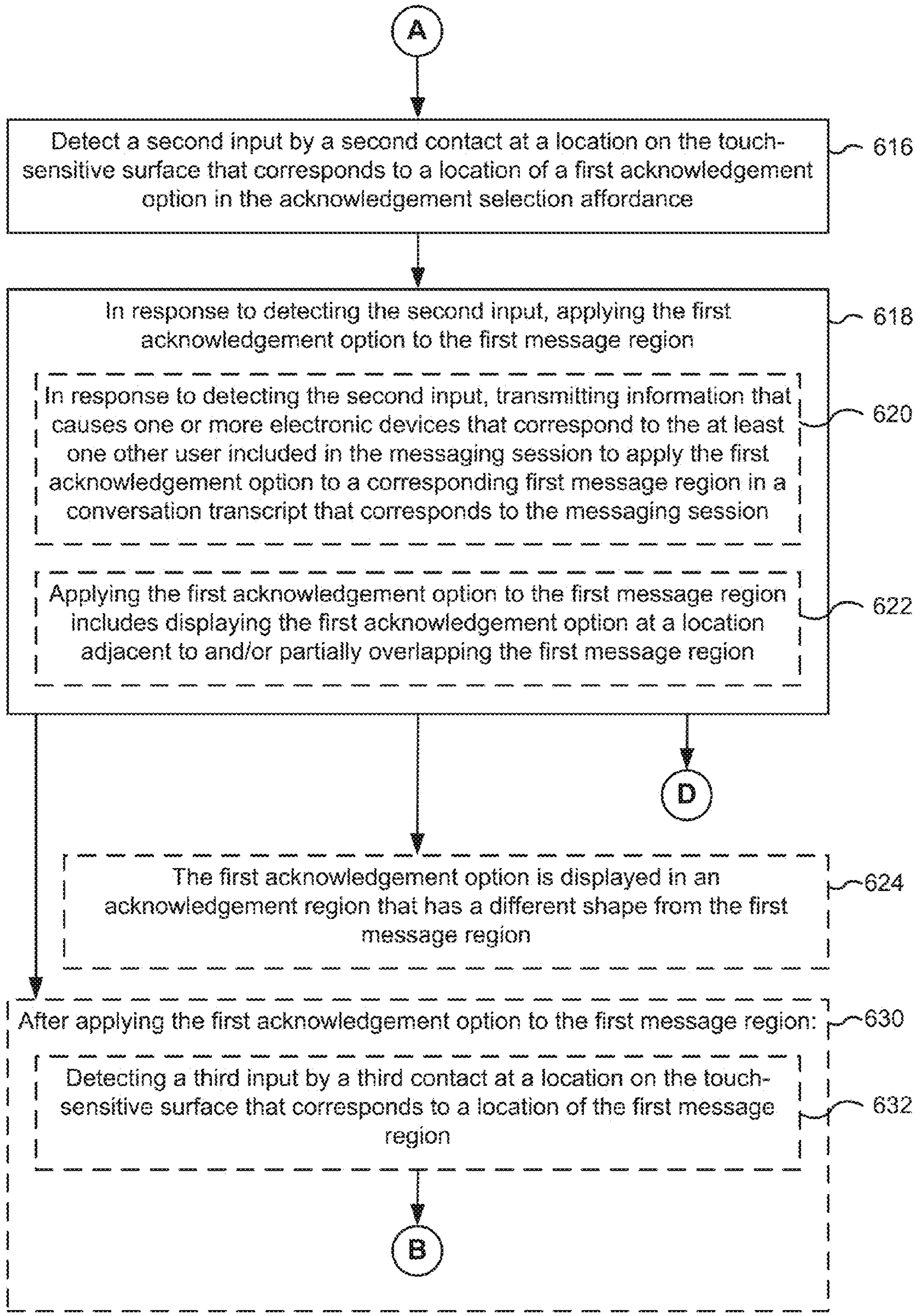
Figure 6C:
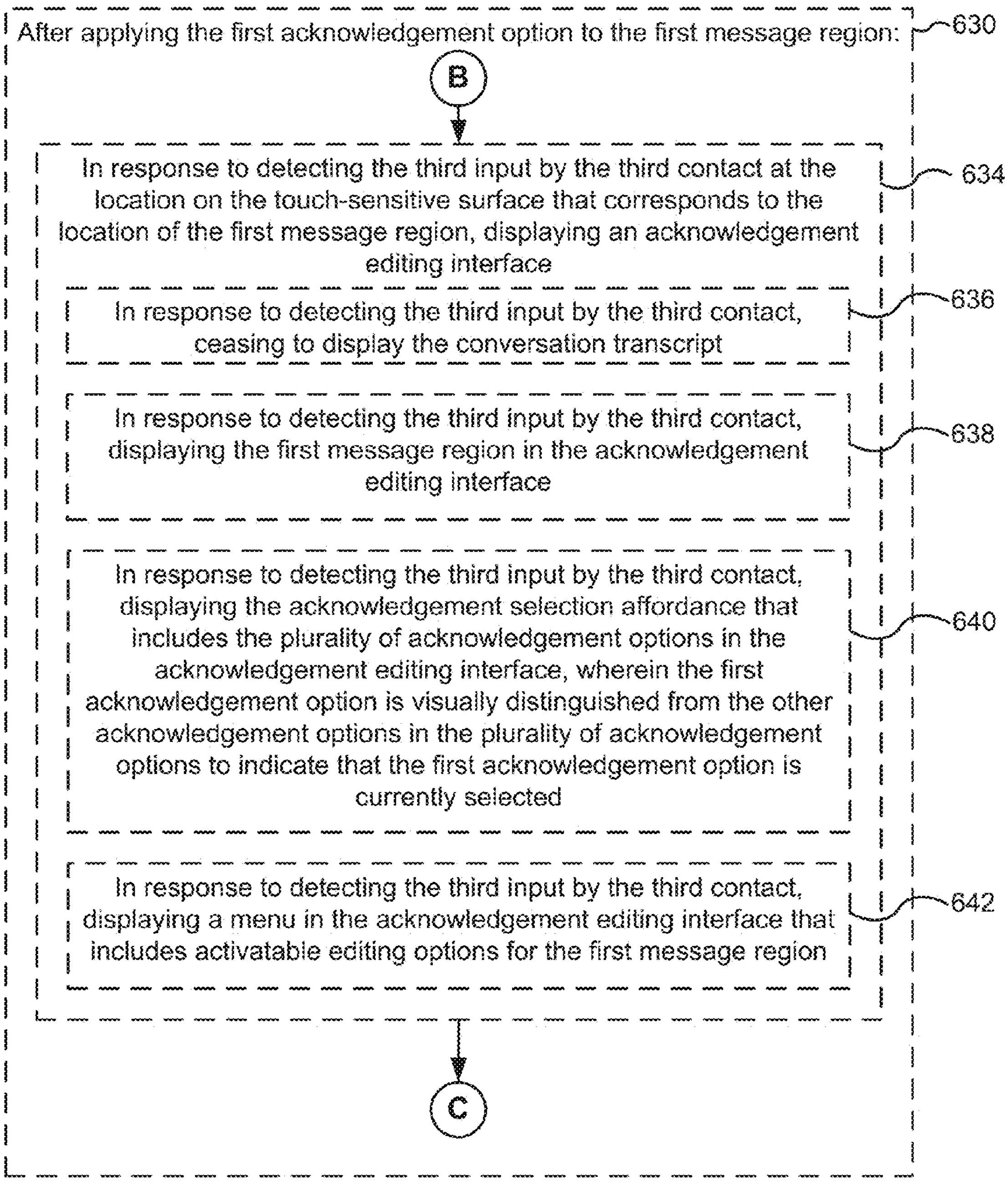
Figure 6D:
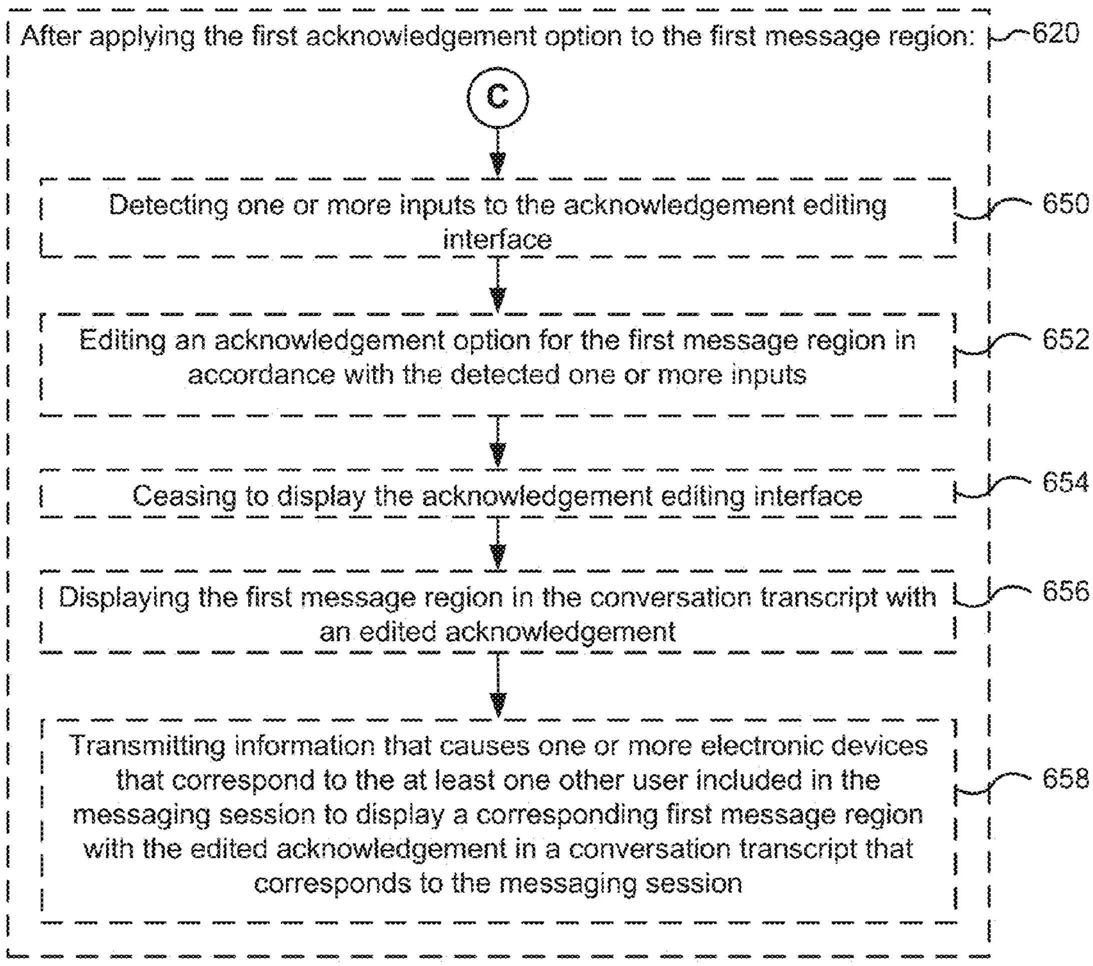

In some alternative embodiments, illustrated in FIGS. 5X, 5Y and 5Z, a deep press input 5108-1, 5108-2, 5108-3, as shown in FIGS. 5X, 5Y and 5Z, when detected by the electronic device, causes the messaging application to display an impact selection interface 5110, FIG. 5AA, that includes a plurality of impact effect options (e.g., impact effect options 5112-1 through 5112-4. The increasing intensity of the deep press input is represented by the intensity diagrams in FIGS. 5X, 5Y and 5Z. Further, the deep press input 5108-1, 5108-2, 5108-3, on impact selection affordance 5104, as shown in FIGS. 5X, 5Y and 5Z, followed by a drag to the first impact effect option (e.g., input 5108-4 on impact effect option 5112-1, FIG. 5AA) and then pausing while over the affordance for a respective impact effect option 5112, selects that impact effect option.

The impact selection interface 5110, FIG. 5AA, includes a "bubble" affordance 5114 for displaying a selecting message region impact effect options, and a "screen" affordance 5116 for selecting full screen impact effect options.

In some embodiments, the impact selection interface 5110, shows an animated preview of the currently selected impact effect option. For example, the sequence of FIGS. 5AB-5AD show an animated preview of the "loud" impact effect option, which is a message region impact effect option, being applied to first message input ("Congratulations!") in response to an input 5108-5 at a location on the touch-sensitive surface that corresponds to a location of the "loud" impact effect option. In this example, the preview of the "loud" impact effect option shows the font size of the message and the size of a message region at first increasing and then decreasing.

In another example, the, sequence of FIGS. 5AE-5AG show an animated preview of the "slam" impact effect option, which is a message region impact effect option, being applied to first message input ("Congratulations!") in response to a second input 5108-6 at a location on the touch-sensitive surface that corresponds to a location of the "slam" impact effect option. In this example, the preview of the "slam" impact effect option shows the font size of the message and the size of a message region at first increasing and then decreasing, and at the same time changing the tilt or rotation state of the message region, and optionally changing the shade or color of a background region surrounding the message region. Optionally, the application of a respective impact effect option may change additional characteristics of the message region to which the impact effect option is applied, such as font color, background shade or color within the message region, etc.

FIG. 5AG also shows a third input 5108-7 on a send affordance, at a location corresponding to a user-selected impact effect option, in this case the "slam" option. In response, the electronic device of the user composing the message ceases to display the impact selection interface and displays a message region that contains the first message input in the conversation transcript, and in some embodiments, applies the selected impact effect option to the message region, as shown in FIG. 5AH, or to the entire conversation transcript, as shown in the FIG. 5AI (enlarging the message region to which the impact effect option was applied and decreasing the size of one or more other message regions in the conversation transcript), and then transitioning to a final or static display of the conversation transcript that includes the sent message, as shown in FIG. 5AJ. Similarly, the sent message is displayed at the electronic device of one or more other users in the messaging session, such as Wendy, with the selected impact effect option applied to the either message region of the sent message or the entire conversation transcript, depending on which impact effect option was selected by the sending user, one example of which is shown in the sequence of FIGS. 5AK, 5AL, 5AM.

The sequence of FIGS. 5AN-5AS show an example of the "loud" impact effect option applied to a respective sent message ("congrats"). The sequence of FIGS. 5AT-5AW show an example of the "gentle" impact effect option applied to a respective sent message ("I'm sorry.").

In some embodiments, the selected impact effect option is applied to all (or substantially all) of the display screen of an electronic device that sends or receives the message, which includes the message region with the sent message, for a full-screen effect, an example of which is shown by the sequence of user interface images in FIGS. 5AX through 5BF. FIGS. 5AX through 5BF show the progression of the "slam" effect of a first message input ("Hell No!!"), starting with the first message input displayed shown enlarged, rotated and with a dark background (FIG. 5AX), then displayed even larger and with a somewhat lighter background (FIG. 5AY), then less enlarged and rotated at a different angle than before (FIG. 5AZ), then shown with further reduced enlargement and with blurry borders (FIG. 5BA), then shown with reduced size a different background and a different rotation (FIG. 5BB) and then with a sequence of different shadows around the message region (FIGS. 5BC, 5BD, 5BE) until the first message input is shown at normal (default) size, not rotated, and with a normal (default) background (FIG. 5BF).

FIGS. 5BG-5CA illustrate exemplary user interfaces for interacting with concealed messages. An impact selection interface 5110, shown in FIG. 5BG, includes a plurality of impact effect options (e.g., impact effect options 5112-1 through 5112-4, described elsewhere in this document with respect to FIG. 5AA). In this example, the impact selection interface 5110 also includes a "bubble" affordance 5114 for displaying a selecting message region impact effect options, and a "screen" affordance 5116 for selecting full screen impact effect options.

In some embodiments, the displayed impact effect options include an option that conceals the content of a message in the conversation transcript ("invisible ink" option 5112-1, FIG. 5AA, indicated in FIG. 5BG by an empty message region). In the example shown in FIG. 5BG, the invisible ink option includes a send affordance 5118 for sending a message (with user-specified message input) with the respective impact effect option. In the example shown in FIG. 5BG, impact selection interface 5110 includes a cancel affordance 5120 for canceling the selection of any impact effect options and returning the messaging application to either a prior user interface of the messaging application or a predefined user interface of the messaging application.

Once a message (hereinafter called the "concealed message" for ease of reference) has been sent with the invisible ink option, the concealed message is not displayed or is obscured, for example by screen elements 5124 that conceal the message, as shown in FIG. 5BH, until the user of the electronic device displaying a conversation transcript that includes the concealed message performs a respective gesture, such as sliding a touch input 5128-*a*, 5128-*b*, 5128-*c* over the message region containing the concealed message, as shown in the sequence of FIGS. 5BH through 5BL, which temporarily reveals a portion of the message corresponding to the position of the touch input 5128-1, 5128-*b*, 5128-*c*; or performing a deep press gesture on the message region containing the concealed message, as shown in the sequence of FIGS. 5BM-5BP, in which the portion of the concealed message that is revealed corresponding to the intensity of the deep press input 5130-*a*, 5130-*b*, 5130-*c*, and optionally also corresponding to the position of the deep press input 5130-*a*, 5130-*b*, 5130-*c*. In these examples, the concealed message is concealed again in response to detecting termination of the input by the contact that caused the concealed message, or portions thereof, to be temporarily revealed.

In another example, the sequence of FIGS. 5BQ-5BV, show a concealed message being gradually revealed, as shown in FIGS. 5BQ to 5BT, and then gradually concealed, as shown in FIGS. 5BT to 5BV. In yet another example, the sequence of FIGS. 5BW-5CA, show a concealed message that contains a picture of photograph being gradually revealed.

FIGS. 5CB-5CW illustrate exemplary user interfaces for triggering enhanced message content and applying an effect to a messaging user interface when a message includes an enhanced message content trigger. More particularly, a respective message in a messaging session can be sent with an enhanced message content trigger, and when an electronic device with a compatible messaging application receives that message with the enhanced message content trigger, the electronic device displays a conversation transcript with the received message and with enhanced message content. In some embodiments, the particular enhanced message content to be displayed is indicated by one or more parameters in the enhanced message content trigger.

FIGS. 5CB and 5CC show an example of a user interface displaying a preview of a full screen impact effect, in this case a full screen impact effect that includes moving or animated balloons 5152-1. As shown in FIG. 5CB, the user of the electronic device composing the message "Congratulations!" has selected the "screen" affordance 5116, for selecting full screen impact effect options. Similarly, the sequence of FIGS. 5CD-5CF show an example of a user interface displaying a preview of a full screen impact effect, in this case a full screen impact effect that includes moving or animated confetti 5152-2. In the example shown here, the user navigates through the available full screen impact effects using swipe gestures, such as swipe gesture 5156 shown in FIG. 5CC, which cause the electronic device to moves from a preview of the balloon full screen impact effect shown in FIG. 5CC to the confetti full screen impact effect shown in FIG. 5CD. As shown in FIGS. 5CB and 5CC, the user interface may include an effect option indicator 5154 (sometimes called page dots) to indicate which full screen effect option is currently selected or is currently being previewed, and also to indicate how many full screen effect options are available and which one of those options in a sequence of the full screen effect options is currently being viewed.

FIG. 5CG is an example of a user interface having a conversation transcript in which none of the messages include an enhanced message content trigger, and thus the messages in the transcript are displayed without displaying enhanced message content corresponding to a trigger.

The sequence of FIGS. 5CH-5CO shows an example of a balloons full screen effect being displayed when a message ("Happy Birthday!!!!!") containing a corresponding enhanced message content trigger is received. Similarly, the sequence of FIGS. 5CP-5CW shows an example of a fireworks full screen effect being displayed when a message ("Happy New Year!!!") containing a corresponding enhanced message content trigger is received.

FIGS. 5CX-5DC illustrate exemplary user interfaces for detecting and responding to combinable content in separate messages. In FIG. 5CX, a messaging user interface 5002 includes a conversation transcript 5004 a messaging session between a user of the electronic device and at least one other user (e.g., a user of another electronic device) including a first other user, and a message input area 5100. A received first message 5170 in a first message region 5008 is shown in the conversation transcript 5004. The first message 5170, for example a beer glass, has first combinable content (e.g., an emoticon or an image such as an emoji or a sticker). In FIG. 5CY, the user of the electronic device inputs a second message 5172 in message input area 5100 of the messaging user interface 5002, and sends the second message 5172 by an input 5174 that selects a send affordance 5118. This results in the display of the messaging user interface shown in FIG. 5CZ.

If the second message 5172 contains second combinable content that forms a predefined combination with the first combinable content in the first message 5170, content 5176, the electronic device displays content that corresponds to the predefined combination, such as an animation of two beer glasses being clicked together (as shown in FIG. 5DA) and/or display of the word "Cheers!" (as shown in FIG. 5DA). Similarly, the electronic devices of the one or more other users in the messaging session would display the first message, the second message, and the content that corresponds to the predefined combination. It is noted that the content 5176 that corresponds to the predefined combination may be an animation that is briefly displayed after the second message is sent. Optionally, display of the content that corresponds to the predefined combination is repeated periodically while both the first and second messages with the combinable content are displayed in the conversation transcript 5004, or when other predefined criteria are satisfied (e.g., both the first and second messages with the combinable content are displayed in the conversation transcript 5004 and there has been no new activity in the messaging session for at least N seconds, when N is a predefined value between 1 and 60 seconds).

The sequence of FIGS. 5DB and 5DC show another example of combinable content, in which a first user has sent a first message 5178, "Happy," and the second user inputs a second message 5180, "Birthday!" If the first message and second message both include combinable content corresponding to a predefined combination, then content corresponding to the predefined combination would be displayed in the message transcript of the messaging user interface displayed by either the sender's electronic device, or a recipient's electronic device, or (typically) both. For example, the content that corresponds to the predefined combination in this example might be balloons, similar to those shown in FIGS. 5CH-5CO.

FIGS. 5DD-5DI illustrate exemplary user interfaces for selecting a message region type or shape, in accordance with some embodiments. FIG. 5DD shows a messaging user interface 5002 with a message input region 5100 having a first message input 5102 ("Yes!") already entered in the message input region. Messaging user interface 5002 includes a send affordance 5200 in or near message input region 5100, for sending the message that has been input in that region. In addition, FIG. 5DD shows a input with a contact 5202 on an options affordance 5204.

The messaging user interface shown in FIG. 5DE is displayed in response to input with contact 5202 on options affordance 5204, which includes affordances for a number of message processing options, including a message region type/shape selection affordance 5208, labeled the "bubbles" affordance in FIG. 5DE. While displaying this messaging user interface, the electronic device receives an input with contact 5206 on the "bubbles" option affordance 5208.

The messaging user interface shown in FIG. 5DF is displayed in response to input with contact 5206 on "bubbles" affordance 5208. FIG. 5DF also shows a preview message region 5210-1 that includes the first message input 5102, and that has a default, or previously selected, message region type. In these embodiments, the messaging application has a plurality of message region types or options, each having a corresponding shape, and typically having a corresponding font size, and optionally having one or more of: a font color, border color, and/or background color. In the example shown in FIG. 5DF, the send affordance 5200 is displayed near the preview message region 5210-1 instead of in message input region 5100. To select a different message region type for the first message 5172, or to view other available message region types, the user inputs a swipe gesture 5212. In response to swipe gesture 5212, a scrolling set of message region type icons is scrolled, as shown in the progression from FIG. 5DF to FIG. 5DG.

In the example of the messaging user interface shown in FIG. 5DG, an input with contact 5214 is received, which causes the electronic device to change the message region type for the message region to be used with message input 5102, as shown in FIG. 5DH. In FIG. 5DH, message input 5102 is now shown in a message region 5210-2 having a message region type corresponding to the message region type selected by input with contact 5214 (shown in FIG. 5DG). The user can continue to select different message region types. For example, in FIG. 5DI, message input 5102 is now shown in a message region 5210-3 having a message region type corresponding to the message region type selected by input with contact 5216.

FIGS. 5DJ-5DQ illustrate exemplary user interfaces for displaying and selecting automatically suggested emoji while composing a message. In FIG. 5DJ, a messaging user interface 5002 having a conversation transcript 5004 with an input, but not yet sent, message 5220 in message input region 5100 is shown. In this example, the messaging using interface 5002 includes a send affordance 5200 in or near message input region 5100 for sending the input message.

As shown in FIGS. 5DK-5DN, the electronic device begins to automatically make suggestions of emoji to replace one or more words or terms in the message input region 5100. In the example shown, the electronic device highlights word or terms, in sequence in the message, that are candidates for being replaced by emoji, first highlighting the term "sushi" 5222 in the input message 5220, as shown in FIGS. 5DK and 5DL, then highlighting the term "wine" 5224 in the input message 5220, as shown in FIG. 5DM, and then highlighting the term "bowling" 5226 in the input message 5220, as shown in FIG. 5DN. In response to the user of the electronic device selecting one of the highlight terms (e.g., by an input with a contact on a highlighted term), such as "sushi" 5222 in the input message 5220, that term is replaced by a corresponding emoji 5232 corresponding to that term, as shown in FIG. 5DO. Similarly, in FIG. 5DP, the term "wine" in the input message 5220 has been replaced by an emoji 5234 (e.g., a wine glass emoji) corresponding to that term in response to a user selection of the highlighted term "wine" in the input message 5220. In a third example, the term "bowling" in the input message 5220 has been replaced by an emoji 5236 (e.g., a bowling emoji) corresponding to that term in response to a user selection of the highlighted term "bowling" in the input message 5220.

Message Acknowledgements

FIGS. 6A-6E are flow diagrams of a process for applying an acknowledgement to a message region in a conversation transcript, in accordance with some embodiments. More specifically, these methods relate to displaying an acknowledgement selection affordance that includes a plurality of acknowledgement options and applying a selected acknowledgement option to a received message. In some embodiments, an indication of the applied acknowledgement option is transmitted to a remote device (e.g., for display within a conversation transcript of the remote device). The acknowledgement allows a user to quickly communicate a sentiment without having to type multiple words. It saves user time by saving keystrokes and, therefore, creates a more efficient man-machine interaction.

One or more examples of an electronic device (e.g., portable multifunction device 100 or device 300) implementing these methods are shown in FIGS. 5A-5K FIGS. 6A-6E are flow diagrams illustrating a method 600, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

While performing method 600, the electronic device displays (602) a messaging user interface (e.g., of a messaging application) on the display. The messaging user interface includes a conversation transcript of a messaging session between a user of the electronic device and at least one other user (e.g., of another electronic device). See for example, FIG. 5A, conversation transcript 5004 in messaging user interface 5002. The electronic device receives (604) a first message within the messaging session from an electronic device (e.g., a second electronic device) that corresponds to another user included in the messaging session. For example, in FIG. 5A, message 5006 is a first message.

In response to receiving the first message, the electronic device displays (606) the first message (e.g., message 5006, FIG. 5A) in a first message region (e.g., message region 5008-1, FIG. 5A) in the conversation transcript (e.g., conversation transcript 5004, FIG. 5A) on the display. As used herein, a message region is a message region, bubble, platter, or other container for a message in a conversation transcript of a messaging session. The electronic device furthermore detects (608) a first input by a first contact (e.g., contact 5010, FIG. 5A) at a location on the touch-sensitive surface that corresponds to a location of the first message region in the conversation transcript. For example, the first contact may be a tap gesture, long press gesture, light press gesture, or deep press gesture on the first message region or on a hidden hit region for the first message region.

Next, in response to detecting the first input, the electronic device displays (610) displaying an acknowledgement selection affordance (e.g., acknowledgement selection affordance 5012, FIG. 5B) at a location in the messaging interface that corresponds to the first message region. The acknowledgement selection affordance displays a plurality of acknowledgement options. For example, see acknowledgement options 5014-1 to 5014-6 in FIG. 5B. In some embodiments, the acknowledgement selection affordance is an acknowledgement selection platter displayed proximate to and/or overlapping the first message region. In some embodiments, in accordance with a determination that a characteristic intensity of the contact is above a first intensity threshold, the acknowledgement selection affordance is displayed. In some embodiments, a user can reveal additional acknowledgement options, in addition to an initially displayed set of acknowledgement options 5014, by performing a predefined input gesture, such as a gesture that includes repeated deep presses, a drag gesture, etc.

In some embodiments, the plurality of acknowledgement options include (612) graphical icons that display at least one of a heart, a thumbs up, a thumbs down, a "HA!", a "!!", and/or a question mark. (See, for example, acknowledgement options 5014-1 to 5014-6 shown in FIG. 5B).

In some embodiments, method 600 includes, in response to detecting the first input, transmitting (614) information that causes one or more electronic devices that correspond to the at least one other user included in the messaging session to display an acknowledgement-preparation indicator for a corresponding first message region in a conversation transcript that corresponds to the messaging session (e.g., causing the other devices in the messaging session to display an acknowledgement region with animated ellipses marks adjacent to and/or partially overlapping the corresponding first message region in the conversation transcript of the at least one other user's device, analogous to what is shown in FIG. 5G).

After detecting and responding to the first input, the electronic device detects (616) a second input by a second contact (e.g., contact 5016, FIG. 5B) at a location on the touch-sensitive surface that corresponds to a location of a first acknowledgement option (e.g., acknowledgement option 5014-2, FIG. 5B) in the acknowledgement selection affordance (e.g., acknowledgement selection affordance 5012, FIG. 5B). Optionally, detecting the second contact is accomplished by, for example, detecting a tap gesture, light press gesture, deep press gesture, or lift off on the first acknowledgement option or on a hidden hit region for the first acknowledgement option. In some embodiments, the first contact and the second contact are distinct contacts, such as contacts in two different tap gestures made by the same finger. In some embodiments, the first contact and the second contact are different parts of the same continuous contact with the touch-sensitive surface, such as a long press, light press, or deep press on the first message region followed by a drag to the first acknowledgement option and lift off at the first acknowledgement option.

In response to detecting the second input, the electronic device applies (618) the first acknowledgement option to the first message region. For example, FIG. 5C shows a first acknowledgment option 5014-2 applied to a first message region. In some embodiments, the electronic device also ceases to display the acknowledgement selection affordance in response to detecting the second input.

In some embodiments, applying (618) the first acknowledgement option to the first message region includes displaying (620) the first acknowledgement option at a location adjacent to and/or partially overlapping the first message region. See, for example, FIG. 5C, which shows first acknowledgement option 5014-2 applied to, and in this case, partially overlapping, a corresponding first message region.

Optionally, in some embodiments, in response to detecting the second input, the electronic device transmits (622) information that causes one or more electronic devices that correspond to the at least one other user included in the messaging session to apply the first acknowledgement option to a corresponding first message region in a conversation transcript that corresponds to the messaging session. In some embodiments, this is accomplished by transmitting information that causes the other devices in the messaging session to display the first acknowledgement option adjacent to and/or partially overlapping the corresponding first message region in the conversation transcript of the at least one other user's device. See, for example, FIG. 5H, which shows the conversation transcript as displayed on one of the other devices in the messaging session, including first acknowledgement option 5014-2 applied to (and in this case, partially overlapping) a corresponding first message region. In some embodiments, the first acknowledgement option (e.g., first acknowledgement option 5014-2) replaces an acknowledgement-preparation indicator (e.g., acknowledgement-preparation indicator 5020, FIG. 5G) for a corresponding first message region (e.g., via an animated transition).

In some embodiments, the first acknowledgement option is displayed in an acknowledgement region that has a different shape from the first message region (e.g., as shown in FIG. 5C, a respective message region 5008-1 for a message from another user is rectangular and/or includes a first indicator that the first message is from the other user (e.g., a tail section "<" pointing towards a first side of the display), whereas a respective acknowledgement region 5018 is circular and/or includes a second indicator that the acknowledgement is from the user (e.g., a tail section "Oo" pointing towards a second side of the display, opposite the first side)).

In some embodiments, method 600 includes, after applying the first acknowledgement option to the first message region (and, in some embodiments, ceasing to display the acknowledgement selection affordance), performing a sequence of operations (632-658) that includes detecting (632) a third input by a third contact (e.g., contact 5022, FIG. 5C) at a location on the touch-sensitive surface that corresponds to a location of the first message region (or, in some embodiments, the first acknowledgement option). In some embodiments, detecting (632) the third input includes detecting a tap gesture, long press gesture, light press gesture, or deep press gesture on the first message region (or the first acknowledgement option) or on a hidden hit region for the first message region (or the first acknowledgement option).

In such embodiments, method 600 further includes, in response to detecting (632) the third input by the third contact at the location on the touch-sensitive surface that corresponds to the location of the first message region (or, in some embodiments, the first acknowledgement option), displaying (634) an acknowledgement editing interface (e.g., acknowledgement editing interface 5024, FIG. 5D). Optionally, the acknowledgement editing interface is displayed on top of and/or in place of the conversation transcript.

In such embodiments, method 600 further includes detecting (650) one or more inputs to the acknowledgement editing interface (e.g., detecting contact 5026, FIG. 5E), editing (652) (e.g., changing or deleting) an acknowledgement option for the first message region in accordance with the detected one or more inputs; ceasing (654) to display the acknowledgement editing interface; displaying (656) the first message region in the conversation transcript with an edited acknowledgement; and transmitting (658) information that causes one or more electronic devices that correspond to the at least one other user included in the messaging session to display a corresponding first message region with the edited acknowledgement in a conversation transcript that corresponds to the messaging session. For example, FIG. 5D shows an acknowledgement editing interface 5024, with an indication (e.g., highlighting or greying out) that acknowledgement option 5014-2 was previously selected. FIG. 5E shows an input, contact 5026, selecting a different, second acknowledgement option 5014-1, and FIG. 5F shows a message region in a conversation transcript with the edited acknowledgment (i.e., with second acknowledgement option 5014-1 displayed instead of first acknowledgement option 5014-2).

In some embodiments, in addition to displaying (634) the acknowledgement editing interface in response to detecting (632) the third input by the third contact, method 600 includes, in response to detecting the third input by the third contact, ceasing (636) to display (or dimming) the conversation transcript, an example of which is shown in FIG. 5E.

Furthermore, in some embodiments, in response to detecting the third input by the third contact, method 600 includes displaying (638) the first message region in the acknowledgement editing interface. For example, FIG. 5E shows an example in which the first message region is displayed in the acknowledgement editing interface, without displaying any other message regions in the conversation transcript in the acknowledgement editing interface. In some embodiments, the first message region is initially displayed in the acknowledgement editing interface at a same location as the first message region was displayed in the conversation transcript immediately prior to detecting the third input.

In some embodiments, in addition to displaying (634) the acknowledgement editing interface in response to detecting (632) the third input by the third contact, method 600 includes, in response to detecting the third input by the third contact, displaying the acknowledgement selection affordance that includes the plurality of acknowledgement options in the acknowledgement editing interface, wherein the first acknowledgement option is visually distinguished (e.g., highlighted) from the other acknowledgement options in the plurality of acknowledgement options to indicate that the first acknowledgement option is currently selected. For example, FIG. 5D shows that acknowledgement editing interface 5024 includes the acknowledgement selection affordance (similar to affordance 5012, FIG. 5B), which includes a plurality of acknowledgement options 5014).

In some embodiments in addition to displaying (634) the acknowledgement editing interface in response to detecting (632) the third input by the third contact, method 600 includes, in response to detecting the third input by the third contact, displaying (642) a menu in the acknowledgement editing interface that includes activatable editing options for the first message region. For example, FIG. 5D shows an edit menu 5028 which includes a "Copy" icon 530 to copy content of the first message region. While not shown in FIG. 5D, edit menu 5028 optionally include additional activatable editing options, such as a "Delete" icon to delete the currently applied acknowledgement option.

In some embodiments, method 600 includes, while displaying the messaging user interface as described above, concurrently displaying (660) on the display (A) a second message region (e.g., message region 5008-2, FIG. 5I) in the conversation transcript, wherein (1) at least some of the users in the messaging session have selected the first acknowledgement option for the second message region, and (2) at least some of the users in the messaging session have selected a second acknowledgement option for the second message region, distinct from the first acknowledgement option; and (B) one or more indicia (e.g., indicia 5036) that users in the messaging session have selected a plurality of acknowledgements options for the second message region. In the example shown in Figure SI, indicia 5036 is a stack of overlapping acknowledgement option icons, but could alternatively be a plurality of individual acknowledgement option icons. As shown in FIG. 5I, indicia 5036 is optionally adjacent to and/or partially overlapping the second message region 5008-02. In some embodiments, for a given acknowledgement option that was selected, the selections are stacked if the acknowledgement option was selected by more than a threshold number of user users in the messaging session (e.g., by more than 2, 3, or 4 users).

In such embodiments (i.e., showing a second message region and the indicia that users in the messaging session have selected a plurality of acknowledgements options for the second message region), method 600 includes detecting (662) an input by a contact at a location on the touch-sensitive surface that corresponds to a location of the second message region (e.g., contact 5034 on second message region 5008-2, FIG. 5I). Alternatively, the detected input corresponds to a location of the one or more indicia that users in the messaging session have selected a plurality of acknowledgements options for the second message region. In some embodiments, detecting (662) the input includes detecting a tap gesture, long press gesture, light press gesture, or deep press gesture on the second message region or on a hidden hit region for the second message region.

In response to detecting the input by the contact at the location on the touch-sensitive surface that corresponds to the location of the second message region, method 600 includes displaying (664) a user interface that includes a tally for each type of acknowledgement option selected by users in the messaging session. For example, as shown in FIG. **5*j*, the user interface includes tallies 5040-1, 5040-2, 5040-3** for three distinct acknowledgement options selected by users in the messaging session. Alternatively, in some embodiments, in response to detecting the input by the contact at the location on the touch-sensitive surface that corresponds to the location of the second message region, the device displays a user interface that includes a tally affordance (e.g., as a menu option), which when activated, displays the tally for each type of acknowledgement option selected by users in the messaging session.

In some embodiments, method 600 includes, while displaying the tally for each type of acknowledgement option selected by users in the messaging session, detecting (666) an input by a contact at a location on the touch-sensitive surface that corresponds to a tally for the first acknowledgement option for the second message region. For example, referring to FIG. 5J, the input may select tally 5040-1. In some embodiments, detecting (666) the input at a location on the touch-sensitive surface that corresponds to a tally includes detecting a tap gesture, long press gesture, light press gesture, or deep press gesture on the tally for the first acknowledgement option, or on a stack of icons (e.g., avatars) that correspond to users in the messaging session that selected the first acknowledgement option, or on a hidden hit region for this tally or this stack of icons.

In such embodiments, method 600 further includes, in response to detecting (666) the input by the contact at a location on the touch-sensitive surface that corresponds to the tally for the first acknowledgement option for the second message region, displaying (668) icons (e.g., avatars) that represent users that selected the first acknowledgement option for the second message region. For example, as shown in FIG. 5K, the user interface displayed by the device in response to an input selecting tally 5040-1 (FIG. 5J), includes a display of the icons (e.g., avatars) that represent users that selected the first acknowledgement option for the second message region, which replaces display of the tally for each type of acknowledgement option selected by users in the messaging session (shown in FIG. 5J).

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, 1200, 1400, 1600, 1800) are also applicable in an analogous manner to method 600 described above with respect to FIGS. 6A-6E. For brevity, these details are not repeated here.

Figure 7:
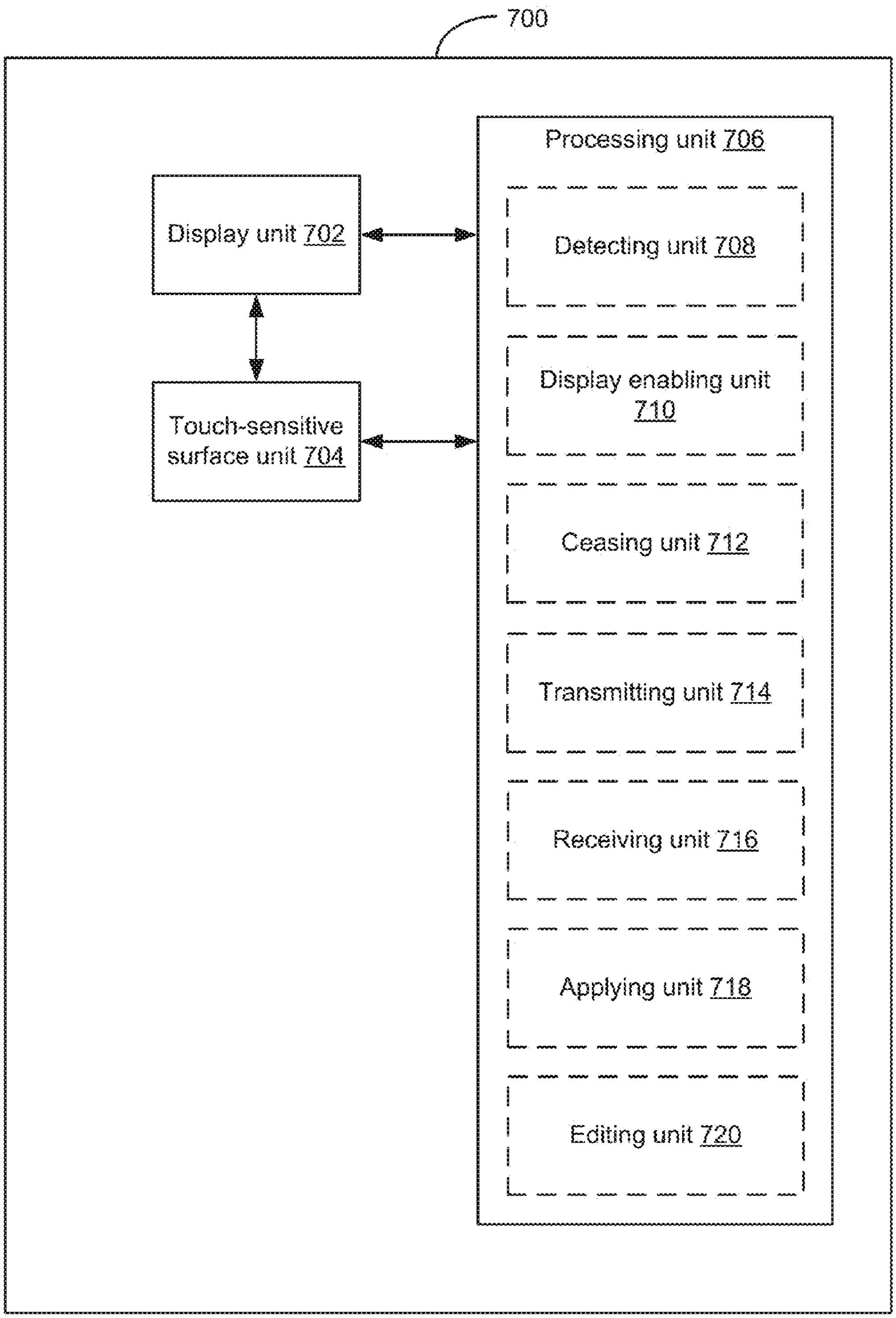
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display a messaging user interface on the display unit, the messaging user interface including a conversation transcript of a messaging session between a user of the electronic device and at least one other user; a touch-sensitive surface unit 704 configured to detect contacts; and a processing unit 706 coupled with the display unit 702 and the touch-sensitive surface unit 704. In some embodiments, the processing unit 706 includes a detecting unit 708, a display enabling unit 710, a ceasing unit 712, a transmitting unit 714, a receiving unit 716, an applying unit 718, and an editing unit 720.

The processing unit 706 is configured to: receive a first message within the messaging session from an electronic device that corresponds to another user included in the messaging session (e.g., with the receiving unit 716); in response to receiving the first message, enable display of the first message in a first message region in the conversation transcript on the display unit 702 (e.g., with the display enabling unit 710); detect a first input by a first contact at a location on the touch-sensitive surface unit 704 that corresponds to a location of the first message region in the conversation transcript (e.g., with the detecting unit 708); in response to detecting the first input, enable display of an acknowledgement selection affordance at a location in the messaging interface that corresponds to the first message region (e.g., with the display enabling unit 710), wherein the acknowledgement selection affordance displays a plurality of acknowledgement options; detect a second input by a second contact at a location on the touch-sensitive surface unit 704 that corresponds to a location of a first acknowledgement option in the acknowledgement selection affordance (e.g., with the detecting unit 708); and, in response to detecting the second input, apply the first acknowledgement option to the first message region (e.g., with the applying unit 718).

In some embodiments, applying the first acknowledgement option to the first message region includes displaying the first acknowledgement option at a location adjacent to and/or partially overlapping the first message region.

In some embodiments, the first acknowledgement option is displayed in an acknowledgement region that has a different shape from the first message region.

In some embodiments, the processing unit 706 is further configured to: in response to detecting the first input, transmit information that causes one or more electronic devices that correspond to the at least one other user included in the messaging session to display an acknowledgement-preparation indicator for a corresponding first message region in a conversation transcript that corresponds to the messaging session (e.g., with the transmitting unit 714).

In some embodiments, the processing unit 706 is further configured to: in response to detecting the second input, transmit information that causes one or more electronic devices that correspond to the at least one other user included in the messaging session to apply the first acknowledgement option to a corresponding first message region in a conversation transcript that corresponds to the messaging session (e.g., with the transmitting unit 714).

In some embodiments, the processing unit 706 is further configured to: after applying the first acknowledgement option to the first message region: detect a third input by a third contact at a location on the touch-sensitive surface unit 704 that corresponds to a location of the first message region (e.g., with the detecting unit 708); in response to detecting the third input by the third contact at the location on the touch-sensitive surface unit 704 that corresponds to the location of the first message region, enable display of an acknowledgement edit interface (e.g., with the display enabling unit 710); detect one or more inputs to the acknowledgement editing interface (e.g., with the detecting unit 708); edit an acknowledgement option for the first message region in accordance with the detected one or more inputs (e.g., with the editing unit 720); cease to display the acknowledgement editing interface (e.g., with the ceasing unit 712); enable display of the first message region in the conversation transcript with an edited acknowledgement (e.g., with the display enabling unit 710); and transmit information that causes one or more electronic devices that correspond to the at least one other user included in the messaging session to display a corresponding first message region with the edited acknowledgement in a conversation transcript that corresponds to the messaging session (e.g., with the transmitting unit 714).

In some embodiments, the processing unit 706 is further configured to: in response to detecting the third input by the third contact, cease to display the conversation transcript (e.g., with the ceasing unit 712).

In some embodiments, the processing unit 706 is further configured to: in response to detecting the third input by the third contact, enable display of the first message region in the acknowledgement editing interface (e.g., with the display enabling unit 710).

In some embodiments, the processing unit 706 is further configured to: in response to detecting the third input by the third contact, enable display of the acknowledgement selection affordance that includes the plurality of acknowledgement options in the acknowledgement editing interface (e.g., with the display enabling unit 710), wherein the first acknowledgement option is visually distinguished from the other acknowledgement options in the plurality of acknowledgement options to indicate that the first acknowledgement option is currently selected.

In some embodiments, the processing unit 706 is further configured to: in response to detecting the third input by the third contact, enable display of a menu in the acknowledgement editing interface that includes activatable editing options for the first message region (e.g., with the display enabling unit 710).

In some embodiments, the plurality of acknowledgement options include graphical icons that display at least one of a heart, a thumbs up, a thumbs down, a “HA!”, a “!!”, and/or a question mark.

In some embodiments, the processing unit 706 is further configured to: concurrently enable display on the display unit 702 (e.g., with the display enabling unit 710) of: a second message region in the conversation transcript, wherein at least some of the users in the messaging session have selected the first acknowledgement option for the second message region and at least some of the users in the messaging session have selected a second acknowledgement option for the second message region, distinct from the first acknowledgement option; and one or more indicia that users in the messaging session have selected a plurality of acknowledgements options for the second message region; and detect an input by a contact at a location on the touch-sensitive surface unit 704 that corresponds to a location of the second message region (e.g., with the detecting unit 708); and, in response to detecting the input by the contact at the location on the touch-sensitive surface unit 704 that corresponds to the location of the second message region, enable display of a user interface that includes a tally for each type of acknowledgement option selected by users in the messaging session (e.g., with the display enabling unit 710).

In some embodiments, the processing unit 706 is further configured to: while the tally for each type of acknowledgement option selected by users in the messaging session is displayed, detect an input by a contact at a location on the touch-sensitive surface unit 704 that corresponds to a tally for the first acknowledgement option for the second message region (e.g., with the detecting unit 708); and in response to detecting the input by the contact at a location on the touch-sensitive surface unit 704 that corresponds to the tally for the first acknowledgement option for the second message region, enable display of icons that represent users that selected the first acknowledgement option for the second message region (e.g., with the display enabling unit 710).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 7. For example, detection operations 606 and 616 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Editing Previously Sent Messages

Figure 8A:
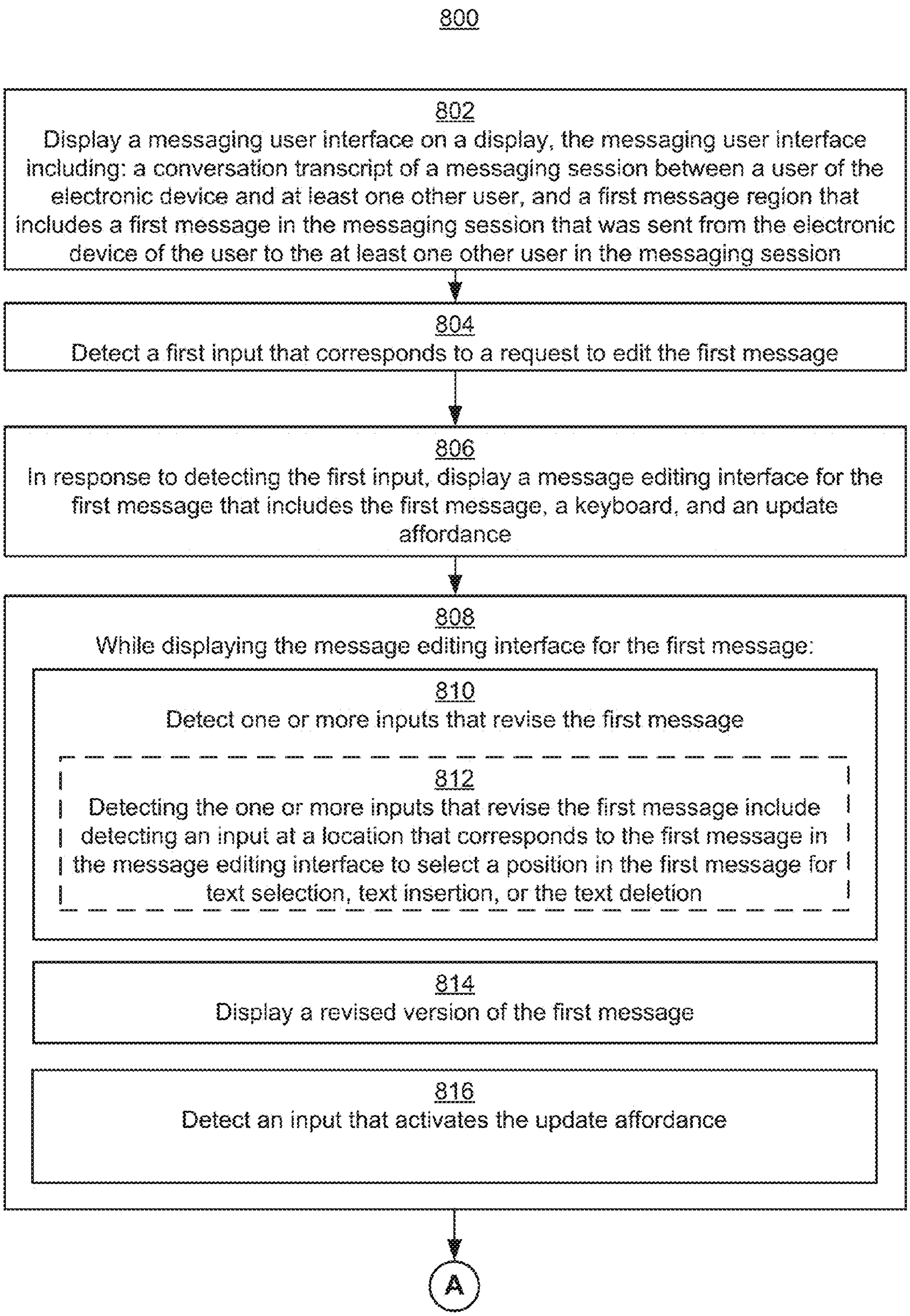

FIGS. 8A-8C are flow diagrams of a process for editing a previously sent messages in a messaging session, in accordance with some embodiments. More specifically, the methods relate to displaying an interface for editing a message, displaying a revised version of the message, ceasing to display the pre-revision version of the message, and/or displaying at least one indication of the revision.

Message transcripts can become cluttered with messages containing typographical errors followed by messages correcting the previous errors. By allowing editing of previously transmitted messages, the conversational flow of the transcript is better preserved and makes it easier for conversation participants to follow the conversation.

One or more examples of an electronic device (e.g., portable multifunction device 100 or device 300) implementing these methods are shown in FIGS. 5L-5T.

FIGS. 8A-8C are flow diagrams illustrating a method 800, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 800 includes displaying (802) a messaging user interface (e.g., user interface 5002, FIG. 5L, of a messaging application) on the display. The messaging user interface includes a conversation transcript (e.g., conversation transcript 5004 in user interface 5002, FIG. 5L) of a messaging session between a user of the electronic device and at least one other user, and a first message region (e.g., message region 5044, FIG. 5L) that includes a first message (e.g., message 5046-1, FIG. 5L) in the messaging session that was sent from the electronic device of the user to the at least one other user in the messaging session.

The method further includes detecting (804) a first input (e.g., input 5048) that corresponds to a request to edit the first message. In some embodiments, the device detects the first input by detecting a tap gesture, long press gesture, light press gesture, or deep press gesture on the first message region (e.g., message region 5044, FIG. 5L) or on a hidden hit region for the first message region that results in display of a message editing interface for the first message (e.g., message editing interface 5052, FIG. 5N). In some embodiments, the device detects a tap gesture, light press gesture, or deep press gesture on an editing affordance in the messaging user interface or on a hidden hit region for the editing affordance that results in display of a message editing interface for the first message (e.g., as shown in FIG. 5N). In some embodiments, if the first message is the most recently sent message by the user, the device detects a tap gesture, long press gesture, light press gesture, or deep press gesture on a message-input area (or on an editing affordance in the message-input area) that results in display of a message editing interface for the first message (e.g., as shown in FIG. 5N).

In some embodiments, in response to detecting an input by the contact at the location on the touch-sensitive surface that corresponds to the location of the first message region (e.g., first message region 5044, FIG. 5L), the device displays a user interface that includes an edit affordance (e.g., an edit affordance, displayed as a menu option, as shown in FIG. 5M), which when activated, displays the message editing interface for the first message (e.g., message editing interface 5052, FIG. 5N). In some embodiments, while the first message region is displayed with a list of activatable options for the first message (FIG. 5M), the device detects an input (e.g., input 5050, FIG. 5M) that activates an edit option, such as a tap gesture on the edit option, that results in display of a message editing interface for the first message.

Method 800 includes, in response to detecting the first input (e.g., input 5048, FIG. 5L, or input 5050, FIG. 5M), displaying (806) a message editing interface (e.g., message editing interface 5052, FIG. 5N) for the first message that includes the first message (e.g., message 5046-1, FIG. 5N), a keyboard (e.g., keyboard 5054, FIG. 5N), and an update affordance (e.g., update affordance 5056, FIG. 5N), and while displaying (808) the message editing interface for the first message, detecting (810) one or more inputs that revise the first message, displaying (814) a revised version of the first message; and detecting (816) an input that activates the update affordance.

In some embodiments, displaying (806) the editing interface replaces display of the conversation transcript (e.g., compare FIGS. 5L and 5N). In some embodiments, display of the editing interface (e.g., as shown in FIG. 5N) replaces display of a user interface that includes a list of activatable options for the first message (e.g., as shown in FIG. 5M).

In some embodiments, detecting (810) one or more inputs that revise the first message includes detecting inputs on the keyboard that add and/or delete text in the first message, and/or detecting inputs that select, cut, copy, and or paste text. For example, in FIGS. 5N and 5O, the editing replaces the term "ridiculous" with "ride". In some embodiments, detecting (816) an input that activates the update affordance includes detecting a tap gesture at a location that corresponds to the update affordance. In some embodiments, the update affordance is adjacent to the revised version of the first message in the message editing interface (rather than in the keyboard or in a new message input area).

Method 800 further includes, in response (818) to detecting the input that activates the update affordance: ceasing (820) to display the message editing interface for the first message; displaying (822) the revised version of the first message in place of the first message in the conversation transcript; displaying (824) at least one indication of the revision of the first message in the conversation transcript; and transmitting (832) the revised version of the first message to one or more electronic devices (e.g., a second electronic device) that correspond to the at least one other user included in the messaging session, wherein the one or more electronic devices display the revised version of the first message in place of the first message in a conversation transcript that corresponds to the messaging session, with at least one indication of the revision of the first message in the conversation transcript. For example, activating update affordance 5056, shown in FIG. 5N, causes the device to cease the display of message editing interface 5052, for example returning to the display of messaging user interface 5002, including conversation transcript 5004, as shown in FIG. 5O. Further, as shown in FIG. 5O, the revised version of the first message 5046-2 is now displayed, along with an indication 5058-1 (e.g., a shadow, indicating the existence of an earlier version of the first message) of the revision of the first message in the conversation transcript. FIG. 50 also shows a second example of an indication 5058-2 of the revision of the first message in the conversation transcript, which in this example is the displayed term "Edited". As shown in FIG. 5R, the revised version 5046-2 of the first message is transmitted to and displayed by at least one electronic device corresponding to at least one other user included in the messaging session, and includes a first indication 5058-1 (e.g., a message region shadow) of the revision of the first message as well as a second indication 5058-2 (e.g., the displayed term "Edited") of the revision of the first message.

In some embodiments of method 800, detecting (810) the one or more inputs that revise the first message includes detecting (812) an input at a location (e.g., location 5057, FIG. 5N) that corresponds to the first message in the message editing interface (e.g., a tap on the first message in the first message region) to select a position in the first message for text selection, text insertion, or the text deletion. The insertion point or location 5057 shown in FIG. 5N is adjacent the term "ridiculous", which, as shown in FIG. 5O, the user edits so as to replace that term with the term "ride."

In some embodiments, the at least one indication (e.g., indication 5058-1 and/or indication 5058-2, FIG. 5O) of the revision of the first message in the conversation transcript is not removable from the conversation transcript (826). Making such indications not removable may be important for giving users confidence that the conversation transcript accurately reflects the messages sent by the participants.

In some embodiments, the at least one indication of the revision of the first message includes a graphical element at a location of the first message region (828). For example, as shown in FIG. 5O, indication 5058-1 is a shadow region behind the first message region; alternatively state, indication 5058-1 is a shadow region that is partially overlapped by the first message region.

In some embodiments, the at least one indication of the revision of the first message includes text adjacent to the first message region (830). For example, as shown in FIG. 5O, indication 5058-1 is text (e.g., "Edited") displayed below the first message region that contains the revised version of the first message.

In some embodiments, method 800 includes, after editing the first message, detecting (834) an input (e.g., input 5060, FIG. 5O) that corresponds to a request to edit the revised version (e.g., version 5046-2) of the first message, and in response to detecting the input that corresponds to the request to edit the revised version of the first message, performing a set of operations, including displaying a message editing interface (e.g., the interface shown in FIG. 5R) for the revised version of the first message that includes the revised version of the first message, the keyboard, and the update affordance, an example of which is shown in FIG. 5R. In such embodiments, method 800 further includes, while displaying the message editing interface for the revised version of the first message: detecting one or more inputs that further revise the first message; displaying a further revised version of the first message; and detecting an input that activates the update affordance. In such embodiments, method 800 further includes, in response to detecting the input that activates the update affordance: ceasing to display the message editing interface for the revised version of the first message; displaying the further revised version of the first message in place of the revised version of first message in the conversation transcript; displaying at least one indication that the first message in the conversation transcript has been revised (e.g., in some embodiment, two shadow regions are displayed behind the first message region, which are partially overlapped by the first message region, to indicate that the first message has been revised twice); and transmitting the further revised version of the first message to one or more electronic devices that correspond to the at least one other user included in the messaging session, wherein the one or more electronic devices display the further revised version of the first message in place of the revised version of first message in a conversation transcript that corresponds to the messaging session, with at least one indication that the first message in the conversation transcript has been revised.

In some embodiments, method 800 includes, after editing the first message, detecting (836) an input that corresponds to a request to see versions of the first message, and in response to detecting the input that corresponds to the request to see versions of the first message, displaying a user interface that includes a current version of the first message and one or more prior versions of the first message. For example, in response to input 5060 in FIG. 5O, the device may display the user interface shown in FIG. 5P, in which display of the conversation transcript is suppressed except for the revised version of the first message 5046-2, and a menu 5062 or list of editing options. In this example, the displayed menu 5062 or list of editing options includes a copy affordance 5064, a show edits affordance 5066, a delete affordance 5068 and a display more options affordance 5070. In the example shown in FIG. 5P, input 5072 (e.g., a tap gesture) is detected at the location on the touch-sensitive surface that corresponds to the location of the "show edits" affordance 5066, which when activated, displays a user interface 5074 (FIG. 5Q) that includes current version 5046-1 of the first message as well as a prior version 5046-2, as shown in FIG. 5Q.

Figure 9:
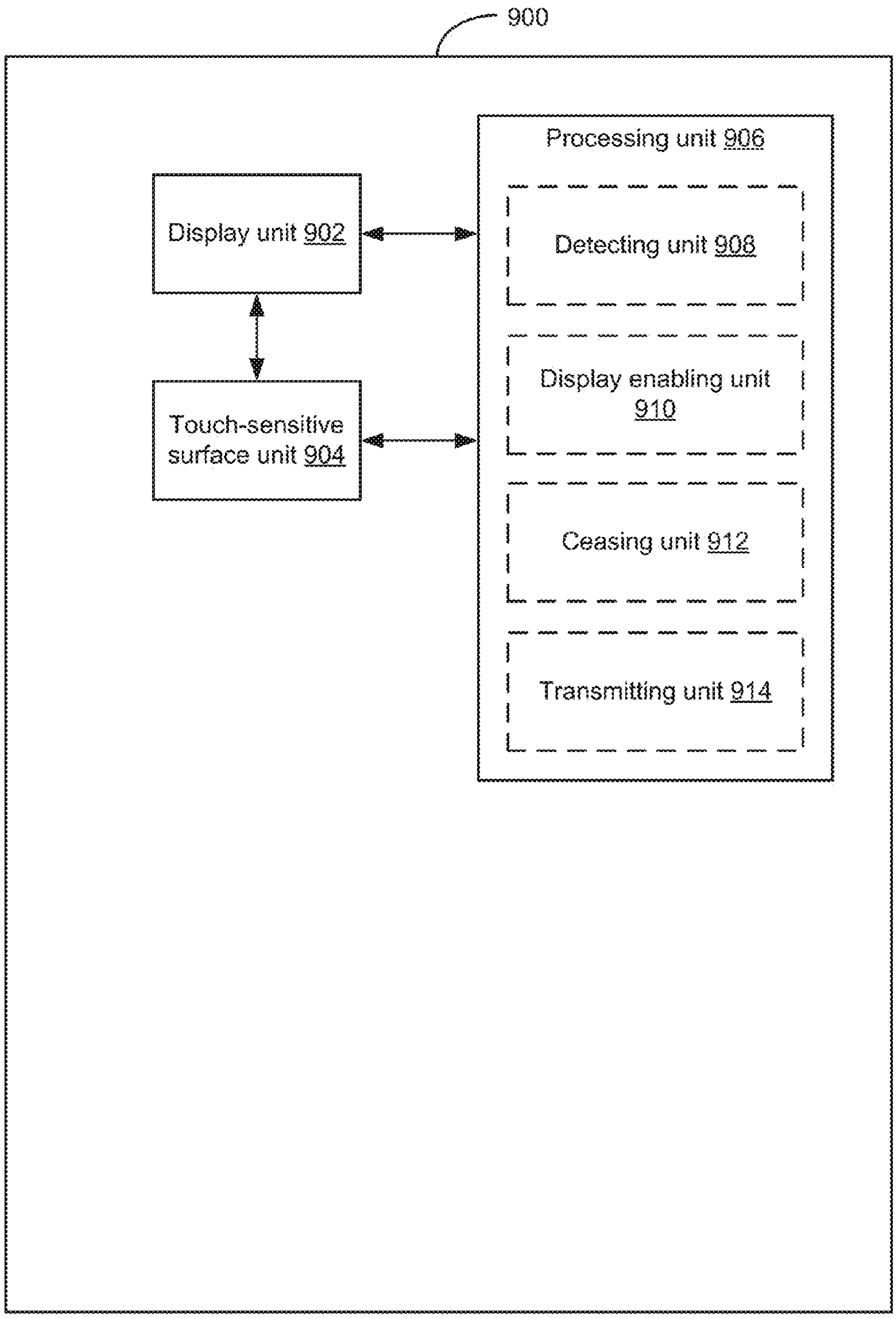
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900 includes a display unit 902 configured to display a messaging user interface on the display 902, the messaging user interface including: a conversation transcript of a messaging session between a user of the electronic device and at least one other user, and a first message region that includes a first message in the messaging session that was sent from the electronic device of the user to the at least one other user in the messaging session; a touch-sensitive surface unit 904 configured to detect contacts; and a processing unit 906 coupled with the display unit 902 and the touch-sensitive surface unit 904. In some embodiments, the processing unit 906 includes a detecting unit 908, a display enabling unit 910, a ceasing unit 912, and a transmitting unit 914.

The processing unit 906 is configured to: detect a first input that corresponds to a request to edit the first message (e.g., with the detecting unit 908); in response to detecting the first input, enable display of a message editing interface for the first message that includes the first message, a keyboard, and an update affordances (e.g., with the display enabling unit 910); while the message editing interface for the first message is displayed: detect one or more inputs that revise the first message (e.g., with the detecting unit 908); enable display of a revised version of the first message (e.g., with the display enabling unit 910); and detect an input that activates the update affordance (e.g., with the detecting unit 908); and, in response to detecting the input that activates the update affordance: cease to display the message editing interface for the first message (e.g., with the ceasing unit 912); enable display of the revised version of the first message in place of the first message in the conversation transcript (e.g., with the display enabling unit 910); enable display of at least one indication of the revision of the first message in the conversation transcript (e.g., with the display enabling unit 910); and transmit the revised version of the first message to one or more electronic devices that correspond to the at least one other user included in the messaging session (e.g., with the transmitting unit 914), wherein the one or more electronic devices display the revised version of the first message in place of the first message in a conversation transcript that corresponds to the messaging session, with at least one indication of the revision of the first message in the conversation transcript.

In some embodiments, the at least one indication of the revision of the first message in the conversation transcript is not removable from the conversation transcript.

In some embodiments, the at least one indication of the revision of the first message includes a graphical element at a location of the first message region.

In some embodiments, the at least one indication of the revision of the first message includes text adjacent to the first message region.

In some embodiments, detecting the one or more inputs that revise the first message include detecting an input at a location that corresponds to the first message in the message editing interface to select a position in the first message for text selection, text insertion, or the text deletion.

In some embodiments, the processing unit 906 is further configured to: after editing the first message, detect an input that corresponds to a request to edit the revised version of the first message (e.g., with the detecting unit 908); in response to detecting the input that corresponds to the request to edit the revised version of the first message, enable display of a message editing interface for the revised version of the first message that includes the revised version of the first message, the keyboard, and the update affordance (e.g., with the display enabling unit 910); while the message editing interface for the revised version of the first message is displayed: detect one or more inputs that further revise the first message (e.g., with the detecting unit 908); enable display of a further revised version of the first message (e.g., with the display enabling unit 910); and detect an input that activates the update affordance (e.g., with the detecting unit 908); and, in response to detecting the input that activates the update affordance: cease to display the message editing interface for the revised version of the first message (e.g., with the ceasing unit 912); enable display of the further revised version of the first message in place of the revised version of first message in the conversation transcript (e.g., with the display enabling unit 910); enable display of at least one indication that the first message in the conversation transcript has been revised (e.g., with the display enabling unit 910); and transmit the further revised version of the first message to one or more electronic devices that correspond to the at least one other user included in the messaging session (e.g., with the transmitting unit 914), wherein the one or more electronic devices display the further revised version of the first message in place of the revised version of first message in a conversation transcript that corresponds to the messaging session, with at least one indication that the first message in the conversation transcript has been revised.

In some embodiments, the processing unit 906 is further configured to: after editing the first message, detect an input that corresponds to a request to see versions of the first message (e.g., with the detecting unit 908); and, in response to detecting the input that corresponds to the request to see versions of the first message, enable display of a user interface that includes a current version of the first message and one or more prior versions of the first message (e.g., with the display enabling unit 910).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C are, optionally, implemented by components depicted in FIGS. 1A-1B or FIG. 9. For example, detection operations 804 and 810 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10B are flow diagrams of a process for editing a previously sent message in a messaging session, in accordance with some embodiments. One or more examples of an electronic device (e.g., portable multifunction device 100 or device 300) implementing these methods are shown in FIGS. 5L-5T.

FIGS. 10A-10B are flow diagrams illustrating a method 1000, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 1000 includes displaying (1002) a messaging user interface (e.g., user interface 5002, as shown in FIG. 5L or 5O, of a messaging application) on the display. The messaging user interface includes a conversation transcript (e.g., conversation transcript 5004 in user interface 5002, FIG. 5L or 5O) of a messaging session between a user of the electronic device and at least one other user (e.g., a user of another electronic device), and a first message region (e.g., message region 5044, FIG. 5O) that includes a current version of a first message (e.g., message version 5046-2, FIG. 5O) in the messaging session, wherein the conversation transcript includes an indication (e.g., indication 5058-1, or 5058-2, as describe above) that the current version of the first message is a revised version of the first message in the conversation transcript. The original version of the first message is, for example, a previously transmitted message or a previously received message.

Method 1000 further includes detecting (1004) an input that corresponds to a request to see versions of the first message (e.g., input 5060, as shown in FIG. 5O), and in response to detecting the input that corresponds to the request to see versions of the first message, displaying (1008) a versions user interface (e.g., user interface 5074, FIG. 5Q) that includes the current version of the first message (e.g., version 5046-1) and one or more prior versions of the first message (e.g., version 5046-2).

In some embodiments, detecting (1004) the input includes the device detecting a tap gesture, long press gesture, light press gesture, or deep press gesture on the first message region or on a hidden hit region for the first message region that results in display of a user interface with current and prior versions of the first message (e.g., user interface 5074, FIG. 5Q).

In some embodiments, in response to detecting an input by the contact at the location on the touch-sensitive surface that corresponds to the location of the first message region (input 5060, FIG. 5O), the device displays a user interface that includes an affordance (e.g., "show edits" menu option, FIG. 5P), which when activated, displays current and prior versions of the first message (e.g., FIG. 5Q). In some embodiments, while the first message region is displayed with a list of activatable options for the revised version of the first message (as shown in FIG. 5P), the device detects an input that activates a "show edits" option (e.g., input 5072 on show edits option 5066, FIG. 5P), such as a tap gesture on the "show edits" option, that results in display of a user interface with current and prior versions of the first message (e.g., FIG. 5Q).

In some embodiments, the input that corresponds to the request to see versions of the first message is detected (1006) while displaying the current version of the first message (e.g., without displaying other messages in the conversation transcript, as shown in FIG. 5S) and a menu that includes an affordance (e.g., a "show edits" option, FIG. 5S), which when activated results in display of the user interface (e.g., as shown in FIG. 5T) that includes the current version (e.g., version 5046-2, FIG. 5T) of the first message and one or more prior versions of the first message (e.g., version 5046-1, FIG. 5T). In some embodiments, the menu includes an affordance (e.g., a "edit" option), which when activated results in display of a message editing interface for the current version of the first message that includes the current version of the first message, a keyboard, and an update affordance.

In some embodiments, in the versions user interface (e.g., 5074, FIG. 5Q), the current version of the first message (e.g., 5046-1) is visually distinguished (1010) from other versions of the first message. For example, in various embodiments the current version of the first message is visually distinguished from other versions of the first message by different shading, background color, background pattern, font color, and/or region boundary color, or the like.

In some embodiments, the versions user interface (e.g., 5074, FIG. 5Q) includes (1012) the current version of the first message (e.g., 5046-1), an original version of the first message (e.g., 5046-2), and at least one version of the first message that was revised prior to the current version of the first message (not shown in the figures).

In some embodiments, the versions user interface (e.g., 5074, FIG. 5Q) includes (1014) an affordance (e.g., a "Done" option 5082, FIG. 5Q), which when activated causes redisplay of the conversation transcript in the user interface (e.g., as shown in FIG. 5R). Typically, activation of this affordance also causes display of the versions user interface to cease.

In some embodiments, the versions user interface includes (1016) an affordance (e.g., Edit icon 5080, FIG. 5Q), which when activated causes display of a message editing interface (e.g., as shown in FIG. 5R) for the current version of the first message that includes the current version of the first message (5046-2), a keyboard (5054), and an update affordance (5056). Typically, activation of this affordance also causes display of the versions user interface to cease.

In some embodiments, method 1000 includes, while displaying the versions user interface (e.g., 5074, FIG. 5Q), detecting (1018) an input (e.g., input 5076 or 5078, FIG. 5Q, to edit either the current version 5046-1 or the original version 5046-2) on a respective version of the first message (e.g., detecting a tap gesture, long press gesture, light press gesture, or deep press gesture on the current version, an intermediate version, or the original version of the first message); and, in response to detecting an input on the respective version of the first message: displaying a message editing interface (e.g., a message editing interface as shown in FIG. 5N) for the respective version of the first message that includes the respective version (5046) of the first message, a keyboard (5054), and an update affordance (5056); and ceasing to display the versions user interface.

Figure 11:
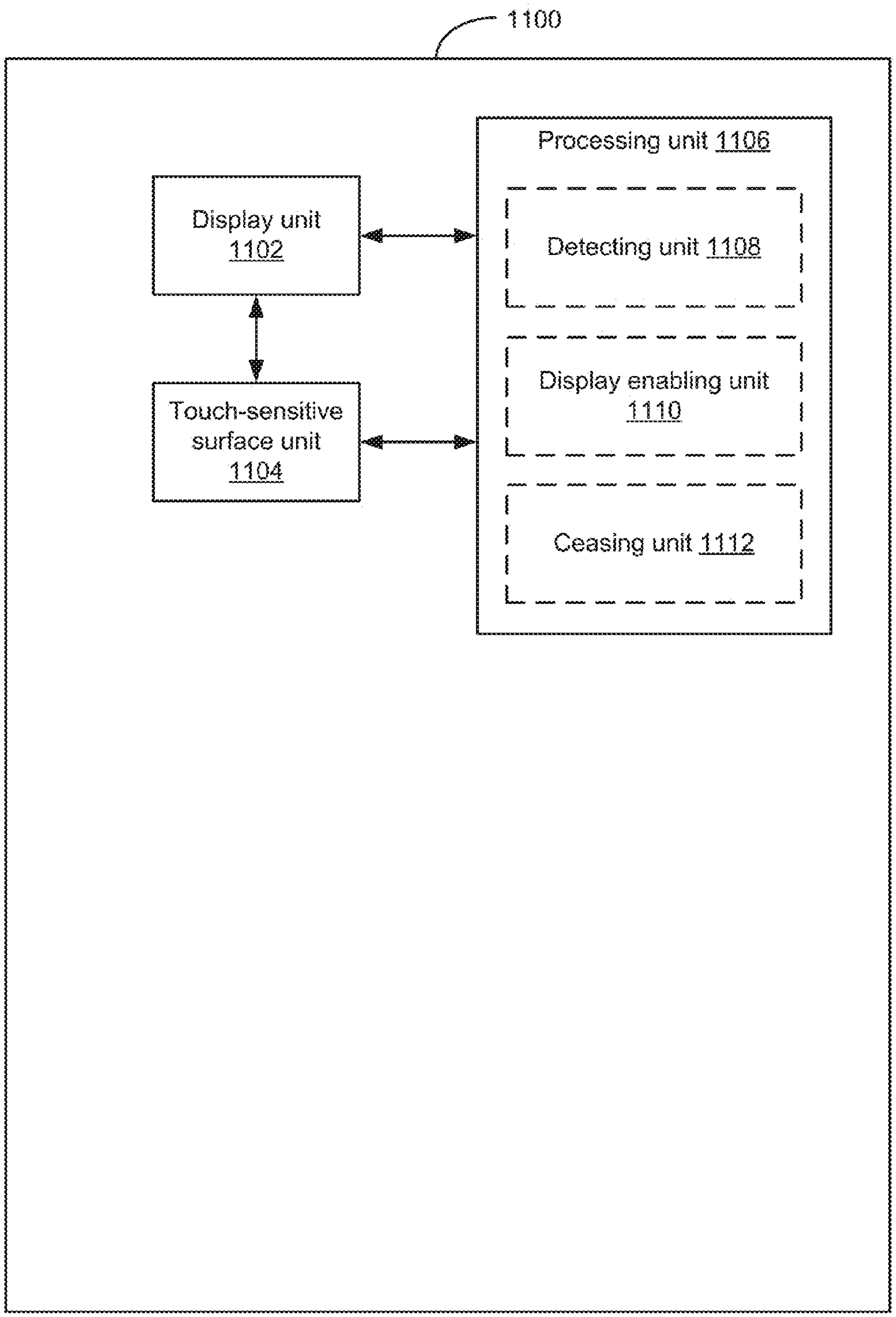
FIG. 11 is a functional block diagram of an electronic device in accordance with some embodiments.
Figure 12B:
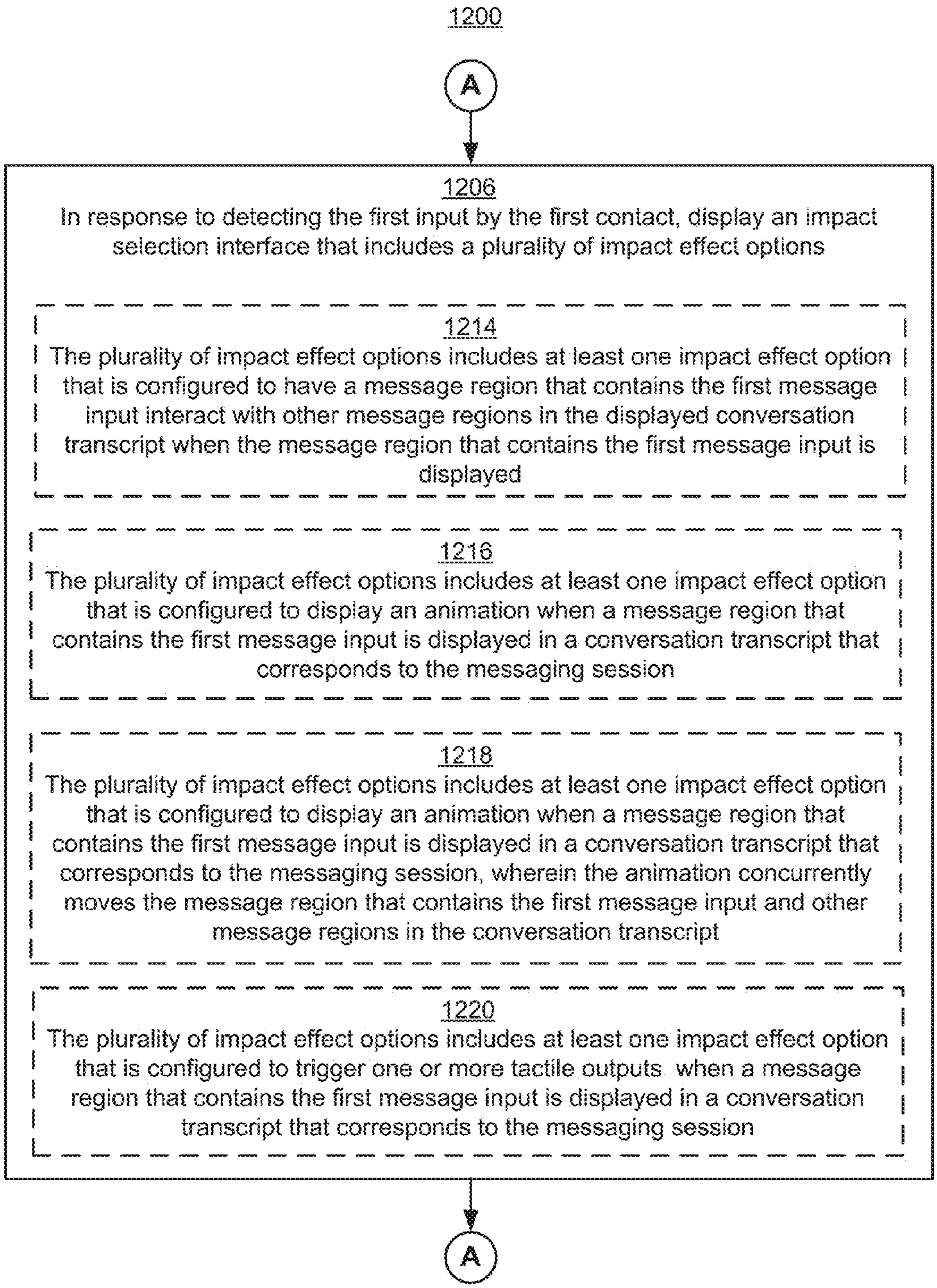

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a display unit 1102 configured to display a messaging user interface on the display unit, the messaging user interface including: a conversation transcript of a messaging session between a user of the electronic device and at least one other user, and a first message region that includes a current version of a first message in the messaging session, wherein the conversation transcript includes an indication that the current version of the first message is a revised version of the first message in the conversation transcript; a touch-sensitive surface unit 1104 configured to detect contacts; and a processing unit 1106 coupled with the display unit 1102 and the touch-sensitive surface unit 1104. In some embodiments, the processing unit 1106 includes a detecting unit 1108, a display enabling unit 1110, and a ceasing unit 1112.

The processing unit 1106 is configured to: detect an input that corresponds to a request to see versions of the first message (e.g., with the detecting unit 1108); and, in response to detecting the input that corresponds to the request to see versions of the first message, enable display of a versions user interface that includes the current version of the first message and one or more prior versions of the first message (e.g., with the display enabling unit 1110).

In some embodiments, the input that corresponds to the request to see versions of the first message is detected while displaying the current version of the first message and a menu that includes an affordance, which when activated results in display of the user interface that includes the current version of the first message and one or more prior versions of the first message.

In some embodiments, in the versions user interface, the current version of the first message is visually distinguished from other versions of the first message.

In some embodiments, the versions user interface includes the current version of the first message, an original version of the first message, and at least one version of the first message that was revised prior to the current version of the first message.

In some embodiments, the versions user interface includes an affordance, which when activated causes redisplay of the conversation transcript.

In some embodiments, the versions user interface includes an affordance, which when activated causes display of a message editing interface for the current version of the first message that includes the current version of the first message, a keyboard, and an update affordance.

In some embodiments, the processing unit 1106 is further configured to: while the versions user interface is displayed, detect an input on a respective version of the first message (e.g., with the detecting unit 1108); and, in response to detecting an input on the respective version of the first message: enable display of a message editing interface for the respective version of the first message that includes the respective version of the first message, a keyboard, and an update affordance (e.g., with the display enabling unit 1110); and cease to display the versions user interface (e.g., with the ceasing unit 1112).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10B are, optionally, implemented by components depicted in FIGS. 1A-1B or FIG. 11. For example, detection operations 1004 and 1018 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Message Impact Effects

FIGS. 12A-12E, described in more detail below, relate generally to methods for applying an impact effect option to a message input. More specifically, these figures relate to methods of displaying an interface that includes multiple impact effect options in response to input received in a message input area of a messaging user interface. A preview that applies an impact effect option to the message input is displayed. Information including the message input and the applied impact effect option is transmitted to at least one remote electronic device (e.g., a device of at least one other user). Oftentimes, additional information that could be conveyed with verbal tone or facial expressions is lost when only the text of a conversation is available to determine the intent of the speaker. The methods described here with respect to FIGS. 12A-12E allow additional information to be added to the transcript to convey additional sentiment that might be missing otherwise.

One or more examples of an electronic device (e.g., portable multifunction device 100 or device 300) implementing these methods are shown in FIGS. 5U-5AM and 5AN-5BF.

FIGS. 12A-12E are flow diagrams illustrating a method 1200, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 1200 includes displaying (1202) a messaging user interface (e.g., user interface 5002, as shown in FIG. 5U, of a messaging application) on the display. The messaging user interface includes a conversation transcript (e.g., conversation transcript 5004 in user interface 5002, FIG. 5U) of a messaging session between a user of the electronic device and at least one other user (e.g., a user of another electronic device), and a message-input area (e.g., 5100, FIG. 5U) that includes a first message input (e.g., text, stickers, images, and/or other graphics entered by a user of the electronic device in the message-input area, but not yet sent to the at least one other user in the messaging session). Method 1200 includes, while displaying the messaging user interface, detecting a first input by a first contact (e.g., input 5102, FIG. 5U) at a location on the touch-sensitive surface that corresponds to a location in the message-input area. In some embodiments, the first input includes a gesture (e.g., a swipe gesture) received at the message-input area. In some embodiments, the message-input area includes an impact selection affordance (e.g., 5104, FIG. 5U) and the location of the contact corresponds to the impact selection affordance. In some embodiments, detecting the first input includes the device detecting a tap gesture, long press gesture, light press gesture, or deep press gesture by the contact at a location that corresponds to the impact selection affordance. Furthermore, in some embodiments, different inputs (e.g., a tap gesture, and a deep press gesture) on the impact selection affordance cause the user interface to transition to different subsequent user interfaces. For example, in some embodiments, a tap gesture on affordance 5104, FIG. 5U or 5X, sends the message input 5102 in message input area 5100 as a message, while a deep press input 5108-1, 5108-2, 5108-3, as shown in FIGS. 5X, 5Y and 5Z, when detected by the electronic device, causes the messaging application to display an impact selection interface 5110, FIG. 5AA.

Thus, method 1200 further includes, in response to detecting the first input by the first contact, displaying (1206) an impact selection interface (e.g., impact selection interface 5110, FIG. 5AA) that includes a plurality of impact effect options (e.g., impact effect options 5112-1 through 5112-4 are displayed in place of the messaging user interface or on top of the messaging user interface). In some embodiments, the displayed plurality of impact effect options (e.g., 5112-1 to 5112-4, FIG. 5AA) are a subset, less than all, of a set of impact effect options. In some embodiments, the set of impact effect options includes options that are applied to an individual message region (e.g., "region effect" options) and options that are applied to the entire displayed conversation transcript when a message is initially displayed in the messaging session (e.g., "full-screen effect" options). In some embodiments, the displayed plurality of impact effect options includes at least some of the region effect options and none of the full-screen effect options. In some embodiments, the region effect options include: an option that slams down a message in the conversation transcript when the message is initially displayed (e.g., "slam" option 5112-4, FIG. 5AA); an option that increases the size of the message in the conversation transcript, at least when the message is initially displayed (e.g., "loud" option 5112-3, FIG. 5AA); an option that decreases the size of the message in the conversation transcript, at least when the message is initially displayed (e.g., "gentle" option 5112-2, FIG. 5AA, and FIGS. 5AT through 5AW); and an option that conceals the content of a message in the conversation transcript ("invisible ink" option 5112-1, FIG. 5AA).

In some embodiments, the full-screen effect options include two or more of the following options: an option that displays balloons in the conversation transcript when the message is initially displayed ("balloons"); an option that displays confetti in the conversation transcript when the message is initially displayed ("confetti"); an option that displays fireworks in the conversation transcript when the message is initially displayed ("fireworks"); an option that displays the message in focus and blurs the rest of the conversation transcript when the message is initially displayed ("focus"); an option that displays one or more spotlight beams moving in the conversation transcript when the message is initially displayed ("spotlight" or "drop the mic"); an option that displays multiple copies of the message over the conversation transcript when the message is initially displayed ("echo"); an option that displays a shooting star in the conversation transcript when the message is initially displayed ("shooting star"); an option that displays multiple laser beams (e.g., as shown in FIGS. 5CR through 5CT) moving in the conversation transcript when the message is initially displayed ("lasers"); and an option that displays a heart inflating from the message when the message is initially displayed ("metallic heart").

Method 1200 further includes, while displaying the impact selection interface, detecting (1222) a second input by a second contact at a location on the touch-sensitive surface that corresponds to a location of a first impact effect option in the plurality of impact effect options. Examples of the second input are input 5108-4, FIG. 5AA, input 5108-5, FIGS. 5AB-5AD, and input 5108-6, FIGS. 5AE-5AF. In some embodiments, the first contact and the second contact are distinct contacts, such as contacts in two different tap gestures made by the same finger, or a deep press gesture on a send affordance followed by a tap gesture on a first impact effect option. In some embodiments, the first contact and the second contact are different parts of the same continuous contact with the touch-sensitive surface, such as a long press, light press, or deep press on the impact selection affordance (e.g., deep press input 5108-1, 5108-2, 5108-3, on impact selection affordance 5104, as shown in FIGS. 5X, 5Y and 5Z) followed by a drag to the first impact effect option (e.g., input 5108-4 on impact effect option 5112-1, FIG. 5AA) and then pausing or deep pressing on the first impact effect option.

Method 1200 also includes, in response to detecting the second user input by a second contact (e.g., second input 5108-6, FIG. 5AE) displaying (1224) a preview (e.g., in the impact selection interface, 5110, FIG. 5AE) that applies the first impact effect option to the first message input. FIG. 5AE shows a preview of the slam option being applied to first message input ("Congratulations!") in response to a second input 5108-6 respective by a second contact at a location on the touch-sensitive surface that corresponds to a location of a first impact effect option (i.e., the slam option). In some embodiments, the preview applies the first impact effect to a message region that includes the first message input (e.g., as shown in FIG. 5AE). In some embodiments, the preview applies the first impact effect to all (or substantially all) of the display screen, which includes a message region with the first message, for a full-screen effect, an example of which is shown by the sequence of user interface images in FIGS. 5AX through 5BF. FIGS. 5AX through 5BF show the progression of the "slam" effect of a first message input ("Hell No!!"), starting with the first message input displayed shown enlarged, rotated and with a dark background (FIG. 5AX), then displayed even larger and with a somewhat lighter background (FIG. 5AY), then less enlarged and rotated at a different angle than before (FIG. 5AZ), then shown with further reduced enlargement and with blurry borders (FIG. 5BA), then shown with reduced size a different background and a different rotation (FIG. 5BB) and then with a sequence of different shadows around the message region (FIGS. 5BC, 5BD, 5BE) until the first message input is shown at normal (default) size, not rotated, and with a normal (default) background (FIG. 5BF).

In some embodiments, while the preview of a respective impact effect option is displayed, the location in the impact selection interface that corresponds to the respective impact effect option includes an affordance (e.g., send affordance 5118, FIG. 5AB) for sending a message (with the first message input) with the respective impact effect option.

With regard to displaying (1206) an impact selection interface that includes a plurality of impact effect options, discussed above, in some embodiments, the impact selection interface includes (1208) both a region effect options affordance (e.g., affordance 5114, FIG. 5AA), which when activated causes display of impact effect options for a message containing the first message input, and a full-screen effect options affordance (e.g., affordance 5116, FIG. 5AA), which when activated causes display of a preview of one impact effect option that is applied to the entire displayed conversation transcript when a message containing the first message input is displayed in the messaging session. Typically, there will be a plurality of full-screen effect options, but only one of them is previewed at any one time, in response to activation of a full-screen effect options affordance.

In some embodiments, with regard to displaying (1206) an impact selection interface that includes a plurality of impact effect options, discussed above, the plurality of impact effect options includes (1210) at least one impact effect option that applies an image (e.g., a shaded oval or cloud) with an area that is larger than an area of a message region that contains the first message input to the message region that contains the first message input (e.g., displaying the image behind the message region that contains the first message input). Examples of this effect are shown in FIGS. 5AE, and 5AF.

In some embodiments, with regard to displaying (1206) an impact selection interface that includes a plurality of impact effect options, discussed above, the plurality of impact effect options includes (1212) at least one impact effect option that increases or decreases a size of a message region that contains the first message input relative to a size (e.g., a default size) of the message region that contains the first message input when no impact effect option is selected. For example, FIG. 5AB shows an example in which an impact effect option is displayed with a message region that contains the first message input having a decreased size relative to a default size of the message region, while FIG. 5AC shows an example in which an impact effect option is displayed with the message region that contains the first message input having an increased size relative to a default size of the message region.

In some embodiments, with regard to displaying (1206) an impact selection interface that includes a plurality of impact effect options, discussed above, the plurality of impact effect options includes (1214) at least one impact effect option that is configured to have a message region that contains the first message input interact with other message regions in the displayed conversation transcript when the message region that contains the first message input is displayed (e.g., the other message regions shake and/or bounce upon display of the message region that contains the first message input in the conversation transcript, to increase the impact of the arriving message). For example, the sequence of user interfaces illustrated in FIGS. 5BB-5BE show message regions other than the message region with the first message input (e.g., "Hell No!!) being moved (e.g., moved closer together, and caused to partially overlap) to increase the visual impact of the arriving message.

In some embodiments, with regard to displaying (1206) an impact selection interface that includes a plurality of impact effect options, discussed above, the plurality of impact effect options includes (1216) at least one impact effect option that is configured to display an animation when a message region that contains the first message input is displayed in a conversation transcript that corresponds to the messaging session. In some embodiments, the animation is a "shake" animation (e.g., as shown in FIGS. 5AH-5AI) that moves the message region between two or more locations, such as side-to-side and/or up-and-down animation. In some embodiments, the animation increases a size of the message region from an initially displayed size in the conversation transcript (e.g., as shown in the sequence of FIGS. 5AK, 5AL, 5AM, and in the sequence of FIGS. 5AN-5AS).

In some embodiments, the animation increases the size of the message region beyond a final size that is displayed at the end of the animation (thereby overshooting the final size) and then reduces the size of the message region to the final size (e.g., as shown in the sequence of FIGS. 5AN-5AS). In some embodiments, the final size of the message region is larger or smaller than a (default) size of the message region that contains the first message input when no impact effect option is selected. In some embodiments, an impact effect option that conceals the content of a message region displays an animation that includes moving particles (e.g., virtual sand particles) within the message region to indicate that the content of the message is concealed (e.g., as shown in FIG. 5BQ-5BR).

In some embodiments, with regard to displaying (1206) an impact selection interface that includes a plurality of impact effect options, discussed above, the plurality of impact effect options includes (1218) at least one impact effect option that is configured to display an animation when a message region that contains the first message input is displayed in a conversation transcript that corresponds to the messaging session, wherein the animation concurrently moves the message region that contains the first message input and other message regions in the conversation transcript. For example, the other message regions shake and/or bounce upon display of the message region that contains the first message input in the conversation transcript, to increase the impact of the arriving message. The sequence of user interfaces illustrated in FIGS. 5BB-5BF show such an example in which both the message region with the first message input and other message regions are moved in the conversation transcript in accordance with the "slam" effect option (5112-4 in FIGS. 5AA, 5AC).

In some embodiments, with regard to displaying (1206) an impact selection interface that includes a plurality of impact effect options, discussed above, the plurality of impact effect options includes (1220) at least one impact effect option that is configured to trigger one or more tactile outputs (e.g., to provide haptic feedback) when a message region that contains the first message input is displayed in a conversation transcript that corresponds to the messaging session. For example, In some embodiments, a first impact effect option (e.g., the "slam" option 5112-4, FIG. 5AA) has a smaller amplitude tactile output than a second impact effect option (e.g., the "loud" option 5112-3, FIG. 5AA).

In some embodiments, with regard to displaying (1224) a preview (e.g., in the impact selection interface, 5110, FIG. 5AE), the preview (e.g., in the impact selection interface 5110, FIG. 5AE) that applies the first impact effect option to the first message input repeats periodically (1226). For example, an animation shown in the preview is repeated every N (e.g., 2, 3, or 4) seconds, until a subsequent user input is detected.

In some embodiments, after displaying the preview, method 1200 includes detecting (1228) lift off of the second contact at a location on the touch-sensitive surface that corresponds to the first impact effect option; and, in response to detecting lift off of the second contact at the location on the touch-sensitive surface that corresponds to the first impact effect option: ceasing to display the impact selection interface (e.g., impact selection interface, 5110, FIG. 5AE); displaying a message region that contains the first message input in the conversation transcript (and, in some embodiments, applying the first impact effect option to the message region and/or the conversation transcript, as shown in FIG. 5AH); and transmitting information that causes one or more electronic devices that correspond to the at least one other user included in the messaging session to (A) display a message region that contains the first message input in a conversation transcript that corresponds to the messaging session, and (B) apply the first impact effect option (e.g., as shown in FIG. 5AK). The first impact effect is optionally applied to the message region that contains the first message input and/or to the displayed conversation transcript.

In some embodiments, after displaying the preview, method 1200 includes detecting (1230) detecting a third input by a third contact at a location on the touch-sensitive surface that corresponds to the first impact effect option (e.g., detecting a tap gesture, long press gesture, light press gesture, or deep press gesture by the contact at a location that corresponds to the first impact effect option, such as at a send affordance for the first impact option). For example, FIG. 5AG shows a third input 5108-7 on a send affordance, at a location corresponding to a user-selected impact effect option, in this case the "slam" option.

In such embodiments, method 1200 includes, in response to detecting the third input by the third contact at the location on the touch-sensitive surface that corresponds to the first impact effect option: ceasing to display the impact selection interface; displaying a message region that contains the first message input in the conversation transcript (and, in some embodiments, applying the first impact effect option to the message region and/or the conversation transcript, as shown in FIG. 5AH); and transmitting information that causes one or more electronic devices that correspond to the at least one other user included in the messaging session to (A) display a message region that contains the first message input in a conversation transcript that corresponds to the messaging session, and (B) apply the first impact effect option (e.g., as shown in FIG. 5AK). The first impact effect is optionally applied to the message region that contains the first message input and/or to the displayed conversation transcript.

In some embodiments, after displaying the preview, method 1200 includes detecting (1232) lift off of the second contact (e.g., lift-off of second input 5108-6, as shown in FIG. 5AE or 5AF) at a location on the touch-sensitive surface that corresponds to the first impact effect option; and, in response to detecting lift off of the second contact at a location on the touch-sensitive surface that corresponds to the first impact effect option: selecting the first impact effect option for a message that contains the first message input; ceasing to display the impact selection interface; and displaying (e.g., as shown in FIG. 5AH) the conversation transcript of the messaging session and the message-input area that includes a first message input.

In such embodiments, method 1200 includes, detecting a third input (e.g., a tap gesture at a location that corresponds to a send affordance, such as third input 5108-7, FIG. 5AG); and in response to detecting the third input: displaying a message region (e.g., as shown in FIG. 5AH) that contains the first message input in the conversation transcript (and, in some embodiments, applying the first impact effect option to the message region and/or the conversation transcript); and transmitting information that causes one or more electronic devices that correspond to the at least one other user included in the messaging session to (A) display a message region that contains the first message input in a conversation transcript that corresponds to the messaging session, and (B) apply the first impact effect option (e.g., as shown in FIG. 5AK). The first impact effect is optionally applied to the message region that contains the first message input and/or to the displayed conversation transcript.

In some embodiments, after displaying the preview, method 1200 includes detecting (1234) a third input by a third contact at a location on the touch-sensitive surface that corresponds to the first impact effect option (e.g., detecting a tap gesture, long press gesture, light press gesture, or deep press gesture by the contact at a location that corresponds to the first impact effect option, such as at a send affordance for the first impact option). For example, FIG. 5AG shows a third input 5108-7 on a affordance, at a location corresponding to a user-selected impact effect option, in this case the "slam" option.

In such embodiments (1234), method 1200 includes, in response to detecting the third input by the third contact at the location on the touch-sensitive surface that corresponds to the first impact effect option: selecting the first impact effect option for a message that contains the first message input; ceasing to display the impact selection interface; and displaying the conversation transcript of the messaging session and the message-input area that includes a first message input (e.g., first message input 5102 in message-input area 5008, as shown in FIG. 5AH). Further, method 1200 includes detecting a fourth input (e.g., a tap gesture at a location that corresponds to a send affordance, which optionally may be the same affordance as the impact option select affordance, or alternatively may a distinct affordance from the impact option select affordance); and in response to detecting the fourth input: (A) displaying a message region that contains the first message input in the conversation transcript (and, in some embodiments, applying the first impact effect option to the message region and/or the conversation transcript); and transmitting information that causes one or more electronic devices that correspond to the at least one other user included in the messaging session to (A) display a message region that contains the first message input in a conversation transcript that corresponds to the messaging session, and (B) apply the first impact effect option (e.g., as shown in FIG. 5AK). The first impact effect is optionally applied to the message region that contains the first message input and/or to the displayed conversation transcript.

Optionally, a user of the messaging application can preview more than one impact effect option that is applied to the entire displayed conversation transcript before making a final selection of an impact effect option. In some embodiments, method 1200 includes, while the message-input area is empty (1236), detecting an input that enters text in the message-input area (e.g., message input area 5100, FIG. 5U); and, in response to detecting the input that enters text in the message-input area, displaying an impact selection affordance (e.g., impact selection affordance 5104, in message-input area 5100), wherein activation of the impact selection affordance is configured to cause display of the impact selection interface.

In some embodiments, method 1200 includes, while a preview of an impact effect option that is applied to the entire displayed conversation transcript is displayed (e.g., a preview of a first full screen effect option, such as displaying balloons (e.g., balloons 5152-1, as shown in FIG. 5CB) floating upwards in the conversation transcript for a birthday message, as shown in FIG. 5CC, and FIGS. 5CH-5CO), detecting (1238) an input (e.g., swipe gesture 5156, FIG. 5CC) that activates display of a preview of another impact effect option that is applied to the entire displayed conversation transcript; and, in response to detecting the input that activates display of the preview of another impact effect option that is applied to the entire displayed conversation transcript, displaying the preview of the second impact effect option that is applied to the entire displayed conversation transcript (e.g., displaying a preview of a second full screen effect option, such as a display of confetti for a "Congratulations!" message, as shown in FIGS. 5CD-5CE, or fireworks exploding in the conversation transcript for a "Happy New Year" message, as shown in FIGS. 5CP-5CW). As shown in FIGS. 5CB and 5CC, the user interface may include an effect option indicator 5154 (sometimes called page dots) to indicate which full screen effect option is currently selected or is currently being previewed, and also to indicate how many full screen effect options are available and which one of those options in a sequence of the full screen effect options is currently being viewed.

Optionally, a user of the messaging application can preview more than one impact effect option before making a final selection of an impact effect option. In some embodiments, method 1200 includes, while displaying the impact selection interface (e.g., impact selection interface 5110, as shown in FIG. 5AA), detecting (1240) an input by a contact (e.g., input 5108-4) at a location on the touch-sensitive surface that corresponds to a location of a second impact effect option in the plurality of impact effect options; and, in response to detecting the user input by the contact at the location on the touch-sensitive surface that corresponds to the location of a second impact effect option, displaying a preview (e.g., in the impact selection interface) that applies the second impact effect option to the first message input. In some embodiments, the preview applies the second impact effect to a message region that includes the first message input.

The sequence of FIGS. 5CH-5CO shows an example of a balloons full screen effect being displayed when a message ("Happy Birthday!!!!!") containing a corresponding enhanced message content trigger is received. Similarly, the sequence of FIGS. 5CP-5CW shows an example of a fireworks full screen effect being displayed when a message ("Happy New Year!!!") containing a corresponding enhanced message content trigger is received.

In some embodiments, method 1200 includes determining (1242) whether an electronic device that corresponds to another user in the messaging session is capable of applying the first impact effect option (or, more generally, capable of applying any of the plurality of impact effect options) to a message in the messaging session, and, in accordance with a determination that the electronic device that corresponds to another user in the messaging session is not capable of applying the first impact effect option to a message in the messaging session, displaying a notification on the display of the electronic device of the user about the first impact effect option (e.g., a notification that the electronic device that corresponds to the other user in the messaging session is not capable of applying the first impact effect option, or any impact effect option, to a message in the messaging session). Optionally, in accordance with a determination that the electronic device that corresponds to another user in the messaging session is capable of applying the first impact effect option to a message in the messaging session, method 1200 includes forgoing displaying the notification.

In some embodiments, prior to transmitting information that causes one or more electronic devices that correspond to the at least one other user included in the messaging session to display a message region that contains the first message input, the electronic device of the user determines whether the electronic device corresponding to the at least one other user is capable of applying the first impact effect option to the message region. If not, the electronic device of the user displays a notification indicating that the other user will not see the effect.

Figure 13:
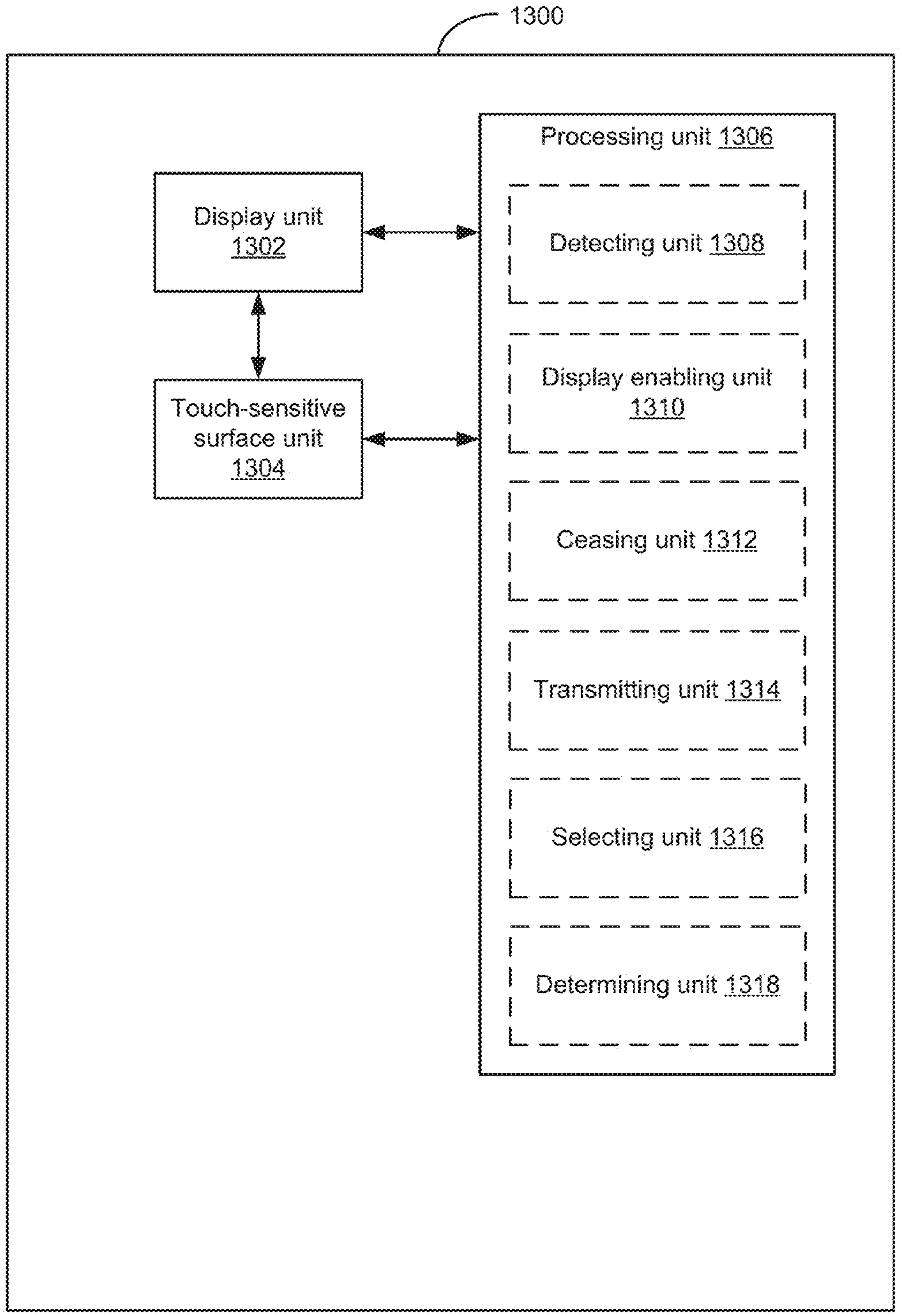
FIG. 13 is a functional block diagram of an electronic device in accordance with some embodiments.

In accordance with some embodiments, FIG. 13 shows a functional block diagram of an electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, an electronic device 1300 includes a display unit 1302 configured to display a messaging user interface on the display unit, the messaging user interface including: a conversation transcript of a messaging session between a user of the electronic device and at least one other user, and a message-input area that includes a first message input; a touch-sensitive surface unit 1304 configured to detect contacts; and a processing unit 1306 coupled with the display unit and the touch-sensitive surface unit. In some embodiments, the processing unit 1306 includes a detecting unit 1308, a display enabling unit 1310, a ceasing unit 1312, a transmitting unit 1314, a selecting unit 1316, and a determining unit 1318.

The processing unit 1306 is configured to: while displaying the messaging user interface, detect a first input by a first contact at a location on the touch-sensitive surface unit 1304 that corresponds to a location in the message-input area (e.g., with the detecting unit 1308); in response to detecting the first input by the first contact, enable display of an impact selection interface that includes a plurality of impact effect options (e.g., with the display enabling unit 1310); while displaying the impact selection interface, detect a second input by a second contact at a location on the touch-sensitive surface unit 1304 that corresponds to a location of a first impact effect option in the plurality of impact effect options (e.g., with the detecting unit 1308); and, in response to detecting the second user input by a second contact, enable display of a preview that applies the first impact effect option to the first message input (e.g., with the display enabling unit 1310).

In some embodiments, the processing unit 1306 is further configured to: after displaying the preview, detect lift off of the second contact at a location on the touch-sensitive surface unit 1304 that corresponds to the first impact effect option (e.g., with the detecting unit 1308); and, in response to detecting lift off of the second contact at the location on the touch-sensitive surface unit 1304 that corresponds to the first impact effect option: cease to display the impact selection interface (e.g., with the ceasing unit 1312); enable display of a message region that contains the first message input in the conversation transcript (e.g., with the display enabling unit 1310); and transmit information that causes one or more electronic devices that correspond to the at least one other user included in the messaging session to enable display of a message region that contains the first message input in a conversation transcript that corresponds to the messaging session, and apply the first impact effect option (e.g., with the transmitting unit 1314).

In some embodiments, the processing unit 1306 is further configured to: after displaying the preview, detect lift off of the second contact at a location on the touch-sensitive surface unit 1304 that corresponds to the first impact effect option (e.g., with the detecting unit 1308); and, in response to detecting lift off of the second contact at a location on the touch-sensitive surface unit 1304 that corresponds to the first impact effect option: select the first impact effect option for a message that contains the first message input (e.g., with the selecting unit 1316); cease to display the impact selection interface (e.g., with the ceasing unit 1312); and enable display of the conversation transcript of the messaging session and the message-input area that includes a first message input (e.g., with the display enabling unit 1310); detect a third input (e.g., with the detecting unit 1308); and in response to detecting the third input: enable display of a message region that contains the first message input in the conversation transcript (e.g., with the display enabling unit 1310); and transmit information that causes one or more electronic devices that correspond to the at least one other user included in the messaging session to enable display of a message region that contains the first message input in a conversation transcript that corresponds to the messaging session, and apply the first impact effect option (e.g., with the transmitting unit 1314).

In some embodiments, the processing unit 1306 is further configured to: after displaying the preview, detect a third input by a third contact at a location on the touch-sensitive surface unit 1304 that corresponds to the first impact effect option (e.g., with the detecting unit 1308); and, in response to detecting the third input by the third contact at the location on the touch-sensitive surface unit 1304 that corresponds to the first impact effect option: cease to display the impact selection interface (e.g., with the ceasing unit 1312); enable display of a message region that contains the first message input in the conversation transcript (e.g., with the display enabling unit 1310); and transmit information that causes one or more electronic devices that correspond to the at least one other user included in the messaging session to enable display of a message region that contains the first message input in a conversation transcript that corresponds to the messaging session, and apply the first impact effect option (e.g., with the transmitting unit 1314).

In some embodiments, the processing unit 1306 is further configured to: after displaying the preview, detect a third input by a third contact at a location on the touch-sensitive surface unit 1304 that corresponds to the first impact effect option (e.g., with the detecting unit 1308); and, in response to detecting the third input by the third contact at the location on the touch-sensitive surface unit 1304 that corresponds to the first impact effect option: select the first impact effect option for a message that contains the first message input (e.g., with the selecting unit 1316); cease to display the impact selection interface (e.g., with the ceasing unit 1312); and enable display of the conversation transcript of the messaging session and the message-input area that includes a first message input (e.g., with the display enabling unit 1310); detect a fourth input (e.g., with the detecting unit 1308); and in response to detecting the fourth input: enable display of a message region that contains the first message input in the conversation transcript (e.g., with the display enabling unit 1310); and transmit information that causes one or more electronic devices that correspond to the at least one other user included in the messaging session to enable display of a message region that contains the first message input in a conversation transcript that corresponds to the messaging session, and apply the first impact effect option (e.g., with the transmitting unit 1314).

In some embodiments, the processing unit 1306 is further configured to: while the message-input area is empty, detect an input that enters text in the message-input area (e.g., with the detecting unit 1308); and, in response to detecting the input that enters text in the message-input area, enable display of an impact selection affordance (e.g., with the display enabling unit 1310), wherein activation of the impact selection affordance is configured to cause display of the impact selection interface.

In some embodiments, the impact selection interface includes a region effect options affordance, which when activated causes display of impact effect options for a message containing the first message input, and a full-screen effect options affordance, which when activated causes display of a preview of one impact effect option that is applied to the entire displayed conversation transcript when a message containing the first message input is displayed in the messaging session.

In some embodiments, the processing unit 1306 is further configured to: while a preview of an impact effect option that is applied to the entire displayed conversation transcript is displayed, detect an input that activates display of a preview of another impact effect option that is applied to the entire displayed conversation transcript (e.g., with the detecting unit 1308); and, in response to detecting the input that activates display of the preview of another impact effect option that is applied to the entire displayed conversation transcript, enable display of the preview of the second impact effect option that is applied to the entire displayed conversation transcript (e.g., with the display enabling unit 1310).

In some embodiments, the processing unit 1306 is further configured to: while displaying the impact selection interface, detect an input by a contact at a location on the touch-sensitive surface unit 1304 that corresponds to a location of a second impact effect option in the plurality of impact effect options (e.g., with the detecting unit 1308); and, in response to detecting the user input by the contact at the location on the touch-sensitive surface unit 1304 that corresponds to the location of a second impact effect option, enable display of a preview that applies the second impact effect option to the first message input (e.g., with the display enabling unit 1310).

In some embodiments, the plurality of impact effect options includes at least one impact effect option that applies an image with an area that is larger than an area of a message region that contains the first message input to the message region that contains the first message input.

In some embodiments, the plurality of impact effect options includes at least one impact effect option that increases or decreases a size of a message region that contains the first message input relative to a size of the message region that contains the first message input when no impact effect option is selected.

In some embodiments, the plurality of impact effect options includes at least one impact effect option that is configured to have a message region that contains the first message input interact with other message regions in the displayed conversation transcript when the message region that contains the first message input is displayed.

In some embodiments, the plurality of impact effect options includes at least one impact effect option that is configured to display an animation when a message region that contains the first message input is displayed in a conversation transcript that corresponds to the messaging session.

In some embodiments, the plurality of impact effect options includes at least one impact effect option that is configured to display an animation when a message region that contains the first message input is displayed in a conversation transcript that corresponds to the messaging session, wherein the animation concurrently moves the message region that contains the first message input and other message regions in the conversation transcript.

In some embodiments, the plurality of impact effect options includes at least one impact effect option that is configured to trigger one or more tactile outputs when a message region that contains the first message input is displayed in a conversation transcript that corresponds to the messaging session.

In some embodiments, the preview that applies the first impact effect option to the first message input repeats periodically.

In some embodiments, the processing unit 1306 is further configured to: determine whether an electronic device that corresponds to another user in the messaging session is capable of applying the first impact effect option to a message in the messaging session (e.g., with the determining unit 1318), and, in accordance with a determination that the electronic device that corresponds to another user in the messaging session is not capable of applying the first impact effect option to a message in the messaging session, enable display of a notification on the display unit 1302 of the electronic device of the user about the first impact effect option (e.g., with the display enabling unit 1310).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12E are, optionally, implemented by components depicted in FIGS. 1A-1B or FIG. 13. For example, detection operations 1204 and 1222 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Concealed Message Interaction

Figure 14A:
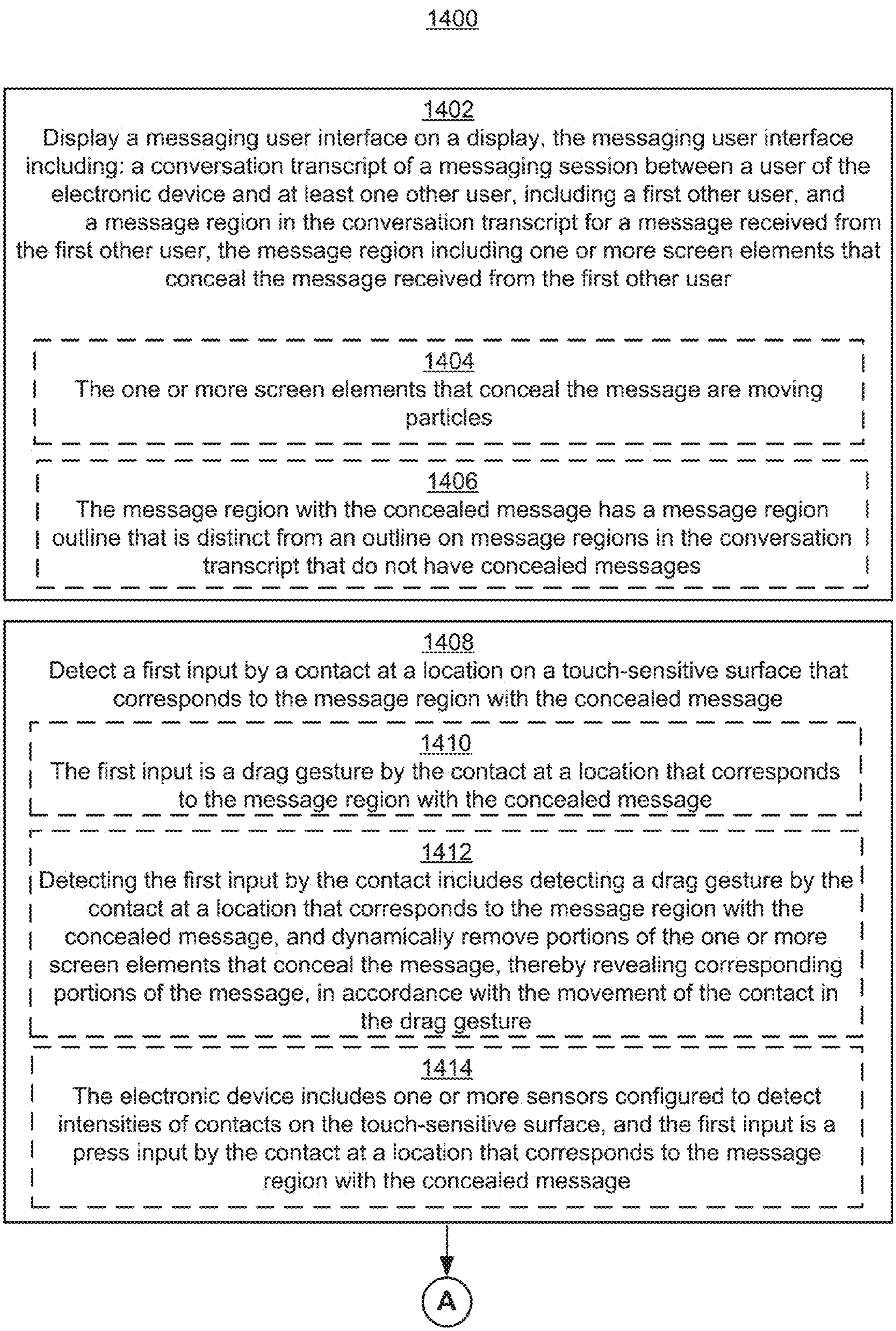

FIGS. 14A-14B are flow diagrams of a process for interacting with concealed messages, in accordance with some embodiments. More specifically, these figures relate to methods of displaying an interface that includes one or more screen elements to conceal received message text within the message region. In response to input received at a location corresponding to the message region, the received message is at least partially revealed. This allows messages to be transmitted and viewed privately where messages may be viewed in a crowded location, etc. By requiring an additional action to view the message text, inadvertent disclosure of the contents is avoided.

One or more examples of an electronic device (e.g., portable multifunction device 100 or device 300) implementing these methods are shown in FIGS. 5BG-5BP and 5BQ-5CA.

FIGS. 14A-14B are flow diagrams illustrating a method 1400, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 1400 includes displaying (1402) a messaging user interface (e.g., user interface 5002, as shown in FIG. 5BH, of a messaging application) on the display. The messaging user interface includes a conversation transcript (e.g., conversation transcript 5004 in user interface 5002, FIG. 5BH) of a messaging session between a user of the electronic device and at least one other user (e.g., a user of another electronic device) including a first other user, and a message region (5008, FIG. 5BH) in the conversation transcript for a message (e.g., message 5126) received from the first other user, the message region including one or more screen elements (e.g., screen elements 5124, FIG. 5BH) that conceal the message received from the first other user.

In some embodiments, the received message is sent by another device, a user of which has applied an "invisible ink" effect to the message. In some embodiments, that is accomplished using an impact selection interface 5110, FIG. 5BG, that includes a plurality of impact effect options (e.g., impact effect options 5112-1 through 5112-4, described above with respect to FIG. 5AA). In some embodiments, the set of impact effect options includes options that are applied to an individual message region (e.g., "region effect" options) and options that are applied to the entire displayed conversation transcript when a message is initially displayed in the messaging session (e.g., "full-screen effect" options). In some embodiments, the displayed plurality of impact effect options includes an option that conceals the content of a message in the conversation transcript ("invisible ink" option 5112-1, FIG. 5AA, indicated in FIG. 5BG by an empty message region). In some embodiments, the invisible ink option includes an affordance (e.g., send affordance 5118, FIG. 5BG) for sending a message (with user-specified message input) with the respective impact effect option. In some embodiments, impact selection interface 5110, FIG. 5BG, includes a cancel affordance 5120 for canceling the selection of any impact effect options and returning the messaging application to either a prior user interface of the messaging application or a predefined user interface of the messaging application.

In some embodiments, the one or more screen elements (5124) that conceal the message are (1404) moving particles (e.g., displayed images of moving particles). In some embodiments, the device displays an animation that includes moving particles (e.g., virtual sand particles) within the message region to conceal the content of the message.

In some embodiments, the message region (5008, FIG. 5BH) with the concealed message has (1406) a message region outline that is distinct from an outline on message regions in the conversation transcript that do not have concealed messages. In one example, the message region with the concealed message has a dotted line outline, whereas conventional message regions (e.g., message regions that do not have impact effects applied to them, such as the invisible ink effect) in the conversation transcript have solid line outlines.

Method 1400 further includes detecting (1408) a first input by a contact (e.g., a swipe or drag gesture input 5128-*a*, FIG. 5BH) at a location on the touch-sensitive surface that corresponds to the message region with the concealed message; and, after detecting the first input by the contact, revealing (1416) the concealed message in the message region. For example, as shown in FIGS. 5BH, 5BI, 5BJ and 5BK, respective portions of the message 5126 are revealed in response to the drag gesture input 5128-*a*, 5128-*b*, 5128-*c*, 5128-*d* progressing from a first portion of the message region 5008 to another portion of the message region 5008. Continuing with the example, as shown in FIG. 5L, when the drag gesture 5128 is completed, or ends, or after the passage of a predefined time, the message in the message region 5008 is again concealed.

In some embodiments, the first input is a drag gesture (e.g., input 5128-*a*) by the contact at a location that corresponds to the message region with the concealed message.

In some embodiments, detecting (1408) the first input by the contact includes detecting (1412) a drag gesture (e.g., input 5128-*a*, FIG. 5BH) by the contact at a location that corresponds to the message region with the concealed message, and method 1400 includes dynamically removing (1412) portions of the one or more screen elements that conceal the message, thereby revealing corresponding portions of the message, in accordance with the movement of the contact in the drag gesture. In some embodiments, portions of the one or more screen elements (e.g., screen elements 5124) are removed that are within a predetermined distance of the contact in the drag gesture. In some embodiments, after a given portion of the message is revealed (e.g., after passage of a predetermined amount of time, such as 0.5, 1, 2, 3, 4, or 5 seconds), the given portion is concealed again (e.g., by applying one or more screen elements that conceal the given portion).

In some embodiments, the electronic device includes (1414) one or more sensors configured to detect intensities of contacts on the touch-sensitive surface, and the first input (e.g., input 5128-*a*) is a press input (e.g., a light press or a deep press) by the contact at a location that corresponds to the message region with the concealed message.

In some embodiments, the electronic device includes (1418) one or more sensors configured to detect intensities of contacts on the touch-sensitive surface, and detecting the first input by the contact includes detecting an increase in intensity of the contact (e.g., input 5130-*a*, 5130-*b*, 5130-*c*, with increasing intensity, as shown in FIGS. 5BM, 5BN and 5BO) at a location that corresponds to the message region (5008, FIG. 5BM) with the concealed message. In such embodiments, method 1400 includes: dynamically removing portions of the one or more screen elements (5124) that conceal the message (e.g., as shown in FIG. 5BM), thereby revealing corresponding portions of the message, in accordance with the increase in intensity of the contact (e.g., as shown in the sequence of FIGS. 5BM, 5BN and 5BO). In some embodiments, portions of the one or more screen elements (5124) are removed that are closest to the contact and then, as the intensity of the contact increases, portions that are farther and farther from the contact are removed, until the entire message is revealed, as shown in the sequence of FIGS. 5BM, 5BN and 5BO. In some embodiments, in accordance with a decrease in intensity of the contact during the input, the device dynamically adds portions of one or more screen elements, thereby concealing corresponding portions of the message, as shown in the progression from FIG. 5BO to FIG. 5BP.

In some embodiments, method 1400 includes, in response to detecting the first input by the contact, displaying (1420) an authentication prompt (e.g., text that says "Please enter a fingerprint or passcode" or the like) and/or an authentication interface (e.g., a passcode screen). In such embodiments, method 1400 further includes receiving an authentication input (e.g., receiving a passcode or fingerprint input); in accordance with a determination that the authentication input satisfies authentication criteria, revealing the concealed message in the message region; and in accordance with a determination that the authentication input does not satisfy the authentication criteria, keeping the message in the message region concealed.

In some embodiments, the device determines whether the user is authorized to see the message, and, in accordance with a determination that the user is authorized to see the message, the message is revealed. In some embodiments, the determination is performed in response to detecting the first user input. In some embodiments, the determination is performed in response to receiving the concealed message. In some embodiments, the determination is performed when a messaging application is loaded or when the messaging application receives focus (e.g., when a user interface of the messaging application is displayed and is enabled to received user inputs). In some embodiments, the determination is performed when the user provides authentication information to the device (e.g., authentication is performed when the user unlocks the device using a code, password, and/or fingerprint). In some embodiments (e.g., on a device with multiple users) authentication is performed each time a new user provides authentication information.

In some embodiments, determining whether the user is authorized to reveal the message includes performing a biometric authentication. In some embodiments, authentication is performed when user provides a fingerprint to unlock the device. In some embodiments, user is prompted to provide a fingerprint or passcode when the concealed message is received or when user attempts to access the concealed message.

In some embodiments, prior to sending a concealed message from a device, the device authenticates the sender (e.g., by checking sender authentication credentials). For example, prior to sending a concealed message (such as a message with an "invisible ink" impact effect option), the sending device checks whether a passcode or fingerprint provided by a user corresponds to an authorized user, such as the primary user of the device. In some embodiments, the sender is prompted to provide a passcode and/or biometric authentication (e.g., a fingerprint) just prior to sending the concealed message (e.g., in response to a user activating a send icon or selecting an option to conceal the message, like an "invisible ink" impact effect option). In some embodiments, if the device authenticates the sender, then the concealed message is sent or is enabled to be sent, whereas if the device does not authenticate the sender, then the concealed message is prevented from being sent.

In some embodiments, method 1400 includes, after revealing the concealed message in the message region, concealing (1422) the message received from the first other user. For example, after a concealed message in message region 5008 has been revealed, as shown in the sequence of FIGS. 5BH-5BK, the message in message region is again concealed, as shown in FIG. 5BL. In another example, the sequence of FIGS. 5BQ-5BV, show a message being gradually revealed, as shown in FIGS. 5BQ to 5BT, and then gradually concealed, as shown in FIGS. 5BT to 5BV. In some embodiments, the message is concealed again in response to detecting termination of the first input by the contact. In some embodiments, the message is concealed again after a predetermined time (e.g., 2 seconds, 5 seconds, or a predetermined amount of time that between two and five seconds) has elapsed since the first input by the contact terminates. In some embodiments, the message is concealed again after a predetermined time (e.g., 2 seconds, 5 seconds, or a predetermined amount of time that between two and five seconds) has elapsed since the message was revealed.

Figure 15:
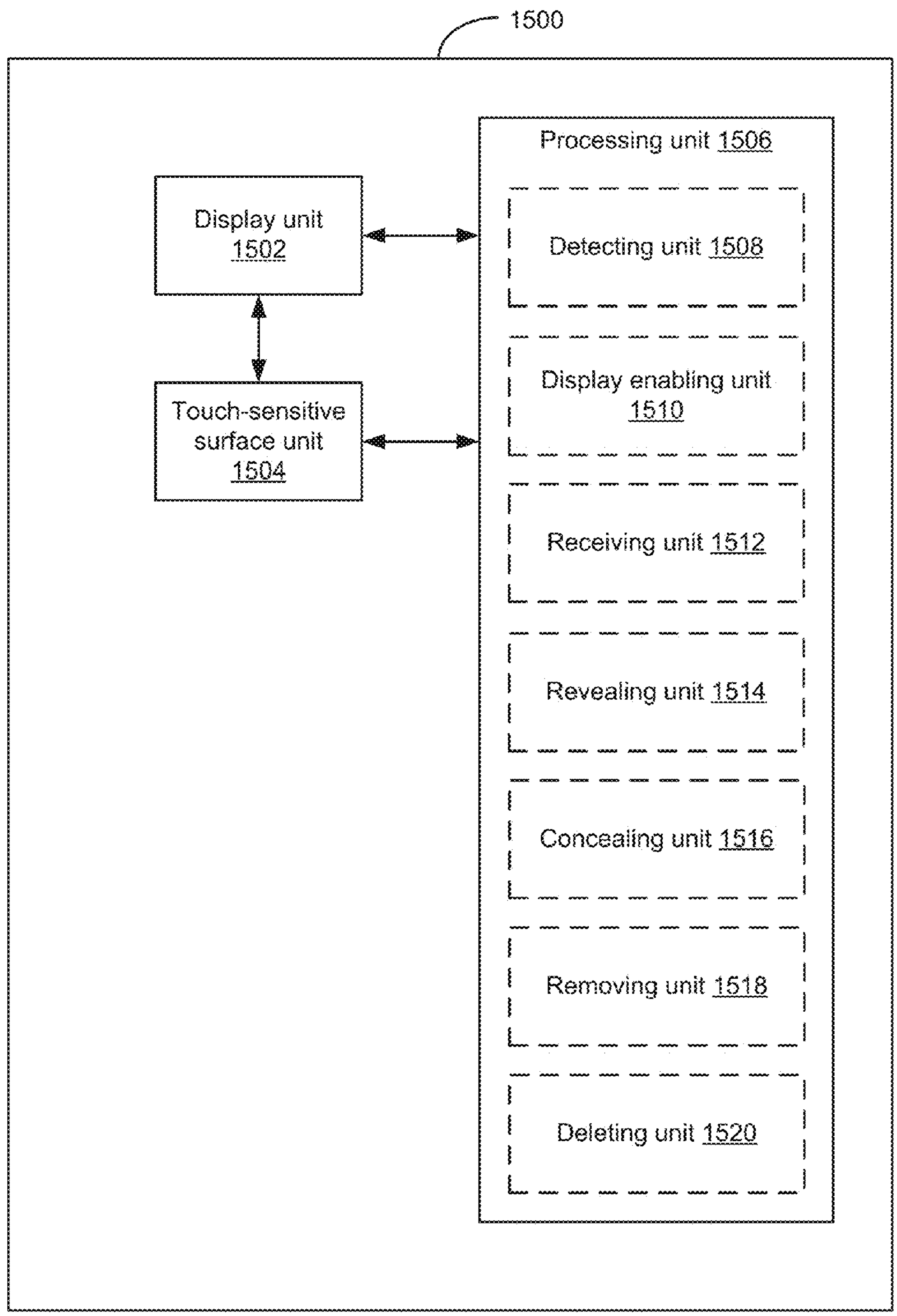
FIG. 15 is a functional block diagram of an electronic device in accordance with some embodiments.

In accordance with some embodiments, FIG. 15 shows a functional block diagram of an electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, an electronic device 1500 includes a display unit 1502 configured to display a messaging user interface on the display unit 1502, the messaging user interface including: a conversation transcript of a messaging session between a user of the electronic device and at least one other user, including a first other user, and a message region in the conversation transcript for a message received from the first other user, the message region including one or more screen elements that conceal the message received from the first other user; a touch-sensitive surface unit 1504 configured to detect contacts; and a processing unit 1506 coupled with the display unit 1502 and the touch-sensitive surface unit 1504. In some embodiments, the processing unit 1506 includes a detecting unit 1508, a display enabling unit 1510, a receiving unit 1512, a revealing unit 1514, a concealing unit 1516, a removing unit 1518, and a deleting unit 1520.

The processing unit 1506 is configured to: detect a first input by a contact at a location on the touch-sensitive surface unit 1504 that corresponds to the message region with the concealed message (e.g., with the detecting unit 1508); and, reveal the concealed message in the message region in response to detecting the first input by the contact (e.g., with the revealing unit 1514).

In some embodiments, the one or more screen elements that conceal the message are moving particles.

In some embodiments, the message region with the concealed message has a message region outline that is distinct from an outline on message regions in the conversation transcript that do not have concealed messages.

In some embodiments, the processing unit 1506 is further configured to: in response to detecting the first input by the contact, enable display of an authentication prompt and/or an authentication interface (e.g., with the display enabling unit 1510); receive an authentication input (e.g., with the receiving unit 1512); in accordance with a determination that the authentication input satisfies authentication criteria, reveal the concealed message in the message region (e.g., with the revealing unit 1514); and in accordance with a determination that the authentication input does not satisfy the authentication criteria, keep the message in the message region concealed (e.g., with the concealing unit 1516).

In some embodiments, the first input is a drag gesture by the contact at a location that corresponds to the message region with the concealed message.

In some embodiments, detecting the first input by the contact includes detecting a drag gesture by the contact at a location that corresponds to the message region with the concealed message, and the processing unit 1506 is further configured to: dynamically remove portions of the one or more screen elements that conceal the message (e.g., with the removing unit 1518), thereby revealing corresponding portions of the message, in accordance with the movement of the contact in the drag gesture.

In some embodiments, the electronic device includes one or more sensors configured to detect intensities of contacts on the touch-sensitive surface unit 1504, and the first input is a press input by the contact at a location that corresponds to the message region with the concealed message.

In some embodiments, the electronic device includes one or more sensors configured to detect intensities of contacts on the touch-sensitive surface unit 1504, and detecting the first input by the contact includes detecting an increase in intensity of the contact at a location that corresponds to the message region with the concealed message, and the processing unit 1506 is further configured to: dynamically remove portions of the one or more screen elements that conceal the message (e.g., with the removing unit 1518), thereby revealing corresponding portions of the message, in accordance with the increase in intensity of the contact.

In some embodiments, the processing unit 1506 is further configured to: after revealing the concealed message in the message region, conceal the message received from the first other user (e.g., with the concealing unit 1516).

In some embodiments, the processing unit 1506 is further configured to: after revealing the concealed message in the message region, automatically delete the message received from the first other user from the conversation transcript (e.g., with the deleting unit 1520).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 14A-14B are, optionally, implemented by components depicted in FIGS. 1A-1B or FIG. 15. For example, detection operations 1408, 1412, and 1414 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Triggering Enhanced Message Content

Figure 16A:
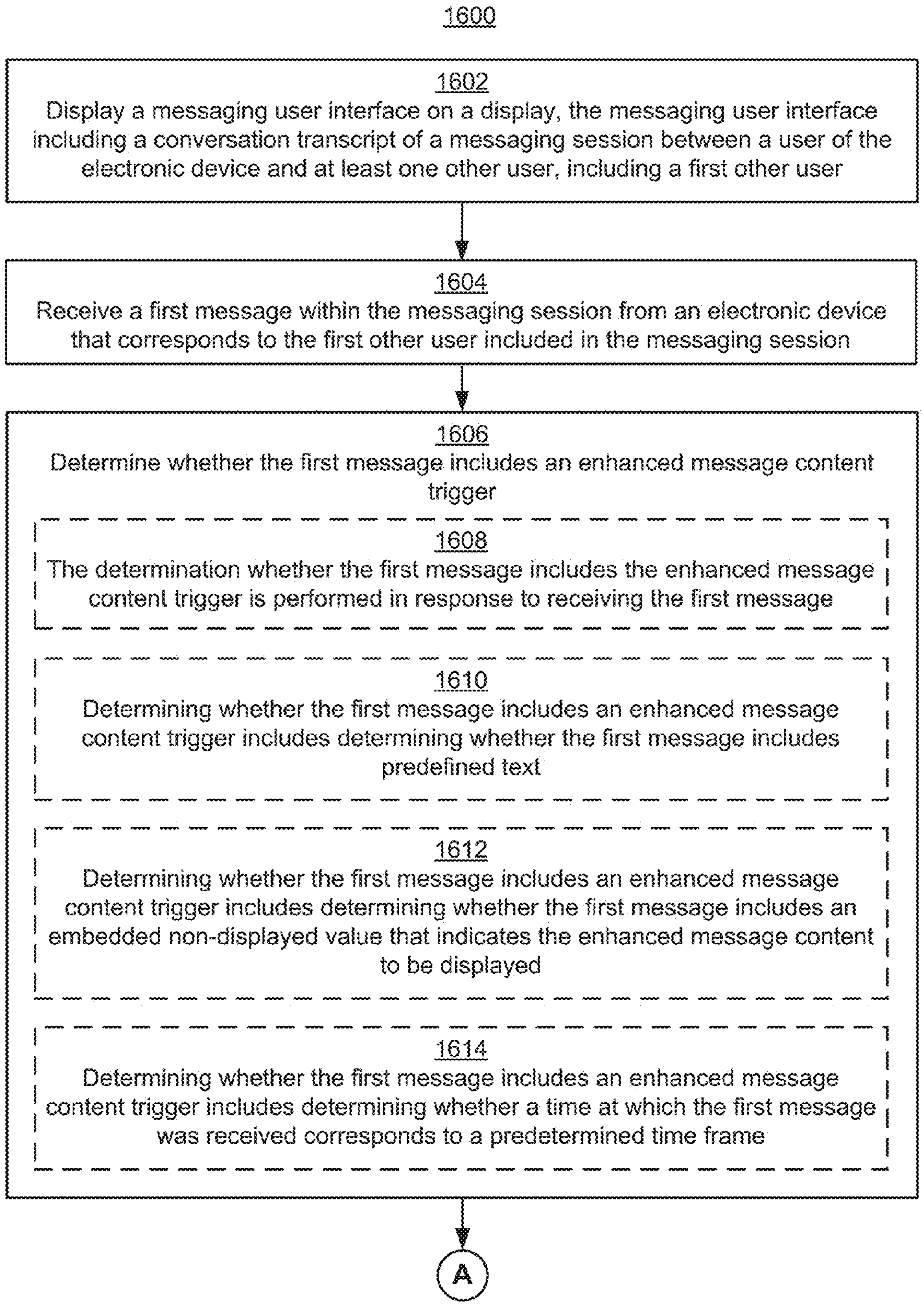
Figure 16B:
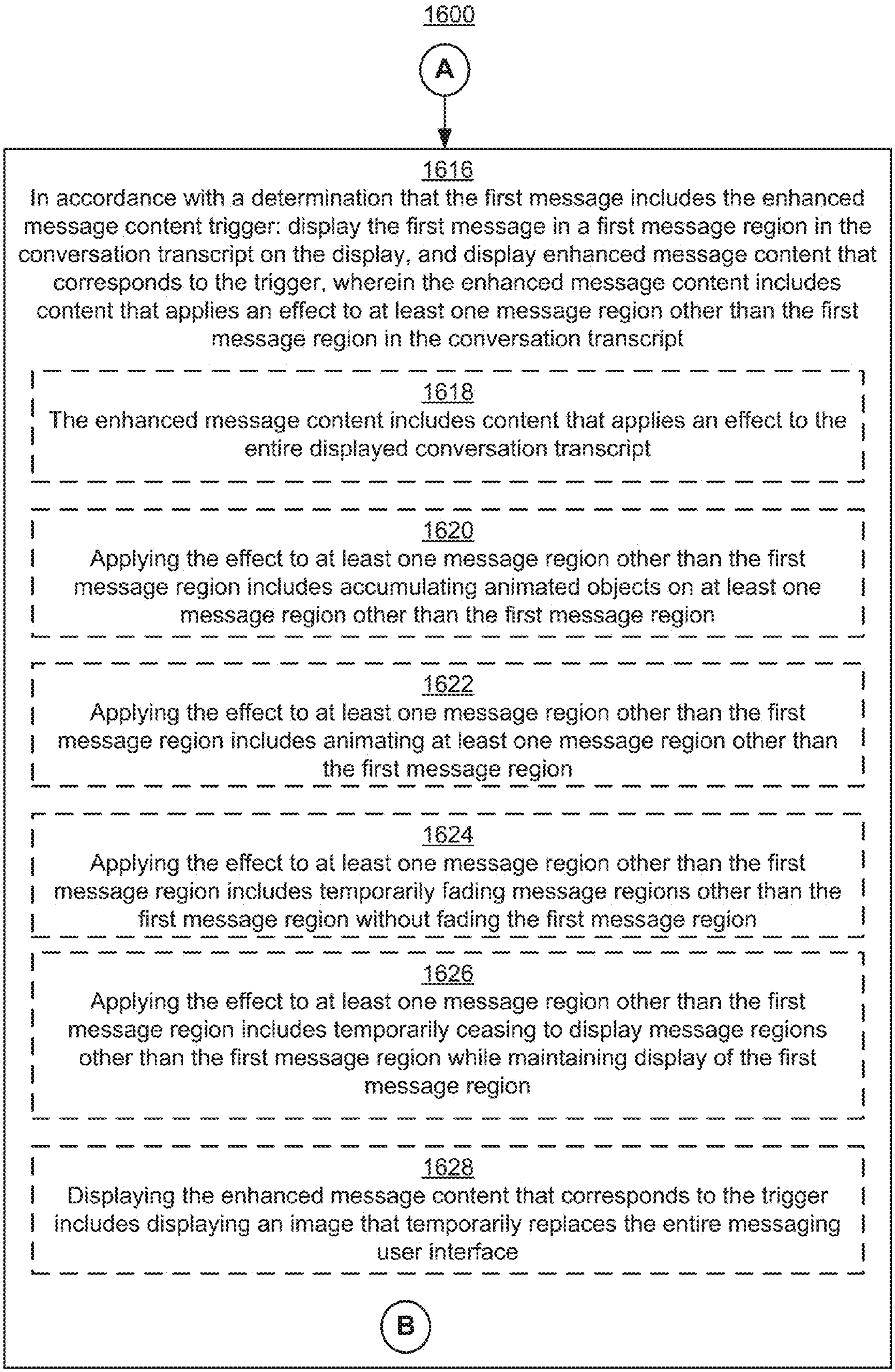

FIGS. 16A-16C are flow diagrams of a process for applying an effect to a messaging user interface when a message includes an enhanced message content trigger, in accordance with some embodiments. More specifically, these figures relates to methods for determining whether a message in a first message region includes an enhanced message content trigger (e.g., a word, phrase, set of emoji, or other content that triggers the effect, or an option selected by the sender). In response to determining that the message includes the enhanced message content trigger, the effect is applied to the messaging user interface. In some embodiments, the effect is applied to at least one message region other than the first message region. In some embodiments, the effect is applied to a chrome of the messaging user interface.

One or more examples of an electronic device (e.g., portable multifunction device 100 or device 300) implementing this method are shown in FIGS. 5CB-5CG and 5CH-5CW.

FIGS. 16A-16C are flow diagrams illustrating a method 1600, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 1600 includes displaying (1602) a messaging user interface (e.g., user interface 5002, as shown in FIG. 5BH, of a messaging application) on the display. The messaging user interface includes a conversation transcript (e.g., conversation transcript 5004 in user interface 5002, FIG. 5CF) of a messaging session between a user of the electronic device and at least one other user (e.g., a user of another electronic device) including a first other user. Method 1600 further includes receiving (1604) a first message within the messaging session from an electronic device (e.g., a second electronic device) that corresponds to the first other user included in the messaging session; determining (1606) whether the first message includes an enhanced message content trigger; in accordance with a determination that the first message includes the enhanced message content trigger: displaying (1616) the first message in a first message region in the conversation transcript on the display, and displaying enhanced message content that corresponds to the trigger, wherein the enhanced message content includes content that applies an effect to at least one message region other than the first message region in the conversation transcript (for example as shown in FIG. 5CF); and, in accordance with a determination that the first message does not include the enhanced message content trigger, displaying (1642) the first message in a first message region in the conversation transcript on the display (i.e., without displaying the enhanced message content that corresponds to the trigger, for example as shown in FIG. 5CG).

In some embodiments, the determination (1606) whether the first message includes the enhanced message content trigger is performed (1608) in response to receiving the first message.

In some embodiments, determining (1606) whether the first message includes an enhanced message content trigger includes determining (1610) whether the first message includes predefined text. For example, when the first message includes the words “happy birthday,” the device displays enhanced message content that includes balloons, as shown in the sequence of FIGS. 5CK to 5CO. In some embodiments, determining whether the first message includes an enhanced message content trigger includes analyzing content of the first message to determine whether the first message includes predefined message content, such as a word, phrase, emoticon, emoticon string, emoji, emoji string, sticker, and/or sticker string.

In some embodiments, determining (1606) whether the first message includes an enhanced message content trigger includes determining (1612) whether the first message includes an embedded non-displayed value (e.g., as determined by a display option selected by the sender) that indicates the enhanced message content to be displayed. For example, the sender of the first message (the first other user) selects a full screen effect option to apply to the first message, and an embedded non-displayed value that corresponds to the full screen effect option selected by the sender is sent with the first message.

In some embodiments, determining (1606) whether the first message includes an enhanced message content trigger includes determining (1614) whether a time at which the first message was received corresponds to a predetermined time frame. For example, when the first message is received at or within a predetermined time after midnight on January 1, the device displays enhanced message content that includes fireworks and/or text that states “Happy New Year!”

In some embodiments, the enhanced message content includes (1618) content that applies an effect to the entire displayed conversation transcript. For example, the effect applied to the entire conversation transcript may be the animated display of balloons that move past the entire conversation transcript, the animated display of confetti (e.g., as shown in FIGS. 5CD through 5CF) that moves past the entire conversation transcript, or the like.

In some embodiments, applying (1616) the effect to at least one message region other than the first message region includes accumulating (1620) animated objects (e.g., virtual confetti) on at least one message region other than the first message region. In some embodiments, animated objects accumulate on user interface objects displayed outside the messaging user interface. In some embodiments, animated objects accumulate on a status bar or other portion of the display that is controlled by the operating system of the device.

In some embodiments, applying (1616) the effect to at least one message region other than the first message region includes animating (1622) at least one message region other than the first message region. In some embodiments, movement of the other message regions is triggered by movement of the first message region. In some embodiments, other user interface objects displayed outside the messaging user interface are animated.

In some embodiments, applying (1616) the effect to at least one message region other than the first message region includes temporarily fading (1624) message regions other than the first message region without fading the first message region, as shown in FIG. 5CQ (as compared to the FIG. 5CP).

In some embodiments, applying (1616) the effect to at least one message region other than the first message region includes temporarily ceasing to display (1626) message regions other than the first message region while maintaining display of the first message region.

In some embodiments, displaying (1616) the enhanced message content that corresponds to the trigger includes displaying (1628) an image (e.g., an animated image) that temporarily replaces the entire messaging user interface. In some other embodiments, displaying (1616) the enhanced message content that corresponds to the trigger includes displaying (1630) an image (e.g., an animated image) that temporarily replaces the entire messaging user interface, except for the first message region. For example, balloons or confetti would be displayed, replacing the entire messaging user interface, or replacing the entire messaging user interface other than the first message region.

In some embodiments, applying (1616) the effect to at least one message region other than the first message region includes temporarily highlighting (1632) the first message region without highlighting message regions other than the first message region. For example, in a "balloons" full screen effect, the first message region would be highlighted while the balloons are displayed, without highlighting (or fading) the other message regions in the displayed conversation transcript.

In some embodiments, the enhanced message content includes sound (1634). For example, in some embodiments, the sound is played in coordination with the displayed enhanced message content.

In some embodiments, the enhanced message content includes tactile output (1636). For example, the tactile output may be haptic effects output in coordination with the displayed enhanced message content.

In some embodiments, displaying (1616) the enhanced message content includes displaying (1638) an animation of the first message region. In some embodiments, when displaying the animation, the first message region disappears and subsequently reappears. In some embodiments, the first message region size and/or first message text size changes during the animation.

In some embodiments, displaying (1616) the enhanced message content includes generating and displaying (1640) moving virtual objects in response to scrolling of the conversation transcript. For example, this may be implemented by generating and displaying hearts or sparkles coming off of the first message region as the transcript moves.

In some embodiments, method 1600 includes ceasing (1644) to display the enhanced message content that corresponds to the trigger. For example, the ceasing to display the enhanced message content occurs in response to user input, or after the enhanced message content has been displayed for a predetermined period of time.

Figure 17:
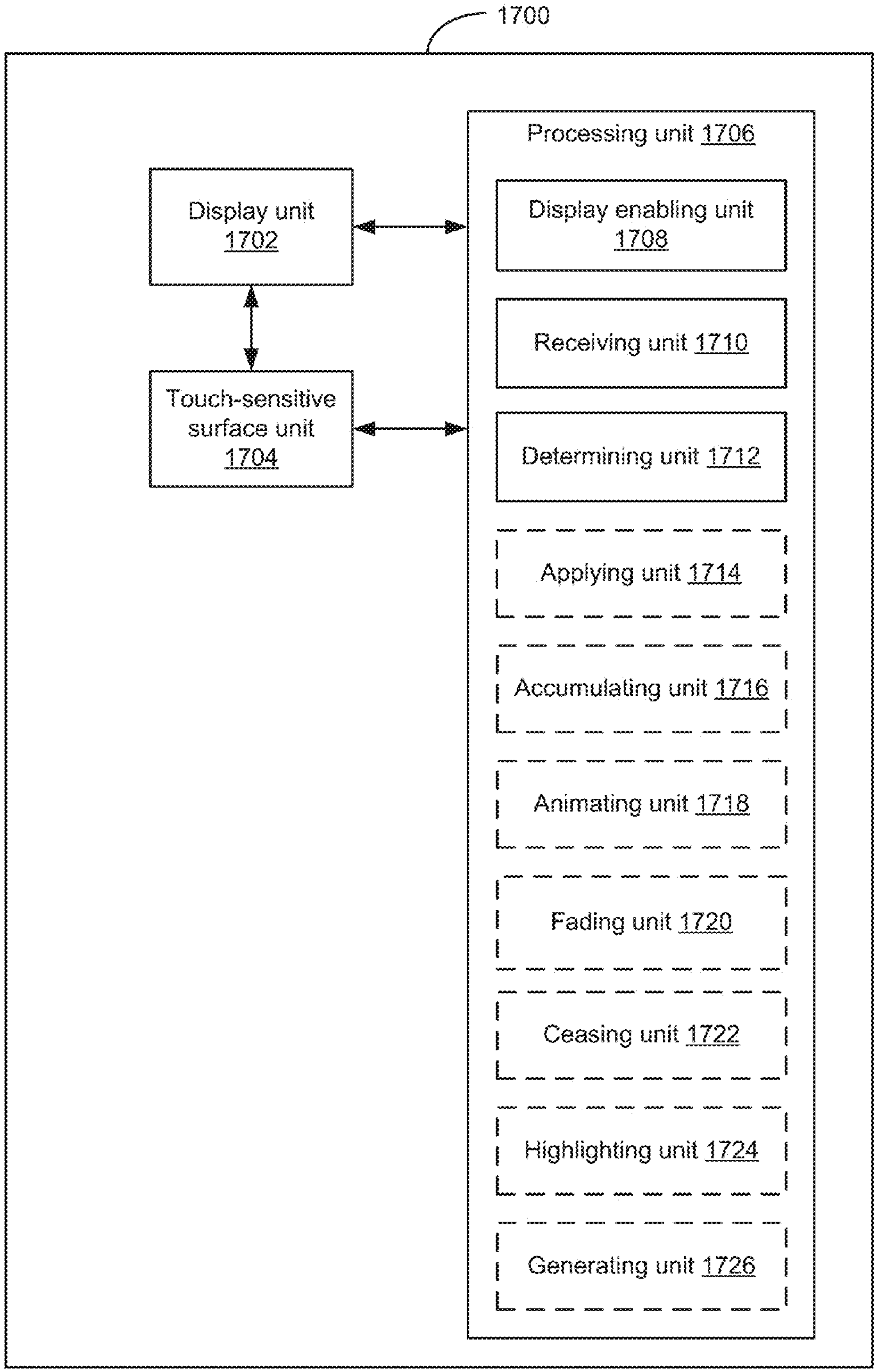
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a messaging user interface on the display unit, the messaging user interface including a conversation transcript of a messaging session between a user of the electronic device and at least one other user, including a first other user; a touch-sensitive surface unit 1704 configured to detect contacts; and a processing unit 1706 coupled to the display unit 1702 and the touch-sensitive surface unit 1704. In some embodiments, the processing unit includes display enabling unit 1708, receiving unit 1710, determining unit 1712, applying unit 1714, accumulating unit 1716, animating unit 1718, fading unit 1720, ceasing unit 1722, highlighting unit 1724, and generating unit 1726.

The processing unit 1706 is configured to: receive a first message within the messaging session from an electronic device that corresponds to the first other user included in the messaging session (e.g., with the receiving unit 1710) and determine whether the first message includes an enhanced message content trigger (e.g., with the determining unit 1712). The processing unit 1706 is further configured to, in accordance with a determination that the first message includes the enhanced message content trigger, display the first message in a first message region in the conversation transcript on the display unit 1702 (e.g., with the display enabling unit 1708) and display enhanced message content that corresponds to the trigger, where the enhanced message content includes content that applies an effect to at least one message region other than the first message region in the conversation transcript (e.g., with the display enabling unit 1708). The processing unit 1706 is further configured to, in accordance with a determination that the first message does not include the enhanced message content trigger, display the first message in a first message region in the conversation transcript on the display unit 1702 (e.g., with the display enabling unit 1708).

In some embodiments, the determination whether the first message includes the enhanced message content trigger is performed in response to receiving the first message (e.g., with the determining unit 1712).

In some embodiments, determining whether the first message includes an enhanced message content trigger includes determining whether the first message includes predefined text (e.g., with the determining unit 1712).

In some embodiments, determining whether the first message includes an enhanced message content trigger includes determining whether the first message includes an embedded non-displayed value that indicates the enhanced message content to be displayed (e.g., with the determining unit 1712).

In some embodiments, determining whether the first message includes an enhanced message content trigger includes determining whether a time at which the first message was received corresponds to a predetermined time frame (e.g., with the determining unit 1712).

In some embodiments, the enhanced message content includes content that applies an effect to the entire displayed conversation transcript (e.g., with the applying unit 1714).

In some embodiments, applying the effect to at least one message region other than the first message region includes accumulating animated objects on at least one message region other than the first message region (e.g., with the accumulating unit 1716).

In some embodiments, applying the effect to at least one message region other than the first message region includes animating at least one message region other than the first message region (e.g., with animating unit 1718).

In some embodiments, applying the effect to at least one message region other than the first message region includes temporarily fading message regions other than the first message region without fading the first message region (e.g., with the fading unit 1720).

In some embodiments, applying the effect to at least one message region other than the first message region includes temporarily ceasing to display message regions other than the first message region while maintaining display of the first message region (e.g., with the ceasing unit 1722).

In some embodiments, displaying the enhanced message content that corresponds to the trigger includes displaying an image that temporarily replaces the entire messaging user interface (e.g., with the display enabling unit 1708).

In some embodiments, displaying the enhanced message content that corresponds to the trigger includes displaying an image that temporarily replaces the entire messaging user interface, except for the first message region (e.g., with the display enabling unit 1708).

In some embodiments, applying the effect to at least one message region other than the first message region includes temporarily highlighting the first message region without highlighting message regions other than the first message region (e.g., with the highlighting unit 1724).

In some embodiments, the enhanced message content includes sound.

In some embodiments, the enhanced message content includes tactile output.

In some embodiments, displaying the enhanced message content includes displaying an animation of the first message region (e.g., with the display enabling unit 1708).

In some embodiments, displaying the enhanced message content includes generating and displaying moving virtual objects in response to scrolling of the conversation transcript (e.g., with the generating unit 1726 and the display enabling unit 1708).

In some embodiments, the processing unit 1706 is further configured to cease to display the enhanced message content that corresponds to the trigger (e.g., with the ceasing unit.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 16A-16C are, optionally, implemented by components depicted in FIGS. 1A-1B or FIG. 17. For example, display operations 1602, 1616, 1618, 1620, 1622, 1624, 1626, 1628, 1630, 1632, 1638, 1640, 1642, and 1644, receiving operation 1604, determining operations 1606, 1608, 1610, 1612, and 1614, audio output operation 1634, and tactile output operation 1636 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Detecting and Responding to Combinable Content in Separate Messages

Figure 18A:
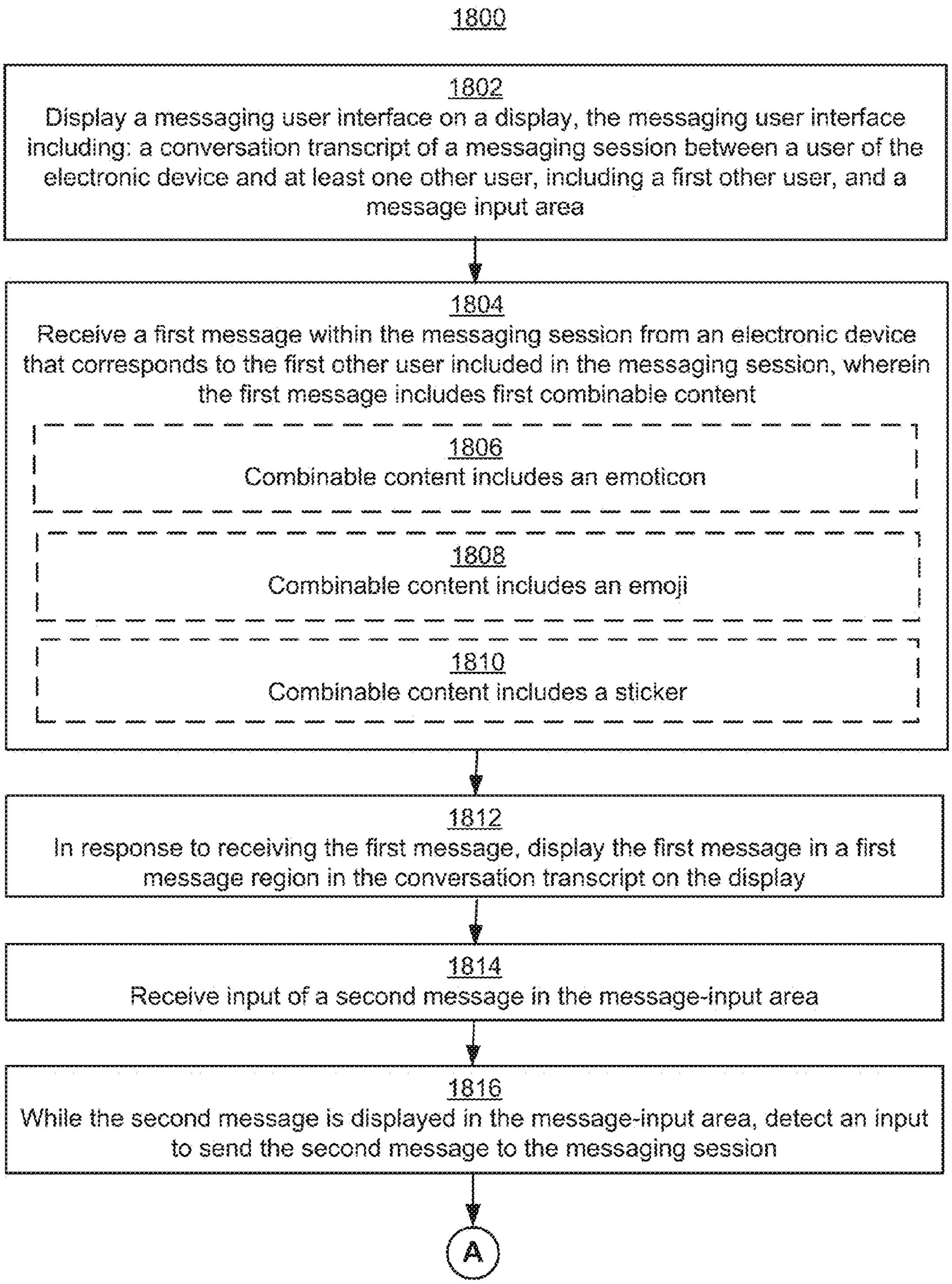
Figure 18C:
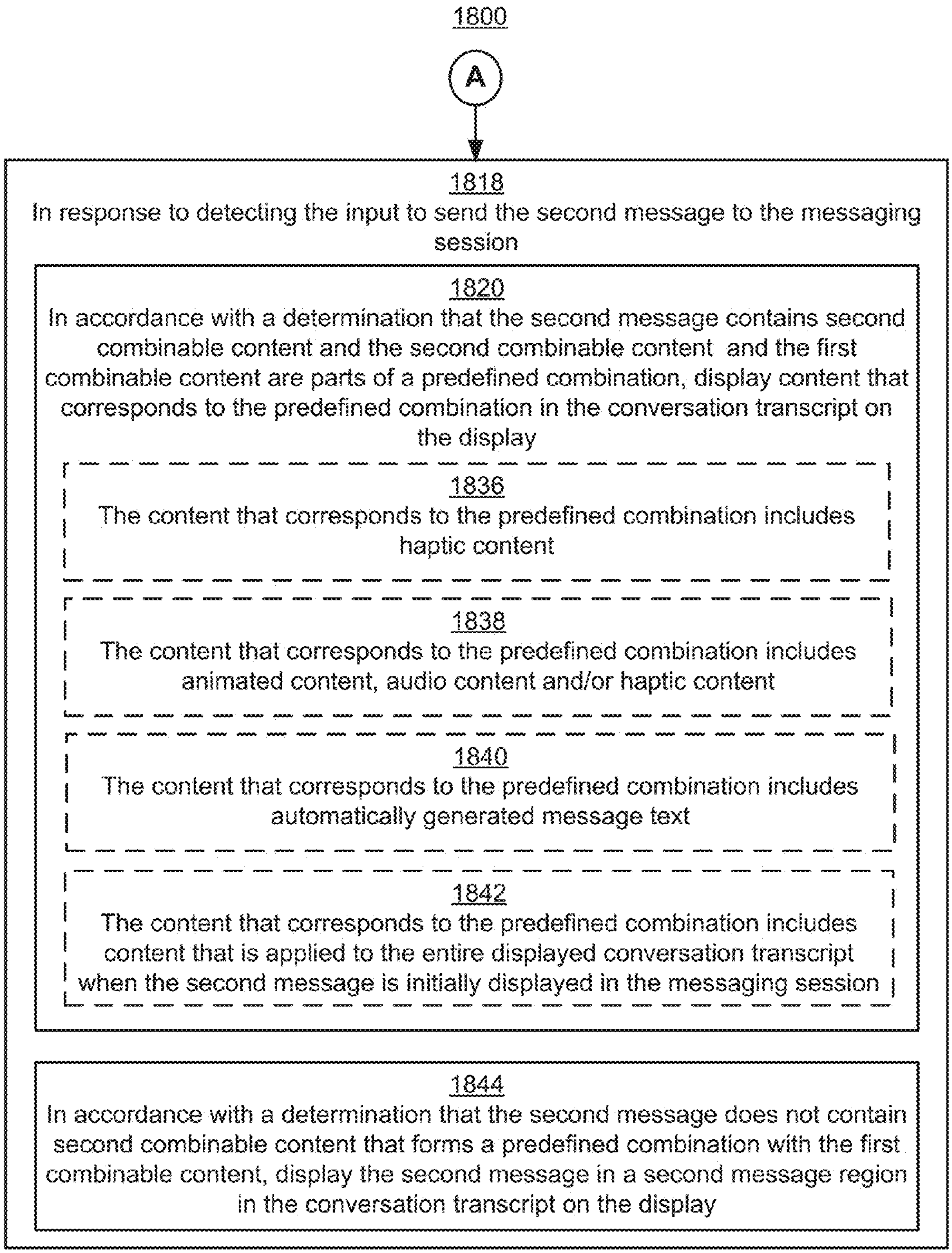

FIGS. 18A-18C, described in more detail below, relate generally to methods for detecting combinable content in a messaging user interface. More specifically, these figures relate to methods for displaying content corresponding to a predetermined combination when the detected combinable content form the predetermined combination.

One or more examples of an electronic device (e.g., portable multifunction device 100 or device 300) implementing this method are shown in FIGS. 5CX-5DC.

FIGS. 18A-18C are flow diagrams illustrating a method 1800, performed by an electronic device, sometimes herein called a first electronic device, having one or more processors, memory, a touch-sensitive surface, and a display. In some embodiments, the electronic device includes one or more sensors (e.g., sensors in a touch-screen display or trackpad) configured to detect intensities of contacts on the touch-sensitive surface.

In accordance with some embodiments, method 1800 includes displaying (1802) a messaging user interface (e.g., user interface 5002, as shown in FIG. 5BH, of a messaging application) on the display. The messaging user interface includes a conversation transcript (e.g., conversation transcript 5004 in user interface 5002, FIG. 5CX) of a messaging session between a user of the electronic device and at least one other user (e.g., a user of another electronic device) including a first other user, and a message input area (e.g., message input area 5100, FIG. 5CX).

Method 1800 further includes receiving (1804) a first message (e.g., message 5170, in message region 5008, FIG. 5CX) within the messaging session from an electronic device (e.g., a second electronic device) that corresponds to the first other user included in the messaging session, wherein the first message includes first combinable content (e.g., an emoticon or an image such as an emoji or a sticker), and in response to receiving the first message, displaying (1812) the first message in a first message region in the conversation transcript on the display (for example, as shown in FIG. 5CX). In some embodiments, the combinable content includes (1806) an emoticon. In some embodiments, the combinable content includes (1808) an emoji. In some embodiments, the combinable content includes (1810) a sticker.

Method 1800 continues with receiving (1814) input of a second message in the message-input area (e.g., second message 5172 in message input area 5100, as shown in FIG. 5CY), and while the second message is displayed in the message-input area, detecting (1816) an input (e.g., 5174, FIG. 5CY) to send the second message to the messaging session (e.g., detecting a tap gesture on a send icon, 5118, FIG. 5CY).

Further, method 1800 includes, in response (1818) to detecting the input to send the second message to the messaging session: in accordance with a determination that the second message contains second combinable content, and the second combinable content and the first combinable content are parts (e.g., complementary parts) of a predefined combination, displaying (1820) content that corresponds to the predefined combination in the conversation transcript on the display. For example, the content corresponding to the predefined combination is displayed in a second message region, or an area between message regions having messages from the user of the device and message regions with messages from the at least one other user. In some embodiments, content corresponding to the predefined combination is briefly applied to the entire displayed conversation transcript when the second message is initially displayed in the messaging session.

Further, in accordance with a determination that the second message does not contain second combinable content that forms a predefined combination with the first combinable content, displaying (1844) the second message in a second message region in the conversation transcript on the display (i.e., without displaying content that corresponds to a predefined combination).

In some embodiments, the determination (1820) that the second combinable content and the first combinable content are parts of a predefined combination is performed (1822) in response to detecting the input (e.g., 5174, FIG. 5CY) to send the second message to the messaging session (e.g., in response to detecting a tap gesture on a send icon, 5118, FIG. 5CY).

In some embodiments, or in some circumstances, the first combinable content and the second combinable content that are part of a predefined combination are the same content (1824). For example, a first word or emoji for beer in a first message (5170, FIG. 5CZ) and a second, same word or emoji for beer in a second message (5172, FIG. 5CZ) result in display of content (e.g., content 5176, FIG. 5DA) that corresponds to the predefined combination, such as an animation of two beer glasses being clicked together (as shown in FIG. 5DA) and/or display of the word "Cheers!" (as shown in FIG. 5DA). In some embodiments, the content that corresponds to the predefined combination is displayed in a portion of the messaging user interface (e.g., messaging user interface 5002) between the first and second messages (e.g., between message regions 5008 for first message 5170 and second message 5172, FIG. 5DA). In another example, a first first emoji in the first message and a second first emoji in the second message result in display of content that corresponds to the predefined combination, such as an animation of two fists bumping together.

In some embodiments, or in some circumstances, the first combinable content and the second combinable content that are part of a predefined combination are different content (1826). For example, a word or emoji for lightning and a word or emoji for key result in display of content that corresponds to a predefined combination, such as an emoji or sticker representing electricity, such as a light bulb. In another example, an emoji for an apple and the word or symbol (e.g., "π") for the number pi result in display of content that corresponds to a predefined combination, such as an emoji or sticker for an apple pie. In yet another example, the word "Happy" in a first message and the word "Birthday" in a second message result in a display of balloons in a portion of the messaging user interface between the first message and second message or in the entire messaging user interface, for example as shown in FIGS. 5CB, 5CC and 5CJ-5CO.

Optionally, users can define combinations of content that are the aforementioned predefined combinations, and/or they can define the content that corresponds to any such combination. More specifically, in some embodiments, or in some circumstances, respective first combinable content and respective second combinable content that are part of a respective predefined combination are defined (1828) by a user of the electronic device. For example, in some embodiments, the predefined combinations are defined by a user of the device or by users in a messaging session. Similarly, in some embodiments, or in some circumstances, the content that corresponds to the predefined combination is defined by a user of the device (1830). For example, in some embodiments, the content that corresponds to the predefined combination is defined by a user of the device or by users in a messaging session.

A variety of content can be included in or used as the content that corresponds to the predefined combination. More specifically, in some embodiments, the content that corresponds to the predefined combination includes animated content (1832), examples of which are balloons or confetti that move through the messaging user interface or a portion of the messaging user interface. In some embodiments, the content that corresponds to the predefined combination includes audio content (1834), such as music, or one or more tones, or recorded or synthesized speech. In some embodiments, the content that corresponds to the predefined combination includes haptic content (1836), such as a vibration or vibration pattern. Thus, in some embodiments, the content that corresponds to the predefined combination includes animated content, audio content and/or haptic content (1838).

Further, in some embodiments, the content that corresponds to the predefined combination includes (1840) automatically generated message text. For example, in the above described example, with a first word or emoji for beer in a first message (5170, FIG. 5CZ) and a second, same word or emoji for beer in a second message (5172, FIG. 5CZ), the first electronic device automatically generates message text, such as "Cheers!", in a message region.

In some embodiments, the content that corresponds to the predefined combination includes (1842) content that is applied to the entire displayed conversation transcript when the second message is initially displayed in the messaging session. For example, content in a "full-screen moment," such as displaying a "fireworks" full screen effect in response to a first message, "Happy," and a second message, "New Year," as shown in FIGS. 5CR-5CT, or displaying a "balloons" full screen effect in response to a first message, "Happy," and a second message, "Birthday," as shown in FIGS. 5CJ-5CO.

Figure 19:
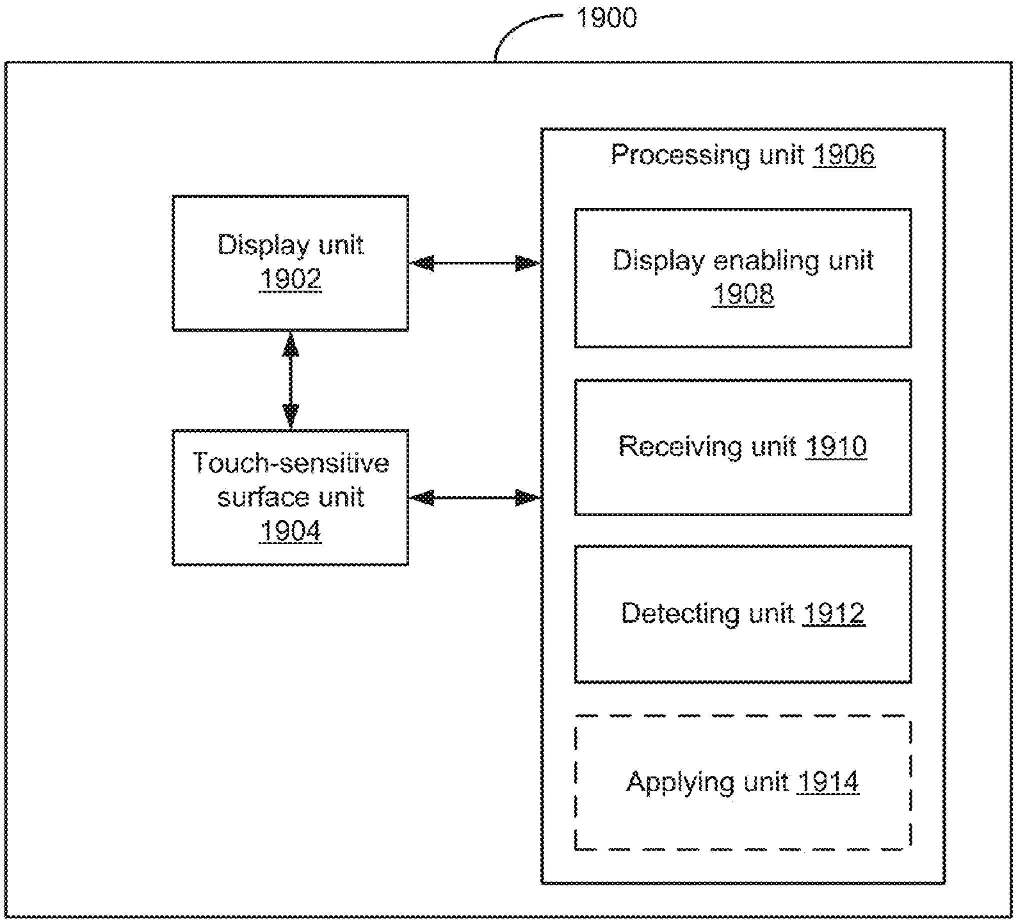
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a messaging user interface on the display unit, the messaging user interface including a conversation transcript of a messaging session between a user of the electronic device and at least one other user, including a first other user, and a message input area; a touch-sensitive surface unit 1904 configured to detect contacts; and a processing unit 1906 coupled to the display unit 1902 and the touch-sensitive surface unit 1904. In some embodiments, the processing unit includes display enabling unit 1908, receiving unit 1910, detecting unit 1912, and applying unit 1914, The processing unit 1906 is configured to: receive a first message within the messaging session from an electronic device that corresponds to the first other user included in the messaging session, where the first message includes first combinable content (e.g., with the receiving unit 1910) and in response to receiving the first message, display the first message in a first message region in the conversation transcript on the display unit 1902 (e.g., with the display enabling unit 1908). Processing unit 1906 is further configured to receive input of a second message in the message-input area (e.g., with the receiving unit 1910). Processing unit 1906 is further configured to, while the second message is displayed in the message-input area, detect an input to send the second message to the messaging session (e.g., with the detecting unit 1912) and, in response to detecting the input to send the second message to the messaging session: in accordance with a determination that the second message contains second combinable content and the second combinable content and the first combinable content are parts of a predefined combination, display content that corresponds to the predefined combination in the conversation transcript on the display unit 1902 (e.g., with the display enabling unit 1908) and, in accordance with a determination that the second message does not contain second combinable content that forms a predefined combination with the first combinable content, display the second message in a second message region in the conversation transcript on the display unit 1902 (e.g., with the display enabling unit 1908).

In some embodiments, the determination that the second combinable content and the first combinable content are parts of a predefined combination is performed in response to detecting the input to send the second message to the messaging session (e.g., with the detecting unit 1912).

In some embodiments, the combinable content includes an emoticon.

In some embodiments, the combinable content includes an emoji.

In some embodiments, the combinable content includes a sticker.

In some embodiments, the first combinable content and the second combinable content that are part of a predefined combination are the same content.

In some embodiments, the first combinable content and the second combinable content that are part of a predefined combination are different content.

In some embodiments, respective first combinable content and respective second combinable content that are part of a respective predefined combination are defined by a user of the electronic device 1900.

In some embodiments, for a respective predefined combination, the content that corresponds to the predefined combination is defined by a user of the device 1900.

In some embodiments, the content that corresponds to the predefined combination includes animated content.

In some embodiments, the content that corresponds to the predefined combination includes audio content.

In some embodiments, the content that corresponds to the predefined combination includes haptic content.

In some embodiments, the content that corresponds to the predefined combination includes animated content, audio content and/or haptic content.

In some embodiments, the content that corresponds to the predefined combination includes automatically generated message text.

In some embodiments, the content that corresponds to the predefined combination includes content that is applied to the entire displayed conversation transcript when the second message is initially displayed in the messaging session (e.g., with the applying unit 1914).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18C are, optionally, implemented by components depicted in FIGS. 1A-1B or FIG. 19. For example, displaying operations 1802, 1812, 1822, 1824, 1826, 1828, 1830, 1832, 1834, 1836, 1838, 1840, 1842, and 1844, receiving operations 1804, 1806, 1808, 1810, and 1814, detecting operation 1816, and applying operation 1842 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Synchronized Media Content

Figure 20A:
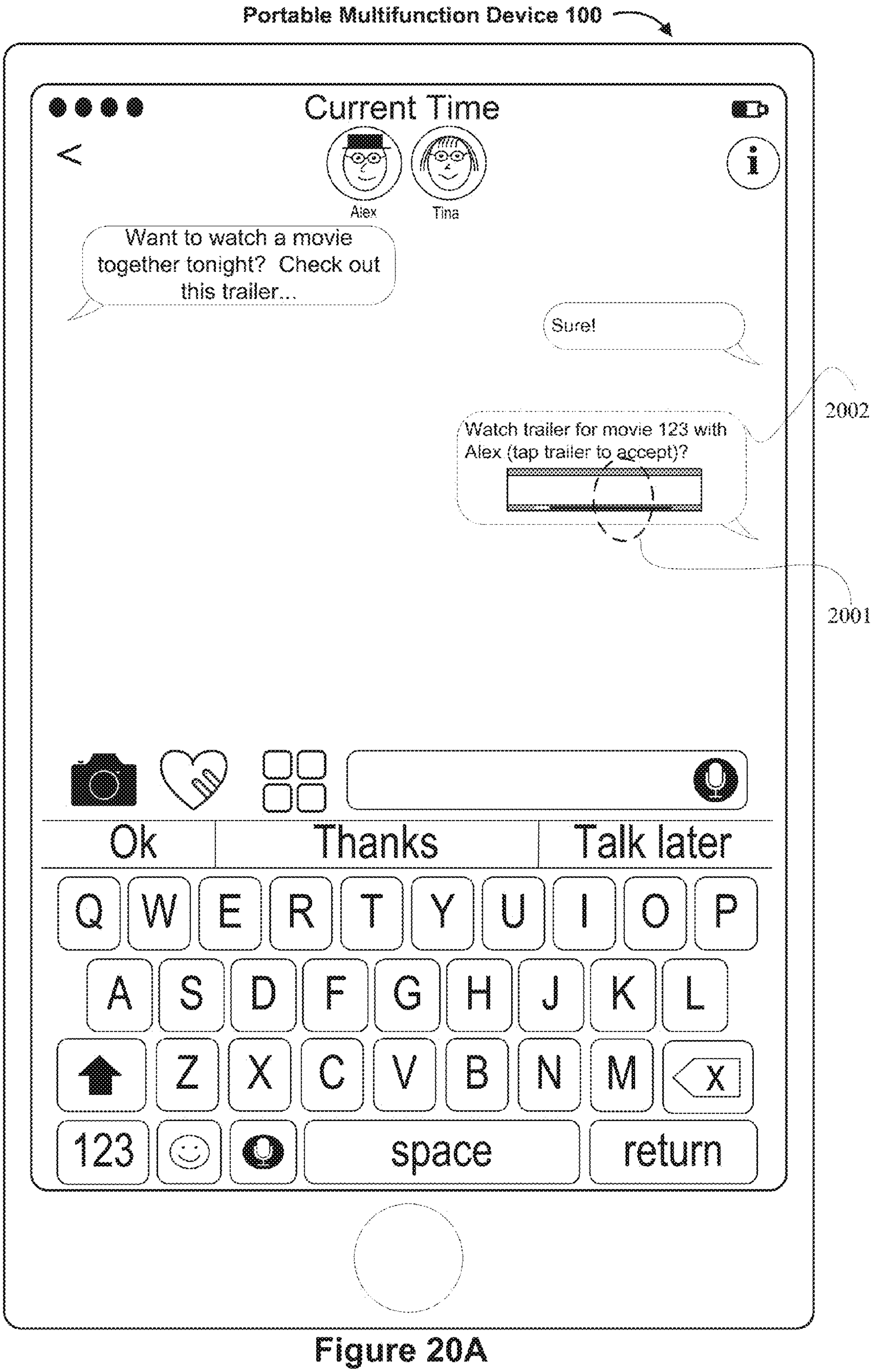
FIGS. 20A-20P illustrate example user interfaces for presenting synchronized media content (e.g., audio content and/or video content) in a messaging application, in accordance with some embodiments.
Figure 20B:
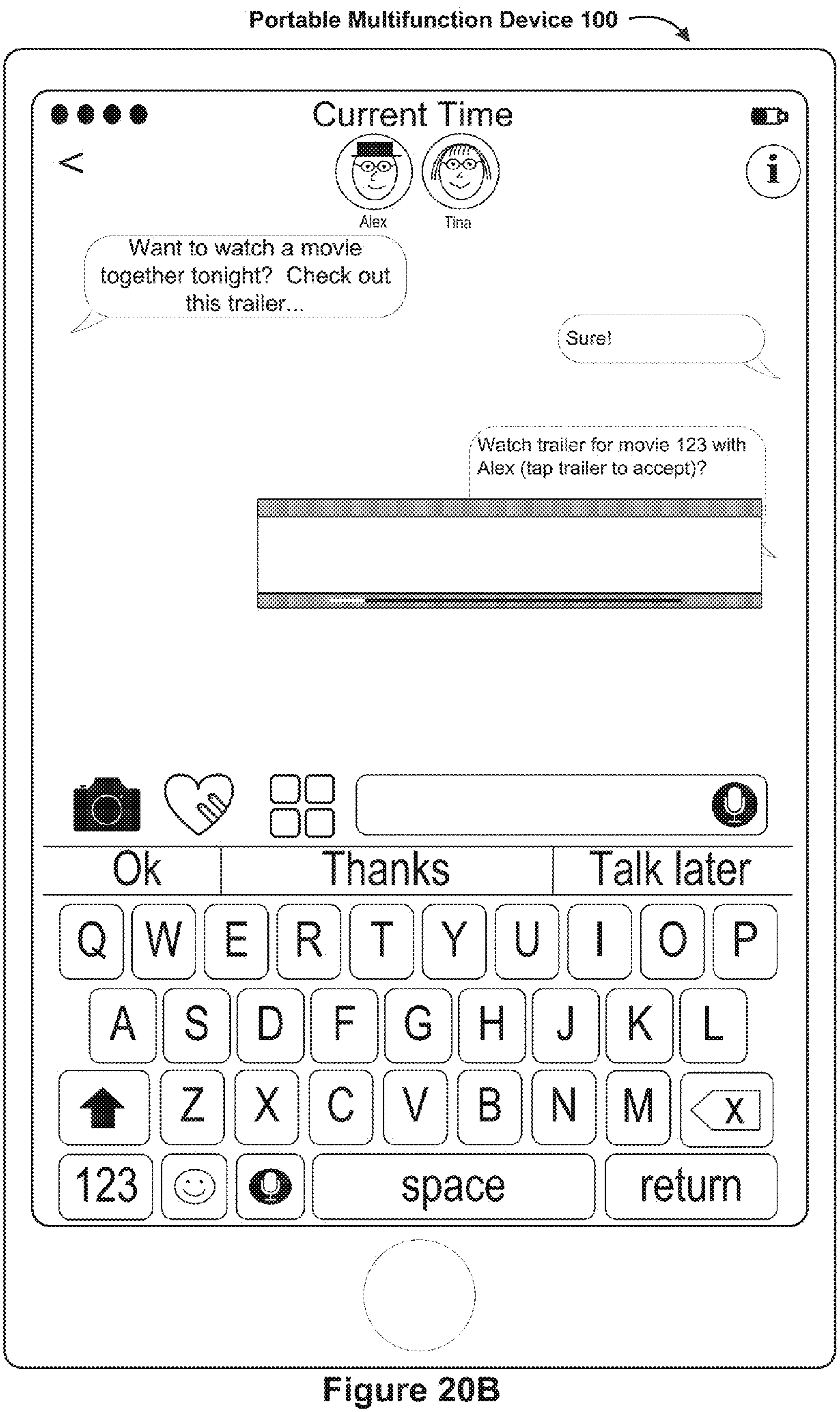
Figure 20C:
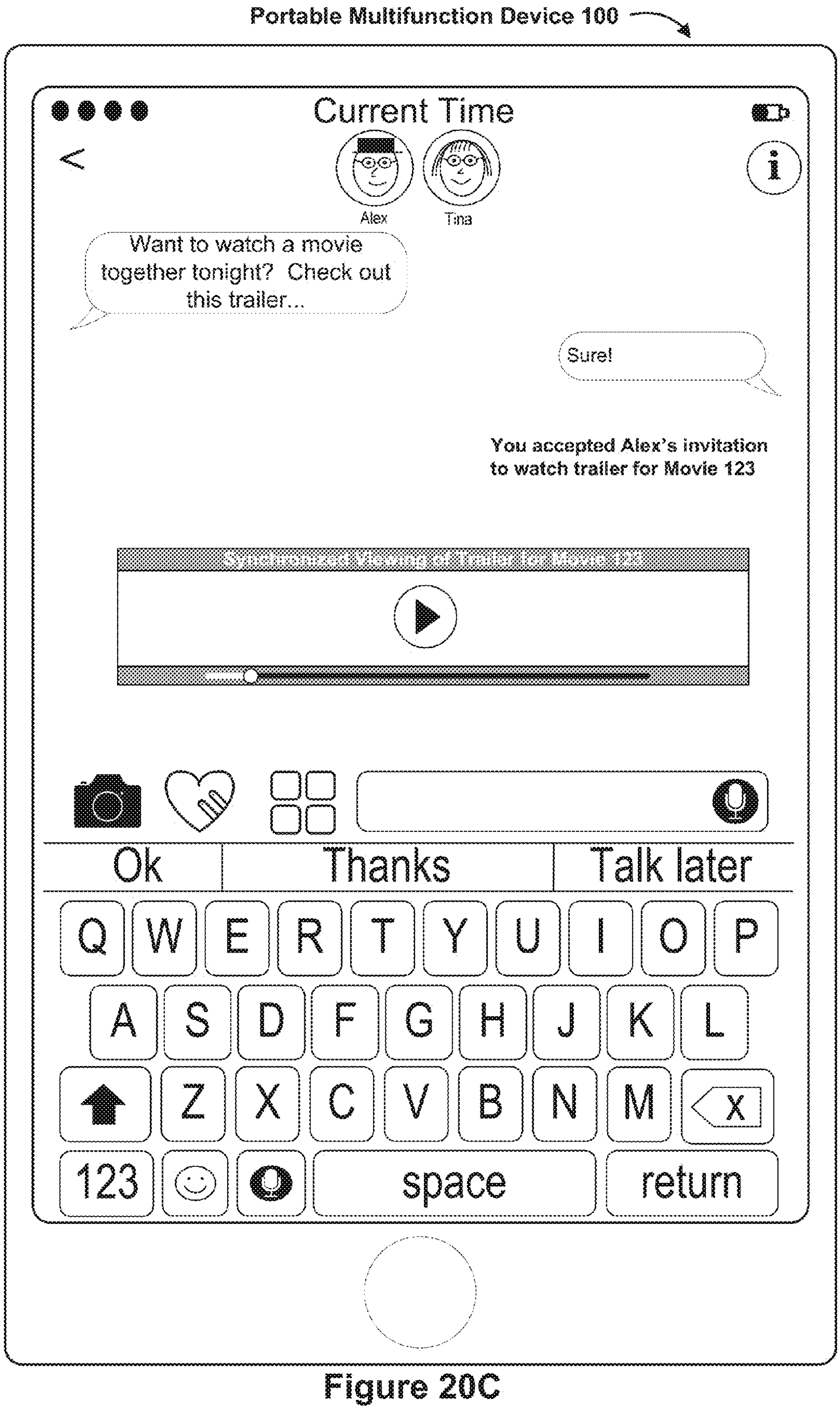
Figure 20D:
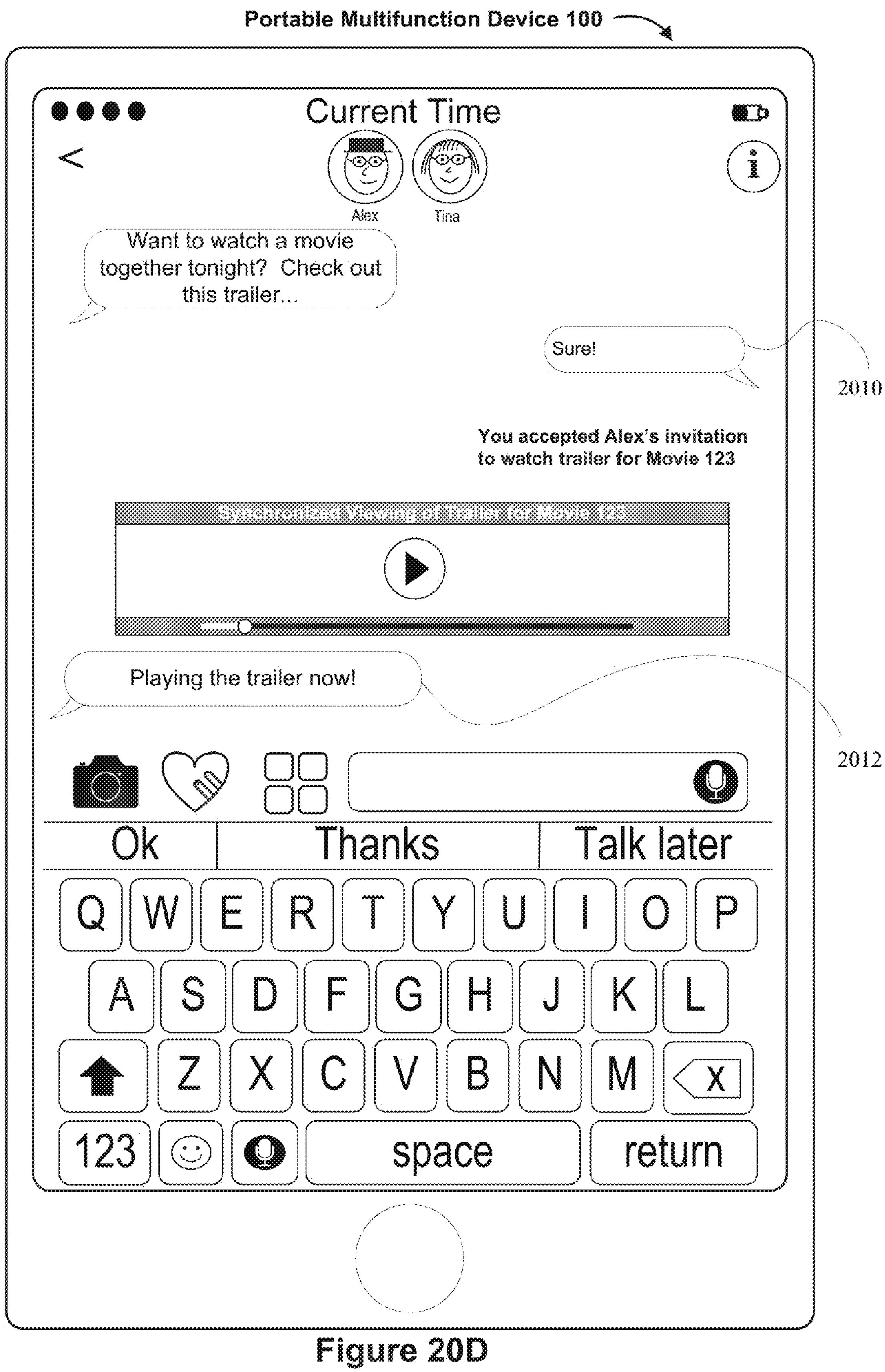
Figure 20E:
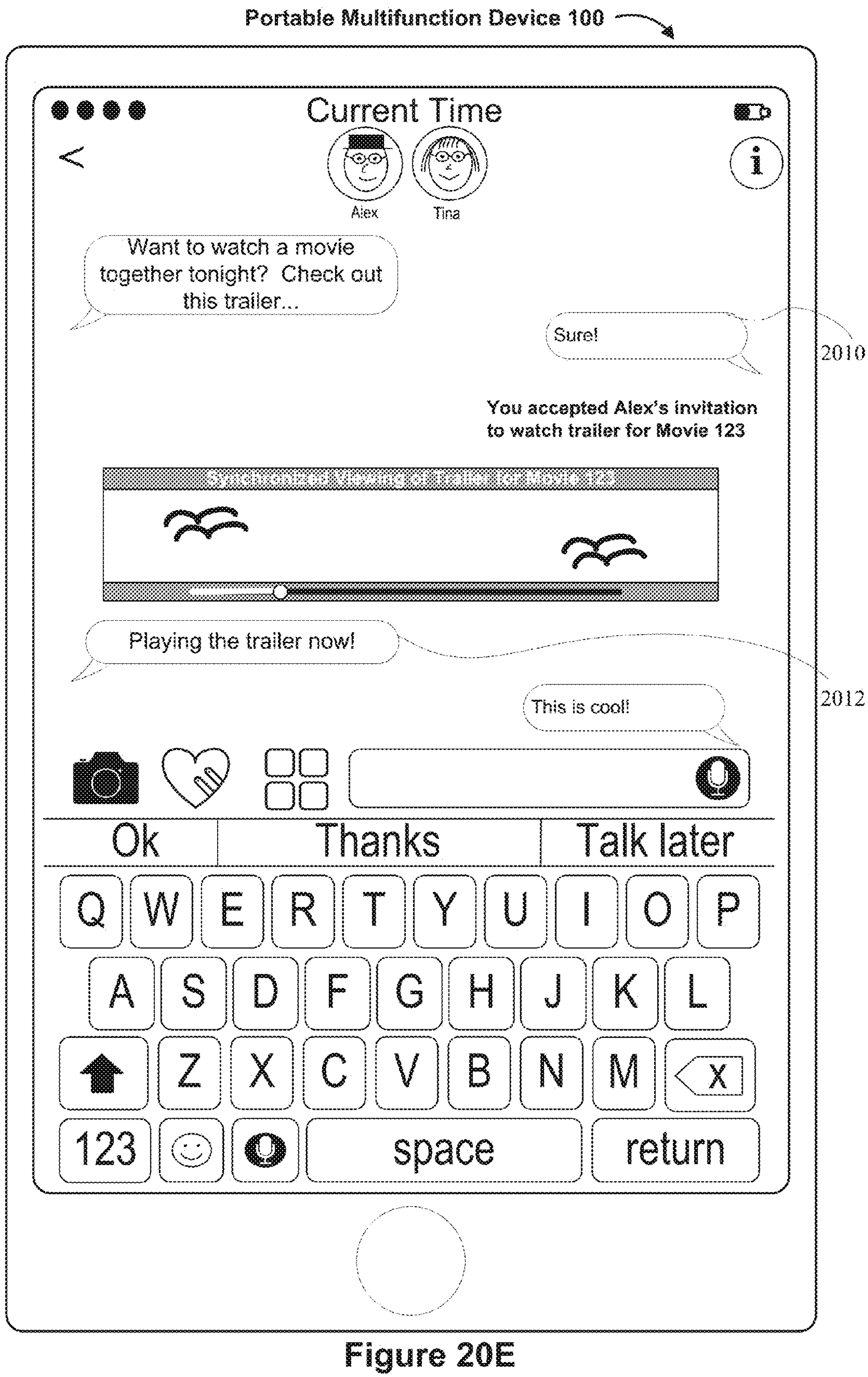
Figure 20F:
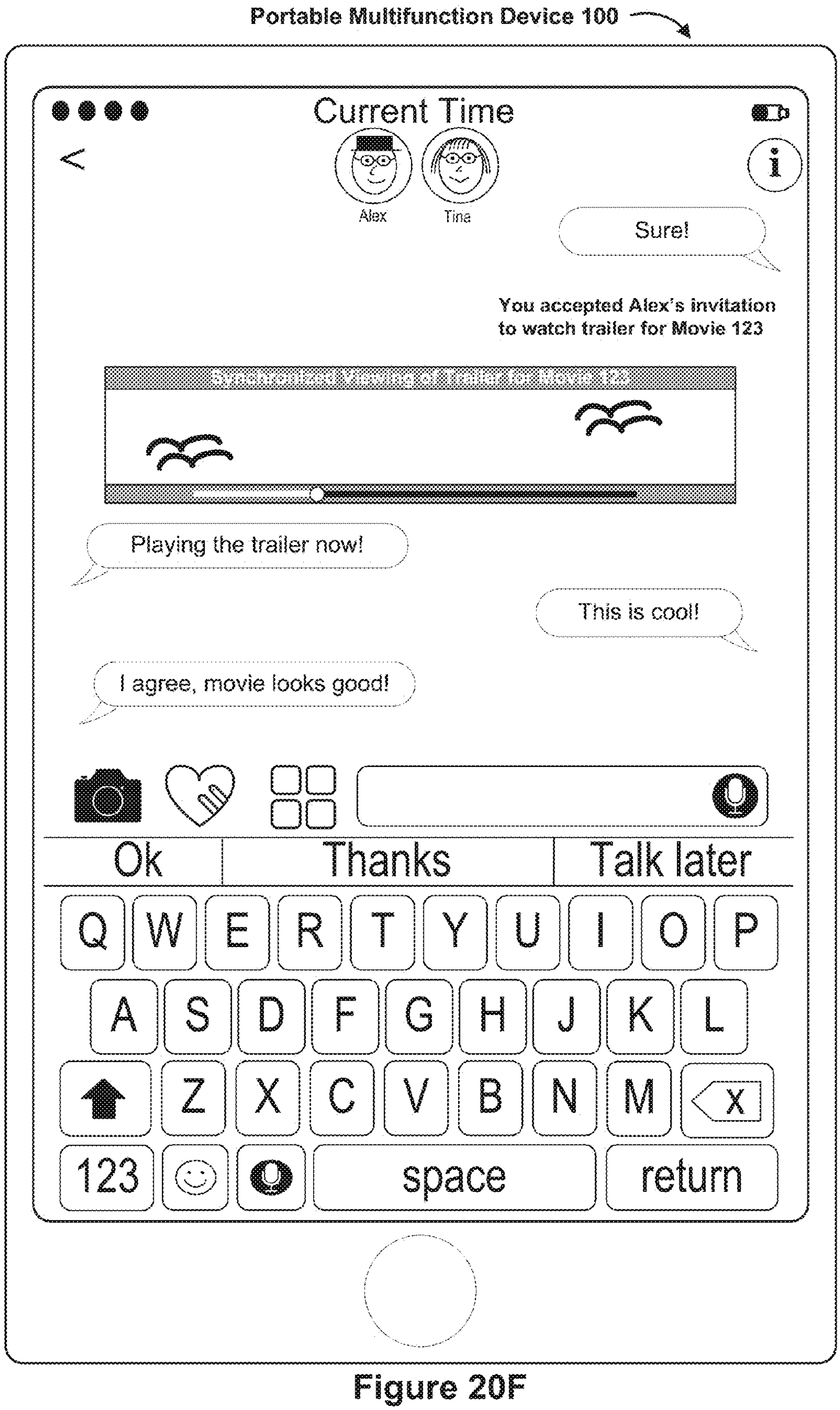
Figure 20G:
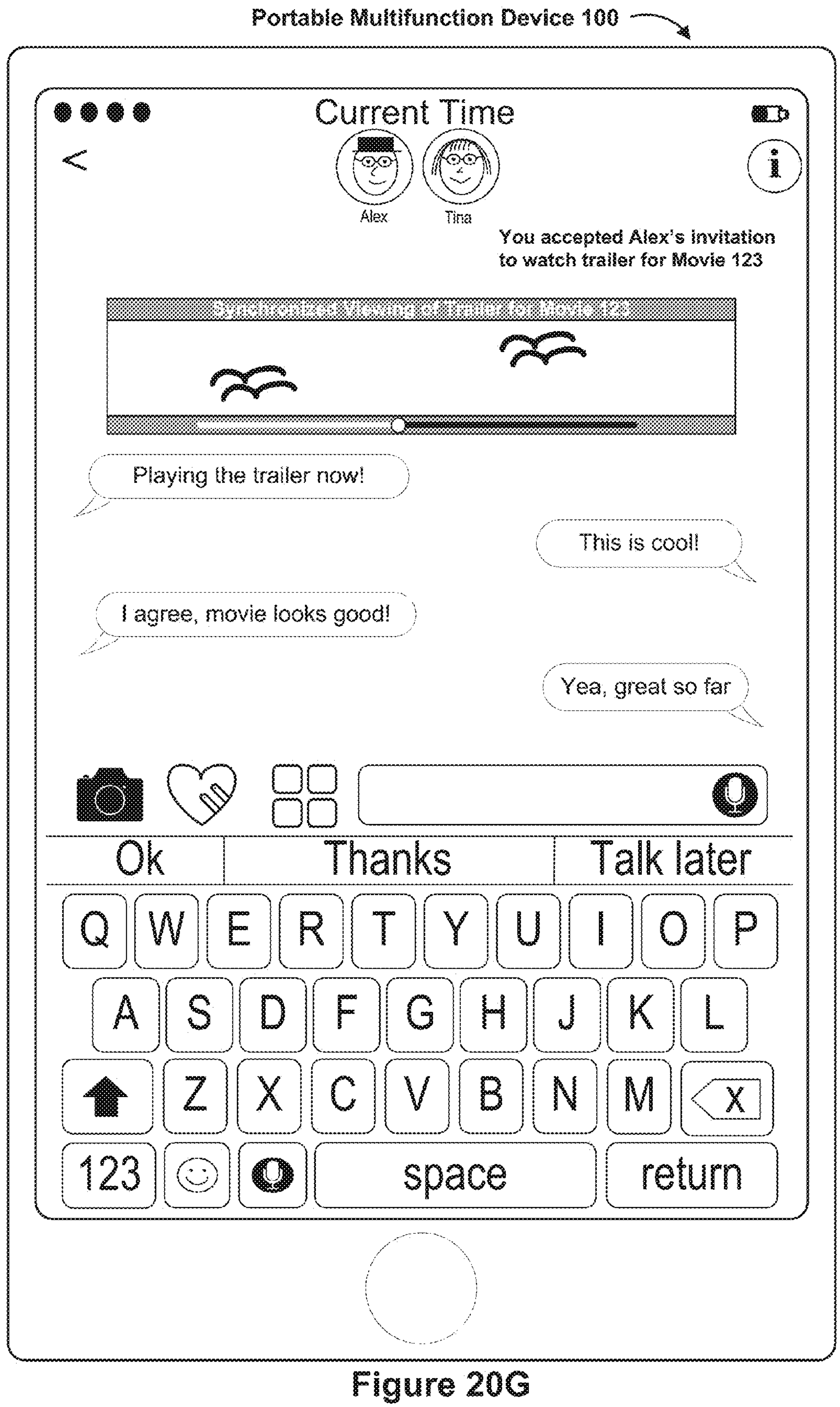
Figure 20H:
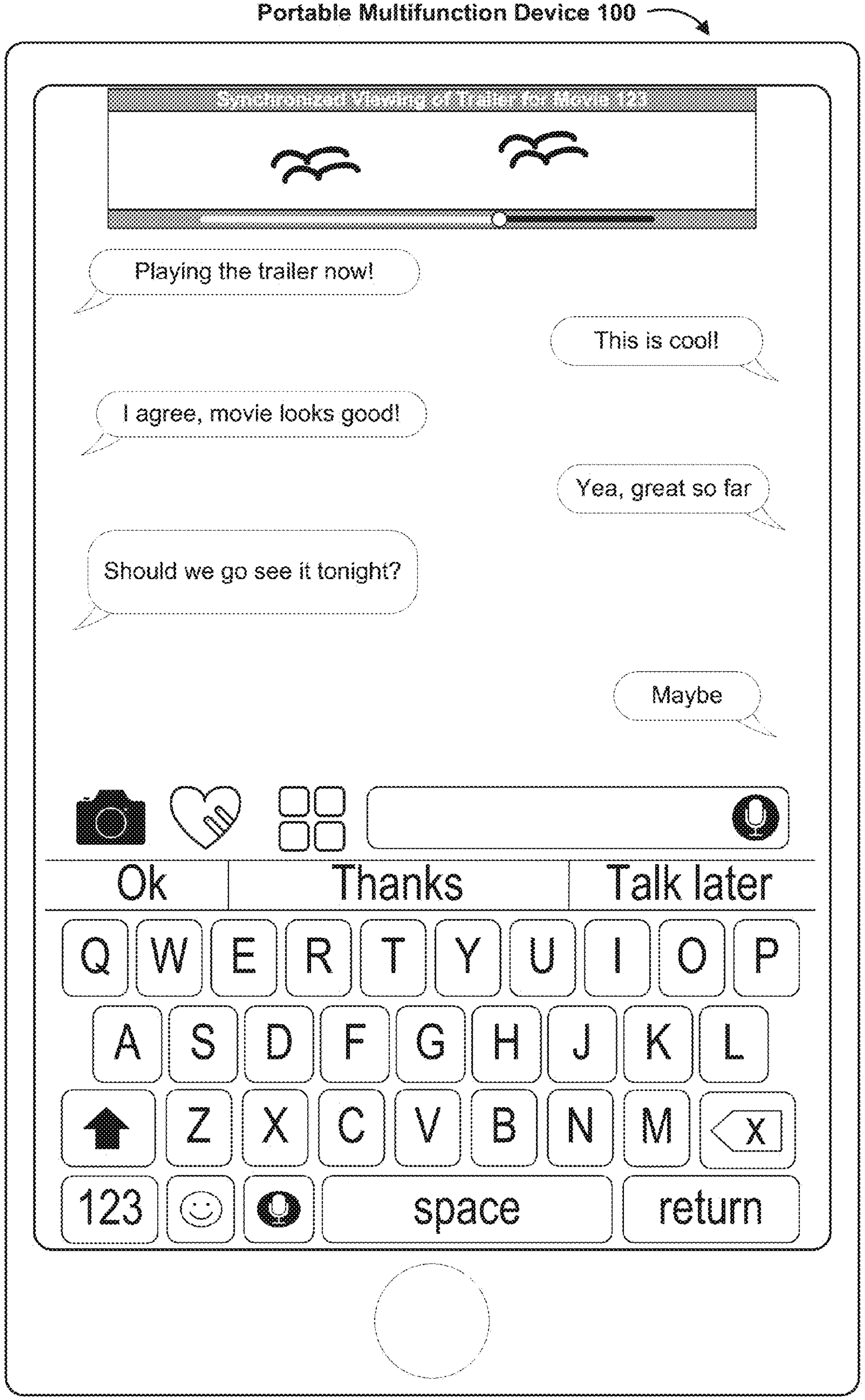
Figure 20I:
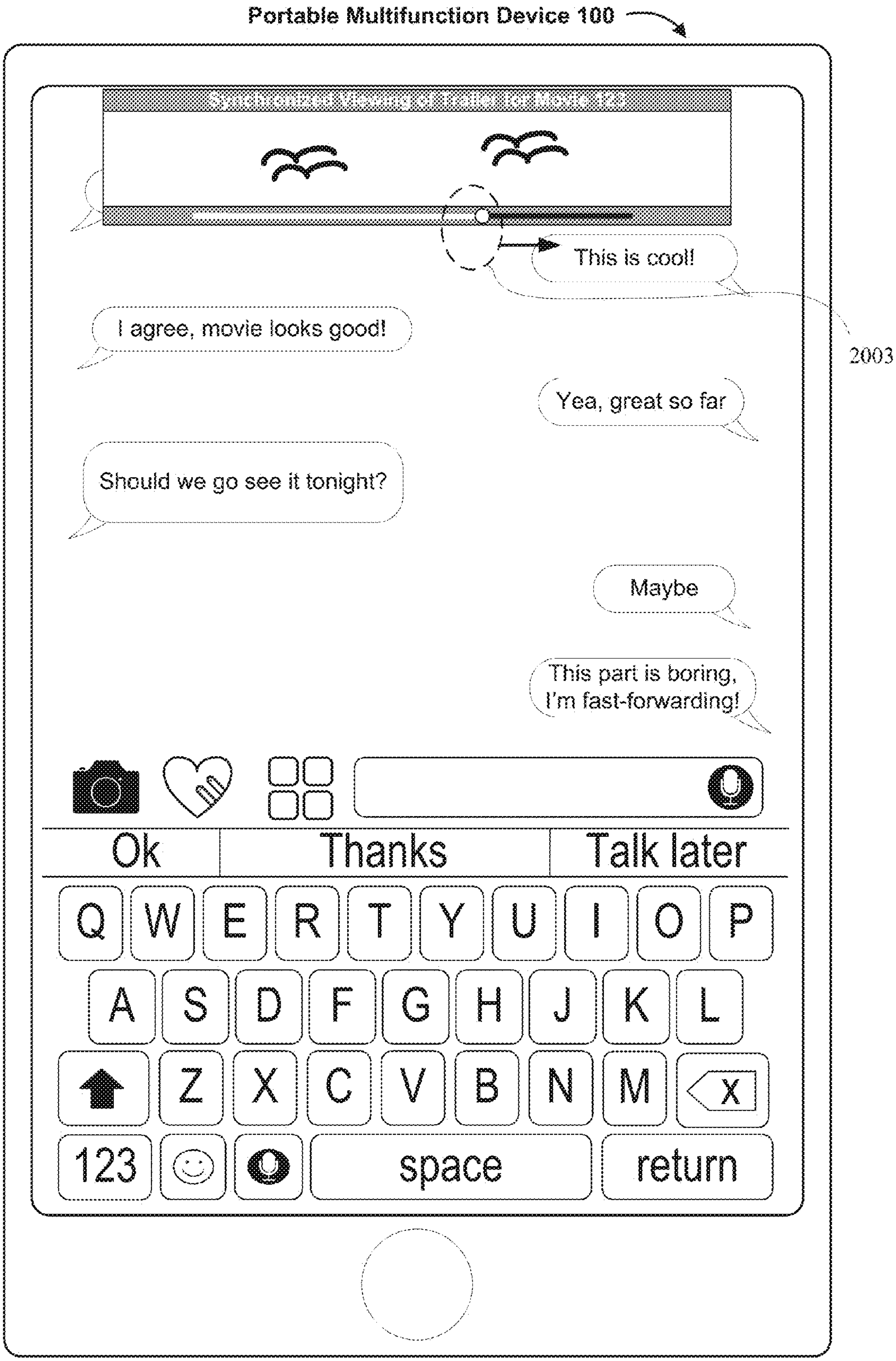
Figure 20J:
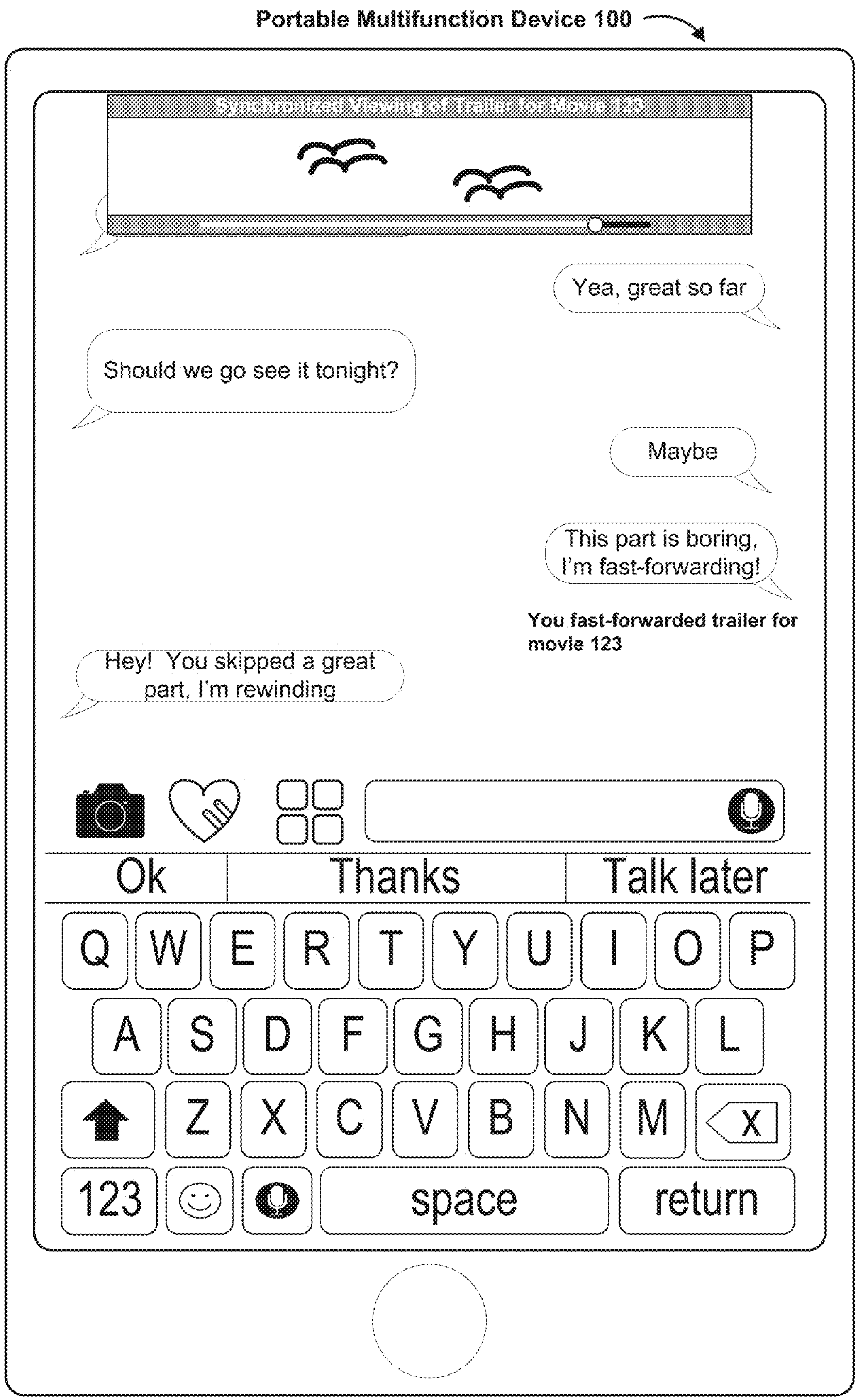
Figure 20K:
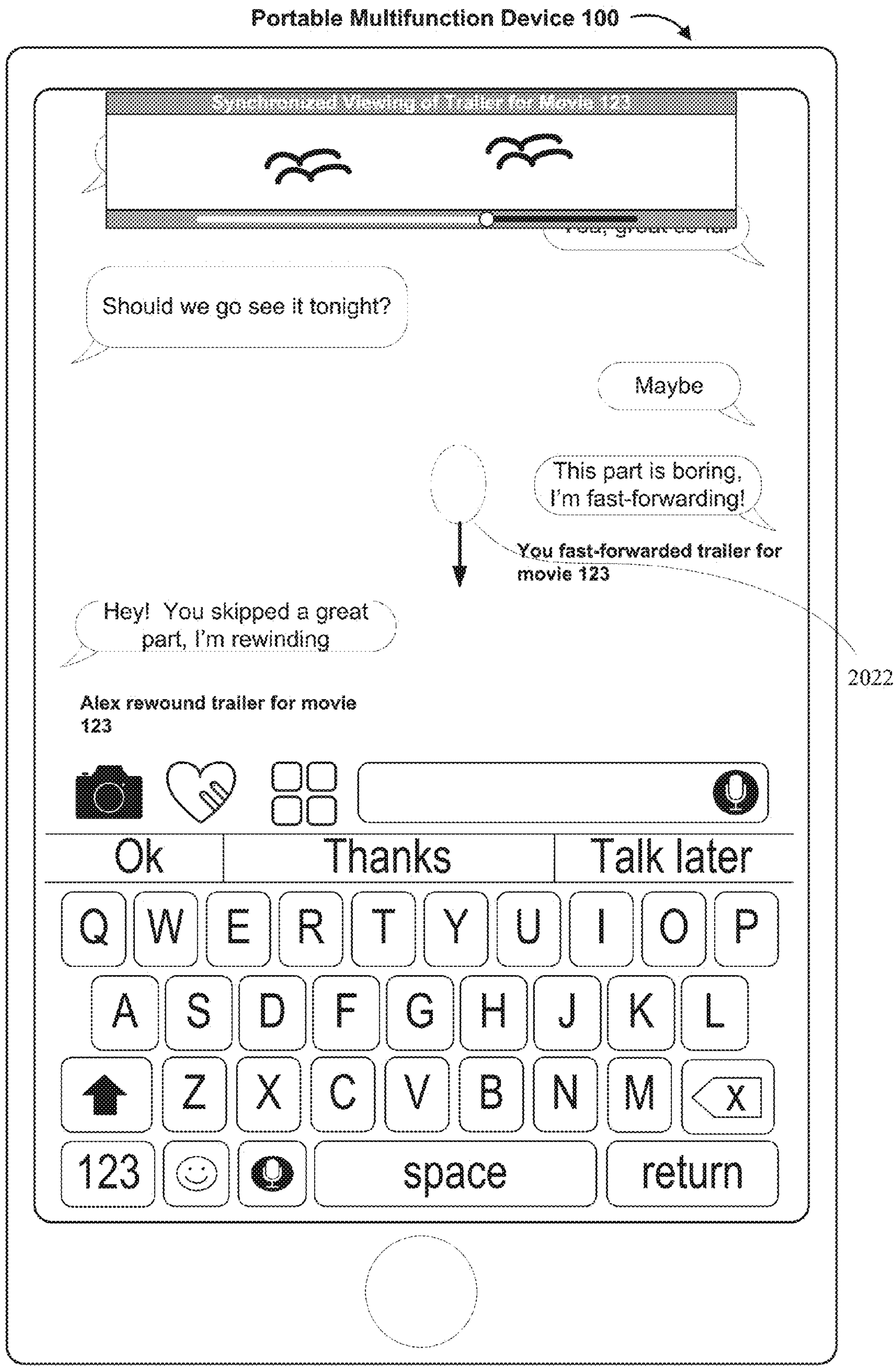
Figure 20L:
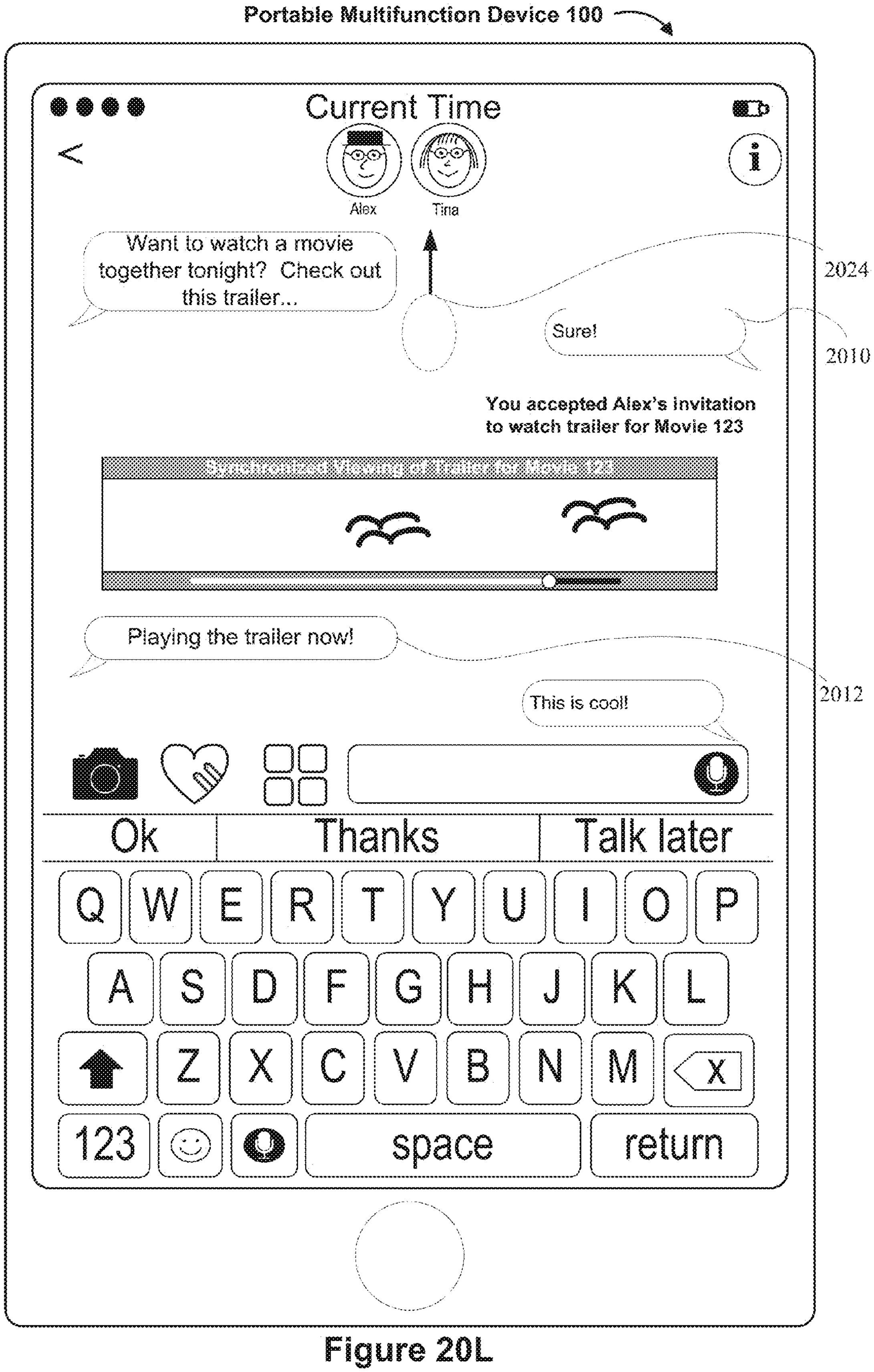
Figure 20M:
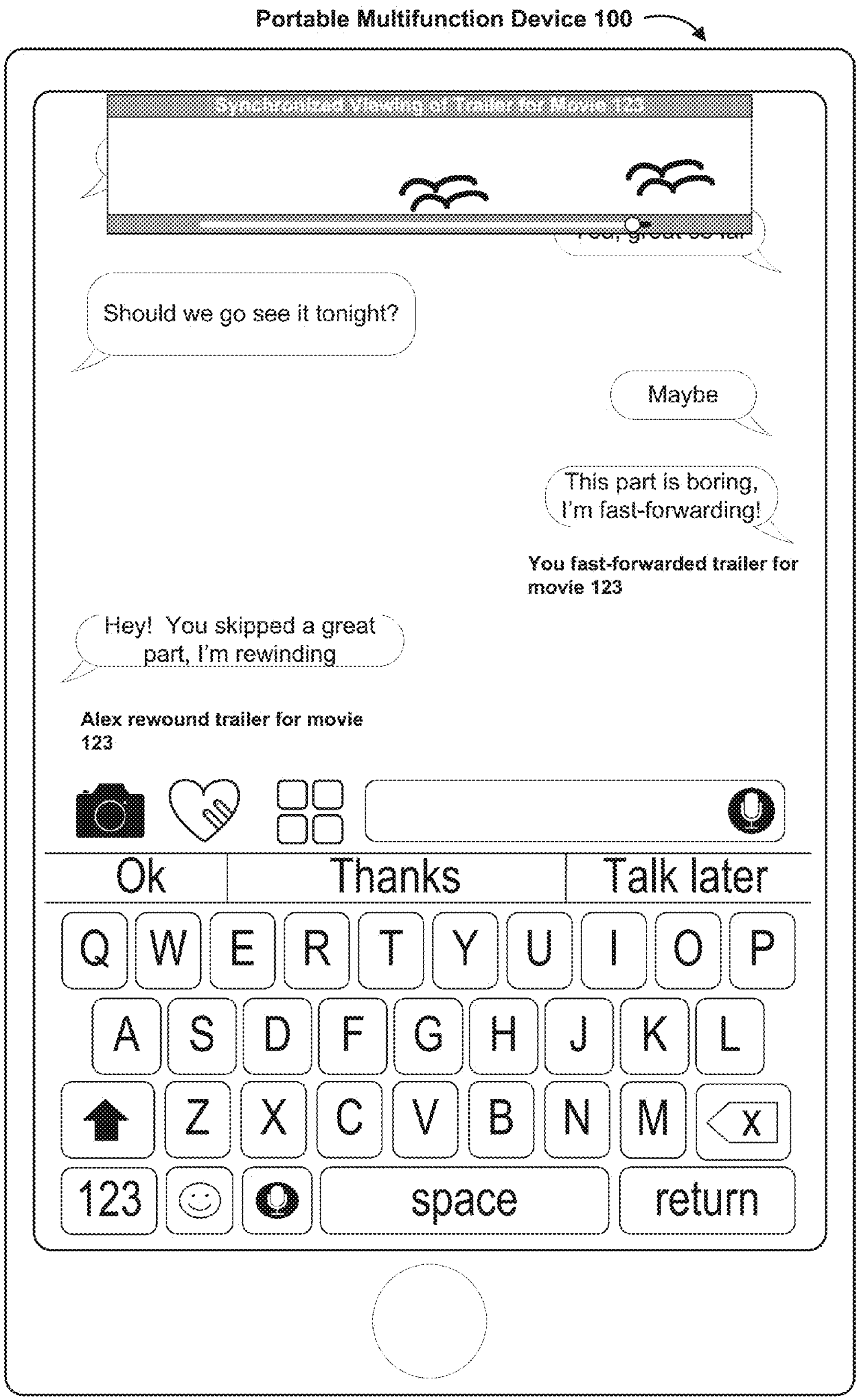
Figure 20N:
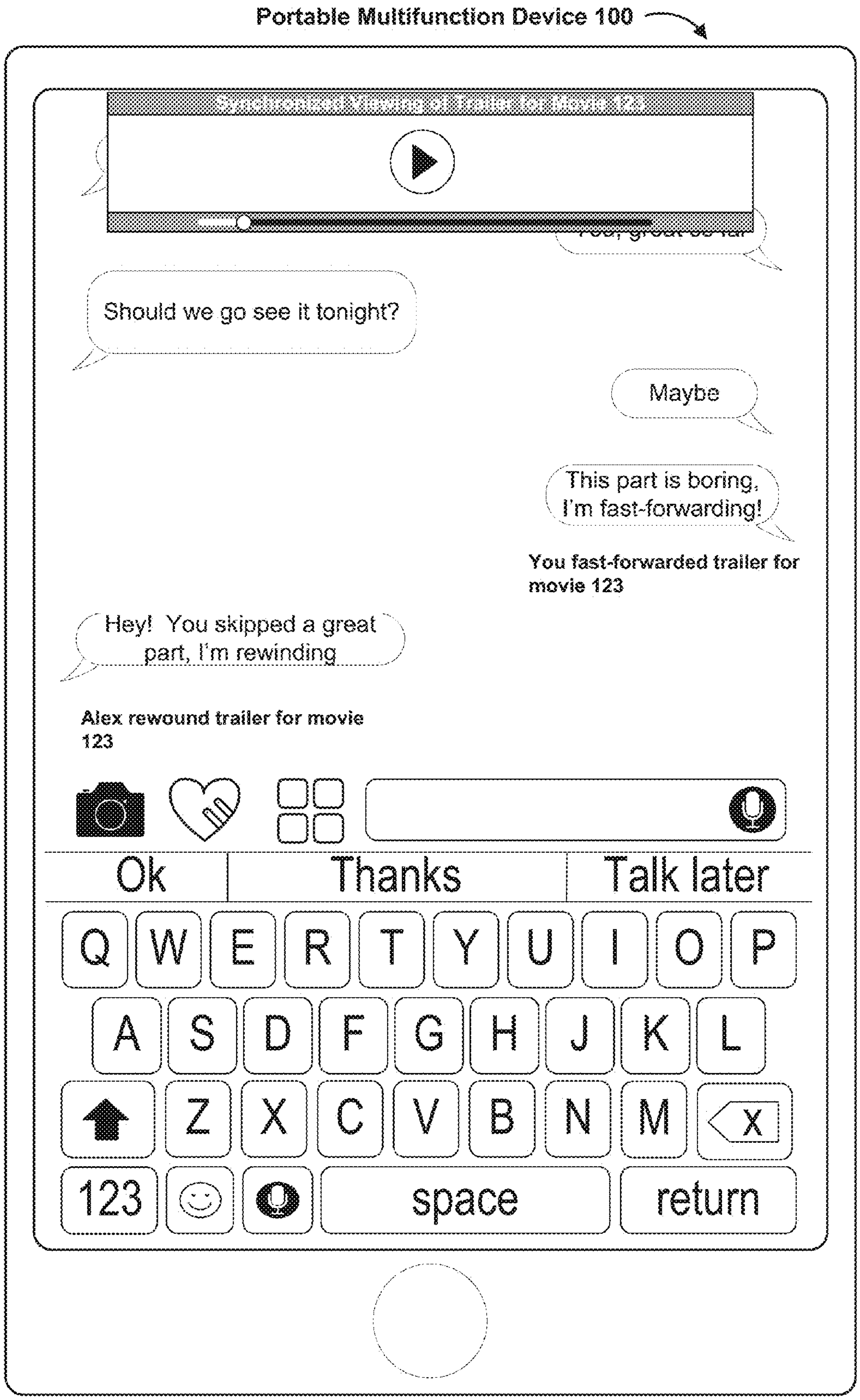
Figure 20O:
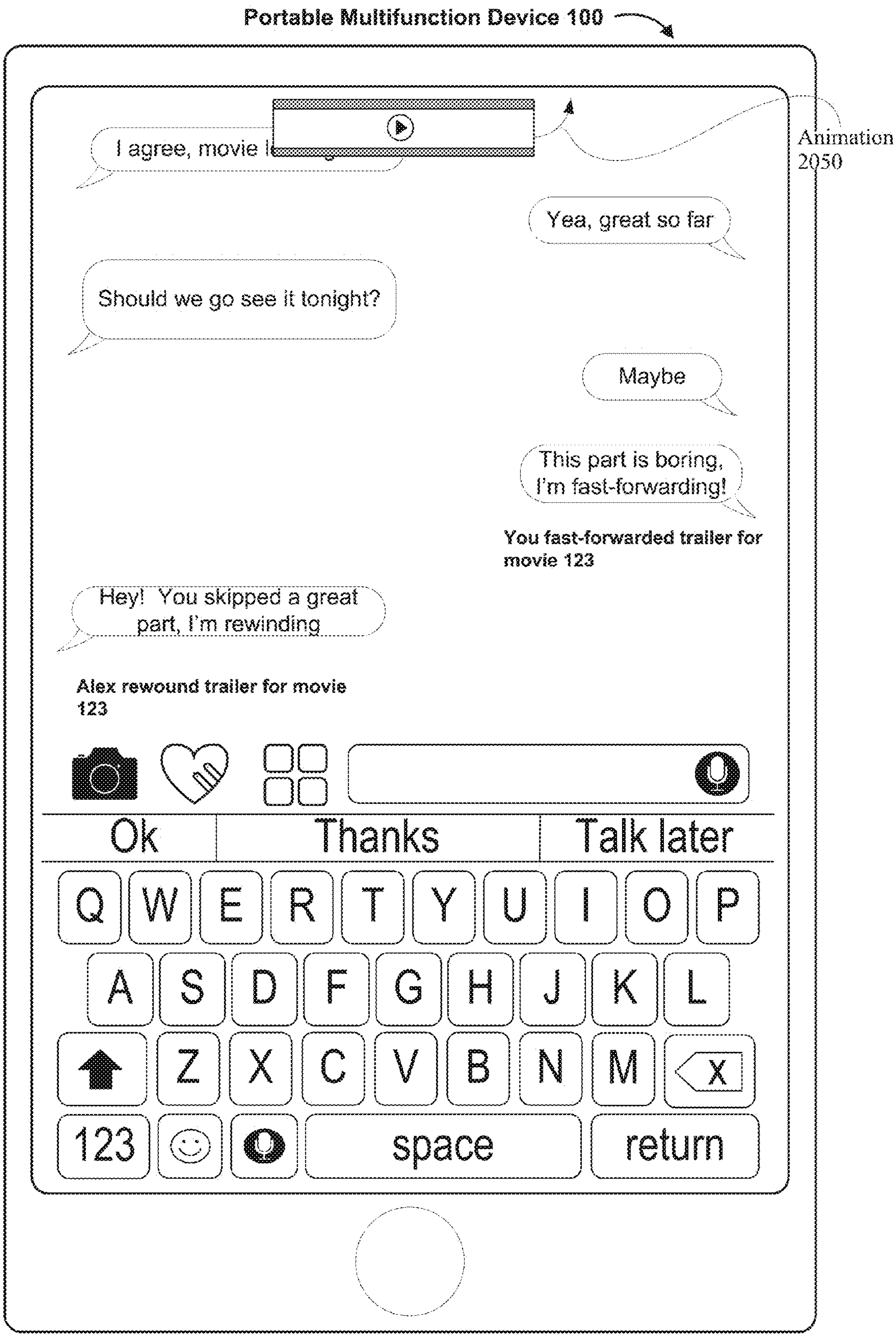
Figure 20P:
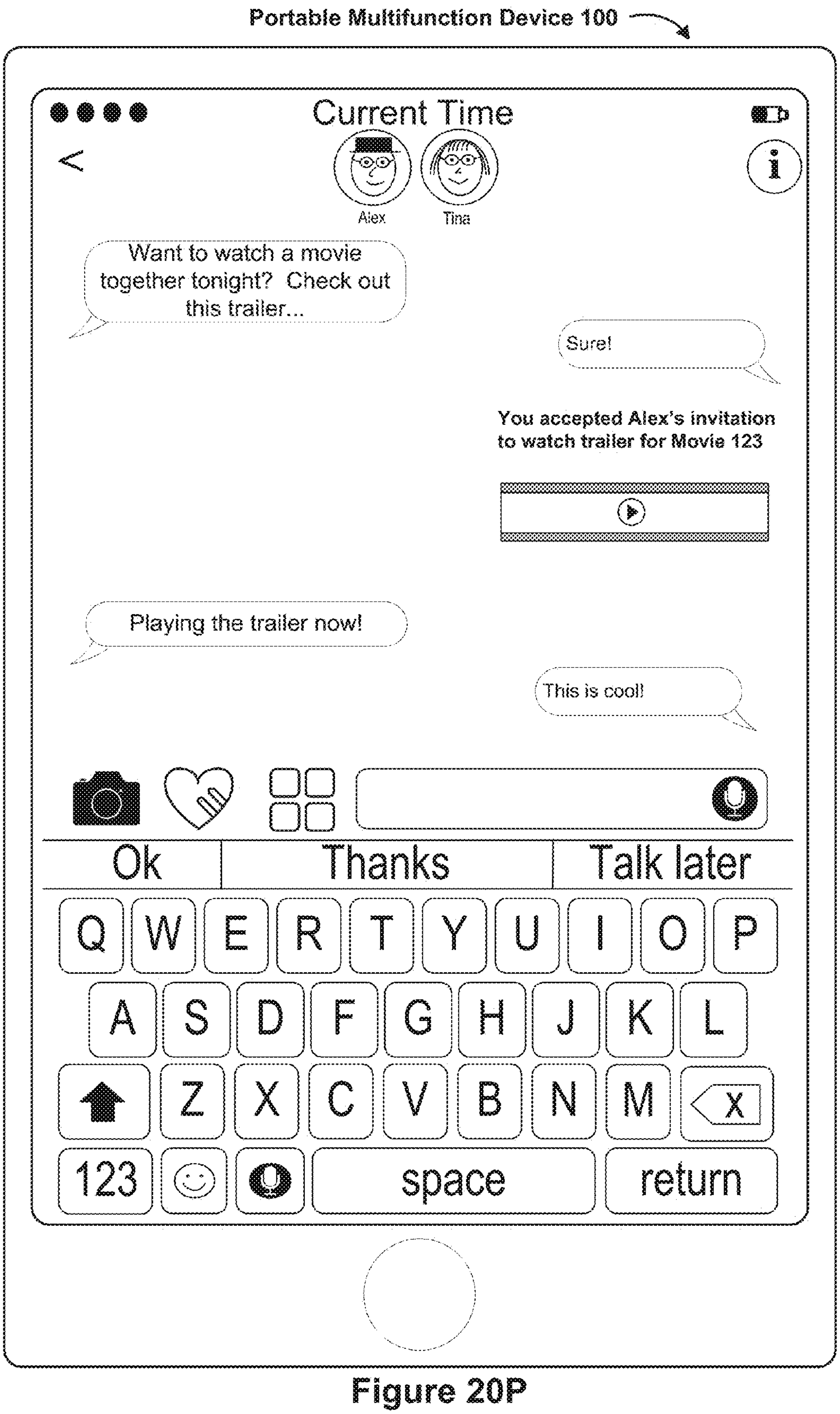

FIGS. 20A-20P illustrate example user interfaces for presenting synchronized media content in a messaging application, in accordance with some embodiments. The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

As shown in FIG. 20A, a first user of a first electronic device (e.g., device 100) receives an invitation from a second user of a second electronic device to synchronously watch a media item. As shown in FIG. 20A, the first user receives a message that is displayed within a messaging user interface (i.e., a user interface that is displayed within a messaging application) that informs the first user that the second user would like to watch a "trailer for movie 123" together. In some embodiments, the first user accepts the invitation by tapping (e.g., tap 2001) within a message region (e.g., the message bubble 2002 shown in FIG. 20A) that includes the invitation and also optionally includes a representation (e.g., a thumbnail view) of the media item. In some embodiments or circumstances, a message region is a message bubble, platter, or other container for a message in a conversation transcript of a messaging session.

As shown in FIG. 20B, in response to detecting that the first user has accepted the invitation (e.g., detecting the tap gesture 2001 over the representation of the media item), the electronic device 100 provides the user with an animation that indicates that the media item will be displayed at a larger size within the messaging user interface. For example, the representation of the media item increases in size within the message user interface and begins to expand so that at least a portion of the representation is displayed outside of the message region (e.g., the representation of the media item is shown as increasing in size and expanding outside of the message bubble 2002, FIG. 20B).

The animation continues with the representation continuing to increase in size and, as shown in FIG. 20C, the representation of the media item is eventually shown as occupying a different part of the messaging user interface (e.g., a central region of the messaging user interface). In some embodiments, the initial location of the representation of the media item after the animation completes is referred to as the chronological position of the media item (i.e., the media item is shown in a chronological order relative to other messages that were received either before or after initiation of synchronized viewing of the media item). For example, as shown in FIG. 20D, the representation of the media item is shown at its chronological position, which is between a position representing a message that was received before initiation of synchronized viewing of the media item (e.g., position for message region 2010) and between a position for a message that was received after initiation of synchronized viewing of the media item (e.g., position for message region 2012). Additionally, chronological positions of the media item and messages received before/after initiation of synchronized viewing are maintained as new messages are received (as shown in FIG. 20E, receiving/displaying a new message moves content in the conversation transcript in a substantially vertical direction while maintaining respective chronological positions for each respective message region). As discussed in more detail below, in some circumstances, the media item also moves to a fixed position at a top portion of the messaging user interface (as shown in FIG. 20H).

In some embodiments, the representation of the media item includes information that indicates that the media item is being viewed in synchrony with other users (e.g., "Synchronized Viewing of Trailer for Movie 123"), includes an affordance that, when selected, causes the messaging application to begin synchronized viewing of the media item (and causes remote devices associated with other users within the messaging session to concurrently begin synchronized viewing as well) (e.g., the play button affordance shown within the representation of the media item), and a play-head and progress bar. In some embodiments, after (and/or in conjunction with the animation discussed above) the representation of the media item is displayed in the central region, the message region that included the invitation from the second user is no longer displayed and an indication that the first user has accepted the second user's invitation is instead displayed. For example, the indication that the first user has accepted includes a textual description of "You accepted Alex's invitation to watch trailer for Movie 123" (as shown in FIG. 20D).

As shown in FIG. 20D, the users in the messaging session (e.g., the first and the second user) are able to continue exchanging messages while the representation of the media item is displayed (before and/or during initiation of playback of the media item). For example, the second user sends a message of "Playing the trailer now!" and that message moves all of the content within the conversation transcript in a substantially vertical (e.g., upward) direction. In this way, users are able to fluidly continue conversing before synchronized playback of the media item begins.

In response to receiving a request from any of the users in the messaging session to begin synchronized viewing of the media item (e.g., one of the users hits the play affordance shown with the representation of the media item, FIG. 20D), the device (or the messaging application) initiates playing of content corresponding to the media item. As shown in FIG. 20E, playing of content corresponding to the media item begins and users are able to continue exchanging messages during synchronized playback of the media item (e.g., the first user sends a message of "This is cool!" and that message moves the content within the conversation transcript in a substantially vertical direction, while continuing to play the content corresponding to the media item).

As shown in FIG. 20F-20G, the users are able to continue exchanging messages while the synchronized viewing of the media item continues. In some embodiments, the newly exchanged messages continue to move content in the conversation transcript in a substantially vertical direction (while still maintaining a chronological ordering of each respective message region).

As shown in FIG. 20H, once the representation of the media item is within a predetermined distance of a top portion of the messaging user interface (e.g., 1 px, 2 px, 3 px, 4 px, 5 px, or some other predetermined distance), the representation of the media item is then displayed at a fixed position within the messaging user interface (in other words, the representation of the media item is not displayed at its chronological position). In some embodiments, a representation of the media item does remain at the chronological position and the representation is also displayed at the fixed position (i.e., representations are shown in two places).

As shown in FIG. 20I, while playing content corresponding to the media item and while displaying the representation of the media item at the fixed position, users are able to continue exchanging messages and those messages cause earlier messages to move underneath the playing content corresponding to the media item (in order to avoid obscuring viewing of the playing content). In some embodiments, users are also able to manipulate (e.g., fast-forward, rewind, pause, and the like) the playing content corresponding to the media item and those manipulations are communicated to devices for other users in the messaging session in order to continue synchronized viewing of the media item for all of the users in the messaging session. For example, as shown in FIG. 20I, the first user is able to drag a play-head (e.g., gesture 2003) to fast-forward the playing content and the fast-forward command is also communicated to devices for other users in the messaging session (techniques for transmitting this information are discussed in detail below in reference to FIGS. 21A-21C). In some embodiments, the messaging user interface is also updated to indicate that the first user performed a respective manipulation of the playing content (e.g., “You fast-forwarded trailer for movie 123,” FIGS. 20J-20K).

As another example of user manipulations of the playing content, after the second user manipulates the playing content by providing a rewind command, the playing content is shown in the messaging user interface at the first electronic device in accordance with the second user’s rewind command (e.g., as shown between FIGS. 20J-20K, the play-head for the playing content has moved backwards due to the second user’s rewind command). In some embodiments, the messaging user interface is also updated to indicate that the second user performed a respective manipulation of the playing content (e.g., “Alex rewound trailer for movie 123,” FIG. 20K).

As is also shown in FIG. 20K, the first user is able to scroll the conversation transcript while the synchronized viewing of the media item is ongoing. For example, the first user provides gesture 2022 that, when detected, causes the device to scroll the conversation transcript in a substantially downward direction (FIG. 20K). While scrolling the conversation transcript (and the content included therein), the device determines whether the playing content corresponding to the media item should be moved back to its chronological position (and no longer displayed at the fixed position). In accordance with a determination that the playing content corresponding to the media item should be moved back to its chronological position (e.g., chronological position is scrolled to within a predetermined distance of the fixed position, as discussed below in reference to FIGS. 21A-21C), the playing content corresponding to the media item is moved to the chronological position and is no longer displayed at the fixed position. As shown in FIG. 20L, the first user is also able to scroll in a substantially upward direction (e.g., by providing gesture 2024) and, in response, the playing content corresponding to the media item moves back to the fixed position at an appropriate time (e.g., as shown in FIG. 20M after scrolling in an upward direction, the playing content corresponding to the media item moves back to the fixed position). In this way, users are able to intuitively scroll through the conversation transcript without interrupting their viewing of the media item.

As shown in FIGS. 20N-20O, an end of the playing content corresponding to the media item is detected (e.g., playing of the media item finishes, one of the users exits the messaging application, or one of the users provides a stop command) and, in response, the device provides an animation of the representation of the media item shrinking in size and returning to its chronological position within the conversation transcript (as shown in FIG. 20O for animation 2050, the representation shrinks in size and beings to move back towards its chronological position, as shown in FIG. 20P).

Figure 21A:
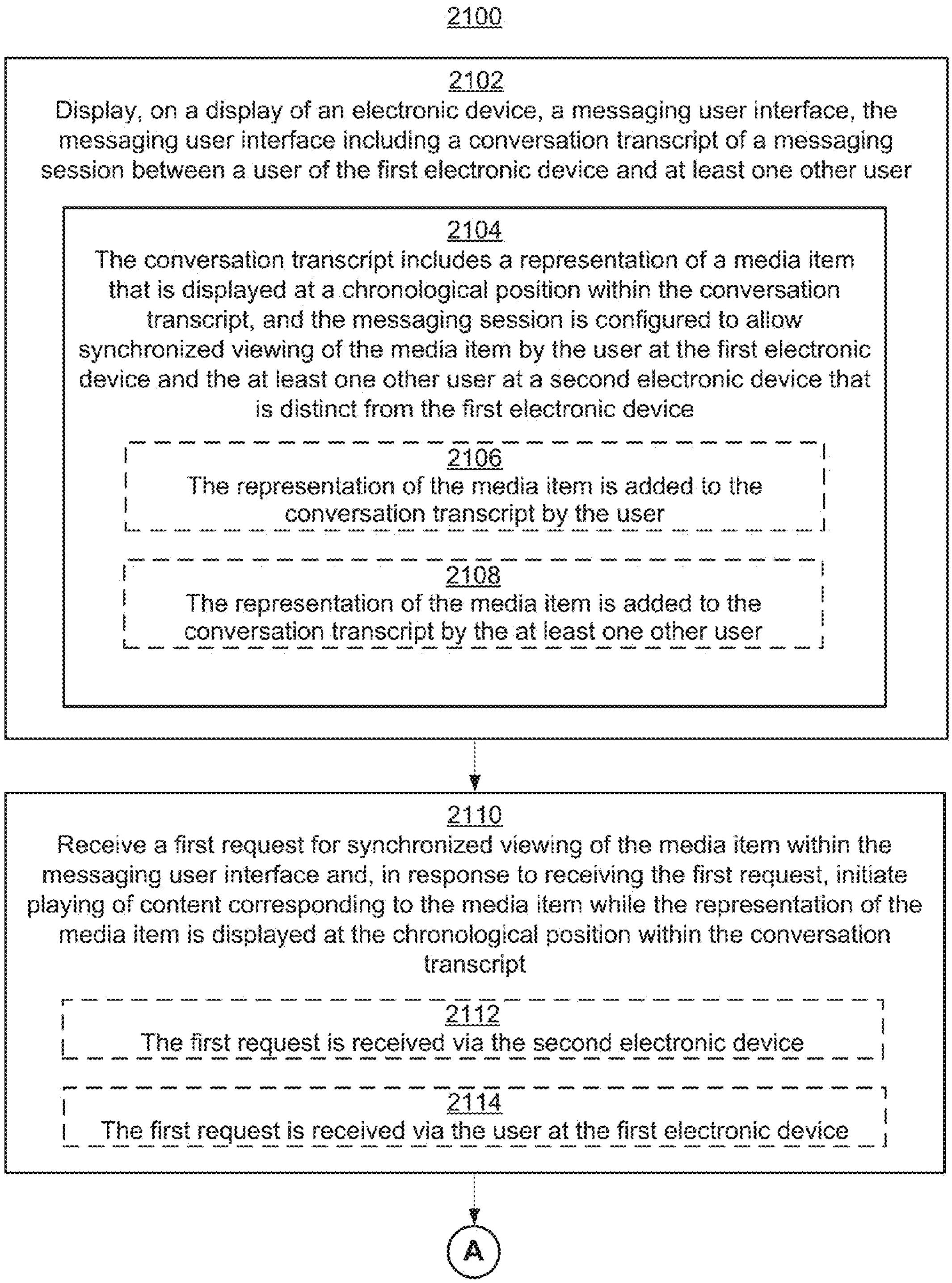
Figure 21B:
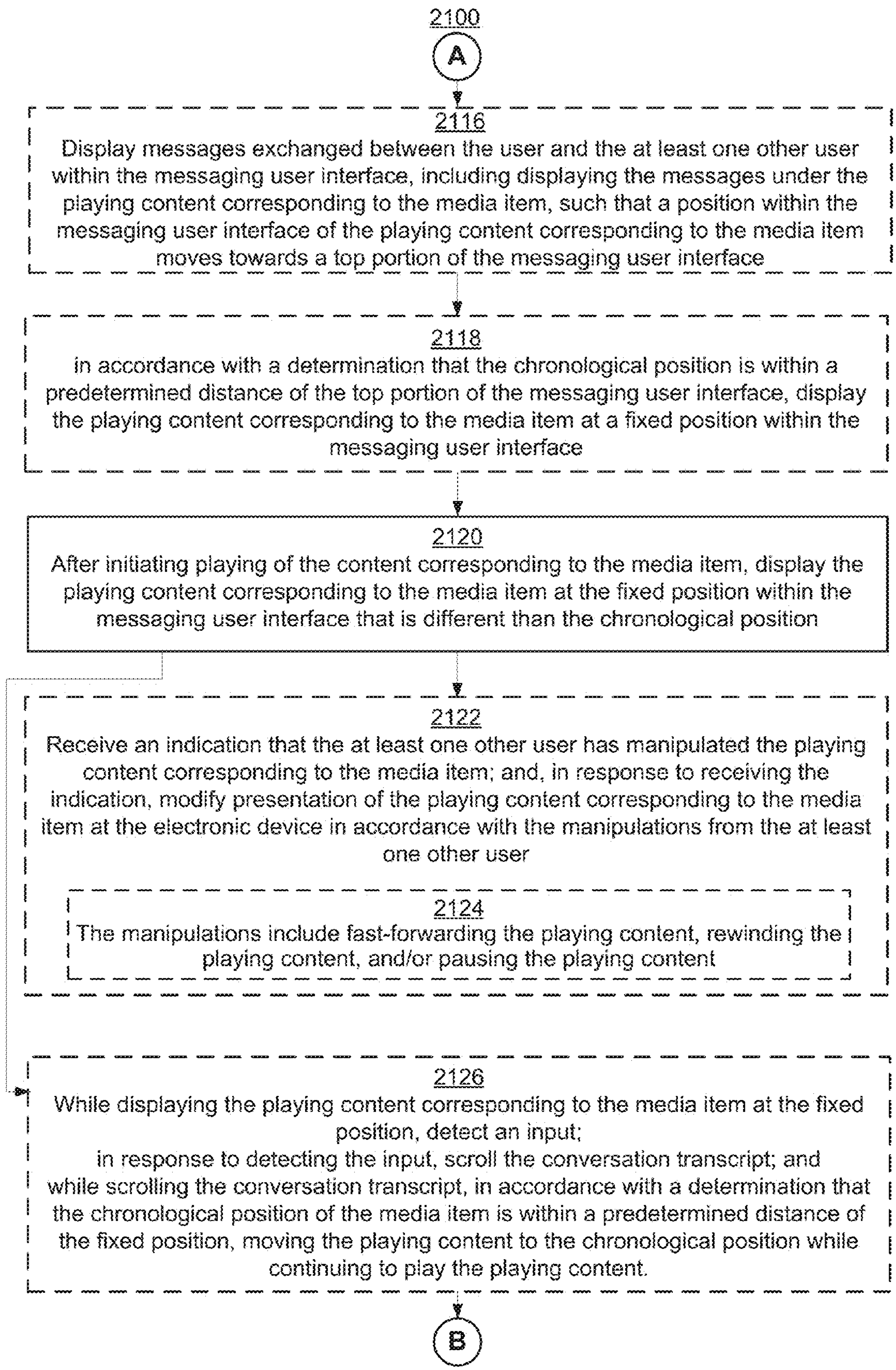

FIGS. 21A-21C are flow diagrams illustrating a method 2100 of presenting synchronized media content in a messaging application, in accordance with some embodiments. The method 2100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2100 are, optionally, combined and/or the order of some operations is, optionally, changed.

As described below, the method 2100 provides an intuitive way to present synchronized media content in a messaging application. The method produces more efficient human-machine interfaces by allowing users to easily view media content in a synchronized fashion directly within a messaging application (and without having to be co-located with another user viewing the media content and without having to use very inefficient techniques to enable synchronized viewing). For battery-operated devices, the method increases user satisfaction with their devices, conserves power (e.g., by requiring few inputs to enable synchronized viewing of media content), and increases the time between battery charges. Furthermore, allowing users to easily view media content in a synchronized fashion directly within a messaging application enhances the operability of the device and makes the user-device interface (e.g., in the messaging application) more efficient (e.g., by allowing for efficient synchronized viewing of media items).

As shown in FIG. 21A, the device displays (2102), on the display, a messaging user interface, the messaging user interface including a conversation transcript of a messaging session between a user of the first electronic device and at least one other user. The conversation transcript includes (2104) a representation of a media item that is displayed at a chronological position within the conversation transcript. For example, the representation of the media item is an icon that shows a still image from the media item (such as a representation shown in FIG. 20A within message container 2002), or a link to the media item that when selected causes the device to display the icon that shows the still image from the media item (such as a link displayed within the message container 2002 that indicates “click here to being synchronized viewing” or “click here to accept synchronized viewing invitation”). The messaging session is configured (2104) to allow synchronized viewing of the media item by the user at the first electronic device and the at least one other user at a second electronic device that is distinct (and remotely located) from the first electronic device. In some embodiments, the media item is specially configured to allow synchronized viewing. In some embodiments, the messaging session or a messaging application associated with the messaging session (and displaying the messaging user interface) is able to take any media item and allow synchronized viewing of the media item using a variety of synchronized viewing techniques that are discussed in more detail below.

In some embodiments, the representation of the media item is added to the conversation transcript by the user (2106). In some embodiments, the representation of the media item is added to the conversation transcript by the at least one other user (2108). In this way, any user in the messaging session is able to initiate synchronized viewing of the media item. Additional details regarding facilitating/transmitting messages between the user and the at least one other user in order to enable synchronous viewing of the media item are provided below.

In some embodiments, the device receives (2110) a first request for synchronized viewing of the media item within the messaging user interface (e.g., the first request is from the user or the at least one other user). In some embodiments, receiving the first request includes receiving a URL for the media item and when a respective user (e.g., the user or the at least one other user or some other user associated with the messaging session) activates a play button for the media item, the device sends a play command, via a messaging network (cellular, WiFi) to the second electronic device and an indication of a current time at the first electronic device. In some embodiments, if the at least one other user hits the play button first, then the first electronic device receives the play command and the indication of a current time at the second electronic device.

In response to receiving the first request, the device initiates playing (2110) of content corresponding to the media item while the representation of the media item is displayed at the chronological position within the conversation transcript. In some embodiments, the first request is received (2112) via the second electronic device (e.g., a request by the at least one other user at the second electronic device to synchronously view the media item is routed through a server or sent directly to the first electronic device). In some embodiments, the first request is received (2114) via the user at the first electronic device (e.g., the user selects the play button shown in the representation of the media item illustrated in FIG. 20C). In some embodiments, playing includes playing the content in a synchronized fashion at both the electronic device and the second electronic device for synchronized viewing by the user and the at least one other user, respectively. In some embodiments, initiation of playback of the content corresponding to the media item is delayed when the user hits play (e.g., by 2 seconds to account for time it takes to send a message to the second electronic device and begin playback at the second electronic device). In other embodiments, sending/receiving the URL includes sending/receiving information to push playback on the second device ahead in time (e.g., jump by 1-2 seconds to sync playback on the devices).

Turning now to FIG. 21B, the device (before displaying the playing content corresponding to the media item at the fixed position), displays (2116) messages exchanged between the user and the at least one other user within the messaging user interface, including displaying the messages under the playing content corresponding to the media item (as shown in FIGS. 20D-20G, exchanged messages are displayed underneath the playing content and a position within the messaging user interface of the playing content corresponding to the media item is moved towards a top portion of the messaging user interface). In other words, displaying the messages includes moving the chronological position of the playing content towards the top portion of the messaging user interface, because as new messages are received and displayed in the messaging user interface, earlier messages continue to move (or be pushed) towards the top portion. In some embodiments, relative vertical positioning of messages with respect to other messages corresponds to an earlier chronological position.

In accordance with a determination that the chronological position is within a predetermined distance of the top portion of the messaging user interface, the device displays (2118) the playing content corresponding to the media item at the fixed position within the messaging user interface (e.g., a synchronized content position that is defined relative to the top portion of the messaging user interface, such that the content item is pinned at the top portion of the messaging user interface while exchanged messages appear below). As shown in FIGS. 20H-20K, messages exchanged between the users continue to be displayed beneath the playing content while it is located at the fixed/pinned position.

After initiating playing of the content corresponding to the media item (and while continuing to play the content corresponding to the media item), the device displays (2120) (e.g., moves) the playing content corresponding to the media item at the fixed position within the messaging user interface that is different than the chronological position. In some embodiments, the content corresponding to the media item (or the representation of the media item) floats up to the fixed position sometime after initiating playback of the content corresponding to the media item. In some embodiments, the representation of the media item remains in the chronological position while the content is playing and messages exchanged between the user and the at least one other user push the chronological position towards a top portion of the messaging user interface. In some embodiments, in accordance with a determination that the content corresponding to the media item has moved to within a predetermined distance of the top portion, the electronic device displays the content corresponding to the media item at the fixed position (as also discussed above). In some embodiments, the representation of the media item is displayed at the chronological position (above the fold) while the playing content corresponding to the media item is displayed at the fixed position (in other words, representations of the media item are displayed at the fixed position and at the chronological position). By displaying the representation of the media item at the fixed position, users are able to continue viewing the media item in a substantially synchronous fashion with other users without having to interrupt their conversation. Therefore, users are able to quickly and conveniently watch a media item together and continue conversing normally, thereby enhancing operability of the device 100 and producing more efficient user-device interfaces (e.g., users need not switch back and forth between a messaging application and some other media-sharing or watching application).

In some embodiments, while displaying the playing content corresponding to the media item, users are able to manipulate the playing content (2122) (e.g., fast-forward, rewind, pause) and users are also able to scroll the conversation transcript (2126).

With respect to operation 2122, the device receives an indication that the at least one other user has manipulated the playing content (e.g., issued a fast-forward, rewind, or pause command) corresponding to the media item. In response to receiving the indication, the device modifies presentation of the playing content corresponding to the media item at the electronic device in accordance with the manipulations from the at least one other user (e.g., as shown in FIGS. 20I-20J (fast-forward) and FIGS. 20J-20K (rewind)). In this way, users are able to continue synchronous viewing of the media item while also being able to manipulate a position of the content corresponding to the media item and other users will seamlessly be provided with those manipulations as well.

In some embodiments, the manipulations include one or more of fast-forwarding the playing content, rewinding the playing content, and/or pausing the playing content. For example, the indication indicates that the at least one other user fast-forwarded the playing content and, in response to receiving the indication of the fast-forwarding, the presentation of the playing content is modified in accordance with the fast-forwarding (e.g., both the user's device and another device associated with the at least one other user both display the fast-forwarding in a substantially synchronous fashion). As another example, the indication indicates that the at least one other user rewound the playing content and, in response, the presentation of the playing content is modified in accordance with the rewinding. As one more example, the indication indicates that the at least one other user paused the playing content and, in response, the presentation of the playing content is paused.

As to operation 2126, while displaying the playing content corresponding to the media item at the fixed position, the device detects an input (e.g., a drag gesture moving the conversation transcript in a downward direction, as shown for gesture 2022 in FIG. 20K). In response to detecting the input, the device scrolls the conversation transcript (as shown in FIG. 20L, the conversation transcript is scrolled in a downward direction in response to the gesture 2022). While scrolling the conversation transcript, in accordance with a determination that the chronological position of the media item is within a predetermined distance of the fixed position (e.g., within 1 px, 2 px, 3 px, 4 px, or 5 px, or some other predefined distance), the device moves the playing content to the chronological position while continuing to play the playing content (as shown in FIG. 20L, the representation of the media item is now shown at the chronological position in response to the scroll gesture 2022 and is no longer displayed at the fixed position. In this way, if the user scrolls far enough back in the conversation, then the playing content moves back to the chronological position instead of remaining at the fixed position, thus ensuring a smooth viewing experience of the content corresponding to the media item.

Turning now to FIG. 21C, while displaying the playing content corresponding to the media item at the fixed position, the device: displays (2128) messages exchanged between the user and the at least one other user below the playing content corresponding to the media item (and passing behind the playing content corresponding to the media item, so that viewing of the media item is uninterrupted and so that the users are able to continue exchanging messages while synchronously viewing the media item).

While displaying the playing content corresponding to the media item at the fixed position, the device also detects (2128) an end of the content corresponding to the media item. In response to detecting the end of the content corresponding to the media item, the device ceases to display the content corresponding to the media item at the fixed position. In some embodiments, ceasing to display includes presenting an animation of the media item (or the representation of the media item) returning to the chronological position within the conversation transcript (e.g., the animation 2050 illustrated in FIGS. 20N-20P). This animation effect provides users with a visual reminder of the chronological position for the media item, since many messages may have been exchanged and the user may no longer be able to locate the media item (or the representation thereof) within the conversation transcript. Providing this animation effect enhances the operability of the device 100 and makes the user-device interface more efficient (e.g., by ensuring that the user knows where the media is located within the conversation transcript, so that they can easily and efficiently locate the media item at a later point in time).

In some embodiments, detecting the end of the playing of the content corresponds (2130) to receiving a request to end playing of the content (e.g., the request is received from any user associated with the messaging session, such as when a user hits a stop button or when a user leaves the messaging application). In some embodiments, detecting the end of the playing of the content corresponds (2132) to reaching an end of the playing of the content (e.g., the playing content concludes after reaching an end point).

In some embodiments, the synchronous viewing of the content corresponding to the media item described above is facilitated by sending play-head information over a message channel (e.g., a meta-message) whenever either user (or any user in a messaging session that includes more than two users) manipulates a position of the playing content (as discussed above with respect to fast-forwarding, rewinding, and/or pausing). In some embodiments, time synchronization protocols are used to send messages back and forth whenever the play-head is manipulated and/or to verify that the content is being viewed synchronously (e.g., if a particular user's network connection slows down, this can be detected and used to also slow down viewing at an electronic device for a different user (who is part of the messaging session in which synchronized viewing of a media item is taking place) in order to ensure that viewing remains synchronous). In some embodiments, if a touch event is detected (at an electronic device associated with a user who is part of a messaging session that includes synchronized viewing of a media item) that manipulates the play-head of the media item, the electronic device actively tracks the touch event and keeps sending messages (including play-head information) to the second electronic device (or to a plurality of devices, including the second electronic device) in order to ensure that synchronized viewing continues with interruption.

The embodiments and techniques for enabling synchronous viewing of media items in a messaging application may also be applied to asynchronous games that are played within a messaging application (including checkers, chess, connect four, gin, tic-tac-toe, etc.), a shared shopping list (e.g., both users are able to synchronously view a shopping list within a messaging application and can each individually check off items while they are shopping at the same or remotely-located businesses), a shared to-do list, and collaborative drawings.

It should be understood that the particular order in which the operations in FIGS. 21A-21C have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2100 described above. For example, the contacts, gestures, user interface objects, intensity thresholds, focus selectors, and animations described above with reference to method 2100 optionally have one or more of the characteristics of the contacts, gestures, user interface objects, intensity thresholds, focus selectors, and animations described herein with reference to other methods described herein. For brevity, these details are not repeated here.

Figure 22:
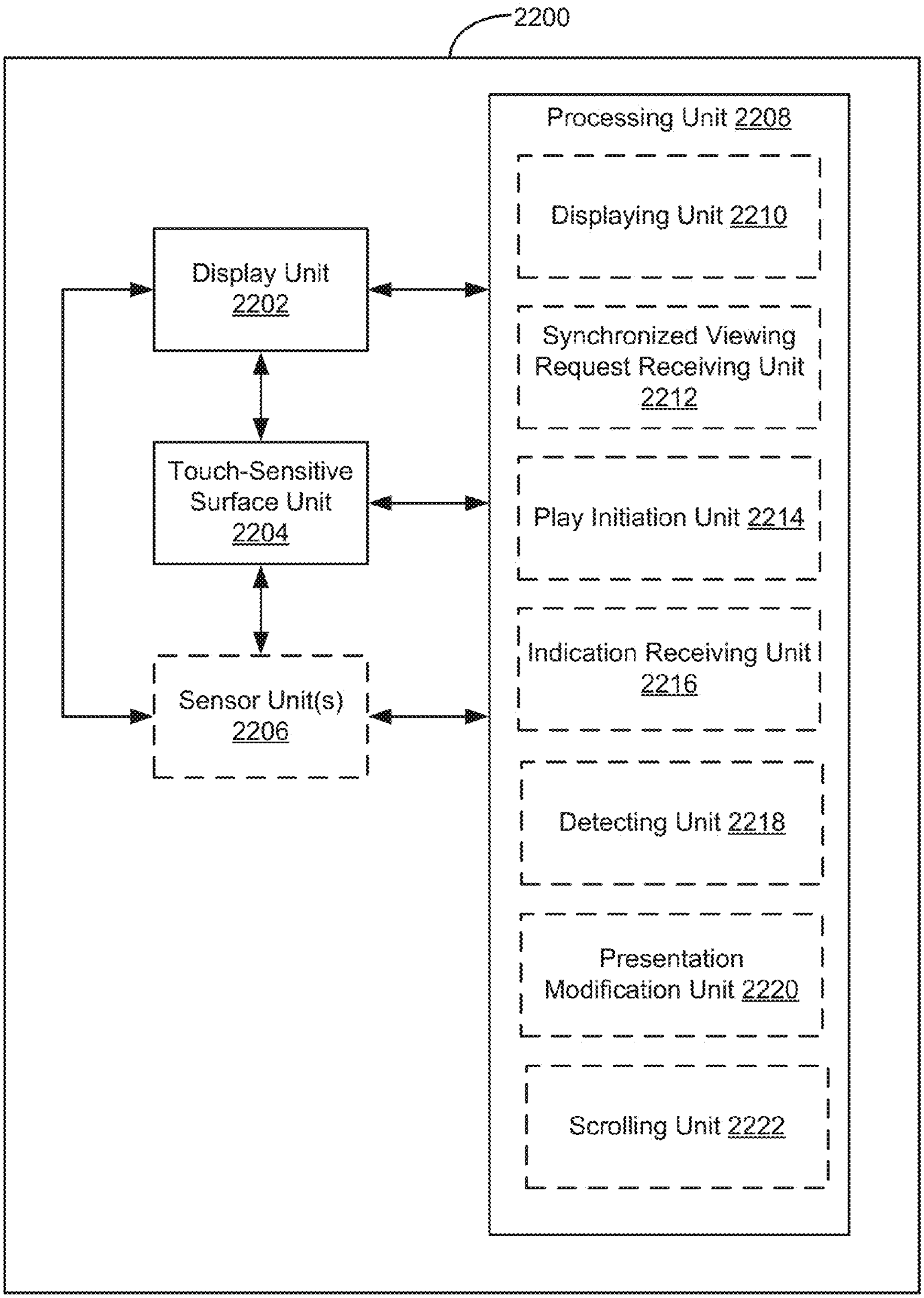
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display a user interface, a touch-sensitive surface unit 2204 configured to receive contacts, one or more sensor units 2206 for detecting intensities of contacts on the touch-sensitive surface unit 2204; and a processing unit 2208 coupled with the display unit 2202, the touch-sensitive surface unit 2204 and the one or more sensor units 2206. In some embodiments, the processing unit 2208 includes a displaying unit 2210, a synchronized viewing request receiving unit 2212, a play initiation unit 2214, an indication receiving unit 2216, a detecting unit 2218, and/or presentation modification unit 2220, and/or a scrolling unit 2222.

The processing unit 2208 is configured to display (e.g., with the displaying unit 2210), on the display (e.g., the display unit 2202), a messaging user interface, the messaging user interface including a conversation transcript of a messaging session between a user of the first electronic device and at least one other user. In some embodiments, the conversation transcript includes a representation of a media item that is displayed at a chronological position within the conversation transcript, and the messaging session is configured to allow synchronized viewing of the media item by the user at the first electronic device and the at least one other user at a second electronic device that is distinct from the first electronic device. The processing unit is also configured to: receive a first request for synchronized viewing of the media item within the messaging user interface (e.g., with the synchronized viewing request receiving unit 2212) and, in response to receiving the first request, initiate playing of content corresponding to the media item (e.g., with the play initiation unit 2214) while the representation of the media item is displayed at the chronological position within the conversation transcript. After initiating playing of the content corresponding to the media item, display the playing content corresponding to the media item at a fixed position (e.g., with the displaying unit 2210 in conjunction with the display unit 2202) within the messaging user interface that is different than the chronological position. While displaying the playing content corresponding to the media item at the fixed position: (i) display (e.g., with the displaying unit 2210 in conjunction with the display unit 2202) messages exchanged between the user and the at least one other user below the playing content corresponding to the media item and (ii) detect an end of the content corresponding to the media item (e.g., with the detecting unit 2218). In response to detecting the end of the content corresponding to the media item, cease to display the content corresponding to the media item at the fixed position (e.g., with the displaying unit 2210 in conjunction with the display unit 2202).

In accordance with some embodiments of the electronic device 2200, the processing unit is further configured to: receive an indication that the at least one other user has manipulated the playing content corresponding to the media item (e.g., with the indication receiving unit 2216); and, in response to receiving the indication, modify presentation of the playing content corresponding to the media item at the electronic device in accordance with the manipulations from the at least one other user (e.g., with the presentation modification unit 2220).

In accordance with some embodiments of the electronic device 2200, the manipulations include fast-forwarding the playing content, rewinding the playing content, and/or pausing the playing content.

In accordance with some embodiments of the electronic device 2200, the representation of the media item is added to the conversation transcript by the user.

In accordance with some embodiments of the electronic device 2200, the representation of the media item is added to the conversation transcript by the at least one other user.

In accordance with some embodiments of the electronic device 2200, the first request is received via the second electronic device.

In accordance with some embodiments of the electronic device 2200, the first request is received via the user at the first electronic device.

In accordance with some embodiments of the electronic device 2200, the processing unit is further configured to: before displaying the playing content corresponding to the media item at the fixed position: (i) display (e.g., with the displaying unit 2210 in conjunction with the display unit 2202) messages exchanged between the user and the at least one other user within the messaging user interface, and displaying the messages includes displaying the messages under the playing content corresponding to the media item, such that a position within the messaging user interface of the playing content corresponding to the media item moves towards a top portion of the messaging user interface; and (ii) in accordance with a determination that the chronological position is within a predetermined distance of the top portion of the messaging user interface, display the playing content corresponding to the media item at the fixed position within the messaging user interface.

In accordance with some embodiments of the electronic device 2200, the processing unit is further configured to: while displaying the playing content corresponding to the media item at the fixed position, detect an input; in response to detecting the input, scroll the conversation transcript (e.g., with the scrolling unit 2222); and while scrolling the conversation transcript, in accordance with a determination that the chronological position of the media item is within a predetermined distance of the fixed position, move the playing content to the chronological position while continuing to play the playing content (e.g., with the displaying unit in conjunction with the display unit 2202).

In accordance with some embodiments of the electronic device 2200, detecting the end of the playing of the content corresponds to receiving a request to end playing of the content.

In accordance with some embodiments of the electronic device 2200, detecting the end of the playing of the content corresponds to reaching an end of the playing of the content The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 21A-21C are, optionally, implemented by components depicted in FIGS. 1A-1B or FIG. 22. For example, one or more of the operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Incorporate Handwritten Inputs in Messages

Figure 23A:
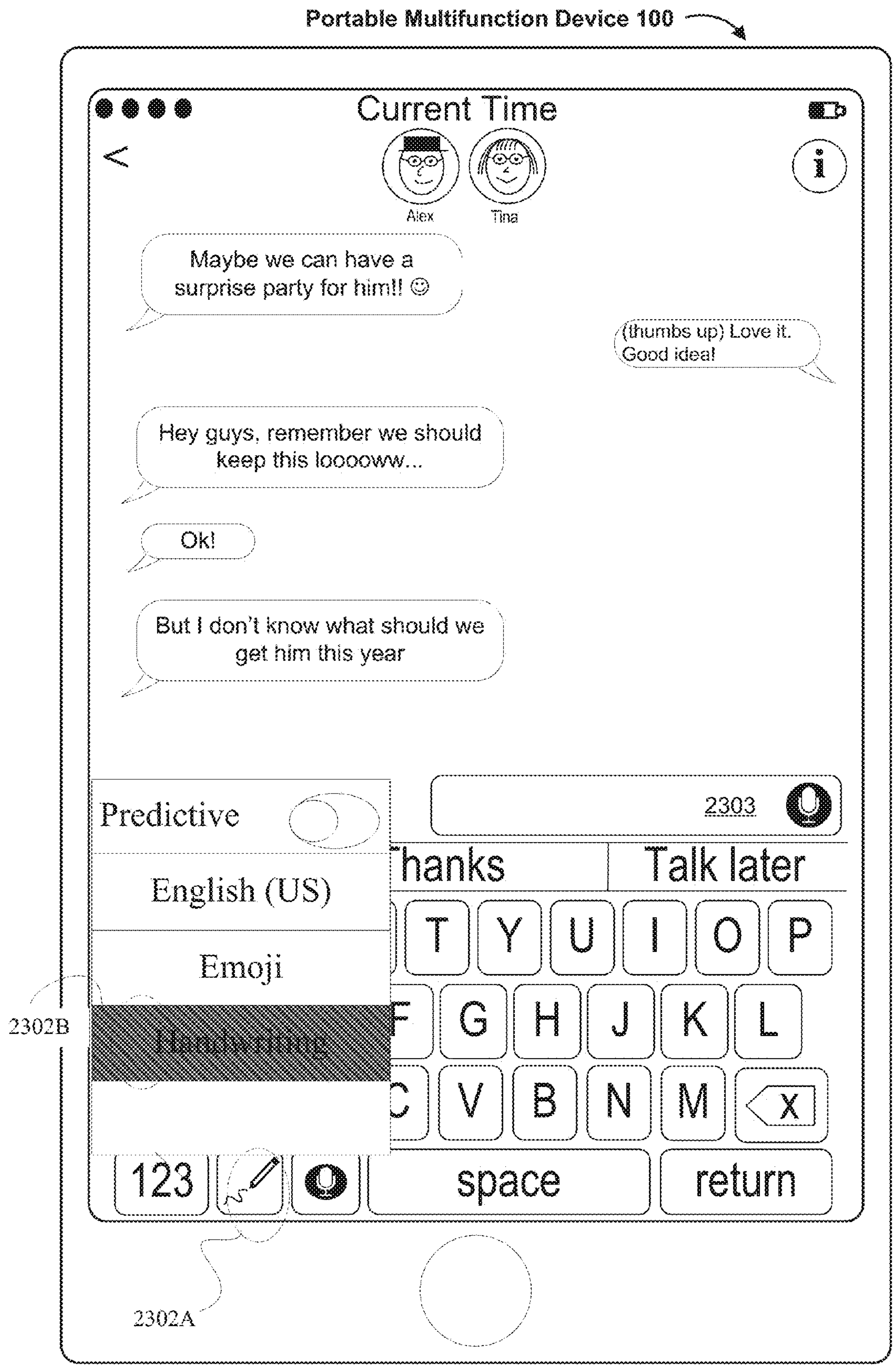
FIGS. 23A-23AE illustrate example user interfaces for providing and presenting user-specific handwritten inputs in a messaging application, in accordance with some embodiments.

FIGS. 23A-23AE illustrate example user interfaces for providing and presenting user-specific handwritten inputs in a messaging application, in accordance with some embodiments. The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

As shown in FIG. 23A, the device displays a user interface for a messaging application (also referred to herein as a "messaging user interface") and a user of the device is able to activate handwriting features by providing either or both of gestures 2302A and 2302B. In some embodiments, in response to the gestures 2302A and/or 2302B and while the device is in a portrait orientation, the device displays selectable representations of handwritten inputs (as shown in FIG. 23B for user interface region 2351).

Figure 23B:
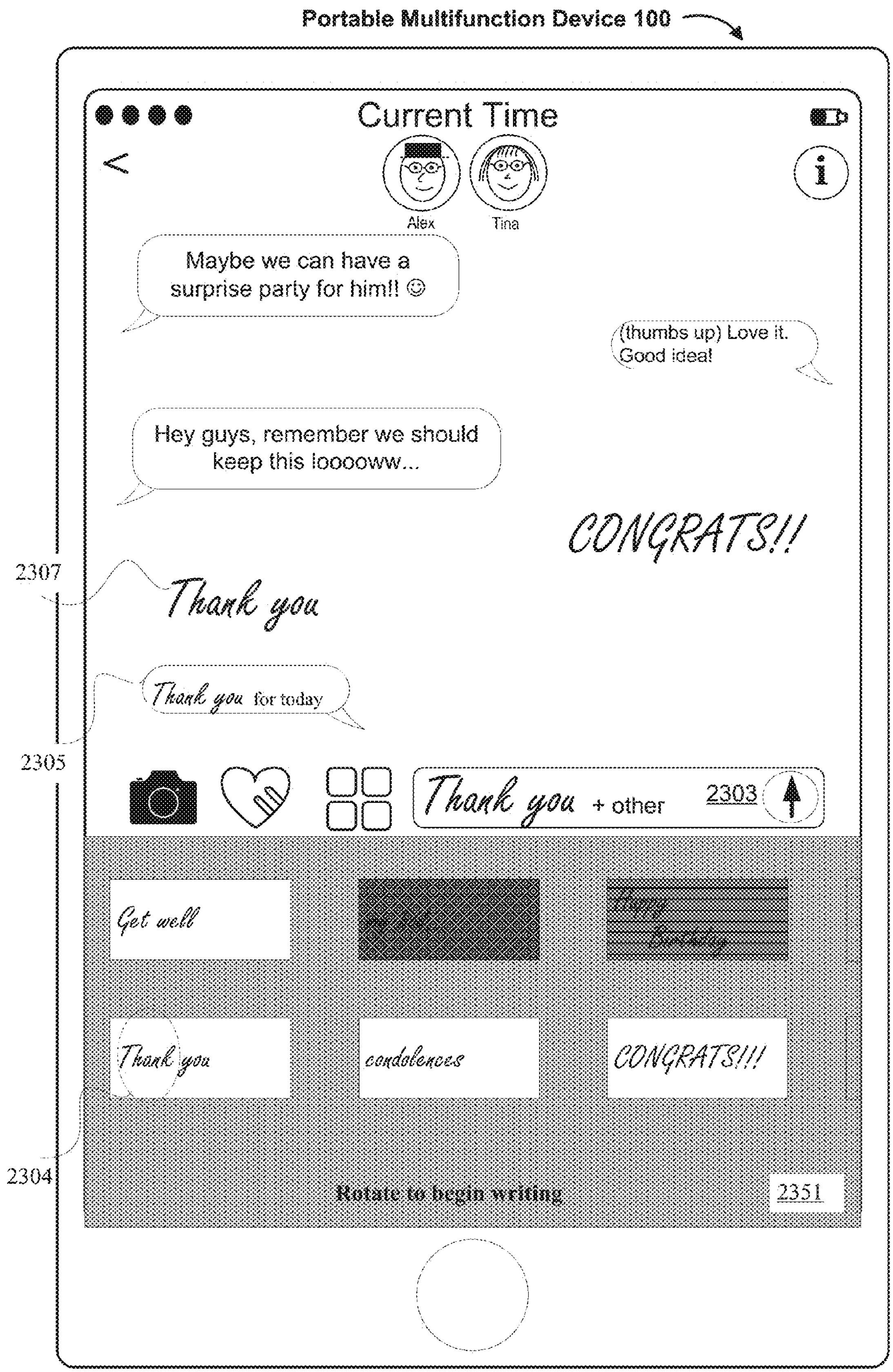

In some embodiments, in response to receiving a selection of one of the selectable representations shown in user interface region 2351 (e.g., in response to input 2304 over a first selectable representation), the device updates message-input region 2303 to include handwritten text that is associated with the first selectable representation (e.g., as shown in FIG. 23B, the message-input area is updated to include handwritten text of "Thank you").

In some embodiments, users are also able to select handwritten text that is displayed in the message-input area 2303. For example, in response to a tap over the handwritten text displayed in the message-input area 2303 (FIG. 23B), the device may allow the user to then edit that handwritten text (e.g., by displaying a user interface such as that shown in FIG. 23J that allows for editing handwritten text).

Figure 23C:
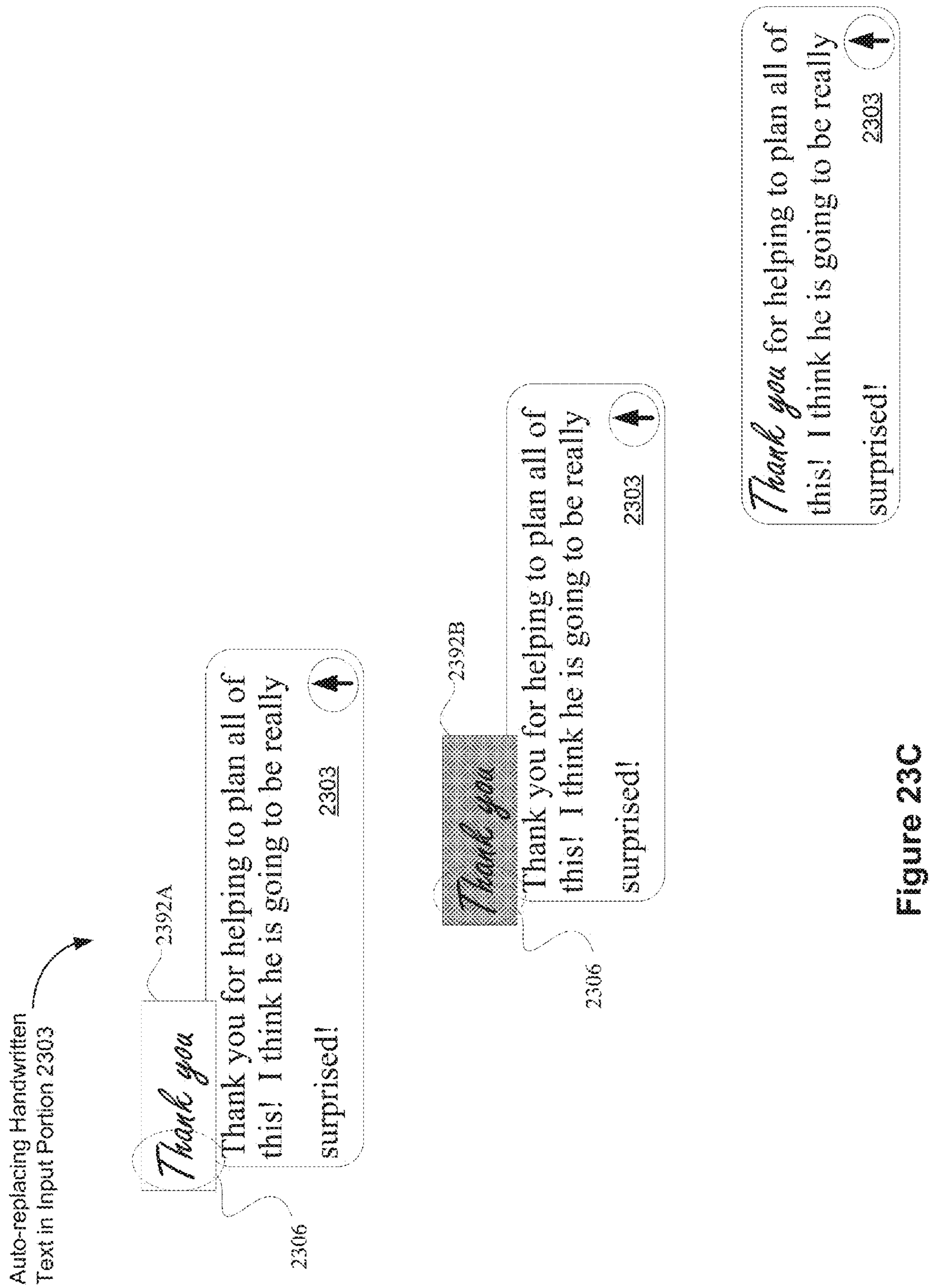

As shown in FIG. 23C, in some embodiments, the device also provides suggestions to auto-replace typed text with handwritten text.

In addition to selecting handwritten text by selecting any of the selectable representations shown in user interface region 2351, some embodiments also allow users to simply rotate the device in order to provide new handwritten inputs. For example, the user simply rotates the device from the portrait orientation (FIG. 23D) to a landscape orientation (FIG. 23E) and, in response to detecting this orientation change, the device displays a user interface that is configured to accept handwritten inputs from the user (e.g., user interface 2309, FIG. 23E).

Figure 23D:
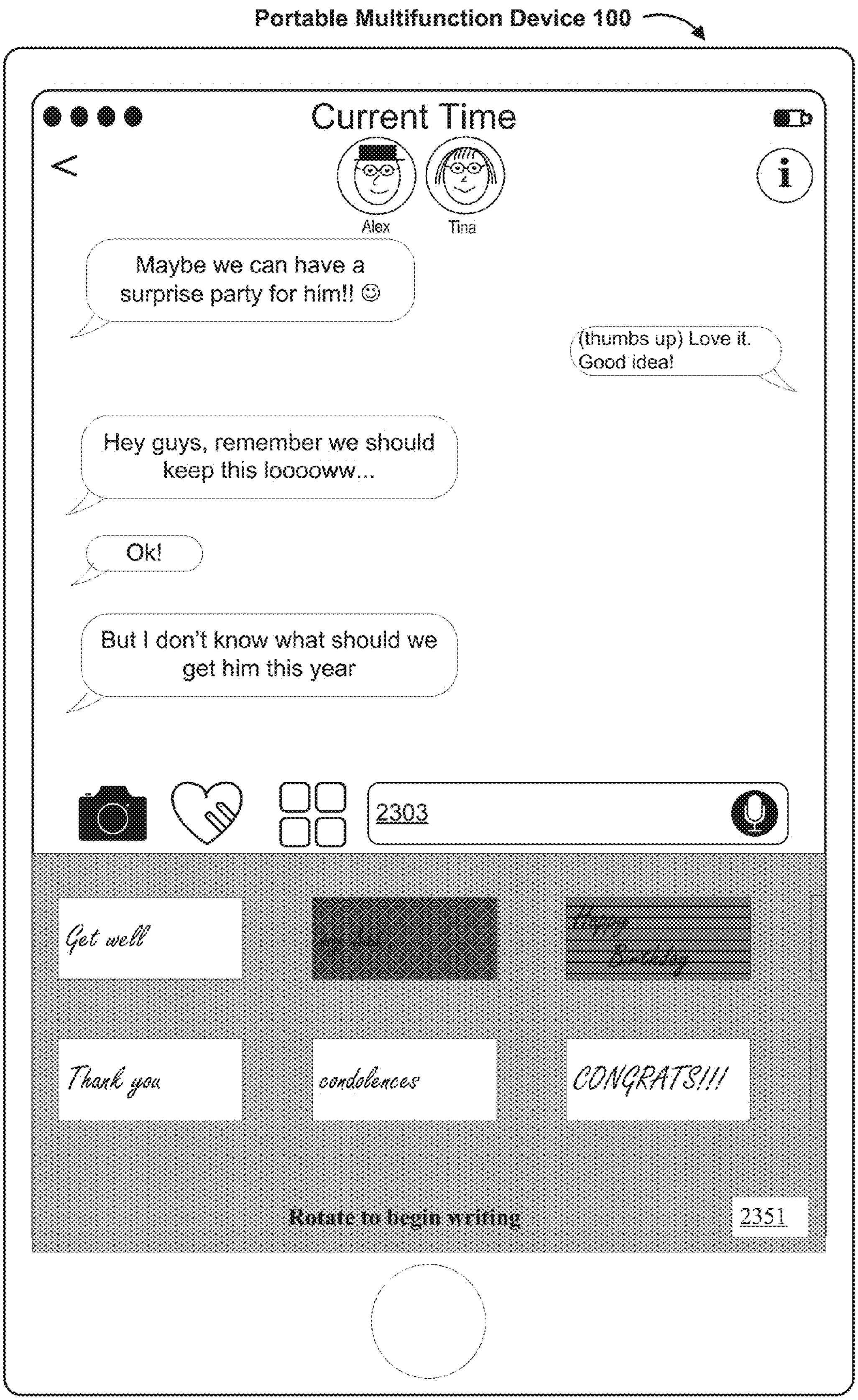
Figure 23E:
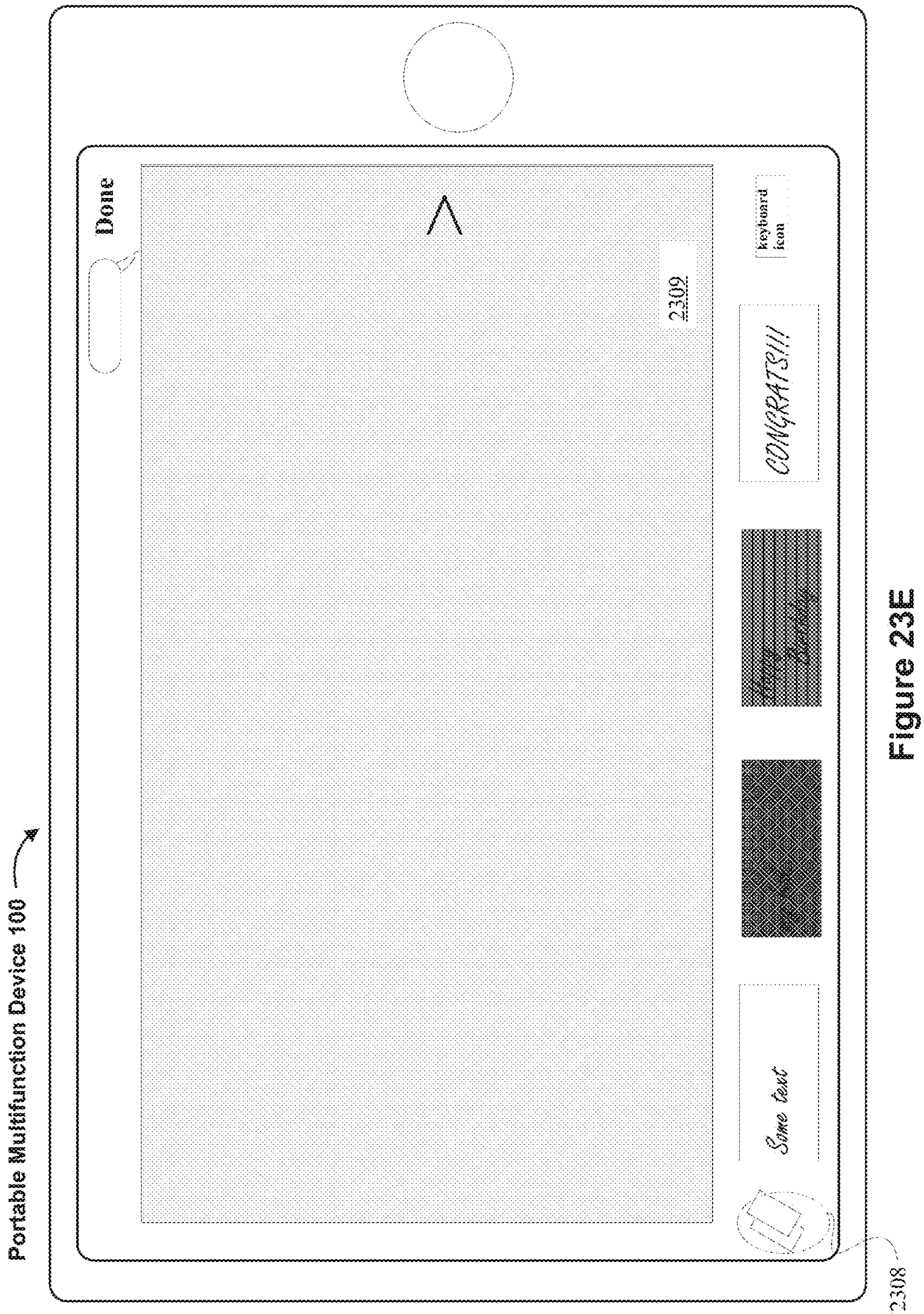
Figure 23F:
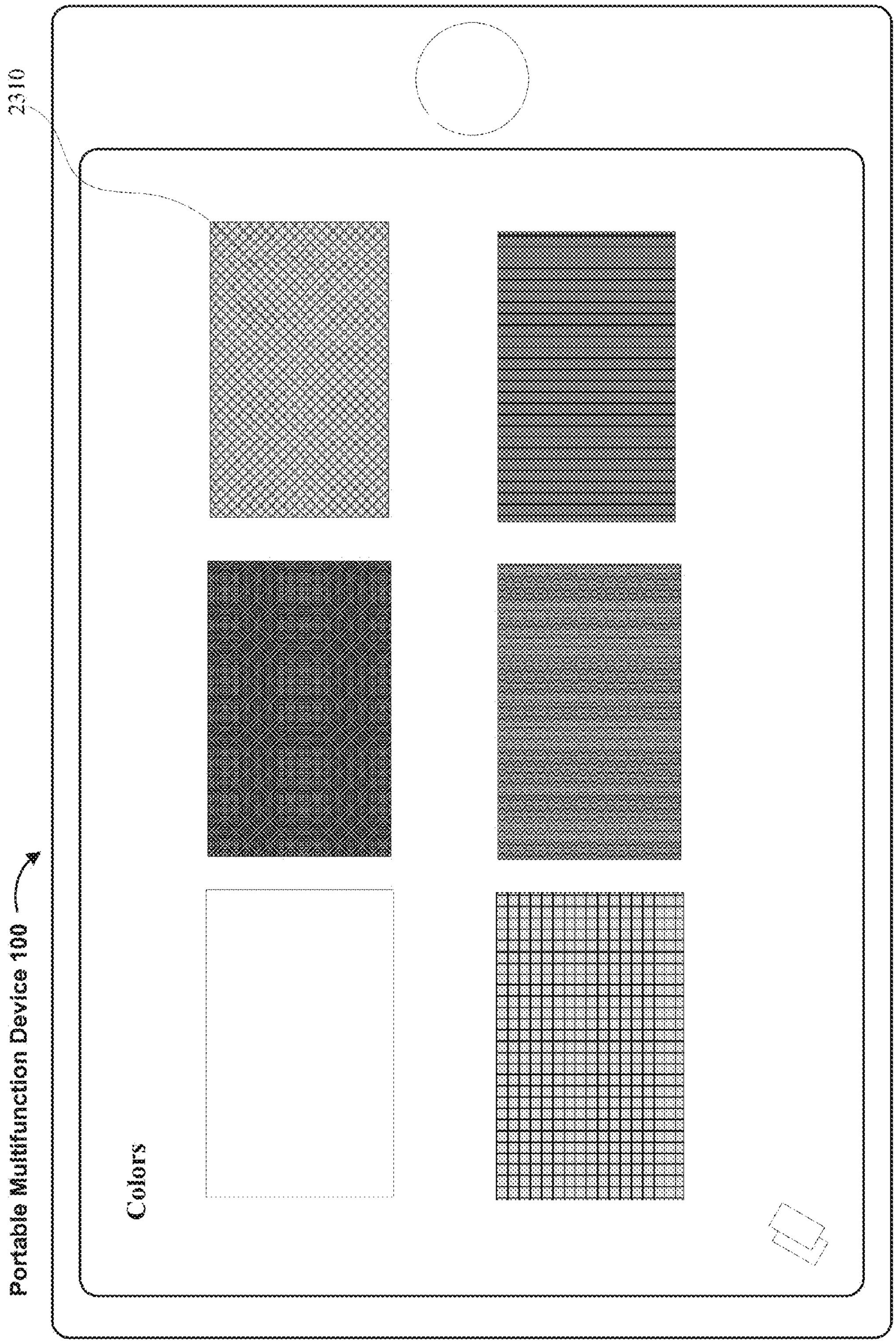
Figure 23G:
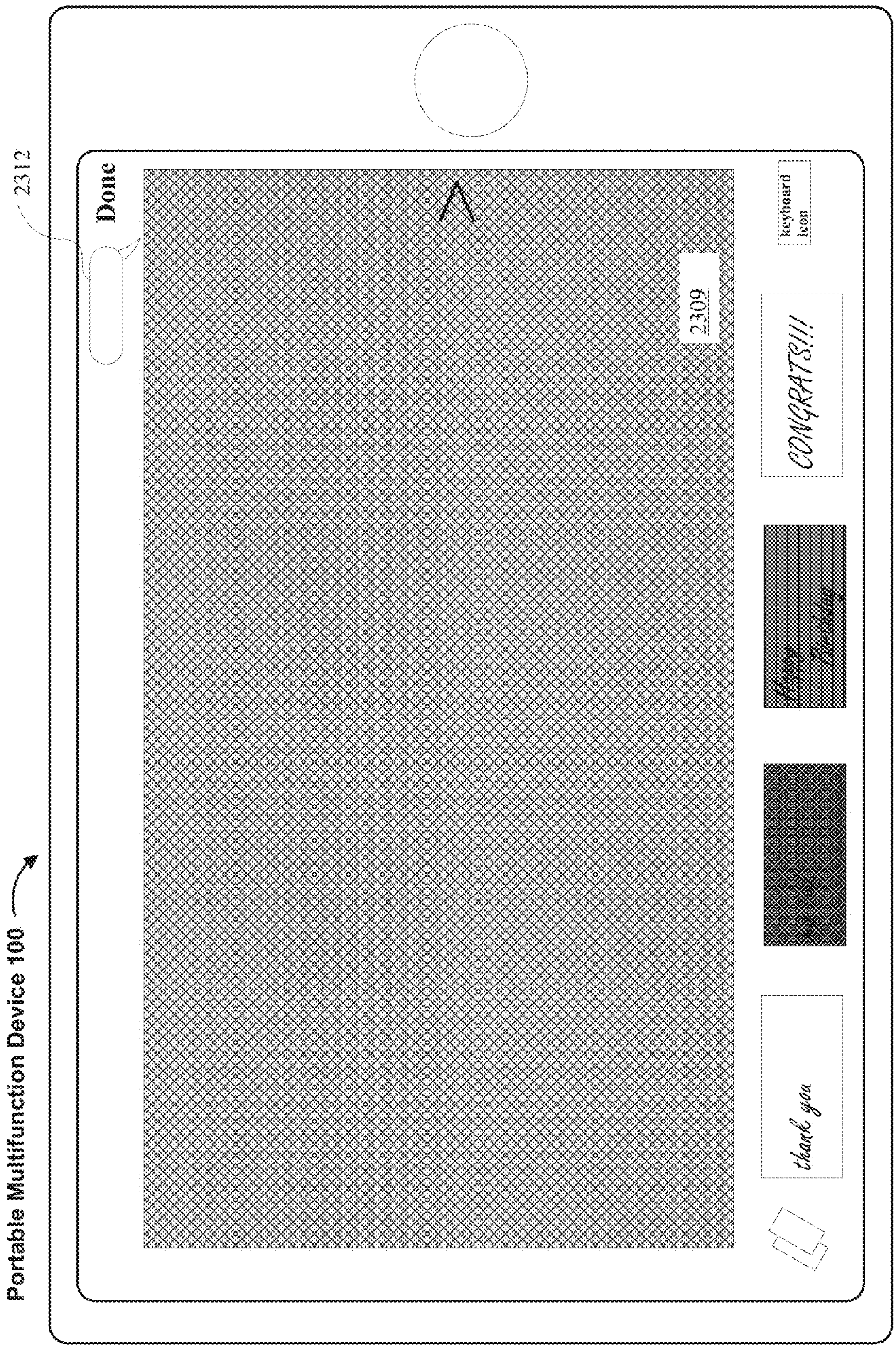

In some embodiments, users may select background colors and/or patterns for the handwritten inputs (e.g., in response to user input 2308, FIG. 23E, the device displays a background selection user interface, FIG. 23F). In response to a selection (e.g., tap 2310, FIG. 23F), the device modifies a background for the user interface 2309 accordingly (as shown in FIG. 23G).

Figure 23H:
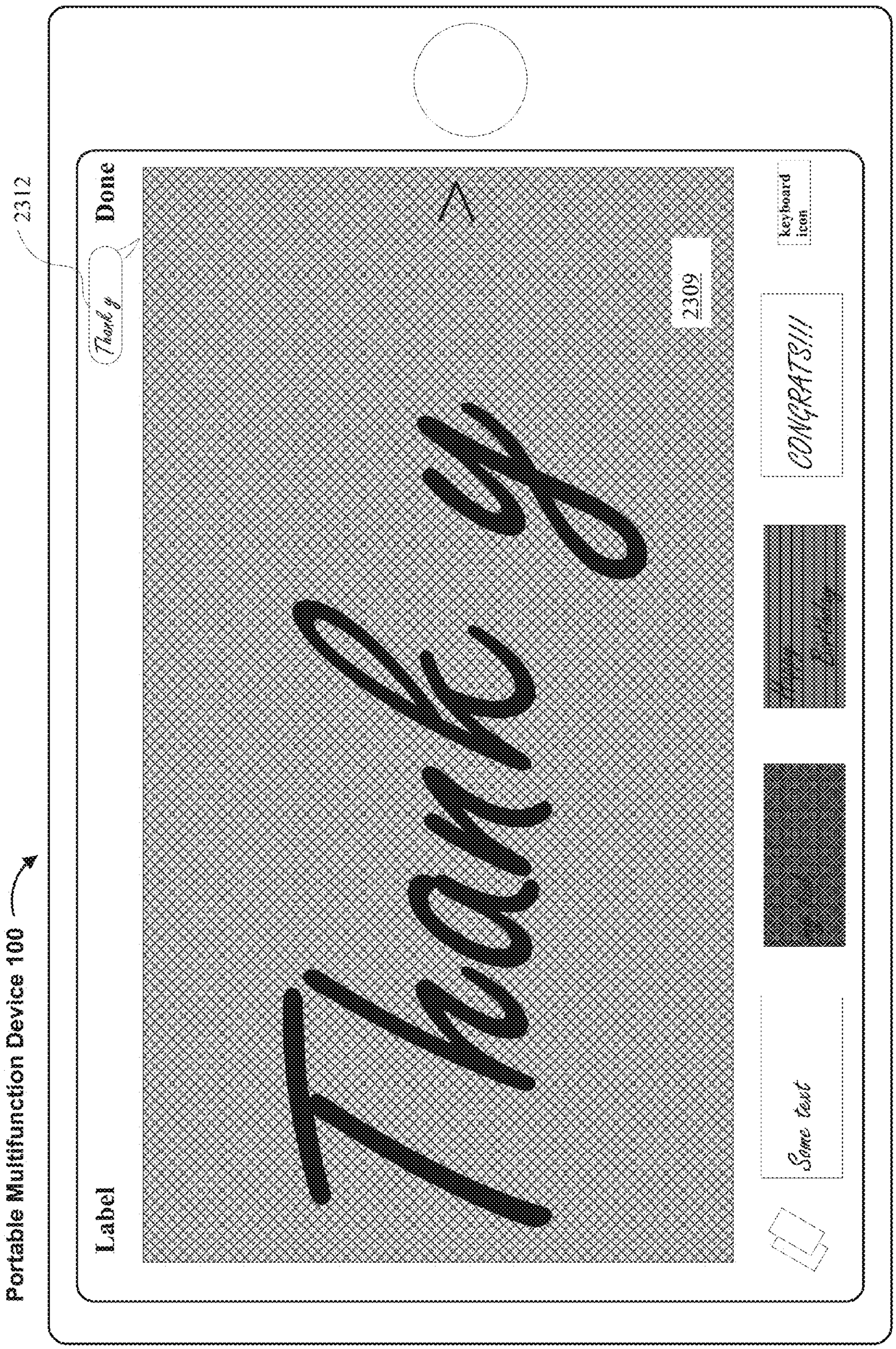
Figure 23I:
Figure 23J:

FIGS. 23H-23J illustrate that the user is able to provide the handwritten inputs at the user interface 2309 and, as the user is providing the handwritten inputs, the device presents a real-time preview 2312 of those handwritten inputs. The device may also allow the user to provide a label for a newly-provided handwritten input. For example, in response to a selection of "Label" shown in the upper left corner of FIG. 23J, the device displays a user interface that allows the user to provide a label.

Figure 23K:
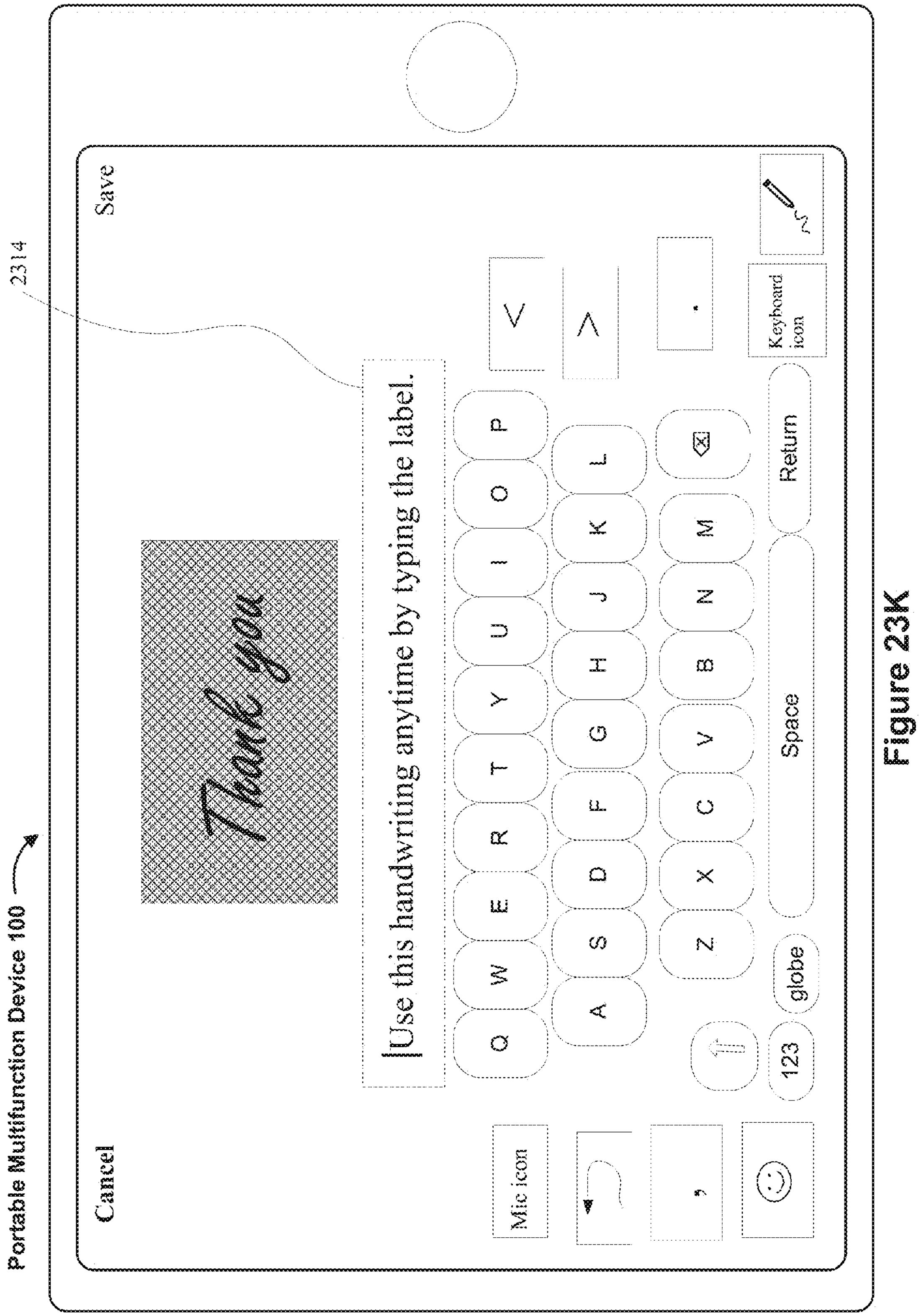
Figure 23L:
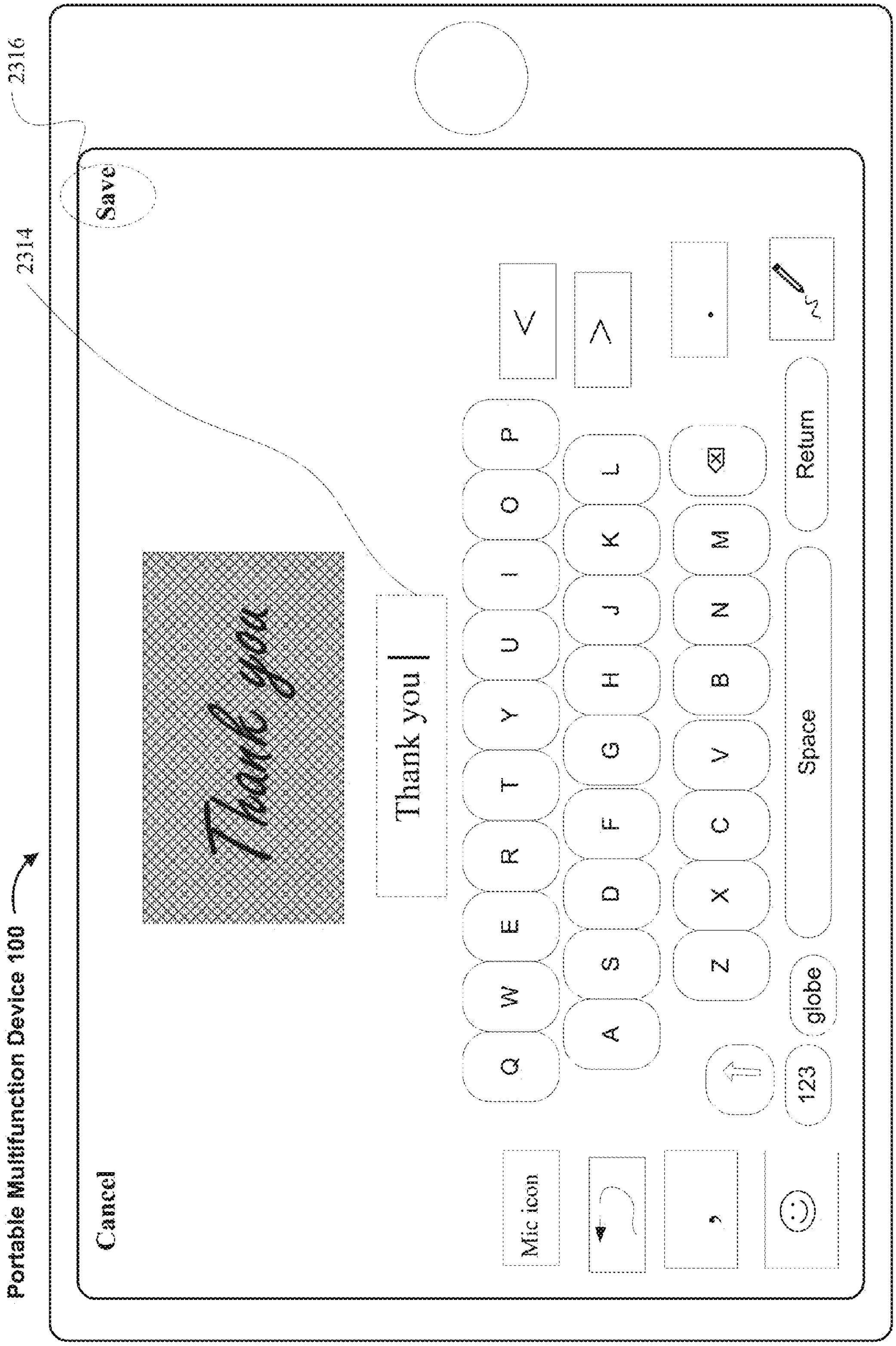
Figure 23M:

In some embodiments, the user is able to type the label into input region 2314 (as shown in FIGS. 23K-23L). In some embodiments, the input region 2314 is auto-populated with a suggested label (e.g., by applying an optical character recognition algorithm to the newly provided handwritten inputs the device is able to suggest an appropriate label). In response to user selection (e.g., tap 2316, FIG. 23L) of a "Save" affordance, the device saves the label and associates the newly-provided handwritten input (e.g., handwritten strokes for the newly-provided "Thank you" text) therewith. As shown in FIG. 23M, the device also provides an indication that the newly-provided handwritten input is associated with the label (e.g., indication 2318).

In some embodiments, in response to selection of a "Done" link (e.g., tap 2320) the device adds the newly-provided handwritten input to the message input-area 2303 and the user is then able to send the newly-provided handwritten input to other users. For example, as shown in FIGS. 23N-23V, after the user sends the newly-provided handwritten input, devices associated with the other users are instructed to render the handwritten input at a predetermined pace (e.g., a second electronic device 2360 presents an indication that the user is provided a handwritten input (e.g., indication 2322) and then the second device 2360 presents an animation of the handwritten input being drawn at the predetermined pace (as shown in FIGS. 23Q-23V for animation 2324)).

In some embodiments, line thickness for a particular handwritten stroke (e.g., strokes provided in conjunction with a particular handwritten input) is determined based on velocity and force applied by a user's finger (or stylus) during the particular handwritten stroke. In some embodiments, a number of ink-rendering techniques are utilized in order to accurately mimic the way that ink naturally swells on a surface (as discussed in more detail below).

Figure 23N:
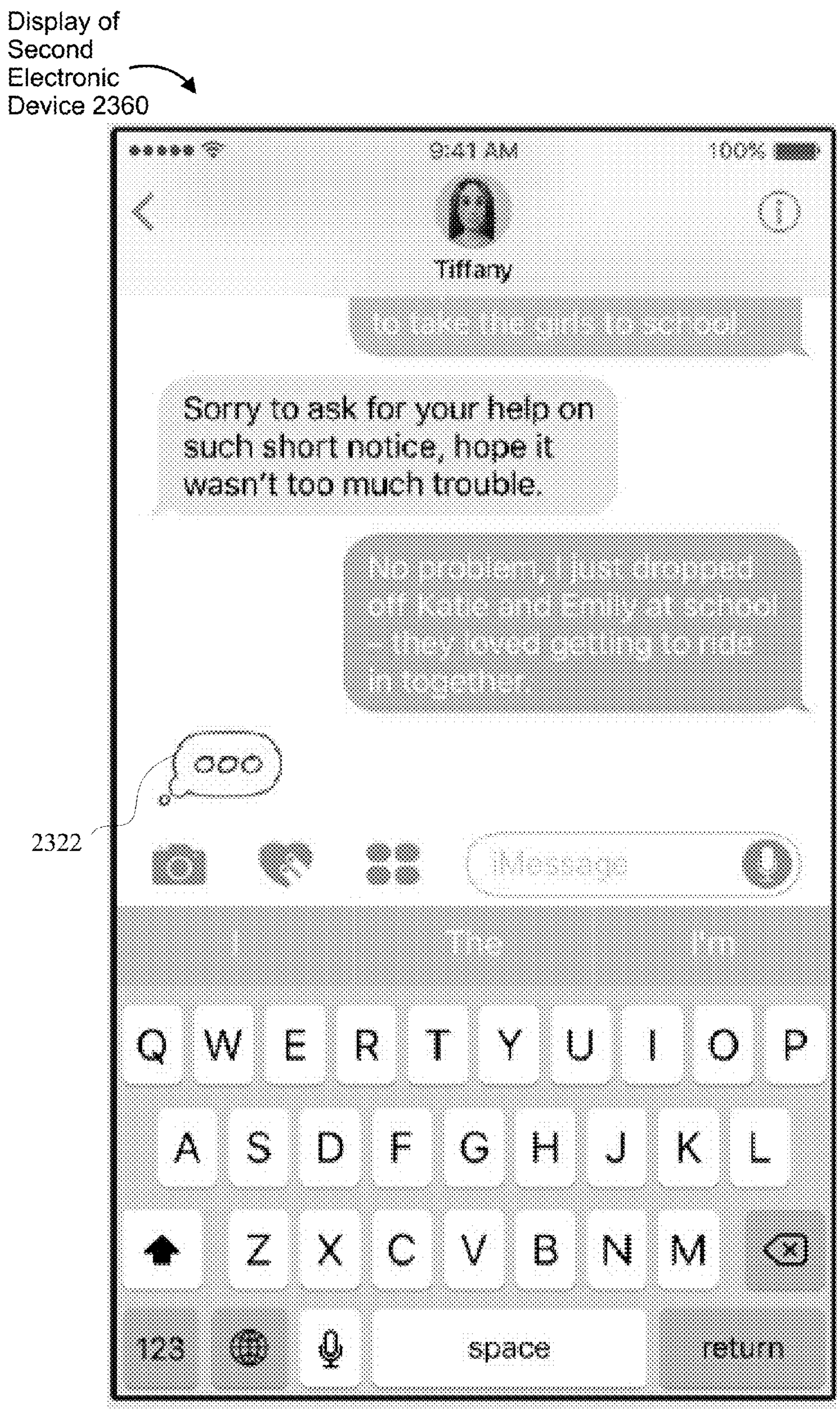
Figure 23O:
Figure 23P:
Figure 23Q:
Figure 23R:
Figure 23S:
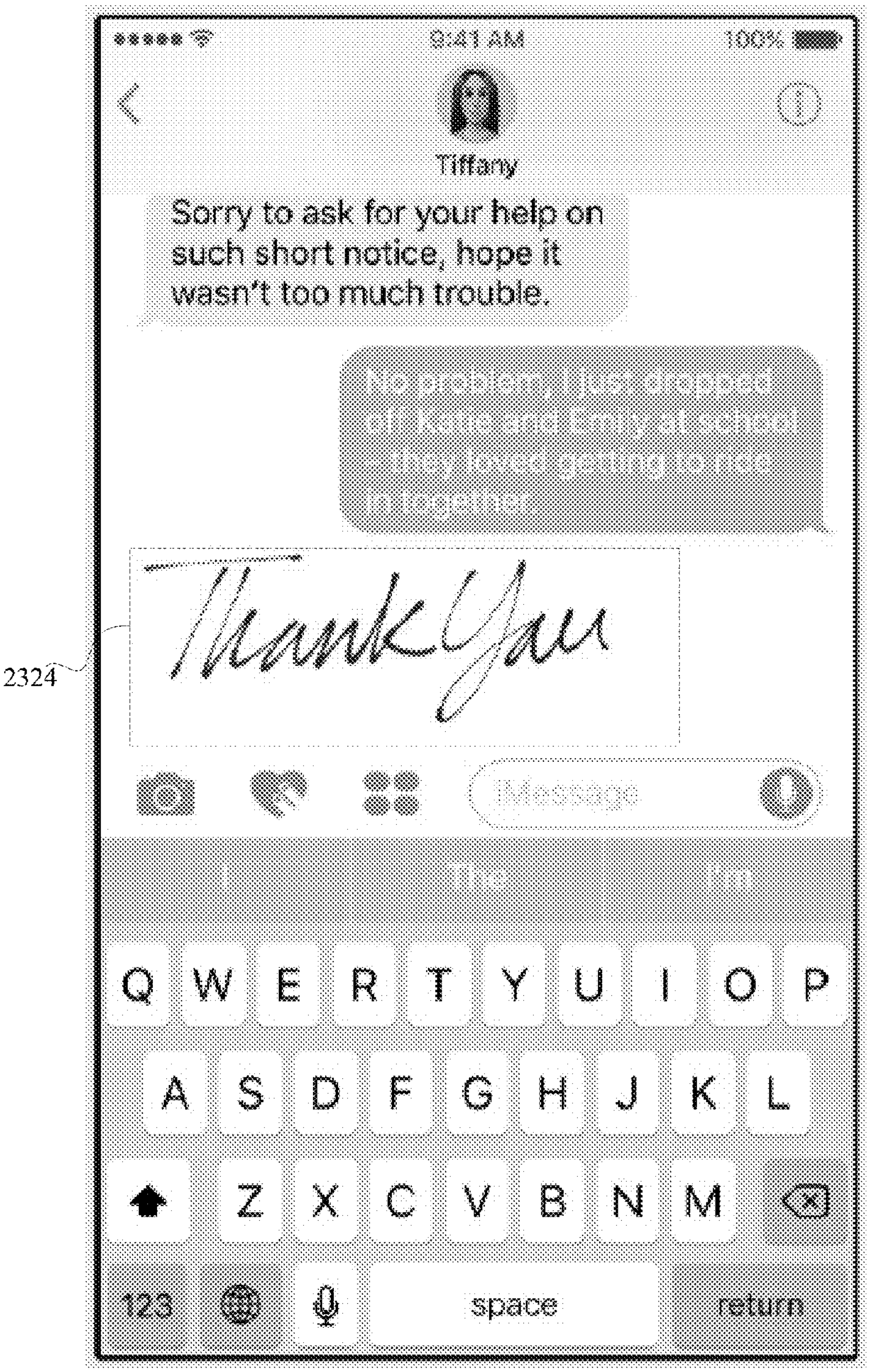
Figure 23T:
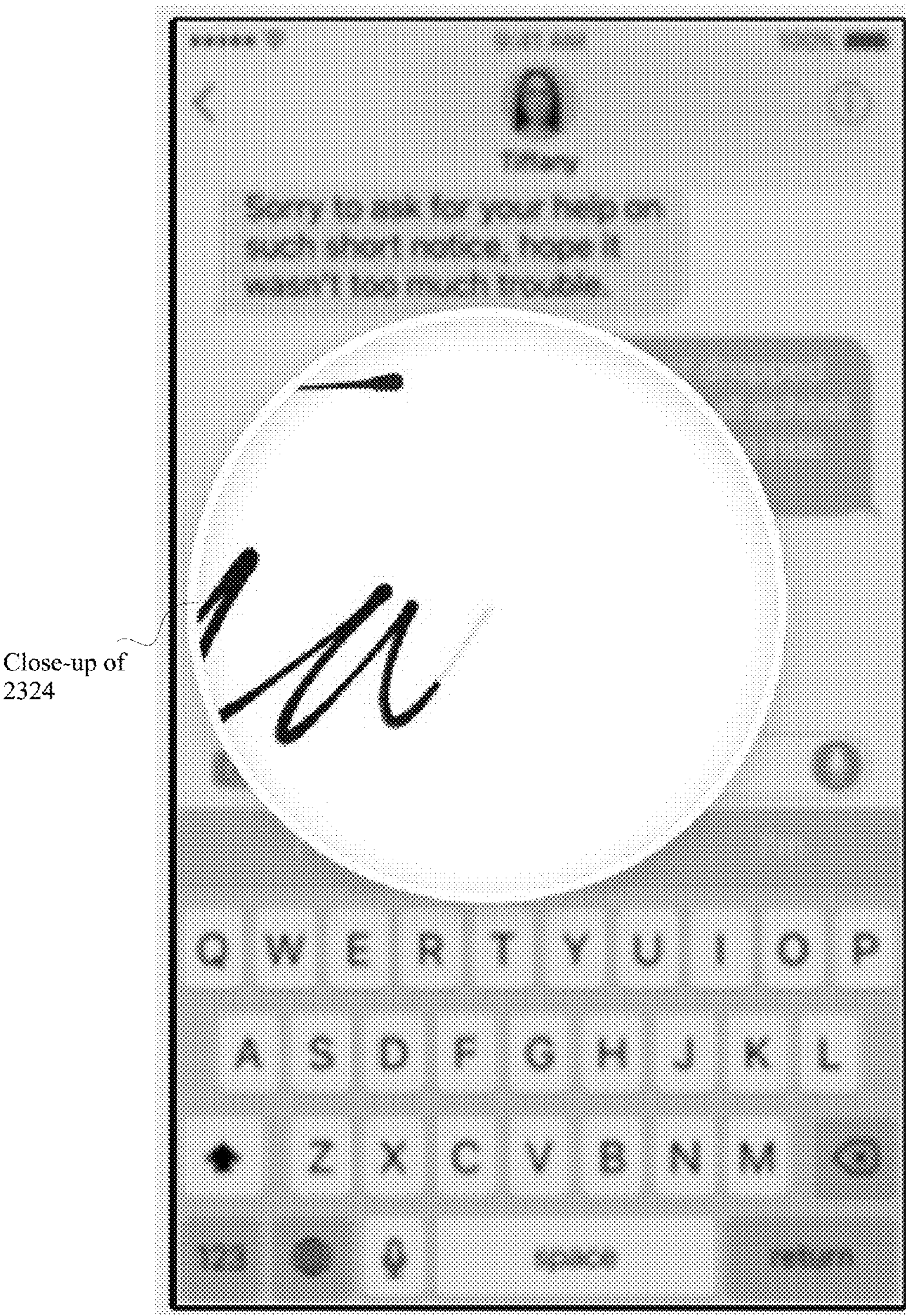
Figure 23U:
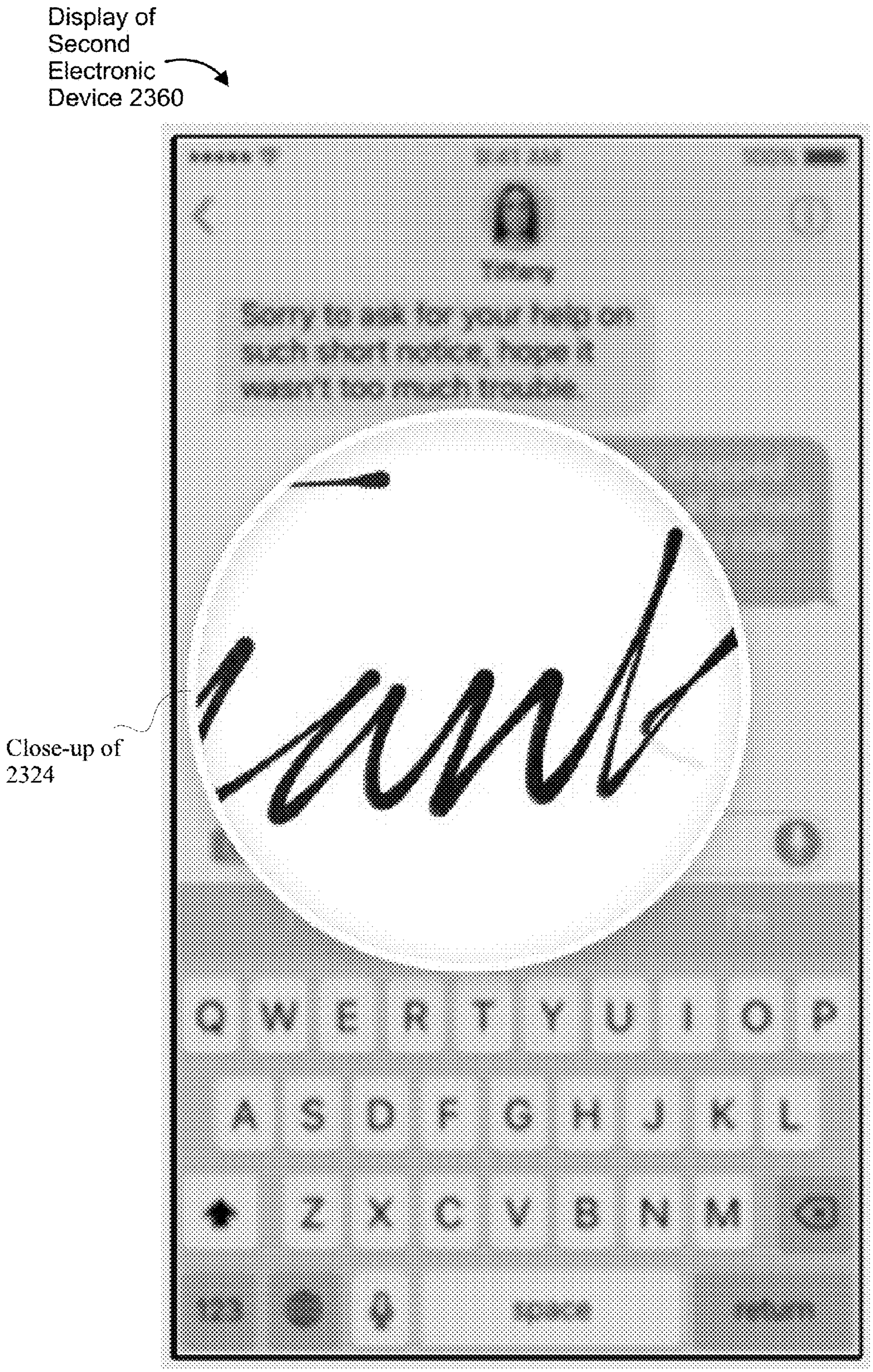
Figure 23V:
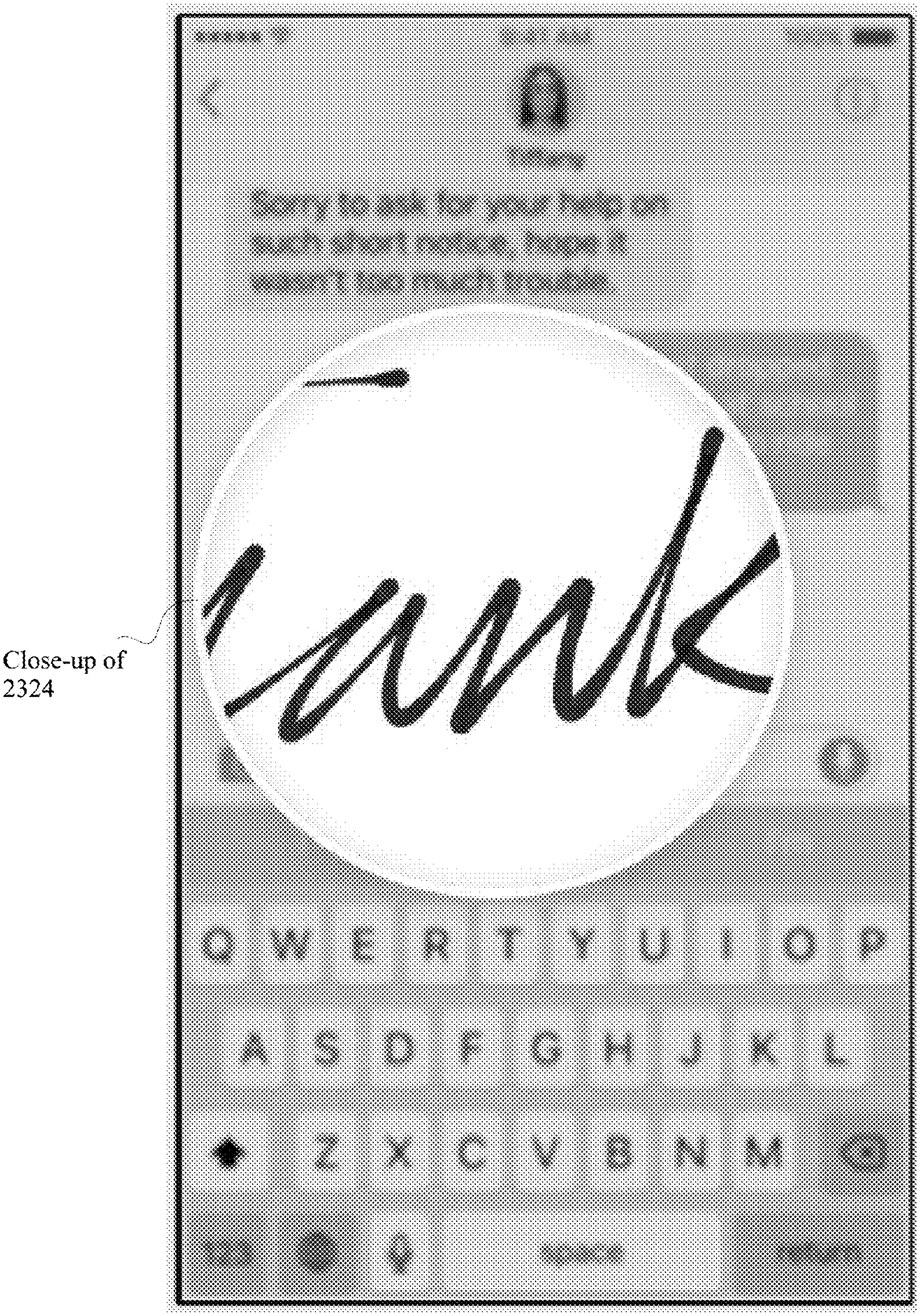
Figure 23W:

In some embodiments, users are also able to train a custom user-specific handwriting keyboard via the user interfaces shown in FIGS. 23W-23AB. In some embodiments, after successfully training the handwriting keyboard, the device is able to present the custom user-specific handwriting keyboard (as shown in FIG. 23AC).

As shown in FIG. 23AE, in some embodiments, in addition to providing handwritten text, users are also able to provide handwritten drawings (or a combination of handwritten text and handwritten drawings). Any of the techniques discussed herein with respect to handwritten text are also applicable to handwritten drawings (such as the goldfish sketch shown in FIG. 23AE).

As shown in FIGS. 23AD-23AE, in some embodiments, the user interfaces for providing and presenting handwritten inputs are different depending on certain physical characteristics of a display that is in communication with the electronic device (also discussed above). In some embodiments, FIG. 23AD-23AE represent user interfaces shown on a device that is in communication with a display of approximately 9.4 inches (about 240 mm), such as an iPad Air (or a device with a larger display, such as an iPad Pro) from Apple Inc. of Cupertino, Calif. In order to utilize these larger display sizes, the handwriting input area is displayed at the same time as the conversation transcript (upper right corner) and a listing of current conversations that the user is part of (upper left corner). In some embodiments, any of the details provided herein in reference to handwriting input area 2309 are applicable to the handwriting input area shown in FIGS. 23AD-23AE.

Figure 24B:
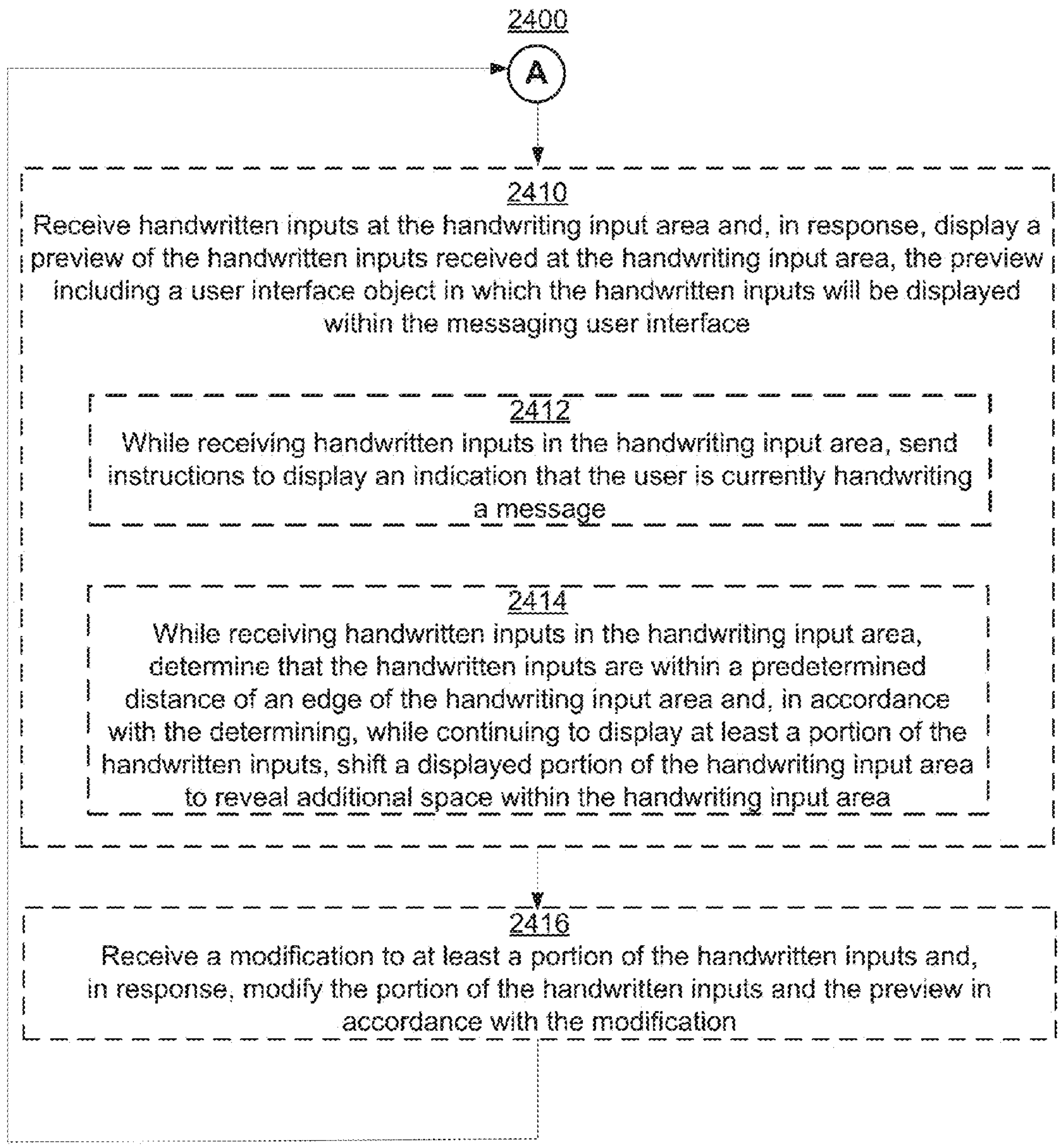
Figure 24C:
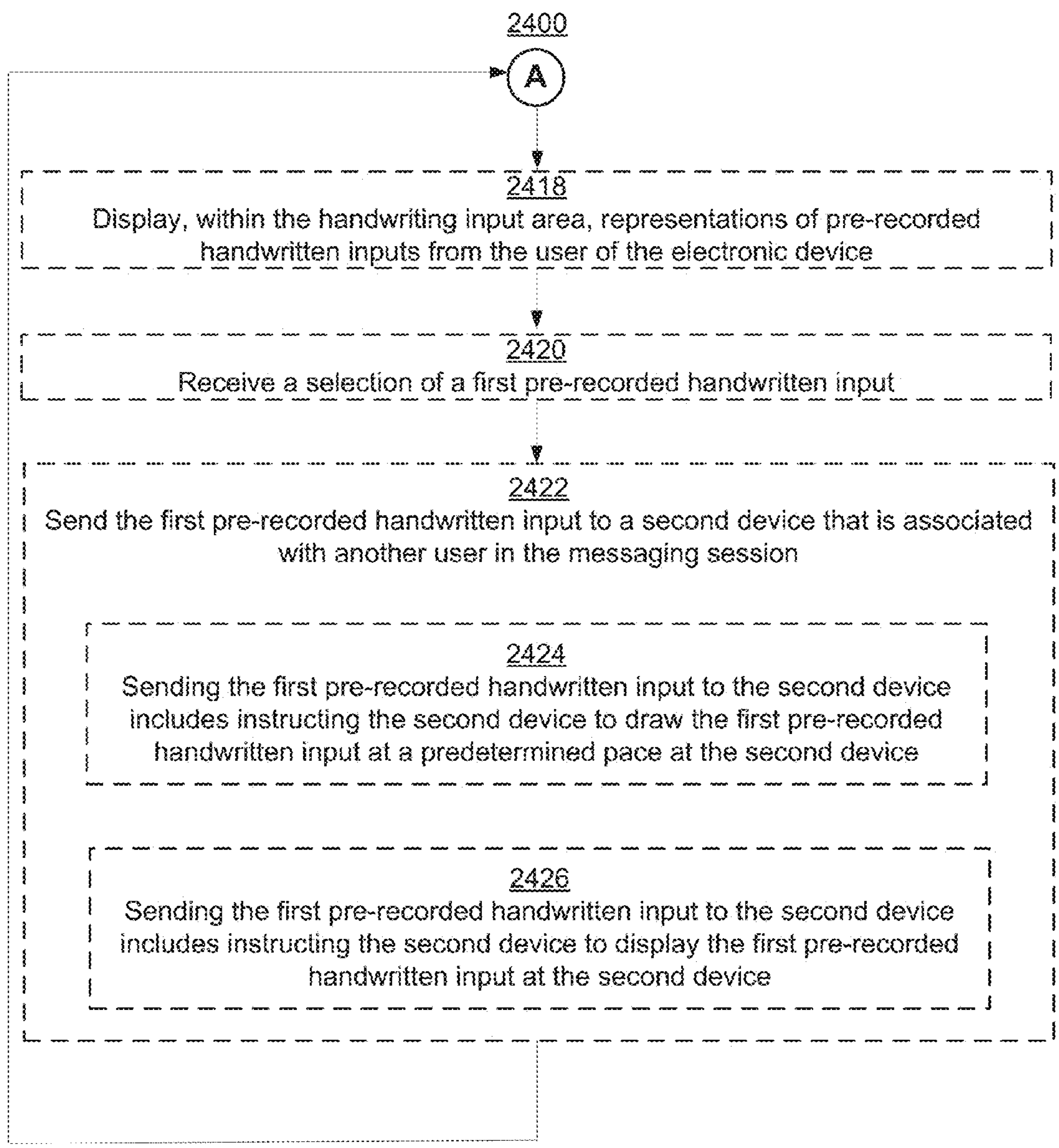

FIGS. 24A-24C are flow diagrams illustrating a method 2400 of providing and presenting user-specific handwritten inputs in a messaging application, in accordance with some embodiments. The method 2400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2400 are, optionally, combined and/or the order of some operations is, optionally, changed.

As described below, the method 2400 provides an intuitive way to provide and present user-specific handwritten inputs in a messaging application. The method helps to improve user satisfaction with their devices and produces more efficient human-machine interfaces by allowing users, e.g., to simply rotate their device in order to begin entering handwritten inputs. Such methods and interfaces also produce more efficient human-machine interfaces by allowing to easily, efficiently, and quickly select handwritten inputs for inclusion in a conversation transcript of a messaging application. For battery-operated devices, such methods and interfaces conserve power and increase the time between battery charges. Furthermore, allowing users to simply rotate their devices in order to begin entering handwritten inputs and allowing users to easily, efficiently, and quickly select handwritten inputs enhances the operability of the devices and makes user-device interfaces (e.g., in the messaging application) more efficient (e.g., by allowing users to easily customize their message content with handwritten inputs) which, additionally, reduces power usage and improves battery life of the device by enabling the user to use the device more quickly and efficiently (e.g., the user need not leave the messaging application, open and use a different application to input or locate handwritten inputs, and then return to use those inputs in the messaging application, instead the user simple provides and/or selects custom handwritten inputs directly within the messaging application).

As shown in FIG. 24A, while the electronic device is in a portrait orientation, the device displays (2402, on the display, a messaging user interface (e.g., a messaging user interface that includes a conversation transcript of a messaging session between a user of the electronic device and at least one other user), the messaging user interface including a virtual keyboard. An example messaging user interface is shown in FIG. 23A. In some embodiments, the virtual keyboard is not configured to accept handwritten input. In some embodiments, the keyboard is a QWERTY, emoji, or other type of virtual keyboard that does not accept handwritten input (such as the QWERTY keyboard shown in FIG. 23A.

The device detects (2404) a change in the orientation of the electronic device from the portrait orientation to a landscape orientation (e.g., a user of the device physically rotates the device approximately 90 degrees along an axis). As an example, in FIG. 23D, the device 100 is oriented in the portrait orientation and, in FIG. 23E, the device is oriented in a landscape orientation.

In response to detecting the change in the orientation of the electronic device (e.g., between FIGS. 23A and 23E, and also between FIGS. 23D and 23E), the device ceases to display (2406) the virtual keyboard and displays, on the display, a handwriting input area (e.g., area 2309, FIG. 23E) that is configured to accept handwritten input from a user of the electronic device. As shown in FIGS. 23D-23E, upon detecting the change in orientation from portrait to landscape, the device displays the handwriting input area 2309 and no longer displays the messaging user interface. In some embodiments, the handwriting input area is displayed in accordance with a determination that the user previously selected a handwriting input affordance (e.g., the user selects the affordance in order to ensure that when the device is oriented in landscape, the handwriting input area will be immediately displayed without requiring the user to manually choose to display the handwriting input area). In this way, by simply rotating the device 100, the user is able to enter a handwriting input mode and begin providing handwritten inputs, thus, producing an efficient human-machine interface for providing handwritten inputs in a messaging application.

In some embodiments, ceasing to display the virtual keyboard includes (2408) ceasing to display a conversation transcript that is included in the messaging user interface while the orientation of the electronic device is in the portrait orientation (as shown between FIGS. 23A and 23E and between FIGS. 23D and 23E, after the device is rotated to the landscape orientation, the conversation transcript is no longer displayed). In this way, by displaying only the handwriting input area 2309 (i.e., the handwriting input area 2309 occupies substantially all of the display 112) and ceasing to display the conversation transcript, the user is presented with a large canvas on which to provide handwritten inputs. Presenting a large canvas on which to provide handwritten inputs enhances the operability of the device 100 and makes the user-device interface more efficient (e.g., by providing the user with sufficient space to accurately provide handwritten inputs).

After displaying the handwriting input area 2309, users are able to provide handwriting inputs (as discussed in reference to operations 2410-2416, FIG. 24B) and users are able to select representations pre-recorded handwritten inputs (as discussed in reference to operations 2418-2426).

Users may perform these operations in any order (e.g., provide handwritten inputs and then later select representations, or vice versa, and may repeat these operations as needed to produce desired handwritten text). In this way, users are able to easily and efficiently provide new handwritten inputs, provide typed inputs, and/or select pre-recorded handwritten inputs in order to produce varied messages to add to a conversation transcript in a messaging application.

Turning now to FIG. 24B, in some embodiments, the device receives (2410 handwritten inputs at the handwriting input area (e.g., the user begins to handwrite "Thank y" as shown in FIG. 23H). In some embodiments, in response to receiving the handwritten inputs, the device displays a (real-time/constantly updating) preview (e.g., preview 2312, FIG. 23H) of the handwritten inputs, the preview including a user interface object (message region/bubble) in which the handwritten inputs will be displayed within the messaging user interface. As shown in FIGS. 23H-23J, the preview of the handwritten inputs is shown in the upper right corner in a message bubble that will be used to display the handwritten inputs within the messaging user interface (e.g., after selecting and sending the handwritten inputs to another user, the handwritten inputs are shown within a messaging bubble in the messaging user interface). In some embodiments, handwritten inputs are not shown within message bubbles and are instead displayed as free-standing text within the messaging user interface. One example of a handwritten input within a messaging bubble is shown in FIG. 23B (e.g., message bubble 2305) and an example of a handwritten input outside of a messaging bubble is shown in FIG. 23B (e.g., message bubble 2307). By providing a live, real-time preview of the handwritten inputs, operability of the device 100 is enhanced and more efficient user-device interfaces are produced (e.g., by helping the user to provide proper inputs and reduce user mistakes when providing handwritten inputs).

In some embodiments, while receiving handwritten inputs in the handwriting input area, the device sends (2412) (e.g., to a server for routing to a second device of a second user who is in a messaging session with the user of the electronic device, or directly to the second device) instructions to display an indication that the user is currently handwriting a message (e.g., a message bubble with a simulated handwritten stroke and the message bubble is displayed within a conversation transcription of a messaging user interface at the second device, such as indication 2322 FIGS. 23N-23P). In some embodiments, the indication (e.g., 2322, FIGS. 23N-23P) that that user is currently handwriting a message is different than an indication that is provided when a user is typing a message using an input mechanism other than the handwriting input area (e.g., a virtual QWERTY keyboard).

In some embodiments, while receiving handwritten inputs in the handwriting input area, the device determines (2414) that the handwritten inputs are within a predetermined distance of an edge of the handwriting input area (e.g., within 1 px, 2 px, 3 px, 4 px, 5 px, or some other predefined distance) and, in accordance with the determining, while continuing to display at least a portion of the handwritten inputs, the device shifts a displayed portion of the handwriting input area to reveal additional space within the handwriting input area. For example, as shown in FIGS. 23H-23J, once the handwritten inputs approach within the predetermined distance of the edge, the handwriting input area is shifted to reveal additional space and to allow the user to continue fluidly providing the handwritten inputs. In some embodiments, by continuing to display at least a portion of the handwritten inputs, the user is still able to view some of the previously entered handwritten strokes in order to provide context as the user continues to provide additional handwritten inputs. By dynamically shifting a displayed region of the handwriting input area, operability of the device 100 is enhanced and more efficient user-device interfaces are provided (e.g., by shifting the displayed region, users are able to continue providing handwritten inputs in an uninterrupted fashion, while still being able to view a portion of previously providing handwriting strokes).

In some embodiments, the user is able to manually cause the device to shift the displayed portion of the handwriting input area (e.g., by selecting the ">" affordance shown in FIGS. 23H-23J). In some embodiments, the user is able to provide a two finger swipe gesture in a substantially horizontal direction in order to cause the device to shift the displayed portion of the handwriting input area as well (in order to allow the user to easily navigate to the left or right of a particular handwritten input that is currently displayed on the user interface 2309).

In some embodiments, the device receives (2416) a modification to at least a portion of the handwritten inputs (e.g., an annotation or embellishment of some previously-completed handwriting strokes, or a request to undo a portion of the handwritten inputs.) and, in response to receiving the modification, the device modifies the portion of the handwritten inputs and the preview (e.g., 2312) in accordance with the modification. For example, in response to an undo request (e.g., the user clicks an undo button (not pictured) displayed proximate to or within the handwriting input area 2309), the device deletes a last handwritten stroke provided by the user and concurrently deletes the same stroke from the preview 2312. In some embodiments, if the user taps over the undo button and keeps in contact with the undo button for a predetermined period of time (e.g., 2 seconds or more), the device clears the entire handwriting canvas (e.g., user interface/canvas 2309).

Turning now to FIG. 24C, the device displays (2418), within (or near/next to) the handwriting input area, representations of pre-recorded handwritten inputs from the user of the electronic device. In some embodiments, the pre-recorded handwritten inputs are displayed below the handwritten input area (e.g., as shown in FIG. 23J, representations are shown for "my bad," "Happy Birthday", and "CONGRATS!!!") and each one is available for selection by the user. In some embodiments, after selecting a first of the pre-recorded handwritten inputs, the handwritten input area is updated to include the first pre-recorded handwritten input and the user is then able to modify the input or include it in the conversation transcript for sending to other users. In some embodiments, in addition to representations of pre-recorded handwritten inputs, the device also displays representations of default pre-stored handwritten inputs.

In some embodiments, in addition to being able to modify pre-recorded handwritten inputs, users are also able to select them for sending to other users (e.g., as shown in FIG. 23B, input 2304 is provided for selecting a representation of the handwritten input "Thank you"). In some embodiments, the device receives (2420) a selection of a first pre-recorded handwritten input (e.g., input 2304, FIG. 23B) and sends (2422) the first pre-recorded handwritten input (or a representation thereof, or instructions for re-producing the first pre-recorded handwritten input) to a second device that is associated with another user in the messaging session, and sending the first pre-recorded handwritten input to the second device includes instructing the second device to draw the first pre-recorded handwritten input at a predetermined pace at the second device.

For example, as shown in FIGS. 23Q-23V for region 2324 of a messaging application on a second electronic device 2360, in response to user selection of a representation of a first pre-recorded handwritten input of "Thank you," a second device 2360 receives instructions to draw the first pre-recorded handwritten input at the predetermined pace. Additional details are provided below regarding ink-regarding techniques utilized to accurately simulate drawing on of the pre-recorded handwritten input.

In some embodiments, instead of drawing the first pre-recorded handwritten input, the second electronic device 2360 just displays (2426) the first pre-recorded handwritten input (i.e., without the drawing discussed above). For example, the second device 2360 just displays the message region 2324 as shown in FIG. 23S, instead of rendering the drawing effects. Stated another way, in some embodiments, the first pre-recorded handwritten input is added to the messaging user interface at the second device 2360 and is displayed without an animation effect (e.g., without drawing the handwritten input at the predetermined pace).

In some embodiments, the predetermined pace corresponds (2424) to a writing pace that was used by the user while providing the first pre-recorded handwritten input. In some embodiments, the predetermined pace corresponds to a writing pace that is different than a pace that was used by the user while providing the first pre-recorded handwritten input (e.g., a default pace for presenting handwritten inputs).

In some embodiments, the handwriting input area is available while the device is in the portrait orientation (e.g., for devices with larger displays). In some embodiments, in order to access the handwriting input area while the device is in the portrait orientation, a handwritten input selection affordance is included in the messaging user interface (e.g., affordance shown as being selected by input 2302A, FIG. 23A, or the affordance shown as being selected by input 2302B, FIG. 23A). In response to detecting selection of the handwritten input selection affordance, the device ceases to display the virtual keyboard and displays the handwriting input area and representations of pre-recorded handwritten inputs from the user of the electronic device. In some embodiments, the handwritten input selection affordance is only available while in the portrait orientation if the device has a touch-sensitive display that is above a predefined size (e.g., a touch-sensitive display that is at least 7.9 inches, such as those available on iPad and iPad mini devices from APPLE of Cupertino, Calif.) or a touch-sensitive display that has a resolution that is above a predefined threshold (such as 2048×1536 pixels at 346 ppi, or better, such as those available on the aforementioned devices from APPLE). Stated another way, in some embodiments, smaller smart phones do not have a handwritten input selection affordance displayed at all while the orientation of the smaller device is the portrait orientation and, therefore, the handwritten input area is only available while these smaller devices are oriented in the landscape orientation.

It should be understood that the particular order in which the operations in FIGS. 24A-24C have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2400 described above. For example, the contacts, gestures, user interface objects, intensity thresholds, focus selectors, and animations described above with reference to method 2400 optionally have one or more of the characteristics of the contacts, gestures, user interface objects, intensity thresholds, focus selectors, and animations described herein with reference to other methods described herein. For brevity, these details are not repeated here.

In some embodiments, the method 2400 described above in reference to FIGS. 24A-24C utilizes one or more of the techniques described below to render ink on the display in order to accurately simulate the way that ink is applied to a surface.

Figure 25:
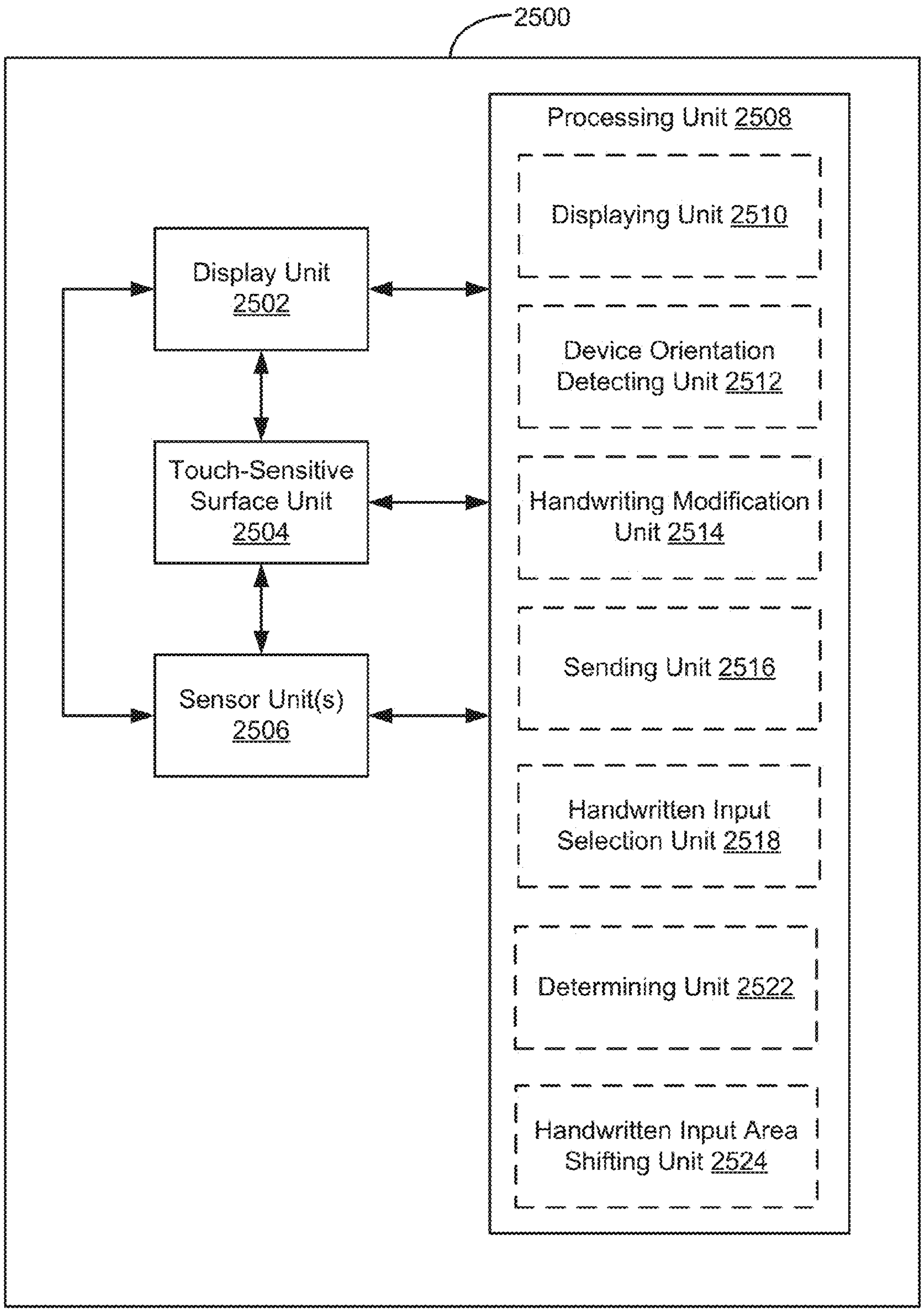
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display a user interface, a touch-sensitive surface unit 2504 configured to receive contacts, one or more sensor units 2506 for detecting intensities of contacts on the touch-sensitive surface unit 2504; and a processing unit 2508 coupled with the display unit 2502, the touch-sensitive surface unit 2504 and the one or more sensor units 2506. In some embodiments, the processing unit 2508 includes a displaying unit 2510, a device orientation detecting unit 2512, a handwriting modification unit 2514, a sending unit 2516, a handwritten input selection unit 2518, a determining unit 2520, and/or a handwritten input area shifting unit 2524.

The processing unit 2508 is configured to while the electronic device is in a portrait orientation, display (e.g., with the displaying unit 2510), on the display (e.g., the display unit 2502), a messaging user interface, the messaging user interface including a virtual keyboard; detect a change in the orientation of the electronic device from the portrait orientation to a landscape orientation (e.g., with the device orientation detecting unit 2512); and, in response to detecting the change in the orientation of the electronic device: cease to display the virtual keyboard (e.g., with the displaying unit 2510); and display, on the display, a handwriting input area that is configured to accept handwritten input from a user of the electronic device (e.g., with the displaying unit 2510).

In accordance with some embodiments of the electronic device 2500, the processing unit is configured to: receive handwritten inputs at the handwriting input area (e.g., with the handwritten modification unit 2514); and in response to receiving the handwritten inputs, display a preview of the handwritten inputs, the preview including a user interface object in which the handwritten inputs will be displayed within the messaging user interface (e.g., with the displaying unit 2510).

In accordance with some embodiments of the electronic device 2500, the processing unit is further configured to: receive a modification to at least a portion of the handwritten inputs (e.g., with the handwritten modification unit 2514)

and, in response to receiving the modification, modify the portion of the handwritten inputs and the preview in accordance with the modification (e.g., with the handwritten modification unit 2514).

In accordance with some embodiments of the electronic device 2500, the processing unit is further configured to: while receiving handwritten inputs in the handwriting input area, send instructions to display an indication that the user is currently handwriting a message (e.g., with the sending unit 2516).

In accordance with some embodiments of the electronic device 2500, the processing unit is further configured to: display, within the handwriting input area, representations of pre-recorded handwritten inputs from the user of the electronic device (e.g., with the displaying unit 2510).

In accordance with some embodiments of the electronic device 2500, the processing unit is further configured to: receive a selection of a first pre-recorded handwritten input (e.g., with the handwritten input selection unit 2518); and send the first pre-recorded handwritten input to a second device that is associated with another user in the messaging session (e.g., with the sending unit 2516), and sending the first pre-recorded handwritten input to the second device includes instructing the second device to draw the first pre-recorded handwritten input at a predetermined pace at the second device.

In accordance with some embodiments of the electronic device 2500, the predetermined pace corresponds to a writing pace that was used by the user while providing the first pre-recorded handwritten input.

In accordance with some embodiments of the electronic device 2500, the predetermined pace corresponds to a writing pace that is different than a pace that was used by the user while providing the first pre-recorded handwritten input.

In accordance with some embodiments of the electronic device 2500, the processing unit is further configured to: receive a selection of a first pre-recorded handwritten input (e.g., with the handwritten input selection unit 2518); and send the first pre-recorded handwritten input to a second device that is associated with another user in the messaging session (e.g., with the sending unit 2516), and sending the first pre-recorded handwritten input to the second device includes instructing the second device to display the first pre-recorded handwritten input at the second device.

In accordance with some embodiments of the electronic device 2500, the processing unit is further configured to: while receiving handwritten inputs in the handwriting input area, determine that the handwriting inputs are within a predetermined distance of an edge of the handwriting input area (e.g., with the determining unit 2522) and, in accordance with the determining, while continuing to display at least a portion of the handwritten inputs, shift a displayed portion of the handwriting input area to reveal additional space within the handwriting input area (e.g., with the handwritten input area shifting unit 2524).

In accordance with some embodiments of the electronic device 2500, ceasing to display the virtual keyboard includes ceasing to display a conversation transcript that is included in the messaging user interface while the orientation of the electronic device is in the portrait orientation.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 24A-24C are, optionally, implemented by components depicted in FIGS. 1A-1B or FIG. 25. For example, some operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26A:
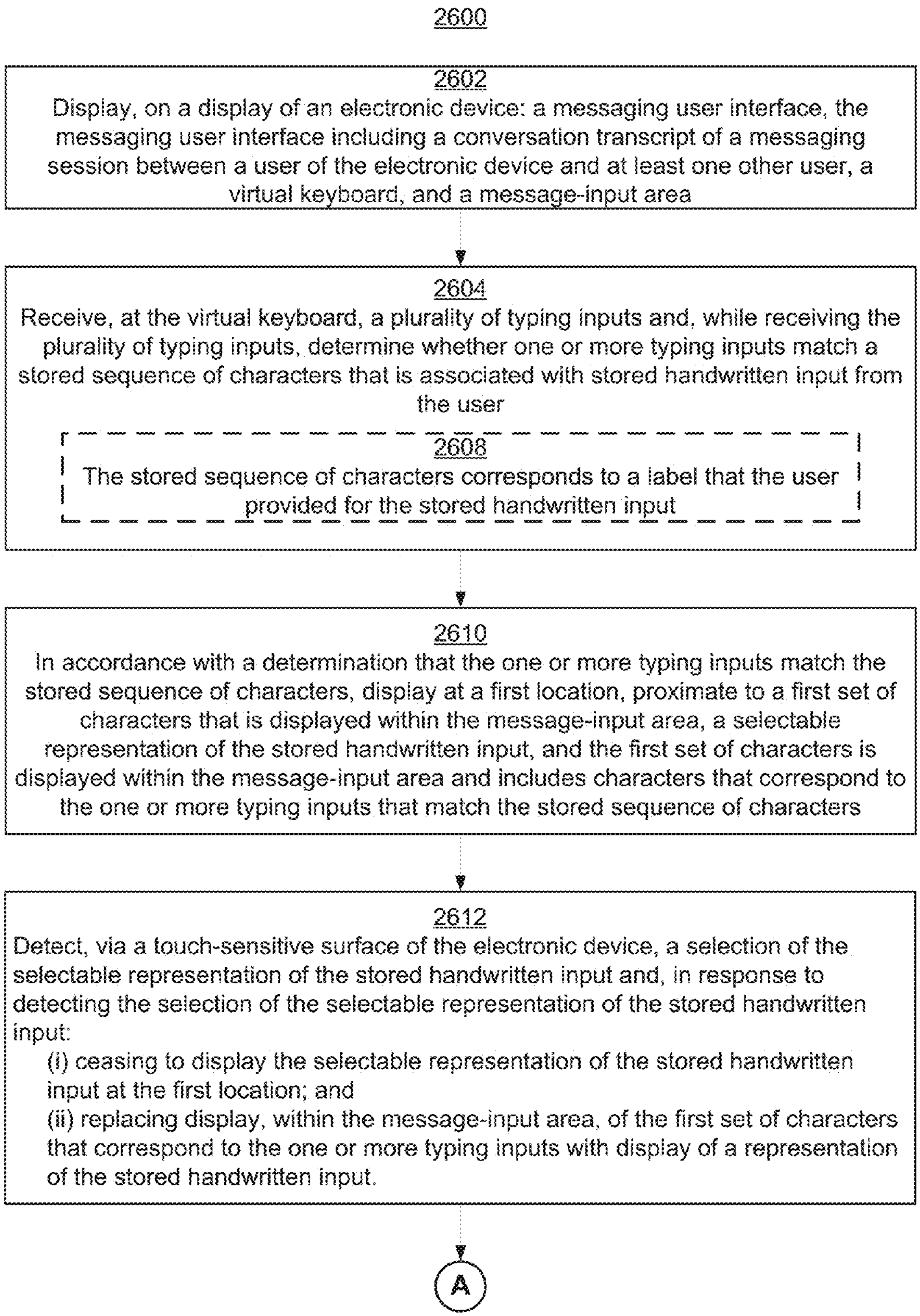

FIGS. 26A-26B are flow diagrams illustrating a method 2600 of providing and presenting user-specific handwritten inputs in a messaging application, in accordance with some embodiments. The method 2600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2600 are, optionally, combined and/or the order of some operations is, optionally, changed.

As described below, the method 2600 provides an intuitive way to provide and present user-specific handwritten inputs in a messaging application. The method helps to improve user satisfaction with their devices and produces more efficient human-machine interfaces by allowing users, e.g., to efficiently auto-replace typed inputs with handwritten inputs. For battery-operated devices, such methods and interfaces conserve power and increase the time between battery charges (e.g., by requiring only a single input to auto-replace a particular sequence of typed inputs with an associated handwritten input).

The device displays (2602), on the display: a messaging user interface, the messaging user interface including a conversation transcript of a messaging session between a user of the electronic device and at least one other user (e.g., including the message regions displaying messages exchanged between the user and the at least one other user, as shown in FIG. 23A), a virtual keyboard (e.g., the virtual QWERTY keyboard shown in FIG. 23A), and a message-input area (e.g., message-input area 2303, FIG. 23B).

The device also receives (2604), at the virtual keyboard, a plurality of typing inputs (the user types a plurality of keys on the display virtual QWERTY keyboard). For example, as shown in FIG. 23C (showing close-ups of the message-input area 2303) the user types (in other words, the plurality of typing inputs include the following inputs) "Thank you for helping to play all of this! I think he is going to be really surprised!" While receiving the plurality of typing inputs, the device determines whether one or more typing inputs of the plurality of typing inputs match a stored sequence of characters that is associated with stored handwritten input from the user. In some embodiments, the stored sequence of characters corresponds (2608) to a label that the user provided for the stored handwritten input. For example, the user inputs a variety of handwritten inputs and associates a label with each respective handwritten input (e.g., as shown in FIG. 23K-23M, the user associates a label of thank you with recently-typed handwritten text for "Thank you").

In accordance with a determination that the one or more typing inputs match the stored sequence of characters (e.g., that the typed inputs "Thank you" match the stored label of "Thank you"), the device displays (2610) at a first location, proximate to a first set of characters that is displayed within the message-input area, a selectable representation of the stored handwritten input (e.g., selectable representation 2392A and 2392B shown in FIG. 23C), and the first set of characters is displayed within the message-input area and includes characters that correspond to the one or more typing inputs that match the stored sequence of characters.

The device also detects (2612), via the touch-sensitive surface, a selection of the selectable representation of the stored handwritten input (e.g., detects one of the inputs 2306 shown in FIG. 23C). In response to detecting the selection of the selectable representation of the stored handwritten input, the device: ceases to display the selectable representation of the stored handwritten input at the first location and replaces display, within the message-input area, of the first set of characters that correspond to the one or more typing inputs with display of a representation of the stored handwritten input. For example, as shown in FIG. 23C, in response to input 2306, the device ceases to display the selectable representations 2392A/2392B and instead replaces the typed characters "Thank you" with a representation of the stored handwritten input that was displayed in the selectable representation. In this way, the user is able to provide a single input (just a selection of the selectable representation) in order to auto-replace typed text with handwritten text, thereby enhancing operability of the device 100 and making the user-device interface more efficient.

Turning now to FIG. 26B, in some embodiments, after replacing the first set of characters with the representation of the stored handwritten input, the message-input area (e.g., area 2303) includes (2614) both the representation of the stored handwritten input and at least a first typed input of the plurality of typed inputs. (In other words, the user's message includes both handwritten and typed text (as is shown in FIG. 23C). In this way, the user is able to personalize particular phrases within a single message without having to send handwritten text for the full contents of that single message, thereby enhancing operability of the device 100 and making the user-device interface more efficient.

In some embodiments, the device receives (2616) a request to send a message to the at least one other user and, in response to receiving the request, the device displays within the conversation transcript a user interface object that includes an animation that draws the stored handwritten input at a predetermined pace (as shown in FIGS. 23Q-23V for a second electronic device 2360 and, in some embodiments, the same animation is drawn at the predetermined pace at the device 100). In some embodiments, in response to receiving the request to send the message to the at least one other user, the device sends (through a server or directly to a second device 2360 that is associated with the at least one other user) instructions to render a user interface object that includes the animation that draws the stored handwritten input at the predetermined pace (as shown in FIGS. 23Q-23V).

In some embodiments, the predetermined pace corresponds to a writing pace that was used by the user while providing the stored handwritten input (thus allowing users to provided highly customized handwritten messages that include both the user's handwritten text and the predetermined pace at which the user's handwritten text was previously written). In some embodiments, the predetermined pace corresponds to a writing pace that is different from a pace that was used by the user while providing the stored handwritten input.

It should be understood that the particular order in which the operations in FIGS. 26A-26B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2600 described above. For example, the contacts, gestures, user interface objects, intensity thresholds, focus selectors, and animations described above with reference to method 2600 optionally have one or more of the characteristics of the contacts, gestures, user interface objects, intensity thresholds, focus selectors, and animations described herein with reference to other methods described herein. For brevity, these details are not repeated here.

In some embodiments, the method 2600 described above in reference to FIGS. 26A-26B utilizes one or more of the techniques described below to render ink on the display in order to accurately simulate the way that ink is applied to a surface.

Figure 27:
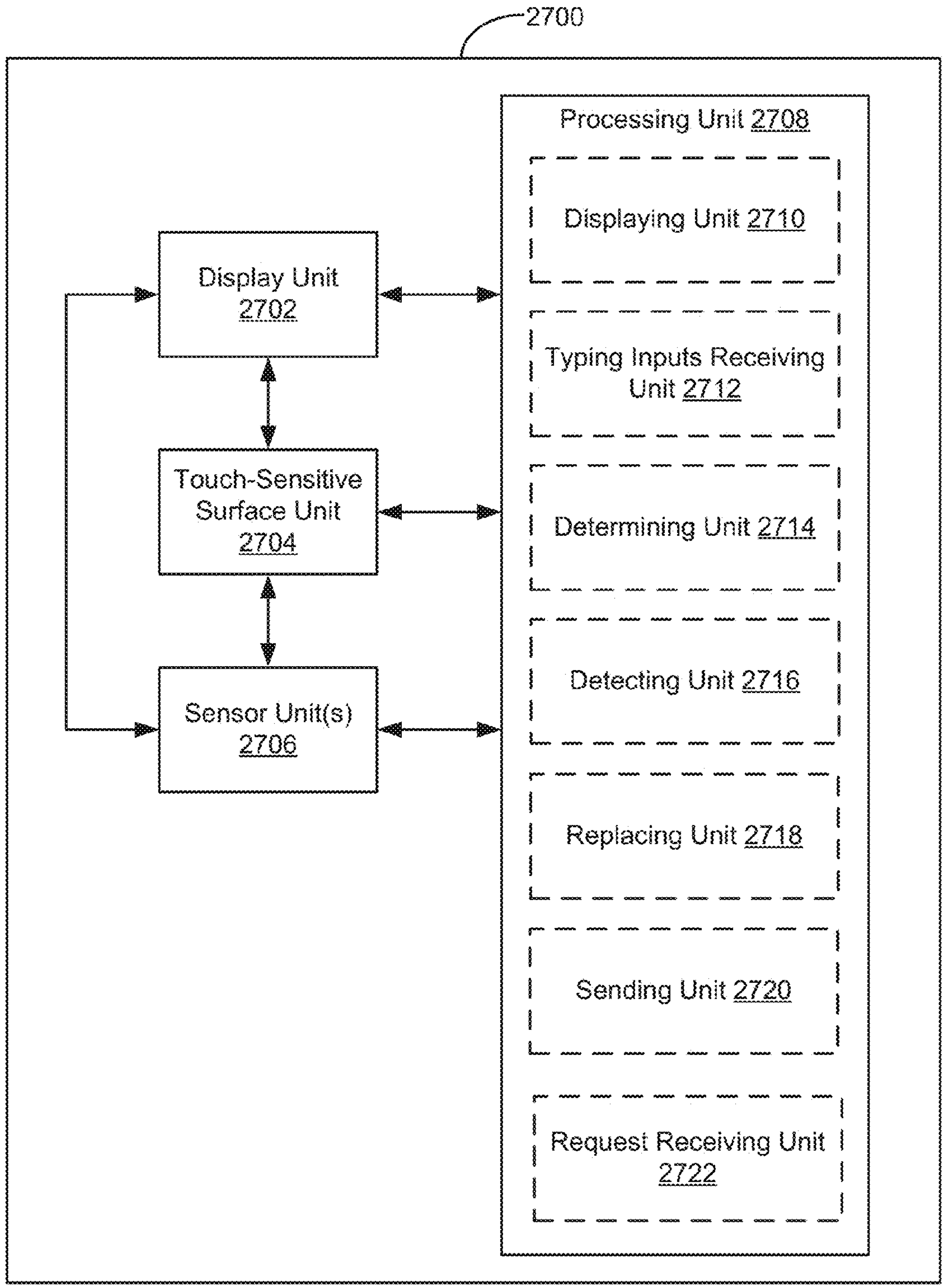
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a display unit 2702 configured to display a user interface, a touch-sensitive surface unit 2704 configured to receive contacts, one or more sensor units 2706 for detecting intensities of contacts on the touch-sensitive surface unit 2704; and a processing unit 2708 coupled with the display unit 2702, the touch-sensitive surface unit 2704 and the one or more sensor units 2706. In some embodiments, the processing unit 2708 includes a displaying unit 2710, a typing inputs receiving unit 2712, a determining unit 2714, a detecting unit 2716, a replacing unit 2718, a second unit 2720, and a request receiving unit 2722.

The processing unit 2708 is configured to display, on the display (e.g., with the displaying unit 2710 in conjunction with the display unit 2702), a messaging user interface, the messaging user interface including a conversation transcript of a messaging session between a user of the electronic device and at least one other user, a virtual keyboard, and a message-input area; receive, at the virtual keyboard, a plurality of typing inputs (e.g., with the typing inputs receiving unit 2712); while receiving the plurality of typing inputs, determine whether one or more typing inputs of the plurality of typing inputs match a stored sequence of characters that is associated with stored handwritten input from the user (e.g., with the determining unit 2714); in accordance with a determination that the one or more typing inputs match the stored sequence of characters, display (e.g., with the displaying unit 2710) at a first location, proximate to a first set of characters that is displayed within the message-input area, a selectable representation of the stored handwritten input, and the first set of characters is displayed within the message-input area and includes characters that correspond to the one or more typing inputs that match the stored sequence of characters; detect (e.g., with the detecting unit 2716)), via the touch-sensitive surface, a selection of the selectable representation of the stored handwritten input; and, in response to detecting the selection of the selectable representation of the stored handwritten input: cease to display (e.g., with the displaying unit 2710) the selectable representation of the stored handwritten input at the first location; and replace display (e.g., with the replacing unit 2718), within the message-input area, of the first set of characters that correspond to the one or more typing inputs with display of a representation of the stored handwritten input.

In accordance with some embodiments of the electronic device 2700, the processing unit is configured to: receive a request (e.g., with the request receiving unit 2722) to send a message to the at least one other user; and, in response to receiving the request, display (e.g., with the displaying unit 2710) within the conversation transcript a user interface object that includes an animation that draws the stored handwritten input at a predetermined pace.

In accordance with some embodiments of the electronic device 2700, the processing unit is further configured to: in response to receiving the request to send the message to the at least one other user, send instructions (e.g., with the sending unit 2720) to render a user interface object that includes the animation that draws the stored handwritten input at the predetermined pace.

In accordance with some embodiments of the electronic device 2700, the predetermined pace corresponds to a writing pace that was used by the user while providing the stored handwritten input.

In accordance with some embodiments of the electronic device 2700, the predetermined pace corresponds to a writing pace that is different from a pace that was used by the user while providing the stored handwritten input.

In accordance with some embodiments of the electronic device 2700, after replacing the first set of characters with the representation of the stored handwritten input, the message-input area includes both the representation of the stored handwritten input and at least a first typed input of the plurality of typed inputs.

In accordance with some embodiments of the electronic device 2700, the stored sequence of characters corresponds to a label that the user provided for the stored handwritten input.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 26A-26B are, optionally, implemented by components depicted in FIGS. 1A-1B or FIG. 27. For example, some operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28A:
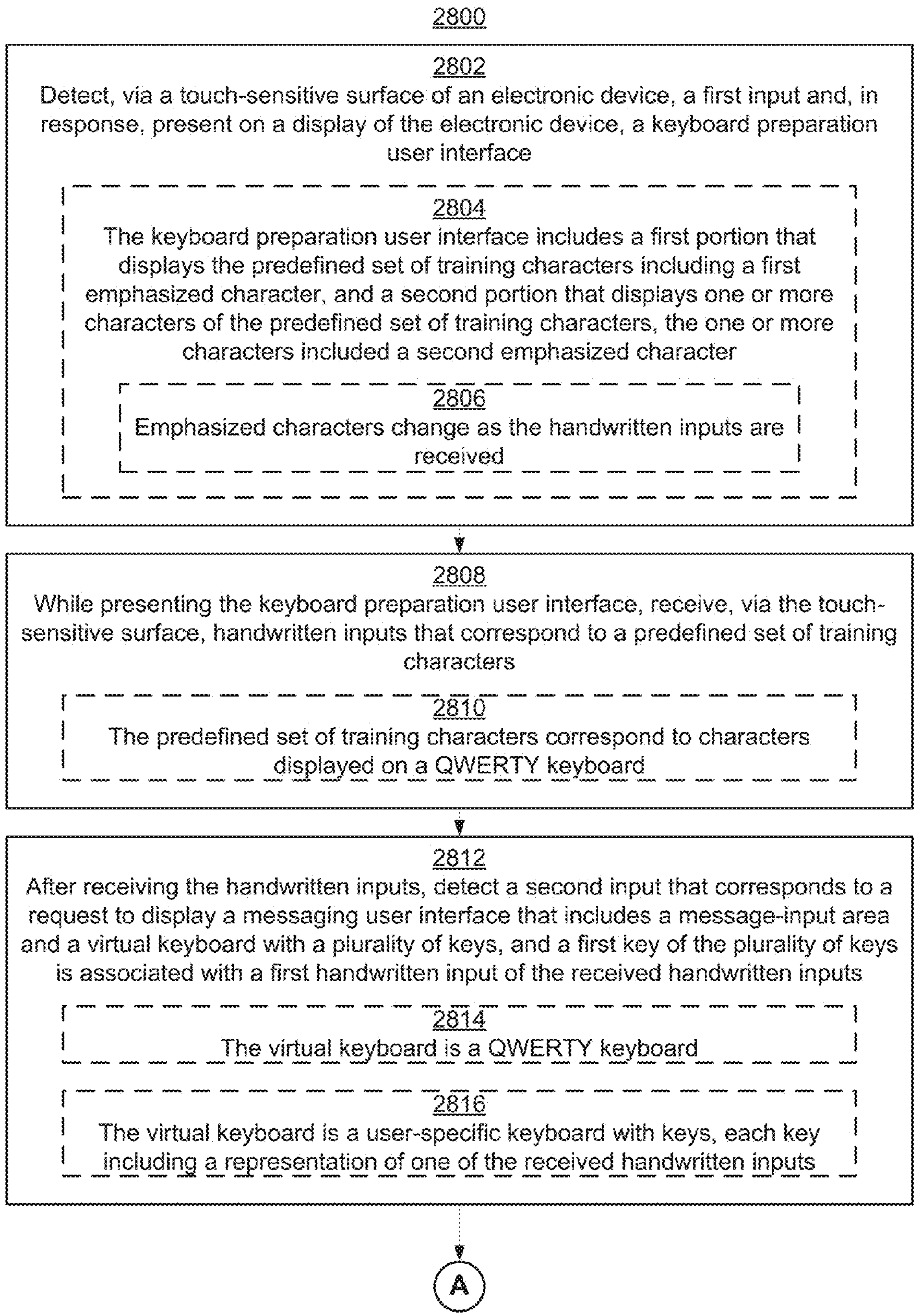
FIGS. 28A-28B are flow diagrams illustrating a method of providing and presenting user-specific handwritten inputs in a messaging application, in accordance with some embodiments.
Figure 28B:
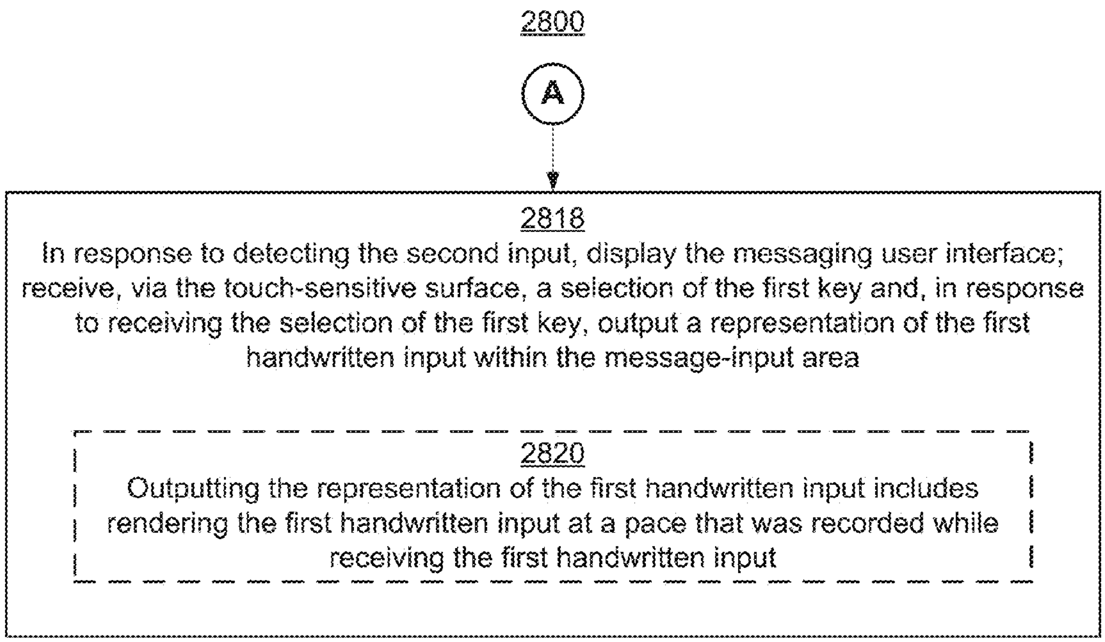

FIGS. 28A-28B are flow diagrams illustrating a method 2800 of providing and presenting user-specific handwritten inputs in a messaging application, in accordance with some embodiments. The method 2800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2800 are, optionally, combined and/or the order of some operations is, optionally, changed.

As described below, the method 2800 provides an intuitive way to provide and present user-specific handwritten inputs in a messaging application. The method helps to improve user satisfaction with their devices and produces more efficient human-machine interfaces by allowing users, e.g., to simply following a predefined training sequence in order to produce a custom keyboard with user-specific handwritten characters as keys on the custom keyboard. For battery-operated devices, such methods and interfaces conserve power and increase the time between battery charges. Furthermore, allowing users to easily, efficiently, and quickly produce custom keyboards with user-specific handwritten characters as keys enhances the operability of the devices and makes user-device interfaces (e.g., in the messaging application) more efficient (e.g., by allowing users to easily customize their message content with handwritten inputs selected from the custom keyboard) which, additionally, reduces power usage and improves battery life of the device by enabling the user to use the device more quickly and efficiently (e.g., the user need not leave the messaging application, open and use a different application to input or locate handwritten inputs, and then return to use those inputs in the messaging application, instead the user simple provides and/or selects custom handwritten inputs directly within the messaging application).

Figure 23X:
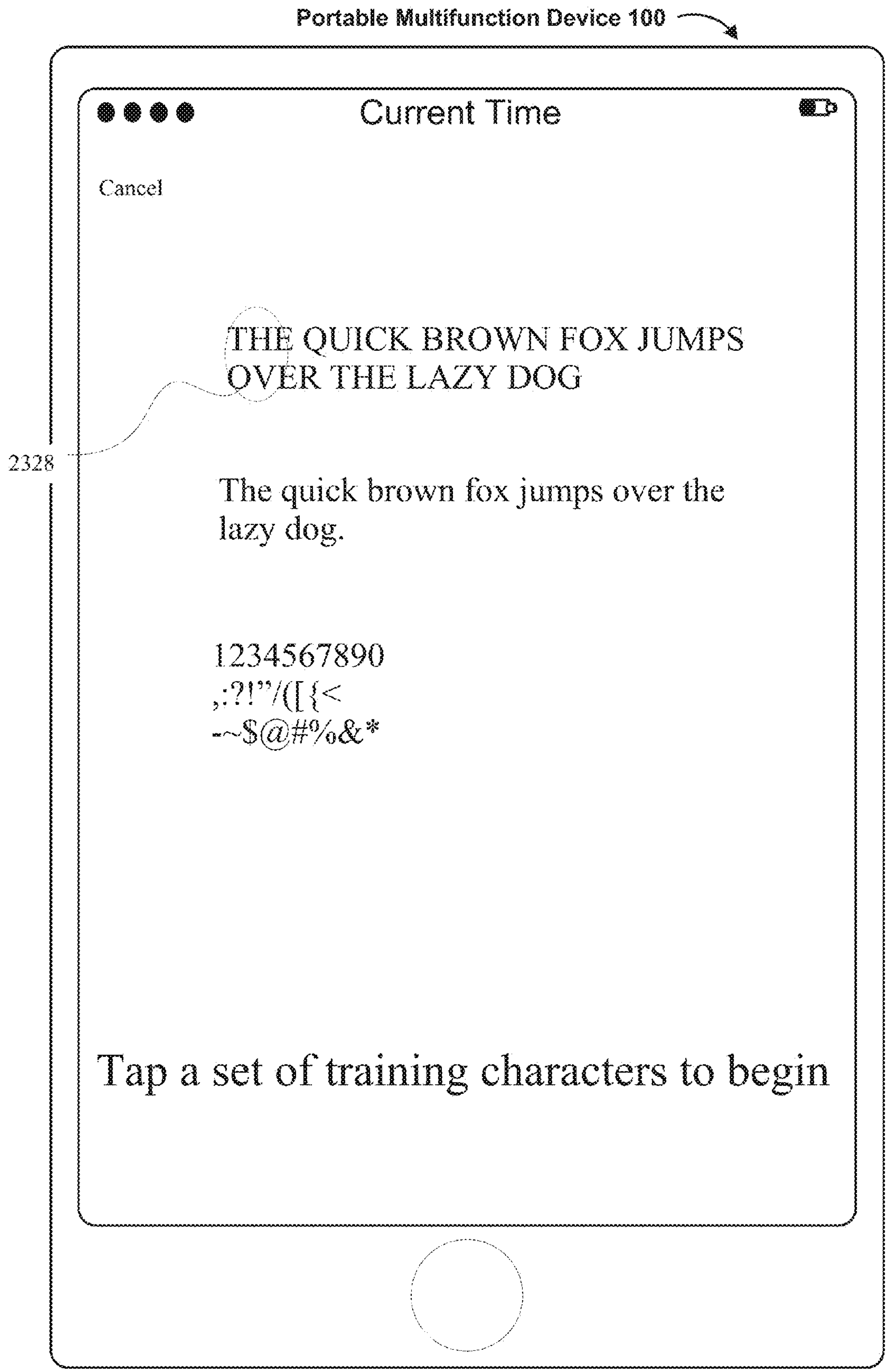
Figure 23Y:
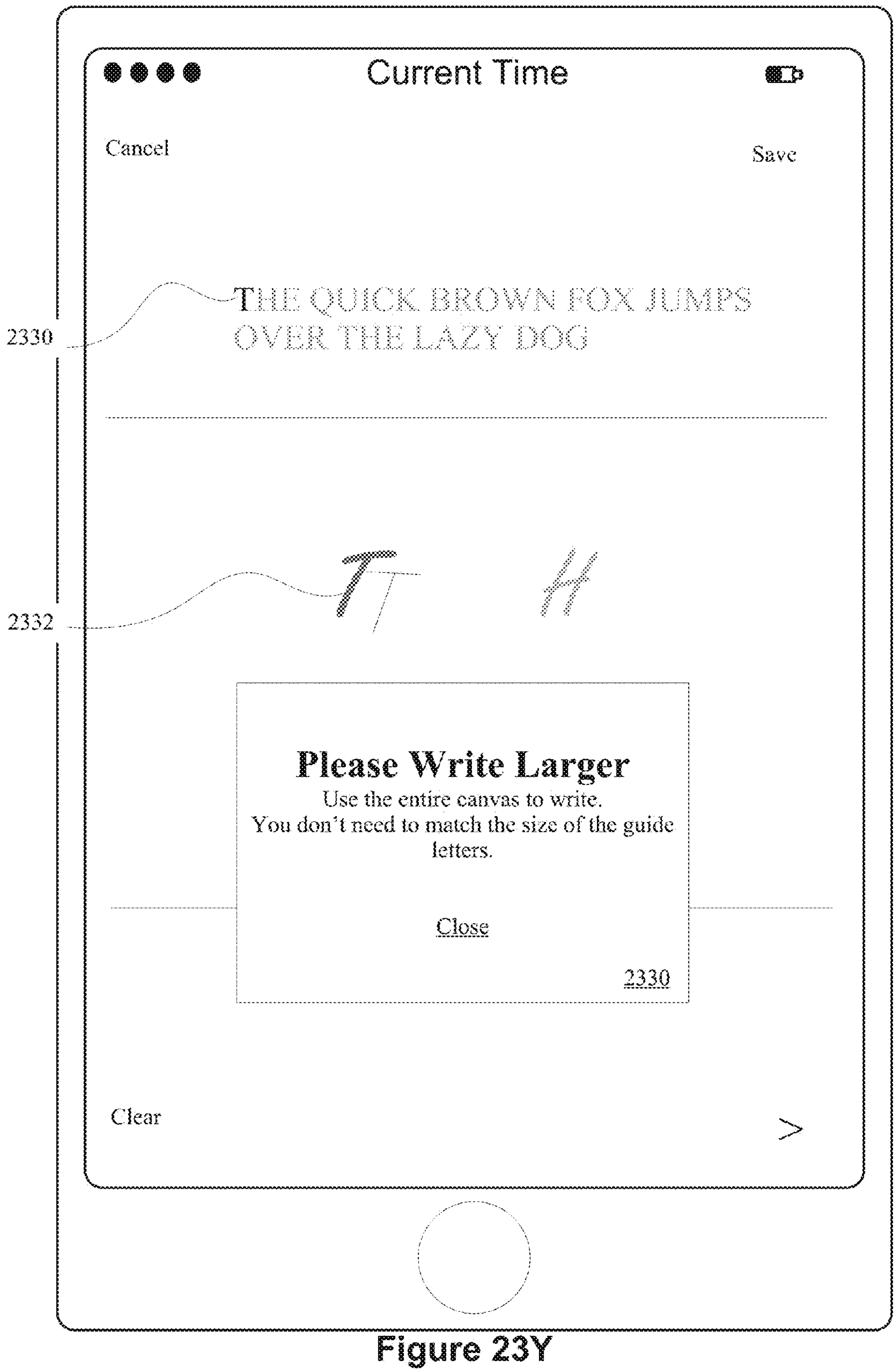
Figure 23Z:
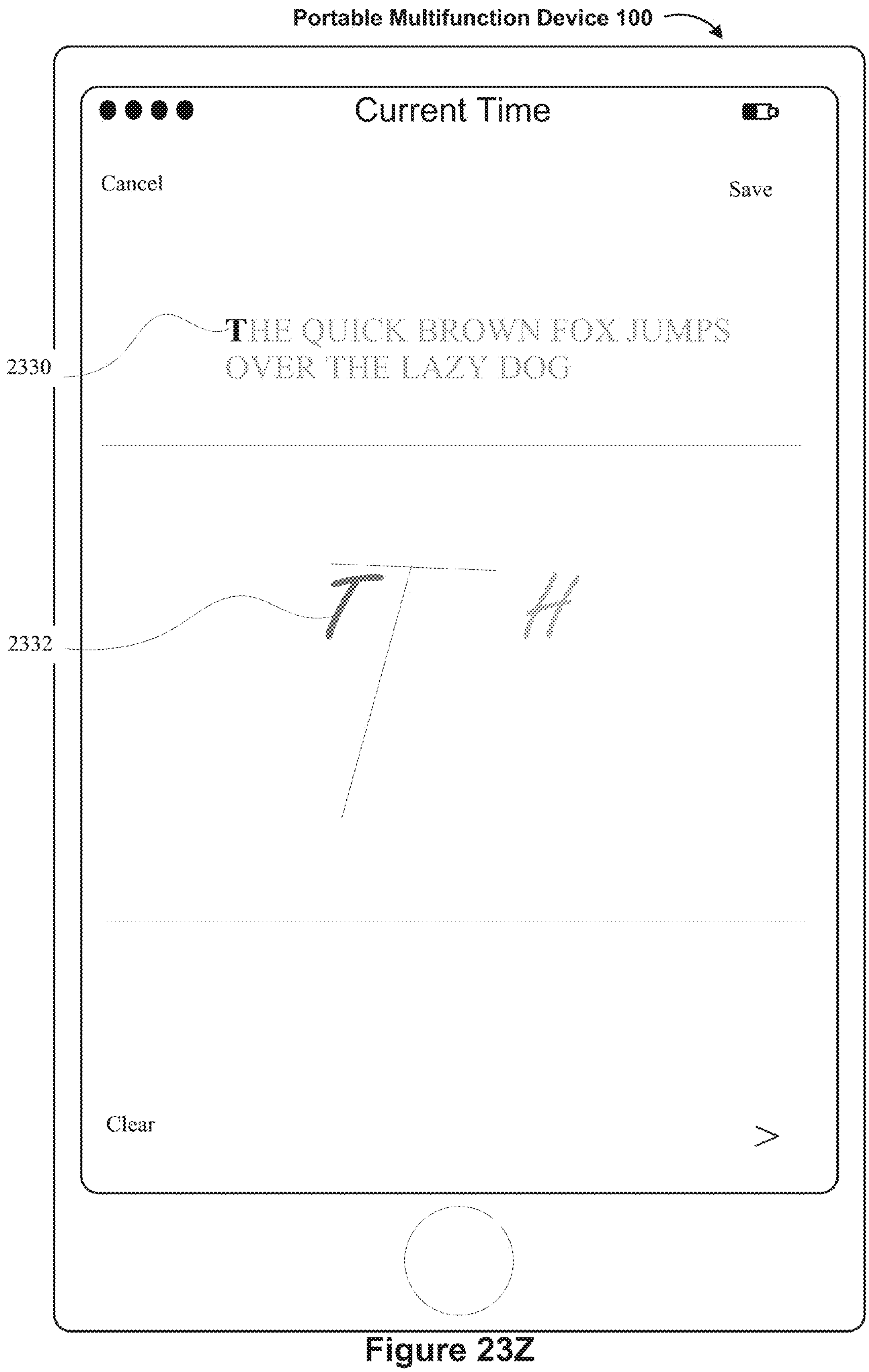
Figure 23A:
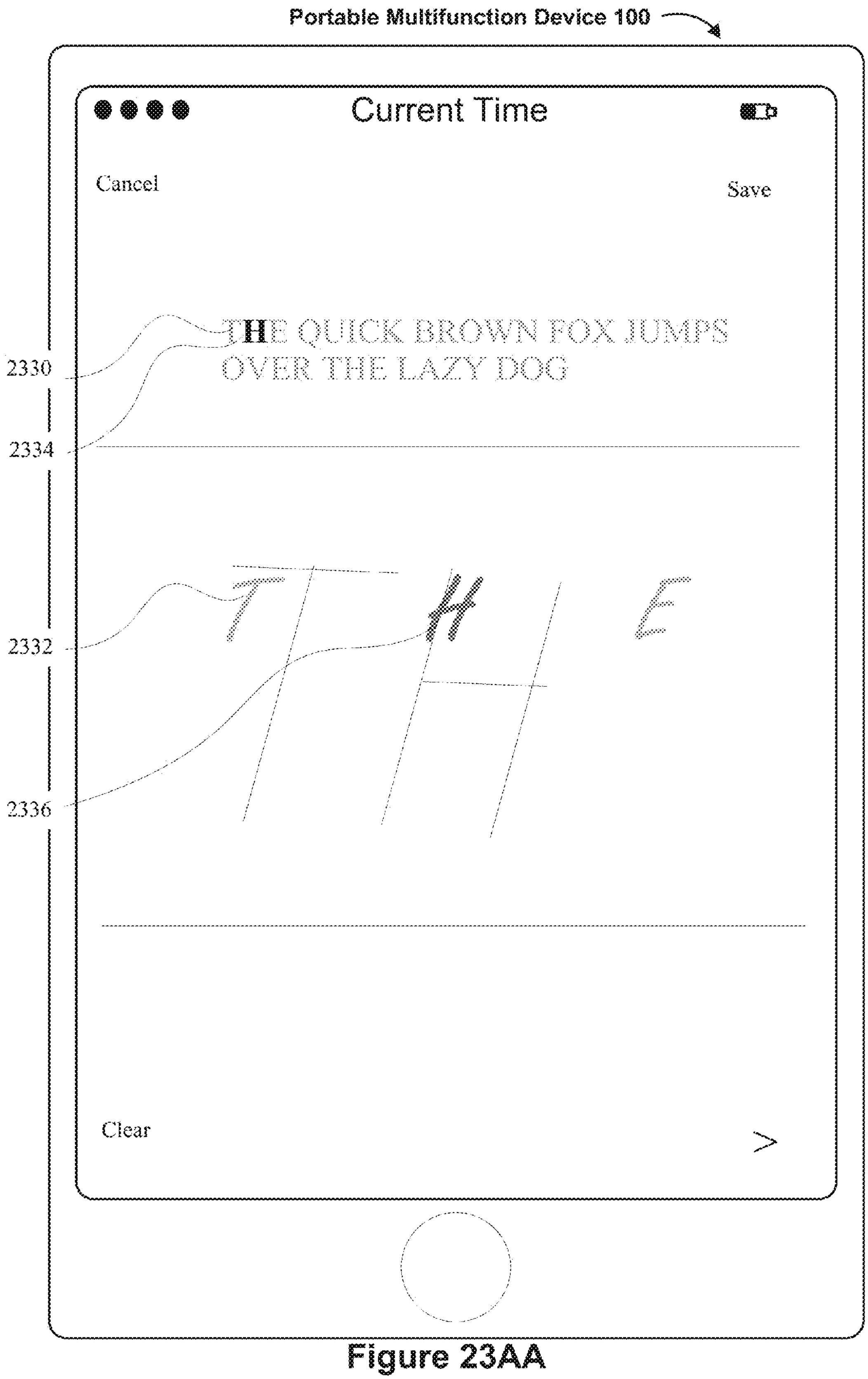
Figure 23A:
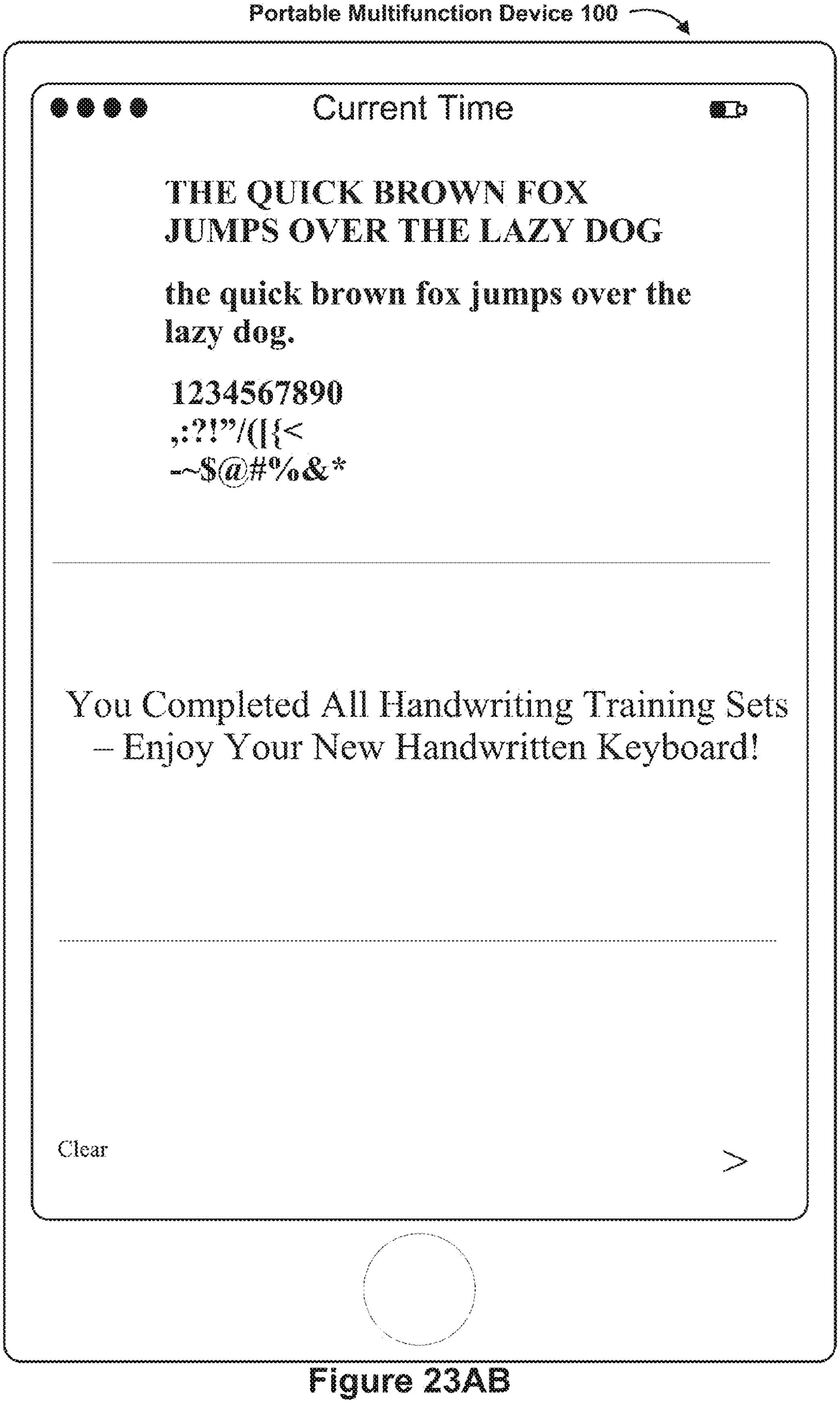
Figure 23A:
Figure 23A:
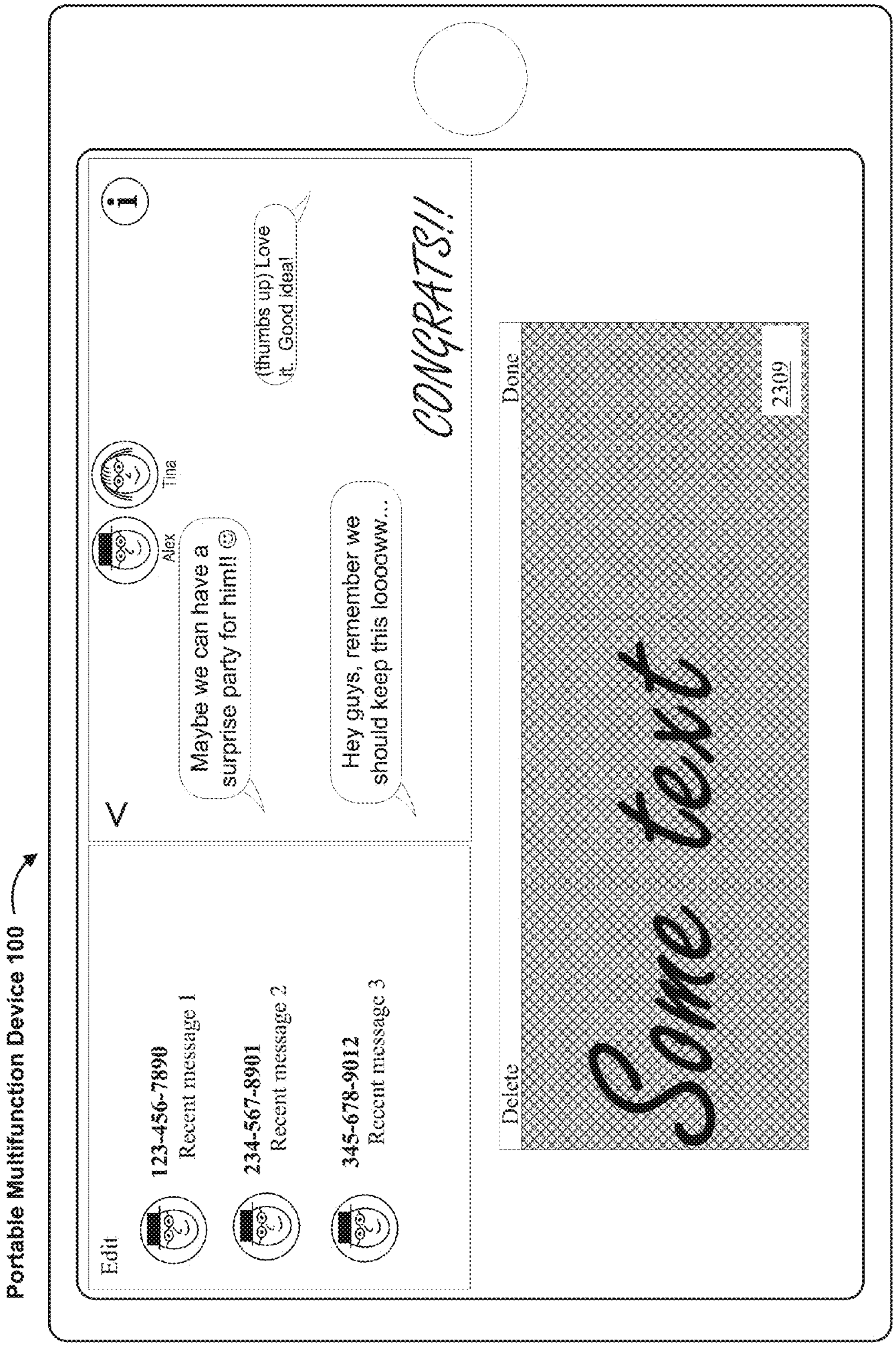
Figure 23A:
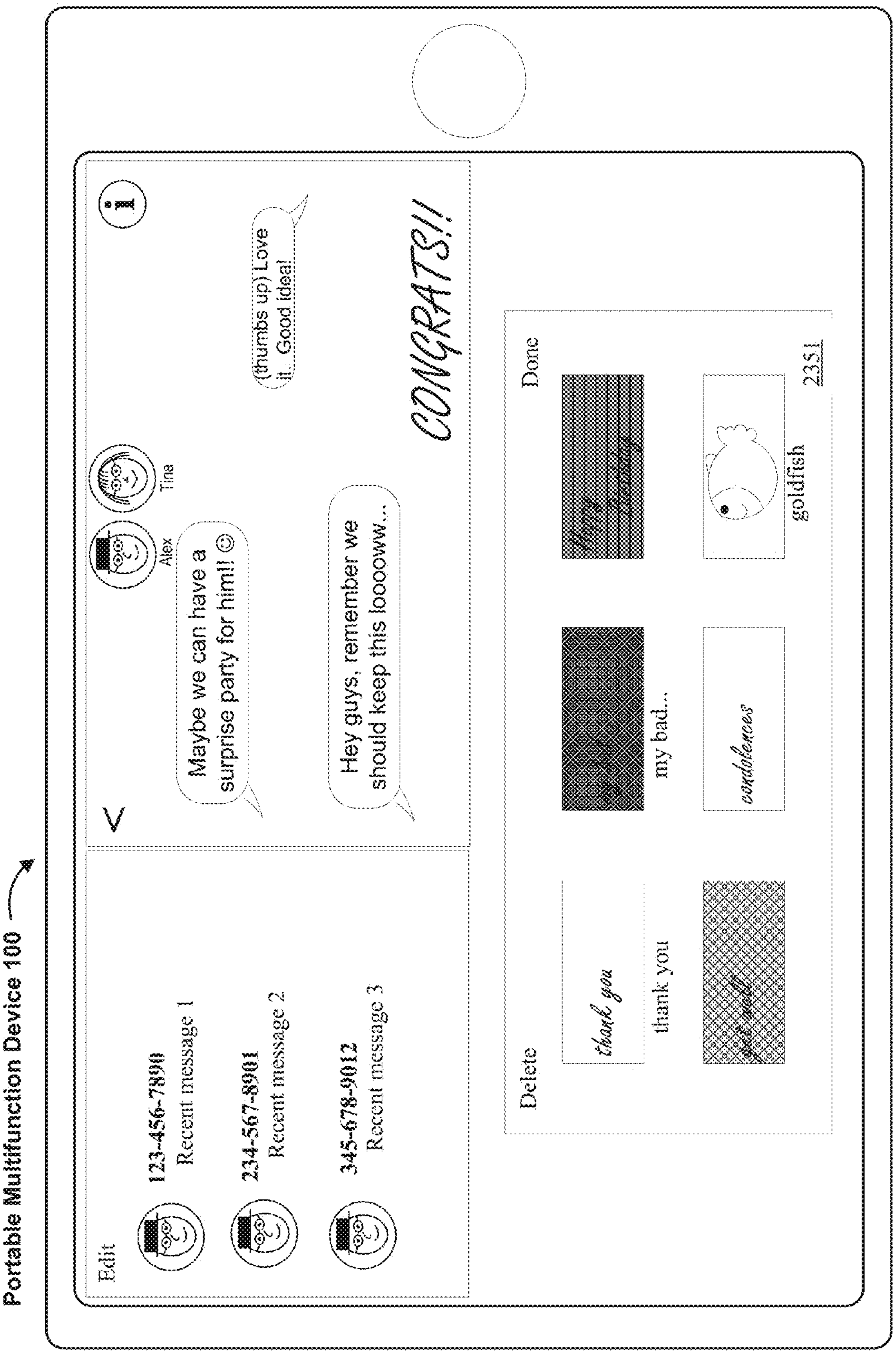

The device detects (2802), via the touch-sensitive surface, a first input (that corresponds to a request to prepare a custom keyboard with handwritten characters, such as input 2326 in order to activate a keyboard preparation mode and then input 2328 in order to display the keyboard preparation user interface for a respective set of training characters, FIGS. 23W-23X). In response to detecting the first input (or multiple inputs, such as inputs 2326 and 2328), the device presents, on the display, a keyboard preparation user interface (e.g., the user interface shown on FIG. 23Y). In some embodiments, the keyboard preparation user interface includes (2804) a first portion that displays the predefined set of training characters including a first emphasized character (e.g., the portion of the user interface shown in FIG. 23Y that displays "THE QUICK BROWN FOX JUMPS OVER THE LAZY DOG." In some embodiments, the first portion is a top portion that provides a preview of characters that will be typed by the user while preparing the custom keyboard and the emphasized character represents that next character to be handwritten by the user while preparing the custom keyboard (e.g., as shown in FIGS. 23Y and 23Z, the "T" character 2330 is emphasized in the first portion in order to indicate to the user that they should provide handwritten input for that character). In some embodiments, the keyboard preparation user interface also includes: a second portion that displays one or more characters of the predefined set of training characters, the one or more characters including a second emphasized character (e.g., emphasized character 2332, FIGS. 23Y-23Z). For example the second portion is a bottom portion that is displayed below the first/top portion and the second portion includes a limited number of characters (e.g., 1, 2, or 3) representing the next characters to be handwritten by the user. In some embodiments, the first and second emphasized characters correspond to the same character, but the second emphasized character is displayed with a larger font size that the first emphasized character, as shown in FIGS. 23Y-23Z.

In some embodiments, emphasized characters in the first and second portions change as the handwritten inputs are received (2806). In some embodiments, in accordance with a determination that a respective handwritten input satisfies acceptance criteria, the device emphasizes a next character in the set of training characters (as shown in FIGS. 23Z-23AA, the emphasized characters change as the user continues to provide handwritten inputs that satisfy the acceptance criteria. In this way, users are provided with clear visual cues as to the characters they should be handwriting.

In some embodiments, in accordance with a determination that a respective handwritten input does not satisfy the acceptance criteria, the device provides an indication to the user as to how the handwritten input should be revised in order to satisfy the acceptance criteria. For example, as shown in FIG. 23Y, the user provides a handwritten input for the letter "T" but that handwritten input does not satisfy the acceptance criteria and, as such, the device displays the indication 2330 instructing the user to provide a larger handwritten input.

While presenting the keyboard preparation user interface, the device receives (2808), via the touch-sensitive surface, handwritten inputs that correspond to a predefined set of training characters (as discussed above in reference to FIGS. 23Y-23AA). For example, the predefined set of training characters correspond to those characters displayed on a QWERTY keyboard (2810).

After receiving the handwritten inputs, the device detects (2812) a second input that corresponds to a request to display a messaging user interface that includes a message-input area and a virtual keyboard with a plurality of keys (e.g., the virtual keyboard is a QWERTY keyboard (such as that shown in FIG. 23A) or is the custom keyboard with handwritten characters that correspond to the handwritten inputs (such as that shown in FIG. 23AC)). A first key of the plurality of keys is associated with a first handwritten input of the received handwritten inputs. In some embodiments, the virtual keyboard is a QWERTY keyboard (2814). For example, the keys on the QWERTY keyboard shown on FIG. 23A are each associated with a respective handwritten input from the user. As another example, the virtual keyboard is a user-specific keyboard with keys, wherein each key includes a representation of one of the received handwritten inputs (such as that shown in FIG. 23AC).

In response to detecting the second input, the device displays (2818) the messaging user interface that includes the message-input area and the virtual keyboard with the plurality of keys. For example the second input corresponds to a request to open a messaging application (e.g., by clicking an icon on a home screen page). The device receives (2818), via the touch-sensitive surface, a selection of the first key (e.g., the user taps over a representation of the "p" key shown on the QWERTY keyboard of FIG. 23A or the user-specific handwritten keyboard of FIG. 23AC. In response to receiving the selection of the first key, the device outputs a representation of the first handwritten input within the message-input area (e.g., extending the previous example after the user taps the "p" key on a displayed keyboard the device displays a user-specific handwritten input for the "p" key, such as one provided during the handwriting training exercise discussed above in reference to FIGS. 23W-23AB)

In some embodiments, outputting the representation of the first handwritten input includes (2820) rendering the first handwritten input at a pace that was recorded while receiving the first handwritten input.

It should be understood that the particular order in which the operations in FIGS. 28A-28B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 2800 described above. For example, the contacts, gestures, user interface objects, intensity thresholds, focus selectors, and animations described above with reference to method 2800 optionally have one or more of the characteristics of the contacts, gestures, user interface objects, intensity thresholds, focus selectors, and animations described herein with reference to other methods described herein. For brevity, these details are not repeated here.

In some embodiments, the methods described above in reference to FIGS. 24A-24C, 26A-26B, and 28A-28B utilize one or more of the techniques described below to render ink on the display in order to accurately simulate the way that ink is applied to a surface.

Handwriting GL Renderer

The handwriting renderer can be defined by two primary systems: wet and dry (as shown in Table 1 in FIG. 28D). These are two interdependent rendering pipelines that present the lifecycle of the appearance of ink on screen. In some embodiments, the rendering pipelines work on all supported hardware (e.g., many different configurations of smart phones, laptops, smart watches, etc.).

In some embodiments, each state described above (e.g., in reference to Table 1 in FIG. 28D) represents a frame buffer and contains its own shader pipeline. Wet Intermediate: off-screen, draw arrays using GL_POINTS, made of many overlapping dots using glBlendFunc(GL_ONE, GL_ONE_MINUS_SRC_ALPHA) resulting in the appearance of continuous line color in concert with Dynamic Circularization, time-based particle simulation for Bleed Behavior. Wet Composite: receives Self, Wet Intermediate and paper texture, fragment based normals determination for Specular Wetness, accumulatively fades to 0%, revealing Dry Composite. Dry Intermediate: off-screen, receives Self and Wet Intermediate, pre-processing for Segment Level Multiply Blending. Dry Composite: receives Dry Intermediate and paper texture, applies color from Dry Intermediate results.

In some embodiments, when presented to a screen (e.g., display 112 of device 100), Wet Composite is alpha blended on top of Dry Composite.

Bleed Behavior

Example equations for rendering bleed behavior that accurately mimics the way ink is applied to a surface is shown in Table 2 below:

TABLE 2

```
life = clamp((time − birth) / lifespan, 0.0, 1.0);
final_size = max_size * 0.1 + (max_size * 0.36 +
max_size * 0.09 * life) * speed +
(max_size * 0.45 * life) * (force * 0.8 + speed * 0.2);
```

In some embodiments, the Bleed Behavior is a time-based effect that changes each vertex's point size over a normalized time-of-lifespan. In some embodiments, the size is determined by filtered (smoothed) and normalized values of user pressure (force) and velocity (baked down to speed).

In some embodiments, when the simulation has completed its phase for a given point, a channel designated exclusively for the Dry Pipeline to receive is written to (e.g., it is critical that this channel is written to only once per point to avoid alpha over-coverage within the Dry Pipeline).

Example equations used to implement a Dynamic Circularization technique are shown in Table 3 below:

TABLE 3

```
one_uv_pixel = 1.0 / point_size;
vector_from_center = (gl_PointCoord − 0.5) * 2.0;
dist_squared = dot(vector_from_center, vector_from_center);
value = 1.0 − linearstep(max(0.0, 1.0 −
one_uv_pixel * 4.0), 1.0, dist_squared);
```

In some embodiments, during the fragment phase of the Wet Intermediate Pass, each GL_POINT is processed. Based on the point-size and fragment-coordinate of the point, we can ensure that the circularization of the point maintains a consistent edge alpha falloff. This consistency provides a consistent line edge appearance without the expense of MSAA (multi-sampled anti-aliasing) and regardless of line-weight/point-size.

An example matrix that illustrates Specular Wetness techniques is shown in Table 4(see FIG. 28C).

In some embodiments, using a Laplacian Convolution Matrix for Wet Intermediate and Paper texture color, a two-dimensional vector is created based on adjacent pixel luminance (an example is shown in Table 4 in FIG. 28C). This vector's direction and magnitude is used to compute a three-dimensional vector (normal). This vector is used just like a bump map to create the appearance of Phong shaded wetness based on a light's three dimensional position.

Multiply Blend Using Segment Separation

Intermediate

In some embodiments, overlapping line segments are provided in conjunction with particular handwritten inputs. An example is shown in Table 5 (see FIG. 28C).

For the purposes of the example shown in Table 5 in FIG. 28C, Element 5B is referred to as a NEW_SEGMENT, Element 5C as PREVIOUS_SEGMENT, and Element 5D as DIFF. In some embodiments, when new data is written to the specified channel that the Dry Intermediate is designed to receive from the Wet Intermediate, that data is denoted as NEW_SEGMENT. In some embodiments, the equation shown in Table 5 in FIG. 28C is utilized to ensure that DIFF can be added seamlessly to the previous state of a color attachment, providing the same consistent alpha coverage along edges (an example is shown in Table 6 in Table 28C.

In some embodiments, DIFF is added and clamped to a single channel of an intermediate frame buffer's color attachment to represent ALPHA (5E).

In some embodiments, the following equation is used to help with the bleeding techniques: BLEND=DIFF*TARGET_MULTIPLIER+(1.0−DIFF*TARGET_MULTIPLIER)*PREVIOUS_BLEND. In some embodiments, the diagonal component in Element 5F of Table 7 in FIG. 28D as DIFF and the grid component as PREVIOUS_BLEND. In some embodiments, DIFF is multiplied by a scalar (TARGET_MULTIPLIER) and added to the inverse of this product of the previous state. The result is written to a single channel representing the multiply blend state. Due to inherent alpha over coverage with this process, alpha is preserved in a separate channel.

Composite

In some embodiments, when a request is made to render a pass to the composite frame buffer to be presented to screen, this task is much more trivial than traditional blend mode operations since the work has been done in the intermediate pass and, notably preserves alpha precisely. Other methods take pre-multiplied alpha and do expensive, imprecise work to extract alpha using methods like unpremultiply.

RGB=mix(BASE_COLOR, BLACK, linearstep(TARGET_MULTIPLIER, 1.0, BLEND)).

A=ALPHA*PAPER_TEXTURE.

In some embodiments, the result from FIG. 5F as BLEND, the result in FIG. 5E as ALPHA. In some embodiments, these techniques of generating multiply blending more closely simulates how ink reacts to paper. It works continuously (per segment) within a single stroke and simultaneously with all other pixels in the color attachment.

Multiply Blend Using Segment Collation

In some embodiments, while the richness and complexity of segment separation blending may require one pass per segment in a live drawing setting, there are a few cases that require a more optimized method of rendering all non-live drawing data in as few passes as possible (e.g. Undo, Thumbnail, Recents). For these cases, it is ideal to collate as many segments as possible that are known to only overlap their previous segment.

Collision Detection to Determine Pass Endpoint

Element 6A in Table 8 in FIG. 28D illustrates an example final composite. Element 6B in Table 8 in FIG. 28D illustrates the series of passes needed to render 6A.

In some embodiments, when all segments are known, fast-enumeration is used to go over each segment to determine two-dimensional vector intersection with all segments within the current pass (This includes detached segments from previous lines. This system is agnostic to beginning and end of complete strokes). When an intersection is determined, this group of vertices is denoted as a single pass by flagging the last segment as an endpoint. In some embodiments, in the second shape of FIG. 6B, although the second shape appears to intersect with the first shape, these techniques do not determine intersection until an intersection is reached within vectors enumerated since the last intersection.

Additional details regarding techniques used in conjunction with the methods described above in reference to FIGS. 24A-24C, 26A-26B, and 28A-28B are also provided in U.S. Provisional Application Ser. No. 62/349,116, filed Jun. 12, 2016, which is incorporated by reference herein. The details provided in U.S. Provisional Application Ser. No. 62/349,116 thus serve as a supplement to the details provided herein and may be combined and interchanged with any of the details provided above in reference to FIGS. 24A-24C, 26A-26B, and 28A-28B.

Figure 29:
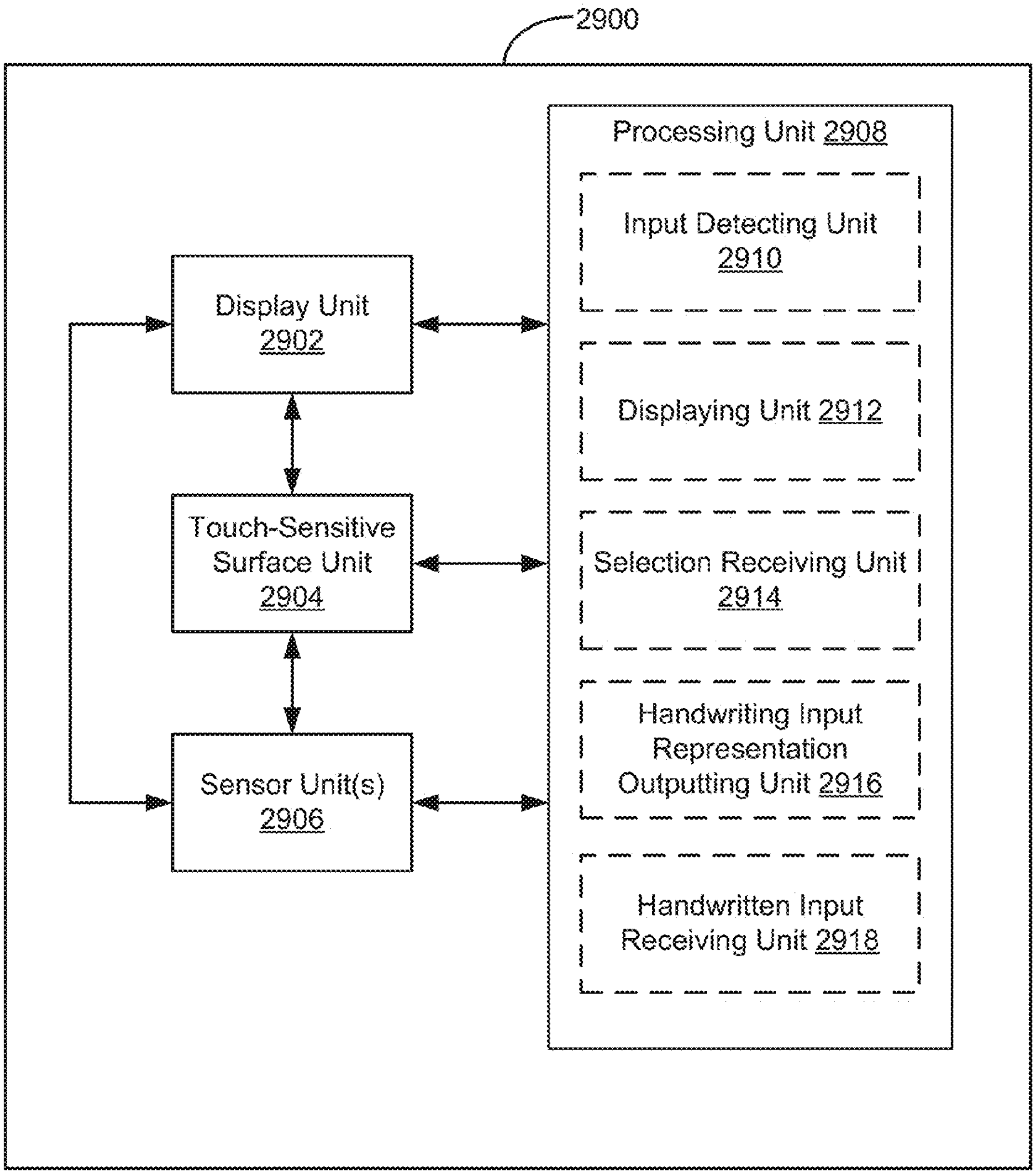
FIG. 29 is a functional block diagram of an electronic device in accordance with some embodiments.

In accordance with some embodiments, FIG. 29 shows a functional block diagram of an electronic device 2900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a display unit 2902 configured to display a user interface, a touch-sensitive surface unit 2904 configured to receive contacts, one or more sensor units 2906 for detecting intensities of contacts on the touch-sensitive surface unit 2904; and a processing unit 2908 coupled with the display unit 2902, the touch-sensitive surface unit 2904 and the one or more sensor units 2906. In some embodiments, the processing unit 2908 includes an input detecting unit 2910, a displaying unit 2912, a selection receiving unit 2914, a handwriting input representation outputting unit 2916, and a handwritten input receiving unit 2918.

The processing unit 2908 is configured to detect (e.g., with the input detecting unit 2910), via the touch-sensitive surface, a first input; in response to detecting the first input, present, on the display (e.g., with the displaying unit 2912 in conjunction with the display unit 2902), a keyboard preparation user interface; while presenting the keyboard preparation user interface, receive, via the touch-sensitive surface, handwritten inputs (e.g., with the handwritten input receiving unit 2918) that correspond to a predefined set of training characters; after receiving the handwritten inputs, detect a second input (e.g., with the input detecting unit 2910) that corresponds to a request to display a messaging user interface that includes a message-input area and a virtual keyboard with a plurality of keys, and a first key of the plurality of keys is associated with a first handwritten input of the received handwritten inputs; in response to detecting the second input, display the messaging user interface that includes the message-input area and the virtual keyboard with the plurality of keys (e.g., with the displaying unit 2912); receive, via the touch-sensitive surface, a selection of the first key (e.g., with the selection receiving unit 2914); and in response to receiving the selection of the first key, output a representation of the first handwritten input within the message-input area (e.g., with the handwriting input representation outputting unit 2916).

In some embodiments, the predefined set of training characters corresponds to characters displayed on a QWERTY keyboard.

In some embodiments, the virtual keyboard is a QWERTY keyboard.

In some embodiments, the virtual keyboard is a user-specific keyboard with keys, wherein each key includes a representation of one of the received handwritten inputs.

In some embodiments, outputting the representation of the first handwritten input includes rendering the first handwritten input at a pace that was recorded while receiving the first handwritten input.

In some embodiments, the keyboard preparation user interface includes: a first portion that displays the predefined set of training characters including a first emphasized character, and a second portion that displays one or more characters of the predefined set of training characters, the one or more characters including a second emphasized character.

In some embodiments, emphasized characters change as the handwritten inputs are received.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 28A-28B are, optionally, implemented by components depicted in FIGS. 1A-1B or FIG. 29. For example, some operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selectively Scrunch Content in a Message Transcript

FIGS. 30A-30G illustrate example user interfaces for quickly locating different types of content in a messaging application, in accordance with some embodiments. The user interfaces in these figures are used to illustrate the processes described below. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

Figure 30A:
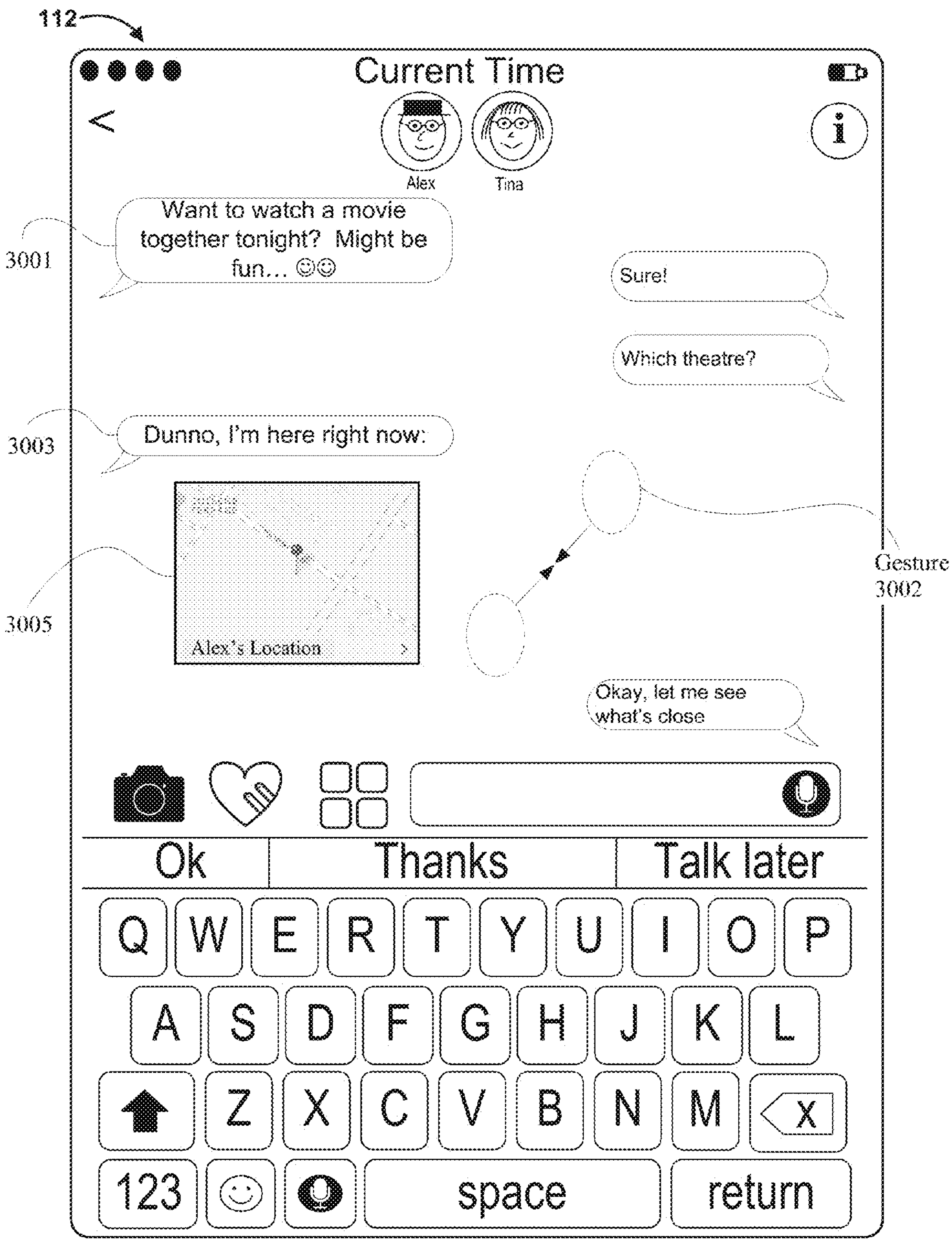
FIGS. 30A-30G illustrate example user interfaces for quickly locating different types of content in a messaging application, in accordance with some embodiments.

As shown in FIG. 30A, in some embodiments, users are able to quickly locate different types of content in a messaging application by scrunching down content in order to easily locate desired content. A user provides a gesture 3002 in FIG. 30A and, in response, the device reduces a display size (i.e., scrunches/squishes down) message regions that include content having a first content type (e.g., message regions with text-only content are reduced in size, such as the content for message region 3003, FIG. 30B). In some embodiments, as a user continues to provide a gesture (e.g., gesture 3004 is a continuation of gesture 3002 but, in some embodiments, gesture 3004 is a distinct gesture from gesture 3002), the message regions are further reduced in size (e.g., message region 3003 is further reduced in size, FIG. 30C).

Figure 30B:
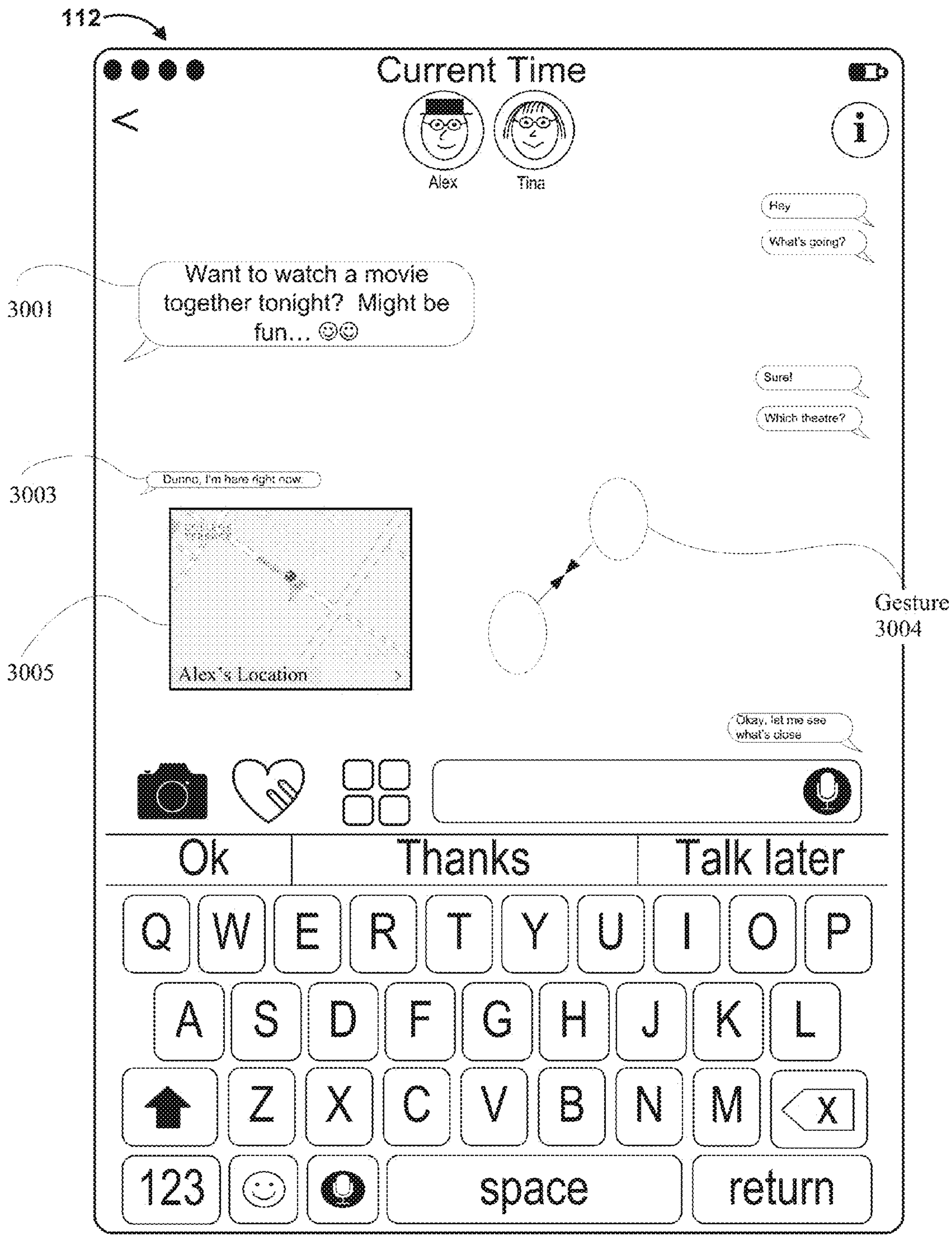

Users are able to intuitively provide additional gestures (or continue providing a single gesture) that reduce a display size for content types other than the first content type. As shown in FIG. 30D, in response to gesture 3006 (FIG. 30C), content items having a second content type (e.g., text with emojis) are displayed with a reduced display size (such as message region 3001). As shown in FIG. 30E, in response to gesture 3008 (FIG. 30D), content items having a third content type (e.g., text that includes text-rendering effects) are displayed with a reduced display size (such as message region 3009, FIG. 30E). As shown in FIG. 30F, in response to gesture 3010, content items having a fourth content type (e.g., graphical content, such as images and maps objects) are displayed with a reduced display size (such as message region 3005 and 3011, FIG. 30F).

In some embodiments, users are also able to quickly expand portions of the messaging user interface in response to a de-pinch gesture (e.g., gesture 3012). In response to detecting gesture 3012, the device increases display sizes for all content types (FIGS. 30F-30G), until the message regions return to their respective default sizes. In this way, users are easily able to search out desired content without having to aimlessly scroll through a long and confusing conversation transcript (instead users simply scrunch down content so that they can quickly see a high-level overview of content items in the conversation transcript and, once desired information is located, users can expand content items to view the desired information and message regions that are surrounding the desired information).

Figure 31B:
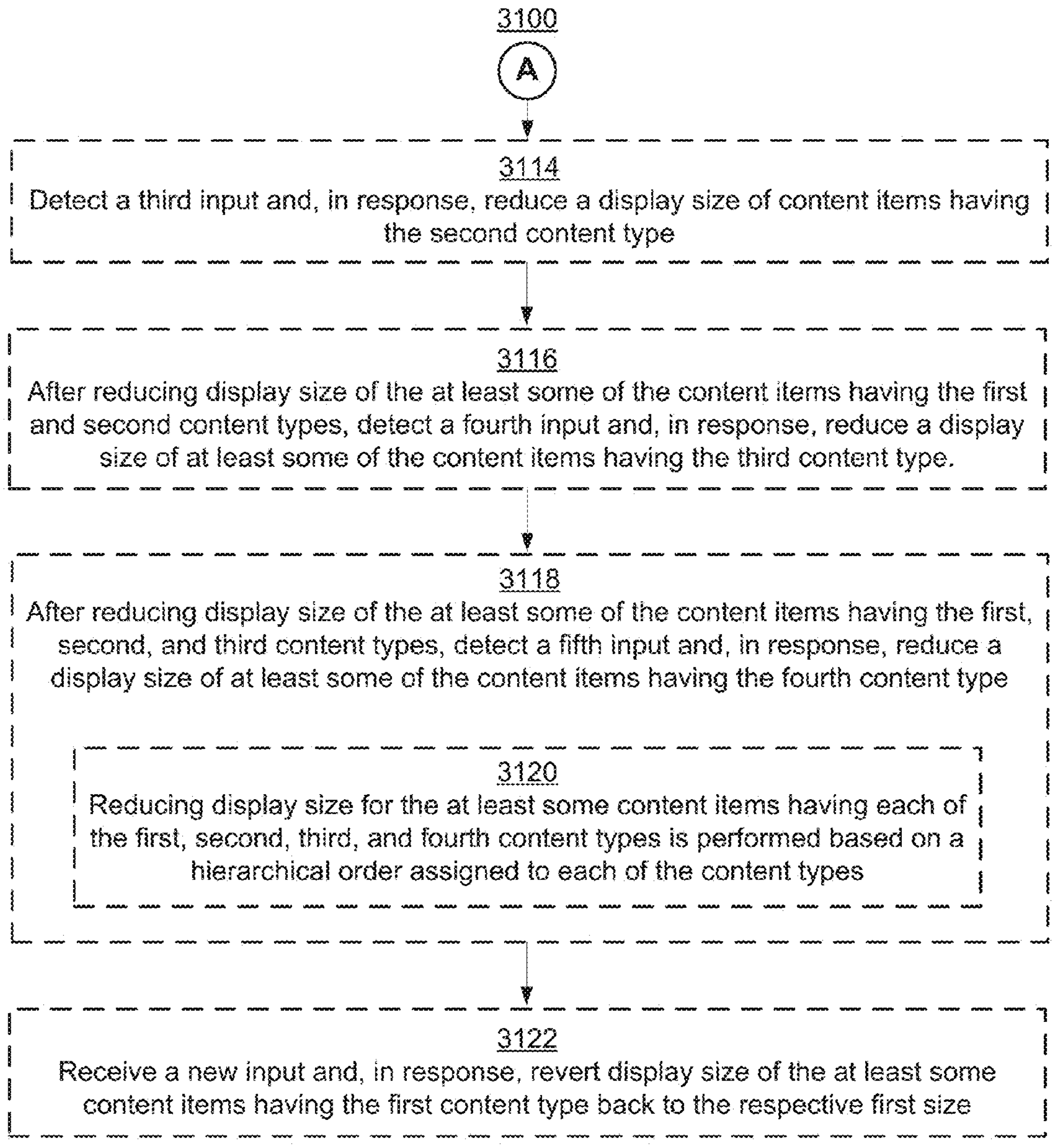

FIGS. 31A-31B are flow diagrams illustrating a method 3100 of quickly locating different types of content in a messaging application, in accordance with some embodiments. The method 3100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3100 are, optionally, combined and/or the order of some operations is, optionally, changed.

As described below, the method 3100 provides an intuitive way to locate different types of content in a messaging application. The method produces more efficient human-machine interfaces by allowing users to use a simple gesture to quickly scale down display sizes for content in a messaging application, so that users are able to quickly locate desired content (e.g., users can scale down all text-only content in order to quickly locate emojis, photos, videos, or other types of content that may have been received a long time ago). For battery-operated devices, the method helps to conserve power and increase the time between battery charges (e.g., by allowing users to quickly locate desired content instead forcing users to employ inefficient and battery-draining techniques). Furthermore, allowing users to quickly locate desired content enhances the operability of the devices and makes user-device interfaces (e.g., in the messaging application) more efficient by allowing users to easily locate desired content in a potentially large and difficult to search conversation transcript. The user need not scroll through pages and pages of content in the conversation transcript and can instead simply provide intuitive gestures to easily scale down content so that desired content is easily located.

The device displays (3102), on the display, a messaging user interface that includes a plurality of content items. In some embodiments, the messaging user interface includes a conversation transcript of a messaging session between a user of the electronic device and at least one other user, as shown in FIG. 30A. In some embodiments, the plurality of content items includes content items having a first content type. For example, each content item of the first content type is text-based and does not include any emojis or other text-rendering effects (such as making the text appear or disappear in response to a gesture over a content item, also referred to herein as an invisible ink effect or a private message). In some embodiments, the first content type includes text-only messages sent and received via the messaging user interface. In some embodiments, a content item corresponds to content included in a single user interface element displayed in the messaging user interface (e.g., a single message region or bubble). Message region 3003 is a one example shown in FIG. 30A of a content item that includes content of the first content type.

In some embodiments, the plurality of content items includes content items having a second content type that is distinct from the first content type. For example, the second content type corresponds to messages containing content other than text-only content, such as emojis or graphical content sent and received via the message user interface, such as camera images, screenshots, maps objects, objects with text-rendering effects, and the like. In some embodiments, content items having the second content type include message regions that include text and emojis (e.g., message region 3001, FIG. 30A). As described in more detail below, the messaging user interface may include content items having a third content type (e.g., the content included in message region 3009, FIG. 30C) and a fourth content type (e.g., the content included in message region 3005 and image 3011, FIGS. 30A and 30D) as well.

In some embodiments, a respective content item in the plurality of content items is displayed with a respective first size. In some embodiments, each content item is displayed with a respective default display size. In some embodiments, different default sizes are associated with the content types (e.g., pictures and other graphical content have a different default display size than text-only content items).

While displaying the messaging user interface (and, in some embodiments, while a focus selector is over the messaging user interface), the device detects (3104), via the touch-sensitive surface, a first input. In some embodiments, the first input (e.g., a first portion of a pinch gesture, such as gesture 3002 shown in FIG. 30A) corresponds to a first request to reduce a display size (or a magnification level) for at least a portion of the content items in the plurality of content items. In some embodiments, the first request is received while some textual-only content is displayed within the messaging user interface (e.g., the message regions that include text-only content including message region 3003, as shown in FIG. 30A).

In response to detecting the first input, the device reduces (3106) a display size of at least some content items having the first content type while continuing to display content items having the second content type with their respective first size. In some embodiments, reducing the display size includes reducing the display size for all content items having the first content type. In some embodiments, reducing the display size includes reducing the display size for only those content items having the first content type that are currently visible on the display (e.g., items of the first content type may or may not have a reduced display size while they are not currently visible within the portion of the messaging session that is visible within the messaging user interface on the display). As shown in FIG. 30B, in response to the gesture 3002, the device reduces a display size of the message region 3003 (and for other message regions that include text-only content).

In this way, users can easily scrunch or squish down content of a first type (e.g., text-only content) within a messaging user interface in order to quickly search for other content having a type other than the first type. For example, a user can quickly search for a desired photograph or video, without having to scroll through pages and pages of text-only content, thereby quickly, efficiently, and intuitively locating desired (non-textual) content. Additionally, in some embodiments, after content has been squished down, timestamps that are displayed in the conversation transcript are easily visible and, thus, users can quickly search through a lengthy conversation transcript to find a relevant time period. In other embodiments, any other user interface could employ the aforementioned features. For example, any user interface that includes content of a variety of content types, such as a web browser user interface (including images, text, videos, etc.), an electronic book user interface (including text, images associated with the text, etc.), and others.

In some embodiments, in conjunction with reducing the display size of at least some content items having the first content type, the device provides (3108) haptic feedback. In some embodiments, haptic feedback is provided whenever display sizes for any of the content items is reduced (to indicate either that the gesture was received or that the gesture/input was "legal.") (e.g., any type a messaging bubble is scrunched down, the device provides haptic feedback).

In some embodiments, reducing the display size includes (3110) reducing the display size in accordance with a determination that a characteristic (distance travelled, space between fingers in a pinch gesture, characteristic intensity of contact) of the first input satisfies first display-size-reduction criteria that are associated with the first content type.

In some embodiments, after reducing the display size of at least some of the content items having the first content type, the device detects (3112), via the touch-sensitive surface, a second input that corresponds to a request to scroll the messaging user interface. In response to detecting the second input, the device scrolls the messaging user interface while continuing to display: at least some of the content items having the first content type with the reduced display size, and content items having the second content type with their respective first sizes. In this way, users are easily able to scroll and search for desired content while keeping some content items at reduced display sizes (in order to assist in more easily locating desired content items).

In some embodiments, the user is able to provide a series of gestures or one continuous gesture in order to scrunch down display sizes for content within the messaging user interface. For example, in response to gesture 3004, the device continues to reduced display sizes for content have the first content type (e.g., message region 3003 is further reduced in size as compared to its size in FIG. 30B).

Figure 30C:
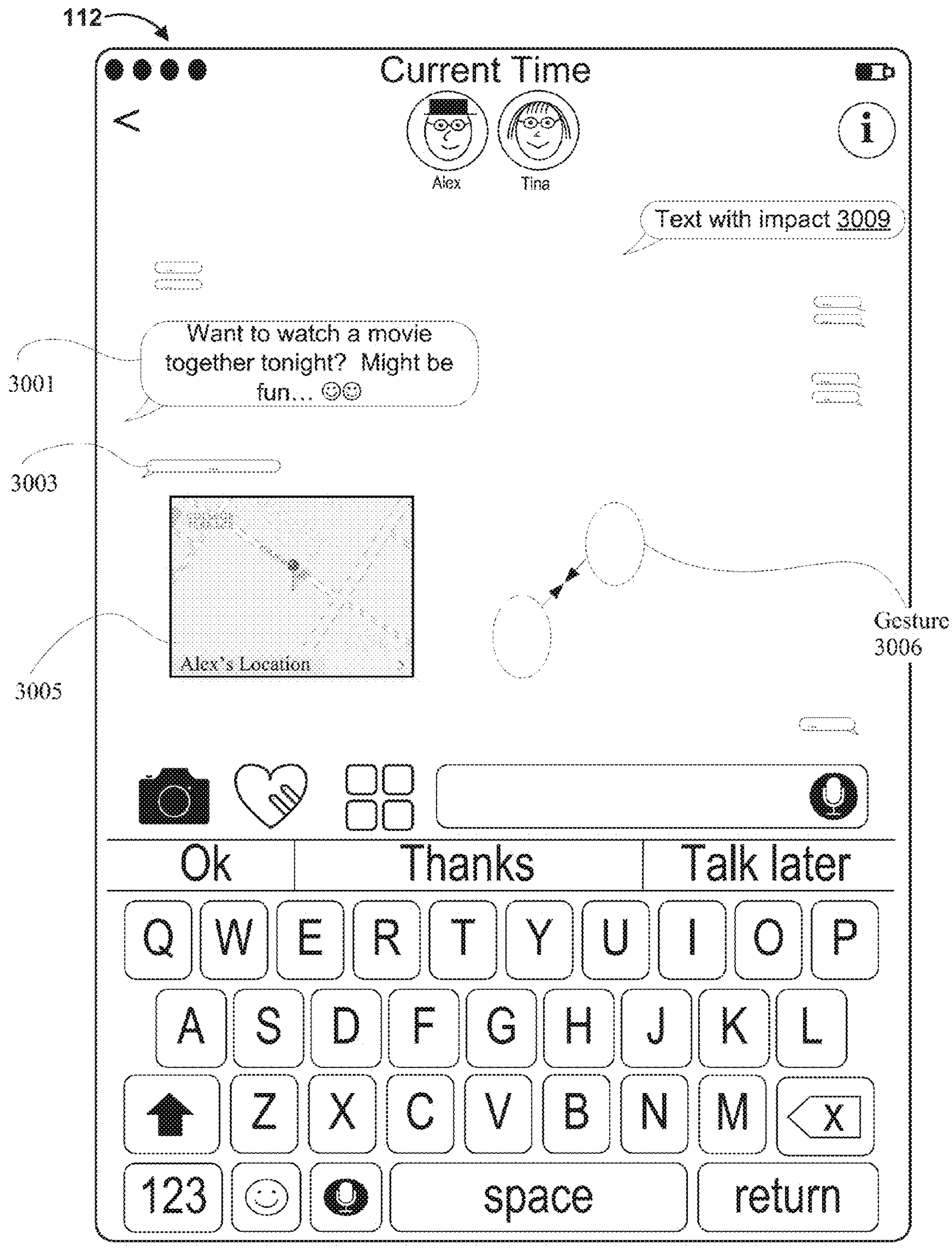
Figure 30D:
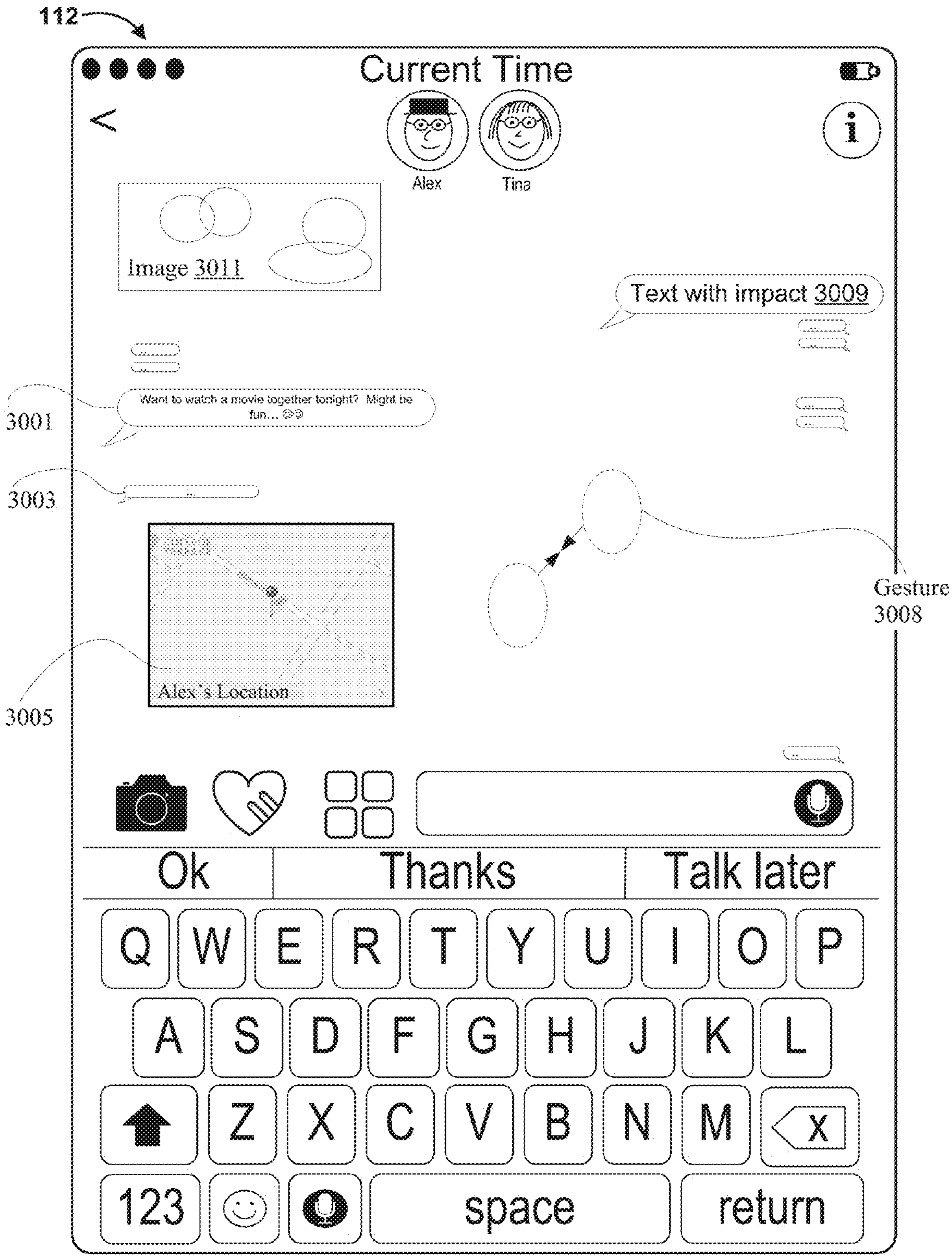
Figure 30E:
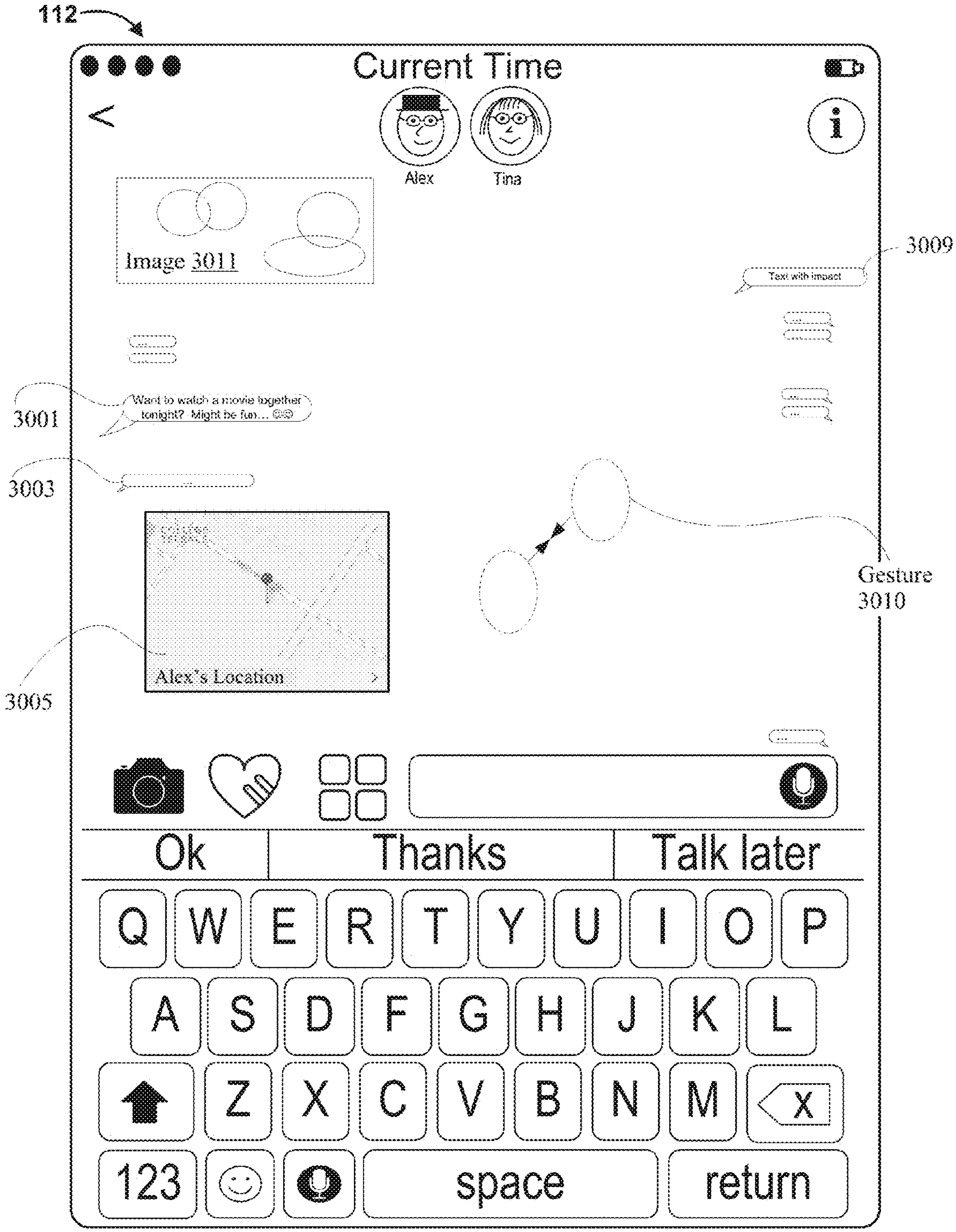
Figure 30F:
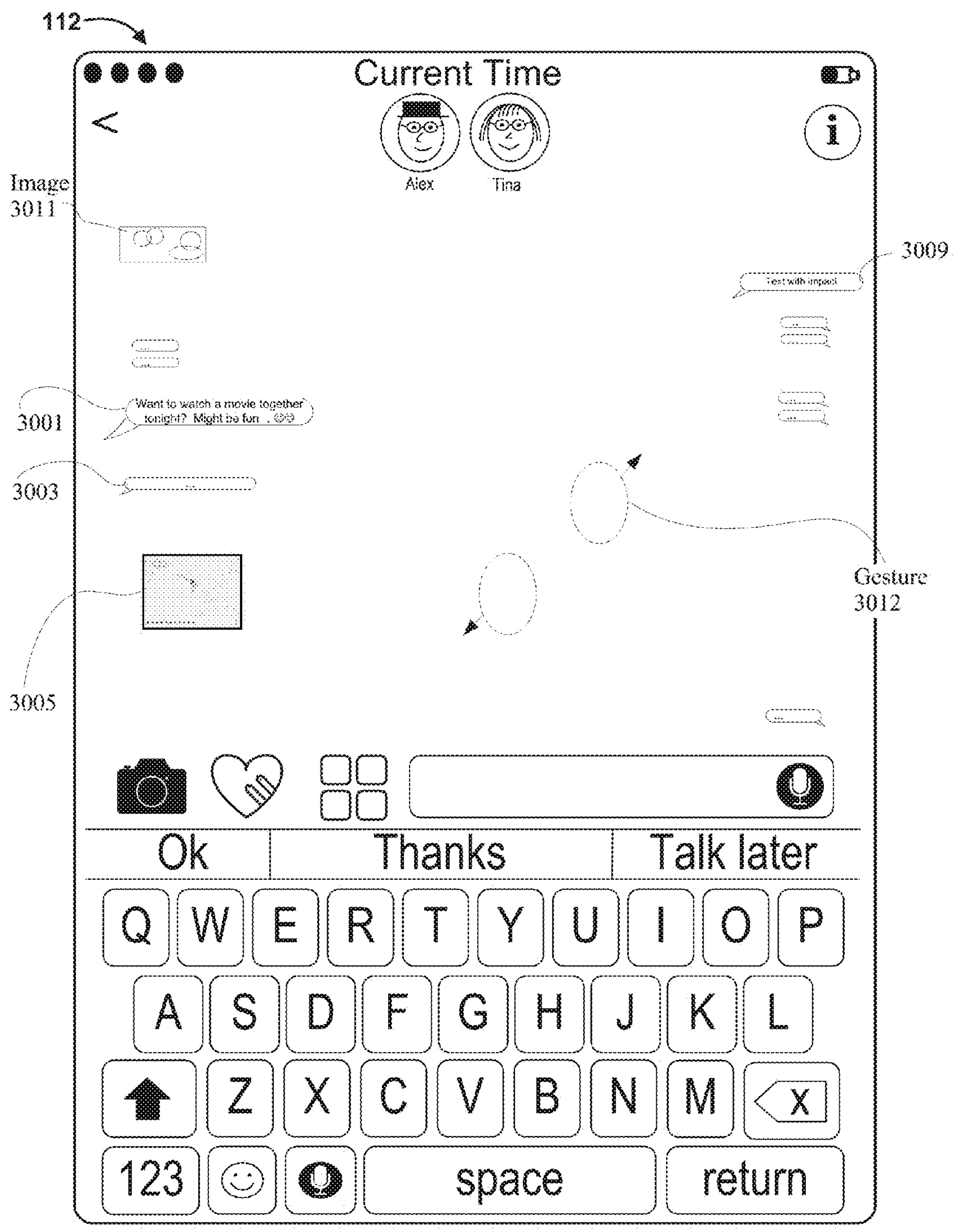

In some embodiments, the device detects (3114) a third input (e.g., a pinch gesture or a portion thereof, such as gesture 3006, shown in FIG. 30C). In response to detecting the third input, the device reduces a display size of content items having the second content type. For example, as shown in FIG. 30D, in response to gesture 3006 shown in FIG. 30C, the display size for content items having the second content type is reduced (e.g., message region 3001 is now displayed with a reduced display size in accordance with the gesture 3008).

In some embodiments, the messaging user interface includes content items having a third content type (e.g., content included in message region 3009 includes text that is associated with a text-rendering effect). The device, after reducing display size of the at least some of the content items having the first and second content types, detects (3116) a fourth input (e.g., a pinch gesture or a portion thereof, such as gesture 3008 shown in FIG. 30D). In response to detecting the fourth input, the device reduces a display size of at least some of the content items having the third content type. (e.g., as shown in FIG. 30E, a display size for the message region 3009 is reduced).

In some embodiments, the messaging user interface includes content items having a fourth content type (e.g., message regions that include graphical content, such as images, maps objects, and other types of graphical content). After reducing display size of the at least some of the content items having the first, second, and third content types, the device detects a fifth input (e.g., a pinch gesture or a portion thereof, such as gesture 3010 shown in FIG. 30E). In response to detecting the fifth input, the device reduces a display size of at least some of the content items having the fourth content type (e.g., as shown in FIG. 30F, the device reduces a display size for content included in message region 3011 (an image) and message region 3005 (a maps object).

In some embodiments, reducing display sizes for the at least some content items having each of the first, second, third, and fourth content types is performed based on a hierarchical order (e.g., a predefined order of importance) assigned to each of the content types. In other words, some embodiments include at least four different content types that are scrunched down one after another in response to inputs (e.g., pinch gestures or portions of a single pinch gesture). For example, messaging bubbles with only text are scrunched down first, then messaging bubbles that include emojis are scrunched down, followed by messaging bubbles that are associated with a text-rendering effect (e.g., private messages), and then photos that are included in the conversation transcript are scrunched down (in some embodiments, the photos are not included in messaging bubbles).

Figure 30G:
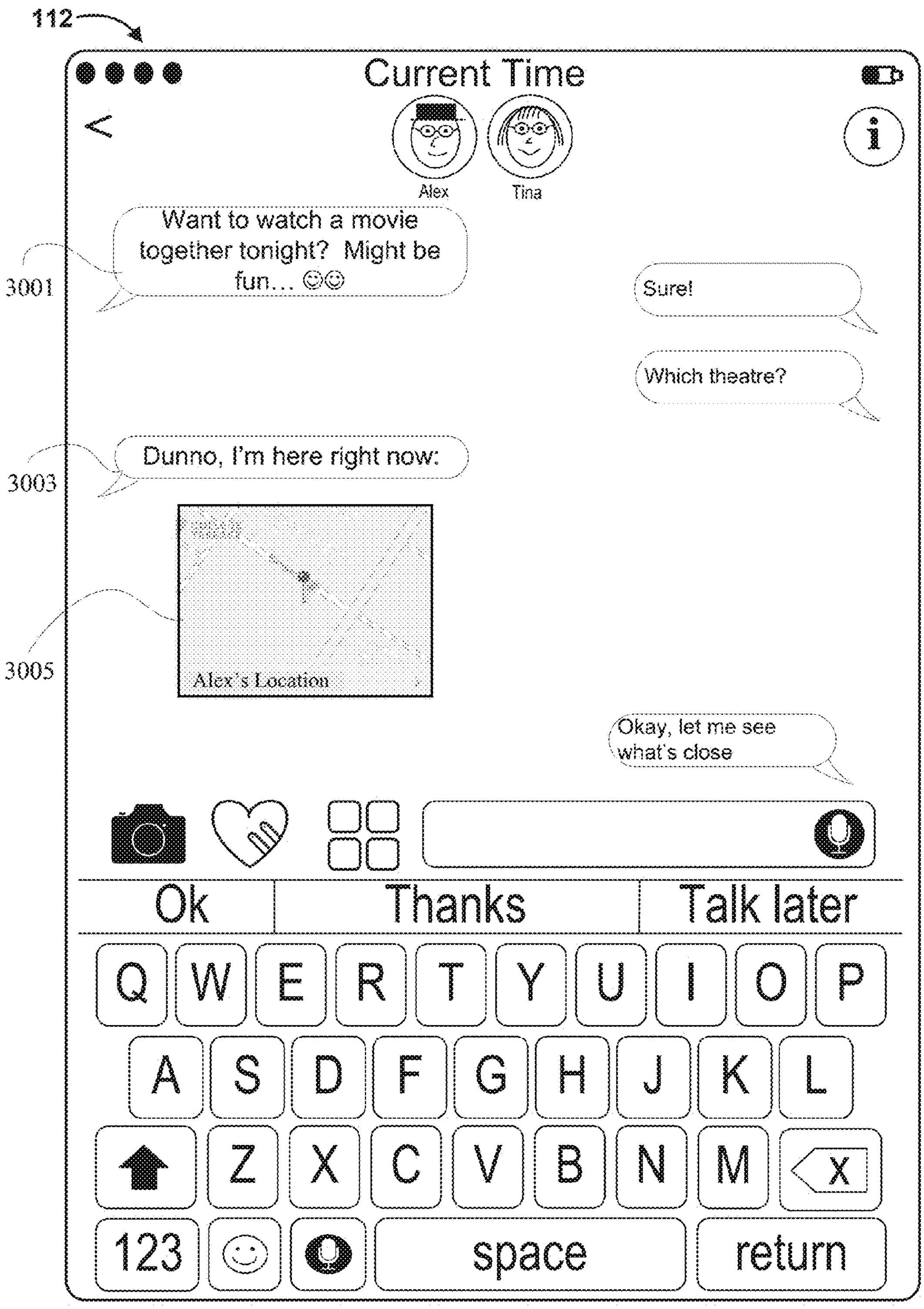

In some embodiments, the device receives a new input (e.g., one or more de-pinch gestures, such as gesture 3012, FIG. 30F). In response to receiving the new input, the device reverts display size of the at least some content items having the first content type back to the respective first size (as shown in FIG. 30G display sizes for message regions that include content items having first (3003), second (3001), and fourth (3005) content types are all returned to their respective first/default sizes. In some embodiments, the new input may be utilized to revert display sizes for any content items that have been scrunched down back to their respective first sizes (e.g., as shown in FIGS. 30-F-30G, the de-pinch gesture 3012 is used to quickly increase display sizes for content items having a number of content types). In some embodiments, the user is able to gradually perform the de-pinch gesture 3012 and each content item have each respective content type will revert back to its respective first size at an appropriate time.

In some embodiments, at any point during method 3100 (or method 3300 below) if a new message is received (and then displayed within a new message region within the messaging user interface), the device displays that message bubble at its respective first size (instead of displaying it as being scrunched down). In this way, users are still able to view new messages.

It should be understood that the particular order in which the operations in FIGS. 31A-31B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 3100 described above. For example, the contacts, gestures, user interface objects, intensity thresholds, focus selectors, and animations described above with reference to method 3100 optionally have one or more of the characteristics of the contacts, gestures, user interface objects, intensity thresholds, focus selectors, and animations described herein with reference to other methods described herein. For brevity, these details are not repeated here.

Figure 32:
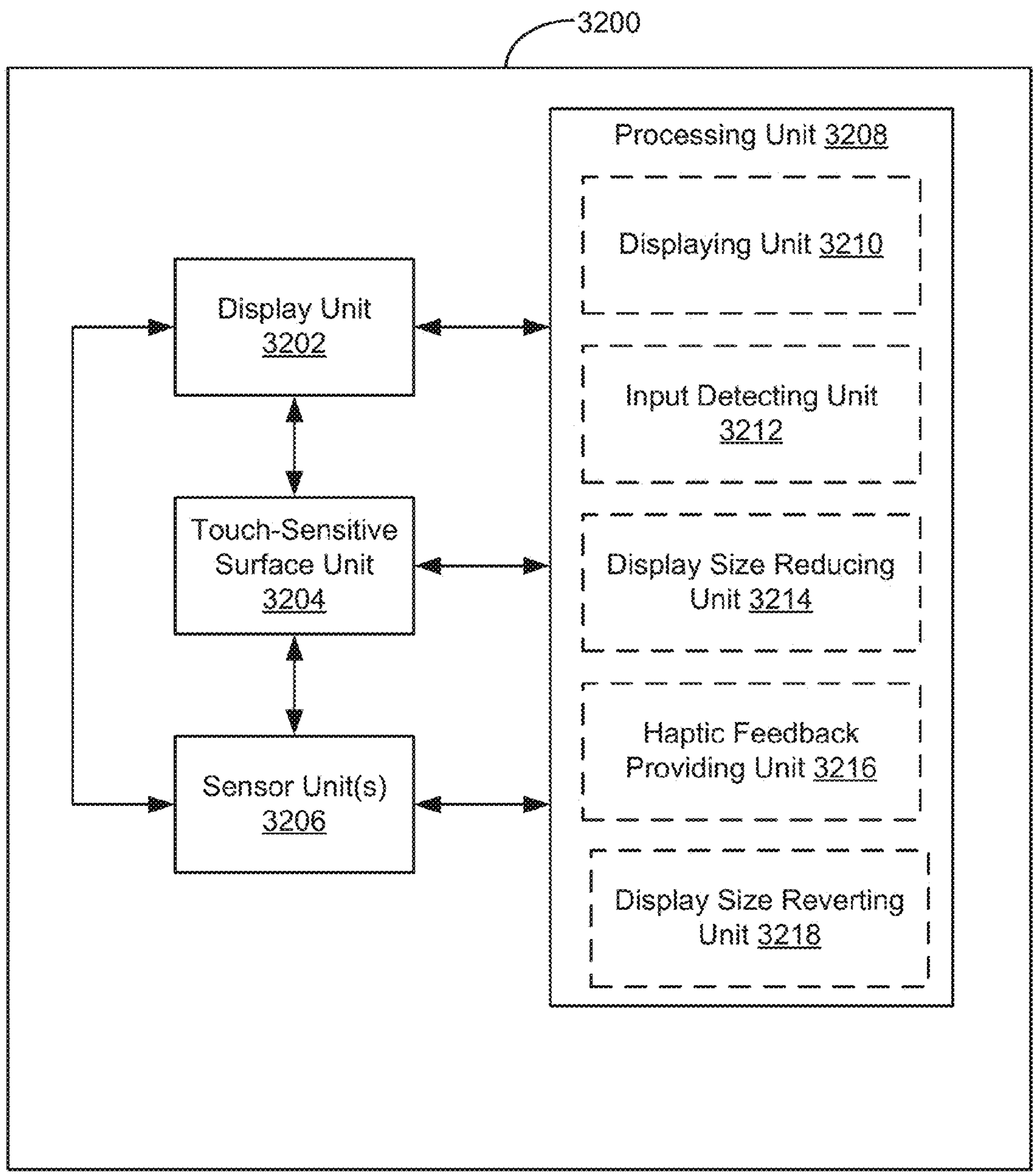
FIG. 32 is a functional block diagram of an electronic device, in accordance with some embodiments.

In accordance with some embodiments, FIG. 32 shows a functional block diagram of an electronic device 3200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 32 are, optionally, combined or separated into sub-blocks to implement the principles of the various described embodiments. Therefore, the description herein optionally supports any possible combination or separation or further definition of the functional blocks described herein.

As shown in FIG. 32, an electronic device 3200 includes a display unit 3202 configured to display a user interface, a touch-sensitive surface unit 3204 configured to receive contacts, one or more sensor units 3206 for detecting intensities of contacts on the touch-sensitive surface unit 3204; and a processing unit 3208 coupled with the display unit 3202, the touch-sensitive surface unit 3204 and the one or more sensor units 3206. In some embodiments, the processing unit 3208 includes a displaying unit 3210, an input detecting unit 3212, a display size reduction unit 3214, a haptic feedback providing unit 3216, and a display size reverting unit 3218.

The processing unit 3208 is configured to display (e.g., with the displaying unit 3210), on the display (e.g., the display unit 3202), a messaging user interface that includes a plurality of content items. In some embodiments, the plurality of content items includes content items having a first content type, the plurality of content items includes content items having a second content type that is distinct from the first content type, and a respective content item in the plurality of content items is displayed with a respective first size. While displaying the messaging user interface, the processing unit is configured to: detect, via the touch-sensitive surface, a first input and, in response to detecting the first input, reduce a display size of at least some content items having the first content type while continuing to display content items having the second content type with their respective first size.

In accordance with some embodiments of the electronic device 3200, the processing unit is configured to: after reducing the display size of at least some of the content items having the first content type, detecting, via the touch-sensitive surface, a second input (e.g., with the input detecting unit 3212) that corresponds to a request to scroll the messaging user interface; and, in response to detecting the second input, scrolling the messaging user interface while continuing to display: at least some of the content items having the first content type with the reduced display size, and content items having the second content type with their respective first sizes (e.g., with the displaying unit 3210).

In accordance with some embodiments of the electronic device 3200, the processing unit is further configured to: in conjunction with reducing the display size of at least some content items having the first content type, provide haptic feedback (e.g., with the haptic feedback providing unit 3216).

In accordance with some embodiments of the electronic device 3200, the processing unit is further configured to: receive a new input; and, in response to receiving the new input, revert display size (e.g., with the display size reverting unit 3218) of the at least some content items having the first content type back to the respective first size.

In accordance with some embodiments of the electronic device 3200, reducing the display size includes reducing the display size in accordance with a determination that a characteristic of the first input satisfies first display-size-reduction criteria that are associated with the first content type (e.g., with the display size reducing unit 3214).

In accordance with some embodiments of the electronic device 3200, the processing unit is further configured to: detect a third input (e.g., with the input detecting unit 3212) and, in response to detecting the third input, reduce a display size of content items having the second content type (e.g., with the display size reducing unit 3214).

In accordance with some embodiments of the electronic device 3200, the messaging user interface includes content items having a third content type, and the processing unit is further configured to: after reducing display size of the at least some of the content items having the first and second content types, detect a fourth input (e.g., with the input detecting unit 3212) and, in response to detecting the fourth input, reduce a display size of at least some of the content items having the third content type (e.g., with the display size reducing unit 3214).

In accordance with some embodiments of the electronic device 3200, the messaging user interface includes content items having a fourth content type, and the processing unit is further configured to: after reducing display size of the at least some of the content items having the first, second, and third content types, detect a fifth input (e.g., with the input detecting unit 3212); and, in response to detecting the fifth input, reduce a display size of at least some of the content items having the fourth content type (e.g., with the display size reducing unit 3214).

In accordance with some embodiments of the electronic device 3200, reducing display sizes for the at least some content items having each of the first, second, third, and fourth content types is performed based on a hierarchical order assigned to each of the content types.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 31A-31B are, optionally, implemented by components depicted in FIGS. 1A-1B or FIG. 32. For example, some operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 33B:
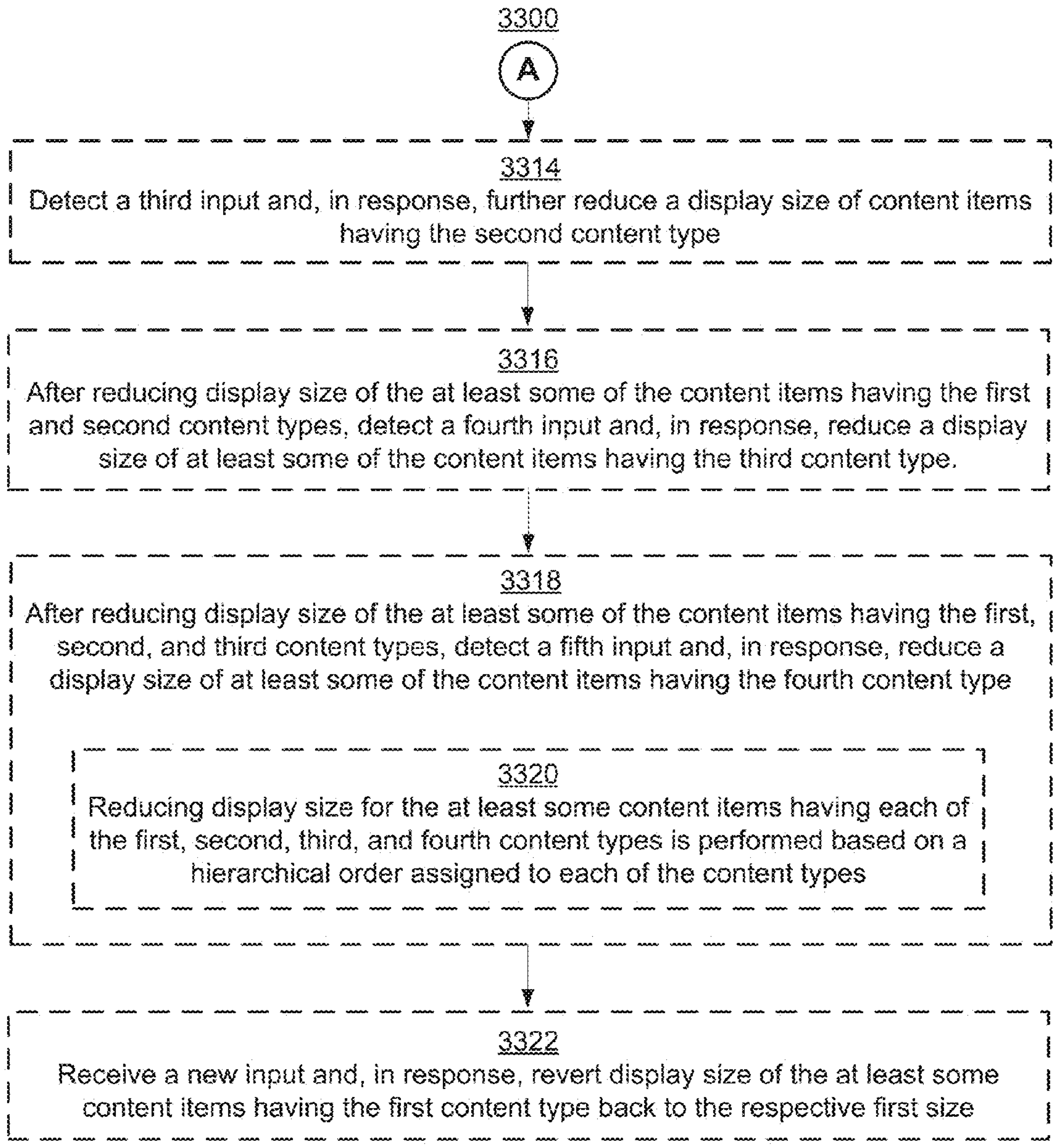

FIGS. 33A-33B are flow diagrams illustrating a method 3300 of quickly locating different types of content in a messaging application, in accordance with some embodiments. The method 3300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3300 are, optionally, combined and/or the order of some operations is, optionally, changed.

As described below, the method 3300 provides an intuitive way to locate different types of content in a messaging application. The method produces more efficient human-machine interfaces by allowing users to use a simple gesture to quickly scale down display sizes for content in a messaging application, so that users are able to quickly locate desired content (e.g., users can scale down all text-only content in order to quickly locate emojis, photos, videos, or other types of content that may have been received a long time ago). For battery-operated devices, the method helps to conserve power and increase the time between battery charges (e.g., by allowing users to quickly locate desired content instead forcing users to employ inefficient and battery-draining techniques). Furthermore, allowing users to quickly locate desired content enhances the operability of the devices and makes user-device interfaces (e.g., in the messaging application) more efficient by allowing users to easily locate desired content in a potentially large and difficult to search conversation transcript. For example, the user need not scroll through pages and pages of content in the conversation transcript and can instead simply provide intuitive gestures to easily scale down content so that desired content is easily located.

The device displays (3302), on the display, a messaging user interface that includes a plurality of content items. In some embodiments, the messaging user interface includes a conversation transcript of a messaging session between a user of the electronic device and at least one other user, as shown in FIG. 30A. In some embodiments, the plurality of content items includes content items having a first content type. For example, each content item of the first content type is text-based and does not include any emojis or other text-rendering effects (such as making the text appear or disappear in response to a gesture over a content item, also referred to herein as an invisible ink effect or a private message). In some embodiments, the first content type includes text-only messages sent and received via the messaging user interface. In some embodiments, a content item corresponds to content included in a single UI element displayed in the messaging user interface (e.g., a single message region or bubble). Message region 3003 is a one example shown in FIG. 30A of a content item that includes content of the first content type.

In some embodiments, the plurality of content items includes content items having a second content type that is distinct from the first content type. For example, the second content type corresponds to messages containing content other than text-only content, such as emojis or graphical content sent and received via the message user interface, such as camera images, screenshots, maps objects, objects with text-rendering effects, and the like. In some embodiments, content items having the second content type include message regions that include text and emojis (e.g., message region 3001, FIG. 30A). As described in more detail below, the messaging user interface may include content items having a third content type (e.g., the content included in message region 3009, FIG. 30C) and a fourth content type (e.g., the content included in message region 3005 and image 3011, FIGS. 30A and 30D) as well.

In some embodiments, a respective content item in the plurality of content items is displayed with a respective first size. In some embodiments, each content item is displayed with a respective default display size. In some embodiments, different default sizes are associated with the content types (e.g., pictures and other graphical content have a different default display size than text-only content items).

While displaying the messaging user interface (and, in some embodiments, while a focus selector is over the messaging user interface), the device detects (3304), via the touch-sensitive surface, a first input. In some embodiments, the first input (e.g., a first portion of a pinch gesture, such as gesture 3002 shown in FIG. 30A) corresponds to a first request to reduce a display size (or a magnification level) for at least a portion of the content items in the plurality of content items. In some embodiments, the first request is received while some textual-only content is displayed within the messaging user interface (e.g., the message regions that include text-only content including message region 3003, as shown in FIG. 30A).

In response to detecting the first input, the device reduces (3306) a display size of at least some content items having the first content type, such that a first content item having the first content type is reduced to a respective second size that is smaller than the respective first size by a predefined first display-size-reduction factor (e.g., content included in the message region 3003 is reduced from a first size, FIG. 30A, and then to a second size, Figure B). In response to detecting the first input, the device also reduces (3306) a display size of at least some content items having the second content type, such that a second content item having the second content type is reduced to a respective third size that is smaller than the respective first size by a predefined second display-size-reduction factor (e.g., content included in the message region 3001 is reduced from a first size, FIG. 30C, to a second size, FIG. 30D). In some embodiments, the reduction in size for the message region 3001 is performed in response to gesture 3002 and/or 3004. In some embodiments, the predefined second display-size-reduction factor is less than the predefined first display-size-reduction factor. Stated another way, the content items having the first content type are reduced to a smaller display size relative to the content items having the second content type (the content items have the first content type are scrunched down more than the content items having the second content type). In some embodiments, the content items having the second content type are only slightly reduced in size, so as to provide a visual cue to the user that the content items having the second content type can be further reduced in size by providing additional inputs (e.g., additional pinch gestures). For example, as shown in FIG. 30D, message regions that include text-only content (e.g., message region 3003, FIG. 30D) are scrunched down more than message regions that include content in addition to text (e.g., message region 3001, FIG. 30D).

Operations 3308 and 3310 correspond to operations 3108 and 3110, respectively, discussed above in reference to FIG. 31A. As such, the descriptions above in reference to operations 3108 and 3110 are applicable to operations 3308 and 3310 as well.

In some embodiments, after reducing the display size of at least some of the content items having the first content type and at least some of the content items having the second content type, the device detects (3312), via the touch-sensitive surface, a second input that corresponds to a request to scroll the messaging user interface. In response to detecting the second input, the device scrolls the messaging user interface while maintaining displayed sizes of content items having the first content type at the respective second size and content items having the second content type at the respective third size.

In some embodiments, the device detects (3314) a third input and, in response, the device further reduces a display size of content items having the second content type (e.g., as shown in FIG. 30E, the device further reduces message region 3001 and the contained included therein in response to a continuation of or new pinch gesture, such as gesture 3008).

Operations 3316, 3318, 3320, and 3322 correspond to operations 3116, 3118, 3120, and 3122, respectively, discussed above in reference to FIG. 31A. As such, the descriptions above in reference to operations 3116, 3118, 3120, and 3122 are applicable to operations 3316, 3318, 3320, and 3322 as well.

It should be understood that the particular order in which the operations in FIGS. 33A-33B have been described is merely one example and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 3300 described above. For example, the contacts, gestures, user interface objects, intensity thresholds, focus selectors, and animations described above with reference to method 3300 optionally have one or more of the characteristics of the contacts, gestures, user interface objects, intensity thresholds, focus selectors, and animations described herein with reference to other methods described herein. For brevity, these details are not repeated here.

Figure 34:
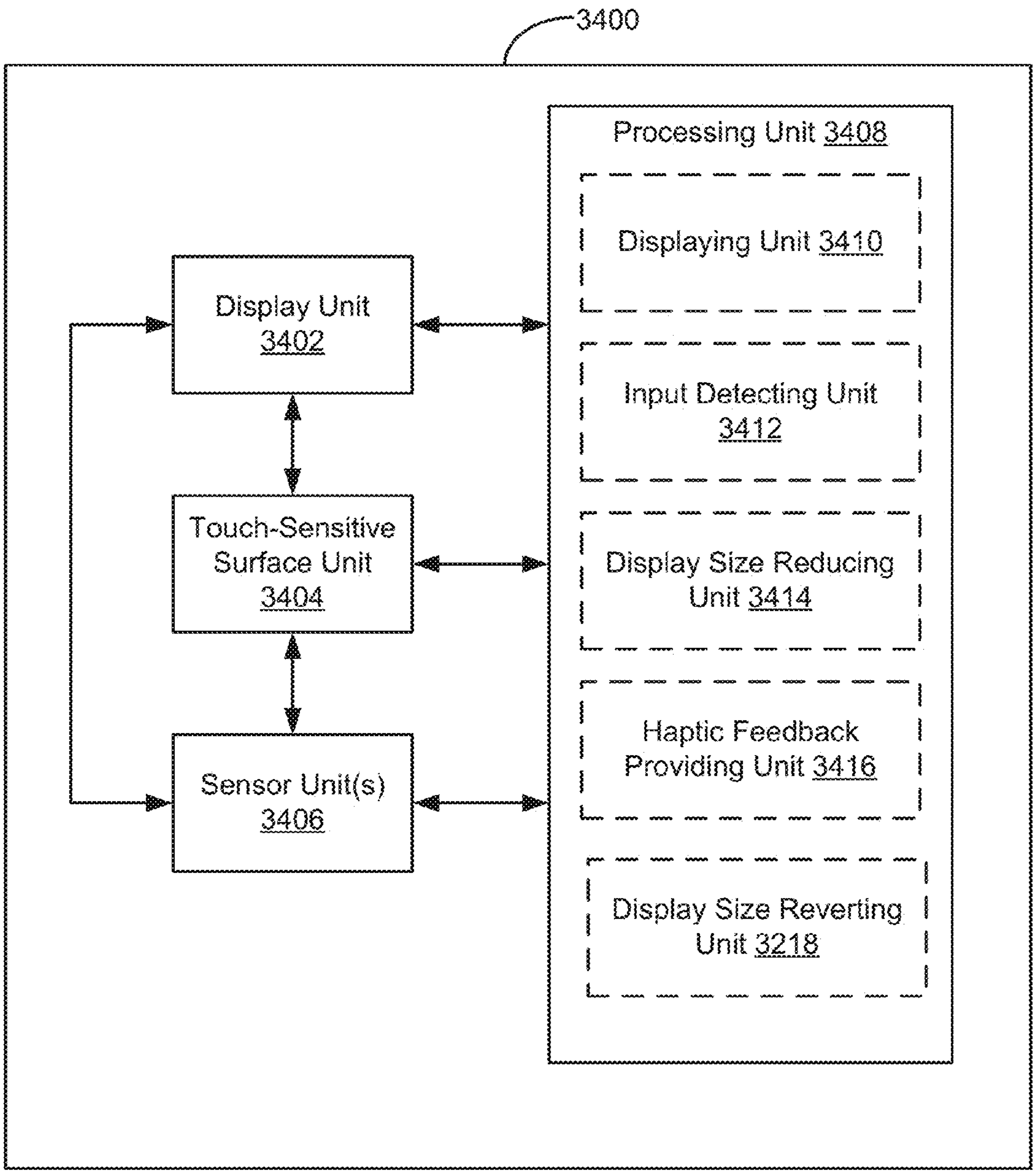
FIG. 34 is a functional block diagram of an electronic device, in accordance with some embodiments.

In accordance with some embodiments, FIG. 34 shows a functional block diagram of an electronic device 3400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 34 are, optionally, combined or separated into sub-blocks to implement the principles of the various described embodiments. Therefore, the description herein optionally supports any possible combination or separation or further definition of the functional blocks described herein.

As shown in FIG. 34, an electronic device 3400 includes a display unit 3402 configured to display a user interface, a touch-sensitive surface unit 3404 configured to receive contacts, one or more sensor units 3406 for detecting intensities of contacts on the touch-sensitive surface unit 3404; and a processing unit 3408 coupled with the display unit 3402, the touch-sensitive surface unit 3404 and the one or more sensor units 3406. In some embodiments, the processing unit 3408 includes a displaying unit 3410, an input detecting unit 3412, a display size reduction unit 3414, a haptic feedback providing unit 3416, and a display size reverting unit 3418.

The processing unit 3408 is configured to display (e.g., with the displaying unit 3410), on the display (e.g., display unit 3402), a messaging user interface that includes a plurality of content items. In some embodiments, the plurality of content items includes content items having a first content type, the plurality of content items includes content items having a second content type that is distinct from the first content type, and a respective content item in the plurality of content items is displayed with a respective first size. While displaying the messaging user interface, detect (e.g., with the input detecting unit 3412), via the touch-sensitive surface, a first input and, in response to detecting the first input: reduce a display size (e.g., with the display size reducing unit 3414) of at least some content items having the first content type, such that a first content item having the first content type is reduced to a respective second size that is smaller than the respective first size by a predefined first display-size-reduction factor; and reduce a display size (e.g., with the display size reducing unit 3414) of at least some content items having the second content type, such that a second content item having the second content type is reduced to a respective third size that is smaller than the respective first size by a predefined second display-size-reduction factor. In some embodiments, the predefined second display-size-reduction factor is less than the predefined first display-size-reduction factor.

In accordance with some embodiments of the electronic device 3400, the processing unit is configured to: after reducing the display size of at least some of the content items having the first content type, detecting, via the touch-sensitive surface, a second input (e.g., with the input detecting unit 3412) that corresponds to a request to scroll the messaging user interface; and, in response to detecting the second input, scrolling the messaging user interface while continuing to display: at least some of the content items having the first content type with the reduced display size, and content items having the second content type with their respective first sizes (e.g., with the displaying unit 3410).

In accordance with some embodiments of the electronic device 3400, the processing unit is configured to: detect a third input (e.g., with the input detecting unit 3412) and, in response to detecting the third input, further reduce display size of each content item having the second content type (e.g., with the display size reducing unit 3414).

In accordance with some embodiments of the electronic device 3400, the processing unit is further configured to: in conjunction with reducing the display size of at least some content items having the first content type, provide haptic feedback (e.g., with the haptic feedback providing unit 3416).

In accordance with some embodiments of the electronic device 3400, the processing unit is further configured to: receive a new input; and, in response to receiving the new input, revert display size (e.g., with the display size reverting unit 3418) of the at least some content items having the first content type back to the respective first size.

In accordance with some embodiments of the electronic device 3400, reducing the display size includes reducing the display size in accordance with a determination that a characteristic of the first input satisfies first display-size-reduction criteria that are associated with the first content type (e.g., with the display size reducing unit 3414).

In accordance with some embodiments of the electronic device 3400, the processing unit is further configured to: detect a third input (e.g., with the input detecting unit 3412) and, in response to detecting the third input, reduce a display size of content items having the second content type (e.g., with the display size reducing unit 3414).

In accordance with some embodiments of the electronic device 3400, the messaging user interface includes content items having a third content type, and the processing unit is further configured to: after reducing display size of the at least some of the content items having the first and second content types, detect a fourth input (e.g., with the input detecting unit 3412) and, in response to detecting the fourth input, reduce a display size of at least some of the content items having the third content type (e.g., with the display size reducing unit 3414).

In accordance with some embodiments of the electronic device 3400, the messaging user interface includes content items having a fourth content type, and the processing unit is further configured to: after reducing display size of the at least some of the content items having the first, second, and third content types, detect a fifth input (e.g., with the input detecting unit 3412); and, in response to detecting the fifth input, reduce a display size of at least some of the content items having the fourth content type (e.g., with the display size reducing unit 3414).

In accordance with some embodiments of the electronic device 3400, reducing display sizes for the at least some content items having each of the first, second, third, and fourth content types is performed based on a hierarchical order assigned to each of the content types.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 33A-33B are, optionally, implemented by components depicted in FIGS. 1A-1B or FIG. 34. For example, some operations are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Integrated Messaging

Figure 35A:
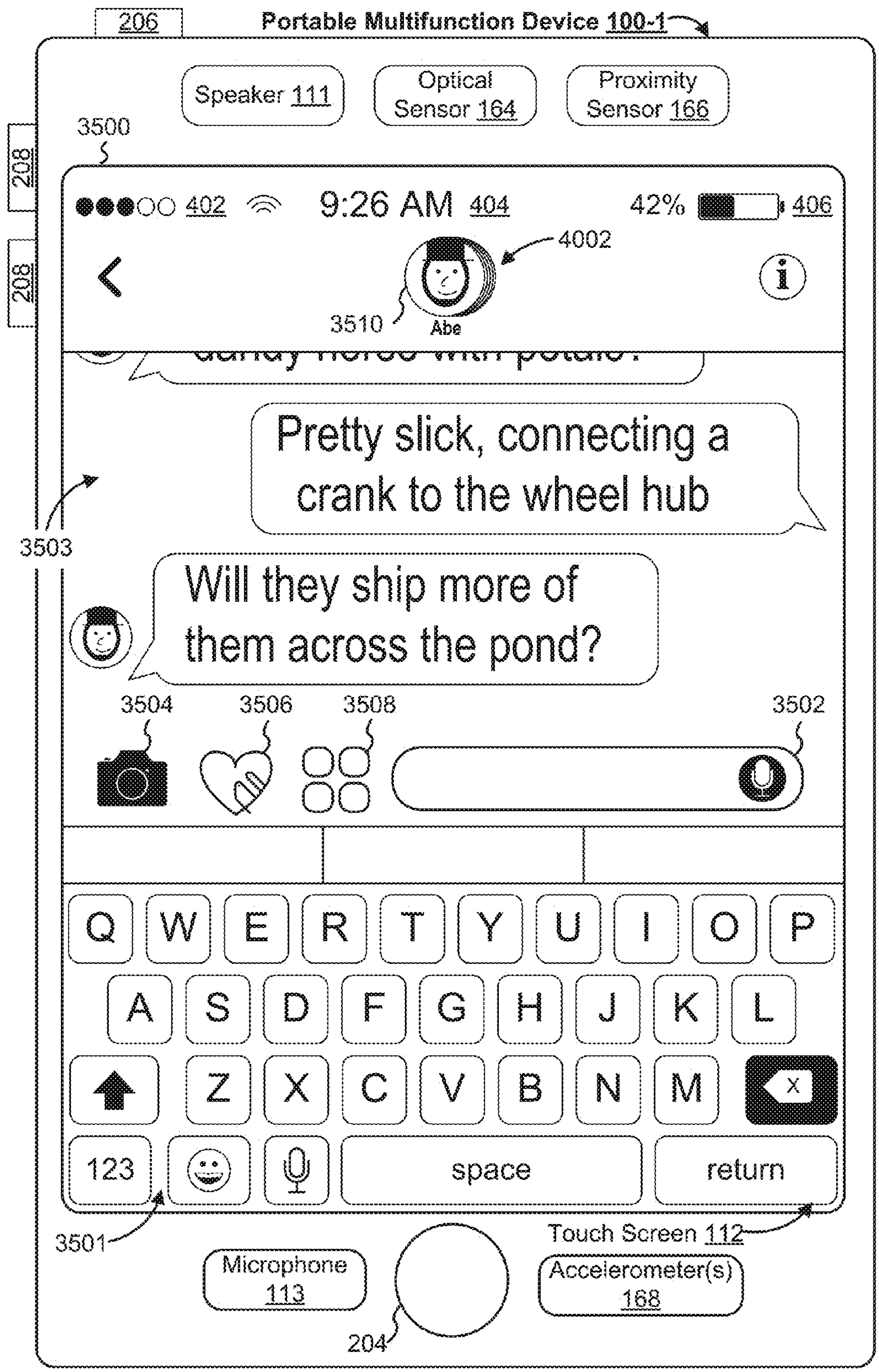
FIGS. 35A-35AP illustrate exemplary user interfaces for integrating a digital camera into a messaging application in accordance with some embodiments.
Figure 35B:
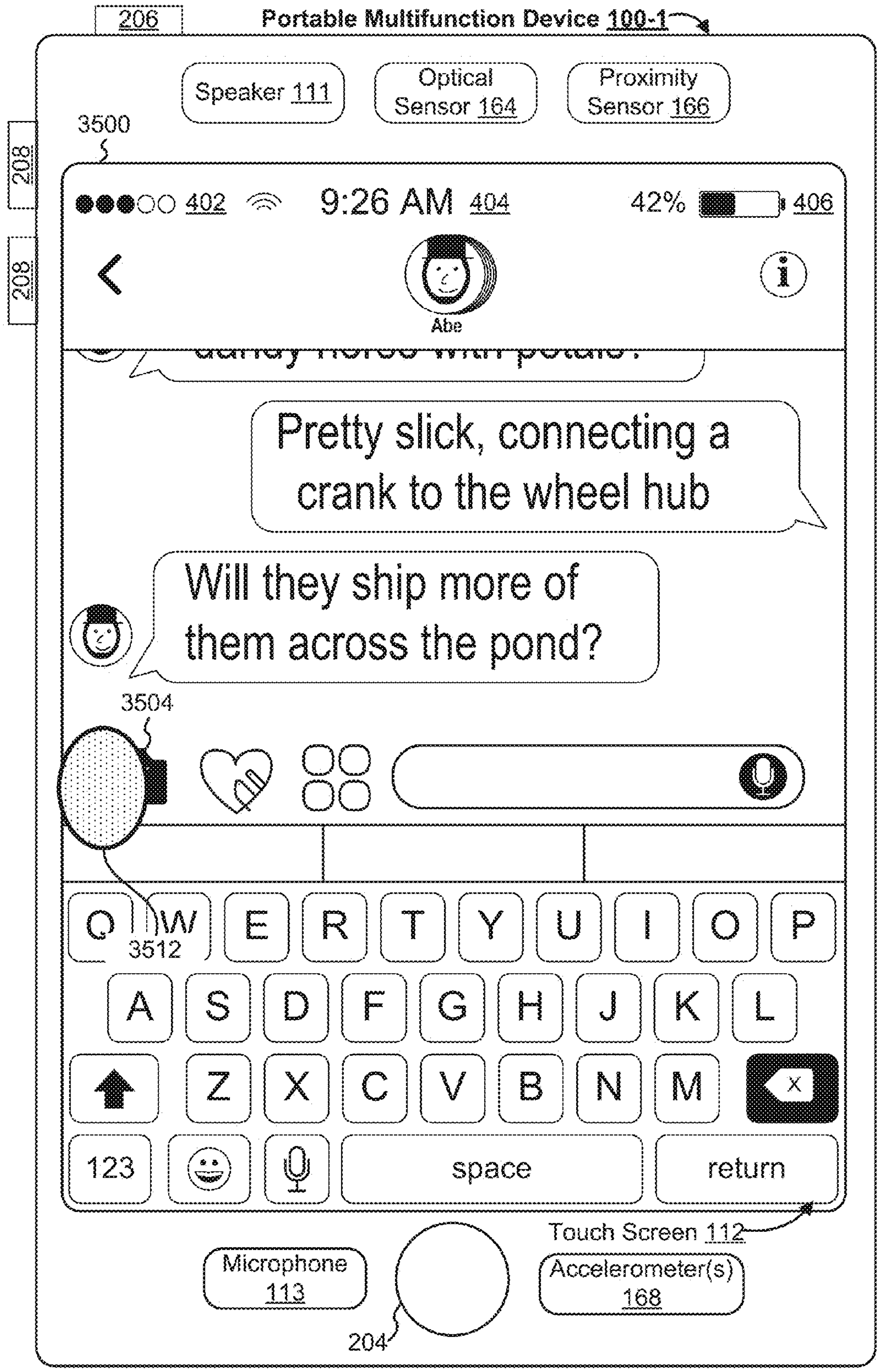
Figure 35C:
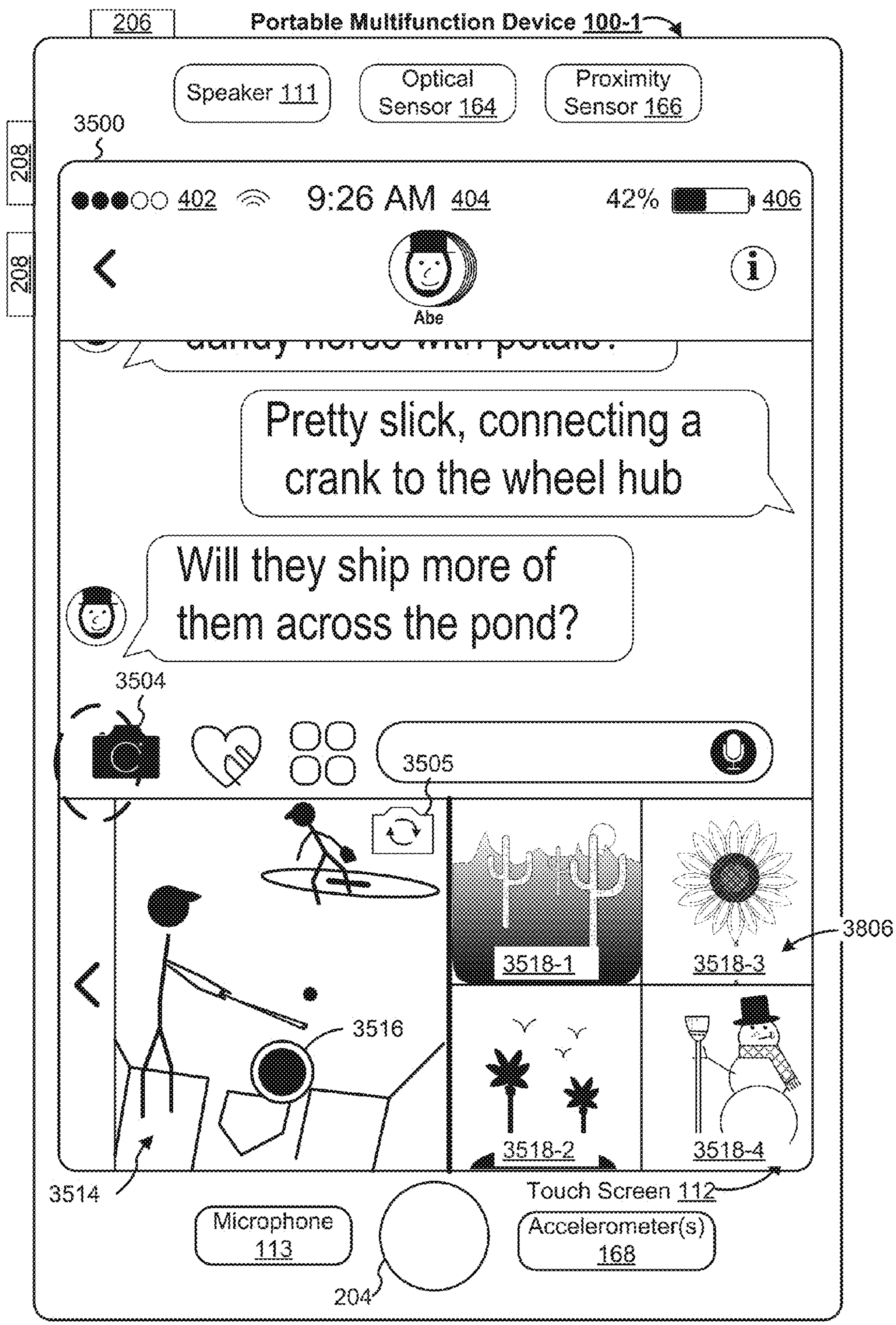

FIGS. 35A-35AP illustrate exemplary user interfaces for integrating a digital camera into a messaging application in accordance with some embodiments. The user interfaces in these figures are used to illustrate the processes described below, including the processes in FIGS. 42A-42D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 35D:
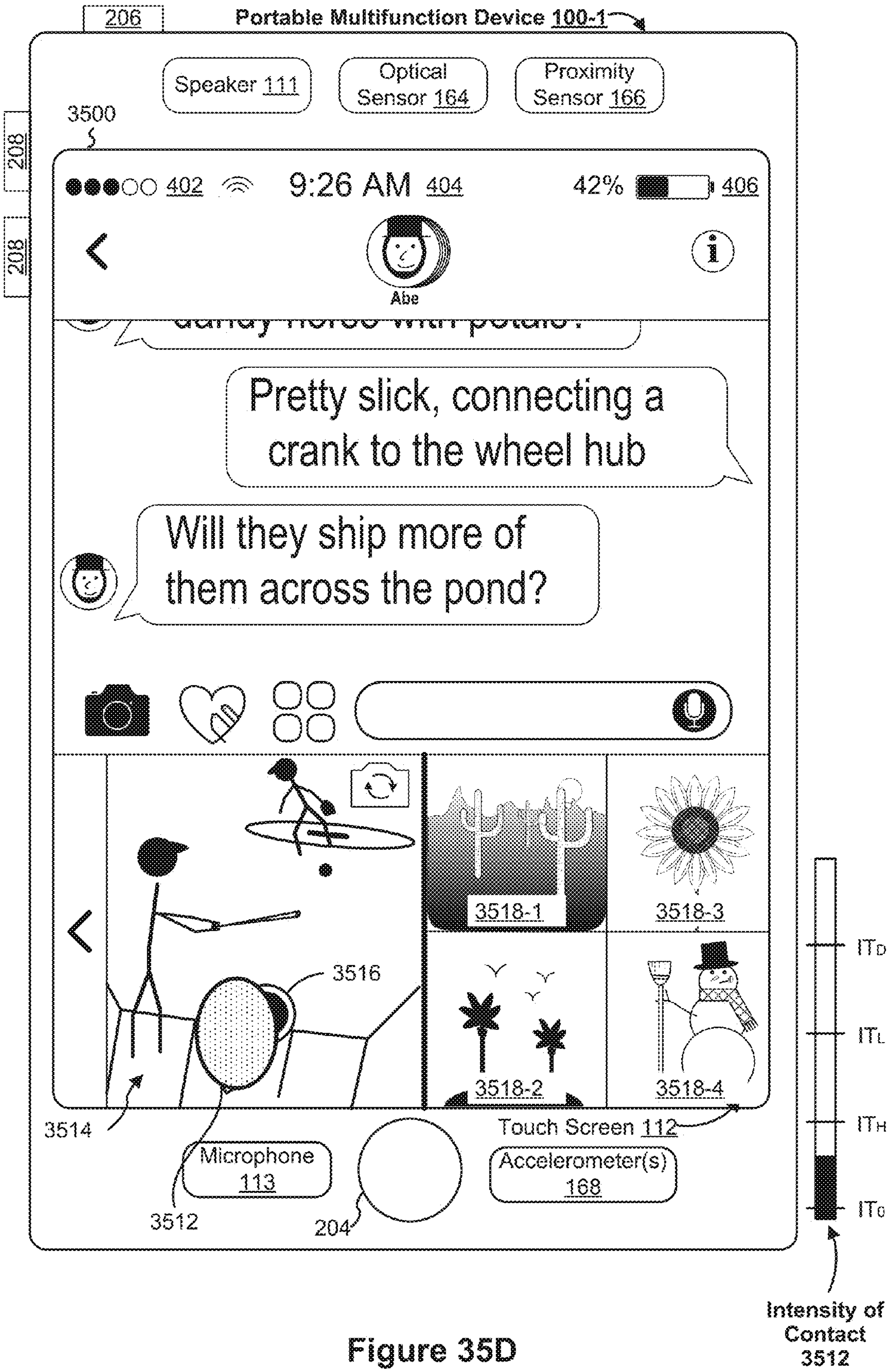
Figure 35E:
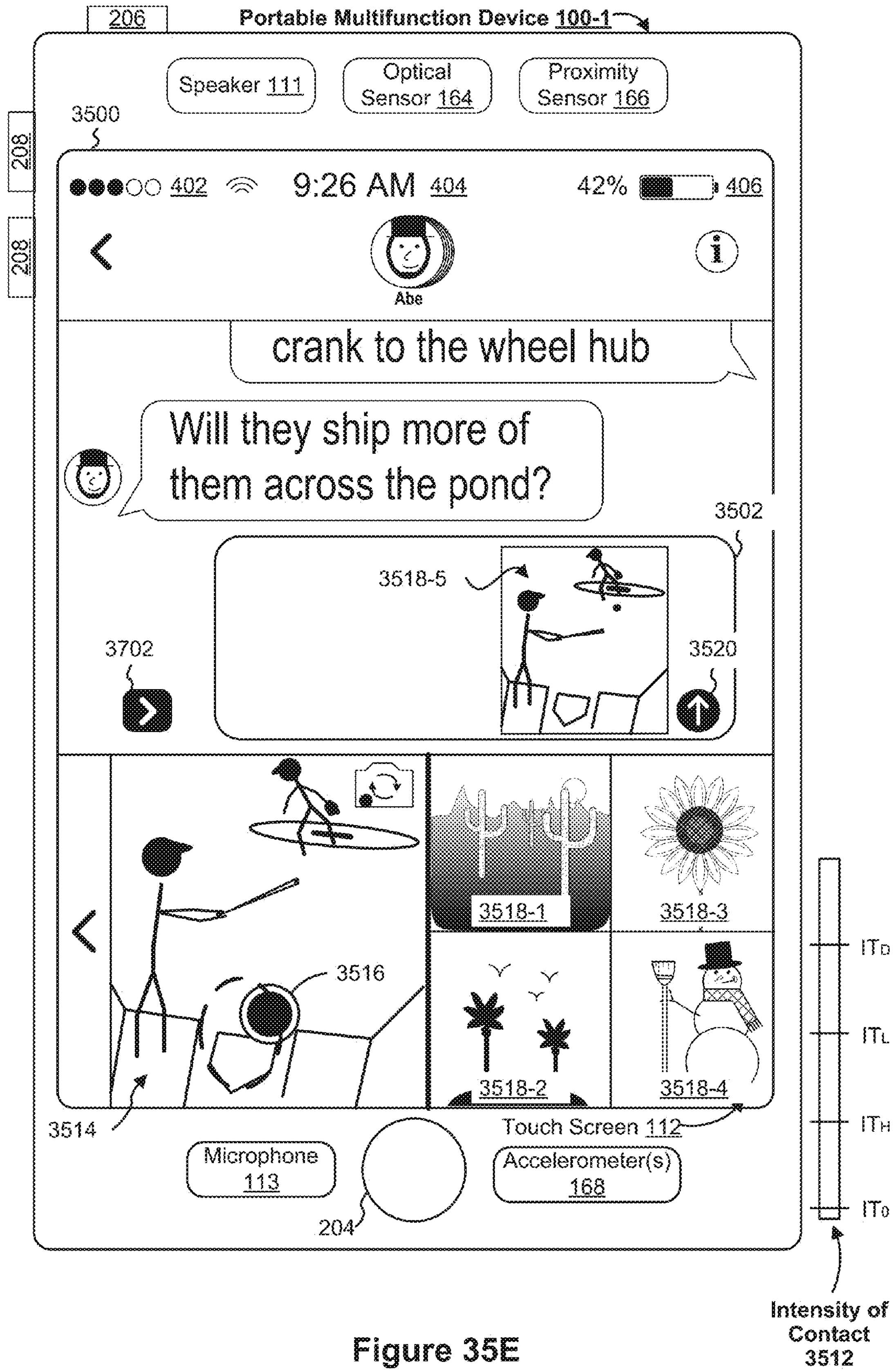
Figure 35F:
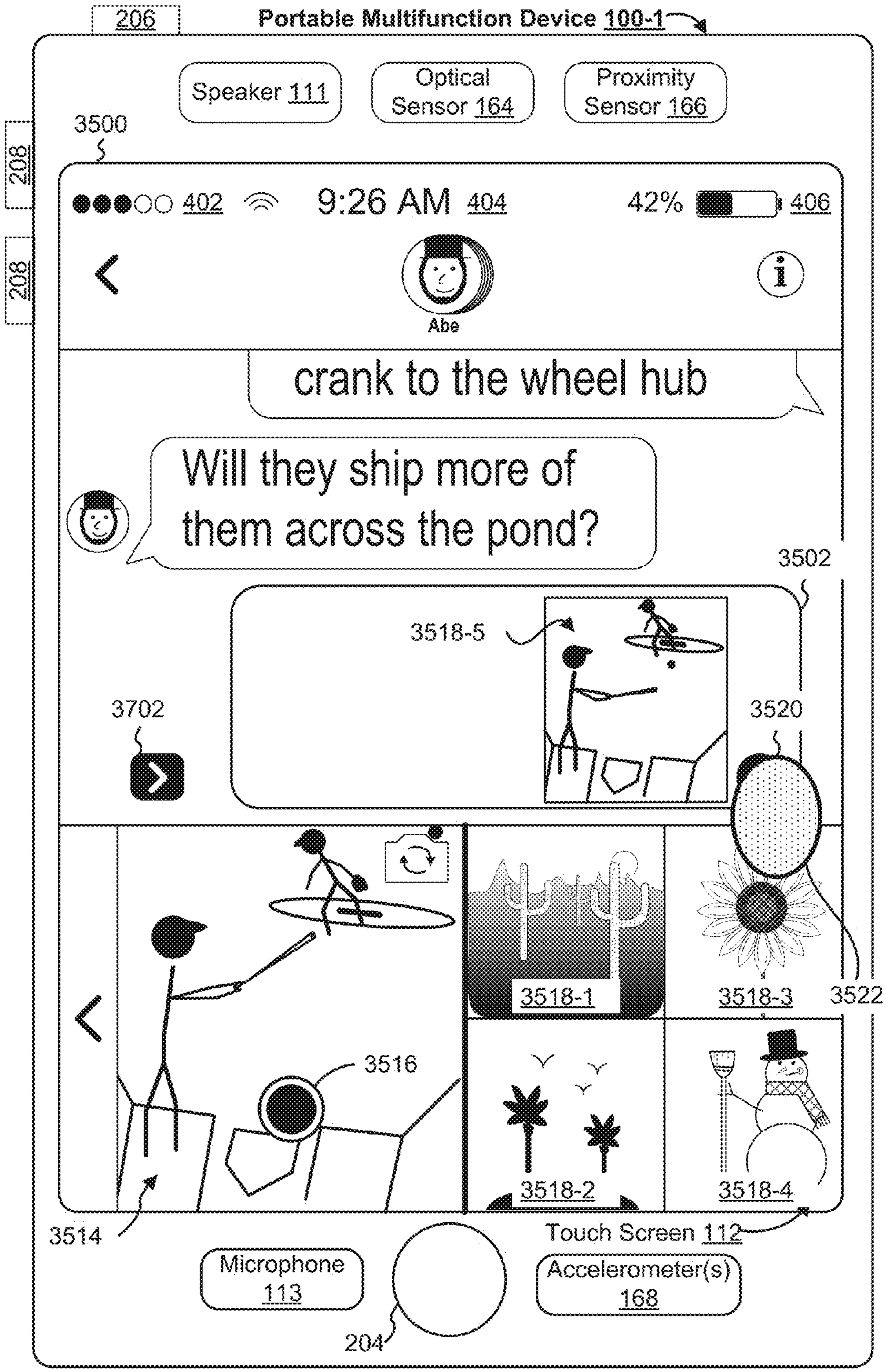
Figure 35G:
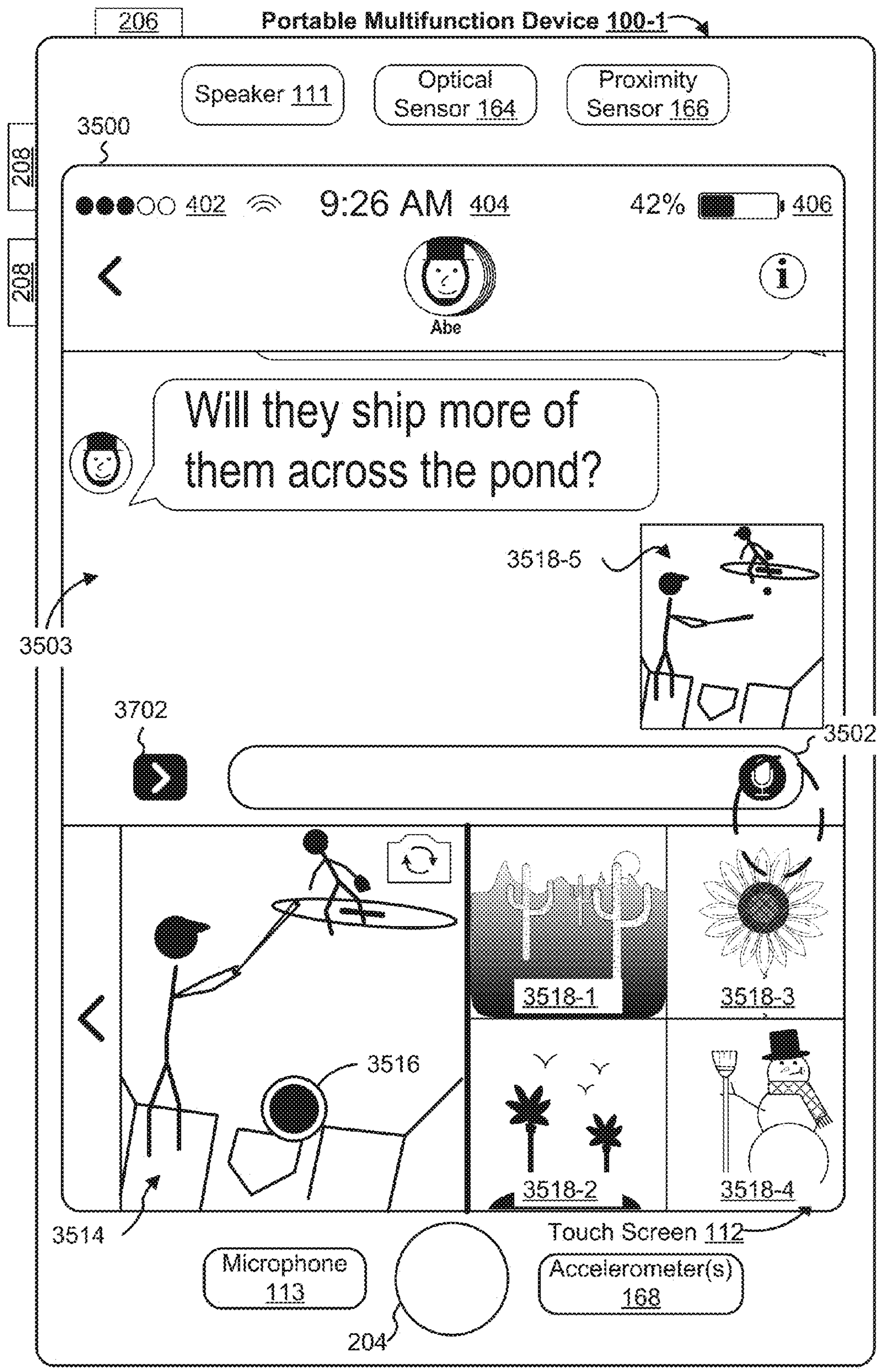
Figure 35H:
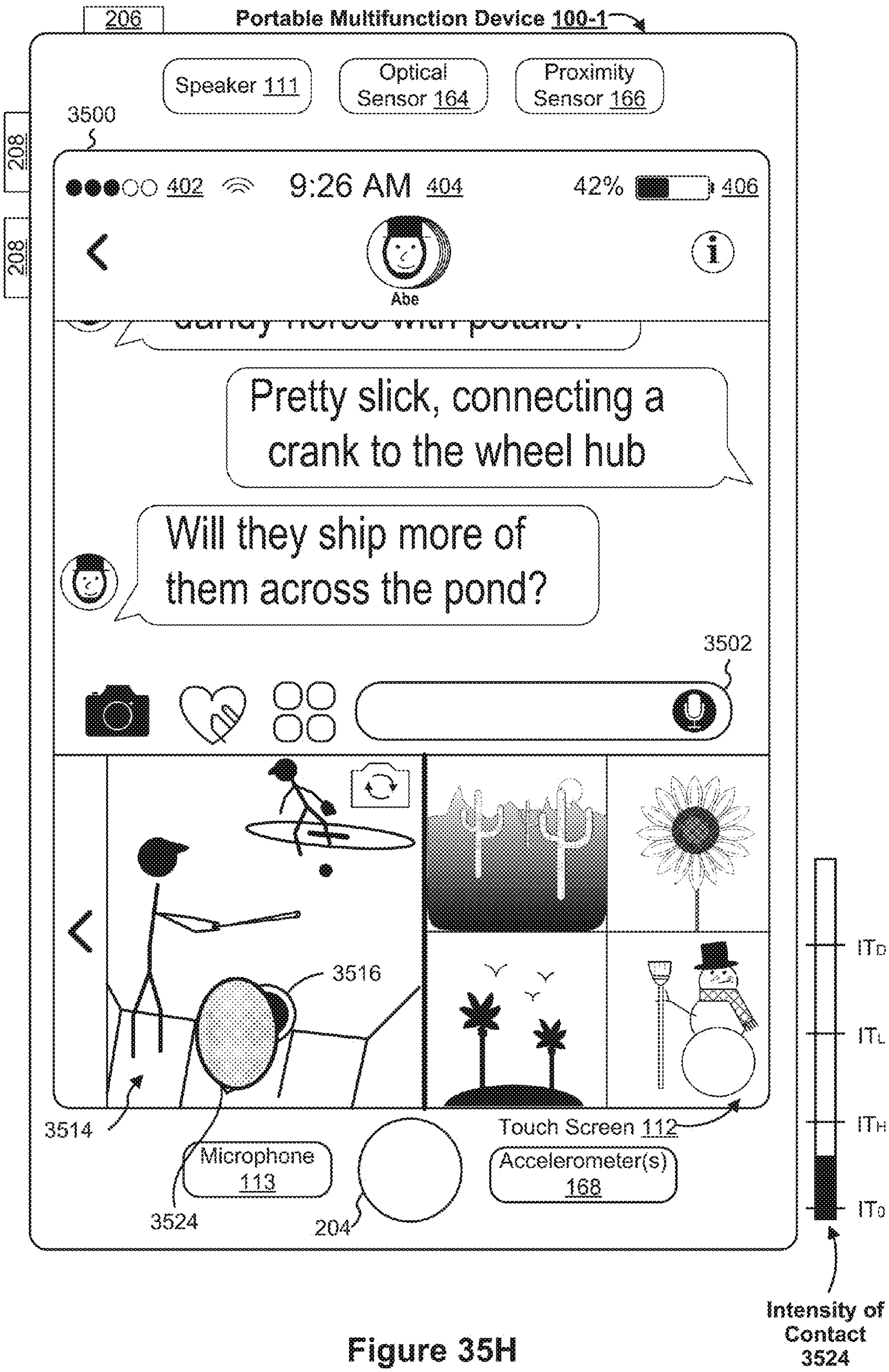
Figure 35I:
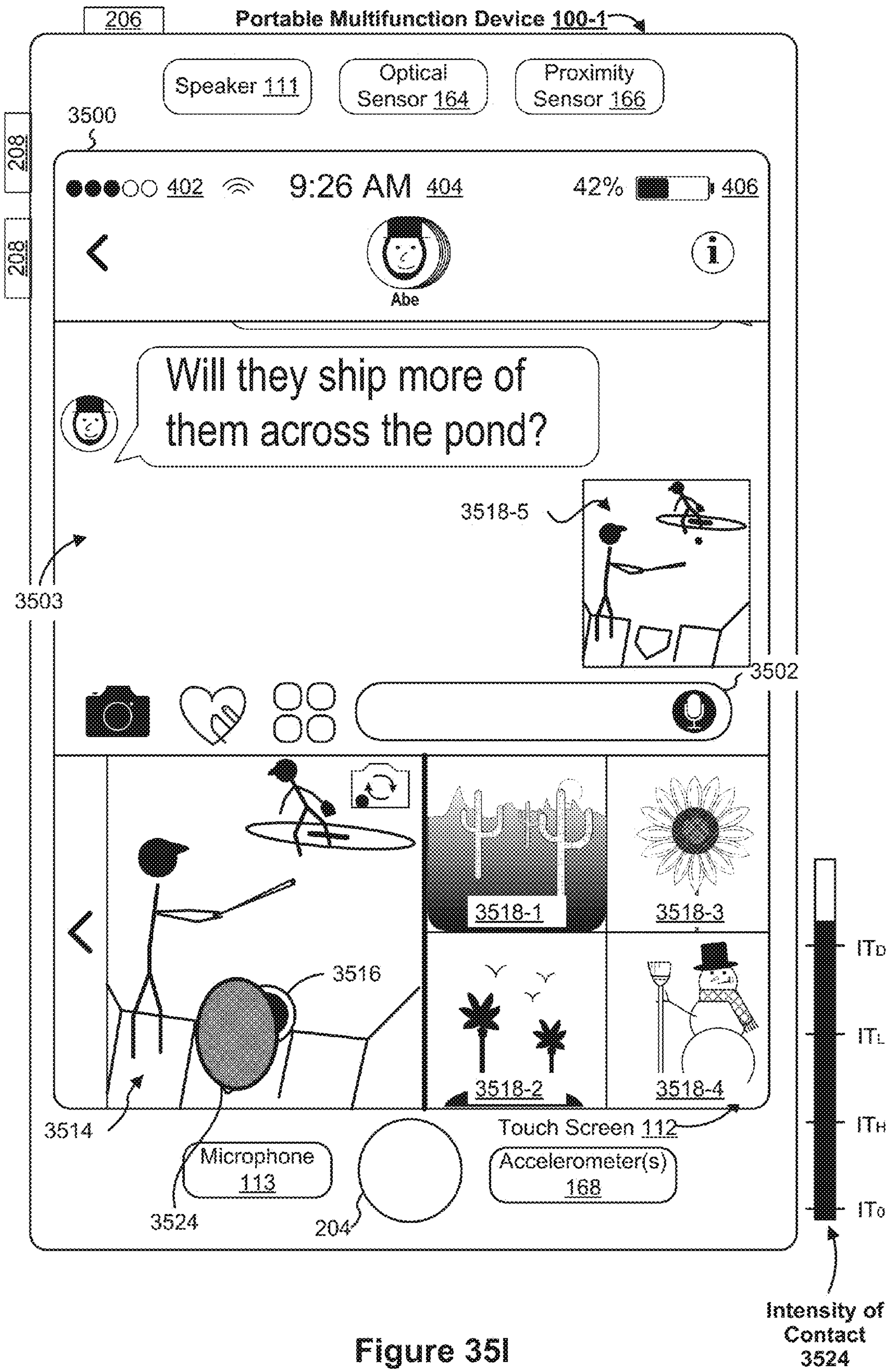
Figure 35J:
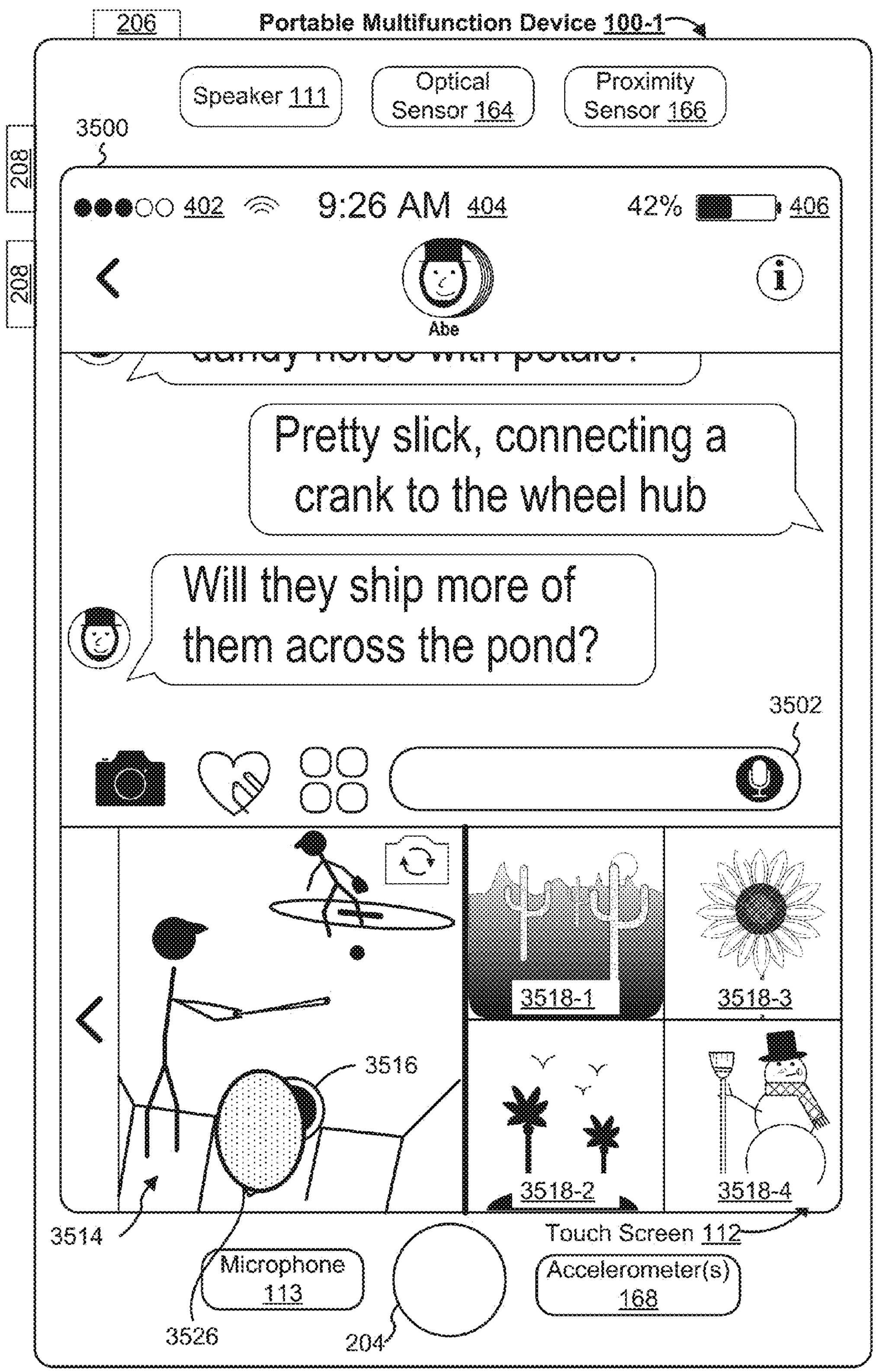
Figure 35K:
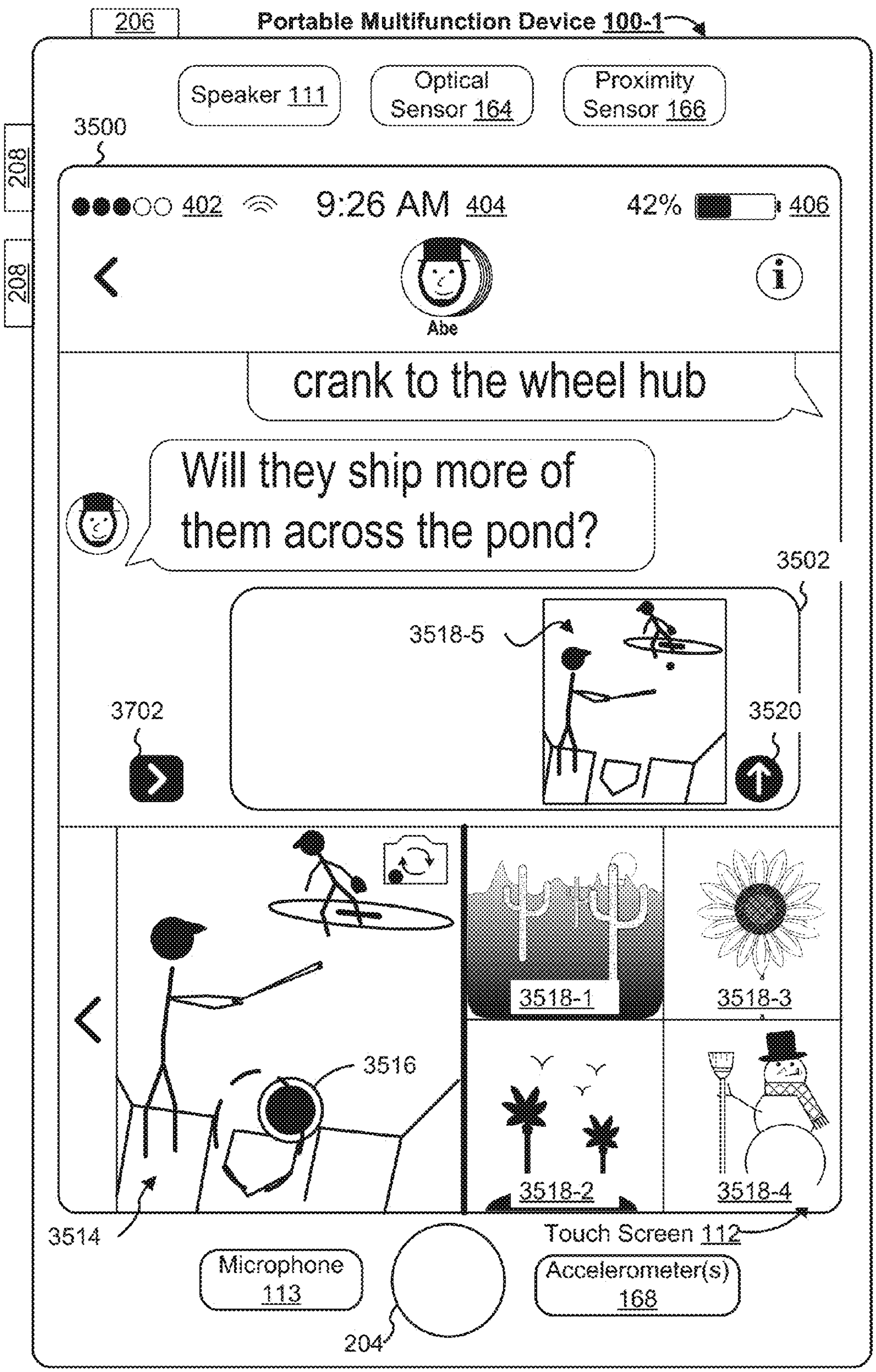
Figure 35L:
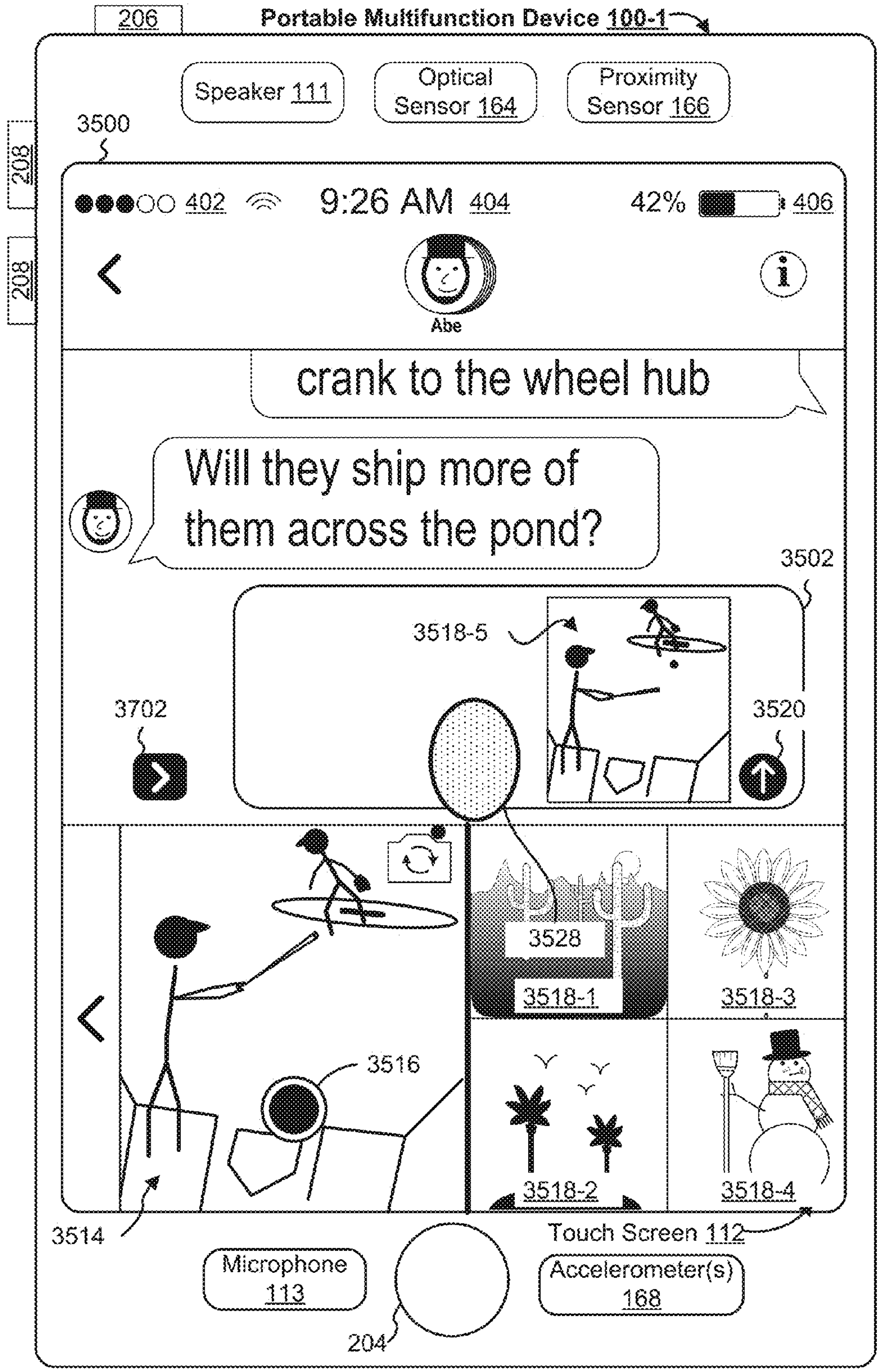
Figure 35M:
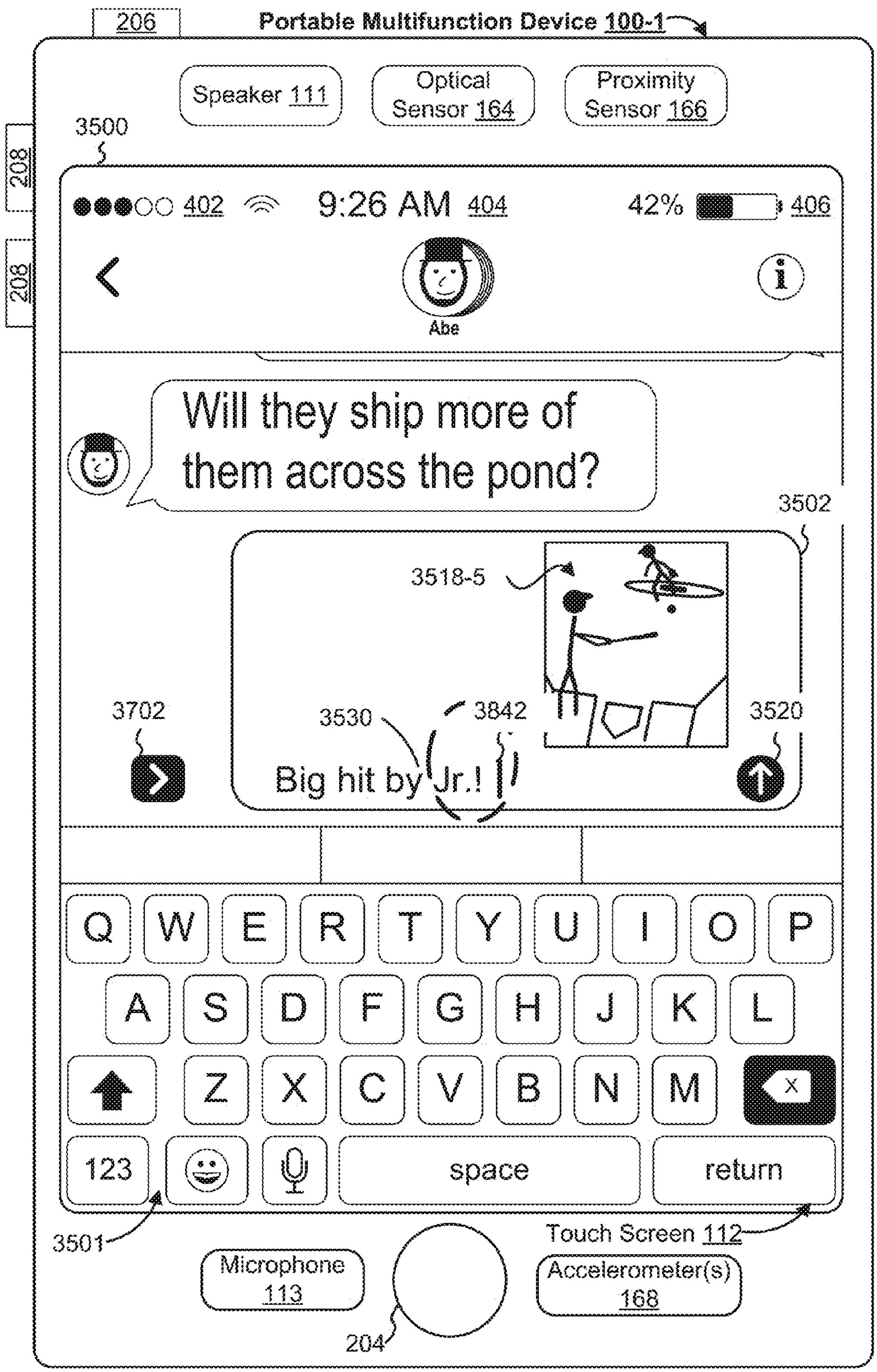
Figure 35N:
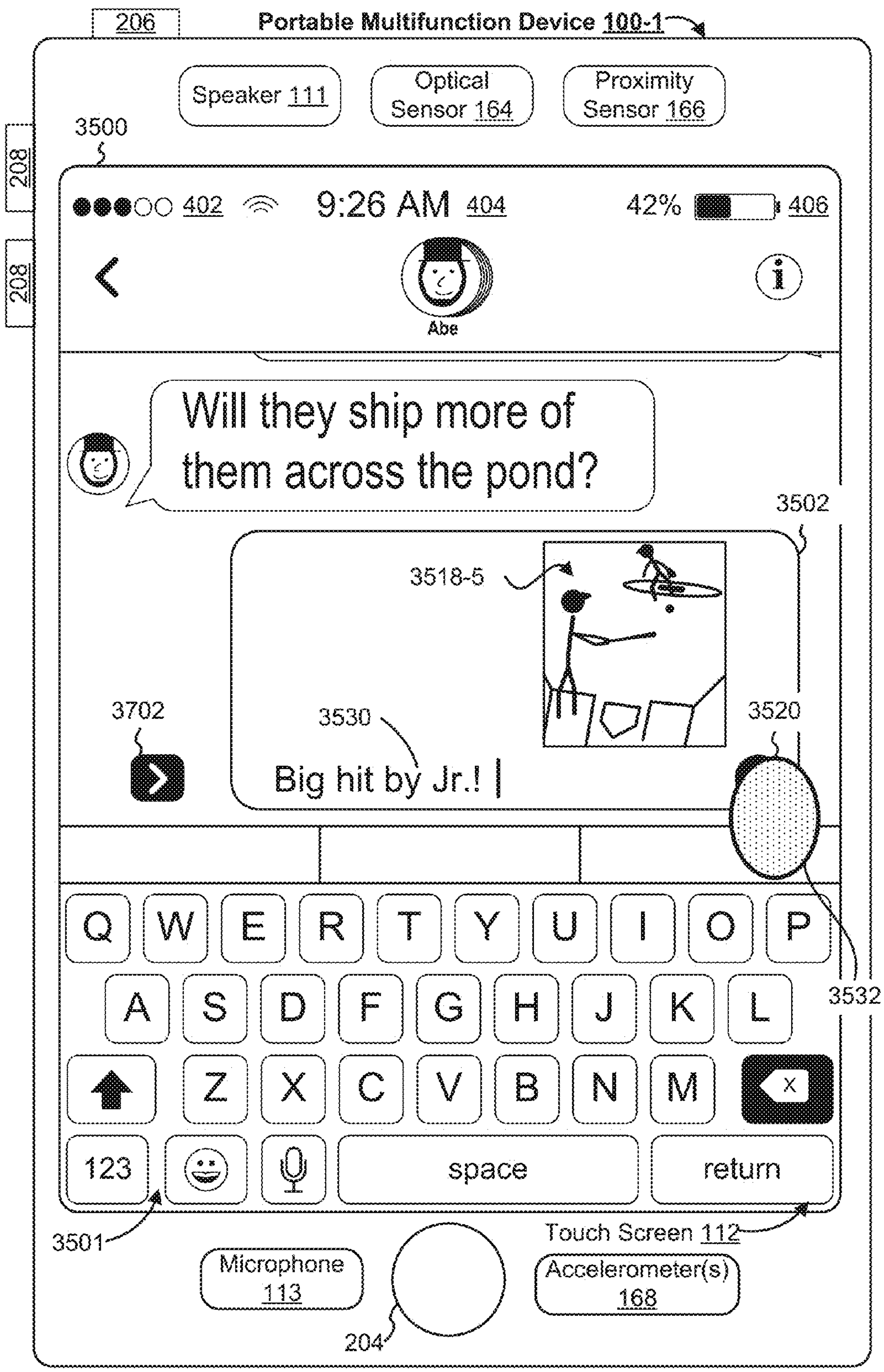
Figure 35O:
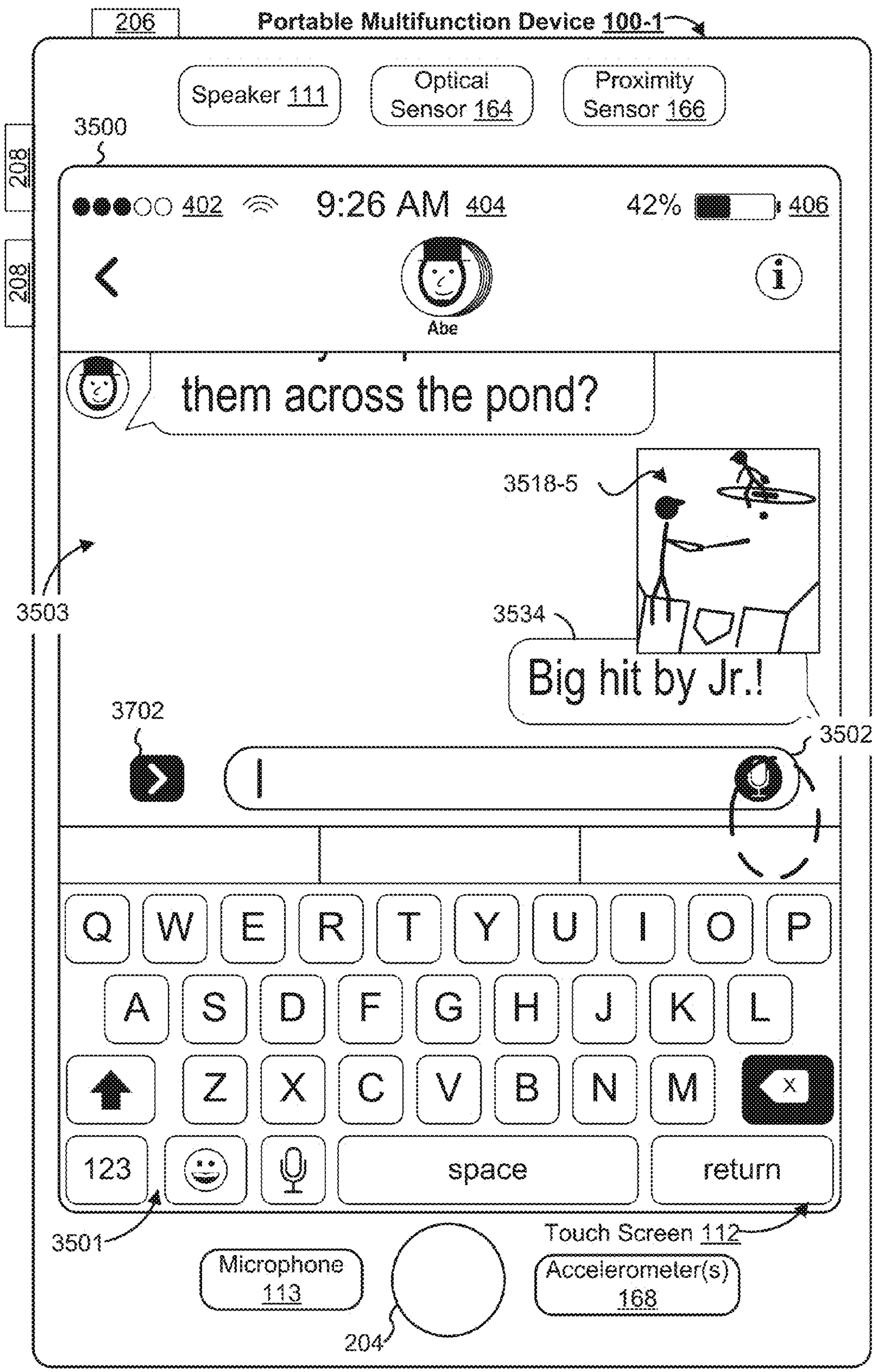
Figure 35P:
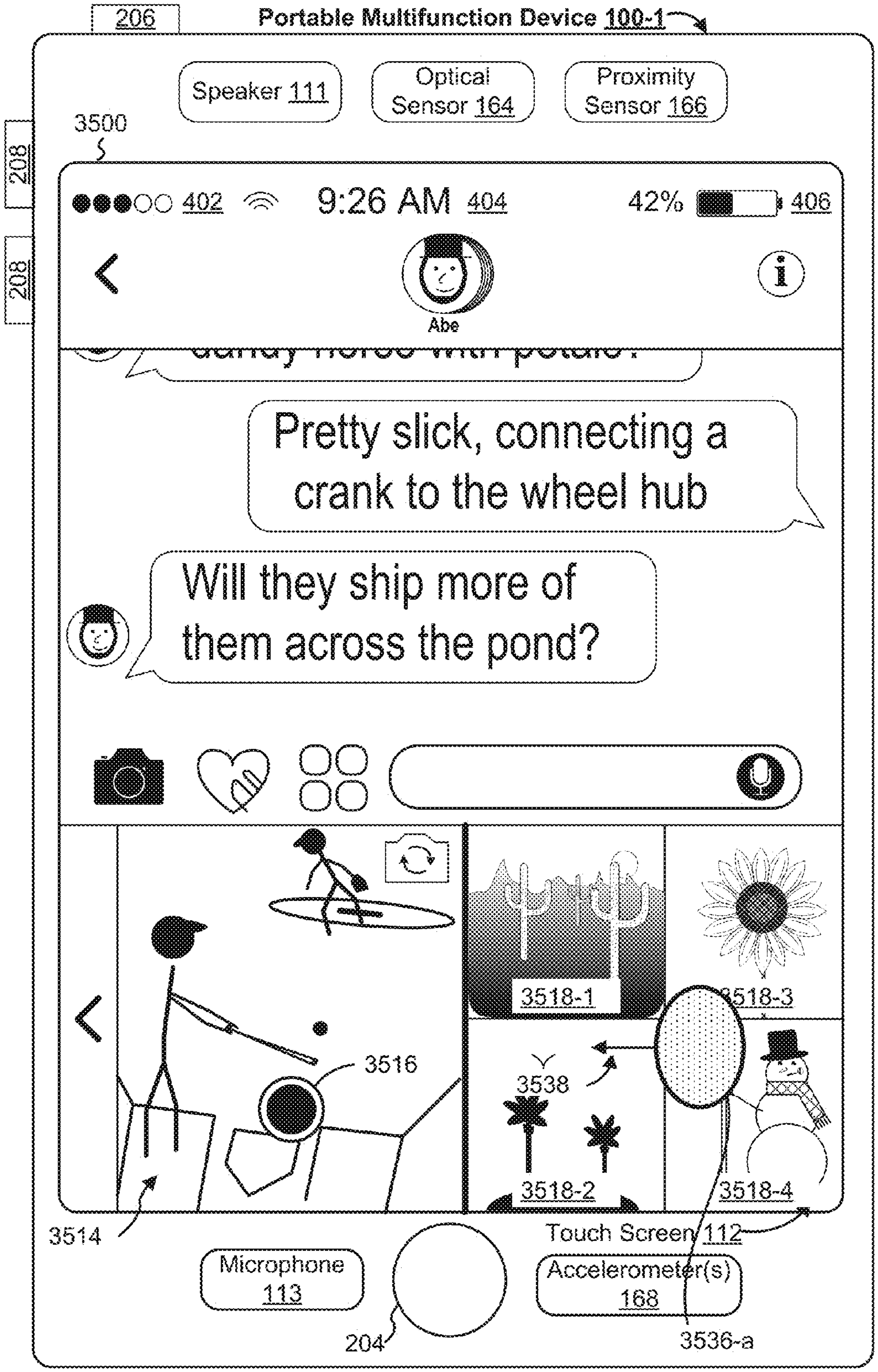
Figure 35Q:
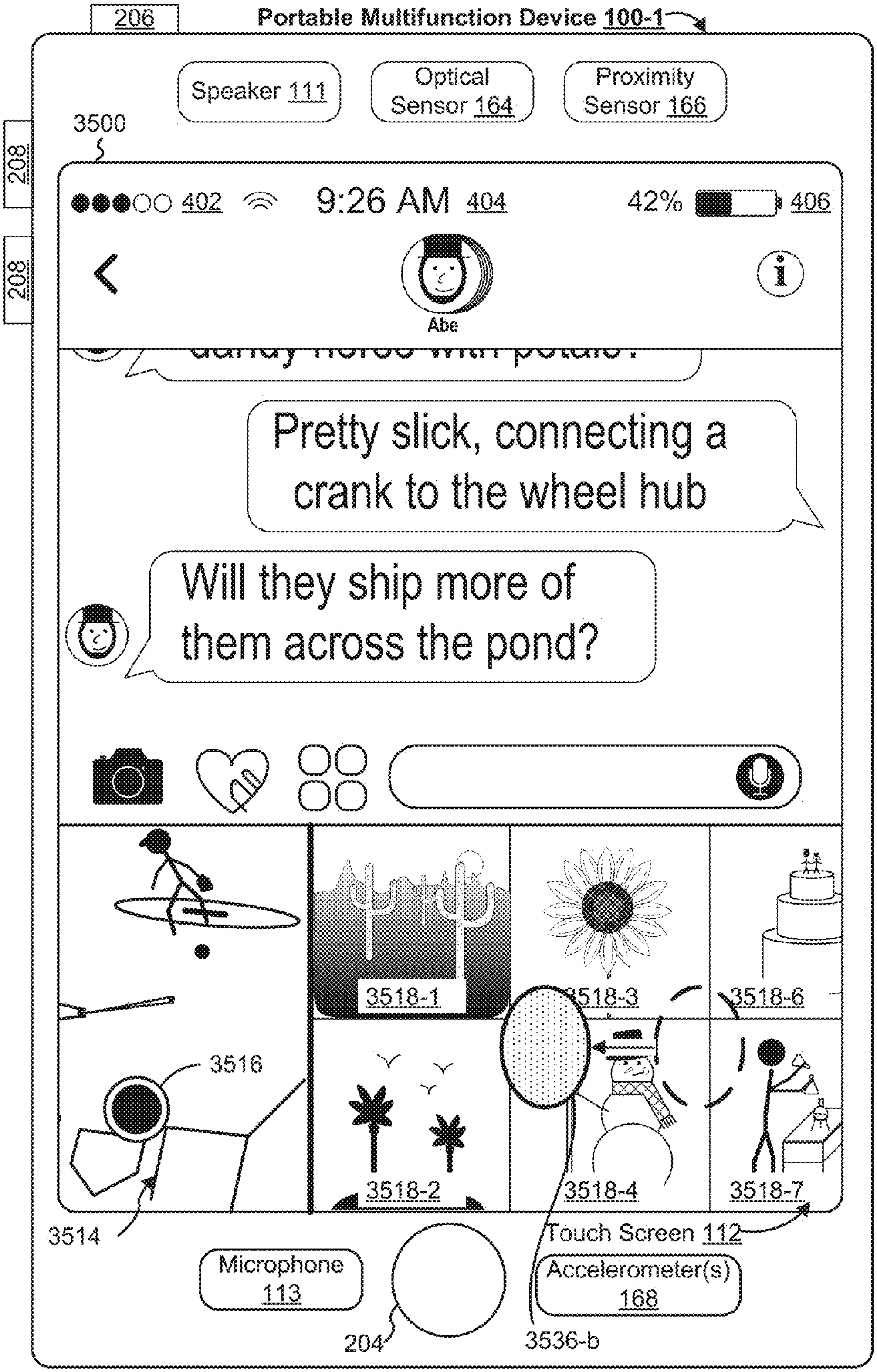
Figure 35R:
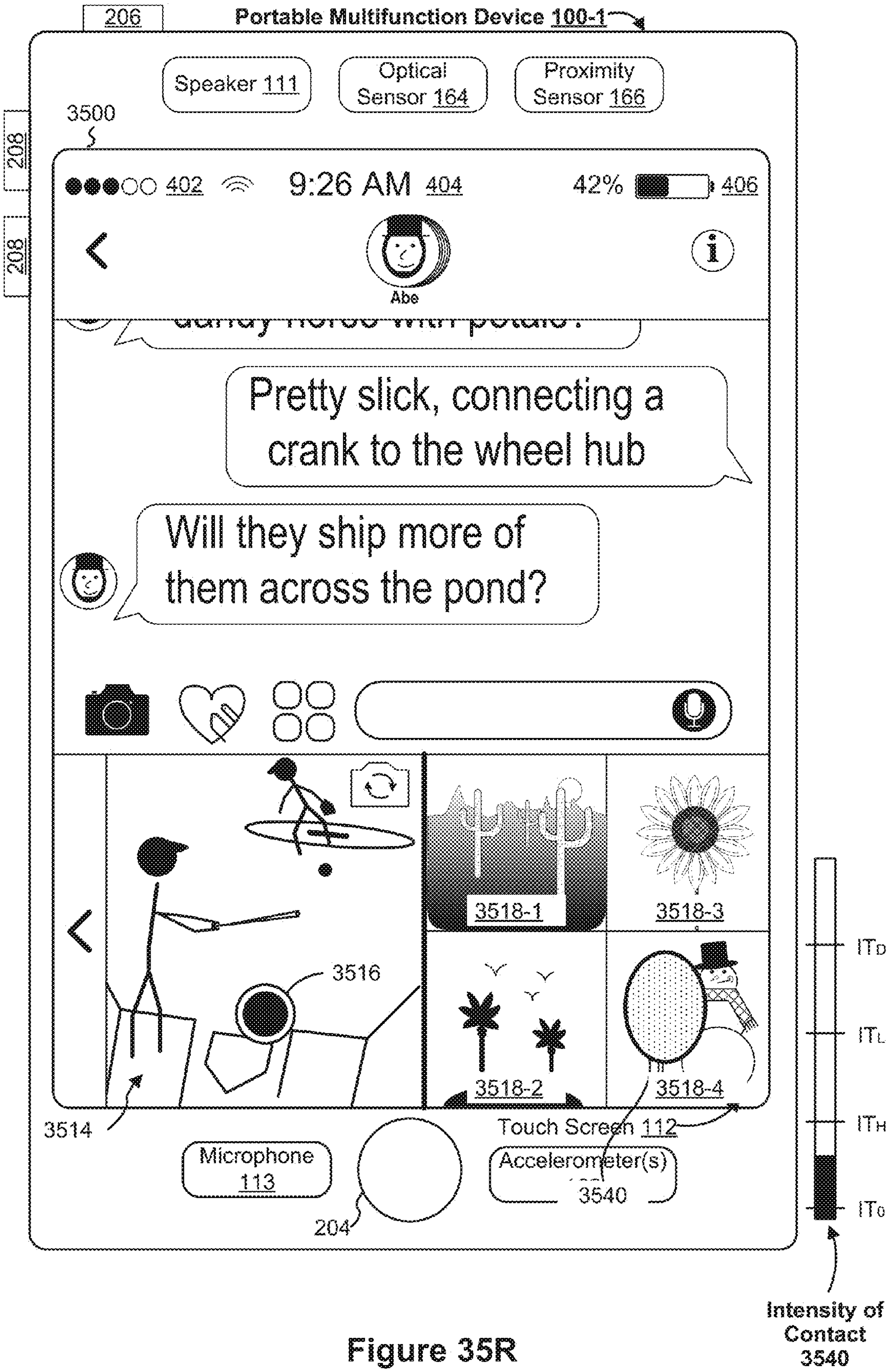
Figure 35S:
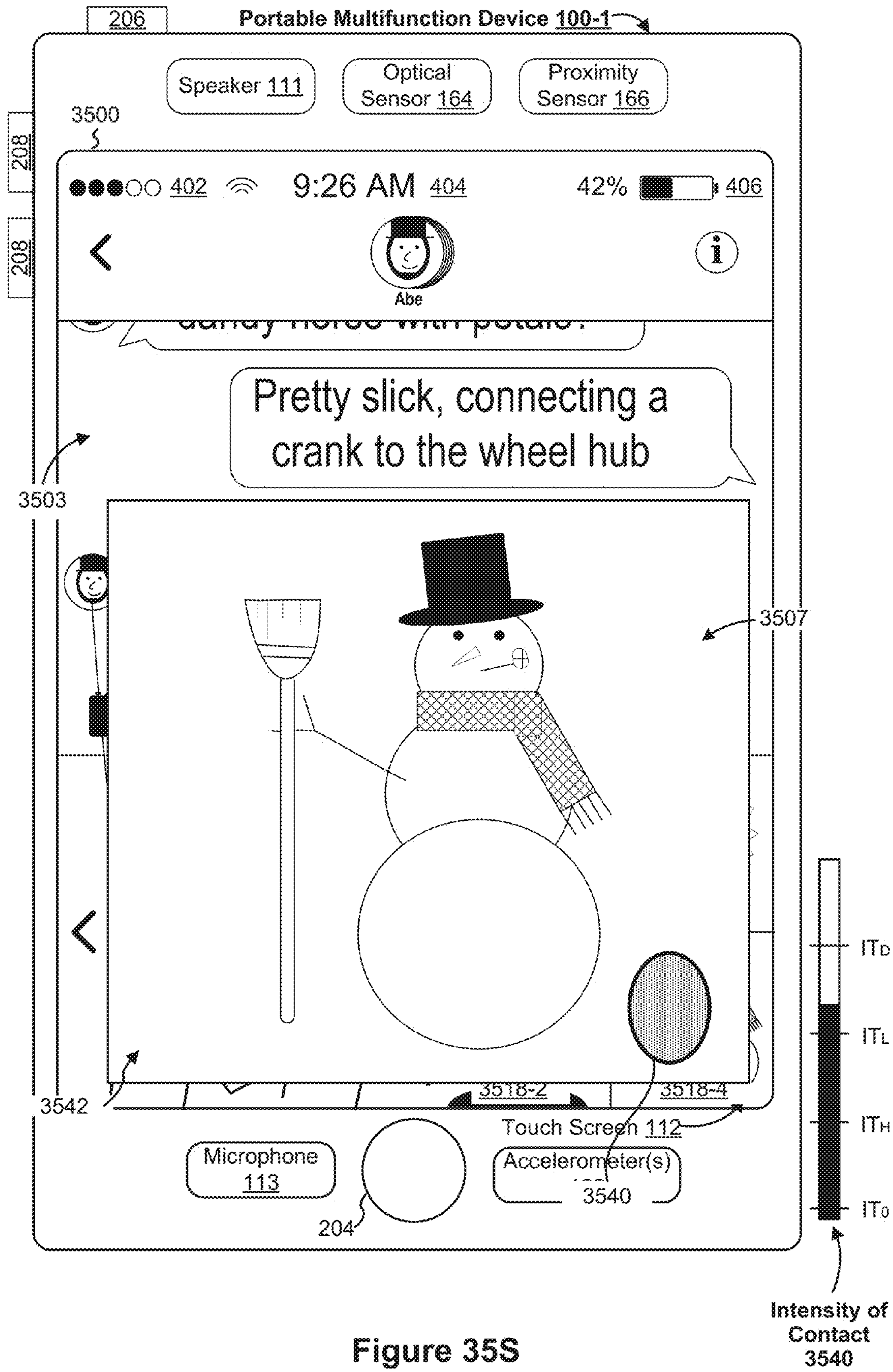
Figure 35T:
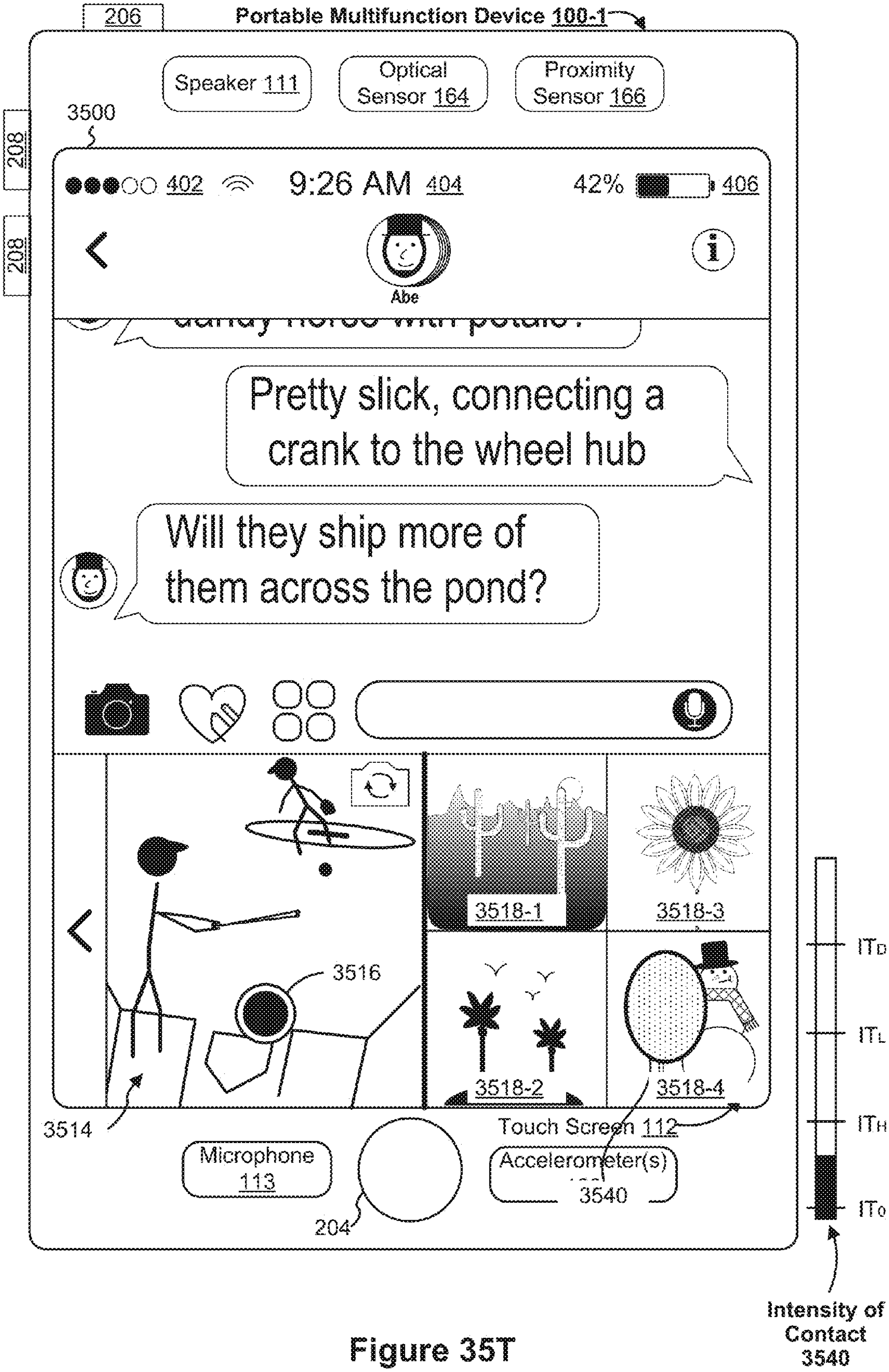
Figure 35U:
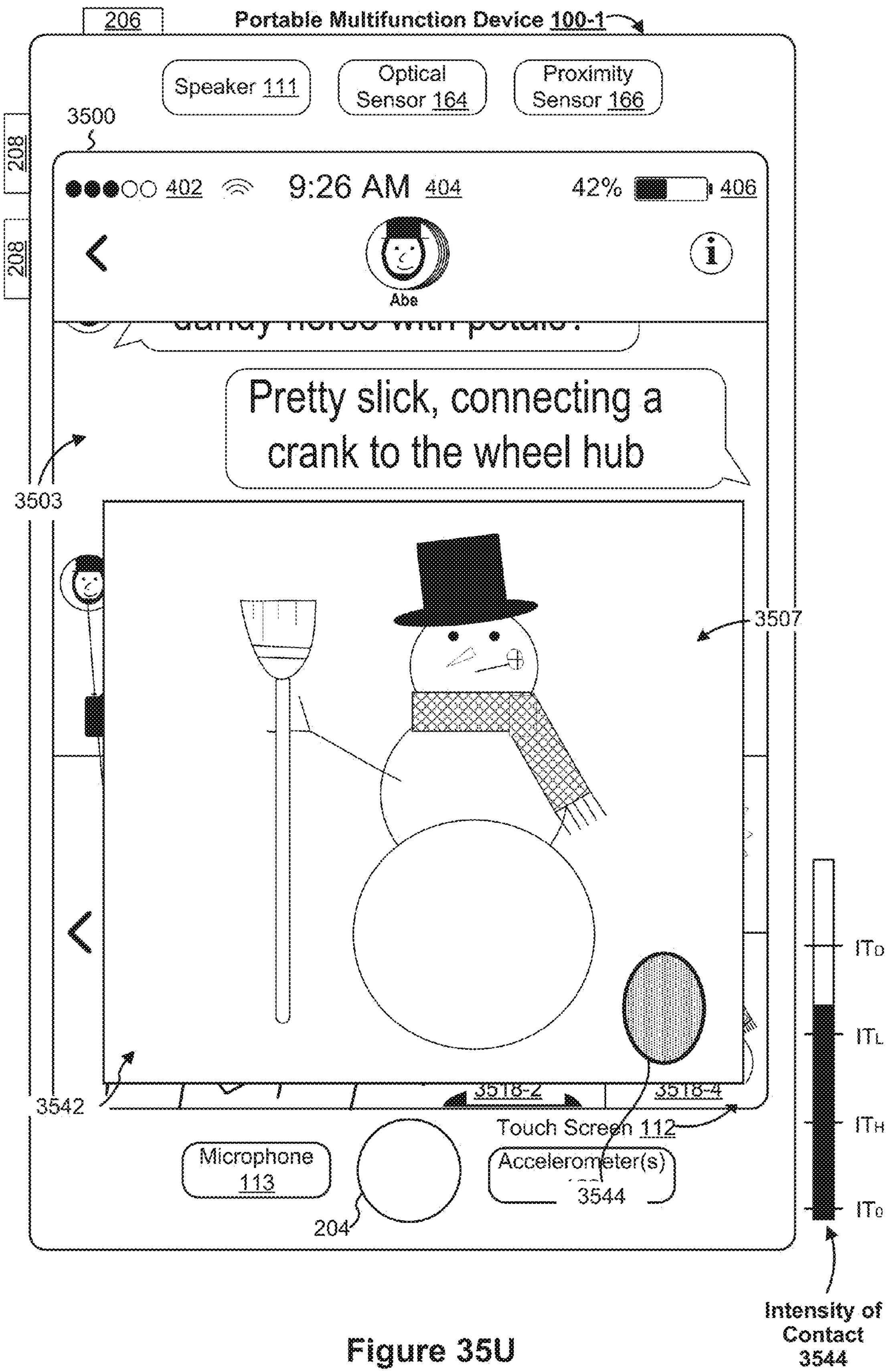
Figure 35V:
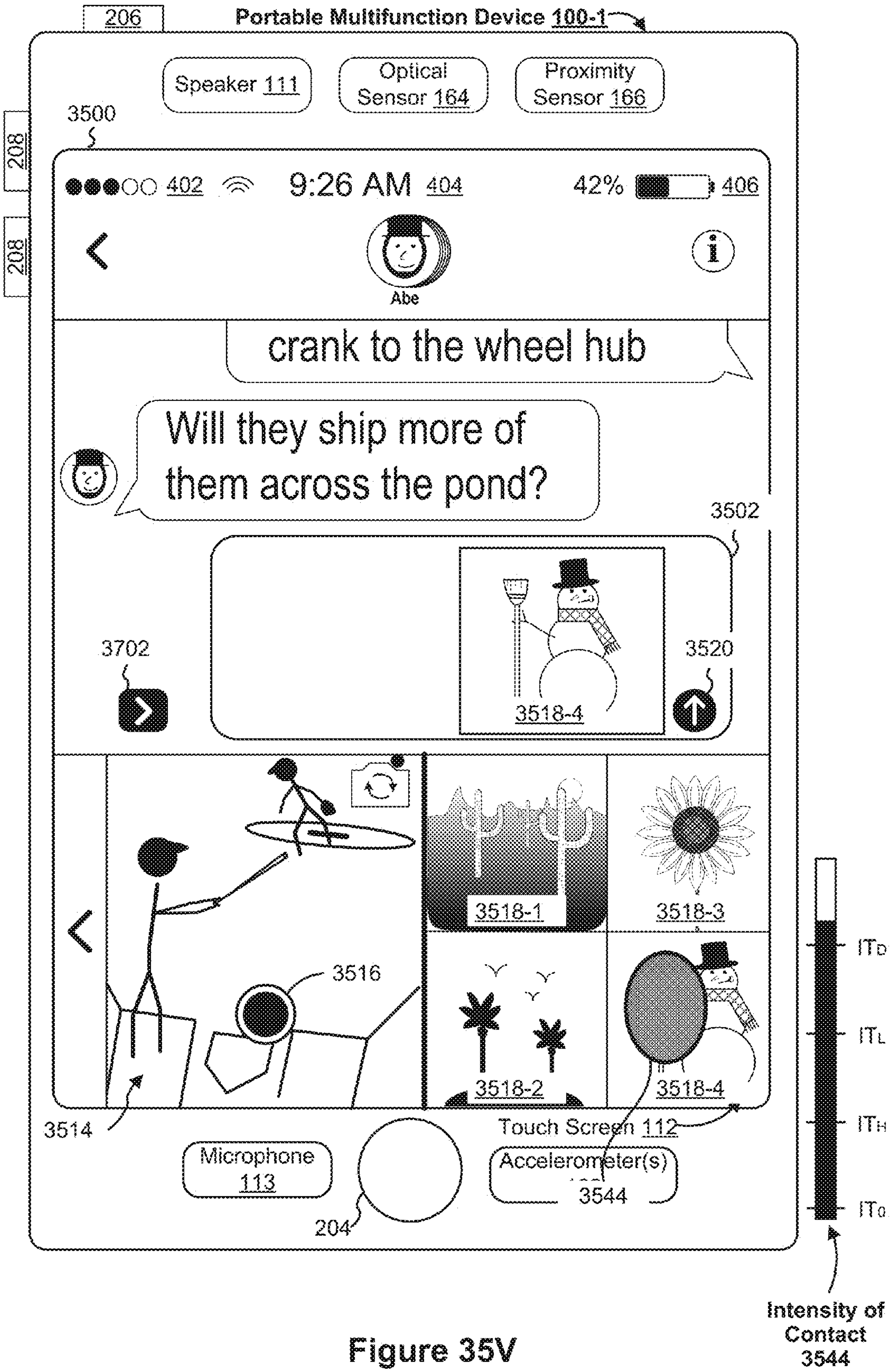
Figure 35W:
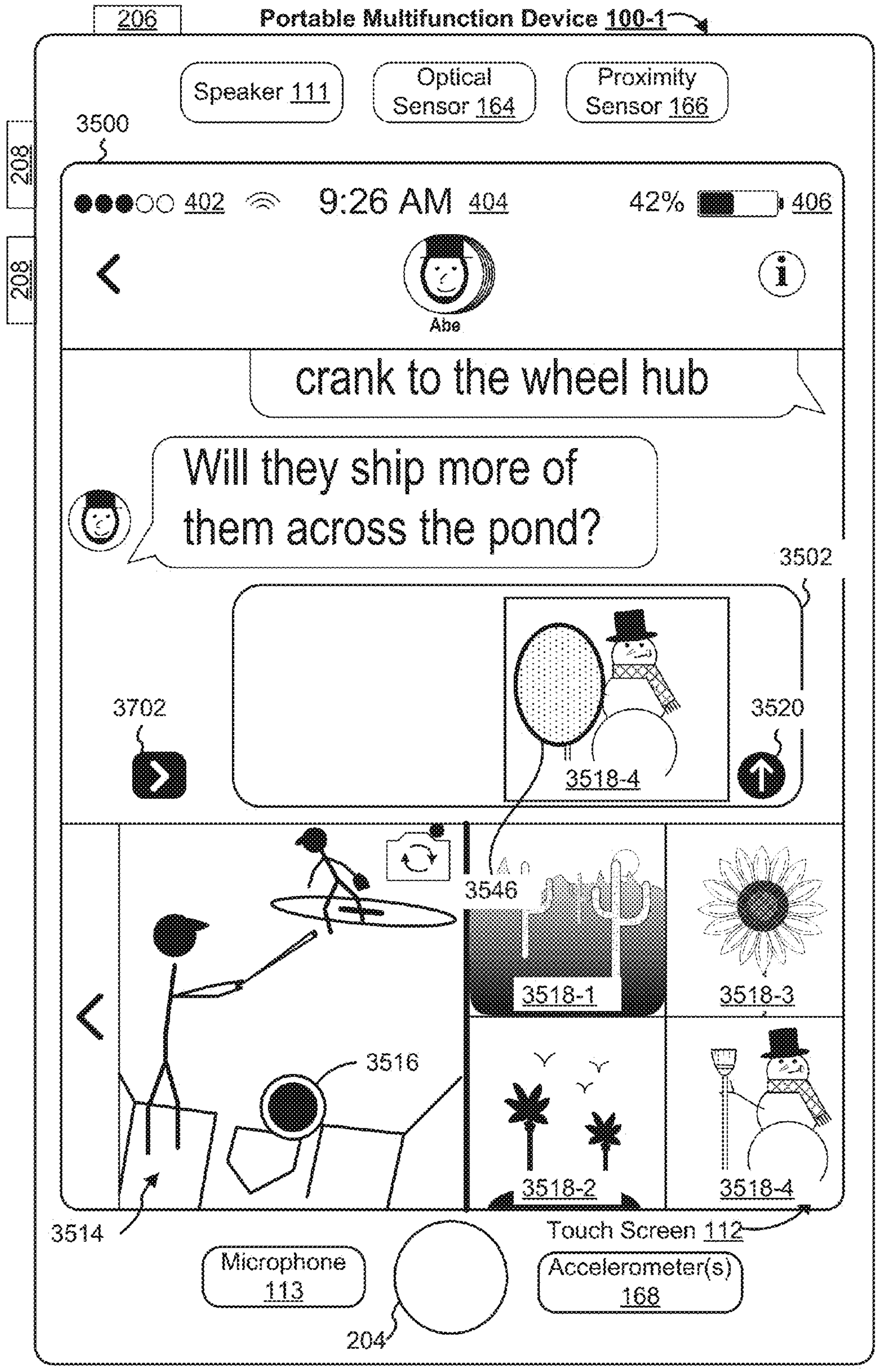

FIGS. 35A-35W and 35AL-35AP illustrate exemplary user interface 3500 for a messaging application which includes conversation transcript 3503, message-input area 3502, either of application expansion affordance 3702 or three activatable affordances—digital image affordance 3504, digital canvas affordance 3506, and application affordance 3508—either of digital keyboard 3501 or digital image tray 3806, which includes live preview image 3514 from an associated digital camera, including image capture affordance 3516 and camera switching affordance 3505 for switching the live preview image between two or more associated digital cameras, and previously captured digital images 3518. Conversation transcript 3503 includes messages from participants of a corresponding messaging session, including the user of portable multifunction device 100 and other users included in the messaging session. Each of the other users included in the messaging transcript are represented by an avatar (e.g., avatar 3510 for "Abe") displayed in stack of avatars 4002.

Figure 35X:
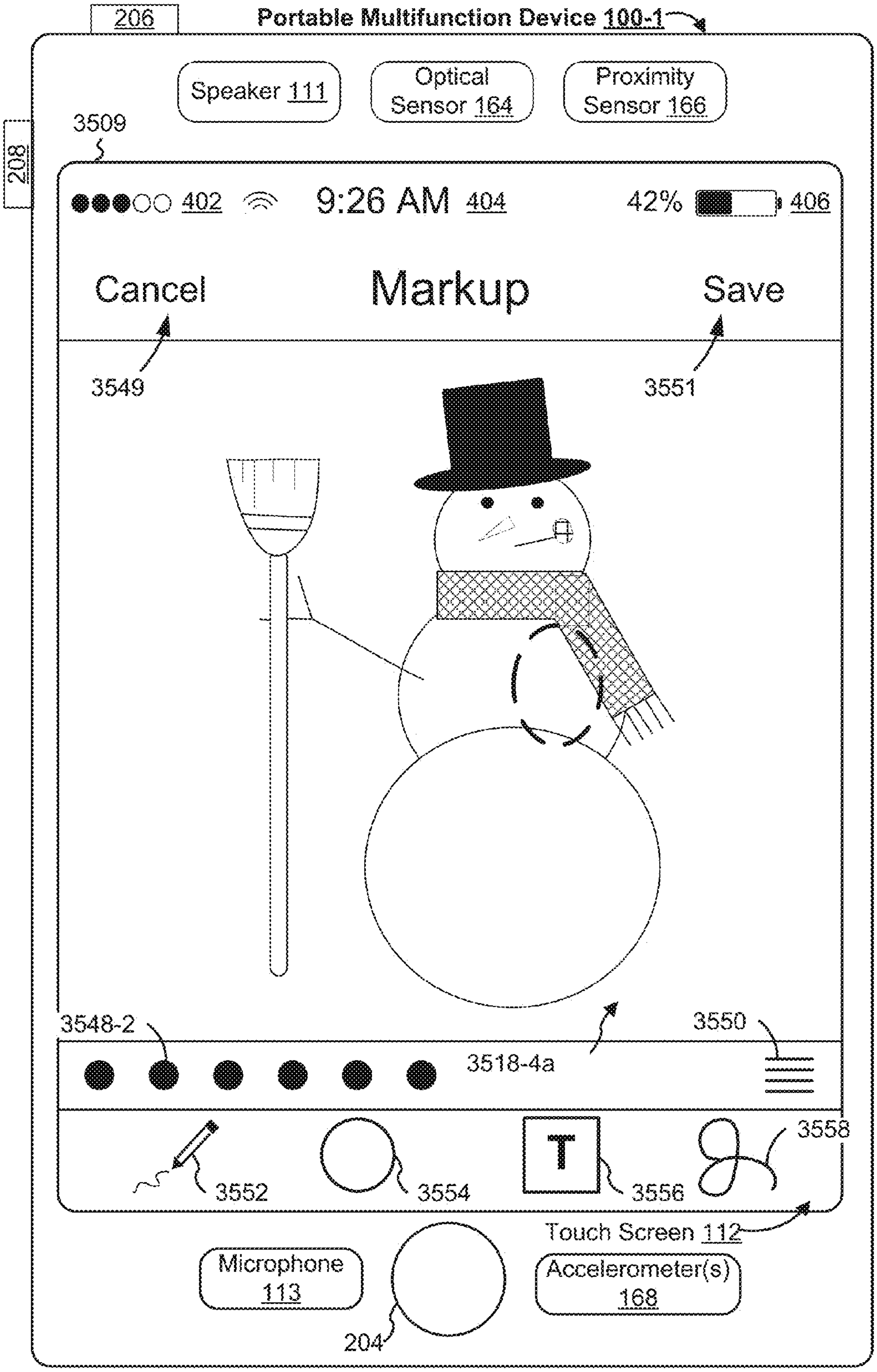

FIGS. 35X-35AK illustrate exemplary user interface 3509 for editing digital images, optionally operated within the messaging application, which includes display of digital image 3518-4, editing affordances that enable different editing modes—pencil affordance 3552, magnification loupe affordance 3554, text affordance 3556, and handwriting affordance 3558—color selection affordances 3548 for setting a color for an editing affordance tool, size selection affordance 3550 for setting the size of a line, text, or handwriting made on the digital image, canceling affordance 3549 for canceling edits to the digital image, and saving affordance 3551 for saving edits to the digital image.

FIGS. 35A-35I illustrate two exemplary embodiments for capturing a digital image and posting the captured image to the messaging transcript (e.g., the messaging session) without leaving the messaging application. In both embodiments, a digital camera is accessed in a messaging user interface displaying message transcript 3503 and keyboard 3501, as illustrated in FIG. 35A, by detecting activation of digital image affordance 3504 by contact 3512 in FIG. 35B. In response, digital image tray 3806 replaces digital keyboard 3501 in FIGS. 35C and 35H.

In a first embodiment, device 100 detects a tap gesture including contact 3512 on image capture affordance 3516 in FIG. 35D. In response, device 100 captures live preview image 3514, creating digital image 3518-5, and places the image (e.g., a representation of the image) in message-input area 3502, which expands to accommodate the image, in FIG. 35E. The device then detects a tap gesture including contact 3522 on message-content posting affordance 3520 in FIG. 35F. In response, device 100 posts captured digital image 3518-5 to the messaging session, displaying the image in conversation transcript 3503 in FIG. 35G.

In a second embodiment, device 100 detects a press gesture including contact 3524 on image capture affordance 3516 in FIG. 35H. Device 100 then detects an increase in the intensity of contact 3524 above a predefined intensity threshold (e.g., $IT_L$ or $IT_D$) and, in response, captures live preview image 3514, creating digital image 3518-5 in FIG. 35I. In contrast to the first embodiment—where the intensity of contact 3512 did not increase above the predefined intensity threshold—device 100 posts captured digital image 3518-5 directly to the messaging session, displaying the image in conversation transcript 3503 in FIG. 35I, because the intensity of contact 3516 reached the predefined intensity threshold.

FIGS. 35J-35O illustrate an exemplary embodiment where a message is associated with a posted digital image. Device 100 detects a tap gesture including contact 3526 on image capture affordance 3516 in FIG. 35J. In response, device 100 captures live preview image 3514, creating digital image 3518-5, and places the image (e.g., a representation of the image) in message-input area 3502, which expanded to accommodate the image in FIG. 35K. The device then detects a tap gesture including contact 3528 in message-input area 3502 in FIG. 35L. In response, device 100 replaces display of digital image tray 3806 with digital keyboard 3501, further expands message-input area 3502 to accommodate a message, and displays text cursor 3842 in FIG. 35M. Device 100 also detects input of message 3530 and displays the message in message-input area 3502, along with captured digital image 3518-5 in FIG. 35M. The device then detects a tap gesture including contact 3532 on message-content posting affordance 3520 in FIG. 35N. In response, device 100 posts captured digital image 3518-5 and message 3530 to the messaging session, displaying the image and message, in message region 3534, within conversation transcript 3503 in FIG. 35O. Because message 3530 was posted from message-input area 3502 at the same time as image 3518-5, message region 3534 is displayed as overlapping with image 3518-5 in FIG. 35O.

FIGS. 35P-35Q illustrate an exemplary embodiment where a swipe gesture reveals additional digital images. Device 100 detects a swipe gesture including movement 3538 of contact 3536 to the left, from position 3536-*a* in FIG. 35P to position 3536-*b* in FIG. 35Q. In response, the device moves digital image tray 3806 to the left, in accordance with movement 3538, creating the appearance that live preview image 3514 slides off of the left side of touch screen 112 and additional digital images 3518-6 and 3518-7 slide onto the display from the right side of touch screen 112, in FIG. 35Q.

FIGS. 35R-35V illustrate two exemplary embodiments where a previously captured digital image is previewed and posted to the messaging session.

In a first embodiment, device 100 detects a press gesture including contact 3540 on previously captured digital image 3518-4 in FIG. 35R. Device 100 then detects an increase in the intensity of contact 3540 above a first predefined intensity threshold (e.g., $IT_L$) and, in response, displays enlarged preview 3507 of image 3518-4 over portions of digital image tray 3806 and conversation transcript 3503 in FIG. 35S. The device then detects a decrease in the intensity of contact 3540 and, in response, ceases display of enlarged preview 3507 in FIG. 35T.

In a second embodiment, device 100 detects a press gesture including contact 3544 on previously captured digital image 3518-4, and then an increase in the intensity of contact 3540 above a first predefined intensity threshold (e.g., $IT_L$), in FIG. 35U. In response, the device displays enlarged preview 3507 of image 3518-4 over portions of digital image tray 3806 and conversation transcript 3503 in FIG. 35U. The device then detects a further increase in the intensity of contact 3540 above a second predefined intensity threshold (e.g., $IT_D$) and, in response, and places the image in message-input area 3502 in FIG. 35V. Previously captured digital image 3518-4 may now be posted to the messaging session upon detection of an input (e.g., tap gesture) activating message-content posting affordance 3520.

FIGS. 35W-35AN illustrate an exemplary embodiment where a digital image is edited prior to posting the image to the messaging session. Device 100 detects a tap gesture including contact 3546 on digital image 3518-4, while the image is displayed in message-input area 3502, in FIG. 35W. In response, the device opens image-editing user interface 3509, displaying editable representation 3518-4*a* of digital image 3518-4, in FIG. 35X.

Figure 35Y:
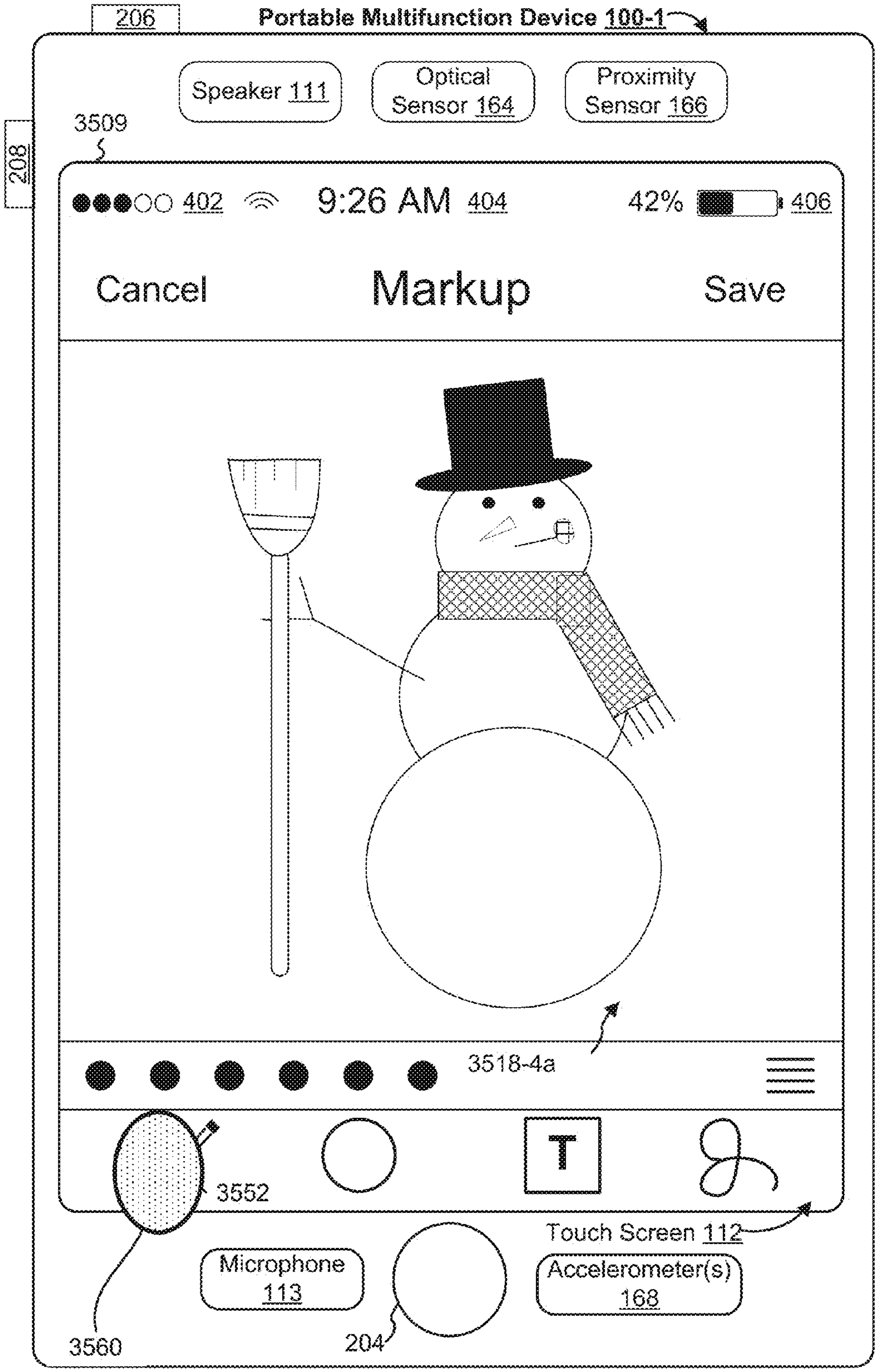
Figure 35Z:
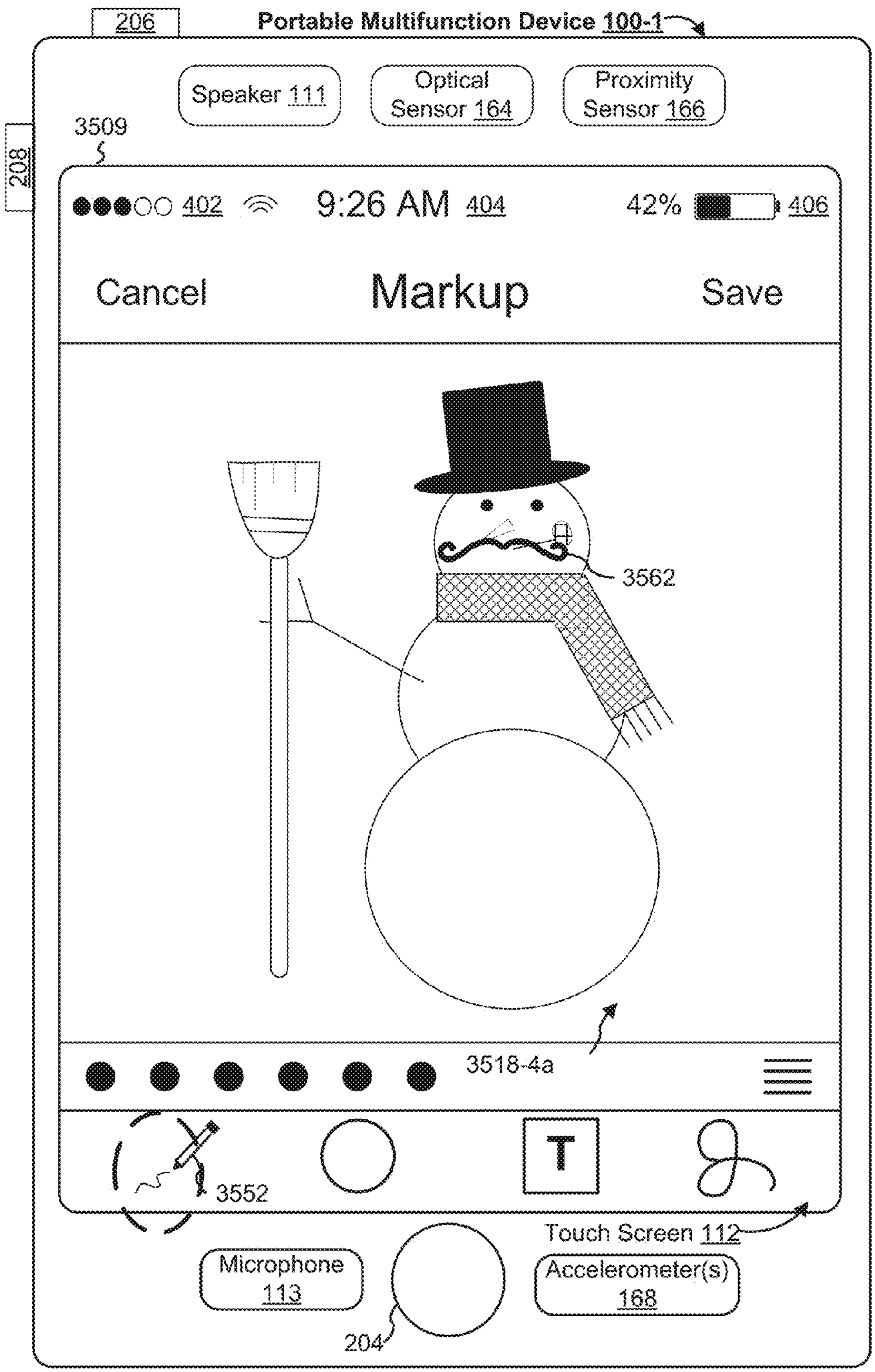
Figure 35A:
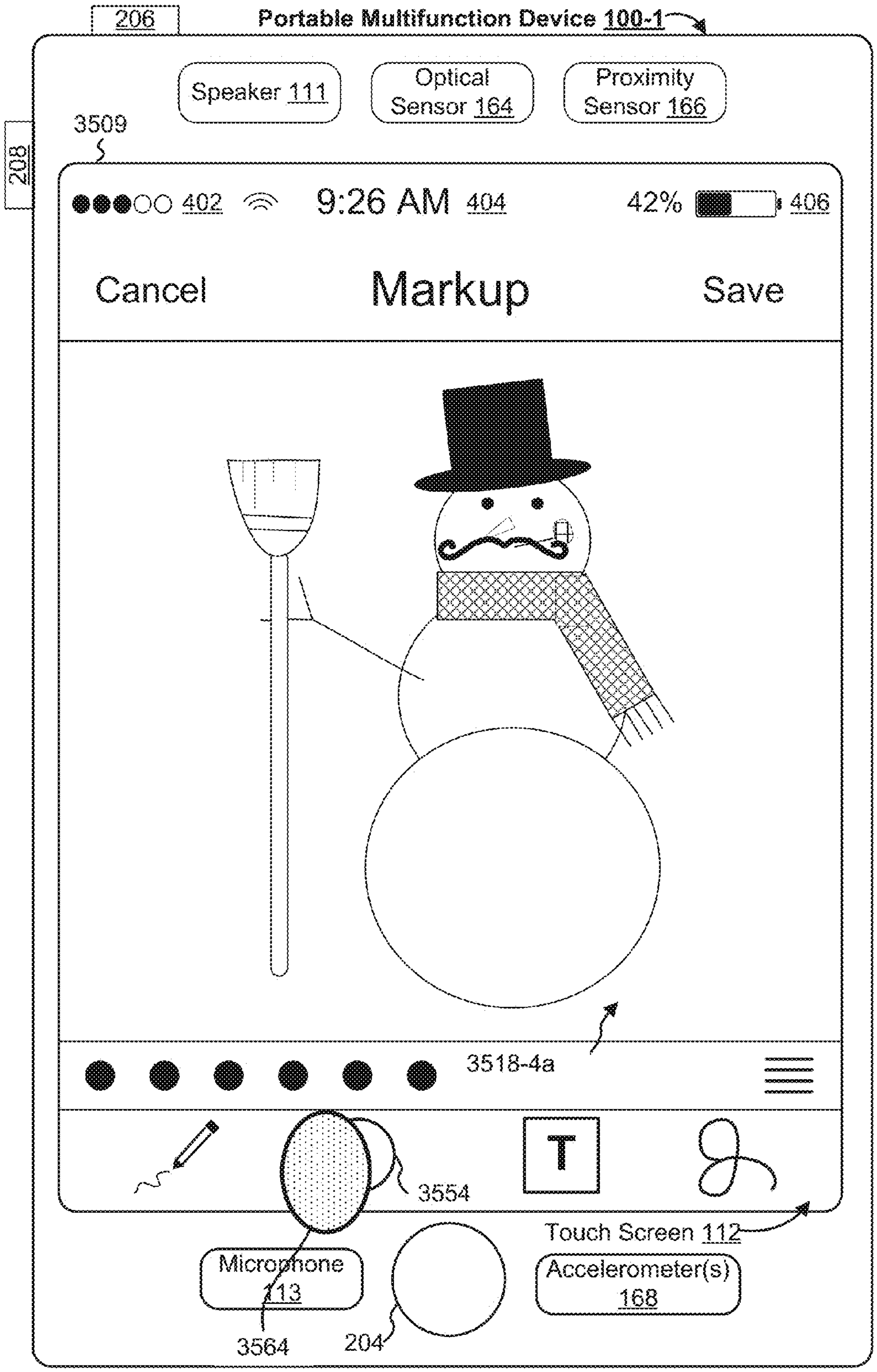
Figure 35A:
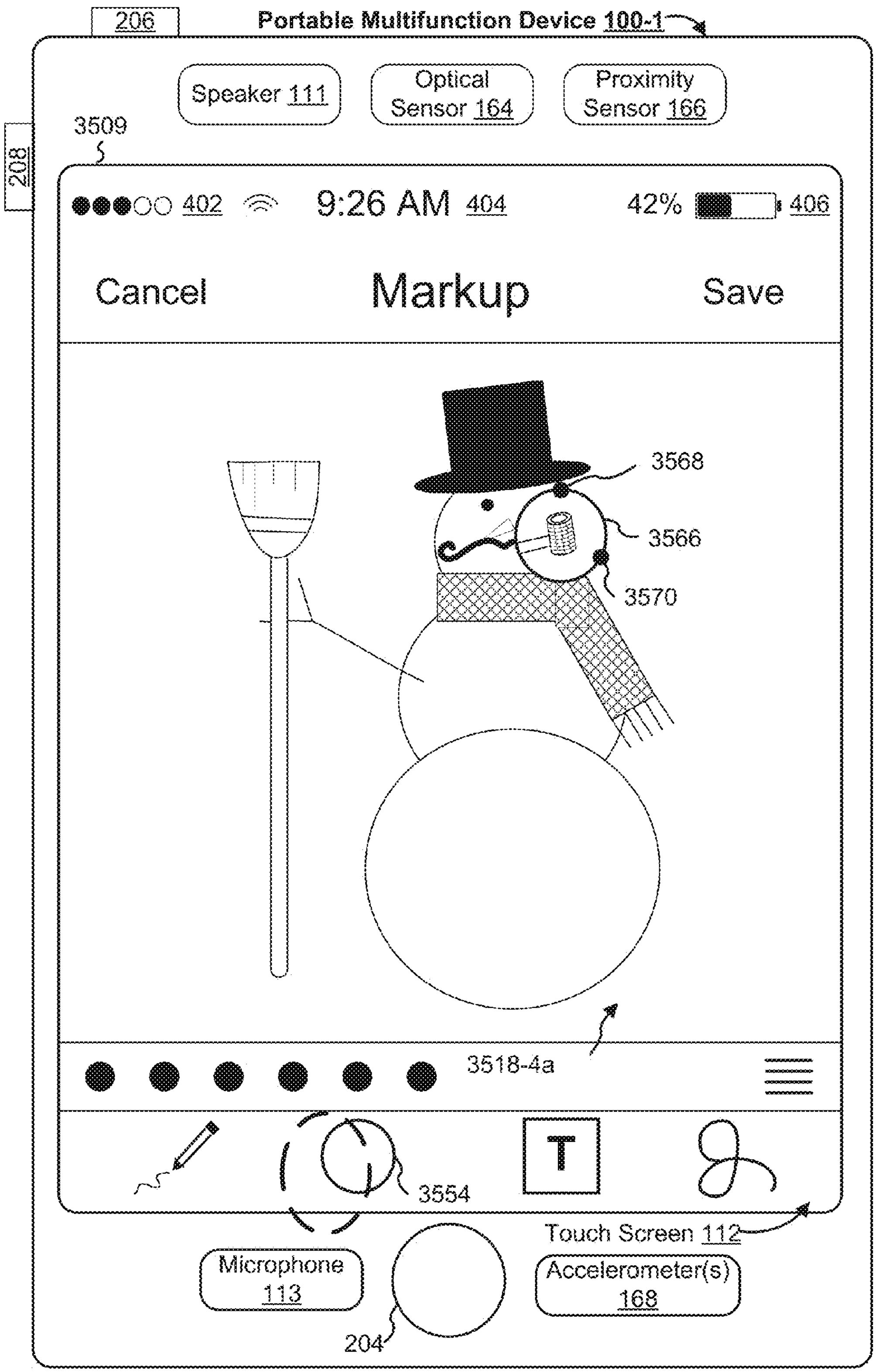
Figure 35A:
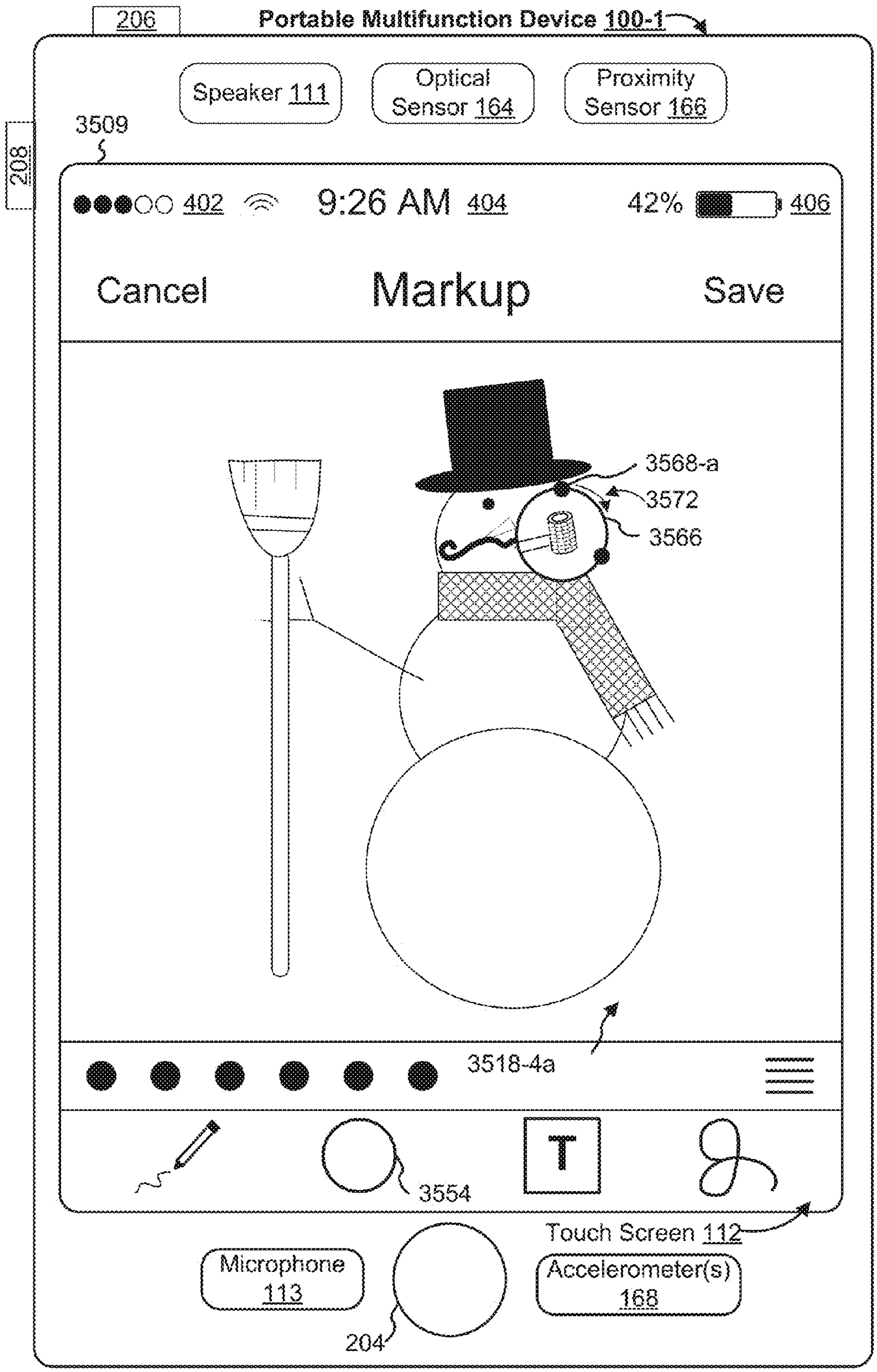
Figure 35A:
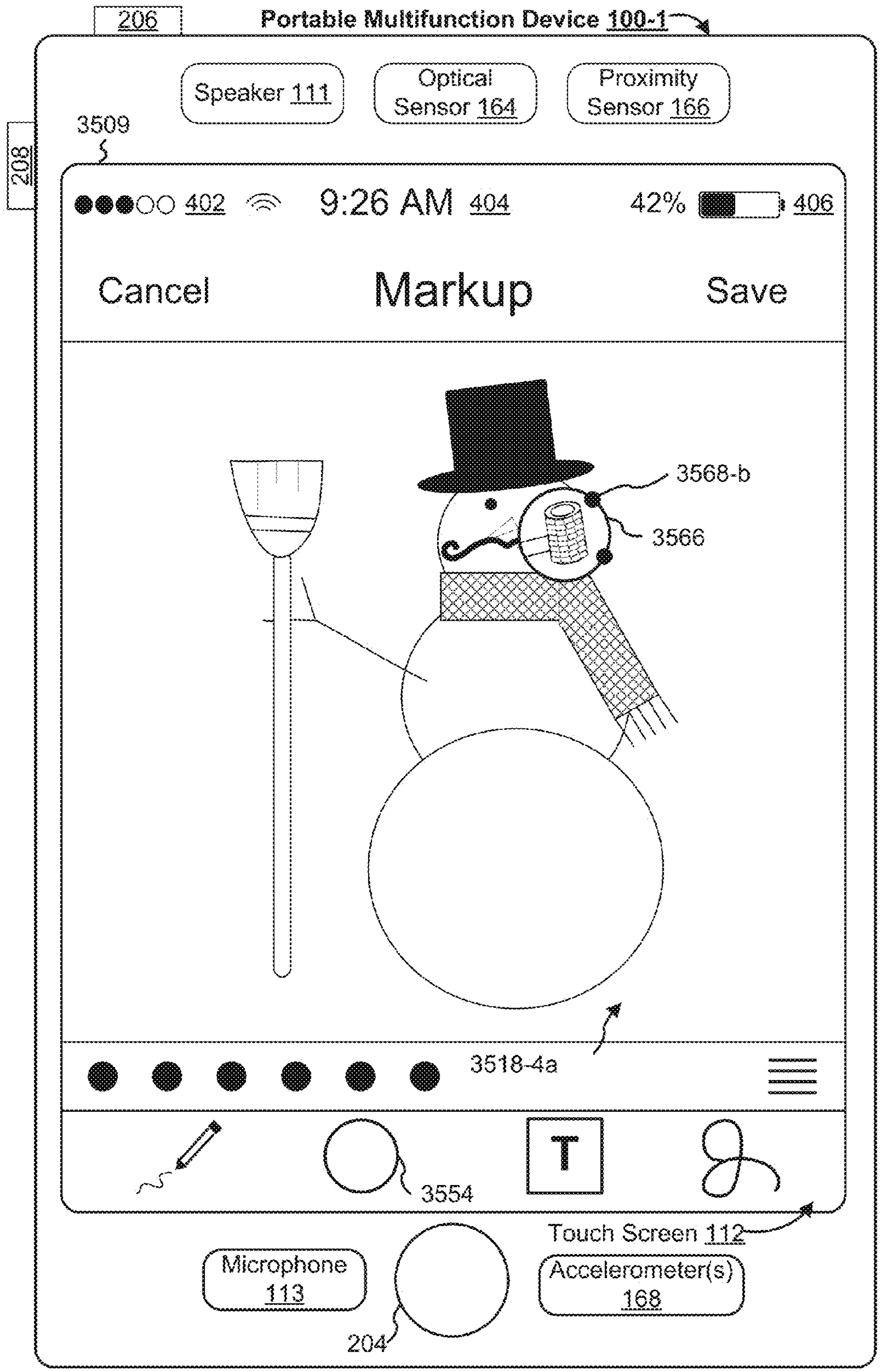
Figure 35A:
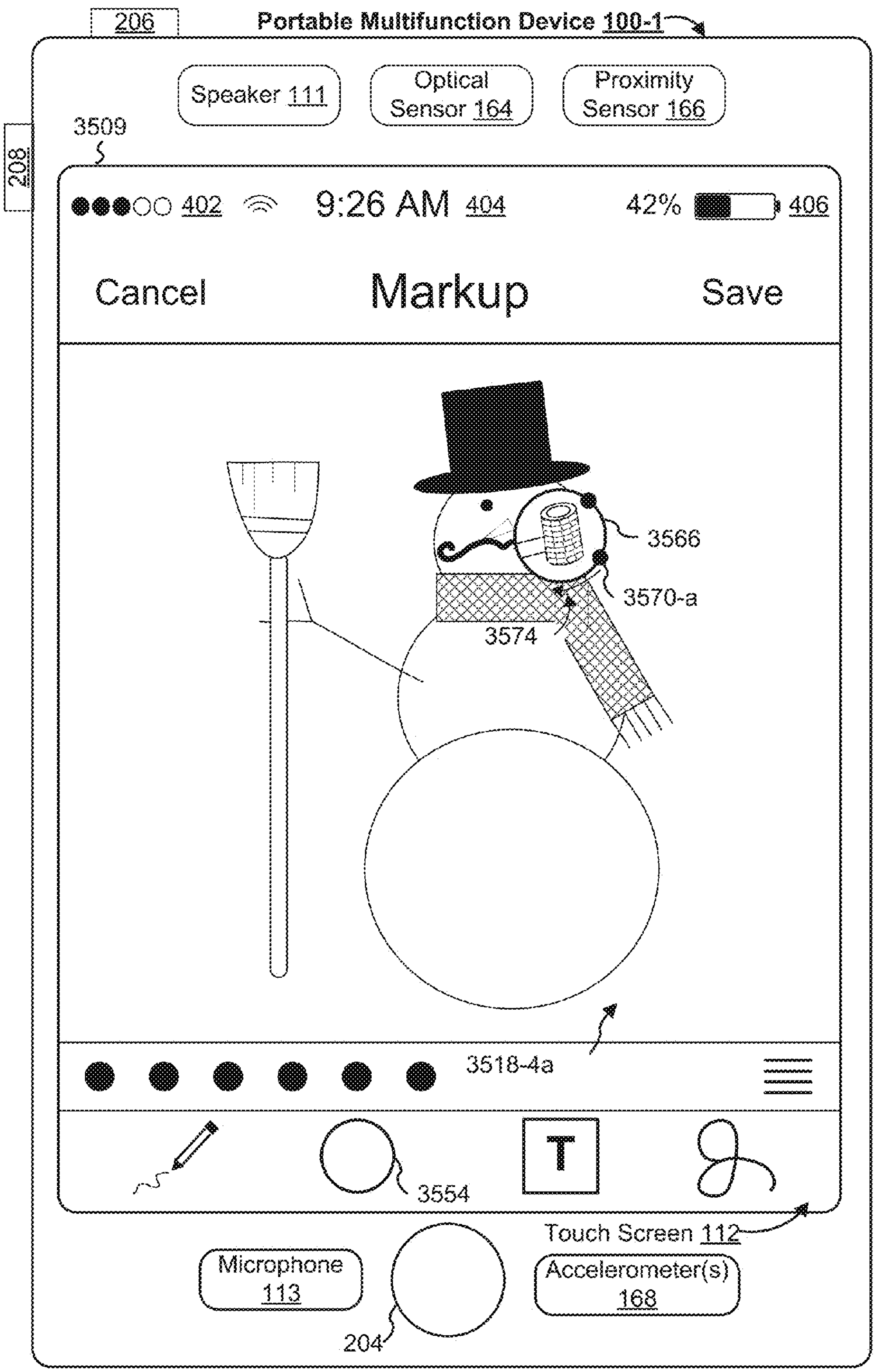
Figure 35A:
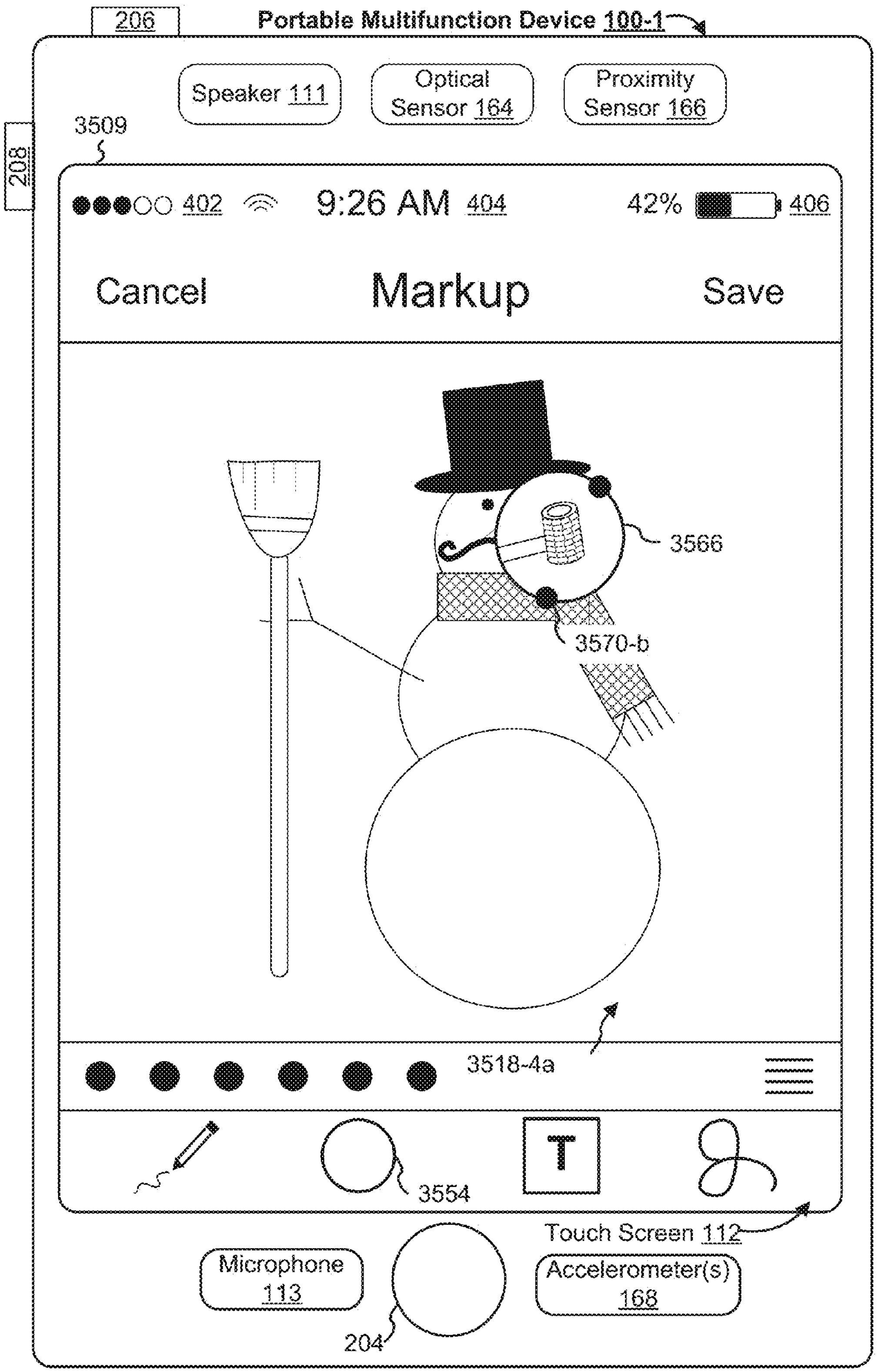
Figure 35A:
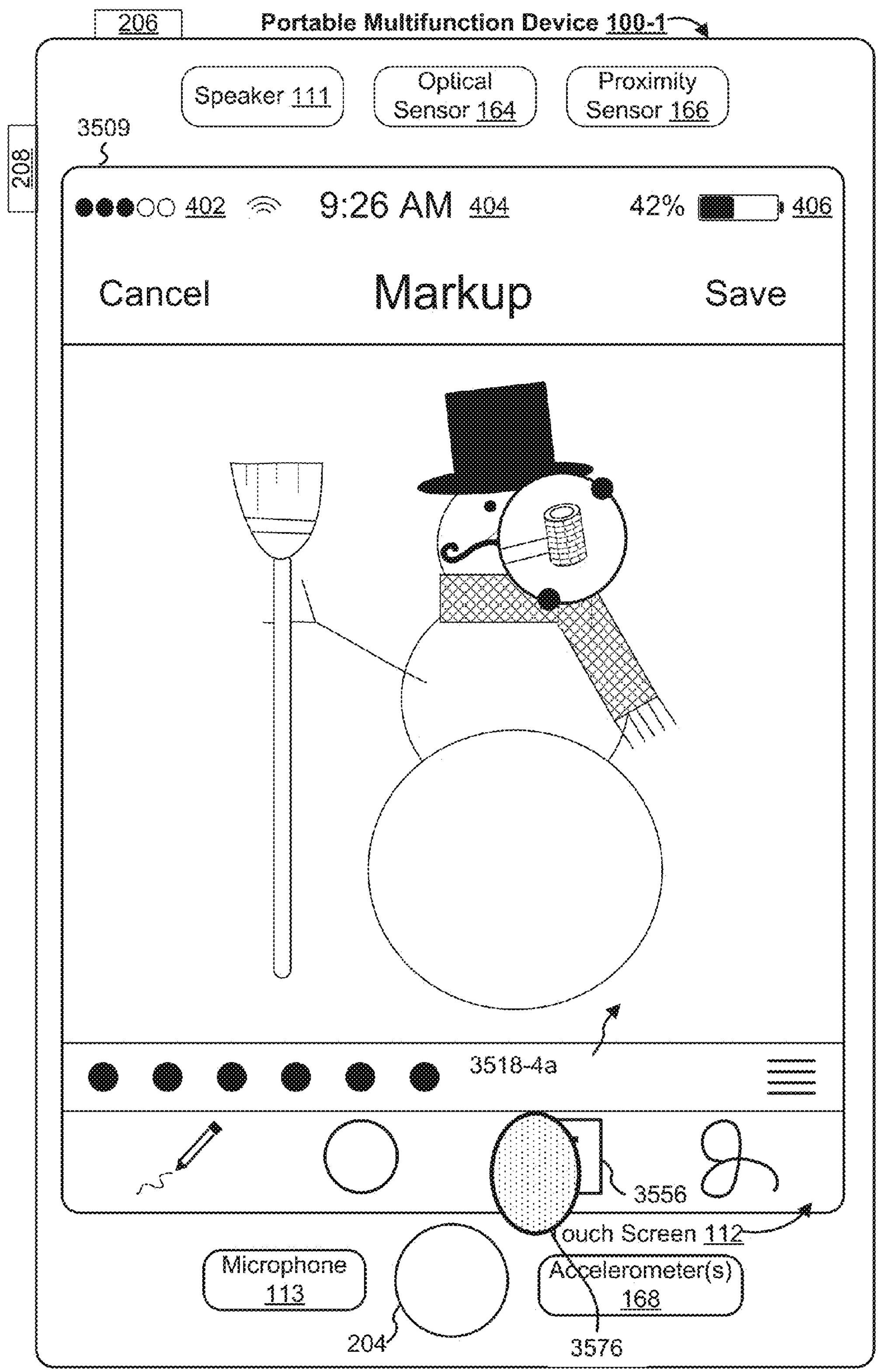
Figure 35A:
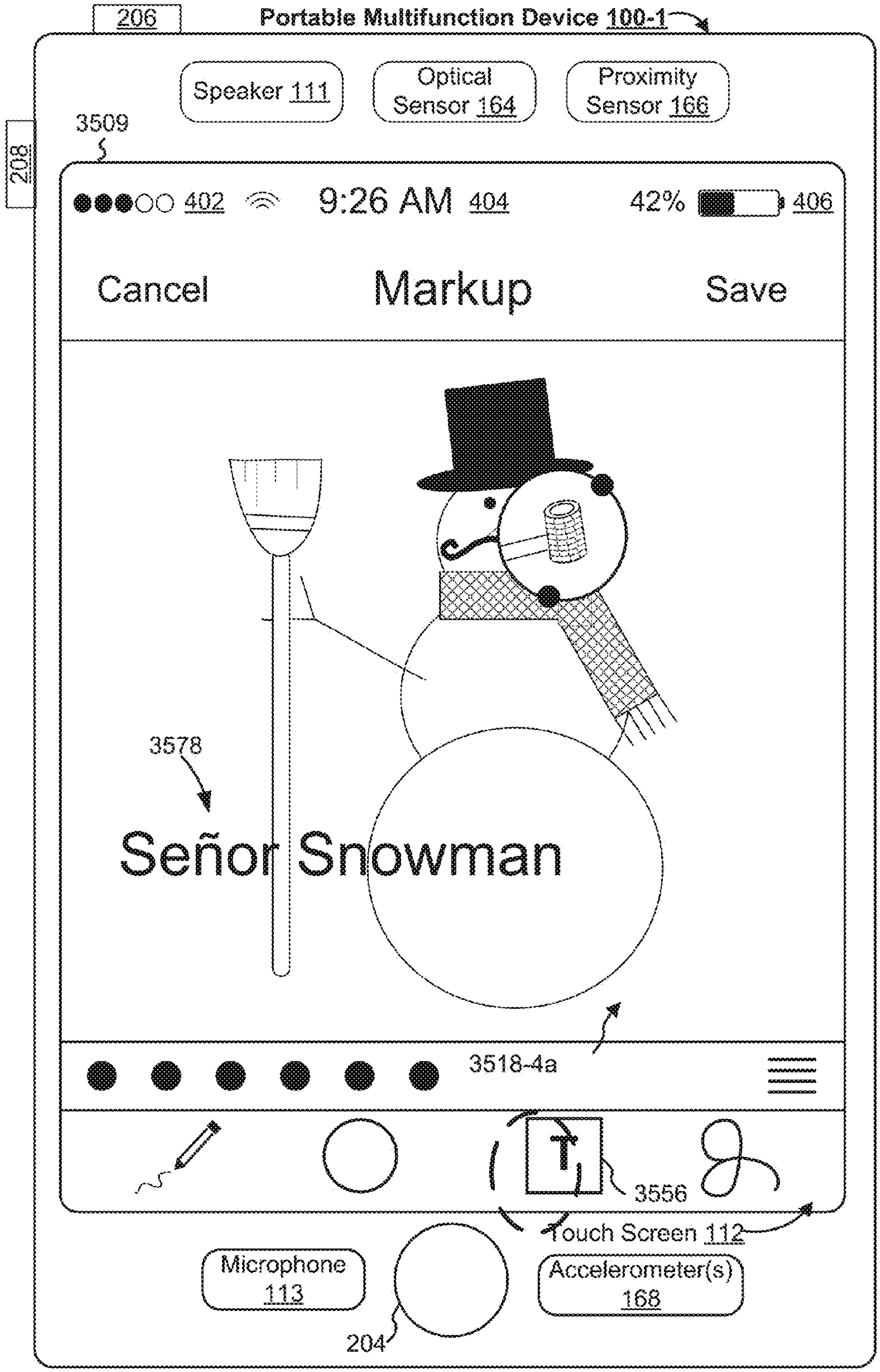
Figure 35A:
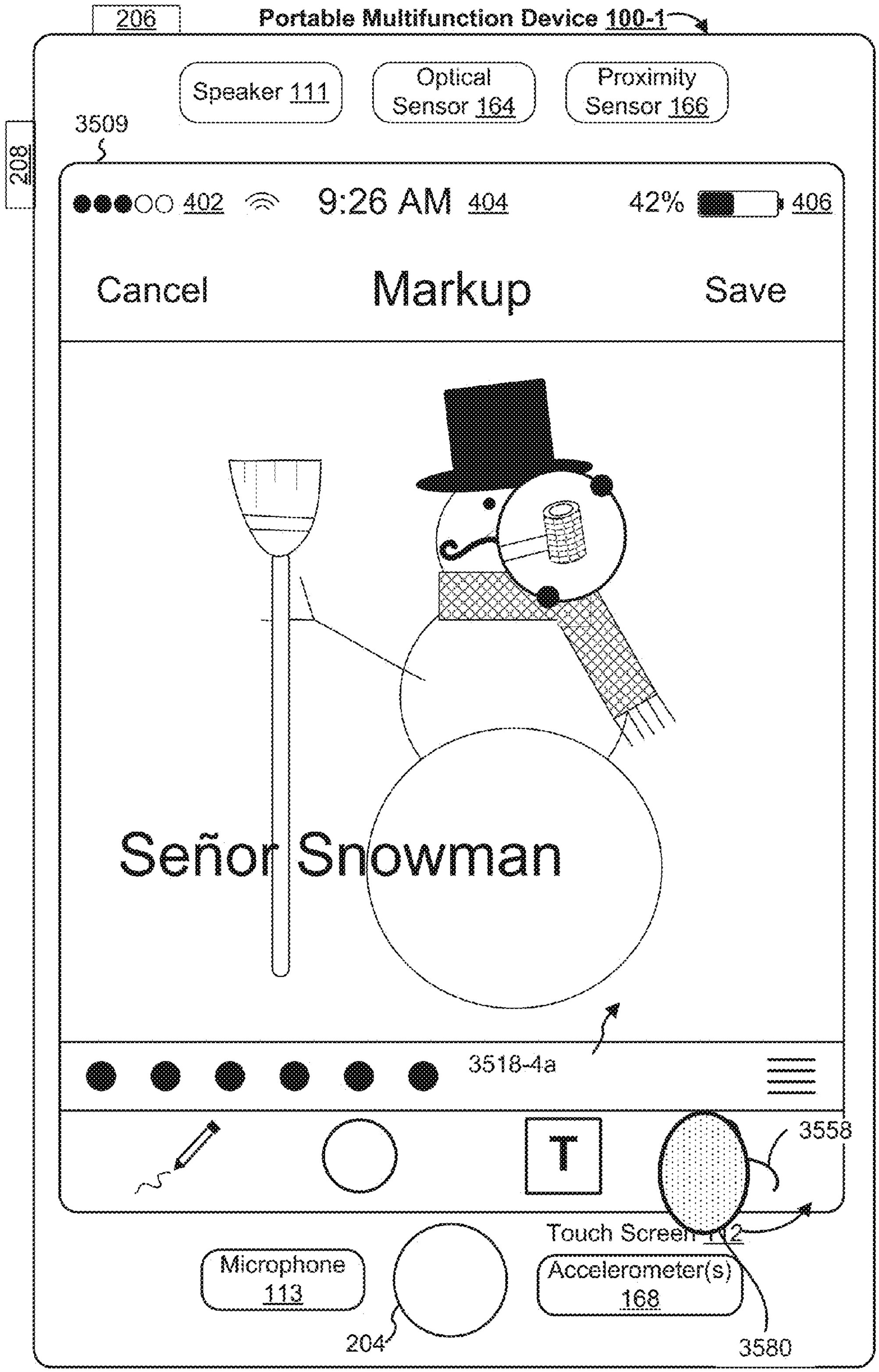
Figure 35A:
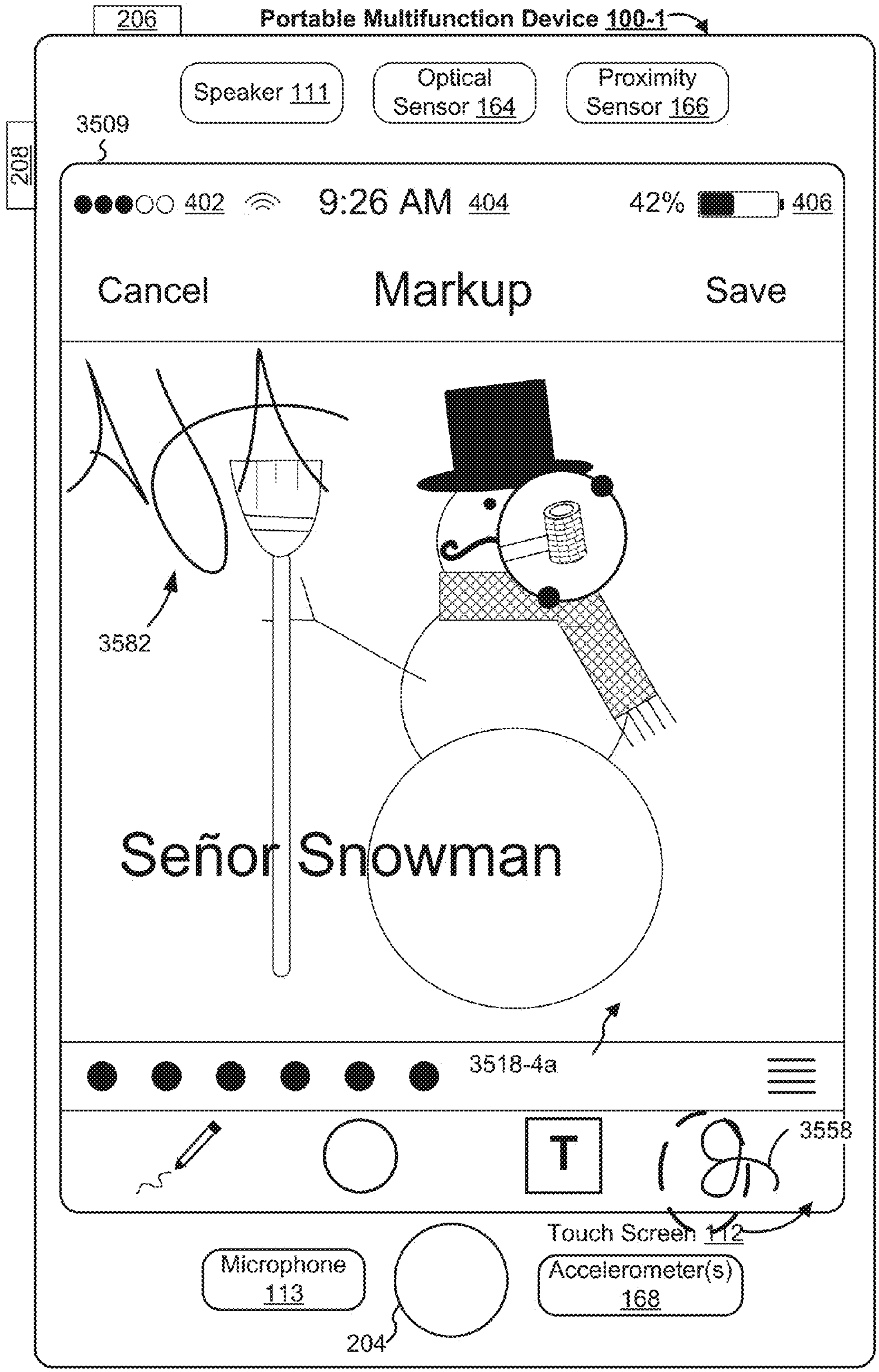
Figure 35A:
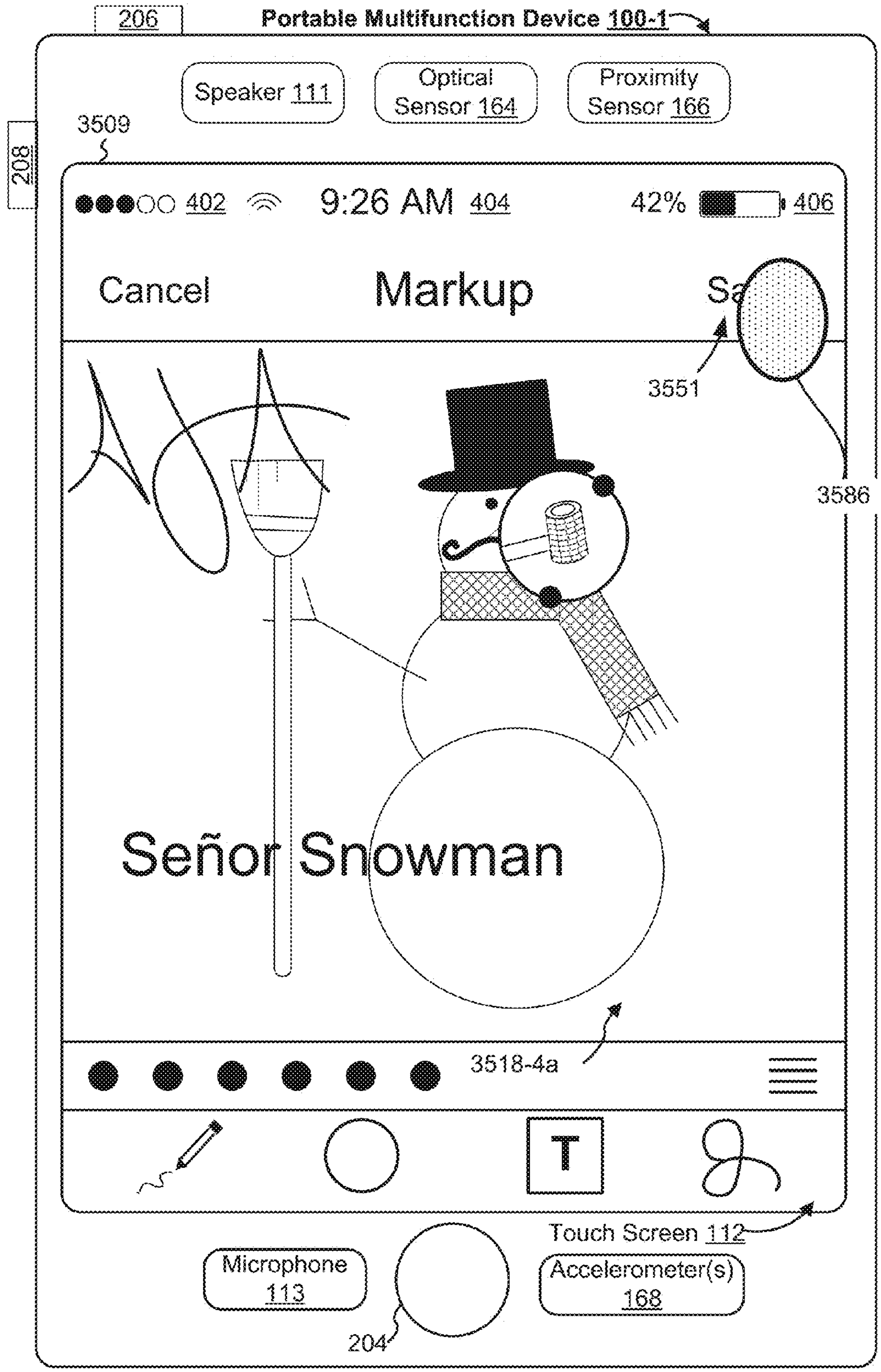
Figure 35A:
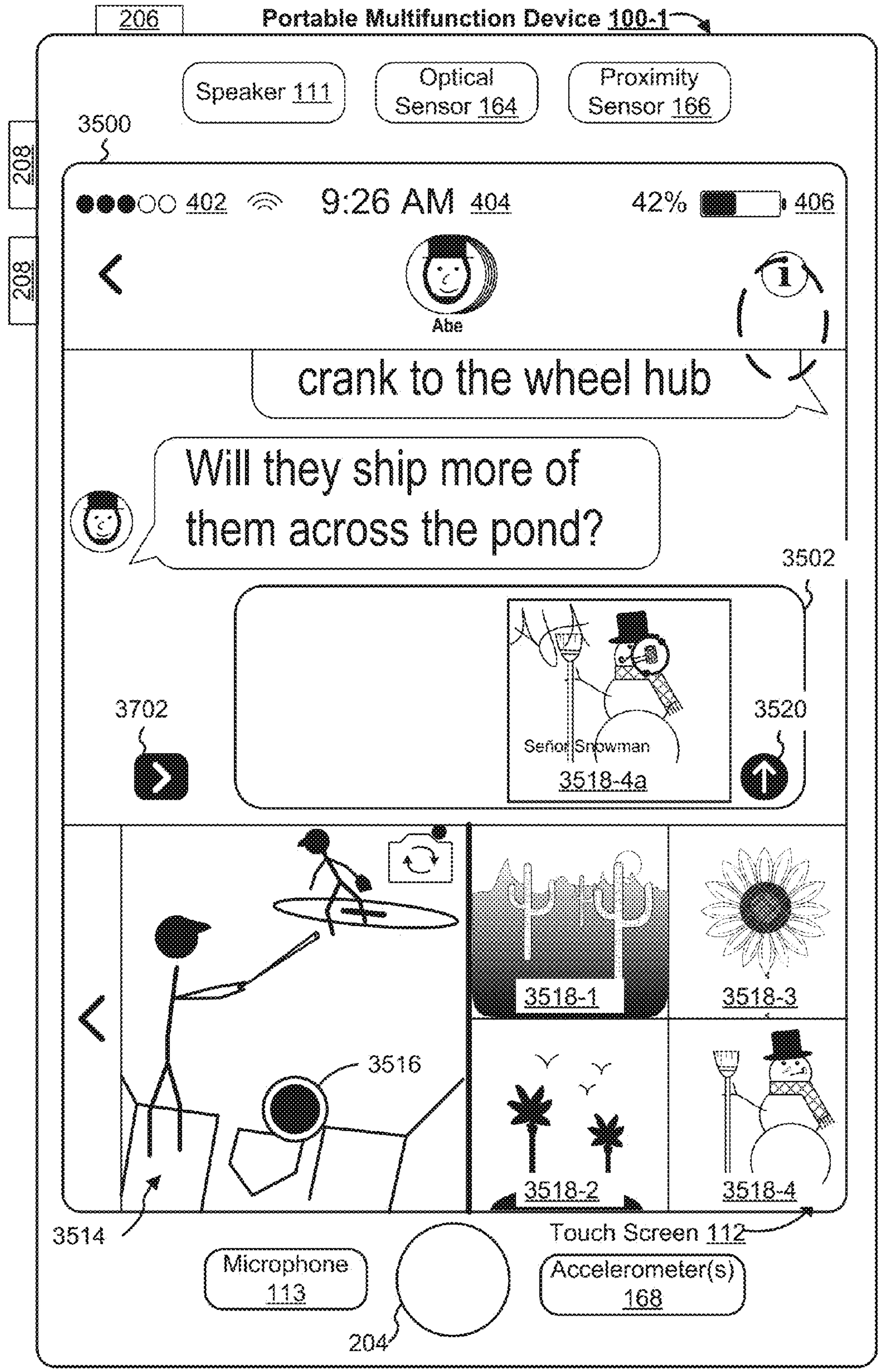
Figure 35A:
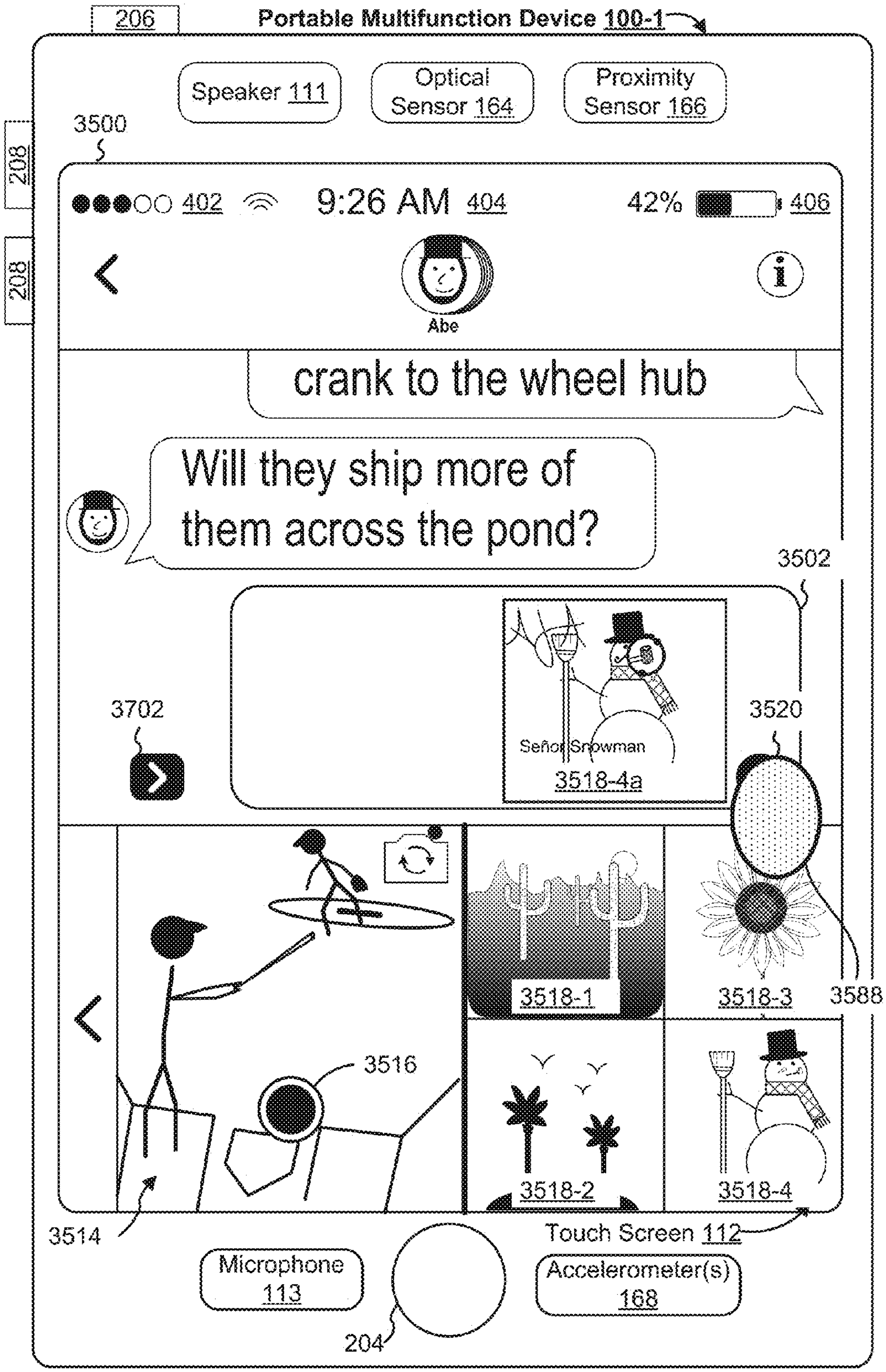
Figure 35A:
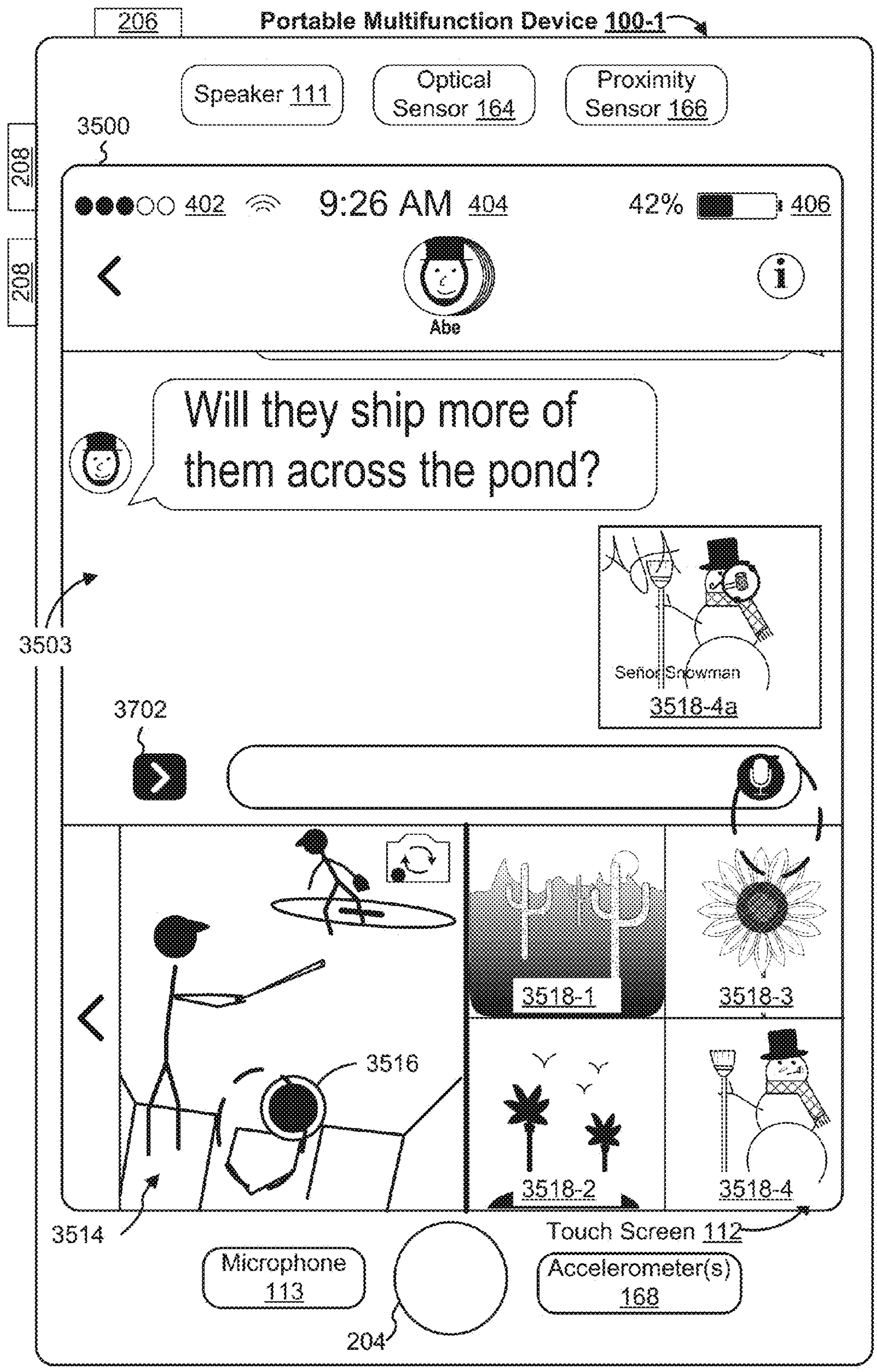
Figure 35A:
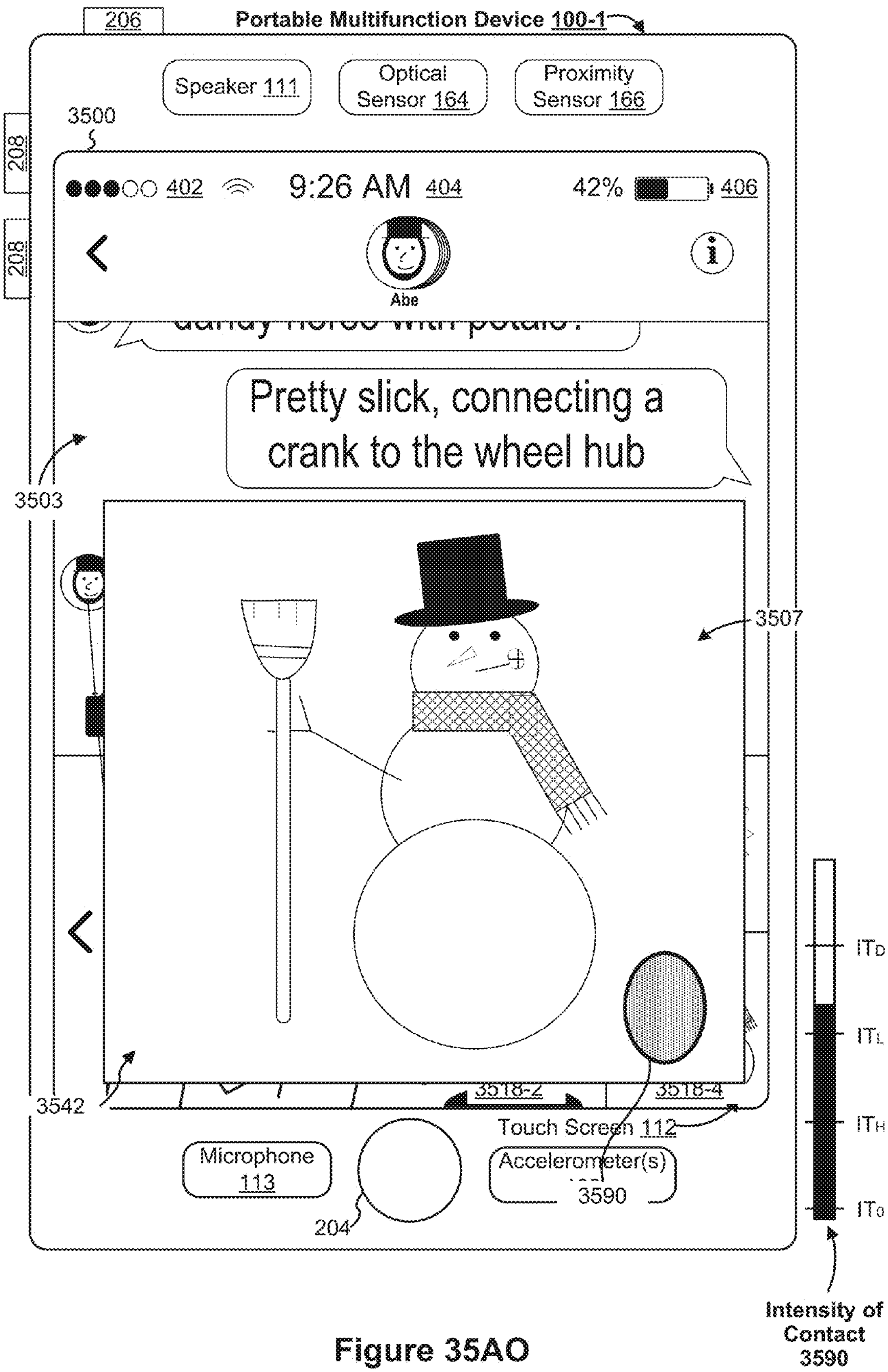
Figure 35A:
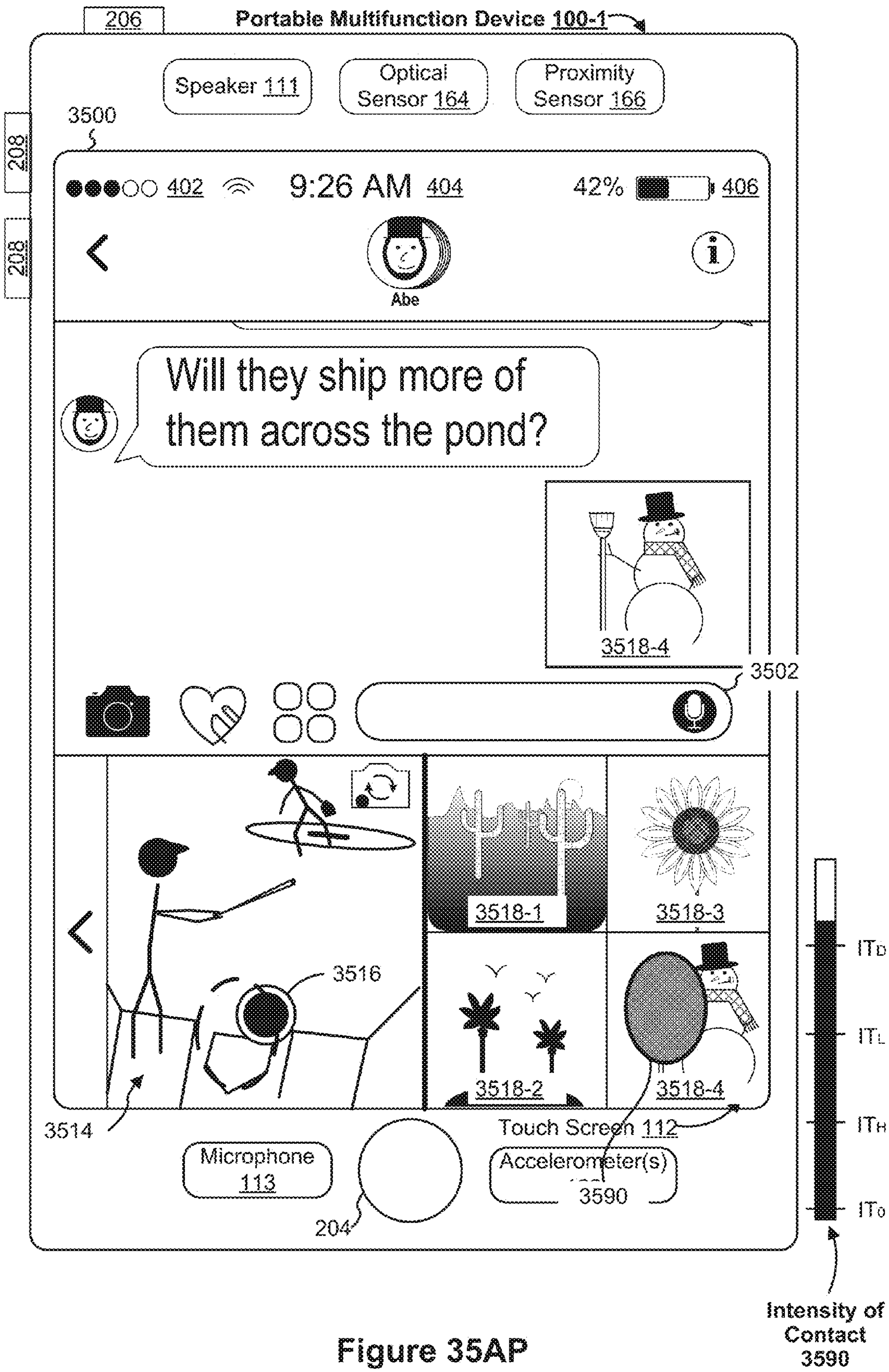

The device detects activation of pencil affordance 3552, in FIG. 35Y, and drawing of mustache 3562, in FIG. 35Z. The device then detects activation of magnification loupe affordance 3554, in FIG. 35AA, and placement of magnification loupe 3566, in FIG. 35AB. The magnification of loupe 3566 is increased by movement 3572 of tab 3568 from position 3568-*a* in FIG. 35AC to position 3568-*b* in FIG. 35AD. The size of loupe 3566 is increased by movement 3574 of tab 3570 from position 3570-*a* in FIG. 35AE to position 3570-*b* in FIG. 35AF. The device then detects activation of text affordance 3556, in FIG. 35AG, and input of text 3578 in FIG. 35AH. The device then detects activation of handwriting affordance 3558, in FIG. 35AI, and input of handwriting 3582 in FIG. 35AJ.

The device then detects a tap gesture including contact 3586 on saving affordance 3551 in FIG. 35AK. In response, the device returns to messaging user interface 3500 and displays edited digital image 3518-4*a* in message-input area 3502 in FIG. 35AL. The device then detects a tap gesture including contact 3588 on message-content posting affordance 3520 in FIG. 35AM. In response, device 100 posts edited digital image 3518-4*a* to the messaging session, displaying the image in conversation transcript 3503 in FIG. 35AN.

FIGS. 35AO-35AP illustrate a third exemplary embodiment where a previously captured digital image is previewed and posted to the messaging session. Device 100 detects a press gesture including contact 3590 on previously captured digital image 3518-4, and then an increase in the intensity of contact 3590 above a first predefined intensity threshold (e.g., $IT_L$), in FIG. 35AO. In response, the device displays enlarged preview 3507 of image 3518-4 over portions of digital image tray 3806 and conversation transcript 3503 in FIG. 35AO. The device then detects a further increase in the intensity of contact 3590 above a second predefined intensity threshold (e.g., $IT_D$) and, in response, and posts previously captured digital image 3518-4 directly to the messaging session, displaying the image in conversation transcript 3503 in FIG. 35AP.

Figure 36A:
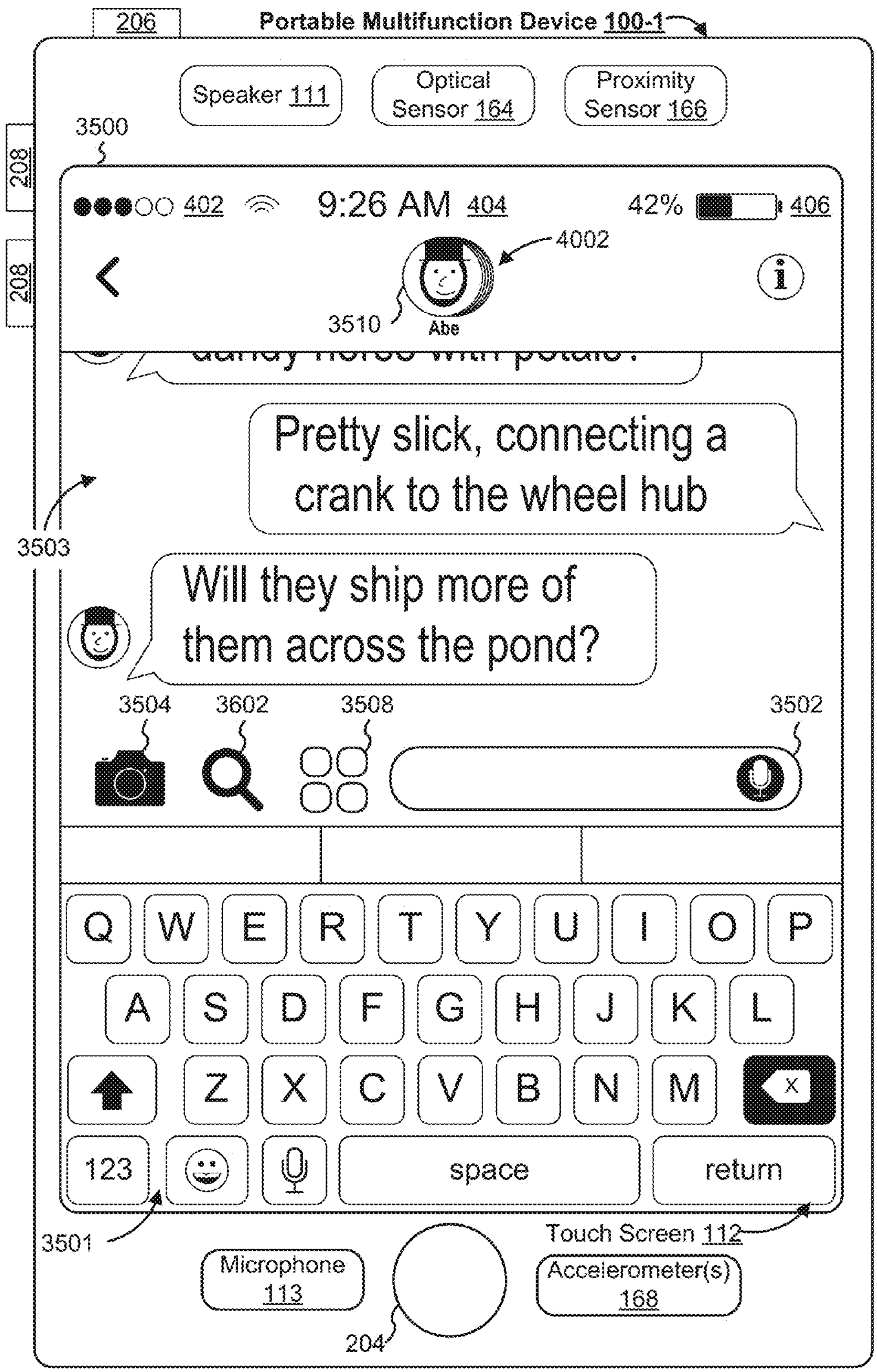
FIGS. 36A-36 AL illustrate exemplary user interfaces for integrating search functionality, and posting rich content, in a messaging application, in accordance with some embodiments.

FIGS. 36A-36 AL illustrate exemplary user interfaces for integrating search functionality, and posting rich content, in a messaging application, in accordance with some embodiments. The user interfaces in these figures are used to illustrate the processes described below, including the processes in FIGS. 44A-44D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 36B:
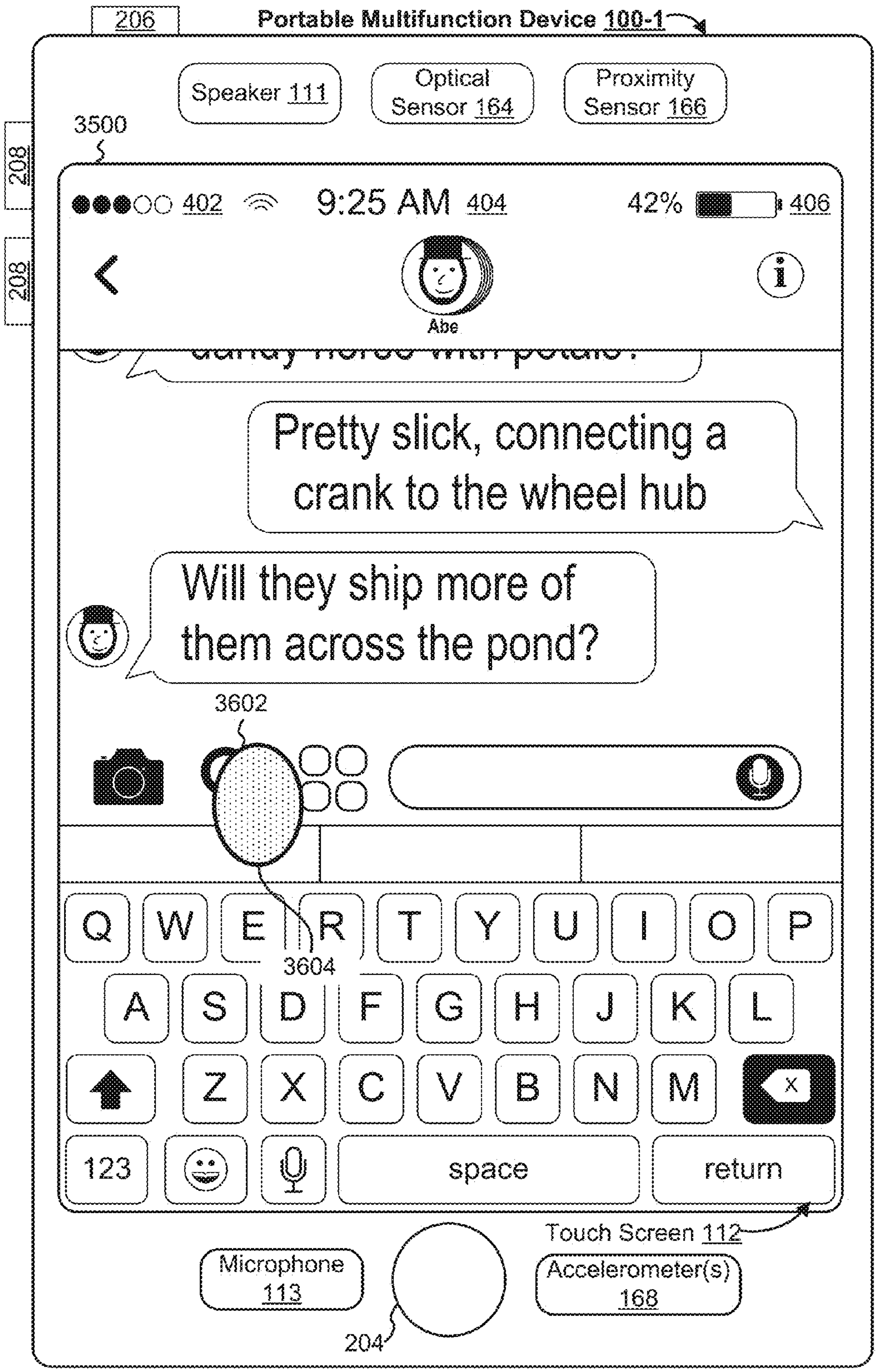
Figure 36C:
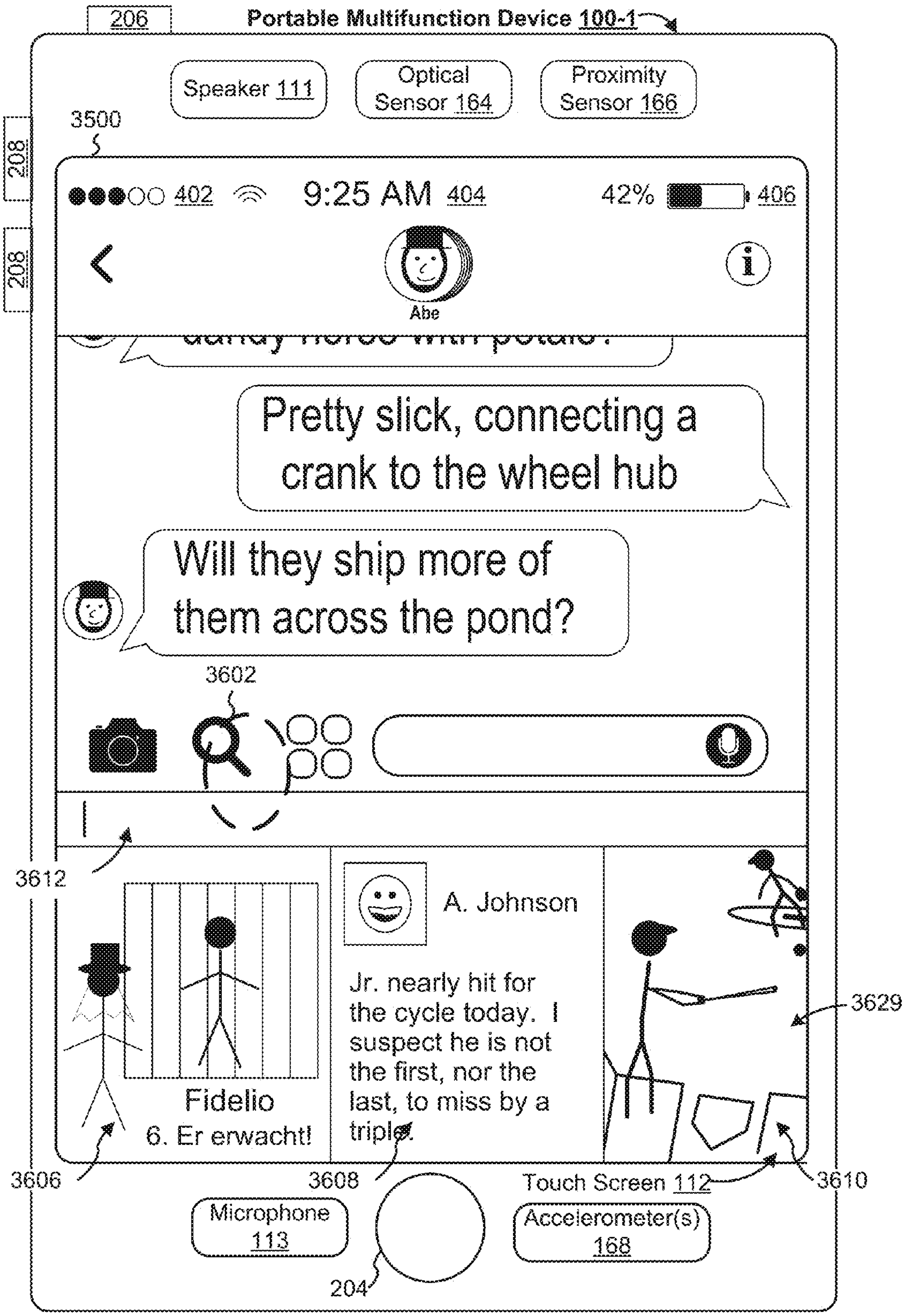
Figure 36D:
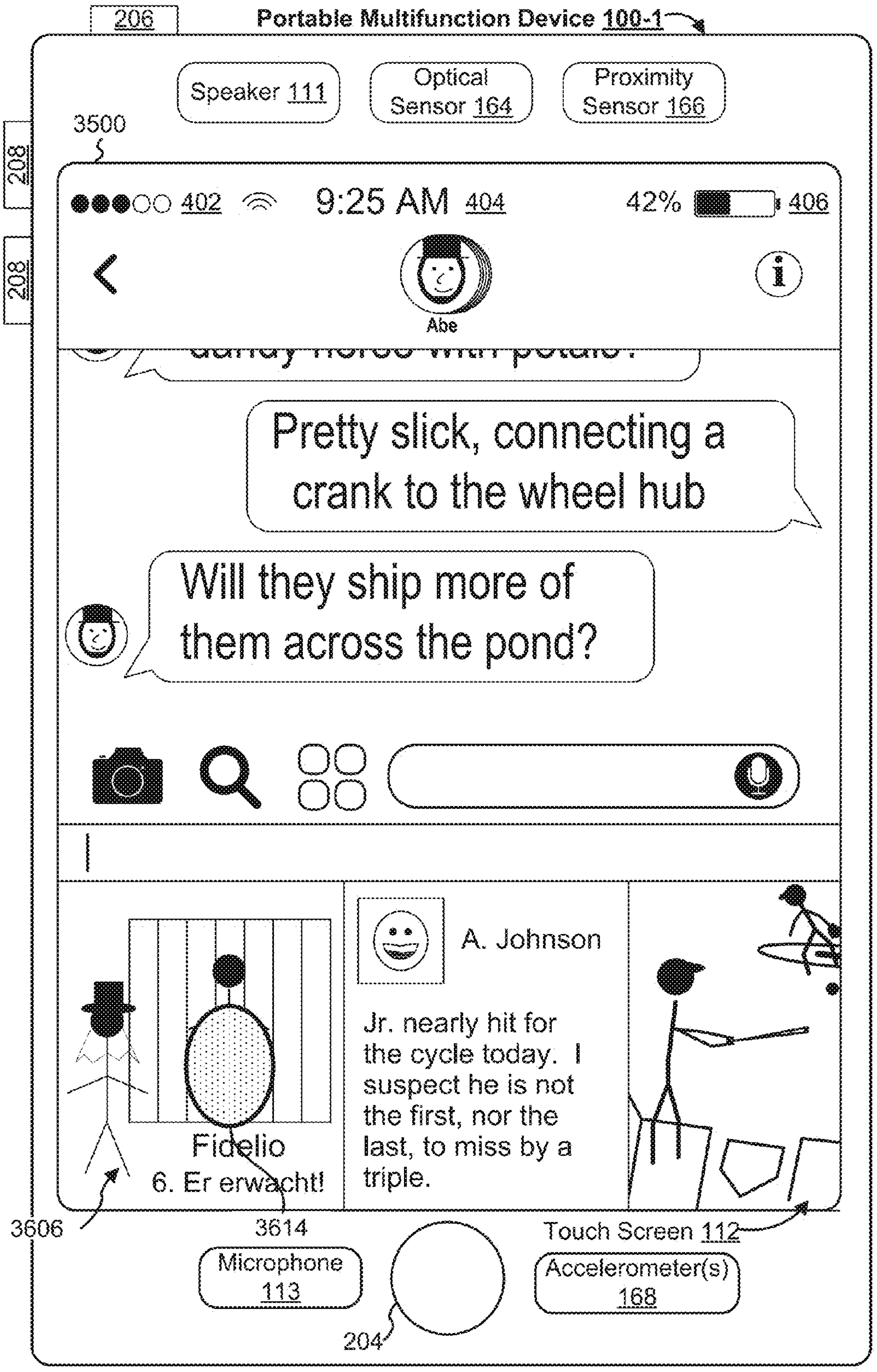
Figure 36E:
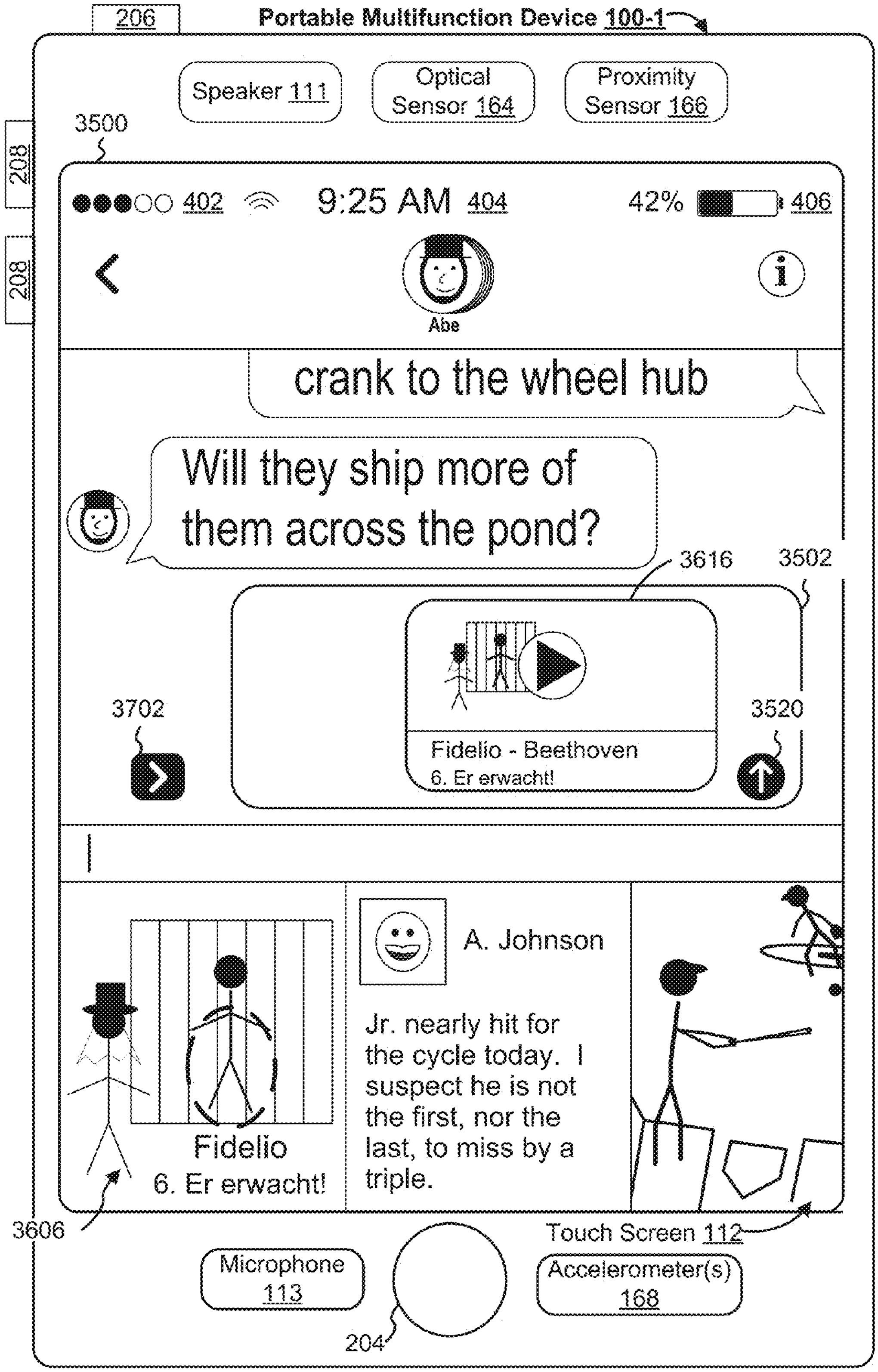
Figure 36F:
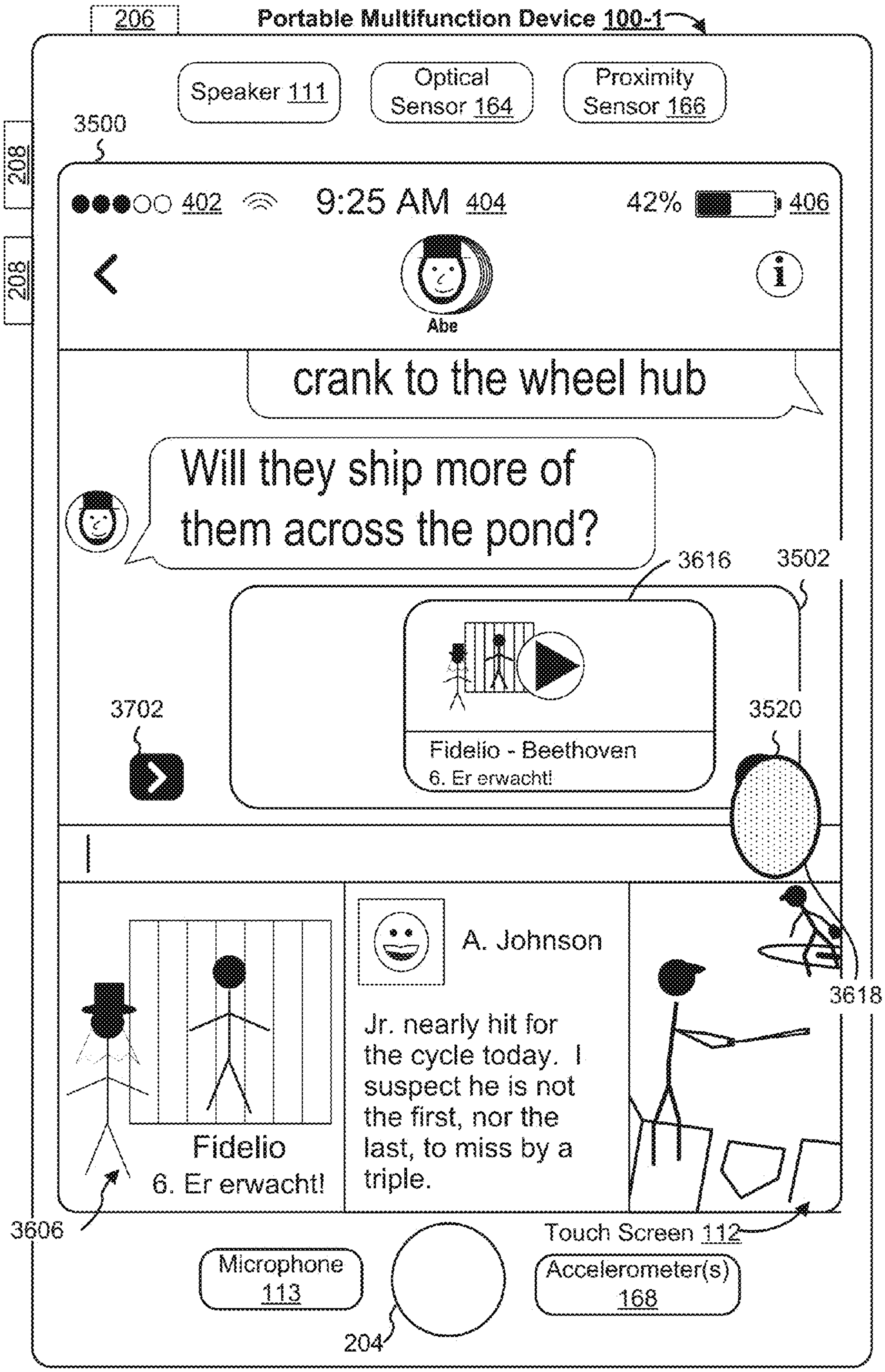
Figure 36G:
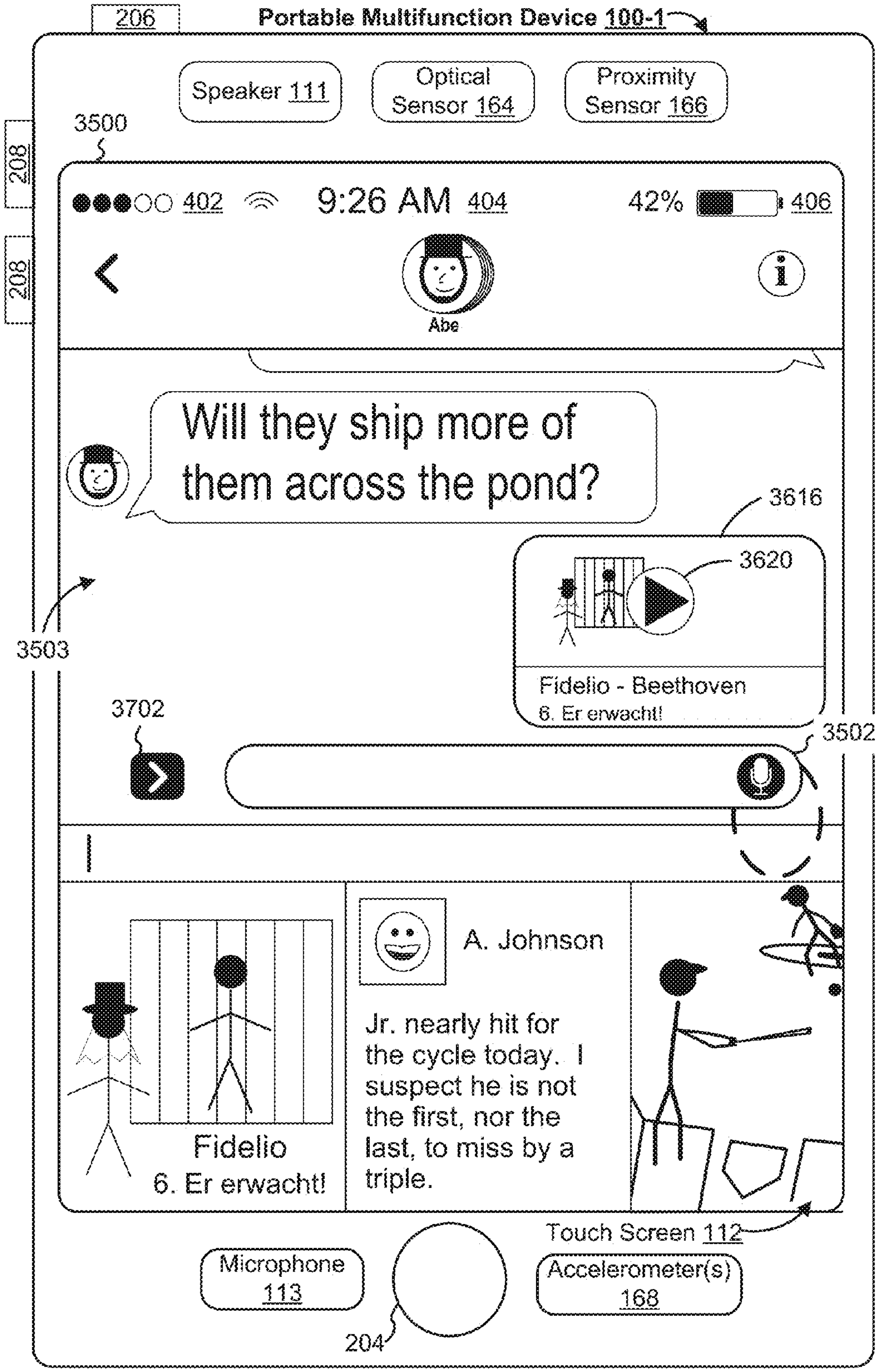
Figure 36H:
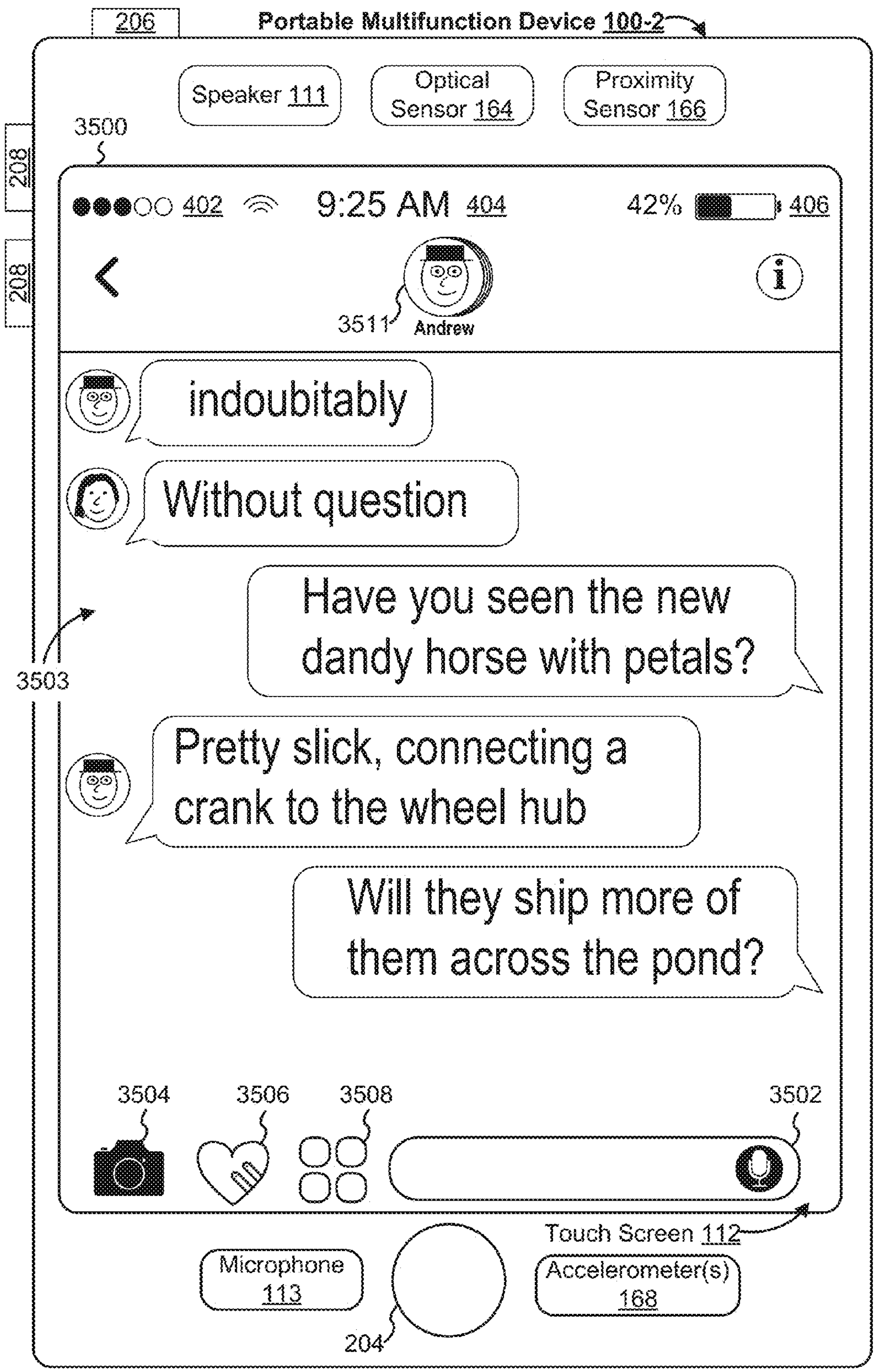
Figure 36I:
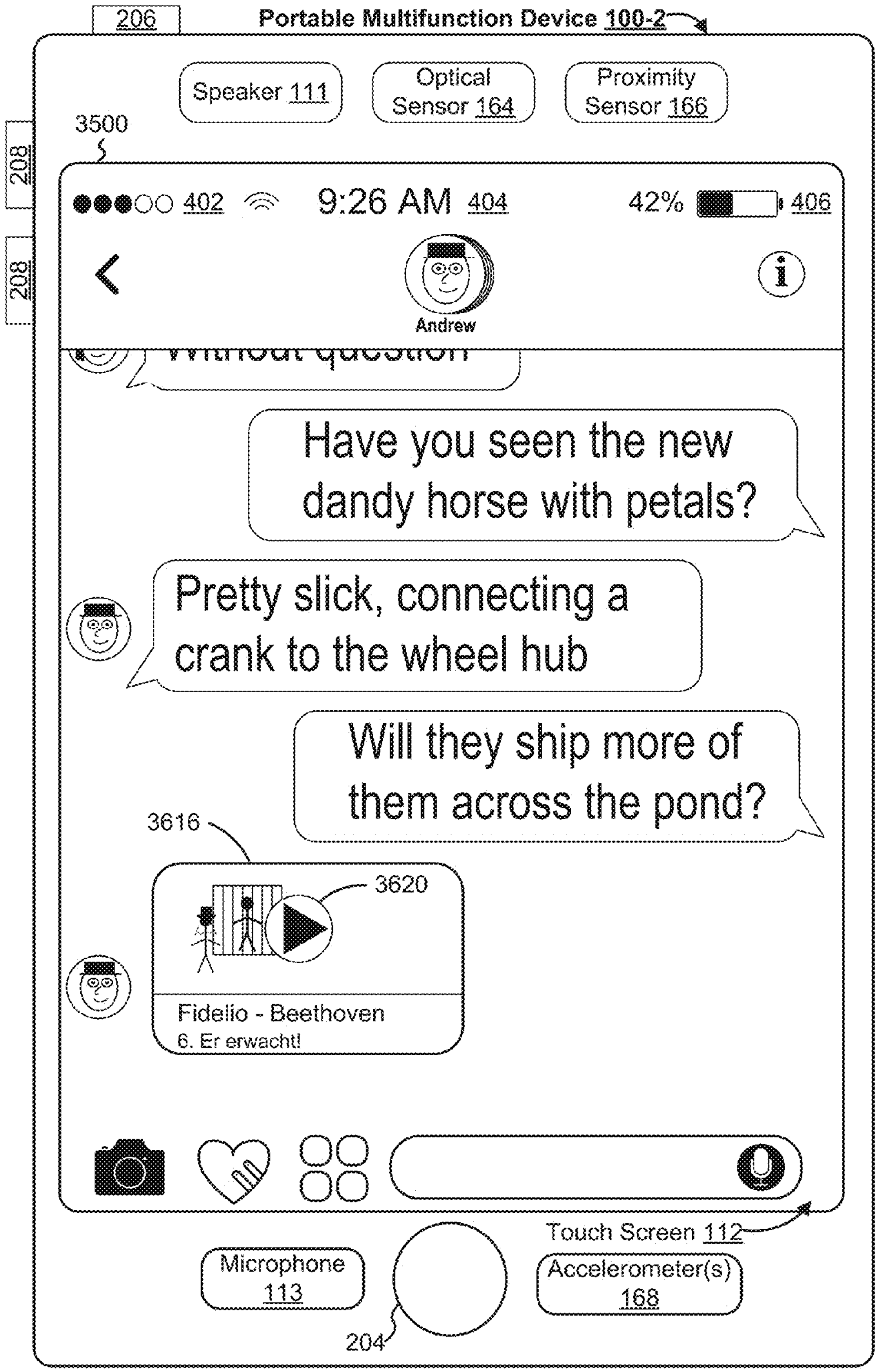
Figure 36J:
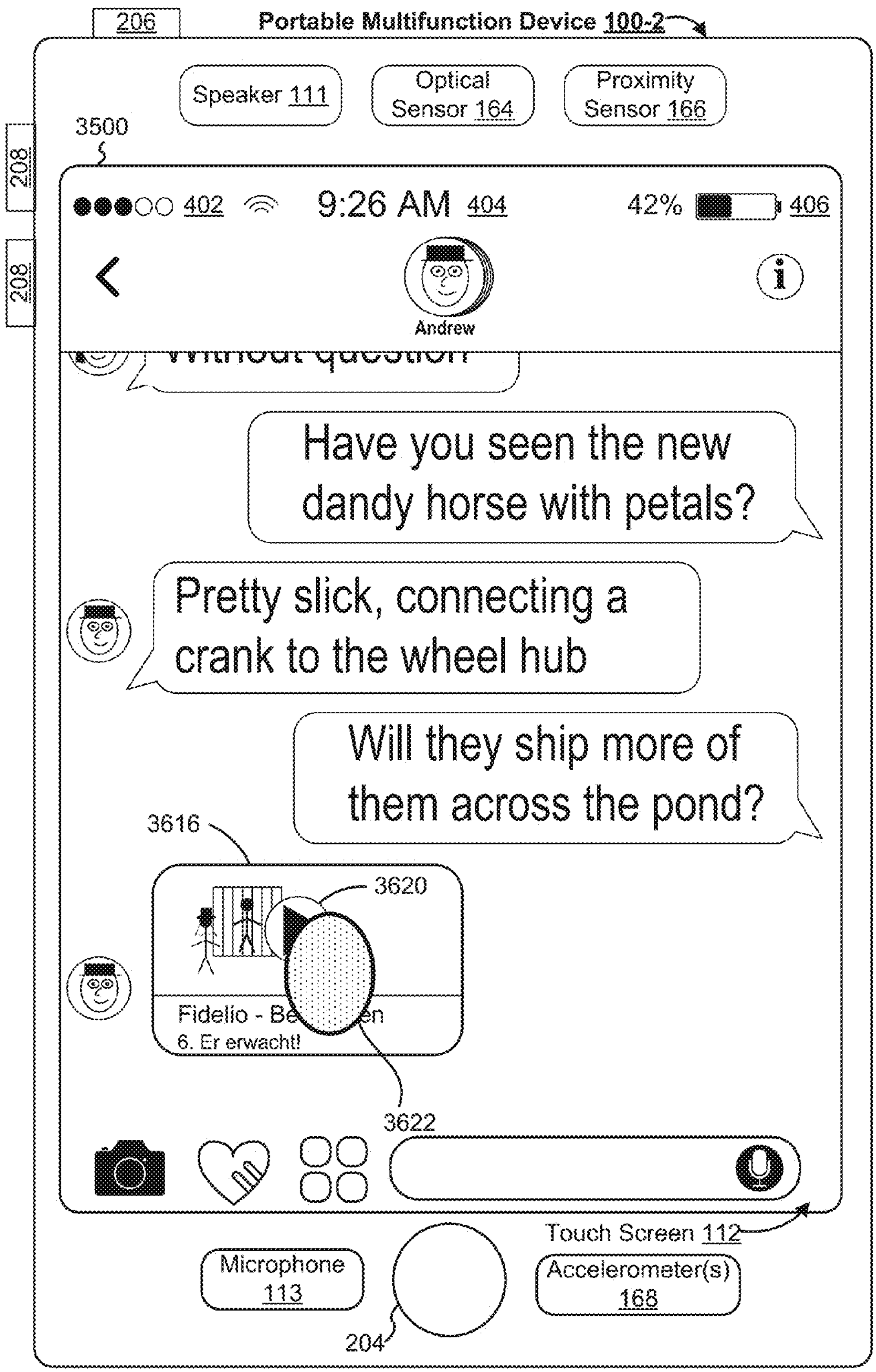
Figure 36K:
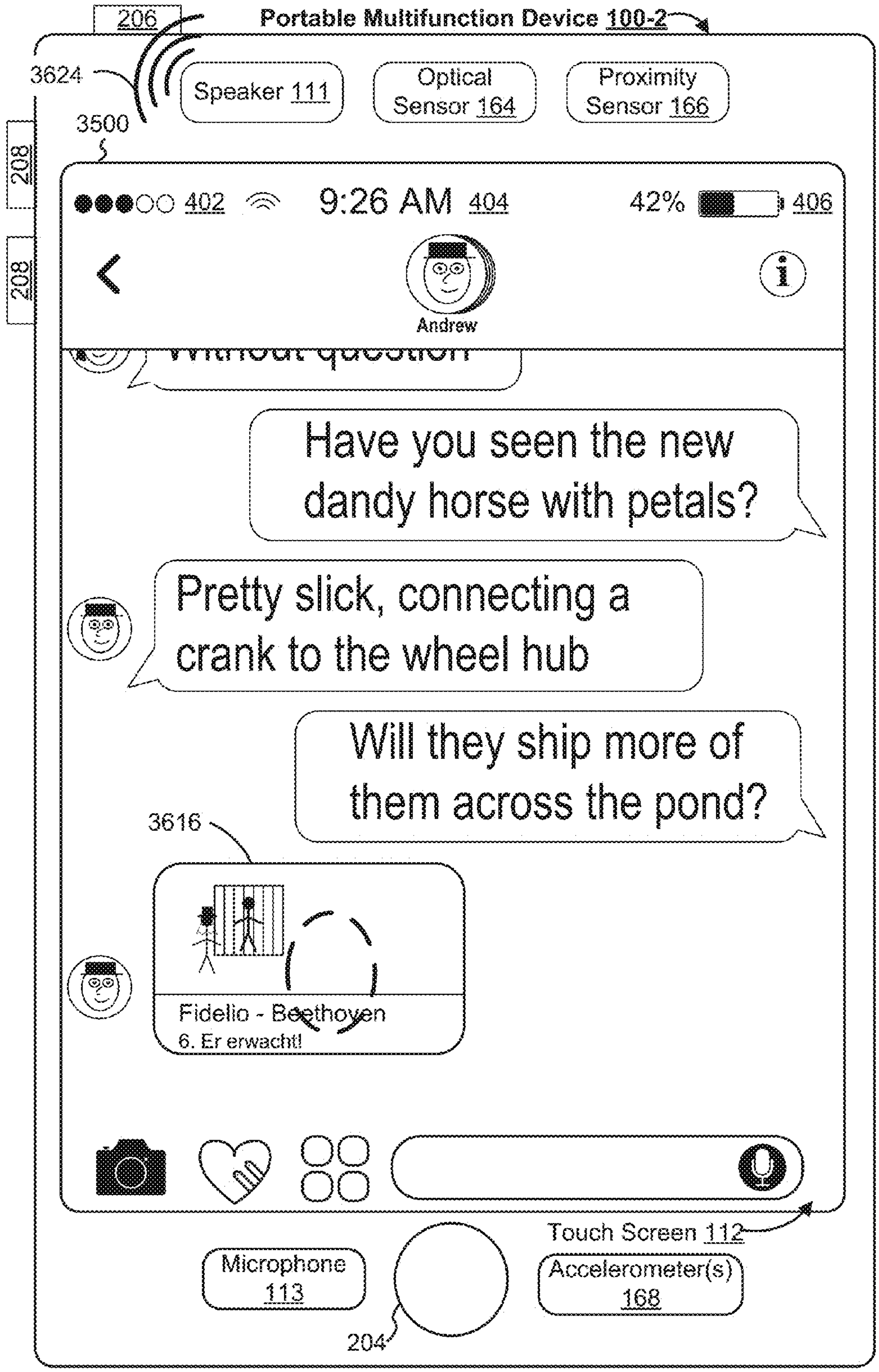
Figure 36L:
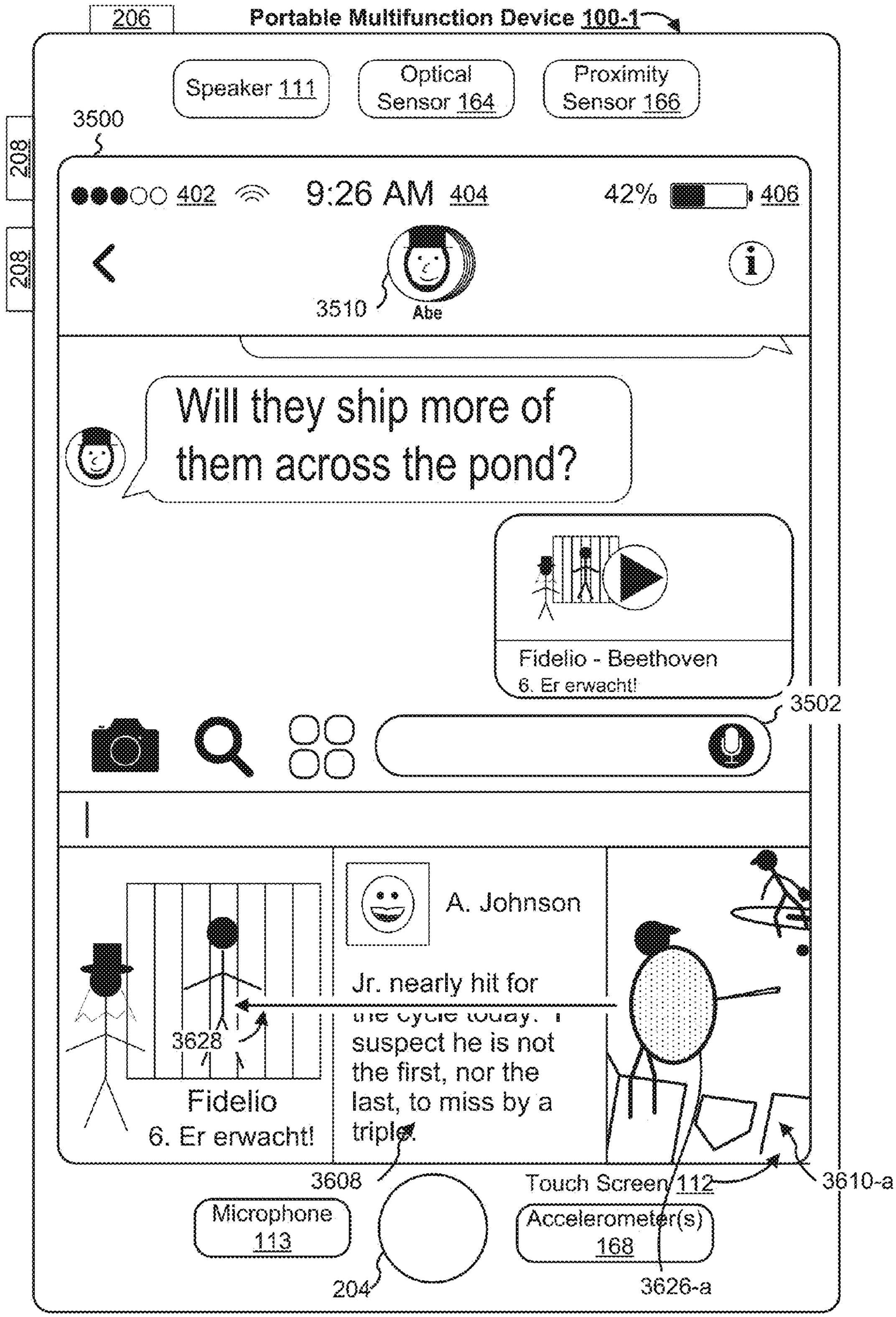
Figure 36M:
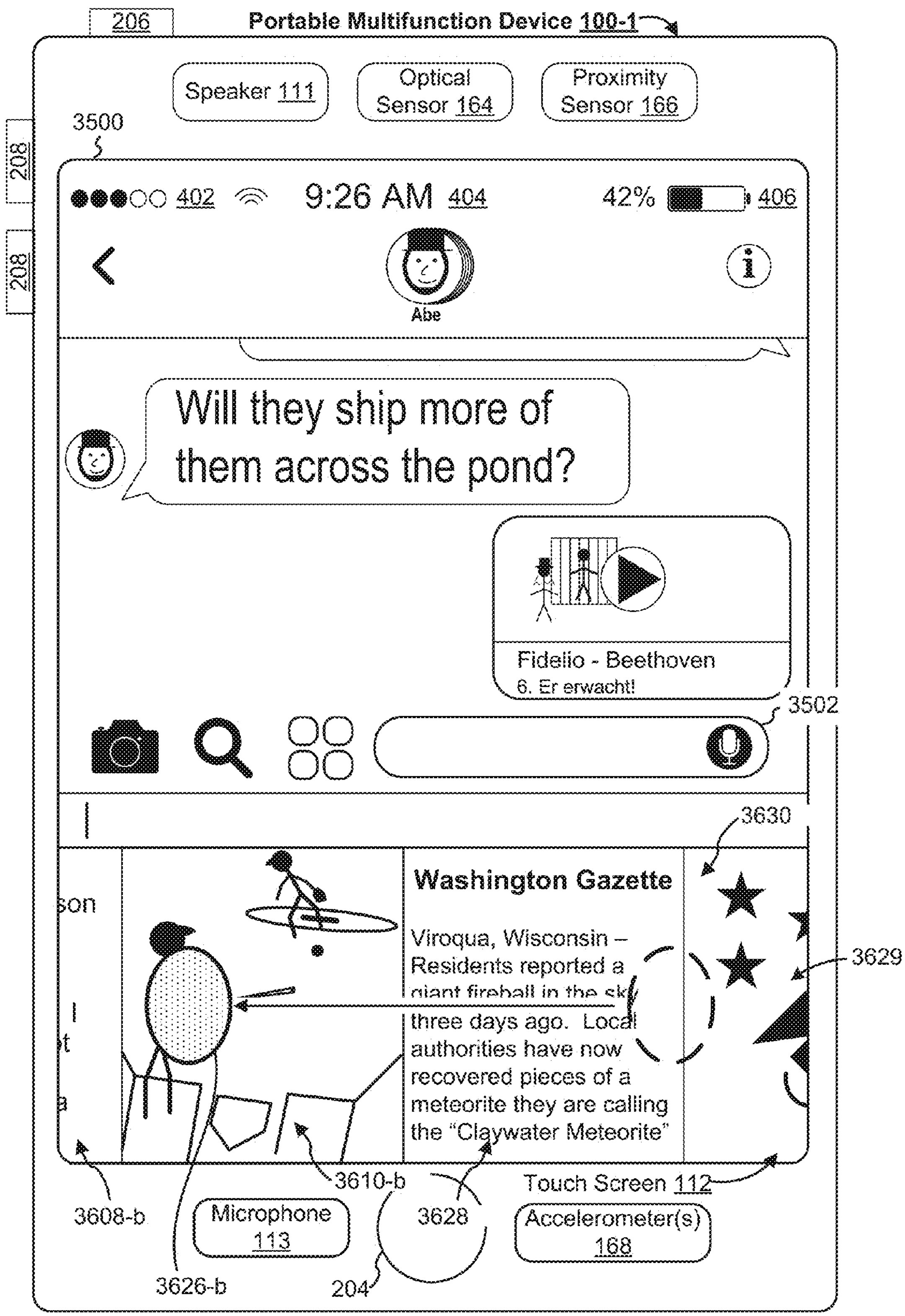
Figure 36N:
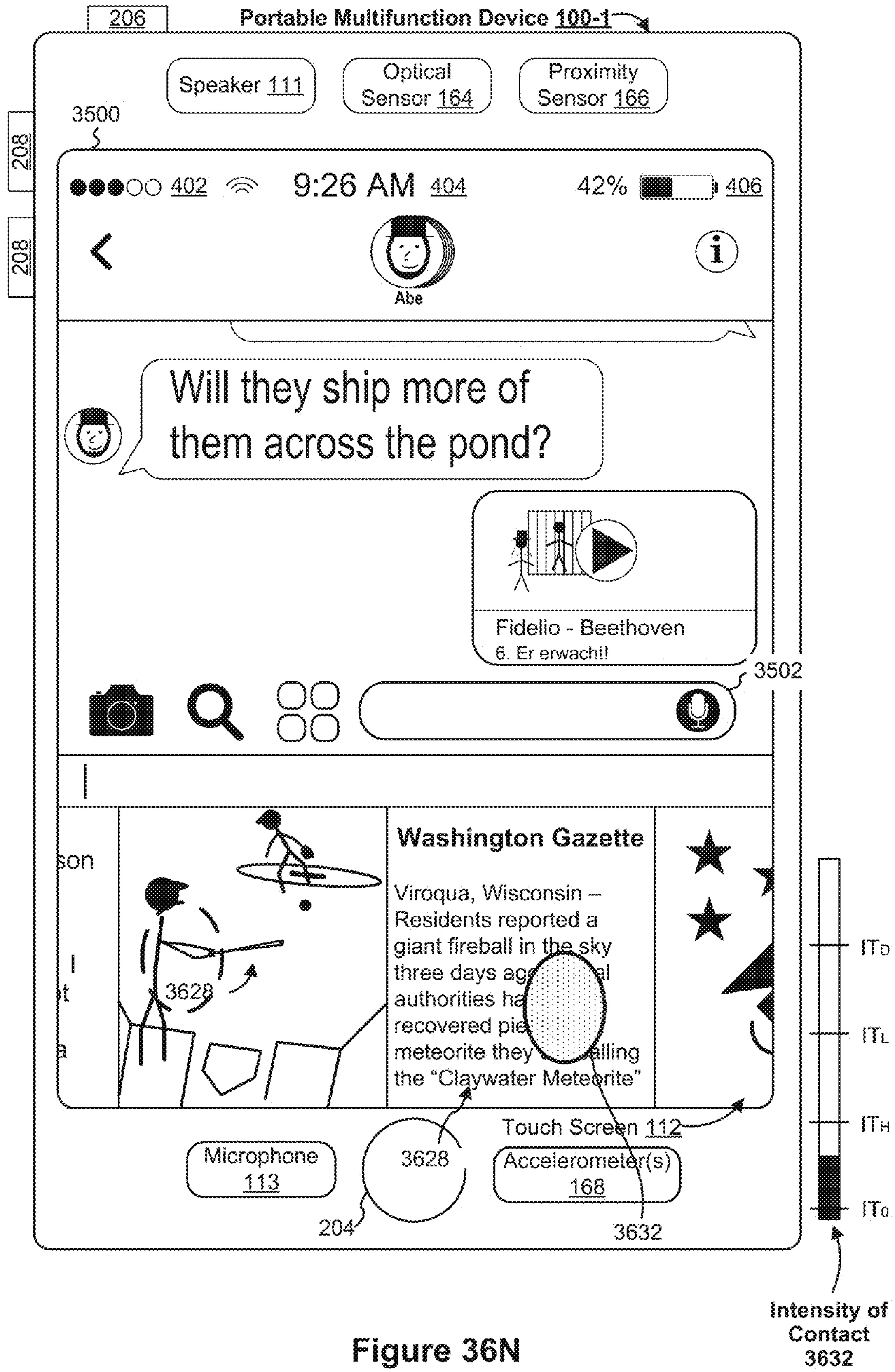
Figure 36O:
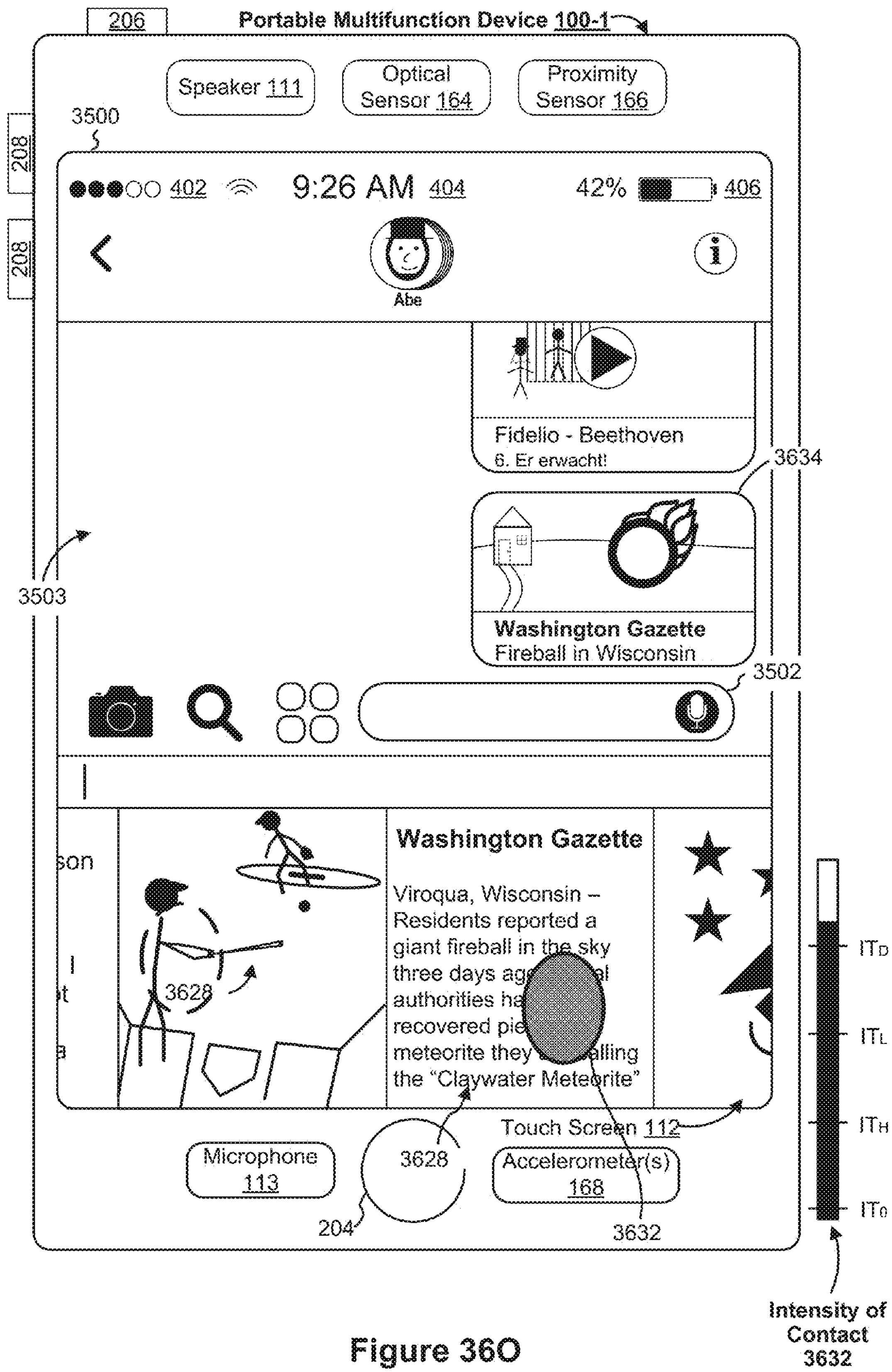
Figure 36P:
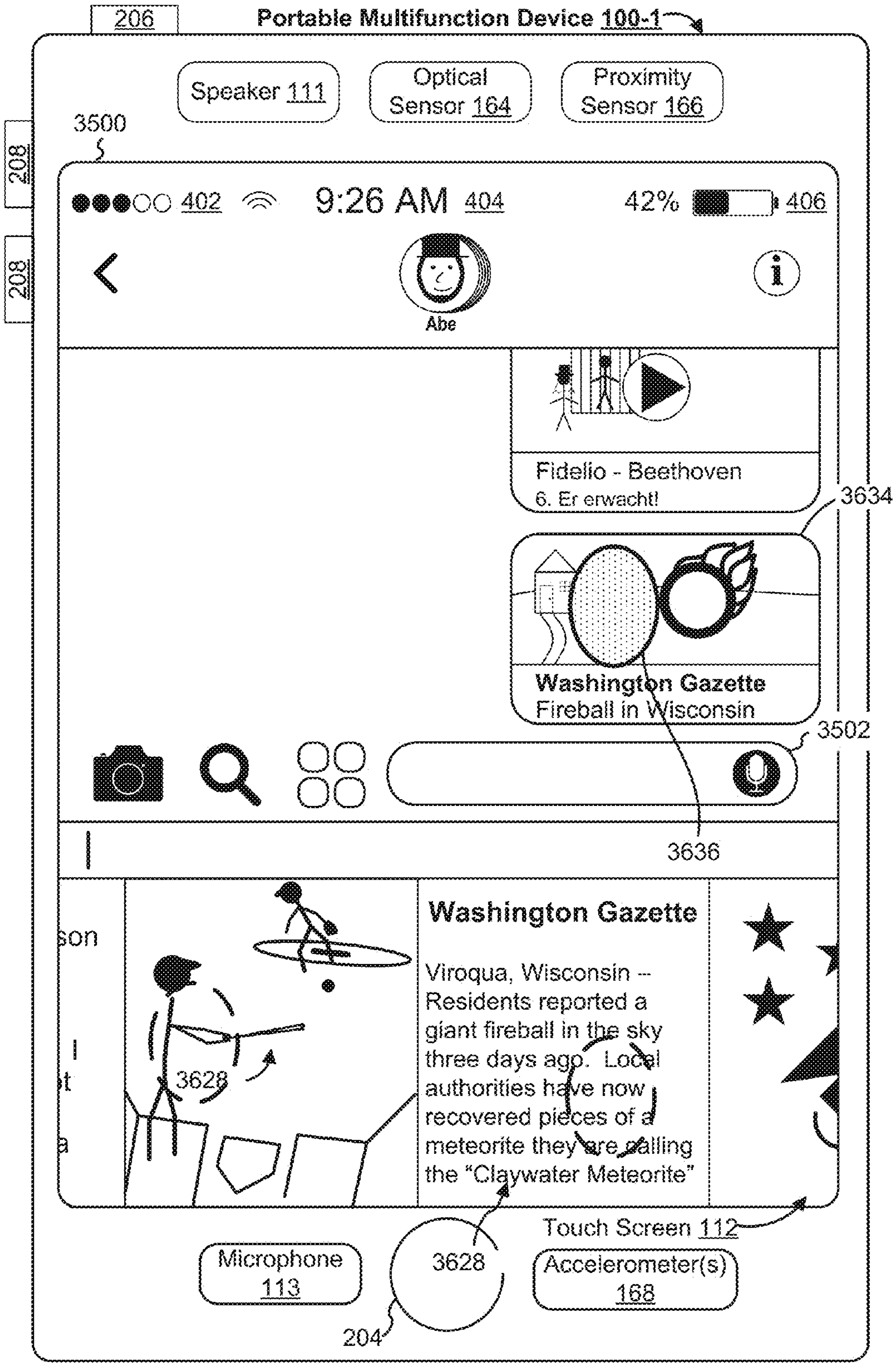
Figure 36Q:
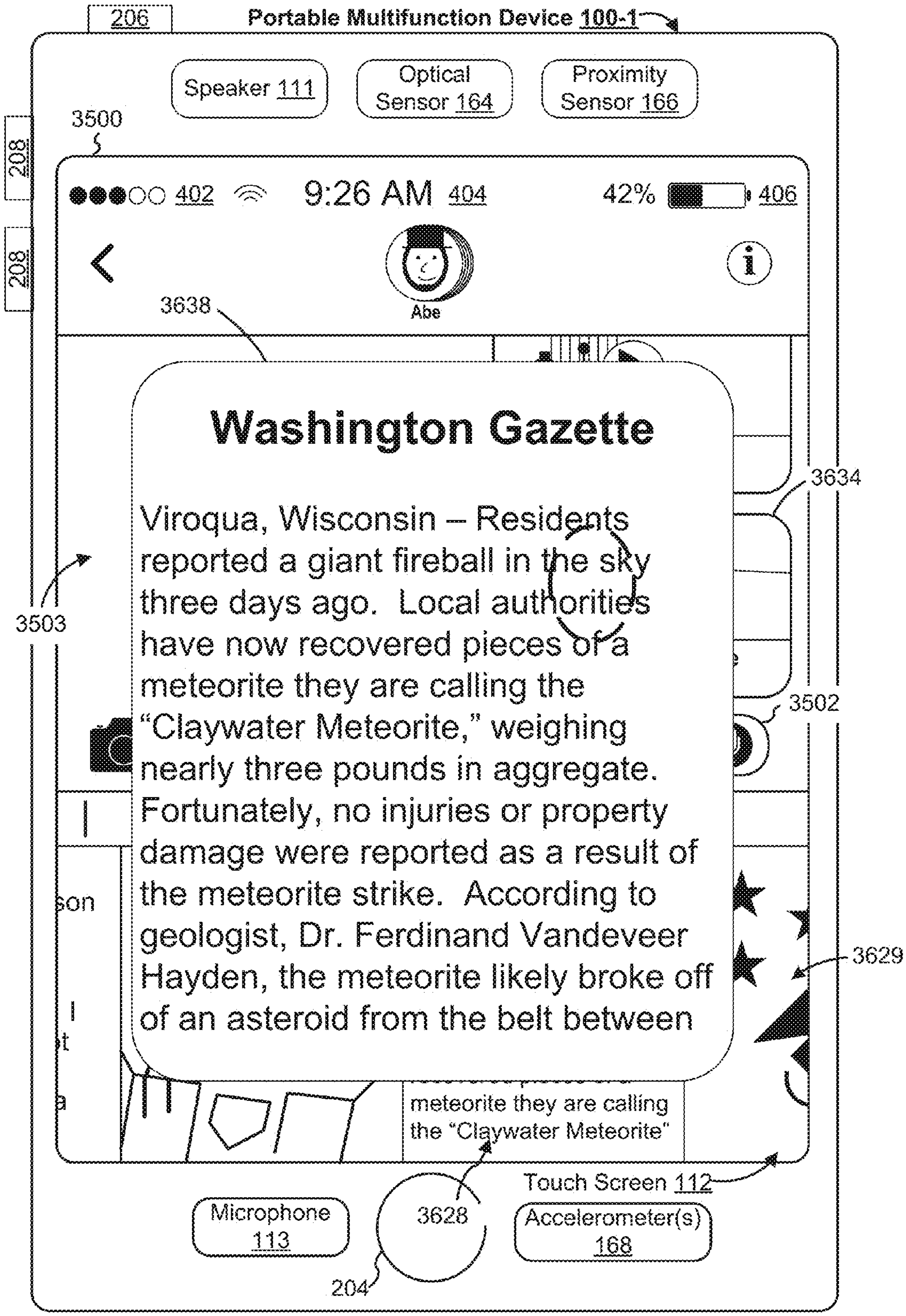
Figure 36R:
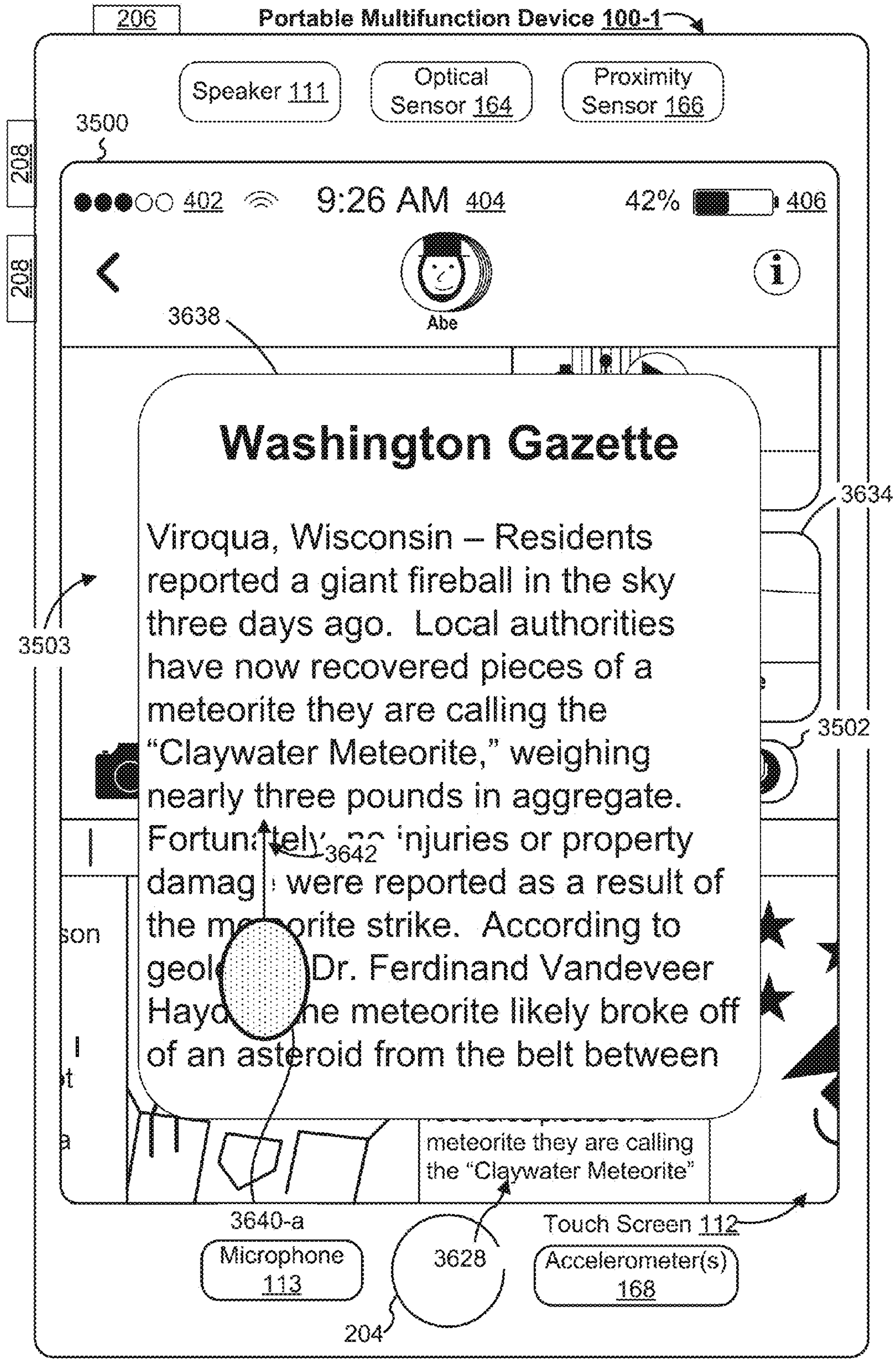
Figure 36S:
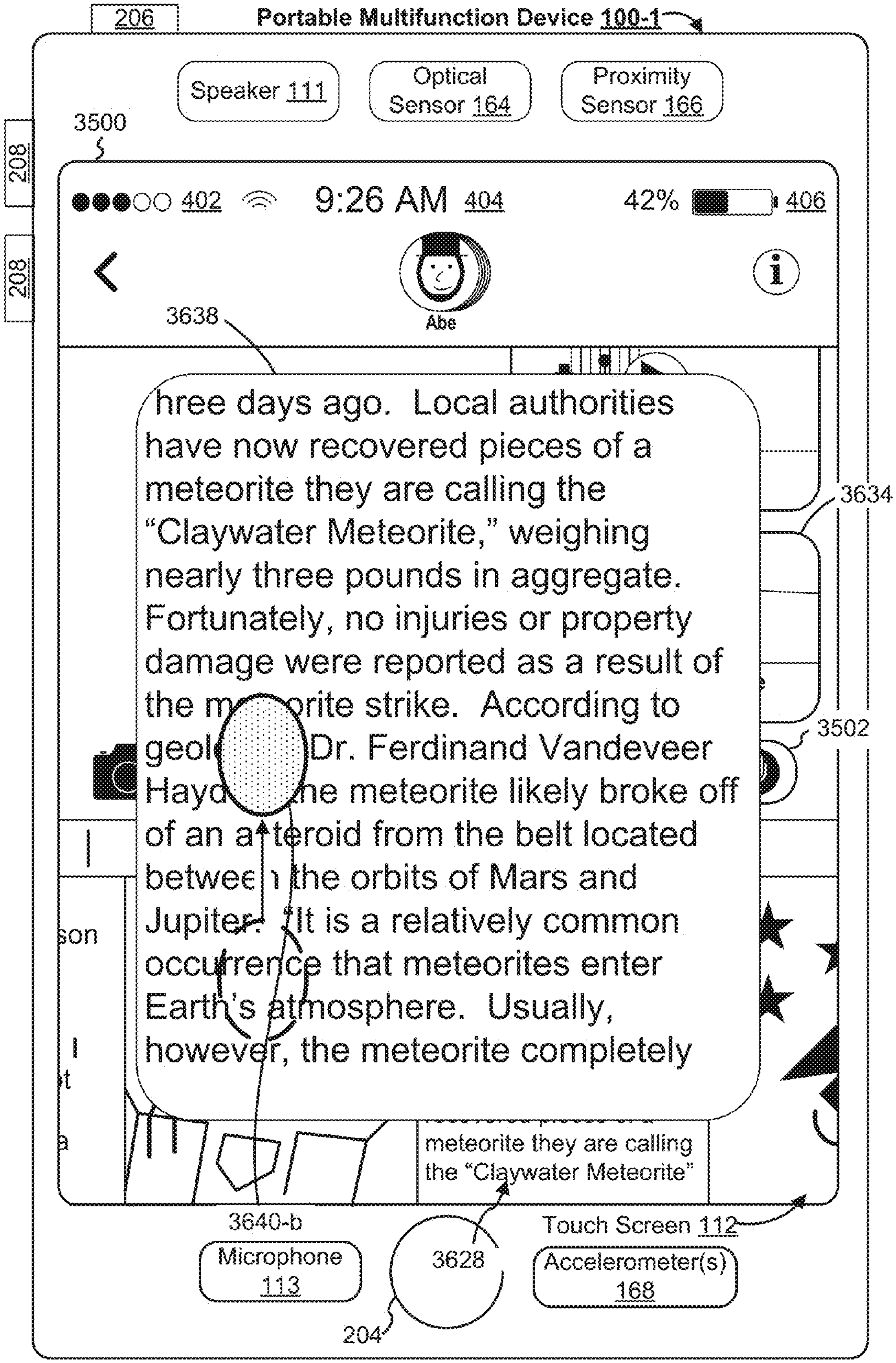
Figure 36T:
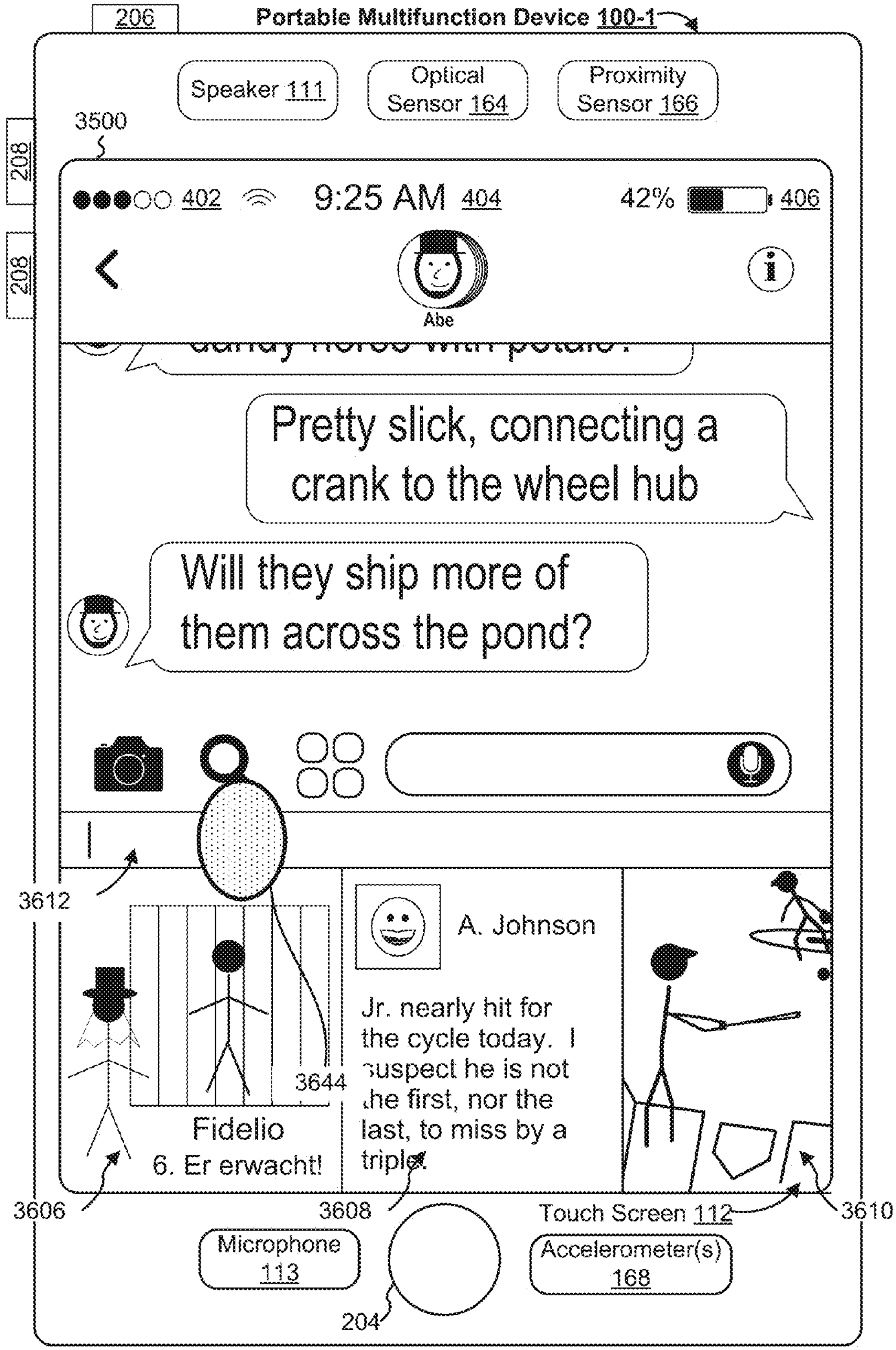
Figure 36U:
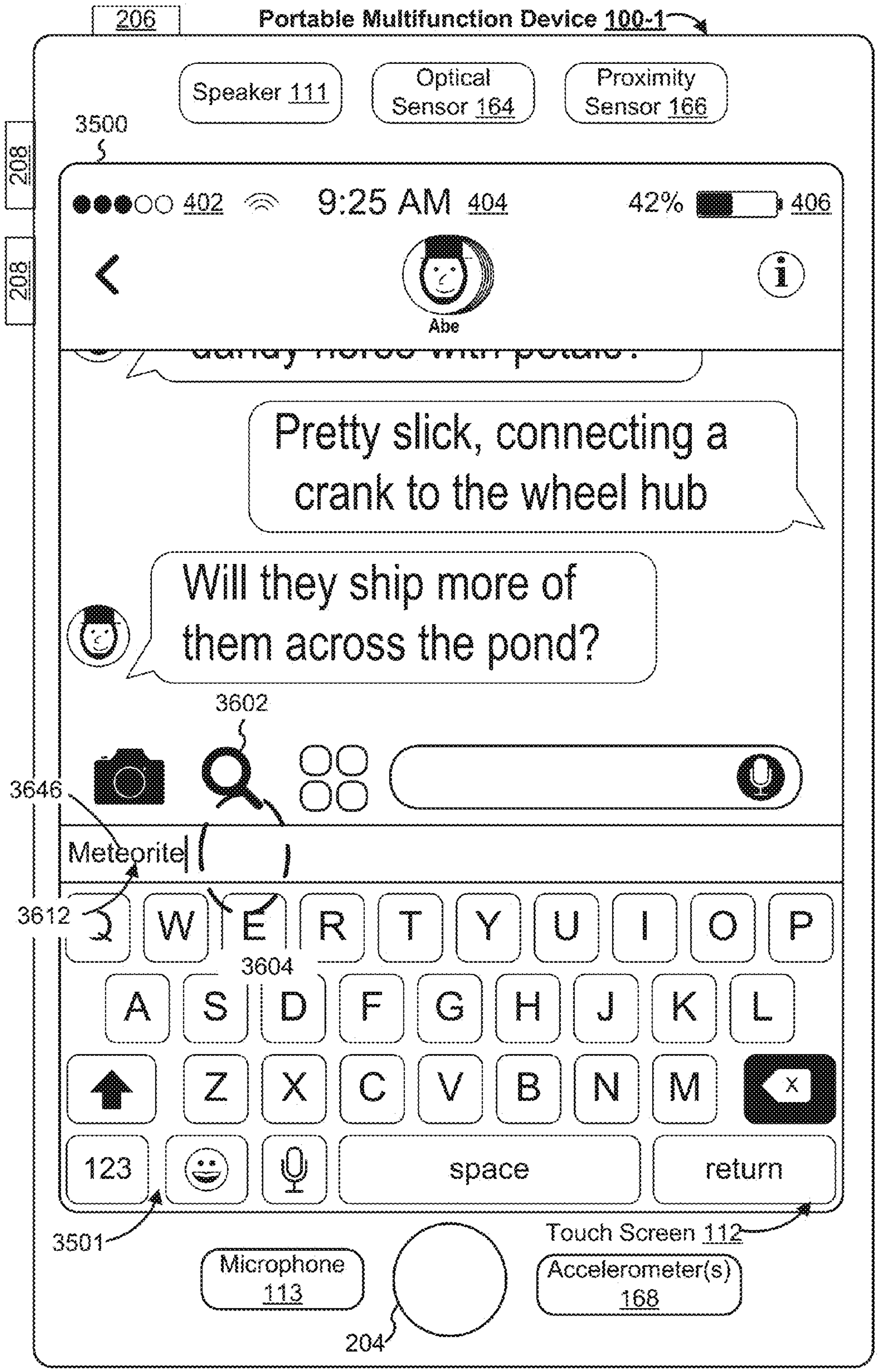
Figure 36V:
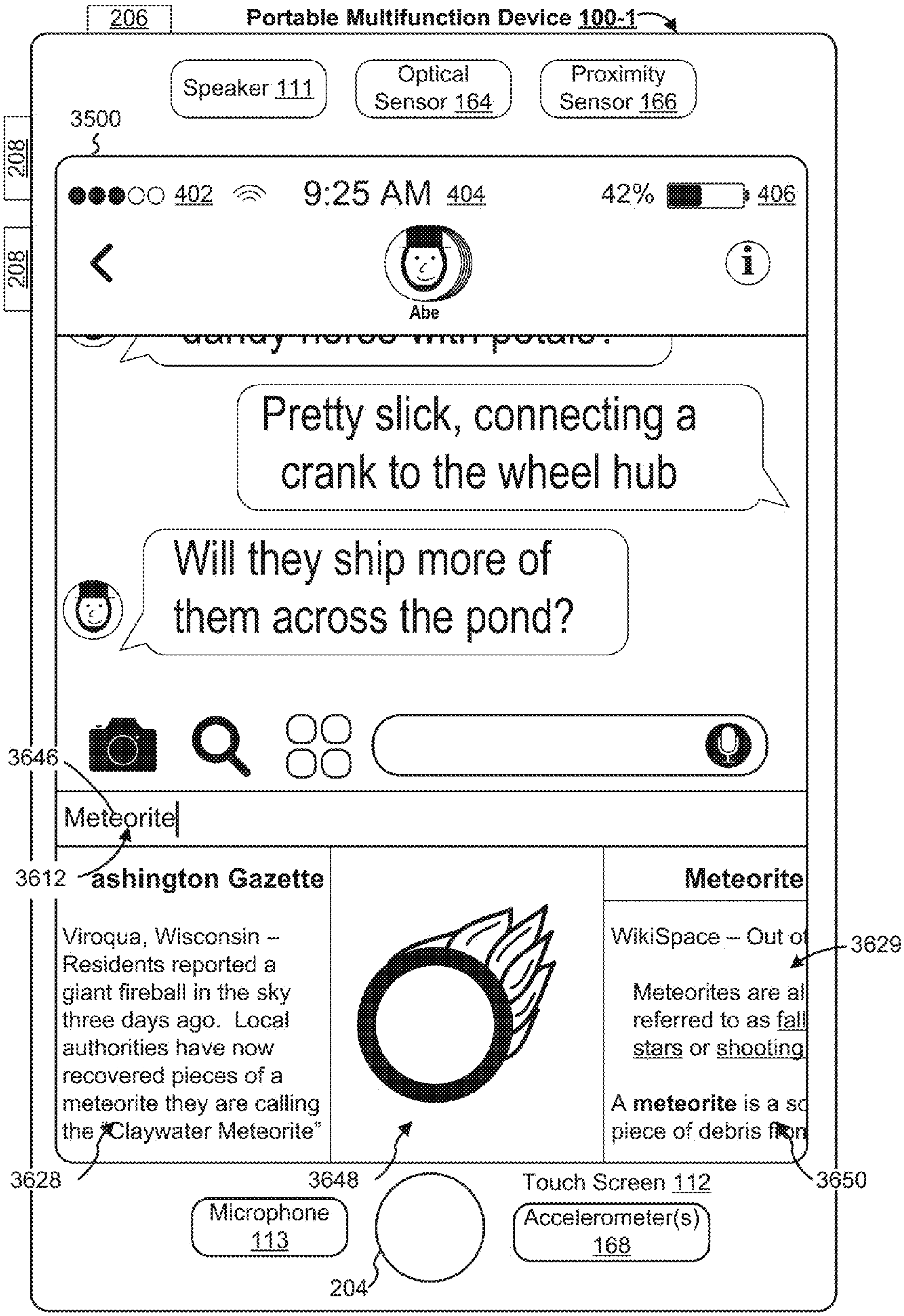

FIGS. 36A-36V illustrate exemplary user interface 3500 for a messaging application which includes conversation transcript 3503, message-input area 3502, either of application expansion affordance 3702 or three activatable affordances—digital image affordance 3504, search affordance 3602, and application affordance 3508—optionally, either of digital keyboard 3501 or search tray 3629, which includes content (e.g., 3606, 3608, and 3610) that can be posted to the messaging session corresponding to conversation transcript 3503. Conversation transcript 3503 includes messages and content from participants of a corresponding messaging session, including the user of portable multifunction device 100 and other users included in the messaging session. Each of the other users included in the messaging transcript are represented by an avatar (e.g., avatar 3510 for "Abe") displayed in stack of avatars 4002.

FIGS. 36A-36S illustrate two exemplary embodiments for posting multimedia content stored on the electronic device and/or multimedia content recently accessed on the device, without leaving the messaging application. Multimedia content is accessed in a messaging user interface displaying message transcript 3503 and keyboard 3501, as illustrated in FIG. 36A, by detecting activation of search affordance 3602 by contact 3604 in FIG. 36B. In response, search tray 3629, including multimedia content that was recently accessed on the device—digital recording 3606, social media entry 3608, and digital image 3610—replaces digital keyboard 3501 in FIG. 36C.

In a first embodiment, device 100-1 places digital recording 3606 in message-input area 3520, in FIG. 36E, in response to detecting a tap gesture including contact 3614 on the digital recording in FIG. 36D. Responsive to detecting a tap gesture including contact 3618 on message-content posting affordance 3520 in FIG. 36F, device 100-1 posts the digital recording to the messaging session, displaying the recording in conversation transcript 3603 in FIG. 36G.

Device 100-2, corresponding to a second user included in the messaging session corresponding to conversation transcript 3503, as illustrated in FIG. 36H, receives digital recording 3616 in FIG. 36I. Responsive to detecting a tap gesture on digital recording 3616, including contact 3622 in FIG. 36J, device 100-2 plays the digital recording in FIG. 36K, as illustrated by sound waves 3624.

A second embodiment also illustrates an exemplary embodiment where a swipe gesture reveals additional multimedia content recently accessed by the device. Device 100-1 detects a swipe gesture including movement 3628 of contact 3626 to the left, from position 3626-*a* in FIG. 36L to position 3626-*b* in FIG. 36M. In response, the device moves search tray 3629 to the left, in accordance with movement 3628, creating the appearance that digital image 3608 slides off the left side of touch screen 112 and additional multimedia content—news article 3628 and movie preview 3630—slides onto the display from the right side of touch screen 112, in FIG. 36M.

Device 100-1 detects a press gesture including contact 3632 on news article 3628, associated with a webpage previously accessed by device 100-1, in FIG. 36N. Device 100 then detects an increase in the intensity of contact 3632 above a predefined intensity threshold (e.g., ITL or ITD) and, in response, posts representation 3634 of the news article, including an image associated with the article, an organization associated with the website (the "Washington Gazette"), and a title of the news article ("Fireball in Wisconsin") directly to the messaging session, displaying representation 3634 in conversation transcript 3503 in FIG. 36O.

FIGS. 36P-36S illustrate an exemplary embodiment where content from the internet is accessed from within the messaging user interface. Device 100-1 detects a tap gesture, including contact 3636, on news article 3634 displayed in conversation transcript 3503, in FIG. 36P. In response, device 100-1 accesses the web page associated with the news article in area 3638, displayed over portions of search tray 3629 and conversation transcript 3503, in FIG. 36Q. Device 100-1 then displays more of the news article from the web site, in area 3638, responsive to detecting a swipe gesture, including movement 3642 of contact 3640 from position 3640-*a* in FIG. 36R to position 3640-*b* in FIG. 36S.

FIGS. 36T-36V illustrate an exemplary embodiment where multimedia content on the internet is searched from within the messaging user interface. Device 100-1 initiates a search in response to detecting a tap gesture, including contact 3612, on search-input area 3612, in FIG. 36T. In response, the device replaces search tray 3629 with digital keyboard 3501 in FIG. 36U. Device 100-1 then detects input of search term 3646 ("Meteorite") in FIG. 36U. In response, digital keyboard 3501 is replaced by search tray 3629, including content from the internet—news article 3628, picture 3648, and wiki page 3650—in FIG. 36V.

Figure 36W:
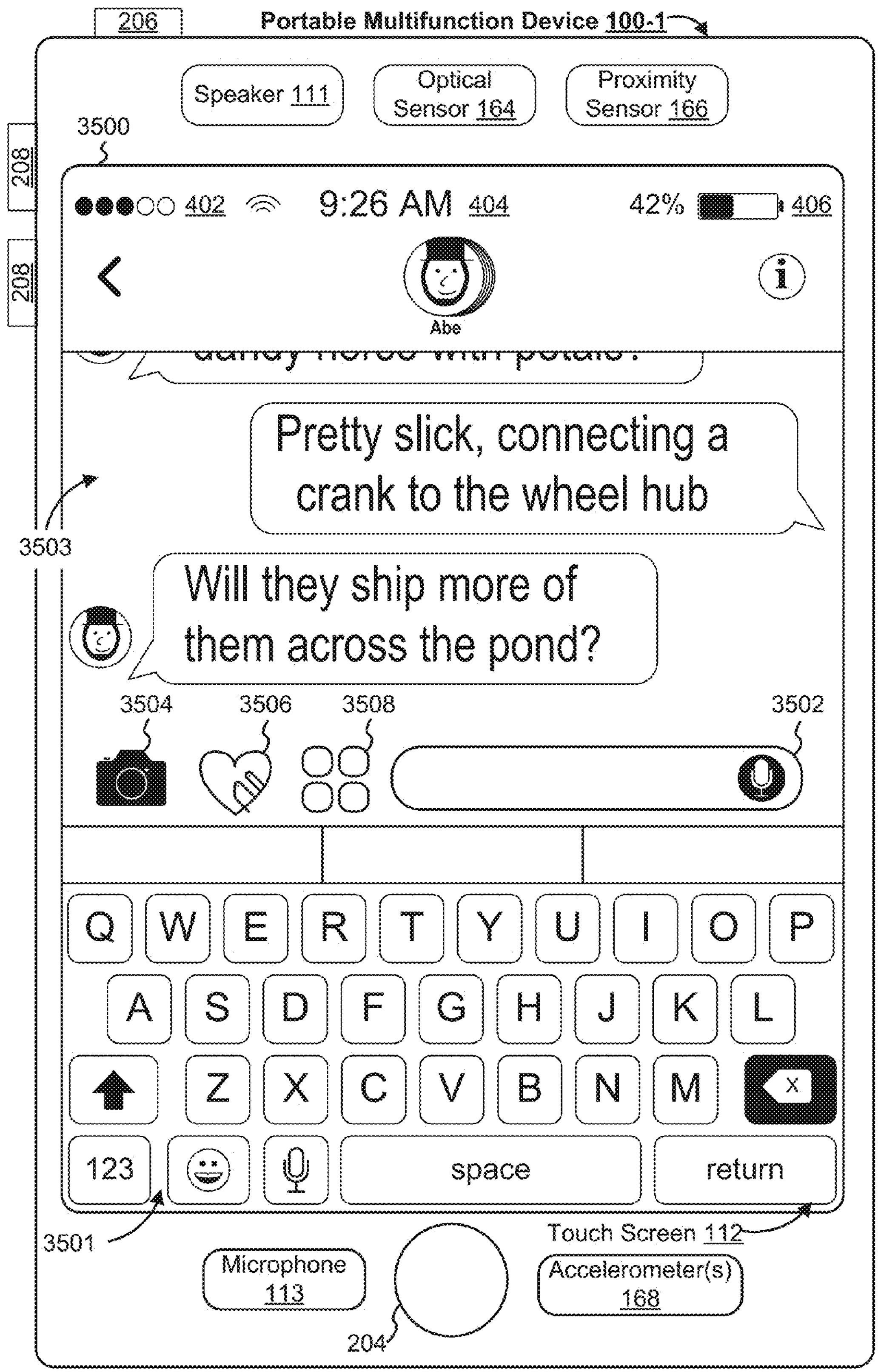

FIGS. 36W-36AL illustrate two exemplary embodiments in which multimedia content is searched and posted to a messaging session from a search user interface run within the messaging application. FIG. 36W illustrates an exemplary user interface 3500 for a messaging application which includes conversation transcript 3503, message-input area 3502, three activatable affordances—digital image affordance 3504, digital canvas affordance 3506, and application affordance 3508, and digital keyboard 3501.

Figure 36X:
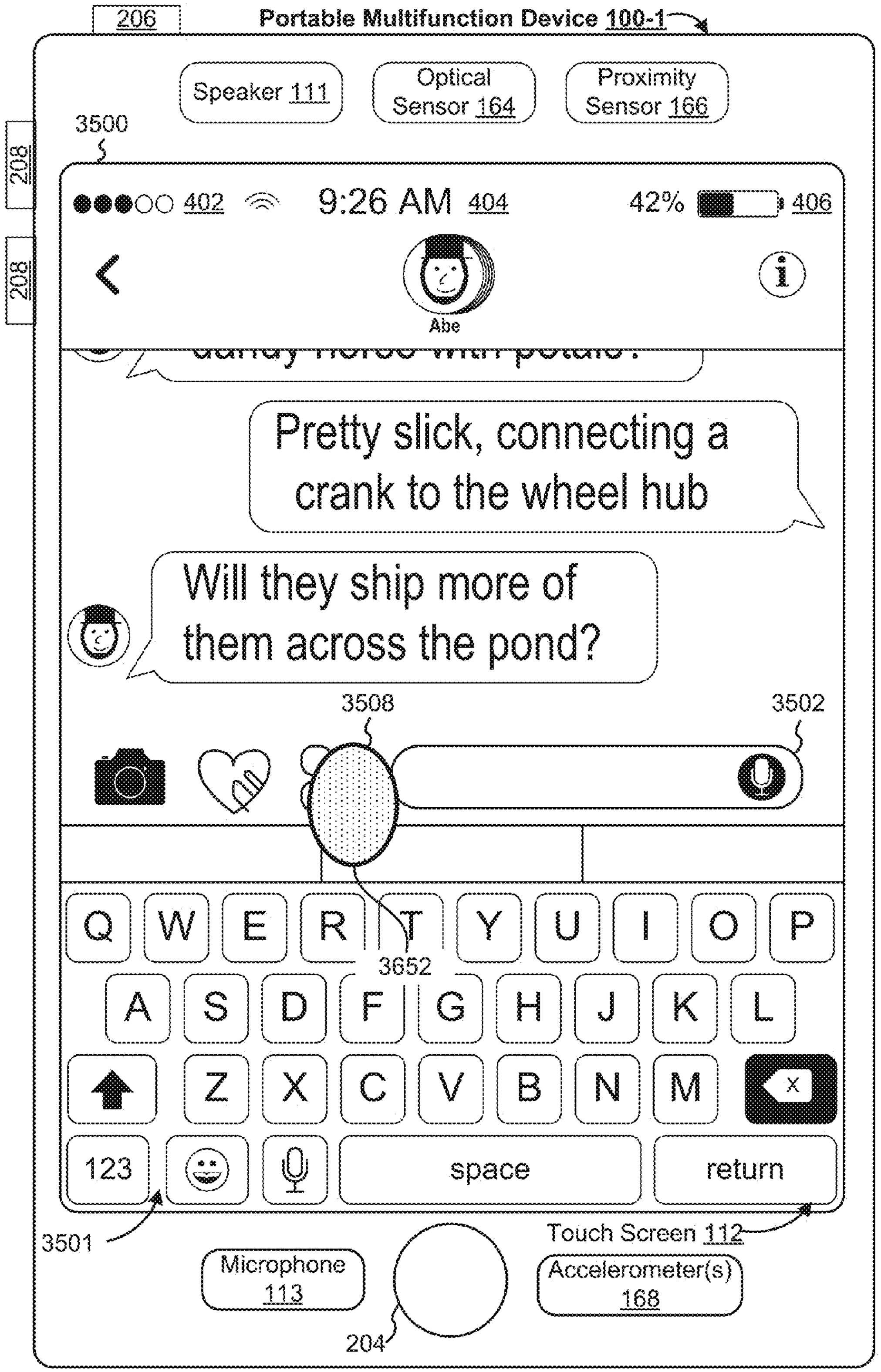

Device 100-1 detects a tap gesture, including contact 3652, on application affordance 3508 in FIG. 36X. In response, digital keyboard 3501 is replaced with application selection tray 3654, including launch icons 3601, 3603, 3605, 3607, 3609, 3611, 3613, and 3615 for applications operable within the messaging application, in FIG. 36Y. Responsive to activation of launch icon 3607 for a search application by a tap gesture including contact 3656, in FIG. 36Z, the device replaces display of messaging user interface 3500 with default search user interface 3658, in FIGS. 36AA and 36AD.

In a first embodiment, default search user interface 3658 displays suggested content associated with device 100-1—location 3662, news article 3664 from an open web page, digital recording 3666, recently shared news article 3668, recently shared movie trailer 3670 from the internet, and recently shared digital image 3672—in FIG. 36AA. Responsive to selection of movie trailer 3670 by a tap gesture including contact 3674, in FIG. 36AB, the device switches back to messaging user interface 3500 and posts movie trailer 3670 to the messaging session, displaying the trailer in conversation transcript 3503, in FIG. 36AC.

In a second embodiment, content from the internet, accessed via a search within the messaging search user interface, is posted to the messaging session without leaving the messaging application. Device 100-1 detects a tap gesture including contact 3676 on search-input area 3660 of default search user interface 3658, in FIG. 36AD. In response, the device displays trending search user interface 3659, including suggested content trending on the internet—digital recordings 3678 and 3680, and news articles 3668 and 3669—and digital keyboard 3501, in FIG. 36AE. Responsive to receiving input of search term "Meteorites," the device displays search result user interface 3661, including multimedia content from the internet relating to meteorites—news articles 3664, 3678, and 3680, and movie trailers 3670, 3682, and 3684—and category filter affordances 3617, 3619, 3621, 3623, and 3625 for filtering the search results for specific categories of search results, in FIG. 36AF.

Additional search results are displayed in response to device 100-1 detecting a swipe gesture including movement 3688 of contact 3686 to the left, from position 3686-*a* in FIG. 36AG to position 3686-*b* in FIG. 36AH. In response, the device moves movie trailer search results 3670, 3682, and 3684 to the left, in accordance with movement 3688, creating the appearance that movie trailer 3670 slides off of the left side of touch screen 112 and additional movie trailer 3688 slides onto the display from the right side of touch screen 112, in FIG. 36AH.

Responsive to selection of movie trailer 3690, by detection of a tap gesture including contact 3690 in FIG. 36AI, device 100-1 switches back to messaging user interface 3500 and places movie trailer 3684 in area 3692 of expanded message-input area 3502, which includes cancel icon 3694 for canceling selection of movie trailer 3684, in FIG. 36AJ. Movie trailer 3684 is then posted to the messaging session in response to detecting a tap gesture, including contact 3696, on message-content posting affordance 3520 in FIG. 36AK. Movie trailer 3684 is then displayed in conversation transcript 3503, in FIG. 36AL.

FIGS. 37A-37DJ illustrate exemplary user interfaces for integrating interactive applications in a messaging application in accordance with some embodiments. The user interfaces in these figures are used to illustrate the processes described below, including the processes in FIGS. 46A-46C, 48A-48D, 50A-50C, 52A-52C, 54A-54C, 56A-56B, and 58. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 37A-37DJ illustrate exemplary electronic devices 100-1, operated by "Andrew," and 100-2, operated by "Abe." The user interfaces on devices 100-1 and 100-2 include time stamp 404, allowing inputs made at a particular time on one device to be matched with the effects of those inputs on the other device. For example, placement of 'O' 3792 in tic-tac-toe user interface 3782 at 9:34 AM on device 100-1, in FIGS. 37AX-37AY, corresponds to the display of tic-tac-toe notification 3703 and tic-tac-toe application object 3705 in conversation transcript 3700 on device 100-2 at 9:34 AM in FIG. 37BF.

Figure 37A:
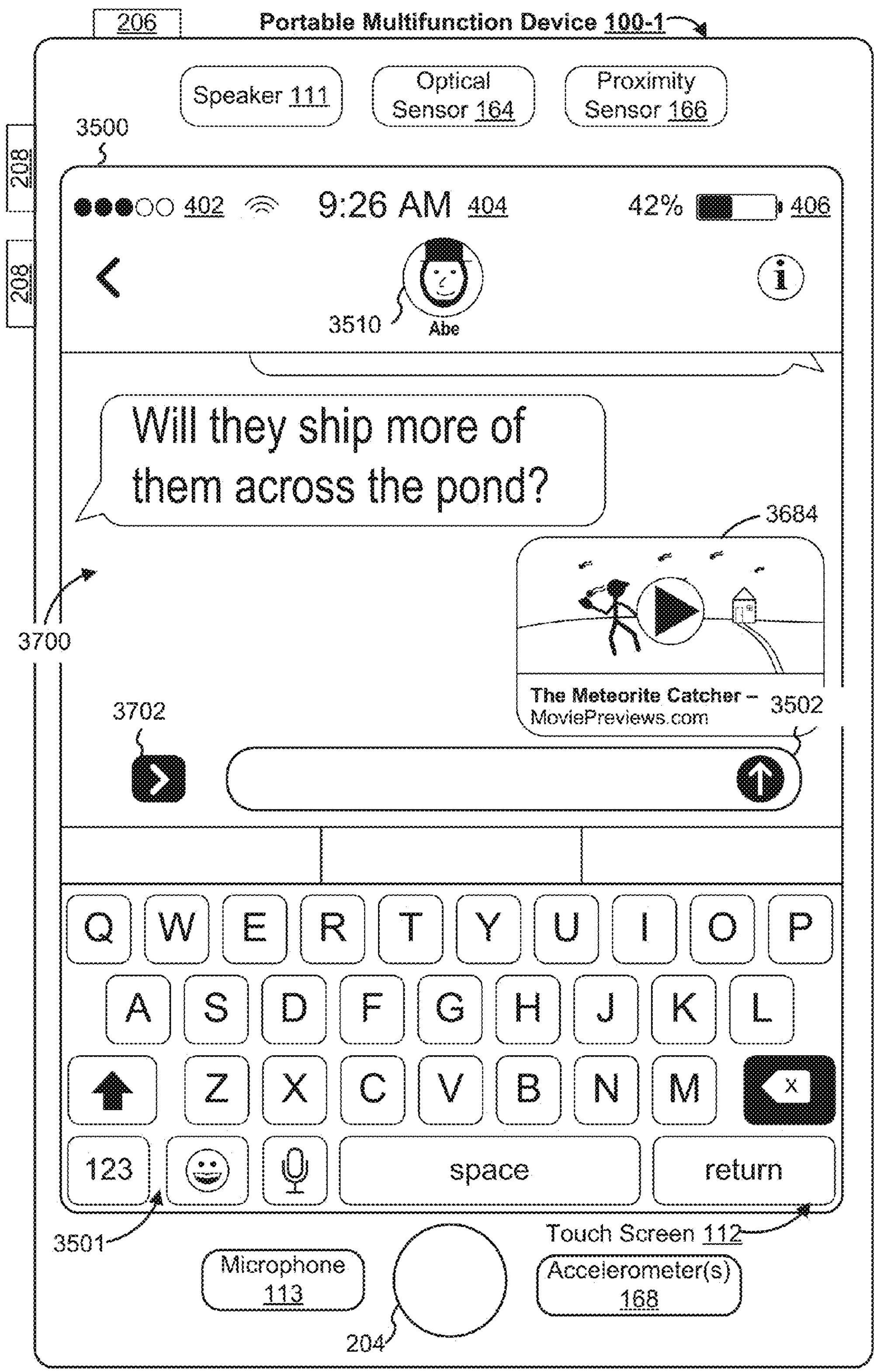
FIGS. 37A-37DJ illustrate exemplary user interfaces for integrating interactive applications in a messaging application in accordance with some embodiments.

FIGS. 37A-37AM illustrate an exemplary embodiment of an interactive reservation application operated within a messaging application. Operation of the interactive application includes display of a full-screen application user interface that replaces display of the messenger user interface, and which is accessible to users included in the messaging session through an application object displayed in the conversation transcript.

Figure 37B:
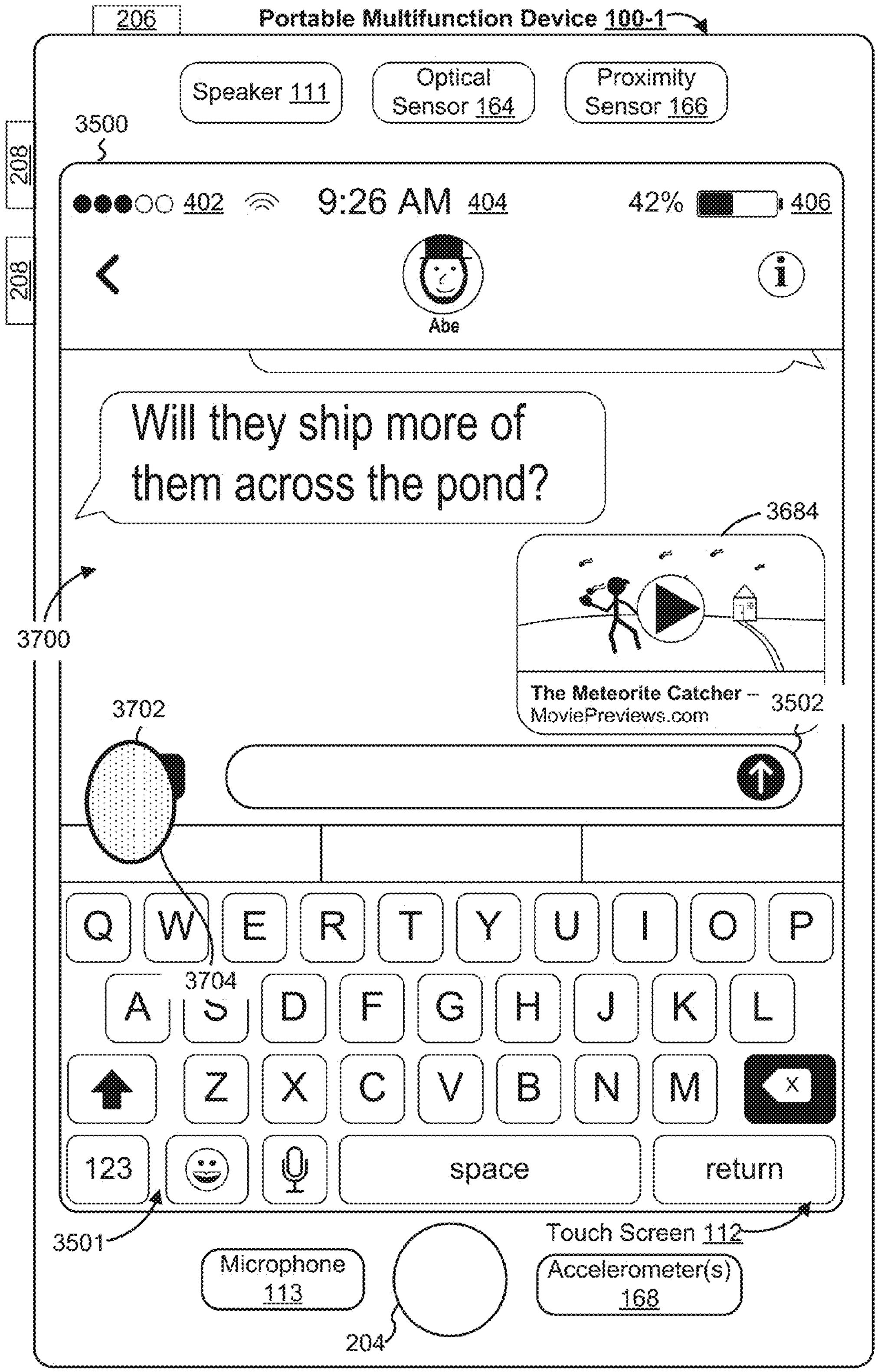
Figure 37C:
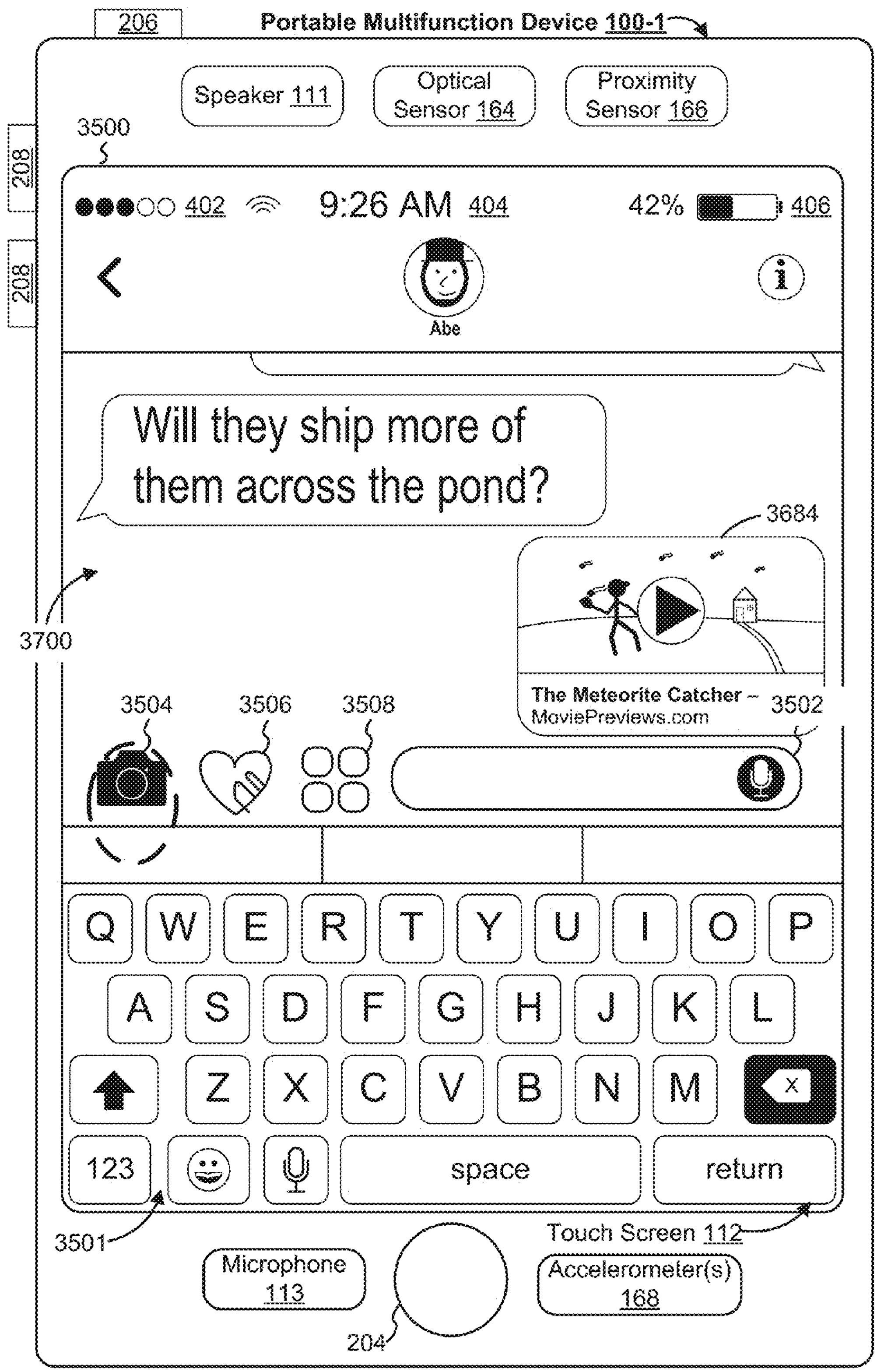
Figure 37D:
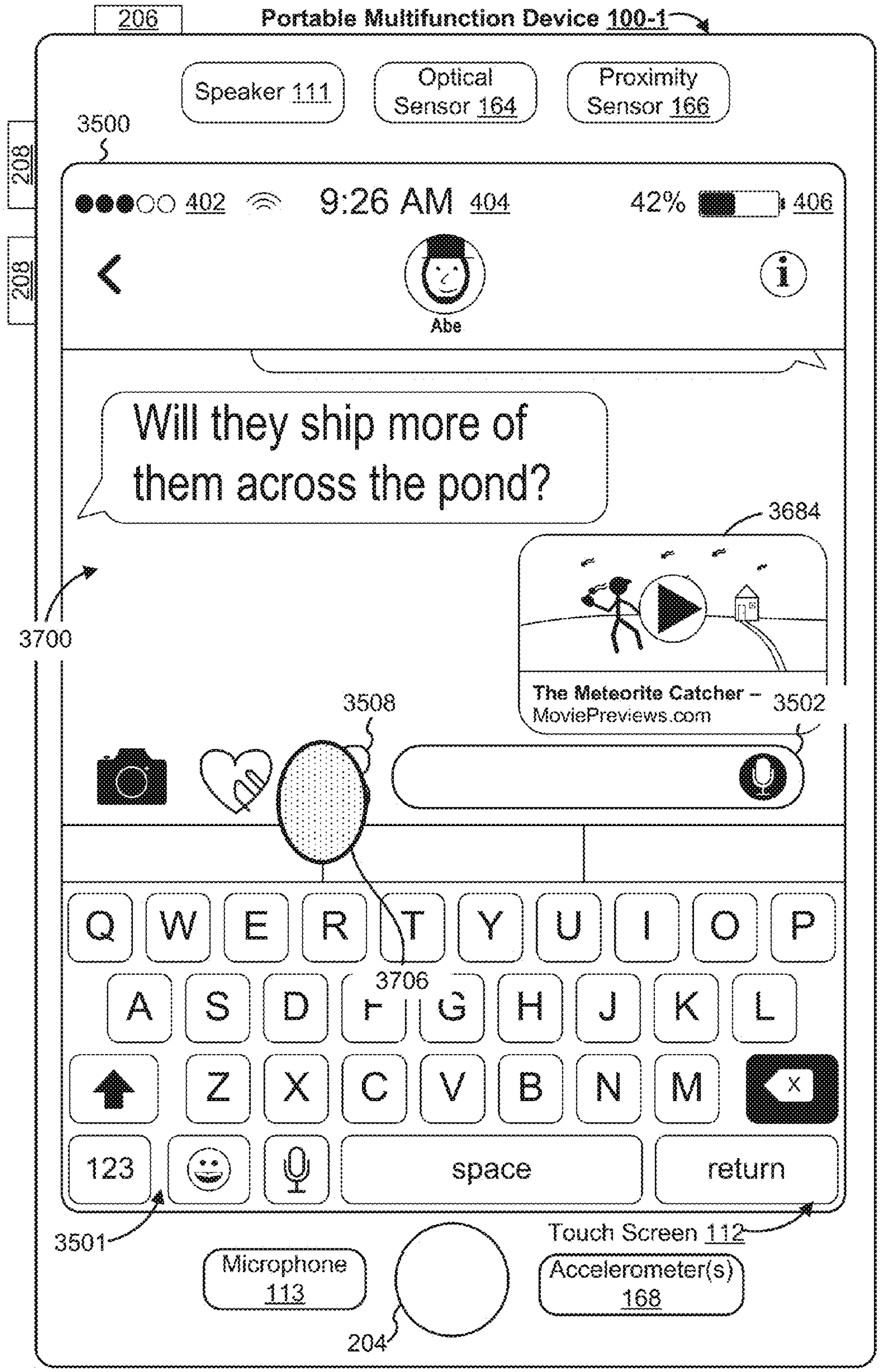
Figure 37E:
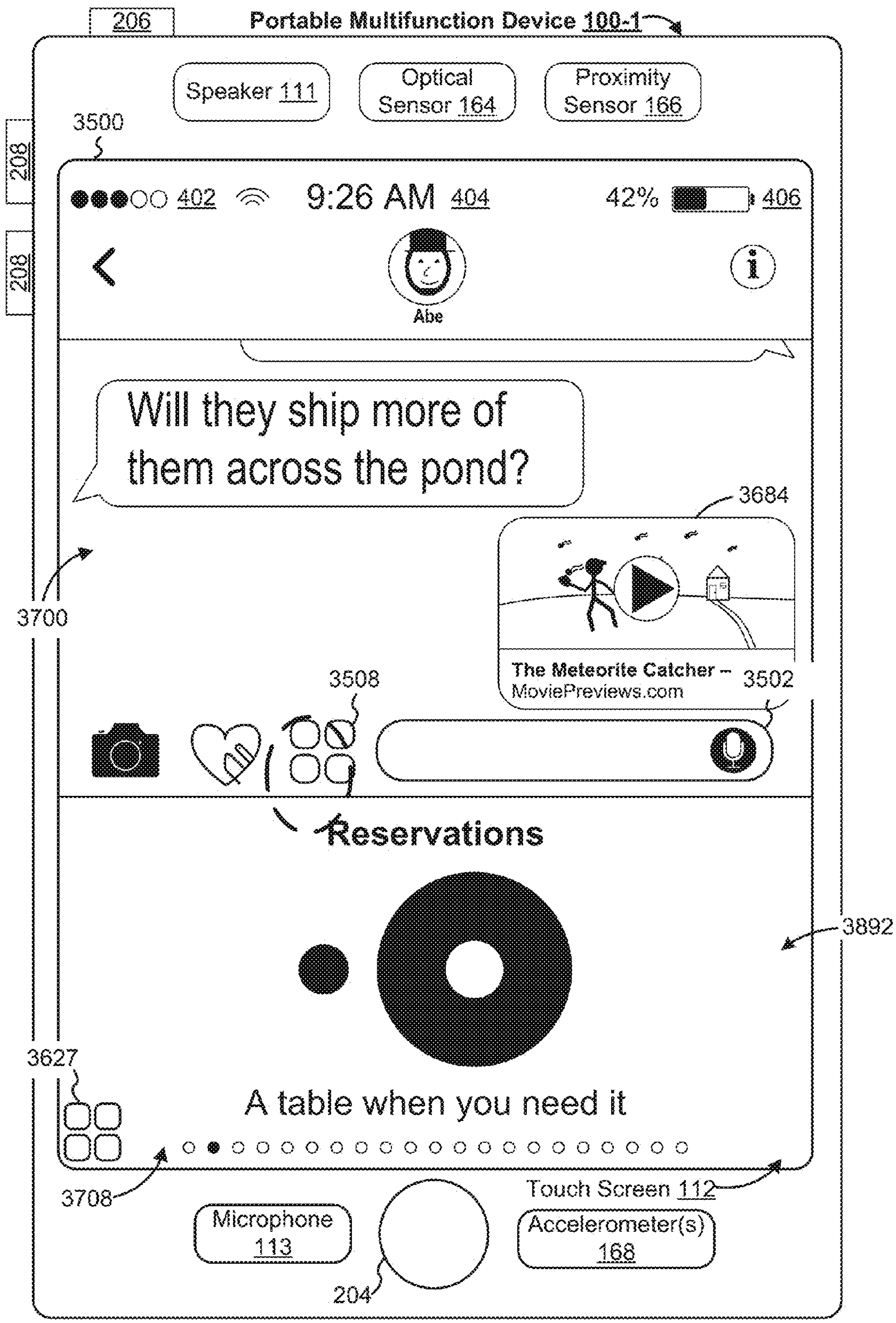
Figure 37F:
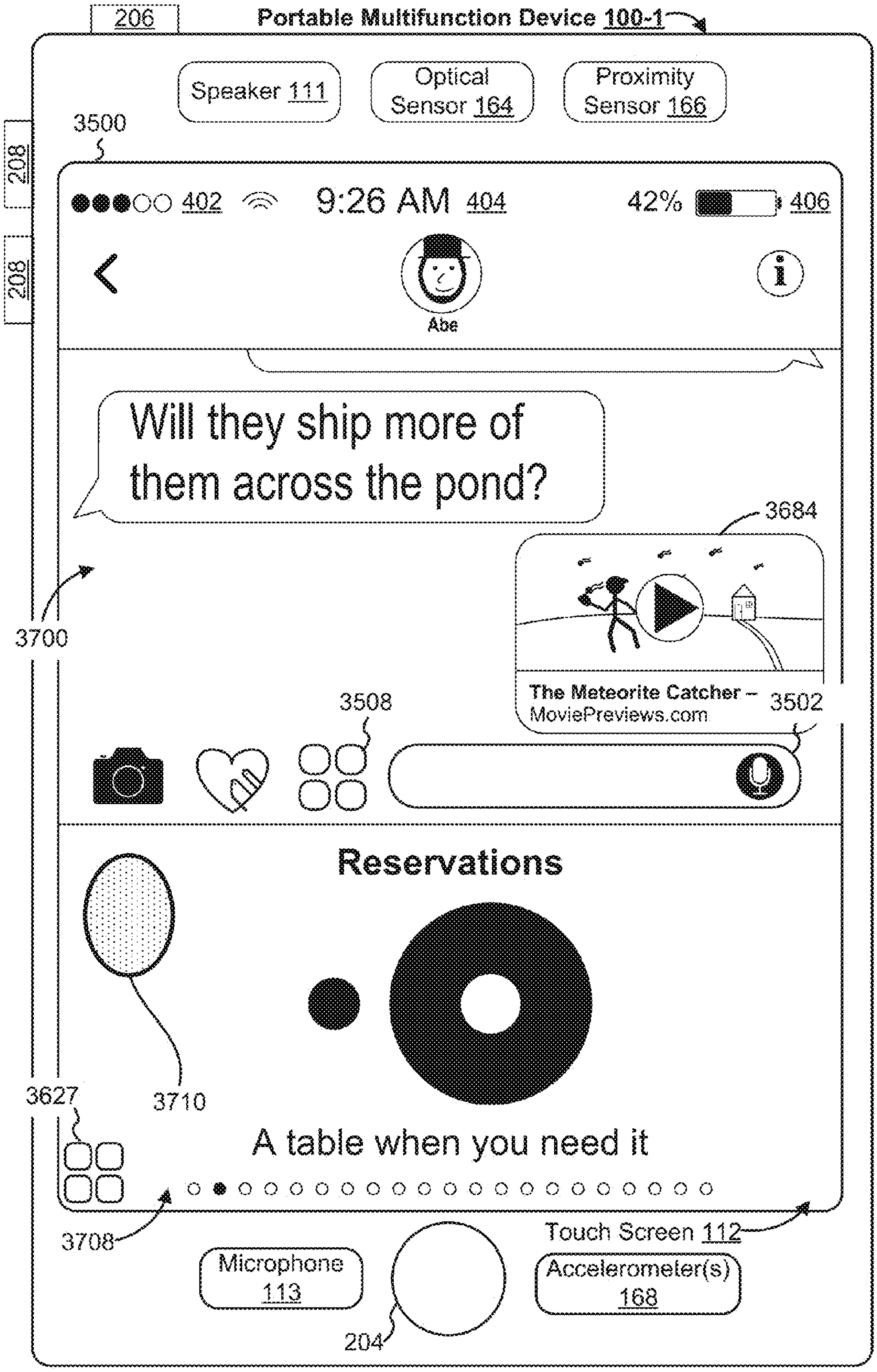
Figure 37G:
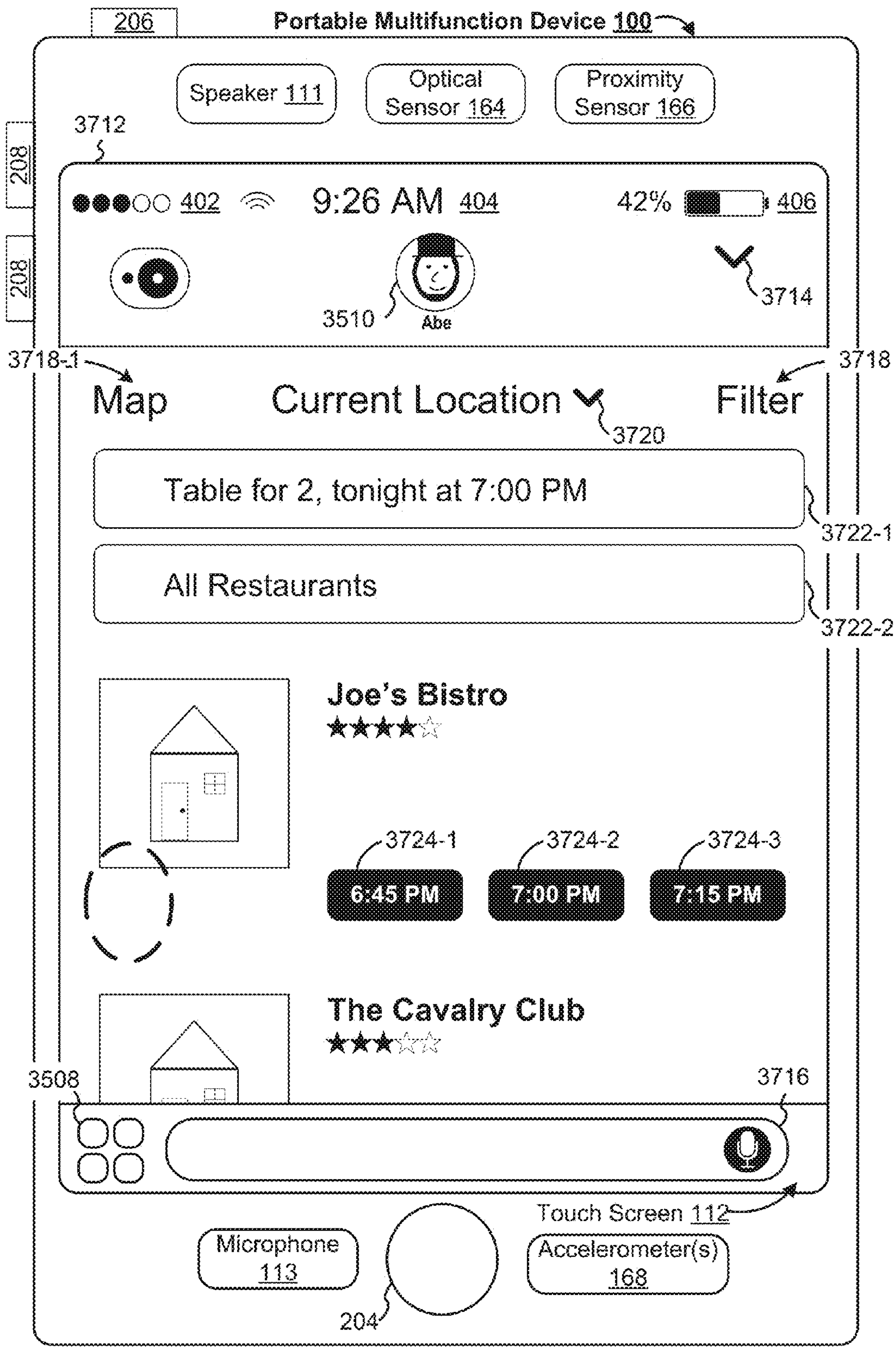
Figure 37H:
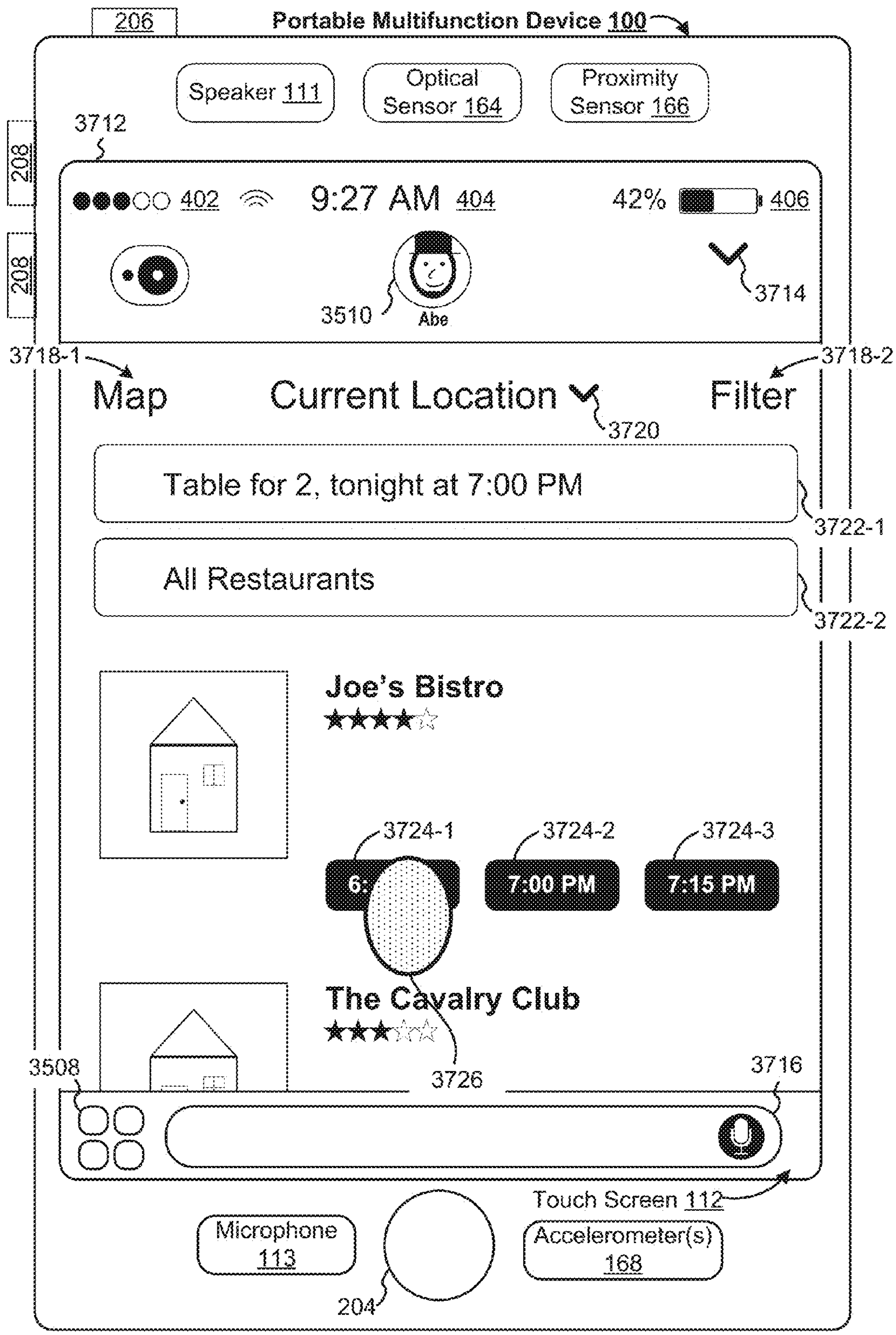
Figure 37I:
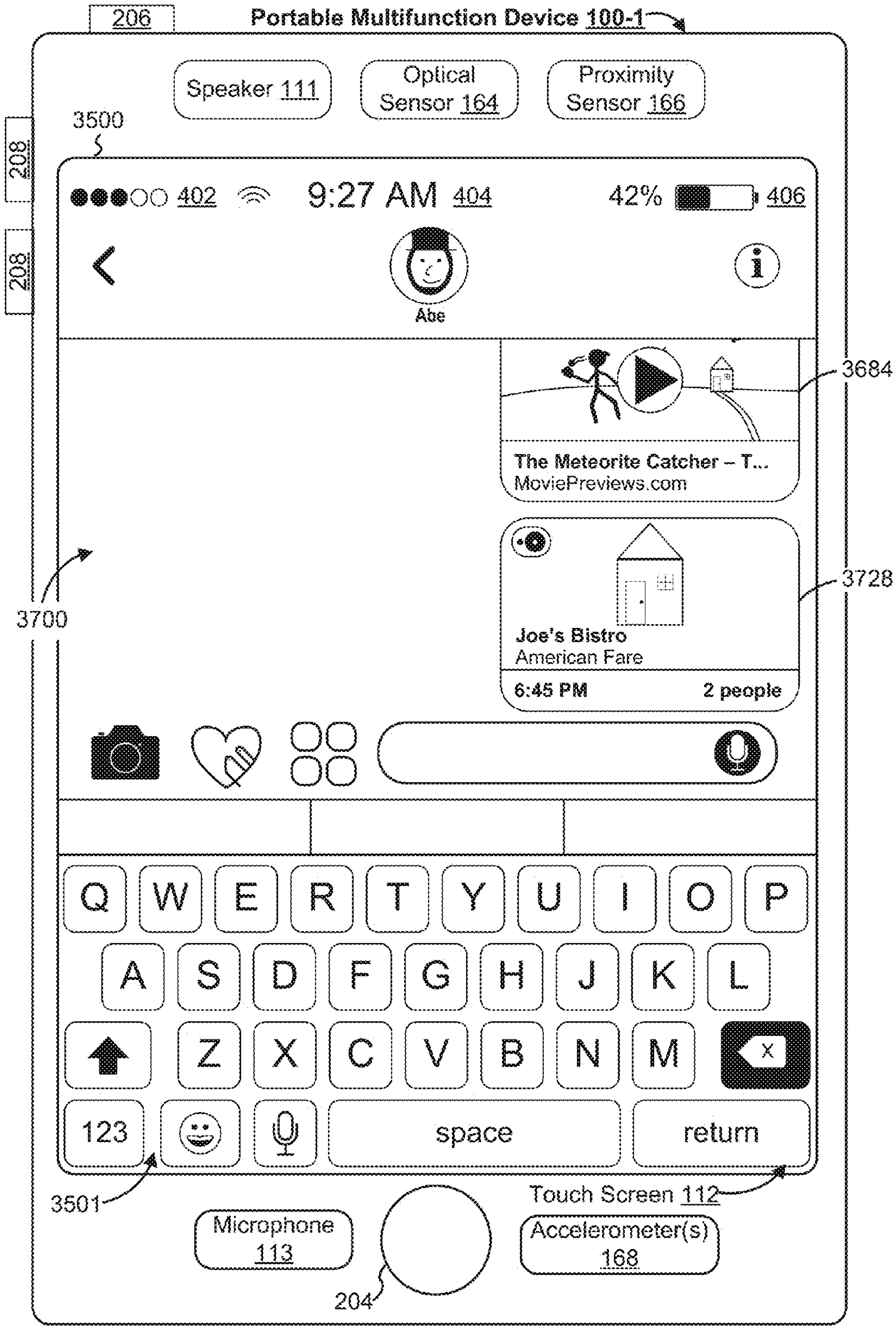
Figure 37J:
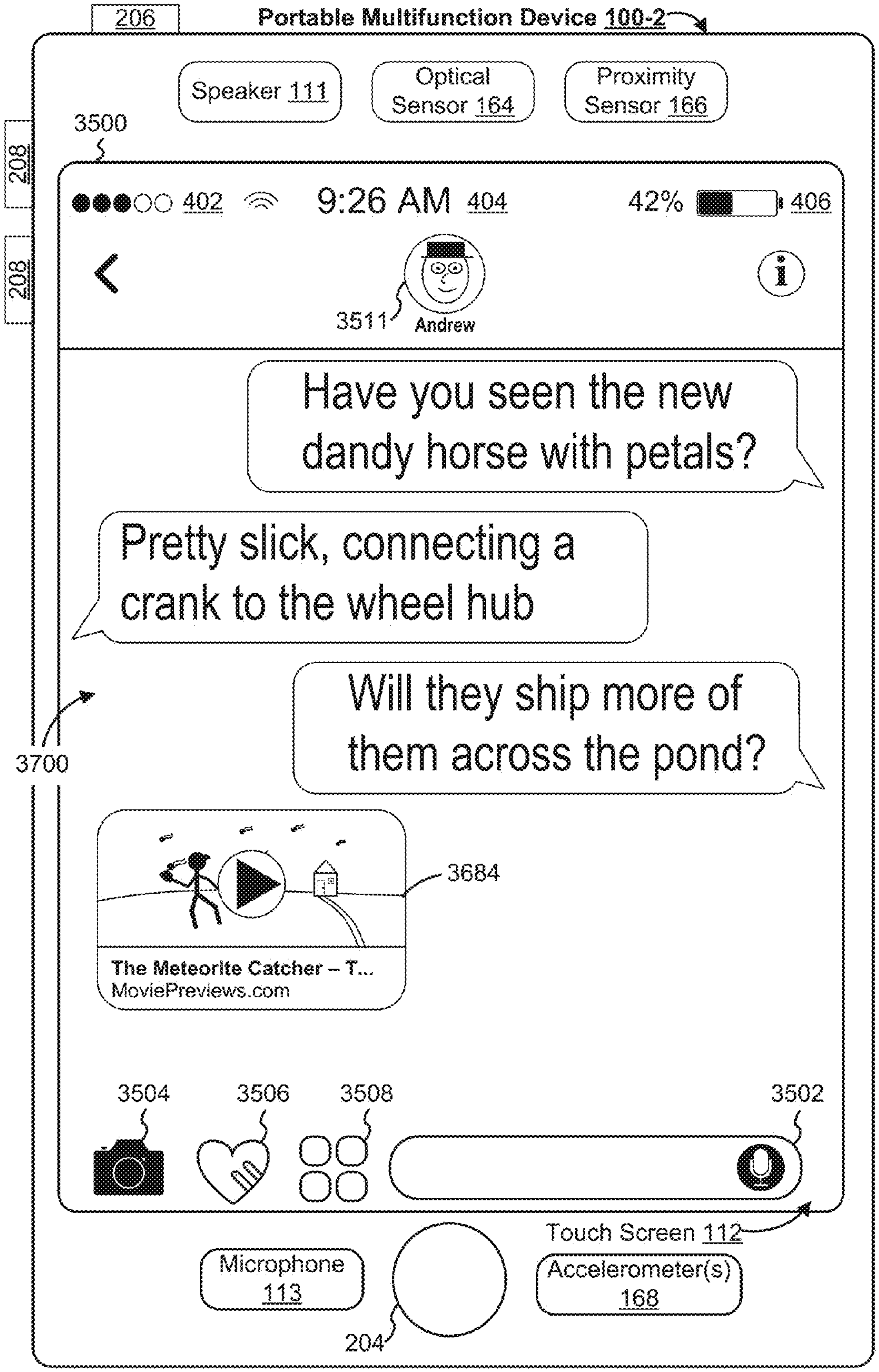

FIGS. 37A and 37J illustrate exemplary user interface 3500 for a messaging application on devices 100-1 and 100-2, respectively. User interface 3500 includes conversation transcript 3700, message-input area 3502, either of application expansion affordance 3702 or three activatable affordances—digital image affordance 3504, digital canvas affordance 3506, and application affordance 3508—optionally, one of digital keyboard 3501 for inputting messages into message-input area 3502, application selection tray 3654, and application swipe tray 3892. Conversation transcript 3700 includes messages from participants of a corresponding messaging session, including the user of the particular portable multifunction device and other users included in the messaging session. Each of the other users included in the messaging transcript are represented by an avatar (e.g., avatar 3510 for "Abe" and avatar 3511 for "Andrew").

FIGS. 37A-37G illustrate activation of an interactive application for making a reservation. Application expansion affordance 3702 is expanded to display three activatable affordances—digital image affordance 3504, digital canvas affordance 3506, and application affordance 3508—in FIG. 37C, in response to device 100-1 detecting a tap gesture including contact 3702 on application expansion affordance 3702 in FIG. 37B. The device then displays application swipe tray 3892 in FIG. 37E, responsive to detecting a tap gesture including contact 3706 on application affordance 3508 in FIG. 37D. Application swipe tray 3892 includes launch icon 3708 for an interactive reservations application and application menu toggle affordance 3627 for switching between application swipe tray 3892 and application selection tray 3654.

Figure 38A:
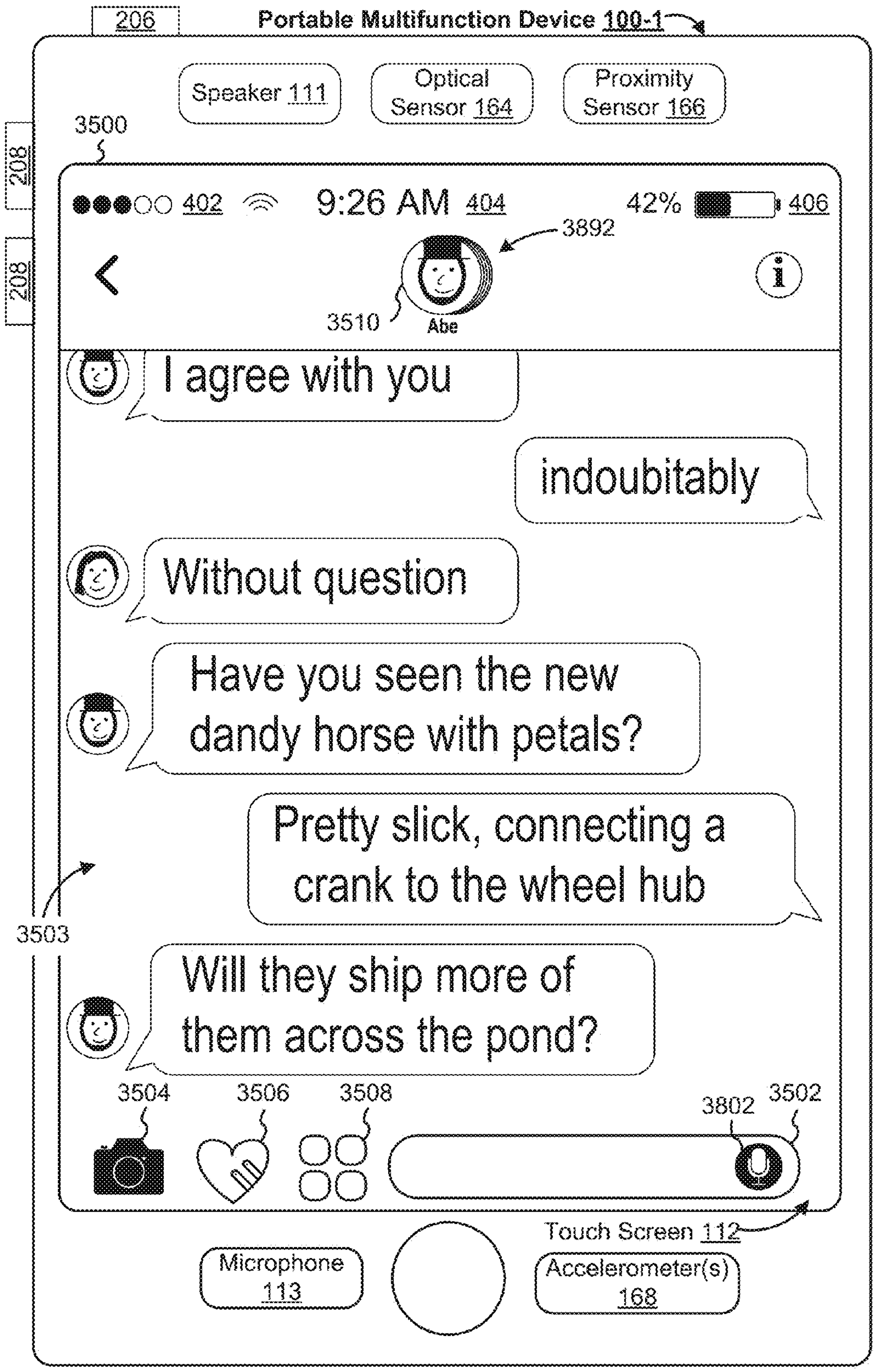
FIGS. 38A-38AZ illustrate exemplary user interfaces for integrating applications in a messaging application in accordance with some embodiments.
Figure 38B:
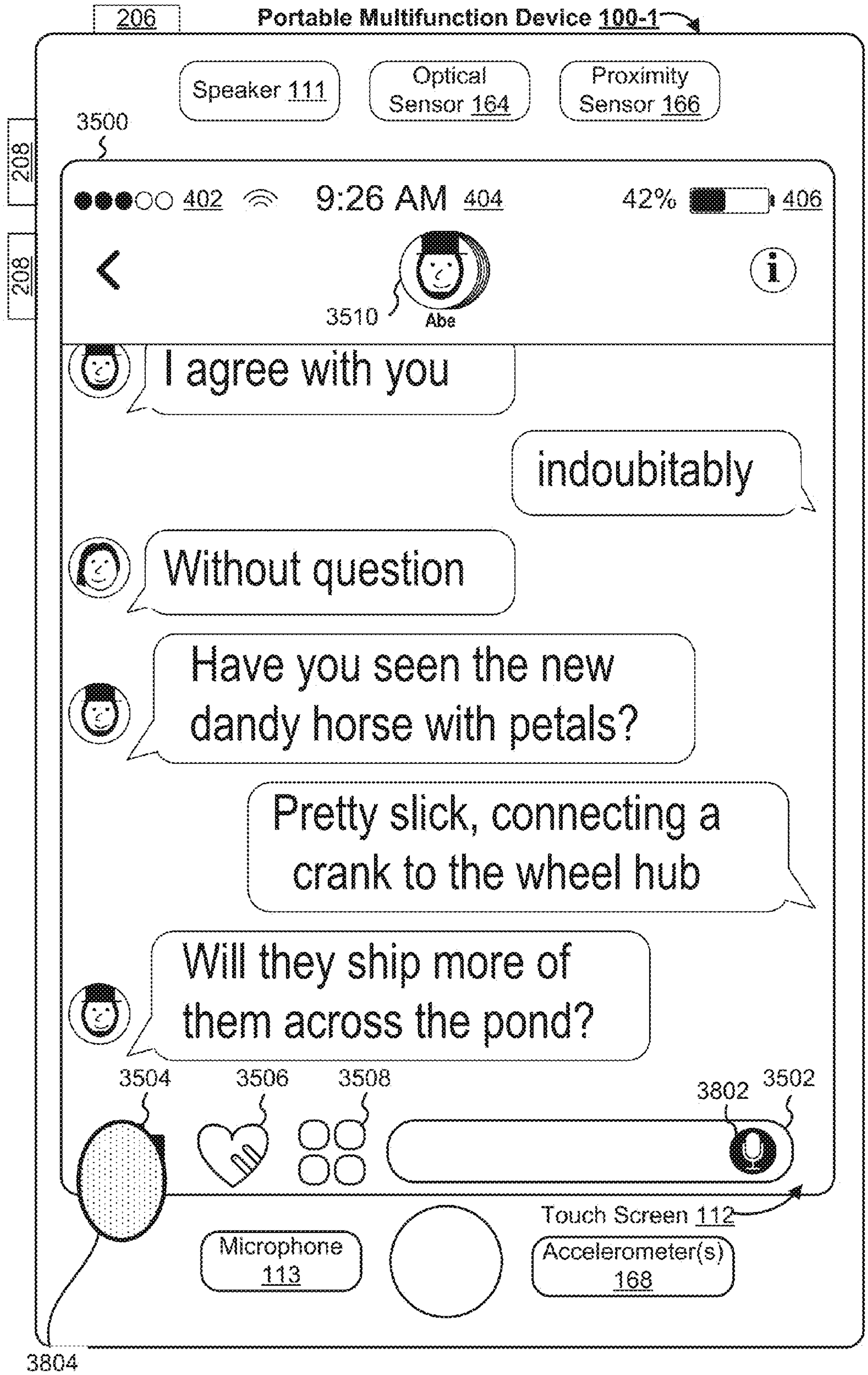
Figure 38C:
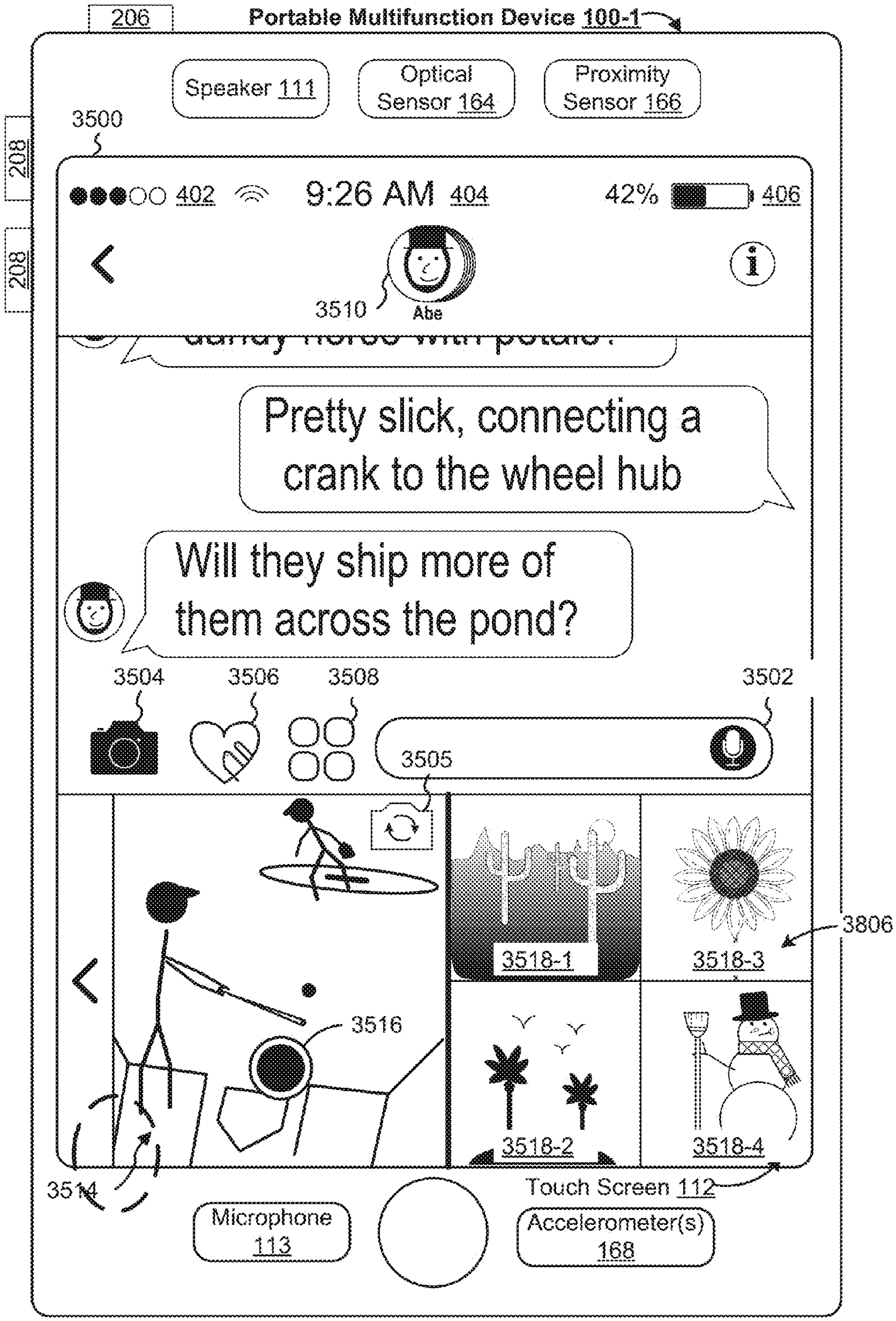
Figure 38D:
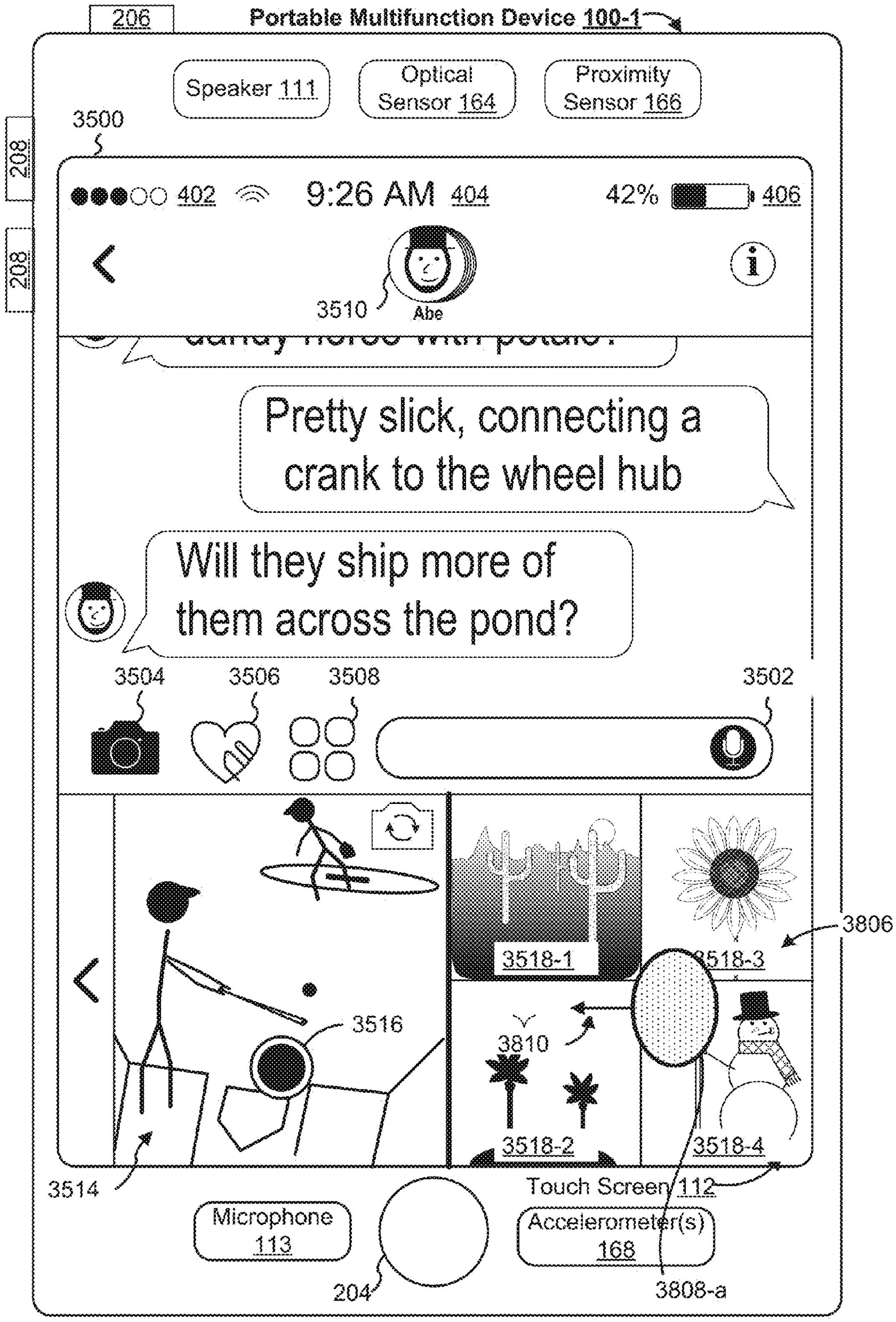
Figure 38E:
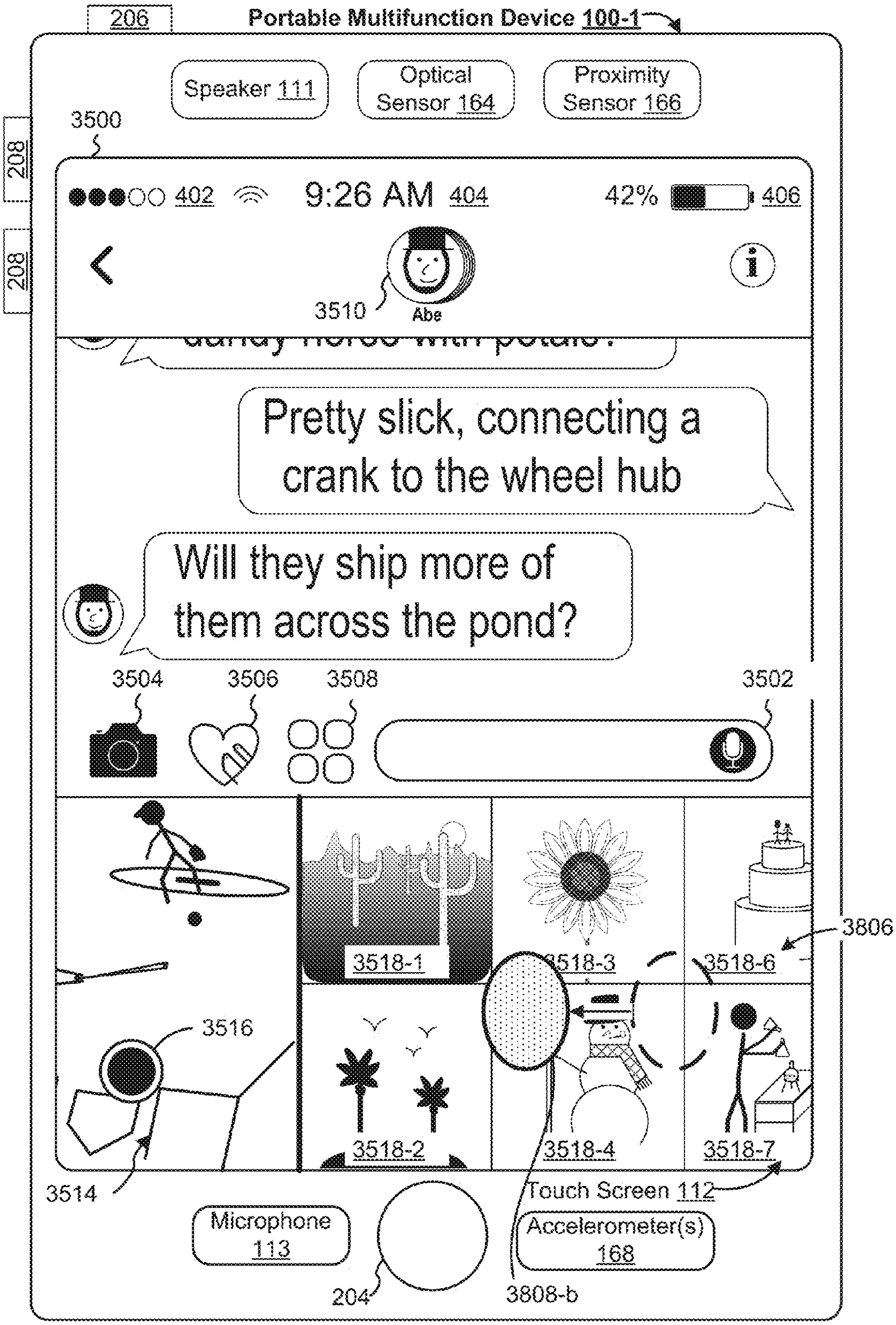
Figure 38F:
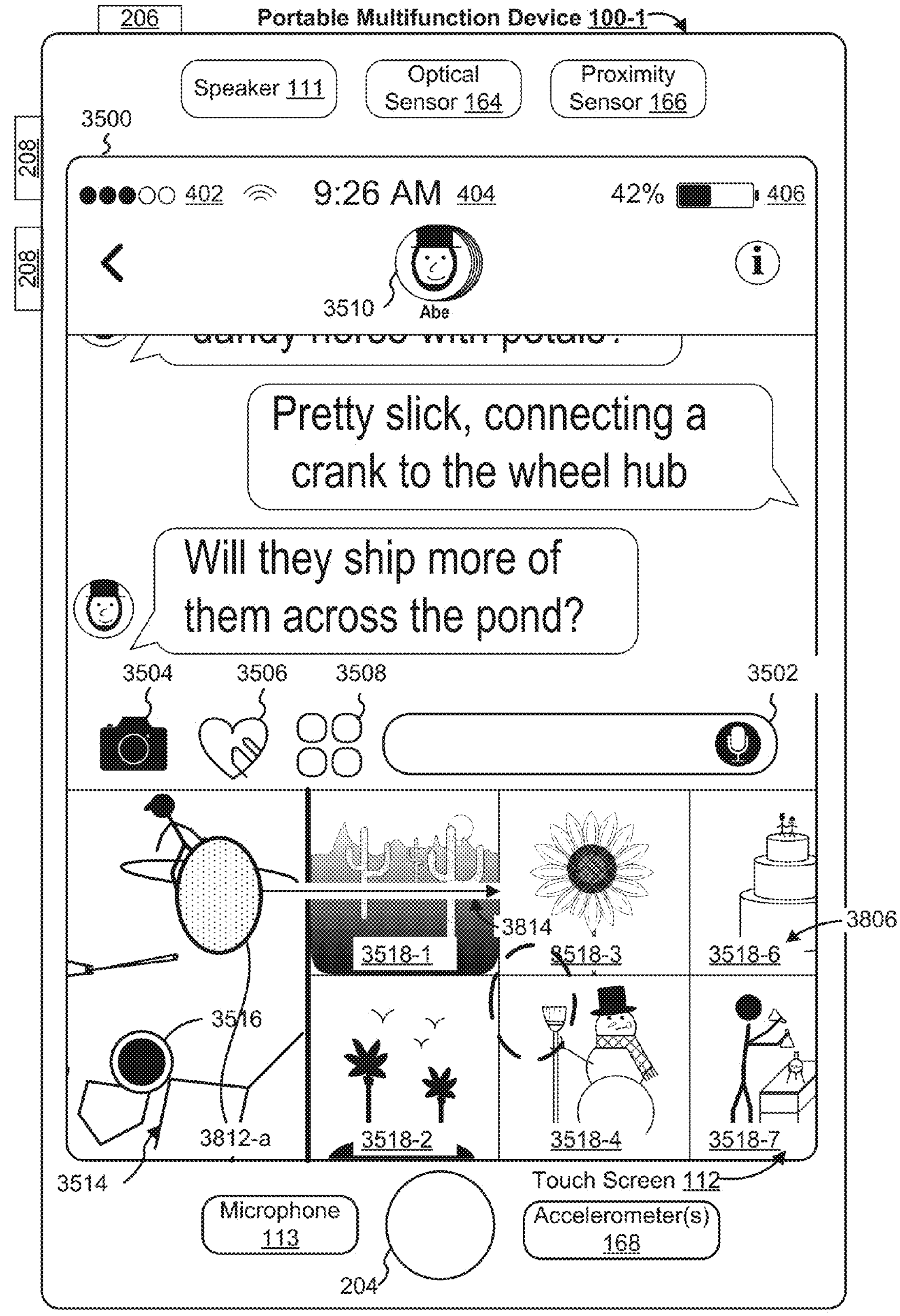
Figure 38G:
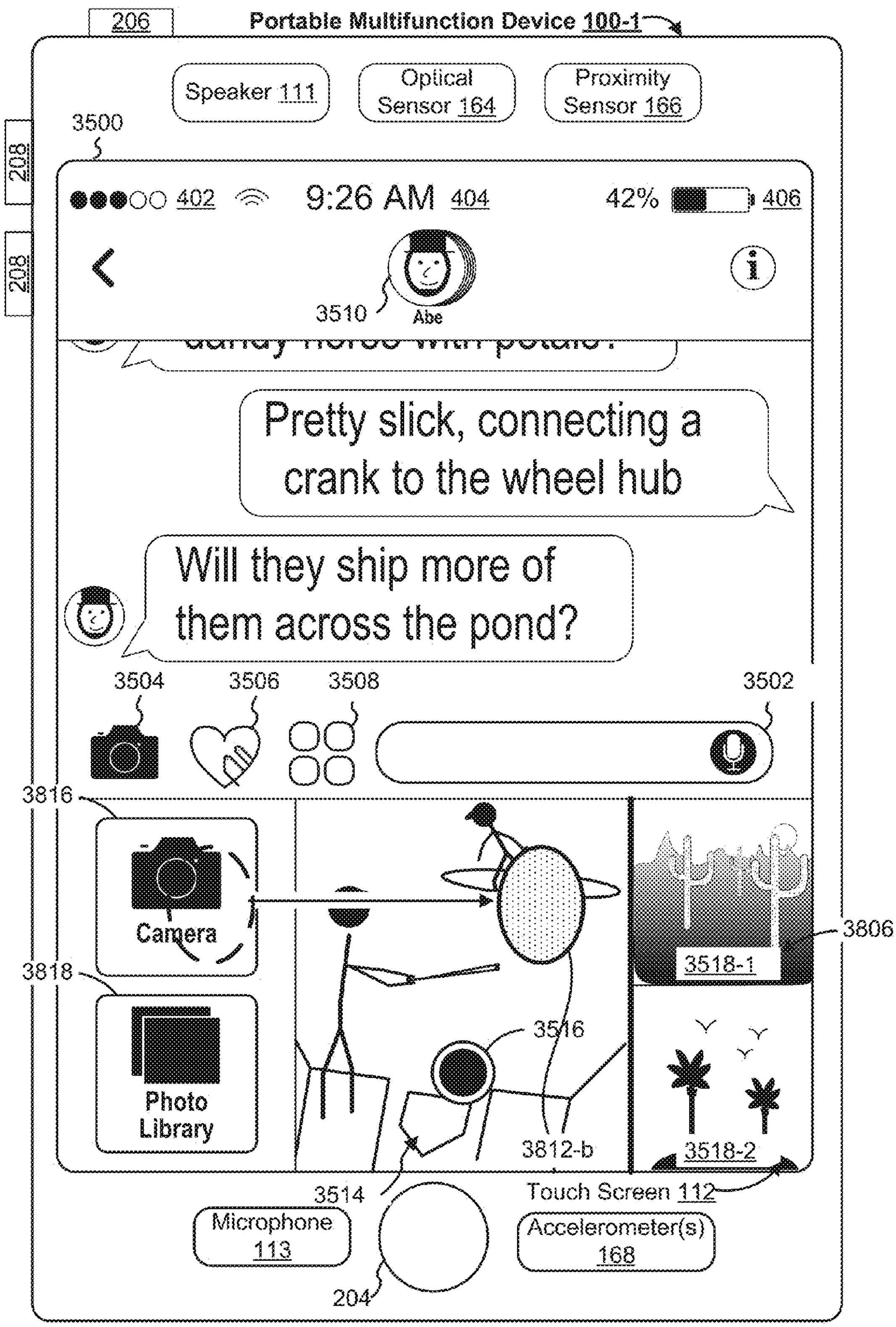
Figure 38H:
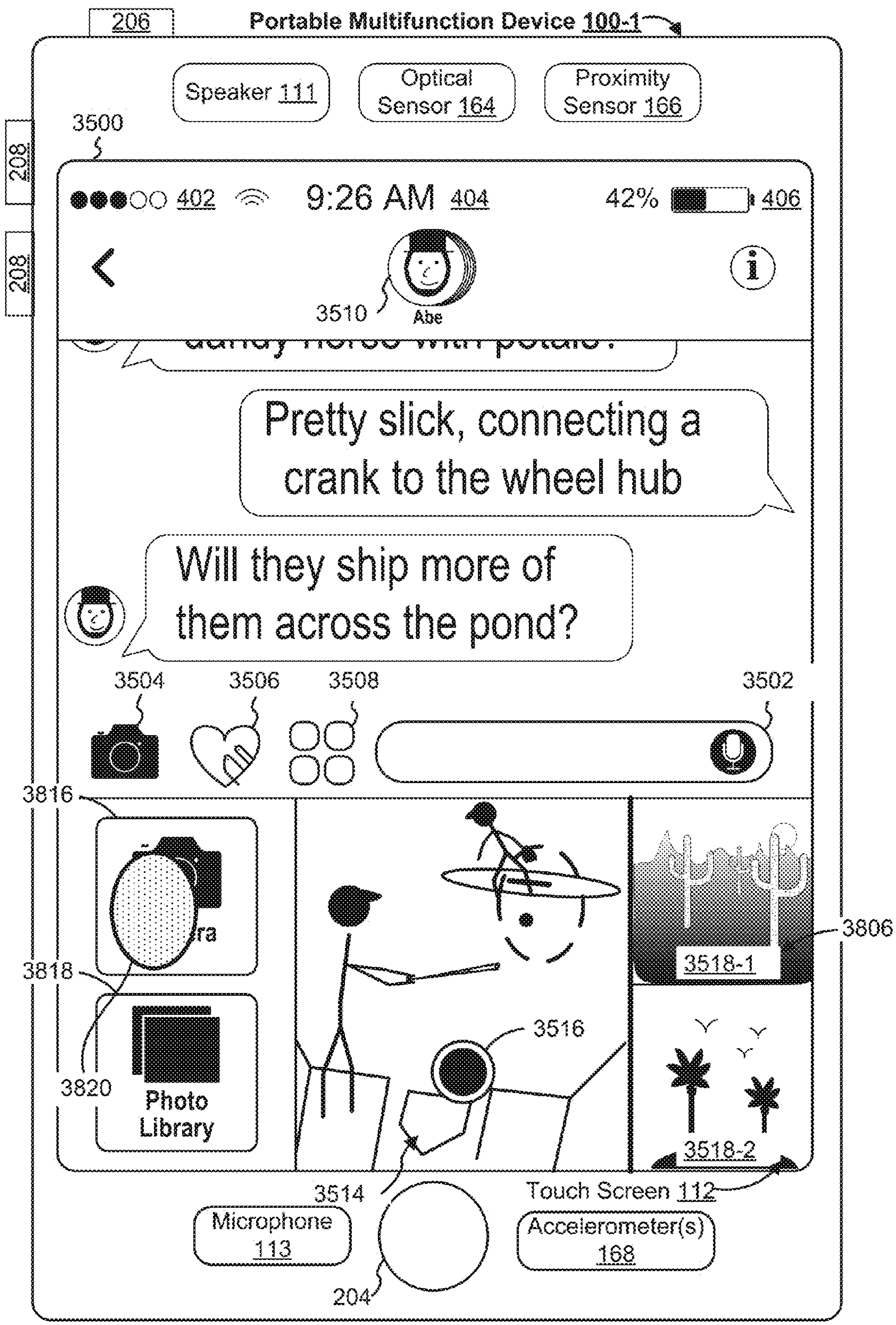

The interactive reservation application is launched within the messaging application in FIG. 38G when the device detects a tap gesture including contact 3710 on reservation launch icon 3708 in FIG. 37F. Upon launch, the device displays user interface 3712 for the reservation application, including input affordances 3720 for selecting a location around which to search, 3722-1 and 3722-2 for setting parameters of a search, 3718 for executing a search, and 3724 for selecting a reservation. The user interface also includes canceling affordance 3714 for closing the user interface without selecting reservation.

FIGS. 37H-37AC illustrate selection and modification of a reservation using the interactive reservation application. Device 100-1 detects selection of a reservation at "Joe's Bistro at 6:45 PM" by a tap gesture including contact 3726 on reservation affordance 3724-1 in FIG. 37H at 9:27 AM. In response, the device replaces display of reservation application user interface 3712 with messaging user interface 3500. Device 100-1 also displays reservation application object 3728, which displays information on the reservation (e.g., that the reservation is for 2 people at 6:45 PM at Joe's Bistro), on the right-hand side of conversation transcript 3700, indicating that the reservation was initially made by device 100-1.

Device 100-1 also transmits information to device 100-2 that a reservation was made in the reservation application. In response to receiving the information transmitted from device 100-1, device 100-2 displays a corresponding reservation application object 3728 on the left-hand side of corresponding conversation transcript 3700, indicating that another device made the initial reservation. Reservation application object includes indication 3730 that the object is associated with a reservation application. Device 100-2 displays digital keyboard 3501 in FIG. 37M, responsive to a tap gesture including contact 3732 on message-input area 3502 in FIG. 37L. The device then posts message 3736, indicating the reservation time is inconvenient for the Abe, to the messaging session, as displayed in conversation transcript 3700 in FIG. 37O, responsive to receiving input from digital keyboard 3501 and detecting a tap gesture including contact 3734 on message posting affordance 3502 in FIG. 37N.

Figure 37K:
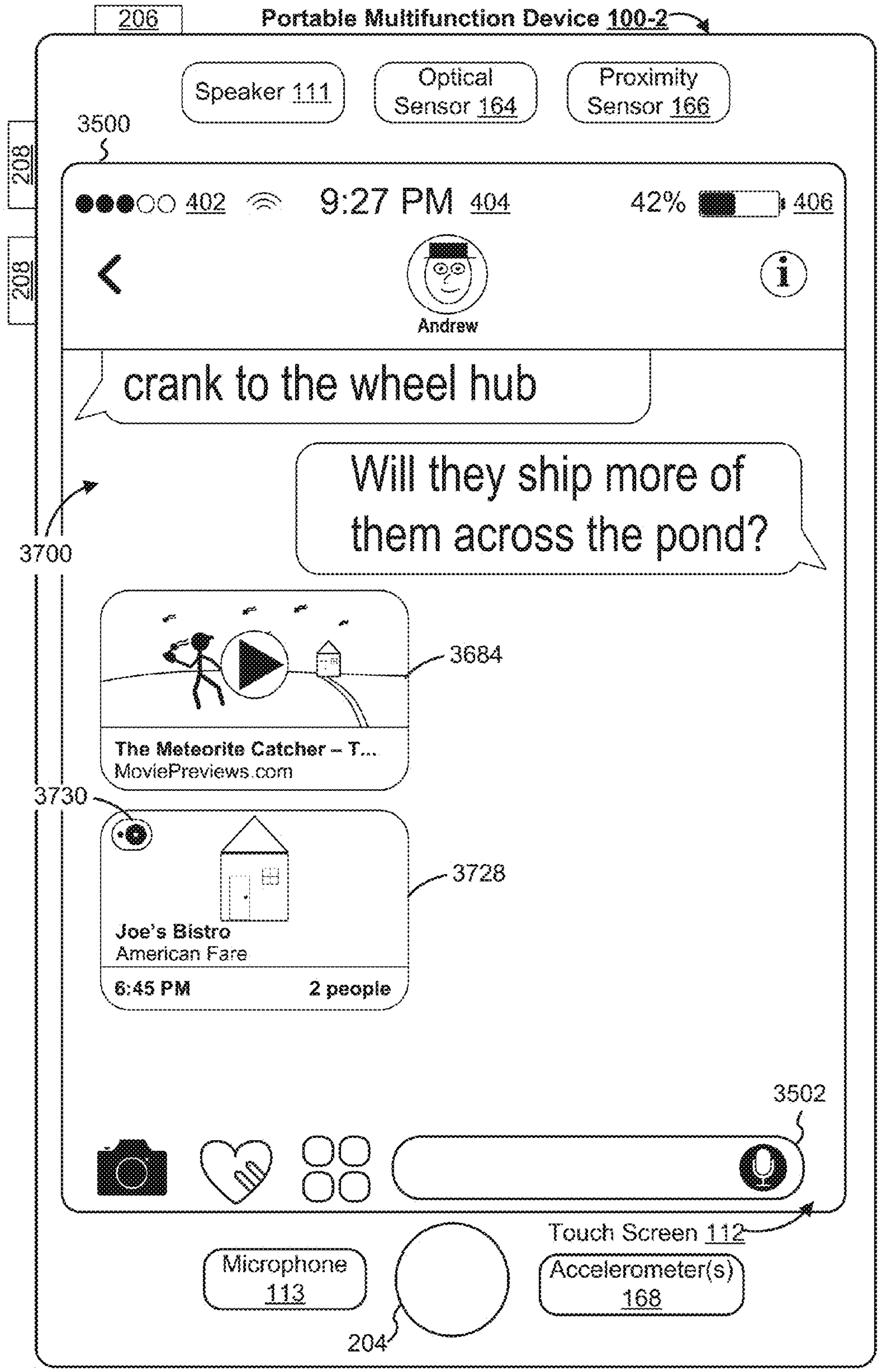
Figure 37L:
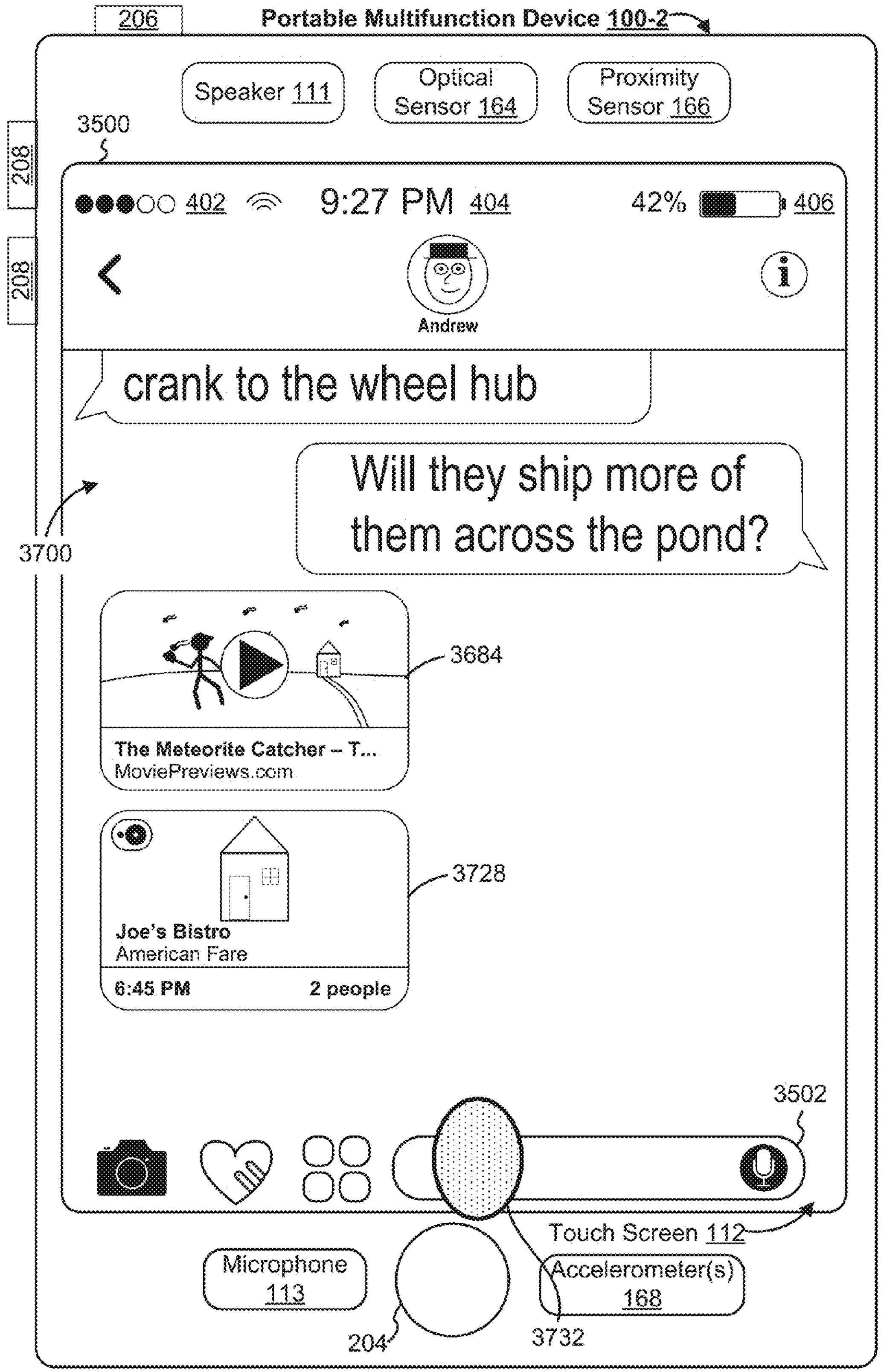
Figure 37M:
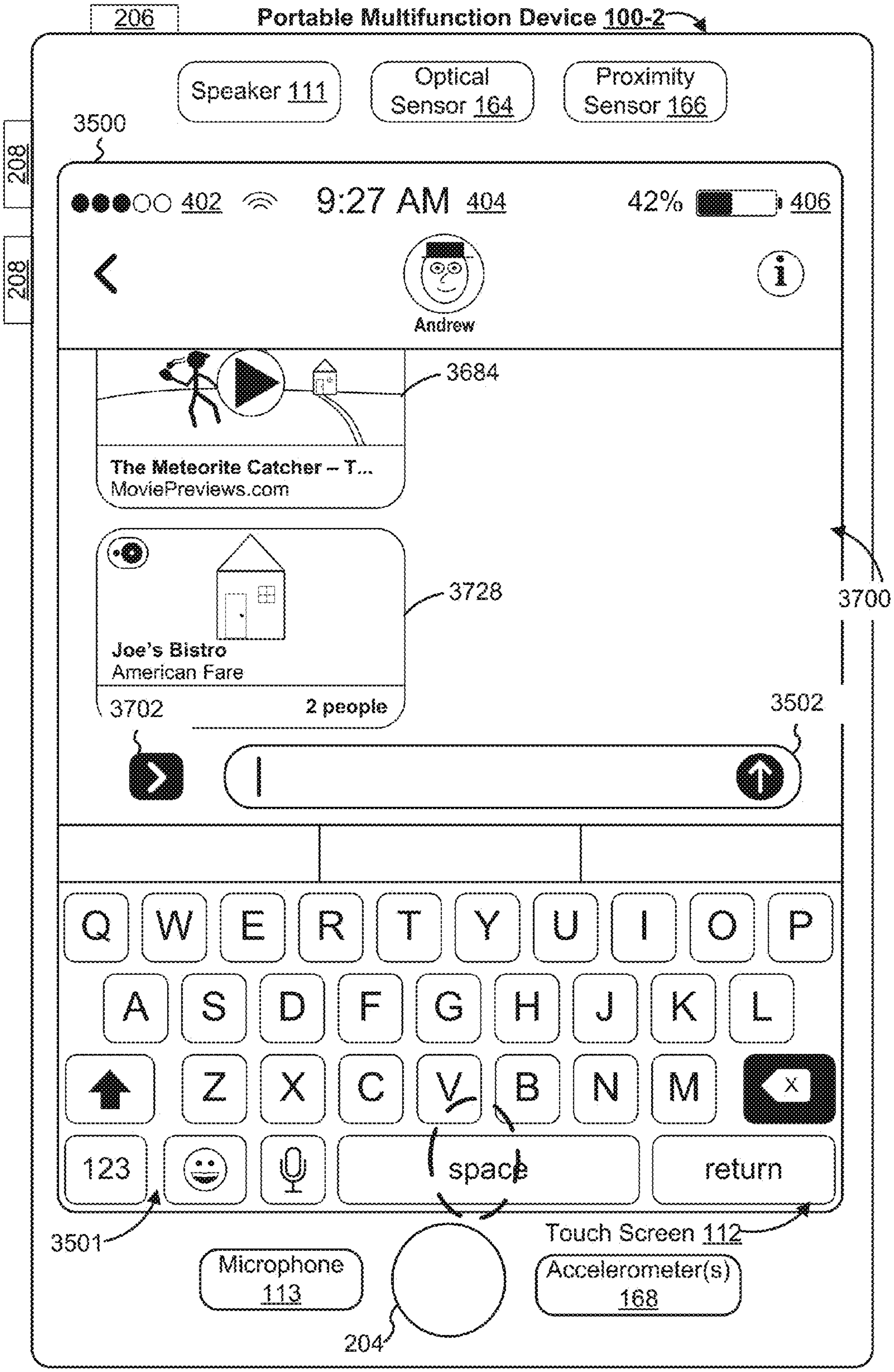
Figure 37N:
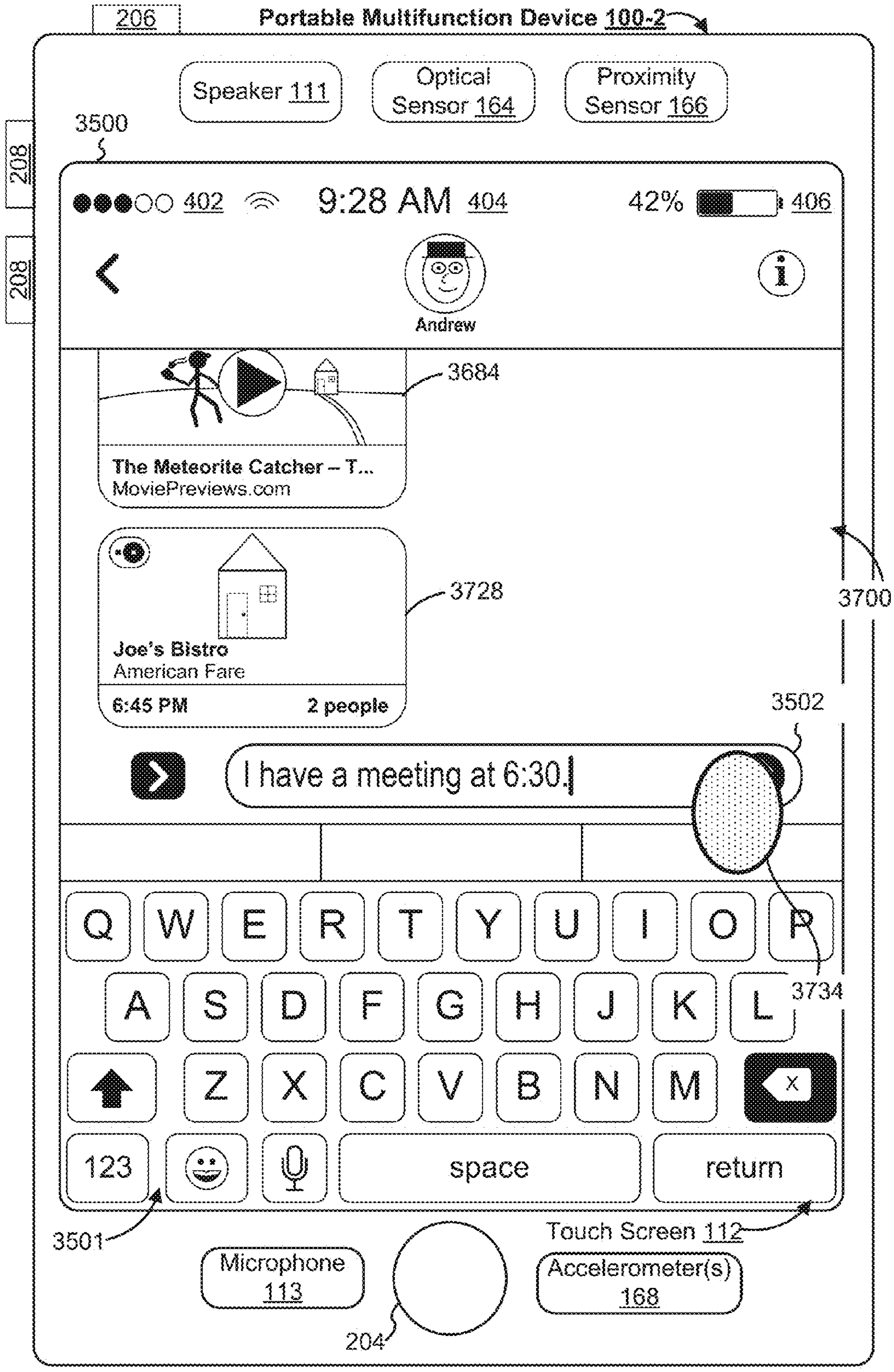
Figure 37O:
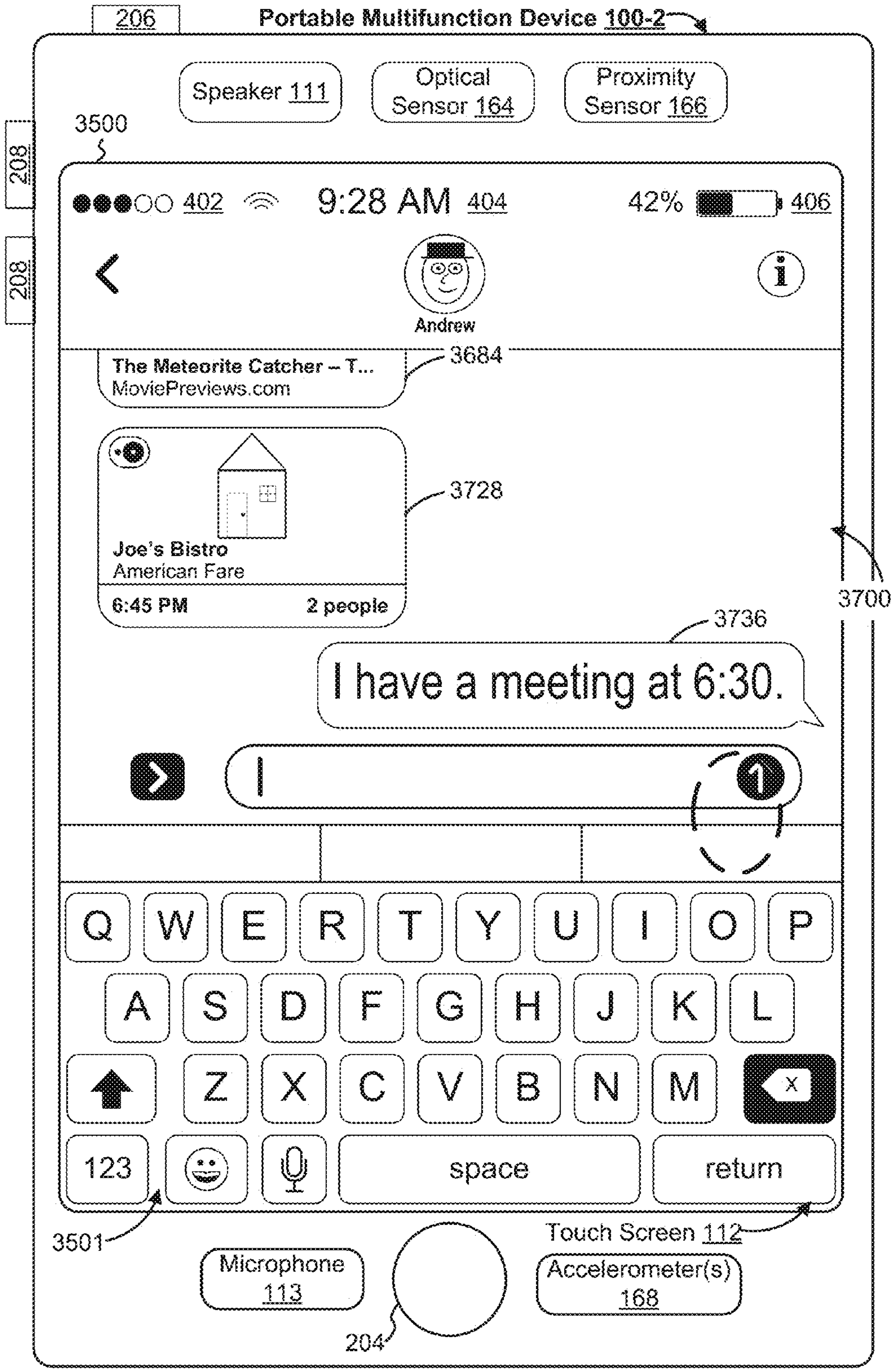
Figure 37P:
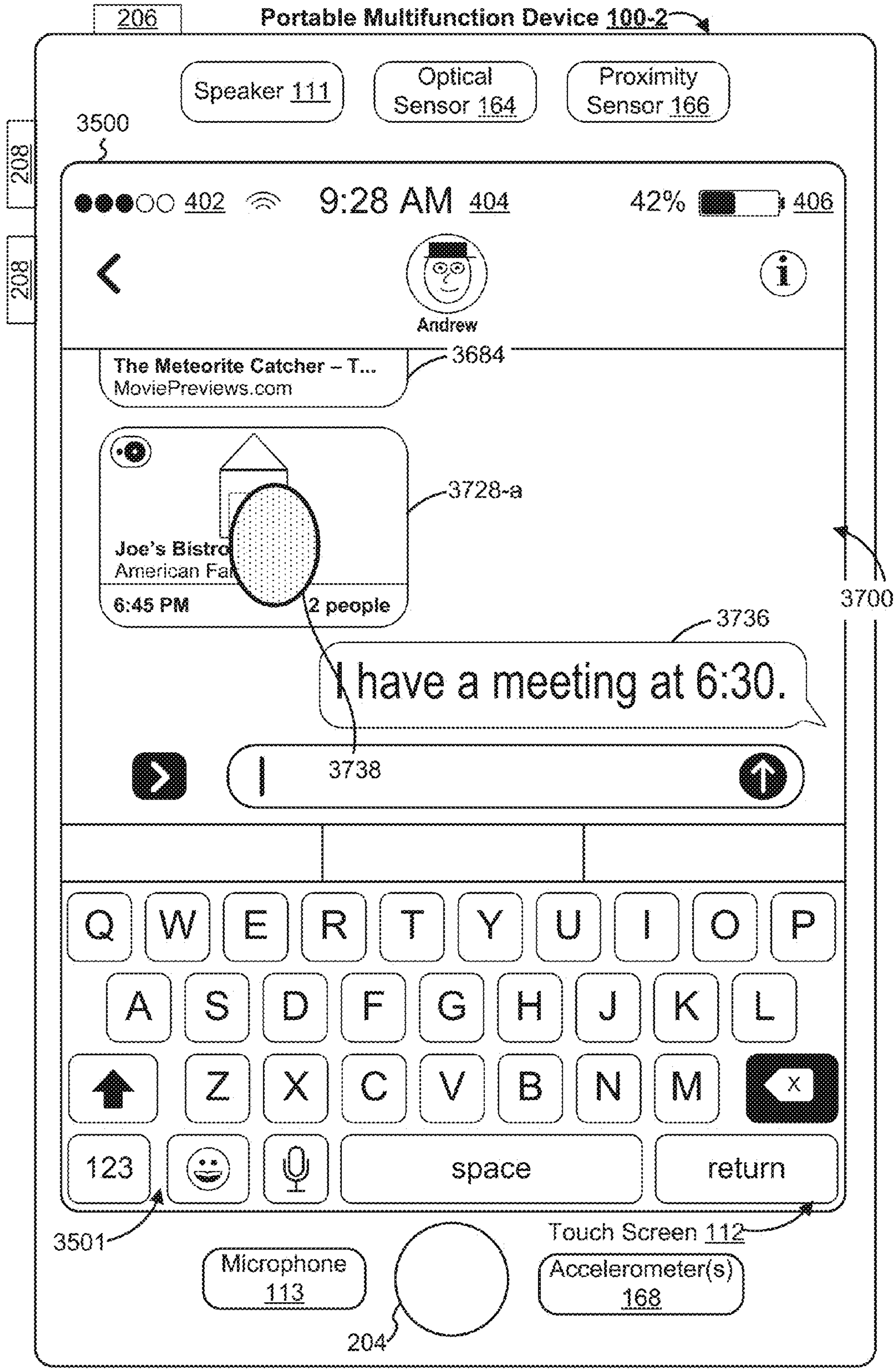

Device 100-2 then detects activation of the reservation application session by a tap gesture including contact 3738 on reservation application object 3728 displayed at location 3728-*a* in conversation transcript 3700 in FIG. 37P. Responsive to activation, the device displays reservation user interface 3712 in FIG. 37Q. The user interface includes input affordances 3740-1, 3740-2, and 3742 for changing the time, number of patrons, or location of the reservation. Reservation user interface 3712 also includes message-input area 3716 that is separate from message-input area 3501 displayed in message user interface 3500. Reservation user interface 3712 also includes Andrew's avatar 3511, corresponding to the other user included in the messaging session. Reservation user interface 3712 also includes exit affordance 3714 to return to the messaging user interface.

Figure 37Q:
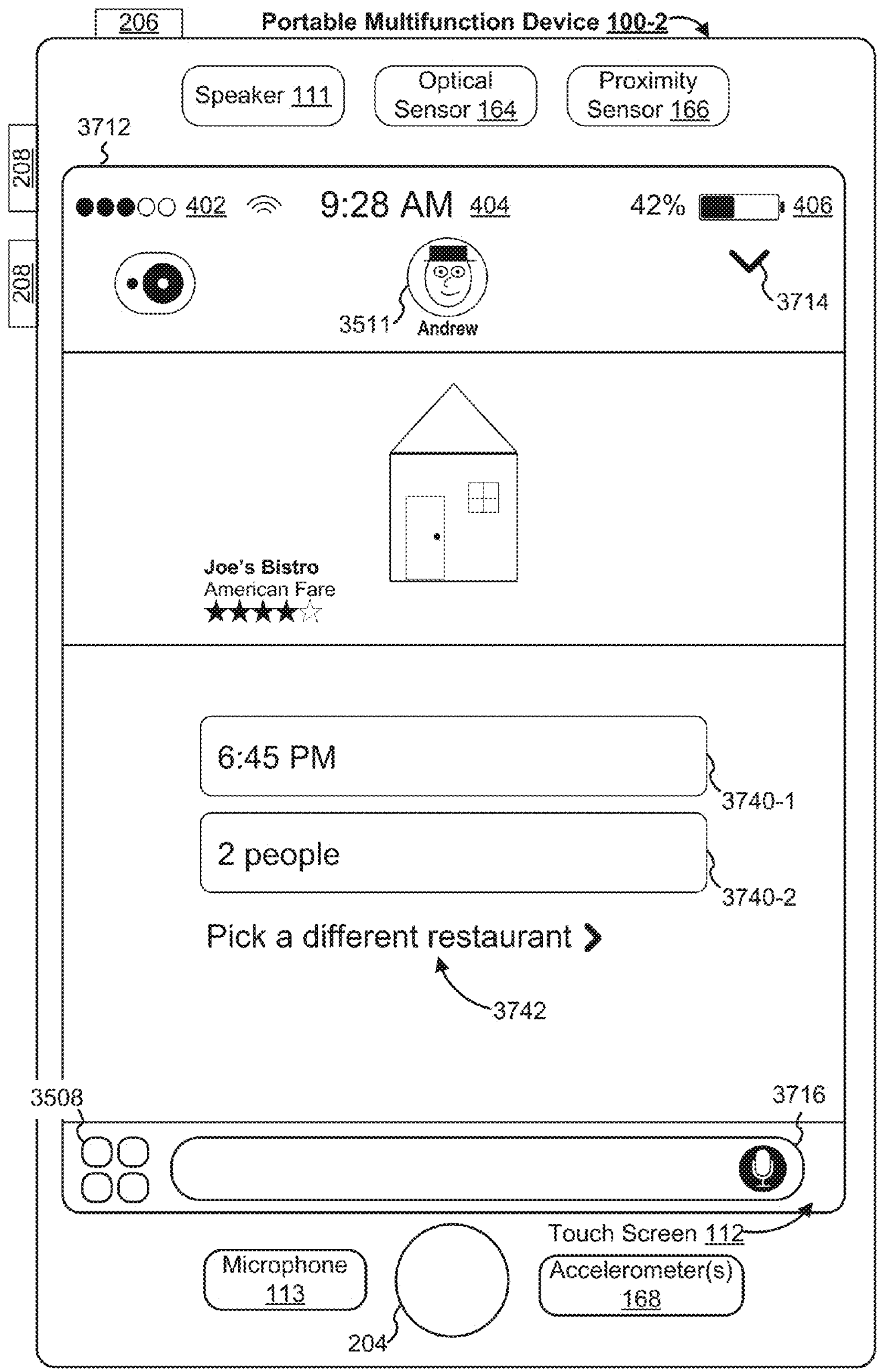
Figure 37R:
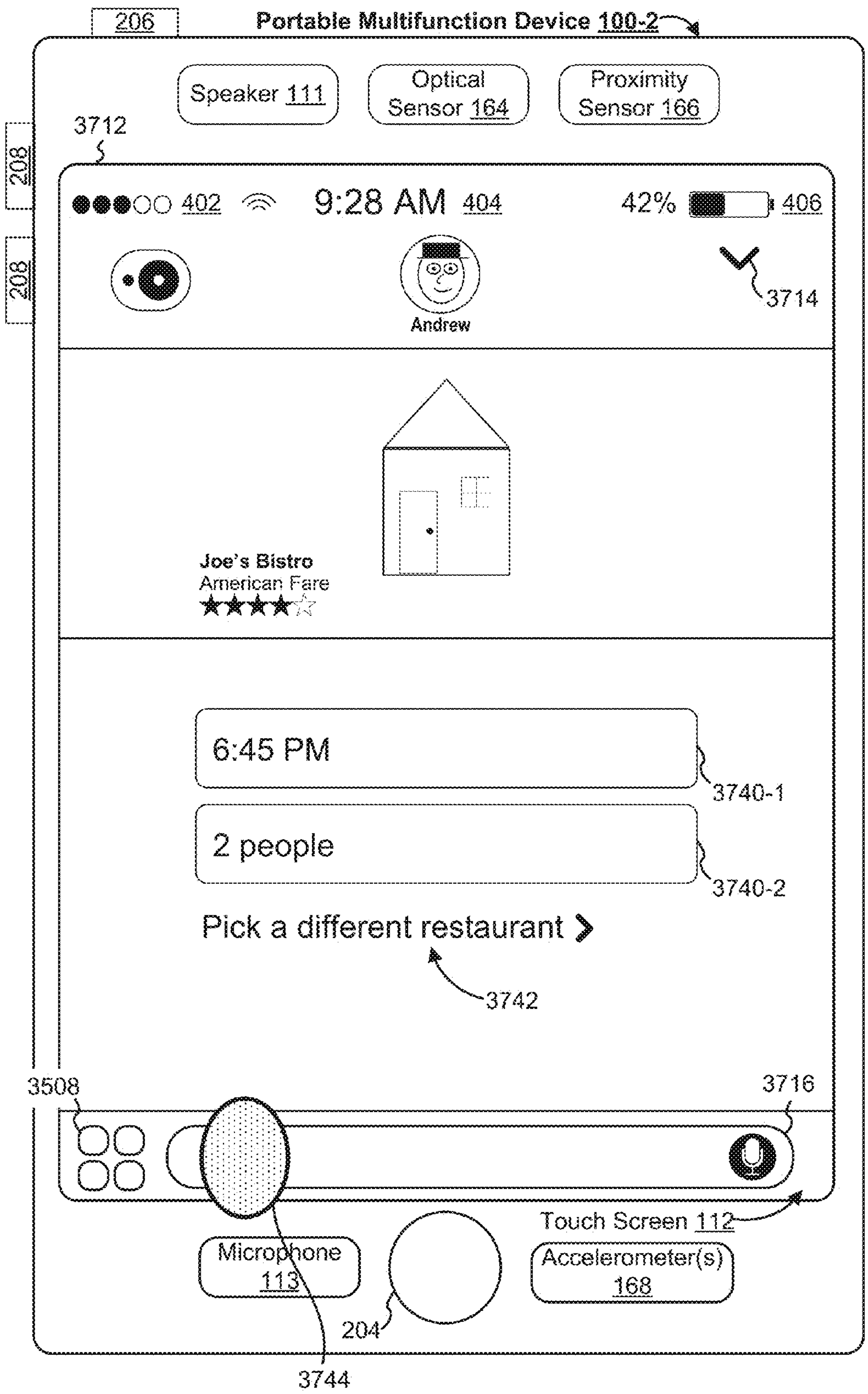
Figure 37S:
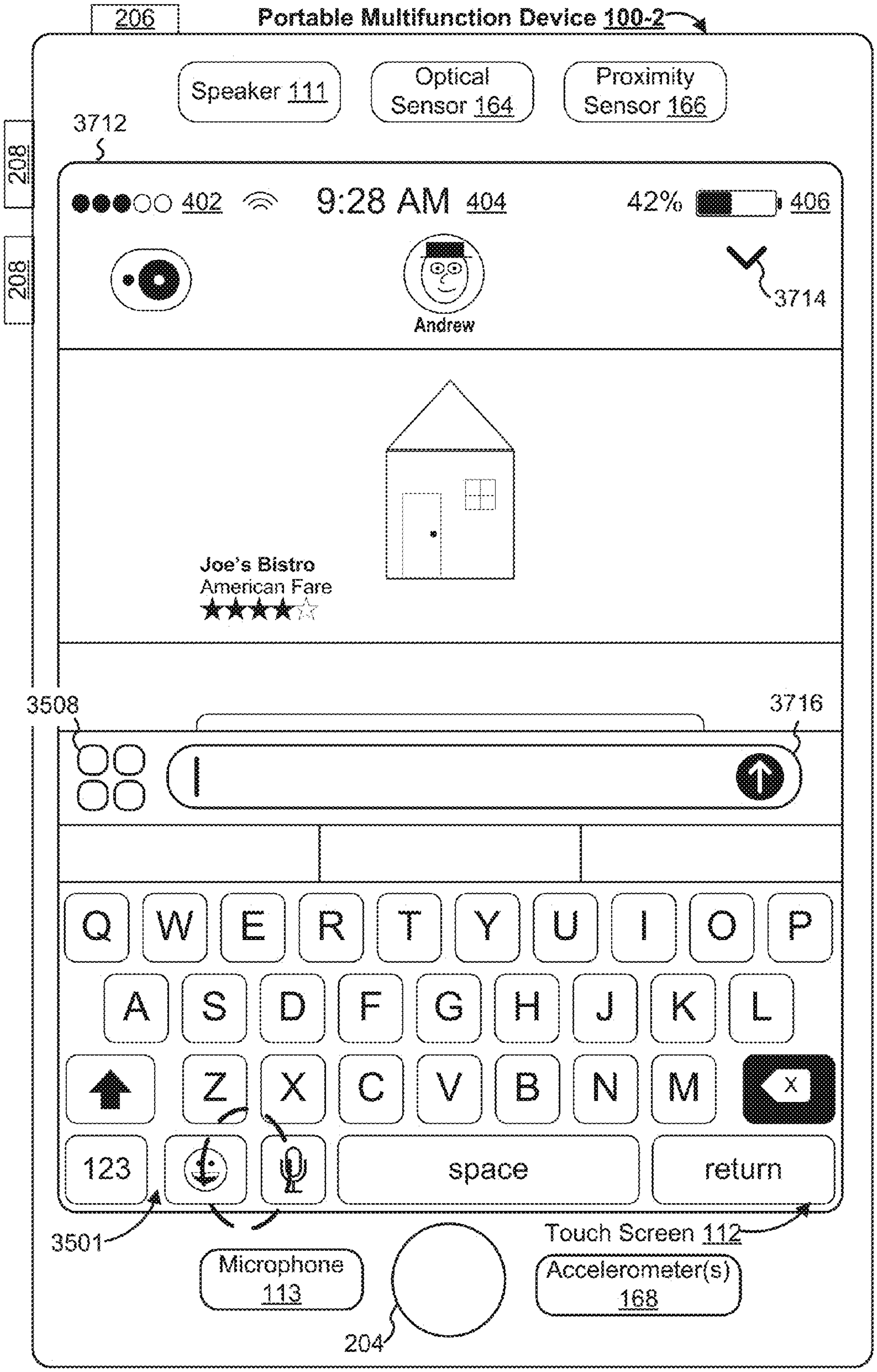
Figure 37T:
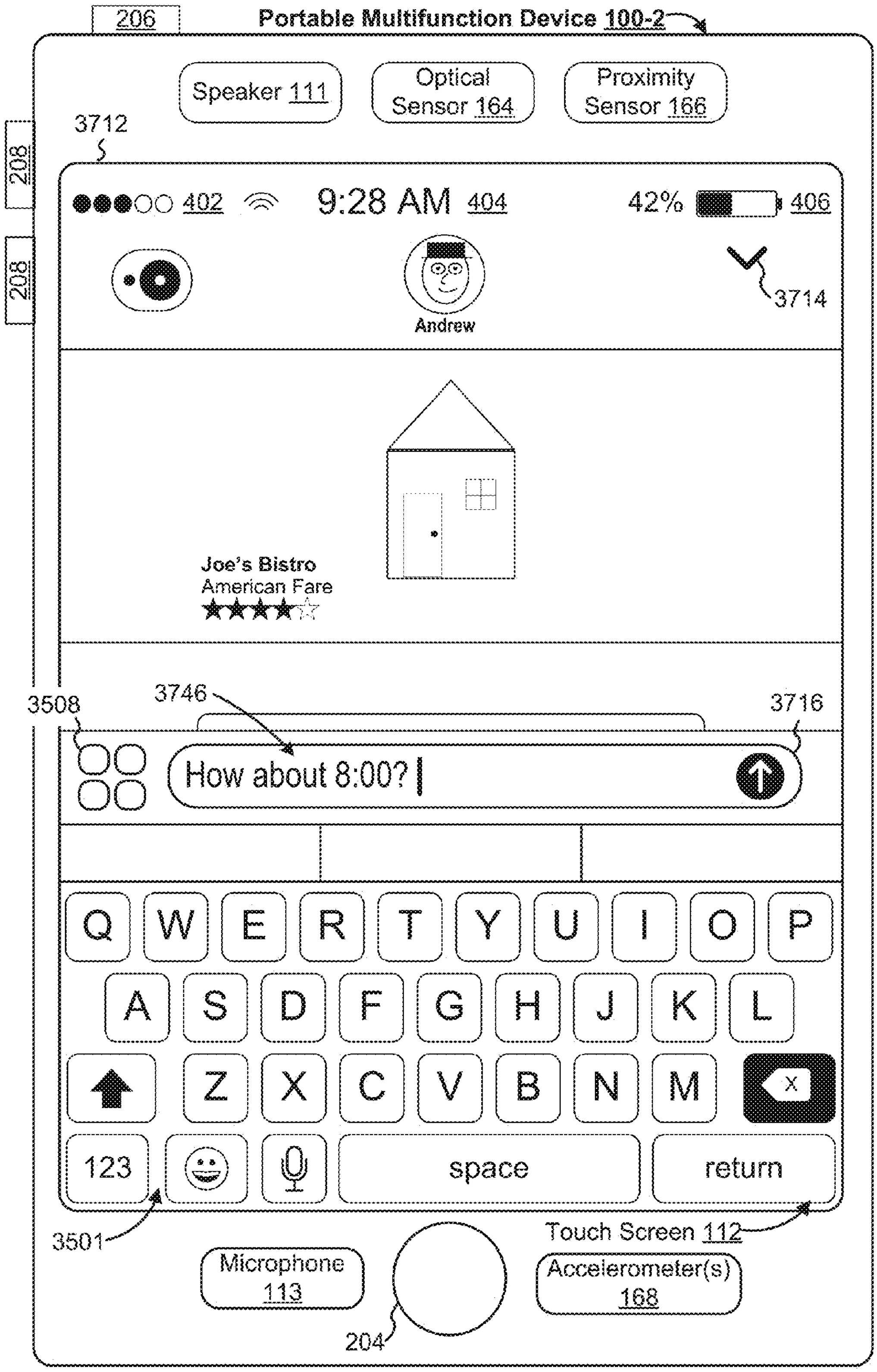

Device 100-2 detects a tap gesture, including contact 3744 in FIG. 37R, in message-input area 3716, activating digital keyboard 3501 in FIG. 37S. The device receives input of message 3746 in FIG. 37T, asking whether an 8:00 reservation would be alright, and a request to post the message to the messaging session, via a tap gesture including contact 3748 in FIG. 37U. In response, the device posts the message to the messaging session at 9:29 AM, and ceases to display digital keyboard 3501 in FIG. 37V. Corresponding device 100-1 receives message 3746 and displays it in conversation transcript in FIG. 37AE.

Device 100-1 displays digital keyboard 3501 in FIG. 37AG in response to a tap gesture, including contact 3758 in FIG. 37AF, on message-input area 3502. The device then receives input of reply message 3750 in message input area 3502 in FIG. 37AH, indicating that 8:00 is fine for the reservation. The message is posted to the messaging session at 9:30 AM via a tap gesture, including contact 3760 on message posting affordance 3520 in FIG. 37AI, as displayed within conversation transcript 3700 in FIG. 37AJ.

Figure 37U:
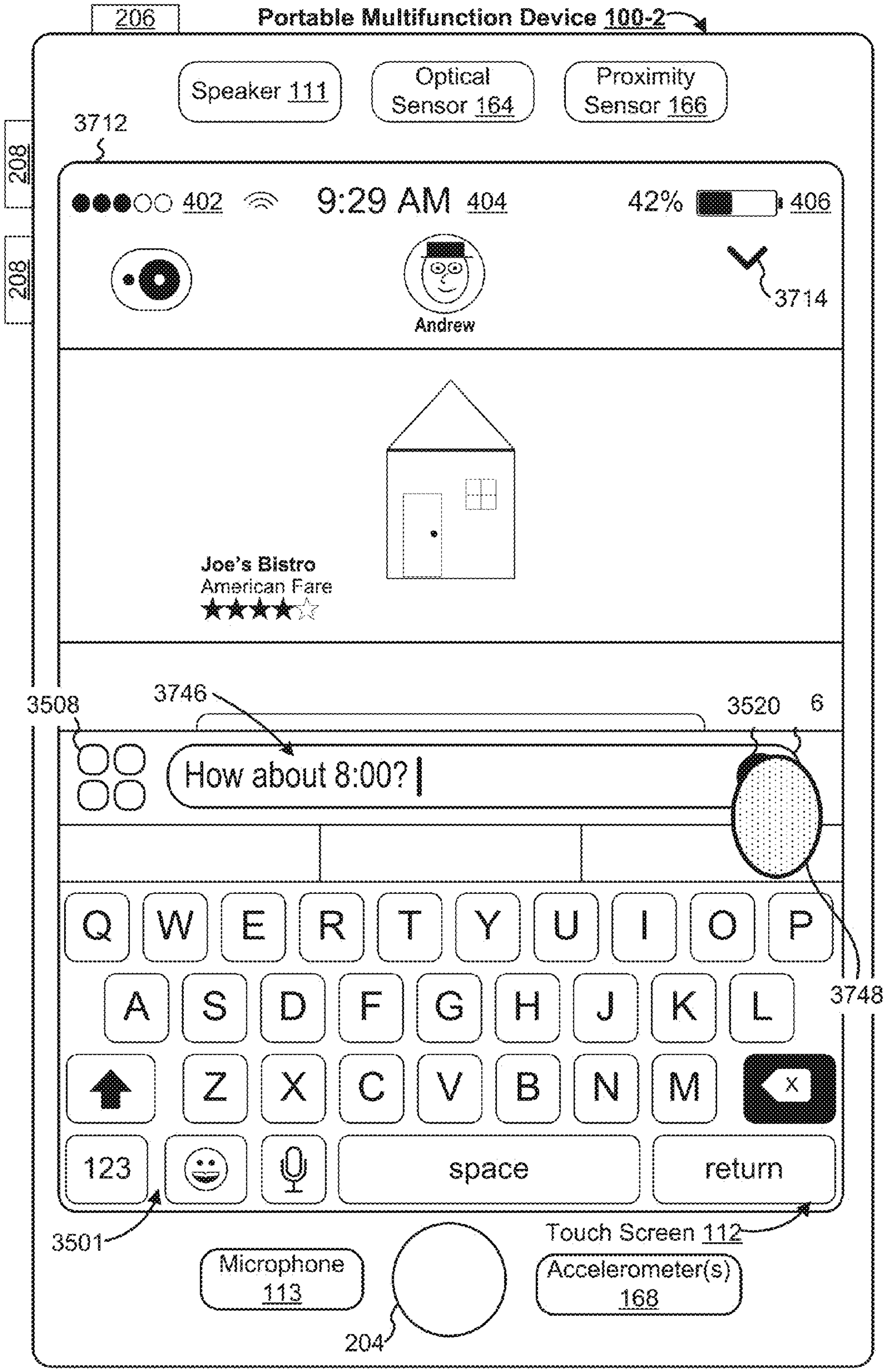
Figure 37V:
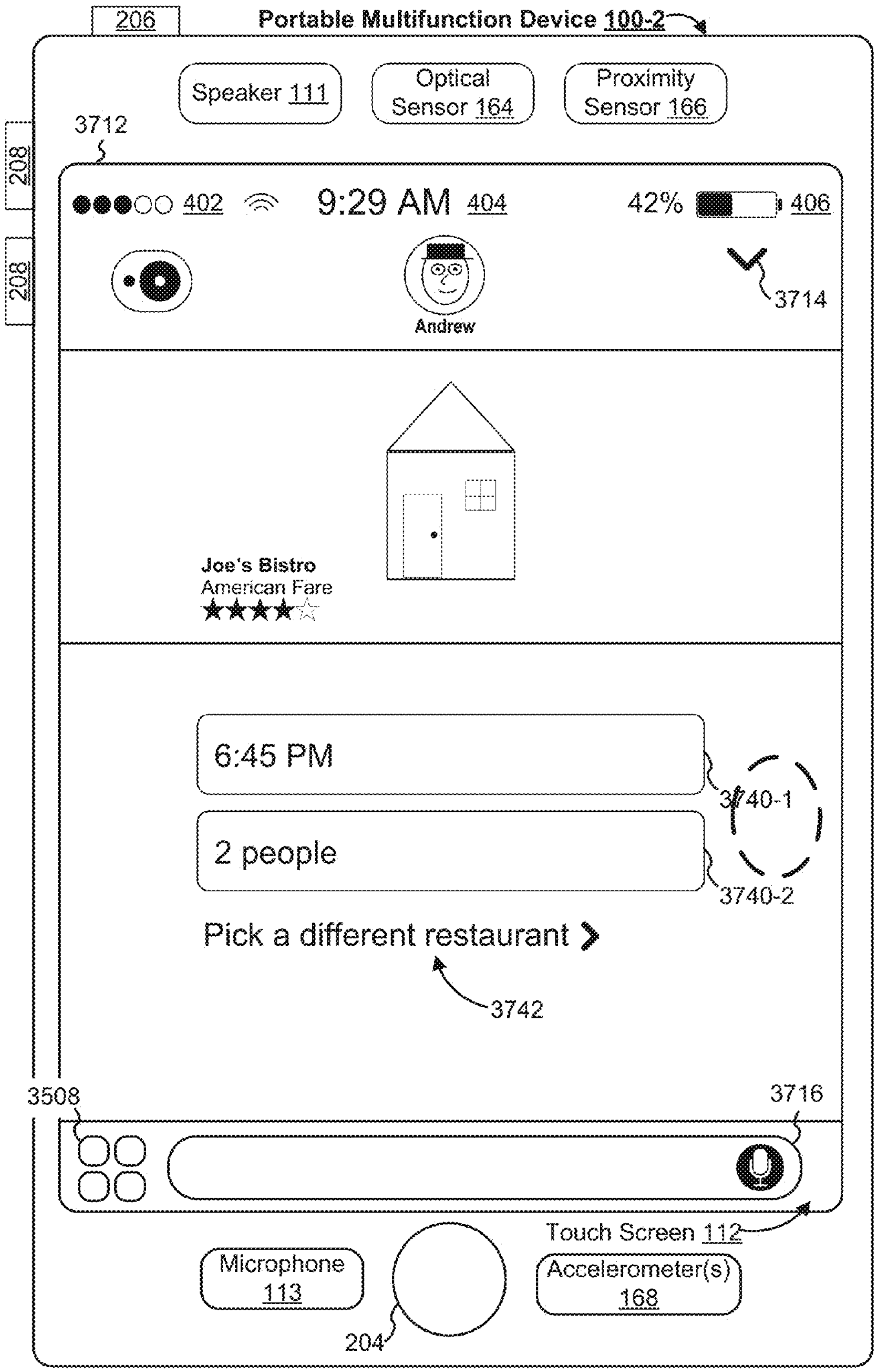
Figure 37W:
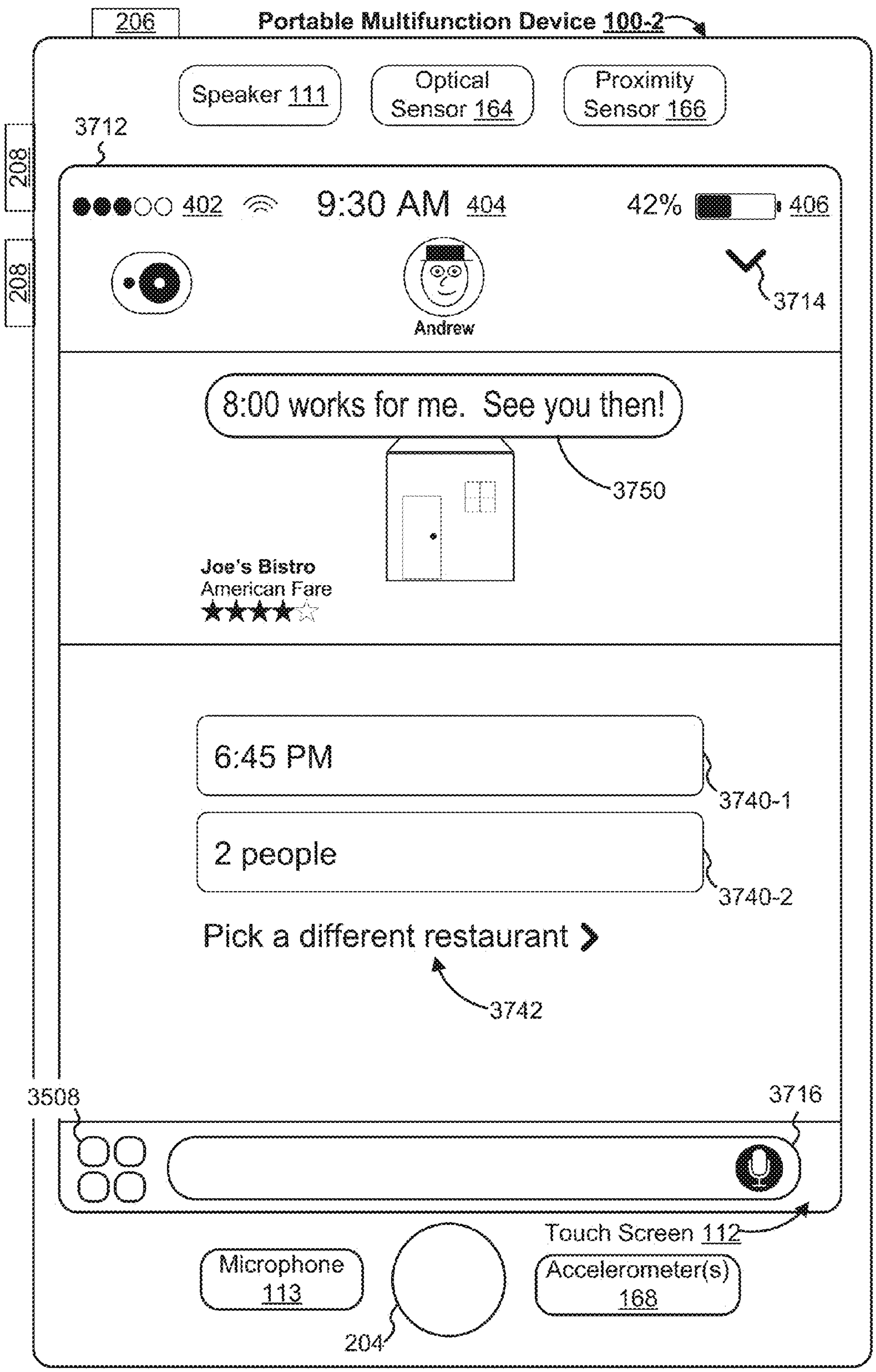
Figure 37X:
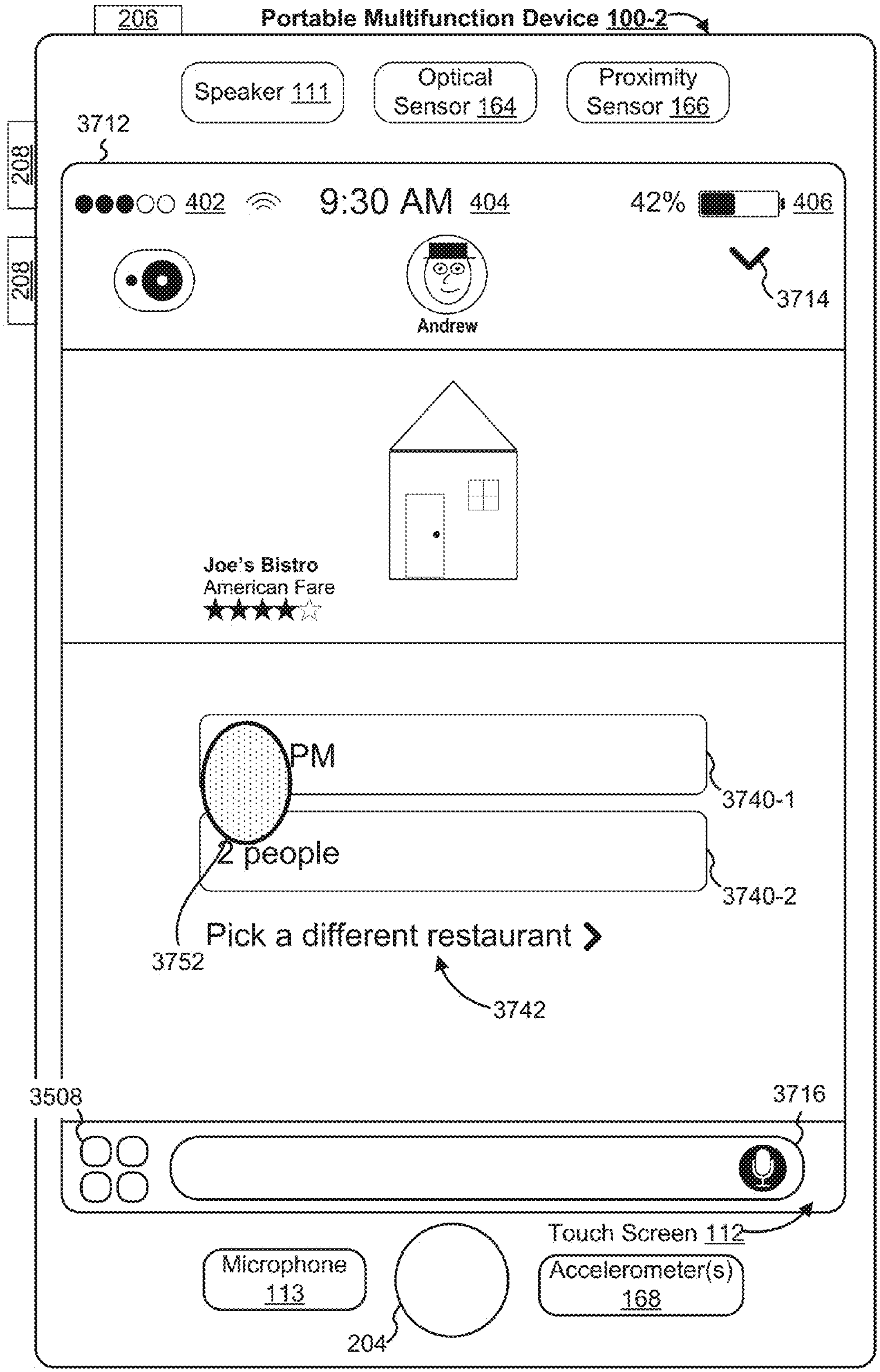

Device 100-2 receives reply message 3750 at 9:30 AM, and transiently displays it within reservation user interface 3712 in FIG. 37W. The device then receives tap inputs changing the time of the reservation to 8:00 PM. The first tap input includes contact 3752 on input affordance 3740-1 in FIG. 37X, causing the device to display a drop-down menu from input affordance 3740-1, displaying alternate reservation times, in FIG. 37Y. The second tap input selects an 8:00 reservation time by contact 3754 on '8:00 PM' in FIG. 37Z. The updated reservation details are displayed in FIG. 37AA. Device 100-2 returns to messaging user interface 3500, in FIG. 37AC, in response to a tap gesture on exit affordance 3714, including contact 3756 in FIG. 37AB. Reservation application object 3728 is updated in response to the change in the reservation time, and has moved in conversation transcript 3700 from position 3728-*a*, as displayed in FIG. 37P, to position 3728-*b*, as displayed in FIG. 37AC.

Movement of reservation application object 3728 from the left-hand side to the right-hand side of conversation transcript 3700 reflects that the user of device 100-2 made the last input in the application session. Movement of reservation application object 3728 down in conversation transcript reflects the temporal order in which the last input was made in the application session (e.g., the original reservation was made before message 3736 was posted to the messaging session, while the reservation update was made after message 3750 was posted to the messaging session). The temporal position of the original reservation (e.g., prior to posting of message 3736) is archived by display of application archiving icon 3756.

In some embodiments, selection of an application archiving icon (e.g., by a tap gesture) causes the device to display information about the particular event being archived (e.g., in some embodiments, tapping on application archiving icon 3756 would cause display of information on the original reservation (e.g., within the conversation transcript or after displaying the application user interface).

The display of reservation application object 3728 is also updated on device 100-1 in response to the changes to the reservation made by device 100-2. Device 100-1 ceases to display digital keyboard 3501, responsive to swipe gesture including movement 3764 of contact 3761 from location 3762-*a* in FIG. 37AJ to location 3762-*b* in FIG. 37AK. Device 100-1 then receives information transmitted from device 100-2 about the change to the reservation. In response, device 100-1 updates reservation application object 3728 by moving it from position 3728-*a*, as in FIG. 37AK, down and left to position 3728-*b*, as in FIG. 37AK, reflecting that the last input in the application session was made by device 100-2, after message 3750 was posted to the messaging session. Application archiving icon 3756 is inserted in conversation transcript 3700 at the temporal location previously occupied by the reservation application object (e.g., position 3728-*a*) in FIG. 37AL.

FIGS. 37A0-37BS illustrate an exemplary embodiment of an interactive tic-tac-toe application operated within a messaging application. Operation of the interactive application includes display of an application user interface over a portion of the messenger user interface, and which is accessible to users included in the messaging session through an application object displayed in the conversation transcript.

FIGS. 37AO and 37BD illustrate exemplary user interface 3500 for a messaging application on devices 100-1 and 100-2, respectively. User interface 3500 includes conversation transcript 3700, message-input area 3502, three activatable affordances—digital image affordance 3504, digital canvas affordance 3506, and application affordance 3508—optionally, one of digital keyboard 3501 for inputting messages into message-input area 3502, application selection tray 3654, and application swipe tray 3892. Conversation transcript 3700 includes messages from participants of a corresponding messaging session, including the user of the particular portable multifunction device and other users included in the messaging session. Each of the other users included in the messaging transcript are represented by an avatar (e.g., avatar 3510 for "Abe" and avatar 3511 for "Andrew").

FIGS. 37AO-37AW illustrate activation of an interactive tic-tac-toe application. Responsive to detecting a tap gesture on application affordance 3508, including contact 3768 in FIG. 37AO, device 100-1 displays application swipe tray 3892 in FIG. 37E. Application swipe tray 3892 includes launch icon 3708 for an interactive reservations application and application menu toggle affordance 3627 for switching between application swipe tray 3892 and application selection tray 3654. The device then detects a swipe gesture to the left in application swipe tray 3892, including movement 3772 of contact 3770 from position 3770-*a* in FIG. 37AQ to position 3770-*b* in FIG. 37AR. In response, the device moves application swipe tray 3892 to the left, in accordance with movement 3772, creating the appearance that application launch icon 3708 slides off of the left side of touch screen 112 and application launch icon 3774 slides onto the display from the right side of touch screen 112, in FIG. 37AR. After completion of the swipe gesture, the device displays application launch icon 3774 for an interactive tic-tac-toe application within application slide tray 3892, in FIG. 37AS.

The interactive tic-tac-toe application is launched within the messaging application in FIG. 37AU when the device detects a tap gesture on tic-tac-toe launch icon 3774, including contact 3710 in FIG. 37F. In response to launching the application, application slide tray is replaced by menu 3778 including options 3780-1 and 3780-2 for playing the game as O or X, respectively. Responsive to detecting selection of 'O' via a tap gesture on affordance 3780-1, including contact 3782 in FIG. 37AV, device 100-1 displays tic-tac-toe user interface 3784 over a portion of messaging user interface 3500 in FIG. 37AW. User interface 3784 includes tic-tac-toe board 3791, exit affordance 3694 for closing the user interface, and message-input area 3716, separate from message-input area 3716. Device 100-1 also places tic-tac-toe application object 3786 into conversation transcript 3700 responsive to initiation of the tic-tac-toe session.

Device 100-1 then detects placement of 'O' 3792 in the center square of tic-tac-toe board 3791 in FIG. 37AY, by a tap gesture including contact 3788 in FIG. 37AX. Responsive to placing 'O' 3792 on tic-tac-toe board 3791, device 100-1 places application archiving icon 3790 in conversation transcript 3700, in FIG. 37AY, memorializing the temporal location of the move in the transcript. In some embodiments, selecting the application archiving icon 3790 (e.g., by tapping on it) opens tic-tac-toe user interface 3782 in a state that shows the play associated with the temporal location of the archiving icon.

While device 100-1 is initiating the tic-tac-toe session, device 100-2 displays activity region 3703 including tic-tac-toe icon 3793 in conversation transcript 3700 indicating that the user of another device is contemporaneously initiating a session of an interactive application within the messaging session, as in FIG. 37BE. Responsive to receiving information that 'O' 3792 was placed on tic-tac-toe board 3791 on device 100-1, device 100-2 displays application archiving icon 3703 and tic-tac-toe application object 3705 in transcript 3700 in FIG. 37BF.

Responsive to detecting a tap gesture on tic-tac-toe application object 3705, including contact 3707 in FIG. 37BG, device 100-2 downloads the tic-tac-toe application because it was not already stored on the device, as indicated below tic-tac-toe application object 3705 ("tap to download"). Indicia 3709 of the ongoing download is displayed over tic-tac-toe application object 3705 in FIG. 37BH. Upon completion of the download, device 100-2 indicates that it the user's turn to move by displaying "your turn" below tic-tac-toe application object 3705 in FIG. 37BI. The device opens tic-tac-toe user interface partially over transcript 3700 in FIG. 37BK upon detecting a tap gesture on tic-tac-toe application object 3705, including contact 3711 in FIG. 37BJ.

Device 100-2 then detects placement of 'X' 3794 in the upper right square of tic-tac-toe board 3791 in FIG. 37BM, by a tap gesture including contact 3713 in FIG. 37BL. Responsive to placing 'X' 3794 on tic-tac-toe board 3791, device 100-2 places application archiving icon 3715 in conversation transcript 3700, in FIG. 37BM, memorializing the temporal location of the move in the transcript. Device 100-2 also moves the location of tic-tac-toe application object 3705 from position 3705-*a* in FIG. 37BL to position 3705-*b* in FIG. 37BM, reflecting that the last tic-tac-toe move was made by device 100-2 at a new temporal position in the messaging session.

Device 100-2 then closes tic-tac-toe user interface 3782 in FIG. 37B0 responsive to a tap gesture on exit affordance 3694, including contact 3717 in FIG. 37BN. Device 100-2 displays digital keyboard 3501 in FIG. 37BP upon detecting a tap gesture on message-input area 3502, including contact 3719 in FIG. 37B0. Device 100-2 then posts message 3798 to the messaging session in FIG. 37BS after receiving input of the message in FIG. 37BQ and detecting a tap gesture including contact 3721 in FIG. 37BR.

Responsive to receiving information that 'X' 3794 was placed on tic-tac-toe board 3791 on device 100-2, device 100-1 updates display of tic-tac-toe user interface, which was open when the information was received, to display 'X' 3794 on board 3791 in FIG. 37AZ. Device 100-1 also displays tic-tac-toe archiving icon 3796 at the next temporal position in conversation transcript 3700 in FIG. 37AZ, and moves tic-tac-toe application object 3786 from position 3786-*a* in FIG. 37AY to position 3786-*b* in FIG. 37AZ reflecting that the last tic-tac-toe move was made by device 100-2 at a new temporal position in the messaging session.

Device 100-1 receives message 3798 from device 100-2, while tic-tac-toe user interface 3782 remains open over messaging user interface 3500, in FIG. 37BA. In response, the device transiently displays message 3798 within tic-tac-toe user interface 3782 and places the message in conversation transcript 3700, shown behind tic-tac-toe user interface 3798 in FIG. 37BA. Device 100-1 then closes tic-tactoe user interface 3782 in FIG. 37BC after detecting a tap gesture on exit affordance 3694, including contact 3701 in FIG. 37BB. This reveals conversation transcript 3700, which includes tic-tac-toe application archiving icons 3790 and 3796—memorializing moves made in the application by device 100-1 and 100-2, respectively—tic-tac-toe application object 3786—indicating by its position on the left-hand side of the transcript that another device (e.g., device 100-2) made the last move within the application, and prompting the user to make a move ("Your turn")—and message 3798 received while tic-tac-toe user interface 3782 was displayed.

FIGS. 37BT-37DJ illustrate an exemplary embodiment of an interactive pizza ordering application operated within a messaging application. Operation of the interactive application causes display of an application input area on a portion of the display (e.g., a portion that is sometimes used to display a digital keyboard, application swipe tray, or application selection tray) and an interactive application object, displaying an output of the interactive application, displayed within the conversation transcript of the messaging user interface. The application input area is accessible to users of the messaging session through the interactive application object.

FIGS. 37BT and 37CQ illustrate exemplary user interface 3500 for a messaging application on devices 100-2 and 100-1, respectively. User interface 3500 includes conversation transcript 3700, message-input area 3502, either of application expansion affordance 3702 or three activatable affordances—digital image affordance 3504, digital canvas affordance 3506, and application affordance 3508—optionally, one of digital keyboard 3501 for inputting messages into message-input area 3502, application selection tray 3654, and application swipe tray 3892. Conversation transcript 3700 includes messages from participants of a corresponding messaging session, including the user of the particular portable multifunction device and other users included in the messaging session. Each of the other users included in the messaging transcript are represented by an avatar (e.g., avatar 3510 for "Abe" and avatar 3511 for "Andrew").

FIGS. 37BT-37CA illustrate activation of an interactive application for ordering a pizza. Three activatable affordances—digital image affordance 3504, digital canvas affordance 3506, and application affordance 3508—are displayed by device 100-2 in FIG. 37BU, in response to a tap gesture on application expansion affordance 3702, including contact 3723 in FIG. 37BT. The device then displays application swipe tray 3892 in FIG. 37BW, responsive to detecting a tap gesture on application affordance 3508, including contact 3725 in FIG. 37BV. Application swipe tray 3892 includes launch icon 3774 for an interactive tic-tac-toe application and application menu toggle affordance 3627 for switching between application swipe tray 3892 and application selection tray 3654. After detecting a tap gesture on application menu toggle affordance 3627, including contact 3727 in FIG. 37BX, device 100-2 displays application selection tray 3654 in FIG. 37BY, including a plurality of launch icons for applications—launch icon 3601 for a messaging application-specific application store, launch icon 3603 for an interactive tic-tac-toe application, launch icon 3605 for an interactive reservation application, launch icon 3607 for a search application, launch icon 3609 for a digital sticker pack, launch icon 3611 for a live video-streaming application, launch icon 3613 for an interactive pizza ordering application, and launch icon 3615 for an interactive digital music application.

A pizza ordering application is launched in FIG. 37CA after device 100-2 detects a tap gesture on launch icon 3613 for the application, including contact 3729 in FIG. 37BZ. The device displays input area 3731 for the pizza ordering application, which includes input affordances 3733-1, 3733-2, and 3733-3 for adding toppings to the pizza, removing toppings from the pizza, and ordering the pizza, respectively, and exit affordance 3694 for terminating display, in FIG. 37CA. The device also displays pizza ordering application object 3735 in conversation transcript 3700, which displays the status of the pizza being ordered and serves as a launch icon for the interactive session of the pizza building application within in the messaging session. In FIG. 37CA, pizza ordering application object 3735 shows that no toppings have been added to the pizza. Device 100-2 sends information to device 100-1 that a session of the pizza ordering application was initiated within the messaging session.

Device 100-1 receives the information sent from device 100-2 and, in response, displays pizza ordering application object 3735 in conversation transcript 3700 in FIG. 37CR. The device also displays an indication that "Abe wants to share a pizza" below application object 3735.

Device 100-2 then detects a tap gesture on affordance 3733-1 for adding toppings to the pizza, including contact 3737 in FIG. 37CB, and displays a drop-down menu of topping choices from affordance 3733-1 in FIG. 37CC. Pepperoni is added to the pizza in FIG. 37CE in response to detecting a tap gesture on the topping, including contact 3739 in FIG. 37CD. The device displays pepperoni on the pizza in pizza ordering application object 3735 displayed at position 3735-*a*—immediately below message 3798—within conversation transcript 3700 in FIG. 37CE. The device also displays an indication that "you added pepperoni" below application object 3735 in FIG. 37CE. Device 100-2 also sends information to device 100-1 that pepperoni was added to the pizza.

Device 100-1 receives the information sent from device 100-2 and, in response, displays pepperoni on the pizza shown in pizza ordering application object 3735 in FIG. 37CS. Digital keyboard 3501 is then activated in FIG. 37CU by a tap gesture on message-input area, including contact 3759 in FIG. 37CT. The device receives and posts message 3741 to the messaging session, as shown in conversation transcript 3700 in FIG. 37CV, in response to a tap gesture on message-content posting affordance 3520 in FIG. 37CU.

When device 100-2 receives message 3741 posted from device 100-1, pizza ordering application object 3735 moves up on touch screen 112, in accordance with its temporal order within the messaging session, as in FIG. 37CF. Digital keyboard 3501 replaces input area 3731 in FIG. 37CH after device 100-2 detects a tap gesture on message-input area 3502, including contact 3743 in FIG. 37CG. The device then receives and posts message 3747 to the messaging session, as shown in conversation transcript 3700 in FIG. 37CJ, in response to a tap gesture on message-content posting affordance 3520 in FIG. 37CI. However, pizza ordering application object 3735 does not move in response to placing message 3747 in conversation transcript 3700 because it has reached the top of the displayed conversation transcript 3700. Rather, message 3741 moves up and behind pizza ordering application object 3735, which is temporarily pinned to the top of the displayed portion of the conversation transcript, in FIG. 37CJ.

Likewise, when device 100-1 receives message 3747 posted from device 100-2, pizza ordering application object 3735 is pinned to the top of conversation transcript 3700 in FIG. 37CW. Message 3741 is displayed as if sliding behind application object 3735 in FIG. 37CW. The device then receives and posts message 3749 to the messaging session, as shown in conversation transcript 3700 in FIG. 37CY, in response to a tap gesture on message-content posting affordance 3520 including contact 3763 in FIG. 37CX. Pizza ordering application object 3735 remains pinned to the top of conversation transcript 3700 in FIG. 37CY because users of the messaging session are actively creating a pizza together.

Likewise, messages posted to the messaging session continue to slide behind pizza ordering application object 3735 on device 100-2, as shown in FIG. 37CK when the device receives message 3749 posted by device 100-1

Mushrooms are then added to the pizza from device 100-1. Pizza ordering application input area 3731 is displayed on the device in response to a tap gesture on pizza ordering application object 3735 in conversation transcript 3700, including contact 3756 in FIG. 37CZ. Mushrooms are selected after a tap gesture on input affordance 3733-1, including contact 3767 in FIG. 37DB, activates a drop-down menu of pizza toppings in FIG. 37DC. A tap gesture, including contact 3769 on "Mushrooms" in FIG. 37DD, causes the device to display mushrooms on the pizza in pizza ordering application object 3735 in FIG. 37DE. The device also displays an indication that "you added mushrooms" below application object 3735 in FIG. 37DE, and sends information to device 100-2 that mushrooms were added to the pizza.

Upon receiving the information from device 100-1, device 100-2 displays mushrooms on the pizza within pizza ordering application object 3735, in FIG. 37CL. The device also displays, in FIG. 37CL, an indication that "Andrew added mushrooms" to the pizza below application object 3735 in transcript 3700. The device then receives and posts message 3753 to the messaging session ion FIG. 37CN, in response to detecting a tap gesture on message-content posting affordance 3520 including contact 3751 in FIG. 37CM.

Device 100-1 receives message 3753, as displayed in conversation transcript 3700 in FIG. 37DF. The pizza is then ordered from a business associated with the pizza ordering application, by device 100-1. The device detects a tap gesture on ordering affordance 3733-3, including contact 3771 in FIG. 37DG, and displays affordances for setting details of the order—affordance 3773-1 for selecting a payment option and affordance 3773-2 for selecting a delivery address—and for placing the order with the business (affordance 3773-3) in pizza ordering application input area 3731, as in FIG. 37DH. The pizza is ordered in FIG. 37DJ upon detecting a tap gesture on ordering affordance 3773-3, including contact 3775 in FIG. 37DI. In response to ordering the pizza, device 100-1 closes the pizza ordering application, displays conversation transcript 3700 in full-screen mode, un-pins pizza ordering application object 3735 and returns it to its original temporal position within conversation transcript 3700, indicates that "Abe started building a pizza" at that time, and displays pizza ordering application archiving icon 3755 at the end of the conversation transcript, archiving the ordering event in the temporal order of the messaging session. Device 100-1 also sends information to device 100-2 that the pizza was ordered.

Upon receiving the information for device 100-1, device 100-2 likewise displays pizza ordering application archiving icon 3755 at the end of conversation transcript 3700 in FIG. 37CO, indicating that "Andrew ordered a pizza" at this time in the messaging session. Device 1002 also unpins pizza ordering application object 3735 from the top of the displayed portion of the conversation transcript, and displays application object at original temporal position 3735-*a* in conversation transcript 3700, as shown in FIG. 37CQ. Full-screen display of transcript 3700 is activated upon detecting a downward swipe gesture including movement 3759 of contact 3757 from position 3757-*a* in FIG. 37CP to position 3757-*b* in FIG. 37CQ, causing the device to cease display of digital keyboard 3501.

FIGS. 38A-38AZ illustrate exemplary user interfaces for integrating applications in a messaging application in accordance with some embodiments. The user interfaces in these figures are used to illustrate the processes described below, including the processes in FIGS. 60A-60D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 38A-38O and 38R-38ZA illustrate an exemplary user interface 3500 for a messaging application which includes conversation transcript 3503, message-input area 3502, either of application expansion affordance 3702 or three activatable affordances—digital image affordance 3504, digital canvas affordance 3506, and application affordance 3508—optionally, one of digital keyboard 3501, digital image tray 3806, digital canvas tray 3854, application selection tray 3654, and application swipe tray 3892. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe") displayed in stack of avatars 4002.

Figure 38I:
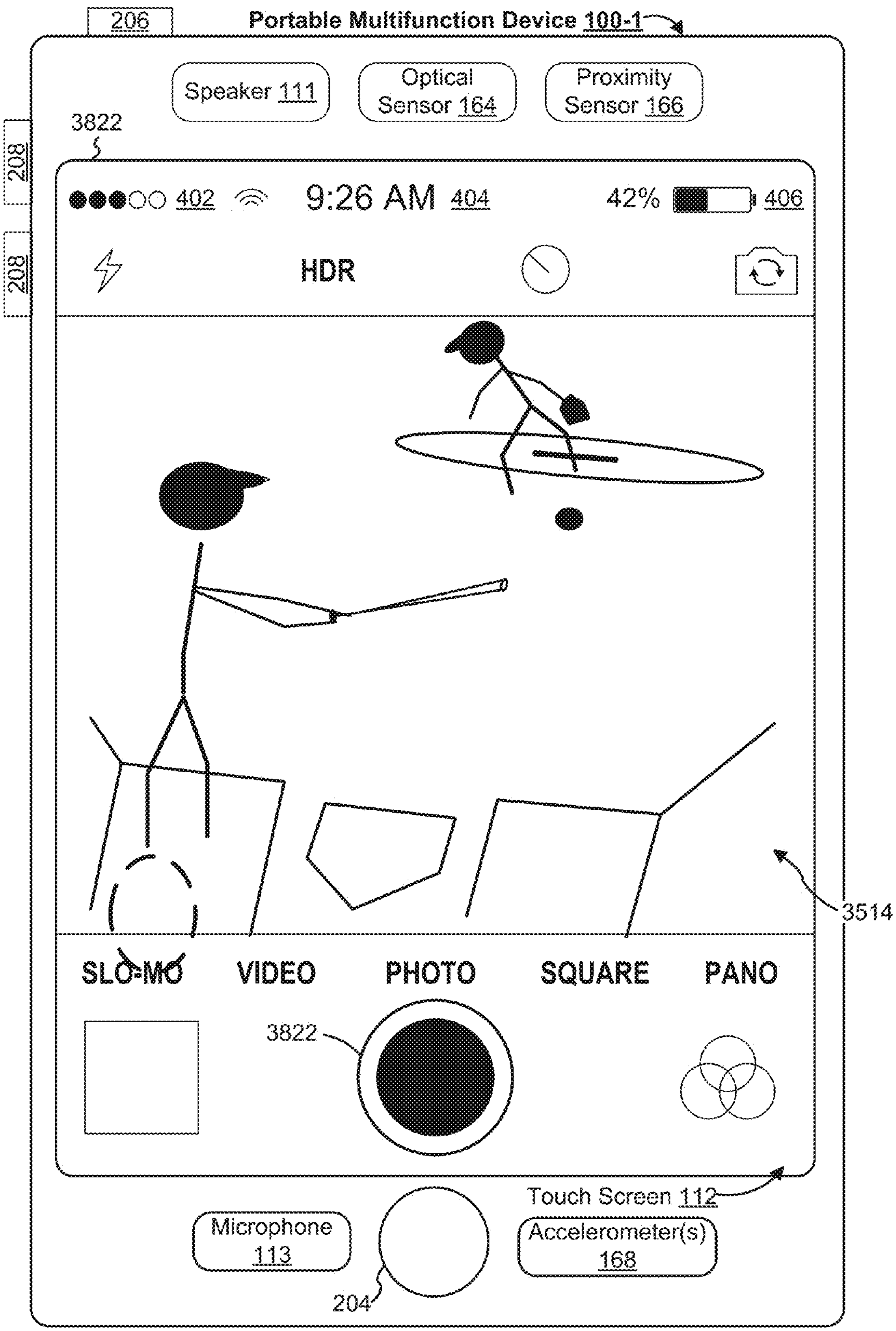
Figure 38J:
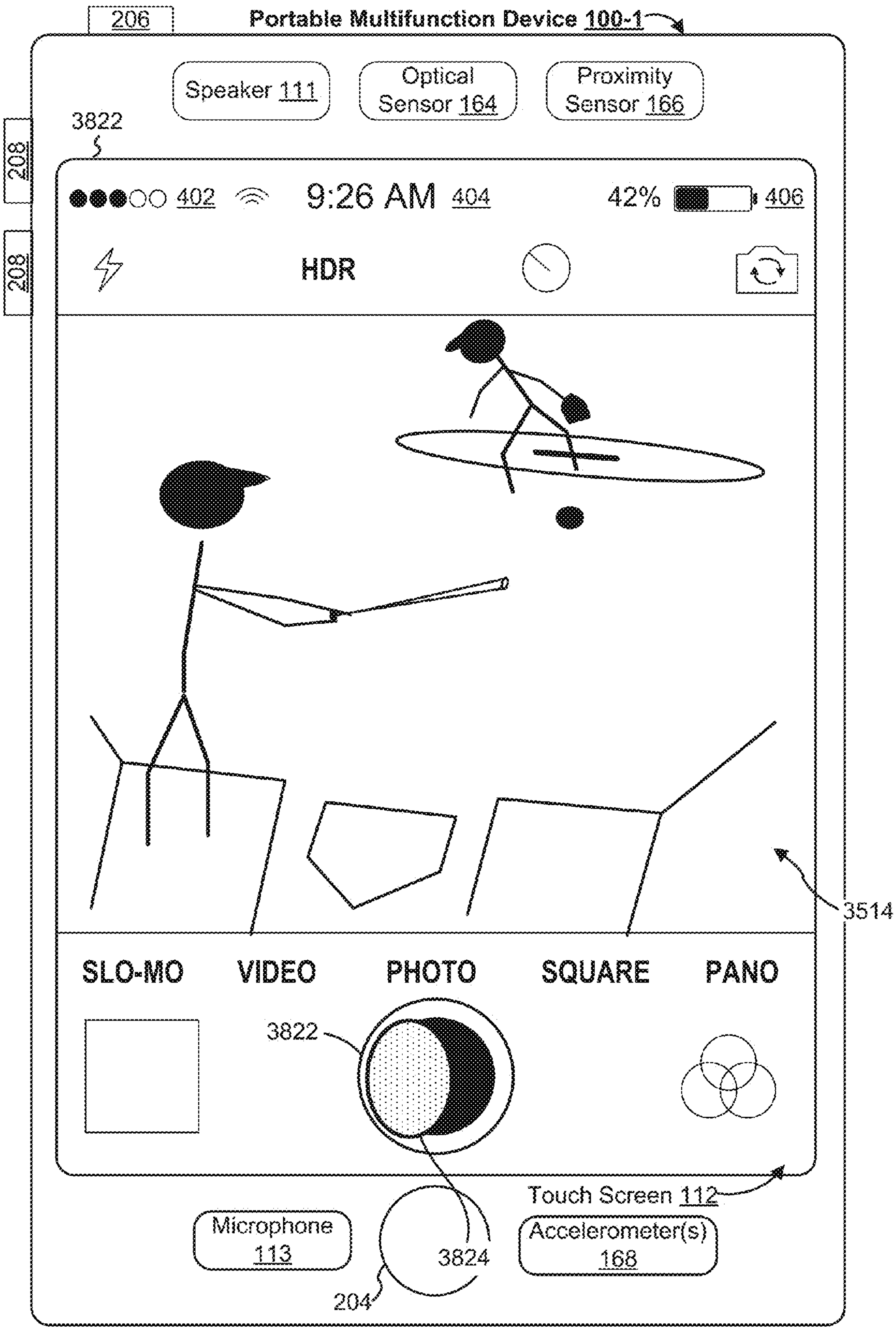
Figure 38K:
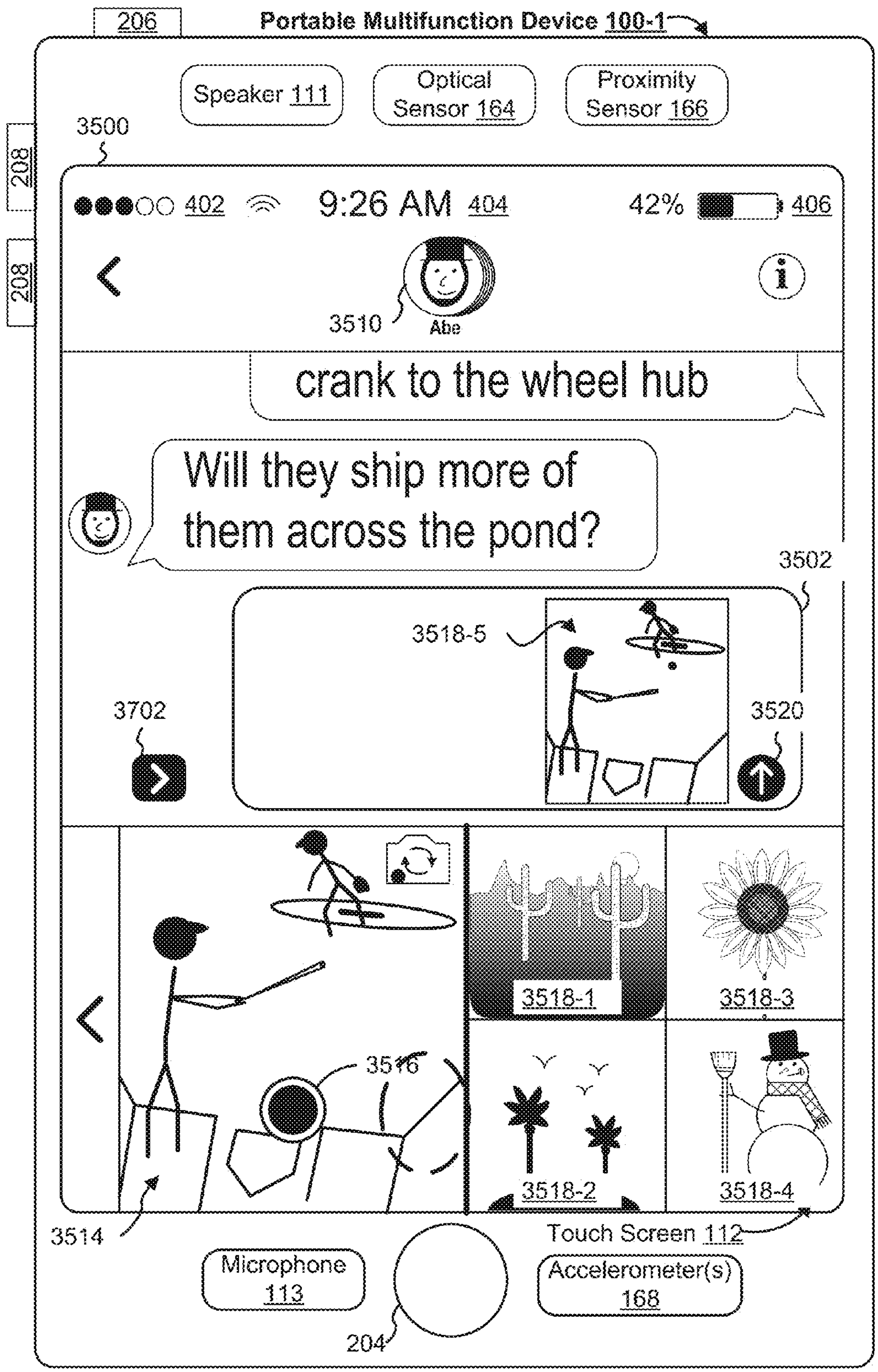
Figure 38L:
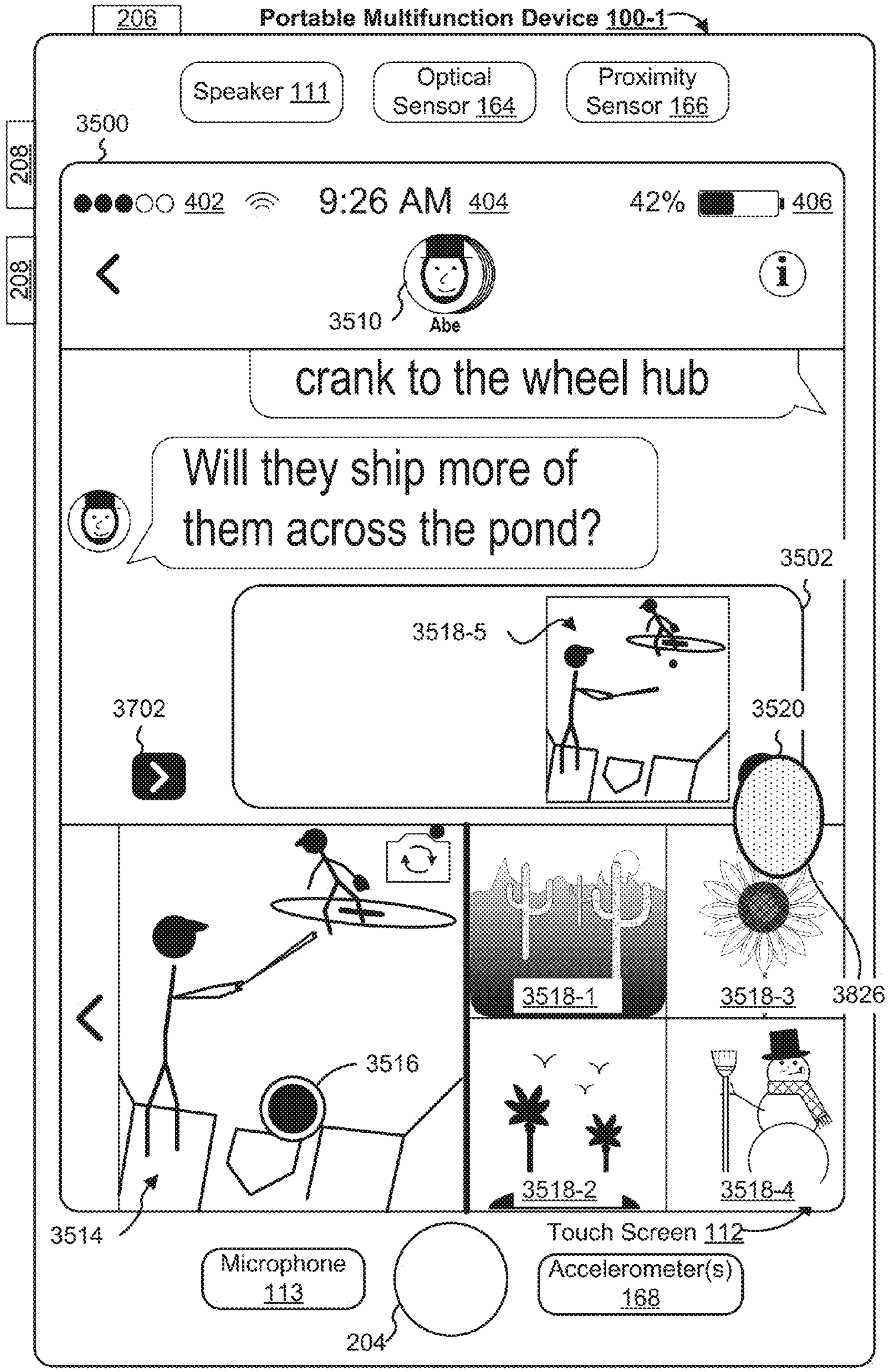
Figure 38M:
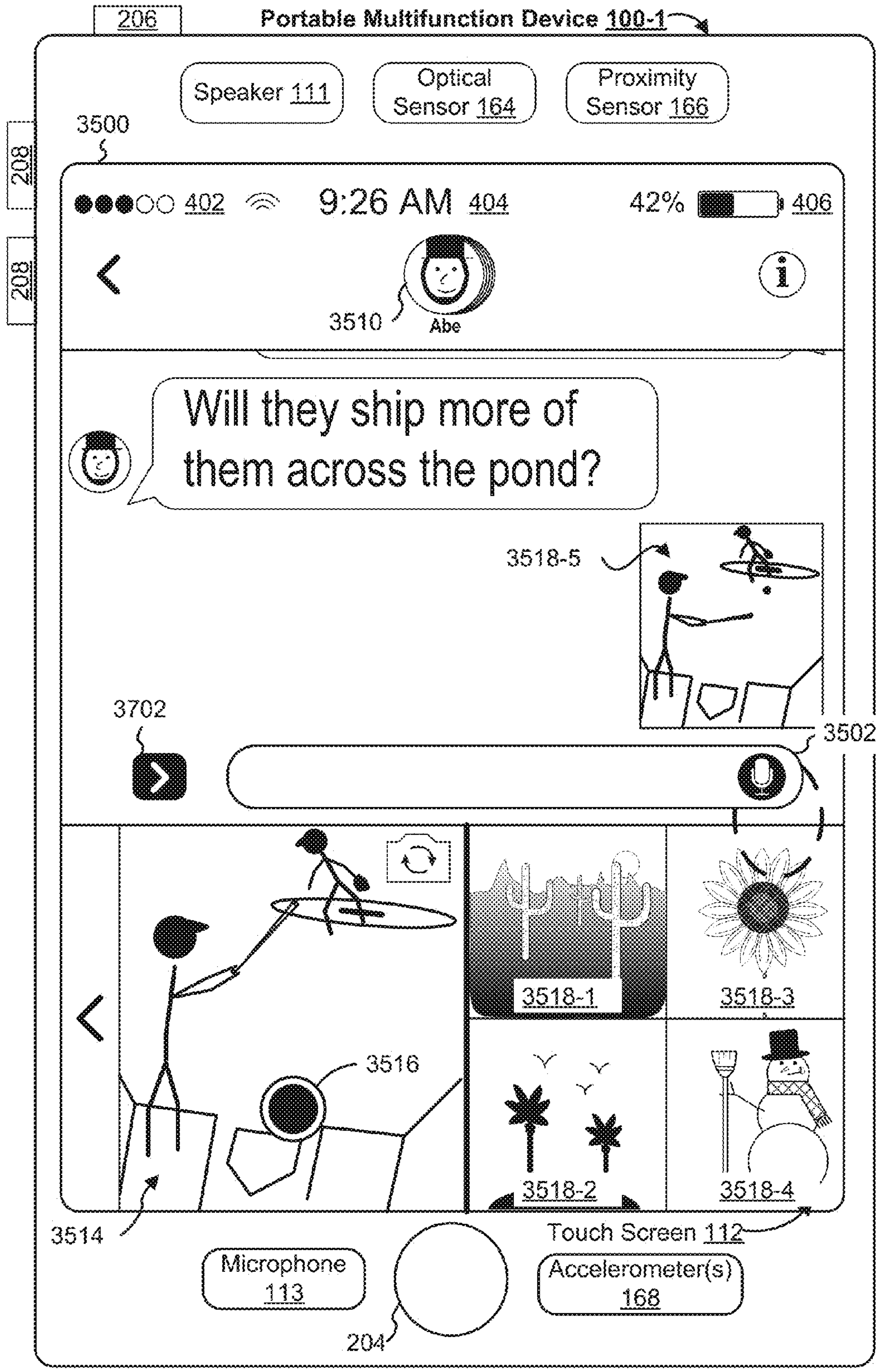
Figure 38N:
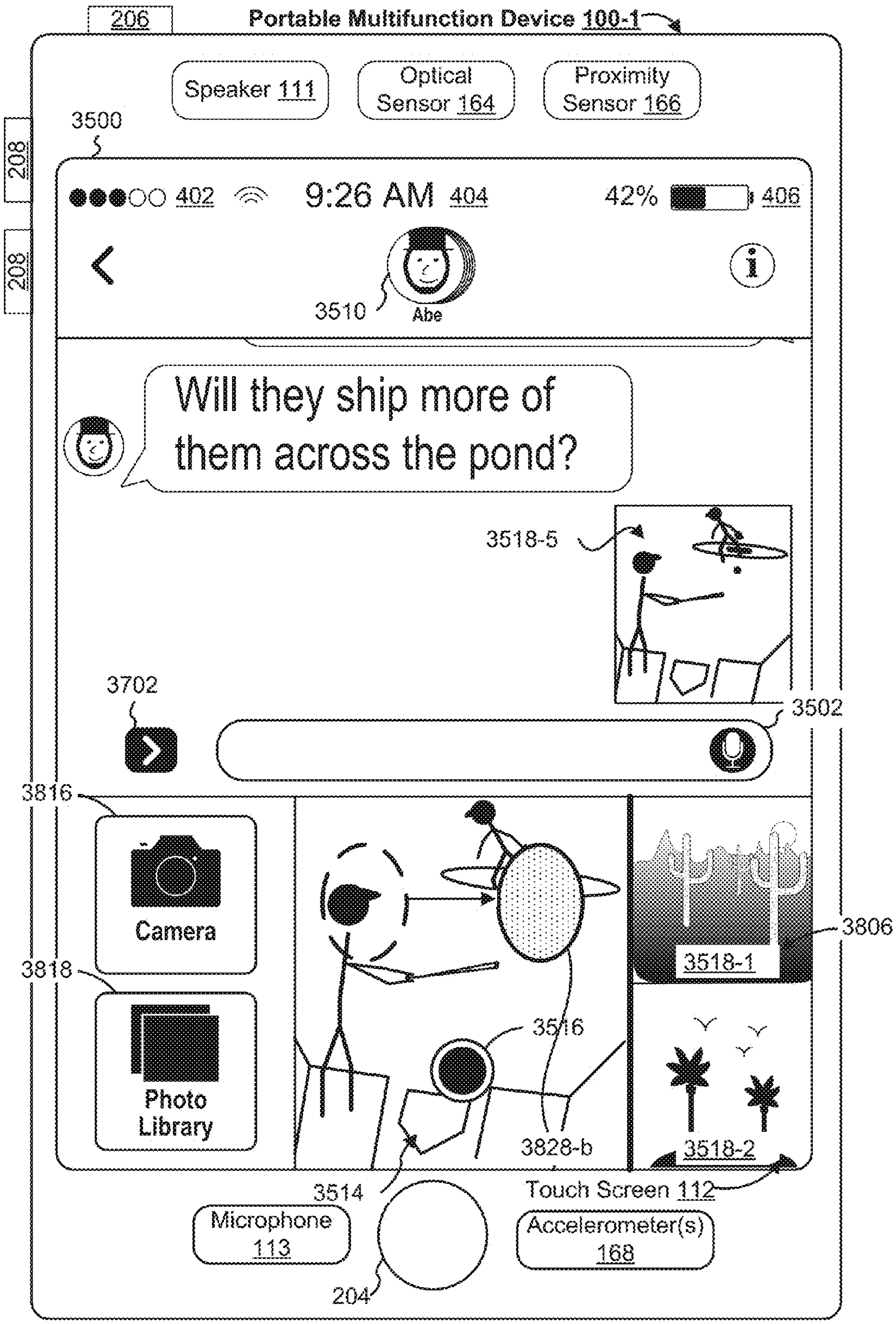
Figure 38O:
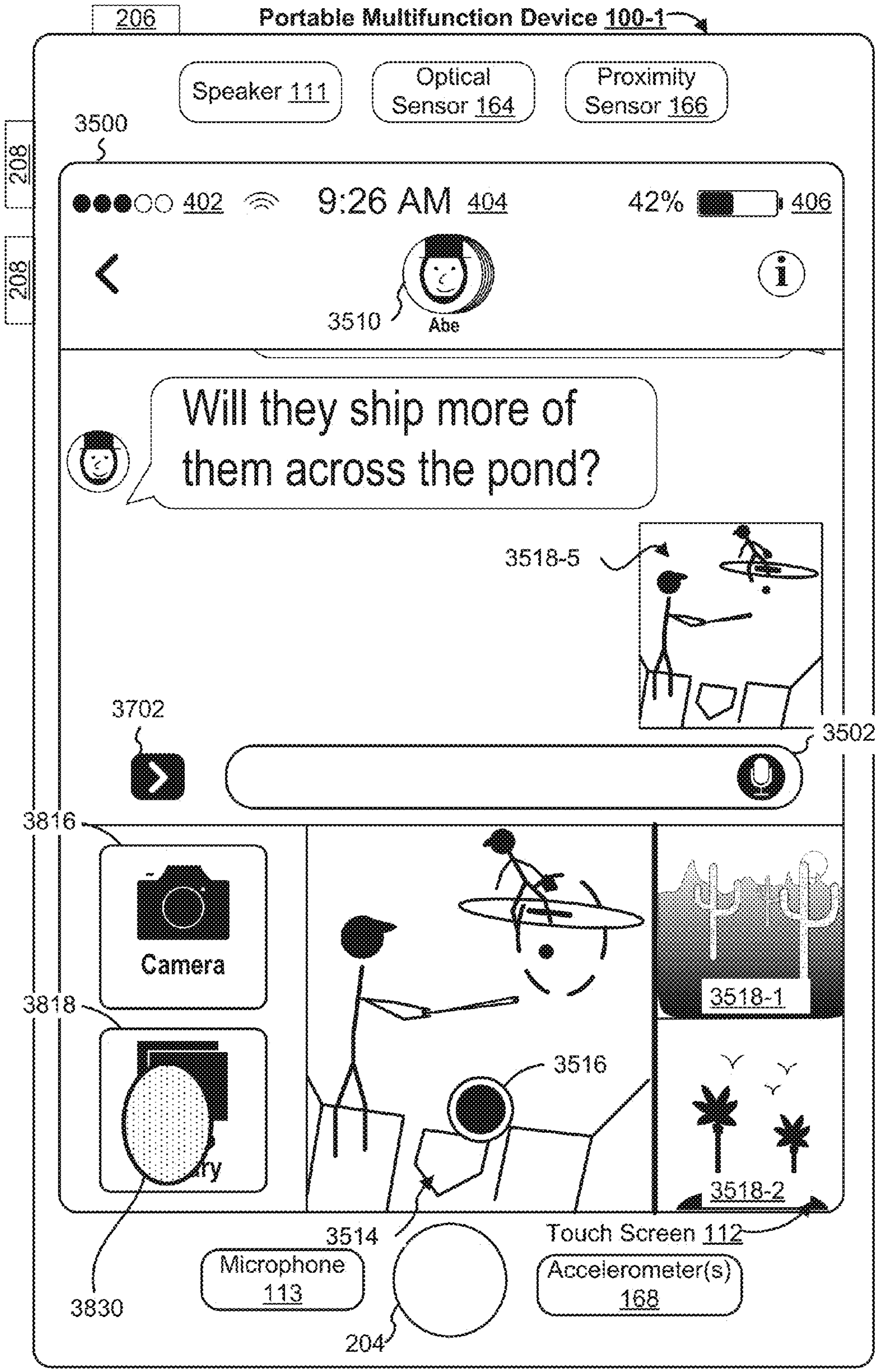
Figure 38P:
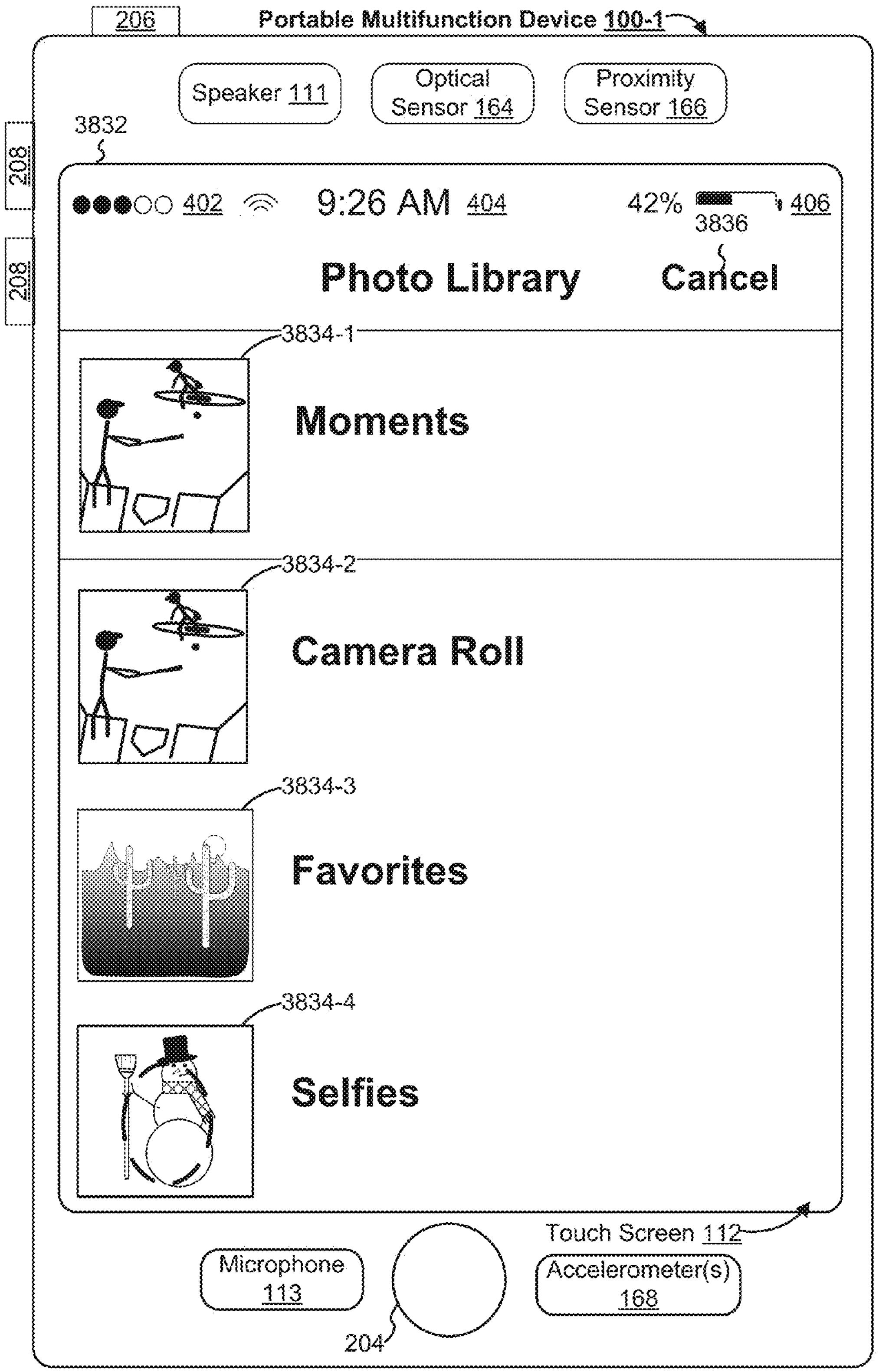
Figure 38Q:
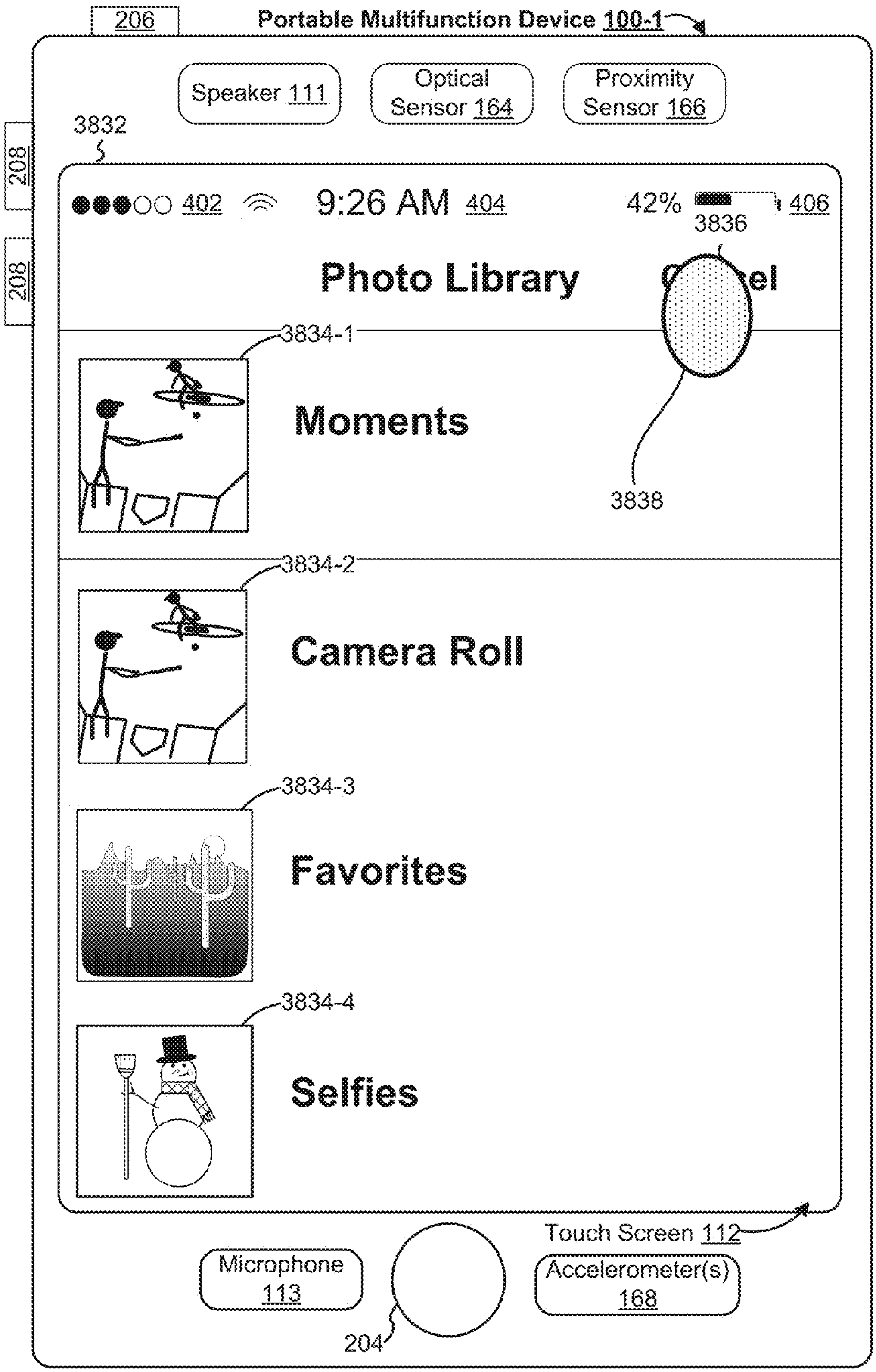
Figure 38R:
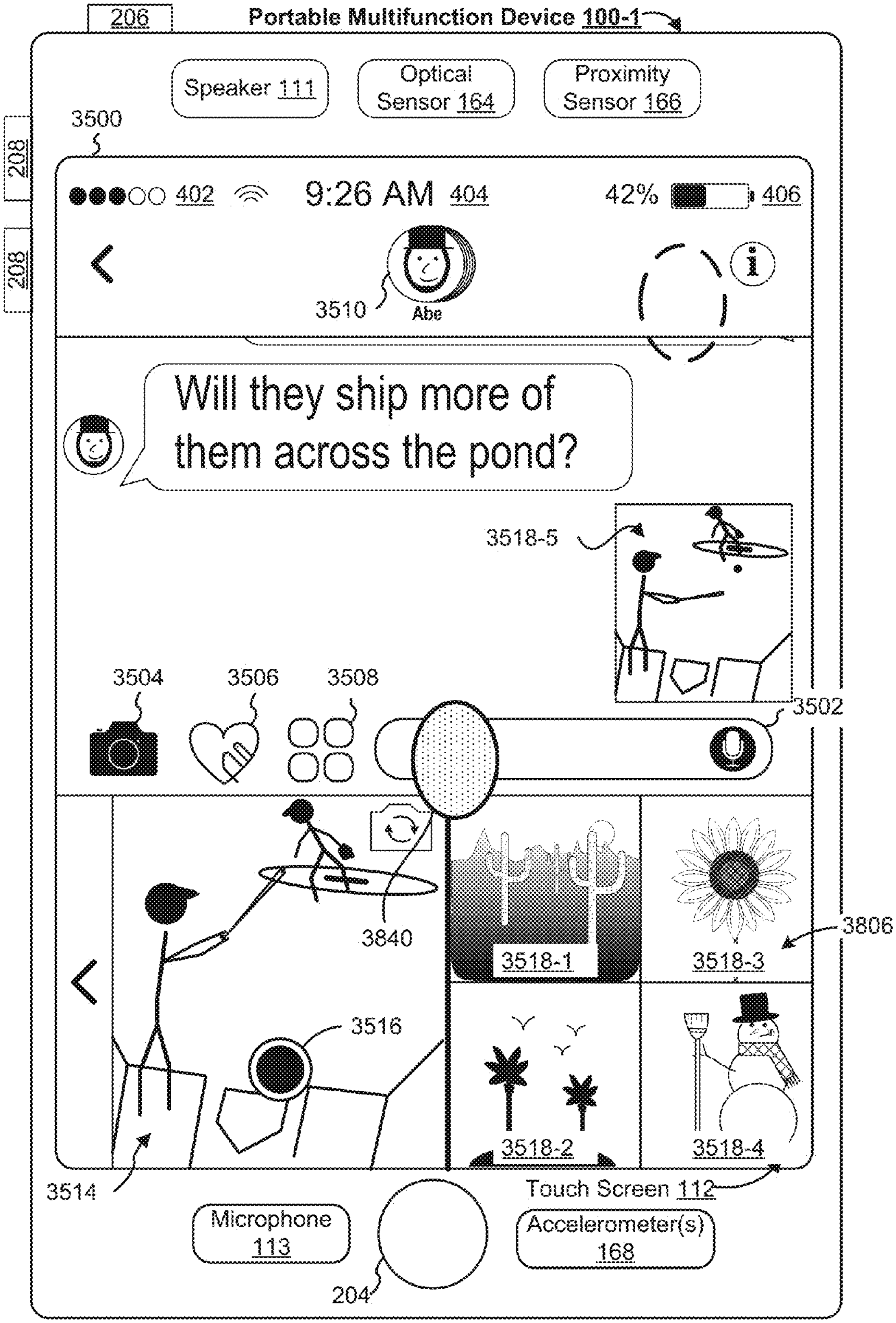
Figure 38S:
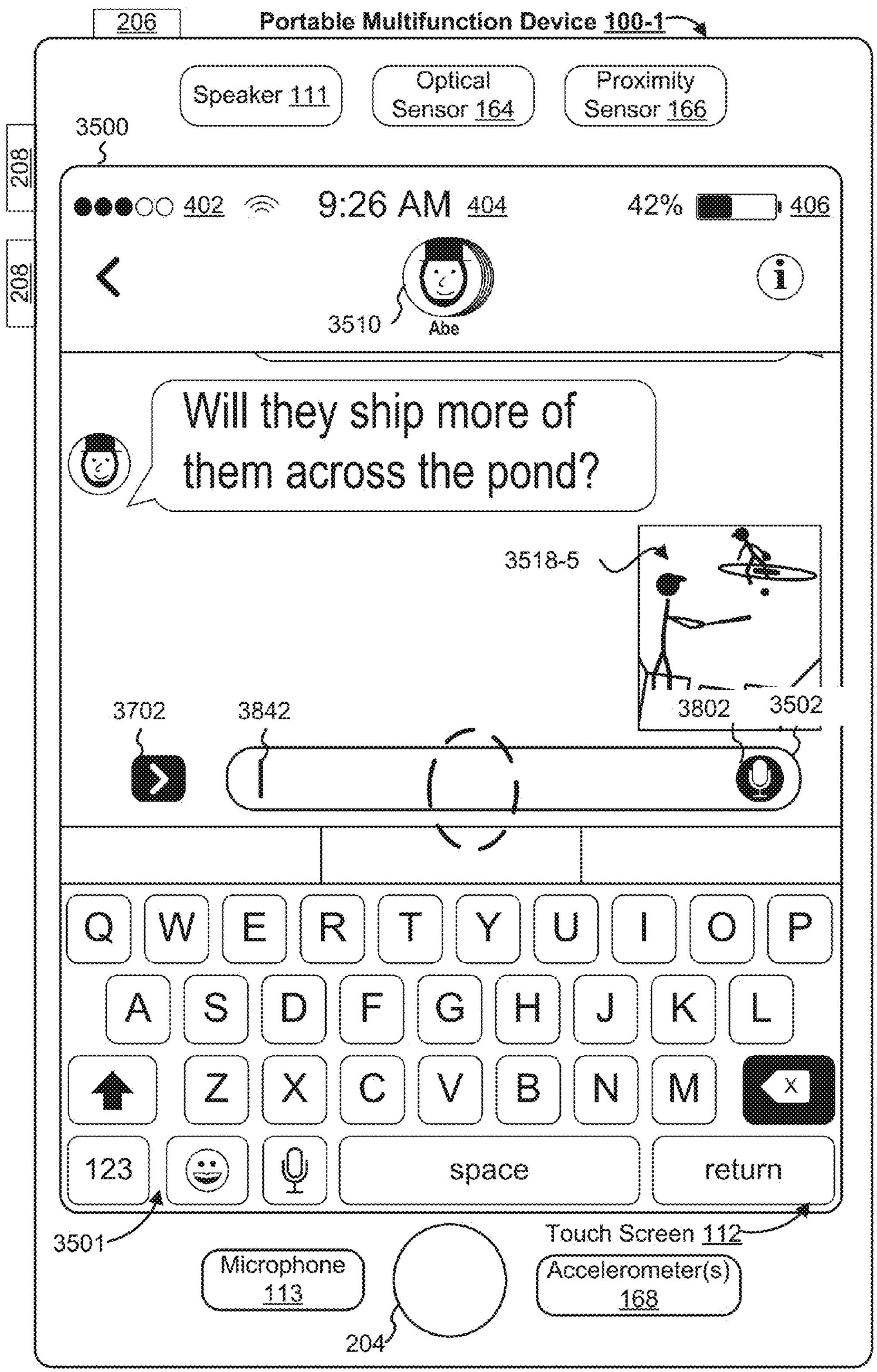
Figure 38T:
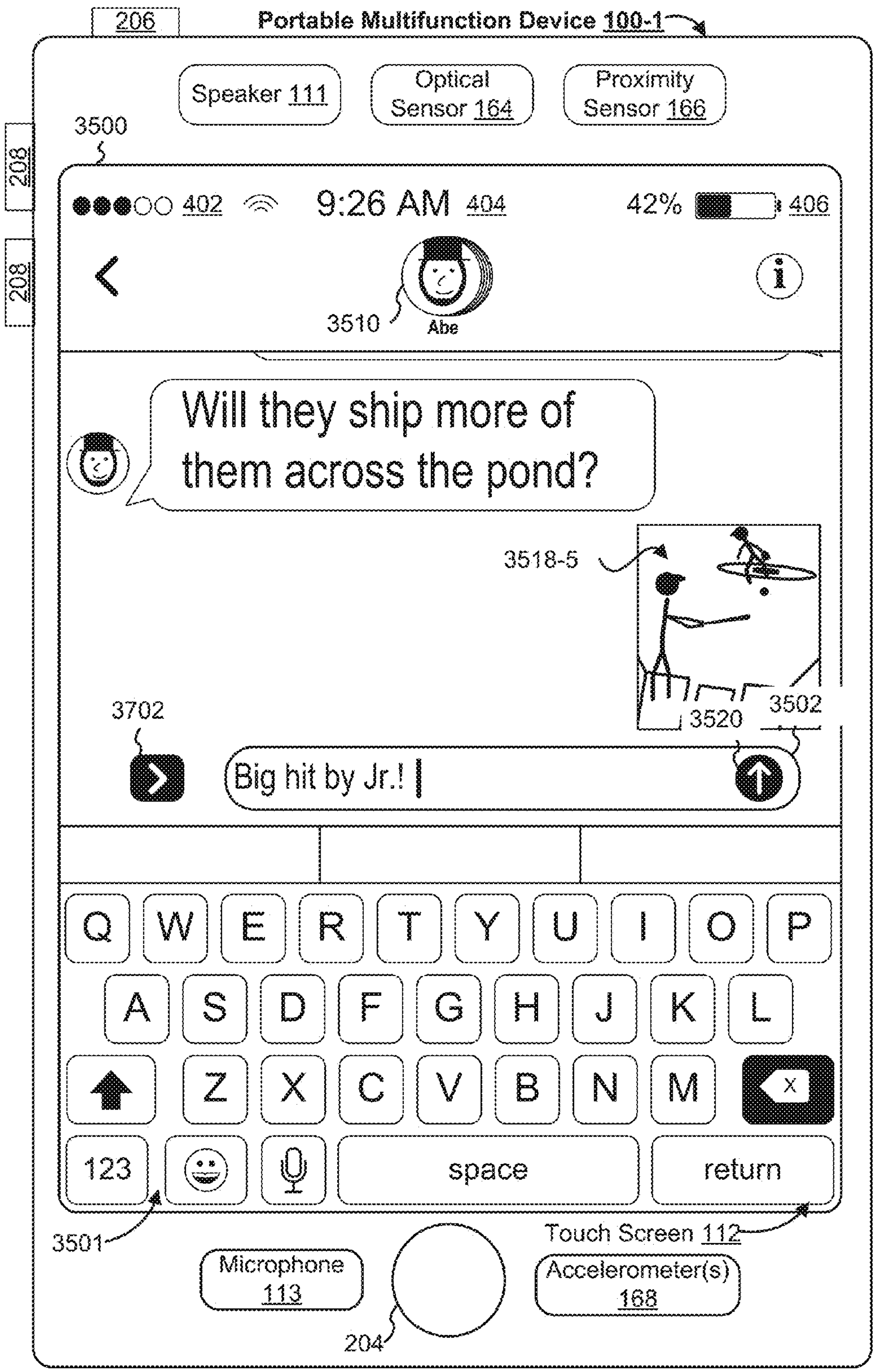
Figure 38U:
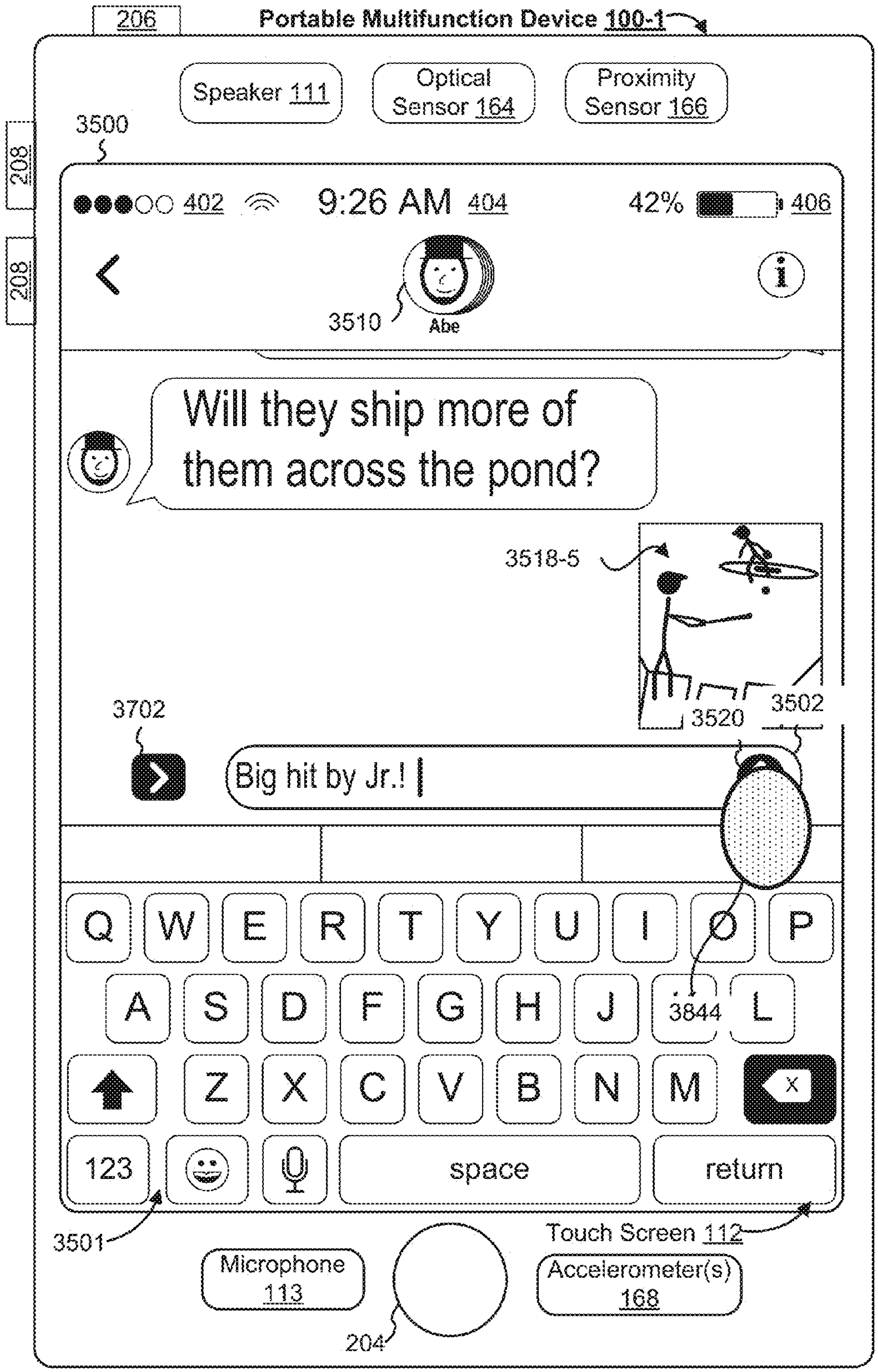
Figure 38V:
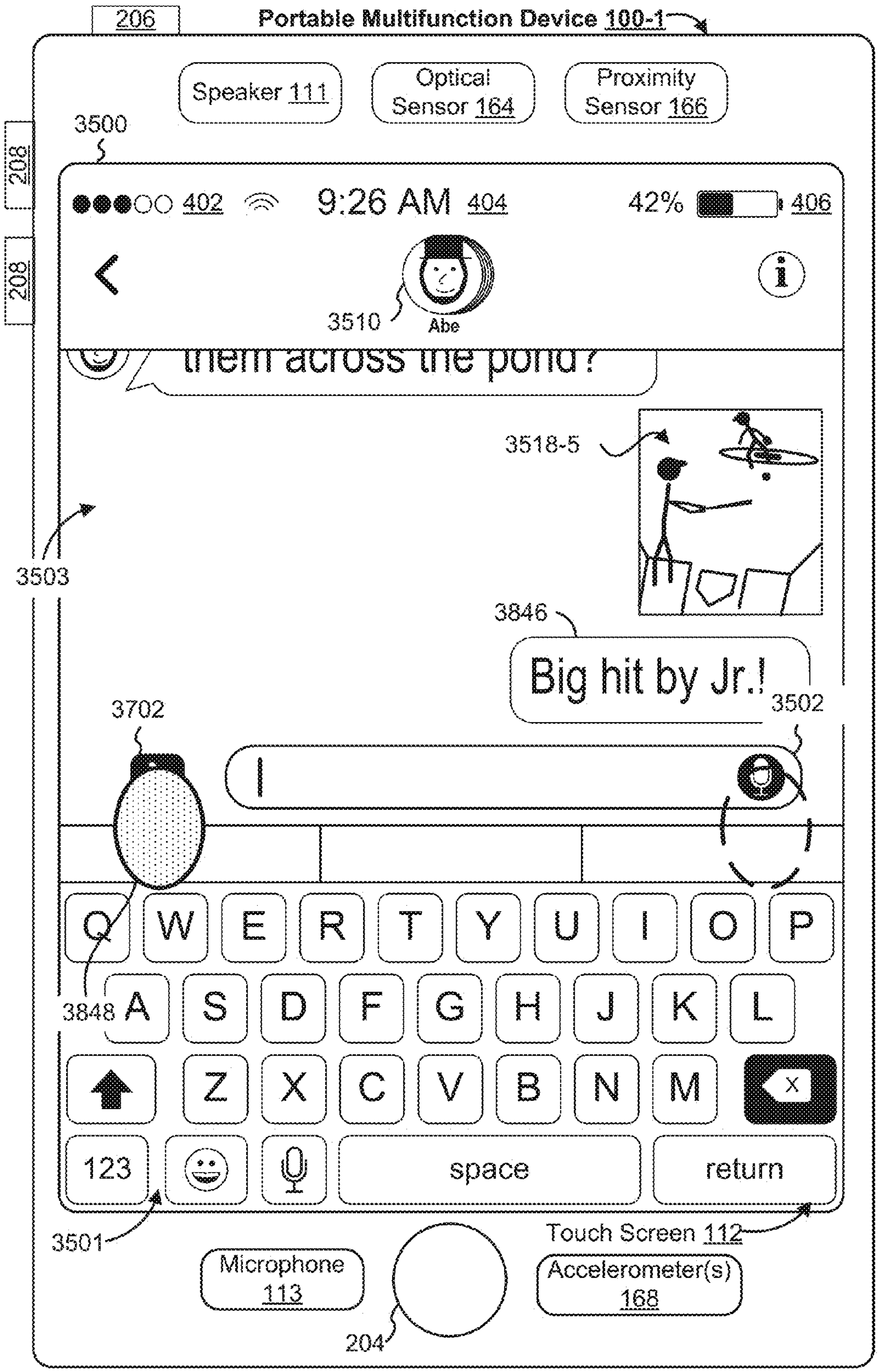
Figure 38W:
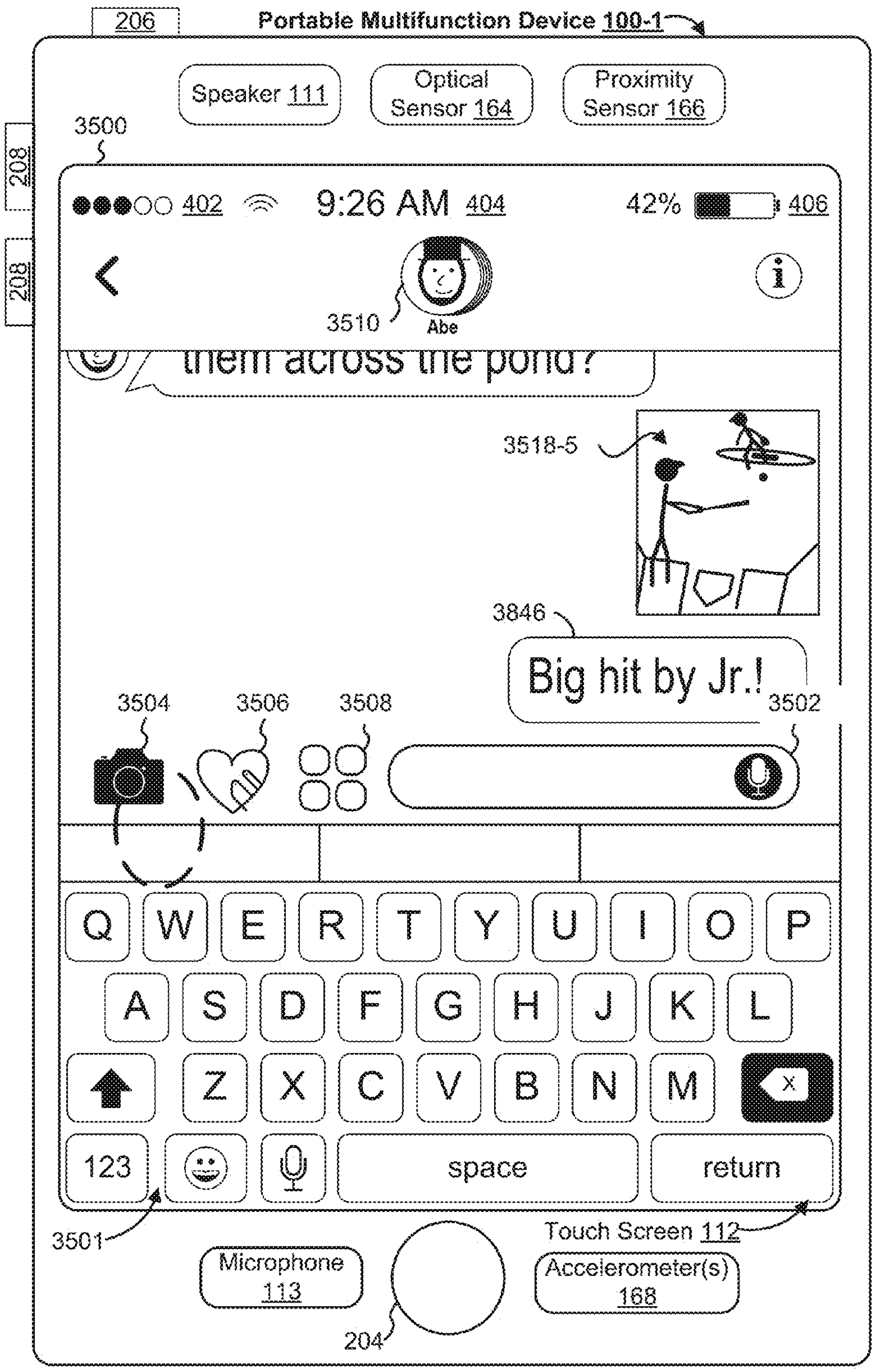
Figure 38X:
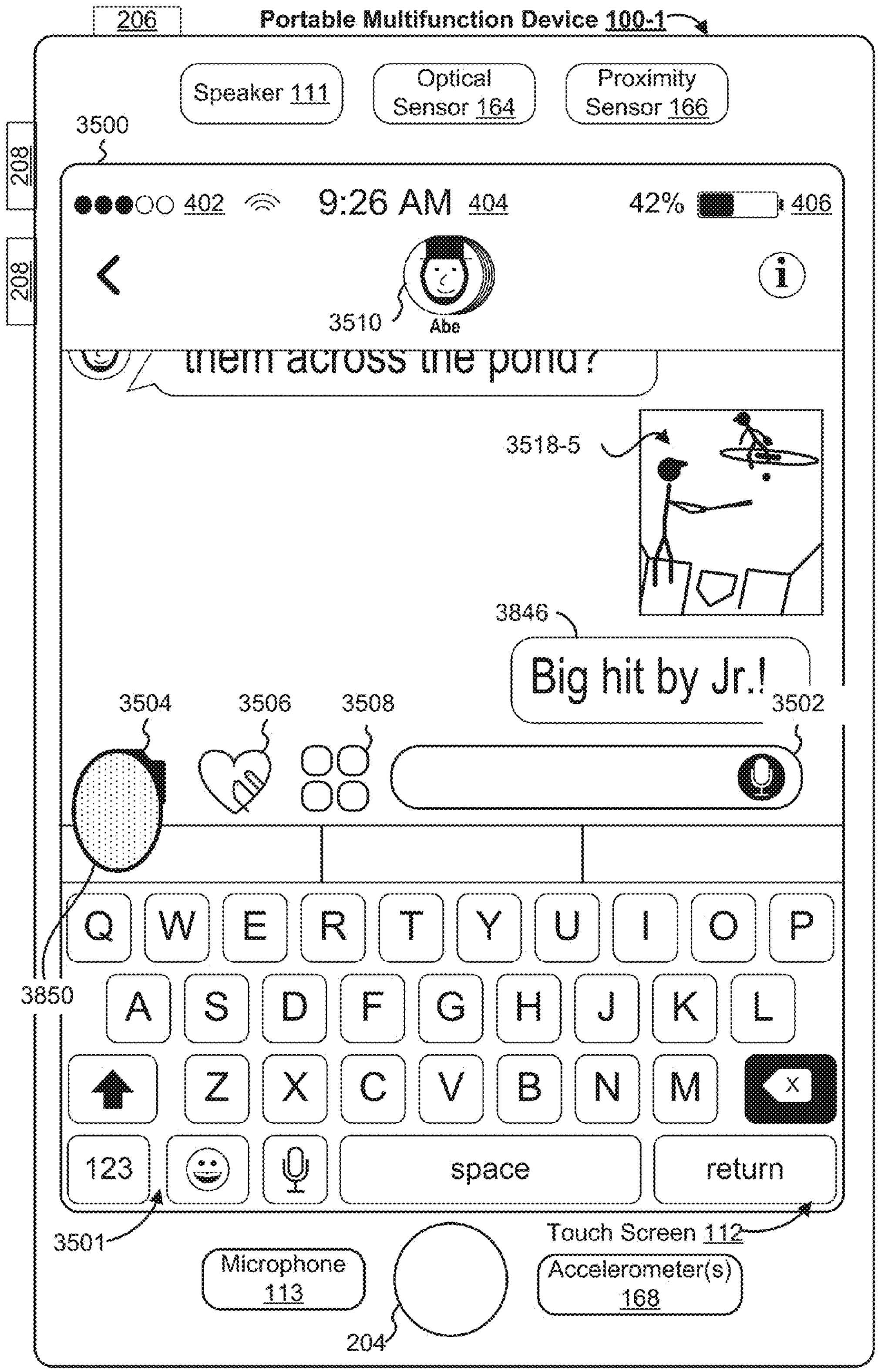
Figure 38Y:
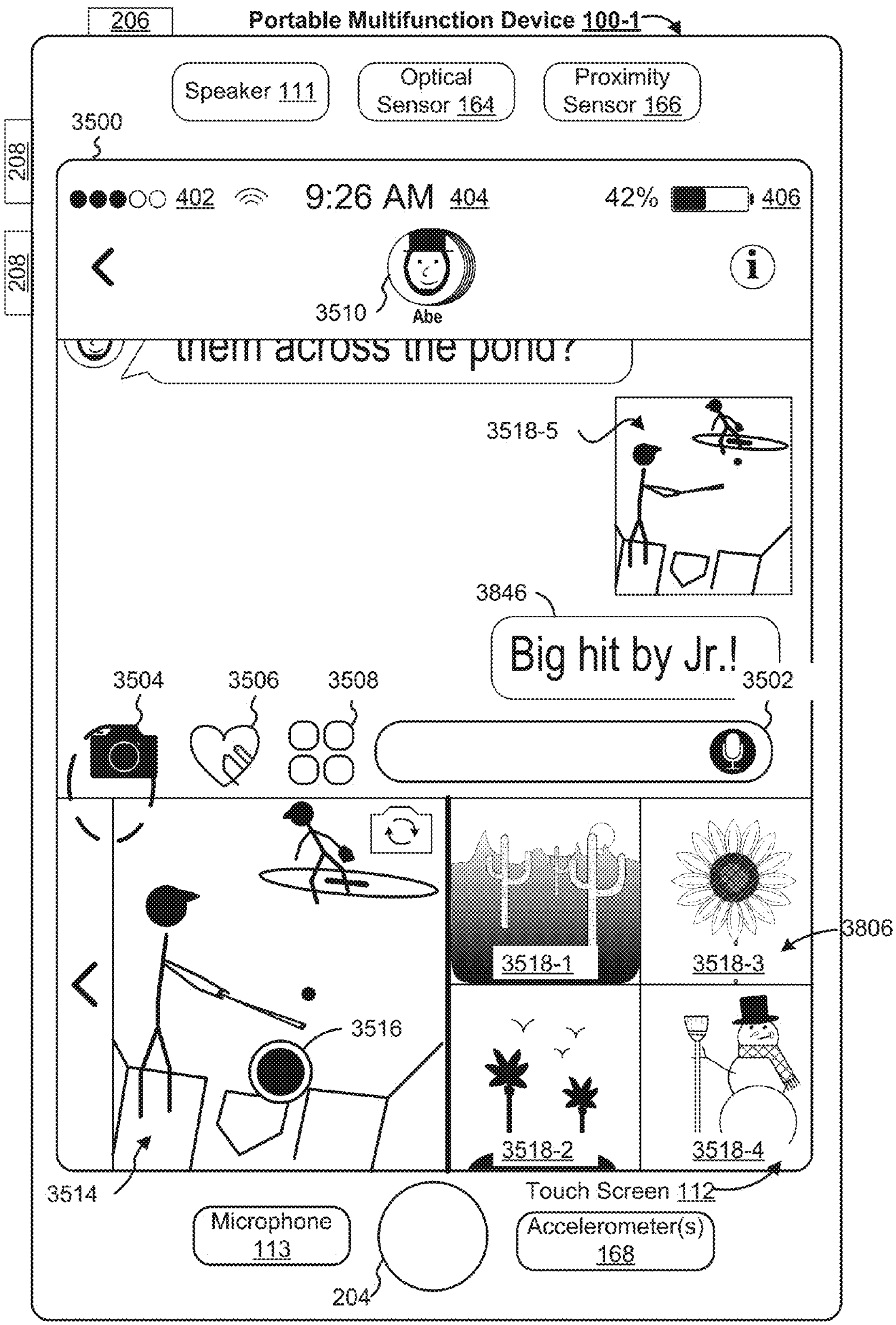

FIGS. 38A-38Y illustrate an exemplary embodiment where digital images and a digital camera are integrated into a messaging application. FIG. 38A illustrates user interface 3500 for a messaging application, including conversation transcript 3503, digital image affordance 3504, digital canvas affordance 3506, application affordance 3508, and message-input area 3502, including microphone affordance 3802 for receiving speech that is translated into text for posting to the messaging session associated with conversation transcript 3503. Device 100-1 detects a tap gesture, including contact 3804 in FIG. 38B, on digital camera affordance 3504 and, in response, displays digital image tray 3806 in FIG. 38C. Conversation transcript 3503 shrinks to accommodate digital image tray 3806. Digital image tray includes live preview image 3514 from an associated digital camera, including image capture affordance 3516 and camera switching affordance 3505 for switching the live preview image between two or more associated digital cameras, and previously captured digital images 3518.

FIGS. 38D-38G illustrate an exemplary embodiment where scrolling in opposite directions on the digital image tray causes display of different affordances. Device 100-1 detects a swipe gesture including movement 3810 of contact 3808 to the left, from position 3808-*a* in FIG. 38D to position 3808-*b* in FIG. 38E. In response, the device moves digital image tray 3806 to the left, in accordance with movement 3810, creating the appearance that live preview image 3514 slides off of the left side of touch screen 112 and additional digital images 3518-6 and 3518-7 slide onto the display from the right side of touch screen 112, in FIG. 38E.

The device then detects a swipe gesture including movement 3814 of contact 3812 to the right, from position 3812-*a* in FIG. 38F to position 3812-*b* in FIG. 38G. In response, the device moves digital image tray 3806 to the right, in accordance with movement 3814, creating the appearance that digital images 3518-3, 3518-4, 3518-6, and 3518-7 slide off of the right side of touch screen 112 and revealing full-screen camera affordance 3816 and photo library affordance 3818 from the left side of touch screen 112 in FIG. 38G.

FIGS. 38H-38M illustrate an exemplary embodiment where a digital image is captured and posted to the messaging session by accessing a full-screen camera live preview image from the messaging application user interface. Device 100-1 detects a tap gesture, including contact 3820 in FIG. 38H, on full-screen camera affordance 3816 and, in response, displays digital camera user interface 3822 in FIG. 38I. Digital camera user interface 3822 includes a full-screen display of live preview image 3514 and image capture affordance 2822. The device then detects a tap gesture including contact 3824 on image capture affordance 3822 in FIG. 38J. In response, device 100 captures live preview image 3514, creating digital image 3518-5, and places the image in message-input area 3502, which expands to accommodate the image in FIG. 38K. The device then detects a tap gesture including contact 3826 on message-content posting affordance 3520 in FIG. 38L. In response, device 100 posts captured digital image 3518-5 to the messaging session, displaying the image in conversation transcript 3503 in FIG. 38M.

FIGS. 38N-38R illustrate an exemplary embodiment where a digital image stored in a photo library is accessed and posted to the messaging session from the messaging application user interface. Full-screen camera affordance 3816 and photo library affordance 3818 are revealed in digital image tray 3806, from the left side of touch screen 112, in response to detecting a swipe gesture, including movement of contact 3828 to the right in FIG. 38N. Device 100-1 then detects a tap gesture, including contact 3830 in FIG. 38O, on photo library affordance 3818 and, in response, displays photo library user interface 3832, in FIG. 38P. Photo library user interface 3832 includes affordances 3834 for accessing digital image collections, from which a digital image can be posted to the messaging session. The device detects a tap gesture, including contact 3838 on canceling affordance 3836, causing the device to return to display of messaging user interface 3500, in FIG. 38R, without posting a previously captured digital image to the messaging session.

FIGS. 38R to 38Y illustrate exemplary embodiments where display of a digital keyboard replaces display of a photo tray, and vis versa. While displaying photo tray 3806, device 100-1 detects a tap gesture on message-input area 3502, including contact 3840 in FIG. 38R. In response, the device replaces photo tray 3806 with digital keyboard 3501 in FIG. 38S. Responsive to the tap gesture, the device also expands message-input area 3502, displaying text cursor 3842 therein, and collapses digital image affordance 3504, digital canvas affordance 3506, and application affordance 3508 into application expansion affordance 3702 in FIG. 38S.

The device detects input of a message, displayed within message-input area 3502 in FIG. 38T. Responsive to input of the message, microphone affordance 3802 is replaced by message-content posting affordance 3520 in FIG. 38T. Responsive to detecting a tap gesture, including contact 3844 in FIG. 38U, on message-content posting affordance 3520, the device posts the message to the messaging session, displaying message 3846 in conversation transcript 3503, in FIG. 38V. The device then displays the three activatable affordances—digital image affordance 3504, digital canvas affordance 3506, and application affordance 3508—in FIG. 38W in response to detection of a tap gesture, including contact 3848 in FIG. 38V, on application expansion affordance 3702. Responsive to detecting a tap gesture, including contact 3850 in FIG. 38X, on digital image affordance 3504, the device replaces digital keyboard 3501 with digital image tray 3806, in FIG. 38Y.

Figure 38Z:
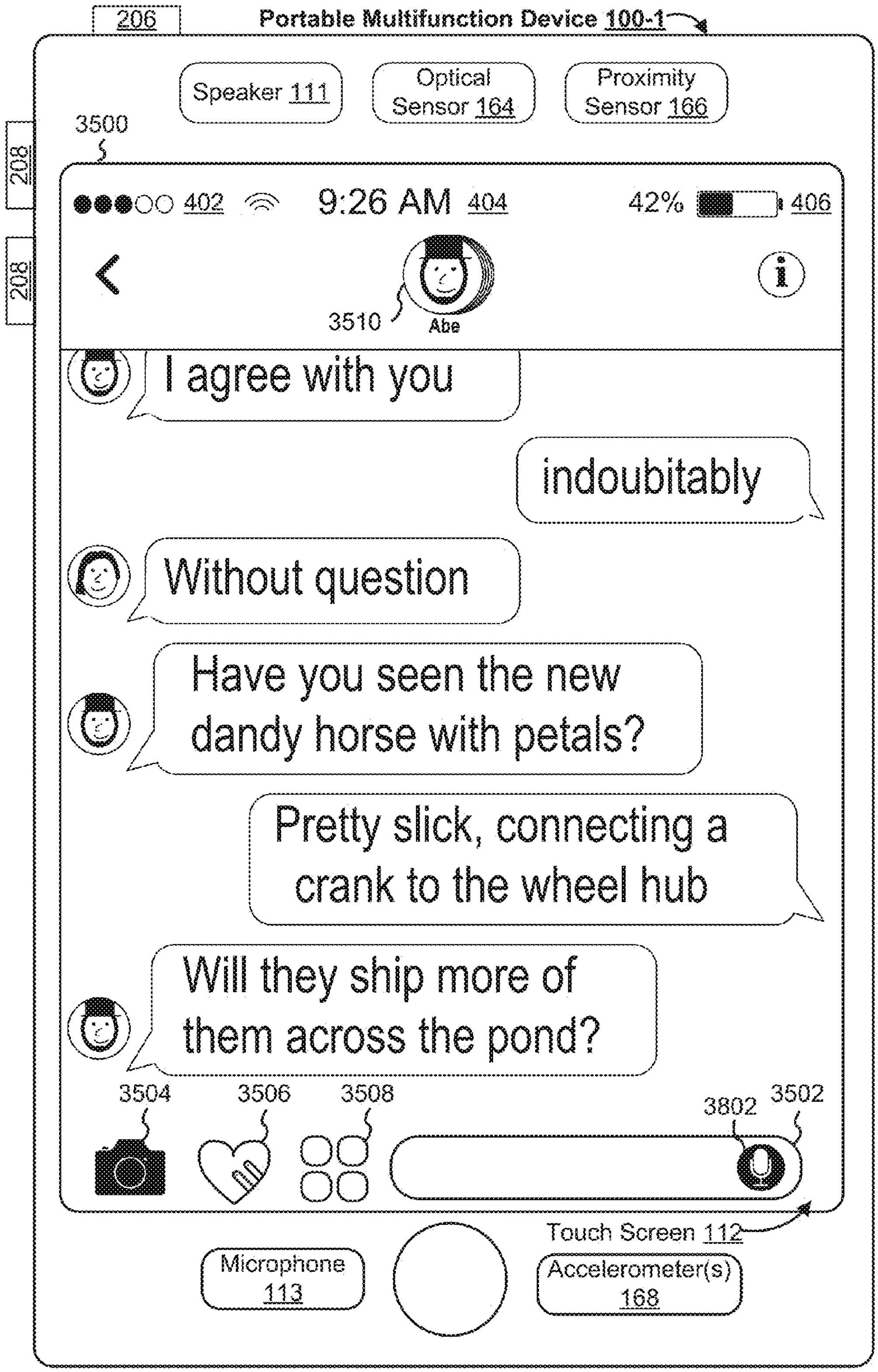
Figure 38A:
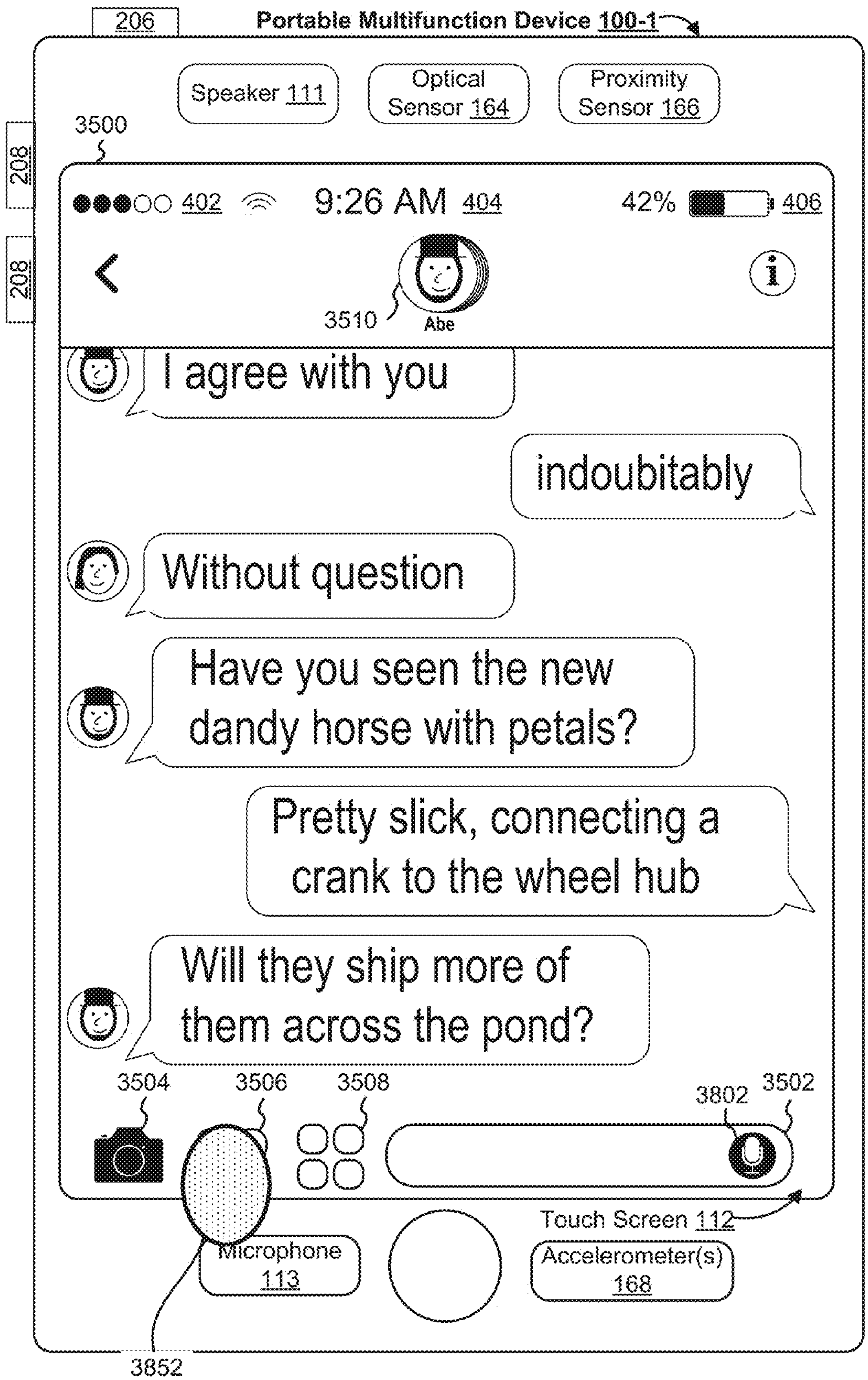
Figure 38A:
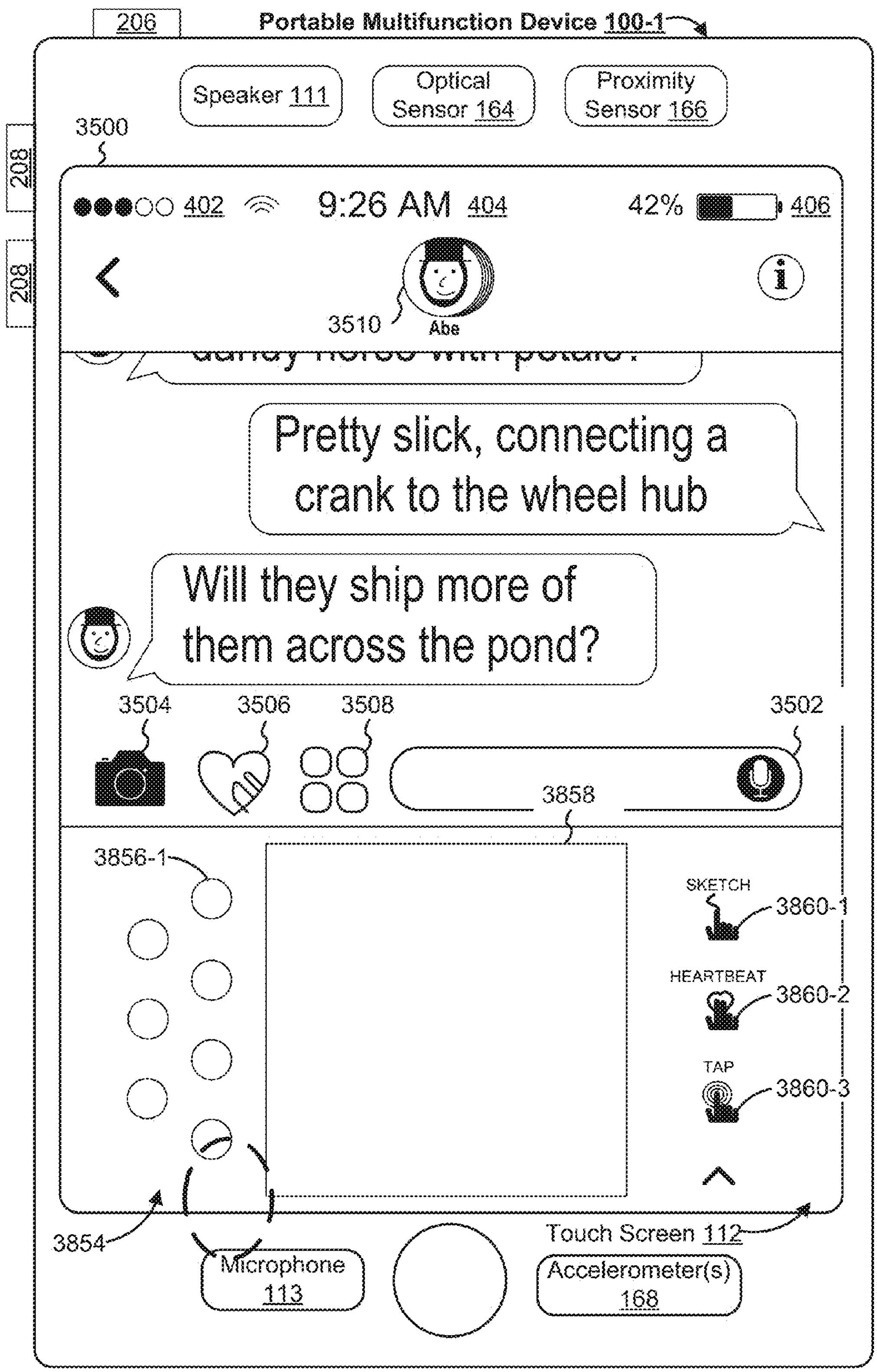
Figure 38A:
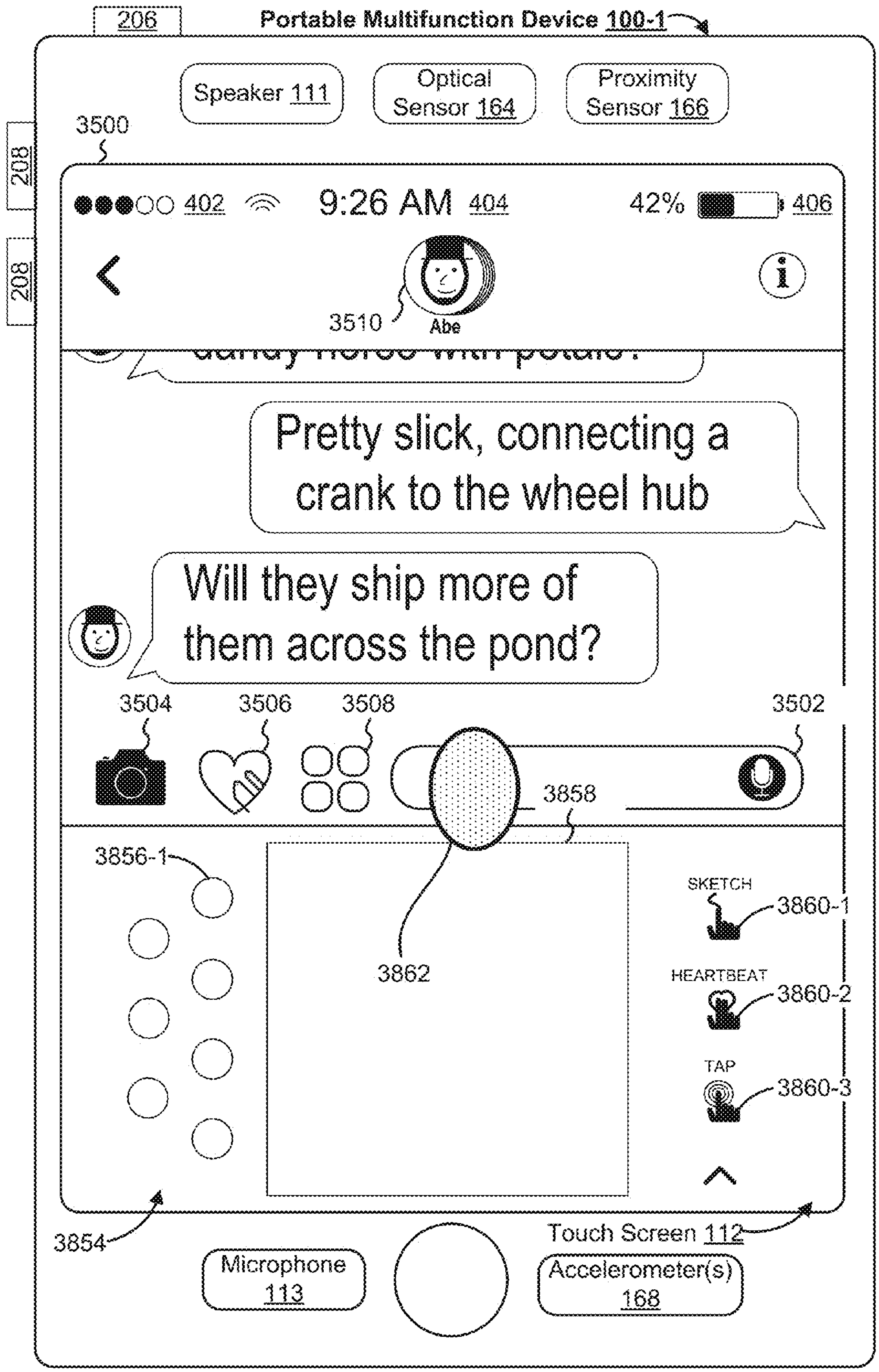
Figure 38A:
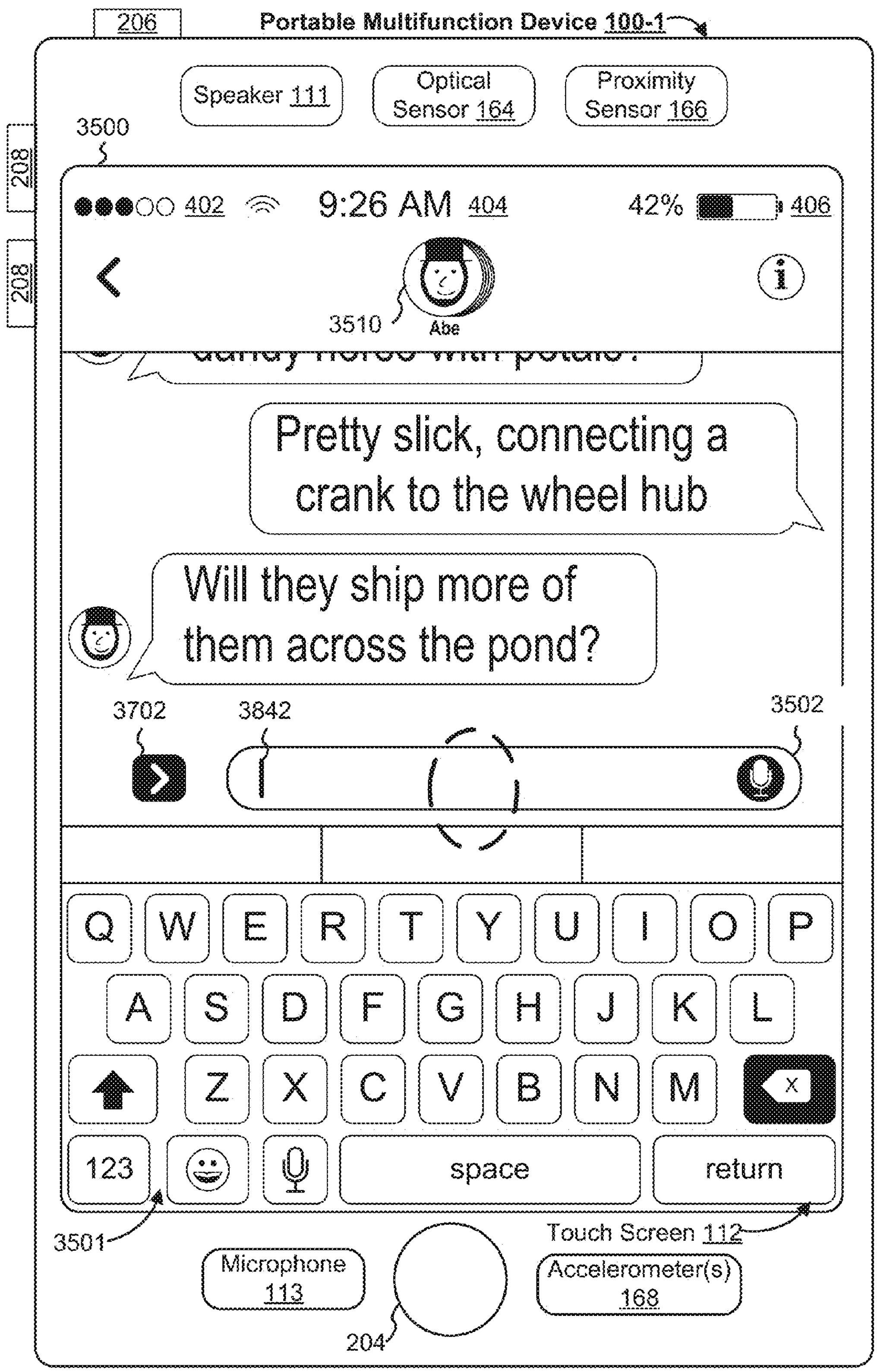
Figure 38A:
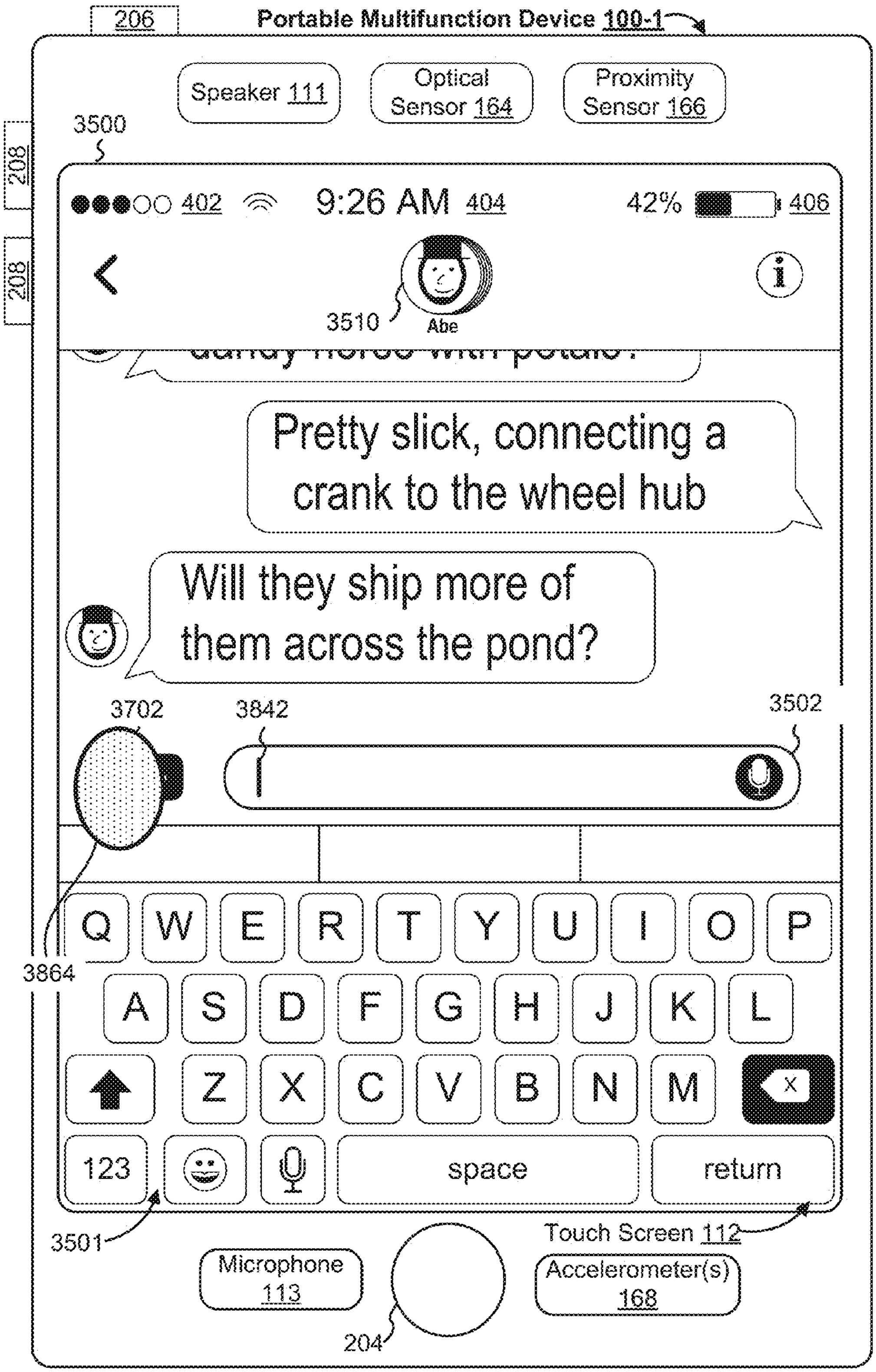
Figure 38A:
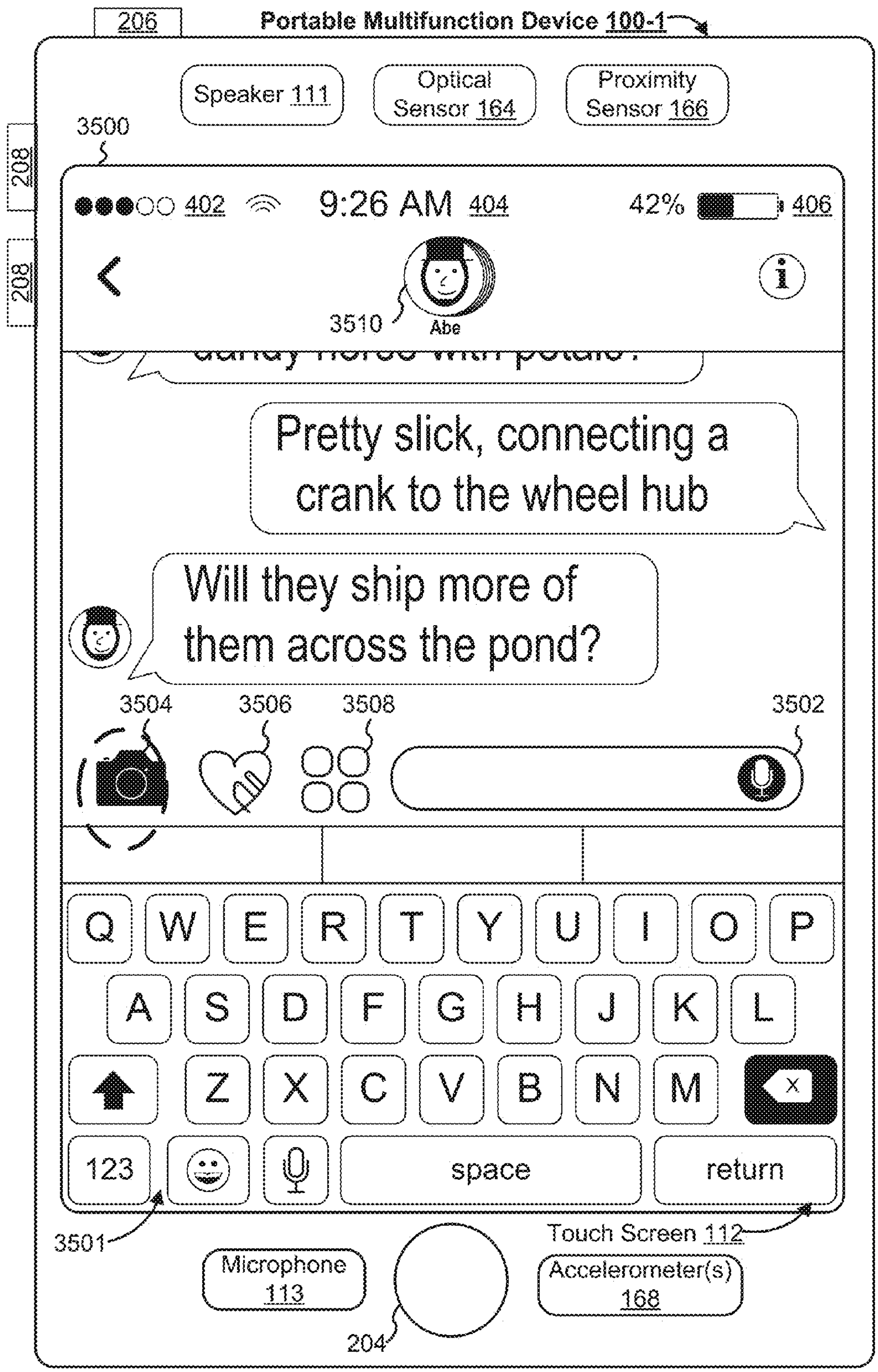
Figure 38A:
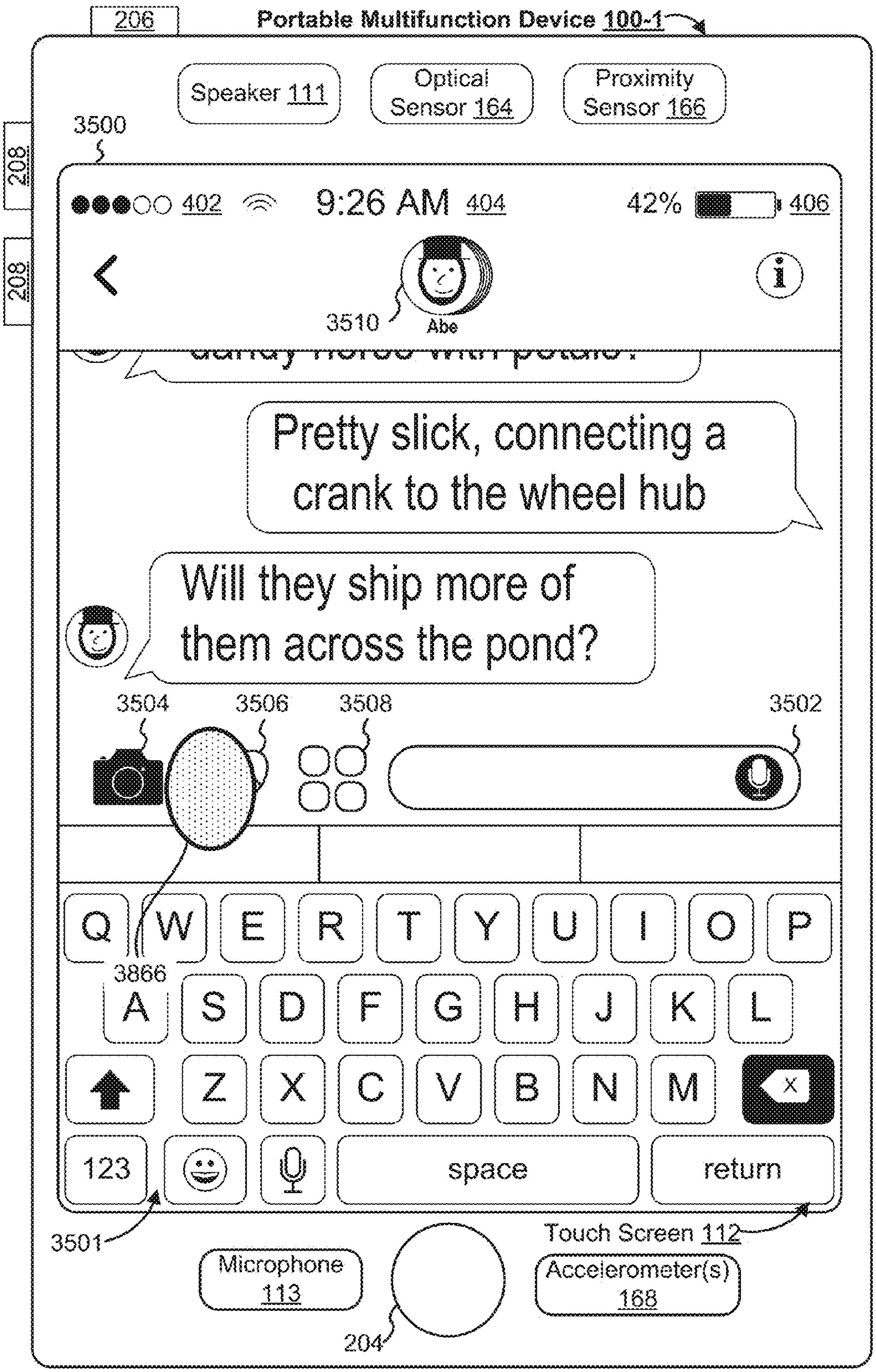
Figure 38A:
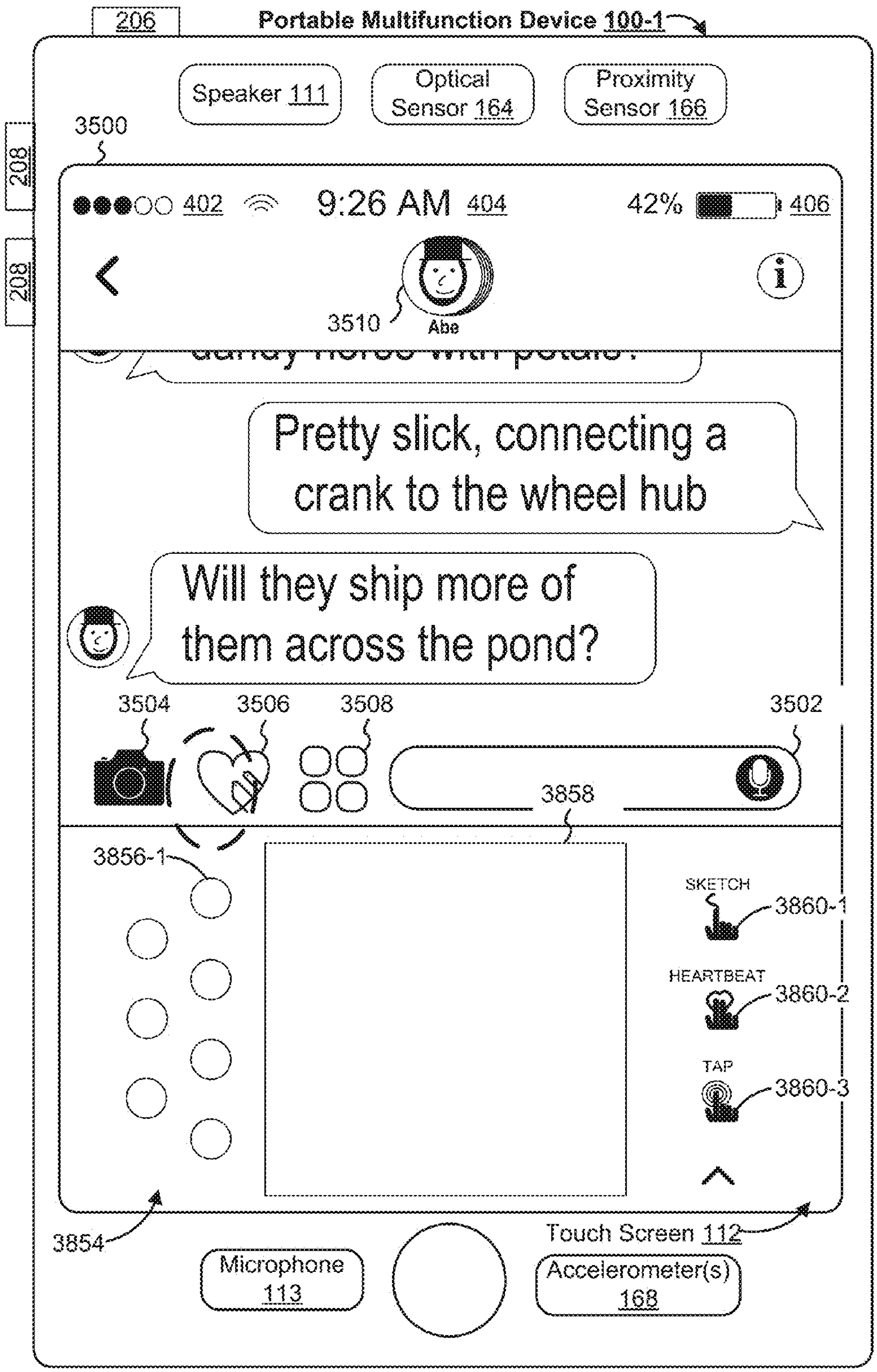
Figure 38A:
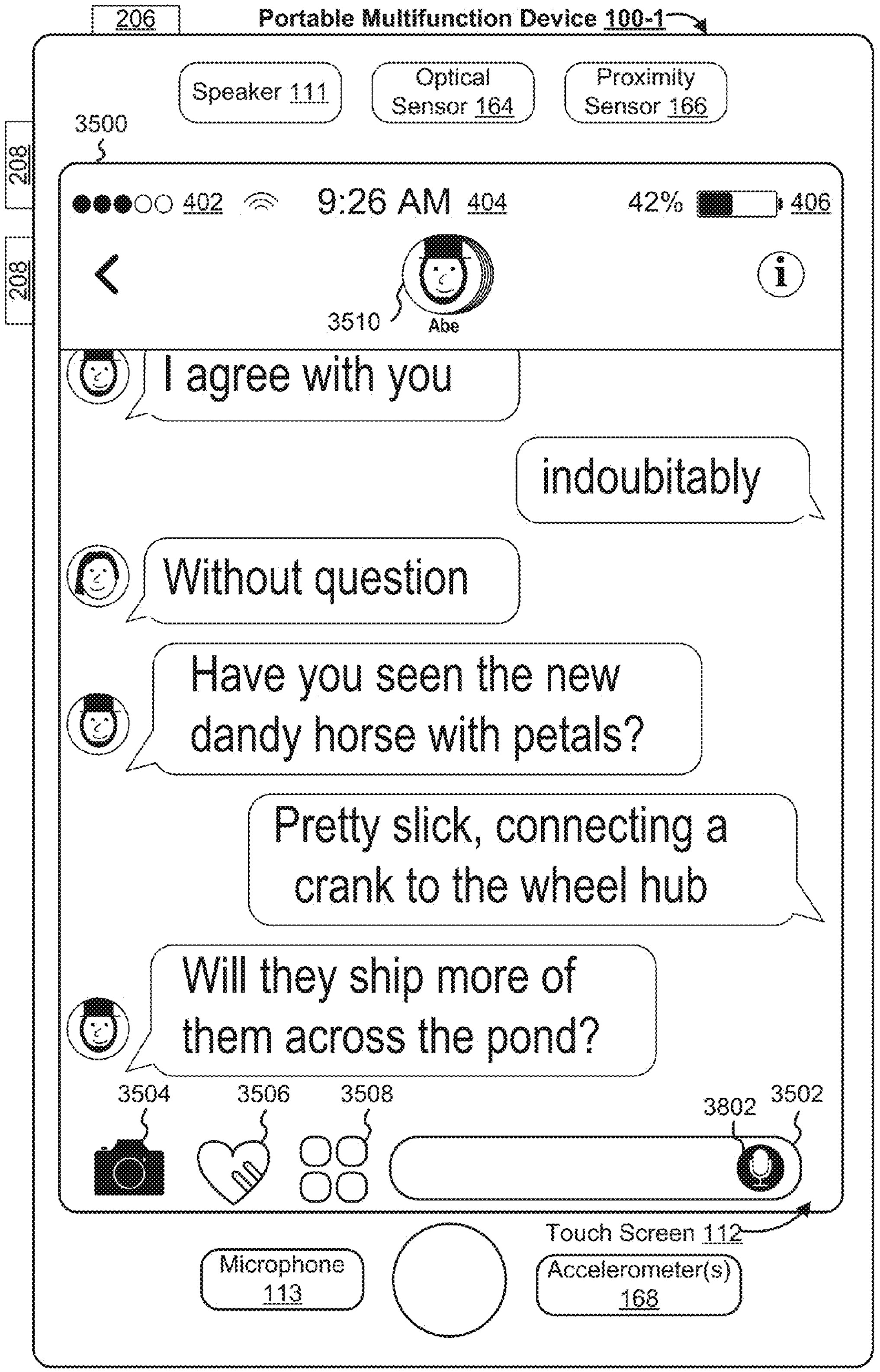
Figure 38A:
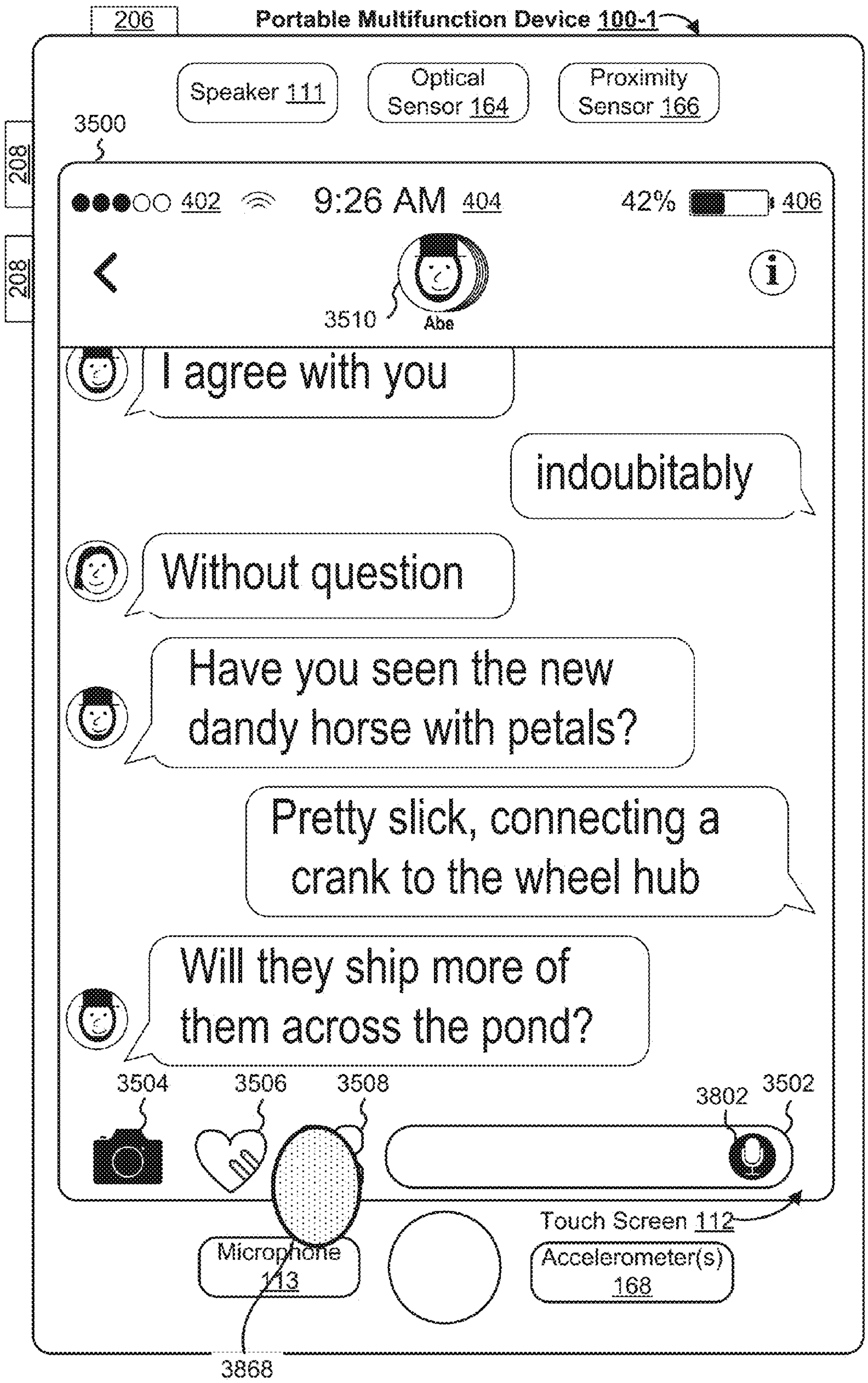
Figure 38A:
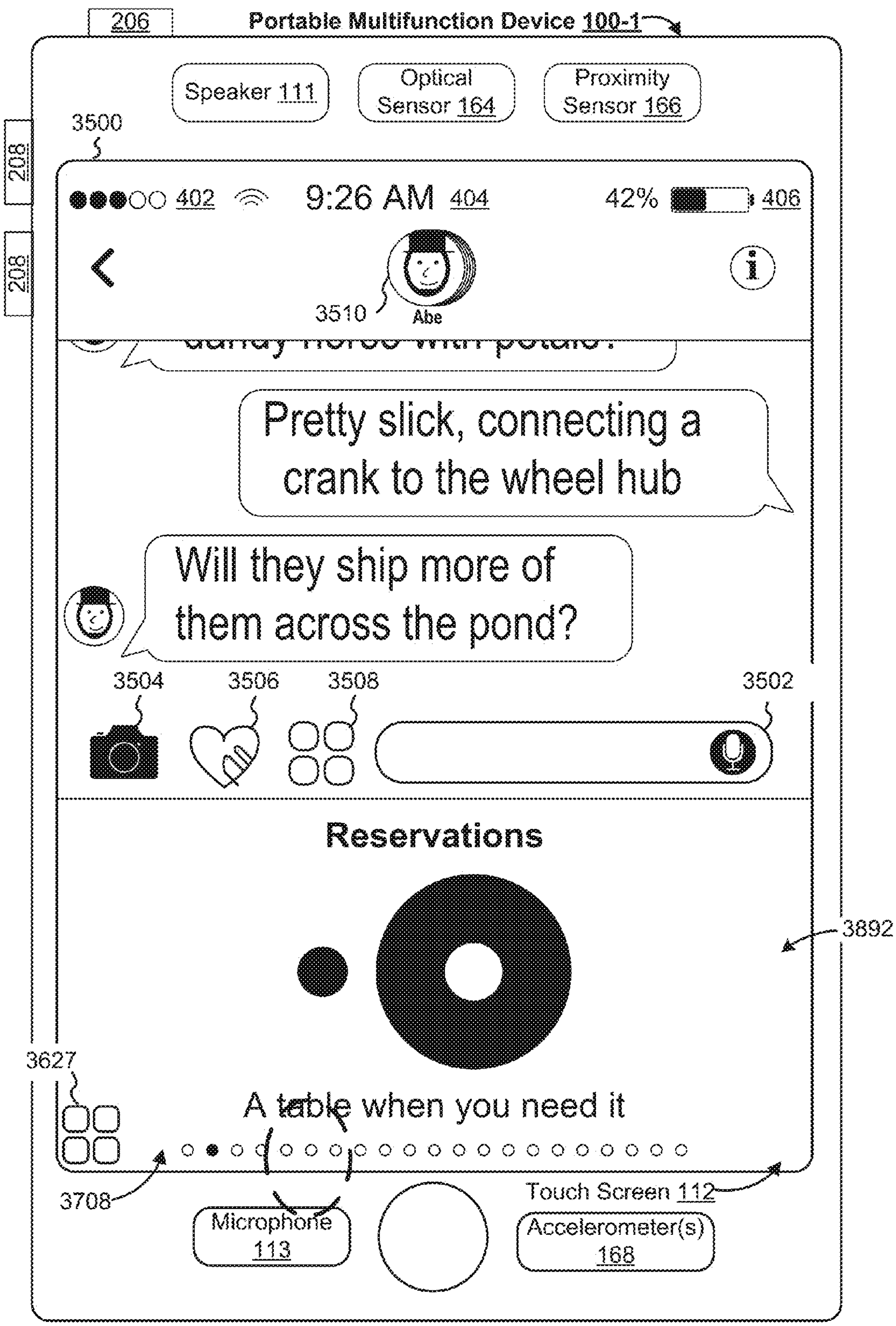
Figure 38A:
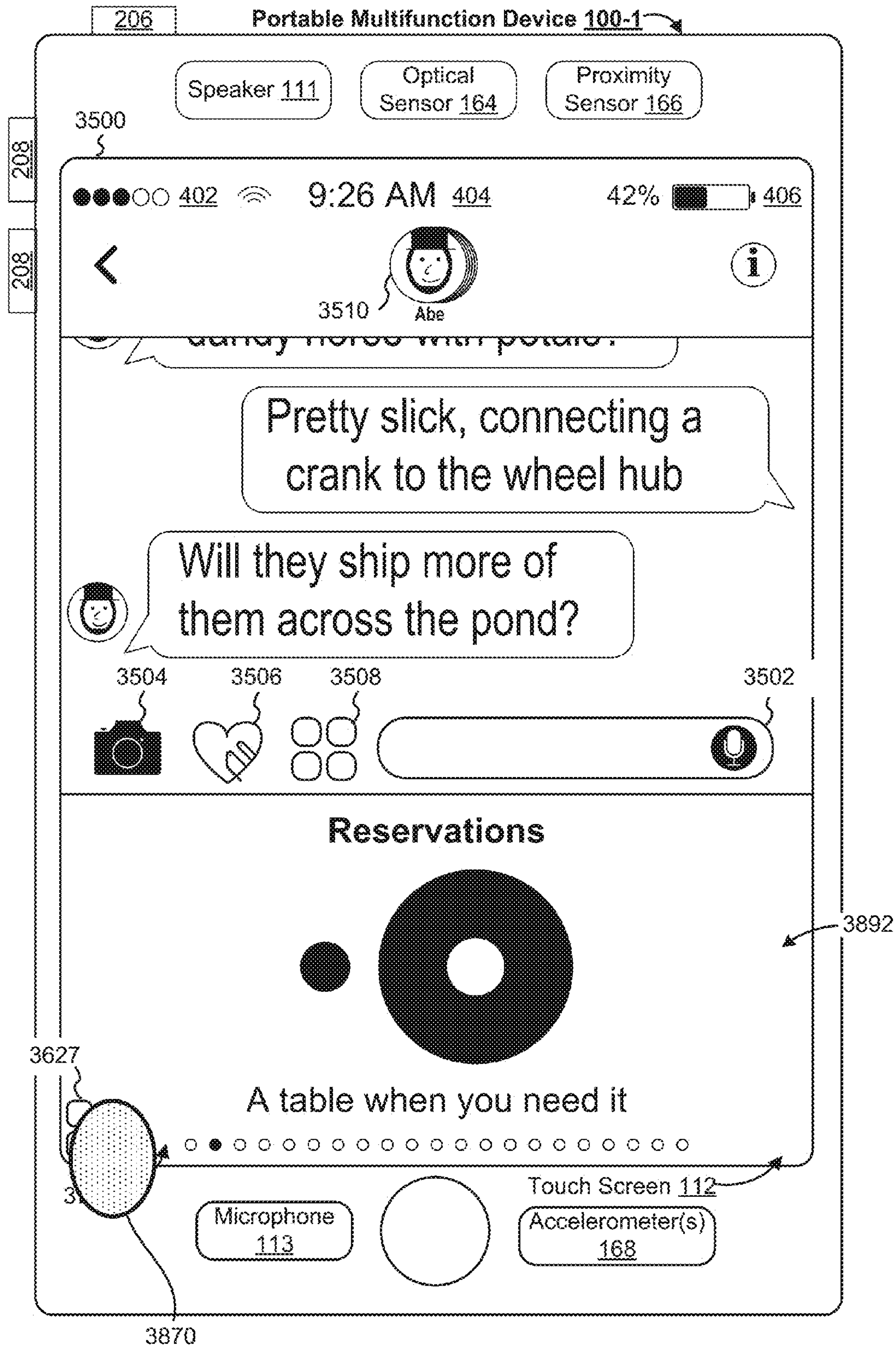
Figure 38A:
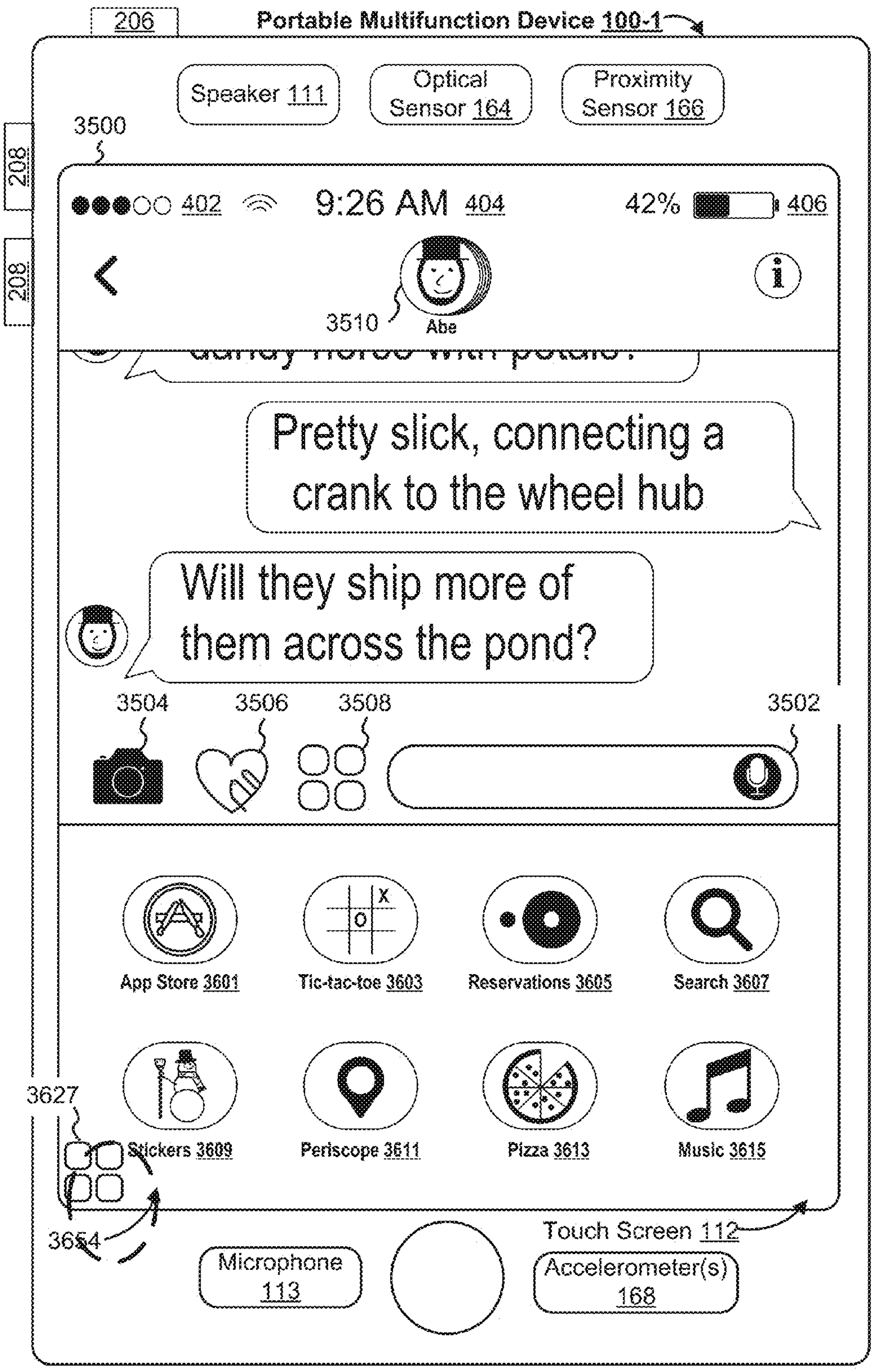
Figure 38A:
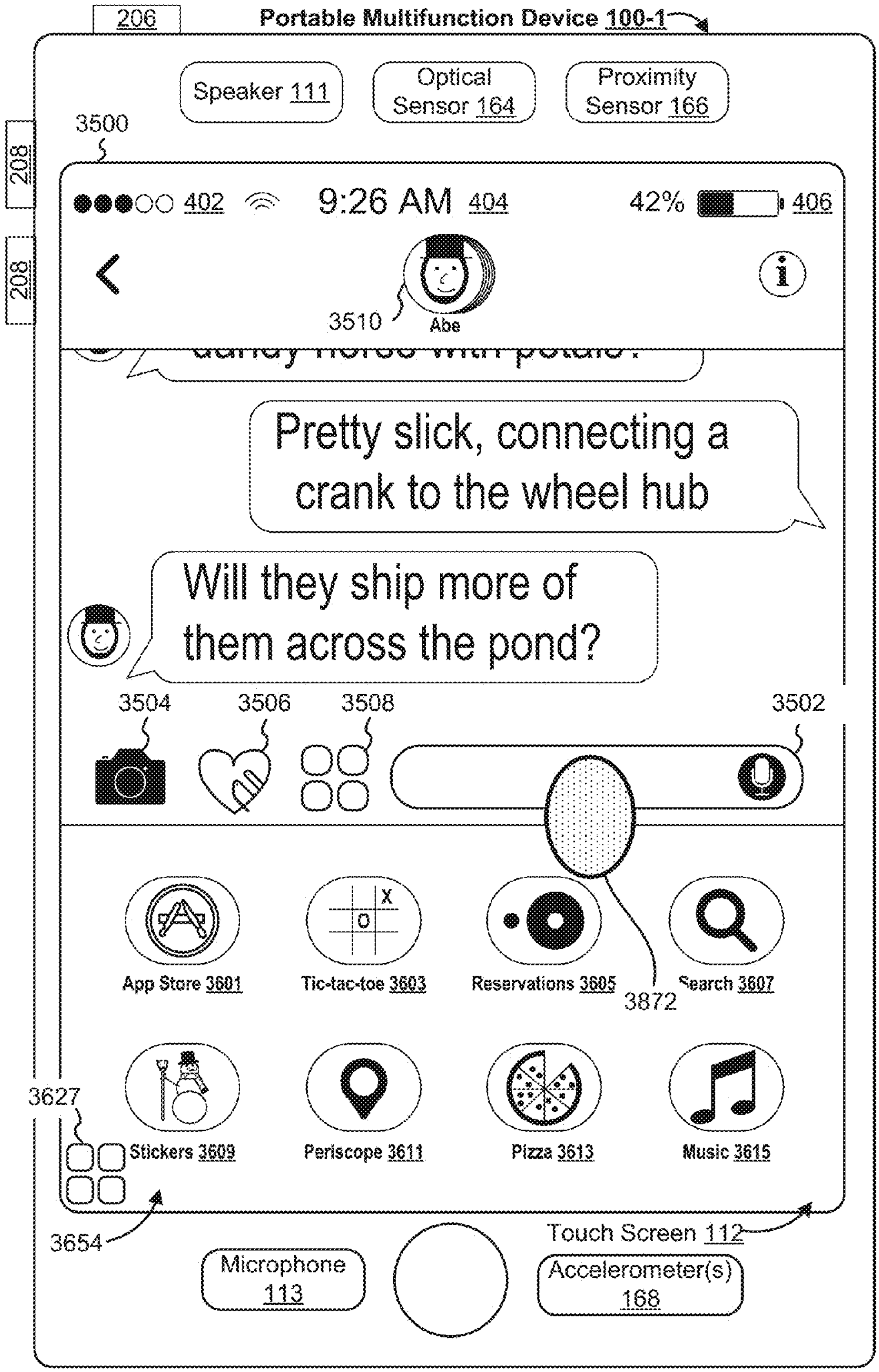
Figure 38A:
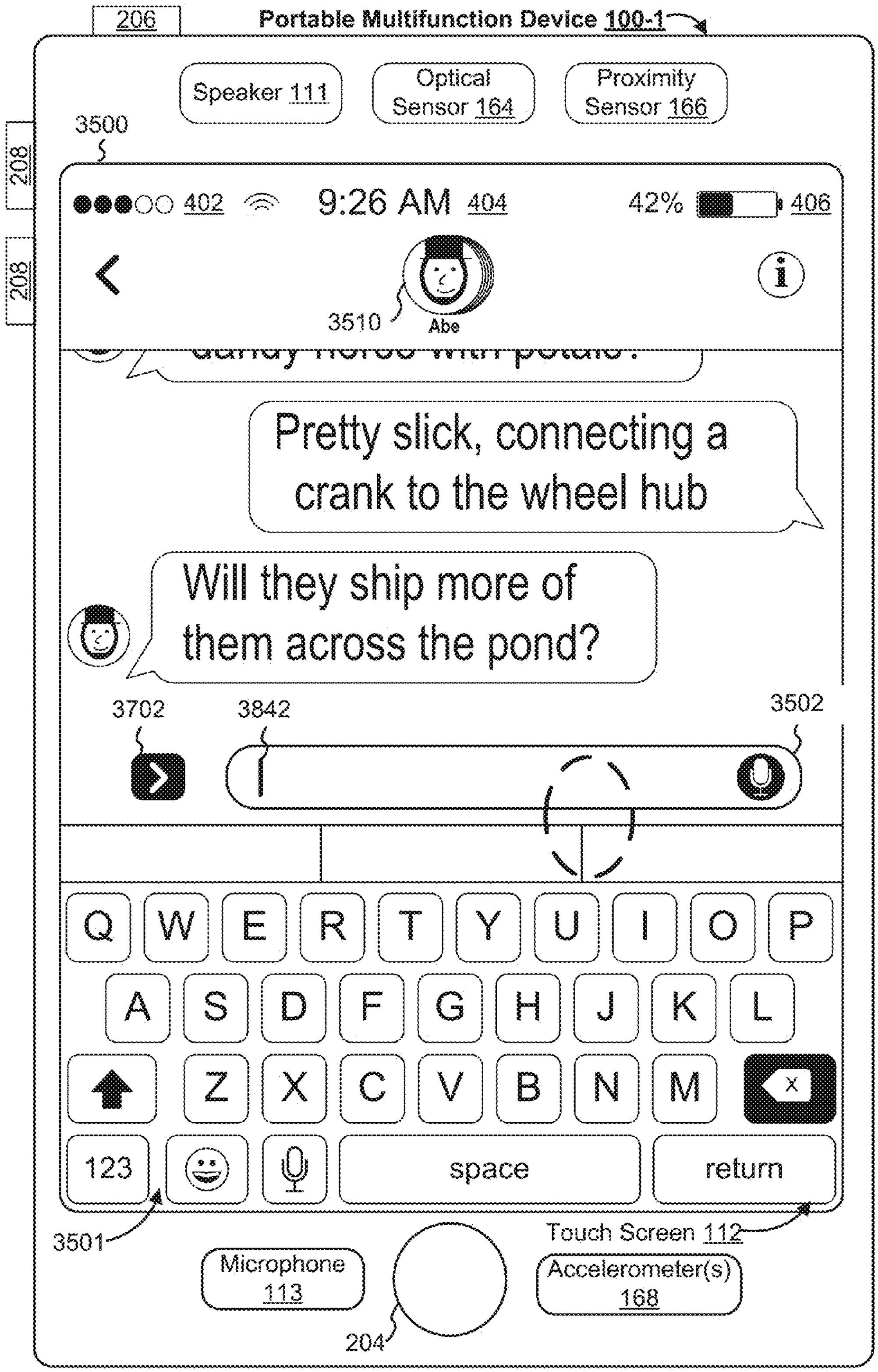
Figure 38A:
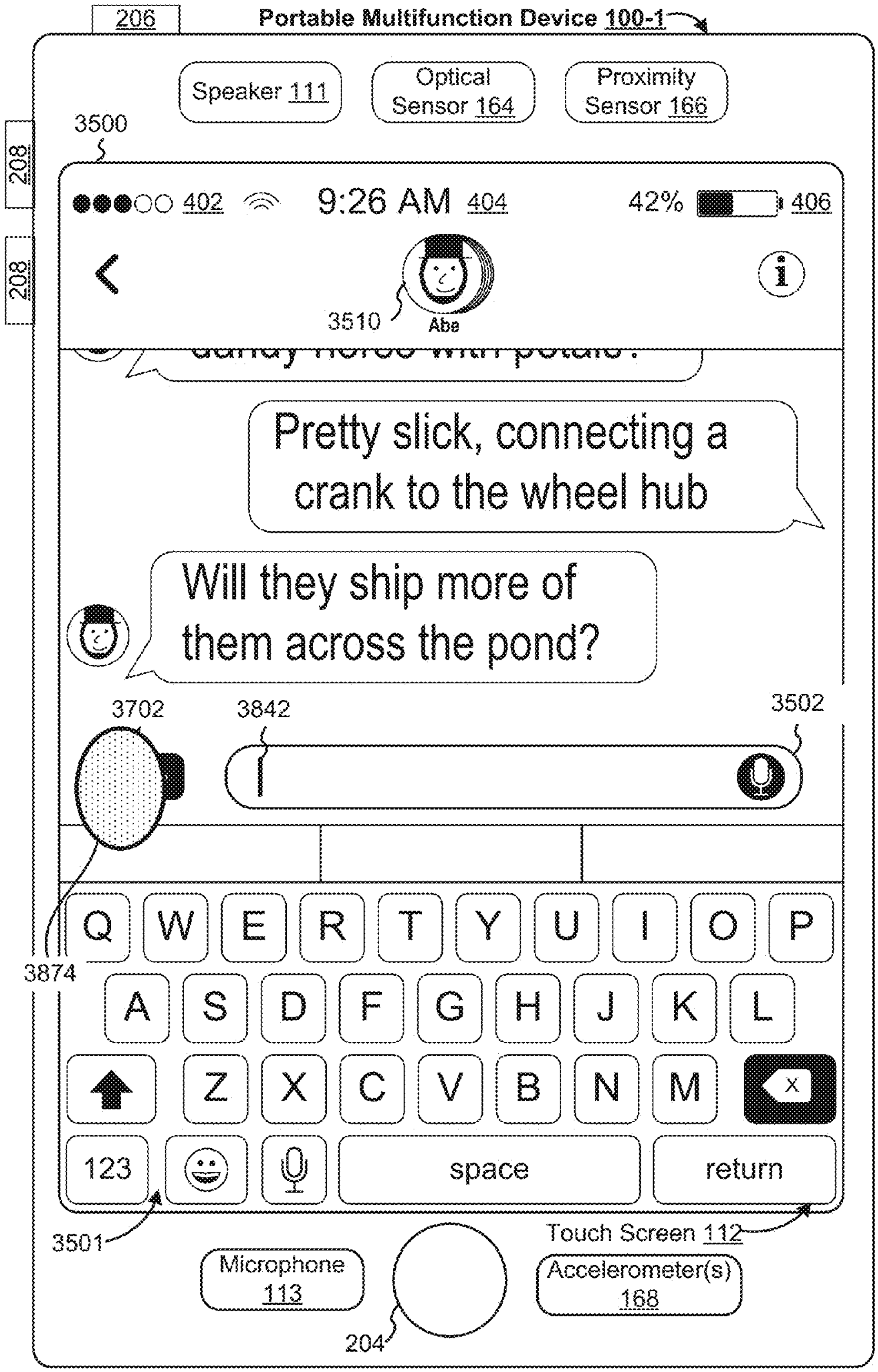
Figure 38A:
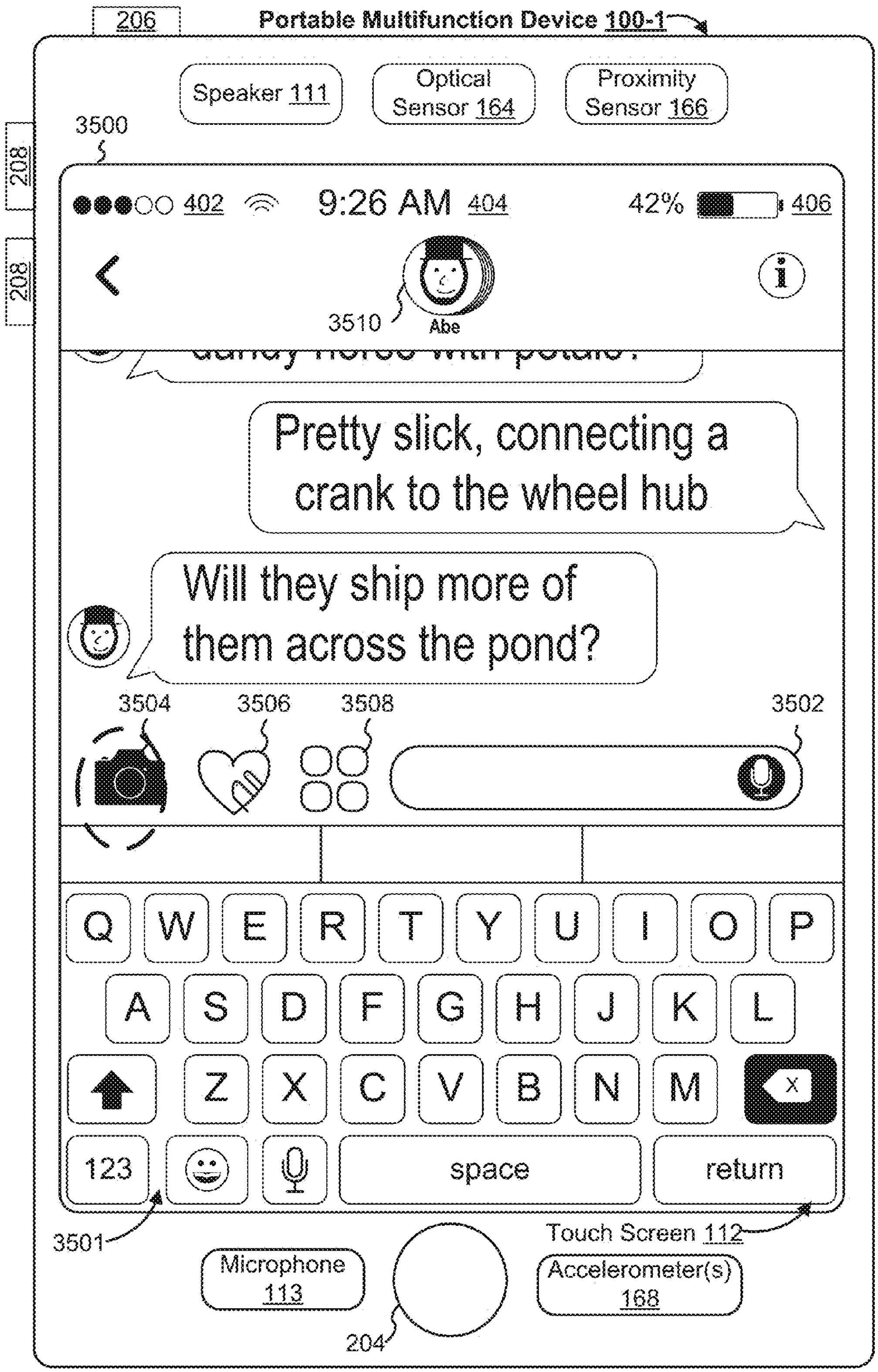
Figure 38A:
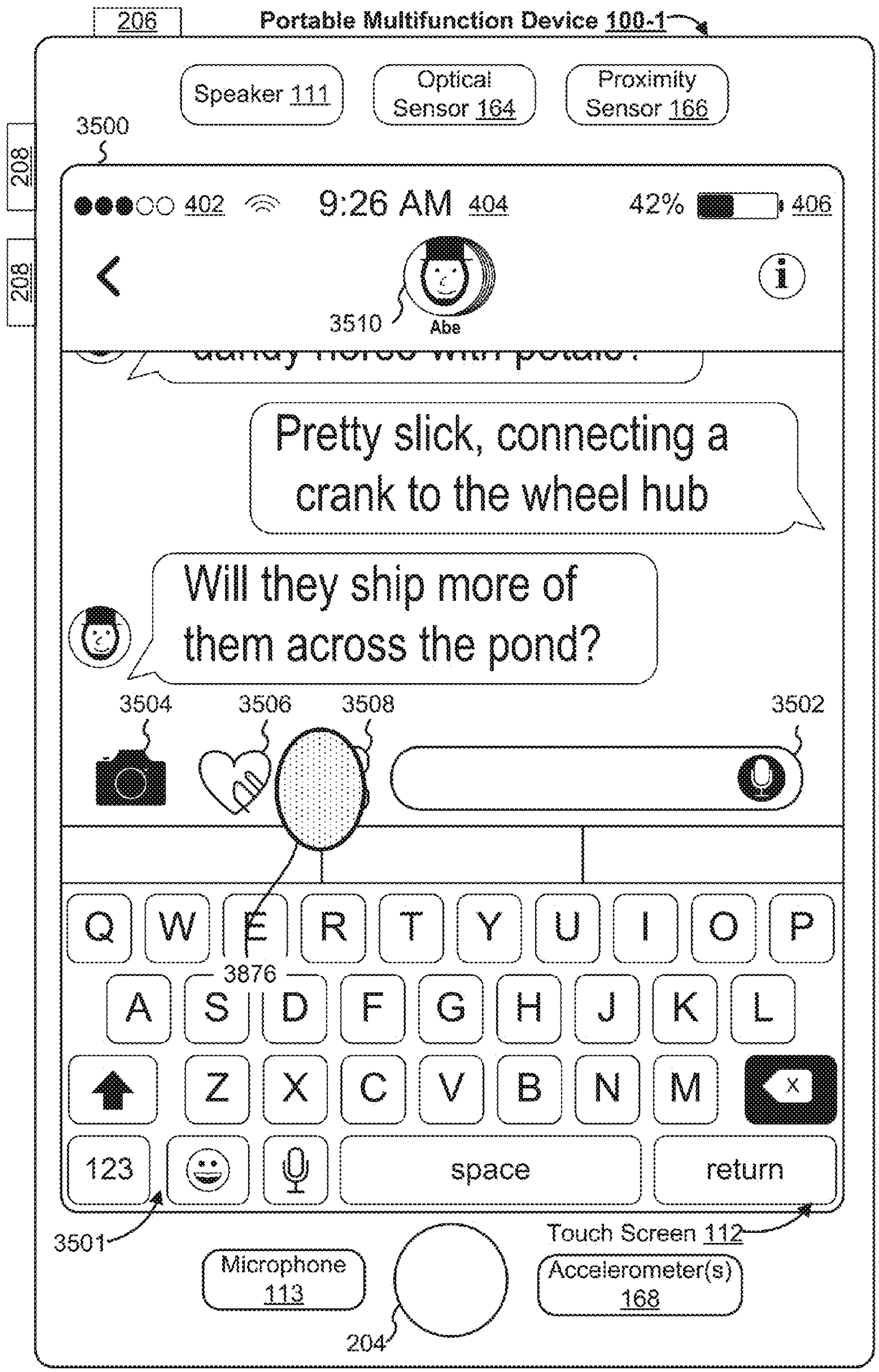
Figure 38A:
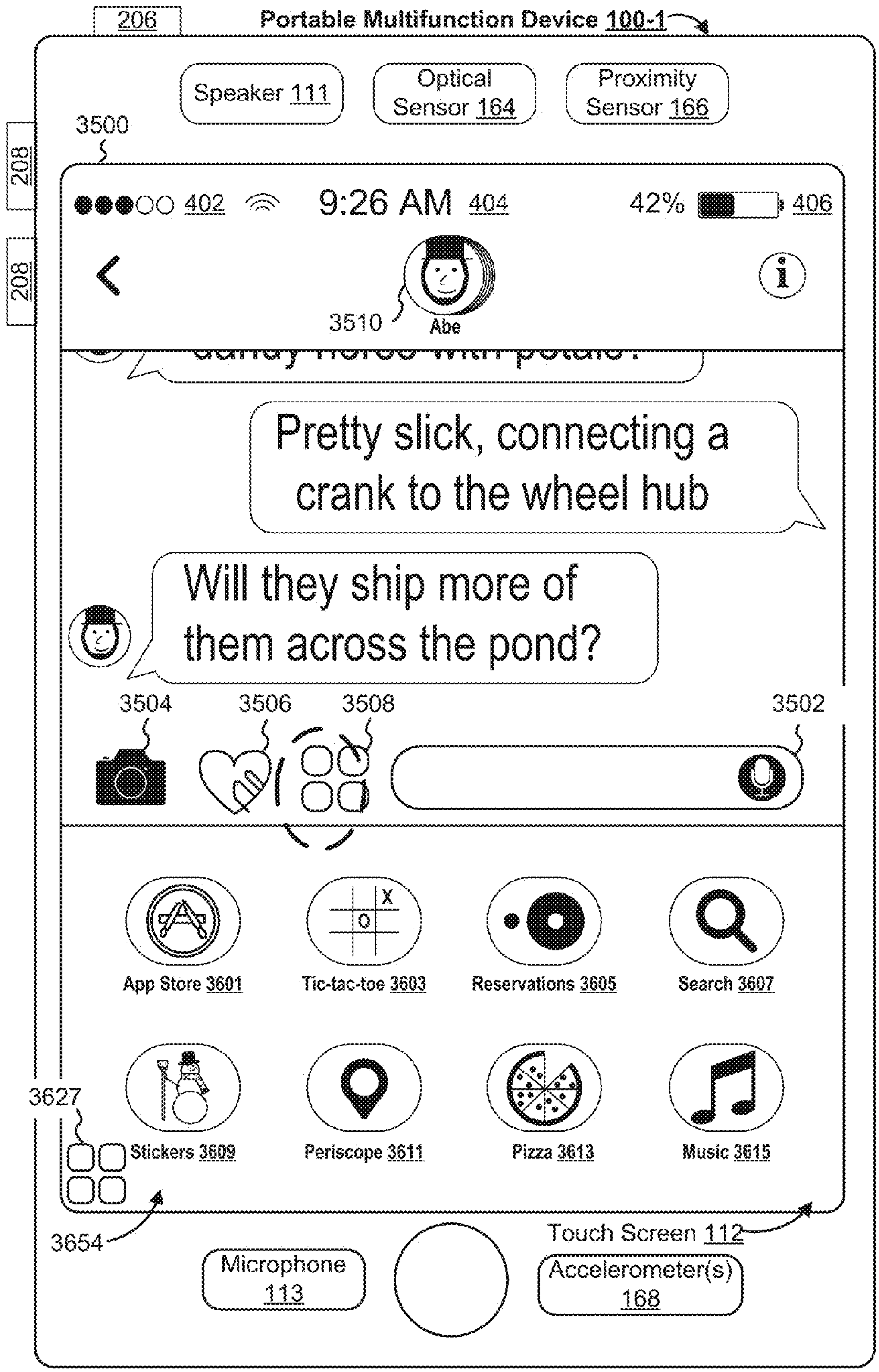
Figure 38A:
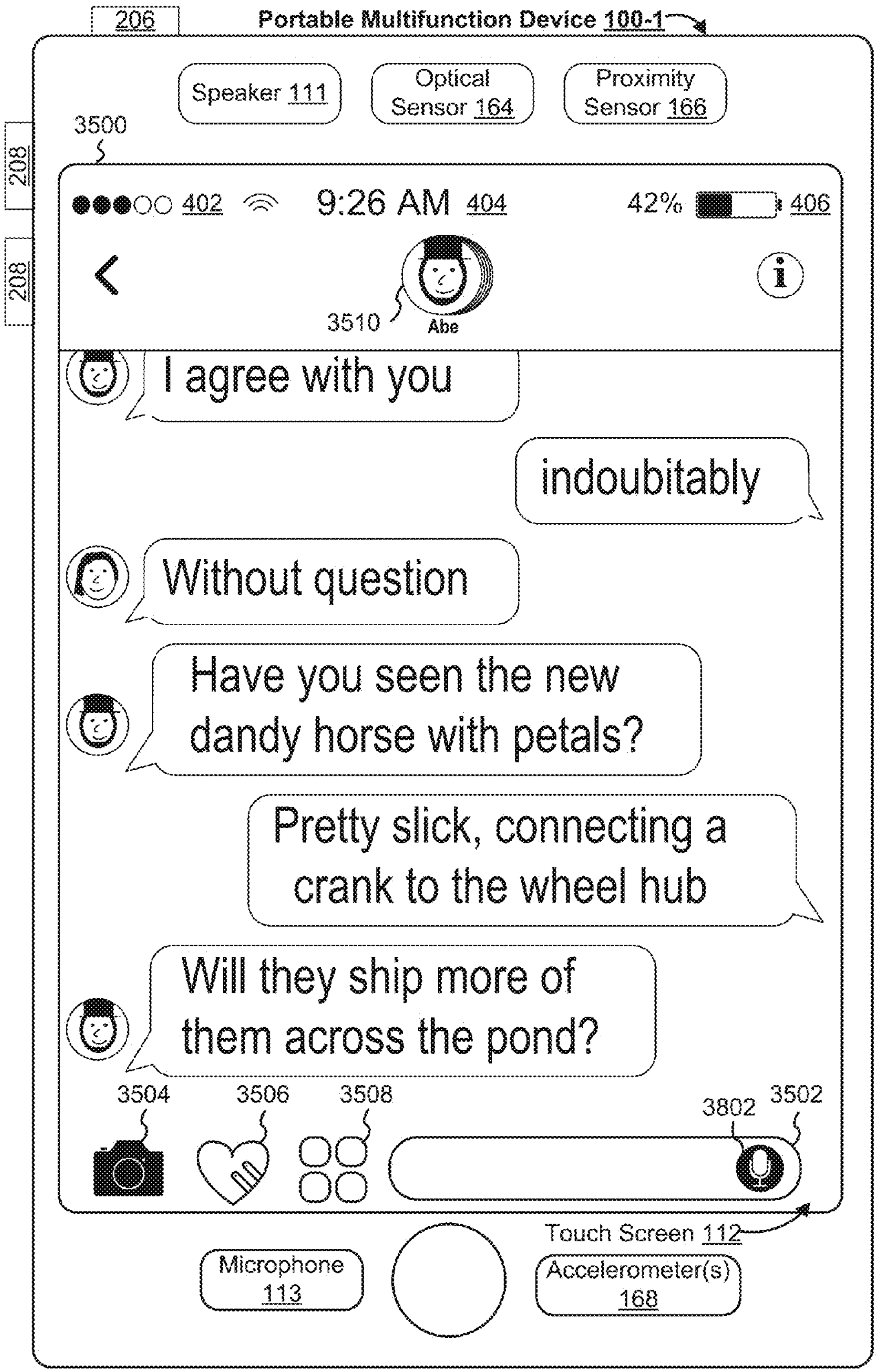
Figure 38A:
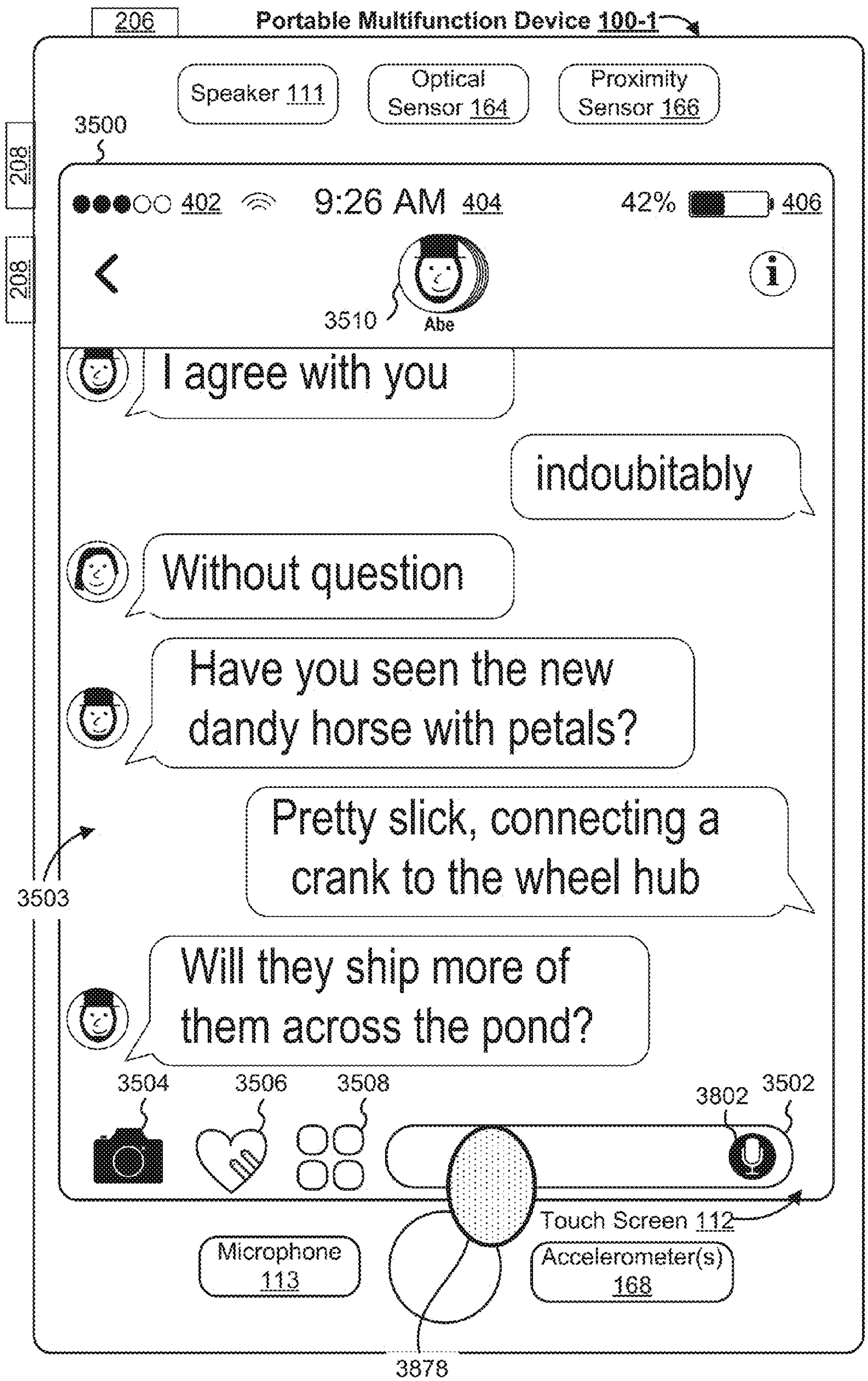
Figure 38A:
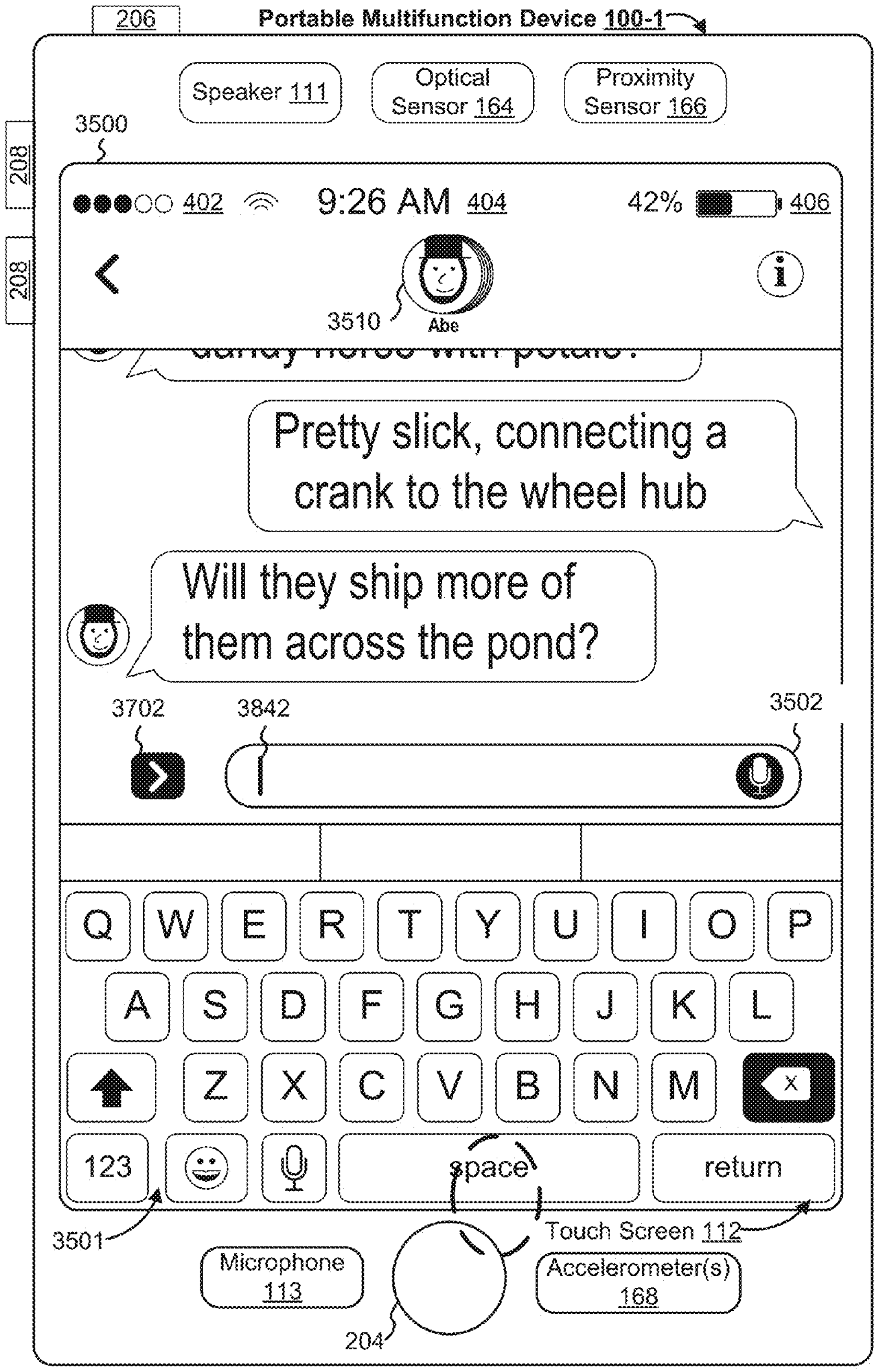
Figure 38A:
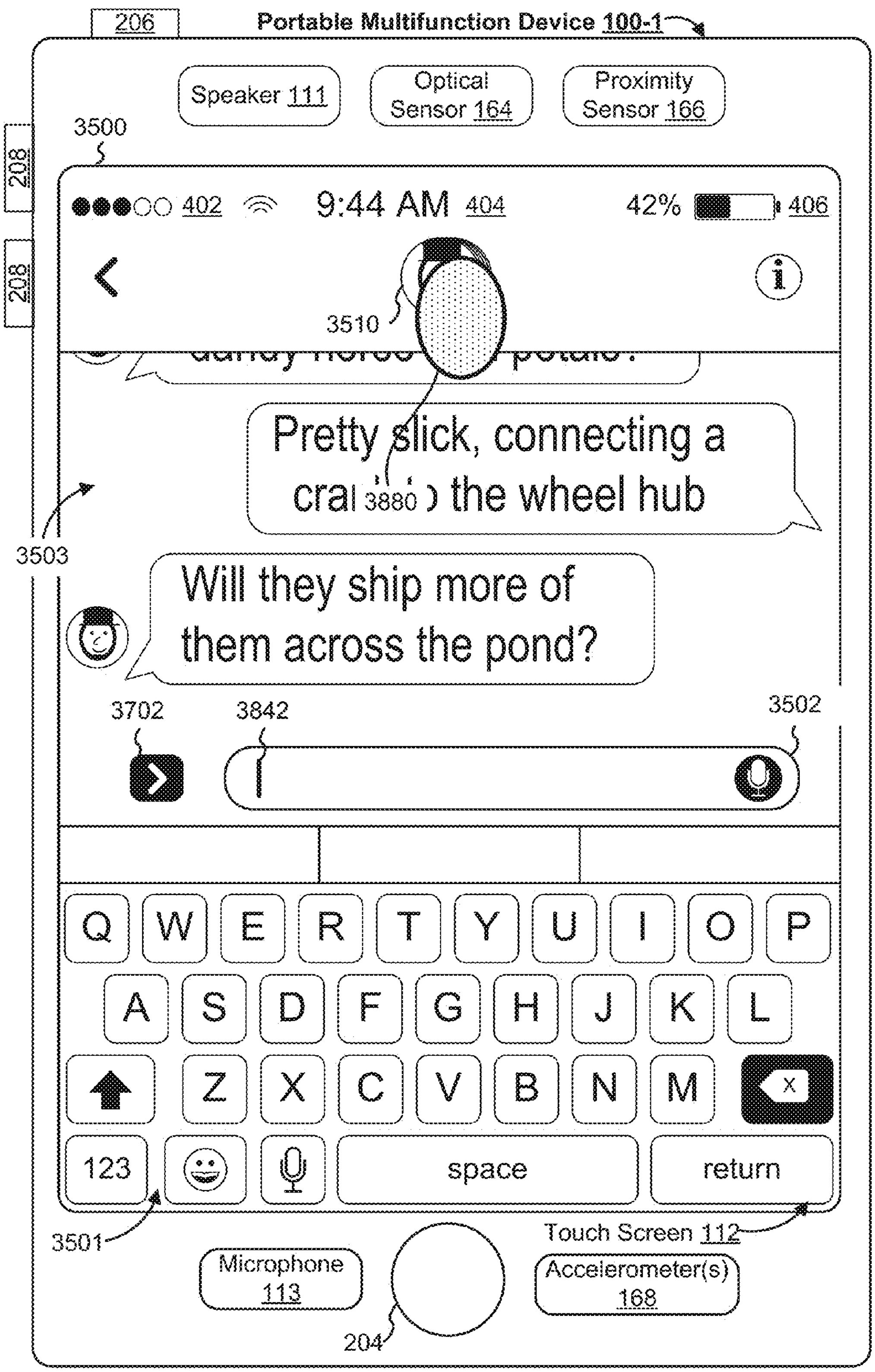
Figure 38A:
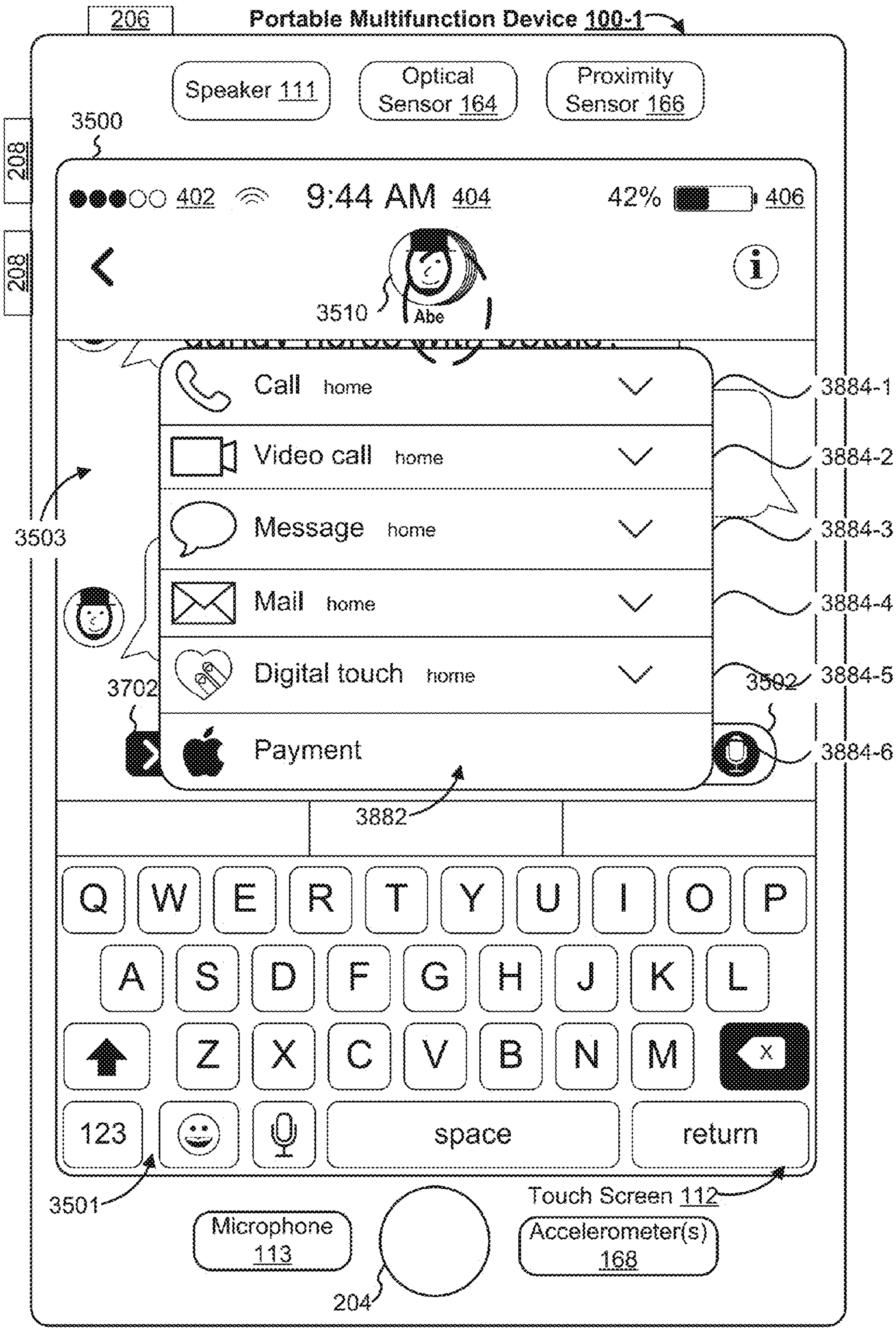
Figure 38A:
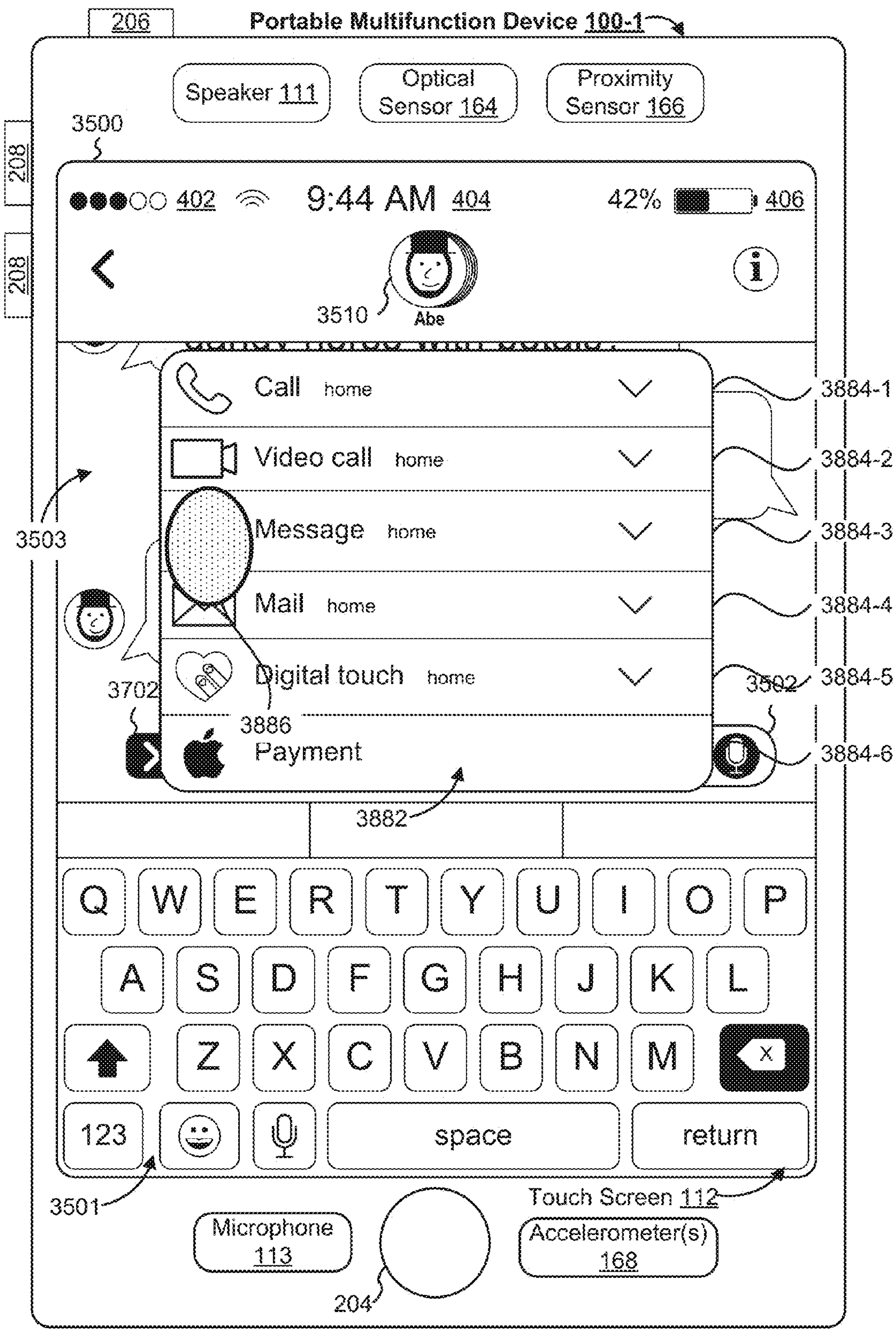
Figure 38A:
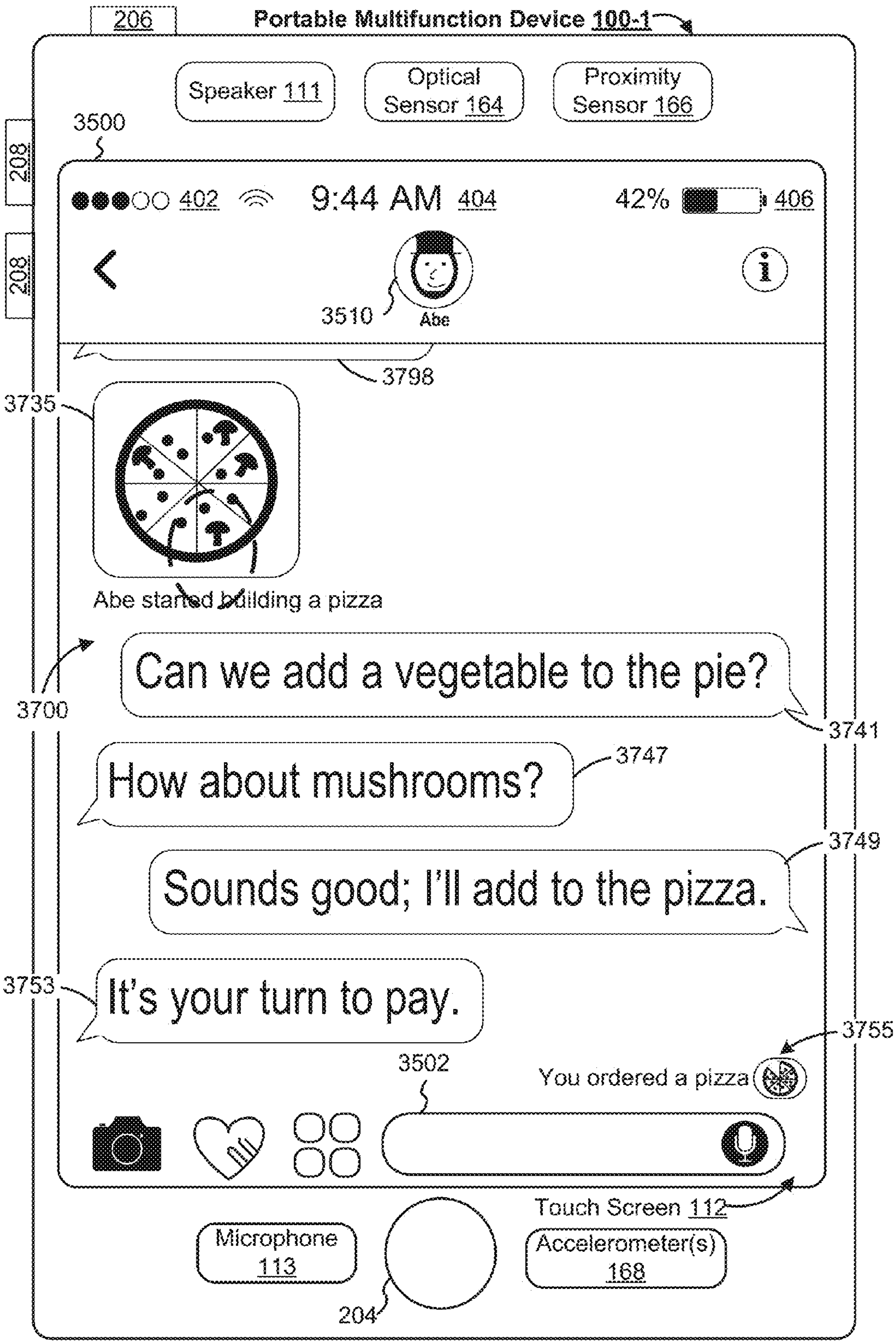

FIGS. 38Z-38AH illustrate an exemplary embodiment where a digital canvas is integrated into a messaging application. FIG. 38Z illustrates user interface 3500 for a messaging application, including conversation transcript 3503, digital image affordance 3504, digital canvas affordance 3506, application affordance 3508, and message-input area 3502. Device 100-1 detects a tap gesture, including contact 3852 in FIG. 38AA, on digital canvas affordance 3506 and, in response, displays digital canvas 3854 in FIG. 38AB. Digital canvas tray 3854 includes a digital canvas 3858, expression mode affordances 3860 for enabling various modes of expression on digital canvas 3858, and color selection affordances 3856 for setting a color for an expression on digital canvas 3858.

FIGS. 38AC to 38AH illustrate exemplary embodiments where display of a digital keyboard replaces display of a digital canvas tray, and vis versa. While displaying digital canvas tray 3854, device 100-1 detects a tap gesture on message-input area 3502, including contact 3862 in FIG. 38AC. In response, the device replaces digital canvas tray 3854 with digital keyboard 3501 in FIG. 38AD. Responsive to the tap gesture, the device also expands message-input area 3502, displaying text cursor 3842 therein, and collapses digital image affordance 3504, digital canvas affordance 3506, and application affordance 3508 into application expansion affordance 3702 in FIG. 38AD.

The device then displays the three activatable affordances—digital image affordance 3504, digital canvas affordance 3506, and application affordance 3508—in FIG. 38AF in response to detection of a tap gesture, including contact 3864 in FIG. 38AE, on application expansion affordance 3702. Responsive to detecting a tap gesture, including contact 3866 in FIG. 38AG, on digital canvas affordance 3506, the device replaces digital keyboard 3501 with digital canvas tray 3858, in FIG. 38AH.

FIGS. 38AI-38AS illustrate an exemplary embodiment where interactive applications are integrated into a messaging application. FIG. 38AI illustrates exemplary user interface 3500 for a messaging application, including conversation transcript 3503, digital image affordance 3504, digital canvas affordance 3506, application affordance 3508, and message-input area 3502. Device 100-1 detects a tap gesture, including contact 3868 in FIG. 38AJ, on application affordance 3508 and, in response, displays application swipe tray 3892 including launch icon 3708 for an interactive application and application menu toggle affordance 3627, in FIG. 38AK. The device then detects a tap gesture, including contact 3870 in FIG. 38AL, on application menu toggle affordance 3627 and, in response, replaces application swipe tray 3892 with application selection tray 3654, including a plurality of launch icons for applications—launch icon 3601 for a messaging application-specific application store, launch icon 3603 for an interactive tic-tac-toe application, launch icon 3605 for an interactive reservation application, launch icon 3607 for a search application, launch icon 3609 for a digital sticker pack, launch icon 3611 for a live video-streaming application, launch icon 3613 for an interactive pizza ordering application, and launch icon 3615 for an interactive digital music application—in FIG. 38AM.

FIGS. 38AC to 38AH illustrate exemplary embodiments where display of a digital keyboard replaces display of an application launch tray, and vis versa. While displaying application selection tray 3654, device 100-1 detects a tap gesture on message-input area 3502, including contact 3872 in FIG. 38AN. In response, the device replaces application selection tray 3654 with digital keyboard 3501 in FIG. 38AO. Responsive to the tap gesture, the device also expands message-input area 3502, displaying text cursor 3842 therein, and collapses digital image affordance 3504, digital canvas affordance 3506, and application affordance 3508 into application expansion affordance 3702 in FIG. 38A0.

In response to detecting a tap gesture, including contact 3874 in FIG. 38AP, on application expansion affordance 3702, the device then displays the three activatable affordances—digital image affordance 3504, digital canvas affordance 3506, and application affordance 3508—in FIG. 38AQ. Responsive to detecting a tap gesture, including contact 3876 in FIG. 38AR, on application affordance 3508, the device replaces digital keyboard 3501 with application selection tray 3654, in FIG. 38AS.

FIGS. 38AT-38AV illustrate an exemplary embodiment where the message transcript shrinks to accommodate display of a keyboard. FIG. 38AT illustrates exemplary user interface 3500 for a messaging application, including conversation transcript 3503, digital image affordance 3504, digital canvas affordance 3506, application affordance 3508, and message-input area 3502. Device 100-1 detects a tap gesture, including contact 3878 in FIG. 38AU, on message-input area 3502 and, in response, shrinks conversation transcript 3503 to accommodate display of digital keyboard 3501 in FIG. 38AV. Responsive to the tap gesture, the device also expands message-input area 3502, displaying text cursor 3842 therein, and collapses digital image affordance 3504, digital canvas affordance 3506, and application affordance 3508 into application expansion affordance 3702 in FIG. 38AV.

FIGS. 38AV-38AZ illustrate an exemplary embodiment where the user of the device can interact with a single participant in a group messaging session through interactions with that person's avatar. FIG. 38AV illustrates an exemplary user interface 3500 for a messaging application which includes conversation transcript 3503, digital keyboard 3501, message-input area 3502, and application expansion affordance 3702. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe" and avatar 4008 for "Mary Todd") displayed in stack of avatars 4002 in messaging user interface 3500.

In one embodiment, a menu of actions for interacting with another user included in the messaging session is displayed by tapping on the user's avatar. Device 100-1 detects a tap gesture, including contact 3880 in FIG. 38AW, on Abe's avatar 3510. In some embodiments, the user input is a deep press gesture. In response, the device displays menu 3882 of activatable menu items 3884-1 to 3884-6 for interacting directly with Abe by a phone call, video call, individual message, e-mail, digital drawing, or payment, respectfully, in FIG. 38AX. The device then activates a private messaging conversation transcript 3700 with Abe in FIG. 38AZ, after detecting a tap input including contact 3886 on menu item 3884-3, in FIG. 38AY.

Figure 39A:
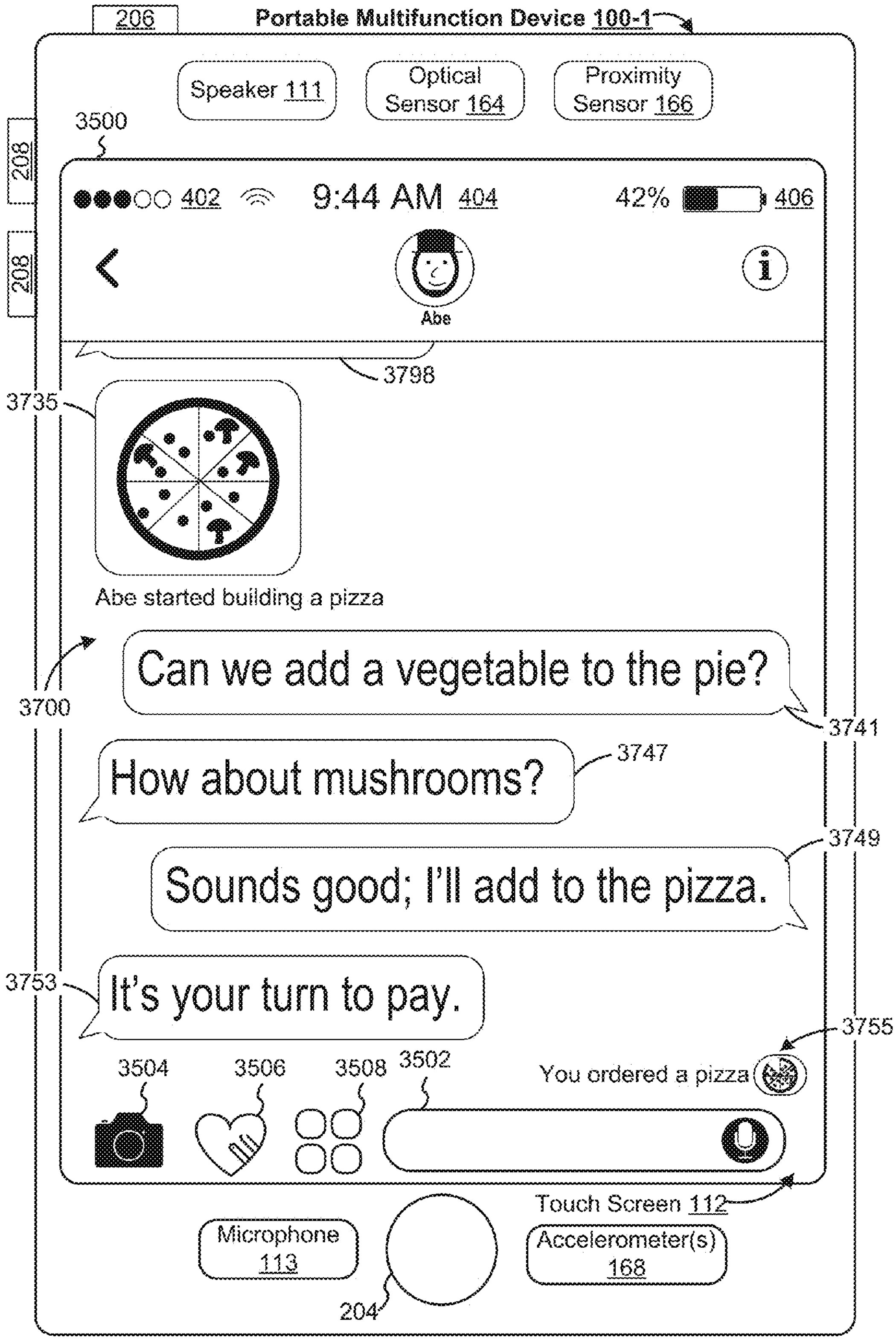
FIGS. 39A-39AW illustrate exemplary user interfaces for integrating electronic stickers in a messaging application in accordance with some embodiments.

FIGS. 39A-39AW illustrate exemplary user interfaces for integrating electronic stickers in a messaging application in accordance with some embodiments. The user interfaces in these figures are used to illustrate the processes described below, including the processes in FIGS. 62A-62C and 64A-64C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 39A-39AW illustrate exemplary user interface 3500 for a messaging application which includes conversation transcript 3700, message-input area 3502, either of application expansion affordance 3702 or three activatable affordances—digital image affordance 3504, digital canvas affordance 3506, and application affordance 3508—optionally, one of digital keyboard 3501, application selection tray 3654, and application swipe tray 3892. Conversation transcript 3503 includes messages from participants of a corresponding messaging session, including the user of portable multifunction device 100 and other users included in the messaging session. Each of the other users included in the messaging transcript are represented by an avatar (e.g., avatar 3510 for "Abe").

Figure 39B:
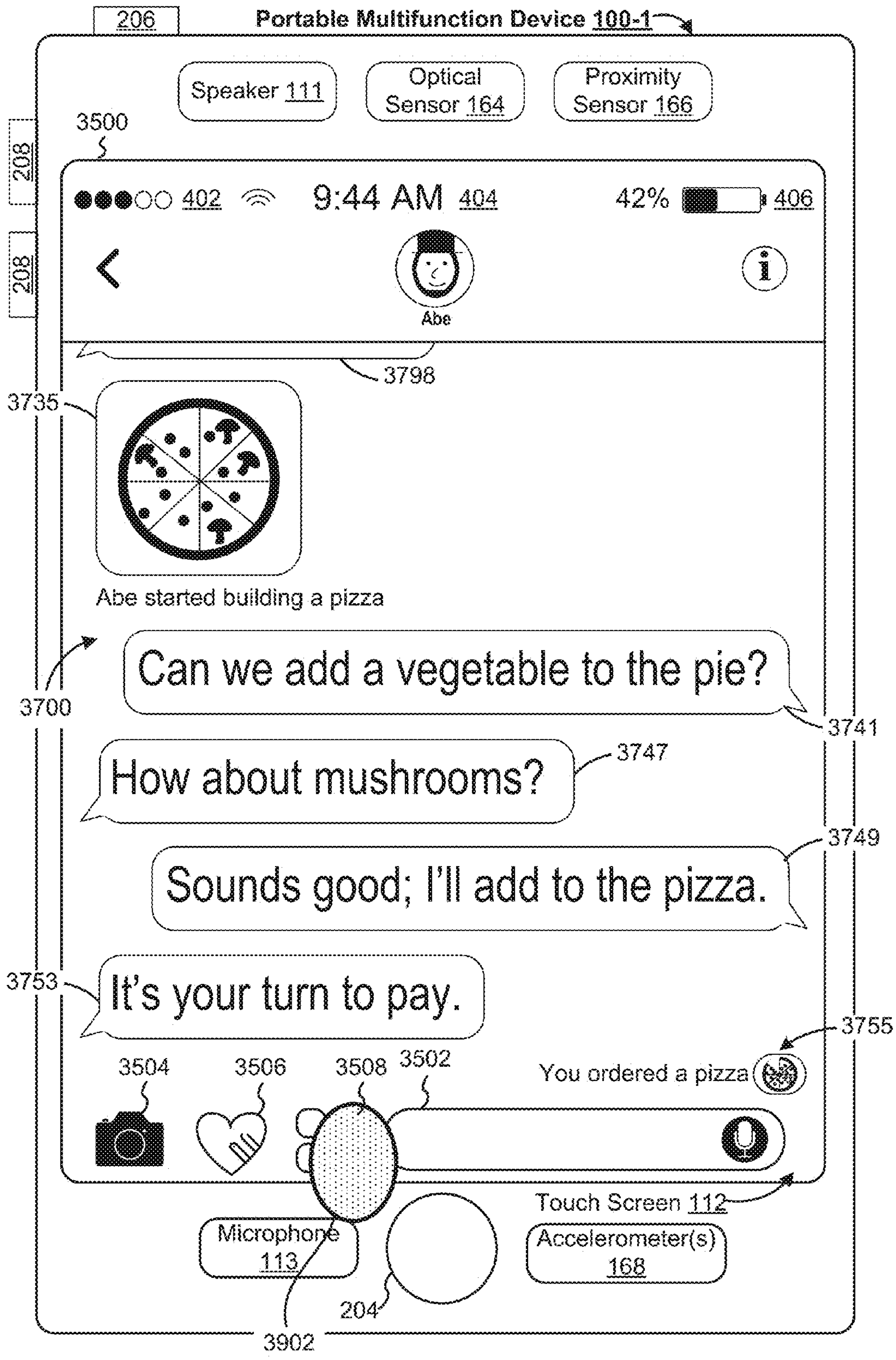
Figure 39C:
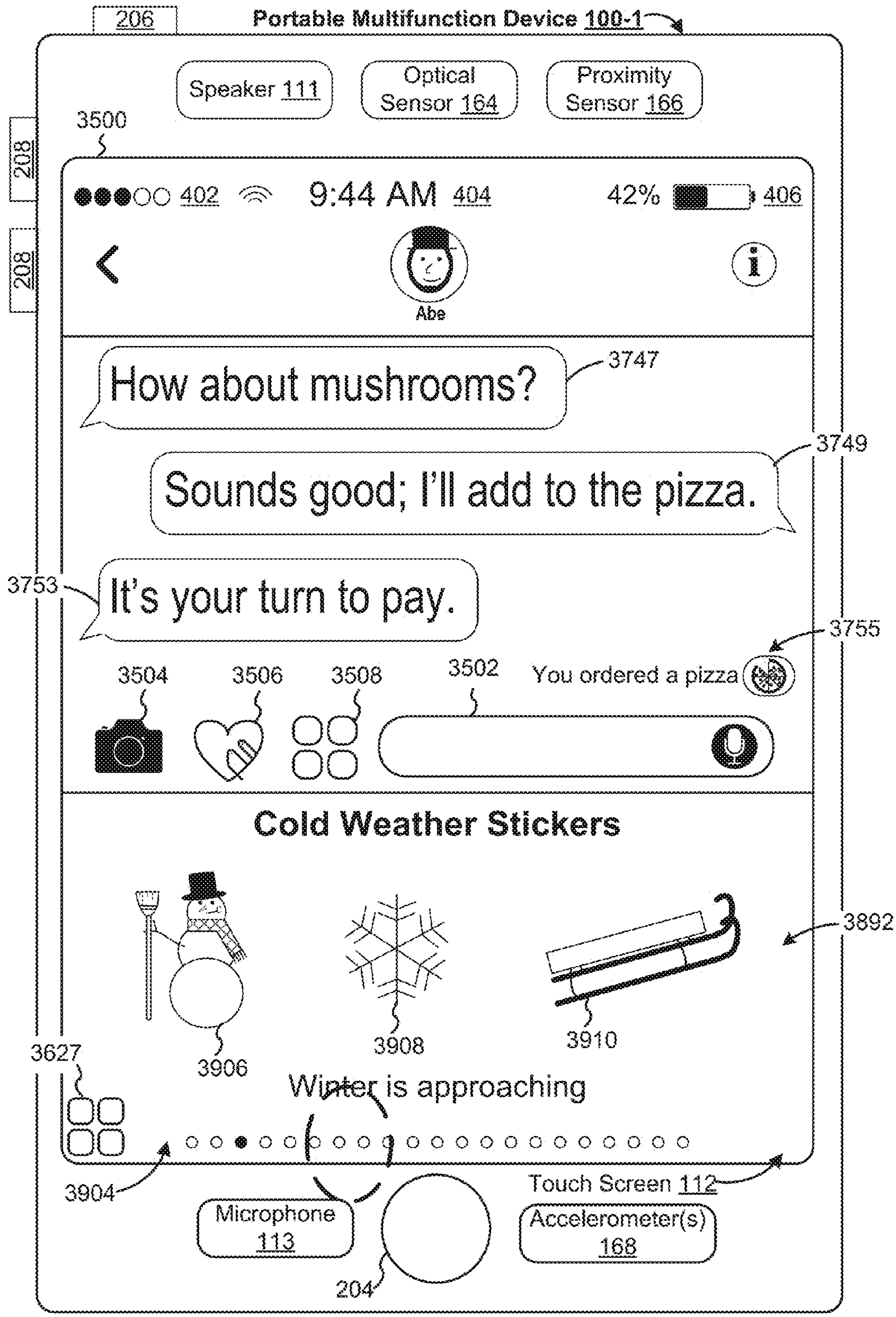
Figure 39D:
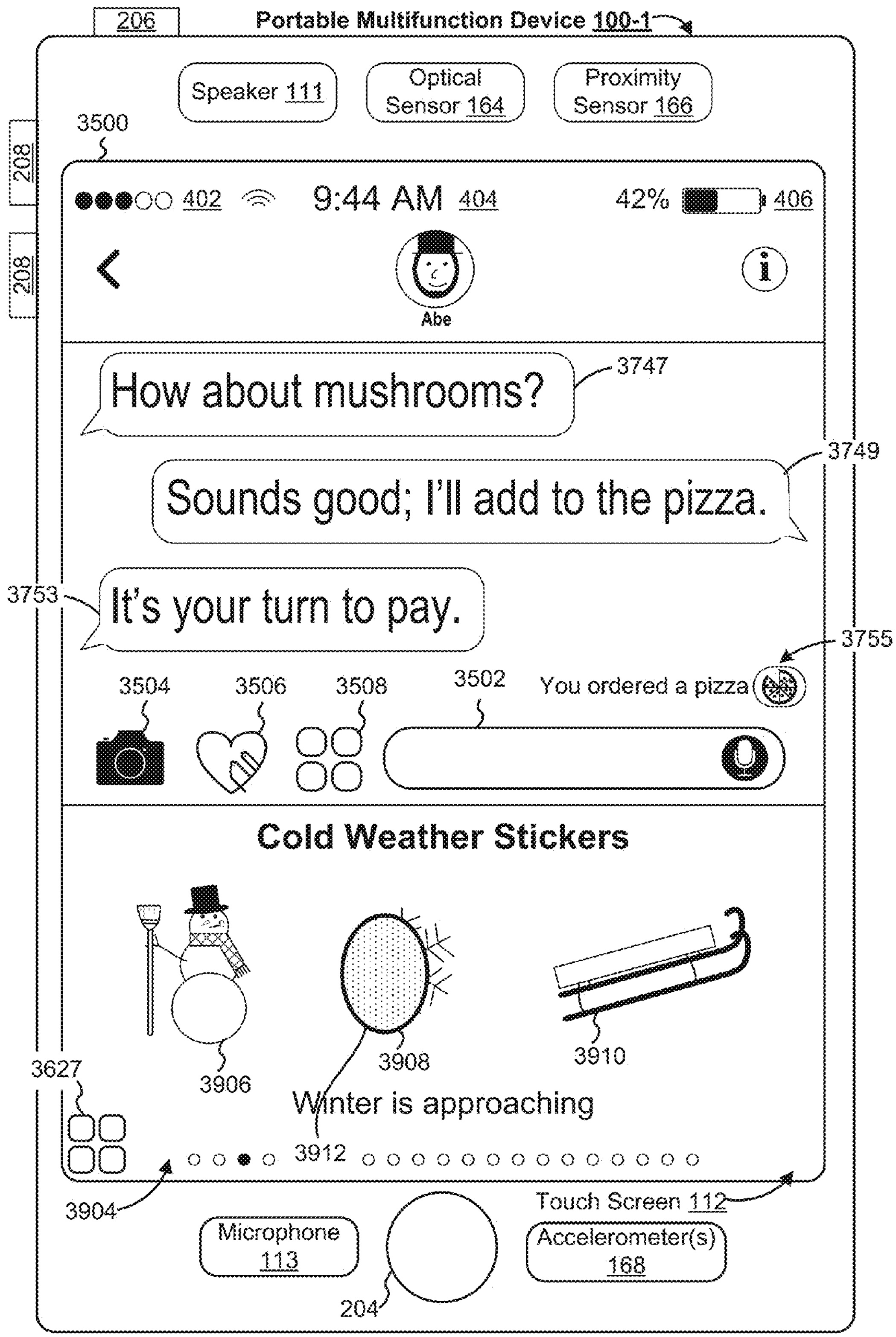
Figure 39E:
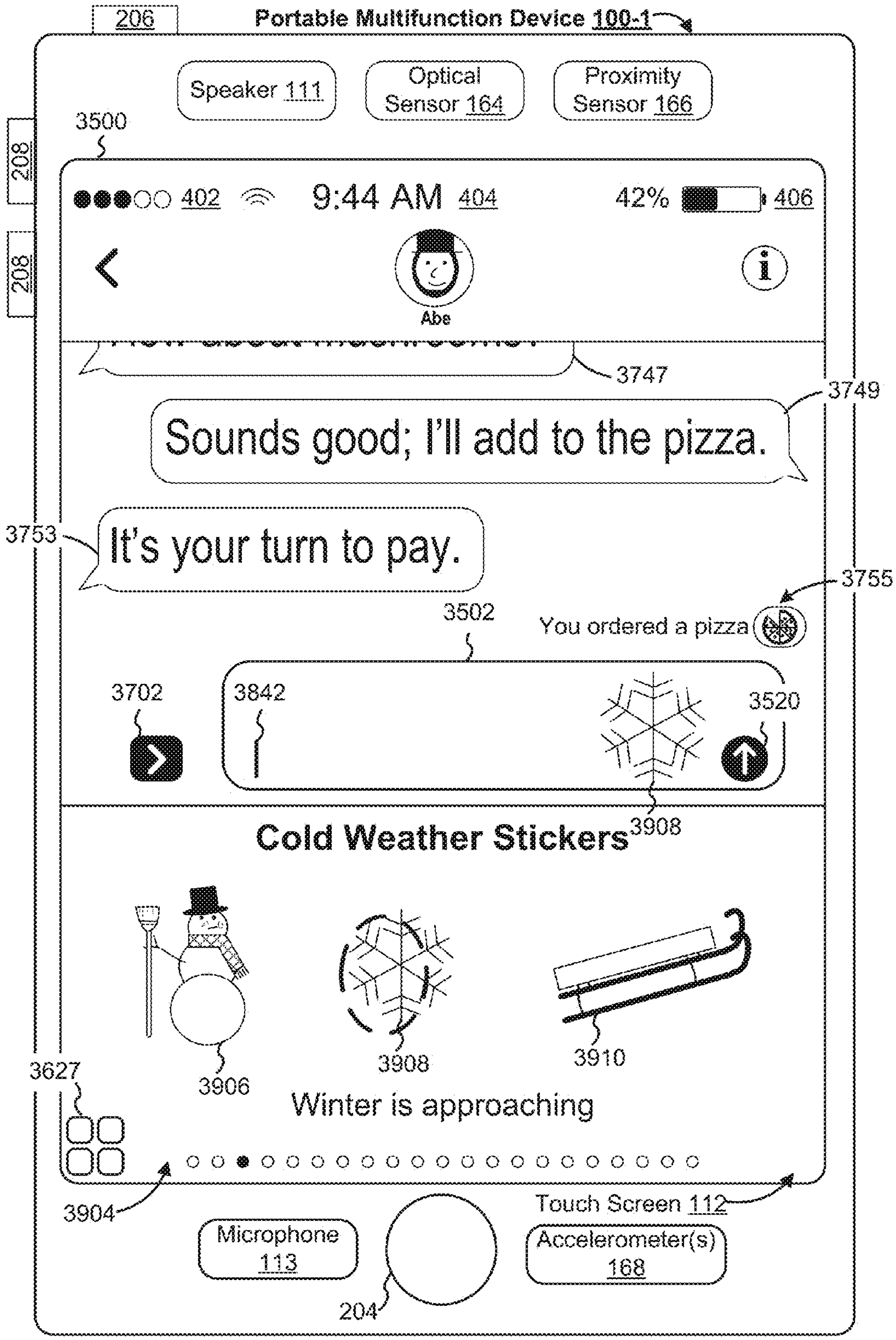
Figure 39F:

FIGS. 39A-39C, 39AB-39AF, and 39AU-39AW illustrate three exemplary embodiments for accessing an electronic sticker pack in a messaging application. Each embodiment begins from an exemplary user interface 3500 for a messaging application, including conversation transcript 3503, digital image affordance 3504, digital canvas affordance 3506, application affordance 3508, and message-input area 3502, including microphone affordance 3802 for receiving speech that is translated into text for posting to the messaging session associated with conversation transcript 3503, as in FIGS. 39A, 39AB, and 39AU.

In a first embodiment, device 100-1 detects a tap gesture, including contact 3902 in FIG. 39B, on application affordance 3508 and, in response, displays application swipe tray 3892, including sticker pack 3904 with electronic stickers 3906, 3908, and 3910 and application menu toggle affordance 3627, in FIG. 39C.

In a second embodiment, device 100-1 detects a tap gesture, including contact 3934 in FIG. 39AB, on application affordance 3508 and, in response, displays application swipe tray 3892, including launch icon 3708 for an interactive reservation application and application menu toggle affordance 3627, in FIG. 39AC. The device then detects a swipe gesture to the left in application swipe tray 3892, including movement 3938 of contact 3936 from position 3936-*a* in FIG. 39AD to position 3936-*b* in FIG. 39AE. In response, the device moves application swipe tray 3892 to the left, in accordance with movement 3936, creating the appearance that application launch icon 3708 slides off of the left side of touch screen 112 and sticker pack 3904 slides the display from the right side of touch screen 112, in FIG. 39AE. After completion of the swipe gesture, the device displays sticker pack 3904 with electronic stickers 3906, 3908, and 3910 and application menu toggle affordance 3627, within application slide tray 3892, in FIG. 39AF.

In a third embodiment, device 100-1 detects a tap gesture, including contact 3952 in FIG. 39AU, on application affordance 3508 and, in response, displays application selection tray 3654, including a plurality of launch icons for applications—launch icon 3601 for a messaging application-specific application store, launch icon 3603 for an interactive tic-tac-toe application, launch icon 3605 for an interactive reservation application, launch icon 3607 for a search application, launch icon 3609 for an electronic sticker pack, launch icon 3611 for a live video-streaming application, launch icon 3613 for an interactive pizza ordering application, and launch icon 3615 for an interactive digital music application—in FIG. 38AM. The device then detects a tap gesture, including contact 3954 in FIG. 39AV, on launch icon 3609 for an electronic sticker pack and, in response, replaces application selection tray 3654 with sticker pack 3904, including electronic stickers 3906, 3908, and 3910 and application menu toggle affordance 3627, in FIG. 39AW.

FIGS. 39D-39P and 39Z-39AA illustrate exemplary embodiments for posting an electronic sticker to a messaging session. Each embodiment begins from an exemplary user interface 3500 for a messaging application, including conversation transcript 3503, message-input area 3502, and electronic sticker pack 3904 with electronic stickers 3906, 3908, and 3910, as in FIGS. 39D, 39H, 39K, 39N, and 39Z.

Figure 39G:
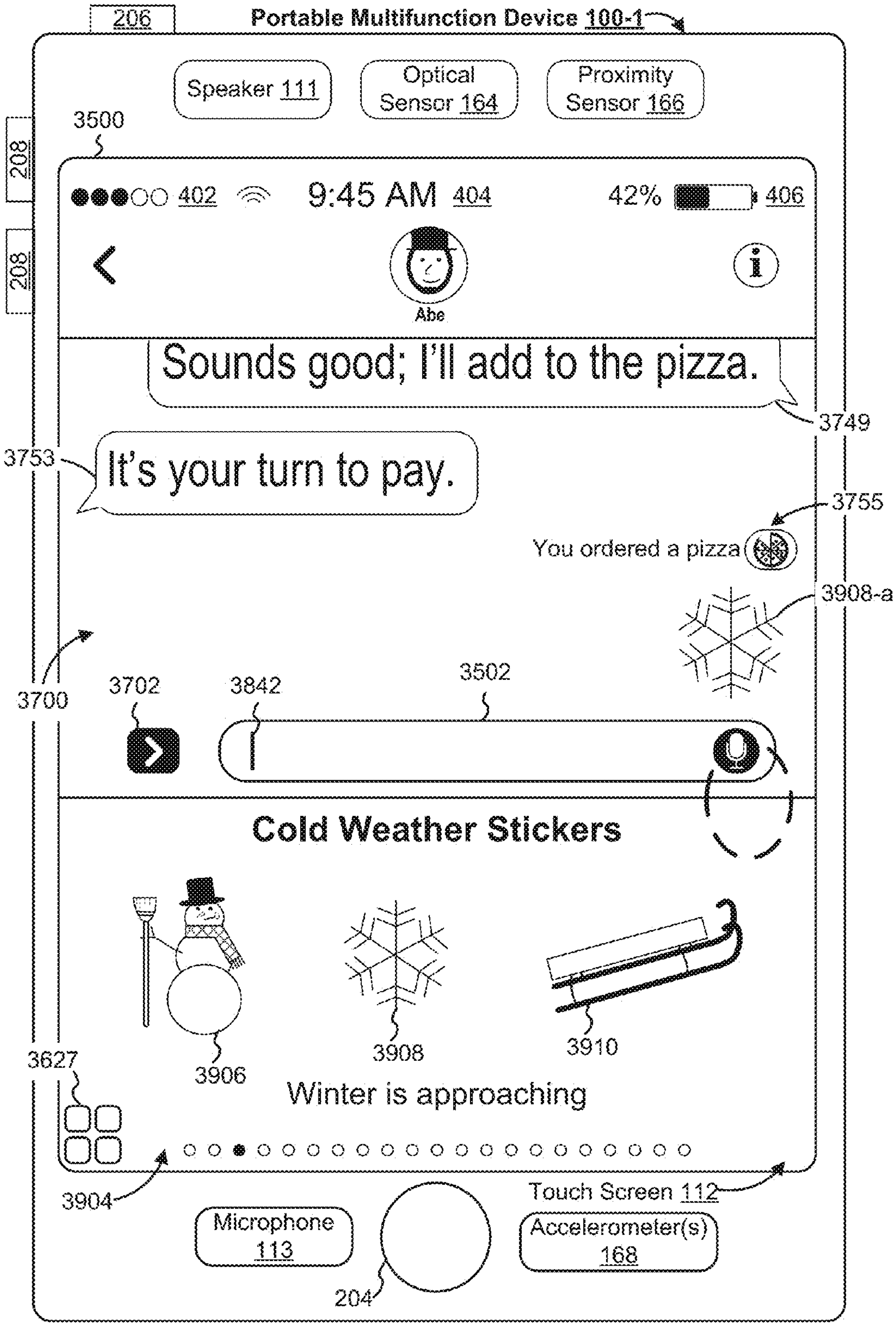
Figure 39H:
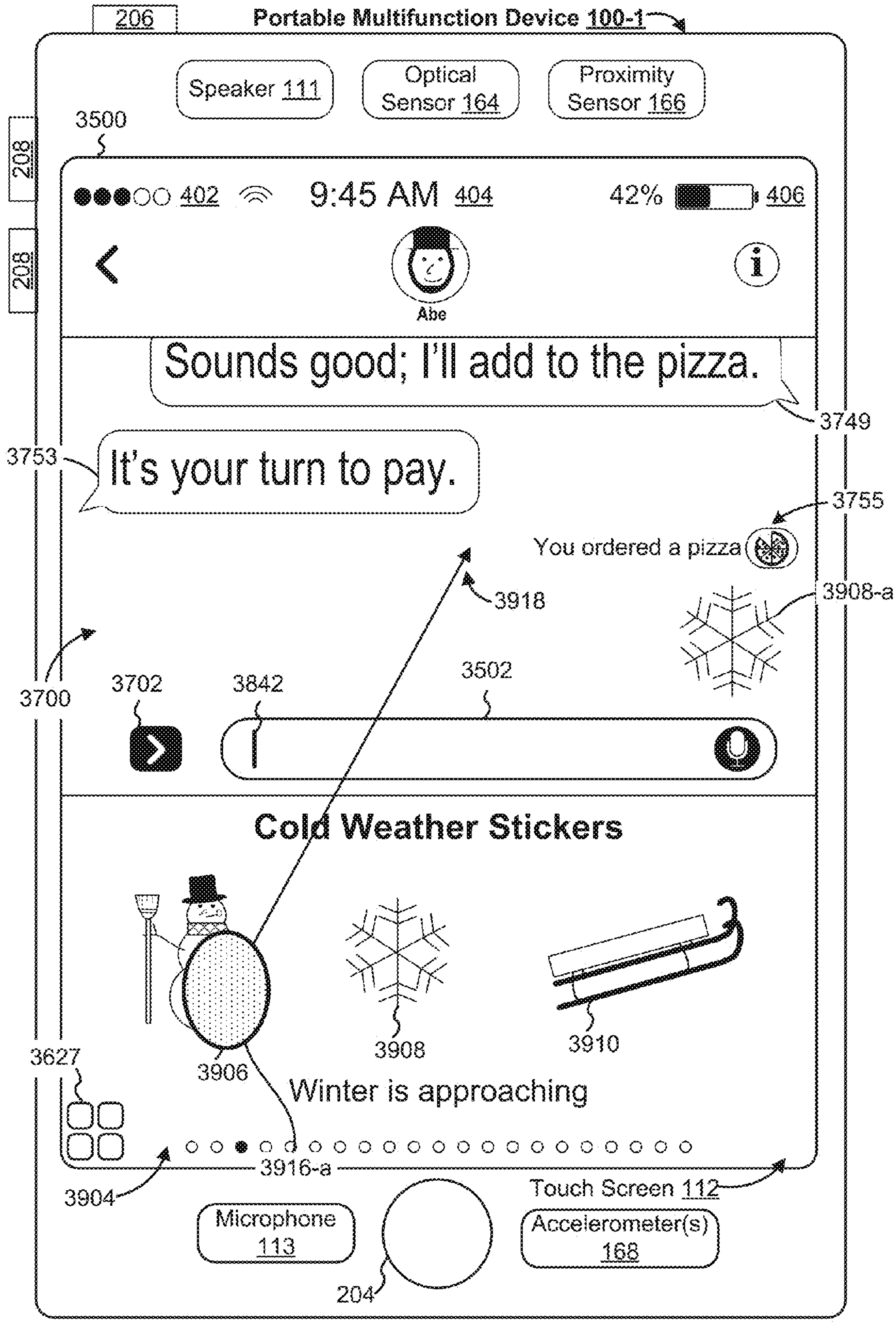
Figure 39I:
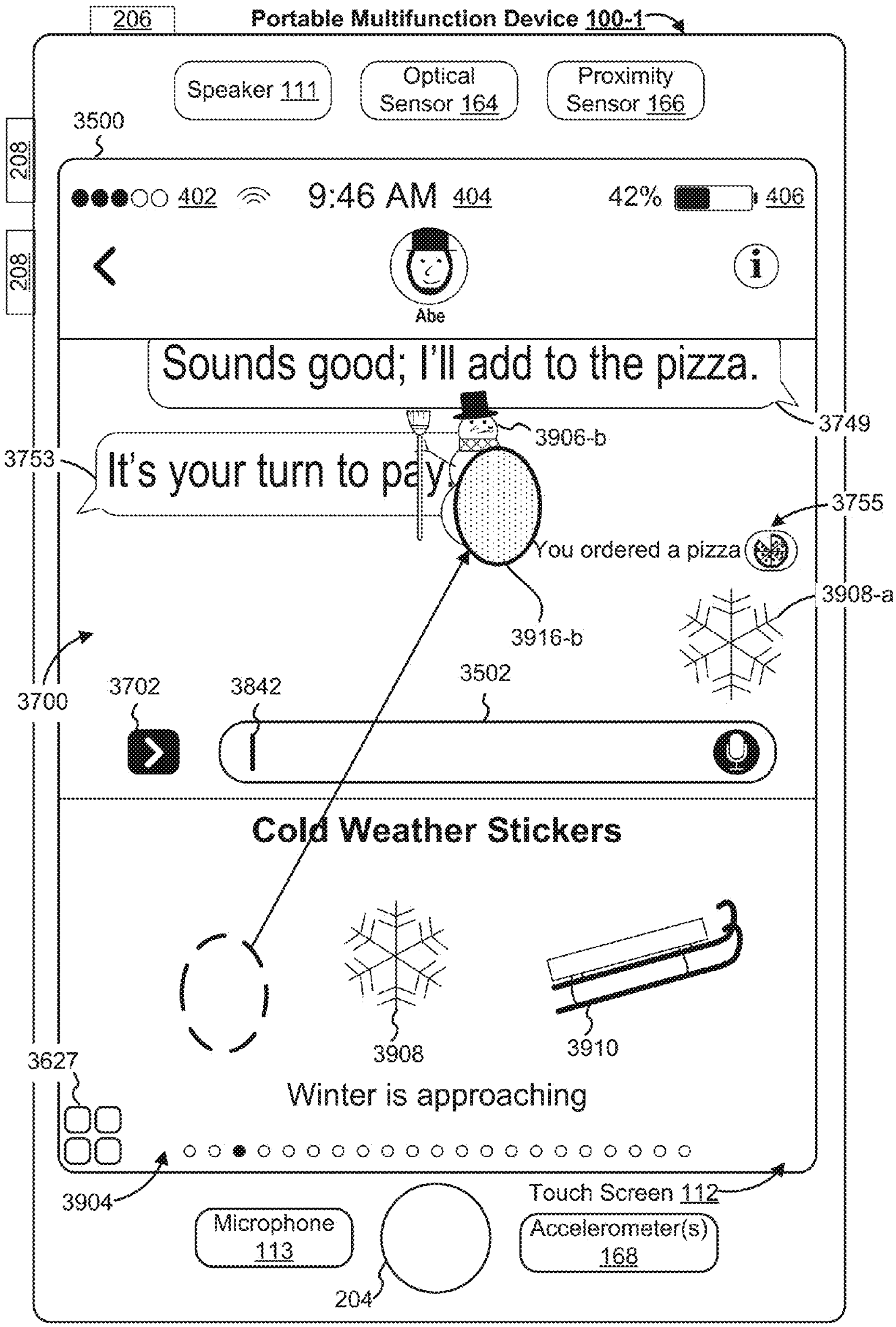

In a first embodiment, an electronic sticker is posted to the conversation transcript through the message-input area, in response to tapping on the electronic sticker. Device 100-1 detects a tap gesture, including contact 3912 in FIG. 39D, on snowflake sticker 3908. In response, the device places snowflake sticker 3908 in message-input area 3502 in FIG. 39E. The device then detects a tap gesture including contact 3914 on message-content posting affordance 3520 in FIG. 39F. In response, device 100 posts snowflake sticker 3908 at location 3908-*a*, corresponding to the next temporal position for a message posted in transcript 3700, as shown in FIG. 39G.

In a second embodiment, an electronic sticker is dragged into the conversation transcript by a drag gesture, and is posted to the messaging session at the location it was dragged to in the conversation transcript. Device 100-1 detects a drag gesture, including movement 3918 of contact 3916, which was initiated on electronic sticker 3906, from position 3916-*a*, within sticker pack 3904, in FIG. 39H to position 3916-*b*, within conversation transcript 3700 in FIG. 39I. In response, snowman sticker 3906 is dragged from its initial position 3906-*a* in the sticker pack, in FIG. 39H, to position 3906-*b* within the conversation transcript, in FIG. 39I, in accordance with movement 3918. Upon lift-off of contact 3916 within conversation transcript 3700, snowman sticker 3906 is posted to the messaging session, as displayed at position 3906-*b* in FIG. 39J.

In a third embodiment, an electronic sticker is not posted to the messaging session when it is not dragged all the way into the conversation transcript. Device 100-1 detects a drag gesture, including movement 3922 of contact 3920, which was initiated on electronic sticker 3910, from position 3920-*a*, within sticker pack 3904, in FIG. 39K to position 3920-*b*, still within sticker pack 3904 in FIG. 39L. In response, sled sticker 3910 is dragged from its initial position 3910-*a* in sticker pack 3904, in FIG. 39K, to position 3910-*b* still within sticker pack 3904, in FIG. 39L, in accordance with movement 3922. Upon lift-off of contact 3920 within sticker pack 3904, sled sticker 3910 is not posted to the messaging session, because it was not dragged into the conversation transcript, as displayed in its original position 3920-*a* in FIG. 39M.

In a fourth embodiment, an electronic sticker is dragged into the conversation transcript by a drag gesture, and is posted to the messaging session at a nearest predefined position to the location it was dragged to in the conversation transcript. Device 100-1 detects a drag gesture, including movement 3926 of contact 3924, which was initiated on electronic sticker 3908, from position 3924-*a*, within sticker pack 3904, in FIG. 39N to position 3924-*b*, within conversation transcript 3700 in FIG. 39O. In response, snowflake sticker 3908 is dragged from its initial position 3908-*a* in the sticker pack, in FIG. 39N, to position 3908-*c* within the conversation transcript, in FIG. 39O, in accordance with movement 3926. Upon lift-off of contact 3924 within conversation transcript 3700, snowflake sticker 3908 is repositioned to position 3908-*d*, which corresponds to the nearest location within a message region (e.g., message region 3749) to the position the sticker was at when the device detected lift-off of the contact corresponding to the drag gesture (e.g., location 3908-*c*).

Figure 39J:
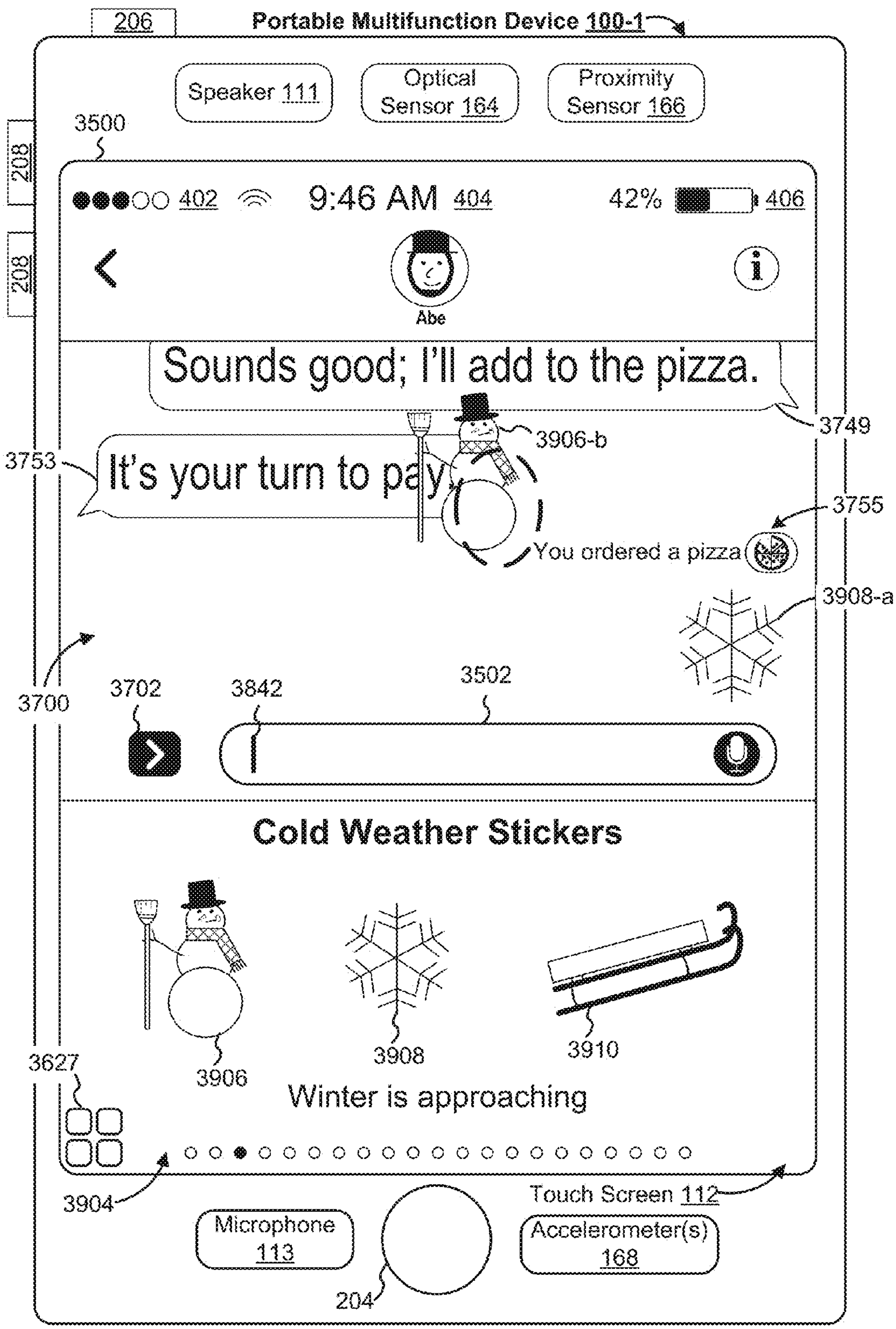
Figure 39K:
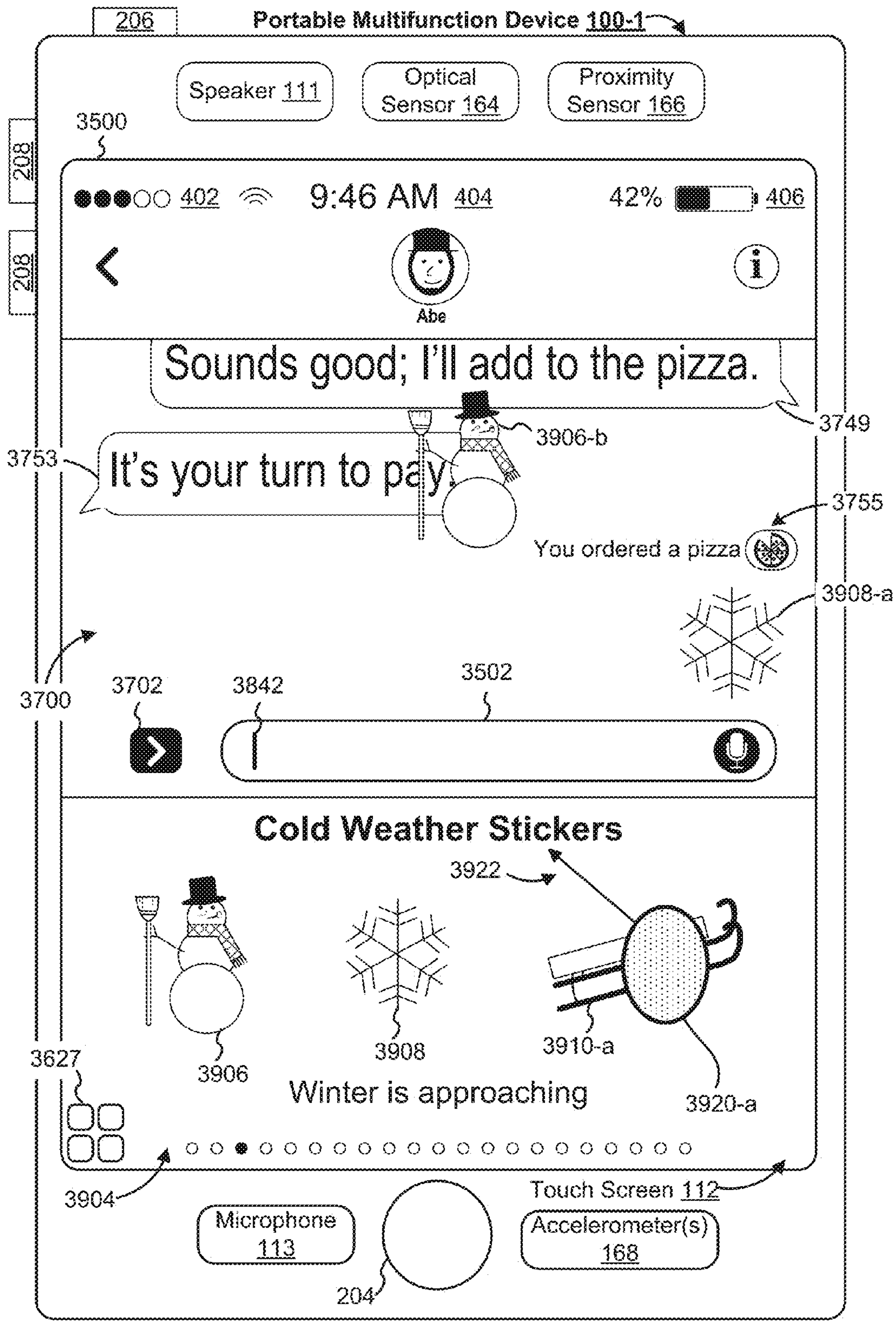
Figure 39L:
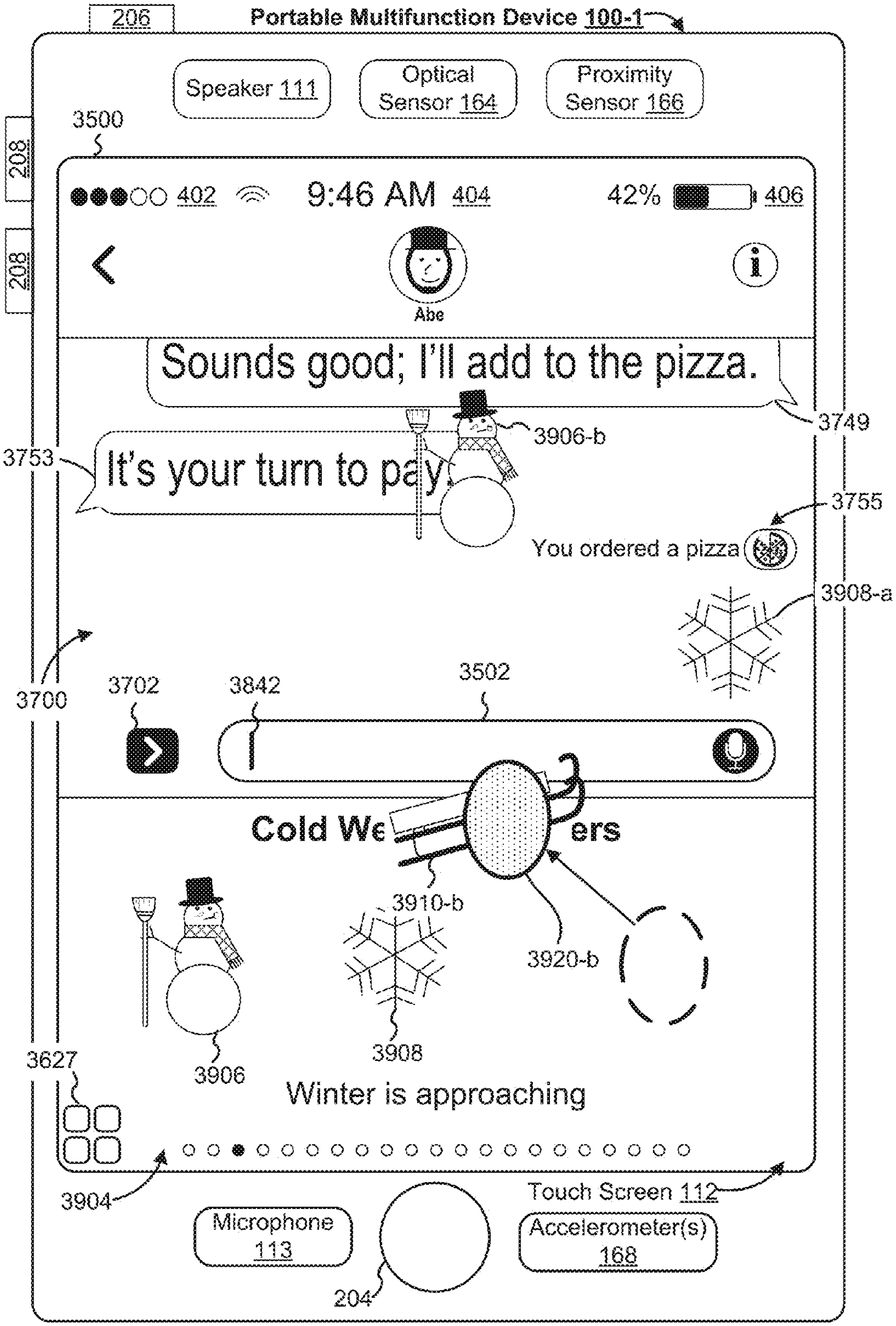
Figure 39M:
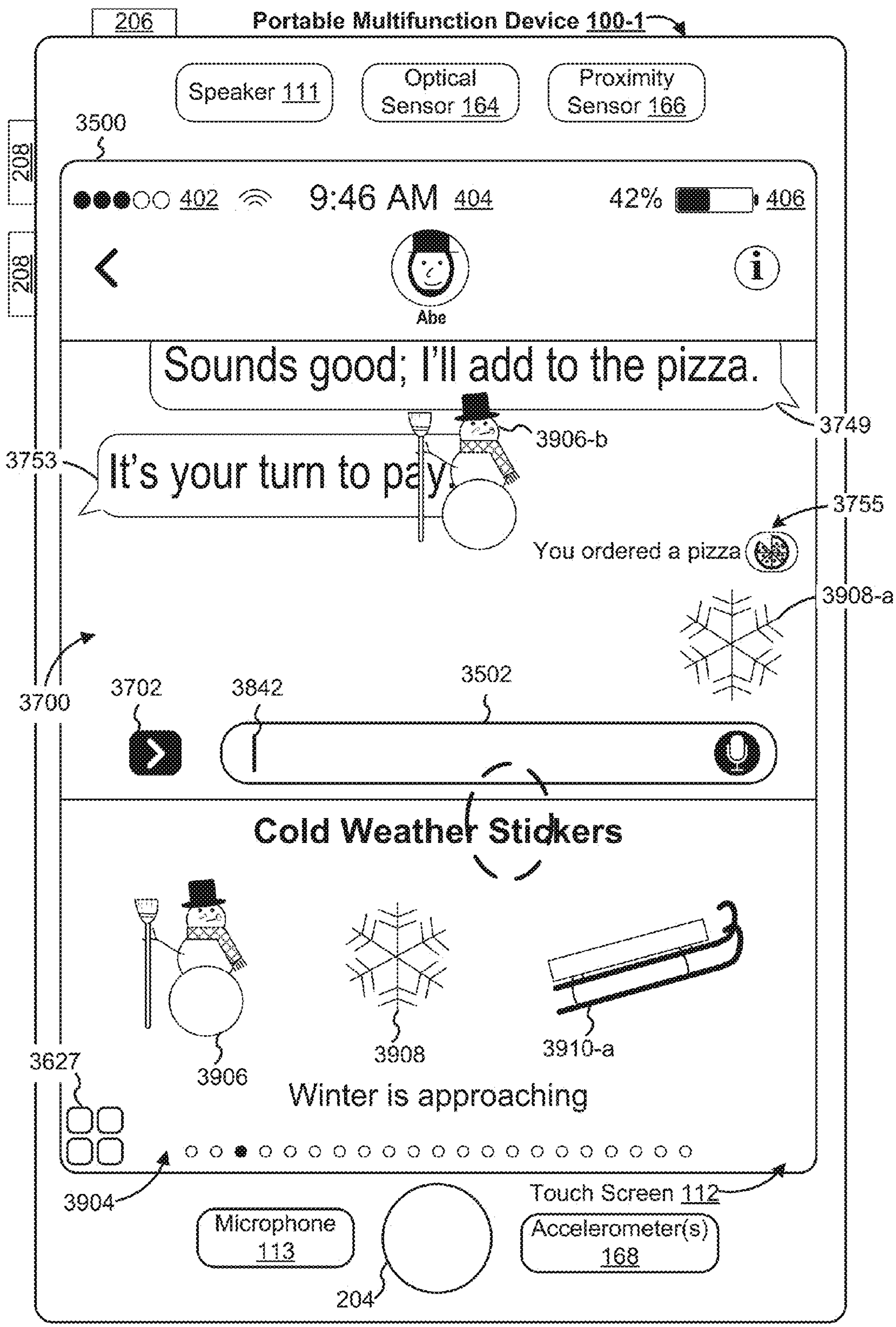
Figure 39N:
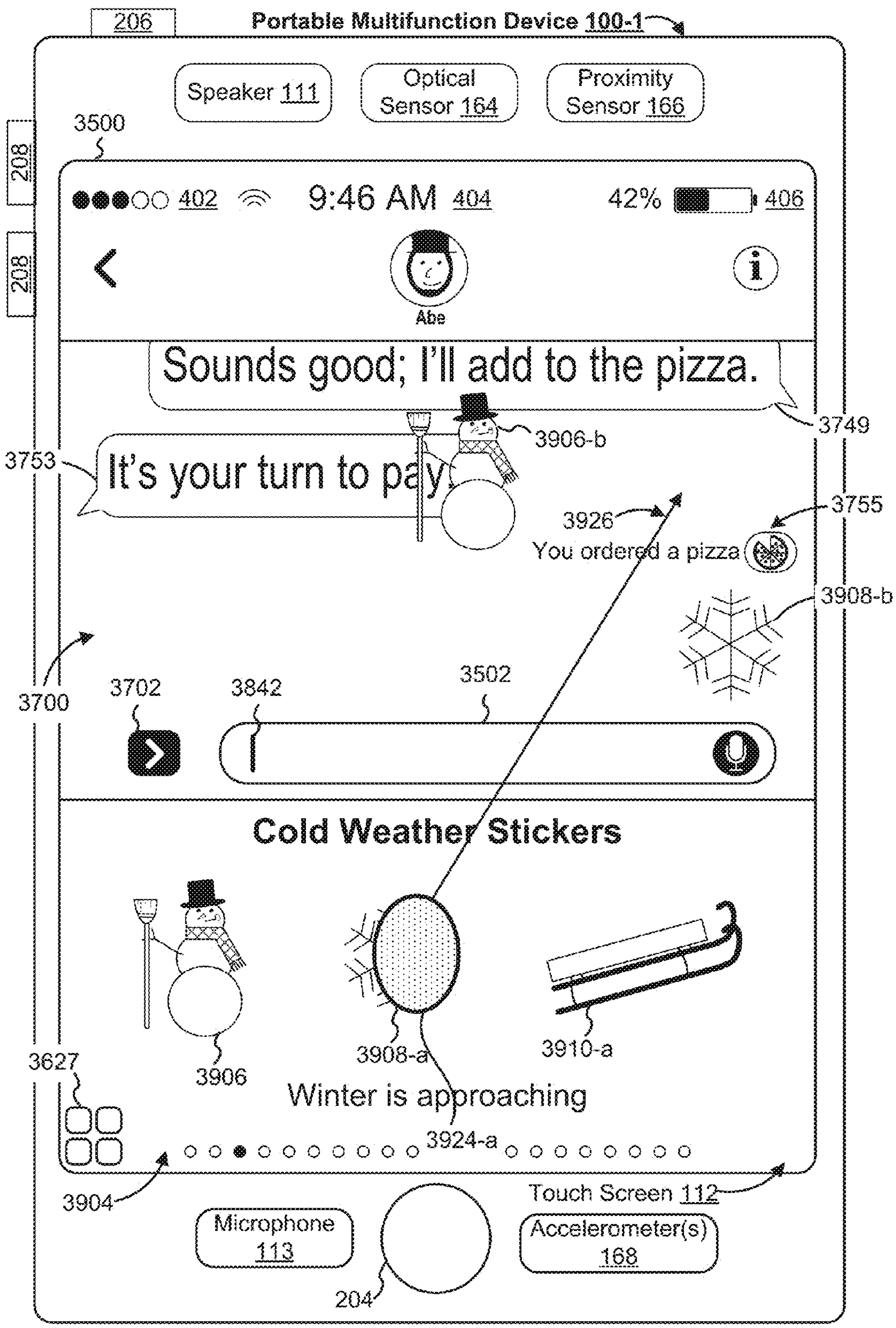
Figure 39O:
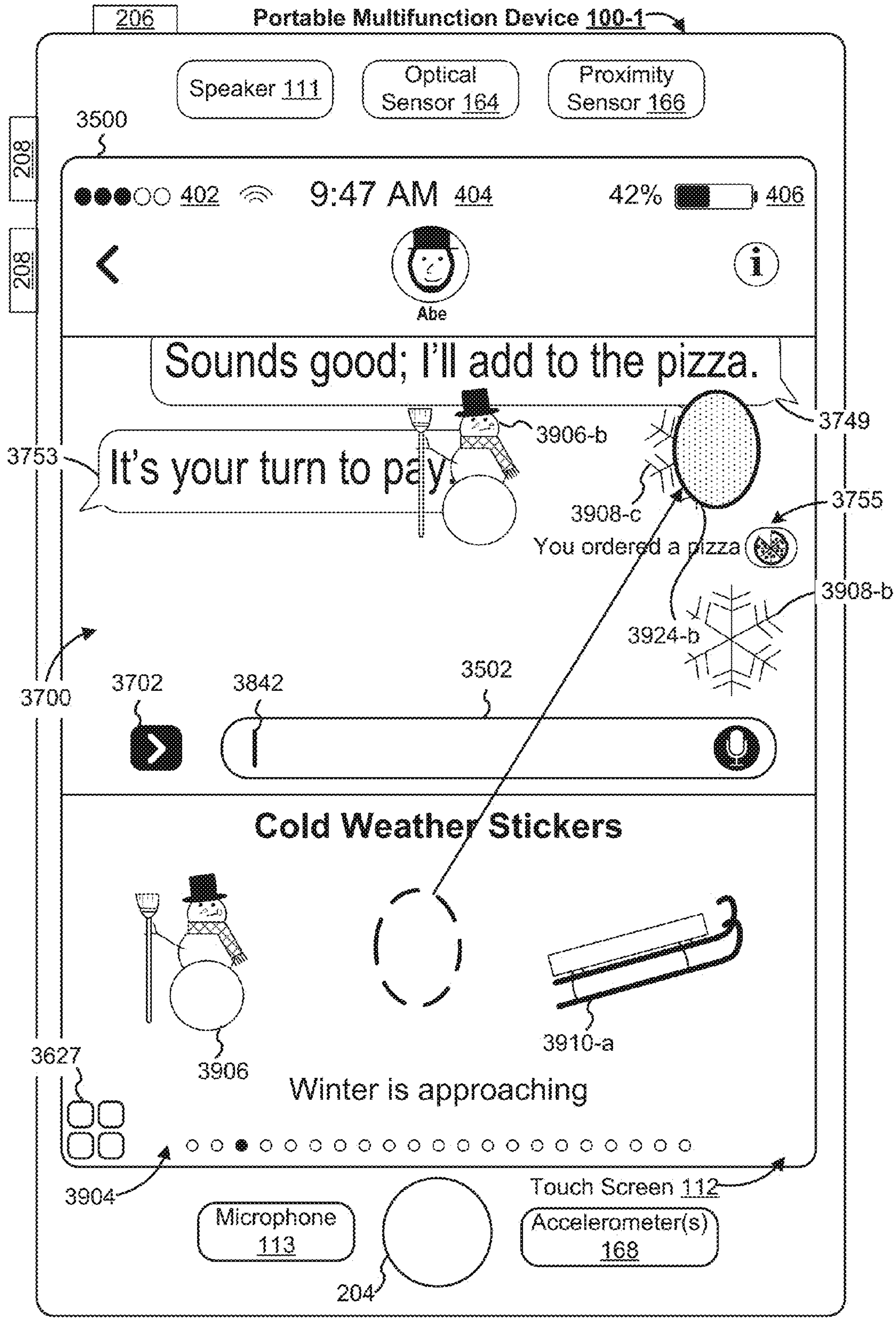

In a fifth embodiment, an electronic sticker is posted directly to the messaging session, at the next temporal position for a message posted in the transcript, in response to detecting a deep press gesture. Device 100-1 detects a press gesture including contact 3932 on snowman sticker 3906 in FIG. 39Y. Device 100-1 then detects an increase in the intensity of contact 3932 above a predefined intensity threshold (e.g., $IT_L$ or $IT_D$) and, in response, posts snowman sticker directly to the messaging session, as displayed at position 3906-*c*, corresponding to the next temporal position for a message posted in transcript 3700, as shown in FIG. 39AA.

Figure 39P:
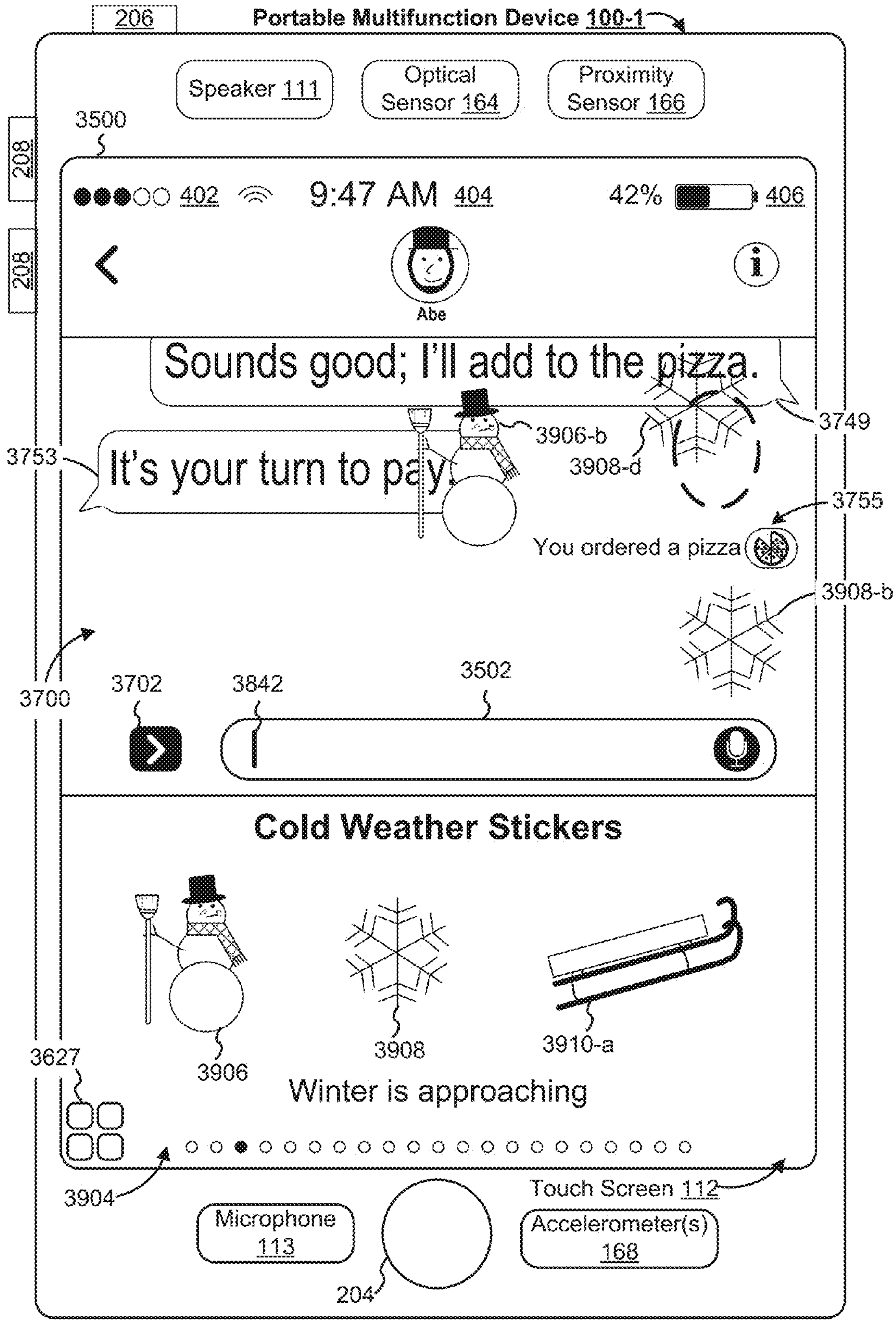
Figure 39Q:
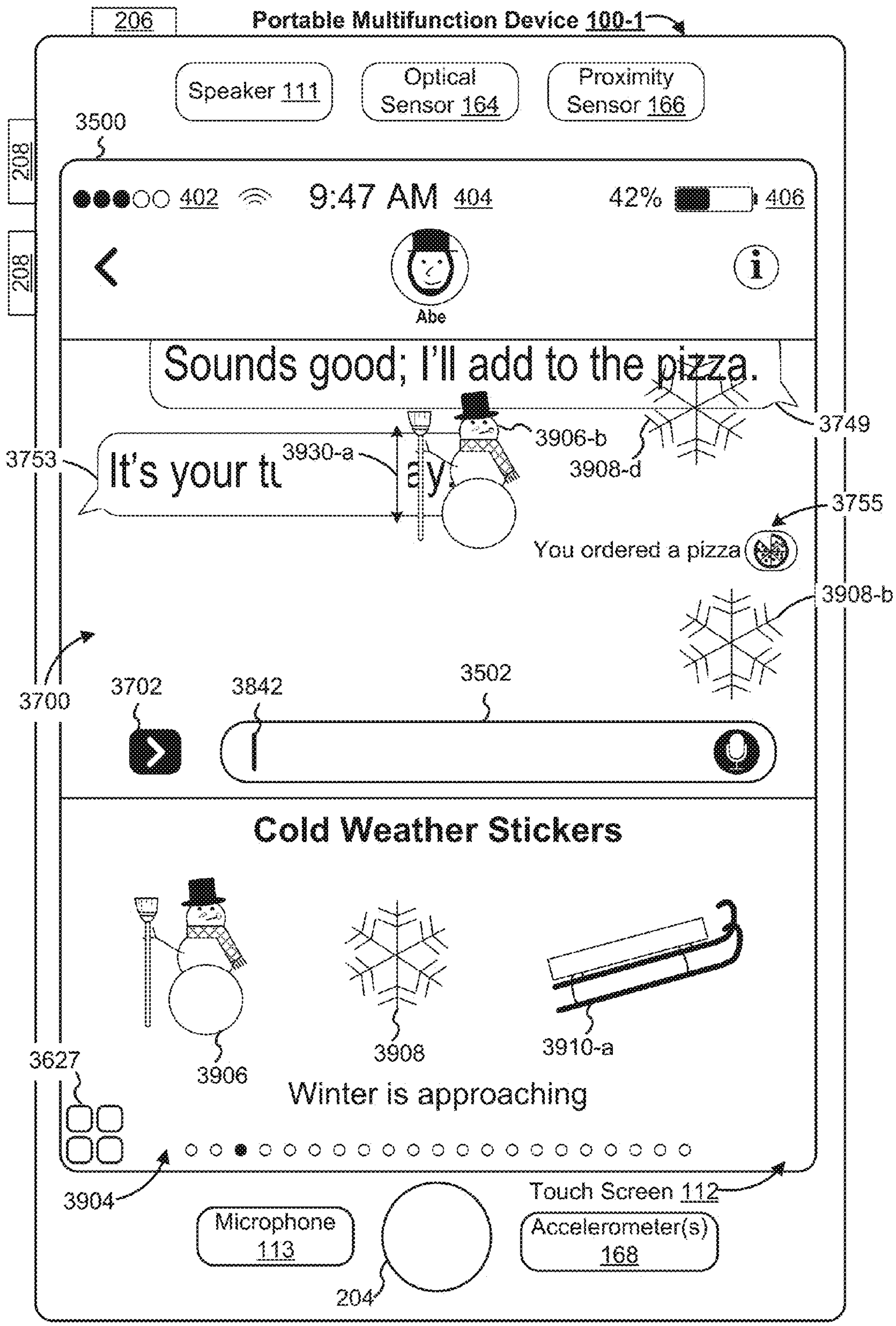

FIGS. 39P-39X illustrate exemplary embodiments where the electronic sticker in animated. In FIG. 39P, snowman sticker 3906 is displayed at location 3906-*b* in conversation transcript 3700, as it was placed in FIGS. 39H-39J. In FIGS. 39Q-39T, snowman sticker 3906 cycles through animation states 3930-*a*, 3930-*b*, and 3930-*c*, appearing to lift and lower his broomstick.

In FIGS. 39U-39X animation 3930 of snowman sticker 3906 is previewed by deep pressing on the sticker in sticker pack 3904. Device 100-1 detects a press gesture including contact 3928 on snowman sticker 3906 in FIG. 39U. Device 100-1 then detects an increase in the intensity of contact 3928 above a predefined intensity threshold (e.g., $IT_L$ or $IT_D$) in FIG. 39V and, in response, cycles snowman sticker 3906 through animation states 3930-*a*, 3930-*b*, and 3930-*c* in FIGS. 39V-39X. In some embodiments, stickers associated with animations are continually animated when displayed in the sticker pack.

FIGS. 39AF-39AT illustrate exemplary embodiments where the position, size, and/or rotation on an electronic sticker are changed.

In one embodiment, the size of an electronic sticker changes in response to the pressure of a contact on the sticker. In FIGS. 39AG-39AI, snowman sticker 3906 is dragged from sticker pack 3904 into conversation transcript 3700 by a drag gesture including movement 3942 of contact

3940 from position 3940-*a* in FIG. 39AG, to position 3940-*c* in FIG. 39AI. During the drag gesture, device 100-1 detects an increase in the intensity of contact 3940 between FIGS. 39AG and 39AH and in between FIGS. 39AH and 39AI. In response, snowman sticker 3940 gets successively larger. The device then detects a decrease in the intensity of contact 3940 between FIGS. 39AI and 39AJ and, in response, the size of snowman sticker 3906 decreases.

In one embodiment, the rotation of an electronic sticker changes in response to a rotation gesture by a contact on the sticker. Device 100-1 detects a counter-clockwise rotation gesture including rotation 3944 of contact 3940 from position 3940-*c* in FIG. 39AK to position 3940-*d* in FIG. 39AL. In response, snowman sticker 3906 is rotated counter-clockwise, in accordance with rotation 3944, from position 3906-*e* in FIG. 39AK to position 3906-*f* in FIG. 39AL. In response to detecting lift-off of contact 3940 from touch screen 112, while in conversation transcript 3700, snowman sticker 3906 is posted to the messaging session, as displayed rotated and larger, with respect to its original appearance in the sticker pack, at position 3906-*f* within conversation transcript 3700 in FIG. 39AM.

In one embodiment, the position of an electronic sticker can be changed after initially placing the sticker within the conversation transcript. Device 100-1 detects a drag gesture initiating over snowman sticker 3906 in conversation transcript 3700, after the sticker was initially placed in the transcript in FIG. 39AM. The drag gesture includes movement 3948 of contact 3946 from position 3946-*a* in FIG. 39AN to position 3946-*b* in FIG. 39AO. In response, snowman sticker moves from position 3906-*f* in FIG. 39AN to position 3906-*g*—in FIG. 39AO, in accordance with movement 3948.

In one embodiment, the size of an electronic sticker is changed after initially placing the sticker with the conversation transcript. As a continuation of the gesture described above, device 100-1 detects an increase in the intensity of contact 3946 between FIGS. 39AO and 39AP. In response, snowman sticker 3940 is displayed larger in FIG. 39AP.

In one embodiment, the rotation of an electronic sticker is changed after initially placing the sticker with the conversation transcript. As a continuation of the gesture described above, device 100-1 detects a counter-clockwise rotation gesture including rotation 3950 of contact 3946 from position 3946-*b* in FIG. 39AQ to position 3946-*c* in FIG. 39AR. In response, snowman sticker 3906 is rotated counter-clockwise, in accordance with rotation 3944, from position 3906-*g* in FIG. 39AQ to position 3906-*h* in FIG. 39AR. In response to detecting lift-off of contact 3946 from touch screen 112, while in conversation transcript 3700, snowman sticker 3906 is placed back in the transcript as displayed in FIG. 39AS. The device sends information about the orientation of snowman sticker 3906 at position 3906-*h* to electronic devices corresponding to other users included in the messaging session associated with conversation transcript 3700.

In one embodiment, the position, size, and/or rotation of an electronic sticker is changed by a second user after being posted to the messaging session. Device 100-1 receives information from another device corresponding to another user included in the messaging session associated with conversation transcript 3700 (e.g., "Abe"). The information conveys that Abe changes the position, size, and rotation of snowman sticker 3906 from orientation (e.g., position) 3906-*h*, as illustrated in FIG. 39AS, to orientation 39064, as illustrated in FIG. 39AT. In response, device 100-1 displays snowman sticker 3906 with orientation 39064 in FIG. 39AT.

Figure 40A:
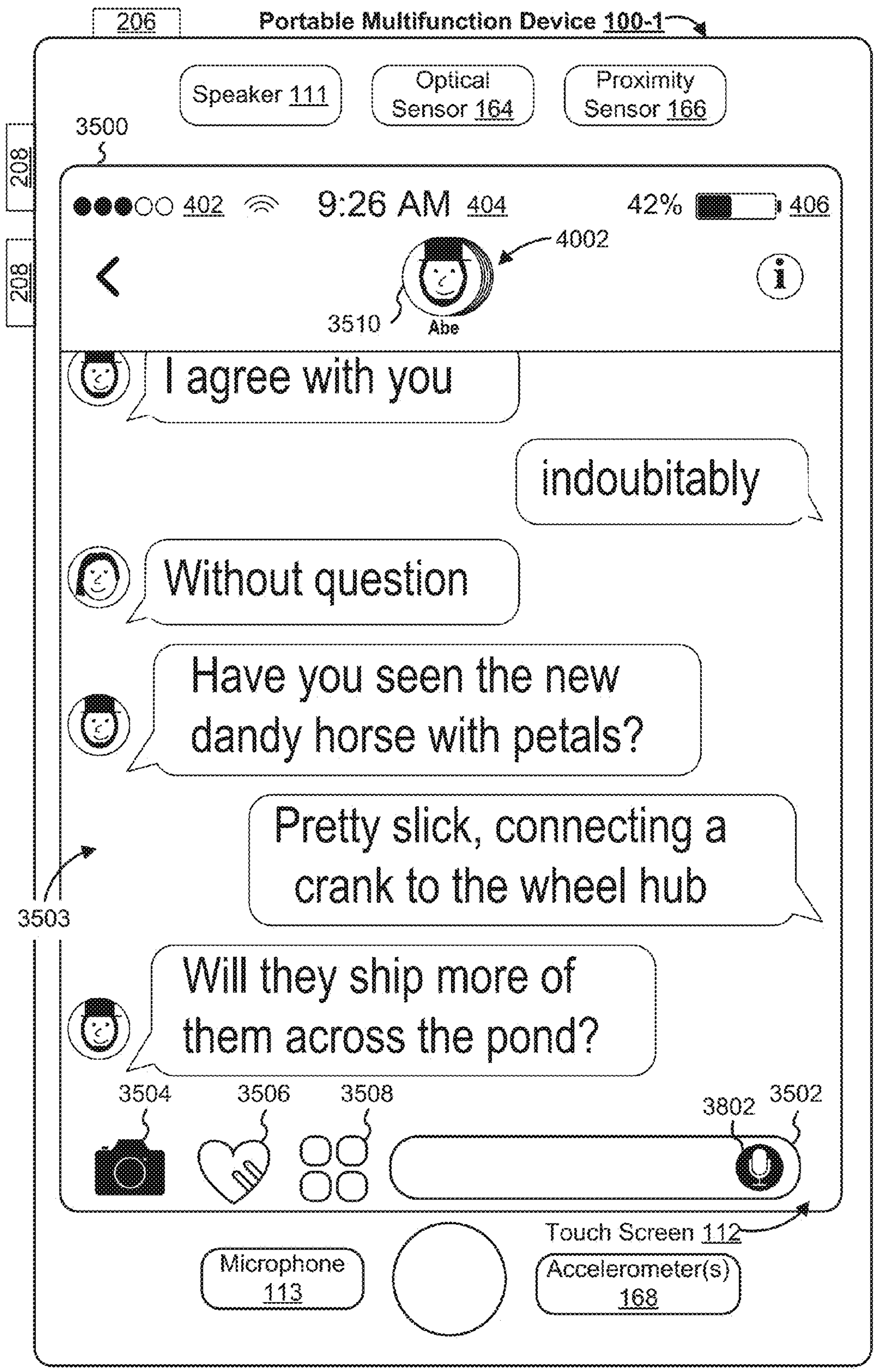
FIGS. 40A-40W illustrate exemplary user interfaces for interacting with other users of a messaging transcript through an avatar in accordance with some embodiments.
Figure 40B:
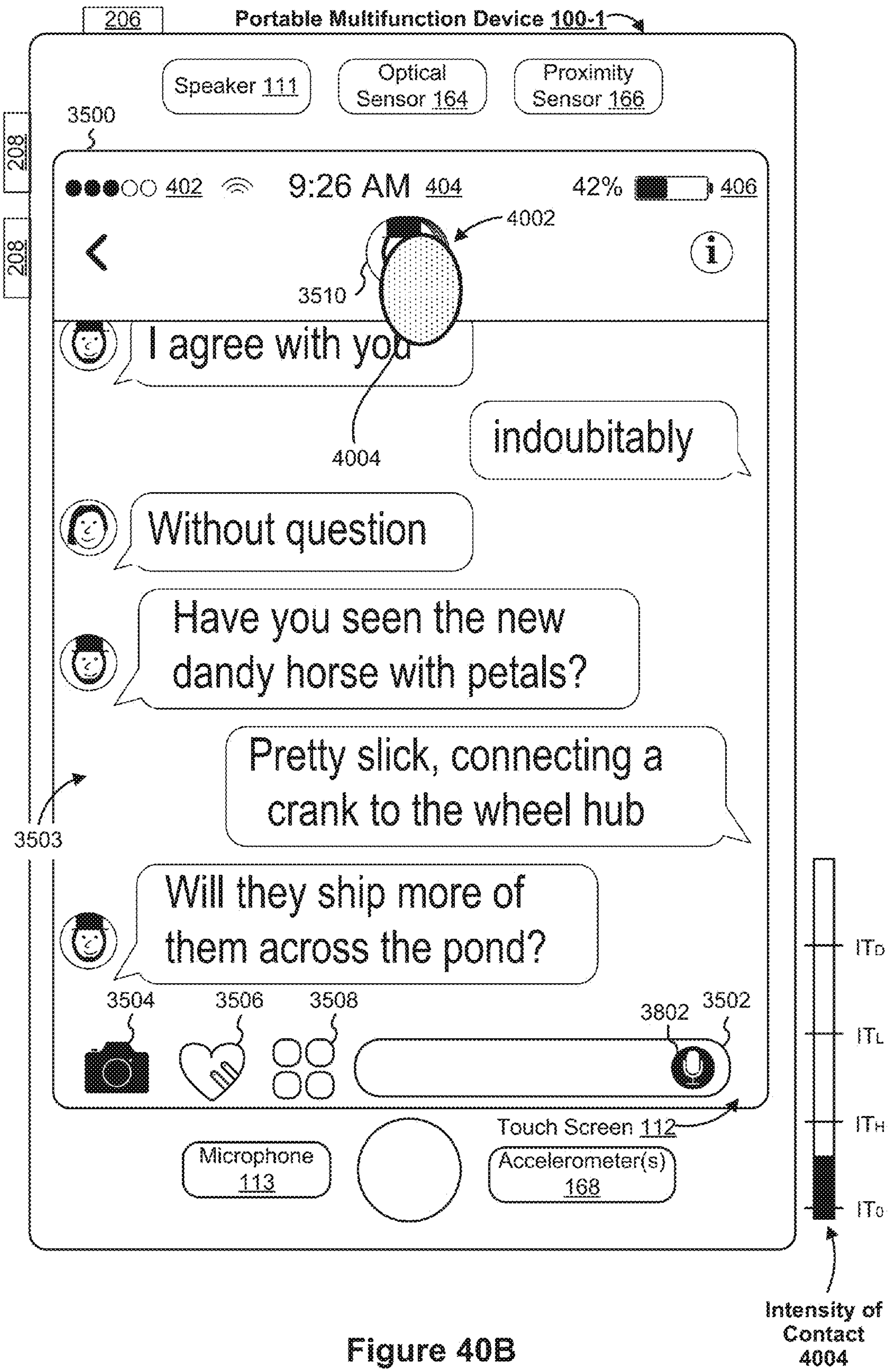
Figure 40C:
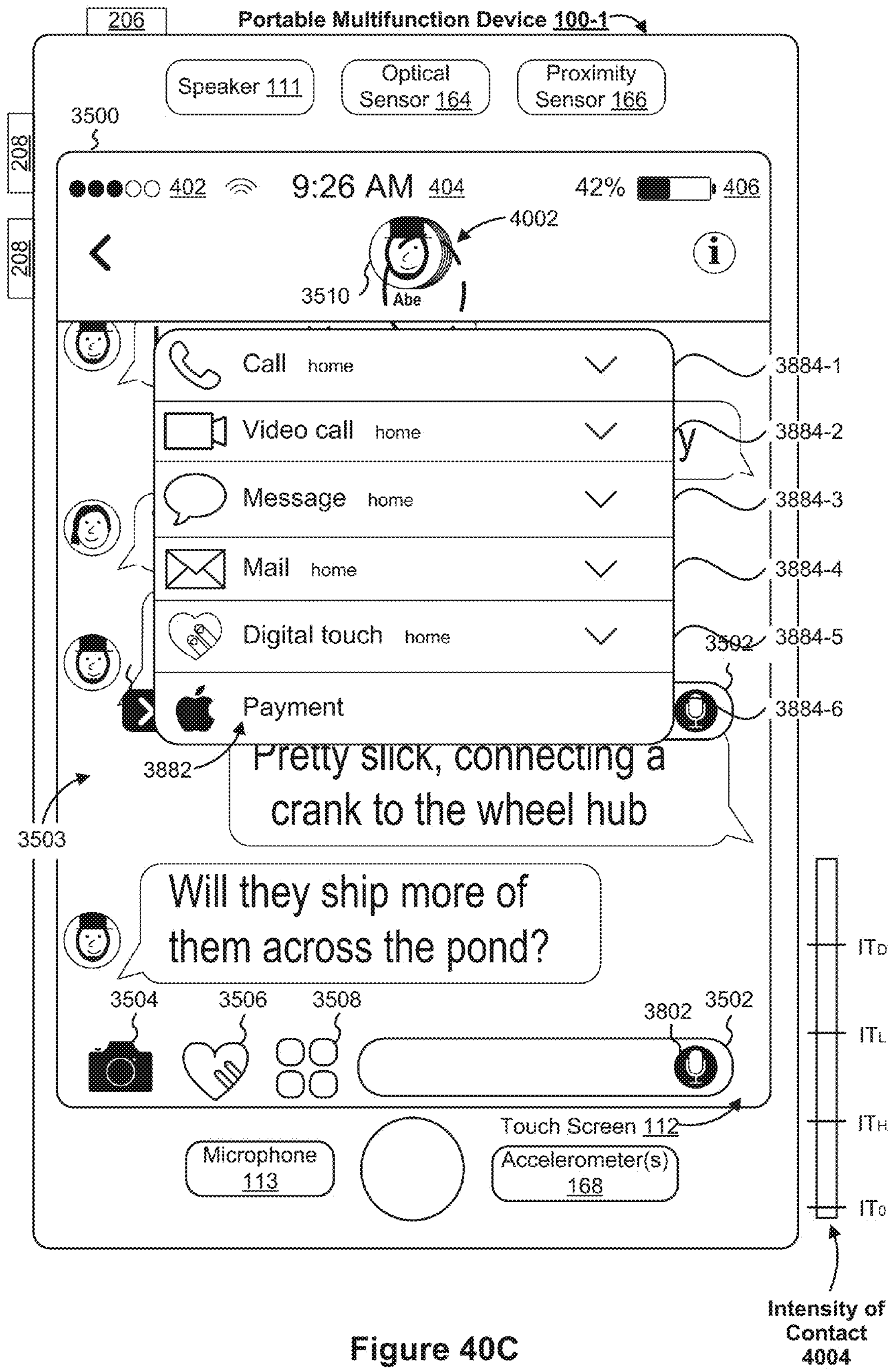
Figure 40D:
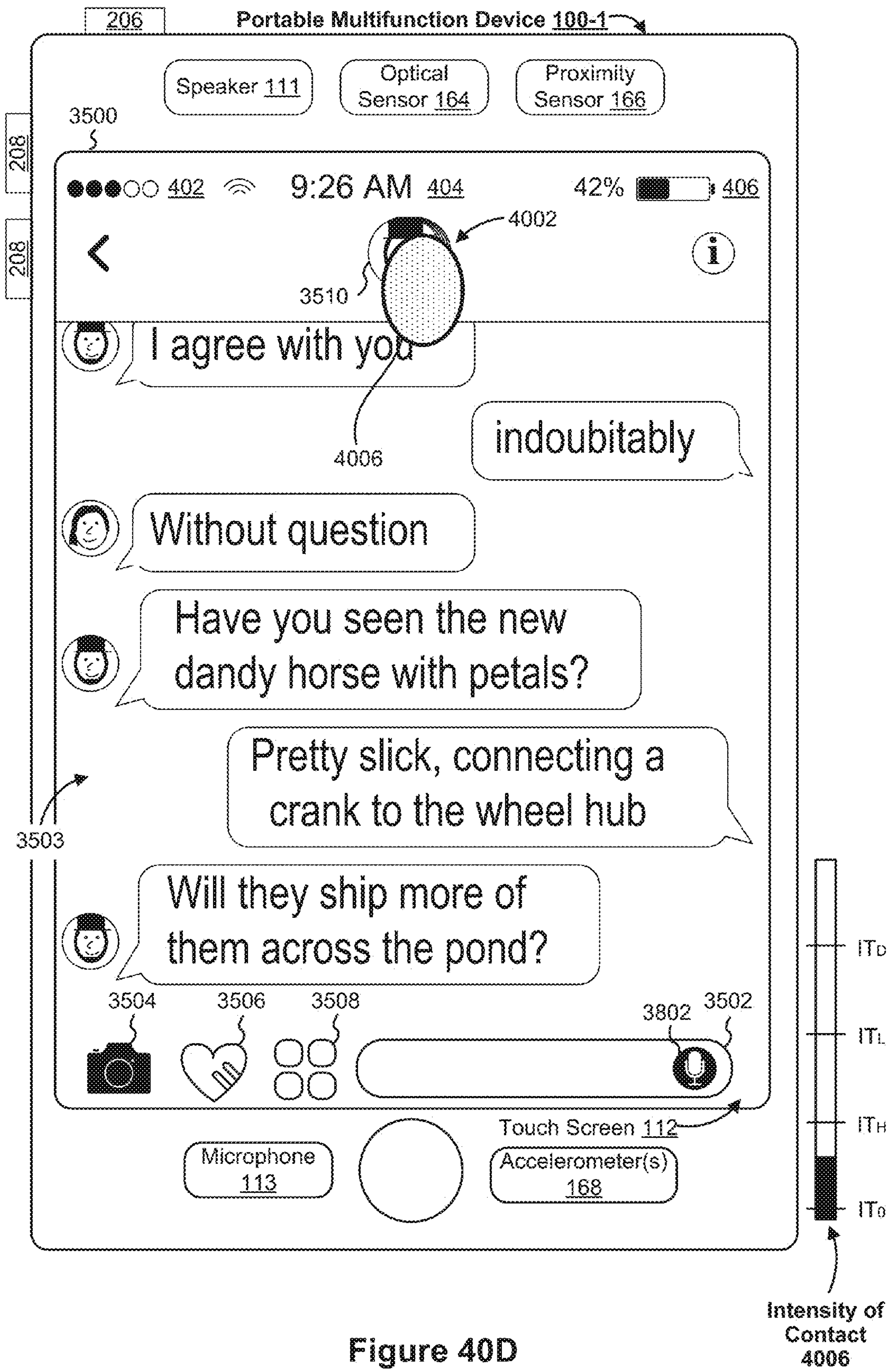
Figure 40E:
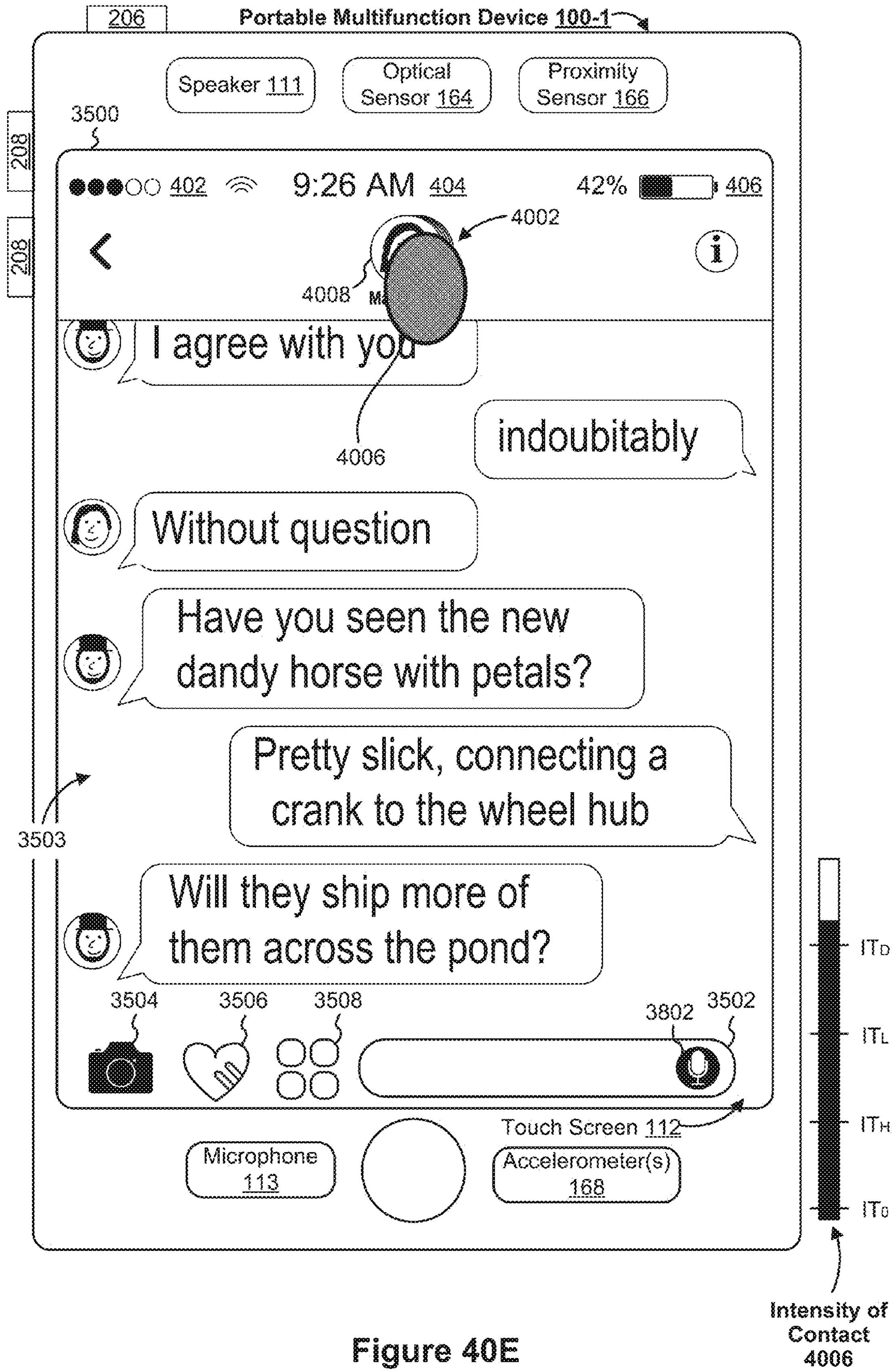
Figure 40F:
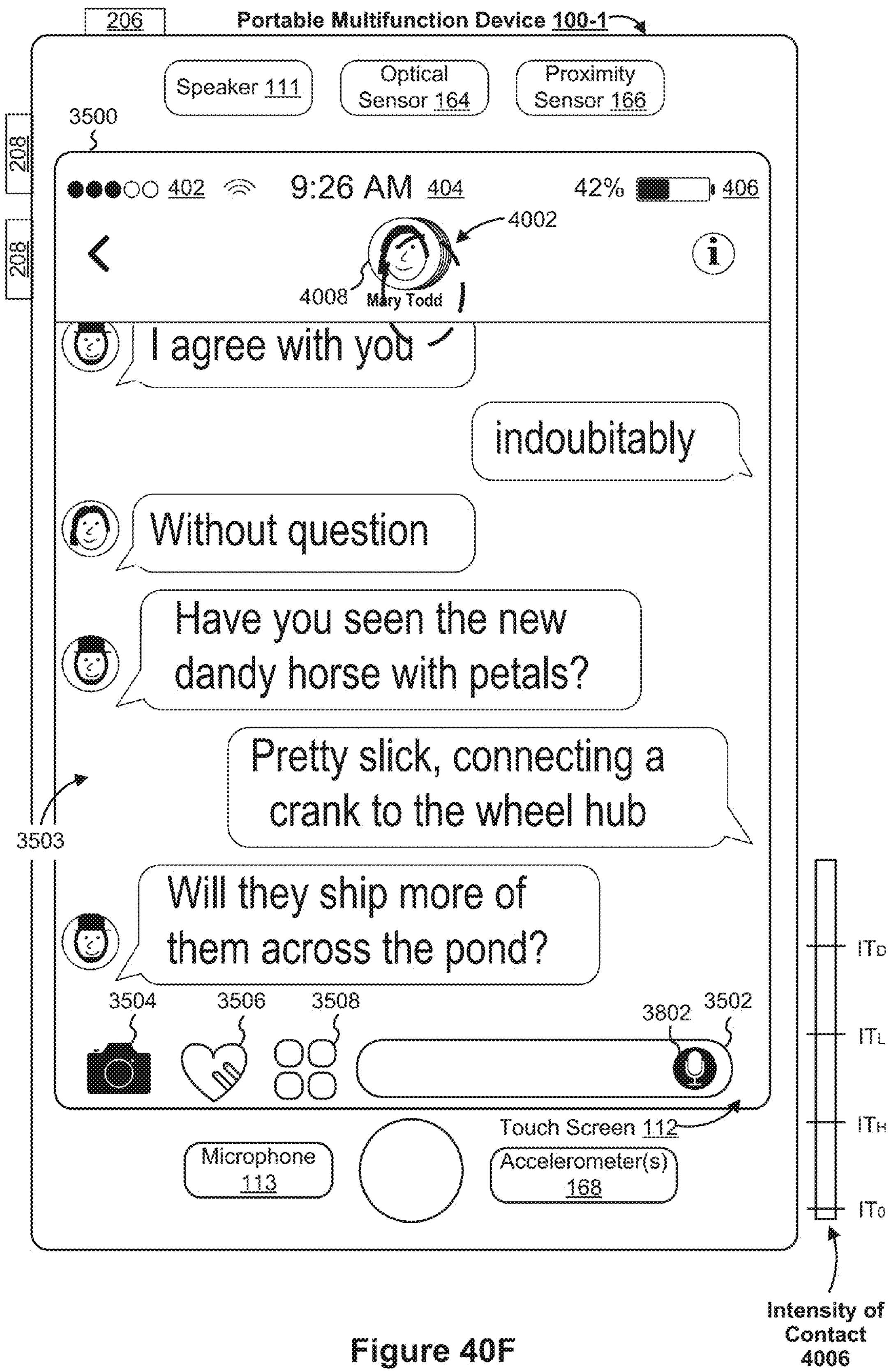
Figure 40G:
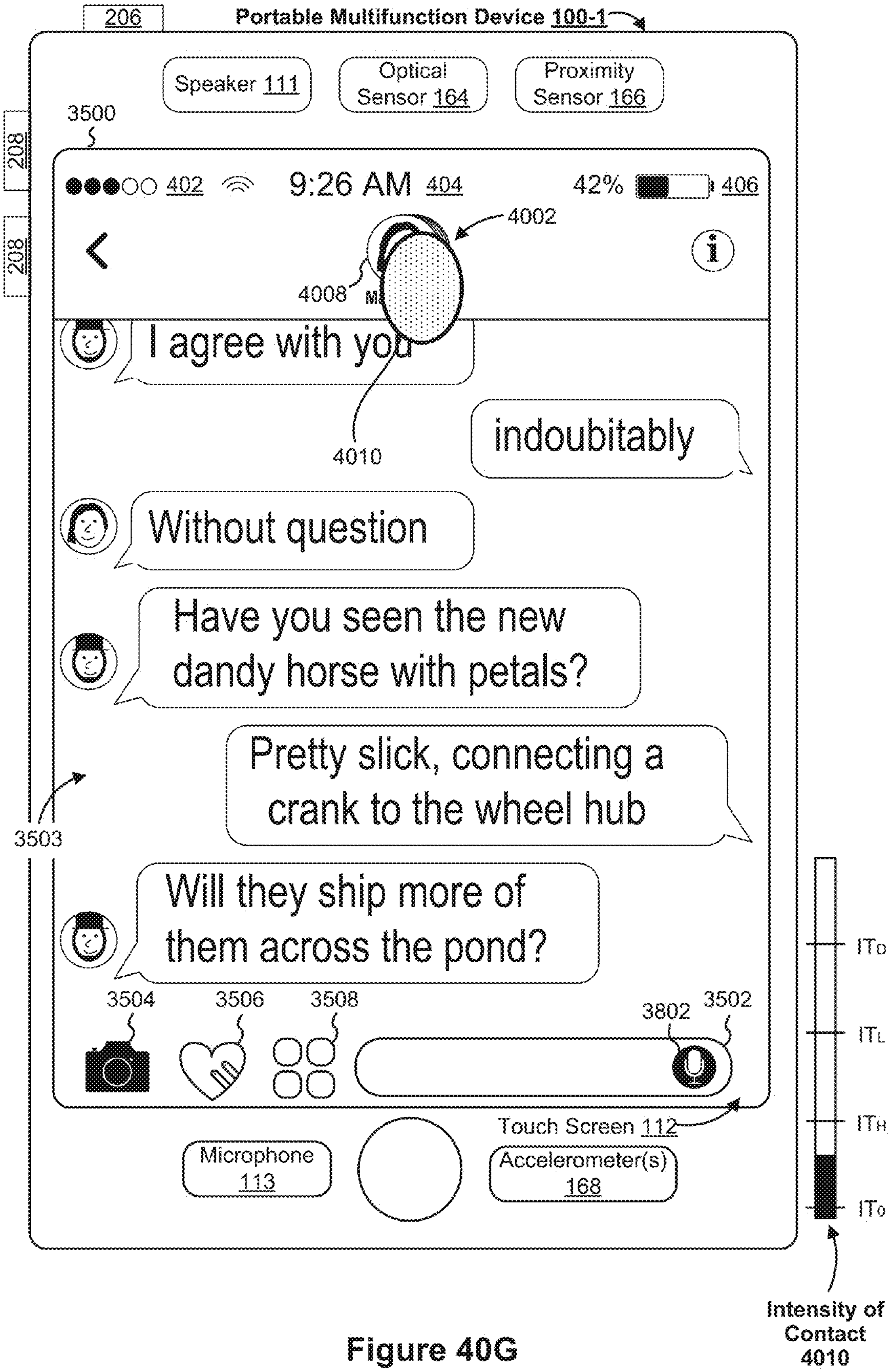
Figure 40H:
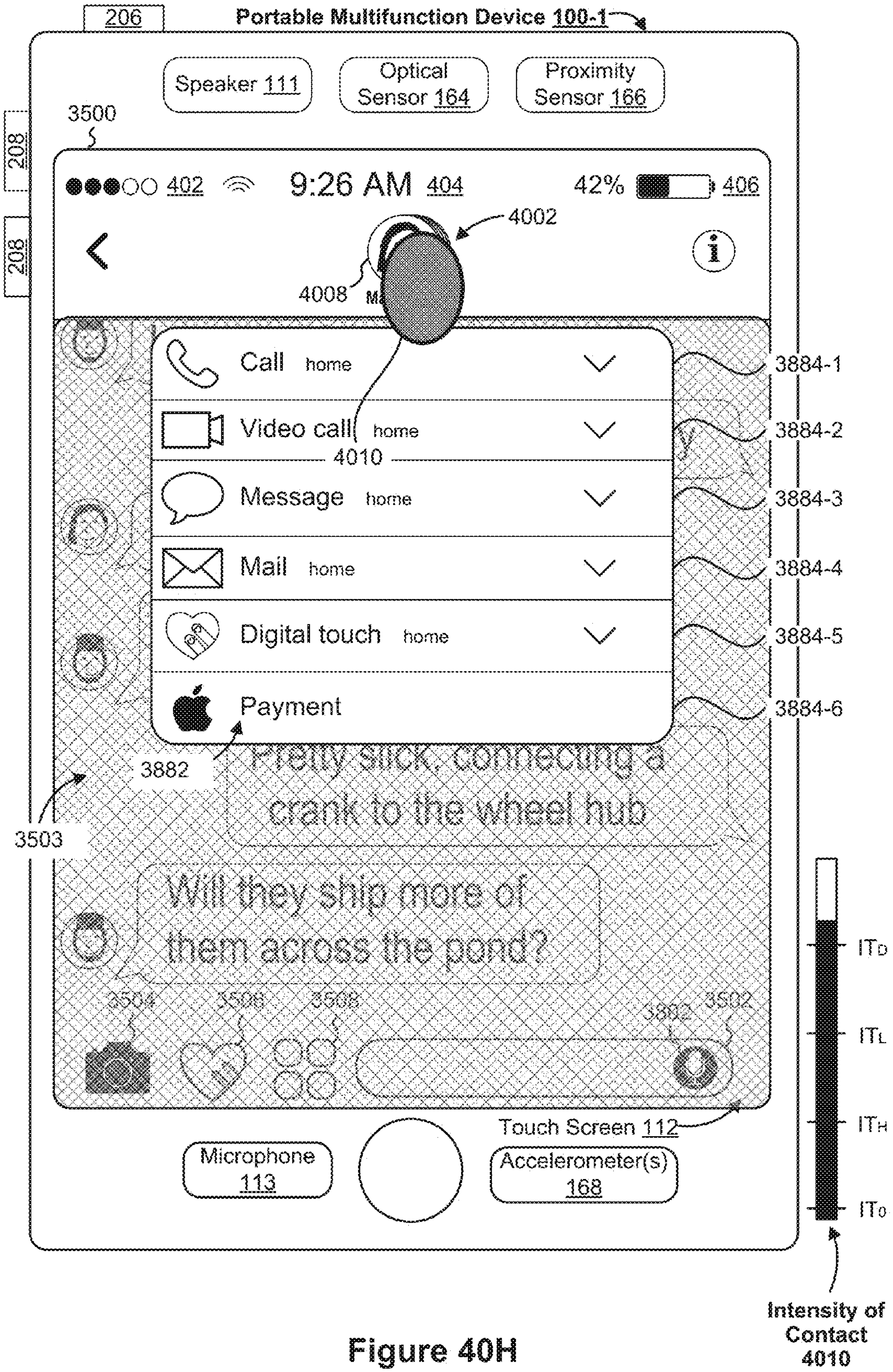
Figure 40I:
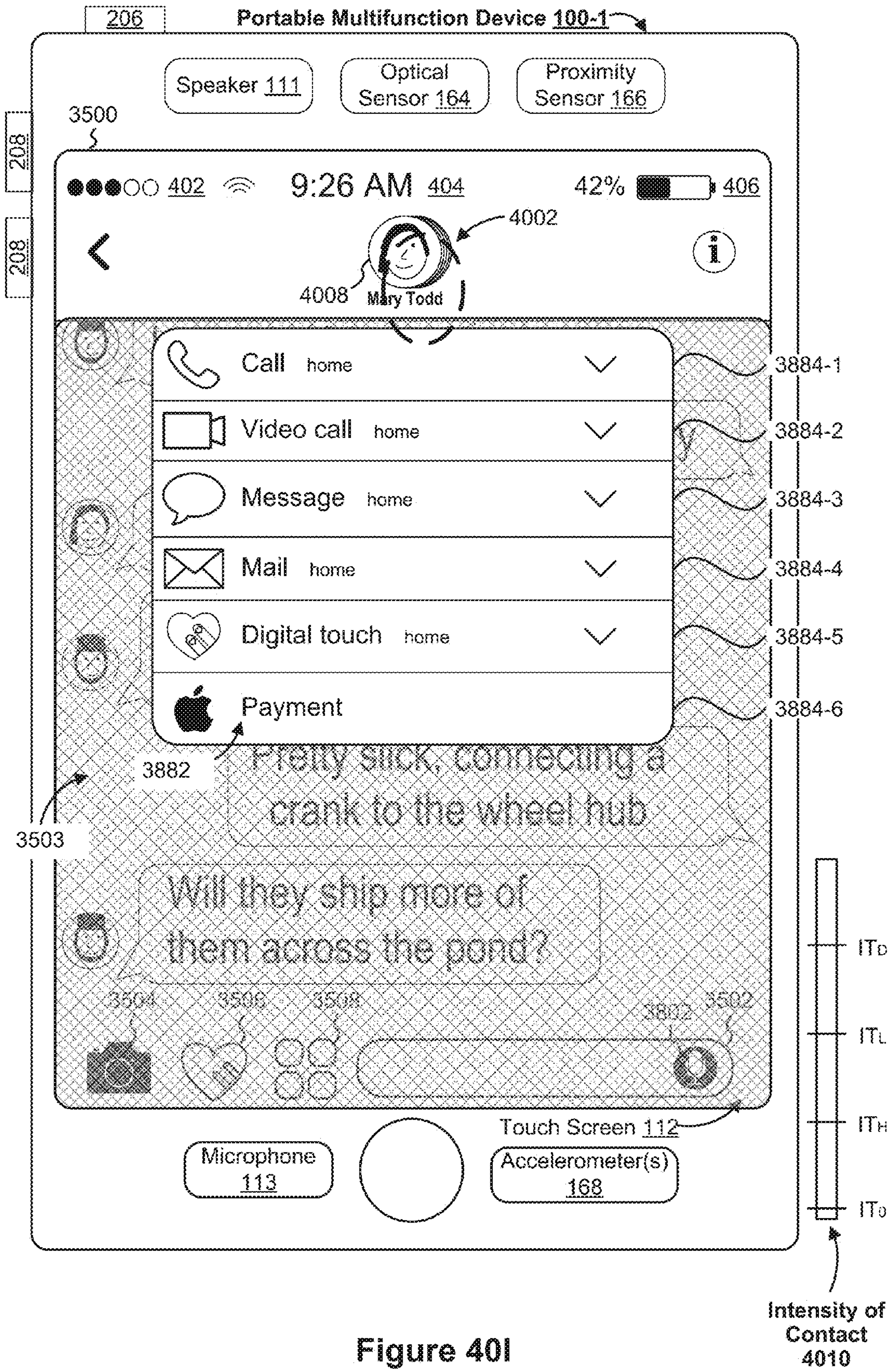
Figure 40J:
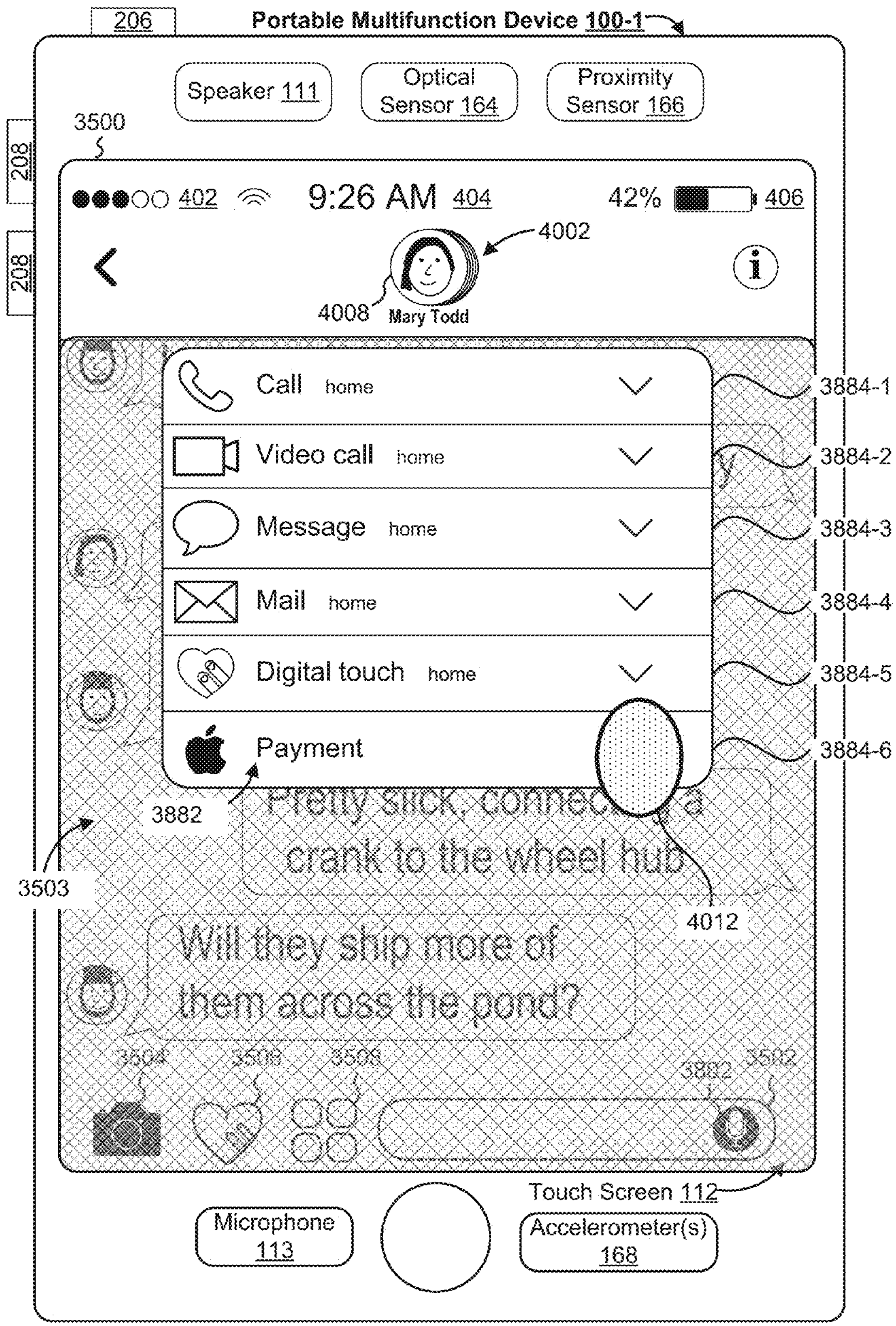
Figure 40K:
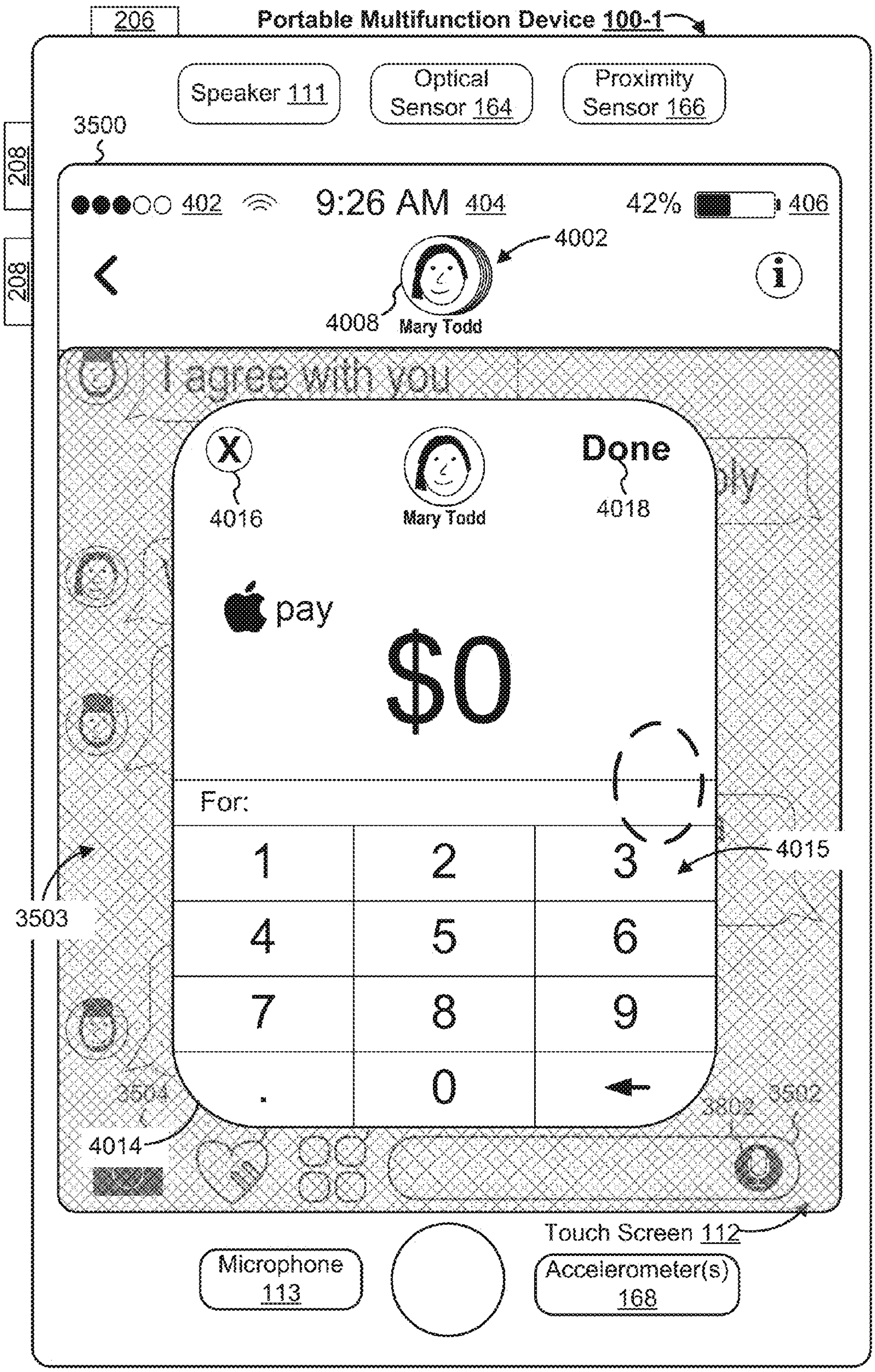
Figure 40L:
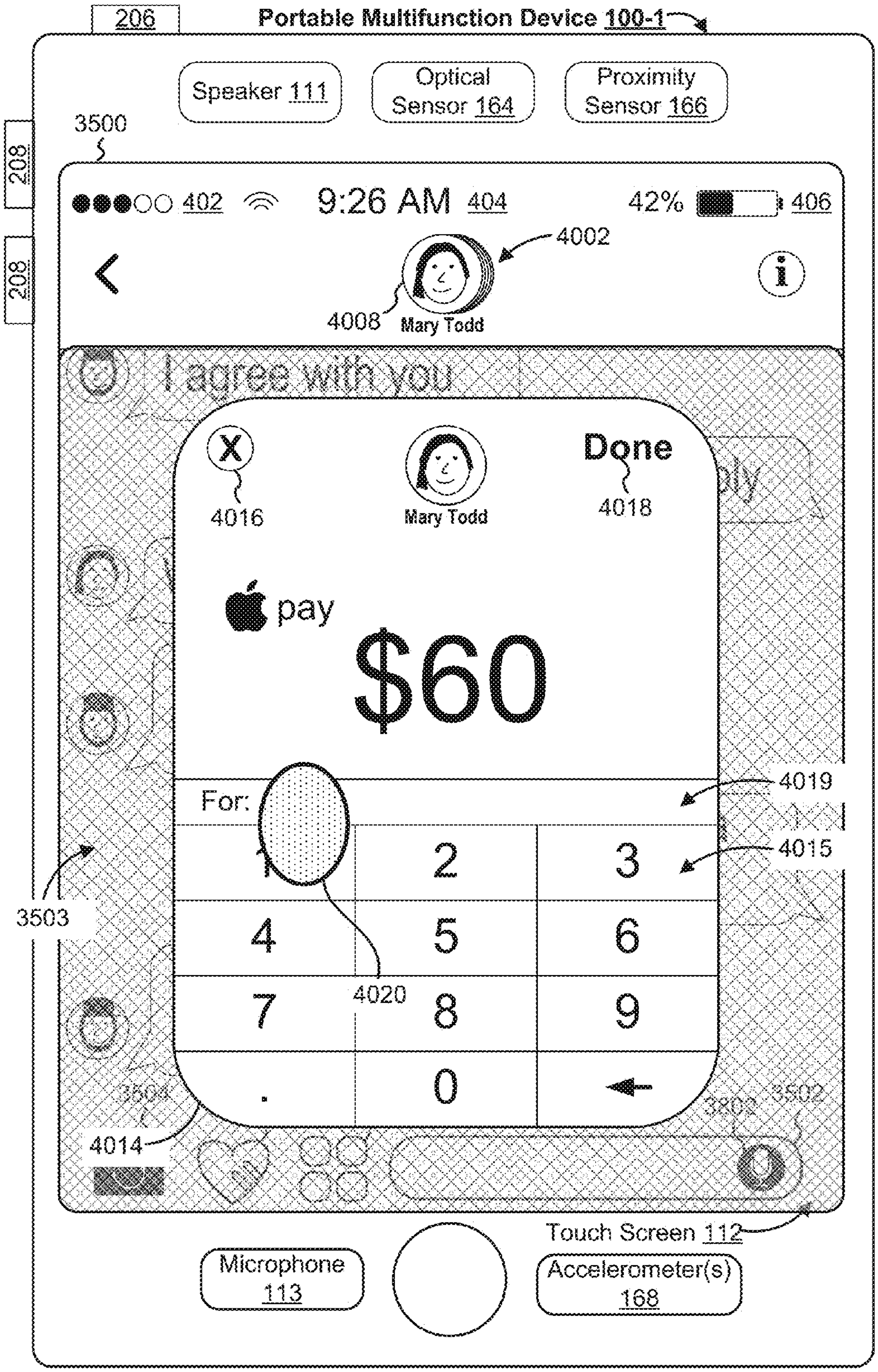
Figure 40M:
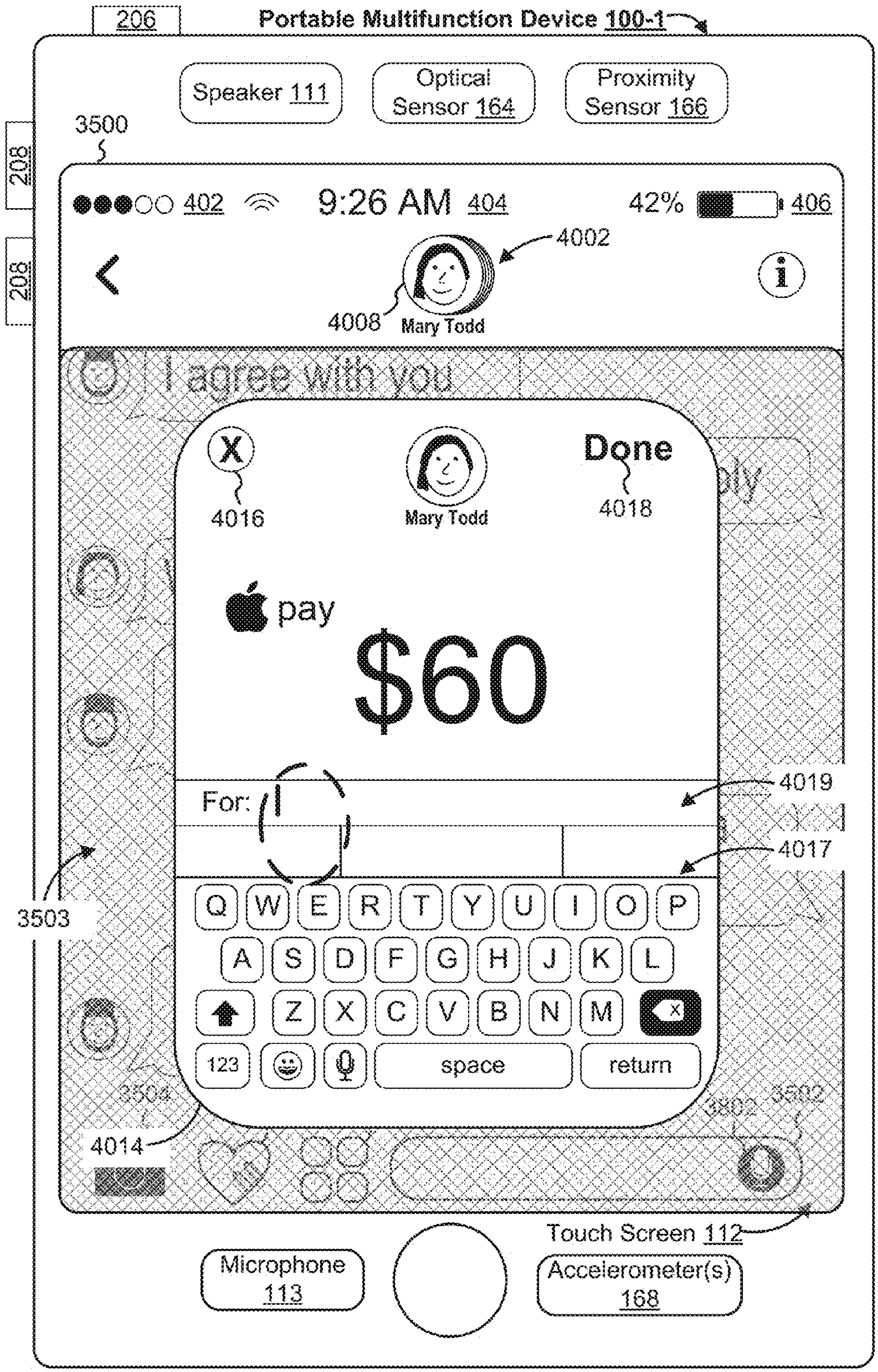
Figure 40N:
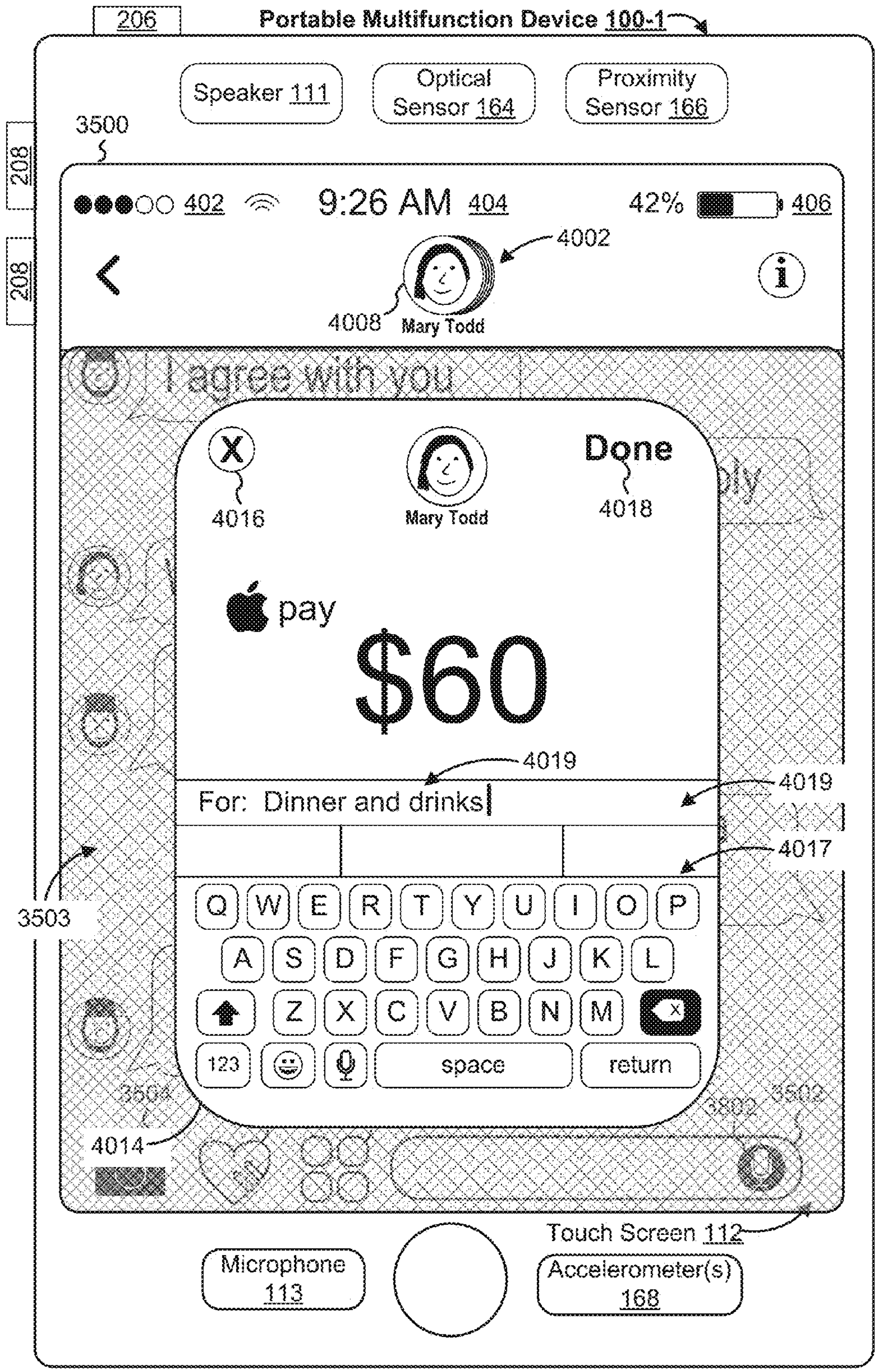
Figure 40O:
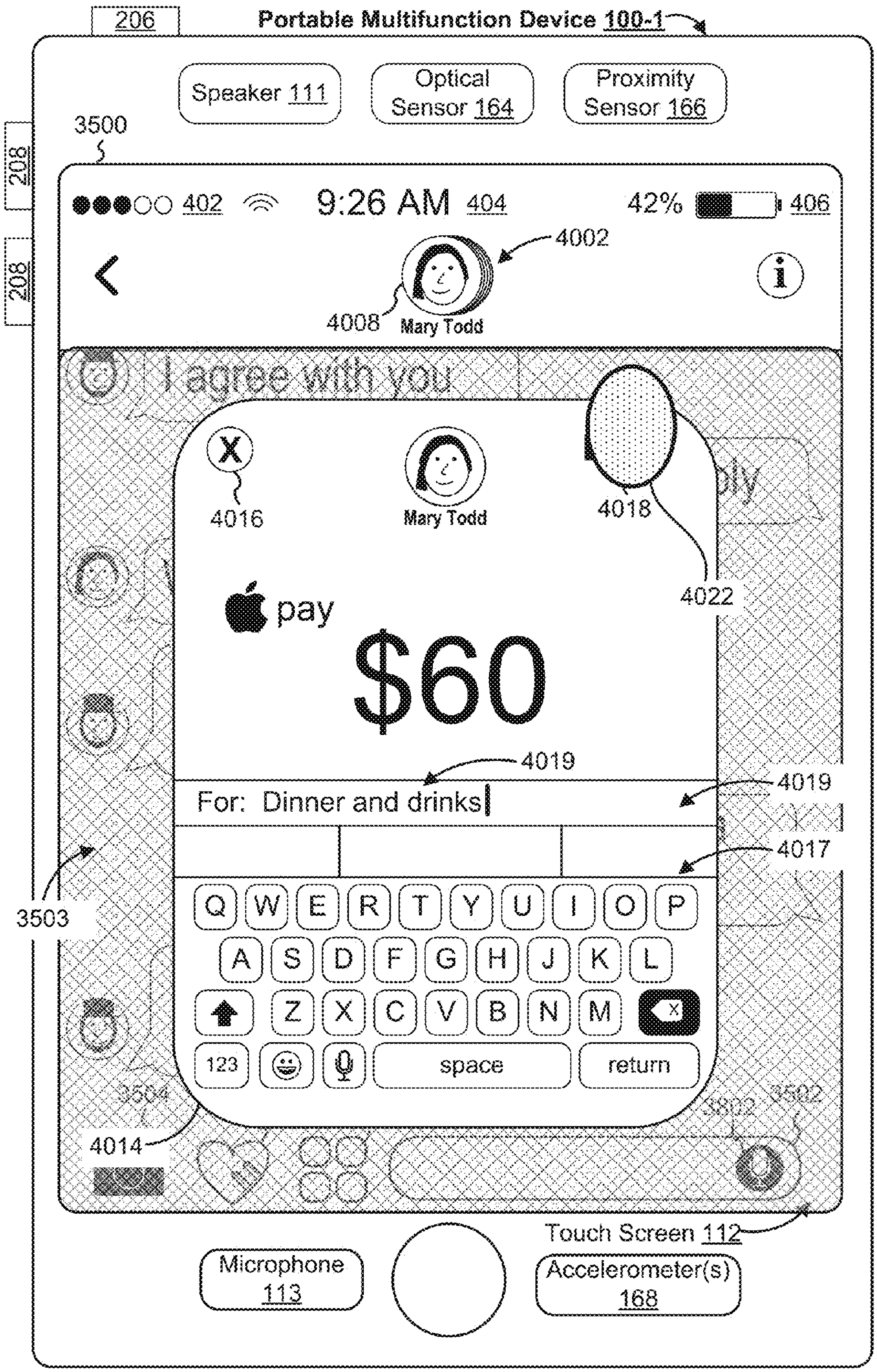
Figure 40P:
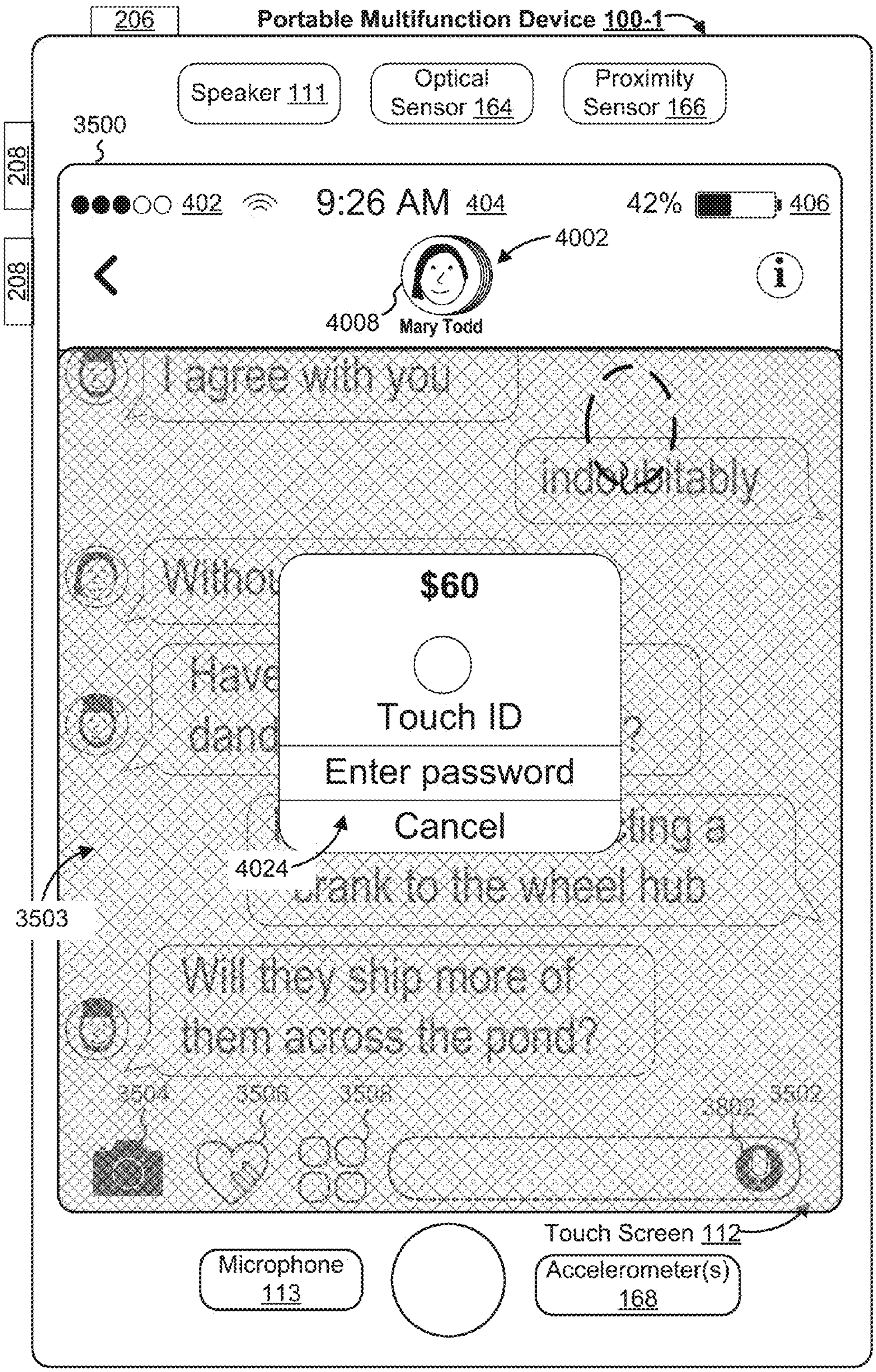
Figure 40Q:
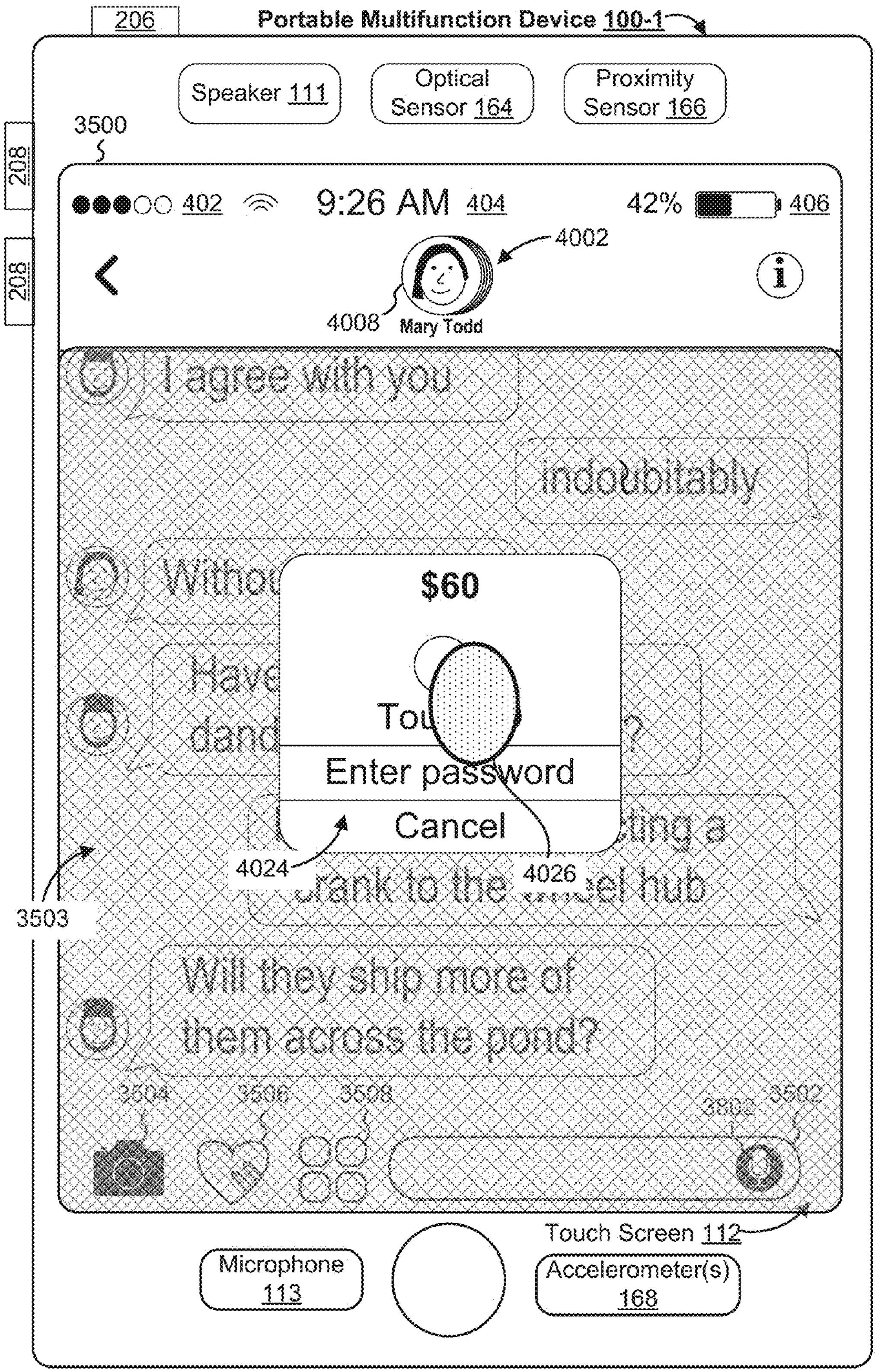
Figure 40R:
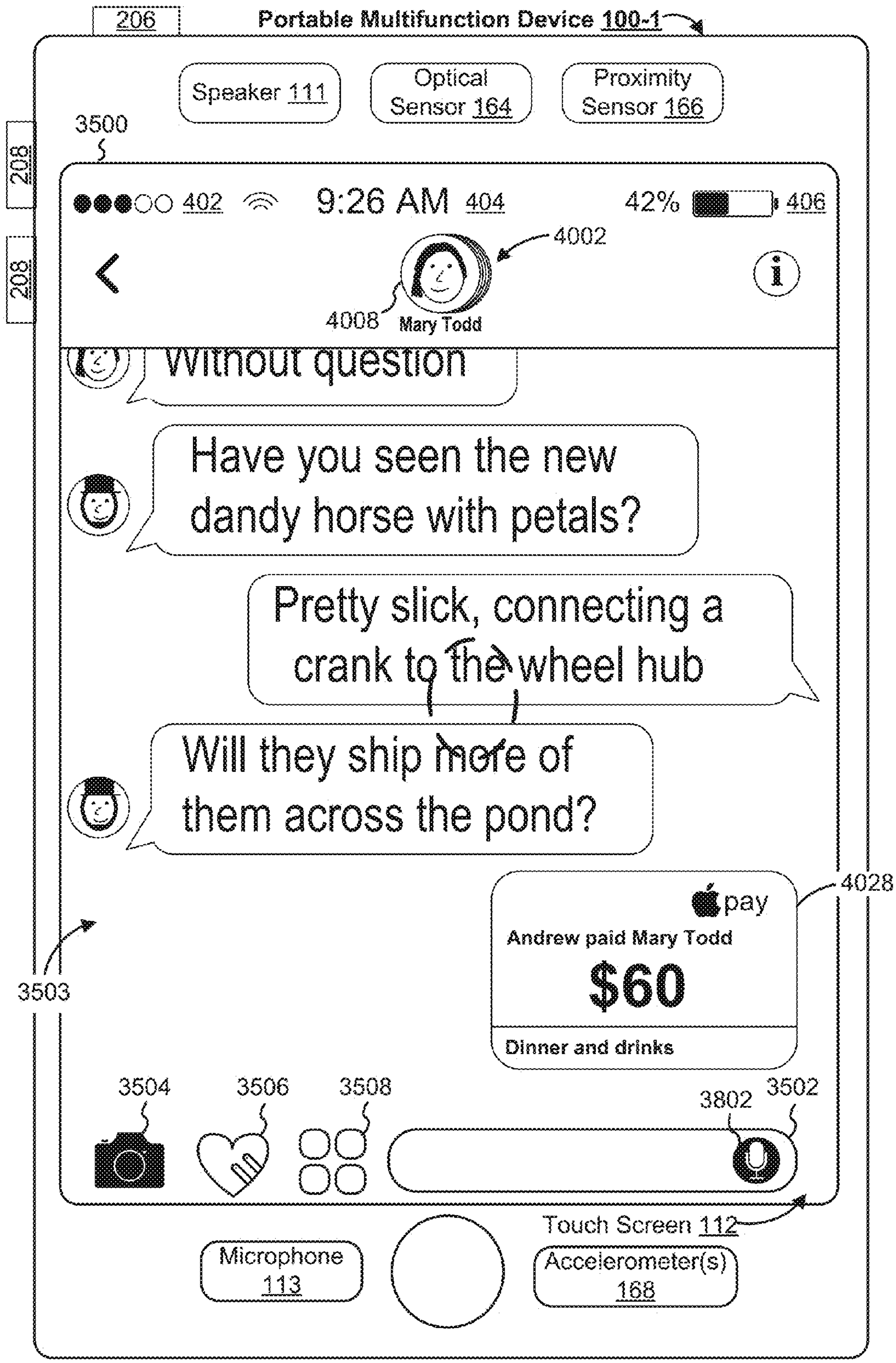
Figure 40S:
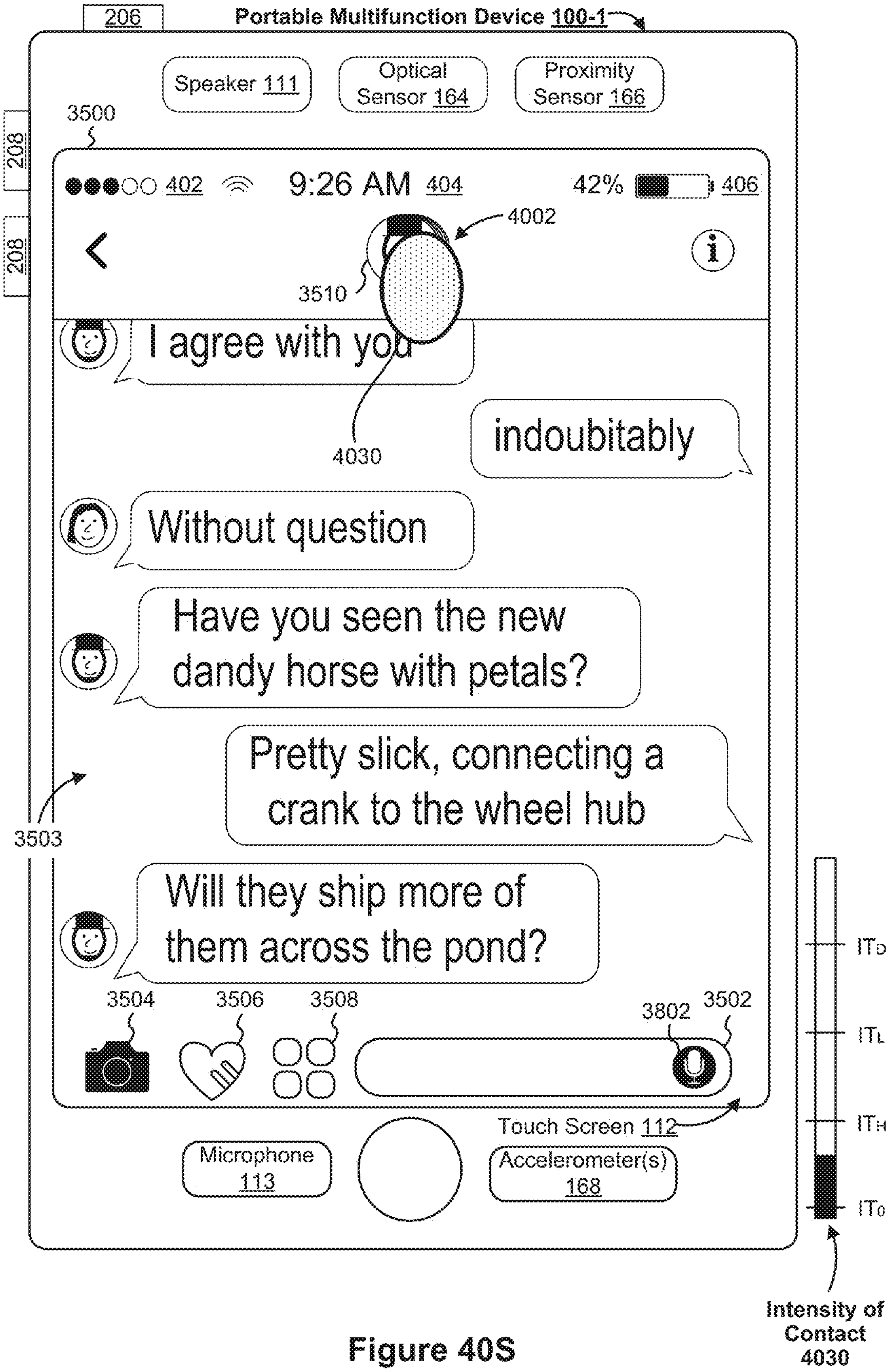
Figure 40T:
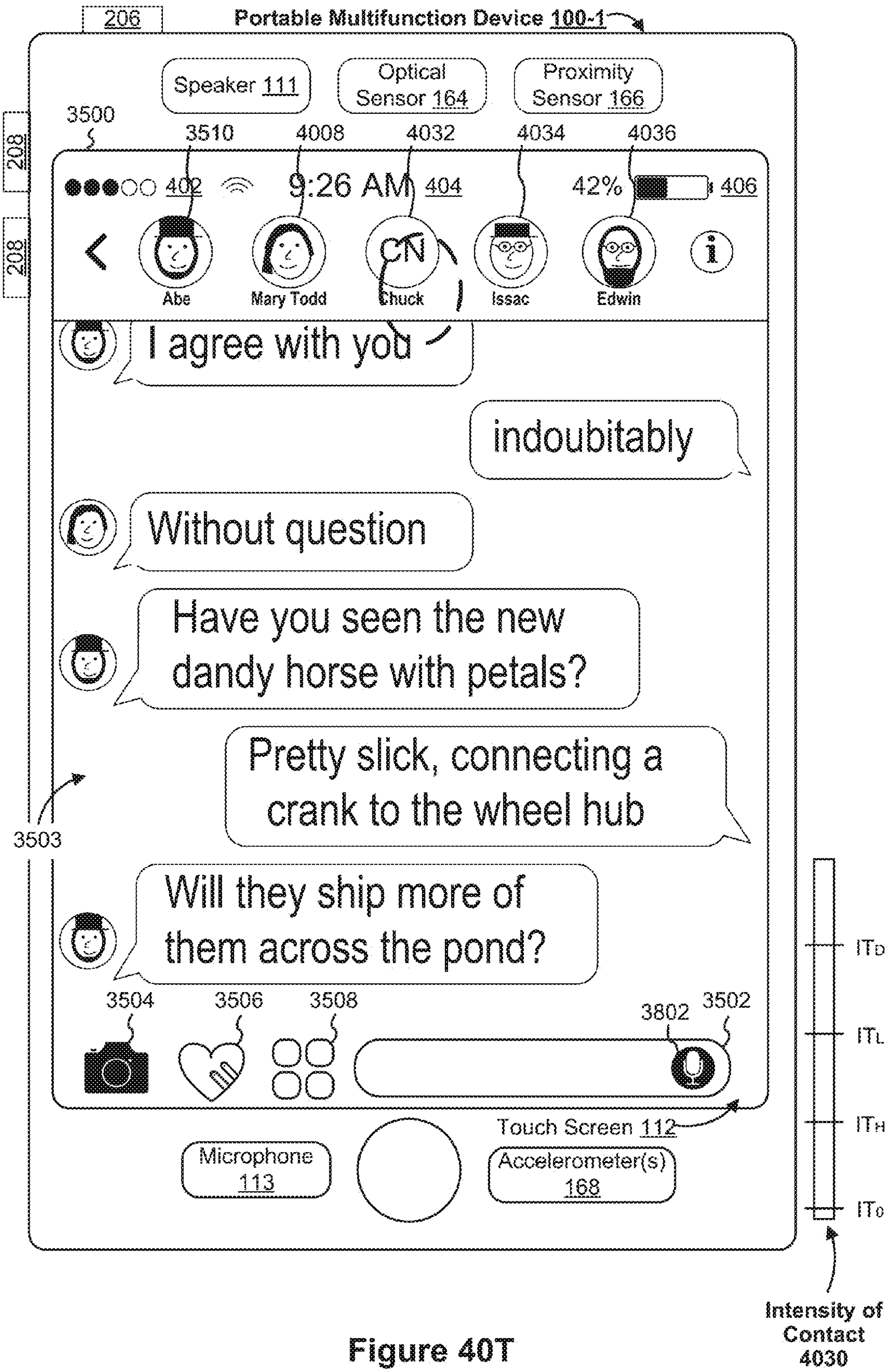
Figure 40U:
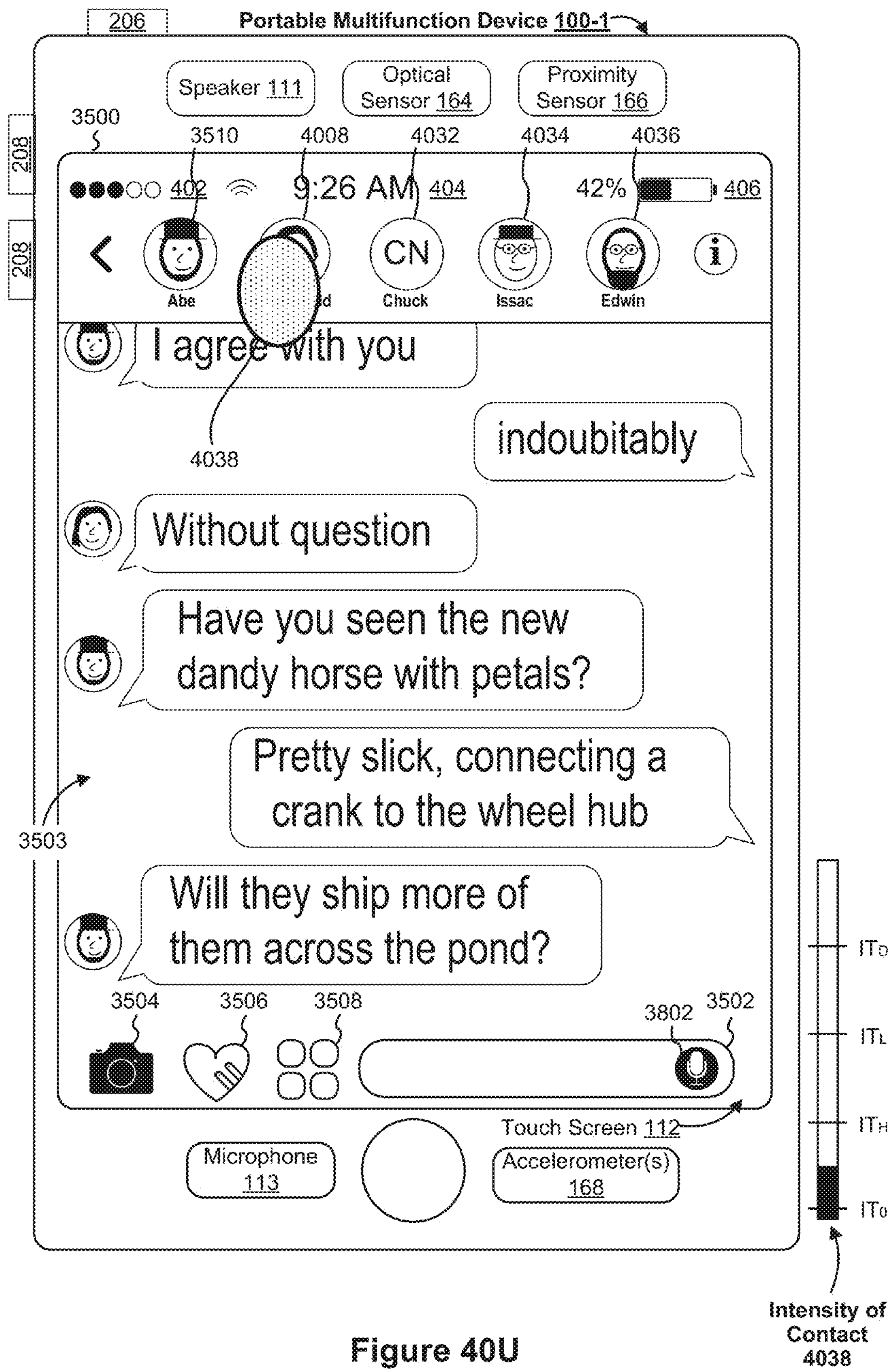
Figure 40V:
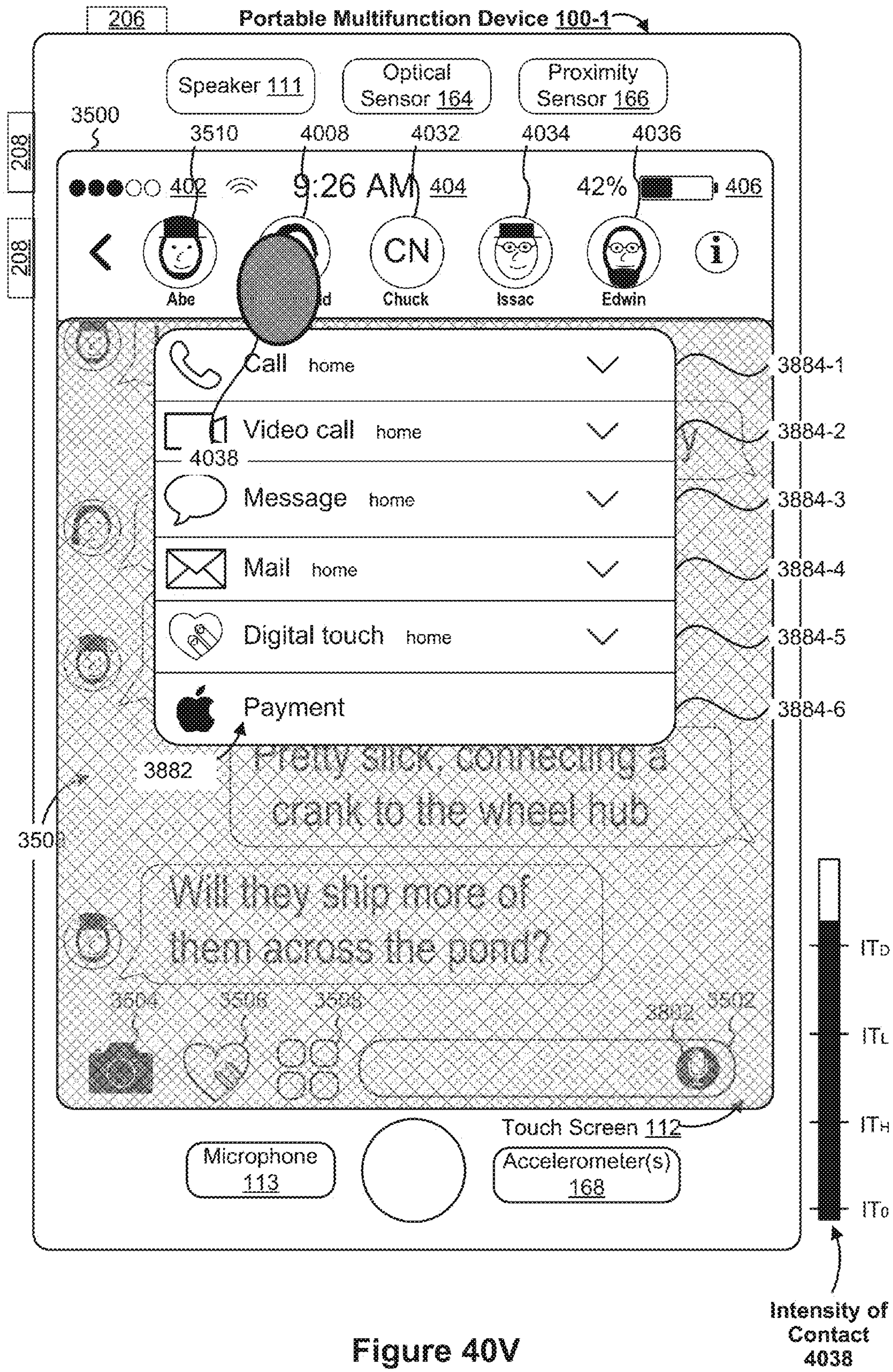
Figure 40W:
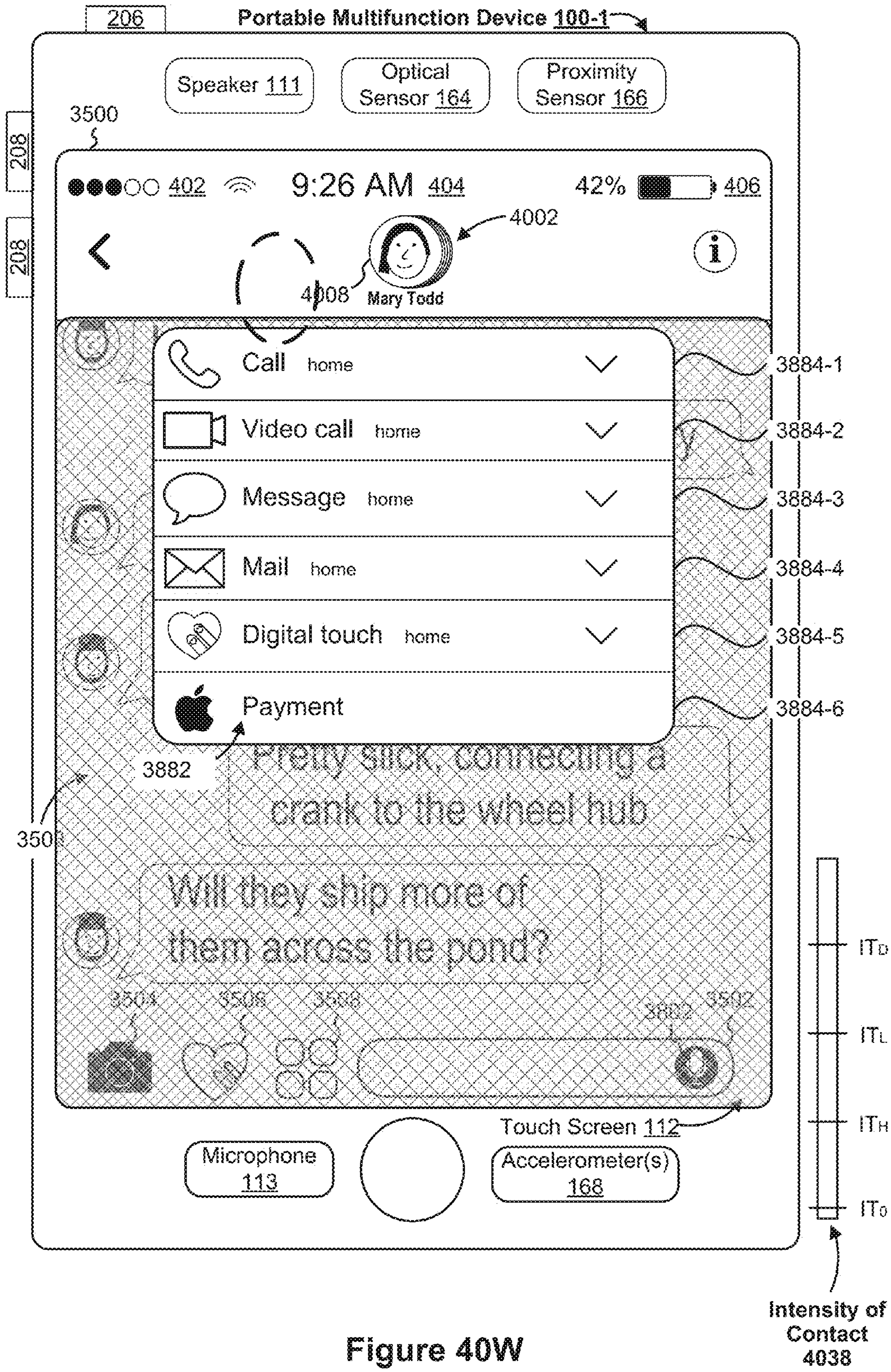

FIGS. 40A-40W illustrate exemplary user interfaces for interacting with other users of a messaging transcript through an avatar in accordance with some embodiments. The user interfaces in these figures are used to illustrate the processes described below, including the processes in FIGS. 66 and 68A-68B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 40A-40W illustrate an exemplary user interface 3500 for a messaging application which includes conversation transcript 3503, message-input area 3502, three activatable affordances—digital image affordance 3504, digital canvas affordance 3506, and application affordance 3508. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe" and avatar 4008 for "Mary Todd") displayed in stack of avatars 4002.

FIGS. 40A-40F illustrate two exemplary embodiments for interacting with another user of a messaging session through an avatar, where the device performs different operations based on detecting different types of user inputs.

In a first embodiment, a menu of actions for interacting with another user included in the messaging session is displayed by tapping on the user's avatar. Device 100-1 detects a tap gesture, including contact 4004 in FIG. 40B, on Abe's avatar 3510. In response, the device displays menu 3882 of activatable menu items 3884-1 to 3884-6 for interacting directly with Abe by a phone call, video call, individual message, e-mail, digital drawing, or payment, respectfully.

In a second embodiment, the stacked avatars are cycled to display a different avatar on top of the stack by deep pressing on the stack of avatars. Device 100-1 detects a press gesture, including contact 4006 in FIG. 40D, on stack of avatars 4002 displaying Abe's avatar 3510 on top. The device then detects an increase in the intensity of contact 4006 above a predefined intensity threshold (e.g., $IT_L$ or $IT_D$) in FIG. 40E and, in response, shuffles the stack of avatars 4002 to display Mary Todd's avatar 4008 on top, in FIGS. 40E-40F.

FIGS. 40G-40R illustrate an exemplary embodiment for paying another user of a messaging session through an avatar. Device 100-1 detects a press gesture, including contact 4010 in FIG. 40G, of stack of avatars 4002 displaying Mary Todd's avatar 4008 on top. The device then detects an increase in the intensity of contact 4010 above a predefined intensity threshold (e.g., $IT_L$ or $IT_D$) and, in response, displays menu 3882 of activatable menu items 3884-1 to 3884-6, for interacting with Mary Todd directly, and blurs display of conversation transcript 3503 in FIG. 40H. Menu 3882 remains displayed after the device detects lift-off of contact 4010 in FIG. 40I.

Device 100-1 then detects a tap gesture, including contact 4012 in FIG. 40J, on activatable menu item 3884-6 for a payment action. In response, the device displays payment area 4014, including termination affordance 4016, execution affordance 4018, and digital keypad 4015 for inputting payment amount, in FIG. 40K. The device then detects input of a payment amount ($60) and, subsequently, a tap gesture including contact 4020 on message-input area 4019, in FIG. 40L. In response, the device replaces digital touchpad 4014 with digital keyboard 4017 in FIG. 40M. Responsive to detecting input of message 4021, in FIG. 40N, and a tap gesture, including contact 4022 in FIG. 40O, on execution affordance 4018, the device prompts the user of device 100-1 to confirm their identity by displaying confirmation area 4024 in FIG. 40P. In response to receiving an identity confirming input, including contact 4026 in FIG. 40Q, the device executes payment of $60 to Mary Todd and posts confirmation of the payment to the messaging session, displaying payment confirmation 4028 within conversation transcript 3503 in FIG. 40R.

FIGS. 40S-40W illustrate two exemplary embodiments for interacting with another user of a messaging session through an avatar, where the device performs different operations based on detecting different types of user inputs.

In a first embodiment, tapping on the stack of avatars spreads the avatars out, such that a particular avatar can be selected. Device 100-1 detects a tap gesture, including contact 4030 in FIG. 40S, on stack of avatars 4002. In response, the device spreads the avatars in stack of avatars 4002—avatar 3510 for "Abe," avatar 4008 for "Mary Todd," avatar 4032 for "Chuck," avatar 4034 for "Issac," and avatar 4036 for "Edwin"—across the top of touch screen 112 in FIG. 40T.

In a second embodiment, which is also a continuation of the first embodiment, deep pressing on a particular avatar calls up a menu of activatable actions for interacting with the user corresponding to the avatar. Device 100-1 detects a press gesture, including contact 4038 in FIG. 40U, on Mary Todd's avatar 4008. The device then detects an increase in the intensity of contact 4038 above a predefined intensity threshold (e.g., $IT_L$ or $IT_D$) and, in response, displays menu 3882 of activatable menu items 3884-1 to 3884-6, for interacting with Mary Todd directly, and blurs display of conversation transcript 3503 in FIG. 40V. Menu 3882 remains displayed after the device detects lift-off of contact 4038 in FIG. 40W.

FIGS. 41A-41H illustrate exemplary user interfaces for integrating data detectors into a messaging application in accordance with some embodiments. The user interfaces in these figures are used to illustrate the processes described below, including the processes in FIGS. 70A-70B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 41A:
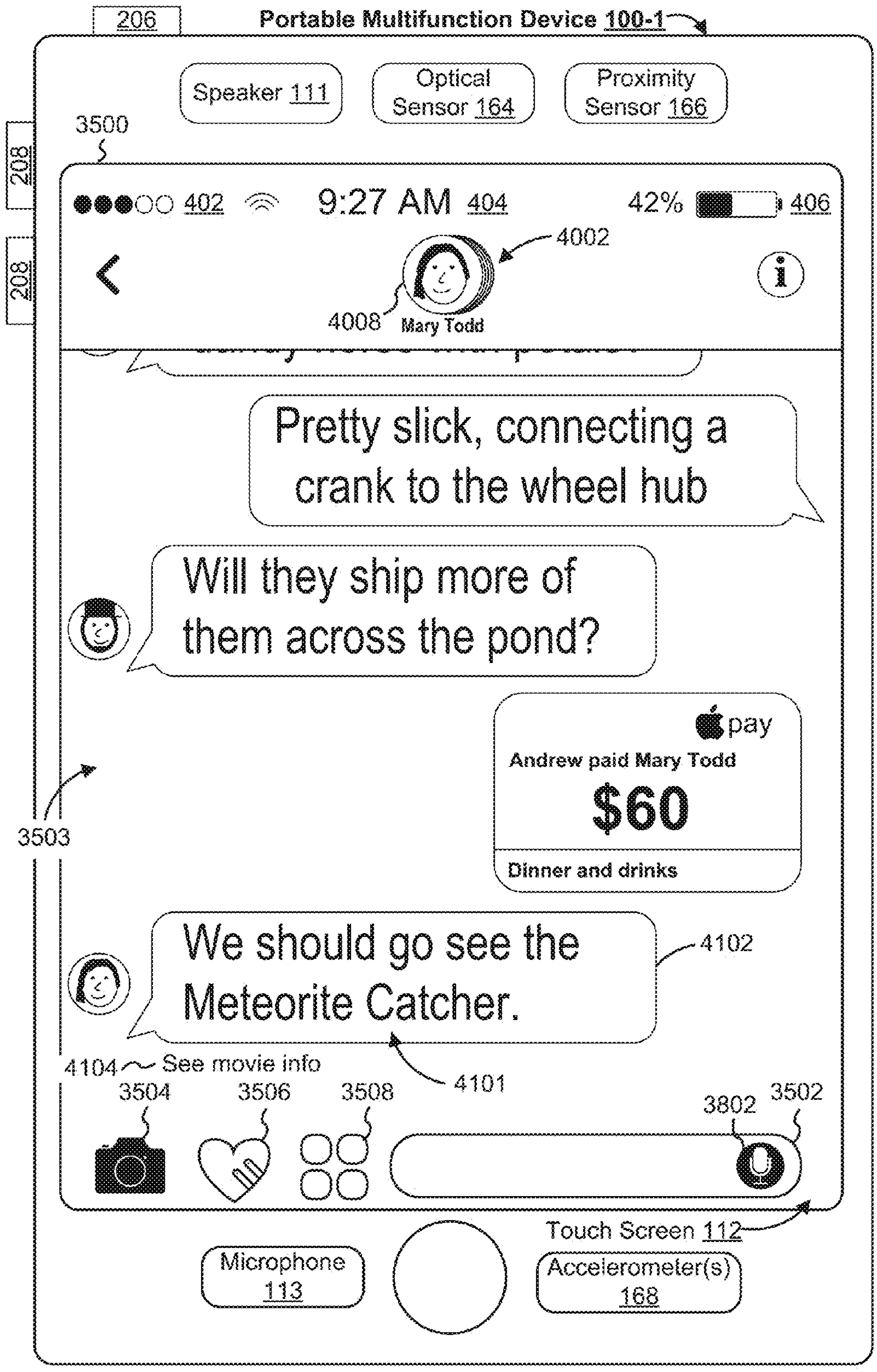
FIGS. 41A-41H illustrate exemplary user interfaces for integrating data detectors into a messaging application in accordance with some embodiments.
Figure 41B:
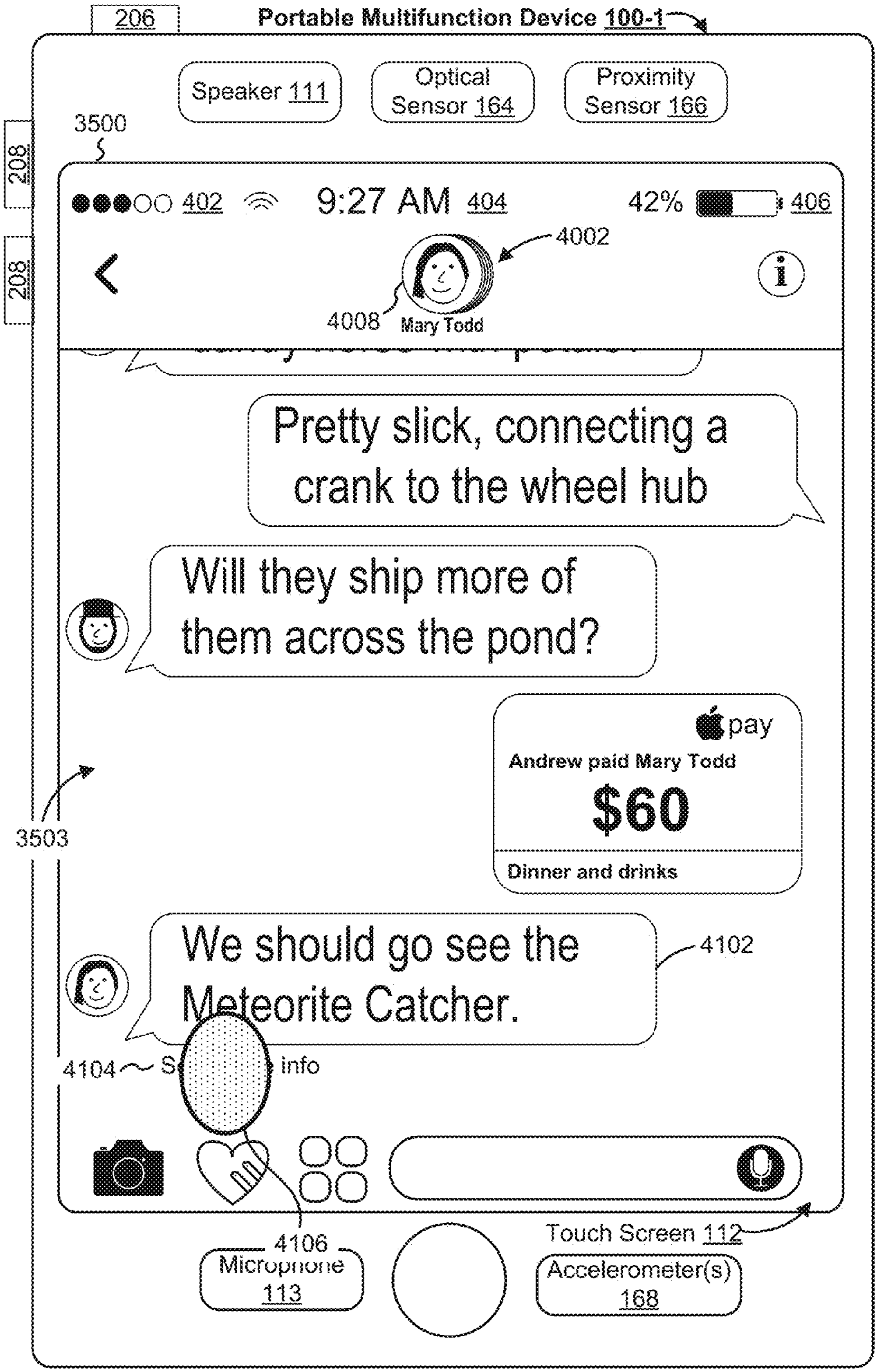
Figure 41C:
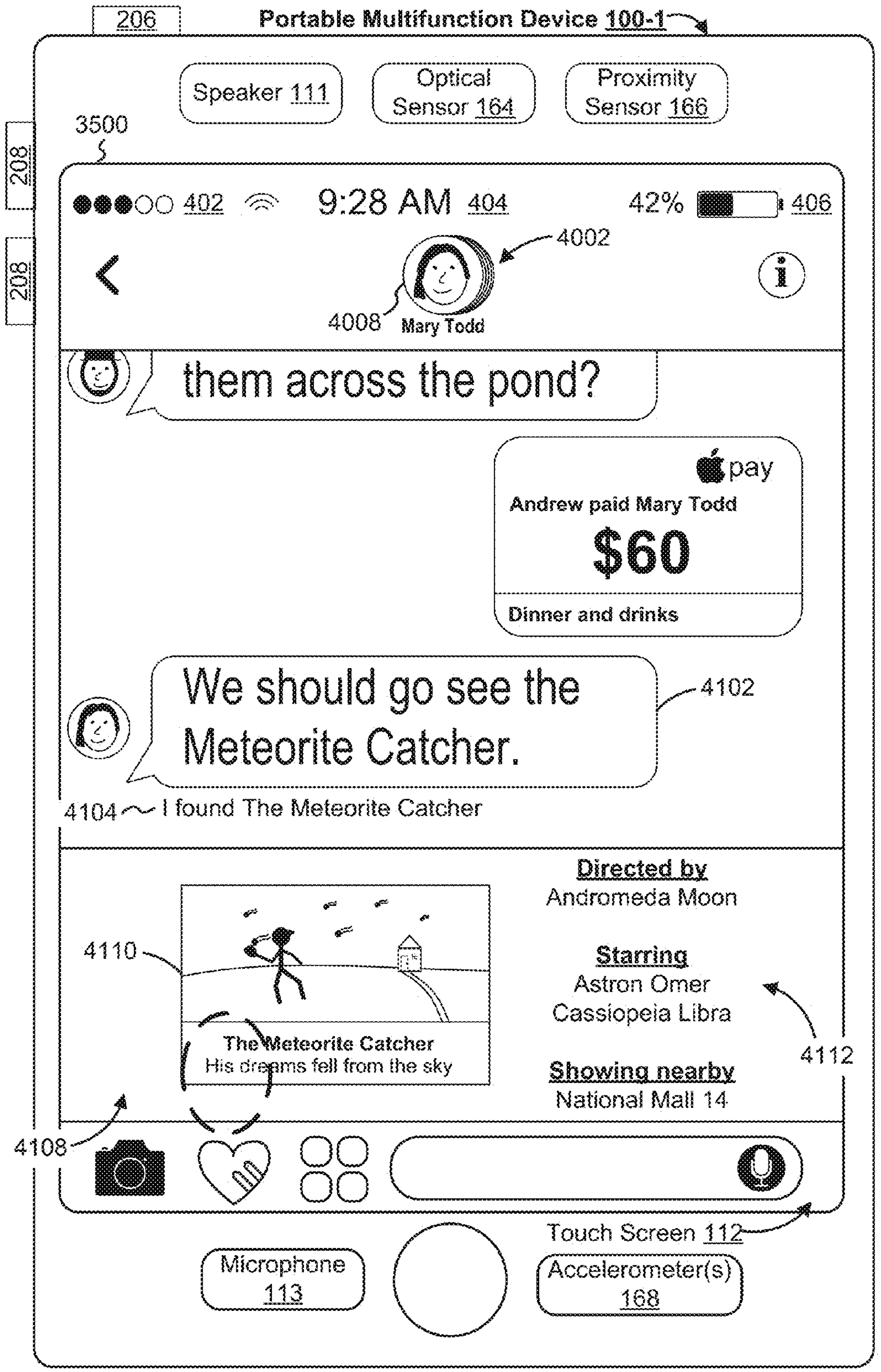

FIGS. 41A-41H illustrate two exemplary embodiments where a first electronic device 100-1 detects a word or phrase, in a messaged received from a second electronic device associated with another user included in the messaging session, associated with additional content available on the internet. FIG. 41A illustrates an exemplary user interface 3500 for a messaging application which includes conversation transcript 3503, message-input area 3502, three activatable affordances—digital image affordance 3504, digital canvas affordance 3506, and application affordance 3508. Conversation transcript 3503 includes messages from participants of a corresponding messaging session, including the user of portable multifunction device 100-1 and other users included in the messaging session. Each of the other users included in the messaging transcript are represented by an avatar (e.g., avatar 4008 for "Mary Todd") displayed in stack of avatars 4002.

In a first embodiment, the device prompts the user to view additional content associated with the identified word or phrase within the messaging user interface by displaying a selectable affordance. Device 100-1 receives message 4102 from Mary Todd, displayed in conversation transcript 3503 in FIG. 41A. The device recognizes phrase 4101 ("Meteorite Catcher") as the name of a movie about which information is available on the internet. In response, the device displays selectable affordance 4104, prompting the user to "See more information" about the movie. The device then detects a tap gesture, including contact 4106, on selectable affordance 4104 in FIG. 41B. In response, the device displays information area 4108 displaying information about the movie found on the internet, including a representation 4110 of a poster for the film and biographical information 4112 about the movie, in FIG. 41C.

In a second embodiment, the device prompts the user to view additional content associated with the identified word or phrase in a separate search user interface by highlighting the word or phrase. Device 100-1 receives message 4114 from Abe, displayed in conversation transcript 3503 in FIG. 41D. The device recognizes phrase 4103 ("Astron Omer") as the name of an actor about whom information is available on the internet. In response, the device displays highlighting 4116 of phrase 4103, prompting the user to select the phrase. The device then detects a tap gesture, including contact 4118, on phrase 4103 in FIG. 41E. In response, the device displays search user interface 3661 displaying categorized results—new articles 3664, 3678, and 3680 and movie previews 3670, 3682, and 3684—of an internet search of phrase 4103, in FIG. 41F. The device detects a tap gesture, including contact 4120 in FIG. 41G, on movie preview 3670. In response, the device posts movie preview 3670 to the messaging session, displaying movie preview 3670 in conversation transcript 3503 in FIG. 41H.

FIGS. 42A-42D are flow diagrams illustrating a method 4200 of capturing and posting digital images within a messaging application in accordance with some embodiments. The method 4200 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 4200 are, optionally, combined and/or the order of some operations is, optionally, changed.

As described below, the method 4200 provides an intuitive way to capture and post digital images within a messaging application. The method reduces the number, extent, and/or nature of the inputs from a user when capturing and posting digital images within a messaging application, thereby creating a more efficient human-machine interface. For battery-operated electronic devices, enabling a user to capture and post digital images within a messaging application faster and more efficiently conserves power and increases the time between battery charges.

The device displays (4202) a messaging user interface (e.g., of a messaging application) on the display (e.g., user interface 3500 on touch screen 112 in FIG. 35A), the messaging user interface including a conversation transcript (e.g., displayed in a first area of the display; e.g., conversation transcript 3503 in FIG. 35A) of a messaging session between a user of the electronic device and at least one other user (e.g., of another electronic device), a keyboard (e.g., displayed in a second area of the display; e.g., keyboard 3501 in FIG. 35A), a message-input area (e.g., area 3502 in FIG. 35A), and a digital image affordance (e.g., affordance 3504 in FIG. 35A).

While displaying the messaging user interface, the device detects (4204) an input that activates the digital image affordance (e.g., for an electronic device with a touch sensitive display, detecting a tap gesture on the digital image affordance). For example, in FIG. 35B, device 100-1 detects an input including contact 3512 on digital image affordance 3504.

In response to detecting the input that activates the digital image affordance, the device replaces (4206) display of the keyboard with display of a plurality of digital images, the plurality of digital images including one or more digital images stored in the memory and a live preview image from the digital camera. For example, responsive to detecting a tap gesture including contact 3512 in FIG. 35B, the device replaces digital keyboard 3501 in FIG. 35B with digital image tray 3806 including live preview image 3514 and previously captured digital images 3518.

In some embodiments, the messaging user interface is not displaying a digital keyboard prior to detecting activation of the digital image affordance (e.g., the conversation transcript is maximized and includes display of the digital image affordance). For example, in FIG. 38B, messaging user interface 3500 is displaying a full-screen version of conversation transcript 3700 when an input including contact 3804 is detected at digital image affordance 3804. In response, the device shrinks display of conversation transcript 3700 to accommodate display of digital image tray 3806 in FIG. 38C.

In some embodiments, replacing display of the keyboard includes displaying the plurality of digital images over the keyboard. In some embodiments, replacing display of the keyboard includes ceasing to display the keyboard and displaying the plurality of digital images where the keyboard had been displayed (e.g., as in FIG. 35B-35C).

In some embodiments, the plurality of digital images is a scrollable array of digital images. For example, in FIGS. 35P-35Q, a drag gesture including movement 3538 of contact 3536 from position 3536-*a* in FIG. 35P to position 3536-*b* in FIG. 35Q scrolls digital image tray to the left, revealing additional previously captured digital images 3518-6 and 3519-7.

In some embodiments, the plurality of digital images includes a recently shared image, a recently received image, an image including a participant in the conversation (e.g., as identified by facial recognition), a real-time image from a forward-facing digital camera in the device, or a real-time image from a backwards-facing digital camera in the device.}

In some embodiments, the one or more digital images stored in the memory, and displayed in response to detecting the input that activates the digital image affordance, consist (4208) of digital images captured (and or posted) during the messaging session.

The device detects (4210) an input that selects the live image displayed within the plurality of digital images (e.g., for an electronic device with a touch sensitive display, detecting a tap gesture on the live image). For example, in FIG. 35D, contact 3512 is detected on live preview image 3514 (e.g., on image capture affordance 3516 displayed over live preview image 3514).

In response to detecting that input that selects the live image, the device captures (4212) a digital image with the digital camera, while maintaining display of the conversation transcript. For example, in response to detecting an input that includes contact 3512 in FIG. 35D, electronic device 100-1 captures digital image 3518-5, displayed in message-input area 3502 in FIG. 35E.

In some embodiments, after capturing the digital image, the device displays (4214) the digital image captured by the digital camera in the conversation transcript and transmits a representation of the captured digital image to one or more electronic devices that correspond to the at least one other user included in the messaging session, wherein the one or more electronic devices display the representation of the captured digital image in a conversation transcript that corresponds to the messaging session. For example, device 100-1 detects an input including contact 3522 on message-content posting affordance 3520 in FIG. 35F and, in response, displays captured digital image 3520 in conversation transcript 3503 in FIG. 35G. Device 100-1 also transmits a representation of digital image 3518-5 to other electronic device associated with other users of the messaging session, for example, "Abe."

In some embodiments, the captured image is automatically posted to the messaging session upon selection of the live image. For example, in response to detecting a deep press gesture including contact 3524 in FIGS. 35H-35G, device 100-1 automatically posts captured digital image 3518-5 to the messaging session, as displayed in conversation transcript 3503 in FIG. 35I. In some embodiments, the device detects an input (e.g., a tap, press, deep press, double tap, multi-finger tap, long-press, or input including movement of a contact) and dependent upon the type of input, the device will either place the captured digital image in the message-input area or post it directly to the messaging session (e.g., display it in the conversation transcript). For example, FIGS. 35C-35I illustrate an exemplary embodiment where a tap gesture causes the device to place the captured image in the message-input area (e.g., as in FIGS. 35D-35F) and a deep press (or multi-finger input) causes the device to post the image directly to the messaging session (e.g., as in FIGS. 35H-35I).

In some embodiments, the captured image is displayed in the message input area and the user posts the image to the messaging session (e.g., by activating a send icon with a tap gesture). For example, activation of message-content posting affordance 3520 in FIG. 35F causes the device to post the captured image to the messaging session, as displayed in messaging transcript 3503 in FIG. 35G.

In some embodiments, prior to displaying the digital image captured by the digital camera in the conversation transcript (or any previously captured image) and transmitting a representation of the captured image, the device displays the digital image captured by the digital camera (or any previously captured image) in the message input area (e.g., as illustrated in FIG. 35V). While displaying the digital image captured by the digital camera (or any previously captured digital image) in the message input area, the device detects an input that activates an image editing mode (e.g., contact 3546 in FIG. 35W). In response to detecting the input that activates the image editing mode, the device replaces display of the messaging user interface with display of a digital photo editing user interface (e.g., user interface 3509 in FIG. 35X), wherein the digital image captured by the digital camera (or any previously captured digital image) is displayed in the digital photo editing user interface (e.g., digital image 3518-4 in FIG. 35X). While displaying the digital photo editing mode, the device detects an input that edits the digital photo captured by the digital camera (or any previously captured digital image). For example, inputs causing device 100-1 to draw mustache 3562 in FIG. 35Z, place magnification loupe 3566 in FIG. 35AB, configure magnification loupe 3566 in FIGS. 35AB-AF, type "Senor Snowman" 3578 in FIG. 35AH, or add handwriting 3582 in FIG. 35AJ. In response to detecting the input that edits the digital photo captured by the digital camera (or any previously captured digital image), the device edits (4216) the digital image captured by the digital camera (e.g., draws on, magnifies, types on, hand writes on, as described above). After editing the digital image captured by the digital camera, the device detects an input terminating the digital image editing mode (e.g., contact 3586 in FIG. 35AK). In response to detecting the input terminating the digital image editing mode, the device displays the edited digital image captured by the digital camera (or any previously captured digital image) in the message input area (e.g., as illustrated in FIG. 35AL.

In some embodiments, in response to detecting the input terminating the digital image editing mode, the device displays the edited digital image captured by the digital camera in the conversation transcript and sends a representation of the edited image to at least one other electronic device corresponding to another user included in the messaging session.

In some embodiments, any digital image (e.g., any of previously captured digital images 3518) can be edited from the messenger application and then posted to a messaging session, in accordance with the description above.

In some embodiments, in response to detecting the input that selects the live preview image, and after capturing the digital image, the device displays the digital image in the message-input area (e.g., digital image 3518-5 displayed in message-input area 3502 in FIG. 35K). While displaying the digital image in the message-input area, the device detects input of a message in the message input area (e.g., a text message, such as message 3530 in FIG. 35M). After detecting input of the message in the message-input area, the device detects an input that corresponds to a request to post contents of the message-input area to the messaging session (e.g., detecting a tap gesture on a send icon, such as contact 3532 in FIG. 35N), the contents including the digital image and the message. In response to detecting the input that corresponds to the request to post the contents of the message-input area to the messaging session, the device displays the digital image in the conversation transcript (e.g., digital image 3518-5 in conversation transcript 3503 in FIG. 35O), and the device displays (4218) the message (e.g., within a message region) in the conversation transcript, wherein the message (e.g., the message region) partially overlaps the digital image in the conversation transcript. For example, message 3534 partially overlaps with digital image 3518-5 in conversation transcript 3503 in FIG. 35O. The device also transmits a representation of the digital image and the message to one or more electronic devices that correspond to the at least one other user included in the messaging session (e.g., "Abe" in FIG. 35O), wherein the one or more electronic devices display the representation of the digital image and the message (e.g., the message region) in a conversation transcript corresponding to the messaging session, wherein the message (e.g., the message region) partially overlaps the representation of the digital image in the conversation transcript corresponding to the messaging session.

In some embodiments, in response to detecting the input that selects the live image, in accordance with a determination that the input that selects the live image meets one or more input-area-display criteria (e.g., one or more criteria based on the motion, timing, and/or intensity of a contact in the input), the device displays (4220) the digital image captured by the digital camera in the message input area (e.g., as illustrated in FIGS. 35D-35E, where the input-area-display criteria are met by a tap gesture including contact 3512), and in accordance with a determination that the input that selects the live image meets one or more transcript-area-display criteria (e.g., one or more criteria based on the motion, timing, and/or intensity of a contact in the input, which are distinct from the input-area-display criteria), the device displays the digital image captured by the digital camera in the conversation transcript and sends instructions, to one or more electronic devices that correspond to the at least one other user included in the messaging session, to display the digital image captured by the digital camera in a conversation transcript corresponding to the messaging session (e.g., as illustrated in FIGS. 35H-35I, where the transcript-area-display criteria are met by a press gesture including contact 3524).

In some embodiments, the electronic device includes one or more sensors configured to detect intensities of contacts on the touch-sensitive surface. Detecting the input that selects the live image displayed within the plurality of digital images includes that the device detects (4222) a first contact at a location on the touch-sensitive surface that corresponds to display of the live image on the display. The one or more transcript-area-display criteria require that a characteristic intensity of the first contact on the touch-sensitive surface meet a respective intensity threshold in order for the transcript-area-display criteria to be met (e.g., transcript-area-display criteria are met in FIG. 35I because a characteristic intensity of contact 3524 meets a predefined intensity threshold (e.g., $IT_L$ or $IT_D$)). The one or more input-area-display criteria do not require that the characteristic intensity of the contact on the touch-sensitive surface meet the respective intensity threshold in order for the selection criteria to be met (e.g., input-area-display criteria are met in Figure in FIGS. 35D-35E even though a characteristic intensity of contact 3512 did not meet a predefined intensity threshold (e.g., $IT_L$ or $IT_D$)).

In some embodiments, the input-area-display criteria are met when a characteristic intensity of the first contact is between a first intensity threshold and a second intensity threshold and the transcript-area-display criteria are met when a characteristic intensity of the first contact is between the second intensity threshold and a third intensity threshold. In some embodiments, the second intensity threshold is above the first intensity threshold and the third intensity threshold is above the second intensity threshold (e.g., tap to display the digital image in the message input area before posting the image to the messaging session and light press (or deep press) to post the digital image directly to the messaging session). In some embodiments, the second intensity threshold is below the first intensity threshold and the third intensity threshold is below the second intensity threshold (e.g., deep press) to display the digital image in the message input area before posting the image to the messaging session and tap to post the digital image directly to the messaging session).

In some embodiments, the one or more input-area-display criteria are met upon detection (4224) of a tap gesture on the touch-sensitive surface (e.g., a tap gesture including contact 3512 in FIG. 35D).

In some embodiments, prior to detecting the input that selects the live preview image (or a previously captured digital image) displayed within the plurality of digital images, the device detects a first portion of a second input that includes detecting an increase in a characteristic intensity of a second contact, at a location that corresponds to display of a first digital image within the plurality of digital images above a preview-intensity threshold. For example, device 100-1 detects an input including contact 3540, which increases in intensity above a predefined intensity threshold (e.g., $IT_L$ or $IT_D$) between FIGS. 35R and 35S. In some embodiments, the first digital image is the live preview image (e.g., live preview image 3514). ISE, the first digital image is a previously acquired image (e.g., previously captured digital image 3518-4 in FIG. 35R).

In response to detecting the first portion of the second input, the device increases (4226) the size of the first digital image. For example, in response to detecting the increase in intensity of contact 3540, device 100-1 displays enlarged preview 3507 of digital image 3518-4 in FIG. 35S. In some embodiments, the size of the first digital image is increased dynamically in accordance with the increase in the characteristic intensity of the second contact. After increasing the size of the first digital image, detecting a second portion of the second input that includes detecting a decrease in the characteristic intensity of the second contact below the preview intensity threshold and, in response to detecting the second portion of the second input, decreasing the size of the first digital image. For example, device 100-1 detects a decrease in the intensity of contact 3540 between FIGS. 35S and 35T and, in response, shrinks image 3518-4 back to its original size in the digital image tray in FIG. 35T.

In some embodiments, the device detects a user input including a first swipe gesture that starts while a focus selector is at a first location in the messaging user interface that corresponds to a first digital image in the plurality of digital images, the first swipe gesture moving the focus selector in a first direction (e.g., detects a drag gesture by a contact on a touch-sensitive surface, such as a touch sensitive display, that starts at the first digital image and moves in a first direction (e.g., towards the edge of the display), or detects a swipe gesture by a contact on a touch-sensitive surface that starts while a cursor or other pointer is at the first digital image on the display and moves the pointer in a first direction on the display). For example, device 100-1 detects a swipe gesture to the left, including movement 3538 of contact 3536 from location **3536-*a* in FIG. 35P to location 3536-*b* in FIG. 35**Q.

In response to detecting the first swipe gesture, the device scrolls display (4228) of the plurality of digital images in the first direction on the display, wherein the scrolling display includes ceasing to display digital images in the plurality of digital images that are scrolled off a first edge of the display and displaying new digital images in the plurality of digital images from a second (e.g., opposite) edge of the display (e.g., photos are scrolled off the display in the direction of the swipe gesture and new images are brought onto the display from the opposite edge of the display). For example, in FIG. 35Q, device 100-1 moves digital image tray 3806 to the left, in accordance with movement 3538, creating the appearance that live preview image 3514 slides off of the left side of touch screen 112 and additional digital images 3518-6 and 3518-7 slide onto the display from the right side of touch screen 112, in FIG. 35Q.

In some embodiments, the device detects a user input including a second swipe gesture that starts while a focus selector is at a first location in the messaging user interface that corresponds to a first digital image in the plurality of digital images, the first swipe gesture moving the focus selector in a second direction (e.g., opposite of the first direction; e.g., the device detects a drag gesture by a contact on a touch-sensitive surface, such as a touch sensitive display, that starts at the first digital image and moves in a second direction (e.g., towards an opposite edge of the display), or detects a swipe gesture by a contact on a touch-sensitive surface that starts while a cursor or other pointer is at the first digital image on the display and moves the pointer in a second direction on the display. For example, device 100-1 detects a swipe gesture to the right, including movement of contact 3812 from position **3812-*a* in FIG. 38F to position 3828-*b* in FIG. 38**G.

In response to detecting the second swipe gesture, the device displays (4230) (e.g., reveals from a first edge of the display) a first affordance for the digital camera and a second affordance for a photo library. For example, full-screen camera affordance 3816 and photo library affordance 3818 are revealed in digital image tray 3806, from the left side of touch screen 112, in response to detecting the swipe gesture including movement 3814 of contact 3812 FIG. 38G.

In some embodiments, while displaying the first affordance for the digital camera (e.g., camera affordance 3816 in FIG. 38H), the device detects an input that activates the first affordance for the digital camera (e.g., contact 3820 in FIG. 38H) and, in response to detecting the input that activates the first affordance for the digital camera, the device displays (4232) a user interface for the digital camera over at least a portion of the messaging user interface (e.g., user interface 3822 displayed in FIG. 38I). In some embodiments, the interactive application user interface entirely replaces display of the messaging user interface (e.g., as in FIG. 38I).

In some embodiments, while displaying the second affordance for the photo library (affordance 3818 in FIG. 38O), the device detects an input that activates the second affordance for the photo library (e.g., contact 3830 in FIG. 38O) and, in response to detecting the input that activates the second affordance for the photo library, the device ceases (4234) to display the plurality of digital images including one or more digital images stored in the memory and a live preview image from the digital camera and displays a plurality of digital images from a digital photo library (e.g., a photo library stored on the electronic device or a photo library stored remotely). For example, in response to detecting an input including contact 3830 in FIG. 38O, device 100-1 replaces display of messenger user interface 3500 in FIG. 38O with photo library user interface 3832 in FIG. 38P.

While displaying the plurality of digital images from the digital photo library, the device detects an input that selects a digital image in the plurality of digital images from the digital photo library and in response to detecting the input that selects the digital image from the digital photo library, the device displays the digital image from the digital photo library in the conversation transcript. In some embodiments, the digital image is automatically posted to the messaging session upon selection of the image. In some embodiments, the digital image is displayed in the message input area and the user posts the image to the messaging session (e.g., by activating a send icon with a tap gesture). The device also transmit a representation of the digital image from the digital photo library to one or more electronic devices that correspond to the at least one other user included in the messaging session (e.g., "Abe"), where the one or more electronic devices display the representation of the digital image from the digital photo library in a conversation transcript that corresponds to the messaging session.

It should be understood that the particular order in which the operations in FIGS. 42A-42D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4400, 4600, 4800, 5000, 5200, 5400, 5600, 5800, 6000, 6200, 6400, 6600, 6800, and 7000) are also applicable in an analogous manner to method 4200 described above with respect to FIGS. 42A-42D. For example, the contacts, gestures, user interface objects, tactile outputs, intensity thresholds, focus selectors, and animations described above with reference to method 4200 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4400, 4600, 4800, 5000, 5200, 5400, 5600, 5800, 6000, 6200, 6400, 6600, 6800, and 7000). For brevity, these details are not repeated here.

Figure 43:
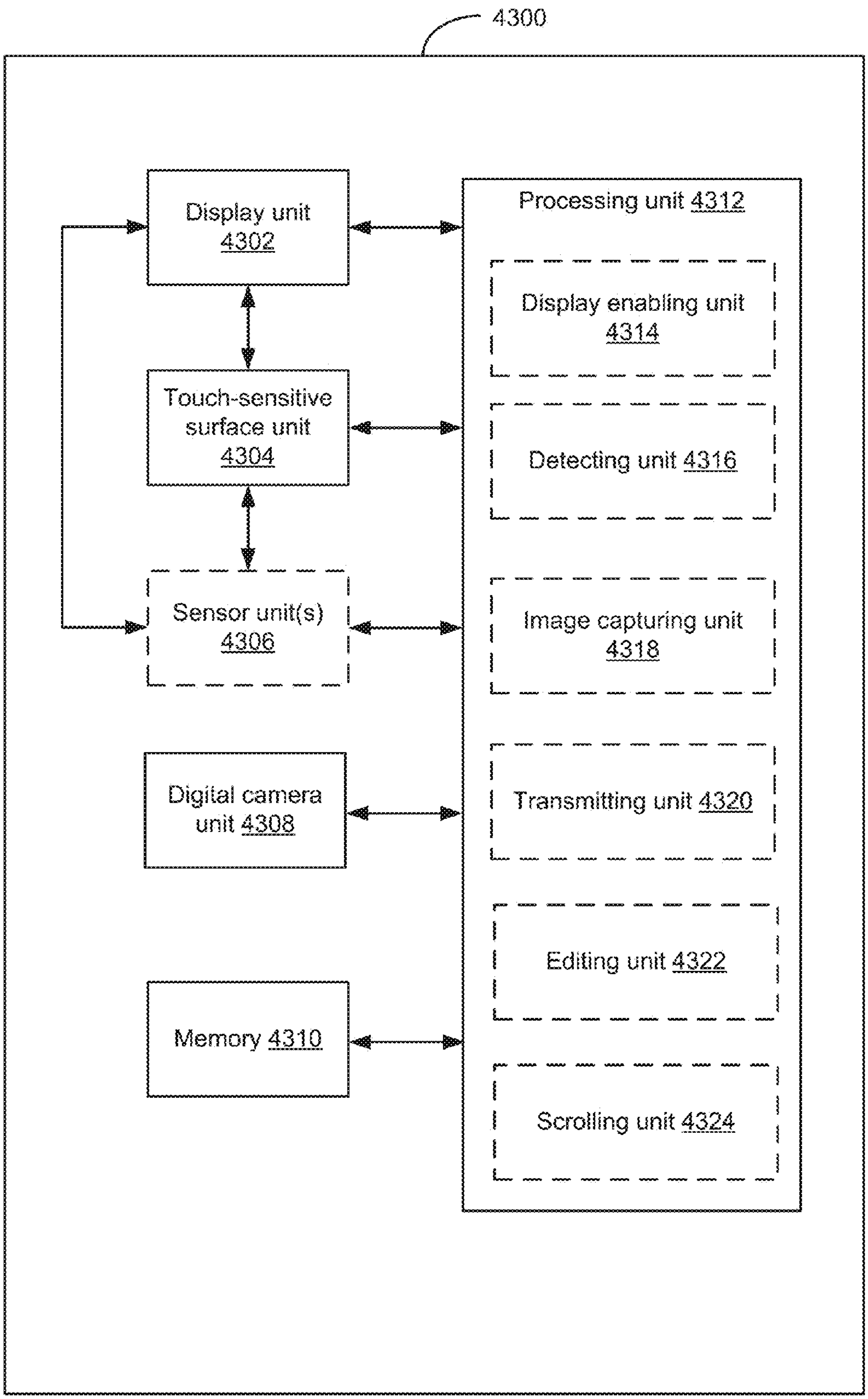
FIG. 43 is a functional block diagram of an electronic device in accordance with some embodiments.
Figure 44B:
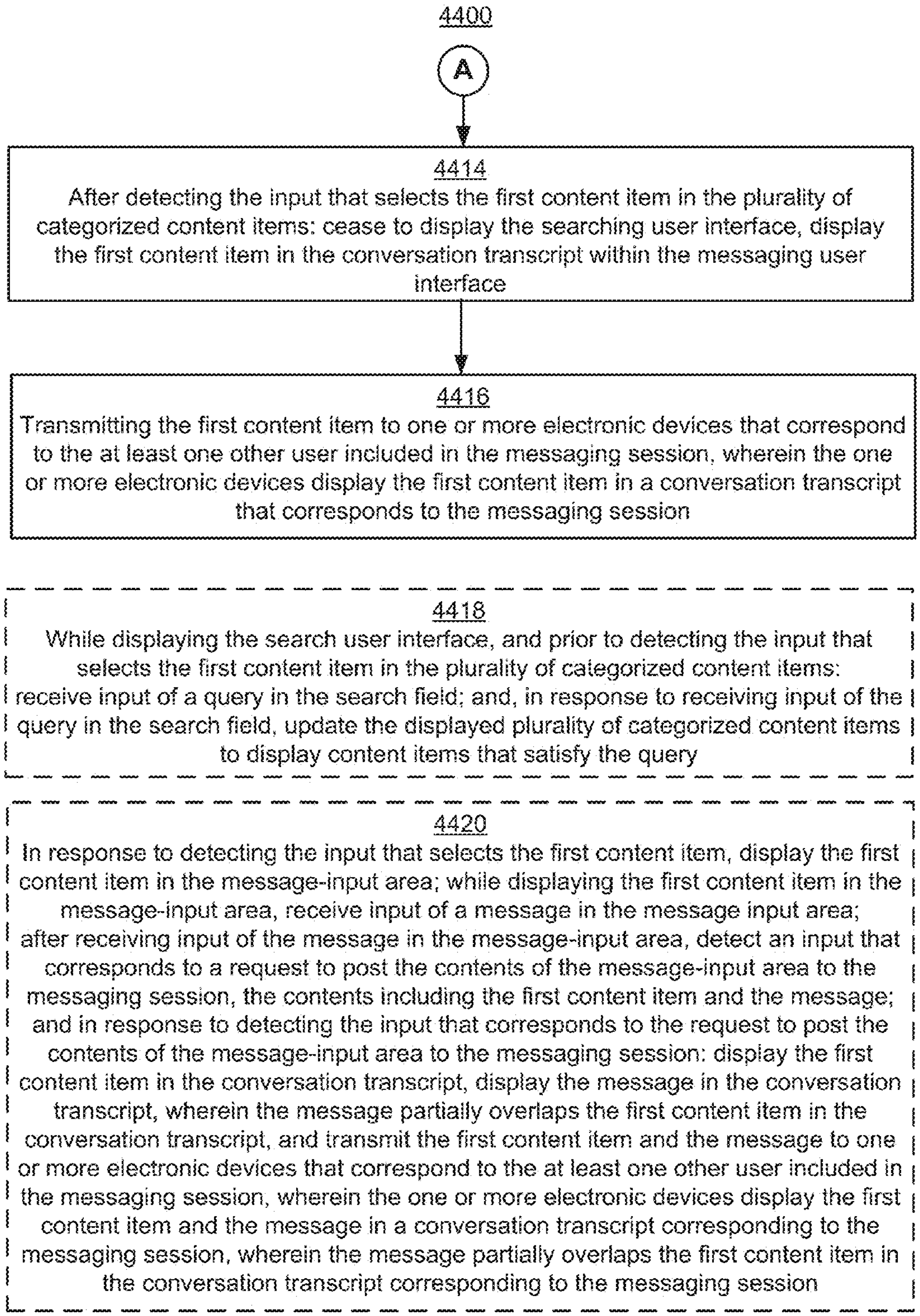

In accordance with some embodiments, FIG. 43 shows a functional block diagram of an electronic device 4300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 43 are, optionally, combined or separated into sub-blocks to implement the principles of the various described embodiments. Therefore, the description herein optionally supports any possible combination or separation or further definition of the functional blocks described herein.

As shown in FIG. 43, an electronic device 4300 includes a display unit 4302 configured to display user interfaces, a touch-sensitive surface unit 4304, optional sensor unit(s) 4306, a digital camera unit 4308 configured to capture images, a memory unit 4310, and a processing unit 4312 coupled to the display unit 4302, the digital camera unit 4308, the touch-sensitive surface unit 4304, and the memory unit 4310. In some embodiments, the processing unit includes a display enabling unit 4314, a detecting unit 4316, an image capturing unit 4318, a transmitting unit 4320, an editing unit 4322, and a scrolling unit 4324.

The processing unit 4312 is configured to display (e.g., with display enabling unit 4314) a messaging user interface on the display unit, the messaging user interface including a conversation transcript of a messaging session between a user of the electronic device and at least one other user, a keyboard, a message-input area, and a digital image affordance. The processing unit 4312 is further configured to, while displaying the messaging user interface, detect (e.g., with detecting unit 4316) an input that activates the digital image affordance. The processing unit 4312 is further configured to, in response to detecting the input that activates the digital image affordance, replace display (e.g., with display enabling unit 4314) of the keyboard with display of a plurality of digital images, the plurality of digital images including one or more digital images stored in the memory unit 4310 and a live preview image from the digital camera unit 4308. The processing unit 4312 is further configured to detect (e.g., with detecting unit 4316) an input that selects the live image displayed within the plurality of digital images. The processing unit 4312 is further configured to, in response to detecting that input that selects the live image, capture (e.g., with image capture unit 4320) a digital image with the digital camera unit 4308, while maintaining display of the conversation transcript.

In some embodiments, the processing unit 4312 is configured to, after capturing the digital image, display (e.g., with display enabling unit 4314) the digital image captured by the digital camera unit 4308 in the conversation transcript, and transmit (e.g., with transmitting unit 4320) a representation of the captured digital image to one or more electronic devices that correspond to the at least one other user included in the messaging session, wherein the one or more electronic devices display the representation of the captured digital image in a conversation transcript that corresponds to the messaging session.

In some embodiments, the processing unit 4312 is configured to, prior to displaying the digital image captured by the digital camera unit 4308 in the conversation transcript and transmitting a representation of the captured image, display (e.g., with display enabling unit 4314) the digital image captured by the digital camera unit 4308 in the message input area. The processing unit 4312 is further configured to, while displaying the digital image captured by the digital camera unit 4308 in the message input area, detect (e.g., with detecting unit 4316) an input that activates an image editing mode. The processing unit 4312 is further configured to, in response to detecting the input that activates the image editing mode, replace display (e.g., with display enabling unit 4314) of the messaging user interface with display of a digital photo editing user interface, wherein the digital image captured by the digital camera unit 4308 is displayed in the digital photo editing user interface. The processing unit 4312 is further configured to, while displaying the digital photo editing mode, detect (e.g., with detecting unit 4316) an input that edits the digital photo captured by the digital camera unit 4308. The processing unit 4312 is further configured to, in response to detecting the input that edits the digital photo captured by the digital camera unit 4308, edit (e.g., with editing unit 4322) the digital image captured by the digital camera unit 4308. The processing unit 4312 is further configured to, after editing the digital image captured by the digital camera unit 4308, detect (e.g., with detecting unit 4316) an input terminating the digital image editing mode. The processing unit 4312 is further configured to, in response to detecting the input terminating the digital image editing mode, display (e.g., with display enabling unit 4314) the edited digital image captured by the digital camera unit 4308 in the message input area.

In some embodiments, the processing unit 4312 is configured to, in response to detecting the input that selects the live preview image, and after capturing the digital image, display (e.g., with display enabling unit 4314) the digital image in the message-input area. The processing unit 4312 is further configured to, while displaying the digital image in the message-input area, detect (e.g., with detecting unit 4316) input of a message in the message input area. The processing unit 4312 is further configured to, after detecting input of the message in the message-input area, detect (e.g., with detecting unit 4316) an input that corresponds to a request to post contents of the message-input area to the messaging session, the contents including the digital image and the message. The processing unit 4312 is further configured to, in response to detecting the input that corresponds to the request to post the contents of the message-input area to the messaging session: display (e.g., with display enabling unit 4314) the digital image in the conversation transcript, display (e.g., with display enabling unit 4314) the message in the conversation transcript, wherein the message partially overlaps the digital image in the conversation transcript, and transmit (e.g., with transmitting unit 4320) a representation of the digital image and the message to one or more electronic devices that correspond to the at least one other user included in the messaging session, wherein the one or more electronic devices display the representation of the digital image and the message in a conversation transcript corresponding to the messaging session, wherein the message partially overlaps the representation of the digital image in the conversation transcript corresponding to the messaging session.

In some embodiments, the processing unit 4312 is configured to, in response to detecting the input that selects the live image, in accordance with a determination that the input that selects the live image meets one or more input-area-display, display (e.g., with display enabling unit 4314) the digital image captured by the digital camera unit 4308 in the message input area. The processing unit 4312 is further configured to, in accordance with a determination that the input that selects the live image meets one or more transcript-area-display criteria, display (e.g., with display enabling unit 4314) the digital image captured by the digital camera unit 4308 in the conversation transcript, and send (e.g., with transmitting unit 4320) instructions, to one or more electronic devices that correspond to the at least one other user included in the messaging session, to display the digital image captured by the digital camera unit 4308 in a conversation transcript corresponding to the messaging session In some embodiments, the electronic device includes one or more sensors units 4306 configured to detect intensities of contacts on the touch-sensitive surface unit 4304. In some embodiments, detecting the input that selects the live image displayed within the plurality of digital images includes detecting a first contact at a location on the touch-sensitive surface unit 4304 that corresponds to display of the live image on the display unit. In some embodiments, the one or more transcript-area-display criteria require that a characteristic intensity of the first contact on the touch-sensitive surface unit 4304 meet a respective intensity threshold in order for the transcript-area-display criteria to be met. In some embodiments, the one or more input-area-display criteria do not require that the characteristic intensity of the contact on the touch-sensitive surface unit 4304 meet the respective intensity threshold in order for the selection criteria to be met.

In some embodiments, the one or more input-area-display criteria are met upon detection of a tap gesture on the touch-sensitive surface unit 4304.

In some embodiments, the processing unit 4312 is configured to, prior to detecting the input that selects the live image displayed within the plurality of digital images, detect (e.g., with detecting unit 4316) a first portion of a second input that includes detecting an increase in a characteristic intensity of a second contact, at a location that corresponds to display of a first digital image within the plurality of digital images, above a preview intensity threshold. The processing unit 4312 is further configured to, in response to detecting the first portion of the second input, increase the size of the first digital image. The processing unit 4312 is further configured to, after increasing the size of the first digital image, detect (e.g., with detecting unit 4316) a second portion of the second input that includes detecting a decrease in the characteristic intensity of the second contact below the preview intensity threshold. The processing unit 4312 is further configured to, in response to detecting the second portion of the second input, decrease the size of the first digital image.

In some embodiments, the processing unit 4312 is configured to detect (e.g., with detecting unit 4316) a user input including a first swipe gesture that starts while a focus selector is at a first location in the messaging user interface that corresponds to a first digital image in the plurality of digital images, the first swipe gesture moving the focus selector in a first direction. The processing unit 4312 is further configured to, in response to detecting the first swipe gesture, scroll display (e.g., with scrolling unit 4324) of the plurality of digital images in the first direction on the display unit, wherein the scrolling display includes ceasing to display digital images in the plurality of digital images that are scrolled off a first edge of the display unit and displaying new digital images in the plurality of digital images from a second edge of the display unit.

In some embodiments, the processing unit 4312 is configured to detect (e.g., with detecting unit 4316) a user input including a second swipe gesture that starts while a focus selector is at a first location in the messaging user interface that corresponds to a first digital image in the plurality of digital images, the first swipe gesture moving the focus selector in a second direction. The processing unit 4312 is further configured to, in response to detecting the second swipe gesture, display (e.g., with display enabling unit 4314) a first affordance for the digital camera unit 4308 and a second affordance for a photo library.

In some embodiments, the processing unit 4312 is configured to, while displaying the first affordance for the digital camera unit 4308, detect (e.g., with detecting unit 4316) an input that activates the first affordance for the digital camera unit 4308. The processing unit 4312 is further configured to, in response to detecting the input that activates the first affordance for the digital camera unit 4308, display (e.g., with display enabling unit 4314) a user interface for the digital camera unit 4308 over at least a portion of the messaging user interface.

In some embodiments, the processing unit 4312 is configured to, while displaying the second affordance for the photo library, detect (e.g., with detecting unit 4316) an input that activates the second affordance for the photo library. The processing unit 4312 is further configured to, in response to detecting the input that activates the second affordance for the photo library, cease to display (e.g., with display enabling unit 4314) the plurality of digital images including one or more digital images stored in the memory unit 4310 and a live preview image from the digital camera unit 4308 and display a plurality of digital images from a digital photo library. The processing unit 4312 is further configured to, while displaying the plurality of digital images from the digital photo library, detect (e.g., with detecting unit 4316) an input that selects a digital image in the plurality of digital images from the digital photo library. The processing unit 4312 is further configured to, in response to detecting the input that selects the digital image from the digital photo library, display (e.g., with display enabling unit 4314) the digital image from the digital photo library in the conversation transcript, and transmit (e.g., with transmitting unit 4320) a representation of the digital image from the digital photo library to one or more electronic devices that correspond to the at least one other user included in the messaging session, wherein the one or more electronic devices display the representation of the digital image from the digital photo library in a conversation transcript that corresponds to the messaging session.

In some embodiments, the one or more digital images stored in the memory unit 4310, and displayed in response to detecting the input that activates the digital image affordance, consist of digital images captured during the messaging session.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 42A-42D are, optionally, implemented by components depicted in FIGS. 1A-1B or FIG. 43. For example, detection operations 4204 and 4210 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 44A-44D are flow diagrams illustrating a method 4400 of searching for and sharing multimedia content within a messaging application in accordance with some embodiments. The method 4400 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 4400 are, optionally, combined and/or the order of some operations is, optionally, changed.

As described below, the method 4400 provides an intuitive way to search for and share multimedia content within a messaging application. The method reduces the number, extent, and/or nature of the inputs from a user when searching for and sharing multimedia content within a messaging application, thereby creating a more efficient human-machine interface. For battery-operated electronic devices, enabling a user to search for and share multimedia content within a messaging application faster and more efficiently conserves power and increases the time between battery charges.

Figure 36Y:
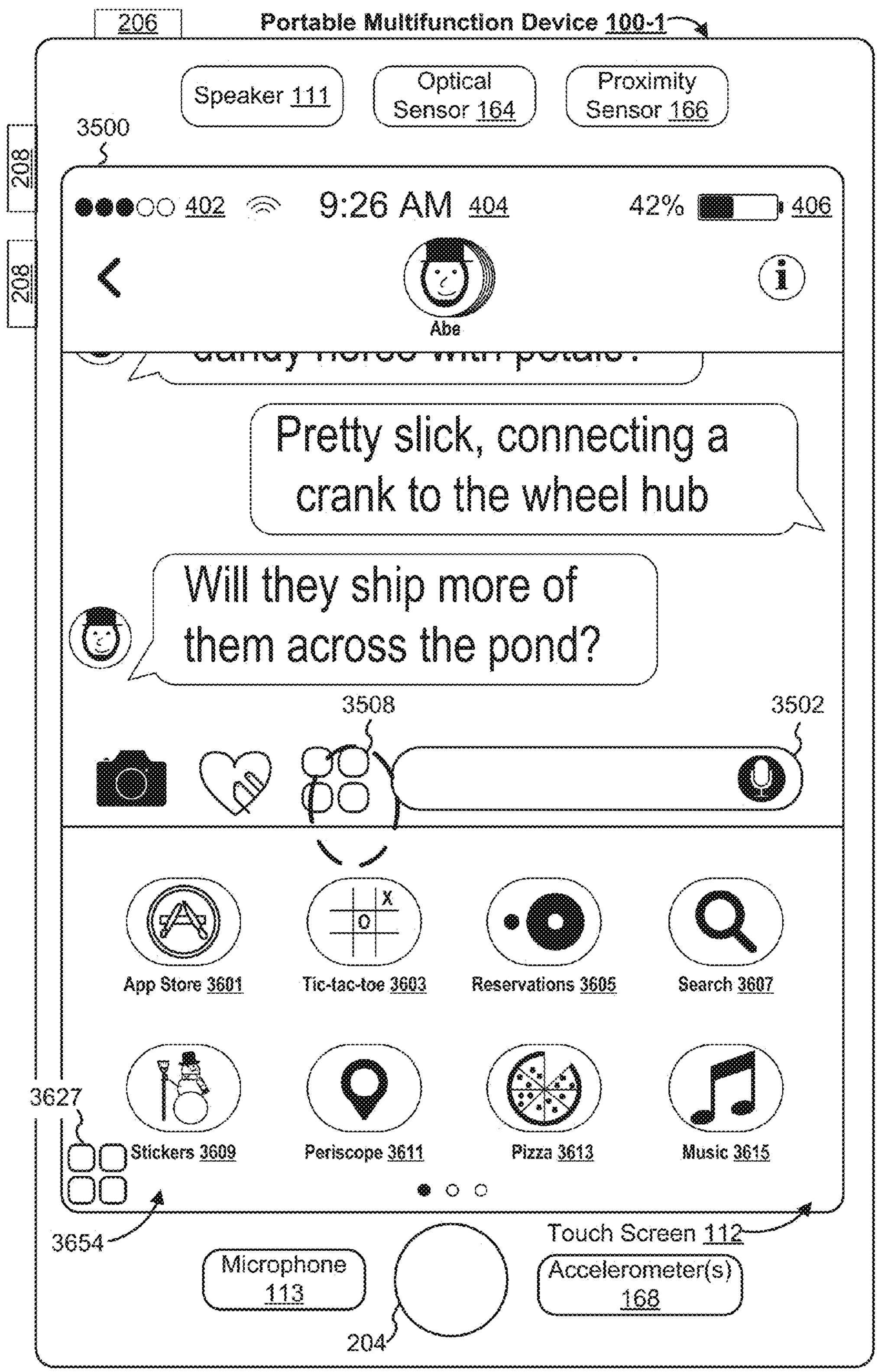

The device displays (4402) a messaging user interface (e.g., of a messaging application, for example, user interface 3500 in FIGS. 36A and 36Y) on the display, the messaging user interface including a conversation transcript (e.g., displayed in a first area of the display, for example, conversation transcript 3503 in FIGS. 36A and 36Y) of a messaging session between a user of the electronic device and at least one other user (e.g., of another electronic device, for example "Abe," represented by avatar 3510 in FIGS. 36A and 36Y), and a search affordance (e.g., search affordance 3602 in FIG. 36A or search launch icon 3607 in FIG. 36Y). In some embodiments, the messaging user interface includes a message input area that is configured to display content ready to be posted to the messaging session (e.g., message-content input area 3502 in FIGS. 36A and 36Y). In some embodiments, the messaging user interface includes a keyboard, e.g., displayed in a second area of the display (e.g., digital keyboard 3501 in FIG. 36A).

In some embodiments, the search affordance is displayed as a launch icon for a search application in a plurality of launch icons for interactive applications within the messaging user interface (e.g., search launch icon 3607 is displayed in application selection tray 3654 with launch icons 3601, 3603, 3605, 3609, 3611, 3613, and 3615). In some embodiments, the search affordance is a search application launch icon (4404) that is displayed with a plurality of launch icons for interactive applications within the messaging application.

In some embodiments, prior to displaying the plurality of launch icons for interactive applications in the messaging user interface, the messaging user interface included the conversation transcript (e.g., displayed in a first area of the display) of the messaging session between a user of the electronic device and at least one other user (e.g., of another electronic device), a keyboard (e.g., displayed in a second area of the display), a message-input area, and an application affordance. For example, in FIG. 36W, user interface 3500 includes conversation transcript 3503, keyboard 3501, message-content input area 3502, and application affordance 3508. The device detects a user input that activates the application affordance (e.g., an input including contact 3652 in FIG. 36X) and, in response to detecting the user input that activates the application affordance, the device replaces (4406) display of the keyboard with display of the plurality of launch icons for interactive applications (e.g., application selection tray 3654 in FIG. 36Y replaces digital keyboard 3501 in FIG. 36X).

In some embodiments, the messaging user interface is not displaying a digital keyboard prior to detection of the application affordance (e.g., the conversation transcript is maximized and includes display of the application affordance). For example, as illustrated in FIGS. 38AJ-38AM.

In some embodiments, replacing display of the keyboard includes displaying the plurality of launch icons for interactive applications over the keyboard. In some embodiments, replacing display of the keyboard includes ceasing to display the keyboard and displaying the plurality of launch icons for interactive applications where the keyboard had been displayed.

While displaying the messaging user interface, the device detects (4408) an input that activates the search affordance.

Figure 36Z:
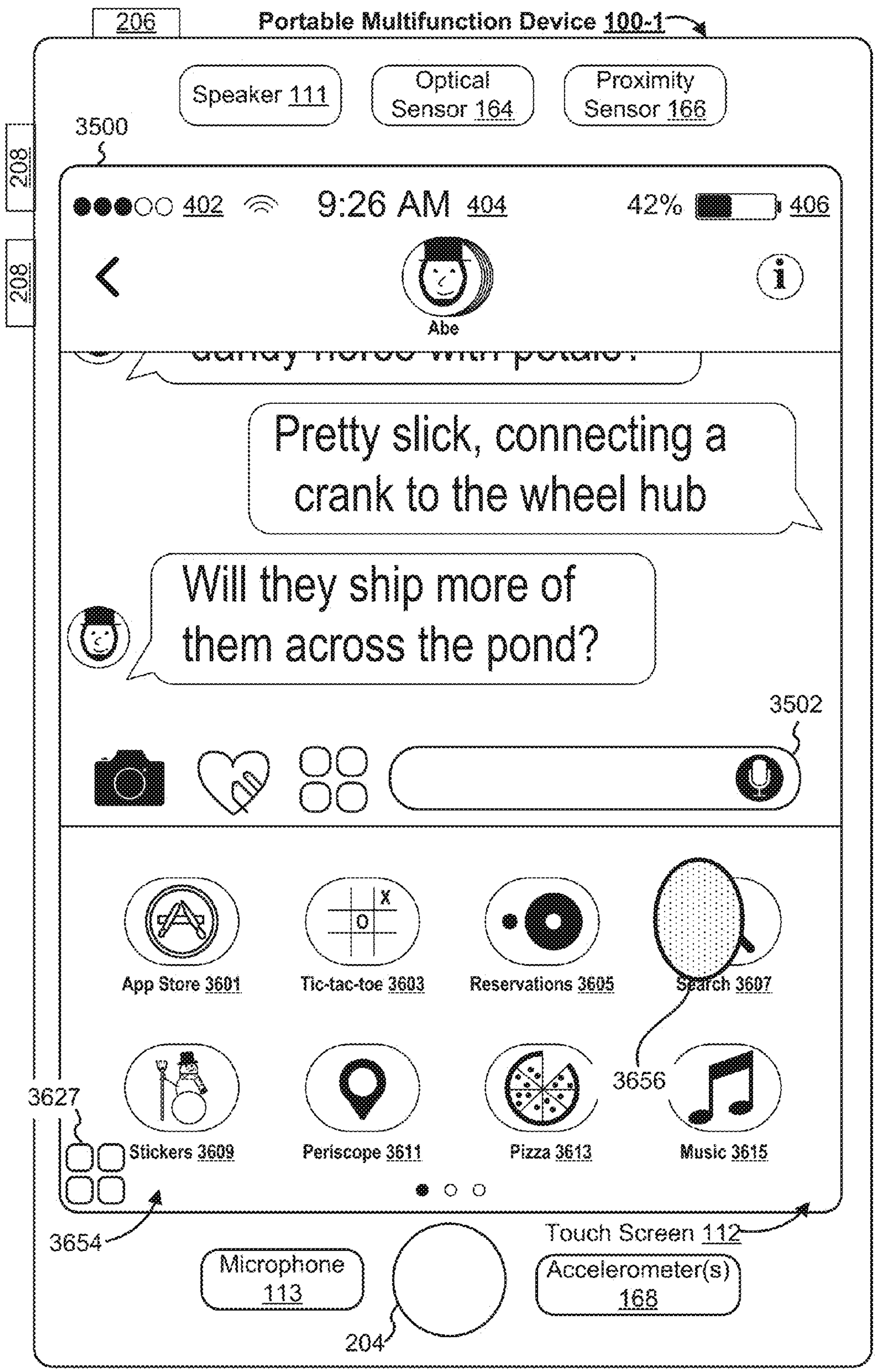
Figure 36A:
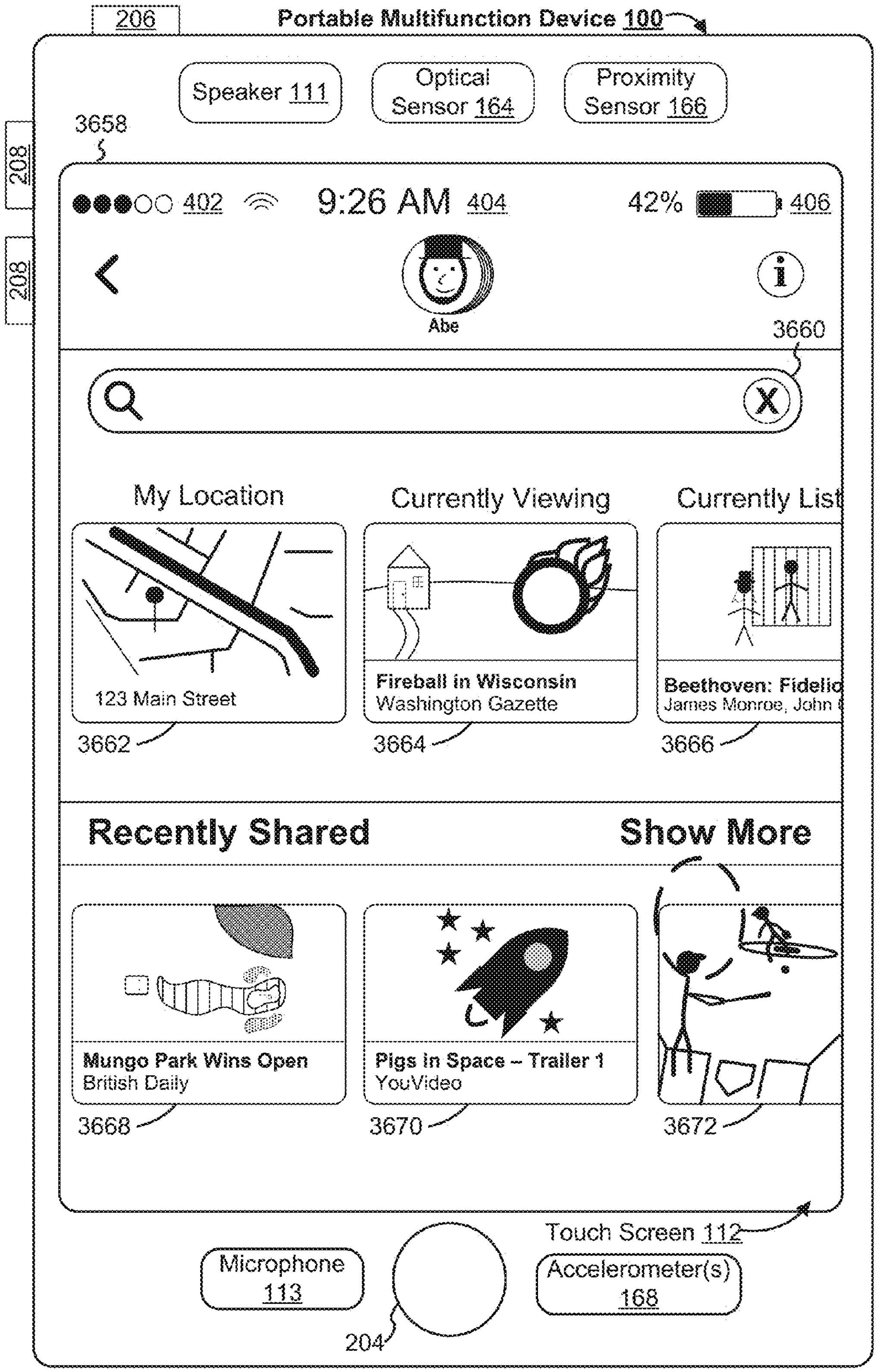
Figure 36A:
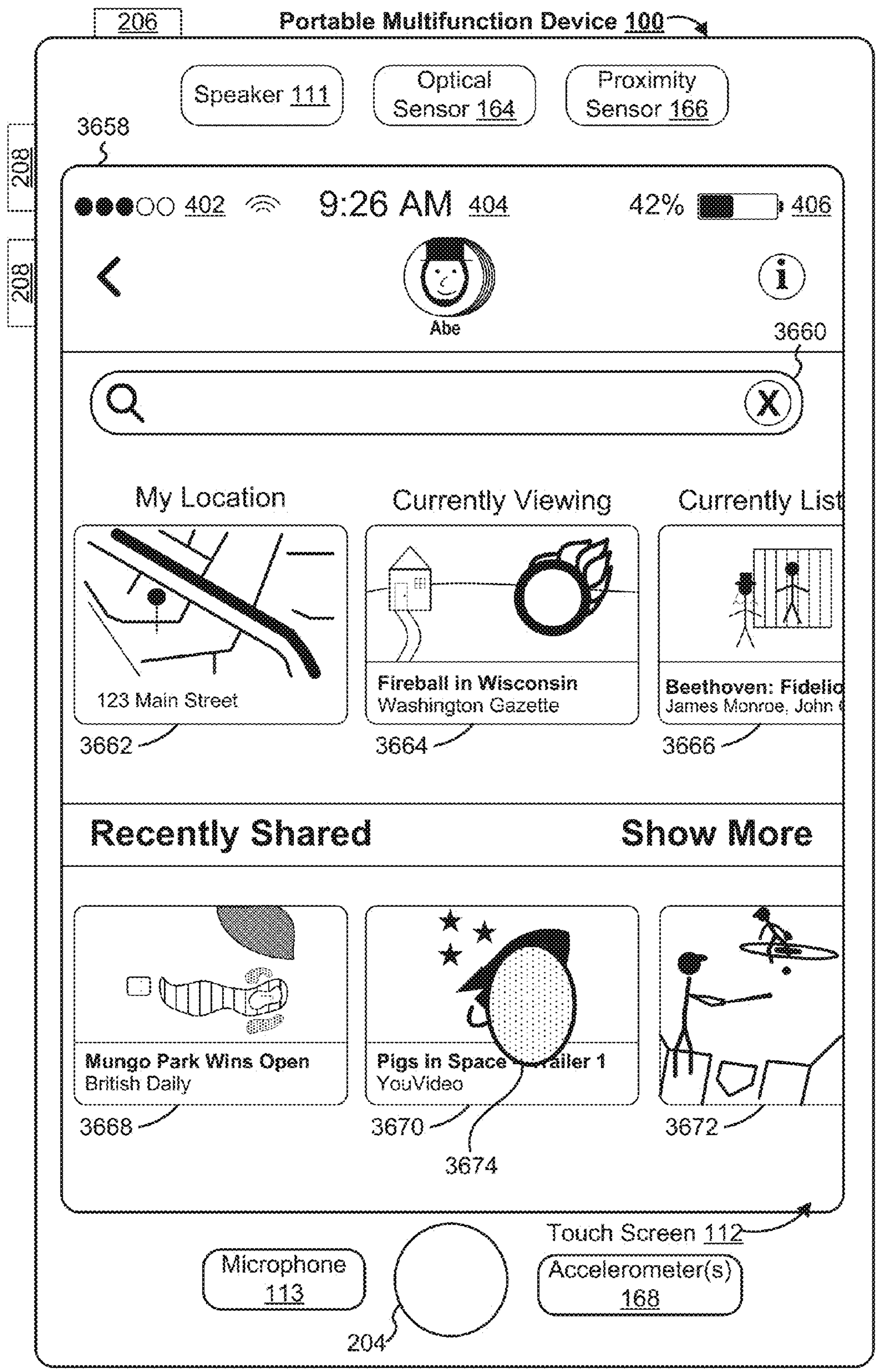
Figure 36A:
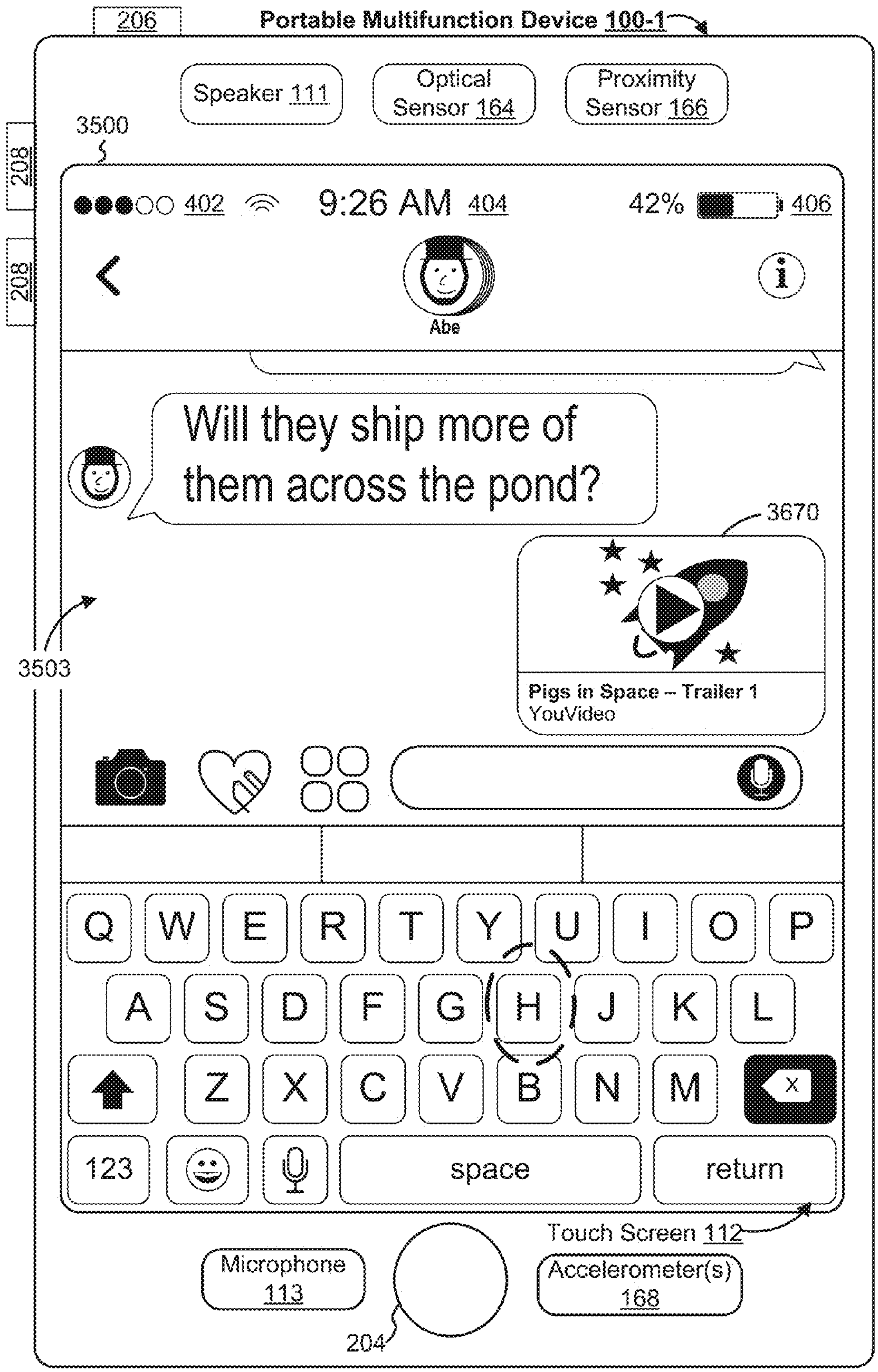
Figure 36A:
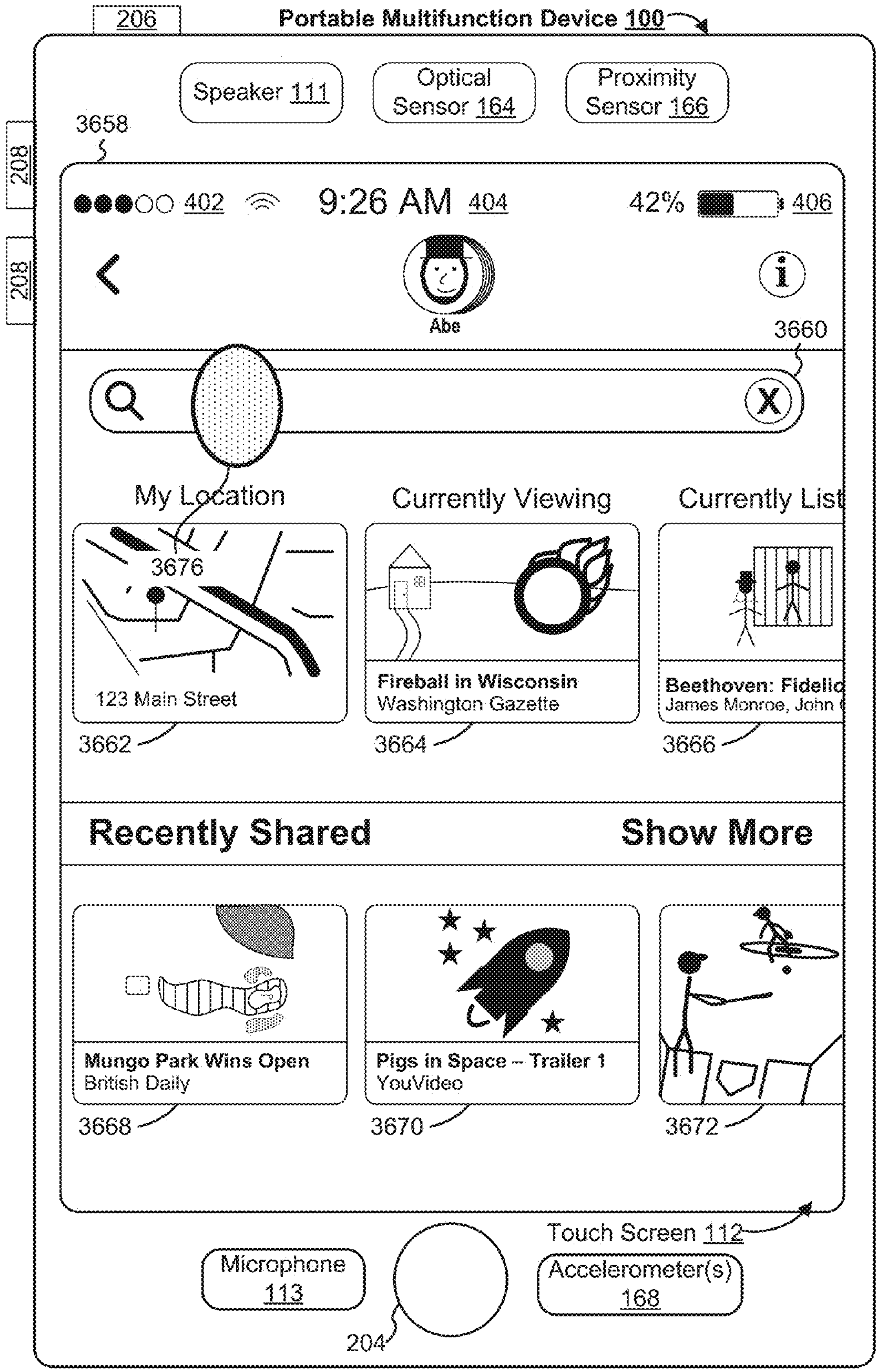
Figure 36A:
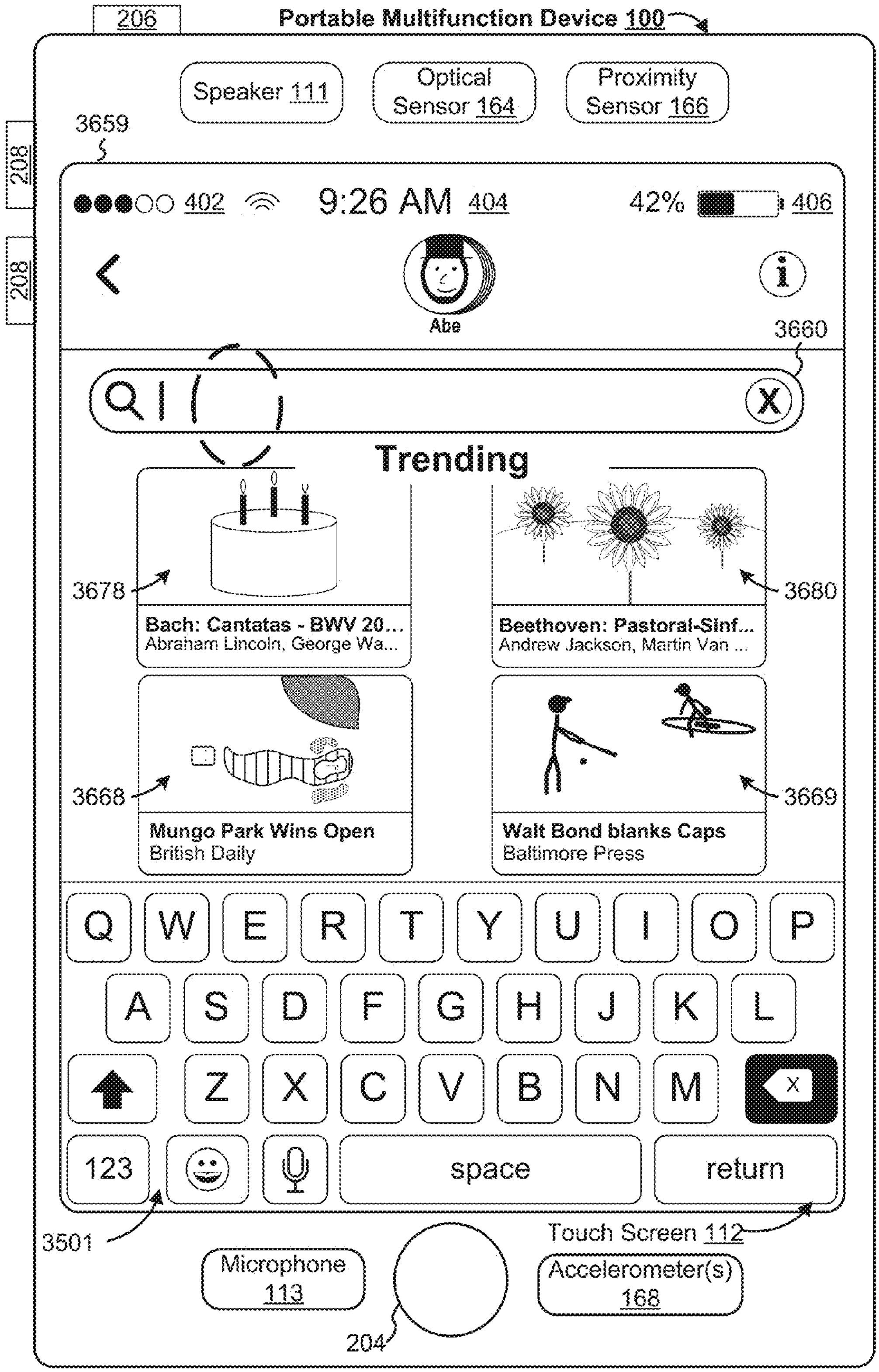
Figure 36A:
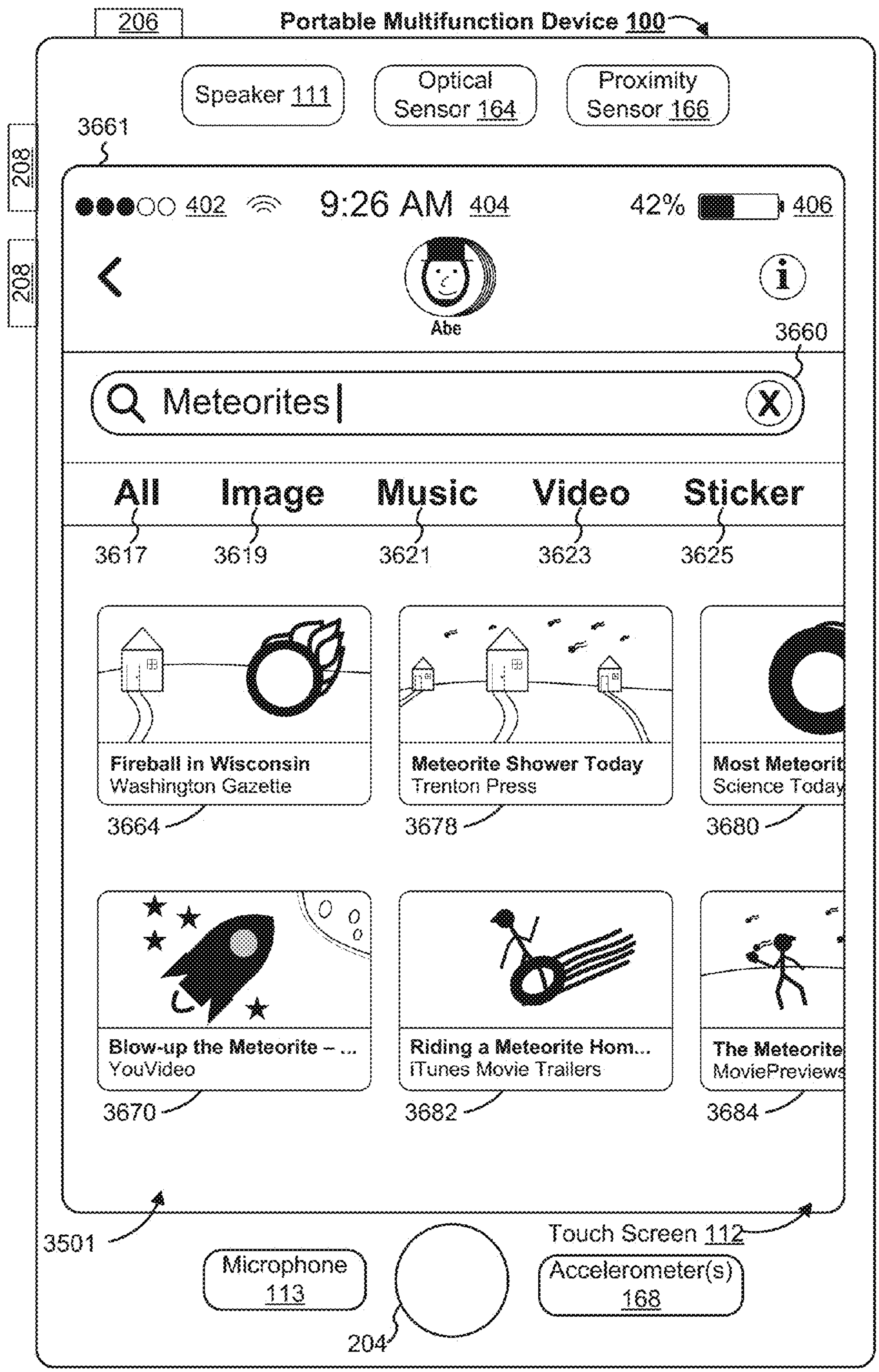
Figure 36A:
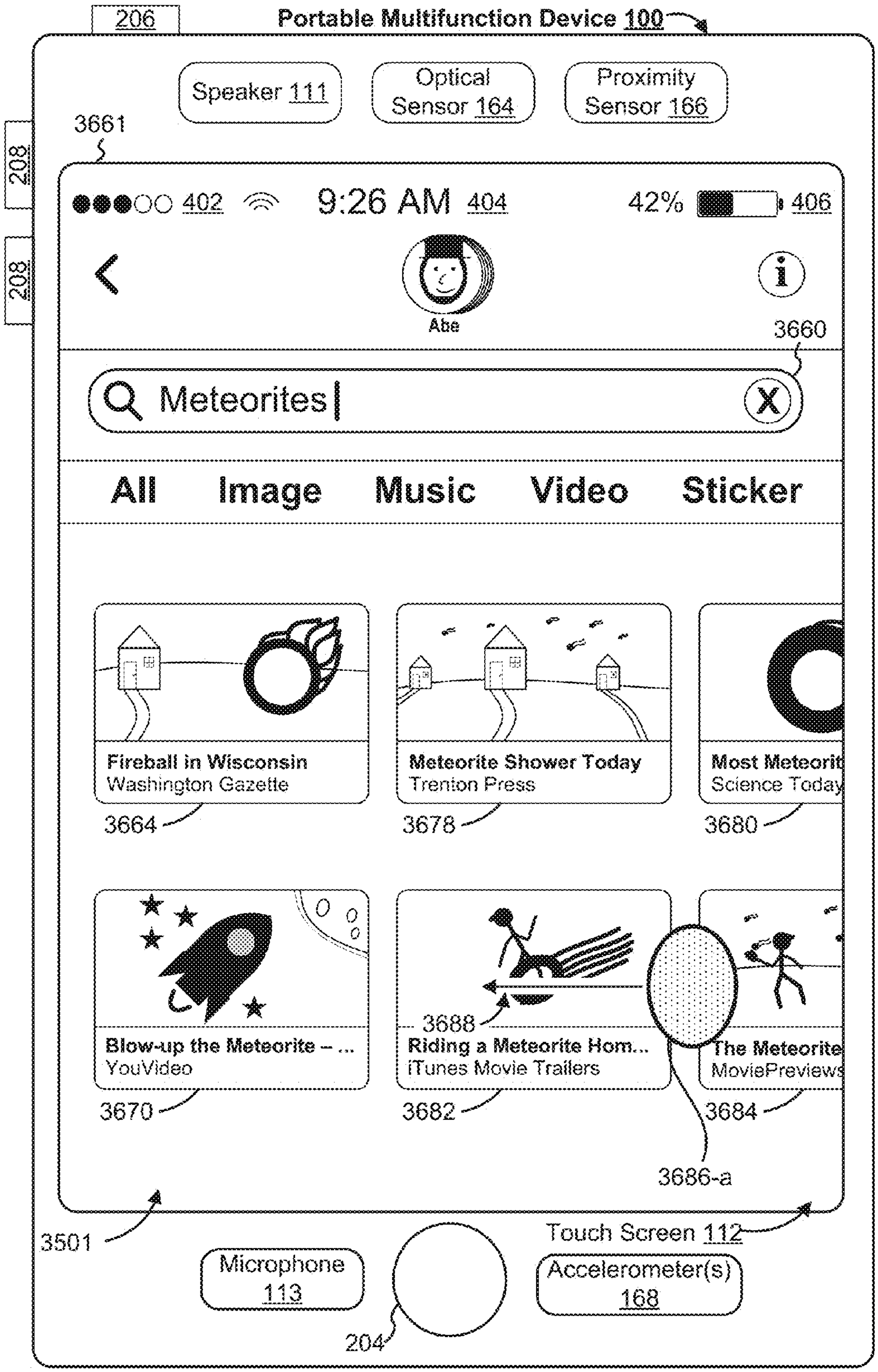
Figure 36A:
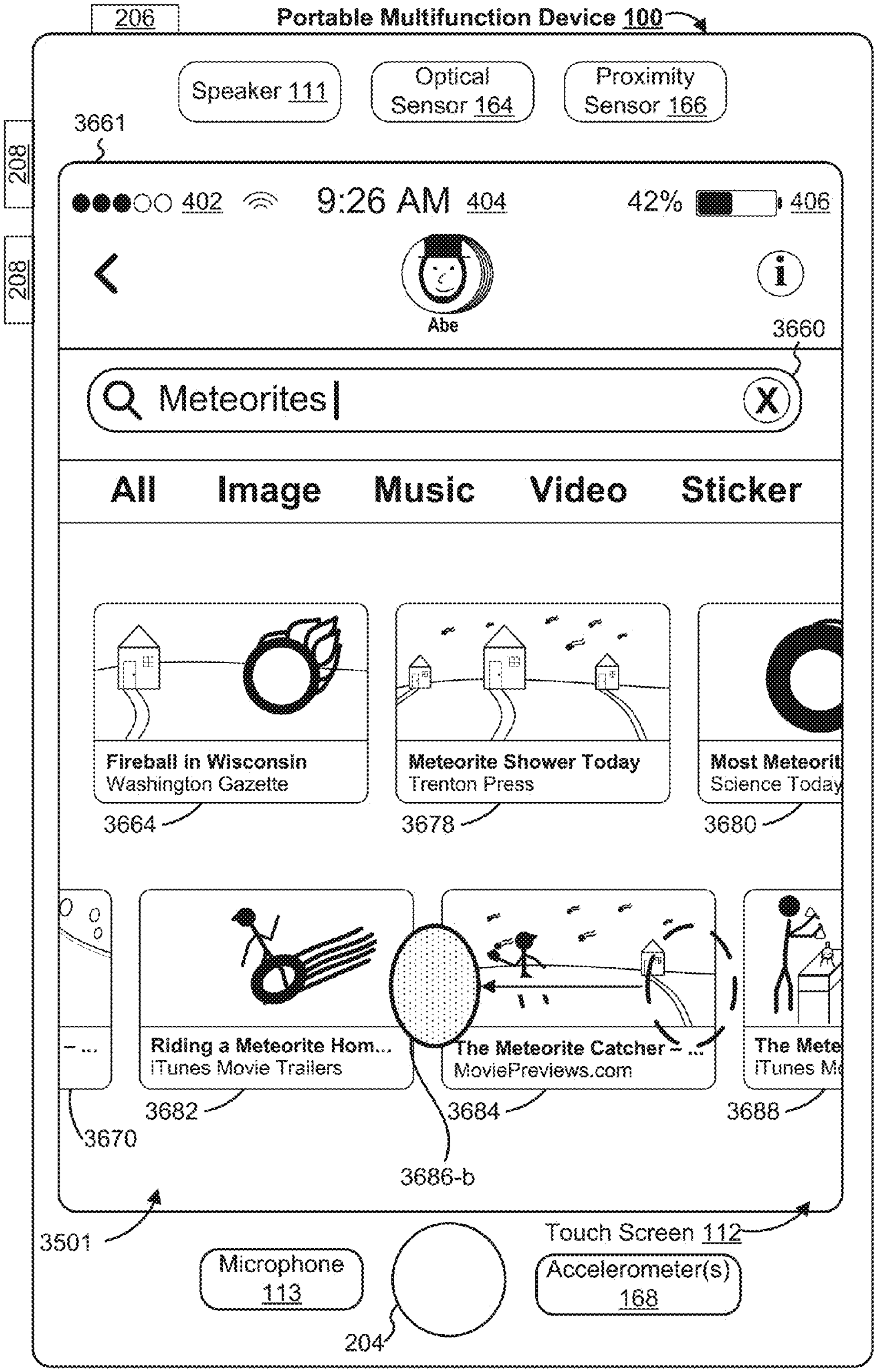
Figure 36A:
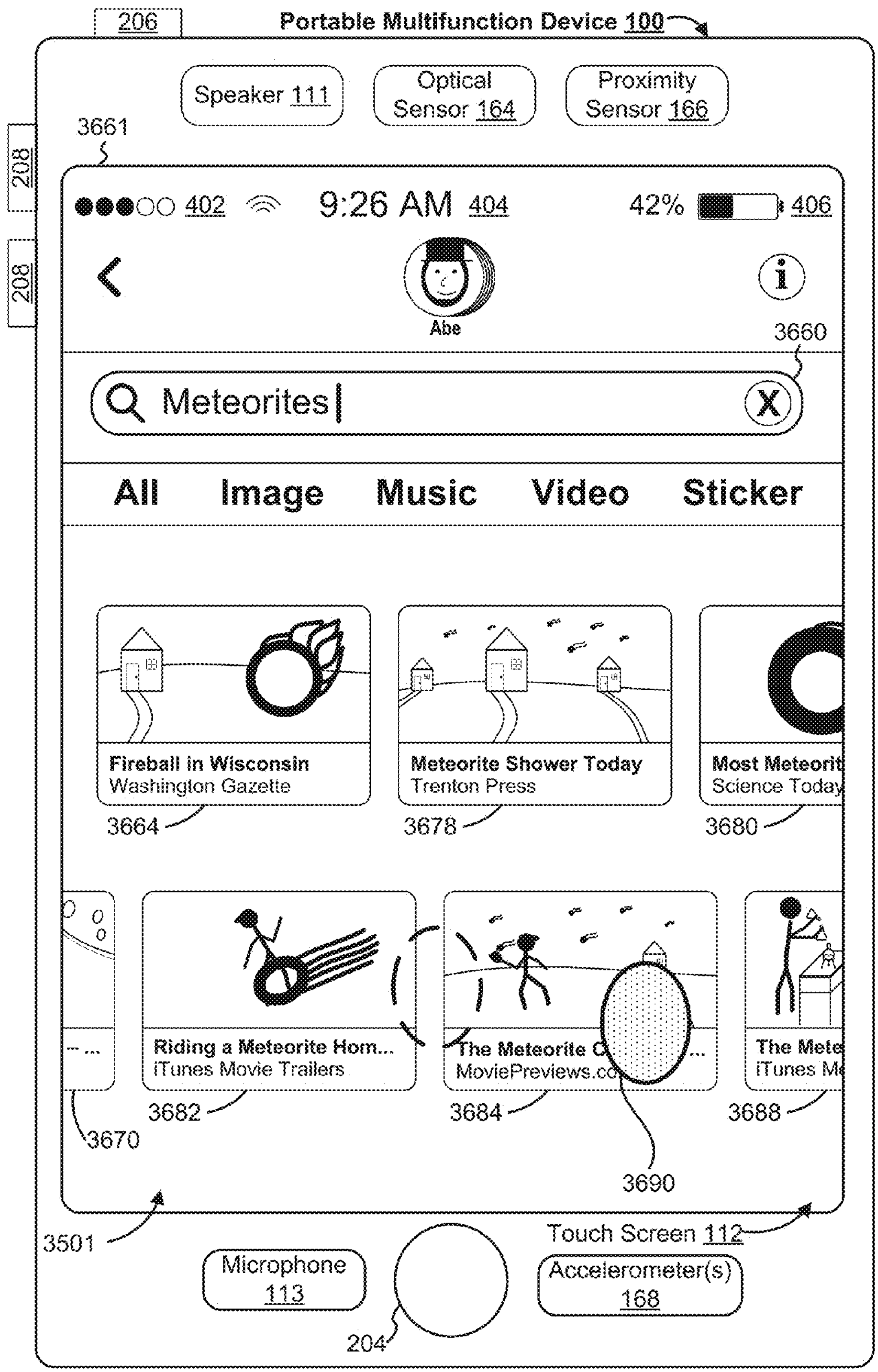
Figure 36A:
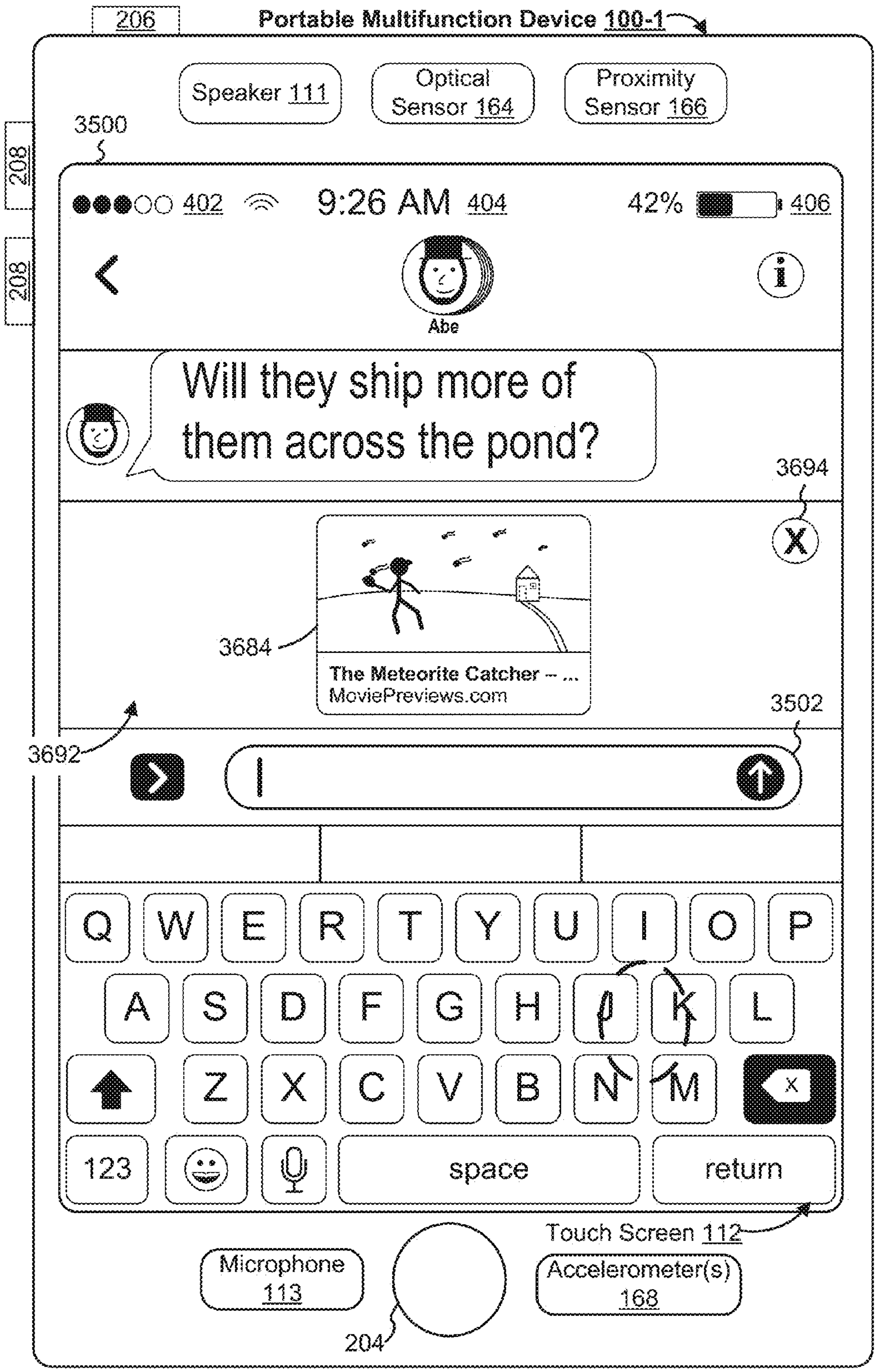
Figure 36A:
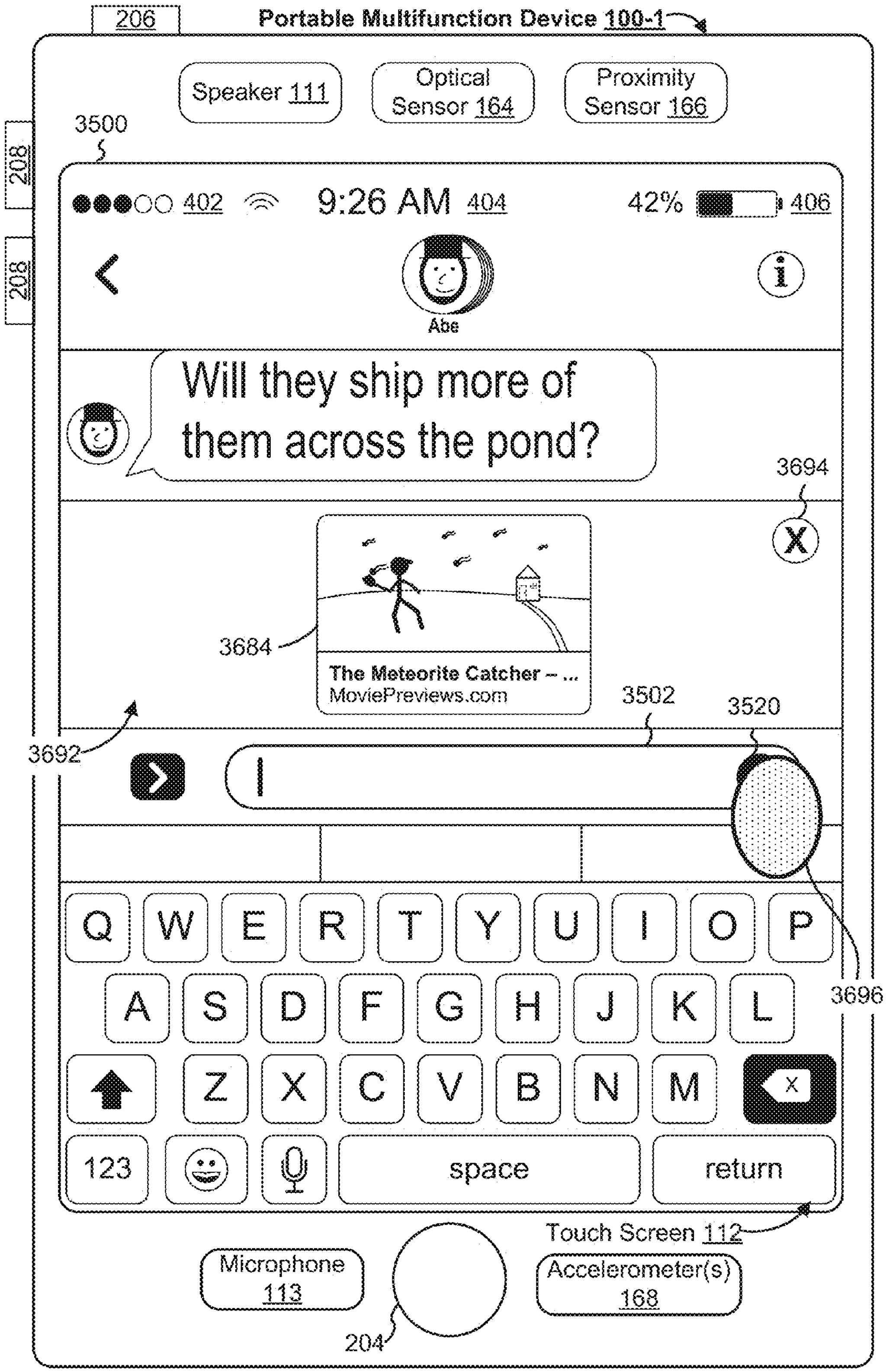
Figure 36A:
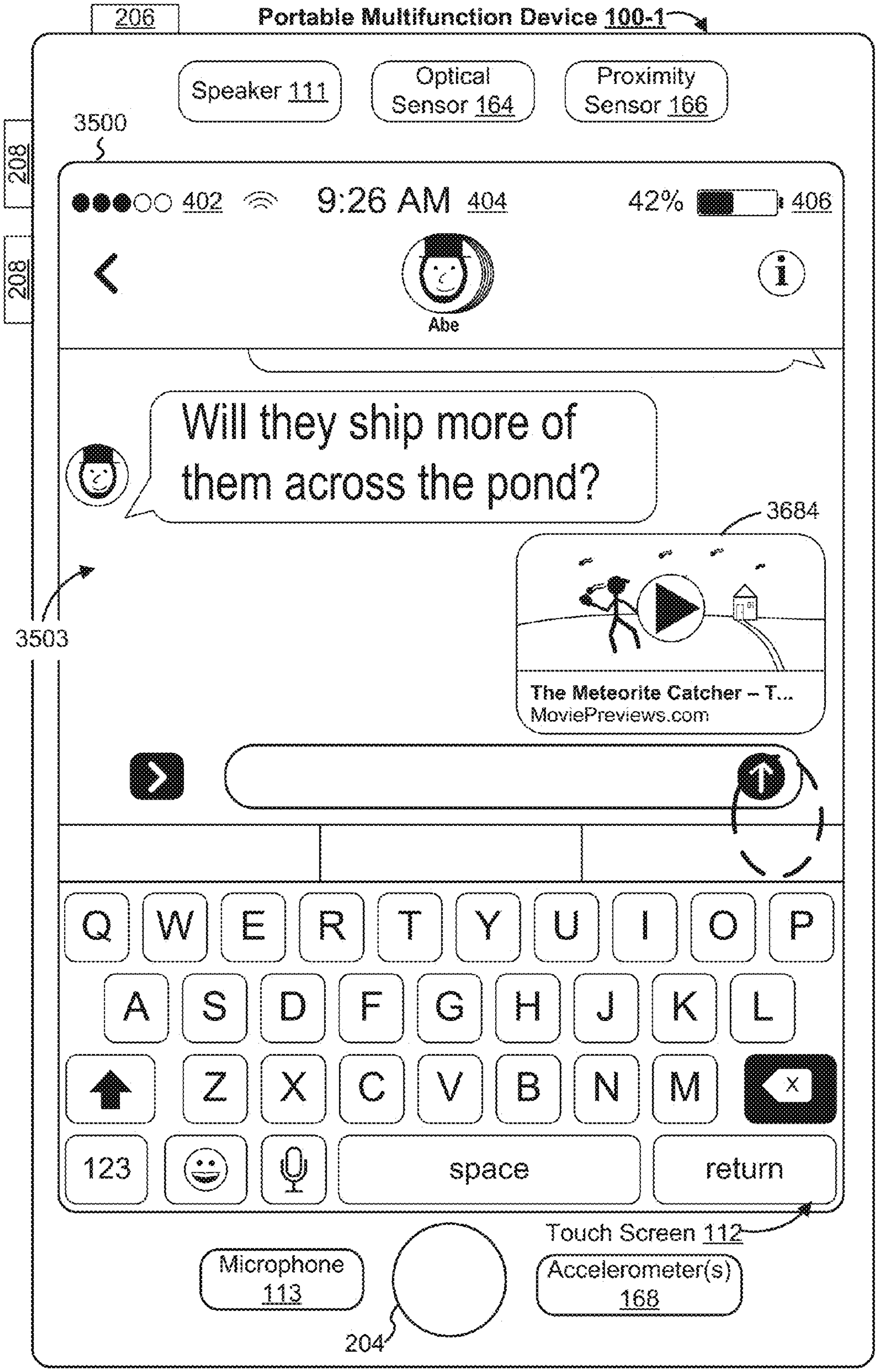

For example an input including contact 3602 on search affordance 3602 in FIG. 36B or an input including contact 3656 on search application launch icon 3607 in FIG. 36Z.

In response to detecting the input that activates the search affordance (4410), the device ceases to display the messaging user interface and displays a search user interface, the search user interface including a search field and a plurality of categorized content items, wherein the plurality of categorized content items includes at least a content item stored on the electronic device and a content item from the Internet. For example, in response to activating search application launch icon 3607 in FIG. 36Z, device 100-1 ceases displaying messenger user interface 3500 and displays search user interface 3658 in FIG. 36AA, including content items 3662, 3664, 3666, 3668, 3670, 3672 categorized as suggested content for posting (e.g., the current location of the device 3662, a news article 3664 being accessed from the internet, a digital recording 3666 playing on the device) and recently shared content (e.g., a news article 3668 accessed from the internet, a movie trailer 3670 accessed from the internet, and a digital image 3672).

In some embodiments, the content items include suggested content, such as content open on the device, content recently accessed on the device (e.g., content 3662, 3664, and 3666 in FIG. 36AA), content related to the messaging session (e.g., content identified as associated with any of the users of the messaging session), web content related to content open or recently opened on the device (e.g., content 3664, 3668, and 3670 in FIG. 36AA), web content related to the messaging session, content related to the location of the device (e.g., content 3662 in FIG. 36AA), recently shared content (e.g., content 3668, 3670, and 3672 in FIG. 36AA), recently received content, and/or content that is trending (e.g., in a social networking application; e.g., content 3678, 3680, 3668, and 3669 in FIG. 36AE). ISE, the content items are related to an input in the search field (e.g., content 3664, 3678, 3680, 3670, 3682, and 3684 are results from a search of the word "Meteorites" in FIG. 36F). In some embodiments, the content includes rich links, music, application links, and/or web links. In some embodiments, the plurality of categorized content items is displayed as a scrollable list of content items, arranged by content categories (e.g., additional content in FIGS. 36AG-36H is accessed by scrolling the search results to the left).

While displaying the search user interface, the device detects an input that selects a first content item in the plurality of categorized content items (e.g., for an electronic device with a touch sensitive display, detecting a tap gesture on the first content item). For example, device 100-1 detects a tap gesture including contact 3674 on movie trailer 3670 in FIG. 36AB and a tap gesture including contact 3690 on movie trailer 3684 in FIG. 36AI.

After detecting the input that selects the first content item in the plurality of categorized content items (4414), the device ceases to display the searching user interface and displays the first content item in the conversation transcript within the messaging user interface. For example, in response to detecting a tap gesture including contact 3674 on movie trailer 3670 in FIG. 36AB, device 100-1 replaces display of search user interface 3658 with display of messaging user interface 3500 in FIG. 36AC. Similarly, in response to detecting a tap gesture including contact 3690 on movie trailer 3684 in FIG. 36AI, device 100-1 replaces display of search user interface 3658 with display of messaging user interface 3500 in FIG. 36AJ.

The device also transmits (4416) the first content item (e.g., information relating to the first content item) to one or more (e.g., second) electronic devices that correspond to the at least one other user included in the messaging session (e.g., "Abe"), where the one or more electronic devices display the first content item in a conversation transcript that corresponds to the messaging session.

In some embodiments, detecting the input that selects the first content item includes: detecting a first input while a focus selector is over the first content item, and displaying the selected first content item in a message-input area. For example, as illustrated in FIGS. 36AI-36AJ. In some embodiments, while displaying the selected content item in the message-input area, the device detects a second input to post the contents of the message-input area to the conversation transcript of the messaging session. For example, device 100-1 detects a tap input including contact 3696 on send affordance 3520 in FIG. 36AK, and posts movie trailer 3684 to the messaging session, as displayed in conversation transcript 3503 in FIG. 36AL.

In some embodiments, the first content item is displayed in the conversation transcript of the messaging session (e.g., is directly posted to the messaging session) in response to detecting the input that selects the first content item. For example, in response to detecting a tap gesture including contact 3674 on movie trailer 3670 in FIG. 36AB, device 100-1 posts the movie trailer directly to the messaging session, as displayed in conversation transcript 3503 in FIG. 36AC.

In some embodiments, while displaying the search user interface, and prior to detecting the input that selects the first content item in the plurality of categorized content items, the device (4418) receives input of a query in the search field and, in response to receiving input of the query in the search field, updates the displayed plurality of categorized content items to display content items that satisfy the query. For example, while displaying search user interface 3658 in FIG. 36AD, device 100-1 receives input of search query "Meterorites" in search field 3660 and, in response, displays search user interface 3661 with updated content items satisfying the query in FIG. 36AF.

In some embodiments, in response to detecting the input that selects the first content item, the device (4420) displays the first content item in the message-input area, while displaying the first content item in the message-input area, receiving input of a message in the message input area (e.g., a text message). After receiving input of the message in the message-input area, the device detects an input that corresponds to a request to post the contents of the message-input area to the messaging session (e.g., detecting a tap gesture on a send icon), the contents including the first content item and the message. In response to detecting the input that corresponds to the request to post the contents of the message-input area to the messaging session, the device displays the first content item in the conversation transcript, displays the message (e.g., within a message region) in the conversation transcript, wherein the message (e.g., the message region) partially overlaps the first content item in the conversation transcript, and transmits the first content item and the message to one or more electronic devices that correspond to the at least one other user included in the messaging session, wherein the one or more electronic devices display the first content item and the message in a conversation transcript corresponding to the messaging session, wherein the message (e.g., the message region) partially overlaps the first content item in the conversation transcript corresponding to the messaging session.

In some embodiments, in response to detecting the input that selects the first content item, the device (4422): in accordance with a determination that the input that selects the first content item meets one or more input-area-display criteria (e.g., one or more criteria based on the motion, timing, and/or intensity of a contact in the input), displays the first content item in the message input area (e.g., as illustrated in FIGS. 36AI-36AJ), and in accordance with a determination that the input that selects the first content item meets one or more transcript-area-display criteria (e.g., one or more criteria based on the motion, timing, and/or intensity of a contact in the input, which are distinct from the input-area-display criteria) displays the first content item in the conversation transcript (e.g., as illustrated in FIGS. 36AB-36AC) and transmits the first content item to one or more electronic devices that correspond to the at least one other user included in the messaging session, where the one or more electronic devices display the first content item in a conversation transcript corresponding to the messaging session.

In some embodiments, the electronic device includes one or more sensors configured to detect intensities of contacts on the touch-sensitive surface. Detecting the input that selects the first content item in the plurality of content items includes detecting a first contact at a location on the touch-sensitive surface that corresponds to display of the first content item on the display. The one or more transcript-area-display criteria require that a characteristic intensity of the first contact on the touch-sensitive surface meet a respective intensity threshold in order for the transcript-area-display criteria to be met (e.g., transcript-area-display criteria are met in FIG. 35AB if a characteristic intensity of contact 3674 meets a predefined intensity threshold (e.g., $IT_L$ or $IT_D$)). The one or more input—area-display criteria do not require that the characteristic intensity of the contact on the touch-sensitive surface meet the respective intensity threshold in order for the selection criteria to be met (e.g., input-area-display criteria are met in Figure in FIGS. 36AI-36AJ even if a characteristic intensity of contact 3690 does not meet a predefined intensity threshold (e.g., $IT_L$ or $IT_D$)).

In some embodiments, (4424) input-area-display criteria are met when a characteristic intensity of the first contact is between a first intensity threshold and a second intensity threshold and the transcript-area-display criteria are met when a characteristic intensity of the first contact is between the second intensity threshold and a third intensity threshold. In some embodiments, the second intensity threshold is above the first intensity threshold and the third intensity threshold is above the second intensity threshold (e.g., tap to display the content item in the message input area before posting the content item to the messaging session and light press (or deep press) to post the first content item directly to the messaging session). In some embodiments, the second intensity threshold is below the first intensity threshold and the third intensity threshold is below the second intensity threshold (e.g., light press (or deep press) to display the content item in the message input area before posting the content item to the messaging session and tap to post the first content item directly to the messaging session).

In some embodiments, the one or more input-area-display criteria are met (2426) upon detection of a tap gesture on the touch-sensitive surface (e.g., a tap gesture including contact 3690 in FIG. 36AI).

In some embodiments, while displaying the first content item in the conversation transcript within the messaging user interface, the device (4428) detects a first input by a first contact at a location that corresponds to the first content item and, in response to detecting the first input, in accordance with a determination that the first contact meets one or more expansion criteria (e.g., a tap, deep press, or long press gesture), the device displays an expanded version of content associated with the first content item. For example, device 100-1 detects a tap gesture, including contact 3636, on news article 3634 displayed in conversation transcript 3503, in FIG. 36P. In response, device 100-1 accesses the web page associated with the news article in area 3638, displayed over portions of search tray 3629 and conversation transcript 3503, in FIG. 36Q. Device 100-1 then displays more of the news article from the web site, in area 3638, responsive to detecting a swipe gesture, including movement 3642 of contact 3640 from position 3640-*a* in FIG. 36R to position 3640-*b* in FIG. 36S.

In some embodiments, the expanded version of the content is navigation to a website, display of an application preview platter displaying more content than the first content item displayed in the conversation transcript, display of a video, or opening of an interactive application within the messaging application.

In some embodiments, the device detects (4430), in the conversation transcript, a word or phrase associated with additional content stored on the electronic device and additional content available on the Internet (e.g., business/restaurant info, music info, movie info; insert boilerplate from Siri/ontology applications). For example, device 100-1 device recognizes phrase 4103 ("Astron Omer") as the name of an actor about whom information is available on the internet. In response, the device displays highlighting 4116 of phrase 4103 in FIG. 41D, prompting the user to select the phrase. The device then detects a tap gesture, including contact 4118, on phrase 4103 in FIG. 41E. In response, the device displays search user interface 3661 displaying categorized results—new articles 3664, 3678, and 3680 and movie previews 3670, 3682, and 3684—of an internet search of phrase 4103, in FIG. 41F. The device detects a tap gesture, including contact 4120 in FIG. 41G, on movie preview 3670. In response, the device posts movie preview 3670 to the messaging session, displaying movie preview 3670 in conversation transcript 3503 in FIG. 41H. In some embodiments, detecting the word or phrase is done in response to detecting the input that activates the search affordance. The plurality of categorized content items displayed in the search user interface includes a content item stored on the electronic device associated with the word or phrase detected in the conversation transcript.

In some embodiments, the device detects (4432), in the conversation transcript, a word or phrase associated with additional content stored on the electronic device and additional content available on the Internet (e.g., business/restaurant info, music info, movie info; insert boilerplate from Siri/ontology applications). In some embodiments, detecting the word or phrase is done in in response to detecting the input that activates the search affordance. The plurality of categorized content items displayed in the search user interface includes content item from the Internet associated with the word or phrase detected in the conversation transcript.

It should be understood that the particular order in which the operations in FIGS. 44A-44D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200,

4600, 4800, 5000, 5200, 5400, 5600, 5800, 6000, 6200, 6400, 6600, 6800, and 7000) are also applicable in an analogous manner to method 4400 described above with respect to FIGS. 44A-44D. For example, the contacts, gestures, user interface objects, tactile outputs, intensity thresholds, focus selectors, animations described above with reference to method 4400 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4600, 4800, 5000, 5200, 5400, 5600, 5800, 6000, 6200, 6400, 6600, 6800, and 7000). For brevity, these details are not repeated here.

Figure 45:
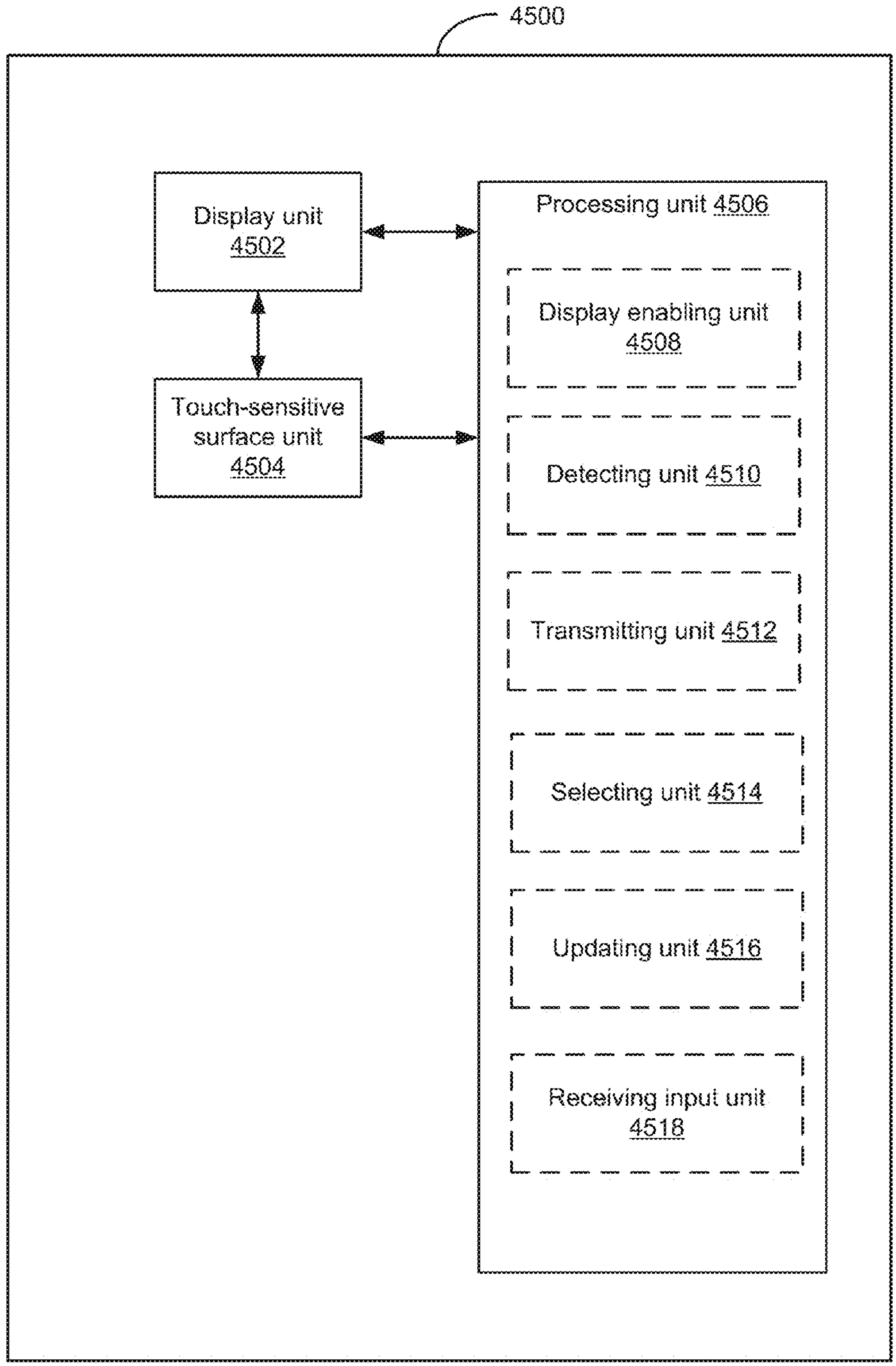
FIG. 45 is a functional block diagram of an electronic device in accordance with some embodiments.

In accordance with some embodiments, FIG. 45 shows a functional block diagram of an electronic device 4500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 45 are, optionally, combined or separated into sub-blocks to implement the principles of the various described embodiments. Therefore, the description herein optionally supports any possible combination or separation or further definition of the functional blocks described herein.

As shown in FIG. 45, an electronic device 4500 includes a display unit 4502 configured to display user interfaces, a touch-sensitive surface unit 4504, and a processing unit 4506 coupled to the display unit 4502 and the touch-sensitive surface unit 4504. In some embodiments, the processing unit includes a display enabling unit 4508, a detecting unit 4510, a transmitting unit 4512, a selecting unit 4514, and an updating unit 4316.

The processing unit 4506 is configured to: display (e.g., with display enabling unit 4508) a messaging user interface on the display unit 4502, the messaging user interface including a conversation transcript of a messaging session between a user of the electronic device 4500 and at least one other user, and a search affordance. The processing unit 4506 is further configured to, while displaying the messaging user interface, detect (e.g., with detecting unit 4510) an input that activates the search affordance. The processing unit 4506 is further configured to, in response to detecting the input that activates the search affordance: cease to display (e.g., with display enabling unit 4508) the messaging user interface, and display a search user interface, the search user interface including a search field and a plurality of categorized content items, wherein the plurality of categorized content items includes at least a content item stored on the electronic device 4500 and a content item from the Internet. The processing unit 4506 is further configured to, while displaying the search user interface, detect (e.g., with detecting unit 4510) an input that selects a first content item in the plurality of categorized content items. The processing unit 4506 is further configured to, after detecting the input that selects the first content item in the plurality of categorized content items: cease to display (e.g., with display enabling unit 4508) the searching user interface, display the first content item in the conversation transcript within the messaging user interface, and transmit (e.g., with transmitting unit 4512) the first content item to one or more electronic devices that correspond to the at least one other user included in the messaging session, wherein the one or more electronic devices display the first content item in a conversation transcript that corresponds to the messaging session.

In some embodiments, the processing unit 4506 is configured to, while displaying the search user interface, and prior to detecting the input that selects the first content item in the plurality of categorized content items, receive input (e.g., with receiving input unit 4518) of a query in the search field. The processing unit 4506 is further configured to, in response to receiving input of the query in the search field, update (e.g., with updating unit 4516) the displayed plurality of categorized content items to display content items that satisfy the query.

In some embodiments, the processing unit 4506 is configured to, in response to detecting the input that selects the first content item, display (e.g., with display enabling unit 4508) the first content item in the message-input area. The processing unit 4506 is further configured to, while displaying the first content item in the message-input area, receive input (e.g., with receiving input unit 4518) of a message in the message input area. The processing unit 4506 is further configured to, after receiving input of the message in the message-input area, detect an input that corresponds to a request to post the contents of the message-input area to the messaging session, the contents including the first content item and the message. The processing unit 4506 is further configured to, in response to detecting the input that corresponds to the request to post the contents of the message-input area to the messaging session, display (e.g., with display enabling unit 4508) the first content item in the conversation transcript, display (e.g., with display enabling unit 4508) the message in the conversation transcript, wherein the message partially overlaps the first content item in the conversation transcript, and transmit (e.g., with transmitting unit 4512) the first content item and the message to one or more electronic devices that correspond to the at least one other user included in the messaging session, wherein the one or more electronic devices display the first content item and the message in a conversation transcript corresponding to the messaging session, wherein the message partially overlaps the first content item in the conversation transcript corresponding to the messaging session.

In some embodiments, the processing unit 4506 is configured to, in response to detecting the input that selects the first content item, in accordance with a determination that the input that selects the first content item meets one or more input-area-display criteria, display (e.g., with display enabling unit 4508) the first content item in the message input area. The processing unit 4506 is further configured to, in accordance with a determination that the input that selects the first content item meets one or more transcript-area-display criteria: display (e.g., with display enabling unit 4508) the first content item in the conversation transcript, and transmit (e.g., with transmitting unit 4512) the first content item to one or more electronic devices that correspond to the at least one other user included in the messaging session, wherein the one or more electronic devices display the first content item in a conversation transcript corresponding to the messaging session.

In some embodiments, the electronic device 4500 includes one or more sensors units configured to detect intensities of contacts on the touch-sensitive surface unit 4504. In some embodiments, detecting the input that selects the first content item in the plurality of content items includes detecting a first contact at a location on the touch-sensitive surface unit 4504 that corresponds to display of the first content item on the display unit 4502. In some embodiments, the one or more transcript-area-display criteria require that a characteristic intensity of the first contact on the touch-sensitive surface unit 4504 meet a respective intensity threshold in order for the transcript-area-display criteria to be met. In some embodiments, the one or more input-area-display criteria do not require that the characteristic intensity of the contact on the touch-sensitive surface unit 4504 meet the respective intensity threshold in order for the selection criteria to be met.

In some embodiments, the one or more input-area-display criteria are met upon detection of a tap gesture on the touch-sensitive surface unit 4504.

In some embodiments, the processing unit 4506 is configured to, while displaying the first content item in the conversation transcript within the messaging user interface, detect (e.g., with detecting unit 4510) a first input by a first contact at a location that corresponds to the first content item. The processing unit 4506 is further configured to, in response to detecting the first input, in accordance with a determination that the first contact meets one or more expansion criteria, display (e.g., with display enabling unit 4508) an expanded version of content associated with the first content item.

In some embodiments, the processing unit 4506 is configured to detect, in the conversation transcript, a word or phrase associated with additional content stored on the electronic device 4500 and additional content available on the Internet, wherein the plurality of categorized content items displayed in the search user interface includes a content item stored on the electronic device 4500 associated with the word or phrase detected in the conversation transcript.

In some embodiments, the processing unit 4506 is configured to, detect, in the conversation transcript, a word or phrase associated with additional content stored on the electronic device 4500 and additional content available on the Internet, wherein the plurality of categorized content items displayed in the search user interface includes content item from the Internet associated with the word or phrase detected in the conversation transcript.

In some embodiments, the search affordance is a search application launch icon that is displayed with a plurality of launch icons for interactive applications within the messaging application.

In some embodiments, the processing unit 4506 is configured to, prior to displaying the plurality of launch icons for interactive applications in the messaging user interface, the messaging user interface included the conversation transcript of the messaging session between a user of the electronic device 4500 and at least one other user, a keyboard, a message-input area, and an application affordance: detect (e.g., with detecting unit 4510) a user input that activates the application affordance. The processing unit 4506 is further configured to, in response to detecting the user input that activates the application affordance, replace display of the keyboard with display of the plurality of launch icons for interactive applications.

The operations described above with reference to FIGS. 44A-44D are, optionally, implemented by components depicted in FIGS. 1A-1B or FIG. 43. For example, detection operations 4408 and 4412 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 46A-46C are flow diagrams illustrating a method 4600 of adding an interactive application to a messaging application in accordance with some embodiments. The method 4600 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 4600 are, optionally, combined and/or the order of some operations is, optionally, changed.

As described below, the method 4600 provides an intuitive way to add an interactive application to a messaging application. The method reduces the number, extent, and/or nature of the inputs from a user when adding an interactive application to a messaging application, thereby creating a more efficient human-machine interface. For battery-operated electronic devices, enabling a user to add an interactive application to a messaging application faster and more efficiently conserves power and increases the time between battery charges.

The device displays (4602) a messaging user interface of a messaging application (e.g., messaging user interface 3500 in FIG. 38AQ) on the display, the messaging user interface including a conversation transcript (e.g., displayed in a first area of the display, such as conversation transcript 3503 in FIG. 38AQ) of a messaging session between a user of the electronic device and at least one other user (e.g., of another electronic device), and an application affordance (e.g., application affordance 3508 in Figure AQ). In some embodiments, the messaging user interface includes a message input area that is configured to display content ready to be posted to the messaging session (e.g., message-input area 3502 in Figure AQ). In some embodiments, the messaging user interface includes a keyboard (e.g., digital keyboard 3501 in FIG. 38AQ), e.g., displayed in a second area of the display.

While displaying the messaging user interface, the device detects (4604) an input that activates the application affordance. For example, a tap gesture including contact 3876 on application affordance 3508 in FIG. 38AR.

In response to detecting the input that activates the application affordance (e.g., while maintaining display of the conversation transcript), the device concurrently displays (4606) a launch icon for an application store and a plurality of launch icons for interactive applications, where activation of a respective launch icon for an interactive application launches a corresponding application that is displayed within the messaging application. For example, in response to detecting the tap gesture including contact 3876 in FIG. 38AR, device 100-1 displays application selection tray 3654, including launch icon 3601 for an application store and other launch icons for interactive applications—e.g., launch icon 3603 for a tic-tac-toe application, launch icon 3605 for a reservation application, launch icon 3611 for a live video-streaming application, and launch icon 3615 for a music application.

In some embodiments, the messaging user interface is not displaying a digital keyboard just prior to detecting the input that activates the application affordance (e.g., the conversation transcript is maximized and includes display of the application affordance or the keyboard is replaced by a user interface for an interactive application that is displayed within the messaging application). In some embodiments, the plurality of launch icons for interactive applications replaces display of the keyboard. In some embodiments, replacing display of the keyboard includes ceasing to display the keyboard and displaying the plurality of launch icons for interactive applications where the keyboard had been displayed.

In some embodiments, the interactive application is configured to perform (4608) a subset (e.g., less than all) of the functions of a corresponding application operated separate from the messaging application. For example, in some embodiments, the application store application launched in response to activation of launch icon 3601 only allows download of applications operable within a messaging application. In contrast, a corresponding application store application (e.g., as launched from a home screen on the device outside of the messaging application) allows download of applications operable within a messaging application and applications operable outside of the messaging application.

In some embodiments, the interactive application launch icon displays (4610) an identifier for a corresponding application operated separate from the messaging application. For example, in FIG. 38AS, application store launch icon 3601 includes a same or similar "A" logo as an application store application operated outside of the messaging application.

In some embodiments, the interactive application displays (4612) a portion (e.g., less than all) of the content displayed by a corresponding application operated separate from the messaging application. For example, in some embodiments, the application store application launched in response to activation of launch icon 3601 only displays all downloadable applications that are operable within the messaging application. In contrast, a corresponding application store application (e.g., as launched from a home screen on the device outside of the messaging application) displays all downloadable applications operable within a messaging application and operable outside of the messaging application.

In some embodiments, the interactive application causes (4614) the device to launch a corresponding application operated separate from the messaging application upon detection of a predefined input. For example, in response to a first input (e.g., a tap, press, deep press, long-press, or multi-finger gesture) on application store launch icon 3601 in FIG. 38AS, the device launches an application store application within the messaging application. In response to a second (e.g., different) input (e.g., a tap, press, deep press, long-press, or multi-finger gesture) on application store launch icon 3601 in FIG. 38AS, the device launches an application store application outside of the messaging application.

In some embodiments, the interactive application is operated (4616) separately from a corresponding application operated separate from the messaging application. For example, the application store application launched in response to activation of launch icon 3601 may be operated when a corresponding application store application operated outside of the application in not running.

In some embodiments, the interactive application is operated (4618) in conjunction with a corresponding application operated separate from the messaging application. For example, the application store application launched in response to activation of launch icon 3601 may not be operated when a corresponding application store application operated outside of the application in not running.

In some embodiments, the interactive application has a dedicated portion of the memory for temporary storage (4620) that is different from a dedicated portion of the memory for temporary storage for a corresponding application operated separate from the messaging application. For example, in some embodiments, records of applications downloaded using the application store application corresponding to launch icon 3601 are stored in a different portion of memory than records of applications downloaded using a corresponding application store application operated outside of the messaging application.

In some embodiments, the corresponding application operated separate from the messaging application is configured (4622) to access the dedicated portion of memory for temporary storage for the interactive application. For example, in some embodiments, the corresponding application store application operated outside of the messaging application can access the records of applications downloaded using the application store application corresponding to launch icon 3601.

The device then detects (4624) an input that activates the launch icon for the application store. For example, device 100-1 detects a tap gesture including a contact on application store launch icon 3601 in FIG. 38AS.

In response to detecting the input that activates the launch icon for the application store, the device (4626) ceases to display the messaging user interface and displays an application store user interface, including display of at least one interactive application available for download to the electronic device. For example, responsive to detecting a tap gesture including a contact on application store launch icon 3601 in FIG. 38S, device 100-1 replaces display of messaging user interface 3500 with display of an application store user interface.

While displaying the application store user interface, the device detects (4628) an input that corresponds to a request to download a first interactive application that is not stored in the memory of the electronic device. For example, device 100-1 detects a tap gesture including a contact on an icon for a tic-tac-toe application not stored on the device. In some embodiments, the input is a tap gesture on a download icon, which initiates automatic downloading and installation of the first interactive application on the device (e.g., as soon as the device detects the tap gesture, the application begins downloading on the device). In some embodiments, the input is a tap gesture on a download confirmation icon, which asks the user to confirm that the user wants to download the first interactive application and which initiates automatic downloading and installation of the first interactive application on the device (e.g., in response to detecting the tap gesture, the device displays a request to confirm the download request and/or confirm the identity of the user.

In response to detecting the input that corresponds to the request to download the first interactive application, the device (4630) downloads the first interactive application to the memory of the electronic device, replaces display of the application store user interface with display of the messaging user interface (e.g., messaging user interface 3500 in FIG. 38AS), the messaging user interface including the conversation transcript (e.g., conversation transcript 3503 in FIG. 38AS) and at least some of the plurality of launch icons for interactive applications (e.g., some of the launch icons displayed in application selection tray 3654 in FIG. 38AS). In some embodiments, the messaging user interface also includes a messaging-input area (e.g., message-input area 3502 in FIG. 38AS. The device also adds a launch icon that corresponds to the first interactive application to the display of the plurality of launch icons for interactive applications (e.g., the device would add application launch icon 3603 for the downloading tic-tac-toe application to application selection tray 3654 in FIG. 38AS.

In some embodiments, adding a launch icon that corresponds to the first interactive application to the display of the plurality of launch icons for interactive applications includes displaying (4632) an indicia (e.g. an animation indicating) that the first interactive application is being downloaded. For example, an indicia similar to indicia 3709, indicating download of a tic-tac-toe application, in FIG. 37BH.

In some embodiments, the indicia (e.g., the animation) indicates (4634) the progress of the download of the first interactive application. For example, in FIG. 37BH, the size of the partial circle in indicia 3709 grows, in accordance with a percentage of the application that is downloaded, until the application is completely downloaded.

It should be understood that the particular order in which the operations in FIGS. 46A-46C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4600, 4800, 5000, 5200, 5400, 5600, 5800, 6000, 6200, 6400, 6600, 6800, and 7000) are also applicable in an analogous manner to method 4600 described above with respect to FIGS. 46A-46C. For example, the contacts, gestures, user interface objects, tactile outputs, intensity thresholds, focus selectors, animations described above with reference to method 4600 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4600, 4800, 5000, 5200, 5400, 5600, 5800, 6000, 6200, 6400, 6600, 6800, and 7000). For brevity, these details are not repeated here.

Figure 47:
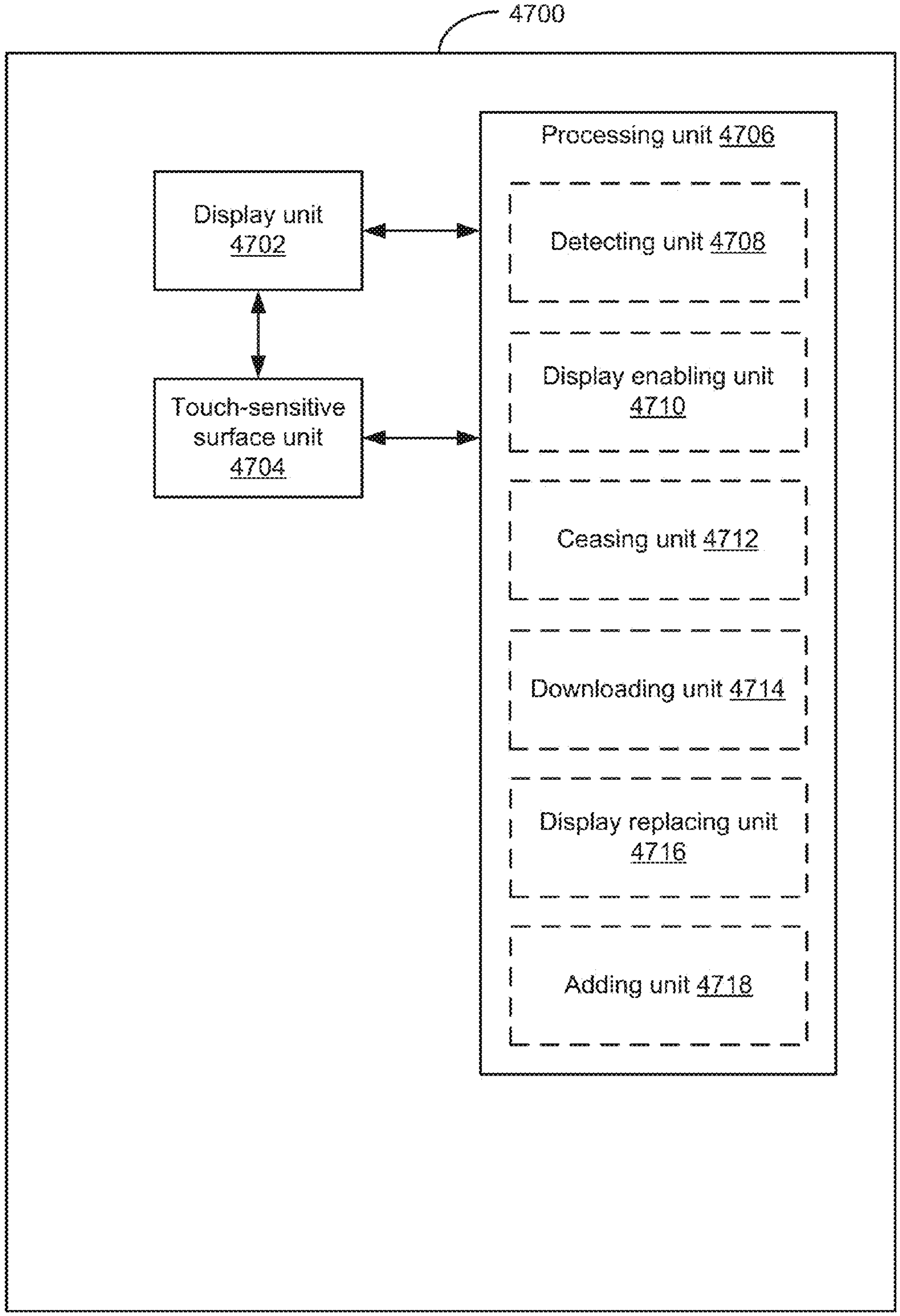
FIG. 47 is a functional block diagram of an electronic device in accordance with some embodiments.
Figure 48C:
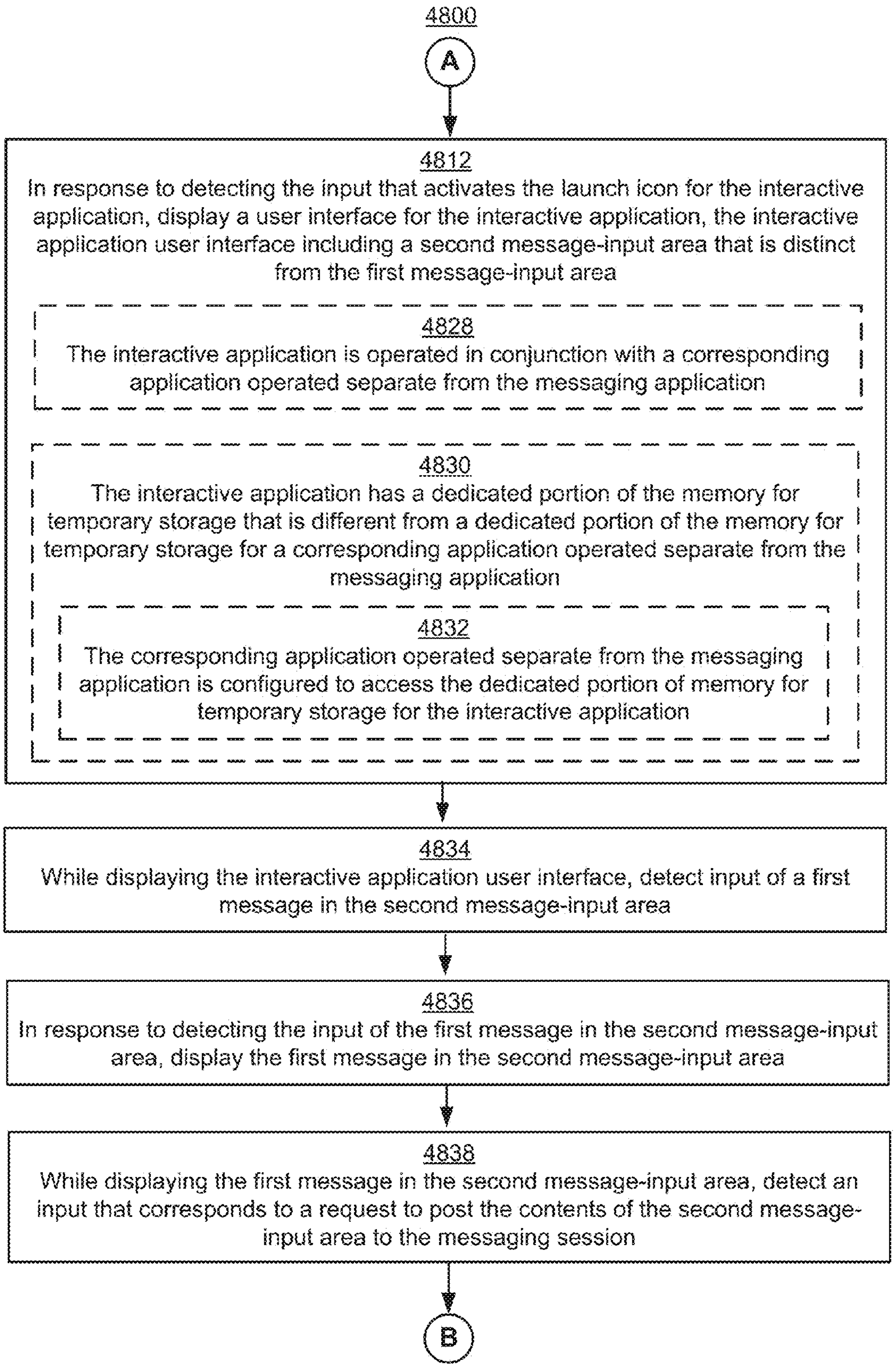

In accordance with some embodiments, FIG. 47 shows a functional block diagram of an electronic device 4700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 47 may be combined or separated into sub-blocks to implement the principles of the invention as described above. Therefore, the description herein may support any possible combination or separation or further definition of the functional blocks described herein.

As shown in FIG. 47, an electronic device 4700 includes a display unit 4702 configured to display user interfaces; a touch-sensitive surface unit 4704 configured to detect contacts; and a processing unit 4706 coupled with the display unit 4702 and the touch-sensitive surface unit 4704. In some embodiments, the processing unit 4706 includes a detecting unit 4708, a display enabling unit 4710, a ceasing unit 4712, a downloading unit 4714, a display replacing unit 4716, and an adding unit 4718.

The processing unit 4706 is configured to: enable display of a messaging user interface of a messaging application on the display unit 4702, the messaging user interface including a conversation transcript of a messaging session between a user of the electronic device and at least one other user, and an application affordance (e.g., with the display enabling unit 4710); while displaying the messaging user interface, detect an input that activates the application affordance (e.g., with the detecting unit 4708); in response to detecting the input that activates the application affordance, concurrently enable display of a launch icon for an application store and a plurality of launch icons for interactive applications, wherein activation of a respective launch icon for an interactive application launches a corresponding application that is displayed within the messaging application (e.g., with the display enabling unit 4710); detect an input that activates the launch icon for the application store (e.g., with the detecting unit 4708); in response to detecting the input that activates the launch icon for the application store: cease to display the messaging user interface (e.g., with the ceasing unit 4712), and enable display of an application store user interface, including display of at least one interactive application available for download to the electronic device (e.g., with the display enabling unit 4710); while displaying the application store user interface, detect an input that corresponds to a request to download a first interactive application that is not stored in the memory of the electronic device (e.g., with the detecting unit 4708); and, in response to detecting the input that corresponds to the request to download the first interactive application: download the first interactive application to the memory of the electronic device (e.g., with the downloading unit 4714); replace display of the application store user interface with display of the messaging user interface, the messaging user interface including the conversation transcript and at least some of the plurality of launch icons for interactive applications (e.g., with the display replacing unit 4716); and add a launch icon that corresponds to the first interactive application to the display of the plurality of launch icons for interactive applications (e.g., with the adding unit 4718).

In some embodiments, adding a launch icon that corresponds to the first interactive application to the display of the plurality of launch icons for interactive applications includes displaying an indicia that the first interactive application is being downloaded.

In some embodiments, the indicia indicates the progress of the download of the first interactive application.

In some embodiments, the interactive application is configured to perform a subset of the functions of a corresponding application operated separate from the messaging application.

In some embodiments, the interactive application launch icon displays an identifier for a corresponding application operated separate from the messaging application.

In some embodiments, the interactive application displays a portion of the content displayed by a corresponding application operated separate from the messaging application.

In some embodiments, the interactive application causes the device to launch a corresponding application operated separate from the messaging application upon detection of a predefined input.

In some embodiments, the interactive application is operated separately from a corresponding application operated separate from the messaging application.

In some embodiments, the interactive application is operated in conjunction with a corresponding application operated separate from the messaging application.

In some embodiments, the interactive application has a dedicated portion of the memory for temporary storage that is different from a dedicated portion of the memory for temporary storage for a corresponding application operated separate from the messaging application.

In some embodiments, the corresponding application operated separate from the messaging application is configured to access the dedicated portion of memory for temporary storage for the interactive application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 46A-46C are, optionally, implemented by components depicted in FIGS. 1A-1B or FIG. 47. For example, detection operations 4604 and 4624 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 48A-48D are flow diagrams illustrating a method 4800 of posting messages to a messaging session from a user interface other than the user interface for the messaging application in accordance with some embodiments. The method 4800 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 4800 are, optionally, combined and/or the order of some operations is, optionally, changed.

As described below, the method 4800 provides an intuitive way to post messages to a messaging session from a user interface other than the user interface for the messaging application. The method reduces the number, extent, and/or nature of the inputs from a user when posting messages to a messaging session from a user interface other than the user interface for the messaging application, thereby creating a more efficient human-machine interface. For battery-operated electronic devices, enabling a user to post messages to a messaging session from a user interface other than the user interface for the messaging application faster and more efficiently conserves power and increases the time between battery charges.

The device displays (4802) a messaging user interface of a messaging application on the display (e.g., messaging user interface 3500 in FIGS. 37F, 37O, and 37AS), the messaging user interface including a conversation transcript (e.g., displayed in a first area of the display, such as conversation transcript 3700 in FIGS. 37F, 37O, and 37AS) of a messaging session between a user of the electronic device and at least one other user {e.g., of another electronic device}, a first message-input area (e.g., message-input area 3502 in FIGS. 37F, 37O, and 37AS), and a launch icon for an interactive application (e.g., an application operated within the messaging application than can be updated by all participants of the messaging session; e.g., launch icon 3708 for an interactive reservations application, reservations interactive application object 3728 displayed in transcript 3700 in FIG. 37O, and launch icon 3774 for an interactive tic-tac-toe application in FIG. 37AS).

In some embodiments, once the interactive application is posted to the messaging session, any participant of the session may open the interactive application, make a change within the interactive application (e.g., change a location on a map, select a topping for a pizza, make or change an appointment, or take a turn in a game, such as tic-tac-toe), and the change is sent to all participants of the messaging session. For example, once a session of a reservations interactive application is posted to a messaging session corresponding to conversation transcript 3700, as illustrated by display of reservation application object 3728 in transcript 3700 in FIG. 37O, any user included in the messaging transcript can open the application session and change the time of the reservation. This is illustrated, for example, in FIGS. 37P-37AC, where Abe, the operator of device 100-2, changes the time of the reservation made by Andrew, the operator of device 100-1, from 6:30 PM, as shown in FIG. 37P, to 8:00 PM, as shown in FIG. 37 AC.

In some embodiments, the first message input area is configured to display text and other content ready to be posted to the messaging session. For example, after receiving input of message 3736 in FIG. 37N, the message is posted to the messaging session, as illustrated by display of message 3736 in conversation transcript 3700 in FIG. 37O.

In some embodiments, the launch icon for the interactive application is concurrently displayed (4804) with a plurality of launch icons for other interactive applications in the messaging user interface. For example, launch icon 3603 for an interactive tic-tac-toe application and launch icon 3605 for an interactive reservation application are displayed in application selection tray 3654 with other launch icons for interactive applications—e.g., application launch icon 3611 for a live video-streaming application, application launch icon 3613 for an interactive pizza ordering application, and application launch icon 3615 for an interactive music application.

In some embodiments, the interactive application launch icon displays (4806) an identifier for a corresponding application operated separate from the messaging application. For example, application launch icon 3708 for an interactive reservations application displays concentric circle identifiers for a corresponding reservation application operated outside of the messaging application.

While displaying the messaging user interface, the device detects (4808) an input that activates the launch icon for the interactive application. In some embodiments, the input is a tap gesture on the launch icon. For example, device 100-1 detects a tap gesture including contact 3710 on launch icon 3708 in FIG. 37F, activating a corresponding interactive reservations application in FIG. 37G. For example, device 100-2 detects a tap gesture including contact 3738 on reservations application object 3728 in FIG. 37P, activating a corresponding interactive reservations application in FIG. 37Q. For example, device 100-1 detects a tap gesture including contact 3776 on tic-tac-toe application launch icon 3774 in FIG. 37AT, activating a corresponding interactive tic-tac-toe application in FIG. 37AU.

In some embodiments, detecting the input that activates the launch icon for the interactive application includes (4810) detecting a first input by a first contact at a location corresponding to the launch icon for the interactive application, in response to detecting the first input, displaying a menu that includes a plurality of options for how to run the interactive application (e.g., to play tic-tac-toe as "X" or "O"; to operate the interactive application in full-screen mode or embedded within the messaging user interface), and detecting a second input that selects a first option in the plurality of options for how to run the interactive application.

For example, device 100-1 detects a tap gesture including contact 3776 on tic-tac-toe launch icon 3774 in FIG. 37AT. In response to detecting the contact, the device displays menu 3778 including options 3780-1 and 3780-2 for playing the game as 'O' or 'X', respectively. Responsive to detecting selection of 'O' via a tap gesture on affordance 3780-1, including contact 3782 in FIG. 37AV, device 100-1 displays tic-tac-toe user interface 3784 over a portion of messaging user interface 3500 in FIG. 37AW.

In some embodiments, the second input is a continuation of the first input, such as, dragging a first contact to a location corresponding to the first option and lifting-off, or increasing the intensity of the first contact, to select the first option. In some embodiments, the second input is by a second contact at a location corresponding to the first option, e.g., a tap gesture on the first option. In some embodiments, the menu is displayed on top of the launch icon and/or the plurality of launch icons. In some embodiments, the menu replaces display of the interactive launch icon, which includes ceasing to display the launch icon or plurality of launch icons and displaying the menu where the launch icon(s) had been displayed. For example, menu 3778 in FIG. 37AU replaces display of interactive launch icon 3774 in response to detecting contact 3776 in FIG. 37AT.

In response to detecting the input that activates the launch icon for the interactive application, the device displays (4812) a user interface for the interactive application (e.g., an "interactive application user interface"). The interactive application user interface includes a second message-input area that is distinct from the first message-input area. For example, interactive reservation application user interface 3712 includes message-input area 3716 in FIGS. 37G and 37Q, which is separate from message-input area 3502 displayed in the messaging user interface 3500 in FIGS. 37F and 37P. Similarly, interactive tic-tac-toe application user interface 3784 includes message-input area 3716 in FIG. 37AW, which is separate from message-input area 3502 displayed in the messaging user interface 3500, as seen in the background of FIG. 37AW.

In some embodiments, the interactive application user interface is displayed over at least a portion of the messaging user interface. For example, interactive tic-tac-toe application user interface 3784 is displayed over a portion of messaging user interface 3500 in FIG. 37AW. In some embodiments, where the interactive application user interface is displayed over a portion of the messaging user interface, the messaging user interface is blurred, faded, or otherwise obscured to emphasize display of the interactive application user interface.

In some embodiments, the interactive application user interface replaces display of the messaging user interface. For example, interactive reservations application user interface 3712, illustrated in FIG. 37G, replaces display of messaging user interface 3500 in FIG. 37F, upon activation.

In some embodiments, the interactive application user interface, or a portion of the interactive application user interface (e.g., where the interactive application user interface is displayed in more than one continuous area on the display) is displayed within the message transcript. For example, pizza application object 3735, displayed within transcript 3700 in FIG. 37CA, is a non-contiguous portion of the user interface for an interactive pizza ordering application, because it displays a current status of the pizza being ordered. For example, in response to pepperoni being added to the pizza in FIG. 37CD, pizza ordering application object 3735 displays pepperoni on the pizza in FIG. 37CE.

In some embodiments, the user interface for the interactive application includes (4814) at least one avatar, each respective avatar in the at least one avatar corresponding to a user in the at least one other user included in the messaging session. For example, user interface 3712 for an interactive reservation application displays avatar 3510 corresponding to Abe, when displayed on device 100-1 (e.g., operated by Andrew) in FIG. 37G, and displays avatar 3511 corresponding to Andrew, when displayed on device 100-2 (e.g., operated by Abe).

In some embodiments, the user interface for the interactive application includes (4816) a plurality of avatars displayed as a stack of avatars (e.g., an overlapping stack of avatars, such as stack of avatars 4002 in FIG. 40A.

In some embodiments, while displaying the interactive application user interface, the device (4818) detects a third input by a third contact at a location corresponding to an avatar within the user interface for the interactive application and, in response to detecting the third input, displaying a menu of actions, that are associated with the avatar (e.g., for sending to the user associated with the avatar a personal message, calling, video chatting, sending a payment, and/or sending a digital touch). In some embodiments, the menu or actions is overlaid on top of the user interface for the interactive application. For example, responsive to detecting a input including an increase in a characteristic intensity of contact 3799 from FIG. 37AM to 37AM, while over avatar 3510 in reservations application user interface 3712, menu 3882 of actions 3884 is displayed in FIG. 37AN.

In some embodiments, the interactive application is configured (4820) to perform a subset (e.g., less than all) of the functions of a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application displays (4822) a portion (e.g., less than all) of the content displayed by a corresponding application operated separate from the messaging application. For example, in some embodiments, an interactive reservations application operated within a messaging application displays restaurant ratings but not user comments on a restaurant. In contrast, the corresponding reservation application operable outside of the messaging application displays both restaurant ratings and user comments on a restaurant.

In some embodiments, the interactive application causes (4824) the device to launch a corresponding application operated separate from the messaging application upon detection of a predefined input. For example, in response to a first input (e.g., a tap, press, deep press, long-press, or multi-finger gesture) on interactive reservations application launch icon 3708 in FIG. 37F, the device launches the interactive reservations application within the messaging application. In response to a second (e.g., different) input (e.g., a tap, press, deep press, long-press, or multi-finger gesture) on interactive reservations application launch icon 3708 in FIG. 37F, the device launches a reservations application outside of the messaging application.

In some embodiments, the interactive application is operated (4826) separately from a corresponding application operated separate from the messaging application. For example, the interactive reservations application launched in response to activation of launch icon 3708 in FIG. 37F is operable when a corresponding reservations application operated outside of the messaging application is not running.

In some embodiments, the interactive application is operated (4828) in conjunction with a corresponding application operated separate from the messaging application. For example, the interactive reservations application launched in response to activation of launch icon 3708 in FIG. 37F is not operable when a corresponding reservations application operated outside of the messaging application is not running.

In some embodiments, the interactive application has a dedicated portion of the memory for temporary storage (4830) that is different from a dedicated portion of the memory for temporary storage for a corresponding application operated separate from the messaging application. For example, in some embodiments, records of reservations made using the interactive reservations application operated within the messaging application are stored in a different portion of memory than records of reservations made using a corresponding reservations application operated outside of the messaging application.

In some embodiments, the corresponding application operated separate from the messaging application is configured (4832) to access the dedicated portion of memory for temporary storage for the interactive application. For example, in some embodiments, the corresponding reservations application operated outside of the messaging application can access the records of reservations made using the interactive reservations application operated within the messaging application.

While displaying the interactive application user interface, the device detects (4834) an input of a first message in the second message-input area. For example, while displaying interactive reservations application user interface 3712, device 100-2 detects input of message 3746 in message-input area 3716 in FIG. 37S.

In response to detecting the input of the first message in the second message-input area, the device displays (4836) the first message in the second message-input area. For example, in response to detecting input of message 3746, device 100-2 displays the message in message-input area 3716 in FIG. 37T.

While displaying the first message in the second message-input area, the device detects (4838) an input that corresponds to a request to post the contents of the second message-input area to the messaging session. In some embodiments, the input is a tap gesture on a send icon. For example, device 100-2 detects an input including contact 3748 on sending affordance 3520 in FIG. 37U.

In response to detecting the input that corresponds to the request to post the contents of the second message-input area to the messaging session, the device transmits (4840) the first message to one or more (e.g., second) electronic devices that correspond to the at least one other user included in the messaging session, wherein the one or more electronic devices display the first message in a conversation transcript corresponding to the messaging session. For example, in response to detecting the input including contact 3748 on sending affordance 3520 in FIG. 37U, device 100-2 transmits message 3746 at 9:29 AM to other device 100-1 associated with Andrew, who is included in the messaging session. Device 100-1 receives message 3746 and displays it within conversation transcript 3700 at 9:29 AM, in FIG. 37AE.

In some embodiments, after detecting the input that corresponds to the request to post the contents of the second message-input area to the messaging session, and while displaying the user interface for the interactive application, the device detects an input terminating the interactive application (e.g., a tap on the close button; for example, a tap gesture including contact 3756 on exit affordance 3714 in FIG. 3756) and, in response to detecting the input terminating the interactive application, the device (4842) ceases to display the user interface for the interactive application and displays the messaging user interface, the messaging user interface including display of the first message in the conversation transcript. For example, responsive to a tap gesture including contact 3756 on exit affordance 3714 in FIG. 3756, device 100-2 replaces display of interactive reservations application user interface 3712 in FIG. 37AB with display of messaging user interface 3500 in FIG. 37AC. Message 3746, posted while device 100-2 was displaying interactive reservations application user interface 3712 in FIGS. 37U-37V, is displayed in conversation transcript 3700 in FIG. 37AC.

In some embodiments, while displaying the user interface for the interactive application (e.g., in full-screen mode), the device (4844) receives a message associated with the messaging session and, in response to receiving the message associated with the messaging session, transiently displays the message overlaid on top of the user interface for the interactive application. For example, while displaying user interface 3712 for an interactive reservations application in full screen mode in FIG. 37V, associated with a messaging session corresponding to conversation transcript 3700 in FIG. 37P, device 100-2 receives message 3750, associated with the messaging session corresponding to conversation transcript 3700 at 9:30 AM, and transiently displays the message over user interface 3712 in FIG. 37W, even though conversation transcript 3700 is not displayed in user interface 3712.

Figure 41D:
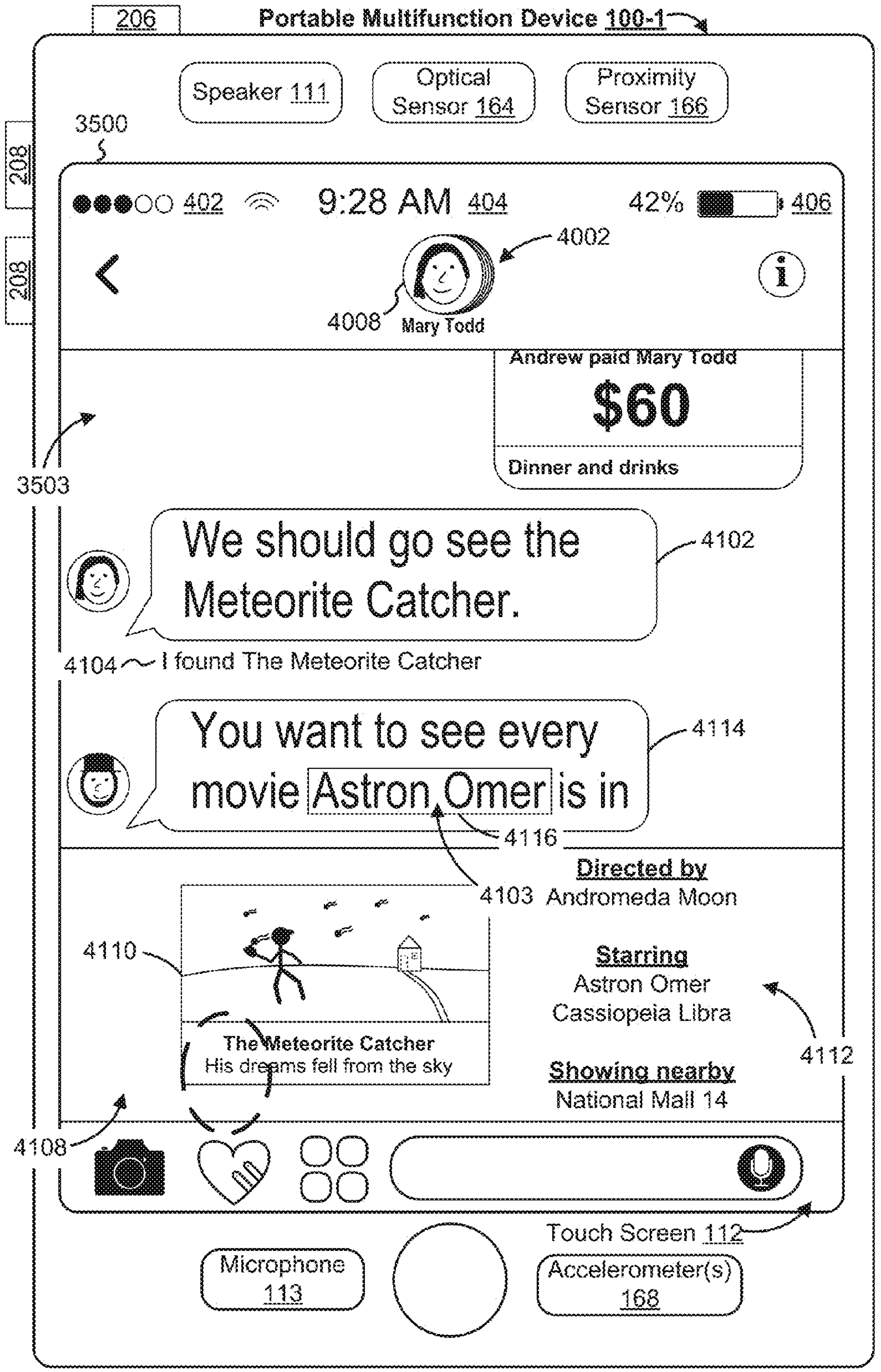
Figure 41E:
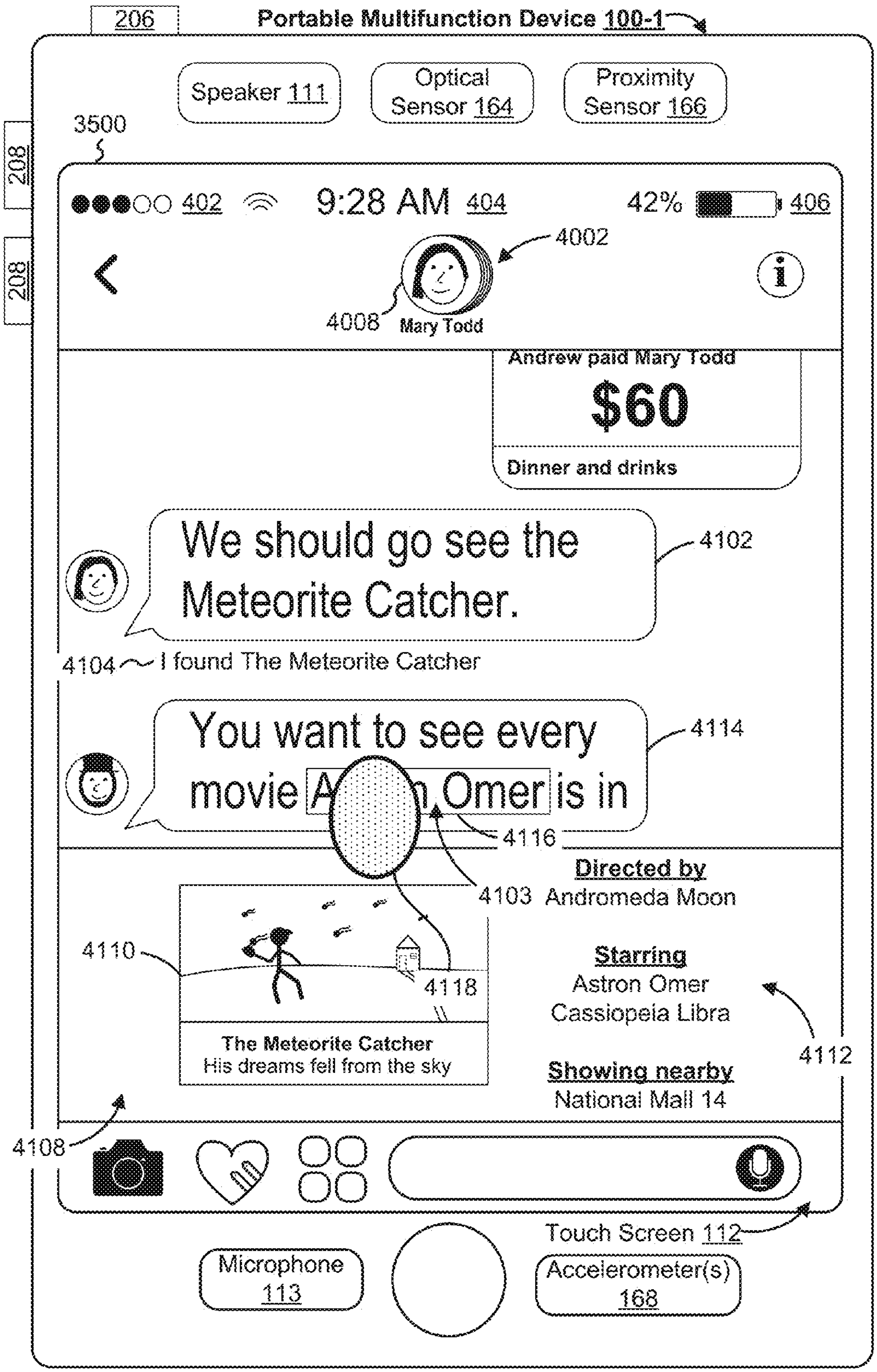
Figure 41F:
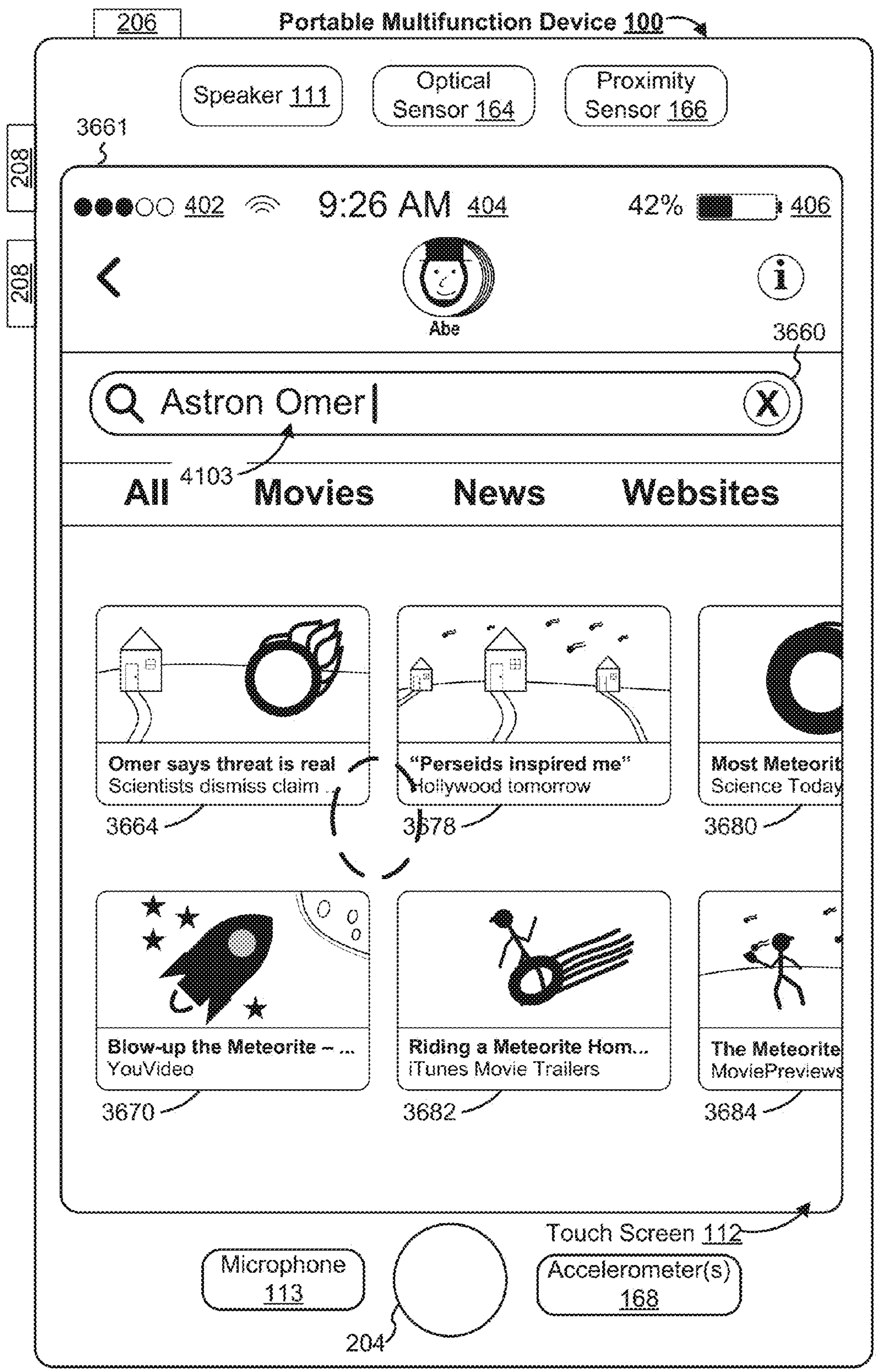

In some embodiments, messages associated with other messaging sessions are not displayed over the interactive application user interface when received. For example, message 4114, posted at 9:28 AM, to a messaging session associated with conversation transcript 3503 in FIG. 41D is not displayed over interactive user interface 3712 in FIGS. 37Q-37T (e.g., at 9:28 AM), even though device 100-2 corresponds to user "Abe," who is also included in the messaging session associated with conversation transcript 3503.

It should be understood that the particular order in which the operations in FIGS. 48A-48D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 5000, 5200, 5400, 5600, 5800 6000, 6200, 6400, 6600, 6800, and 7000) are also applicable in an analogous manner to method 4800 described above with respect to FIGS. 48A-48D. For example, the contacts, gestures, user interface objects, tactile outputs, intensity thresholds, focus selectors, animations described above with reference to method 4800 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 5000, 5200, 5400, 5600, 5800, 6000, 6200, 6400, 6600, 6800, and 7000). For brevity, these details are not repeated here.

Figure 49:
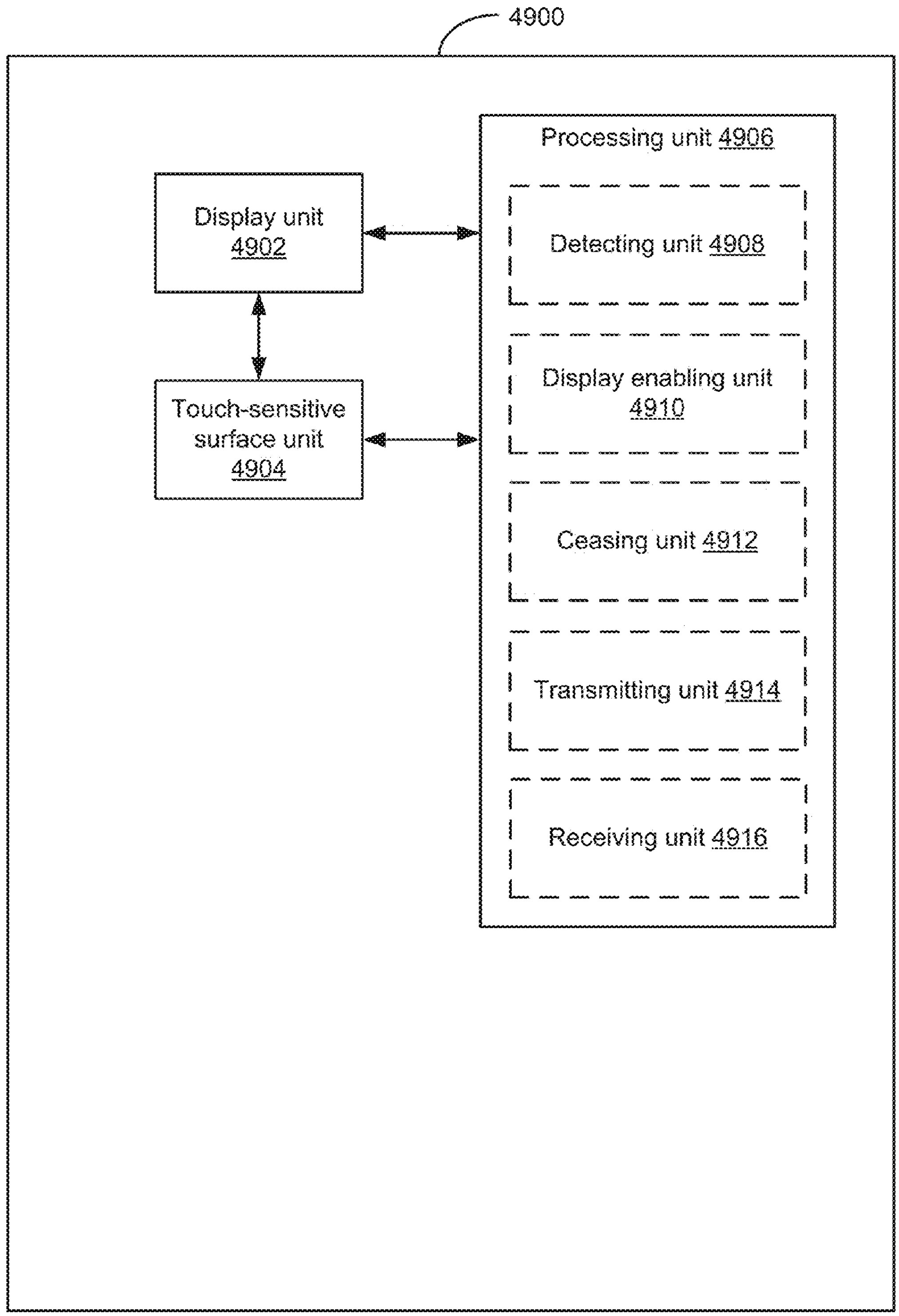
FIG. 49 is a functional block diagram of an electronic device in accordance with some embodiments.

In accordance with some embodiments, FIG. 49 shows a functional block diagram of an electronic device 4900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 49 may be combined or separated into sub-blocks to implement the principles of the invention as described above. Therefore, the description herein may support any possible combination or separation or further definition of the functional blocks described herein.

As shown in FIG. 49, an electronic device 4900 includes a display unit 4902 configured to display user interfaces; a touch-sensitive surface unit 4904 configured to detect contacts; and a processing unit 4906 coupled with the display unit 4902 and the touch-sensitive surface unit 4904. In some embodiments, the processing unit 4906 includes a detecting unit 4908, a display enabling unit 4910, a ceasing unit 4912, a transmitting unit 4914, and a receiving unit 4916.

The processing unit 4906 is configured to: enable display of a messaging user interface of a messaging application on the display unit 4902 (e.g., with the display enabling unit 4910), the messaging user interface including a conversation transcript of a messaging session between a user of the electronic device and at least one other user, a first message-input area, and a launch icon for an interactive application; while displaying the messaging user interface, detect an input that activates the launch icon for the interactive application (e.g., with the detecting unit 4908); in response to detecting the input that activates the launch icon for the interactive application, enable display of a user interface for the interactive application (e.g., with the display enabling unit 4910), the interactive application user interface including a second message-input area that is distinct from the first message-input area; while displaying the interactive application user interface, detect input of a first message in the second message-input area (e.g., with the detecting unit 4908); in response to detecting the input of the first message in the second message-input area, enable display of the first message in the second message-input area (e.g., with the display enabling unit 4910); while displaying the first message in the second message-input area, detect an input that corresponds to a request to post the contents of the second message-input area to the messaging session (e.g., with the detecting unit 4908); and, in response to detecting the input that corresponds to the request to post the contents of the second message-input area to the messaging session, transmit the first message to one or more electronic devices that correspond to the at least one other user included in the messaging session (e.g., with the transmitting unit 4914), wherein the one or more electronic devices display the first message in a conversation transcript corresponding to the messaging session.

In some embodiments, the processing unit 4906 is further configured to: after detecting the input that corresponds to the request to post the contents of the second message-input area to the messaging session, and while displaying the user interface for the interactive application, detect an input terminating the interactive application (e.g., with the detecting unit 4908); and, in response to detecting the input terminating the interactive application: cease to display the user interface for the interactive application (e.g., with the ceasing unit 4912), and enable display of the messaging user interface (e.g., with the display enabling unit 4910), the messaging user interface including display of the first message in the conversation transcript.

In some embodiments, the launch icon for the interactive application is concurrently displayed with a plurality of launch icons for other interactive applications in the messaging user interface.

In some embodiments, detecting the input that activates the launch icon for the interactive application includes: detecting a first input by a first contact at a location corresponding to the launch icon for the interactive application; in response to detecting the first input, displaying a menu that includes a plurality of options for how to run the interactive application; and detecting a second input that selects a first option in the plurality of options for how to run the interactive application.

In some embodiments, the user interface for the interactive application includes at least one avatar, each respective avatar in the at least one avatar corresponding to a user in the at least one other user included in the messaging session.

In some embodiments, the user interface for the interactive application includes a plurality of avatars displayed as a stack of avatars.

In some embodiments, the processing unit 4906 is further configured to: while displaying the interactive application user interface: detect a third input by a third contact at a location corresponding to an avatar within the user interface for the interactive application (e.g., with the detecting unit 4908); and, in response to detecting the third input, enable display of a menu of actions, that are associated with the avatar (e.g., with the display enabling unit 4910).

In some embodiments, the processing unit 4906 is further configured to: while displaying the user interface for the interactive application: receive a message associated with the messaging session (e.g., with the receiving unit 4916); and, in response to receiving the message associated with the messaging session, transiently enable display of the message overlaid on top of the user interface for the interactive application (e.g., with the display enabling unit 4910).

In some embodiments, the interactive application is configured to perform a subset of the functions of a corresponding application operated separate from the messaging application.

In some embodiments, the interactive application launch icon displays an identifier for a corresponding application operated separate from the messaging application.

In some embodiments, the interactive application displays a portion of the content displayed by a corresponding application operated separate from the messaging application.

In some embodiments, the interactive application causes the device to launch a corresponding application operated separate from the messaging application upon detection of a predefined input.

In some embodiments, the interactive application is operated separately from a corresponding application operated separate from the messaging application.

In some embodiments, the interactive application is operated in conjunction with a corresponding application operated separate from the messaging application.

In some embodiments, the interactive application has a dedicated portion of the memory for temporary storage that is different from a dedicated portion of the memory for temporary storage for a corresponding application operated separate from the messaging application.

In some embodiments, the corresponding application operated separate from the messaging application is configured to access the dedicated portion of memory for temporary storage for the interactive application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 48A-48D are, optionally, implemented by components depicted in FIGS. 1A-1B or FIG. 49. For example, detection operations 4808 and 4834 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 50A-50C are flow diagrams illustrating a method 5000 of using an interactive application in a messaging application in accordance with some embodiments. The method 5000 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 5000 are, optionally, combined and/or the order of some operations is, optionally, changed.

As described below, the method 5000 provides an intuitive way to use an interactive application in a messaging application. The method reduces the number, extent, and/or nature of the inputs from a user when using an interactive application in a messaging application, thereby creating a more efficient human-machine interface. For battery-operated electronic devices, enabling a user to use an interactive application in a messaging application faster and more efficiently conserves power and increases the time between battery charges.

The device displays (5002) a messaging user interface of a messaging application on the display, the messaging user interface including a conversation transcript (e.g., displayed in a first area of the display) of a messaging session between a user of the electronic device and at least one other user (e.g., of another electronic device), a message-input area, and an icon for an interactive application ("interactive application icon" or "interactive application object") that is displayed within the conversation transcript.

As used herein, "interactive application icon" and "interactive application object" are used interchangeably to refer to an item, displayed in a conversation transcript of a messaging session, which is associated with an interactive application in a messaging application, and specifically with a session of the interactive application initiated within the messaging session. When activated in a messaging session, the interactive application object causes launch of a user interface for the associated interactive application, and specifically for the session of the interactive application initiated within the messaging session.

For example, messaging user interface 3500 in FIG. 37K includes conversation transcript 3700, message-input area 3502, and icon (e.g., object) 3728 corresponding to an interactive reservations application. Icon 3728 includes identifier 3730, representing that the icon is associated with the interactive reservations application. Icon 3728 also includes information about content input into the associated session of the interactive application, for example, that a reservation was made for two people at 6:45 PM at Joe's Bistro, serving American Fare.

As another example, messaging user interface 3500 in FIG. 37BI includes conversation transcript 3700, message-input area 3502, and icon (e.g., object) 3705 corresponding to an interactive tic-tac-toe application. Icon 3502 includes an identifying image of a tic-tac-toe board with an X and an O that were entered by users in the messaging session.

As another example, messaging user interface 3500 in FIG. 37CT includes conversation transcript 3700, message-input area 3502, and icon (e.g., object) 3735 corresponding to an interactive pizza ordering application. Icon 3502 does not include identifying information about the interactive application, but does include information about inputs made in the associated session of the interactive application, namely that pepperoni was added to the pizza being designed.

In some embodiments, further information about the state of the associated application or session of the interactive application is displayed proximal to an interactive application icon/object. For example, in FIG. 37BF, additional information 3795 is displayed below icon 3705, indicating that the corresponding interactive tic-tac-toe application is not stored in memory of device 100-2. In another example, in FIG. 37CS, additional information 3797 is displayed below icon 3735, indicating that Abe added pepperoni to the pizza being designed in the session of the interactive pizza ordering application associated with icon 3735 (e.g., the last change made with in the session of the application).

In some embodiments, no further information about the state of the associated application or session of the interactive application is displayed proximal to an interactive application icon/object. For example, in FIG. 37K, no additional information about the state of the associated application of session of the interactive application is displayed proximal to interactive application icon 3728.

In some embodiments, an interactive application launch icon displays (5004) an identifier for a corresponding application operated separate from the messaging application. In some embodiments interactive application icons/objects function as application launch icons by enabling launch of a user interface for the interactive application associated with the application icon/object. For example, upon activation of interactive application icon 3728, by an input including contact 3738 in FIG. 37P, device 100-2 displays user interface 3712 for the corresponding interactive reservations application in FIG. 37Q. The display of icon 3728 includes identifier 3730 for a corresponding reservations application operated separate from the messaging application.

While displaying the messaging user interface, the device detects (5006) an input that activates the icon for the interactive application. In some embodiments, the input is a tap gesture on the icon. For example, device 100-2 detects an input including contact 3738 on icon 3728 for an interactive reservations application, in FIG. 37P. As another example, device 100-2 detects an input including contact 3711 on icon 3705 for an interactive tic-tac-toe application, in FIG. 37BJ. As another example, device 100-1 detects an input including contact 3765 on icon 3735 for an interactive pizza ordering application, in FIG. 37CZ.

In response to detecting the input that activates the icon for the interactive application, the device displays (5008) a user interface for the interactive application ("interactive application user interface") in a first state. For example, device 100-2 displays user interface 3712 for an interactive reservations application in a first state that includes display of a 6:45 PM reservation for 2 people at Joe's Bistro, in FIG. 37Q. As another example, device 100-2 displays user interface 3782 for an interactive tic-tac-toe application in a first state that includes display of an 'O' in the center square of tic-tac-toe board 7391 and display of no 'X' on tic-tac-toe board 3791, in FIG. 37BK. As another example, device 100-1 displays a non-contiguous user interface for an interactive pizza ordering application, including application input area 3731 and application object 3735 in a first state that includes display of pepperoni on the pizza displayed in application object 3735. In some embodiments, the output display of an interactive application (e.g., the pizza displayed in application object 3735 in FIG. 37DA) is also included in an application input area (e.g., the pizza could be displayed in a corner of input area 3731 in FIG. 37DA.

In some embodiments, the interactive application user interface is displayed over at least a portion of the messaging user interface. For example, user interface 3782 for an interactive tic-tac-toe application is displayed over a portion of messaging user interface 3500 in FIG. 37BK.

In some embodiments, the interactive application user interface replaces display of the messaging user interface. For example, user interface 3712 for an interactive reservations application in FIG. 37Q replaces display of messaging user interface in FIG. 37P.

In some embodiments, the interactive application user interface is displayed within the message transcript. For example, pizza application object 3735, displayed within transcript 3700 in FIG. 37CA, is a non-contiguous portion of the user interface for an interactive pizza ordering application, because it displays a current status of the pizza being ordered.

In some embodiments, the interactive application displays (5010) a portion (e.g., less than all) of the content displayed by a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application causes (5012) the device to launch a corresponding application operated separate from the messaging application upon detection of a predefined input. For example, in response to a first input (e.g., a tap, press, deep press, long-press, or multi-finger gesture) on interactive reservations application icon 3728 in FIG. 37P, the device launches the interactive reservations application within the messaging application. In response to a second, different input (e.g., a different one of a tap, press, deep press, long-press, or multi-finger gesture) on interactive reservations application icon 3728 in FIG. 37P, the device launches a reservations application outside of the messaging application.

In some embodiments, the interactive application is operated (5014) separately from a corresponding application operated separate from the messaging application. For example, the interactive reservations application launched in response to activation of icon 3728 in FIG. 37P is operable when a corresponding reservations application operated outside of the messaging application is not running.

In some embodiments, the interactive application is operated (5016) in conjunction with a corresponding application operated separate from the messaging application. For example, the interactive reservations application launched in response to activation of icon 3728 in FIG. 37P is not operable when a corresponding reservations application operated outside of the messaging application is not running.

In some embodiments, the interactive application has a dedicated portion of the memory for temporary storage (5018) that is different from a dedicated portion of the memory for temporary storage for a corresponding application operated separate from the messaging application. For example, in some embodiments, records of reservations made using the interactive reservations application launched in response to activation of icon 3728 in FIG. 37P and operated within the messaging application are stored in a different portion of memory than records of reservations made using a corresponding reservations application operated outside of the messaging application.

In some embodiments, the corresponding application operated separate from the messaging application is configured to access the dedicated portion of memory for temporary storage for the interactive application. For example, in some embodiments, the corresponding reservations application operated outside of the messaging application can access the records of reservations made using the interactive reservations application launched in response to activation of icon 3728 in FIG. 37P and operated within the messaging application.

While displaying the user interface for the interactive application, the device detects (5022) a first user input within the user interface for the interactive application. For example, device 100-2 detects an input in interactive reservations user interface 3712 including contacts 3752 in FIG. 37X and 3754 in FIG. 37Z. As another example, device 100-2 detects an input in interactive tic-tac-toe application user interface 3782 including contact 3713 in FIG. 37BL. As another example, device 100-1 detects an input in interactive pizza ordering application user interface 3731 (e.g., application input area 3731) including contacts 3767 in FIG. 37DB and 3769 in FIG. 37DD.

In response to detecting (or after detecting) the first user input within the user interface for the interactive application, the device (5023) changes display of the user interface for the interactive application from the first state to a second state (e.g., placing a second "O" on a tic-tac-toe board) and sends information (e.g., a meta-message, instructions, a representation of an indicia of the input), to the one or more (e.g., second) electronic devices that correspond to the at least one other user included in the messaging session, indicating that the first user input was made in the user interface for the interactive application, wherein the one or more electronic devices display an indicia of the first user input (e.g., indicate that the first user input was made).

For example, device 100-2 changes the time of the reservation from 6:45 PM to 8:00 PM in input affordance 3740-1 of interactive reservations application user interface 3712 in FIG. 37AA. Device 100-2 also sends information, at 9:31 AM, to device 100-1 that the time of the reservation was changed. In response to receiving the information at 9:31 AM, device 100-1 indicates the change in the state of the session of the interactive reservations application by moving display of application icon (e.g., object) 3728 in conversation transcript 3700 from position **3728-*a* in FIG. 37AK to position 3728-*b* in FIG. 37AL and by changing the time of the reservation displayed within application icon 3728 from 6:45 PM in FIG. 37AK to 8:00 PM in FIG. 37**AL.

In another example, device 100-2 places 'X' 3794 in the upper-right corner of tic-tac-toe board 3791 displayed in interactive tic-tac-toe application user interface 3782 in FIG. 37BM. Device 100-2 also sends information, at 9:35 AM, to device 100-1 that the 'X' was placed on tic-tac-toe board 3791. In response to receiving the information at 9:35 AM, device 100-1 indicates the change in the state of the session of the interactive tic-tac-toe application by displaying 'X' 3794 in the upper-right corner of tic-tac-toe board 3791 in FIG. 37AZ, by moving display of application icon (e.g., object) 3786 in conversation transcript 3700 from position **3786-*a* in FIG. 37AY to position 3784-*b* in FIG. 37AZ, and by displaying additional information 3795 "Your turn," in conversation transcript 3700, immediately below application icon 3786, in FIG. 37**AZ.

In another example, device 100-1 displays mushrooms on the pizza displayed in application object 3735 in FIG. 37DE. Device 100-1 also sends information, at 9:42 AM, to device 100-2 that mushrooms were added to the pizza. In response to receiving the information at 9:42 AM, device 100-2 indicates the change in the state of the session of the interactive pizza ordering application by displaying mushrooms on application object (e.g. icon) 3735 in FIG. 37CL and by changing additional information 3797 below application object 3735 from "you added pepperoni" in FIG. 37CK to "Andrew added mushrooms" in FIG. 37 CL.

In some embodiments, the information indicating that the first user input was made in the user interface for the interactive application includes (5024) information that causes movement of a corresponding icon for the interactive application within (e.g., to the end of and/or to an opposite side of) a conversation transcript corresponding to the messaging session.

For example, an interactive application icon is placed at a particular place in a conversation transcript according to when it was first opened in (e.g., posted to) the messaging session. Thereafter, the interactive application icon is moved to the end of the transcript when a device corresponding to a user included in the messaging session changes the state of the session of the interactive application.

For example, information sent to device 100-1 causes the device to move display of application icon (e.g., object) 3728 in conversation transcript 3700 from position **3728-*a* in FIG. 37AK to position 3728-*b* in FIG. 37**AL.

In another example, information sent to device 100-1 causes the device to move display of application icon (e.g., object) 3786 in conversation transcript 3700 from position **3786-*a* in FIG. 37AY to position 3784-*b* in FIG. 37**AZ.

In some embodiments, the information indicating that the first user input was made in the user interface for the interactive application includes (5026) information that causes movement of a corresponding icon for the interactive application from a first side of a conversation transcript corresponding to the messaging session to a second side of the conversation transcript For example, an icon for an interactive application moves from the right side of the transcript to the left side of the transcript, to indicate that another user included in the messaging session (e.g., a device corresponding to another user) made a last input in the associated session of the interactive application (e.g., took a turn within the interactive application shared within the messaging session). In some embodiments, the information causes the one or more devices to move the icon only where the icon was already displayed on the first side (e.g., the side indicating that a post was made by the user of the electronic device, for example, the right side of conversation transcripts 3503 and 3700 displayed in messaging application user interface 3500) (e.g., a condition precedent must be met for a device in the one or more devices to move the application object). Otherwise, where the application object was already displayed on the second side of the conversation transcript when the information was received, the device maintains display of the application object on the second side upon receiving the information (e.g., instructions).

For example, information sent to device 100-1 causes the device to move display of application icon (e.g., object) 3728 in conversation transcript 3700 from position **3728-*a*, on the right side of conversation transcript 3700, in FIG. 37AK to position 3728-*b*, on the left side of conversation transcript 3700, in FIG. 37**AL.

In another example, information sent to device 100-1 causes the device to move display of application icon (e.g., object) 3786 in conversation transcript 3700 from position **3786-*a*, on the right side of conversation transcript 3700, in FIG. 37AY to position 3784-*b*, on the left side of conversation transcript 3700, in FIG. 37**AZ.

In some embodiments, when the application icon/object is moved from a first to a second temporal location within the conversation transcript (e.g., to represent that a new input was received within the session of the corresponding interactive application), an archiving icon/object is placed in the conversation transcript at the first temporal location, to memorialize the previous input that caused the application icon/object to be displayed at the first location.

For example, device 100-1 receives information, at 9:31 AM that the time of a reservation was changed by device 100-2. In response, the device moves interactive reservations application icon/object 3728 from position 3728-*a*, corresponding to a first temporal location in transcript 3700 in FIG. 37AK, to position 3728-*b*, corresponding to a second temporal location in transcript 3700 in FIG. 37AL. To memorialize that the reservation was first made at a time corresponding to the first temporal location position in transcript 3700 (e.g., position 3728-*b*), device 100-1 displays interactive reservations application archiving icon/object 3756, including information on the input made at the first time (e.g., that a reservation was made/suggested for 6:45 PM) and an symbol identifying the corresponding interactive application (e.g., the concentric circle symbol corresponding to the interactive reservations application). In some embodiments, the interactive application archiving icon/object includes only one of text describing the input and an application symbol. In some embodiments, the interactive application archiving icon/object includes both text describing the input and an application symbol In some embodiments, when an interactive application archiving icon/object is activated, additional information on the input associated with that time is displayed. In some embodiments, the information is displayed by opening a user interface for the interactive application in a state corresponding to the state of the session of the interactive application at the time the input was made (e.g., showing a particular tic-tac-toe move made at that time). In some embodiments, the information is displayed within or over the conversation transcript (e.g., as an expansion of the interactive application archiving icon/object or as a pop-up area displayed over/within the messaging user interface (e.g., over at least a portion of the conversation transcript).

In some embodiments, where messages posted to the conversation by the user and other participants of the messaging session are displayed on opposite sides of the display, the icon is always displayed on the side corresponding to the user that made the last input (e.g., wherein display of the interactive application icon at the first side of the conversation transcript indicates that a user of the electronic device made a last input in the interactive application user interface, and display of the interactive application icon at the second side of the conversation transcript indicates that another user included in the messaging session made a last input in the interactive application user interface).

In some embodiments, where the interactive application is a turn-based application, the icon for the interactive application is always displayed on the side of the transcript corresponding to the user whose turn it is to make an input (e.g., wherein display of the interactive application icon at the first side of the conversation transcript indicates that it is another user included in the messaging session's turn to make an input, and display of the interactive application launch icon at the second side of the conversation transcript indicates that it is the user's turn to make an input.

In some embodiments, the information indicating that the first user input was made in the user interface for the interactive application includes (5028) information that causes display of text, indicating the first user input was made, below (or above, next to, near, or proximate to), a corresponding icon for the interactive application within a conversation transcript corresponding to the messaging session.

For example, information sent to device 100-1 causes the device to display additional information 3795 "Your turn," in conversation transcript 3700, below (e.g., directly below) application icon 3786, in FIG. 37AZ.

For example, information sent to device 100-2 causes the device to display additional information 3797 "Andrew added mushrooms" below (e.g., directly below) application object 3735 in FIG. 37 CL.

In some embodiments, displaying text includes changing (e.g., updating) text displayed near the application object prior to receiving the information. For example, information sent to device 100-2 causes the device to update additional information 3797 displayed below (e.g., directly below) application object 3735 from "You added pepperoni" in FIG. 37CK to "Andrew added mushrooms" in FIG. 37 CL.

In some embodiments, the text indicates to the user that it is their turn to make a user input (e.g., "Your turn to play") or that it is another user's turn to make an input (e.g., "Abe's turn to play). In some embodiments, the text indicates the name of the user who made the user input (e.g., "Abe played an 'X'," or "Andrew changed the reservation").

In some embodiments, the information indicating that the first user input was made in the user interface for the interactive application includes (5030) information that causes change of the appearance of a corresponding icon for the interactive application.

For example, information sent to device 100-2 causes the device to change the time of the reservation displayed within application icon 3728 from 6:45 PM in FIG. 37AK to 8:00 PM in FIG. 37AL.

In another example, information sent to device 100-1 causes the device to display mushrooms on application object (e.g. icon) 3735 in FIG. 37CL.

In some embodiments, the information indicating that the first user input was made in the user interface for the interactive application includes (5032) information that causes change of display of a corresponding user interface for the interactive application from a first state to a second state.

In some embodiments, where a corresponding interactive user interface is being displayed on another device when the first user makes an input (e.g., when the other device receives the information that the first user makes an input), the display of the other user is updated in real-time (e.g., an 'X' is placed on the tic-tac-toe board of the second user in real-time).

Figure 37Y:
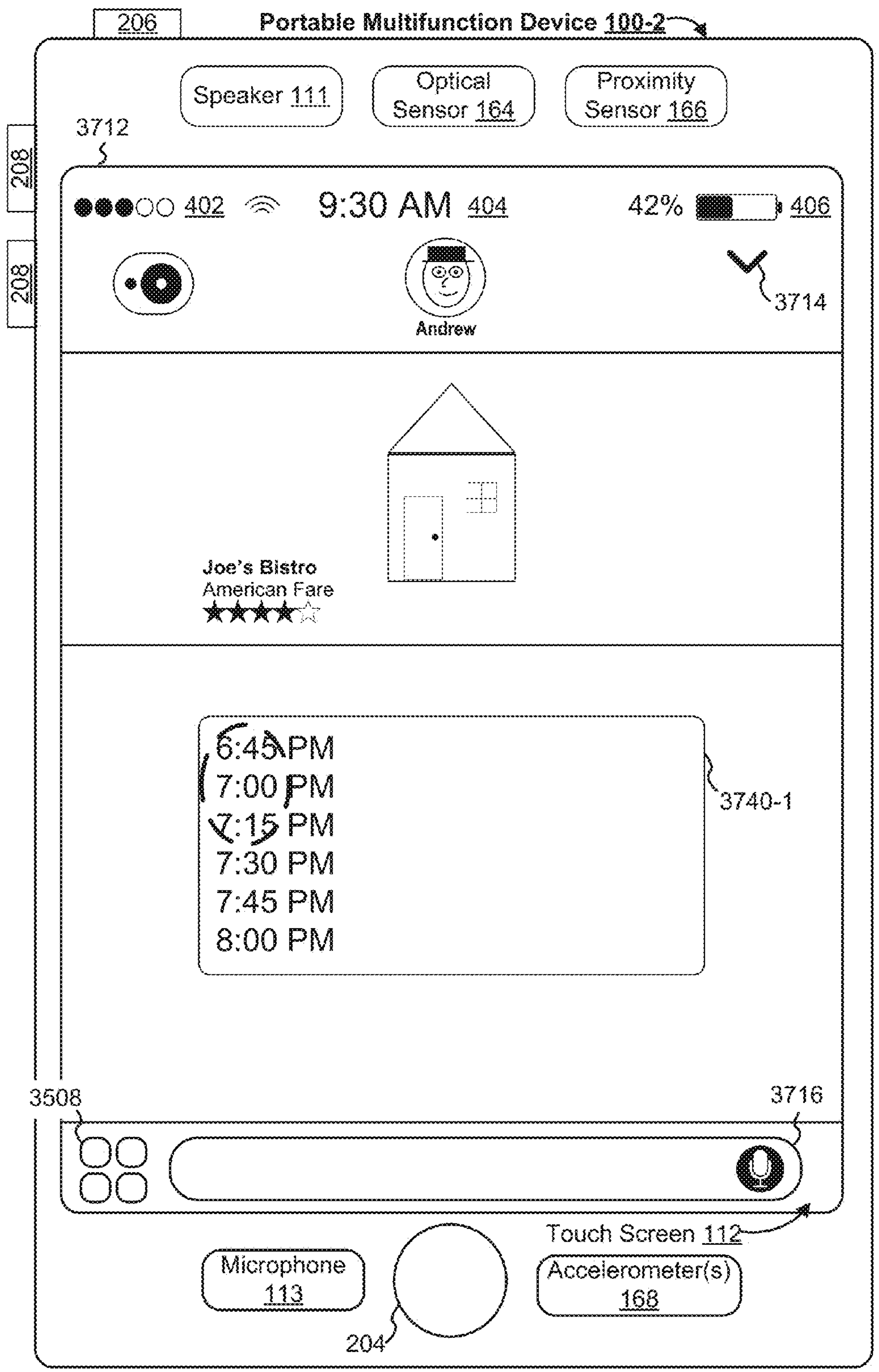
Figure 37Z:
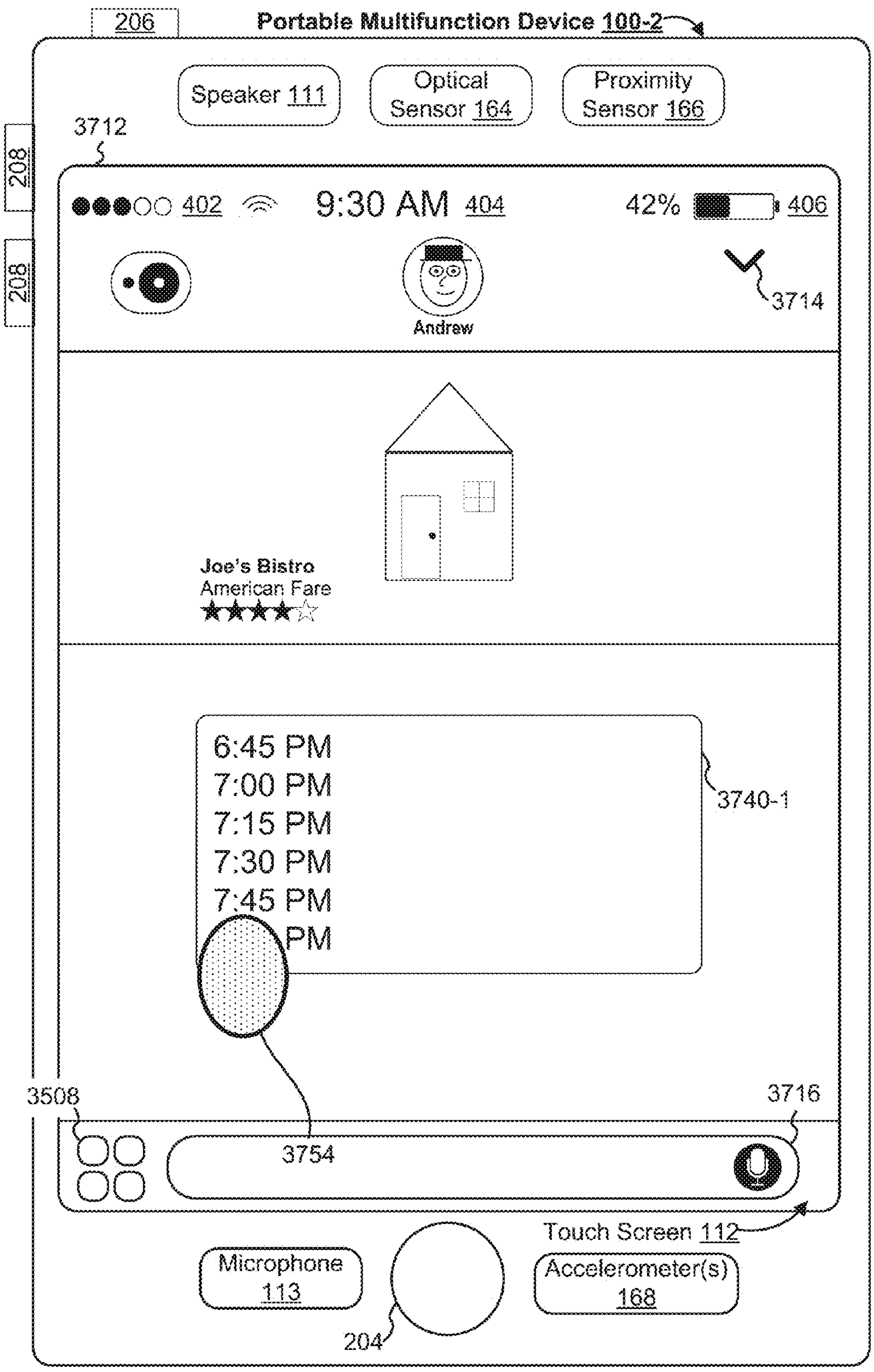
Figure 37A:
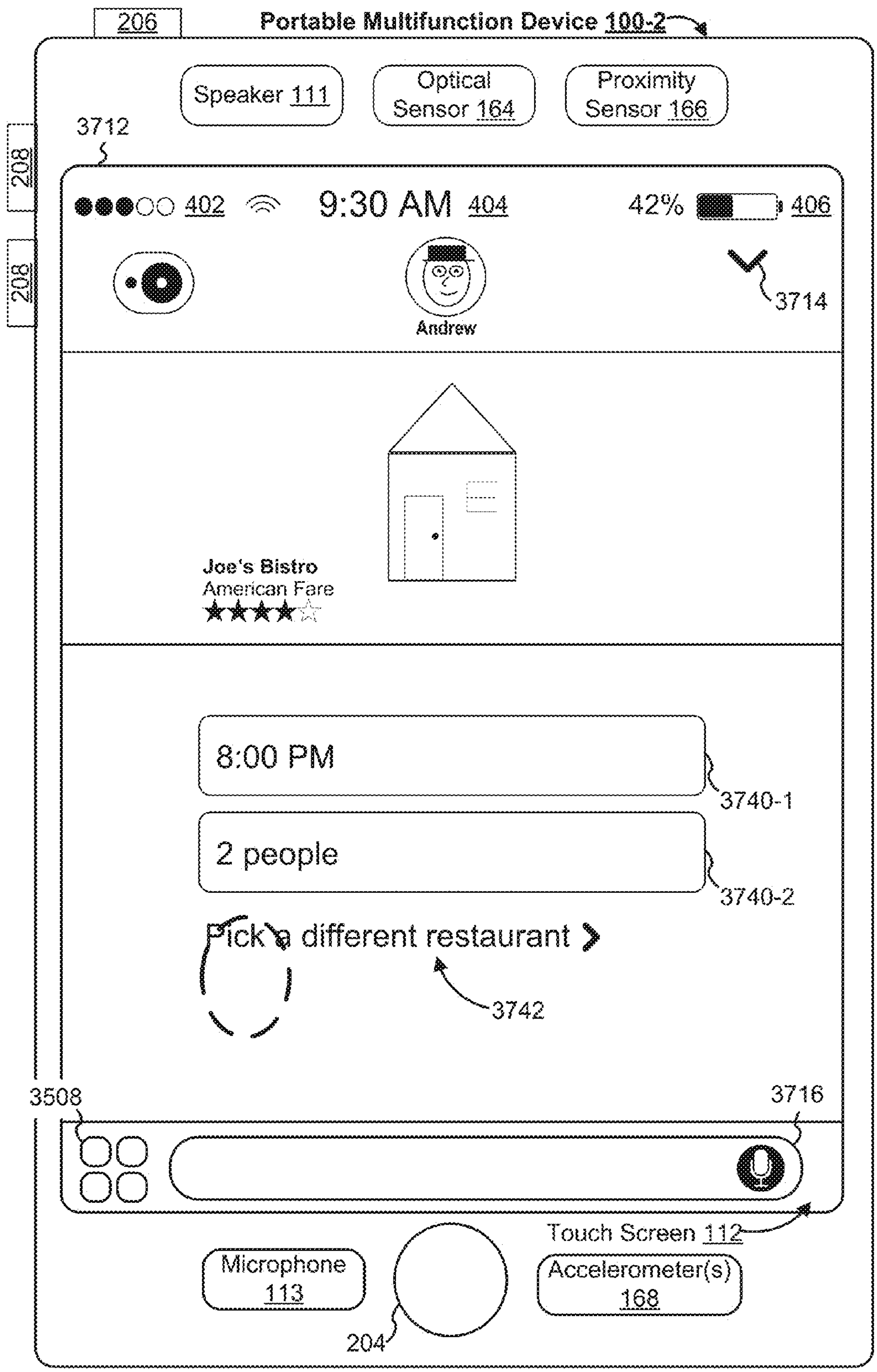
Figure 37A:
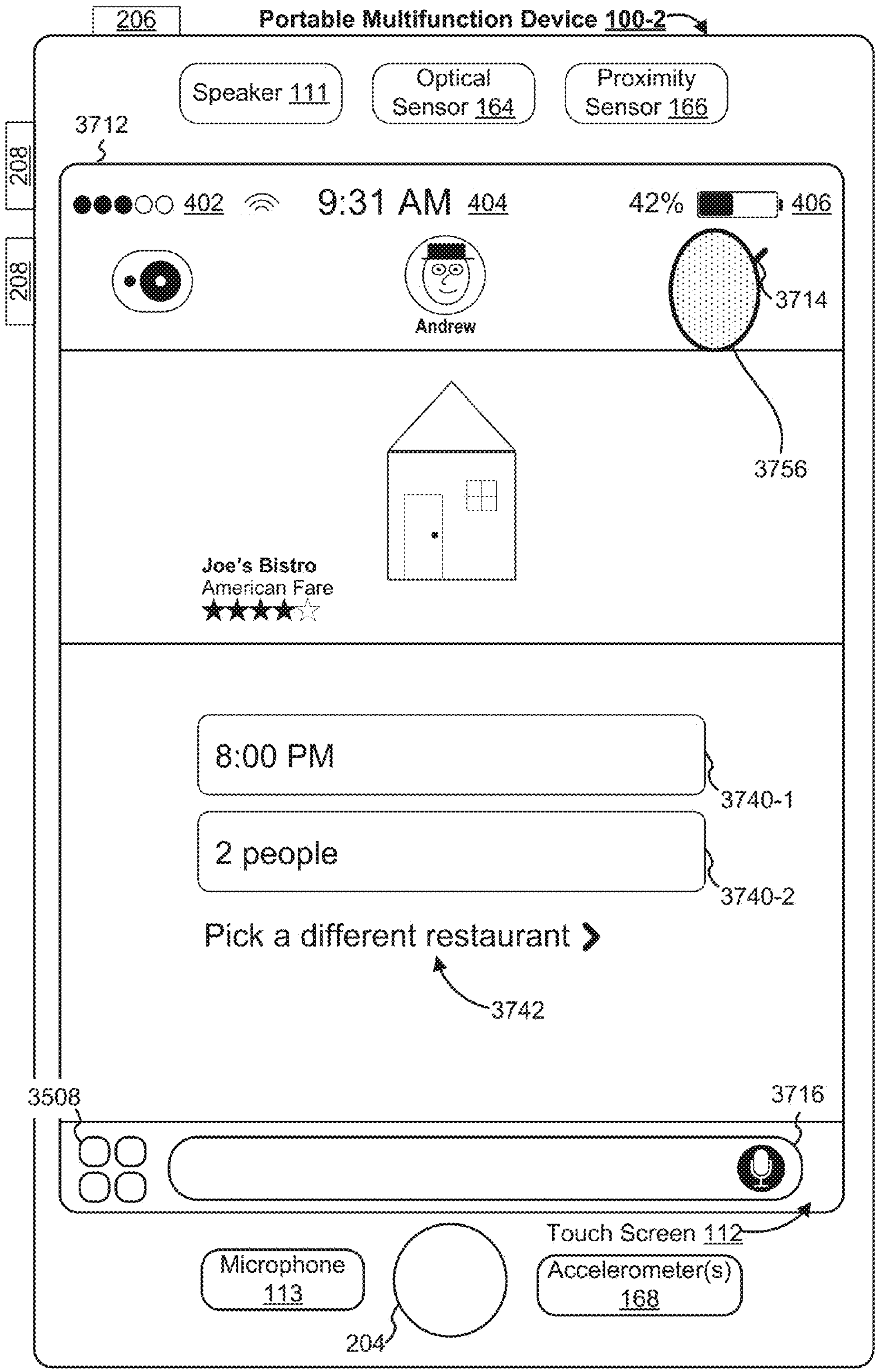
Figure 37A:
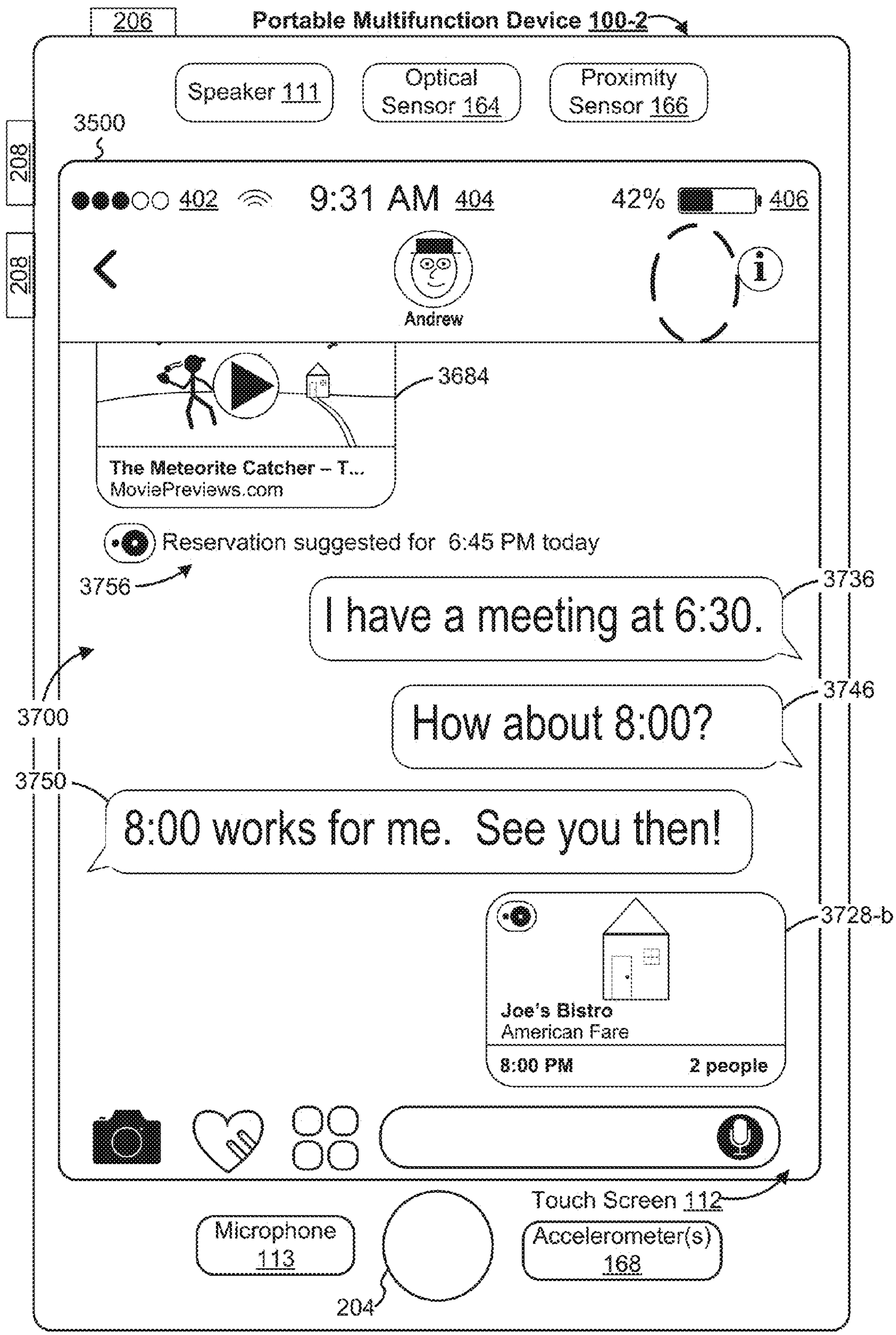
Figure 37A:
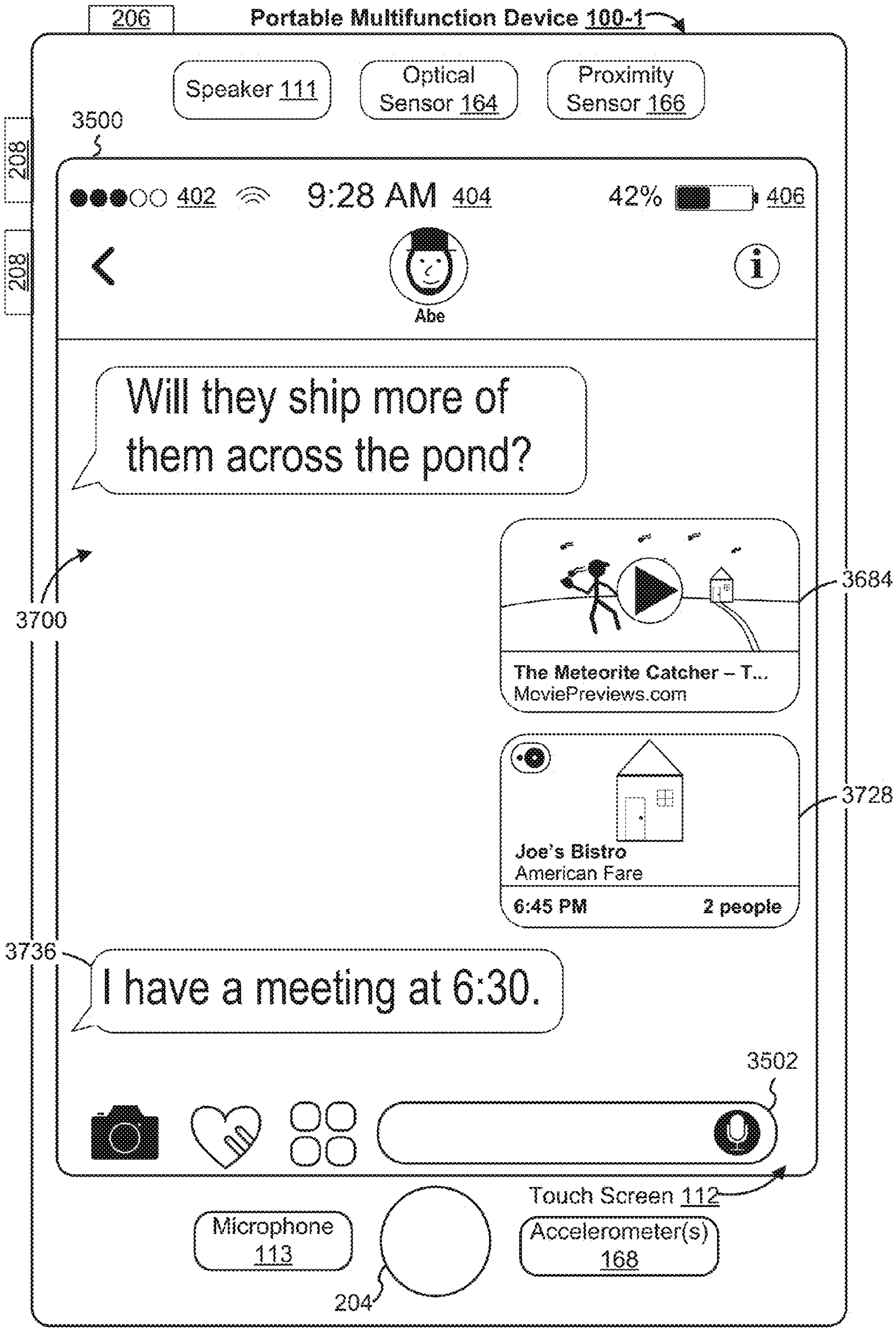
Figure 37A:
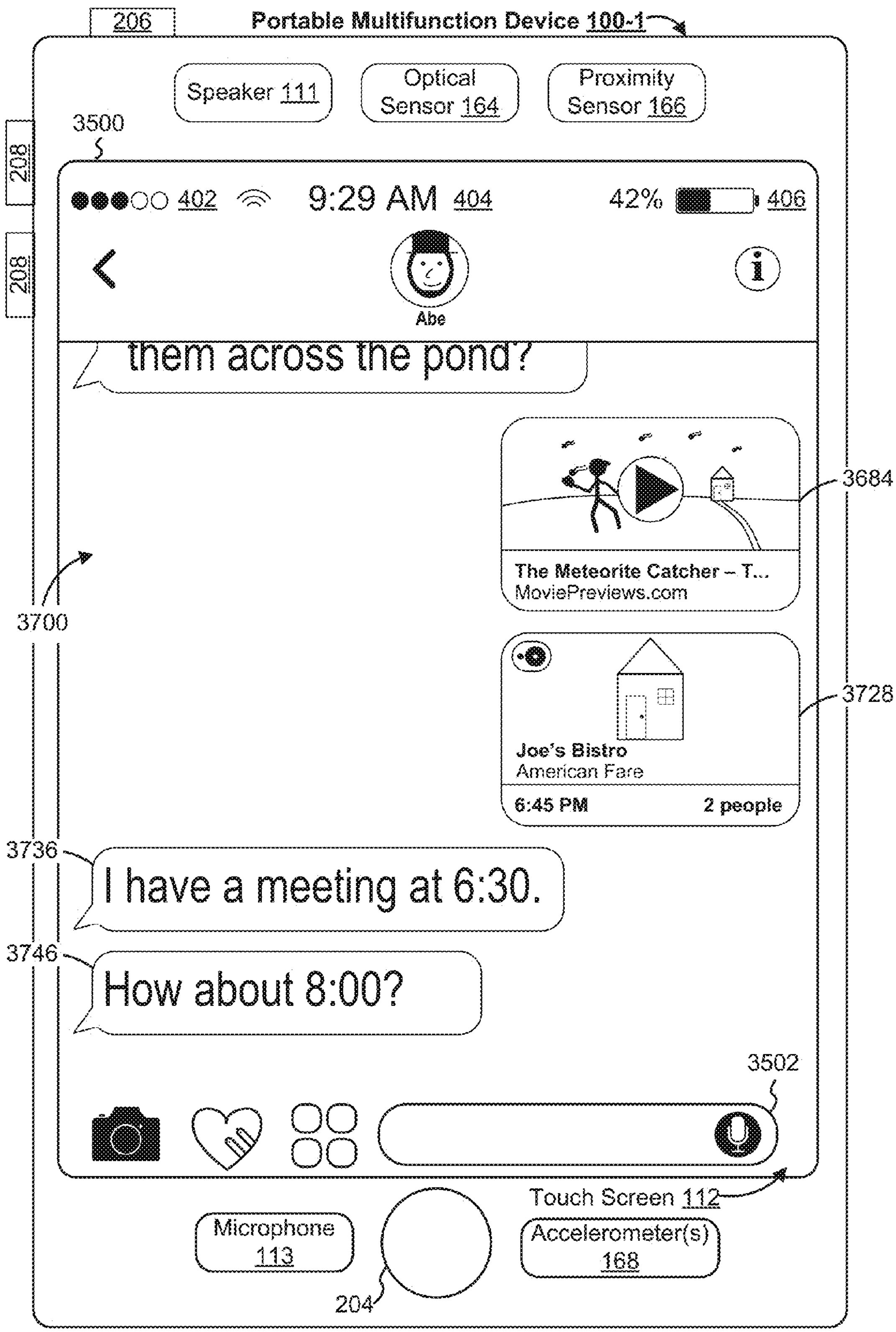
Figure 37A:
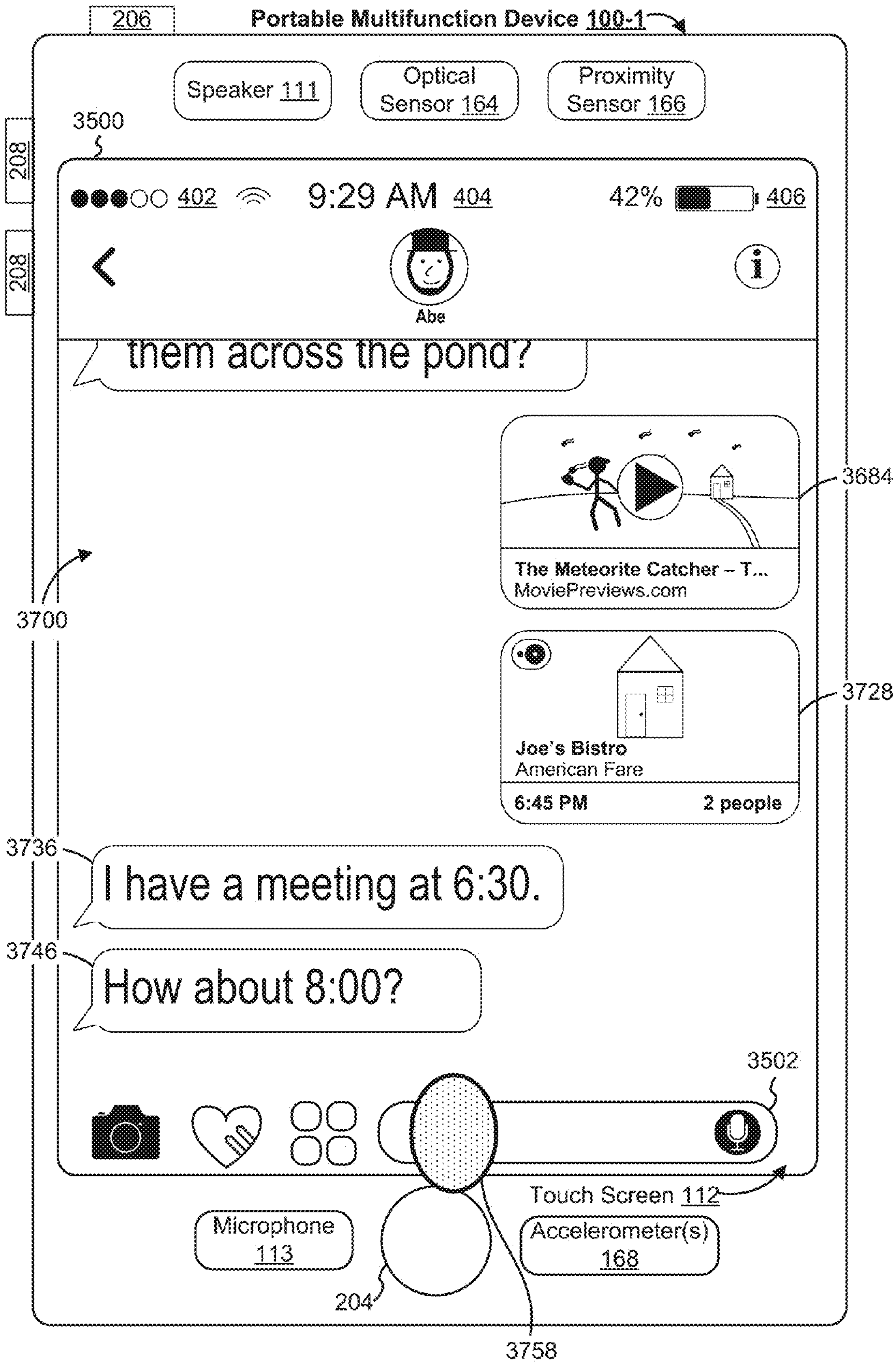
Figure 37A:
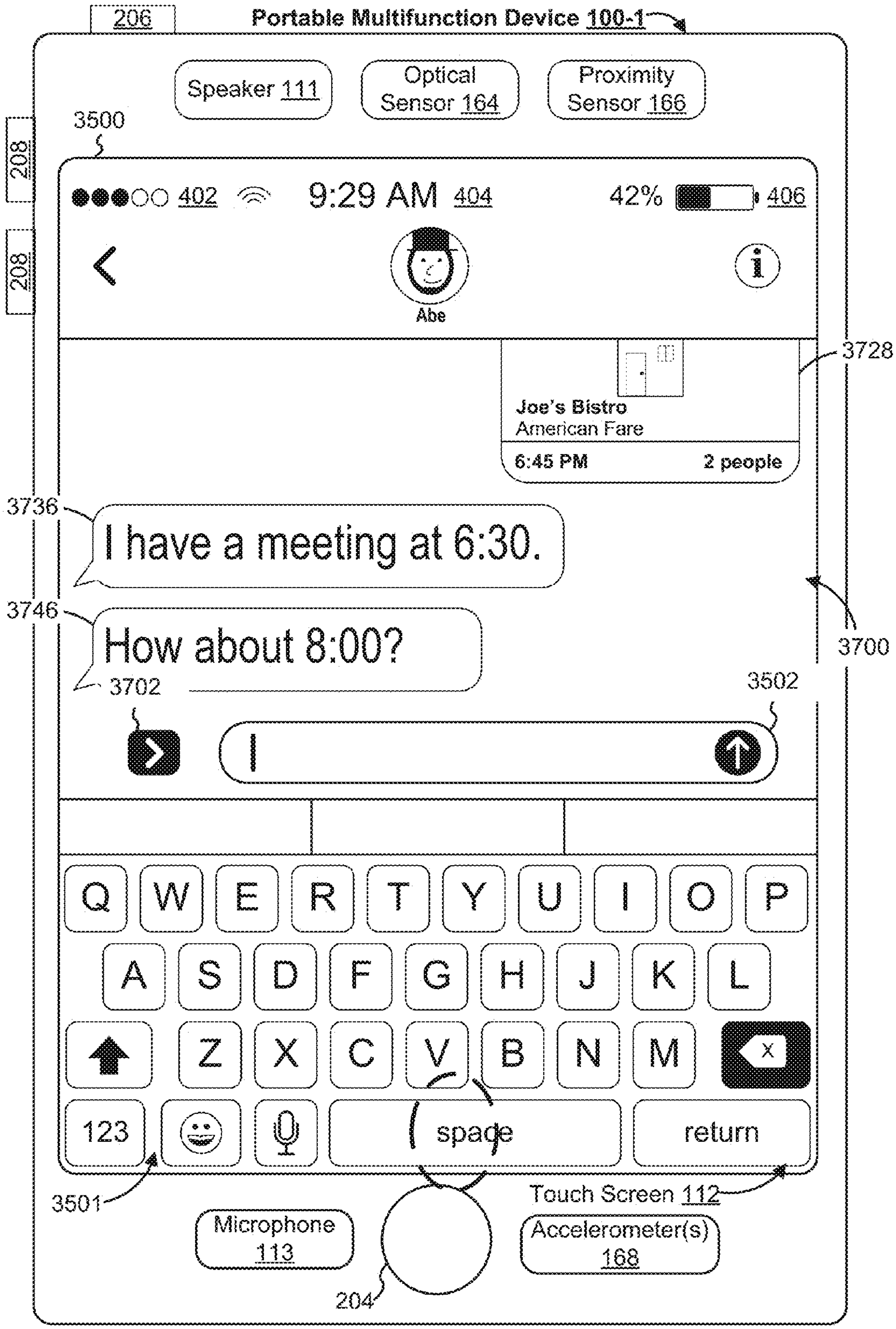
Figure 37A:
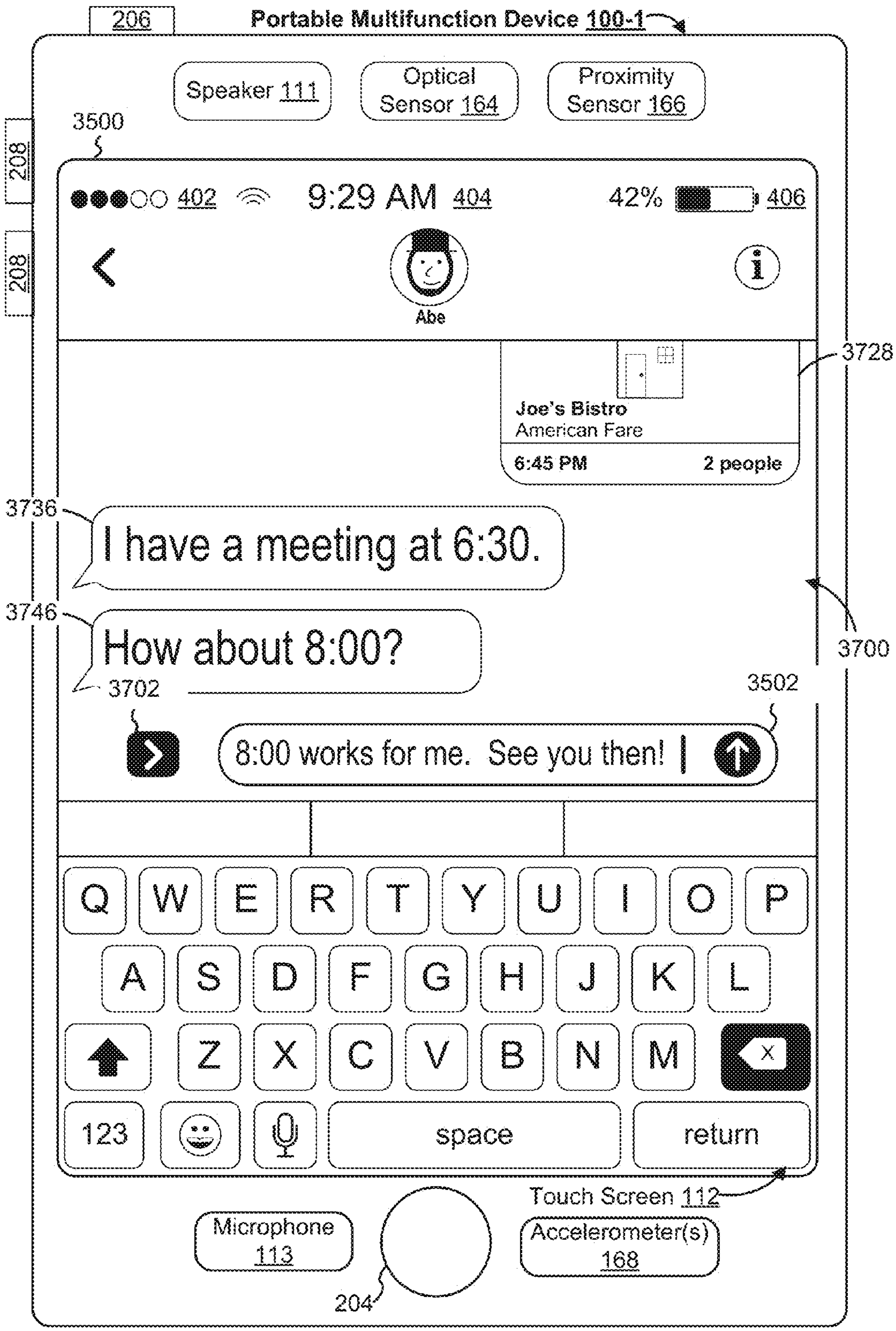
Figure 37A:
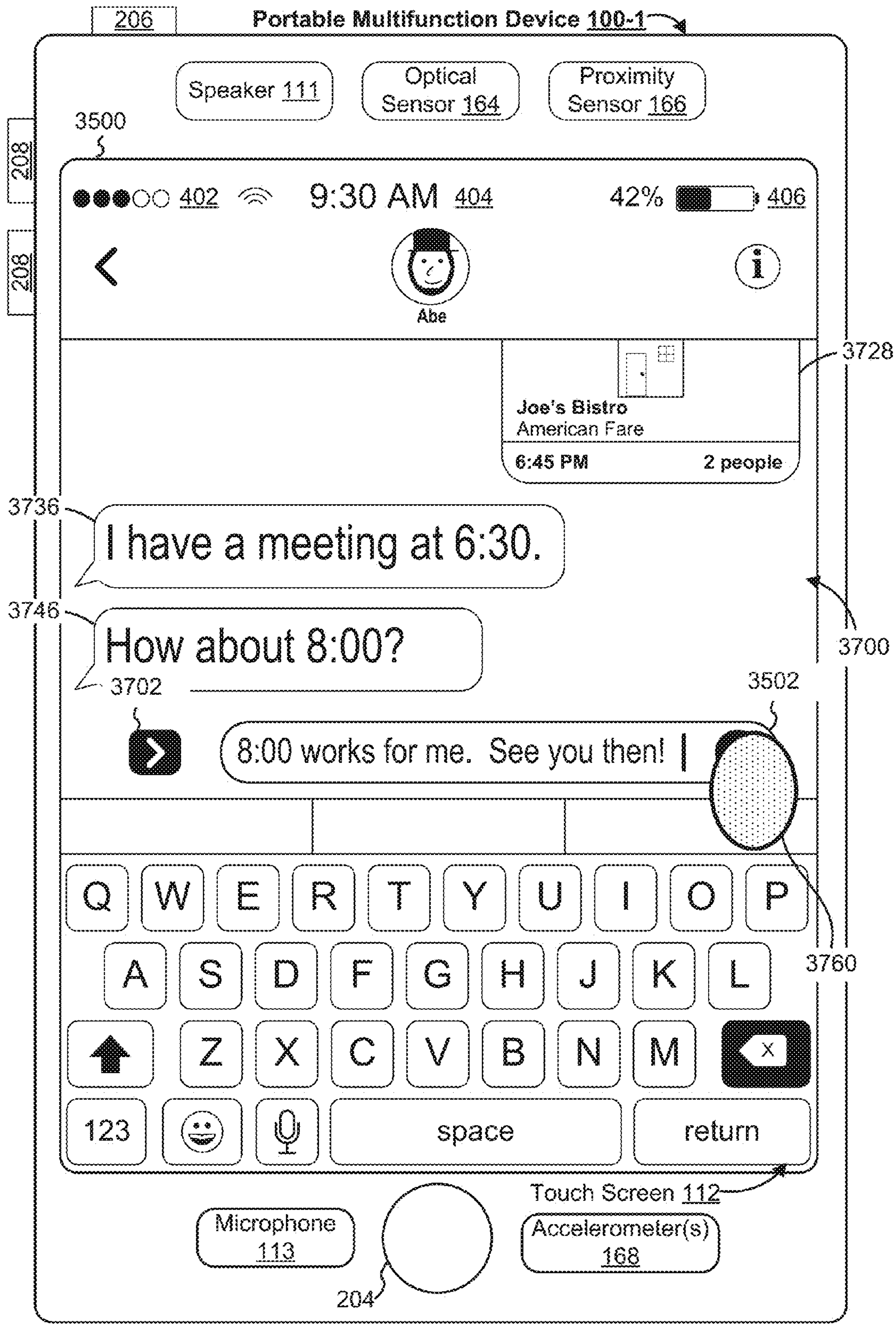
Figure 37A:
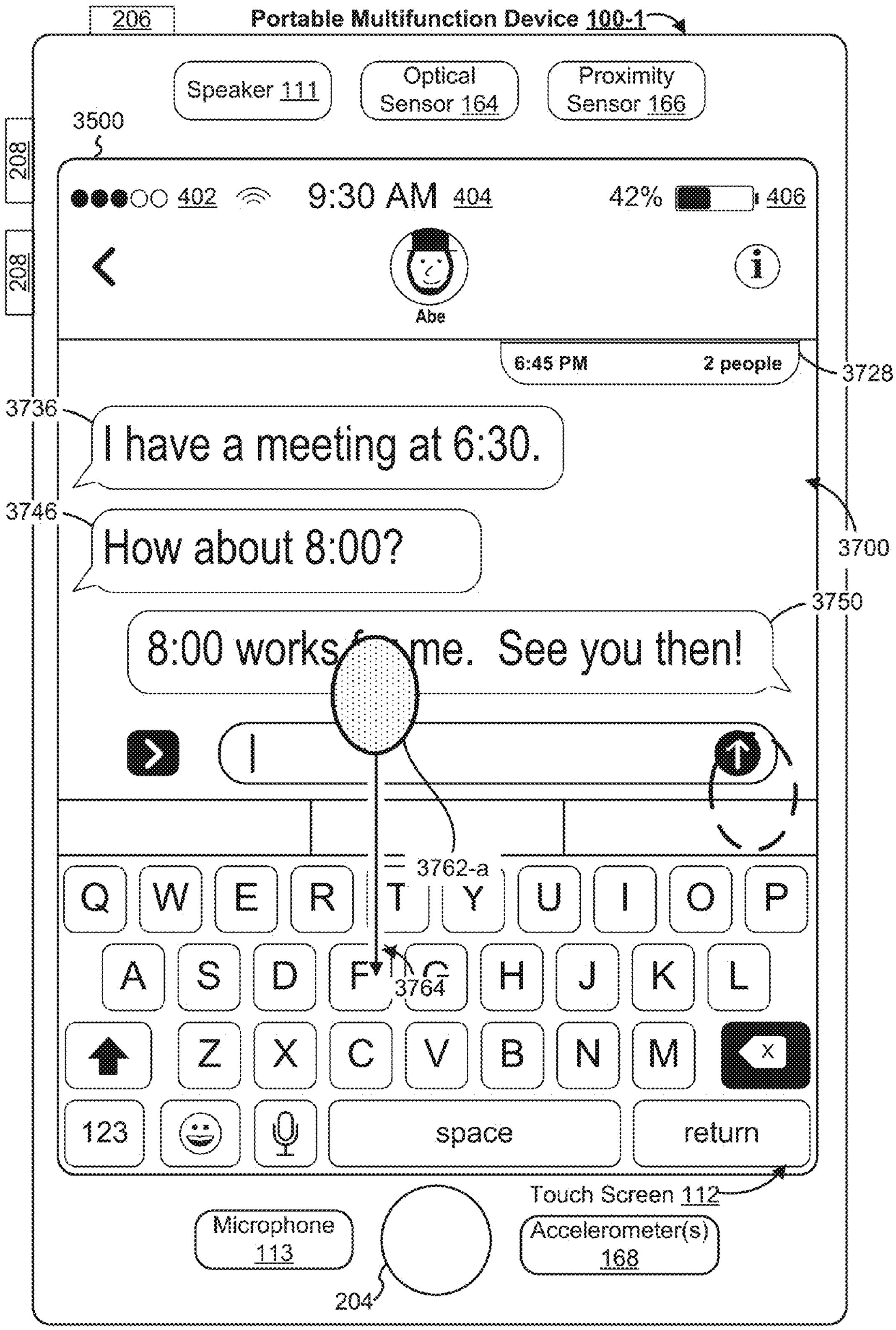
Figure 37A:
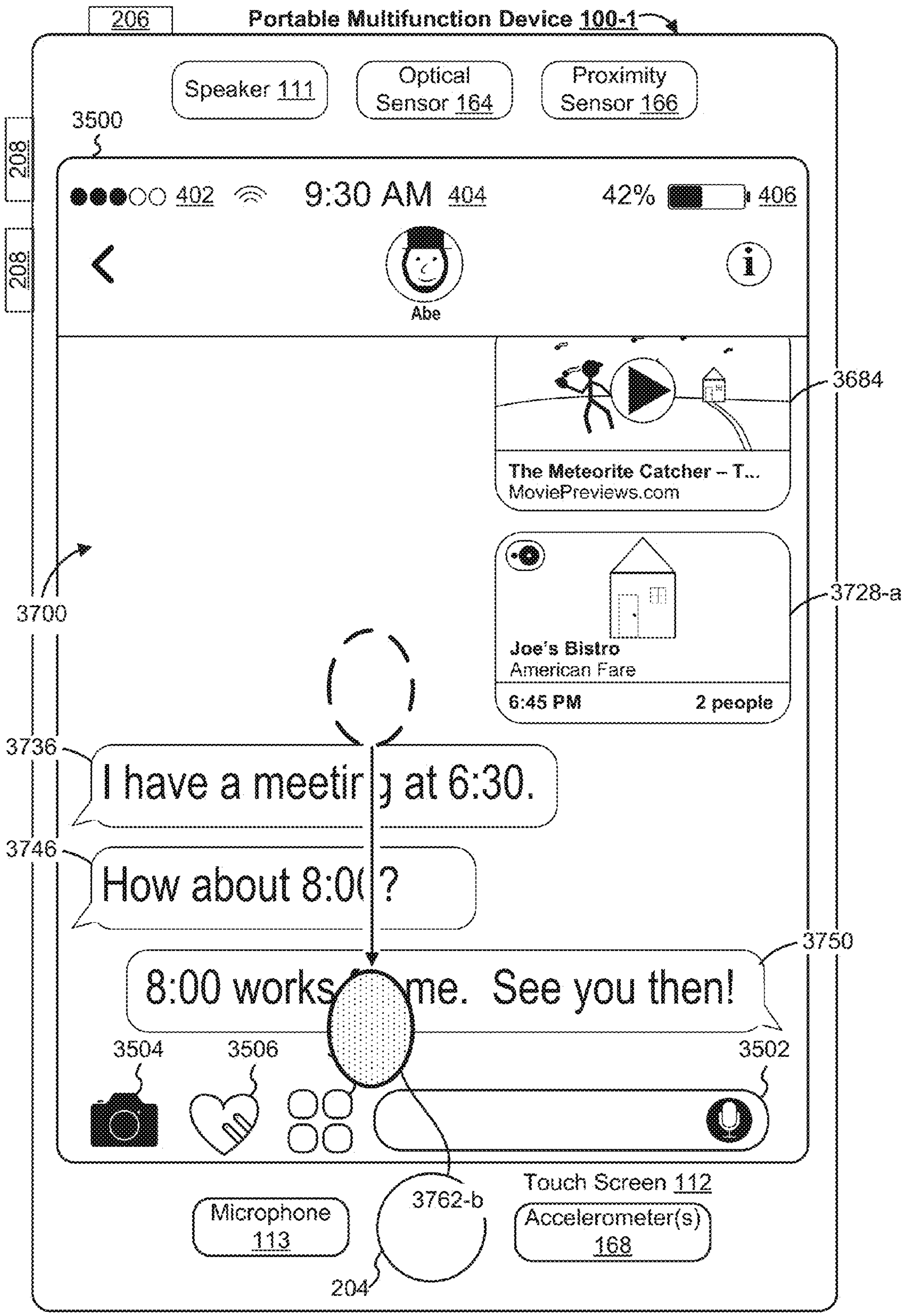
Figure 37A:
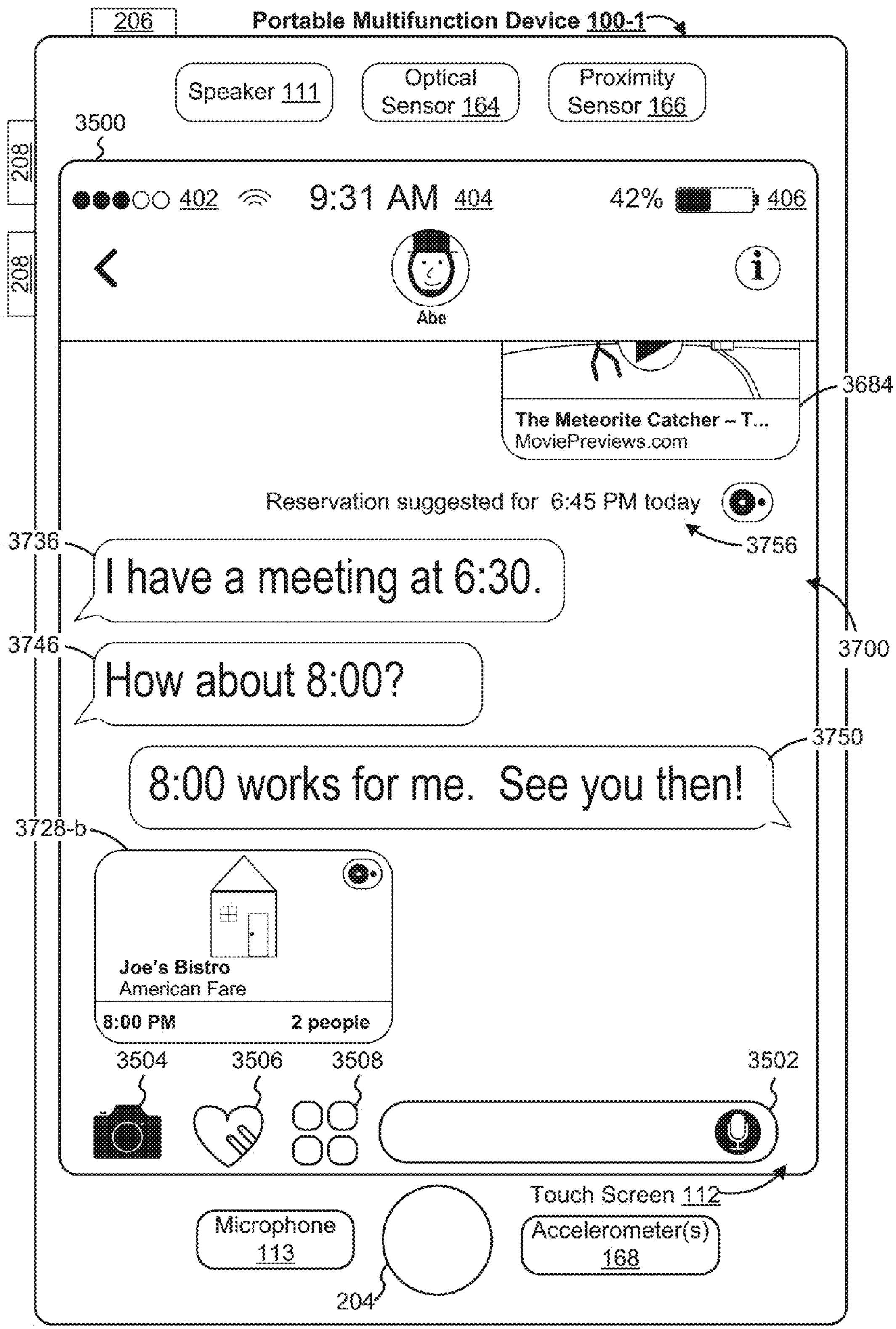
Figure 37A:
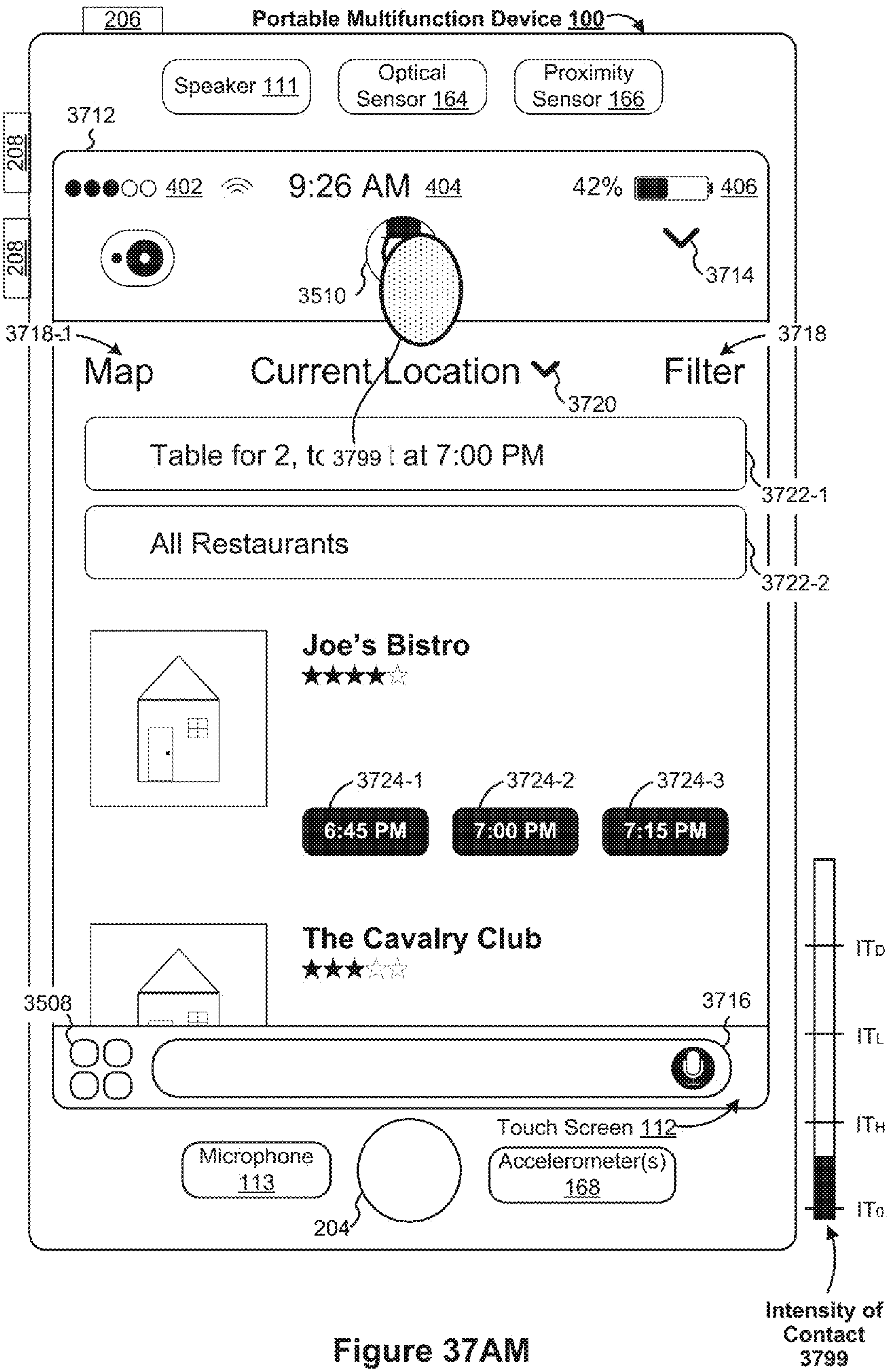
Figure 37A:
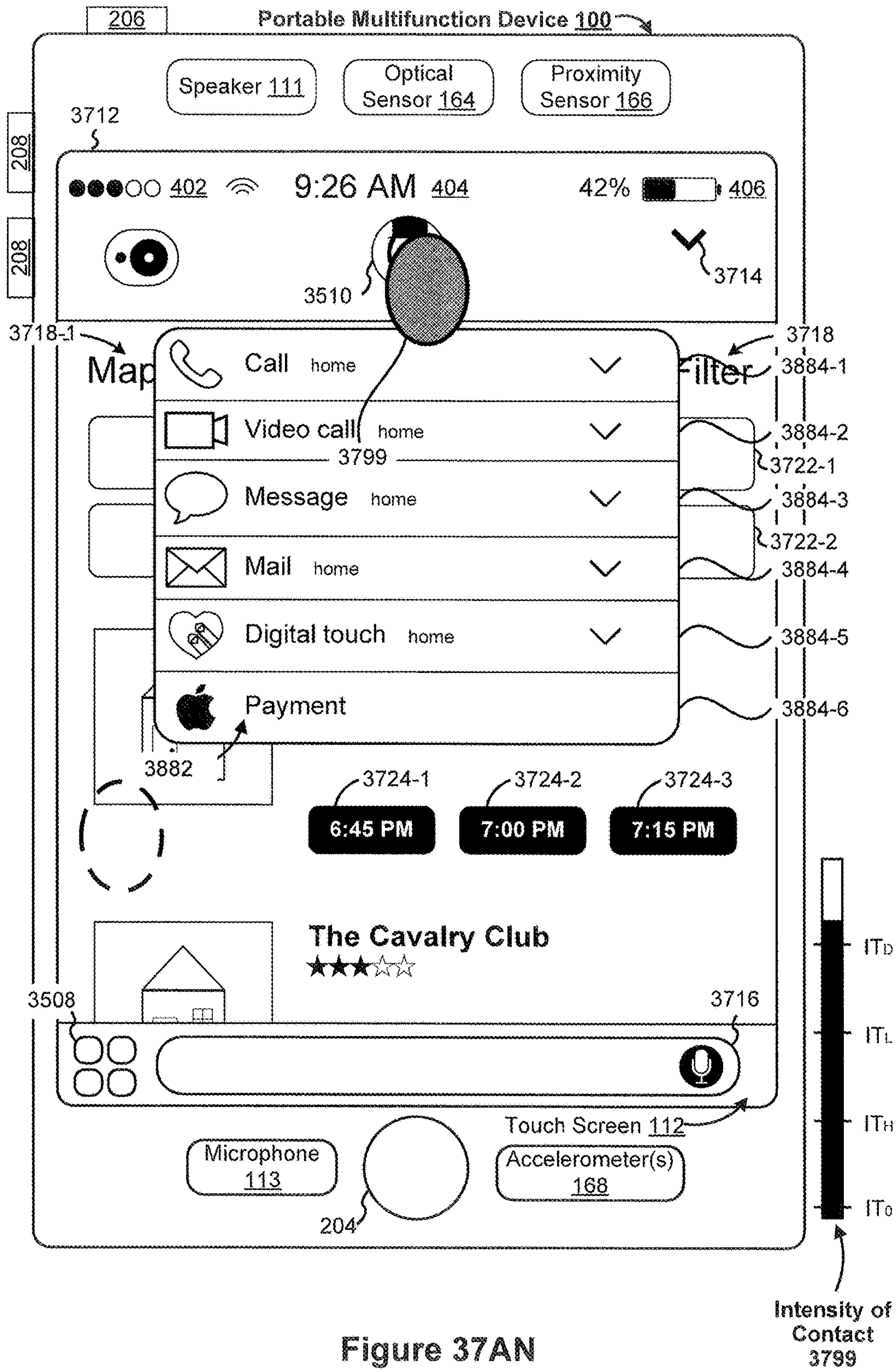
Figure 37A:
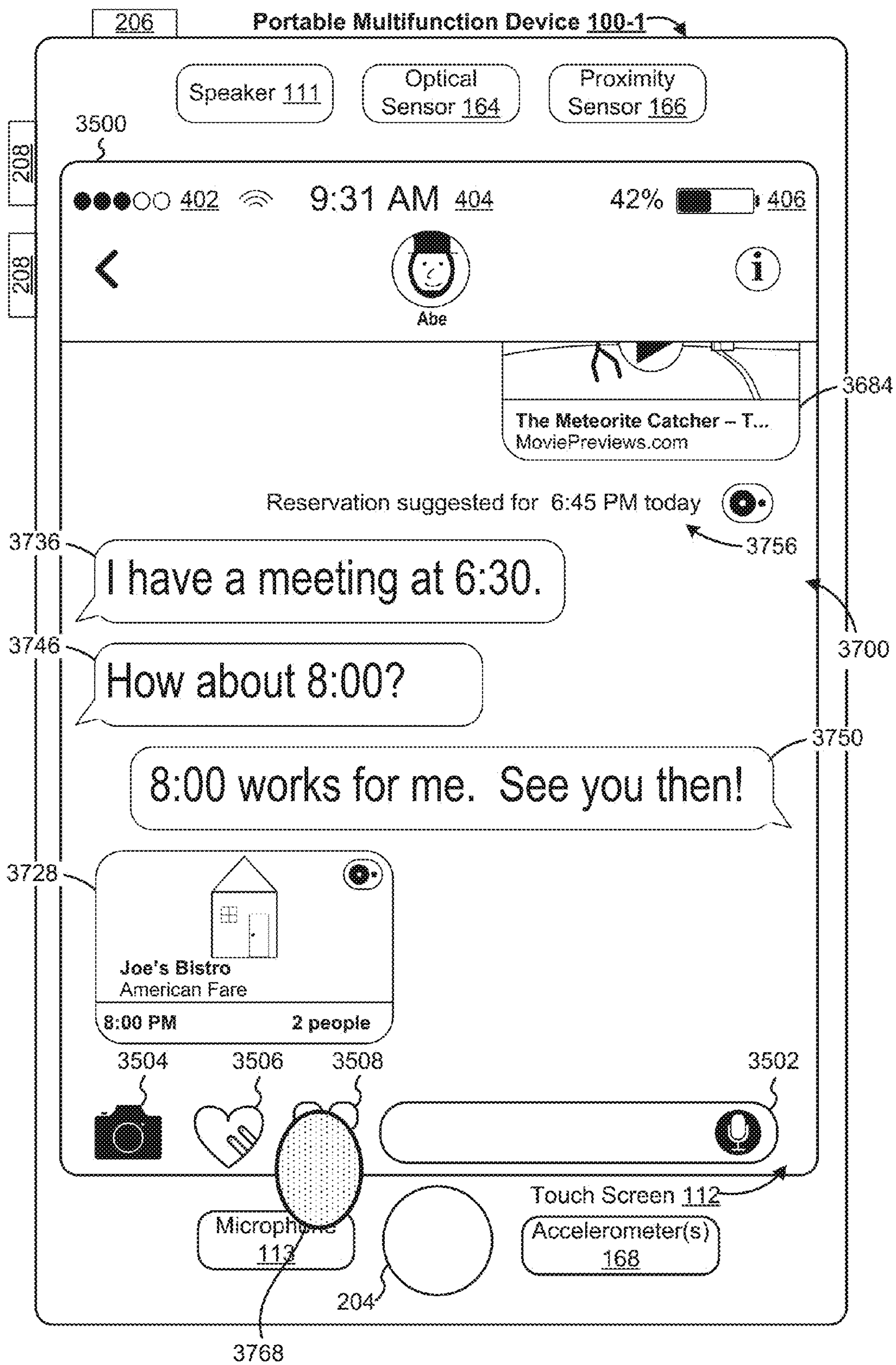
Figure 37A:
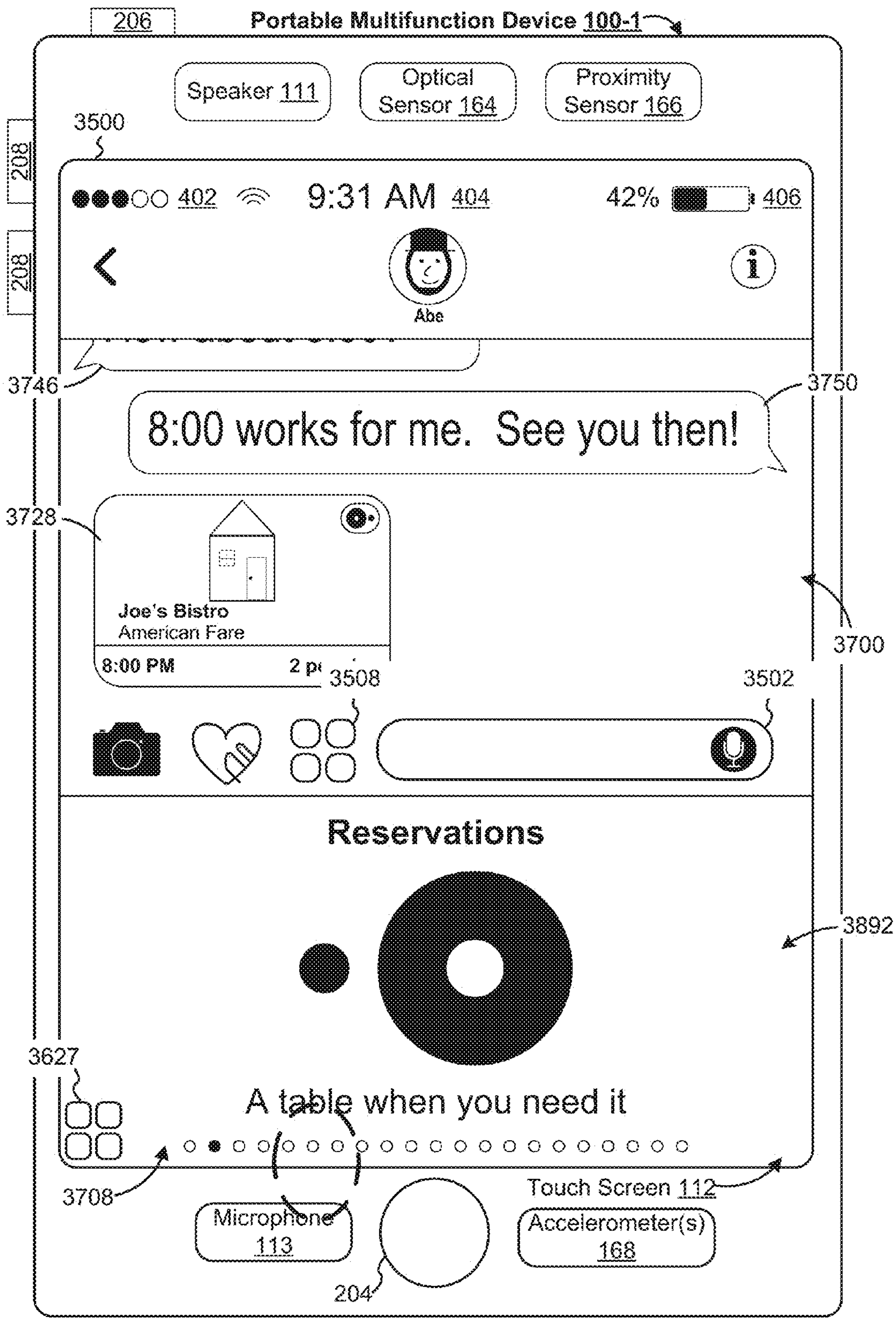
Figure 37A:
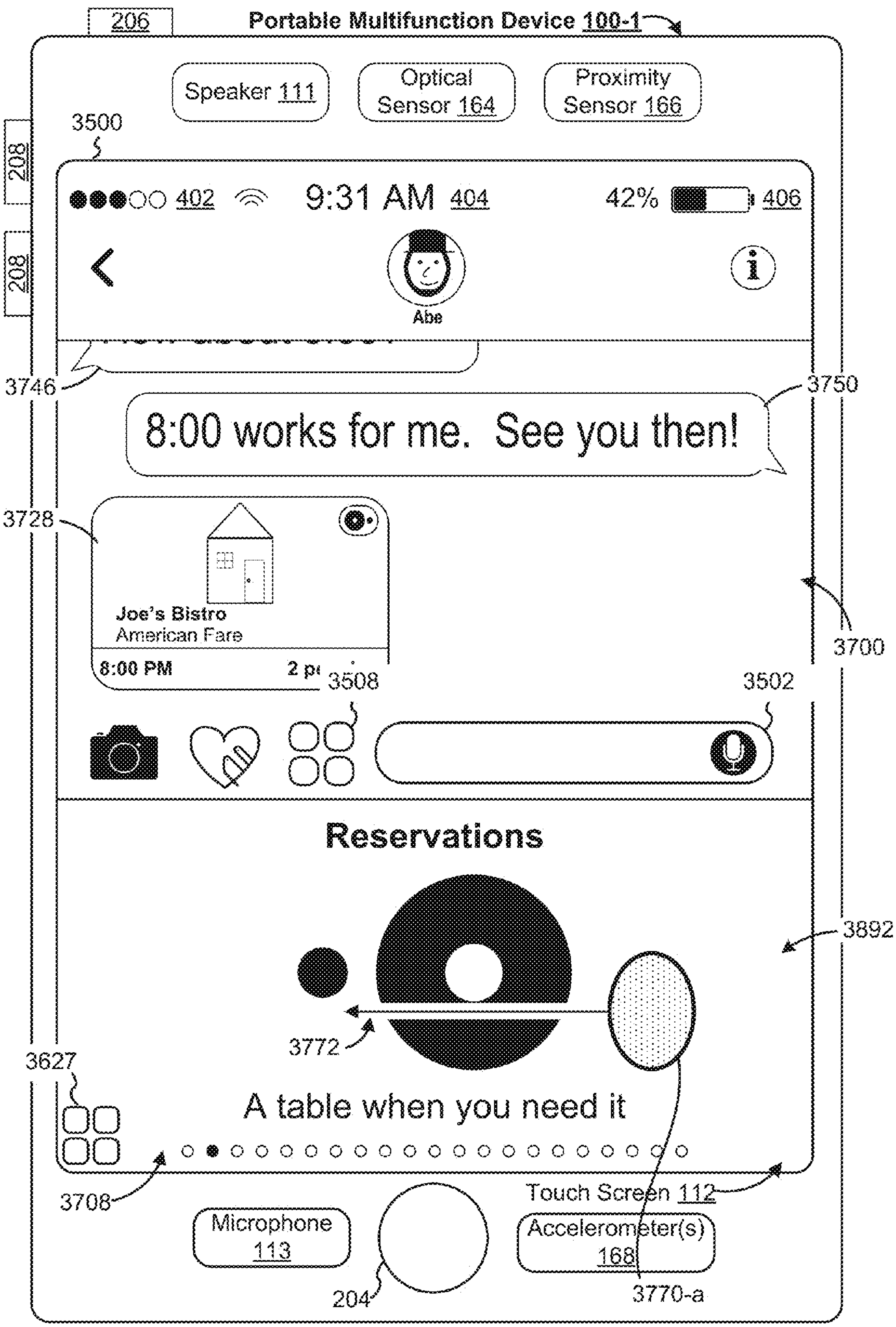
Figure 37A:
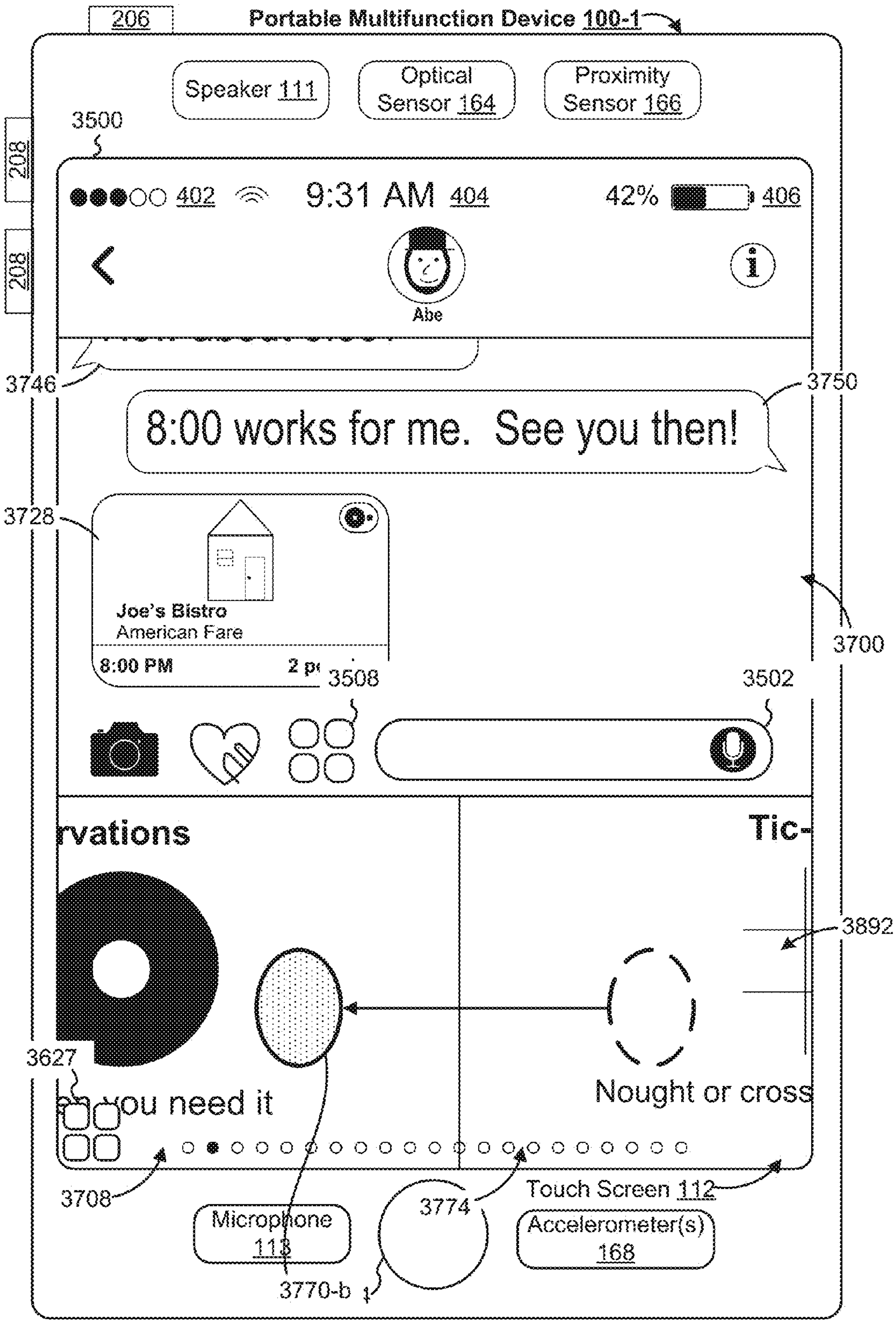
Figure 37A:
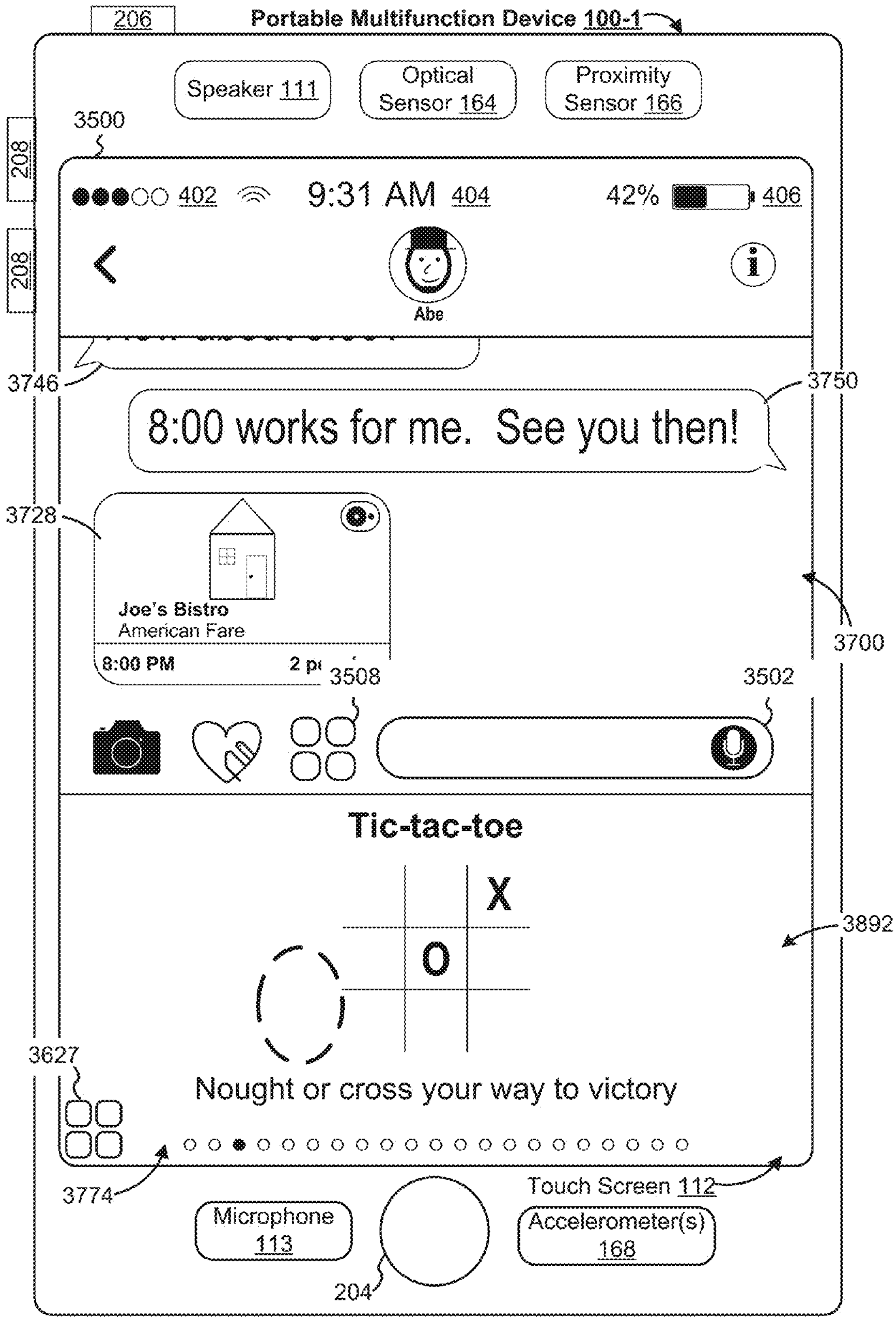
Figure 37A:
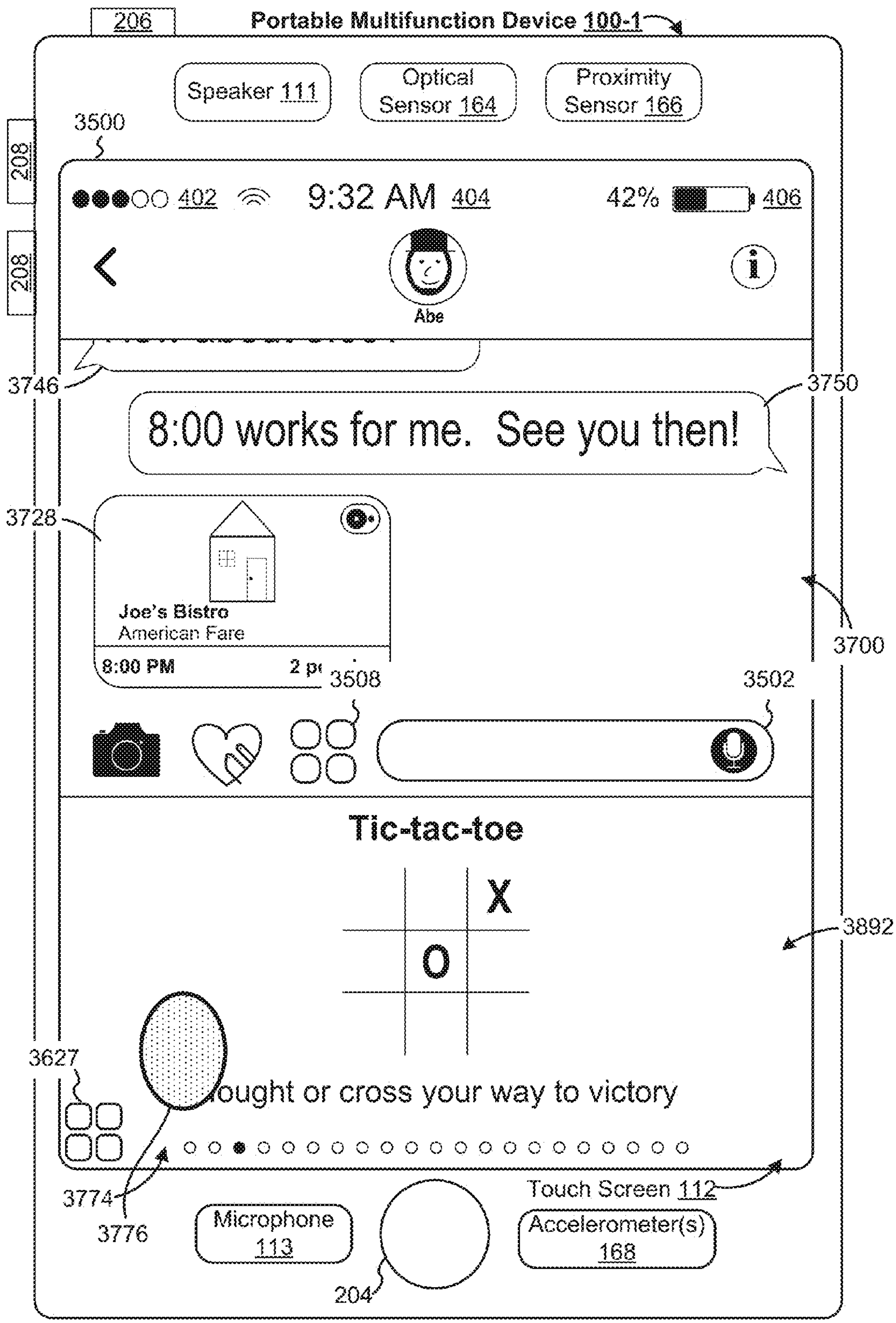
Figure 37A:
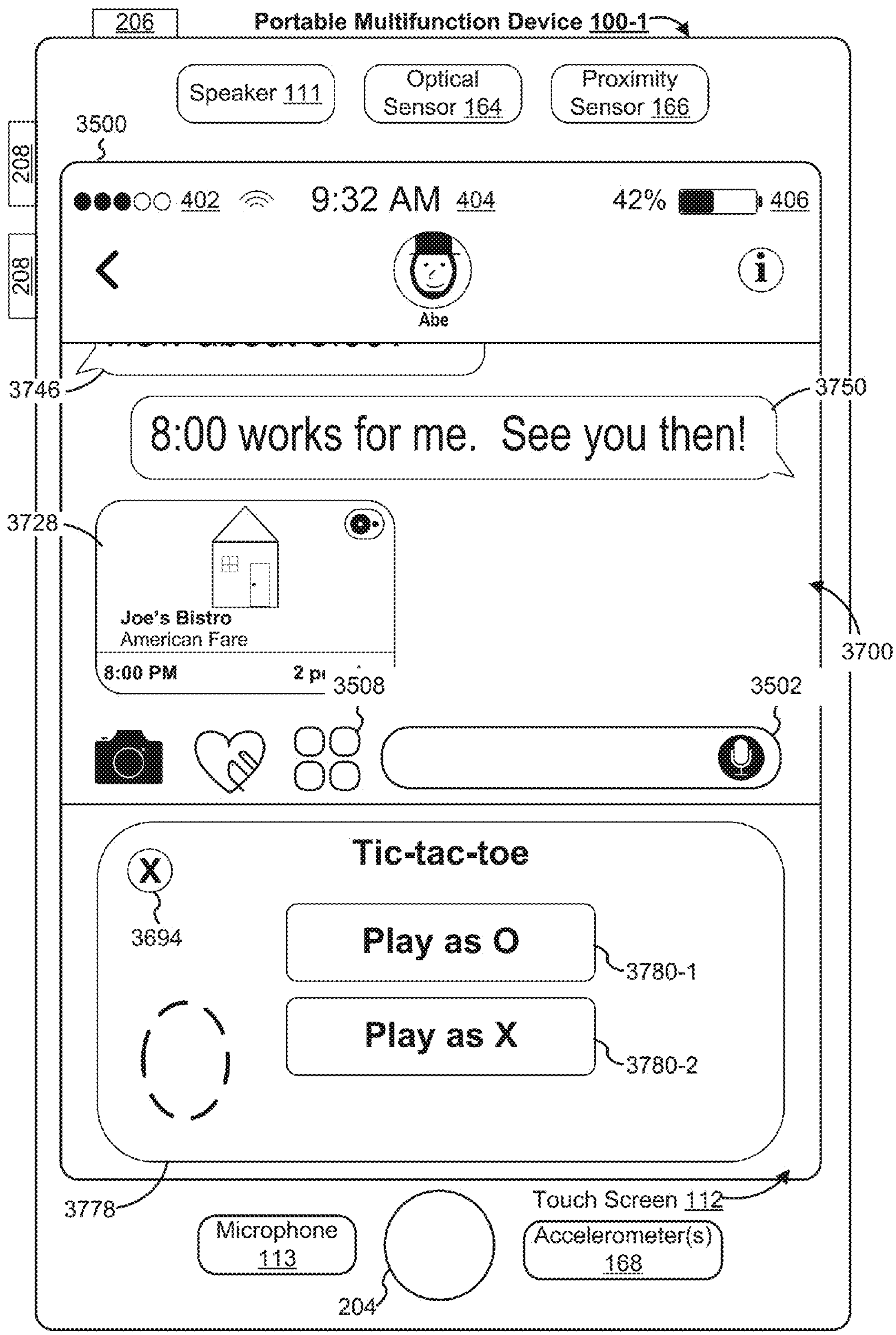
Figure 37A:
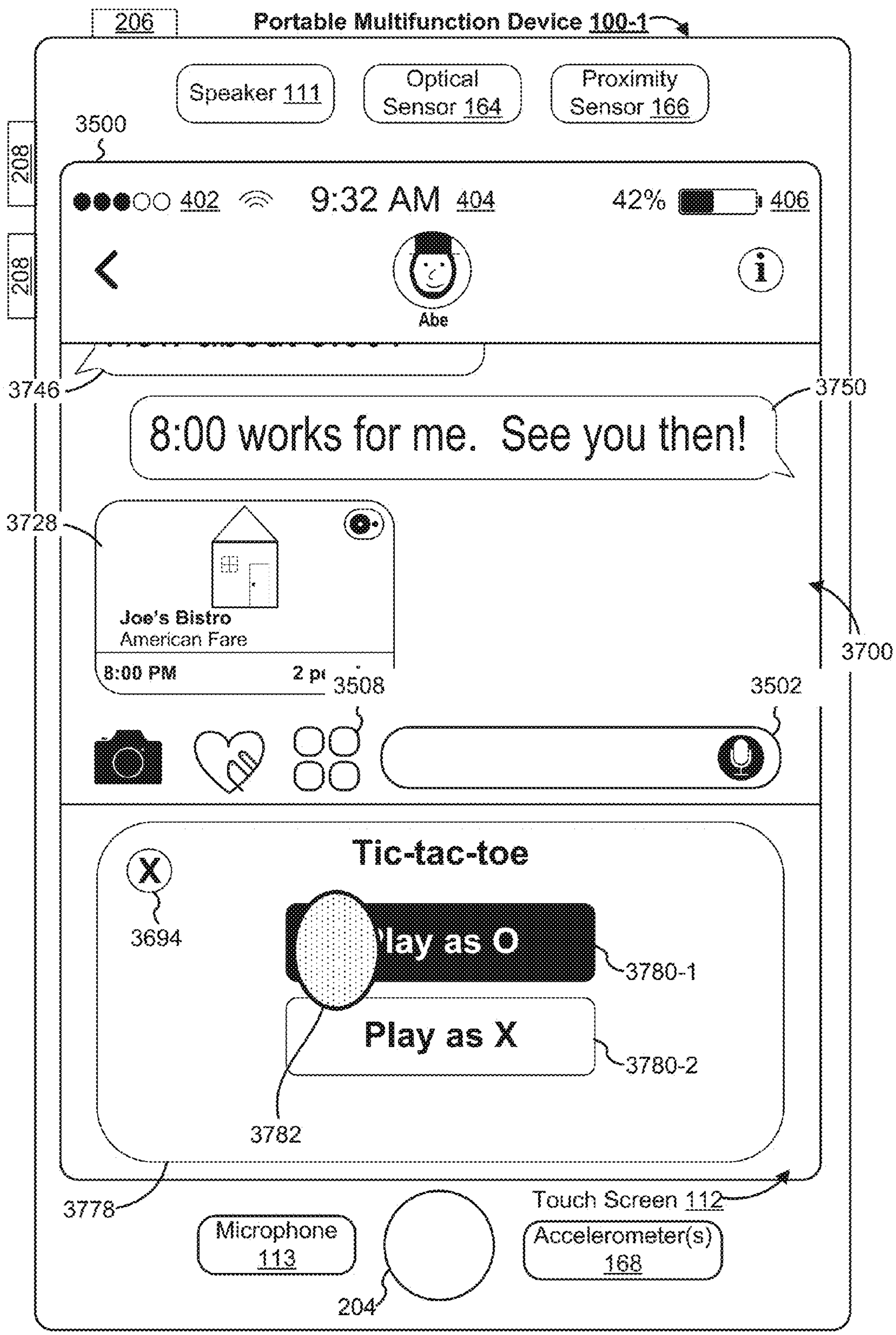
Figure 37A:
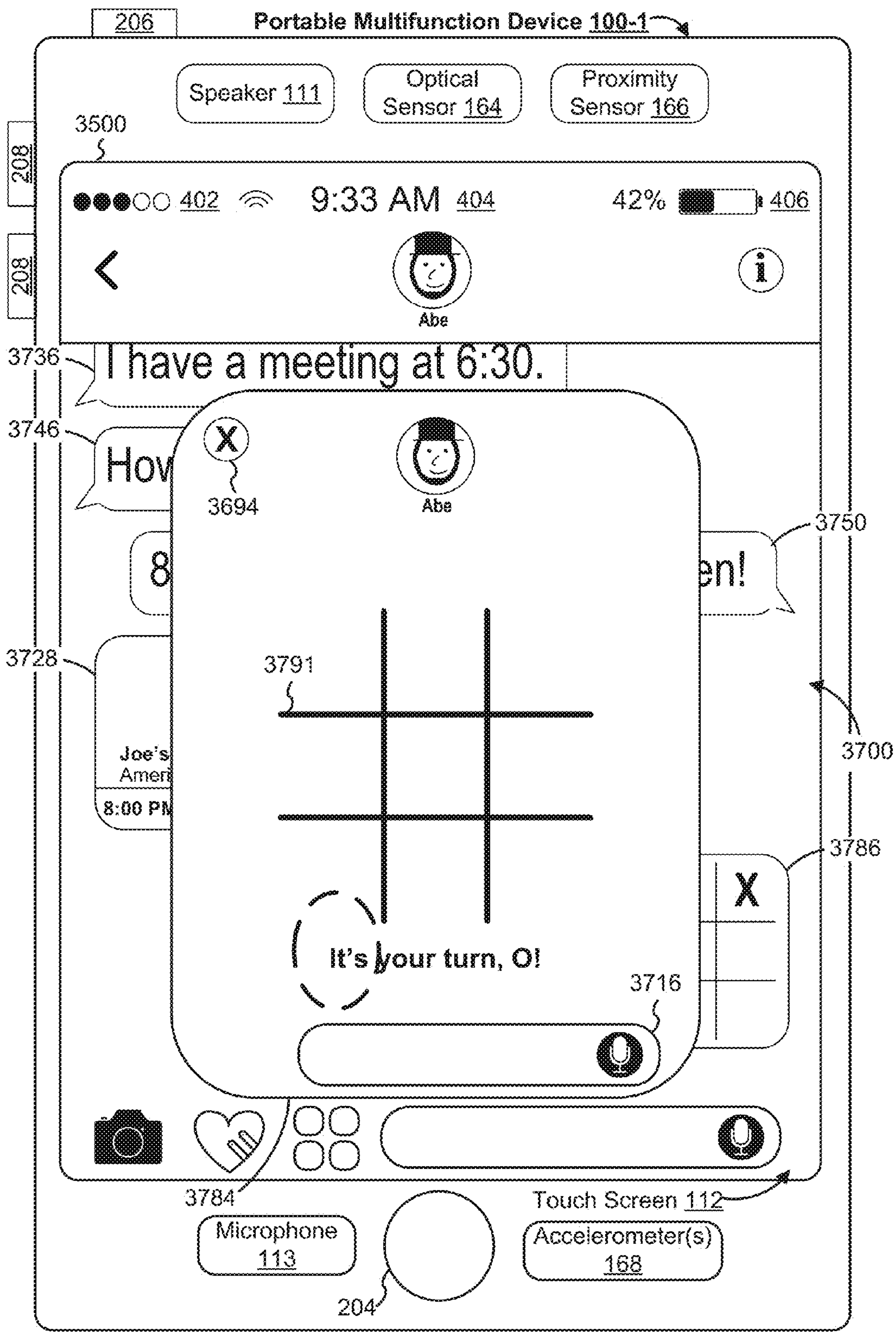
Figure 37A:
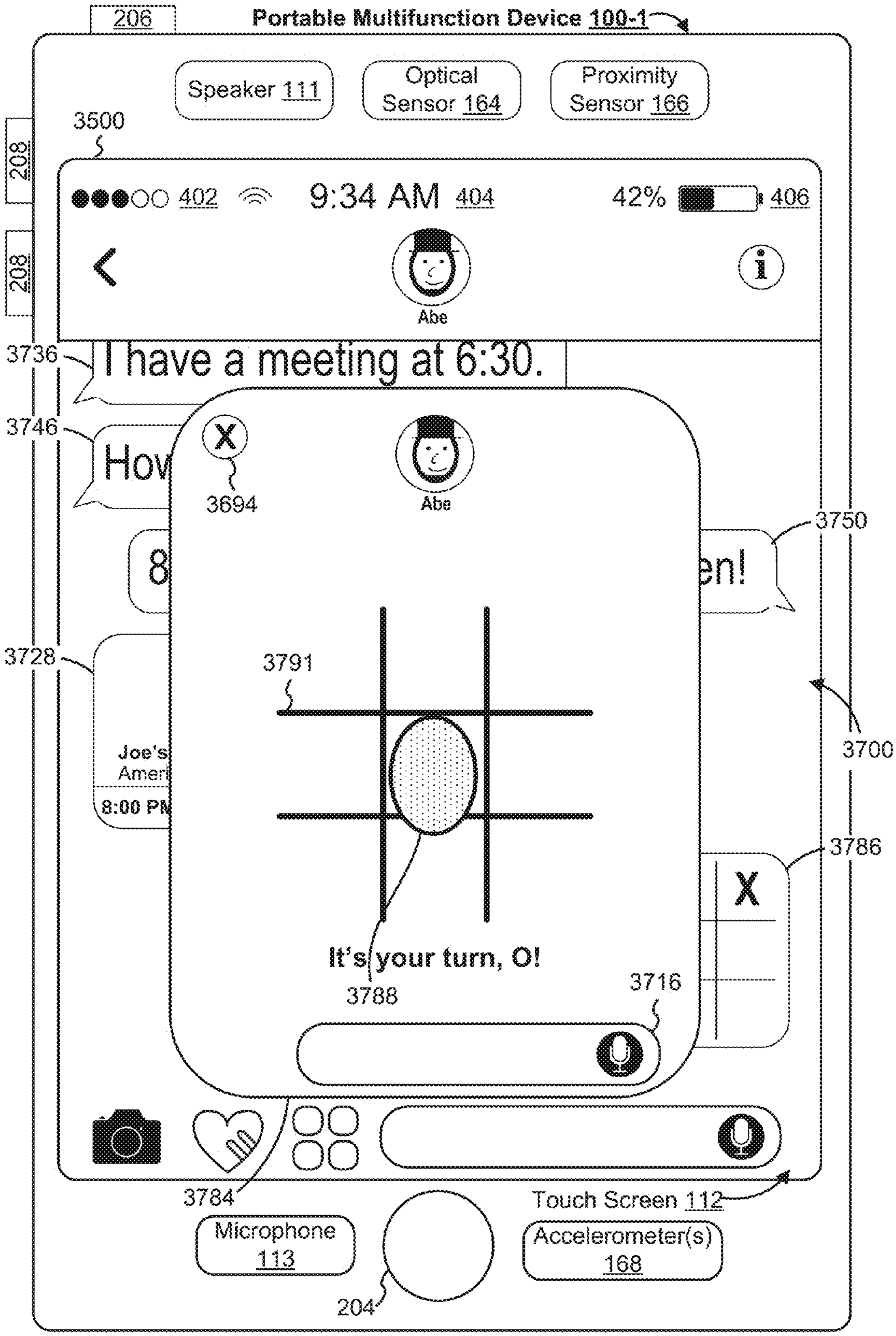
Figure 37A:
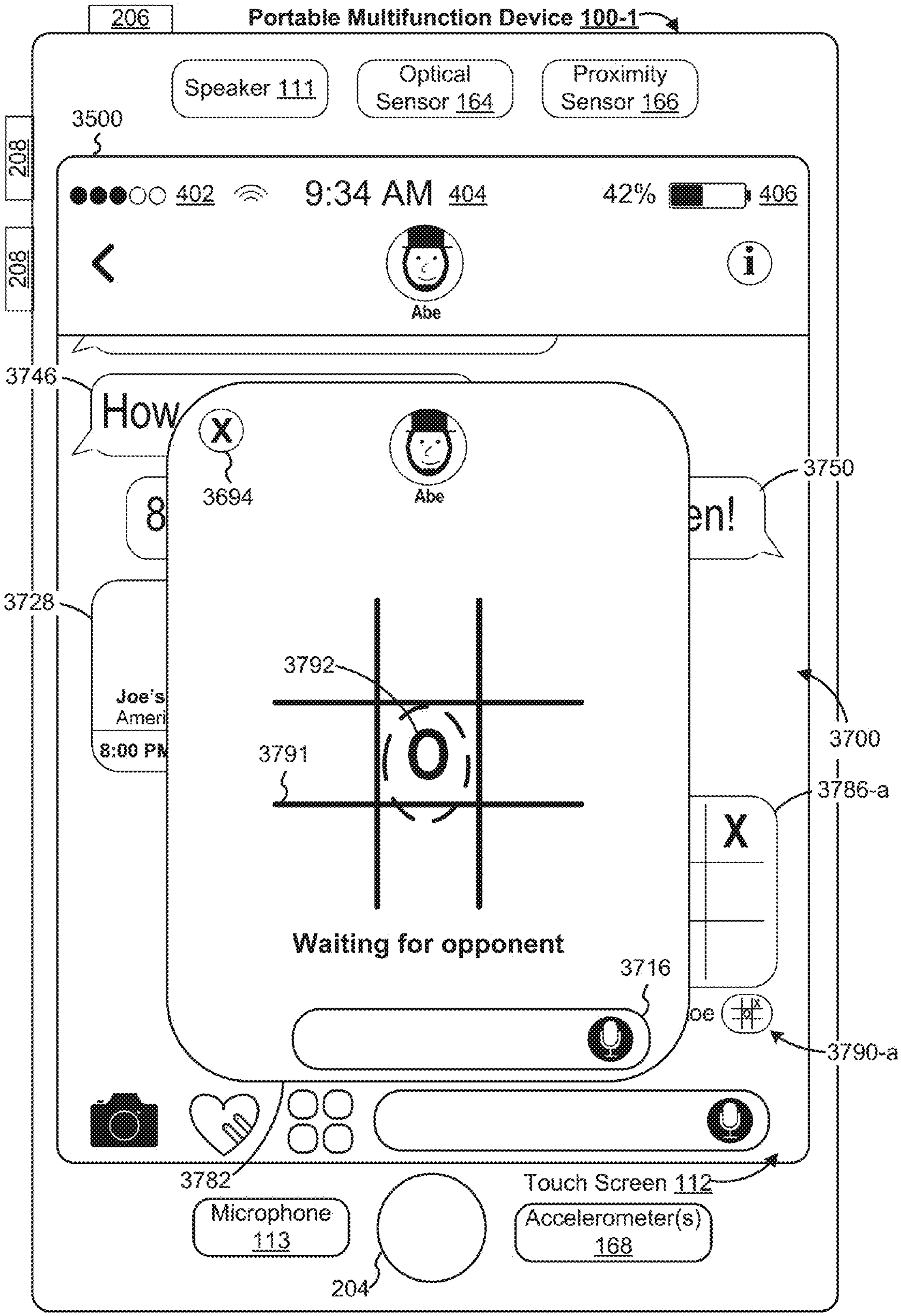
Figure 37A:
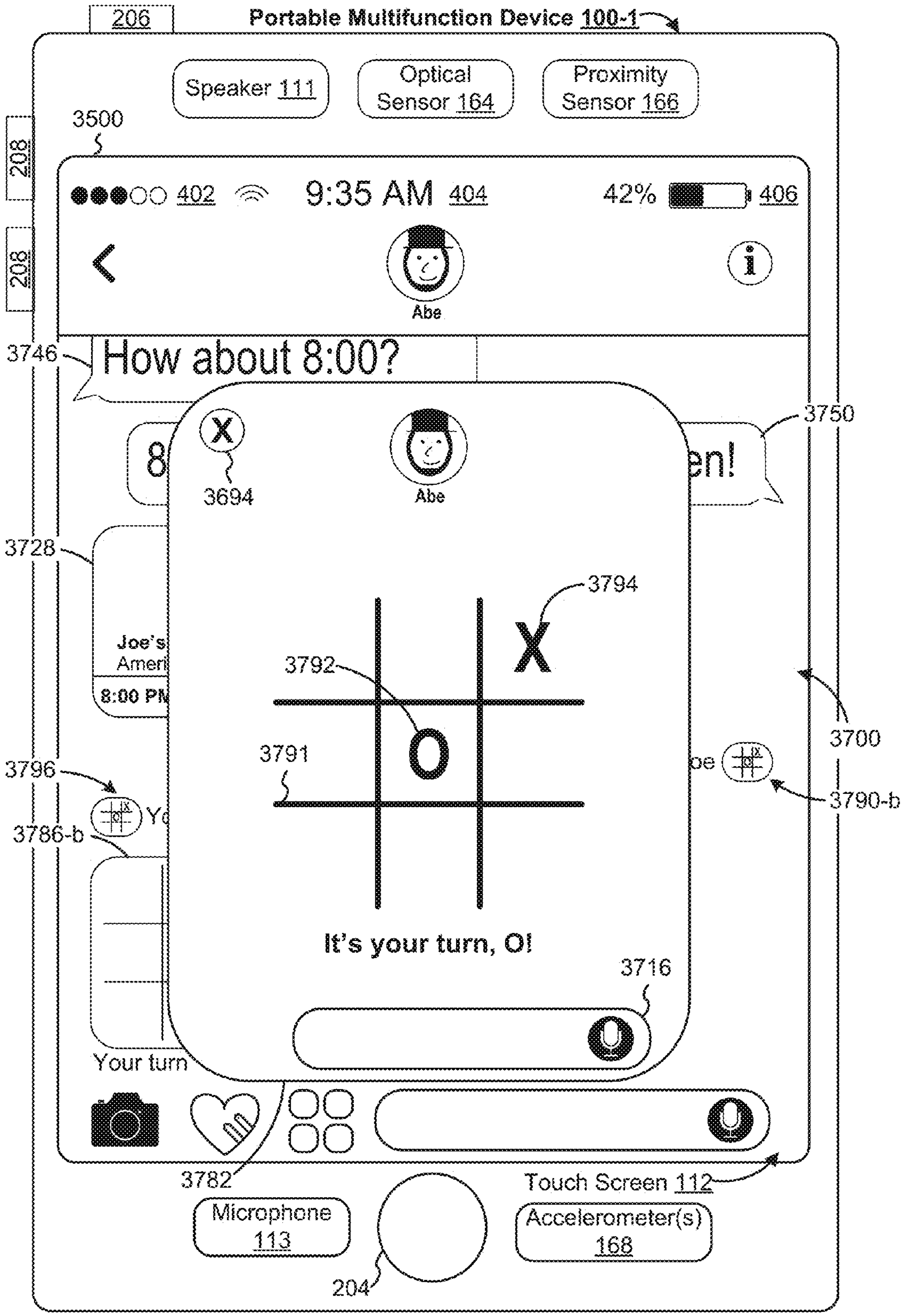
Figure 37B:
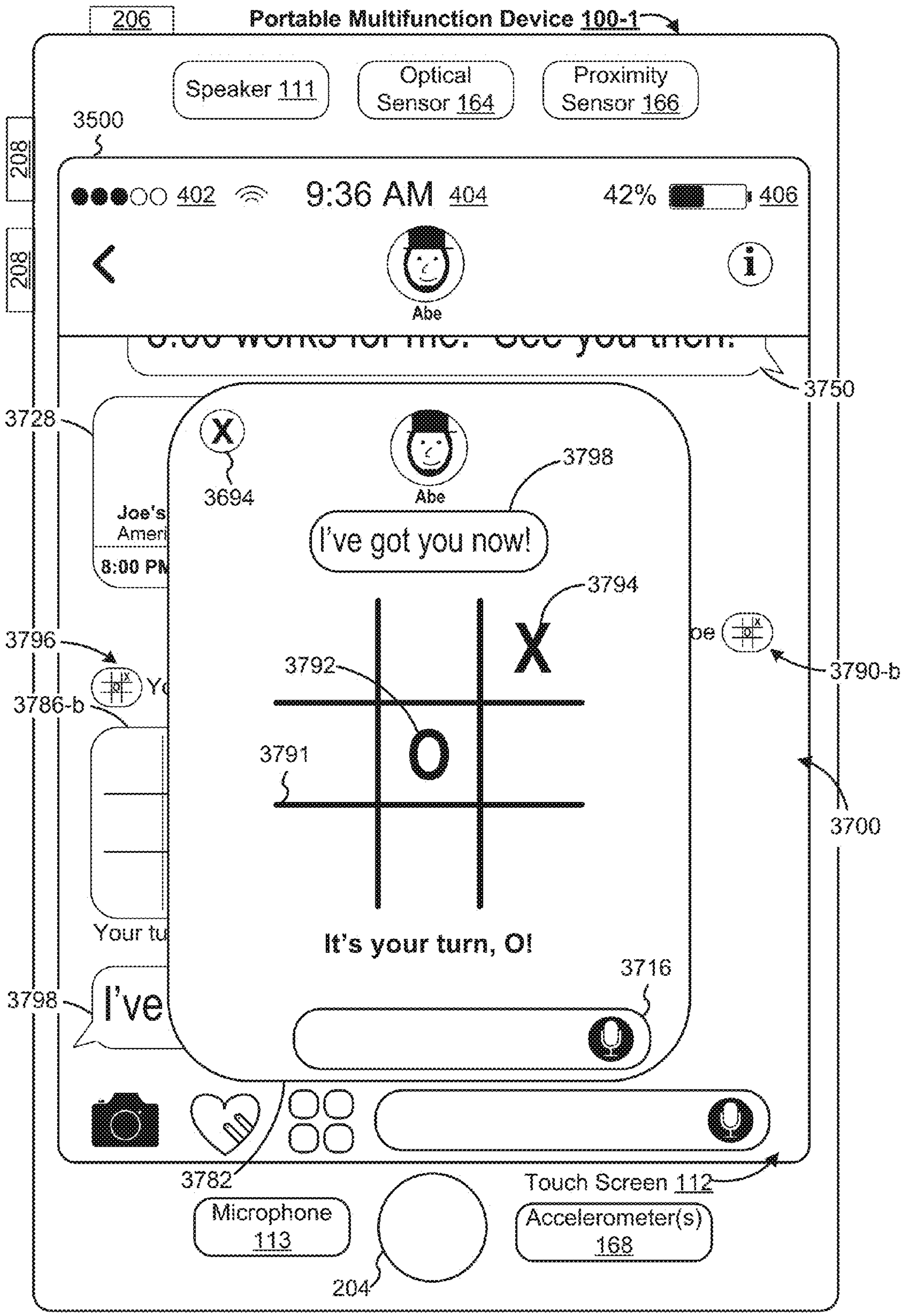
Figure 37B:
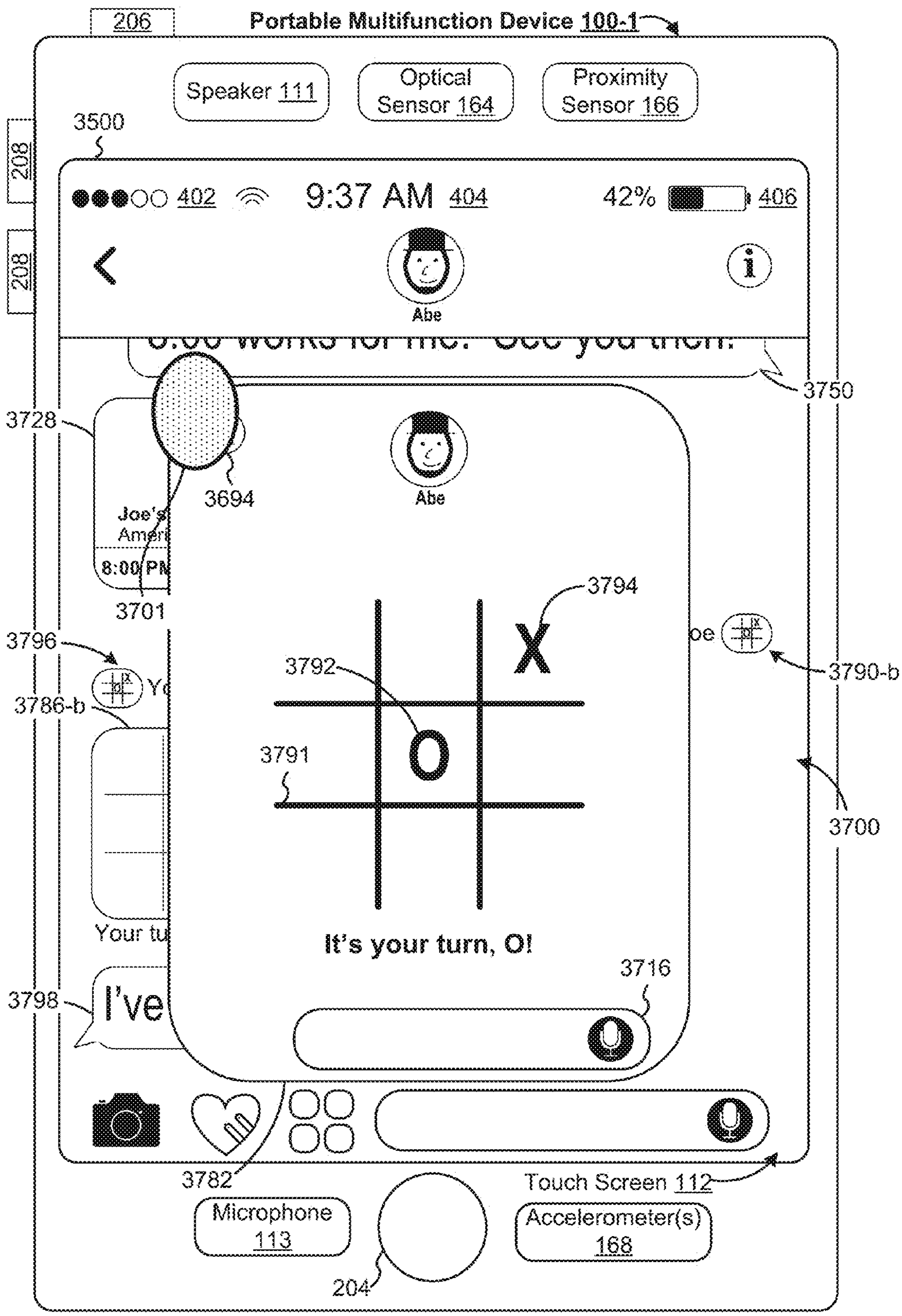
Figure 37B:
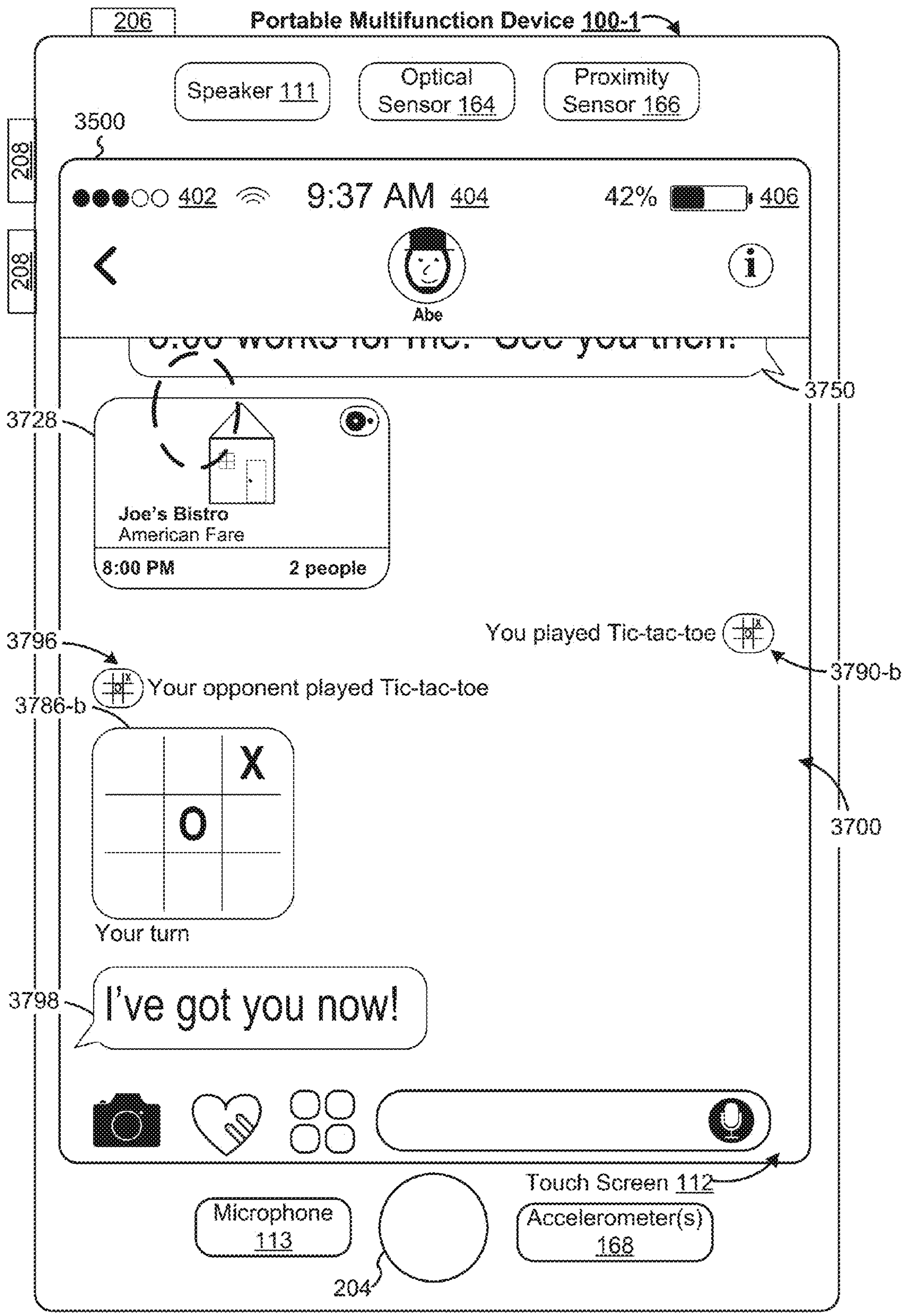
Figure 37B:
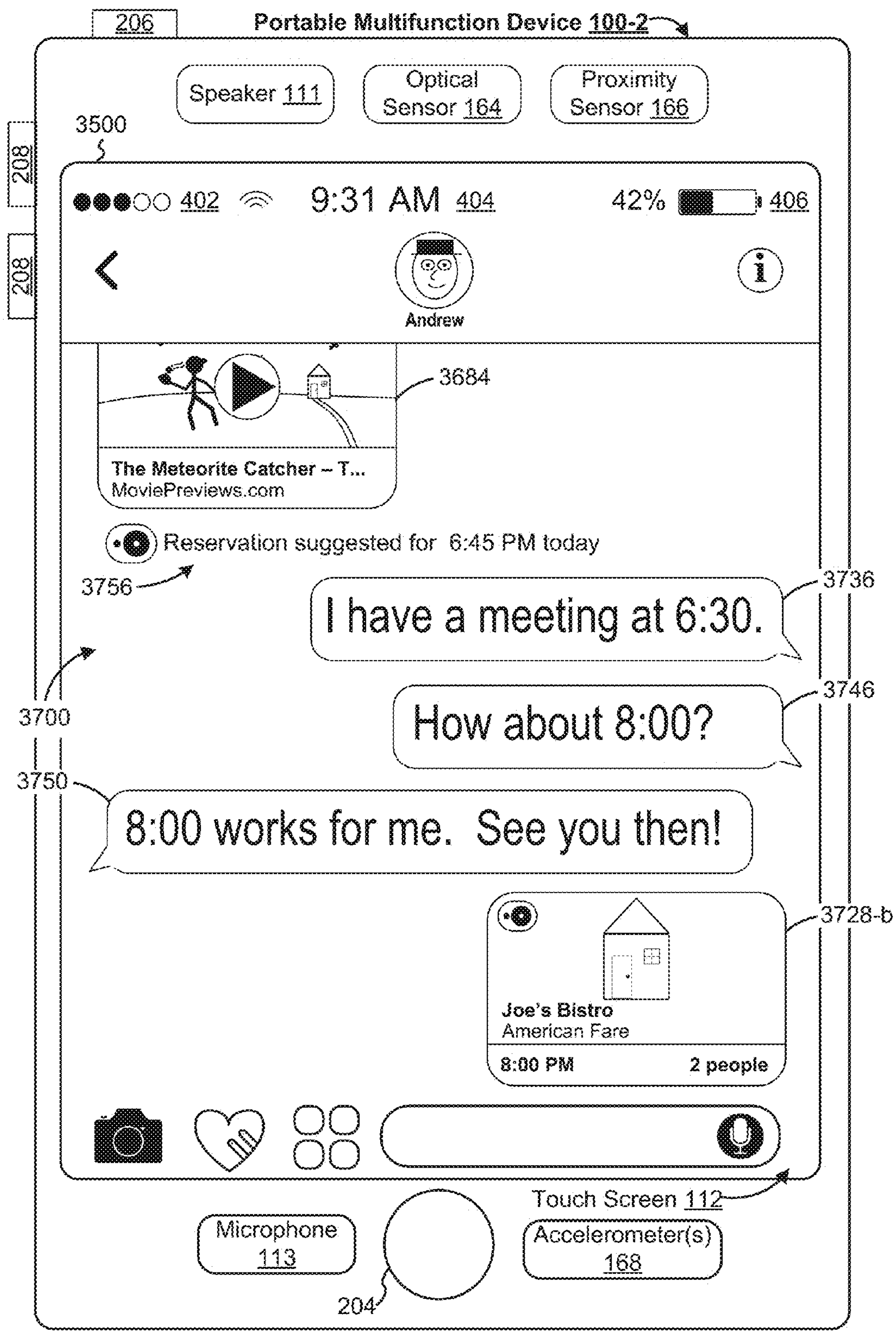
Figure 37B:
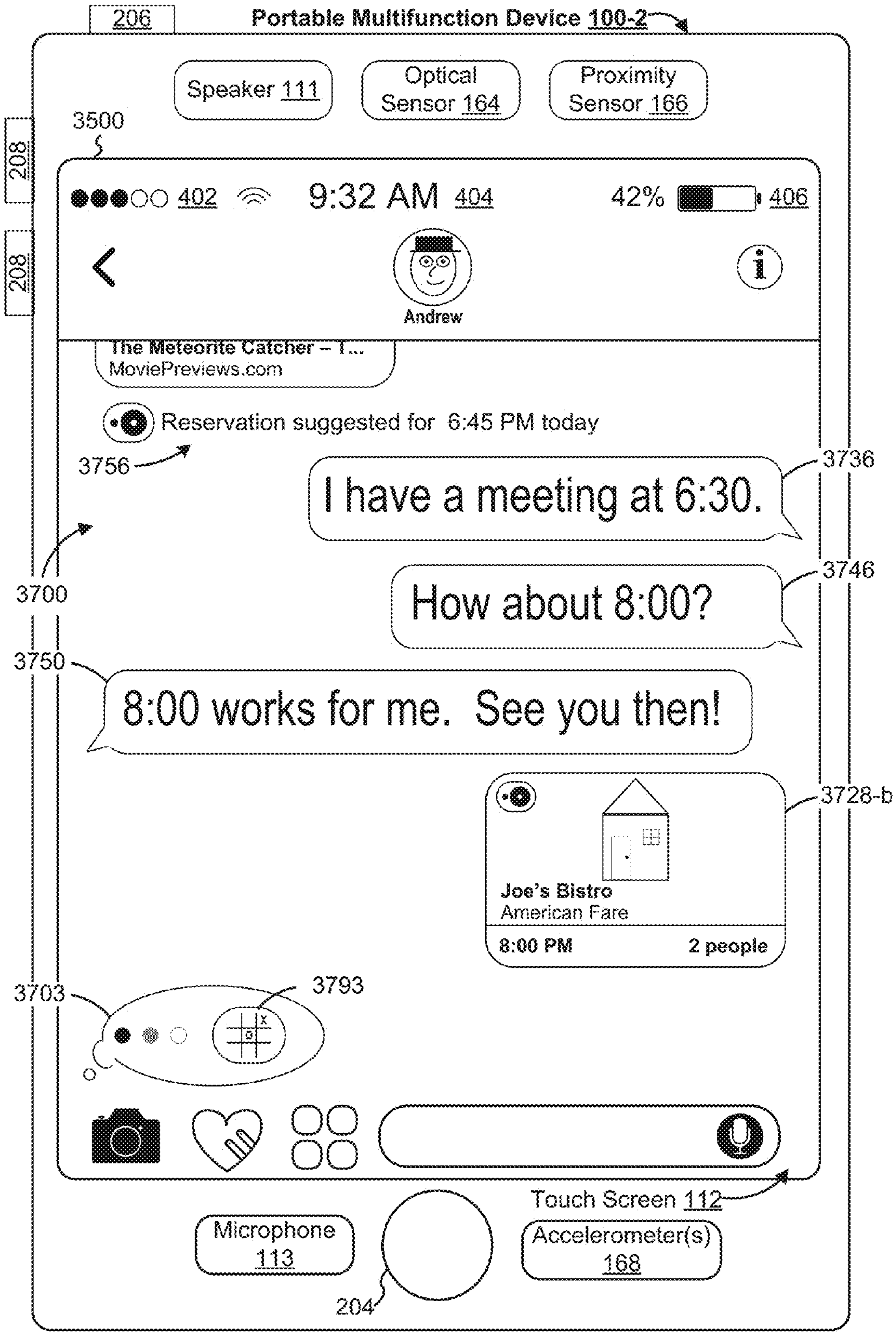
Figure 37B:
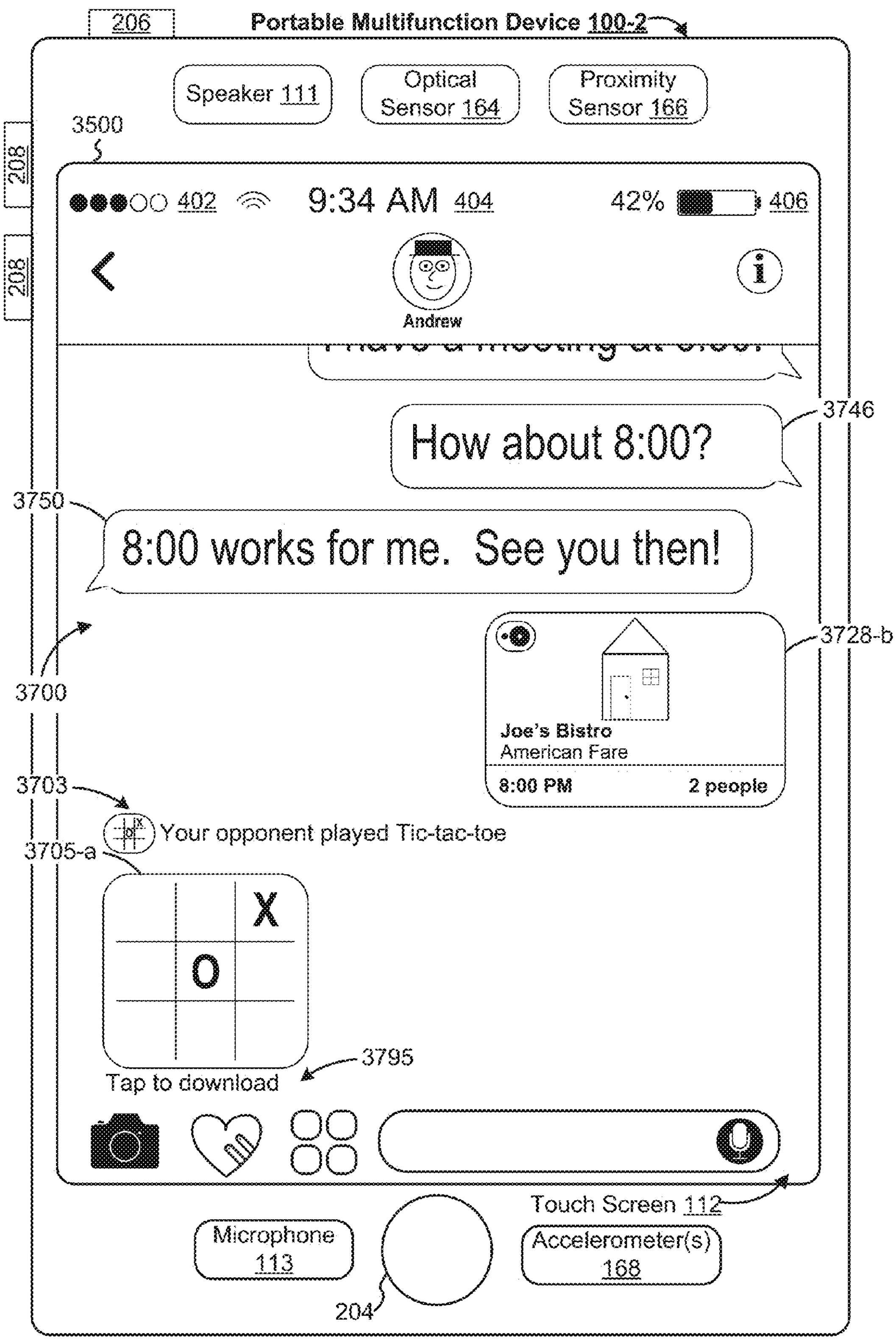
Figure 37B:
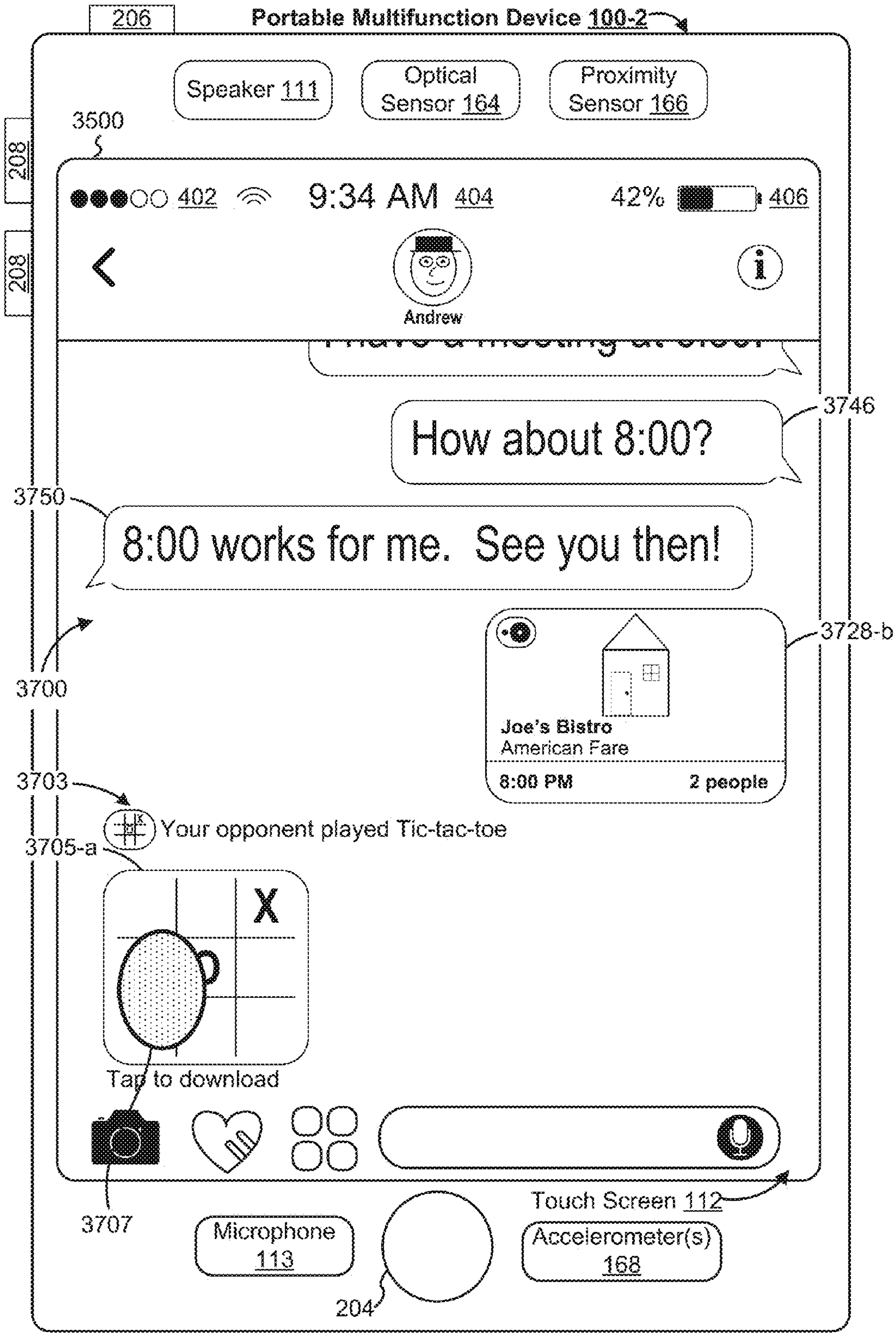
Figure 37B:
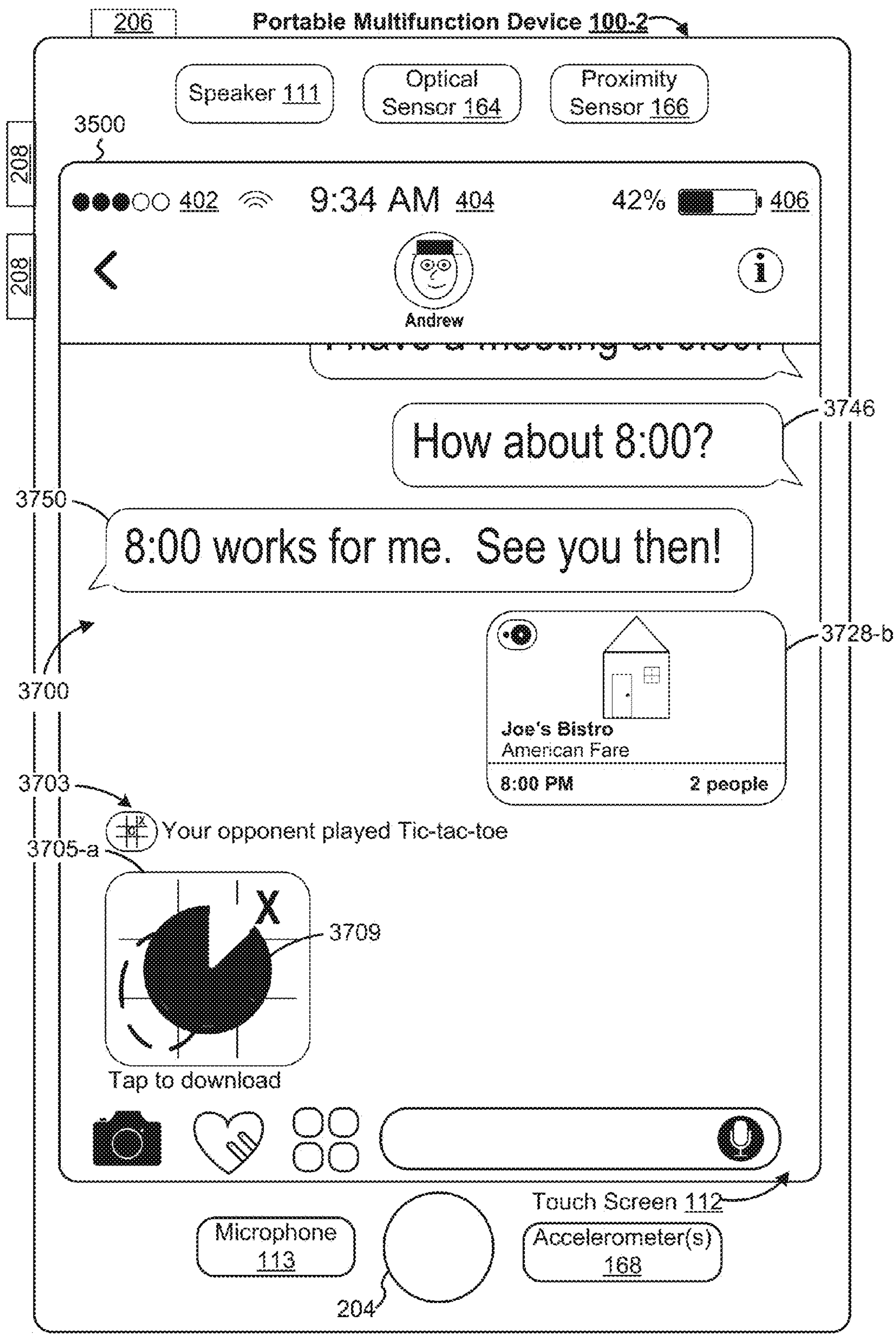
Figure 37B:
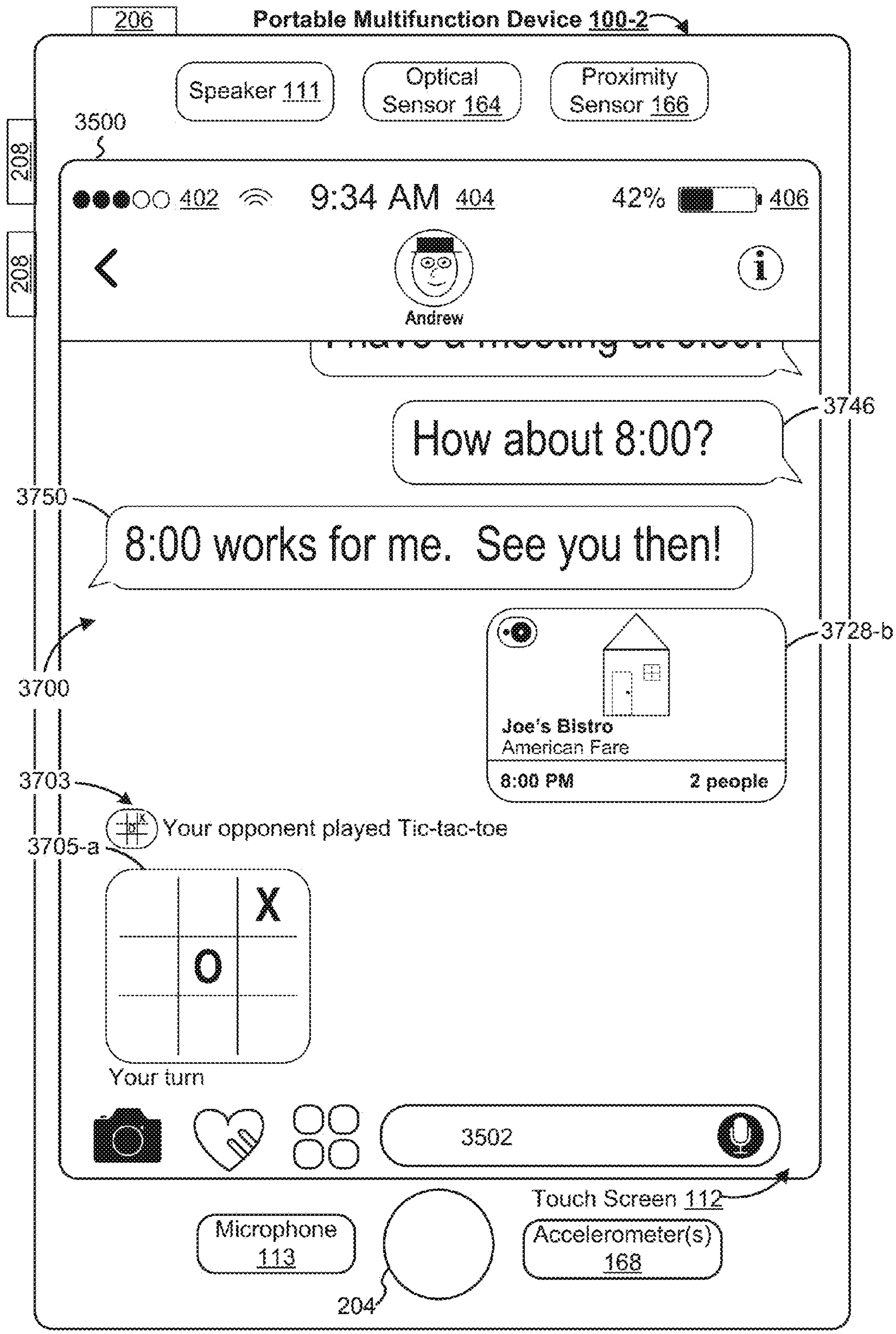
Figure 37B:
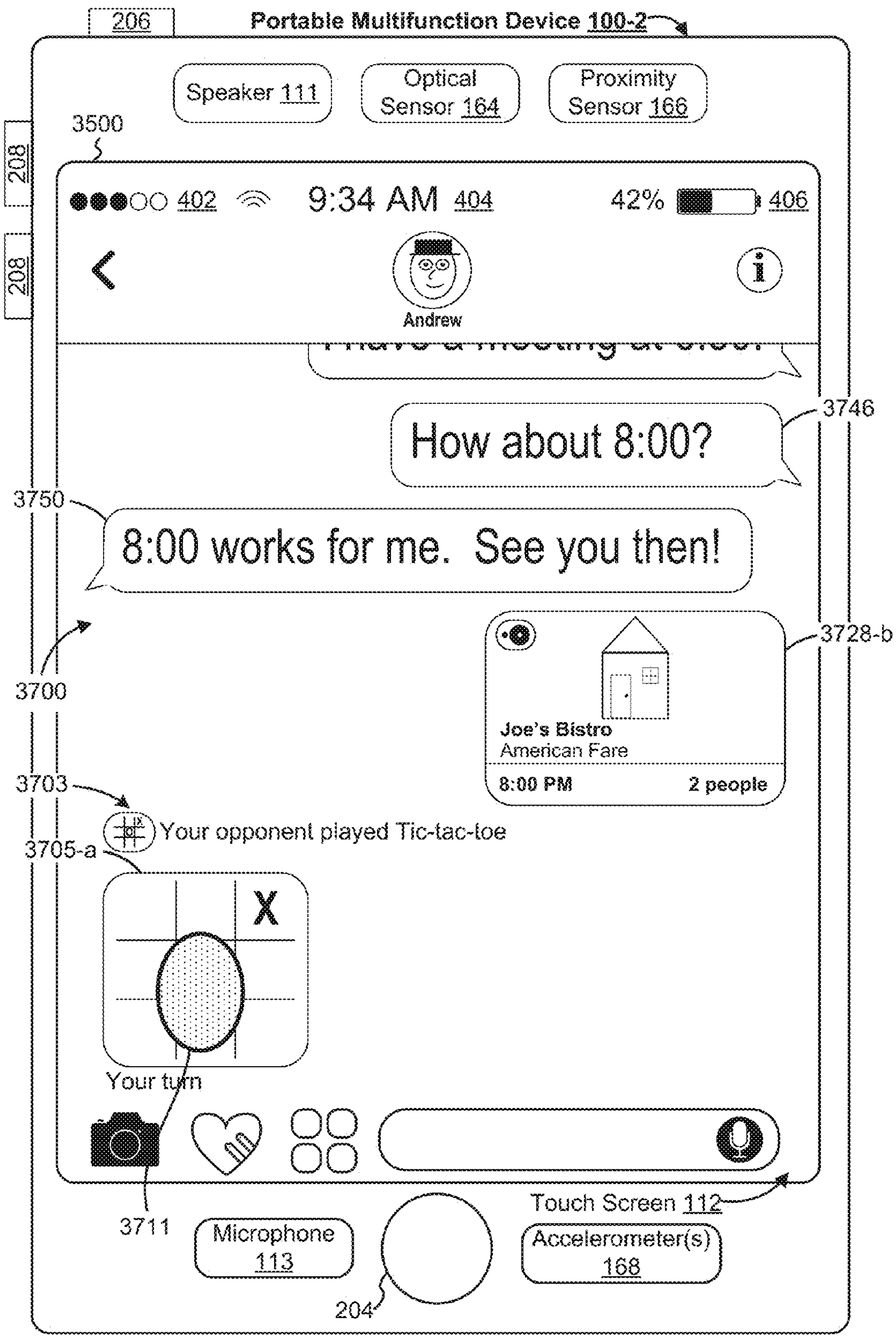
Figure 37B:
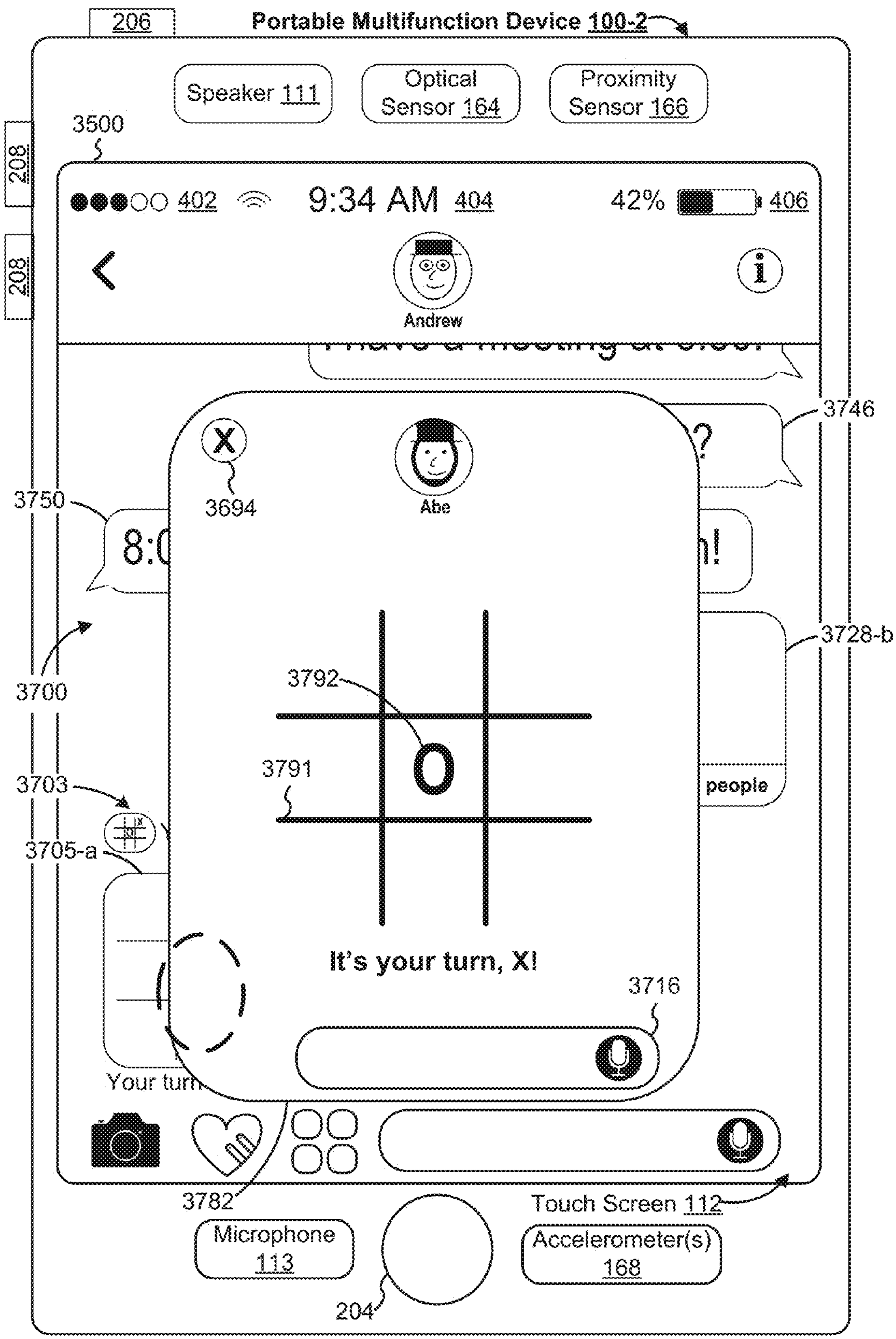
Figure 37B:
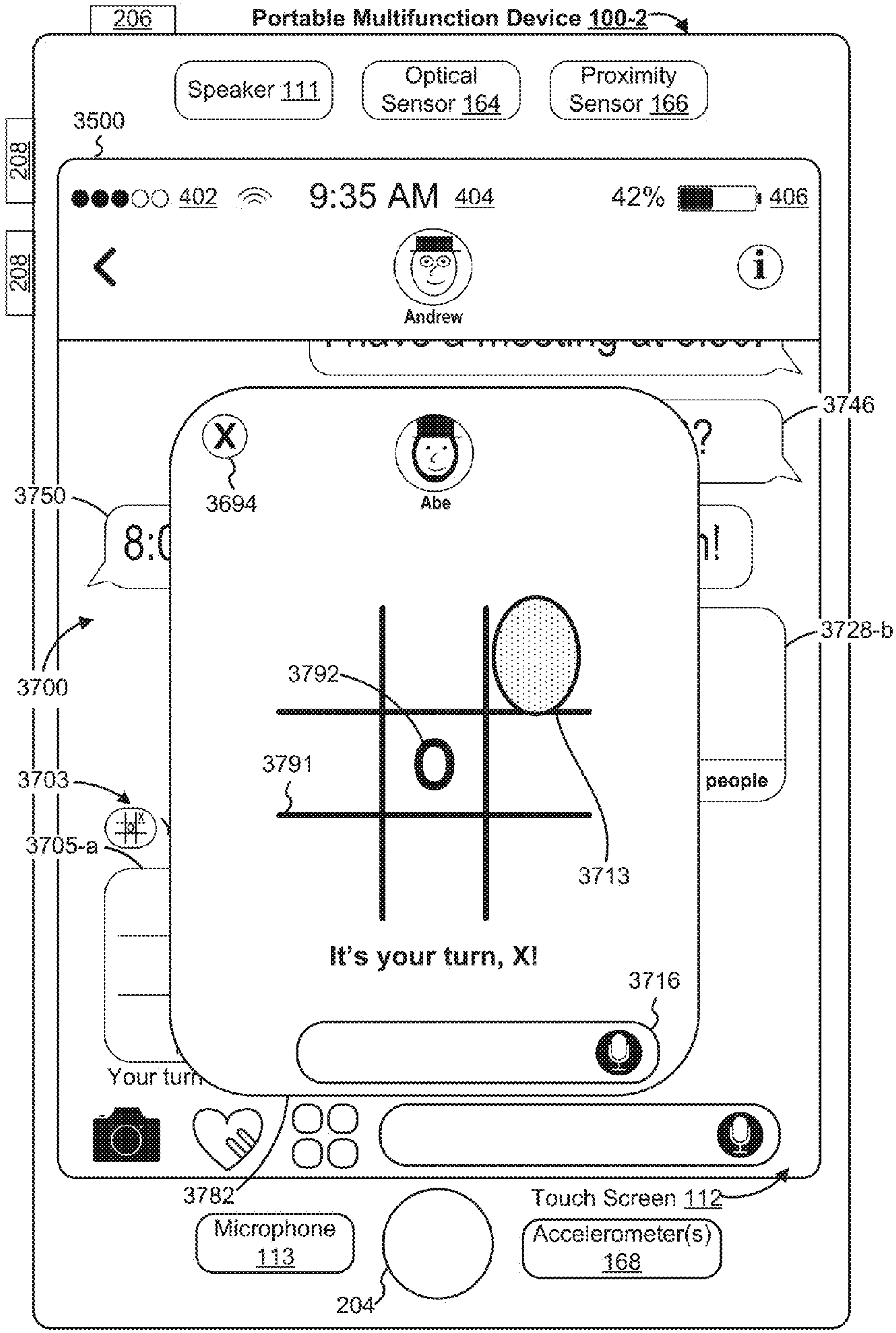
Figure 37B:
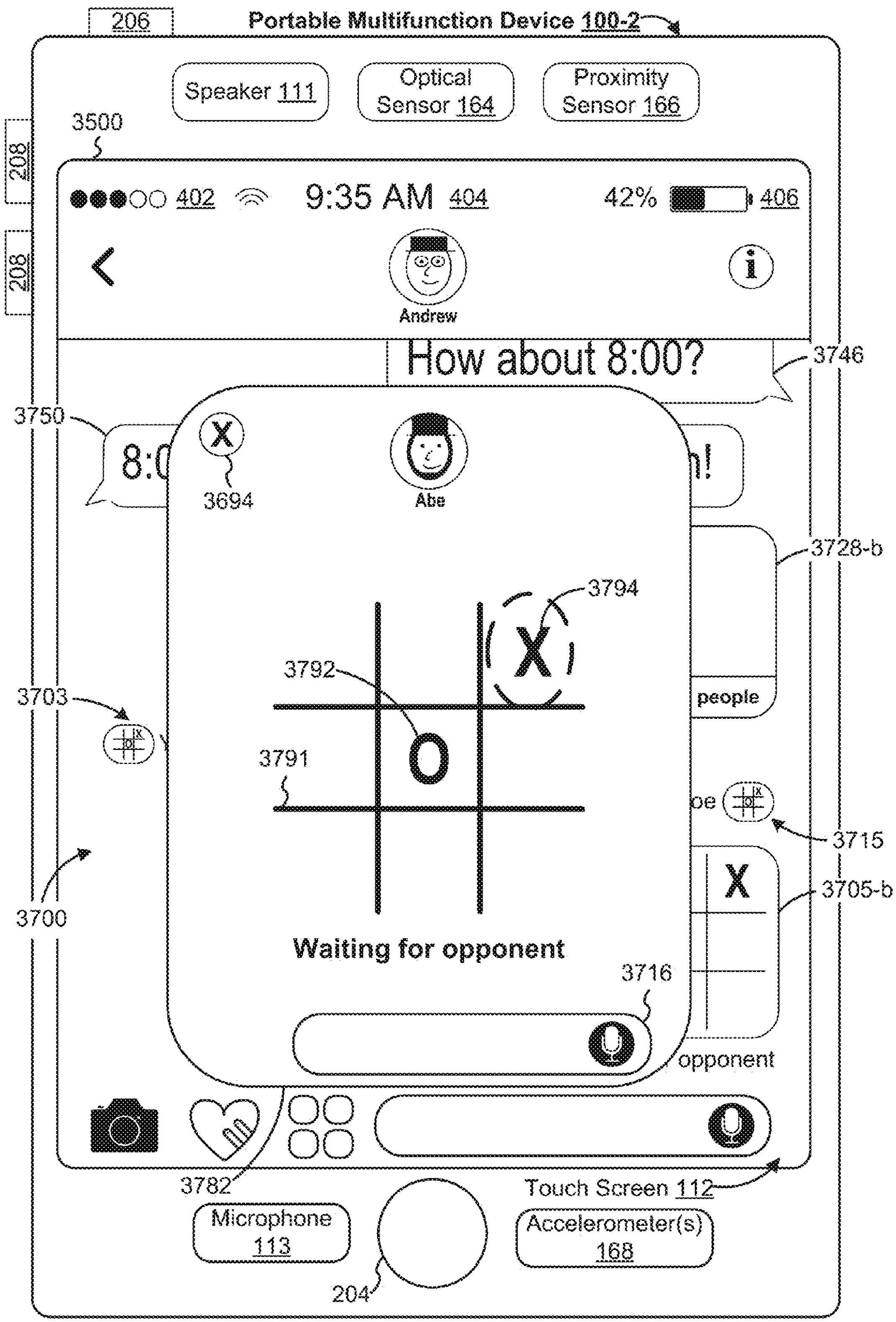
Figure 37B:
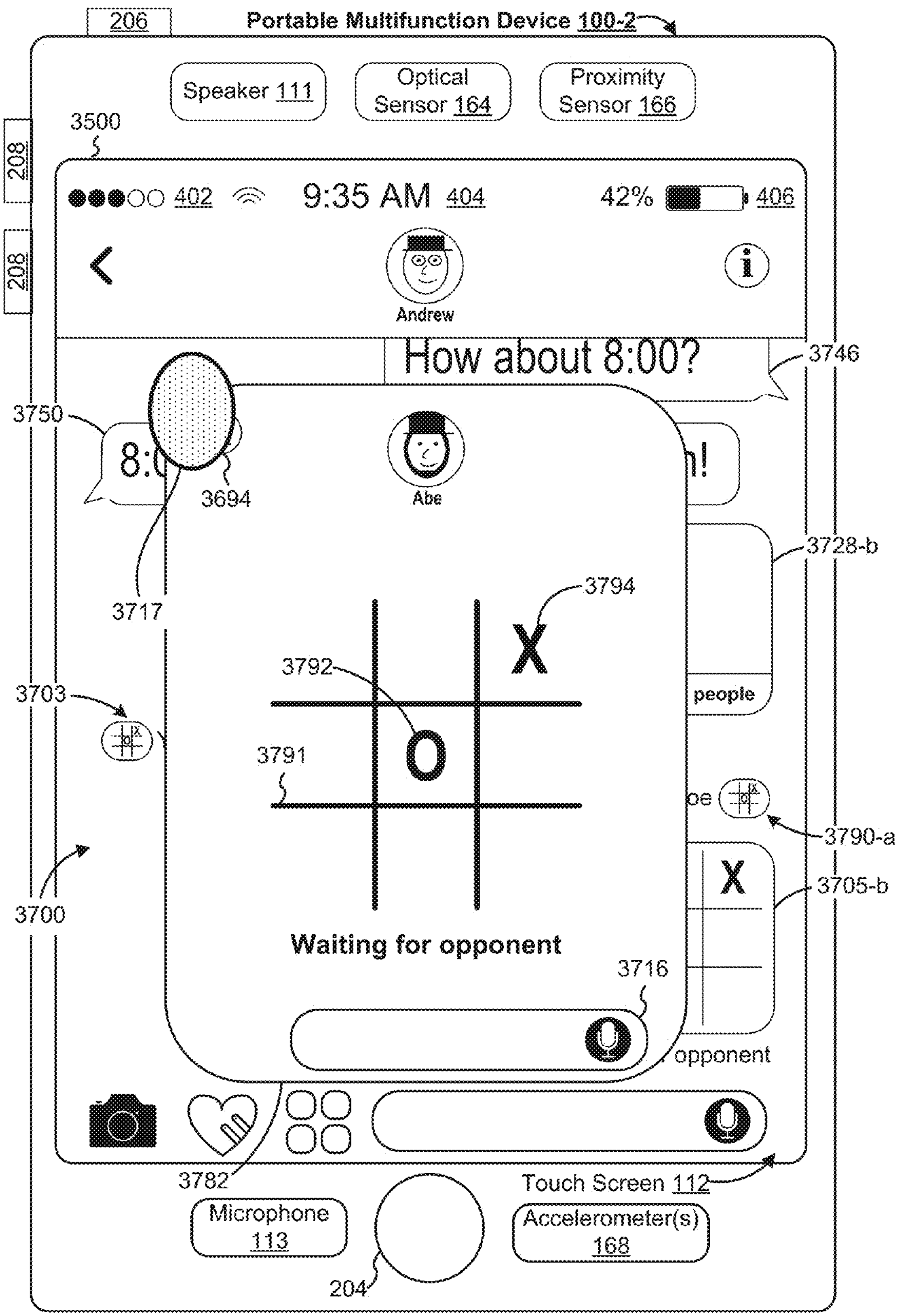
Figure 37B:
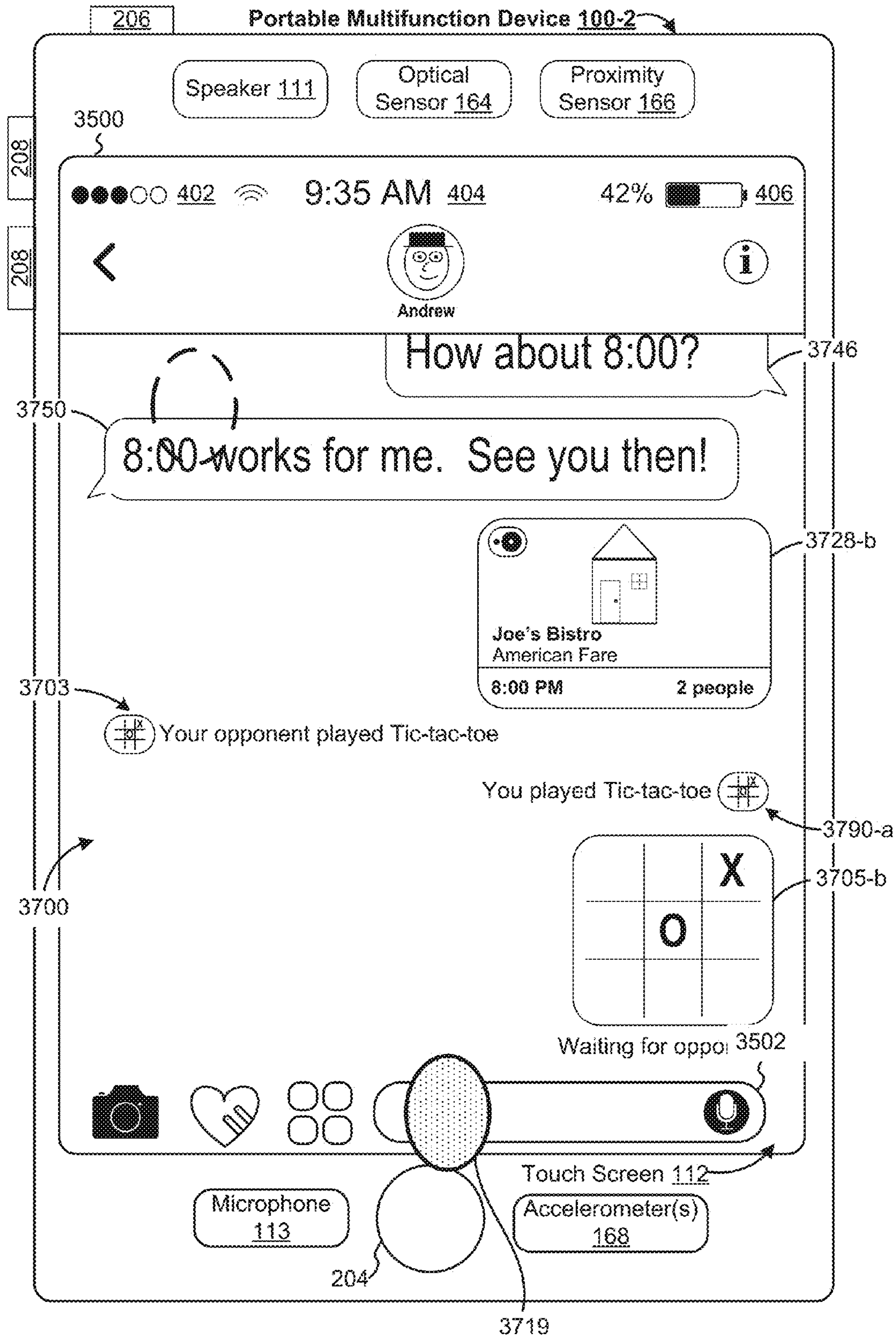
Figure 37B:
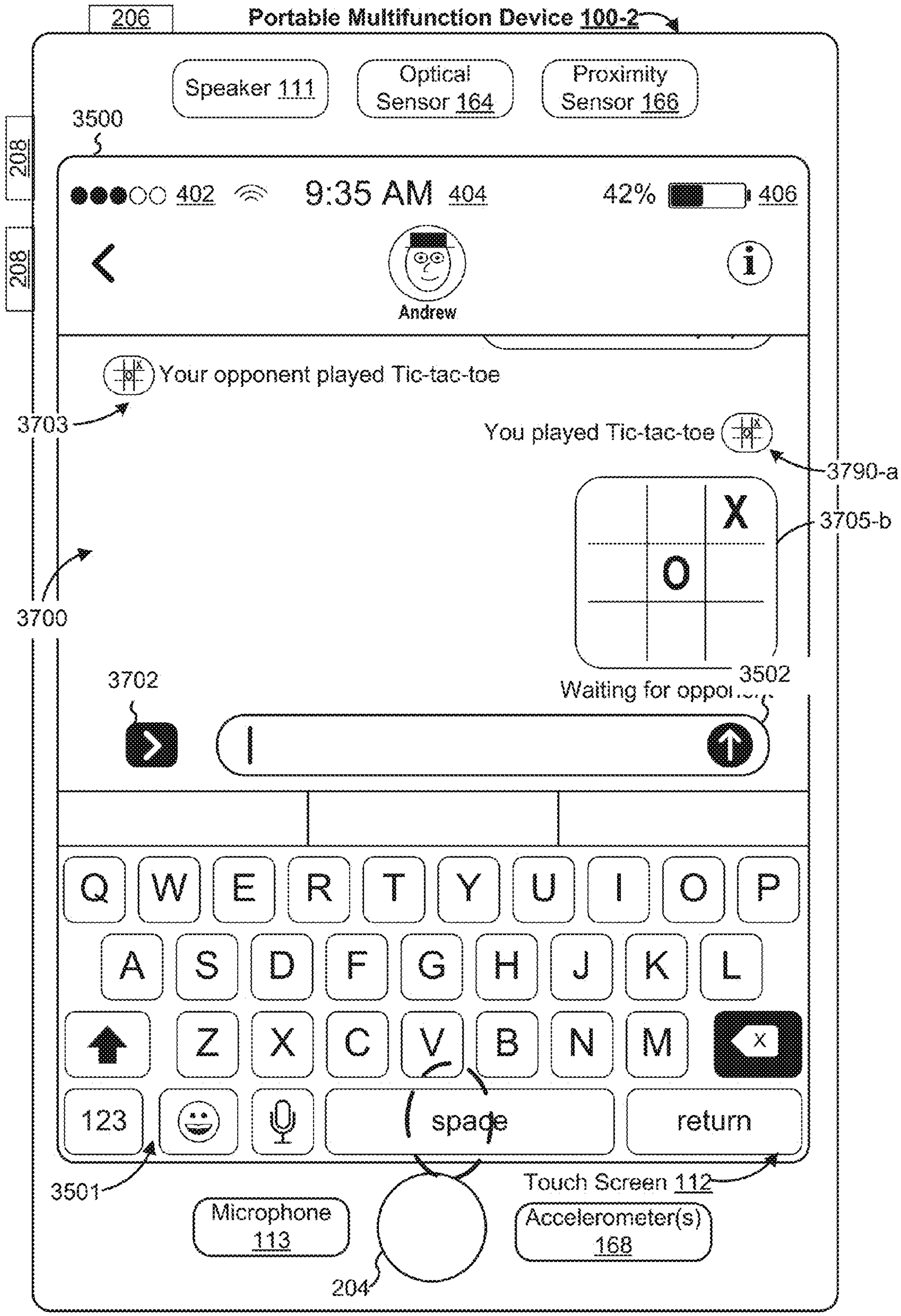
Figure 37B:
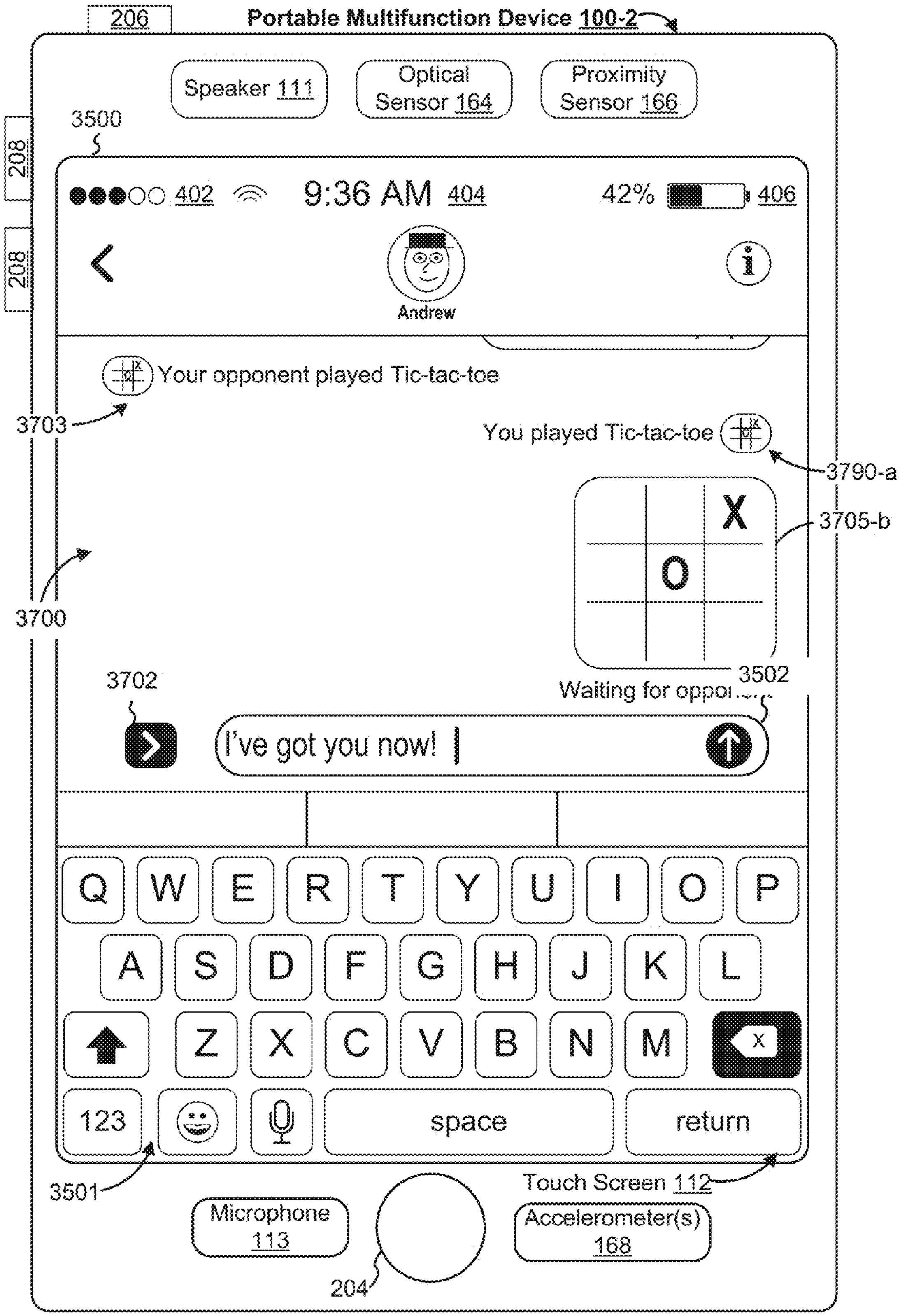
Figure 37B:
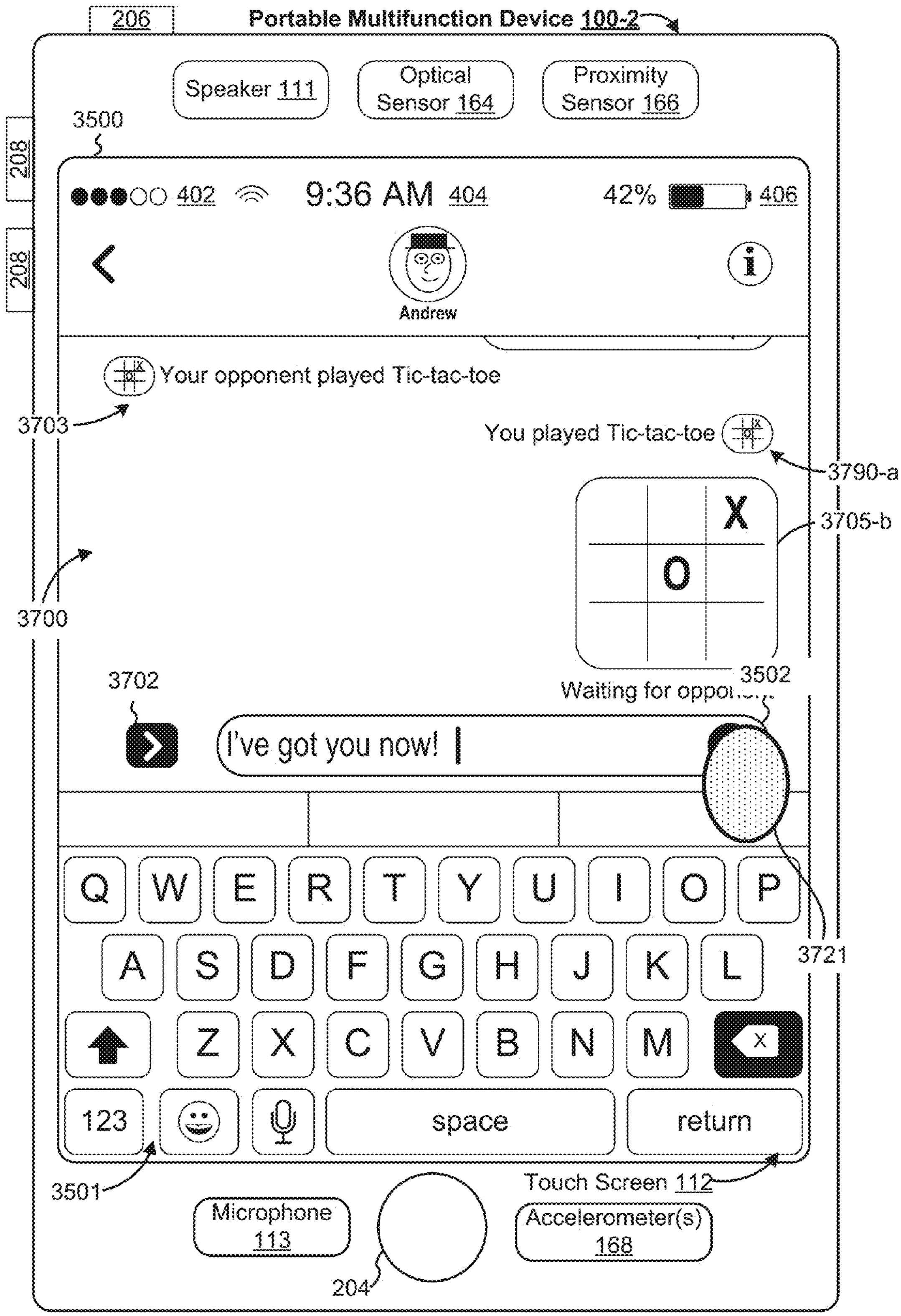
Figure 37B:
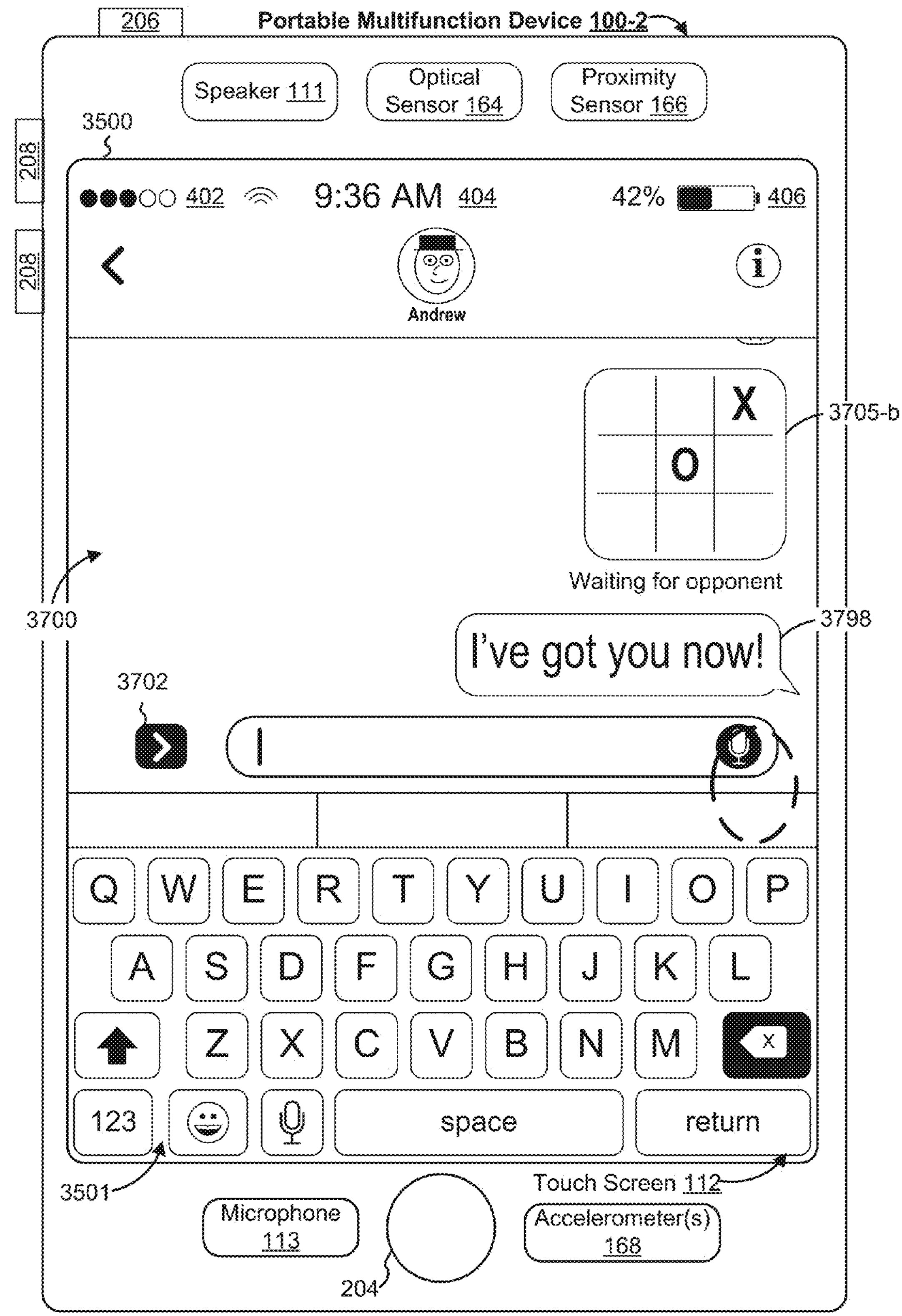
Figure 37B:
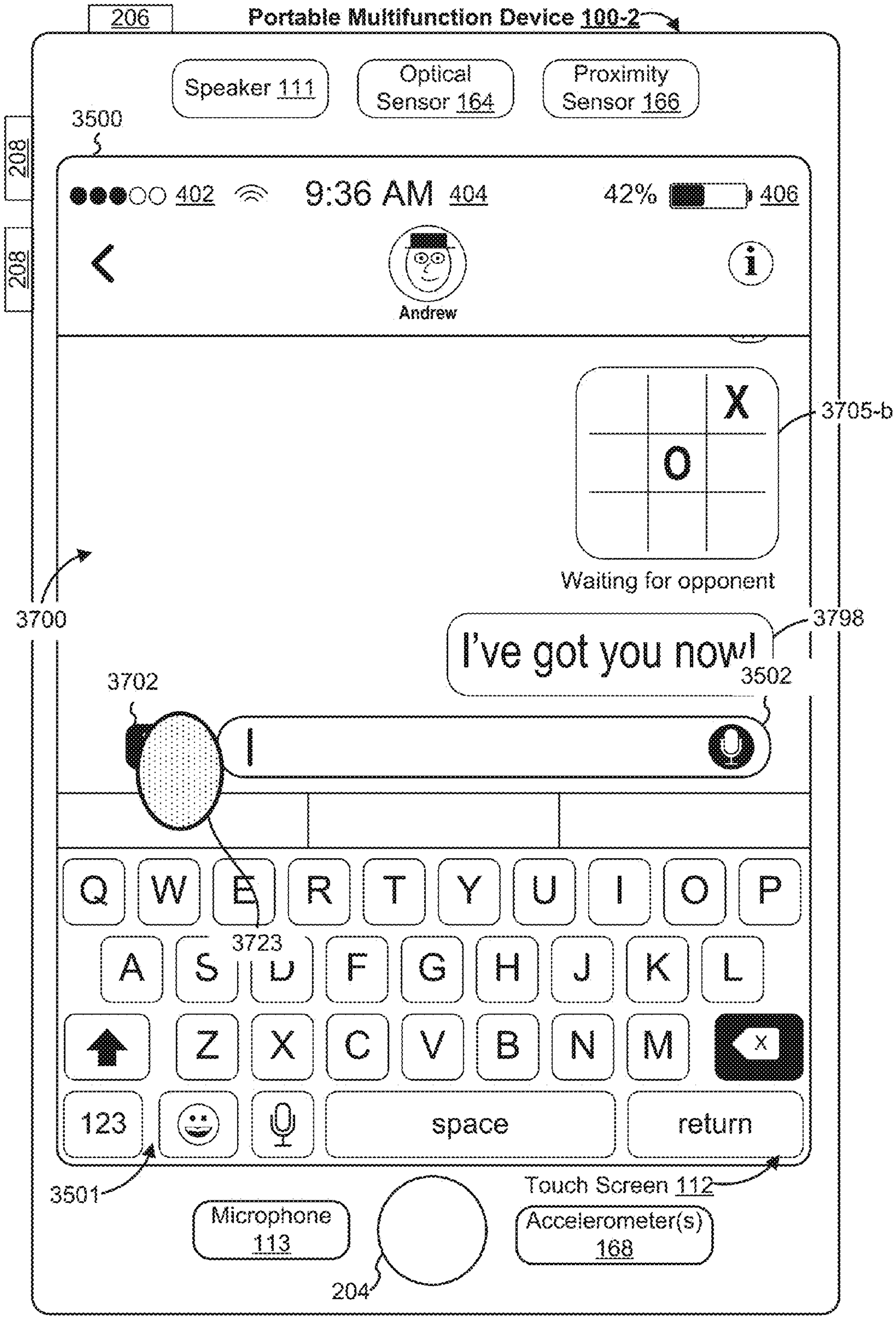
Figure 37B:
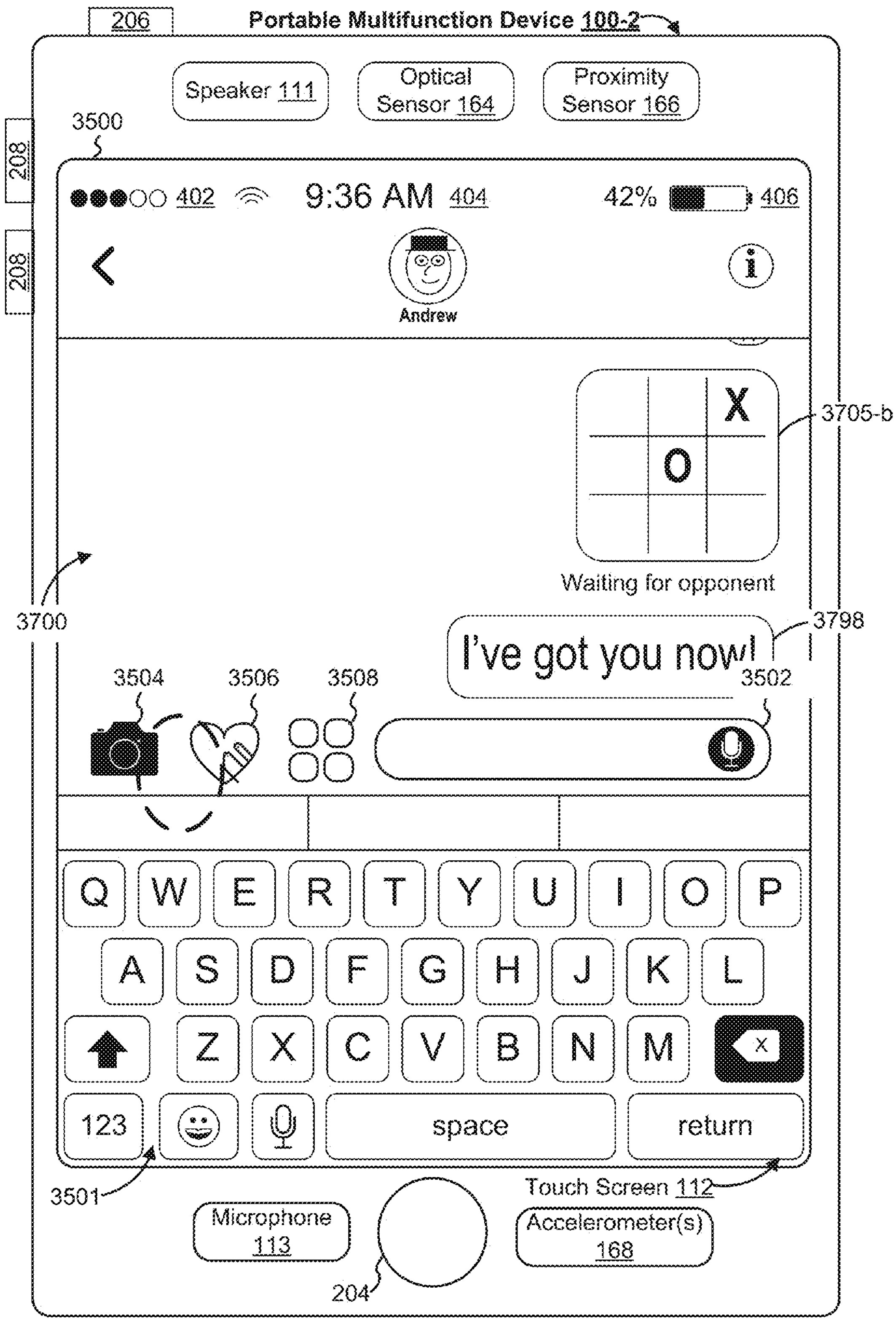
Figure 37B:
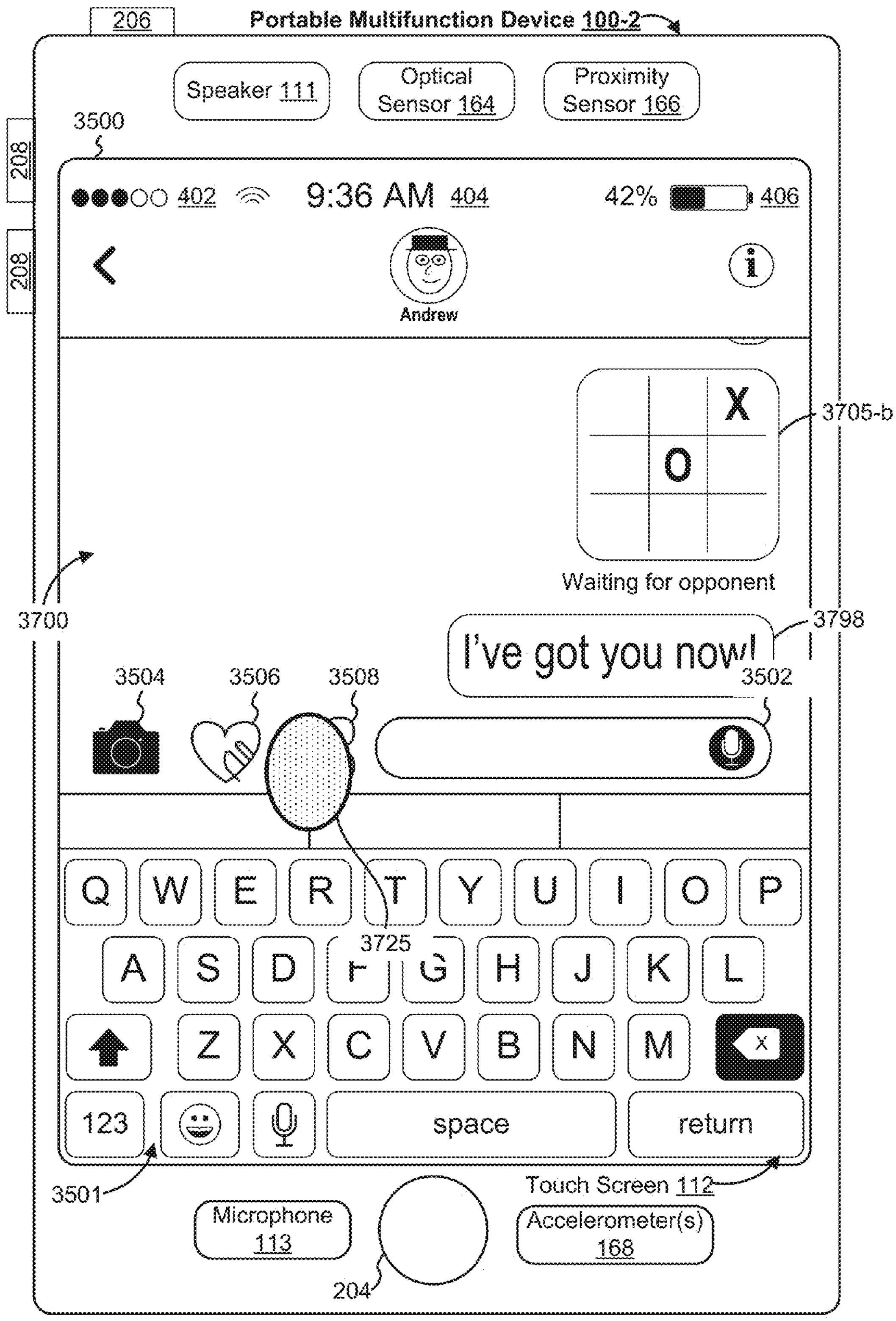
Figure 37B:
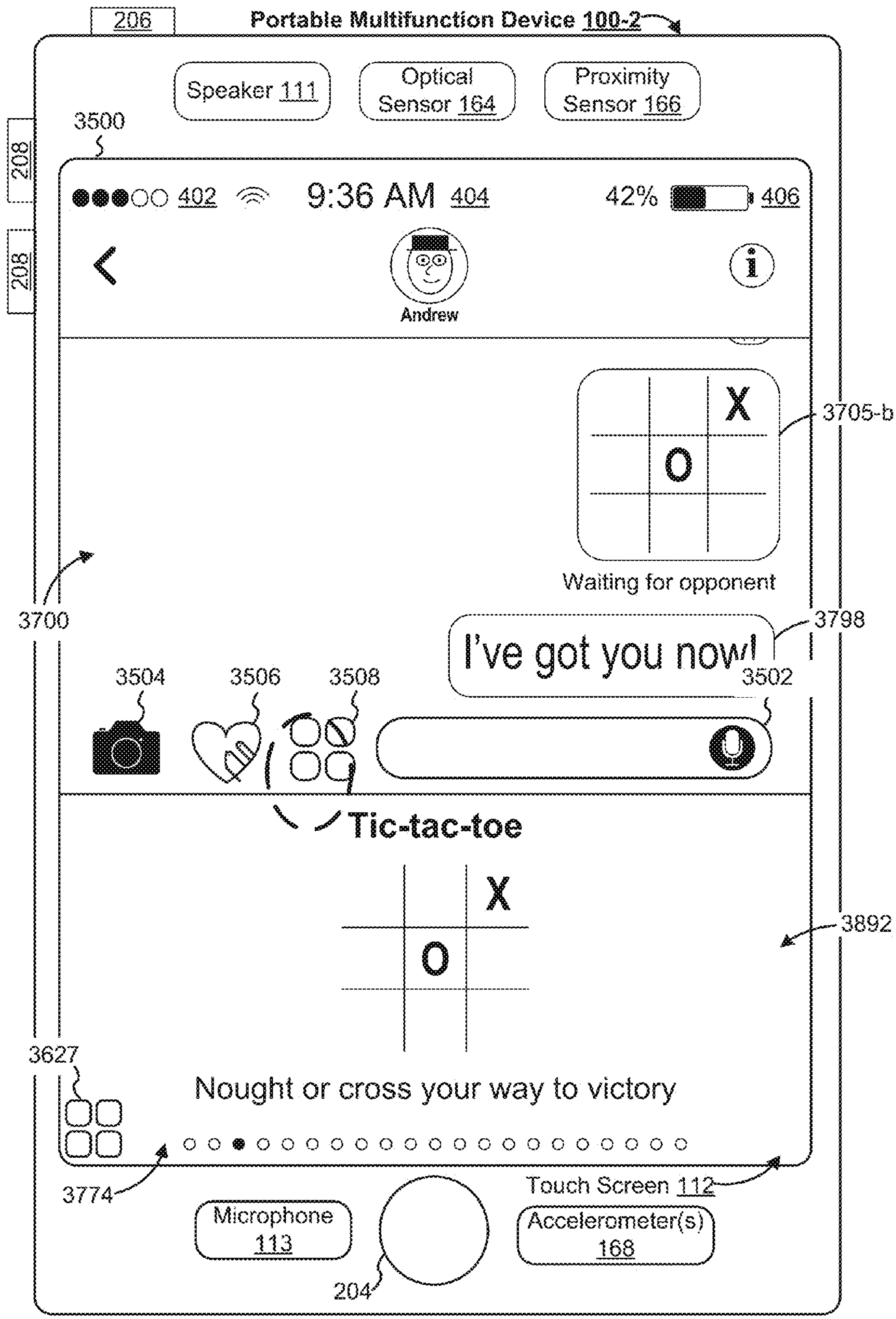
Figure 37B:
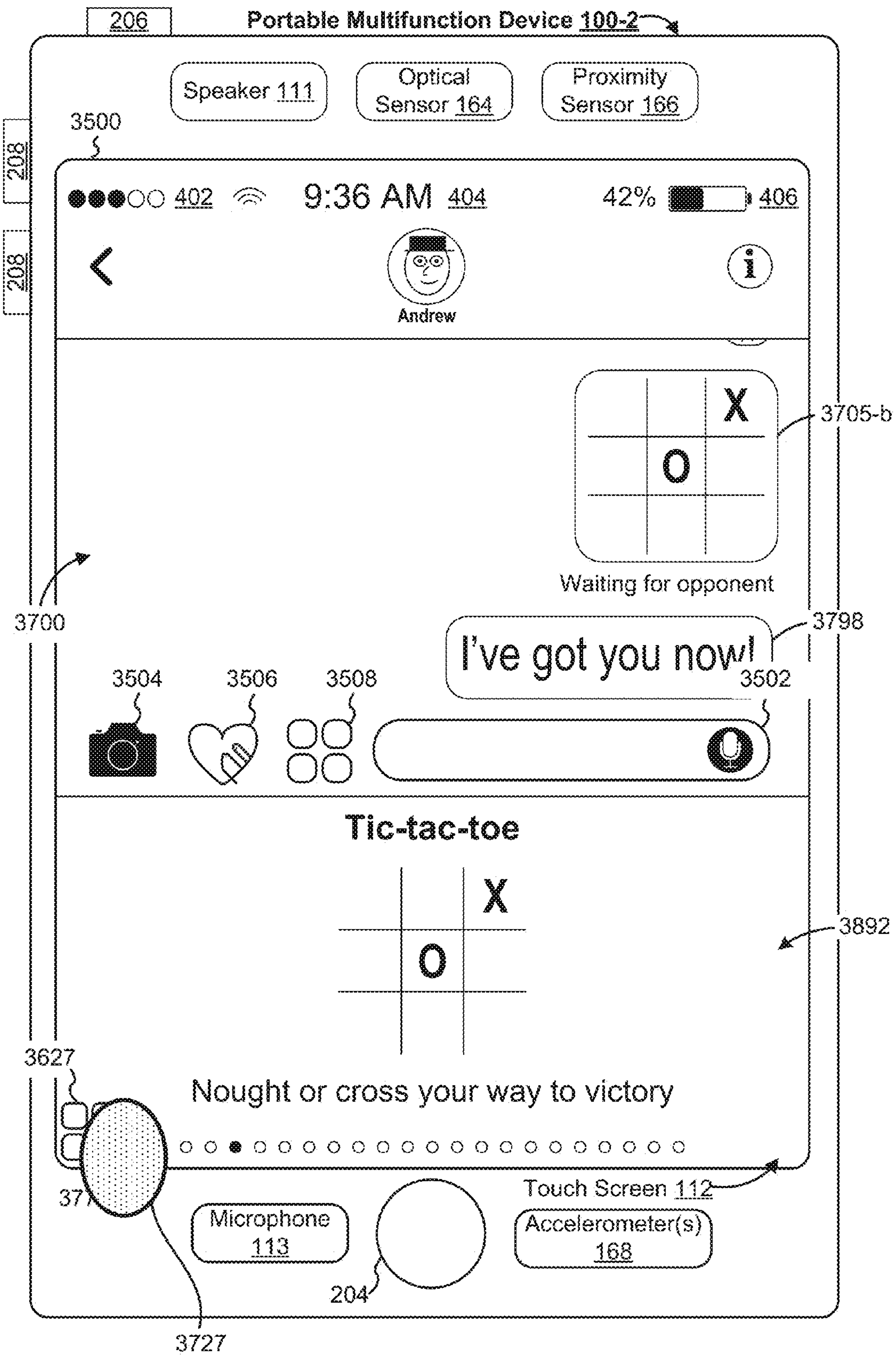
Figure 37B:
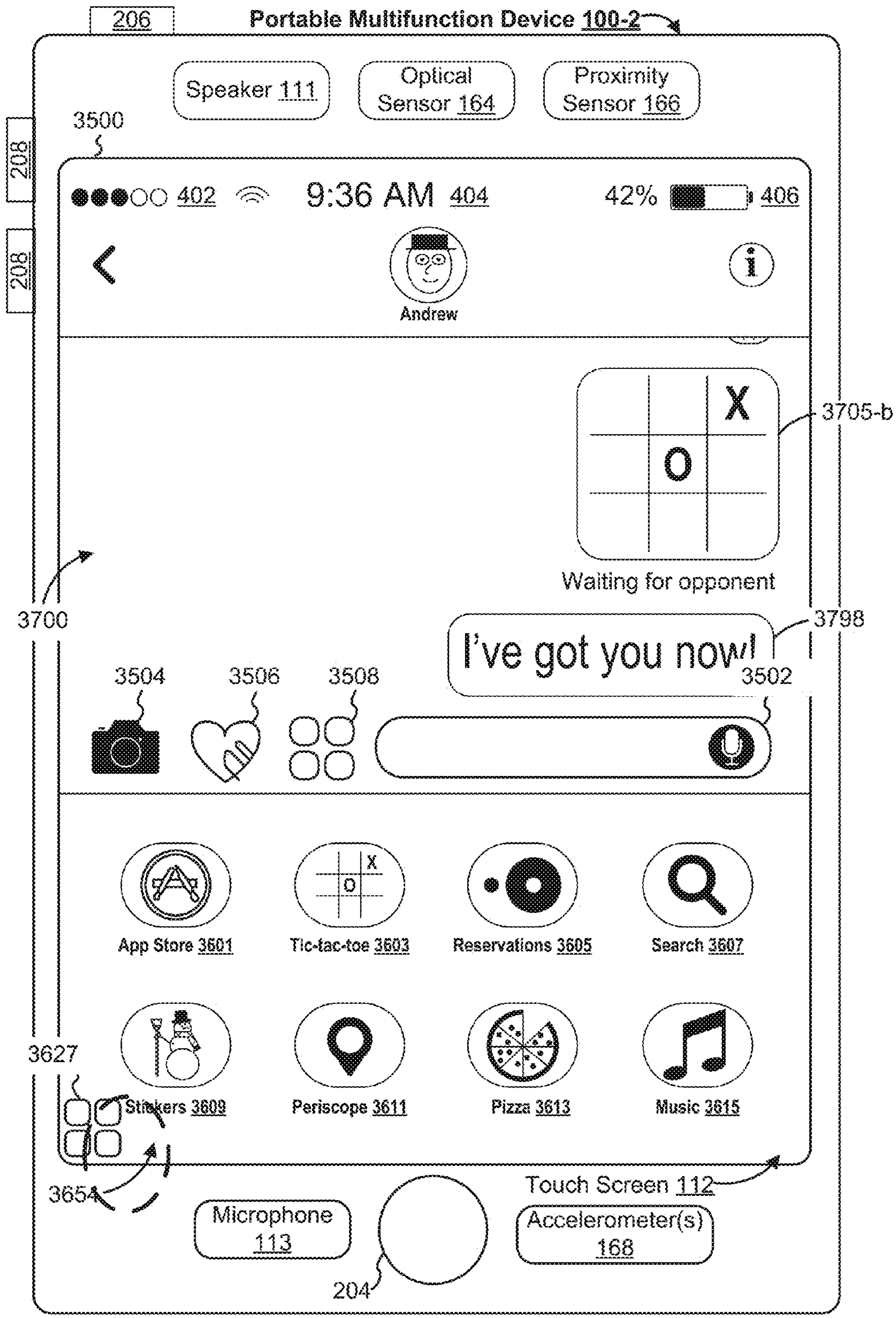
Figure 37B:
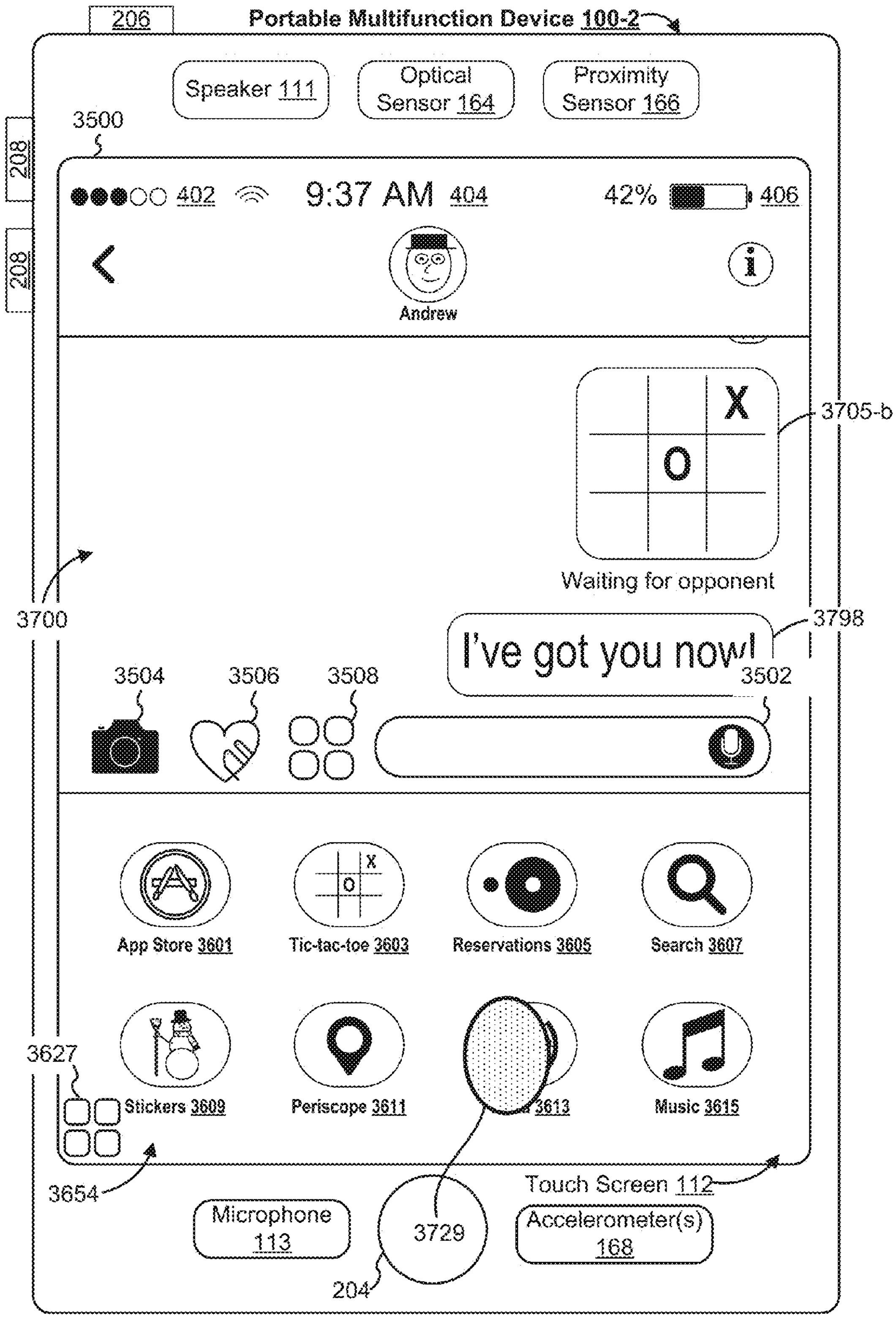
Figure 37C:
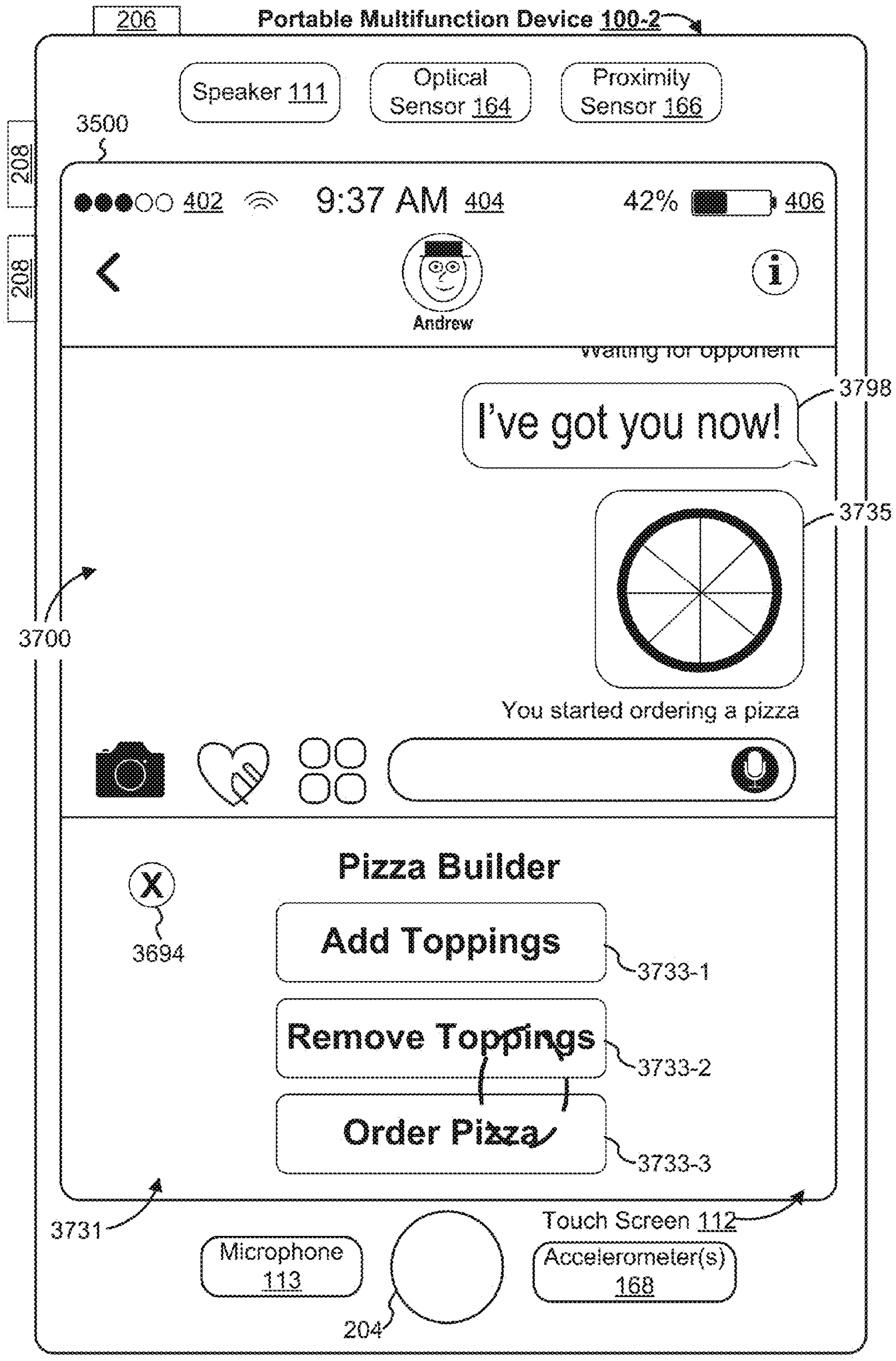
Figure 37C:
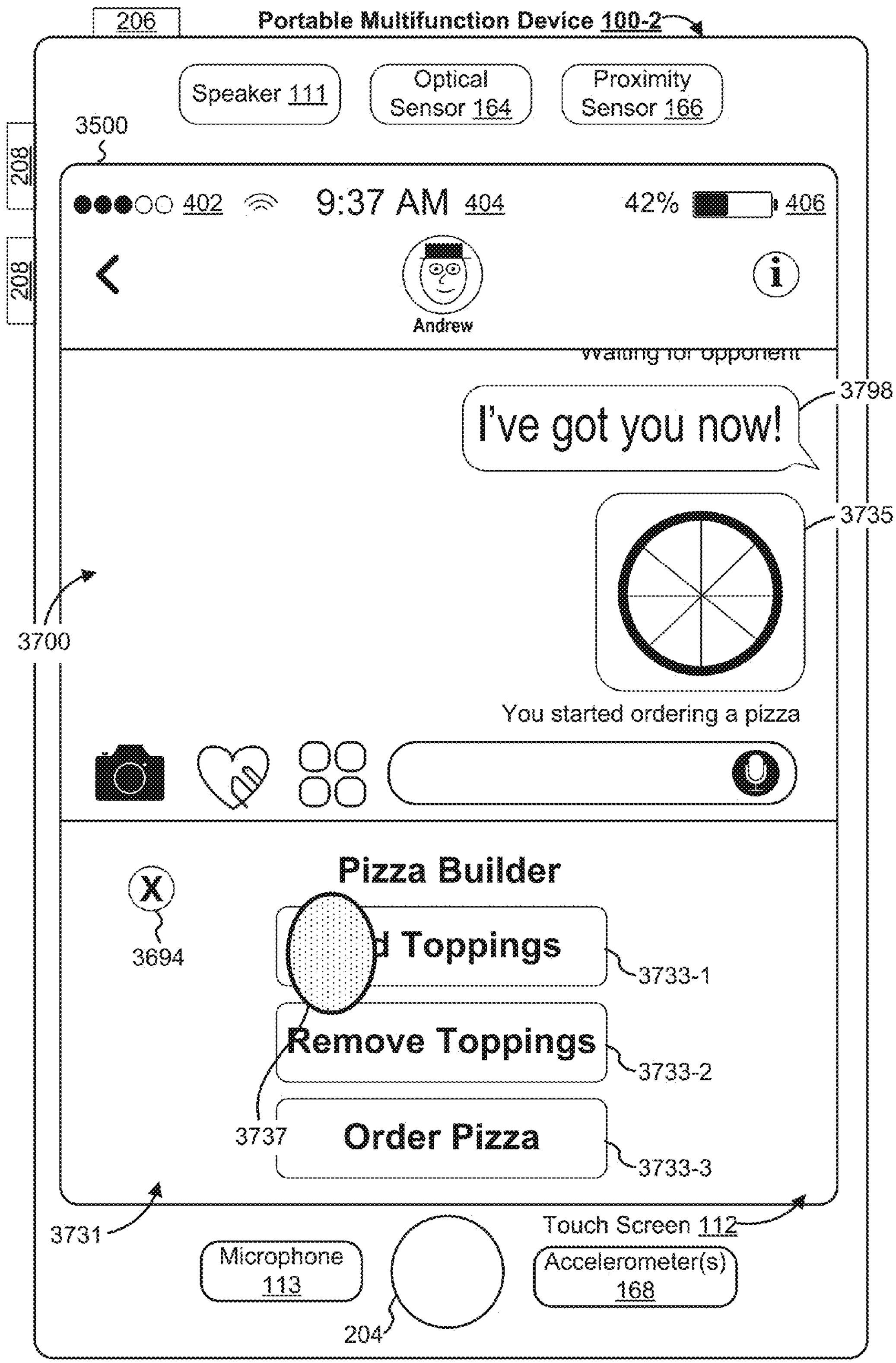
Figure 37C:
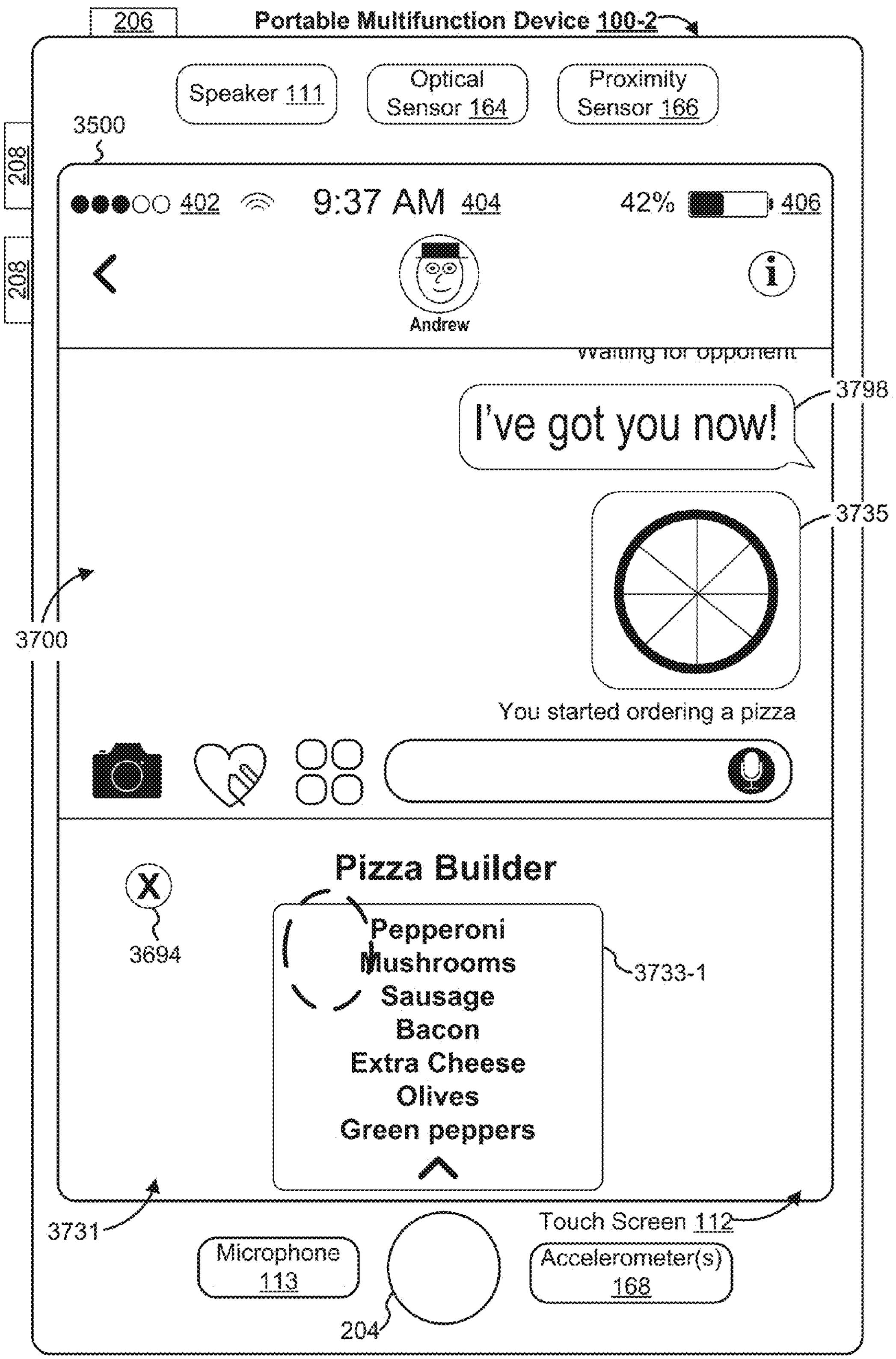
Figure 37C:
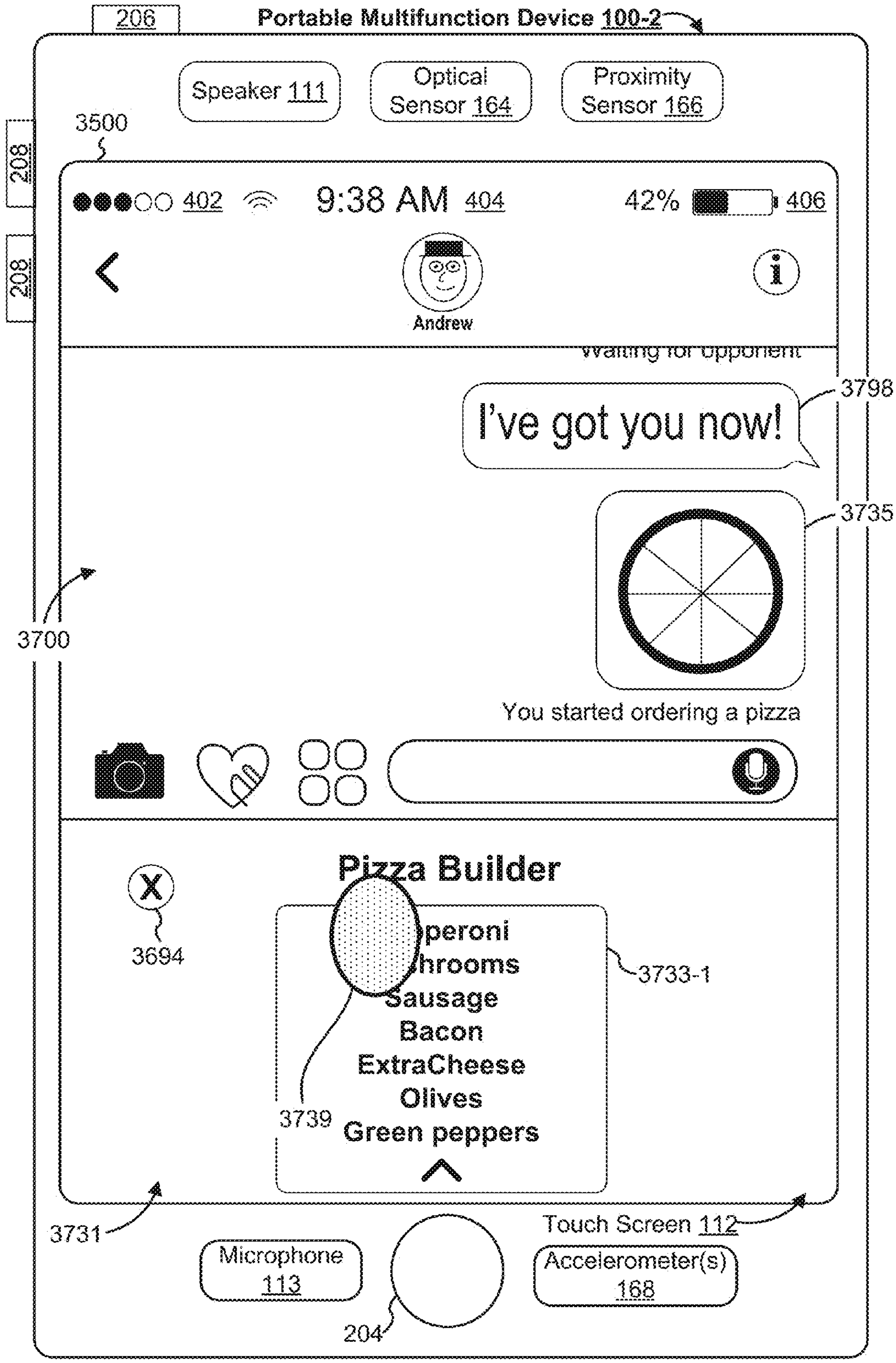
Figure 37C:
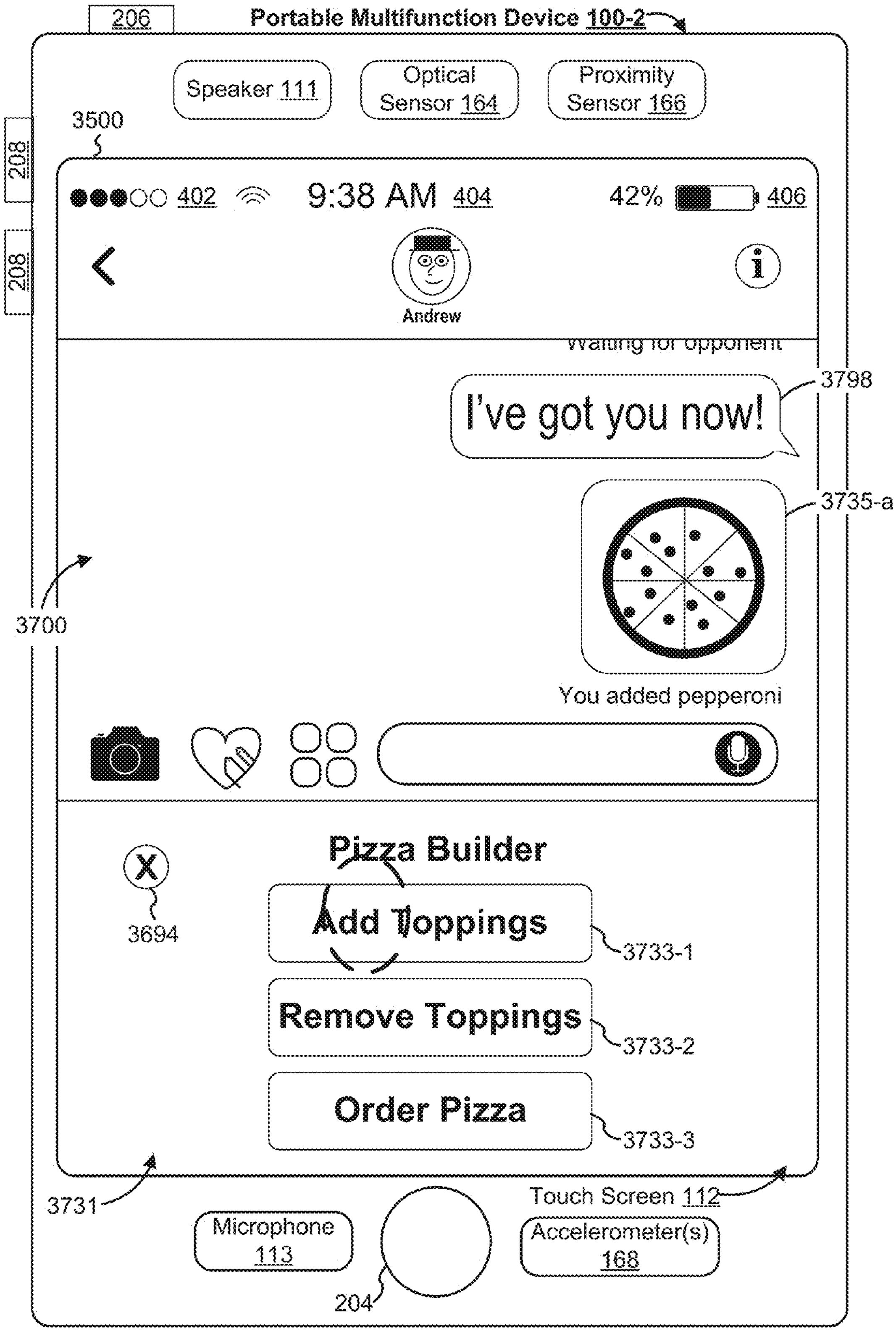
Figure 37C:
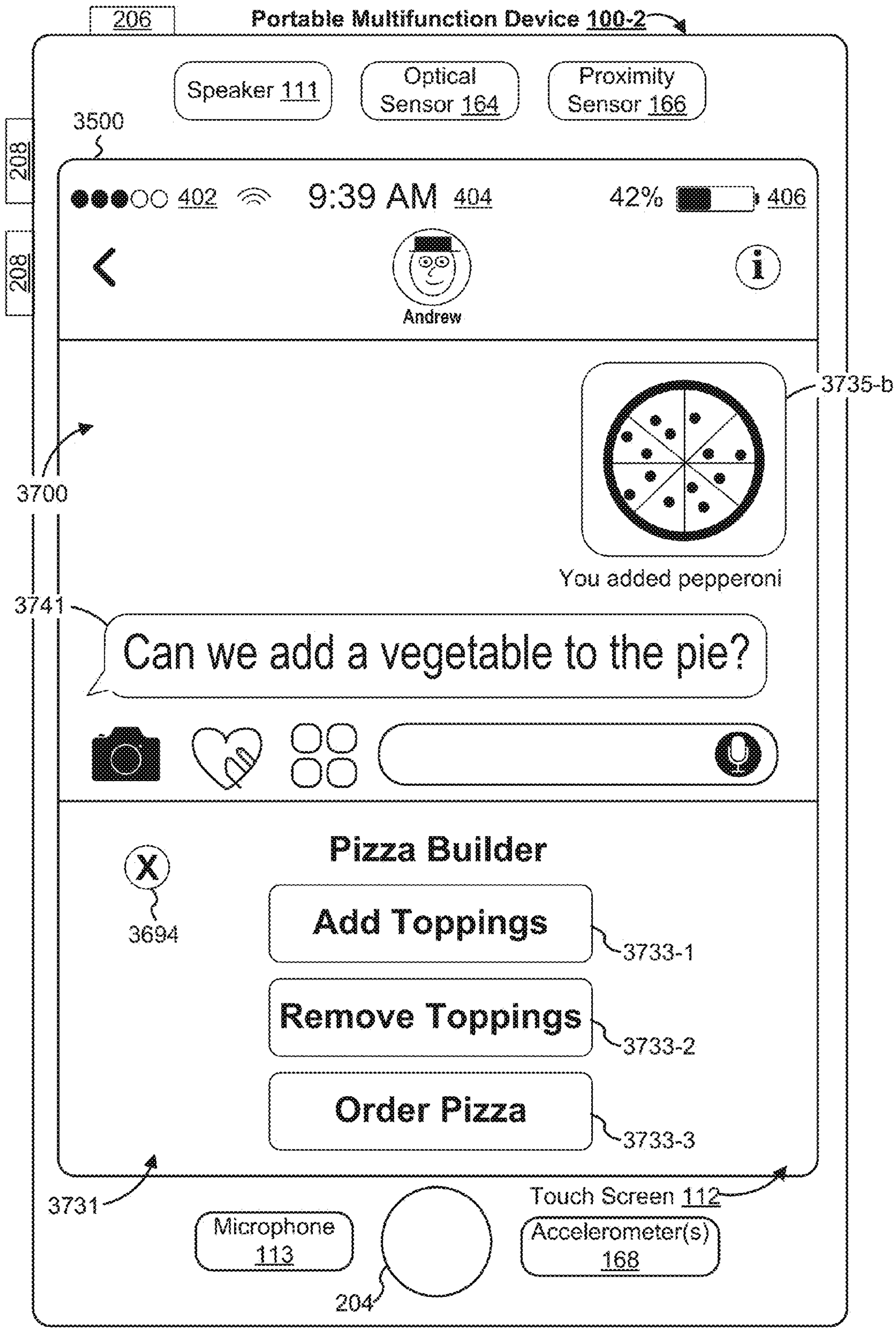
Figure 37C:
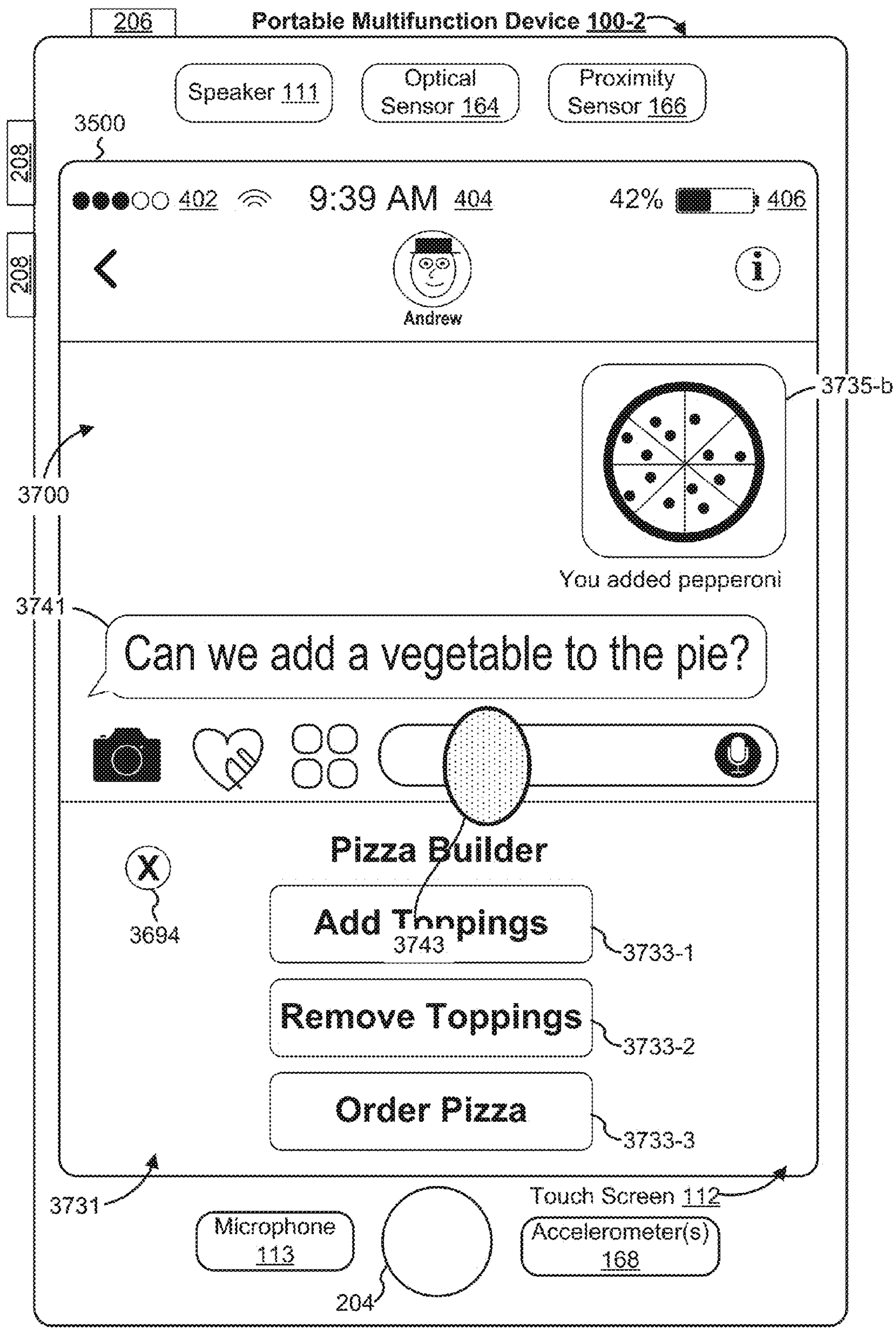
Figure 37C:
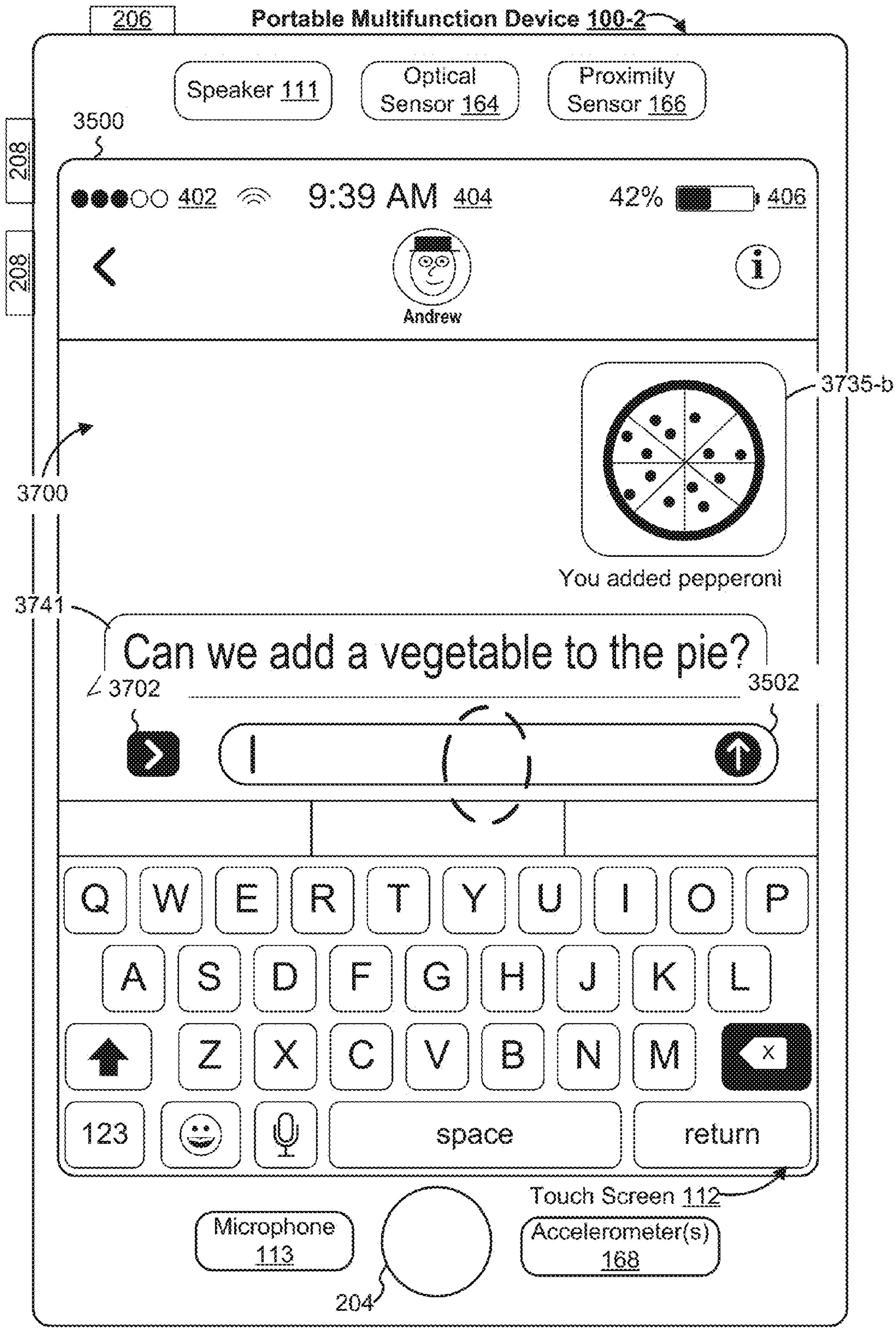
Figure 37C:
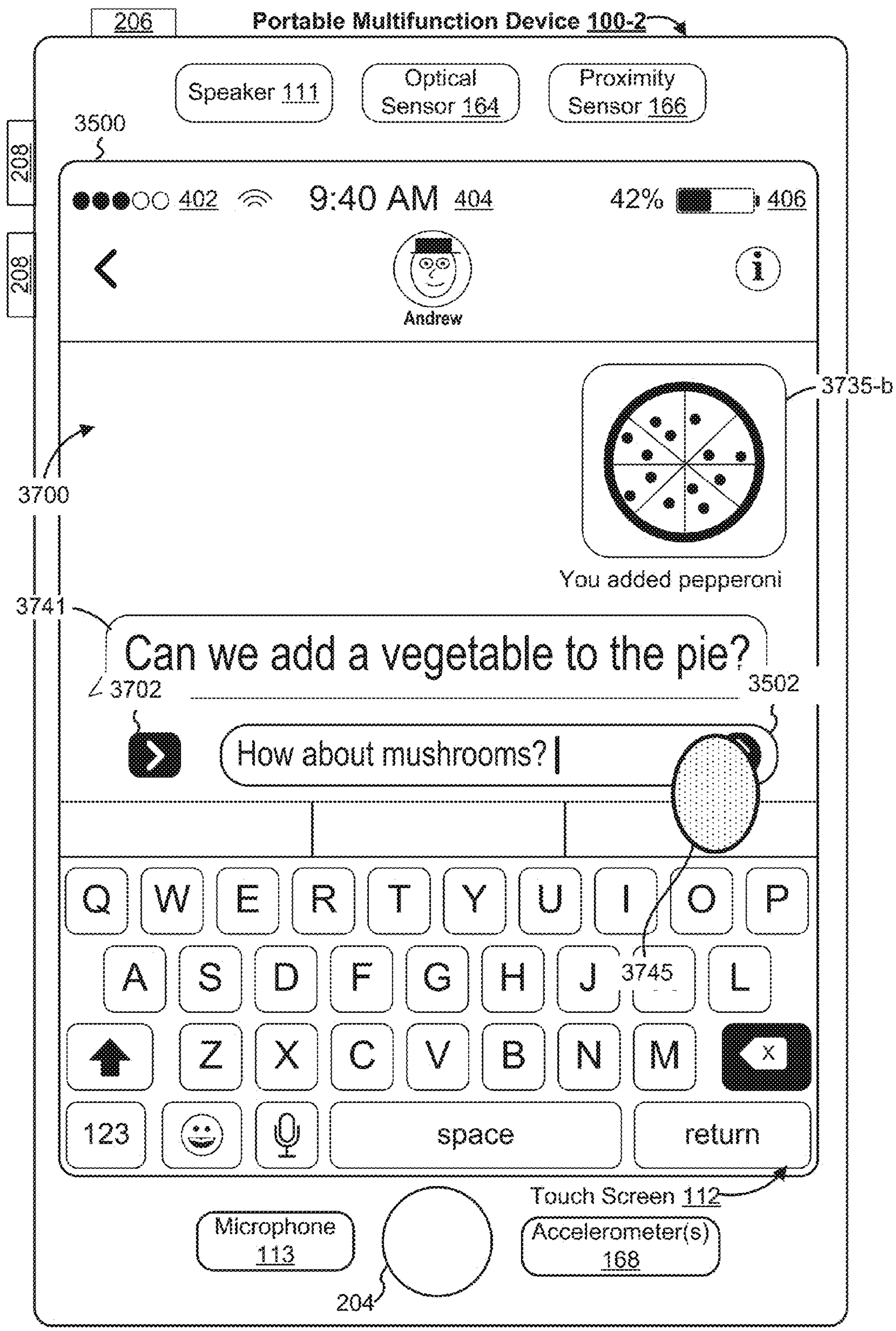
Figure 37C:
Figure 37C:
Figure 37C:
Figure 37C:
Figure 37C:
Figure 37C:
Figure 37C:
Figure 37C:
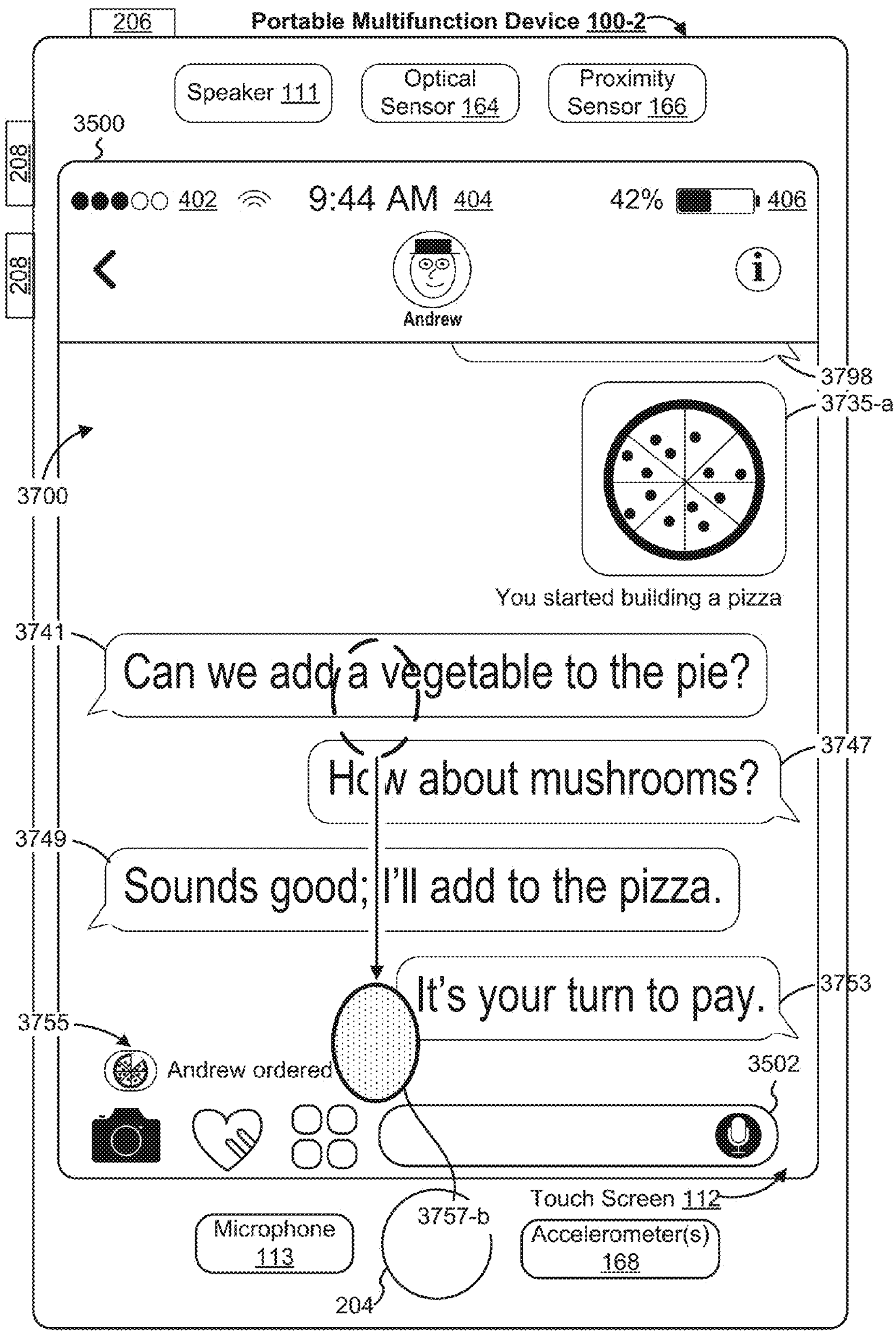
Figure 37C:
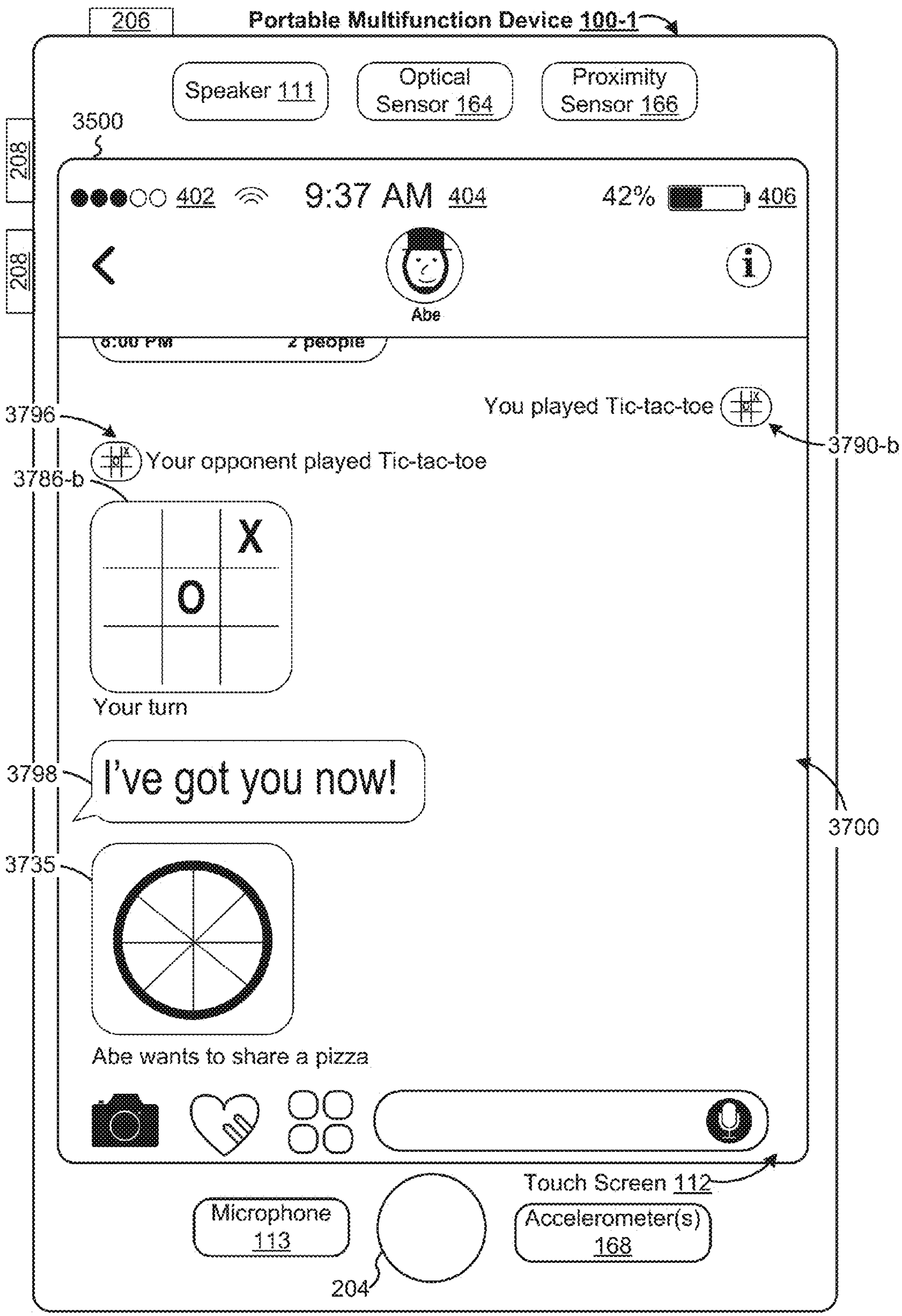
Figure 37C:
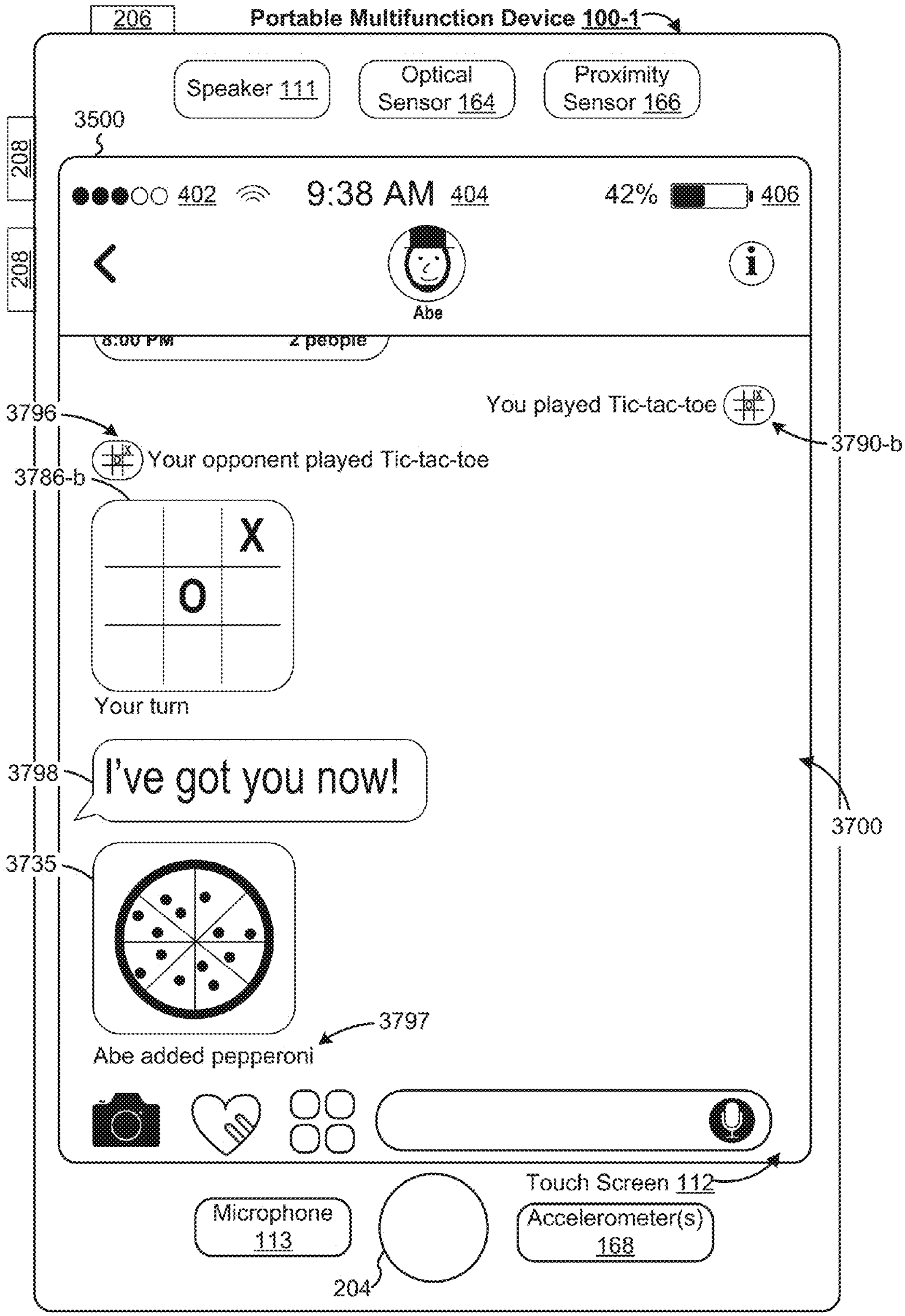
Figure 37C:
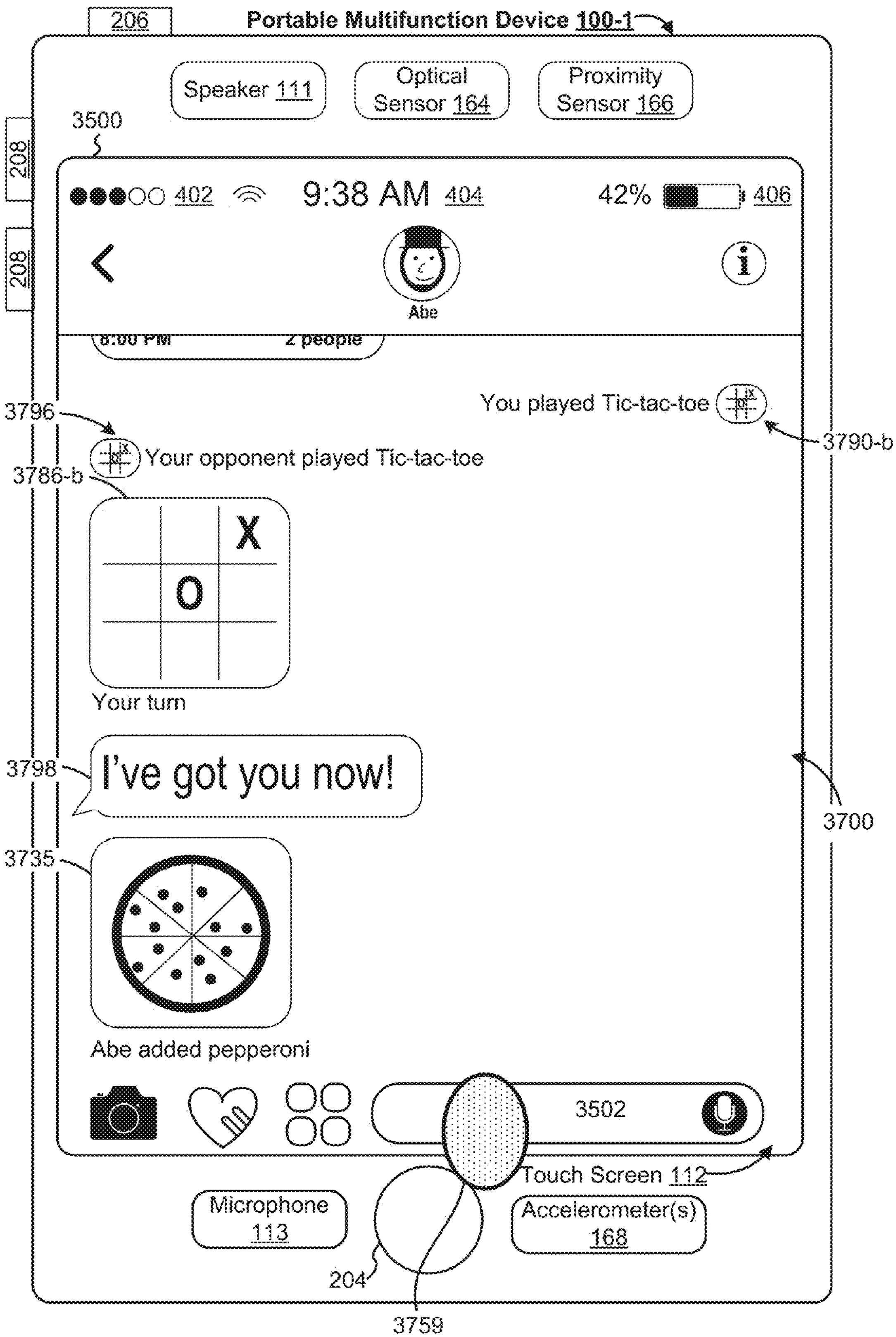
Figure 37C:
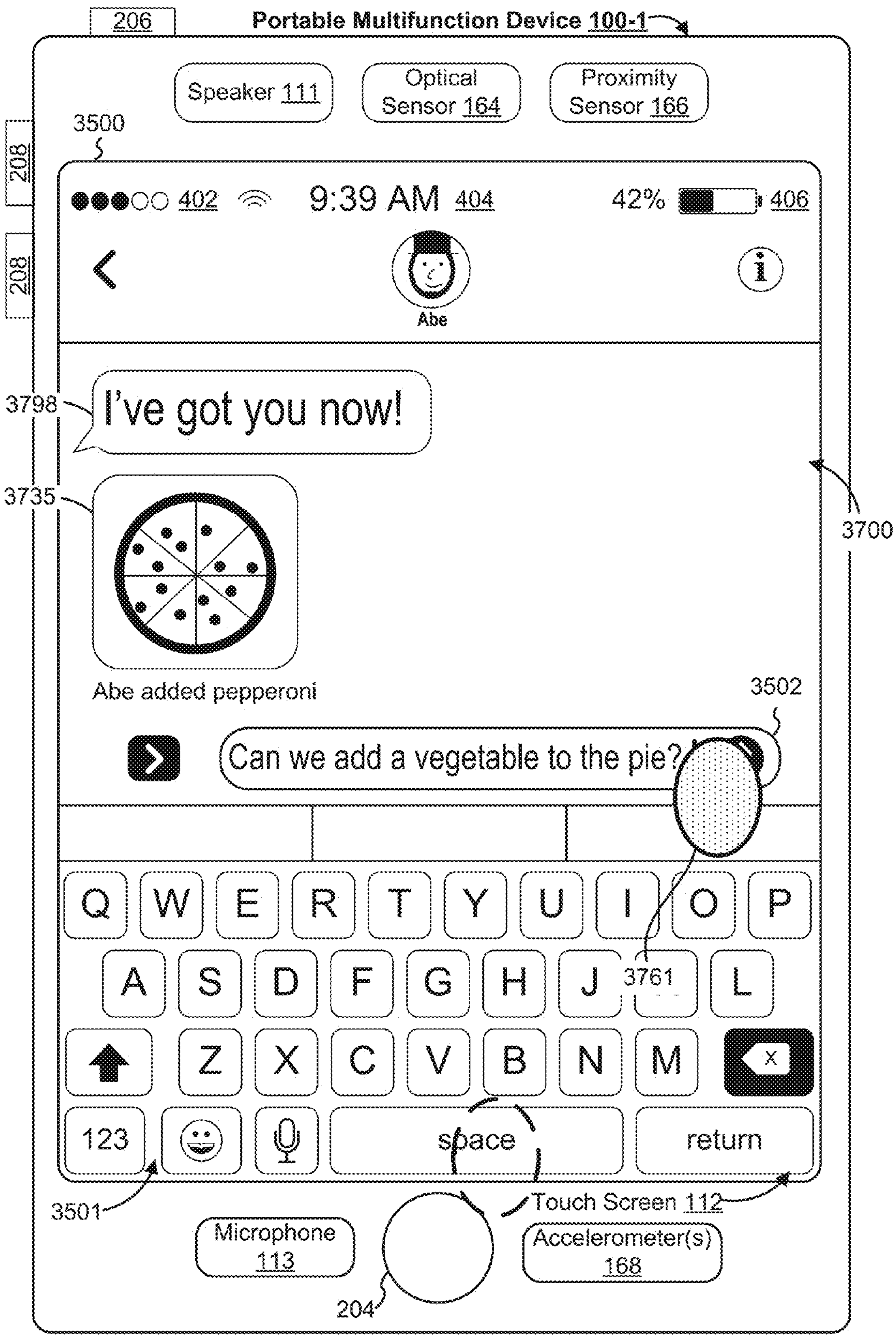
Figure 37C:
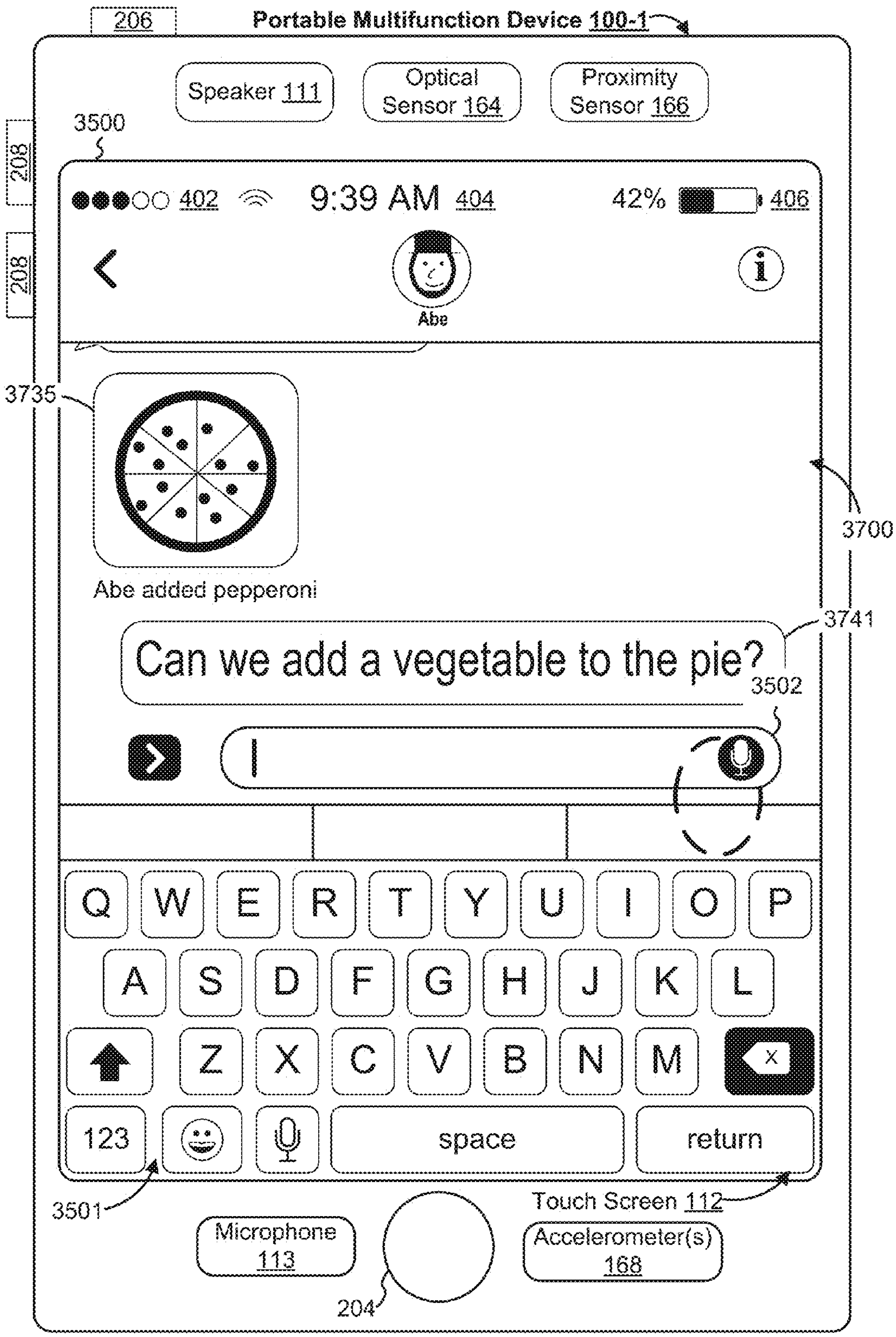
Figure 37C:
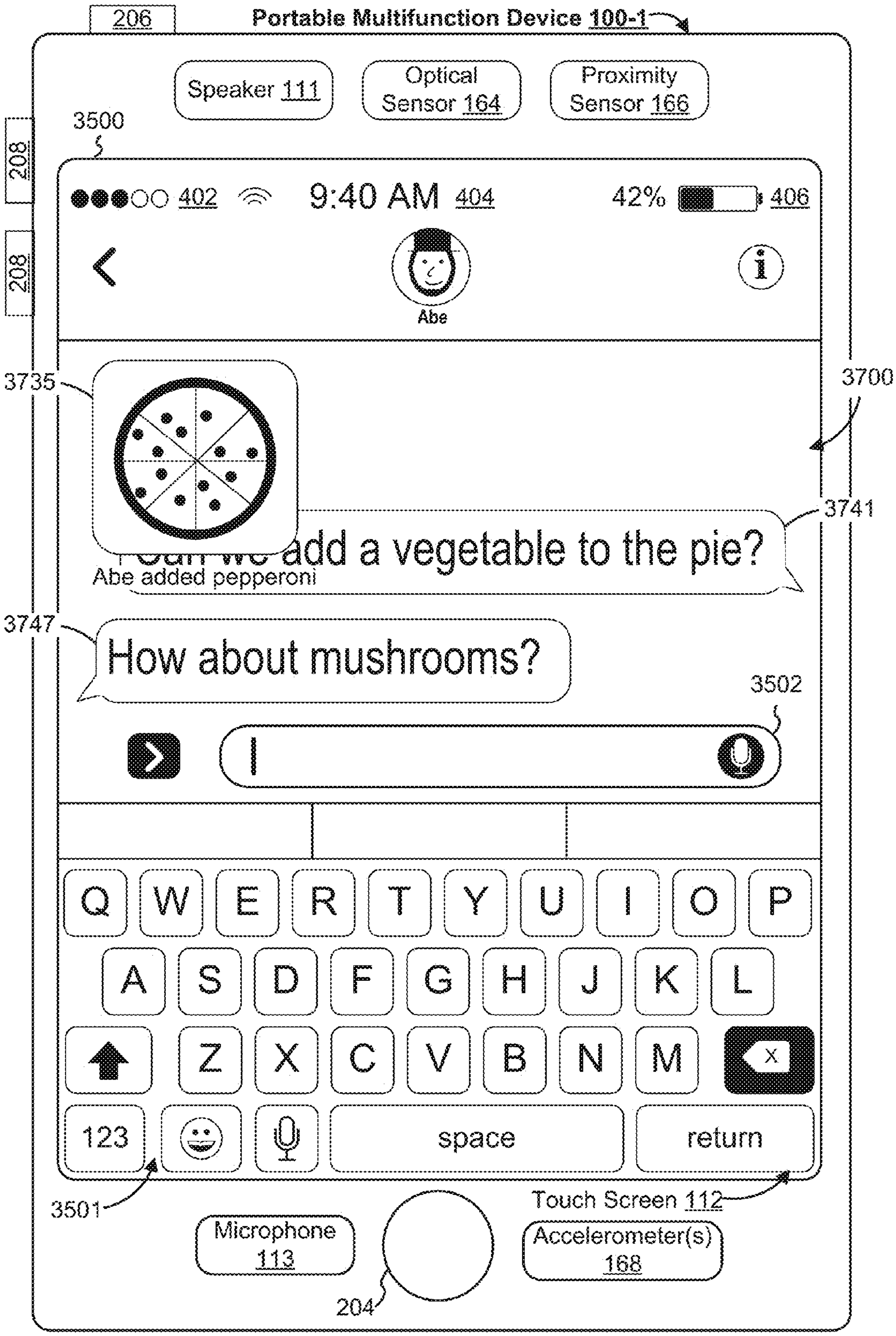
Figure 37C:
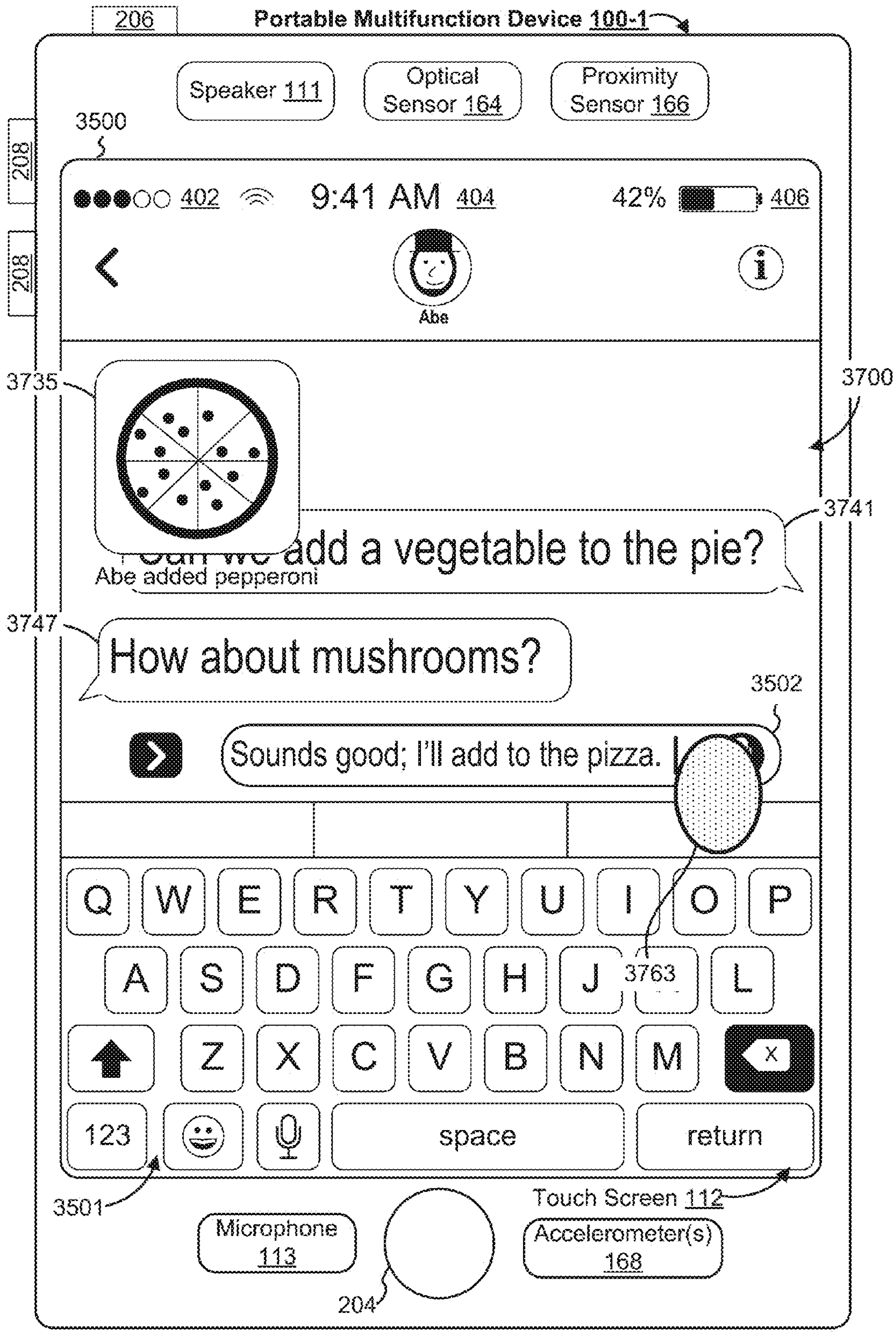
Figure 37C:
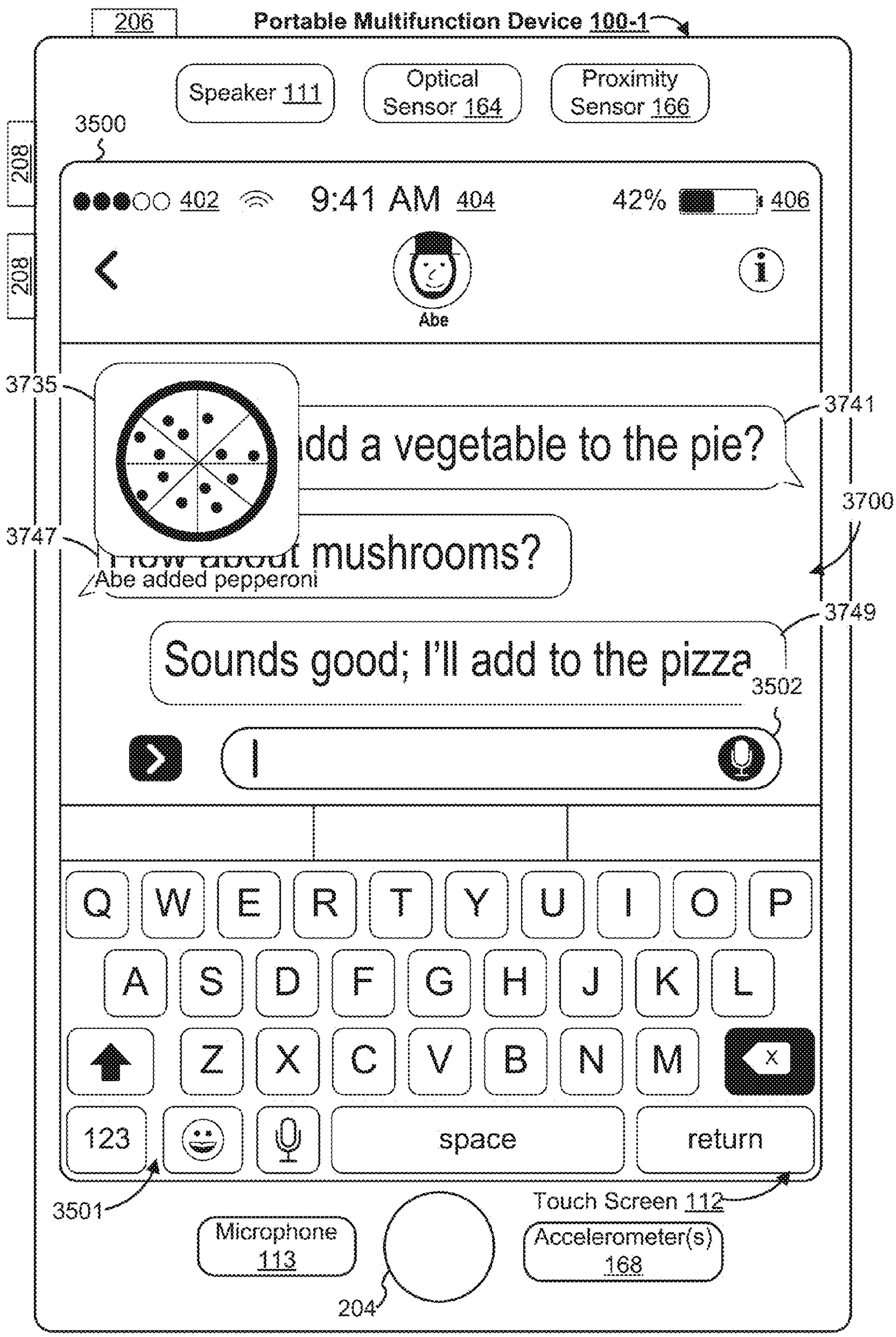
Figure 37C:
Figure 37D:
Figure 37D:
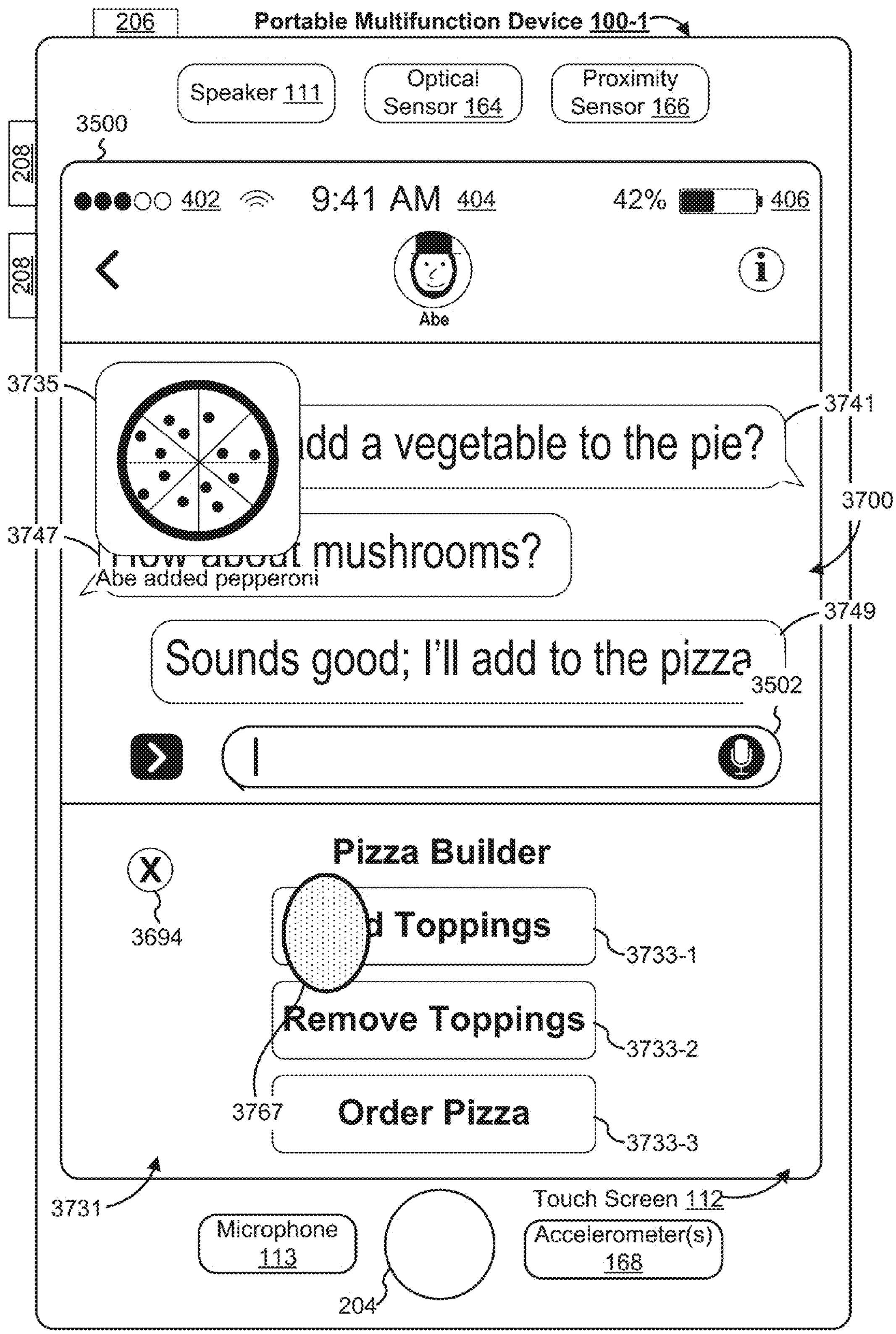
Figure 37D:
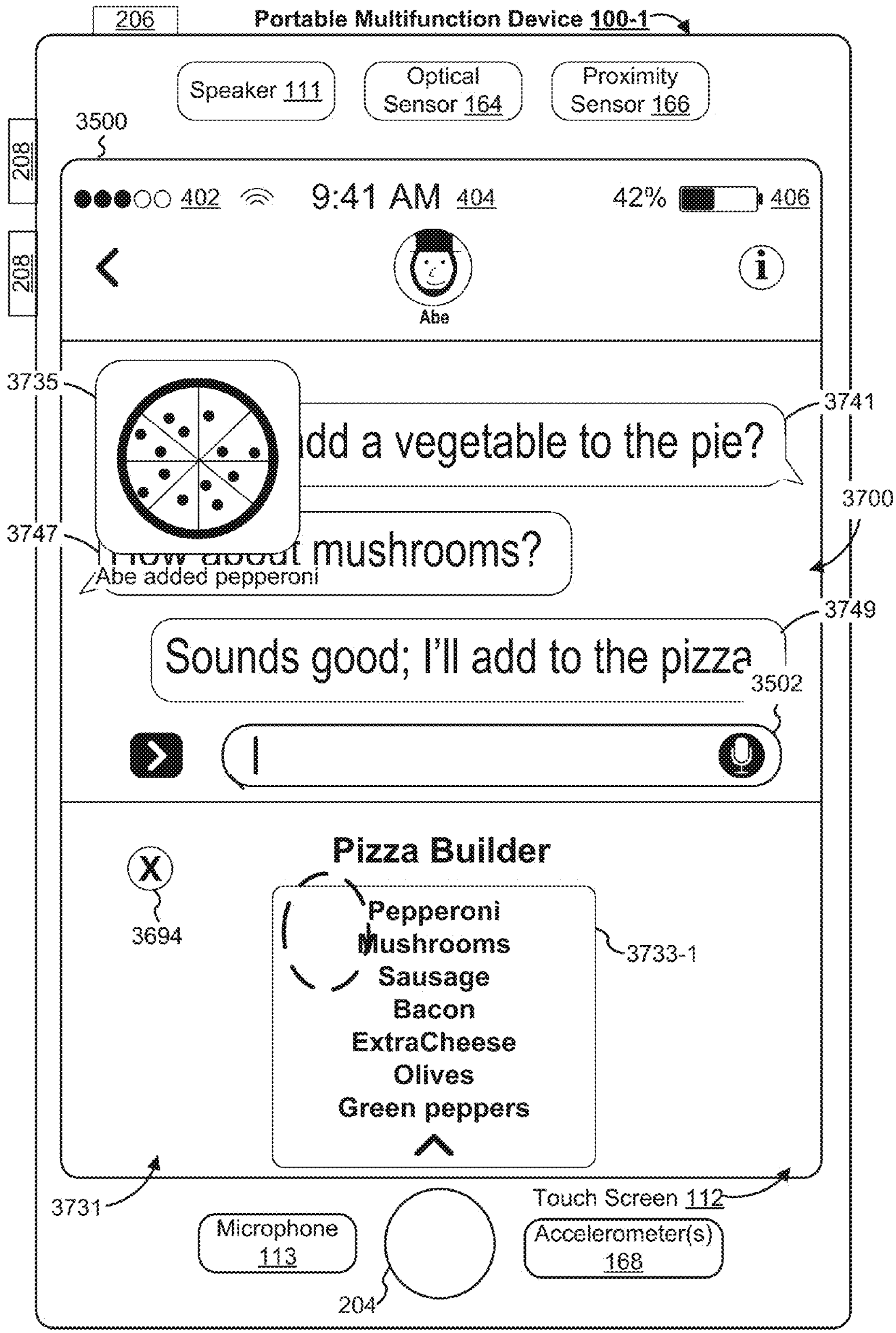
Figure 37D:
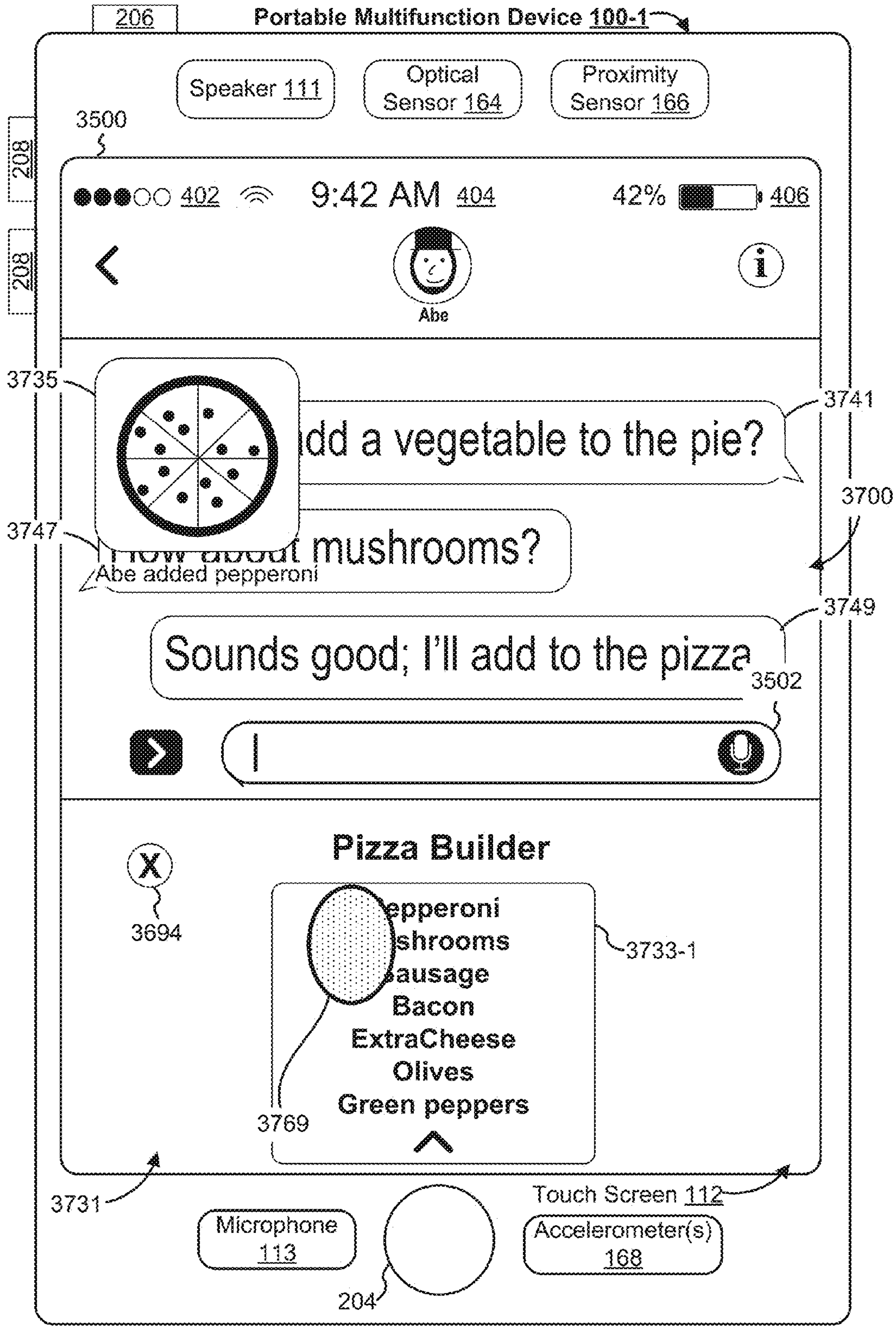
Figure 37D:
Figure 37D:
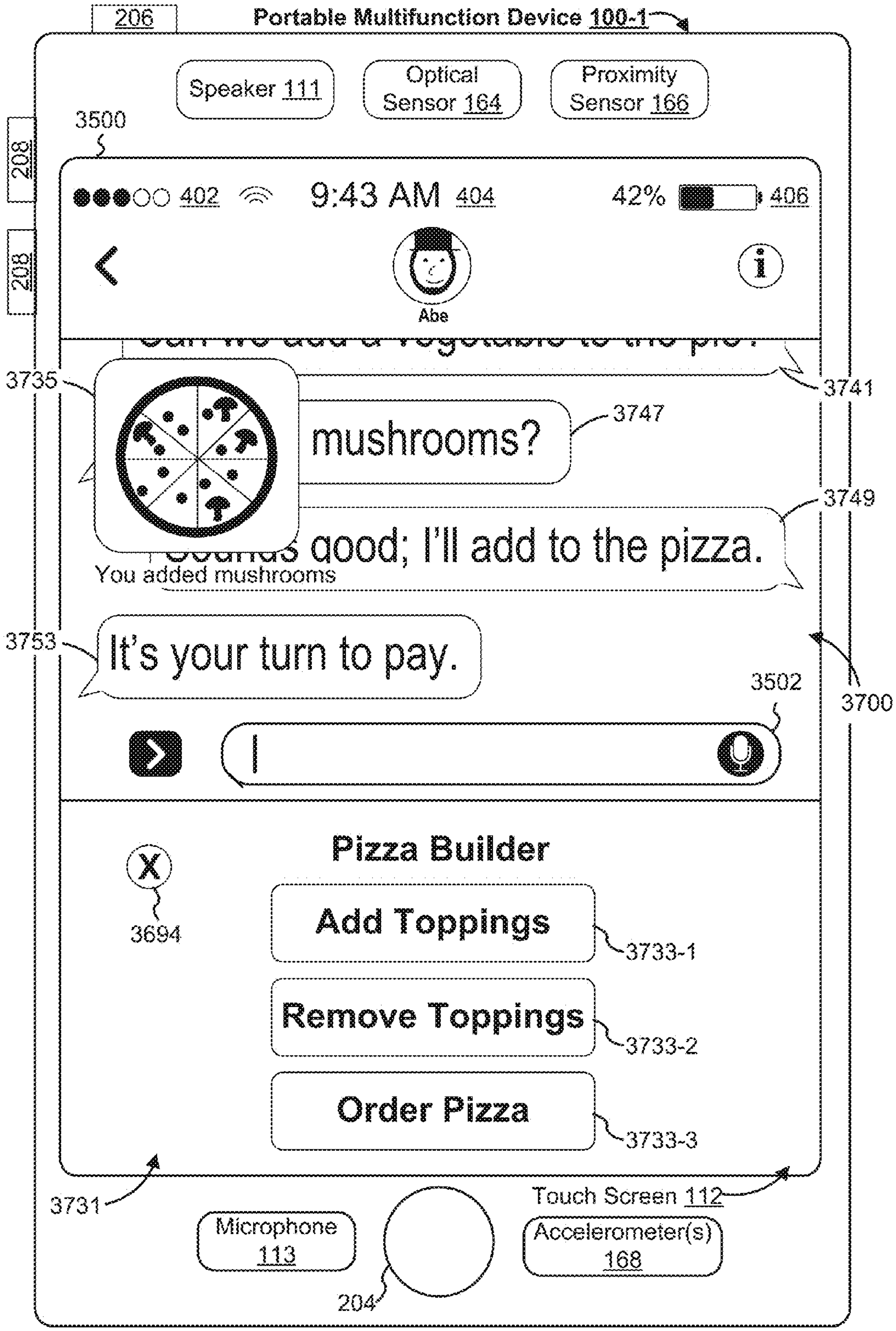
Figure 37D:
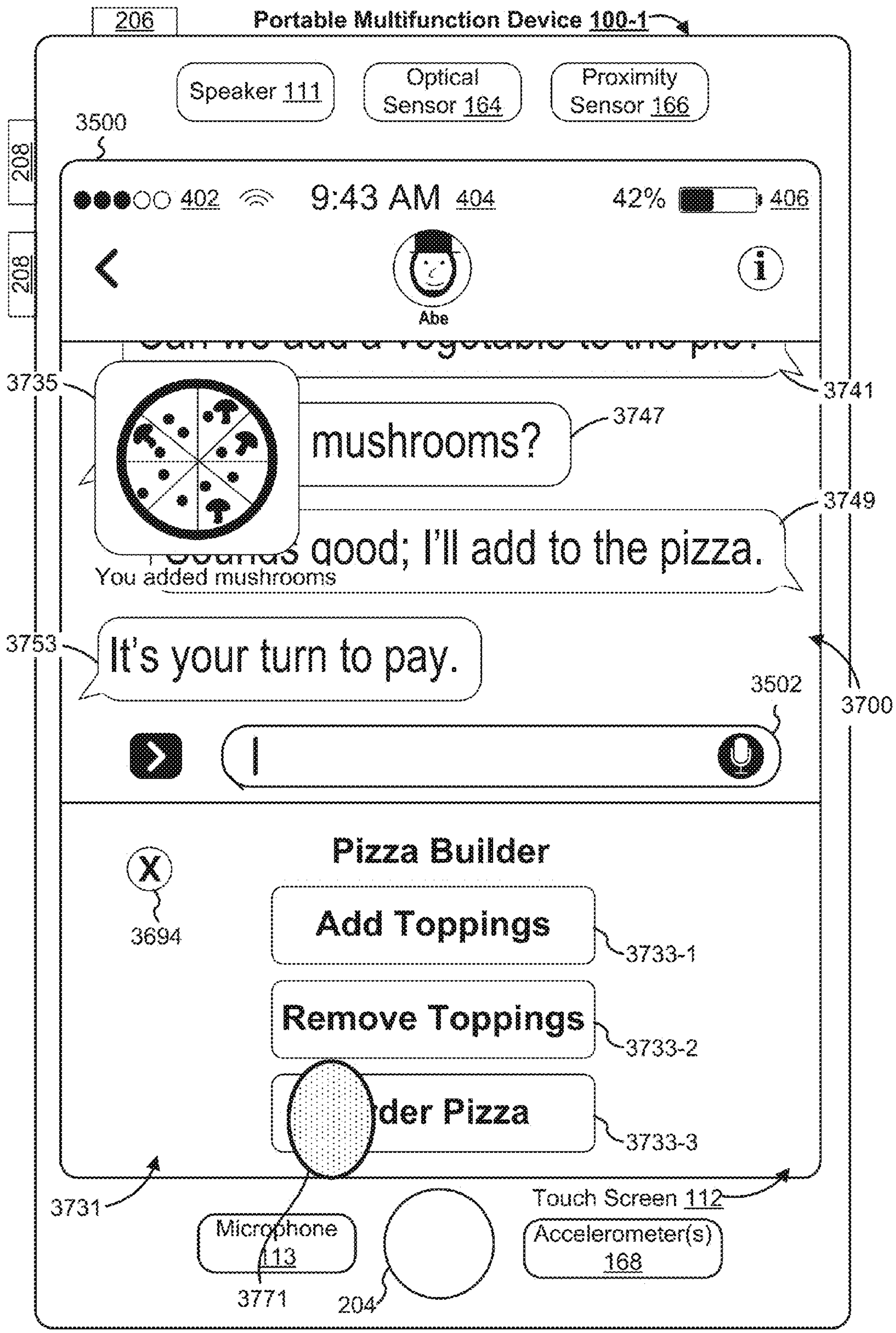
Figure 37D:
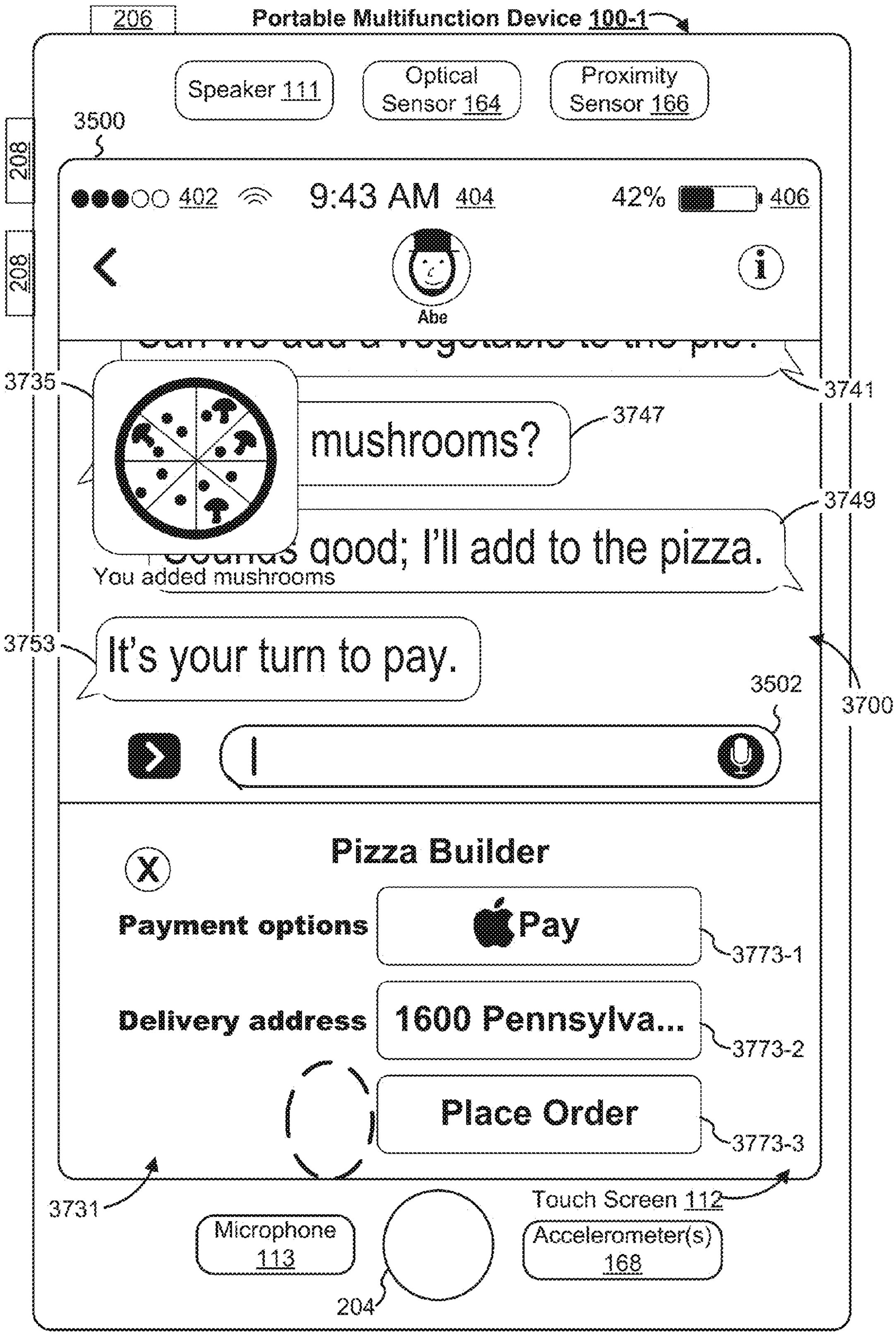
Figure 37D:
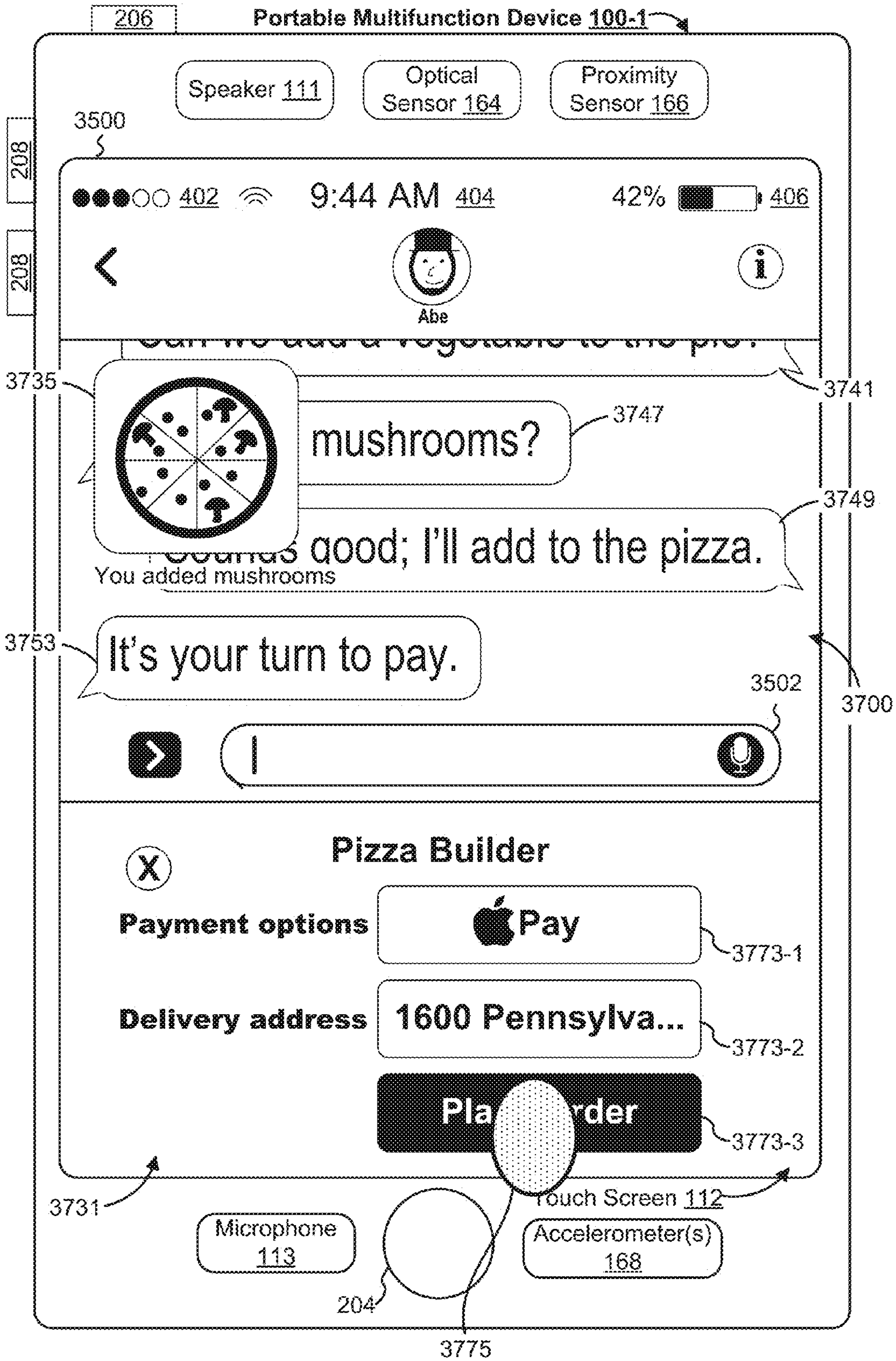
Figure 37D:
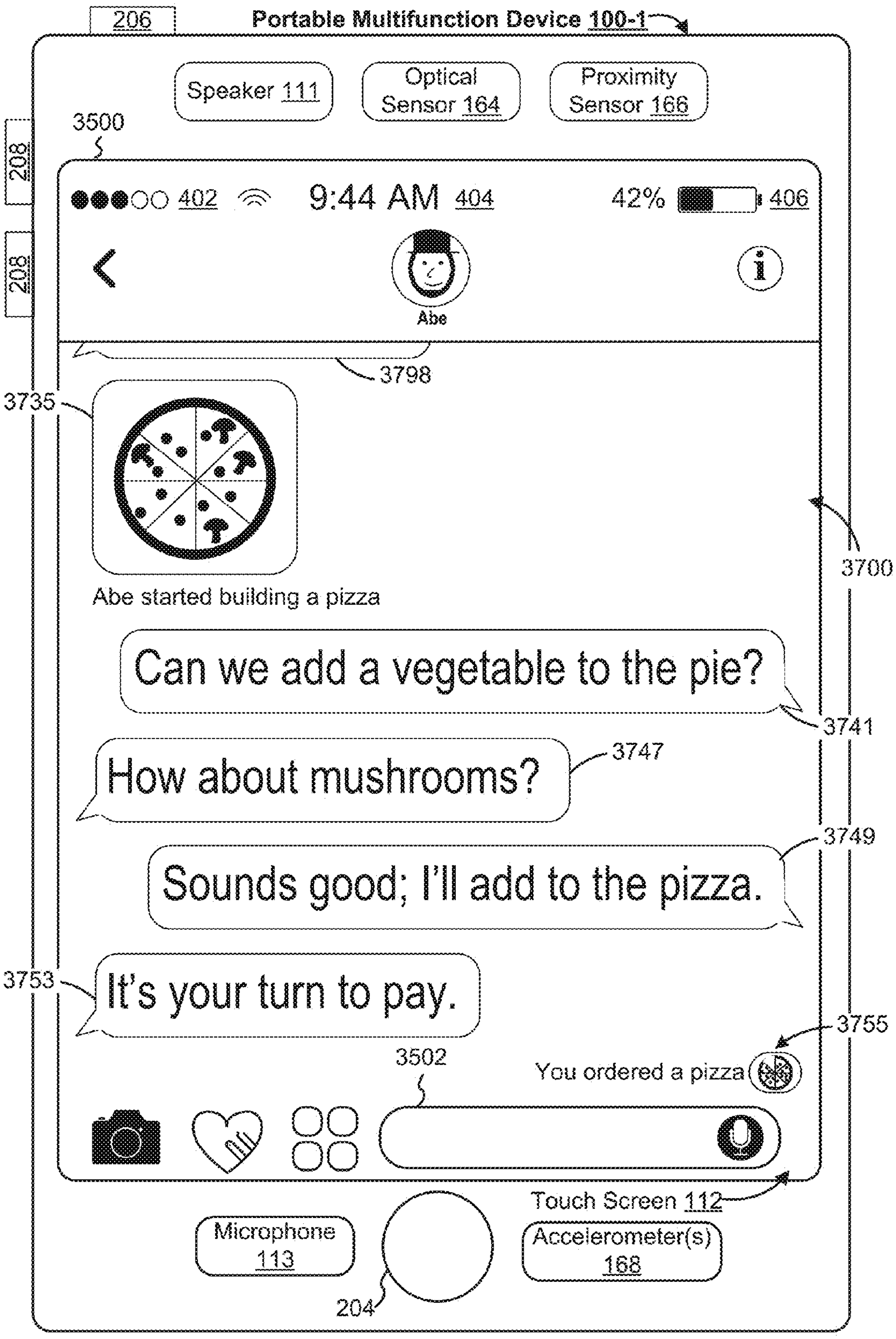

For example, interactive tic-tac-toe application user interface 3782 is displayed on touch screen 112 of device 100-1, in FIG. 37Y, when the device receives information that 'X' 3794 was placed on corresponding tic-tac-board 3791 (e.g., displayed in corresponding tic-tac-toe application user interface 3782 associated with a messaging session corresponding to conversation transcript 3700) on device 100-2 at 9:35 AM. In response, device 100-1 displays 'X' 3794 on tic-tac-toe board 3782 in FIG. 37AZ (e.g., because interactive tic-tac-toe application user interface 3782 was being displayed when the device received the information.

In some embodiments, when the corresponding interactive interface is not being displayed on the other device, the corresponding interactive user interface is updated upon opening on the device.

In some embodiments, the interactive application is configured (5034) to perform a subset (e.g., less than all) of the functions of a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

It should be understood that the particular order in which the operations in FIGS. 50A-50C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5200, 5400, 5600, 5800, 6000, 6200, 6400, 6600, 6800, and 7000) are also applicable in an analogous manner to method 5000 described above with respect to FIGS. 50A-50C. For example, the contacts, gestures, user interface objects, tactile outputs, intensity thresholds, focus selectors, animations described above with reference to method 5000 optionally have one or more of the characteristics of the [contacts, gestures, user interface objects, tactile outputs, intensity thresholds, focus selectors, animations] described herein with reference to other methods described herein (e.g., methods 600, 800, 1000, 1200, 1400, 1600, 1800, 2100, 2400, 2600, 2800, 3100, 3300, 4200, 4400, 4600, 4800, 5200, 5400, 5600, 5800, 6000, 6200, 6400, 6600, 6800, and 7000). For brevity, these details are not repeated here.

Figure 51:
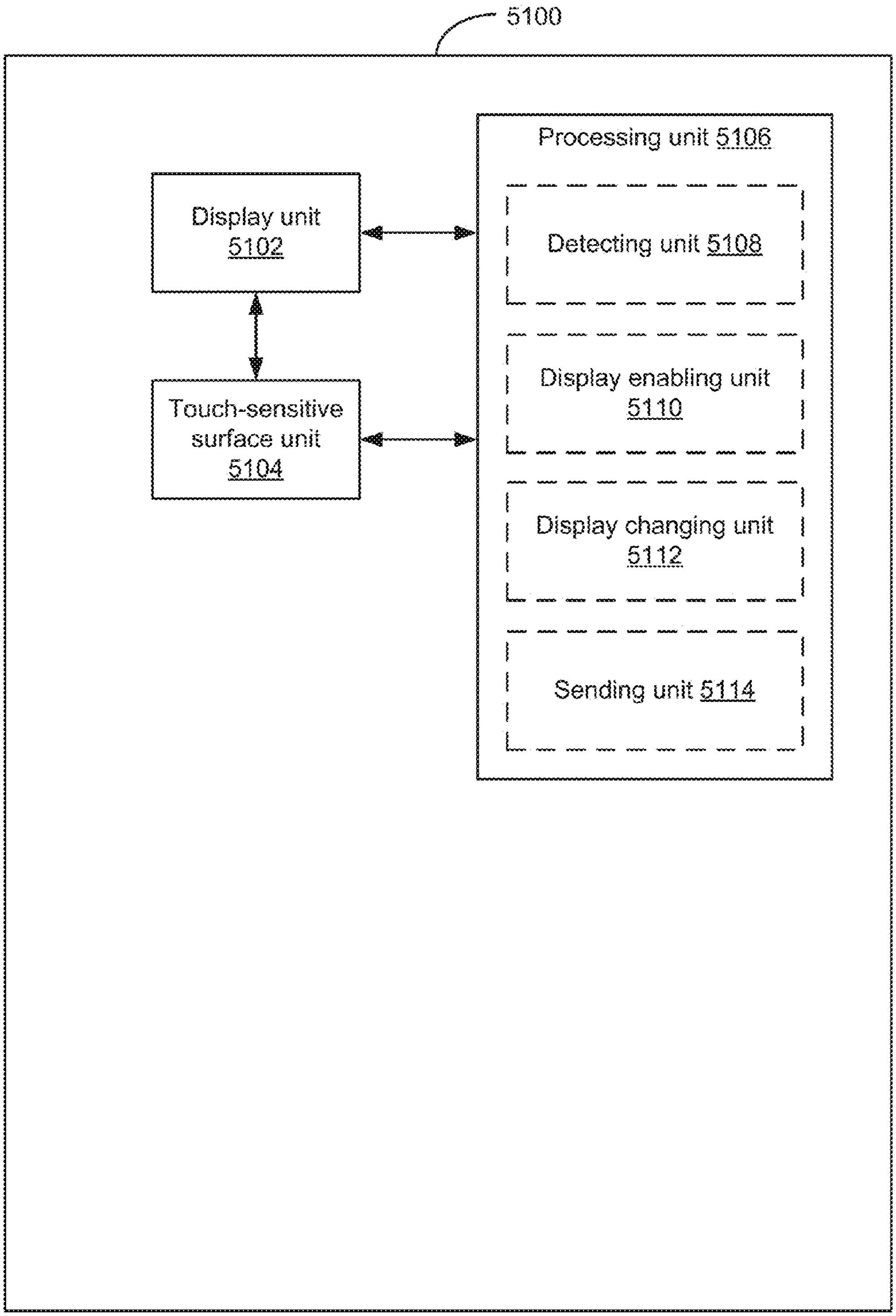
FIG. 51 is a functional block diagram of an electronic device in accordance with some embodiments.

In accordance with some embodiments, FIG. 51 shows a functional block diagram of an electronic device 5100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 51 may be combined or separated into sub-blocks to implement the principles of the invention as described above. Therefore, the description herein may support any possible combination or separation or further definition of the functional blocks described herein.

As shown in FIG. 51, an electronic device 5100 includes a display unit 5102 configured to display user interfaces; a touch-sensitive surface unit 5104 configured to detect contacts; and a processing unit 5106 coupled with the display unit 5102 and the touch-sensitive surface unit 5104. In some embodiments, the processing unit 5106 includes a detecting unit 5108, a display enabling unit 5110, a display changing unit 5112, and a sending unit 5114.

The processing unit 5106 is configured to: enable display of a messaging user interface of a messaging application on the display unit 5102 (e.g., with the display enabling unit 5110), the messaging user interface including a conversation transcript of a messaging session between a user of the electronic device and at least one other user, a message-input area, and an icon for an interactive application that is displayed within the conversation transcript; while displaying the messaging user interface, detect an input that activates the icon for the interactive application (e.g., with the detecting unit 5108); in response to detecting the input that activates the icon for the interactive application, enable display of a user interface for the interactive application in a first state (e.g., with the display enabling unit 5110); while displaying the user interface for the interactive application, detect a first user input within the user interface for the interactive application (e.g., with the detecting unit 5108); and, in response to detecting the first user input within the user interface for the interactive application: change display of the user interface for the interactive application from the first state to a second state (e.g., with the display changing unit 5112), and send information, to the one or more electronic devices that correspond to the at least one other user included in the messaging session, indicating that the first user input was made in the user interface for the interactive application (e.g., with the sending unit 5114), wherein the one or more electronic devices display an indicia of the first user input.

In some embodiments, the information indicating that the first user input was made in the user interface for the interactive application includes information that causes movement of a corresponding icon for the interactive application within a conversation transcript corresponding to the messaging session.

In some embodiments, the information indicating that the first user input was made in the user interface for the interactive application includes information that causes movement of a corresponding icon for the interactive application from a first side of a conversation transcript corresponding to the messaging session to a second side of the conversation transcript.

In some embodiments, the information indicating that the first user input was made in the user interface for the interactive application includes information that causes display of text, indicating the first user input was made, below a corresponding icon for the interactive application within a conversation transcript corresponding to the messaging session.

In some embodiments, the information indicating that the first user input was made in the user interface for the interactive application includes information that causes change of the appearance of a corresponding icon for the interactive application.

In some embodiments, the information indicating that the first user input was made in the user interface for the interactive application includes information that causes change of display of a corresponding user interface for the interactive application from a first state to a second state.

In some embodiments, the interactive application is configured to perform a subset of the functions of a corresponding application operated separate from the messaging application.

In some embodiments, the interactive application launch icon displays an identifier for a corresponding application operated separate from the messaging application.

In some embodiments, the interactive application displays a portion of the content displayed by a corresponding application operated separate from the messaging application.

In some embodiments, the interactive application causes the device to launch a corresponding application operated separate from the messaging application upon detection of a predefined input.

In some embodiments, the interactive application is operated separately from a corresponding application operated separate from the messaging application.

In some embodiments, the interactive application is operated in conjunction with a corresponding application operated separate from the messaging application.

In some embodiments, the interactive application has a dedicated portion of the memory for temporary storage that is different from a dedicated portion of the memory for temporary storage for a corresponding application operated separate from the messaging application.

In some embodiments, the corresponding application operated separate from the messaging application is configured to access the dedicated portion of memory for temporary storage for the interactive application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 50A-50C are, optionally, implemented by components depicted in FIGS. 1A-1B or FIG. 51. For example, detection operations 5006 and 5022 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 52A-52C are flow diagrams illustrating a method 5200 of using an interactive application in a messaging application in accordance with some embodiments. The method 5200 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 5200 are, optionally, combined and/or the order of some operations is, optionally, changed.

As described below, the method 5200 provides an intuitive way to use an interactive application in a messaging application. The method reduces the number, extent, and/or nature of the inputs from a user when using an interactive application in a messaging application, thereby creating a more efficient human-machine interface. For battery-operated electronic devices, enabling a user to use an interactive application in a messaging application faster and more efficiently conserves power and increases the time between battery charges.

The device displays (5202) a messaging user interface of a messaging application on the display, the messaging user interface including a conversation transcript (e.g., displayed in a first area of the display) of a messaging session between a user of the electronic device and at least one other user (e.g., of another electronic device), and a message-input area. For example, device 100-2 (operated by Abe) displays messaging user interface 3500 in FIGS. 37J and 37BD, including conversation transcript 3700 and message-input area 3502.

While displaying the messaging user interface, the device receives (5204) instructions, from an (second) electronic device that corresponds to another user included in the messaging session (e.g., device 100-1 operated by Andrew in Figures and 37F and 37AV), to display an icon for an interactive application ("interactive application icon" or "interactive application object") in the conversation transcript.

In some embodiments, while displaying the messaging user interface, the device receives information (e.g., a meta-message, instructions, or a representation of an interactive application icon/object) from an (second) electronic device that corresponds to another user included in the messaging session (e.g., device 100-1 operated by Andrew in Figures and 37F and 37AV), that a session of an interactive application was initiated within the messaging session. In some embodiments, the information causes the electronic device to display an icon for the for the session of the interactive application in the conversation transcript.

For example, upon initiation of a session of an interactive reservations application, caused by detection of an input (e.g., a tap gesture) including contact 3710 on launch icon 3708 in FIG. 37F, device 100-1 sends information to device 100-2 that a session of the interactive reservations application was initiated. Device 100-2 receives the information in FIG. 37J. As another example, upon initiation of a session of an interactive tic-tac-toe application, device 100-2 receives information from device 100-1 in FIG. 37BE that a session (e.g., game) of the interactive tic-tac-toe application was initiated.

In response to receiving the instructions, the device displays (5208) the icon (e.g., interactive application object) for the interactive application in the conversation transcript.

In some embodiments, in response to receiving the information that a session of an interactive application was initiated within the messaging session, the device displays an icon for the interactive application, that is associated with the session of the interactive application initiated within the messaging session, in the conversation transcript.

For example, in response to receiving information from device 100-2 in FIG. 37J, device 100-1 displays interactive reservations application icon/object 3730 in conversation transcript 3700, in FIG. 37K. As another example, in response to receiving information from device 10012 in FIG. 37BE, device 100-1 displays interactive tic-tac-toe application icon/object 3705 in conversation transcript 3700, in FIG. 37BF.

In some embodiments, the interactive application launch icon displays (5026) an identifier for a corresponding application operated separate from the messaging application. In some embodiments interactive application icons/objects function as application launch icons by enabling launch of a user interface for the interactive application associated with the application icon/object.

In some embodiments, the interactive application icon/object displays an identifier for a corresponding application operated separate from the messaging application. For example, in FIG. 37K, interactive reservations application icon/object 3730 displays a concentric circle symbol that corresponds to a reservations application operated separate from the messaging application.

While displaying the icon for the interactive application in the conversation transcript, the device detects (5212) an input (e.g., a tap gesture) that activates the icon (e.g., launches the application) for the interactive application. For example, device 100-2 detects an input including contact 3738 on interactive application icon/object 3728, in FIG. 37P, that activates an interactive reservations application. In another example, device 100-2 detects an input including contact 3707 on interactive application icon/object 3705, in FIG. 37BG, that activates an interactive tic-tac-toe application.

In response to detecting (5212) the input that activates the icon for the interactive application displayed in the conversation transcript, in accordance with a determination that an interactive application that corresponds to the icon for the interactive application is stored in the memory of the electronic device, the device displays (5214) a user interface for the interactive application ("interactive application user interface").

For example, device 100-2 displays interactive reservations application user interface 3712, in FIG. 37Q, because the interactive reservations application was stored in the device when the activating input, including contact 3738 in FIG. 37P, was detected.

In some embodiments, the interactive application user interface is displayed over at least a portion of the messaging user interface. For example, user interface 3782 for an interactive tic-tac-toe application is displayed over a portion of messaging user interface 3500 in FIG. 37BK.

In some embodiments, the interactive application user interface replaces display of the messaging user interface. For example, user interface 3712 for an interactive reservations application in FIG. 37Q replaces display of messaging user interface in FIG. 37P.

In some embodiments, the interactive application user interface is displayed within the message transcript. For example, pizza application object 3735, displayed within transcript 3700 in FIG. 37CA, is a non-contiguous portion of the user interface for an interactive pizza ordering application, because it displays a current status of the pizza being ordered.

In response to detecting (5212) the input that activates the icon for the interactive application displayed in the conversation transcript, in accordance with a determination that the interactive application that corresponds to the icon for the interactive application is not stored in the memory of the electronic device, the device downloads the interactive application, from a remote server (e.g., a server that is part of an online application store that contains interactive applications for the messaging application), to the memory of the electronic device and, after downloading the interactive application from the remote server, displays the user interface for the interactive application.

For example, device 100-2 downloads an interactive tic-tac-toe application corresponding to interactive tic-tac-toe application icon/object 3705, as indicated by download status indicia 3709 in FIG. 37BH, because the application was not stored in memory of the device when the activating input, including contact 3707 in FIG. 37BG, was detected.

In some embodiments, downloading the interactive application includes a permissive step where a user input indicates approval of the download of the interactive application (e.g., an object is displayed prompting the user to confirm download of the application and/or confirm their identity). In some embodiments, the downloading occurs in the background, without requiring user authorization.

In some embodiments, the downloading occurs without navigating away from the messaging user interface. In some embodiments, the downloading occurs while maintaining display of the messaging user interface.

In some embodiments, the interactive application user interface is displayed over at least a portion of the messaging user interface. For example, user interface 3782 for an interactive tic-tac-toe application is displayed over a portion of messaging user interface 3500 in FIG. 37BK.

In some embodiments, the interactive application user interface replaces display of the messaging user interface. For example, user interface 3712 for an interactive reservations application in FIG. 37Q replaces display of messaging user interface in FIG. 37P.

In some embodiments, the interactive application user interface is displayed within the message transcript. For example, pizza application object 3735, displayed within transcript 3700 in FIG. 37CA, is a non-contiguous portion of the user interface for an interactive pizza ordering application, because it displays a current status of the pizza being ordered.

In some embodiments (5232), in accordance with a determination that the interactive application is not stored in the memory of the electronic device, the icon for the interactive application has a first appearance and, in accordance with a determination that the interactive application is stored in the memory of the electronic device, the icon for the interactive application has a second appearance that is different from the first appearance.

In some embodiments, in accordance with a determination that the interactive application is not stored in the memory of the electronic device, the device displays additional information near (e.g., below, above, next to, or proximate to) the icon for the interactive application, that indicates that the interactive application is not stored in the memory of the device. For example, device 100-2 displays additional information "Tap to download" below icon 3705 in FIG. 37BF because the corresponding interactive tic-tac-toe application is not stored in memory of the device. In contrast, device 100-2 displays additional information "Your turn" below icon 3705 in FIG. 37BI, after the corresponding interactive tic-tac-toe application was downloaded into memory of the device.

In some embodiments, the interactive application is configured (5216) to perform a subset (e.g., less than all) of the functions of a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application displays (5218) a portion (e.g., less than all) of the content displayed by a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application causes (5220) the device to launch a corresponding application operated separate from the messaging application upon detection of a predefined input. For example, in response to a first input (e.g., a tap, press, deep press, long-press, or multi-finger gesture) on interactive reservations application icon 3728 in FIG. 37P, the device launches the interactive reservations application within the messaging application. In response to a second (e.g., different) input (e.g., a tap, press, deep press, long-press, or multi-finger gesture) on interactive reservations application icon 3728 in FIG. 37P, the device launches a reservations application outside of the messaging application.

In some embodiments, the interactive application is operated (5222) separately from a corresponding application operated separate from the messaging application. For example, the interactive reservations application launched in response to activation of icon 3728 in FIG. 37P is operable when a corresponding reservations application operated outside of the messaging application is not running.

In some embodiments, the interactive application is operated (5224) in conjunction with a corresponding application operated separate from the messaging application. For example, the interactive reservations application launched in response to activation of icon 3728 in FIG. 37P is not operable when a corresponding reservations application operated outside of the messaging application is not running.

In some embodiments, the interactive application has a dedicated portion of the memory for temporary storage (5226) that is different from a dedicated portion of the memory for temporary storage for a corresponding application operated separate from the messaging application. For example, in some embodiments, records of reservations made using the interactive reservations application launched in response to activation of icon 3728 in FIG. 37P and operated within the messaging application are stored in a different portion of memory than records of reservations made using a corresponding reservations application operated outside of the messaging application.

In some embodiments, the corresponding application operated separate from the messaging application is configured (5228) to access the dedicated portion of memory for temporary storage for the interactive application. For example, in some embodiments, the corresponding reservations application operated outside of the messaging application can access the records of reservations made using the interactive reservations application launched in response to activation of icon 3728 in FIG. 37P and operated within the messaging application.

In some embodiments (5232), the device detects termination of the interactive application and, in response to detecting termination of the interactive application, ceases to display the user interface for the interactive application and displays (e.g., restoring partial or complete display) the messaging user interface including the conversation transcript, wherein the icon for the interactive application is displayed at a position within the conversation transcript.

For example, device 100-2 displays messaging user interface 3500, including interactive reservations application icon/object 3728 within transcript 3700 in FIG. 37AC, in response to detecting a termination input, including contact 3756 on termination (exiting) affordance 3714, in FIG. 37AB.

In another example, device 100-2 restores, in FIG. 37B0, the partial display of messaging user interface 3500 that was obscured by display of interactive tic-tac-toe application user interface 3782 in FIG. 37BN, including interactive tic-tac-toe application icon/object 3705 within transcript 3700 in FIG. 37B0, in response to detecting a termination input, including contact 3717 on termination (exiting) affordance 3794, in FIG. 37BN.

In some embodiments, the position of the icon within the conversation transcript is dependent upon the temporal order in which the instructions to display the icon was received (e.g., when another user requested a session of the interactive application). In some embodiments, the position of the icon within the conversation transcript is dependent upon the temporal order in which the user terminated the interactive application (e.g., closing the application pushes the icon down in the transcript). In some embodiments, the position of the icon is dependent upon the temporal order in which the last input (e.g., by any user) was made within the interactive application.

It should be understood that the particular order in which the operations in FIGS. 52A-52C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5400, 5600, 5800, 6000, 6200, 6400, 6600, 6800, and 7000) are also applicable in an analogous manner to method 5200 described above with respect to FIGS. 52A-52C. For example, the contacts, gestures, user interface objects, tactile outputs, intensity thresholds, focus selectors, and animations described above with reference to method 5200 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5400, 5600, 5800, 6000, 6200, 6400, 6600, 6800, and 7000). For brevity, these details are not repeated here.

Figure 53:
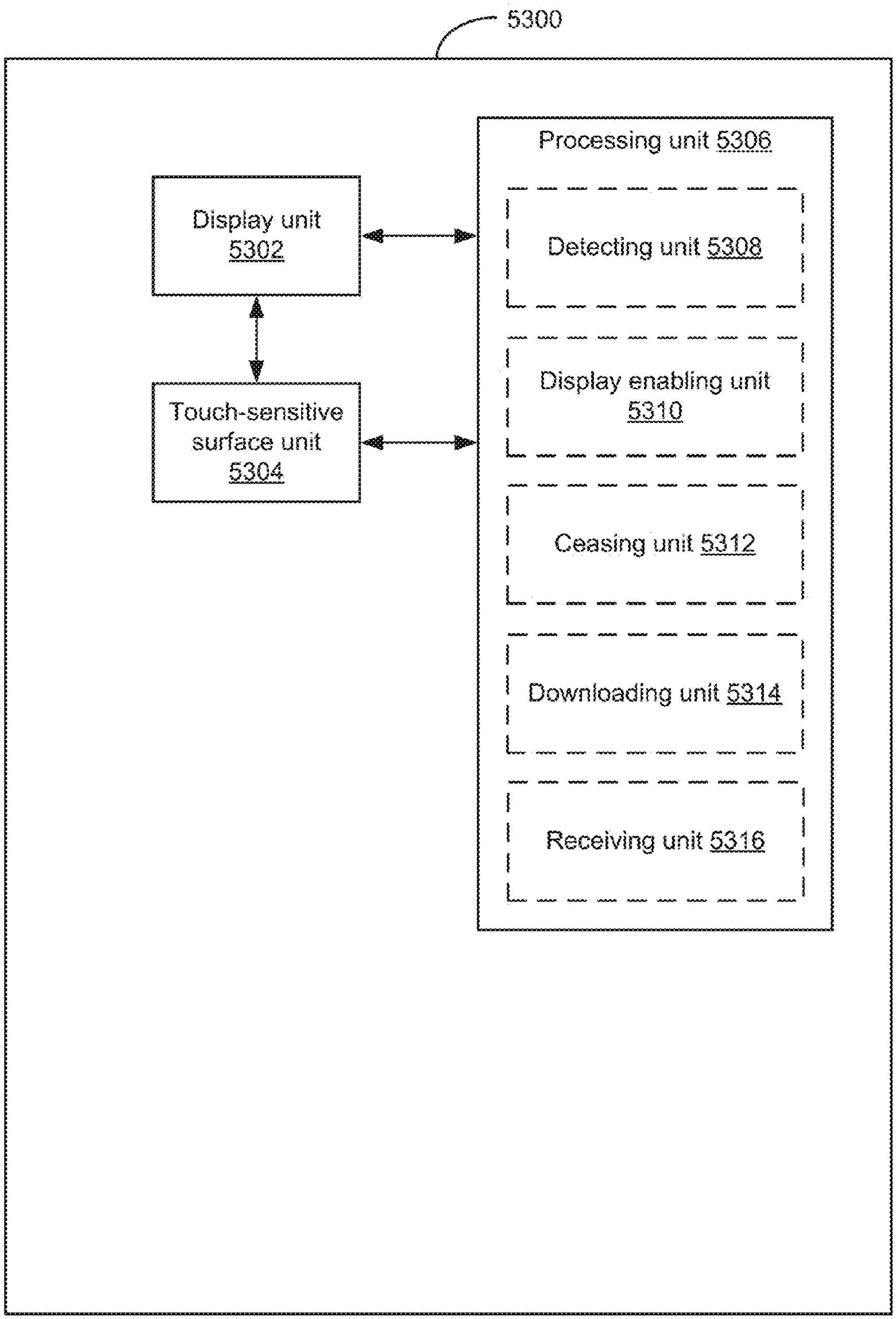
FIG. 53 is a functional block diagram of an electronic device in accordance with some embodiments.

In accordance with some embodiments, FIG. 53 shows a functional block diagram of an electronic device 5300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 53 may be combined or separated into sub-blocks to implement the principles of the invention as described above. Therefore, the description herein may support any possible combination or separation or further definition of the functional blocks described herein.

As shown in FIG. 53, an electronic device 5300 includes a display unit 5302 configured to display user interfaces; a touch-sensitive surface unit 5304 configured to detect contacts; and a processing unit 5306 coupled with the display unit 5302 and the touch-sensitive surface unit 5304. In some embodiments, the processing unit 5306 includes a detecting unit 5308, a display enabling unit 5310, a ceasing unit 5312, a downloading unit 5314, and a receiving unit 5316.

The processing unit 5306 is configured to: enable display of a messaging user interface of a messaging application on the display unit 5302 (e.g., with the display enabling unit 5310), the messaging user interface including a conversation transcript of a messaging session between a user of the electronic device and at least one other user, and a message-input area; while displaying the messaging user interface, receiving information, from an electronic device that corresponds to another user included in the messaging session, that causes display of an icon for an interactive application in the conversation transcript (e.g., with the receiving unit 5316); in response to receiving the information, enable display of the icon for the interactive application in the conversation transcript (e.g., with the display enabling unit 5310); while displaying the icon for the interactive application in the conversation transcript, detect an input that activates the icon for the interactive application (e.g., with the detecting unit 5308); and, in response to detecting the input that activates the icon for the interactive application displayed in the conversation transcript: in accordance with a determination that an interactive application that corresponds to the icon for the interactive application is stored in the memory of the electronic device, enable display of a user interface for the interactive application (e.g., with the display enabling unit 5310), and in accordance with a determination that the interactive application that corresponds to the icon for the interactive application is not stored in the memory of the electronic device: download the interactive application, from a remote server, to the memory of the electronic device (e.g., with the downloading unit 5314), and after downloading the interactive application from the remote server, enable display of the user interface for the interactive application (e.g., with the display enabling unit 5310).

In some embodiments, the processing unit 5306 is further configured to: detect termination of the interactive application (e.g., with the detecting unit 5308), and, in response to detecting termination of the interactive application: cease to display the user interface for the interactive application (e.g., with the ceasing unit 5312); and enable display of the messaging user interface including the conversation transcript (e.g., with the display enabling unit 5310), wherein the icon for the interactive application is displayed at a position within the conversation transcript.

In some embodiments, in accordance with a determination that the interactive application is not stored in the memory of the electronic device, the icon for the interactive application has a first appearance; and in accordance with a determination that the interactive application is stored in the memory of the electronic device, the icon for the interactive application has a second appearance that is different from the first appearance.

In some embodiments, the interactive application is configured to perform a subset of the functions of a corresponding application operated separate from the messaging application.

In some embodiments, the interactive application launch icon displays an identifier for a corresponding application operated separate from the messaging application.

In some embodiments, the interactive application displays a portion of the content displayed by a corresponding application operated separate from the messaging application.

In some embodiments, the interactive application causes the device to launch a corresponding application operated separate from the messaging application upon detection of a predefined input.

In some embodiments, the interactive application is operated separately from a corresponding application operated separate from the messaging application.

In some embodiments, the interactive application is operated in conjunction with a corresponding application operated separate from the messaging application.

In some embodiments, the interactive application has a dedicated portion of the memory for temporary storage that is different from a dedicated portion of the memory for temporary storage for a corresponding application operated separate from the messaging application.

In some embodiments, the corresponding application operated separate from the messaging application is configured to access the dedicated portion of memory for temporary storage for the interactive application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 52A-52C are, optionally, implemented by components depicted in FIGS. 1A-1B or FIG. 53. For example, detection operations 5210 and 5234 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 54A-54C are flow diagrams illustrating a method 5400 of using an interactive application in a messaging application in accordance with some embodiments. The method 5400 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 5400 are, optionally, combined and/or the order of some operations is, optionally, changed.

As described below, the method 5400 provides an intuitive way to use an interactive application in a messaging application. The method reduces the number, extent, and/or nature of the inputs from a user when using an interactive application in a messaging application, thereby creating a more efficient human-machine interface. For battery-operated electronic devices, enabling a user to use an interactive application in a messaging application faster and more efficiently conserves power and increases the time between battery charges.

The device displays (5402) a messaging user interface of a messaging application on the display, the messaging user interface including a conversation transcript, displayed in a first area of the display, of a messaging session between a user of the electronic device and at least one other user (e.g., of another electronic device), a first interactive application object displayed within the conversation transcript a message input area, and an input area for the first interactive application, distinct from the message input area, displayed in a second area of the display, the input area for the first interactive application including one or more input affordances.

For example, in FIGS. 37CA and 37DA, devices 100-2 and 100-1, respectively, display messaging user interface 3500, including conversation transcript 3700 displayed in a top portion of touch screen 112, interactive pizza ordering application object 3735 within conversation transcript 3700, and interactive pizza ordering application input area 3731 displayed in a bottom portion of touch screen 112. Interactive pizza ordering input area 3731 includes input affordances 3733-1, 3733-2, and 3733-3 for adding toppings to a pizza being designed (e.g., for ordering), removing toppings from the pizza, and ordering the pizza, respectively.

In some embodiments, the interactive application object displays an output of the interactive application (e.g., an output of the interactive application is displayed on the interactive application object) in response to a user input. For example, in response to an input adding pepperoni to a pizza, including contacts 3737 and 3739 in FIG. 37CB and 37CD, pepperoni is displayed on interactive pizza ordering application object 3737 in FIG. 37CE.

In some embodiments, the input area for the interactive application is displayed in a second area of the display while the conversation transcript is displayed in the first area of the display.

In some embodiments, display of the input area for the first interactive application replaces display of the conversation transcript, the first interactive application object, and/or the message input area (e.g., in response to detecting an input that activates the first interactive application object).

In some embodiments, the device (5404) displays content posted to the messaging session within the conversation transcript according to a temporal order in which the content was posted and the interactive application object is displayed at a position within the conversation transcript associated with the temporal order in which a session of the interactive application was initiated. For example, the interactive application object is positioned relative to other objects in the conversation transcript (e.g., messages, multimedia, and other content) according to a temporal order when a user first posted a session of the interactive application to the messaging session.

For example, in FIGS. 37CE-37CF, interactive tic-tac-toe application object 3735 is positioned between messages 3798 and 3741 in conversation transcript because message 3798 was posted to the messaging session first (e.g., at 9:36 in FIG. 37BS), application object 3735 was posted second (e.g., at 9:37 PM in FIG. 37CA), and message 3741 was posted last (e.g., at 9:39 AM in FIG. 37CV).

In some embodiments, the device (5406) displays synchronous movement of content displayed in a temporal order within the conversation transcript (e.g., as new content is posted to the messaging session) towards an edge of the conversation transcript (e.g., the top of the conversation transcript), the displayed content including the first interactive application object and in accordance with a determination that the first interactive application object is within a predetermined distance from the edge of the conversation transcript, the device displays the first interactive application object at a fixed location on the display (e.g., at a top portion of the conversation transcript).

For example, in FIG. 37CE, message 3798 and interactive tic-tac-toe application object 3735 are displayed according to the temporal order in which they were posted to the messaging session, as described above. In response to message 3741 being posted to the messaging session, device 100-2 moves message 3798 up and off of the top of touch screen 112 and interactive tic-tac-toe application object 3735 up to the top of conversation transcript 3700, from position 3735-*a*, in FIG. 37CE, to position 3735, in FIG. 37CF. Because interactive tic-tac-toe application object 3735 is displayed at a pre-defined position near the top of the displayed portion of the conversation transcript (e.g., at position 3735-*b*) it does not continue to move up when message 3747 is posted to the messaging session in FIG. 37CJ (e.g., is remains displayed at position 3735-*b*).

In some embodiments, while displaying the first interactive application object at the fixed location on the display, the device continues (5408) to display synchronous movement of other content displayed in a temporal order within the conversation transcript.

For example, in FIGS. 37CI-37CK, although interactive tic-tac-toe application object 3735 has a fixed display at position 3735-*b*, message 3741 continues to scroll up on touch screen 112 as message 2747, In FIG. 37CJ, and message 3749, in FIG. 37CK, are posted to the messaging session.

In some embodiments, continuing to display synchronous movement of other content displayed in a temporal order with the conversation transcript includes that the device animates (5410) other content such that the other content appears to move behind the first interactive application object (e.g., the first interactive application UI appears to hover over the conversation transcript, which continues to scroll upwards as new content is posted to the messaging session).

For example, in FIGS. 37CI-37CK, while interactive tic-tac-toe application object 3735 is fixed at position 3735-*b*, message 3741 is animated to slide behind interactive tic-tac-toe application object 3735 as message 2747, In FIG. 37CJ, and message 3749, in FIG. 37CK, are posted to the messaging session.

In some embodiments, while displaying the first interactive application object at the fixed location on the display, the device (5418) detects a request to close the first interactive application (e.g., an input unpinning the interactive application object from the fixed position on the display) and, in response to detecting the request to close the first interactive application (or to unpin the interactive application object from the fixed position on the display), ceases to display the first interactive application object at the fixed location on the display and displays the first interactive application object at a position within the conversation transcript associated with the temporal order in which the session of the interactive application was initiated (e.g., the first interactive application UI is unpinned from the top of the conversation transcript and moves back to its original position within the transcript).

In some embodiments, the input unpinning the interactive application object from the fixed position on the display does not terminate display of an interactive application user interface (e.g., interactive pizza ordering application object 3735 may be unpinned from the fixed location on touch screen 112 without terminating display of interactive pizza ordering application input 3731.

In some embodiments, the input unpinning the interactive application object from the fixed position on the display (e.g., the displayed portion of the conversation transcript) is a user input (e.g., detected on a touch-sensitive surface, such as touch screen 112). For example, application object 3735 moves from fixed position 3735-*b* in conversation transcript 3700, in FIG. 37DI, to original position 3735-*a* (e.g., its original temporal position in the messaging session), in FIG. 37DJ, in response to an input ordering the pizza (e.g., and closing the interactive pizza ordering application), including contact 3775 on ordering affordance 3773-3, in FIG. 37DI.

In some embodiments, the input unpinning the interactive application object from the fixed position on the display (e.g., the displayed portion of the conversation transcript) is an input (e.g., a meta-message, instruction, or information) from another electronic device that corresponds to another user included in the messaging session. For example, application object 3735 moves from fixed position 3735-*b* in conversation transcript 3700, in FIG. 37CN, to original position 3735-*a* (e.g., its original temporal position in the messaging session), in FIG. 37CO (as evidenced in FIG. 37CQ), on touch screen 112 of device 100-2 in response to receiving information from device 100-1 that the pizza was ordered.

In some embodiments, the input unpinning the interactive application object from the fixed position on the display (e.g., the displayed portion of the conversation transcript) is an automatically generated input (e.g., a command) generated in response to a condition precedent (e.g., a timing-out of the first interactive application).

In some embodiments, the interactive application object is a display and/or user interface for the interactive application.

In some embodiments, the interactive application object is a launch icon for a session of the interactive application initiated within the messaging session.

While displaying the messaging user interface including the input area for the first interactive application, including one or more input affordances, the device detects (5420) an input that activates a first input affordance in the input area for the interactive application. For example, device 100-2 detects an input to add pepperoni to the pizza being designed, including contact 3737, in FIG. 37CB, and contact 3739, in FIG. 37CD.

In some embodiments, after detecting the input that activates the first input affordance, the device (5422) updates the first interactive application object that corresponds to the first interactive application in accordance with the input that activates the first input affordance (e.g., adds a topping on the pizza) and sends information (e.g., a meta-message, instructions, or a representation of the updated interactive application object) to one or more (e.g., second) electronic devices that correspond to the at least one other user included in the messaging session, relating to the activation of the first input affordance (e.g., instructions to update a corresponding interactive application object that corresponds to the first interactive application displayed within a corresponding conversation transcript of the messaging session and/or information that pepperoni was added to the pizza).

For example, device 100-2 updates display of interactive pizza ordering application object 3735 by adding pepperoni on the pizza, in FIG. 37CE, and sends information to device 100-1 that pepperoni was added to the pizza at 9:38 AM. Device 100-1 then updates display of interactive pizza ordering application object 3735 by adding pepperoni on the pizza, in FIG. 37CS.

In some embodiments, prior to displaying the first interactive application object within the conversation transcript, the device (5426) displays the messaging user interface including the conversation transcript (e.g., displayed in a first area of the display) of the messaging session between the user of the electronic device and the at least one other user (e.g., of another electronic device) and an application affordance. For example, device 100-1 displays messaging user interface 3500 including conversation transcript 3700 and application affordance 3508 in FIG. 37AN.

While displaying the messaging user interface, the device detects an input that activates the application affordance (e.g., detecting a tap gesture at a location that corresponds to the application affordance). For example an input including contact 3768 on application affordance 3508 in FIG. 37 AO.

In response to detecting the input that activates the application affordance, the device maintains display of at least a portion of the conversation transcript in a first area of the display and displays a second interactive application icon (e.g., a launch icon for a second interactive application), which is one of a plurality of interactive application icons, in a second area of the display (e.g., in a scrollable interactive application panel). For example, device 100-1 displays interactive reservations application launch icon 3708 in application slide tray 3892 in FIG. 37AP.

In some embodiments, where the messaging user interface includes display of an electronic keyboard prior to activating the application affordance, the display of the scrollable interactive application panel replaces display of the keyboard. For example, display of application slide tray 3892, in FIG. 37BW, replaces display of digital keyboard 3501, in FIG. 37BV.

In some embodiments, where the messaging user interface includes a full-screen display of the conversation transcript prior to activating the application affordance, the display of the scrollable interactive application panel replaces a portion of the display of the message transcript. For example, conversation transcript 3700, displayed in full-screen mode in FIG. 37AO, shrinks to accommodate display of application slide tray 3892 in FIG. 37AP.

While displaying the second interactive application icon in the second area of the display, the device detects a first swipe gesture that includes horizontal movement of a first contact at a location that corresponds to the second area of the display. For example, device 100-1 detects a swipe gesture including movement 3772 of contact 3770 from position 3770 in Figure to position 3770-*b* in FIG. 37AR.

In accordance with a determination that the first swipe gesture satisfies one or more interactive application icon switching criteria, the device replaces display of the second interactive application icon with display of a first interactive application icon that corresponds to the first interactive application in the second area of the display. For example, device 100-1 replaces interactive reservations application launch icon 3708 in slide tray 3892, in FIG. 37AQ, with interactive tic-tac-toe application launch icon 3774 in slide tray 3892, in FIG. 37 AS.

In some embodiments, the interactive application icon switching criteria includes a criterion that the magnitude of a horizontal movement of the first swipe gestures satisfies a predetermined movement threshold. In some embodiments, the predetermined movement threshold varies with the speed of the movement of the contact.

While displaying the first interactive application icon in the second area of the display, the device detects an input that activates the first interactive application icon and, in response to detecting the input that activates the first interactive application icon, the device displays a user interface for the first interactive application within the conversation transcript (e.g., displays the first interactive application object) and ceases to display the first interactive application icon (e.g., replacing display of the first interactive application icon with display of an input area for the first interactive application in the second area of the display). For example, device 100-2 displays interactive pizza ordering application object 3735 in conversation transcript 3700, and replaces display of application selection tray 3654, which includes interactive pizza ordering launch icon 3613, in FIG. 37BZ, with interactive pizza ordering application input area 3731, in FIG. 37CA.

In some embodiments, prior to displaying the first interactive application object within the conversation transcript, the device (5428) displays the messaging user interface including the conversation transcript (e.g., displayed in a first area of the display) of the messaging session between the user of the electronic device and the at least one other user (e.g., of another electronic device) and an application affordance. For example, device 100-1 displays messaging user interface 3500, including conversation transcript 3503 and application affordance 3508, in FIG. 38AQ.

While displaying the messaging user interface, the device detects an input that activates the application affordance (e.g., detecting a tap gesture at a location that corresponds to the application affordance). For example an input including contact 3876 on application affordance 3508, in FIG. 38AR.

In response to detecting the input that activates the application affordance, the device maintains display of at least a portion of the conversation transcript in a first area of the display and displays, in a second area of the display that includes a plurality of launch icons for interactive applications, a launch icon for the first interactive application. For example, device 100-1 maintains display of conversation transcript 3503 and displays application selection tray 3654 in FIG. 38AS.

In some embodiments, where the messaging user interface includes display of an electronic keyboard prior to detecting activation of the application affordance, the display of the plurality of launch icons for interactive applications replaces display of the keyboard. For example, application selection tray 3654, in FIG. 38AS, replaces digital keyboard in FIG. 38AR.

In some embodiments, where the messaging user interface includes a full-screen display of the conversation transcript prior to detecting activation of the application affordance, the display of the plurality of launch icons for interactive applications replaces a portion of the display of the message transcript. For example, conversation transcript 3700, displayed in full-screen mode in FIG. 37A0, shrinks to accommodate display of application slide tray 3892 in FIG. 37AP.

While displaying the plurality of launch icons for interactive applications, the device detects an input that activates the launch icon for the first interactive application. For example, an input including contact 3729 on pizza ordering application launch icon 3613, in FIG. 37BZ.

In response to detecting the input that activates the launch icon for the first interactive application (e.g., detecting a tap gesture at a location that corresponds to the launch icon for the first interactive application), the device displays a user interface for the first interactive application within the conversation transcript (e.g., displaying the first interactive application object). For example, device 100-2 displays interactive pizza ordering application object 3735 within transcript 3700, in FIG. 37CA.

In some embodiments, in response to detecting the input that activates the launch icon for the first interactive application, the device replaces (5426) display of the plurality of launch icons for interactive applications with display of an input area for the first interactive application in the second area of the display. For example, interactive pizza ordering application input area 3731, in FIG. 37CA, replaces display of application selection tray 3654, in FIG. 37BZ.

It should be understood that the particular order in which the operations in FIGS. 54A-54C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5600, 5800 6000, 6200, 6400, 6600, 6800, and 7000) are also applicable in an analogous manner to method 5400 described above with respect to FIGS. 54A-54C. For example, the contacts, gestures, user interface objects, tactile outputs, intensity thresholds, focus selectors, animations described above with reference to method 5400 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5600, 5800, 6000, 6200, 6400, 6600, 6800, and 7000). For brevity, these details are not repeated here.

Figure 55:
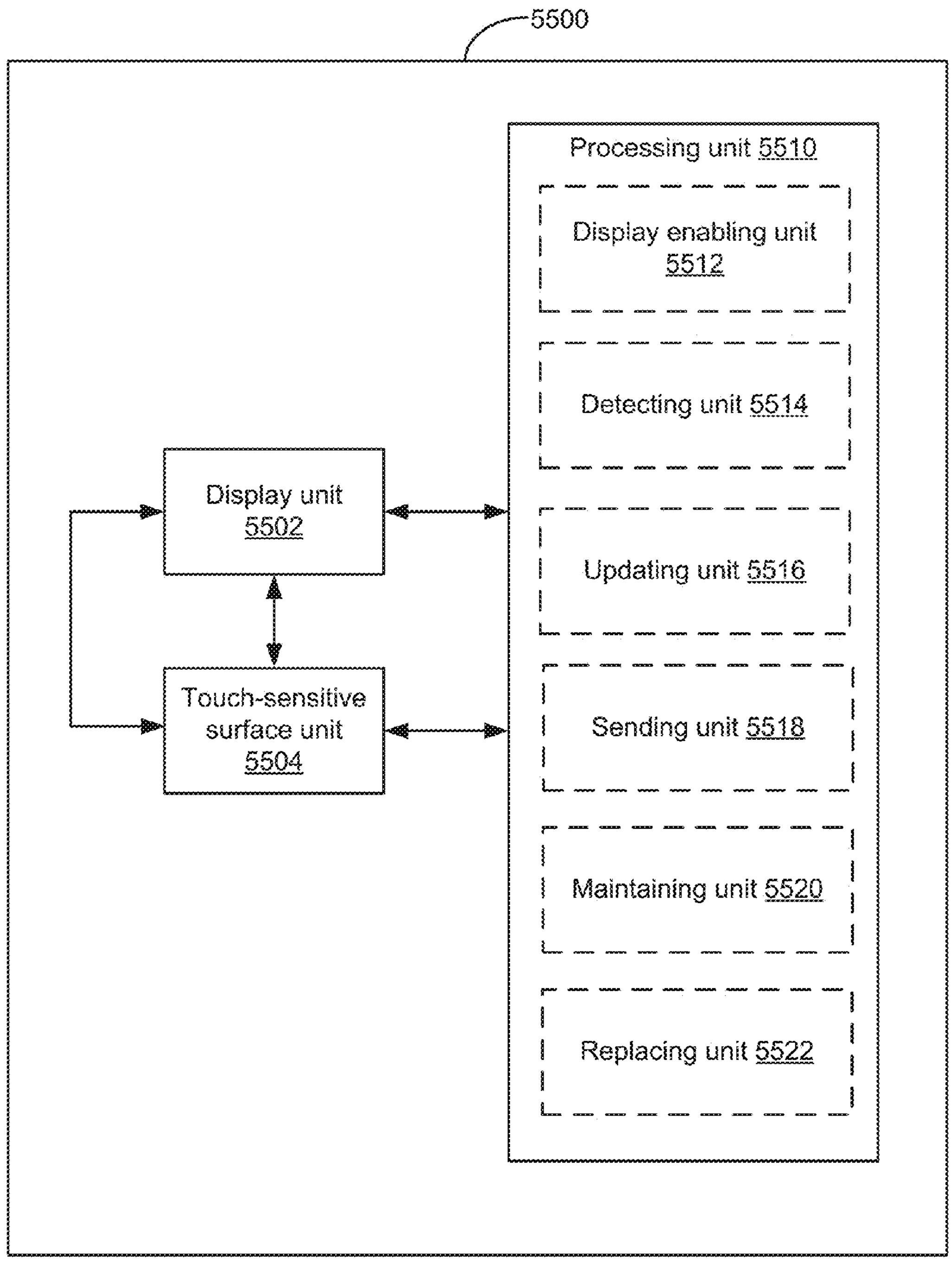
FIG. 55 is a functional block diagram of an electronic device in accordance with some embodiments.

In accordance with some embodiments, FIG. 55 shows a functional block diagram of an electronic device 5500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 55 are, optionally, combined or separated into sub-blocks to implement the principles of the various described embodiments. Therefore, the description herein optionally supports any possible combination or separation or further definition of the functional blocks described herein.

As shown in FIG. 55, an electronic device 5500 includes a display unit 5502, a touch-sensitive surface unit 5504, and a processing unit 5510 coupled with the display unit 5502 and the touch-sensitive surface unit 5504. In some embodiments, the processing unit 5510 includes: a display enabling unit 5512, a detecting unit 5514, an updating unit 5516, a sending unit 5518, a maintaining unit 5520, and a replacing unit 5522.

The processing unit 5510 is configured to enable display (e.g., with the display enabling unit 5512) of a messaging user interface of a messaging application on the display unit 5502, the messaging user interface including: a conversation transcript, displayed in a first area of the display, of a messaging session between a user of the electronic device and at least one other user, a first interactive application object displayed within the conversation transcript that corresponds to a first interactive application, a message input area, and an input area for the first interactive application, distinct from the message input area, displayed in a second area of the display, the input area for the first interactive application including one or more input affordances. The processing unit 5510 is also configured to detect (e.g., with the detecting unit 5514) an input that activates a first input affordance in the input area for the interactive application.

In some embodiments, the processing unit 5510 is further configured to: after detecting the input that activates the first input affordance: update (e.g., with the updating unit 5516) the first interactive application object that corresponds to the first interactive application in accordance with the input that activates the first input affordance; and send (e.g., with the sending unit 5518) information, to one or more electronic devices that correspond to the at least one other user included in the messaging session, that causes update (e.g., with the updating unit 5516) of a corresponding interactive application object that corresponds to the first interactive application displayed within a corresponding conversation transcript of the messaging session.

In some embodiments, content posted to the messaging session is displayed within the conversation transcript according to a temporal order in which the content was posted, and the interactive application object is displayed at a position within the conversation transcript associated with the temporal order in which a session of the interactive application was initiated.

In some embodiments, the processing unit 5510 is further configured to: enable display (e.g., with the display enabling unit 5512) of synchronous movement of content displayed in a temporal order within the conversation transcript towards an edge of the conversation transcript, the displayed content including the first interactive application object; in accordance with a determination that the first interactive application object is within a predetermined distance from the edge of the conversation transcript, enable display (e.g., with the display enabling unit 5512) of the first interactive application object at a fixed location on the display unit 5502.

In some embodiments, the processing unit 5510 is further configured to: while displaying the first interactive application object at the fixed location on the display unit 5502, continue to display synchronous movement of other content displayed in a temporal order within the conversation transcript.

In some embodiments, continuing to display synchronous movement of other content displayed in a temporal order with the conversation transcript includes animating other content such that the other content appears to move behind the first interactive application object.

In some embodiments, the processing unit 5510 is further configured to: while displaying the first interactive application object at the fixed location on the display unit 5502: detect (e.g., with the detecting unit 5514) a request to close the first interactive application; and, in response to detecting the request to close the first interactive application: cease to display (e.g., with the displaying enabling unit 5512) the first interactive application object at the fixed location on the display unit 5502; and enable display (e.g., with the display enabling unit 5512) of the first interactive application object at a position within the conversation transcript associated with the temporal order in which the session of the interactive application was initiated.

In some embodiments, the processing unit 5510 is further configured to: prior to displaying the first interactive application object within the conversation transcript: enable display (e.g., with the display enabling unit 5512) of the messaging user interface including the conversation transcript of the messaging session between the user of the electronic device and the at least one other user and an application affordance; while displaying the messaging user interface, detect (e.g., with the detecting unit 5514) an input that activates the application affordance; in response to detecting the input that activates the application affordance, maintain (e.g., with the maintaining unit 5520) display of at least a portion of the conversation transcript in a first area of the display, and enable display (e.g., with the display enabling unit 5512) of a second interactive application icon, which is one of a plurality of interactive application icons, in a second area of the display; while displaying the second interactive application icon in the second area of the display, detect (e.g., with the detecting unit 5514) a first swipe gesture that includes horizontal movement of a first contact at a location that corresponds to the second area of the display; in accordance with a determination that the first swipe gesture satisfies one or more interactive application icon switching criteria, replace (e.g., with the replacing unit 5522) display of the second interactive application icon with display of a first interactive application icon that corresponds to the first interactive application in the second area of the display; while displaying the first interactive application icon in the second area of the display, detect (e.g., with the detecting unit 5514) an input that activates the first interactive application icon; and, in response to detecting the input that activates the first interactive application icon, enable display (e.g., with the display enabling unit 5512) of a user interface for the first interactive application within the conversation transcript; and cease to display (e.g., with the display enabling unit 5512) the first interactive application icon.

In some embodiments, the processing unit 5510 is further configured to: prior to displaying the first interactive application object within the conversation transcript: enable display (e.g., with the display enabling unit 5512) of the messaging user interface including the conversation transcript of the messaging session between the user of the electronic device and the at least one other user and an application affordance; while displaying the messaging user interface, detect (e.g., with the detecting unit 5514) an input that activates the application affordance; in response to detecting the input that activates the application affordance, maintain (e.g., with the maintaining unit 5520) display of at least a portion of the conversation transcript in a first area of the display, and enable display (e.g., with the displaying enabling unit 5512) of, in a second area of the display that includes a plurality of launch icons for interactive applications, a launch icon for the first interactive application; while displaying the plurality of launch icons for interactive applications, detect (e.g., with the detecting unit 5514) an input that activates the launch icon for the first interactive application; and, in response to detecting the input that activates the launch icon for the first interactive application, enable display (e.g., with the display enabling unit 5512) of a user interface for the first interactive application within the conversation transcript.

In some embodiments, the processing unit 5510 is further configured to: in response to detecting the input that activates the launch icon for the first interactive application, replace (e.g., with the replacing unit 5522) display of the plurality of launch icons for interactive applications with display of an input area for the first interactive application in the second area of the display.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 54A-54C are, optionally, implemented by components depicted in FIGS. 1A-1B or FIG. 55. For example, detection operation 5420 and 5428 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 56A-56B are flow diagrams illustrating a method 5600 of using an interactive application in a messaging application in accordance with some embodiments. The method 5600 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 5600 are, optionally, combined and/or the order of some operations is, optionally, changed.

As described below, the method 5600 provides an intuitive way to use an interactive application in a messaging application. The method reduces the number, extent, and/or nature of the inputs from a user when using an interactive application in a messaging application, thereby creating a more efficient human-machine interface. For battery-operated electronic devices, enabling a user to use an interactive application in a messaging application faster and more efficiently conserves power and increases the time between battery charges.

The device displays (5602) a messaging user interface of a messaging application on the display, the messaging user interface including a conversation transcript of a messaging session between a user of the electronic device and at least one other user (e.g., of another electronic device), a first interactive application object displayed within the conversation transcript (e.g., a reservation application object) that corresponds to a first interactive application (e.g., an interactive application for making reservations for a meal, a movie, a hotel, or the like), and a message input area. For example, device 100-2 displays messaging user interface 3500, including conversation transcript 3700, interactive reservations application object 3728, and message input area 3502, in FIG. 37O.

The device detects (5604) a first input while a focus selector is at a location on the touch-sensitive surface that corresponds to the first interactive application object displayed within the conversation transcript (e.g., detect a gesture by a contact on a touch-sensitive display at the location of the first interactive application object, or detect a gesture by a contact on a touch-sensitive surface while a cursor or other pointer is at the location of the first interactive application object). For example, device 100-2 detects an input including contact 3738 on interactive reservations application object 3728 displayed within transcript 3700, in FIG. 37P.

In response to detecting the first input, the device displays (5606) an input area for the first interactive application that is distinct from the message input area, the input area for the first interactive application including one or more input affordances (e.g., radio buttons, text input fields, check boxes, pull down lists, and/or form fields). For example, device 100-2 displays interactive reservations application user interface 3712, including input affordances 3740-1 and 3740-2, in FIG. 37Q.

In some embodiments, display of the input area for the first interactive application in response to detecting the first input (e.g., in response to detecting an input that activates the first interactive application object) replaces (5608) display of the conversation transcript, the first interactive application object, and/or the message input area. For example, display of interactive reservations application user interface 3712 in FIG. 37Q replaces display of messaging user interface 3500, including conversation transcript 3700, interactive reservations application object 3728, and message input area 3502, in FIG. 37P.

While displaying an input area for the first interactive application, the device detects (5610) one or more inputs on the one or more input affordances. For example, device 100-2 detects inputs including contact 3752 on input affordance 3740-1, in FIG. 37X, and contact 3754 on input affordance 3740-1, in FIG. 37Z.

After detecting the one or more inputs on the one or more input affordances, the device (5612) updates the first interactive application (e.g., updating fields in a reservation application object in the conversation transcript), sends instructions (e.g., information, instructions, or a representation of an updated interactive application object) to one or more (e.g., second) electronic devices that correspond to the at least one other user included in the messaging session to update a corresponding user interface for the first interactive application displayed within a corresponding conversation transcript of the messaging session (e.g., updating a corresponding first interactive application object or other user interface for the first interactive application), and ceases to display of the input area for the first interactive application.

For example, device 100-2 updates the reservation time in input affordance 3740-1 in FIG. 37AA. Device 100-2 also sends information to device 100-1 that the time of the reservation was changed to 8:00 PM, causing device 100-1 to update interactive reservations application object 3728 to show an 8:00 PM reservation time, in FIG. 37AL, to move display of interactive reservations application object 3728 in transcript 3700 from position 3728-*a*, in FIG. 37AK, to position 3728-*b* in FIG. 37AL, and to display interactive reservations application archiving icon 3756 within transcript 3700 (e.g., at original position 3728-*b* of interactive reservations application object 3728). Device 100-2 also ceases to display interactive reservations application user interface in FIG. 37AC.

In some embodiments, the conversation transcript, the first interactive application object, and/or the message input area are redisplayed (e.g., in response to detecting an input that corresponds to a request to cease displaying the input area for the first interactive application. For example, device 100-2 redisplays messaging user interface 3500, including transcript 3700, interactive reservations application object 3728, and message-input area 3502, in FIG. 37AC.

In some embodiments, updating (5614) the first interactive application occurs in response to detecting an input on one of the input affordances. For example, interactive tic-tac-toe application object 3705 is updated (e.g., moves from transcript 3700 position 3705-*a*, in FIG. 37BL, to transcript position 3705-*b*, in FIG. 37BM) in response to detecting an input including contact 3713 on tic-tac-toe board 3791 (e.g., an input affordance), in FIG. 37BL In some embodiments, updating (5616) the first interactive application occurs in response to detecting an input that corresponds to a request to cease displaying the input area for the first interactive application. For example, interactive reservations application object 3728 is updated to display an 8:00 reservation in FIG. 37AC in response to detecting an input including contact 3756 on exit affordance 3714, in FIG. 37AB, which corresponds to a request to confirm the change to the reservation and close interactive reservations application user interface 3712. In another example, the position of interactive pizza ordering application object 3735 is updated in FIG. 37DJ in response to an input including contact 3775 on input affordance 3773-3, in FIG. 37DI, corresponding to a request to order the pizza and close input area 3731 for the interactive pizza ordering application.

In some embodiments, sending instructions (5618) (e.g., sending information, instructions, or an updated representation of an interactive application object) to one or more {e.g., second} electronic devices that correspond to the at least one other user included in the messaging session to update a corresponding user interface for the first interactive application occurs in response to detecting an input on one of the input affordances. For example, device 100-2 sends information, at 9:35 AM, that 'X' 3794 was placed on tic-tac-toe board 3791 in response to detecting an input including contact 3713 on tic-tac-toe board 3791 (e.g., an input affordance), in FIG. 37BL. Device 100-1 receives the information and updates interactive tic-tac-toe application user interface 3782, at 9:35 AM, to display 'X' 3794 on corresponding tic-tac-toe board 3791.

In some embodiments, sending instructions (5620) (e.g., sending information, instructions, or an updated representation of an interactive application object) to one or more (e.g., second) electronic devices that correspond to the at least one other user included in the messaging session to update a corresponding user interface for the first interactive application occurs in response to detecting an input that corresponds to a request to cease displaying the input area for the first interactive application. For example, device 100-2 sends information, at 9:31 AM, that the reservation has been changed to 8:00 to device 100-1 in response to detecting an input including contact 3756 on exit affordance 3714, in FIG. 37AB, which corresponds to a request to confirm the change to the reservation and close interactive reservations application user interface 3712. Device 100-1 receives the information, and updates display of interactive reservations application object 3728, in transcript 3700, at 9:31 AM, in FIG. 37AL.

In some embodiments, ceasing display (5622) of the input area for the first interactive application occurs in response to detecting an input on one of the input affordances. For example, device 100-1 ceases to display interactive pizza ordering application input area 3731, in FIG. 37DJ, in response to an input including contact 3775 on input affordance 3773-3, in FIG. 37DI, corresponding to a request to order the pizza.

In some embodiments, ceasing display (5624) of the input area for the first interactive application occurs in response to detecting an input on an exit affordance. (e.g., detecting a tap gesture on a "done," "save," or "exit" icon or on an area on the display outside of the input area for the first interactive application). For example, device 100-2 ceases to display interactive reservations application user interface 3712, in FIG. 37AC, in response to detecting an input including contact 3756 on exit affordance 3714, in FIG. 37AB.

In some embodiments, the interactive application is configured to perform a subset (e.g., less than all) of the functions of a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application displays a portion (e.g., less than all) of the content displayed by a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application causes the device to launch a corresponding application operated separate from the messaging application upon detection of a predefined input. For example, in response to a first input (e.g., a tap, press, deep press, long-press, or multi-finger gesture) on interactive reservations application icon 3728 in FIG. 37P, the device launches the interactive reservations application within the messaging application. In response to a second (e.g., different) input (e.g., a tap, press, deep press, long-press, or multi-finger gesture) on interactive reservations application icon 3728 in FIG. 37P, the device launches a reservations application outside of the messaging application.

In some embodiments, the interactive application is operated separately from a corresponding application operated separate from the messaging application. For example, the interactive reservations application launched in response to activation of icon 3728 in FIG. 37P is operable when a corresponding reservations application operated outside of the messaging application is not running.

In some embodiments, the interactive application is operated in conjunction with a corresponding application operated separate from the messaging application. For example, the interactive reservations application launched in response to activation of icon 3728 in FIG. 37P is not operable when a corresponding reservations application operated outside of the messaging application is not running.

In some embodiments, the interactive application has a dedicated portion of the memory for temporary storage that is different from a dedicated portion of the memory for temporary storage for a corresponding application operated separate from the messaging application. For example, in some embodiments, records of reservations made using the interactive reservations application launched in response to activation of icon 3728 in FIG. 37P and operated within the messaging application are stored in a different portion of memory than records of reservations made using a corresponding reservations application operated outside of the messaging application.

In some embodiments, the corresponding application operated separate from the messaging application is configured to access the dedicated portion of memory for temporary storage for the interactive application. For example, in some embodiments, the corresponding reservations application operated outside of the messaging application can access the records of reservations made using the interactive reservations application launched in response to activation of icon 3728 in FIG. 37P and operated within the messaging application.

In some embodiments, the interactive application icon/object displays an identifier for a corresponding application operated separate from the messaging application. For example, in FIG. 37K, interactive reservations application icon/object 3730 displays a concentric circle symbol that corresponds to a reservations application operated separate from the messaging application.

It should be understood that the particular order in which the operations in FIGS. 56A-56B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5800, 6000, 6200, 6400, 6600, 6800, and 7000) are also applicable in an analogous manner to method 5600 described above with respect to FIGS. 56A-56B. For example, the contacts, gestures, user interface objects, tactile outputs, intensity thresholds, focus selectors, animations described above with reference to method 5600 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5800, 6000, 6200, 6400, 6600, 6800, and 7000). For brevity, these details are not repeated here.

Figure 57:
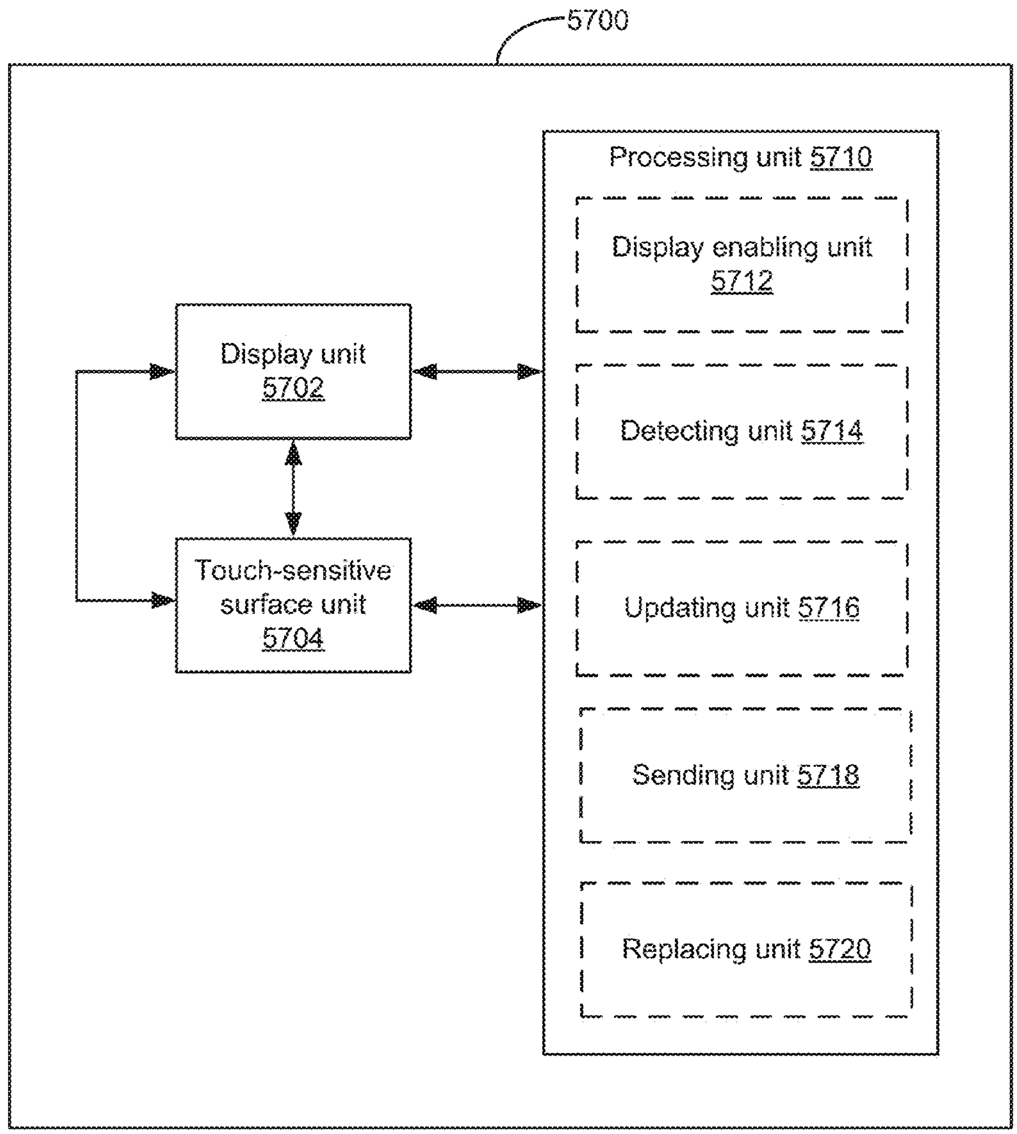
FIG. 57 is a functional block diagram of an electronic device in accordance with some embodiments.

In accordance with some embodiments, FIG. 57 shows a functional block diagram of an electronic device 5700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 57 are, optionally, combined or separated into sub-blocks to implement the principles of the various described embodiments. Therefore, the description herein optionally supports any possible combination or separation or further definition of the functional blocks described herein.

As shown in FIG. 57, an electronic device 5700 includes a display unit 5702, a touch-sensitive surface unit 5704, and a processing unit 5710 coupled with the display unit 5702 and the touch-sensitive surface unit 5704. In some embodiments, the processing unit 5710 includes: a display enabling unit 5712, a detecting unit 5714, an updating unit 5716, a sending unit 5718, and a replacing unit 5720.

The processing unit 5710 is configured to enable display (e.g., with the display enabling unit 5712) of a messaging user interface of a messaging application on the display unit 5702, the messaging user interface including: a conversation transcript of a messaging session between a user of the electronic device and at least one other user, a first interactive application object displayed within the conversation transcript that corresponds to a first interactive application, and a message input area. The processing unit 5710 is also configured to detect (e.g., with the detecting unit 5714) a first input while a focus selector is at a location on the touch-sensitive surface unit 5704 that corresponds to the first interactive application object displayed within the conversation transcript. In response to detecting the first input, the processing unit 5710 is configured to enable display (e.g., with the display enabling unit 5712) of an input area for the first interactive application that is distinct from the message input area, the input area for the first interactive application including one or more input affordances. While displaying an input area for the first interactive application, the processing unit 5710 is configured to detect (e.g., with the detecting unit 5714) one or more inputs on the one or more input affordances. After detecting the one or more inputs on the one or more input affordances, the processing unit 5710 is configured to: update (e.g., with the updating unit 5716) the first interactive application; send (e.g., with the sending unit 5718) information to one or more electronic devices that correspond to the at least one other user included in the messaging session that causes updating of a corresponding user interface for the first interactive application displayed within a corresponding conversation transcript of the messaging session; and cease display (e.g., with the display enabling unit 5712) of the input area for the first interactive application.

In some embodiments, display of the input area for the first interactive application in response to detecting the first input replaces (e.g., with the replacing unit 5720) display of the conversation transcript, the first interactive application object, and/or the message input area.

In some embodiments, updating the first interactive application occurs in response to detecting an input on one of the input affordances.

In some embodiments, updating the first interactive application occurs in response to detecting an input that corresponds to a request to cease displaying the input area for the first interactive application.

In some embodiments, sending information to one or more electronic devices that correspond to the at least one other user included in the messaging session that causes updating of a corresponding user interface for the first interactive application occurs in response to detecting an input on one of the input affordances.

In some embodiments, sending information to one or more electronic devices that correspond to the at least one other user included in the messaging session that causes updating of a corresponding user interface for the first interactive application occurs in response to detecting an input that corresponds to a request to cease displaying of the input area for the first interactive application.

In some embodiments, ceasing display of the input area for the first interactive application occurs in response to detecting an input on one of the input affordances.

In some embodiments, ceasing display of the input area for the first interactive application occurs in response to detecting an input on an exit affordance.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 56A-56B are, optionally, implemented by components depicted in FIGS. 1A-1B or FIG. 57. For example, detection operations 5604 and 5610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 58 is a flow diagram illustrating a method 5800 of enabling use of an interactive application in a messaging application in accordance with some embodiments. The method 5800 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 5800 are, optionally, combined and/or the order of some operations is, optionally, changed.

As described below, the method 5800 provides an intuitive way to enable use of an interactive application in a messaging application. The method reduces the number, extent, and/or nature of the inputs from a user when enabling use of an interactive application in a messaging application, thereby creating a more efficient human-machine interface. For battery-operated electronic devices, enabling a user to enable use of an interactive application in a messaging application faster and more efficiently conserves power and increases the time between battery charges.

In some embodiments, the device has one or more processors, memory, and a display, where a messaging application and a plurality of other applications are stored in the memory, and a respective application in the plurality of other applications has a normal mode for normal operation on the electronic device (e.g., as a standalone application, separate from the messaging application) and an embedded mode for operation within the messaging application on the electronic device;

In some embodiments, the electronic device includes a touch-sensitive surface, e.g., a track-pad or touch-sensitive display. In some embodiments, the electronic device includes one or more sensors configured to detect intensities of contacts on the touch-sensitive surface.

The device (5802) displays a plurality of toggle affordances, where a respective toggle affordance in the plurality of toggle affordances has a corresponding application in the plurality of other applications stored in the memory, the respective toggle affordance has a first state that enables display of a respective launch icon, within the messaging application, for operation of the corresponding application in the embedded mode within the messaging application, the respective toggle affordance has a second state that prevents display of the respective launch icon, within the messaging application, to prevent operation of the corresponding application in the embedded mode within the messaging application, and the plurality of toggle affordances include a first toggle affordance for a first application that is displayed in the first state and a second toggle affordance for a second application that is displayed in the second state.

While displaying the plurality of toggle affordances, the device detects (5804) a first user input at a first location that corresponds to the first toggle affordance (e.g., detecting a tap or swipe gesture at a location on a touch-sensitive surface that corresponds to a location of the first toggle affordance on the display).

In response to detecting the first user input at the first location that corresponds to the first toggle affordance, the device (5806) changes the first toggle affordance from the first state to the second state, and prevents display of a corresponding launch icon for the first application in the messaging application.

In some embodiments, while displaying the plurality of toggle affordances, the device (5808) detects a second user input at a second location that corresponds to the second toggle affordance (e.g., detecting a tap or swipe gesture at a location on a touch-sensitive surface that corresponds to a location of the second toggle affordance on the display) and, in response to detecting the second user input at the second location that corresponds to the second toggle affordance, changes the second toggle affordance from the second state to the first state and enables display of a corresponding launch icon for the second application in the messaging application.

It should be understood that the particular order in which the operations in FIG. 58 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 6000, 6200, 6400, 6600, 6800, and 7000) are also applicable in an analogous manner to method 5800 described above with respect to FIG. 58. For example, the contacts, gestures, user interface objects, tactile outputs, intensity thresholds, focus selectors, animations described above with reference to method 5800 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 6000, 6200, 6400, 6600, 6800, and 7000). For brevity, these details are not repeated here.

Figure 59:
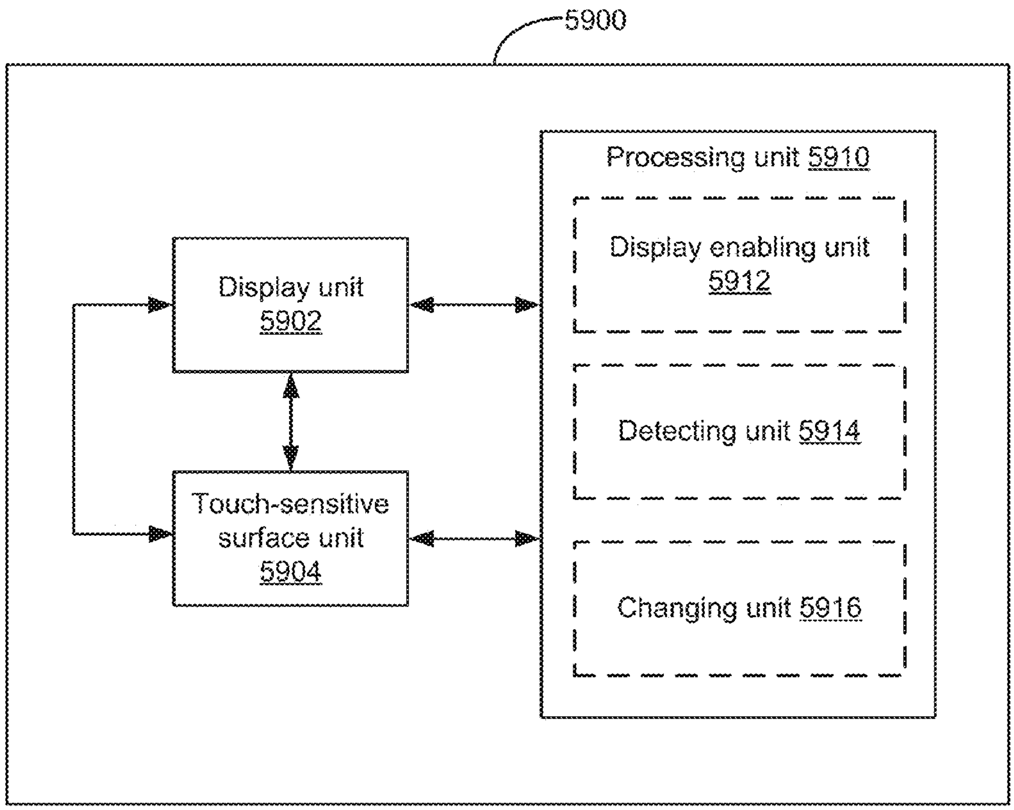
FIG. 59 is a functional block diagram of an electronic device in accordance with some embodiments.

In accordance with some embodiments, FIG. 59 shows a functional block diagram of an electronic device 5900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 59 are, optionally, combined or separated into sub-blocks to implement the principles of the various described embodiments. Therefore, the description herein optionally supports any possible combination or separation or further definition of the functional blocks described herein.

As shown in FIG. 59, an electronic device 5900 includes a display unit 5902, a touch-sensitive surface unit 5904, and a processing unit 5910 coupled with the display unit 5902 and the touch-sensitive surface unit 5904. In some embodiments, a messaging application and a plurality of other applications are stored in memory of the electronic device 5900, and a respective application in the plurality of other applications has a normal mode for normal operation on the electronic device 5900 and an embedded mode for operation within the messaging application on the electronic device 5900. In some embodiments, the processing unit 5910 includes: a display enabling unit 5912, a detecting unit 5914, and a changing unit 5916.

The processing unit 5910 is configured to enable display (e.g., with the display enabling unit 5912) of a plurality of toggle affordances. In some embodiments, a respective toggle affordance in the plurality of toggle affordances has a corresponding application in the plurality of other applications stored in the memory; the respective toggle affordance has a first state that enables display of a respective launch icon, within the messaging application, for operation of the corresponding application in the embedded mode within the messaging application; the respective toggle affordance has a second state that prevents display of the respective launch icon, within the messaging application, to prevent operation of the corresponding application in the embedded mode within the messaging application; the plurality of toggle affordances include a first toggle affordance for a first application that is displayed in the first state and a second toggle affordance for a second application that is displayed in the second state. While displaying the plurality of toggle affordances, the processing unit 5910 is configured to detect (e.g., with the detecting unit 5914) a first user input at a first location that corresponds to the first toggle affordance. In response to detecting the first user input at the first location that corresponds to the first toggle affordance, the processing unit 5910 is configured to change (e.g., with the changing unit 5916) the first toggle affordance from the first state to the second state, and prevent display (e.g., with the display enabling unit 5912) of a corresponding launch icon for the first application in the messaging application.

In some embodiments, while displaying the plurality of toggle affordances, the processing unit 5910 is further configured to detect (e.g., with the detecting unit 5914) a second user input at a second location that corresponds to the second toggle affordance; and, in response to detecting the second user input at the second location that corresponds to the second toggle affordance, change (e.g., with the changing unit 5916) the second toggle affordance from the second state to the first state, and enable display (e.g., with the display enabling unit 5912) of a corresponding launch icon for the second application in the messaging application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 58 are, optionally, implemented by components depicted in FIGS. 1A-1B or FIG. 59. For example, display operation 5802 and detection operation 5804 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 60A-60D are flow diagrams illustrating a method 6000 of navigating within a messaging application having associated applications in accordance with some embodiments. The method 6000 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6000 are, optionally, combined and/or the order of some operations is, optionally, changed.

As described below, the method 5000 provides an intuitive way to navigate within a messaging application having associated applications. The method reduces the number, extent, and/or nature of the inputs from a user when navigating within a messaging application having associated applications, thereby creating a more efficient human-machine interface. For battery-operated electronic devices, enabling a user to navigate within a messaging application having associated applications faster and more efficiently conserves power and increases the time between battery charges.

The device displays (6002) a messaging user interface (e.g., of a messaging application) on the display, the messaging user interface including a conversation transcript (e.g., displayed in a first area of the display) of a messaging session between a user of the electronic device and at least one other user (e.g., of another electronic device), a message-input area, a digital image affordance, a digital touch affordance, and an application affordance. In some embodiments, the messaging user interface also includes a keyboard, e.g., displayed in a second area of the display.

For example, in FIG. 38A, device 100-1 displays messaging user interface 3500 on touch screen 112. Messaging user interface 3500 includes conversation transcript 3503, digital image affordance 3504, digital canvas affordance 3506, application affordance 3508, and message-input area 3502. In FIG. 38AV, messaging user interface also includes digital keyboard 3501.

In some embodiments, the messaging user interface also includes (6004) a microphone affordance, configured to enable sound recording on the electronic device upon activation. For example, microphone affordance 3802 in FIG. 38A.

In some embodiments, the messaging user interface also includes (6006) at least one avatar corresponding to a first other user included in the messaging session, configured to enable the electronic device to display a menu that contains activatable menu items associated with the at least one avatar overlaid on the messaging user interface when activated.

For example, in FIGS. 38A and 38AW, conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe") displayed in stack of avatars 3892. Upon activation of Abe's avatar 3510, by an input including contact 3880 in FIG. 38AW, the device displays menu 3882 containing activatable menu items 3884, in FIG. 38AX.

In some embodiments, the menu that contains activatable menu items associated with the at least one avatar includes (6008) a menu item that when activated initiates a digital touch action with the first other user (e.g., menu item 3884-5 in FIG. 38AX), a menu item that when activated initiates messaging with only the first other user (e.g., selecting a messaging menu item causes the electronic device to display a private messaging user interface between the user of the electronic device and the first other user) (e.g., menu item 3884-3 in FIG. 38AX), a menu item that when activated initiates an email with the first other user (e.g., menu item 3884-4 in FIG. 38AX), a menu item that when activated initiates a call with the first other user (e.g., menu item 3884-1 in FIG. 38AX), a menu item that when activated initiates a video conference with the first other user (e.g., menu item 3884-2 in FIG. 38AX), and/or a menu item that when activated initiates a payment action with the first other user (e.g., menu item 3884-6 in FIG. 38AX).

While displaying the messaging user interface, the device detects (6010) a first input on the touch sensitive surface (e.g., for an electronic device with a touch sensitive display, detecting a tap gesture). For example an input including one of contact 3804 on digital image affordance 3504, in FIG. 38B, contact 3852 on digital canvas affordance 3506, in FIG. 38AA, and contact 3868 on application affordance 3508, in FIG. 38AJ.

In response to detecting the first input, the device (6012): in accordance with a determination that the first input is made while a focus selector is at a location in the messaging user interface that corresponds to the digital image affordance, displays a plurality of digital images within the messaging user interface (e.g., digital images 3514 and 3518 in digital image tray 3806 in FIG. 38C); in accordance with a determination that the first input is made while a focus selector is at a location in the messaging user interface that corresponds to the digital canvas affordance, displaying a digital drawing canvas within the messaging user interface (e.g., digital drawing canvas 3858 in digital touch tray 3854 in FIG. 38AH); and in accordance with a determination that the first input is made while a focus selector is at a location in the messaging user interface that corresponds to the application affordance, displaying one or more launch icons for an (e.g., interactive) application within the messaging user interface (e.g., application launch icon 3708 in application swipe tray 3892 in FIG. 38AK or application launch icons 3601, 3603, 3605, 3607, 3609, 3611, 3613, and 3615 in application selection tray 3654 in FIG. 38AN).

In some embodiments, displaying the plurality of digital images within the messaging user interface includes (6014): in accordance with a determination that the messaging user interface included display of a keyboard at the time the first input was detected, replacing display of the keyboard with the display of the plurality of digital images, the plurality of digital images including a live preview image from the digital camera, and in accordance with a determination that the messaging user interface did not include display of a keyboard at the time the first input was detected, displaying the conversation transcript in a first area of the display and displaying the plurality of digital images in a second area of the display, the plurality of digital images including a live preview image from the digital camera.

For example, in FIG. 38C, the size of conversation transcript 3503 is reduced, with respect to the size of conversation transcript 3503 in FIG. 38B, to accommodate display of digital image tray 3806, including live preview image 3514 from optical sensor 164 and previously captured digital images 3518.

In another example, display of digital keyboard 3501, in FIG. 38X, is replaced by display of digital image tray 3806, including live preview image 3514 from optical sensor 164 and previously captured digital images 3518, in FIG. 38Y.

In some embodiments, replacing display of the keyboard includes displaying the plurality of digital images over the keyboard. In some embodiments, replacing display of the keyboard includes ceasing to display the keyboard and displaying the plurality of digital images where the keyboard had been displayed (e.g., as in FIGS. 38X-38Y).

In some embodiments, the plurality of digital images is a scrollable array of digital images. For example, digital image tray 3806 is scrolled in FIG. 38E to reveal additional digital images 3518-6 and 3518-7.

In some embodiments, the plurality of digital images includes a recently shared image, a recently received image, an image including a participant in the conversation (e.g., as identified by facial recognition), a real-time image from a forward-facing digital camera in the device, or a real-time image from a backwards-facing digital camera in the device.

In some embodiments, the plurality of digital images consists of the live preview image from the digital camera (e.g., live preview image 3514 in FIG. 38C) and a plurality of digital images captured during the messaging session.

In some embodiments, where the conversation transcript was maximized at the time the second input was detected, display of the conversation transcript is partially replaced by display of the plurality of digital images. For example, display of conversation transcript 3503 is partially replaced by digital image tray 3806 in FIG. 38C.

In some embodiments, while displaying the plurality of digital images, the device (6016) detects an input that selects a digital image in the plurality of digital images (e.g., an input including contact 3512 on live preview image 3514 in FIG. 35D) and, after detecting the input that selects a digital image in the plurality of digital images, displays the selected digital image in the conversation transcript (e.g., display of captured digital image 3518-5 in conversation transcript 3503 in FIGS. 35G and 35I) and transmitting a representation of the selected digital image to one or more electronic devices that correspond to the at least one other user included in the messaging session, wherein the one or more electronic devices display the representation of the selected digital image in a conversation transcript that corresponds to the messaging session.

In some embodiments, the digital image is automatically posted to the messaging session upon selection. For example, digital image 3518-5 is automatically posted to the messaging session in FIG. 35I in response to an input including contact 3524 in FIGS. 35H-35I.

In some embodiments, the digital image is displayed in the message input area and the user posts the image to the messaging session (e.g., by activating a send icon with a tap gesture). For example, digital image 3518-5 is displayed in message-input area 3502, in FIG. 35E, in response to detecting an input including contact 3512, in FIG. 35D. Digital image 3518-5 is then posted to the messaging session, in FIG. 35G, in response to detecting an input including contact 3522 on posting affordance 3520, in FIG. 35F.

In some embodiments, the device (6018) detects an input that selects the live image displayed within the plurality of digital images (e.g., for an electronic device with a touch sensitive display, detecting a tap gesture on the live image) and, in response to detecting that input that selects the live image, captures a digital image with the digital camera, while maintaining display of the conversation transcript. For example, in response to detecting an input including contact 3512 on capture affordance 3516 displayed over live preview image 3514, in FIG. 35D, the device captures digital image 3518-5, while maintaining display of conversation transcript 3503, in FIG. 35E.

In some embodiments, after capturing the digital image, the device (6020) displays the digital image captured by the digital camera in the conversation transcript and transmits a representation of the captured digital image to one or more electronic devices that correspond to the at least one other user included in the messaging session, where the one or more electronic devices display the representation of the captured digital image in a conversation transcript that corresponds to the messaging session. For example, captured image 3518-5 is displayed in conversation transcript 3503 in FIGS. 35G and 35I.

In some embodiments, the captured image is automatically posted to the messaging session upon selection of the live image. For example, captured digital image 3518-5 is automatically posted to the messaging session in FIG. 35I in response to an input including contact 3524 in FIGS. 35H-35I.

In some embodiments, the captured image is displayed in the message input area and the user posts the image to the messaging session (e.g., by activating a send icon with a tap gesture). For example, captured digital image 3518-5 is displayed in message-input area 3502, in FIG. 35E, in response to detecting an input including contact 3512, in FIG. 35D. Captured digital image 3518-5 is then posted to the messaging session, in FIG. 35G, in response to detecting an input including contact 3522 on posting affordance 3520, in FIG. 35F.

In some embodiments, displaying the digital drawing canvas within the messaging user interface includes (6022), in accordance with a determination that the messaging user interface included display of a keyboard at the time the first input was detected, replacing display of the keyboard with the display of the digital drawing canvas and, in accordance with a determination that the messaging user interface did not include display of a keyboard at the time the first input was detected, displaying the conversation transcript in a first area of the display and displaying the plurality of digital touch actions in a second area of the display.

For example, in FIG. 38AB, the size of conversation transcript 3503 is reduced, with respect to the size of conversation transcript 3503 in FIG. 38AA, to accommodate display of digital touch tray 3854, including digital drawing canvas 3858.

In another example, display of digital keyboard 3501, in FIG. 38G, is replaced by display of digital touch tray 3854, including digital drawing canvas 3858, in FIG. 38AH.

In some embodiments, replacing display of the keyboard includes displaying the digital drawing canvas over the keyboard. In some embodiments, replacing display of the keyboard includes ceasing to display the keyboard and displaying the digital drawing canvas where the keyboard had been displayed (e.g., as illustrated in FIGS. 38AG-38AH).

In some embodiments, where the conversation transcript was maximized at the time the second input was detected, display of the conversation transcript is partially replaced by display of the digital drawing canvas (e.g., as illustrated in FIGS. 38AA-38AB).

In some embodiments, displaying the one or more launch icons for an (e.g., interactive) application within the messaging user interface includes (6024): in accordance with a determination that the messaging user interface included display of a keyboard at the time the first input was detected, replacing display of the keyboard with the display of the one or more launch icons for an (e.g., interactive) application and, in accordance with a determination that the messaging user interface did not include display of a keyboard at the time the first input was detected, displaying the conversation transcript in a first area of the display and displaying the one or more launch icons for an (e.g., interactive) application in a second area of the display.

For example, in FIG. 38AK, the size of conversation transcript 3503 is reduced, with respect to the size of conversation transcript 3503 in FIG. 38AJ, to accommodate display of application swipe tray 3893, including interactive reservations application launch icon 3708.

In another example, display of digital keyboard 3501, in FIG. 38AR, is replaced by display of application selection tray 3654, including application launch icons 3601, 3603, 3605, 3607, 3609, 3611, 3613, and 3615, in FIG. 38AS.

In some embodiments, replacing display of the keyboard includes displaying the one or more launch icon over the keyboard. In some embodiments, replacing display of the keyboard includes ceasing to display the keyboard and displaying the one or more launch icon where the keyboard had been displayed (e.g., as illustrated in FIGS. 38AR-38AS).

In some embodiments, the one or more launch icon is a single launch icon in a scrollable list of launch icons (e.g., interactive reservations application launch icon 3708 in application swipe tray 3892 in FIG. 37AQ).

In some embodiments, the one or more launch icon is a plurality of launch icons, e.g., displayed in a mini springboard (e.g., application launch icons 3601, 3603, 3605, 3607, 3609, 3611, 3613, and 3615 displayed in application selection tray 3654 in FIG. 38AN).

In some embodiments, where the conversation transcript was maximized at the time the second input was detected, display of the conversation transcript is partially replaced by display of the one or more launch icon (e.g., as illustrated in FIGS. 38AJ-38AK).

In some embodiments, while displaying the one or more launch icons for an (e.g., interactive) application, the device (6026) detects an input that activates a launch icon in the one or more launch icons for an (e.g., interactive) application (e.g., an input including one of contact 3710 in FIG. 37F, contact 3776 in FIG. 37AT, and contact 3729 in FIG. 37BZ).

In some embodiments, after detecting the input that activates the launch icon in the one or more launch icons for an (e.g., interactive) application, the device displays a first input area for an (e.g., interactive) application corresponding to the activated launch icon the (e.g., interactive) application that is distinct from the message input area, the input area for the first interactive application including one or more input affordances (e.g., radio buttons, text input fields, check boxes, pull down lists, and/or form fields. For example, interactive reservations application user interface 3712 in FIG. 37G, interactive tic-tac-toe application input area 3778 in FIG. 37AV, interactive tic-tac-toe application user interface 3784 FIG. 37AW, or interactive pizza ordering application input area 3731 in FIG. 37CA.

In some embodiments, the first input area is displayed over/replaces display of a portion of the messaging user interface. (e.g., interactive reservations application user interface 3712 in FIG. 37G).

In some embodiments, the first input area replaces display of the one or more launch icons for an (e.g., interactive) application (e.g., interactive tic-tac-toe application input area 3778 in FIG. 37AV or interactive pizza ordering application input area 3731 in FIG. 37CA).

In some embodiments, the first input area is displayed over/replaces display of the entire messaging user interface (e.g., interactive reservations application user interface 3712 in FIG. 37G or interactive tic-tac-toe application user interface 3784 FIG. 37AW).

In some embodiments, the first input area for the (e.g., interactive) application is a menu including choices as to how to operate a session of the (e.g., interactive) application (e.g., play tic-tac-toe as X or O). For example, interactive tic-tac-toe application input area 3778 in FIG. 37AV.

In some embodiments, the first input area for the (e.g., interactive) application is a user interface for the (e.g., interactive) application.

In some embodiments, the device displays a first (e.g., interactive) application object within the conversation transcript that corresponds to the (e.g., interactive) application corresponding to the activated launch icon. For example, interactive reservations application object 3728, in FIG. 37I, corresponding to an interactive reservations application launched from launch icon 3708, in FIG. 37F. Another example is interactive tic-tac-toe application object 3728, in FIG. 37AW, corresponding to an interactive tic-tac-toe application launched from launch icon 3774 in FIG. 37AT. Another example is interactive pizza ordering application object 3725, in FIG. 37CA, corresponding to an interactive pizza ordering application launched from launch icon 3613, in FIG. 37BZ.

In some embodiments, where display of at least a portion of the conversation transcript is maintained while the first input area for the (e.g., interactive) application is displayed, the interactive application object is displayed immediately in the conversation transcript (e.g., interactive tic-tac-toe application object 3728, in FIG. 37AW and interactive pizza ordering application object 3725, in FIG. 37CA).

In some embodiments, where display of the first input area for the (e.g., interactive) application replaces display of the conversation transcript, the interactive application object is displayed after display of the first input area is terminated (e.g., interactive reservations application object 3728, in FIG. 37I).

In some embodiments, transmitting a representation of a second (e.g., interactive) application object that corresponds to the (e.g., interactive) application corresponding to the activated launch icon to one or more electronic devices that correspond to the at least one other user included in the messaging session, where the one or more electronic devices display the representation of the second (e.g., interactive) application object in a conversation transcript that corresponds to the messaging session.

For example, device 100-2 displays interactive reservations application object 3728, in FIG. 37K, in response to receiving information from device 100-1 that a session of the corresponding interactive reservations application was initiated within the messaging session corresponding to conversation transcript 3700.

In another example, device 100-2 displays interactive tic-tac-toe application object 3705, in FIG. 37BF, in response to receiving information from device 100-1 that a session of the corresponding interactive tic-tac-toe application was initiated within the messaging session corresponding to conversation transcript 3700.

In another example, device 100-1 displays interactive pizza ordering application object 3735, in FIG. 37CR, in response to receiving information from device 100-2 that a session of the corresponding pizza ordering application was initiated with the messaging session corresponding to conversation transcript 3700.

In some embodiments, the second (e.g., interactive) application object is the same as the first (e.g., interactive) application object, e.g., for a standard messages application. In some embodiments, the second (e.g., interactive) application object is different from the first (e.g., interactive) application object, e.g., for a third party messages application that the other user may need to download to use.

In some embodiments, the interactive application is configured to perform a subset (e.g., less than all) of the functions of a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application displays a portion (e.g., less than all) of the content displayed by a corresponding application operated separate from the messaging application. For example, in some embodiments, an interactive reservations application operated within a messaging application is be configured to allow making reservations but not configured to allow users to comment on a restaurant. In contrast, the corresponding reservation application operable outside of the messaging application is configured to allow making reservations and commenting on a restaurant.

In some embodiments, the interactive application causes the device to launch a corresponding application operated separate from the messaging application upon detection of a predefined input. For example, in response to a first input (e.g., a tap, press, deep press, long-press, or multi-finger gesture) on interactive reservations application icon 3728 in FIG. 37P, the device launches the interactive reservations application within the messaging application. In response to a second (e.g., different) input (e.g., a tap, press, deep press, long-press, or multi-finger gesture) on interactive reservations application icon 3728 in FIG. 37P, the device launches a reservations application outside of the messaging application.

In some embodiments, the interactive application is operated separately from a corresponding application operated separate from the messaging application. For example, the interactive reservations application launched in response to activation of icon 3728 in FIG. 37P is operable when a corresponding reservations application operated outside of the messaging application is not running.

In some embodiments, the interactive application is operated in conjunction with a corresponding application operated separate from the messaging application. For example, the interactive reservations application launched in response to activation of icon 3728 in FIG. 37P is not operable when a corresponding reservations application operated outside of the messaging application is not running.

In some embodiments, the interactive application has a dedicated portion of the memory for temporary storage that is different from a dedicated portion of the memory for temporary storage for a corresponding application operated separate from the messaging application. For example, in some embodiments, records of reservations made using the interactive reservations application launched in response to activation of icon 3728 in FIG. 37P and operated within the messaging application are stored in a different portion of memory than records of reservations made using a corresponding reservations application operated outside of the messaging application.

In some embodiments, the corresponding application operated separate from the messaging application is configured to access the dedicated portion of memory for temporary storage for the interactive application. For example, in some embodiments, the corresponding reservations application operated outside of the messaging application can access the records of reservations made using the interactive reservations application launched in response to activation of icon 3728 in FIG. 37P and operated within the messaging application.

In some embodiments, the interactive application icon/object displays an identifier for a corresponding application operated separate from the messaging application. For example, in FIG. 37K, interactive reservations application icon/object 3730 displays a concentric circle symbol that corresponds to a reservations application operated separate from the messaging application.

In some embodiments, while displaying the message-input area, the device (6028) detecting a second input that activates the message-input area (e.g., an input including one of contact 3872, in FIG. 38AN, contact 3878, in FIG. 38AU, and contact 3528 in FIG. 35L).

In some embodiments, in response to detecting the input that activates the message-input area, in accordance with a determination that the messaging user interface included display of a keyboard and did not include display of the three activatable affordances at the time the second input was detected, the device displays a prompt within the message-input area.

In some embodiments, in response to detecting the input that activates the message-input area, in accordance with a determination that the messaging user interface included display of a keyboard and the three activatable affordances at the time the second input was detected, the device: ceases to display the three activatable affordances, displays the application expansion affordance, expands display of the message input-area, and displays a prompt within the message-input area.

In some embodiments, in response to detecting the input that activates the message-input area, in accordance with a determination that the messaging user interface did not include display of a keyboard and included display of the three activatable affordances at the time the second input was detected, the device: ceases to display the three activatable affordances, displays the application expansion affordance, expands display of the message input-area, displays a prompt within the message-input area, and displays a keyboard.

In some embodiments, in response to detecting the input that activates the message-input area, in accordance with a determination that the messaging user interface did not include display of a keyboard and included display of the three activatable affordances at the time the second input was detected, the device: displays a prompt within the message-input area, and displays a keyboard.

It should be understood that the particular order in which the operations in FIGS. 60A-60D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6200, 6400, 6600, 6800, and 7000) are also applicable in an analogous manner to method 6000 described above with respect to FIGS. 60A-60D. For example, the contacts, gestures, user interface objects, tactile outputs, intensity thresholds, focus selectors, animations described above with reference to method 6000 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6200, 6400, 6600, 6800, and 7000). For brevity, these details are not repeated here.

Figure 61:
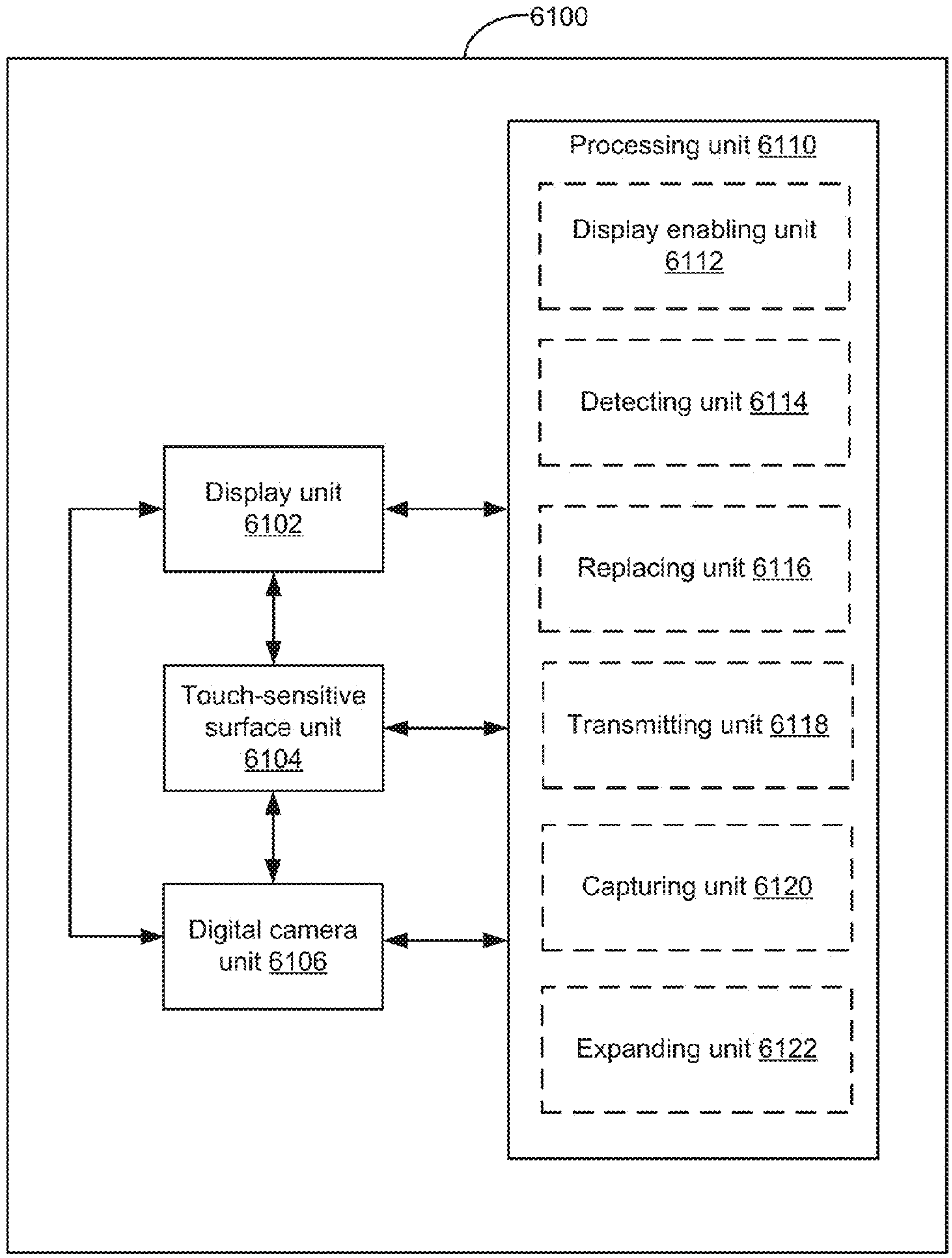
FIG. 61 is a functional block diagram of an electronic device in accordance with some embodiments.

In accordance with some embodiments, FIG. 61 shows a functional block diagram of an electronic device 6100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 61 are, optionally, combined or separated into sub-blocks to implement the principles of the various described embodiments. Therefore, the description herein optionally supports any possible combination or separation or further definition of the functional blocks described herein.

As shown in FIG. 61, an electronic device 6100 includes a display unit 6102, a touch-sensitive surface unit 6104, a digital camera unit 6106, and a processing unit 6110 coupled with the display unit 6102, the touch-sensitive surface unit 6104, and the digital camera unit 6106. In some embodiments, the processing unit 6110 includes: a display enabling unit 6112, a detecting unit 6114, a replacing unit 6116, a transmitting unit 6118, a capturing unit 6120, and an expanding unit 6122.

The processing unit 6110 is configured to enable display (e.g., with the display enabling unit 6112) of a messaging user interface on the display unit 6102, the messaging user interface including a conversation transcript of a messaging session between a user of the electronic device and at least one other user, a message-input area, a digital image affordance, a digital touch affordance, and an application affordance. While displaying the messaging user interface, the processing unit 6110 is configured to detect (e.g., with the detecting unit 6114) a first input on the touch sensitive surface. In response to detecting the first input, the processing unit 6110 is configured to: in accordance with a determination that the first input is made while a focus selector is at a location in the messaging user interface that corresponds to the digital image affordance, enable display (e.g., with the display enabling unit 6112) of a plurality of digital images within the messaging user interface; in accordance with a determination that the first input is made while a focus selector is at a location in the messaging user interface that corresponds to the digital canvas affordance, enable display (e.g., with the display enabling unit 6112) of a digital drawing canvas within the messaging user interface; and in accordance with a determination that the first input is made while a focus selector is at a location in the messaging user interface that corresponds to the application affordance, enable display (e.g., with the display enabling unit 6112) of one or more launch icons for an application within the messaging user interface.

In some embodiments, displaying the plurality of digital images within the messaging user interface includes: in accordance with a determination that the messaging user interface included display of a keyboard at the time the first input was detected, replacing display (e.g., with the replacing unit 6116) of the keyboard with the display of the plurality of digital images, the plurality of digital images including a live preview image from the digital camera unit 6106; and in accordance with a determination that the messaging user interface did not include display of a keyboard at the time the first input was detected, displaying (e.g., with the display enabling unit 6112) the conversation transcript in a first area of the display and displaying the plurality of digital images in a second area of the display, the plurality of digital images including a live preview image from the digital camera unit 6106.

In some embodiments, while displaying the plurality of digital images, the processing unit 6110 is further configured to detect (e.g., with the detecting unit 6114) an input that selects a digital image in the plurality of digital images; and after detecting the input that selects a digital image in the plurality of digital images: enable display (e.g., with the display enabling unit 6112) of the selected digital image in the conversation transcript; and transmit (e.g., with the transmitting unit 6118) a representation of the selected digital image to one or more electronic devices that correspond to the at least one other user included in the messaging session, where the one or more electronic devices display the representation of the selected digital image in a conversation transcript that corresponds to the messaging session.

In some embodiments, the processing unit 6110 is further configured to: detect (e.g., with the detecting unit 6114) an input that selects the live image displayed within the plurality of digital images; and, in response to detecting that input that selects the live image, capture (e.g., with the capturing unit 6120) a digital image with the digital camera unit 6106, while maintaining display of the conversation transcript.

In some embodiments, after capturing the digital image, the processing unit 6110 is configured to: enable display (e.g., with the display enabling unit 6112) of the digital image captured by the digital camera unit 6106 in the conversation transcript, and transmit (e.g., with the transmitting unit 6118) a representation of the captured digital image to one or more electronic devices that correspond to the at least one other user included in the messaging session, where the one or more electronic devices display the representation of the captured digital image in a conversation transcript that corresponds to the messaging session.

In some embodiments, displaying the digital drawing canvas within the messaging user interface includes: in accordance with a determination that the messaging user interface included display of a keyboard at the time the first input was detected, replacing (e.g., with the replacing unit 6116) display of the keyboard with the display of the digital drawing canvas; and in accordance with a determination that the messaging user interface did not include display of a keyboard at the time the first input was detected, displaying (e.g., with the display enabling unit 6112) the conversation transcript in a first area of the display and displaying the plurality of digital touch actions in a second area of the display.

In some embodiments, displaying the one or more launch icons for an application within the messaging user interface includes: in accordance with a determination that the messaging user interface included display of a keyboard at the time the first input was detected, replacing (e.g., with the replacing unit 6116) display of the keyboard with the display of the one or more launch icons for an application; and in accordance with a determination that the messaging user interface did not include display of a keyboard at the time the first input was detected, displaying (e.g., with the display enabling unit 6112) the conversation transcript in a first area of the display and displaying the one or more launch icons for an application in a second area of the display.

In some embodiments, while displaying the one or more launch icons for an application, the processing unit 6110 is further configured to detect (e.g., with the detecting unit 6114) an input that activates a launch icon in the one or more launch icons for an application; and after detecting the input that activates the launch icon in the one or more launch icons for an application, the processing unit 6110 is configured to: enable display (e.g., with the display enabling unit 6112) of a first input area for an application corresponding to the activated launch icon the application that is distinct from the message input area, the input area for the first interactive application including one or more input affordances; enable display (e.g., with the display enabling unit 6112) of a first application object within the conversation transcript that corresponds to the application corresponding to the activated launch icon; and transmit (e.g., with the transmitting unit 6118) a representation of a second application object that corresponds to the application corresponding to the activated launch icon to one or more electronic devices that correspond to the at least one other user included in the messaging session, where the one or more electronic devices display the representation of the second application object in a conversation transcript that corresponds to the messaging session.

In some embodiments, while displaying the message-input area, the processing unit 6110 is further configured to detect (e.g., with the detecting unit 6114) a second input that activates the message-input area; and in response to detecting the input that activates the message-input area: in accordance with a determination that the messaging user interface included display of a keyboard and did not include display of the three activatable affordances at the time the second input was detected, enable display (e.g., with the display enabling unit 6112) of a prompt within the message-input area; in accordance with a determination that the messaging user interface included display of a keyboard and the three activatable affordances at the time the second input was detected: cease to display (e.g., with the display enabling unit 6112) the three activatable affordances, enable display (e.g., with the display enabling unit 6112) of the application expansion affordance, expand (e.g., with the expanding unit 6122) display of the message input-area, and enable display (e.g., with the display enabling unit 6112) of a prompt within the message-input area; in accordance with a determination that the messaging user interface did not include display of a keyboard and included display of the three activatable affordances at the time the second input was detected: cease to display (e.g., with the display enabling unit) the three activatable affordances, enable display (e.g., with the display enabling unit 6112) of the application expansion affordance, expand (e.g., with the expanding unit 6122) display of the message input-area, enable display (e.g., with the display enabling unit 6112) of a prompt within the message-input area, and enable display (e.g., with the display enabling unit 6112) of a keyboard; and in accordance with a determination that the messaging user interface did not include display of a keyboard and did not include display of the three activatable affordances at the time the second input was detected: enable display (e.g., with the display enabling unit 6112) of a prompt within the message-input area, and enable display (e.g., with the display enabling unit 6112) of a keyboard.

In some embodiments, the messaging user interface also includes a microphone affordance, configured to enable sound recording on the electronic device upon activation.

In some embodiments, the messaging user interface also includes at least one avatar corresponding to a first other user included in the messaging session, configured to enable the electronic device to display a menu that contains activatable menu items associated with the at least one avatar overlaid on the messaging user interface when activated.

In some embodiments, the menu that contains activatable menu items associated with the at least one avatar includes: a menu item that when activated initiates a digital touch action with the first other user, a menu item that when activated initiates messaging with only the first other user, a menu item that when activated initiates an email with the first other user, a menu item that when activated initiates a call with the first other user, a menu item that when activated initiates a video conference with the first other user, and/or a menu item that when activated initiates a payment action with the first other user.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 60A-60D are, optionally, implemented by components depicted in FIGS. 1A-1B or FIG. 61. For example, display operation 6002 and detection operation 6010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Adding and Manipulating Stickers

Figure 62A:
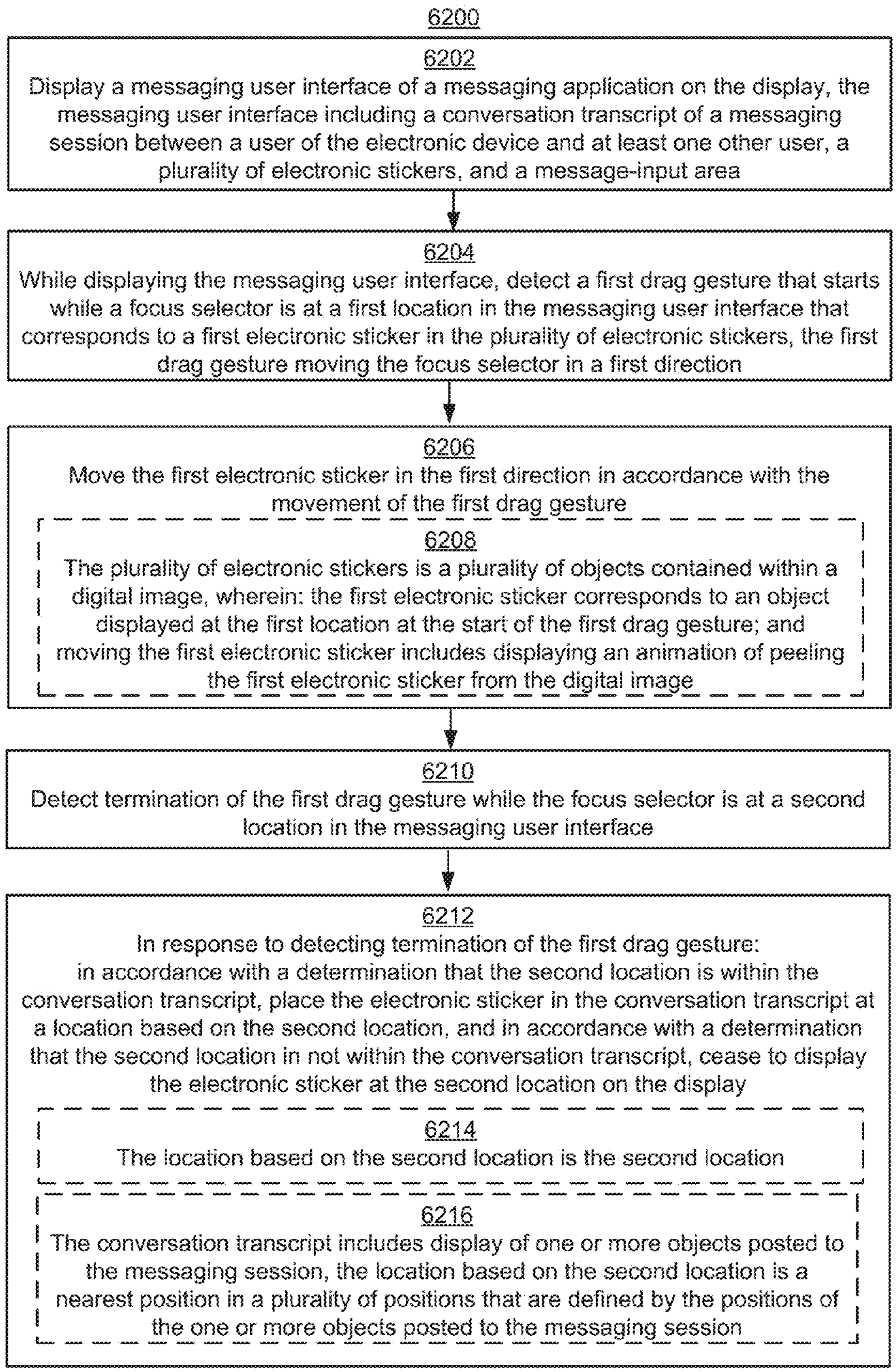

FIGS. 62A-62C are flow diagrams illustrating a method 6200 of adding a sticker to a messaging transcript in accordance with some embodiments. The method 6200 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6200 are, optionally, combined and/or the order of some operations is, optionally, changed.

As described below, the method 6200 provides an intuitive way to add a sticker to a messaging transcript. The method reduces the number, extent, and/or nature of the inputs from a user when adding a sticker to a messaging transcript, thereby creating a more efficient human-machine interface. For battery-operated electronic devices, enabling a user to add a sticker to a messaging transcript faster and more efficiently conserves power and increases the time between battery charges.

The device displays (6202) a messaging user interface of a messaging application on the display, the messaging user interface including a conversation transcript (e.g., displayed in a first area of the display) of a messaging session between a user of the electronic device and at least one other user (e.g., of another electronic device), a plurality of electronic stickers (e.g., a sticker pack displayed in a second area of the display), and a message-input area. For example, in FIG. 39C, device 100-1 displays messaging user interface 3500, including conversation transcript 3700, sticker pack 3892 with electronic stickers 3906, 3908, and 3910, and message-input area 3502.

While displaying the messaging user interface, the device detects (6204) a first drag gesture {e.g., by a first contact on a touch-sensitive surface} that starts while a focus selector is at a first location in the messaging user interface that corresponds to a first electronic sticker in the plurality of electronic stickers, the first drag gesture moving the focus selector in a first direction; (e.g., detect a drag gesture by a contact on a touch-sensitive display that starts at the first electronic sticker and moves in a first direction, or detect a drag gesture by a contact on a touch-sensitive surface that starts while a cursor or other pointer is at the first electronic sticker on the display and moves the pointer in a first direction on the display). For example, device 100-1 detects a drag gesture including movement 3918 of contact 3906 from position 3906-*a*, over electronic snowman sticker 3906 in FIG. 39H, to position 3906-*b*, in FIG. 39I. In another example, device 100-1 detects a drag gesture including movement 3922 of contact 3920 from position 3920-*a*, over electronic sled sticker 3910 in FIG. 39K, to position 3920-*b*, in FIG. 39L. In another example, device 100-1 detects a drag gesture including movement 3926 of contact 3925 from position 3924-*a*, over electronic snowflake sticker 3908 in FIG. 39N, to position 3924-*b*, in FIG. 39O.

The device moves (6206) the first electronic sticker in the first direction in accordance with the movement of the first drag gesture. For example, electronic snowman sticker moves from location 3906-*a*, in FIG. 39H, to position 3906-*b*, in FIG. 39I, in accordance with movement 3918. In another example, electronic sled sticker 3910 moves from position 3910-*a*, in FIG. 39K, to position 3910-*b*, in FIG. 39L, in accordance with movement 3922. In another example, electronic snowflake sticker 3908 moves from position 3908-*a*, in FIG. 39N, to position 3908-*c*, in FIG. 39O, in accordance with movement 3926.

In some embodiments, the plurality of electronic stickers is a plurality of objects contained within a digital image (e.g., a TV or movie frame, a digital comic illustration, a frame from a digital video, or other digital image), where (6208): the first electronic sticker corresponds to an object displayed at the first location at the start of the first drag gesture (e.g., tapping on any object within the digital image creates a digital sticker of that object), and moving the first electronic sticker includes displaying an animation of peeling the first electronic sticker from the digital image (e.g., it appears that the user is peeling the first electronic sticker away from the digital image).

The device detects (6210) termination of the first drag gesture while the focus selector is at a second location in the messaging user interface (e.g., while a contact on a touch-sensitive display is at the second location, or while a cursor or other pointer is at the second location). For example, device 100-1 detects termination of a drag gesture when contact 3916 is at position 3916-*b* in FIG. 39I (e.g., lift-off of contact 3916, as illustrated in FIG. 39J). In another example, device 100-1 detects termination of a drag gesture when contact 3920 is at position 3920-*b* in FIG. 39L (e.g., lift-off of contact 3920, as illustrated in FIG. 39M). In another example, device 100-1 detects termination of a drag gesture when contact 3924 is at position 3924-*b* in FIG. 39O (e.g., lift-off of contact 3924, as illustrated in FIG. 39P).

In response to detecting termination of the first drag gesture (e.g., detecting lift-off the contact in the drag gesture), the device: in accordance with a determination that the second location is within the conversation transcript (e.g., the sticker was dragged from the tray into the conversation transcript), places (6212) the electronic sticker in the conversation transcript at a location based on the second location. For example, in FIG. 39J, electronic snowman sticker 3906 is placed in conversation transcript 3700 because the drag gesture terminated within the transcript (e.g., at position 3916-*b*). In another example, in FIG. 39P, electronic snowflake sticker 3908 is placed in conversation transcript 3700 because the drag gesture terminated within the transcript (e.g., at position 3916-*b*).

In response to detecting termination of the first drag gesture (e.g., detecting lift-off the contact in the drag gesture), the device: in accordance with a determination that the second location in not within the conversation transcript (e.g., the sticker was not dragged into the conversation transcript), ceases (6212) to display the electronic sticker at the second location on the display. E.g., when the sticker is not dragged all the way to the conversation transcript, termination of the gesture causes the sticker to return to the sticker pack. For example, in FIG. 39M, device 100-1 ceases displaying electronic sled sticker 3910 at position 3910-*b* in response to detecting lift-off of contact 3920 (e.g., termination of the drag gesture) while outside of conversation transcript 3700 (e.g., at position 3920-*b*), In some embodiments, the electronic device differentiates between an input that allows the user to place the sticker at a user-selected location in the transcript and an input that places the sticker at a default location within the transcript. For example, a drag gesture places the sticker at a user-selection location within the transcript (e.g., snowman sticker 3906 is dragged to, and placed at, position 3906-*b* in FIGS. 39H-39J, while a stationary gesture (such as a tap, light press, or deep press) places the sticker in the transcript at a default next location designated for a user message (e.g., with or without a surrounding message bubble). For example, snowflake sticker 3908 is placed in transcript 3700 at position 3908-*a*, in FIG. 39G, corresponding to the next temporal position within the conversation transcript, after detecting a tap gesture on the sticker, including contact 3912 in FIG. 39D.

In some embodiments, the device displays a messaging user interface of a messaging application on the display, the messaging user interface including a conversation transcript (e.g., displayed in a first area of the display) of a messaging session between a user of the electronic device and at least one other user (e.g., of another electronic device), a plurality of electronic stickers (e.g., a sticker pack displayed in a second area of the display), and a message-input area. While displaying the messaging user interface, the device detects a first user input at a location corresponding to display of a first electronic sticker. In response to detecting the first user input: in accordance with a determination that the first user input includes a drag gesture starting at the location corresponding to display of the first electronic sticker and ending at a location corresponding to display of the conversation transcript, placing the electronic sticker in the conversation transcript (e.g., dragging the sticker into the conversation transcript). For example, snowman sticker 3906 is dragged into conversation transcript 3700 in FIGS. 39J-39J. In accordance with a determination that the first user input satisfies tap gesture criteria (e.g., detection of initiation and termination of a user contact, having a characteristic intensity that does not reach a predefined intensity threshold, at a substantial same location), displaying the electronic sticker in the message-input area (e.g., which allows the user to post the sticker to the transcript at a location corresponding to the next message). For example, snowflake sticker 3908 is tapped on and placed in message-input area 3502 in FIGS. 39D-39F.

In some embodiments, the location based on the second location is the second location (6214). For example, the sticker is placed in the transcript at the location where the drag gesture terminated (e.g., by user lift-off of the contact corresponding to the drag gesture or by timing-out of the drag gesture by maintaining a relatively stable position for a pre-defined period of time). For example, in FIG. 39J, electronic snowman sticker 3906 is placed at position 3906-*b* in transcript 3700, where it was displayed when the device detected termination (e.g., lift-off) of the drag gesture including contact 3916.

In some embodiments, the conversation transcript includes display of one or more objects posted to the messaging session (e.g., message bubbles, icons for interactive applications, and/or multimedia content), the location is based on the second location is a nearest position in a plurality of positions that are defined by the positions of the one or more objects posted to the messaging session (6216). For example, device 100-1 detects termination of a drag gesture including contact 3924 at position 3924-*b* in conversation transcript, when electronic snowflake sticker 3908 is displayed at position 3908-*c*, in FIG. 39O. In response, snowflake sticker 3908 is placed (e.g., displayed) at position 3908-*d*, corresponding to the nearest point on a message object (e.g., message region 3749), in FIG. 39P.

In some embodiments, the plurality of positions include positions that are defined by the outside border of the one or more objects posted to the messaging session (e.g., every position defining the outlines of the one or more objects, a set number of positions on the outlines (e.g., horizontal and vertical mid-points on the top, bottom, right, and left borders of each object), regularly spaced positions along the outside border (e.g., every X pixels or spaced to provide Y positions on each object)).

In some embodiments, the plurality of positions include positions that are defined by the surface area of the one or more objects posted to the messaging session (e.g., every position within the border (inclusive or exclusive) of an object, a set number of positions within each object (e.g., quadrant midpoints within each object), regularly spaced positions within each object (e.g., every (X, Y) pixels or spaced to provide Z positions within each object).

In some embodiments, the plurality of positions include one or more positions that are defined by a relationship between two adjacent objects (e.g., positions defined by the mid-point between two objects).

In some embodiments, in response to detecting termination of the first drag gesture, in accordance with a determination that the second location is within the conversation transcript, the device (6218) transmits information that represents the electronic sticker to one or more {e.g., at least a second} electronic devices that correspond to the at least one other user included in the messaging session, wherein the one or more electronic devices display a corresponding representation of the electronic sticker in a corresponding location within a corresponding conversation transcript In some embodiments, where messages sent from the user of the electronic device and messages received from other users are displayed on opposite sides of a conversation transcript, the corresponding location is a position that is a mirror image of the position at which the stick is displayed on the sending user's electronic device (e.g., a mirror image of the position or a mirror image of the position and the sticker).

In some embodiments, the device (6220) detects a user input while the focus selector is at a third position that corresponds to a second electronic sticker in the plurality of electronic stickers (e.g., while a contact on a touch-sensitive display is at the second electronic sticker, or while a cursor or other pointer is at the second electronic sticker). For example, an input including one of contact 3912, in FIG. 39D and contact 3932, in FIG. 39Z, In response to detecting the user input while the focus selector is at the third position, in accordance with a determination that the user input satisfies one or more sticker-selection-criteria (e.g., which are distinct from sticker posting criteria), the device displays the second electronic sticker in the message-input area (e.g., snowflake sticker 3908 is displayed in message-input area 3502 in FIG. 39F.

In some embodiments, the sticker selection criteria include a criterion that is configured to be met when a characteristic intensity of a contact in the input remains below a first intensity threshold.

In some embodiments, the sticker selection criteria include a criterion that is met when a characteristic intensity of a contact in the input satisfies a first intensity threshold (e.g., the sticker is displayed in the message-input area, but may be pushed-through to the transcript by pressing harder)

In some embodiments, the sticker can then be posted to the messaging session by a second user input corresponding to a request to post the content within the message-input area, such as a tap gesture at a location that corresponds to a send icon on the display. For example, snowflake sticker 3908 is displayed in conversation transcript 3700, in FIG. 39G, in response to a tap gesture including contact 3914 on send affordance 3520, in FIG. 39F.

In response to detecting the user input while the focus selector is at the third position, in accordance with a determination that the user input satisfies one or more sticker-posting-criteria, displaying the sticker in the conversation transcript at a location that corresponds to a next message insertion point. For example, snowman sticker 3906 is directly posted to the messaging session (e.g., displayed in transcript 3700), in FIG. 39AA in response to detecting deep press gesture including contact 3932.

In some embodiments, the sticker posting criteria include a criterion that is met when a characteristic intensity of a contact in the input goes above a second intensity threshold.

In some embodiments, posting the sticker to the messaging session at the position where the next messaging bubble would be located, e.g., at position 3908-*b* in FIG. 39G or position 3906-*c* in FIG. 39AA.

In some embodiments, the one or more sticker-posting-criteria require that a characteristic intensity of the first contact on the touch-sensitive surface meet a respective intensity threshold in order for the transcript-area-display criteria to be met are met when the characteristic intensity of the first contact is between the second intensity threshold and a third intensity threshold; and the one or more sticker-selection-criteria do not require that the characteristic intensity of the contact on the touch-sensitive surface meet the respective intensity threshold in order for the selection criteria to be met.

In some embodiments, the device detects (6222) a user input while the focus selector is at a fourth position that corresponds to a third electronic sticker in the plurality of electronic stickers (e.g., while a contact on a touch-sensitive display is at the third electronic sticker, or while a cursor or other pointer is at the third electronic sticker) wherein the third electronic sticker is associated with a sticker animation. For example, in FIGS. 39Q-39X, snowman sticker 3906 is associated with an animation including movement of the snowman's broom up and down, cycling through animation states 3930-*a*, 3930-*b*, and 3930-*c*. Device 100-1 detects an input including contact 3928 on snowman sticker 3906 in sticker pack 3904.

In some embodiments, the sticker animation is displayed in a loop when the sticker is posted to the messaging session. In some embodiments, the sticker animation is displayed a pre-defined number of times after being posted to the messaging session. In some embodiments, the sticker animation is displayed upon activation by a user within a corresponding conversation transcript. In some embodiments, the sticker animation is automatically displayed in the sticker pack.

In response to detecting the user input while the focus selector is at the fourth position, in accordance with a determination that the user input satisfies one or more animation preview criteria (e.g., deep-press criteria) the device previews the sticker animation associated with the third electronic sticker (e.g., a cat sticker cries when a user presses on the cat sticker in a sticker pack). For example, device 100-1 displays a preview of the animation for snowman sticker displayed in sticker pack 3904, in FIGS. 39-V-39X.

In some embodiments, the animation preview criteria include a criterion that is met when a characteristic intensity of a contact in the input satisfies an intensity threshold. In some embodiments, a press and hold gesture satisfies animation preview criteria. In some embodiments, a deep press gesture satisfies animation preview criteria. In some embodiments, a light press does not satisfy animation preview. In some embodiments, a light press gesture causes the electronic sticker to be displayed in the message-input area}, previewing the sticker animation associated with the third electronic sticker (e.g., a cat sticker cries when a user presses on the cat sticker in a sticker pack).

In some embodiments, prior to displaying the plurality of electronic stickers, the device (6224) displays the messaging user interface including the conversation transcript (e.g., displayed in a first area of the display) of the messaging session between the user of the electronic device and the at least one other user (e.g., of another electronic device) and an application affordance (e.g., user interface 3500 in FIG. 39A).

While displaying the messaging user interface, the device detects an input that activates the application affordance. For example, an input including contact 3902 on application affordance 3508, in FIG. 39B (e.g., detecting a tap gesture at a location that corresponds to the application affordance).

In response to detecting the input that activates the application affordance, the device maintains display of at least a portion of the conversation transcript in a first area of the display (e.g., FIG. 39C includes a portion of conversation transcript 3700 displayed in FIG. 39C. The device displays the plurality of electronic stickers in a second area of the display (e.g., in sticker pack 3904, in FIG. 39C).

In some embodiments, where the messaging user interface includes display of an electronic keyboard prior to activating the application affordance, the display of the plurality of electronic stickers replaces display of the keyboard (e.g., display of sticker pack 3904 would replace display of digital keyboard 3501).

In some embodiments, where the messaging user interface includes a full-screen display of the conversation transcript prior to activating the application affordance, the display of the plurality of electronic stickers replaces a portion of the display of the message transcript. For example, in FIG. 39B, conversation transcript 3700 is displayed in full-screen mode. In response to activation of sticker pack 3892 by an input including contact 3902 in FIG. 39B, display of conversation transcript 3700 is reduced to accommodate display of the sticker pack in FIG. 39C.

In some embodiments, prior to displaying the plurality of electronic stickers: the device (6226) displays the messaging user interface including the conversation transcript (e.g., displayed in a first area of the display) of the messaging session between the user of the electronic device and the at least one other user (e.g., of an electronic device) and an application affordance. For example, messaging user interface 3500 in FIG. 39AB.

While displaying the messaging user interface, the device detects an input that activates the application affordance. For example, in FIG. 39AB, an input including contact 3934 activates application affordance 3508.

In response to detecting the input that activates the application affordance, the device maintains display of at least a portion of the conversation transcript in a first area of the display (e.g., device 100-1 maintains display of conversation transcript 3700 in FIG. 39AC), and the device displays a first interactive application icon (e.g., an icon for a first interactive application), which is one of a plurality of interactive application icons, in a second area of the display (e.g., in a scrollable interactive application panel). For example, interactive reservations application launch icon 3708 displayed in application slide tray 3892, in FIG. 39AC.

In some embodiments, where the messaging user interface includes display of an electronic keyboard prior to activating the application affordance, the display of the scrollable interactive application panel replaces display of the keyboard (e.g., application slide tray 3892 may replace display of digital keyboard 3501.

In some embodiments, where the messaging user interface includes a full-screen display of the conversation transcript prior to activating the application affordance, the display of the scrollable interactive application panel replaces a portion of the display of the message transcript. For example, in FIG. 39AC, application slide tray 3892 replaces a portion of transcript 3700, displayed in full-screen mode in FIG. 39AB.

While displaying the first interactive application icon in the second area of the display, detecting a first swipe gesture that includes horizontal movement of a first contact at a location that corresponds to the second area of the display. For example, device 100-1 detects a swipe gesture including movement 3938 of contact 3936 from position 3936-*a*, in FIG. 39AD, to position 3936-*b*, in FIG. 39AE.

In accordance with a determination that the first swipe gesture satisfies one or more interactive application icon switching criteria, the device replaces display of the first interactive application icon with display of the plurality of electronic stickers in the second area of the display. For example, sticker pack 3904, in FIG. 39AF, replaces display of interactive reservations application launch icon 3708, in FIG. 39AD, in accordance to movement 3938 of contact 3936.

In some embodiments, the interactive application icon switching criteria includes a criterion that the magnitude of a horizontal movement of the first swipe gesture satisfies a predetermined movement threshold. In some embodiments, the predetermined movement threshold varies with the speed of the movement of the contact.

In some embodiments, prior to displaying the plurality of electronic stickers, the device (6228) displays the messaging user interface including the conversation transcript (e.g., displayed in a first area of the display) of the messaging session between the user of the electronic device and the at least one other user (e.g., of another electronic device) and an application affordance (e.g., messaging user interface 3500 in FIG. 39AU.

While displaying the messaging user interface, the device detects an input that activates the application affordance (e.g., detecting a tap gesture at a location that corresponds to the application affordance). For example, in FIG. 39AU, an input including contact 3952 activates application affordance 3508.

In response to detecting the input that activates the application affordance, the device maintains display of at least a portion of the conversation transcript in a first area of the display (e.g., device 100-1 maintains display of conversation transcript 3700 in FIG. 39AV) and displays in a second area of the display that includes a plurality of application launch icons (e.g., including launch icons for one or more interactive applications; e.g., application selection tray 3654 in FIG. 39AV), an application launch icon for a sticker pack (e.g., sticker pack launch icon 3609 in application selection tray 3654 in FIG. 39AV.

In some embodiments, where the messaging user interface includes display of an electronic keyboard prior to detecting activation of the application affordance, the display of the plurality of application launch icons replaces display of the keyboard. For example, display of application selection tray 3654, in FIG. 36Y, replaces digital keyboard 3501, in FIG. 36X.

In some embodiments, where the messaging user interface includes a full-screen display of the conversation transcript prior to detecting activation of the application affordance, the display of the plurality of application launch icons replaces a portion of the display of the message transcript. For example, in FIG. 39AV, application selection tray 3654 replaces a portion of transcript 3700, displayed in full-screen mode, in FIG. 39AU.

While displaying the plurality of application launch icons, the device detects an input that activates the application launch icon for the sticker pack. For example, device 100-1 detects an in input including contact 3954 over sticker pack launch icon 3609, in FIG. 39AV.

In response to a detecting the input that activates the application launch icon for the sticker pack (e.g., detecting a tap gesture at a location that corresponds to the launch icon for the sticker pack), the device replaces display of the plurality of application launch icons with display of the plurality of electronic stickers in the second area of the display. For example, in response to detecting an input including contact 3954, in FIG. 39AV, device 100-1 replaces display of application selection tray 3654, in FIG. 39AV, with display of sticker pack 3904, in FIG. 39AW.

It should be understood that the particular order in which the operations in FIGS. 62A-62C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6400, 6600, 6800, and 7000) are also applicable in an analogous manner to method 6200 described above with respect to FIGS. 62A-62C. For example, the contacts, gestures, user interface objects, tactile outputs, intensity thresholds, focus selectors, animations described above with reference to method 6200 optionally have one or more of the characteristics of the contacts, gestures, user interface objects, tactile outputs, intensity thresholds, focus selectors, animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6400, 6600, 6800, and 7000). For brevity, these details are not repeated here.

Figure 63:
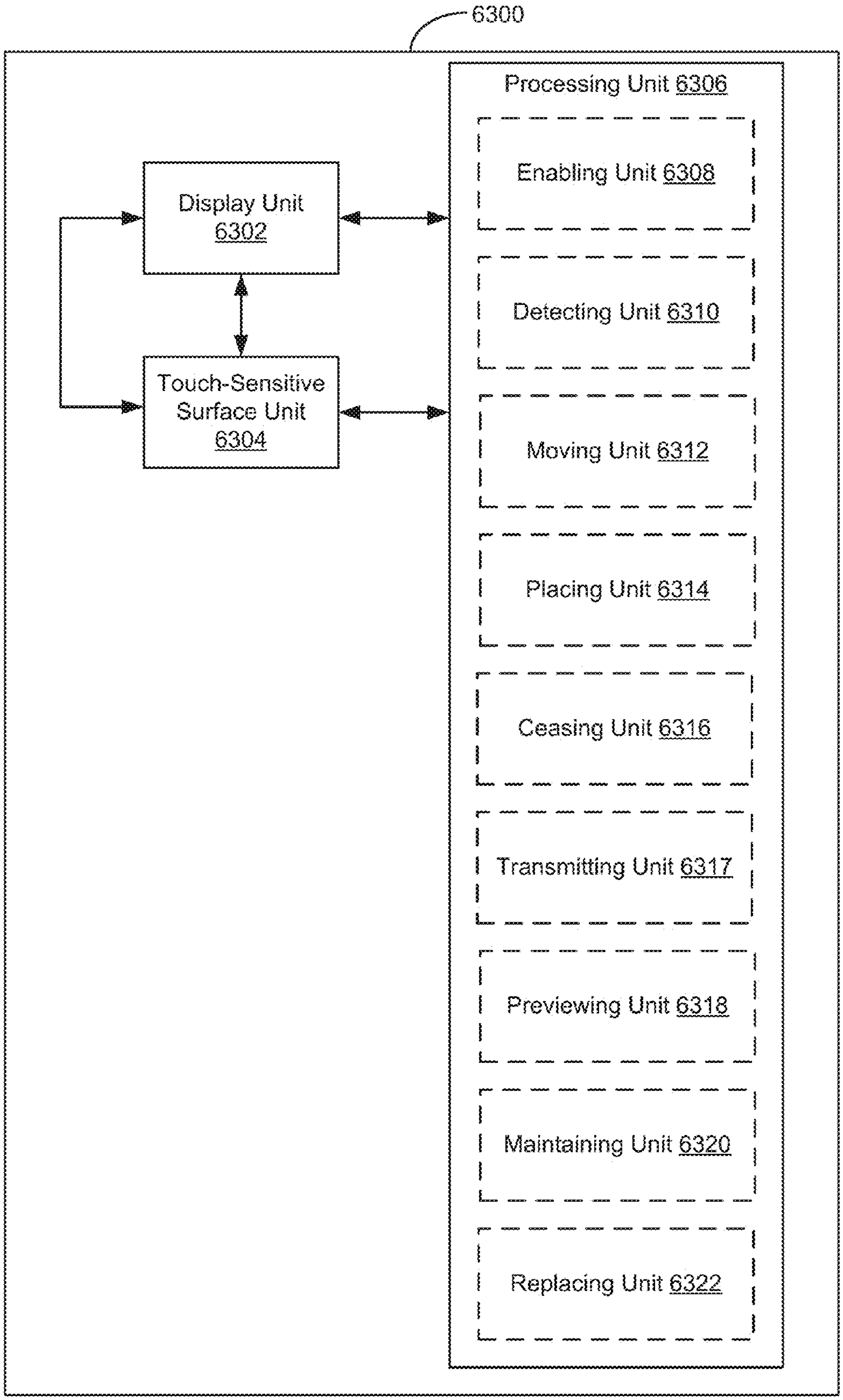
FIG. 63 is a functional block diagram of an electronic device in accordance with some embodiments.

In accordance with some embodiments, FIG. 63 shows a functional block diagram of an electronic device 6300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 63 are, optionally, combined or separated into sub-blocks to implement the principles of the various described embodiments. Therefore, the description herein optionally supports any possible combination or separation or further definition of the functional blocks described herein.

As shown in FIG. 63, an electronic device 6300 includes a display unit 6302 configured to display user interfaces; a touch-sensitive surface unit 6304 configured to detect contacts; and a processing unit 6306 coupled with the display unit 6302 and the touch-sensitive surface unit 6304. The processing unit 6306 includes: an enabling unit 6308, a detecting unit 6310, a moving unit 6312, a placing unit 6314, a ceasing unit 6316, a previewing unit 6318, a maintaining unit 6320, and a replacing unit 6322. The processing unit 6306 is configured to enable display of (e.g., with enabling unit 6308) a messaging user interface of a messaging application on the display unit 6302, the messaging user interface including a conversation transcript of a messaging session between a user of the electronic device and at least one other user, a plurality of electronic stickers, and a message-input area. While displaying the messaging user interface, the processing unit 6306 is configured to detect (e.g., with detecting unit 6310) a first drag gesture that starts while a focus selector is at a first location in the messaging user interface that corresponds to a first electronic sticker in the plurality of electronic stickers, the first drag gesture move the focus selector in a first direction. The processing unit 6306 is configured to move (e.g., with moving unit 6312) the first electronic sticker in the first direction in accordance with the movement of the first drag gesture. The processing unit 6306 is configured to detect (e.g., with detecting unit 6310) termination of the first drag gesture while the focus selector is at a second location in the messaging user interface. In response to detecting termination of the first drag gesture: in accordance with a determination that the second location is within the conversation transcript, the processing unit 6306 is configured to place (e.g., with placing unit 6314) the electronic sticker in the conversation transcript at a location based on the second location, and in accordance with a determination that the second location in not within the conversation transcript, the processing unit 6306 is configured to cease (e.g., with ceasing unit 6316) to display the electronic sticker at the second location on the display unit 6302.

In some embodiments, the processing unit 6306 is further configured to: in response to detecting termination of the first drag gesture, in accordance with a determination that the second location is within the conversation transcript: transmit (e.g., with transmitting unit 6317) information that represents the electronic sticker to one or more electronic devices that correspond to the at least one other user included in the messaging session, wherein the one or more electronic devices display a corresponding representation of the electronic sticker in a corresponding location within a corresponding conversation transcript.

In some embodiments, the location based on the second location is the second location.

In some embodiments, the conversation transcript includes display of one or more objects posted to the messaging session, the location based on the second location is a nearest position in a plurality of positions that are defined by the positions of the one or more objects posted to the messaging session.

In some embodiments, the processing unit 6306 is further configured to: detect (e.g., with detecting unit 6310) a user input while the focus selector is at a third position that corresponds to a second electronic sticker in the plurality of electronic stickers. In response to detecting the user input while the focus selector is at the third position: in accordance with a determination that the user input satisfies one or more sticker-selection-criteria, enable display of (e.g., with enabling unit 6308) the second electronic sticker in the message-input area; and in accordance with a determination that the user input satisfies one or more sticker-posting-criteria, enable display of (e.g., with enabling unit 6308) the sticker in the conversation transcript at a location that corresponds to a next message insertion point.

In some embodiments, the processing unit 6306 is further configured to: detect (e.g., with detecting unit 6310) a user input while the focus selector is at a fourth position that corresponds to a third electronic sticker in the plurality of electronic stickers, wherein the third electronic sticker is associated with a sticker animation. In response to detecting the user input while the focus selector is at the fourth position, in accordance with a determination that the user input satisfies one or more animation preview criteria, preview (e.g., with previewing unit 6318) the sticker animation associated with the third electronic sticker.

In some embodiments, the processing unit 6306 is further configured to: prior to displaying the plurality of electronic stickers: enable display of (e.g., with enabling unit 6308) the messaging user interface including the conversation transcript of the messaging session between the user of the electronic device and the at least one other user and an application affordance. While displaying the messaging user interface, the processing unit 6306 is configured to detect (e.g., with detecting unit 6310) an input that activates the application affordance. In response to detecting the input that activates the application affordance, the processing unit 6306 is configured to: maintain display of (e.g., with maintaining unit 6320) at least a portion of the conversation transcript in a first area of the display, and enable display of (e.g., with enabling unit 6308) the plurality of electronic stickers in a second area of the display.

In some embodiments, the processing unit 6306 is further configured to: prior to displaying the plurality of electronic stickers: enable display of (e.g., with enabling unit 6308) the messaging user interface including the conversation transcript of the messaging session between the user of the electronic device and the at least one other user and an application affordance. While displaying the messaging user interface, the processing unit 6306 is configured to detect (e.g., with detecting unit 6310) an input that activates the application affordance. In response to detecting the input that activates the application affordance, the processing unit 6306 is configured to: maintain display of (e.g., with maintaining unit 6320) at least a portion of the conversation transcript in a first area of the display, and enable display of (e.g., with enabling unit 6308) a first interactive application icon, which is one of a plurality of interactive application icons, in a second area of the display. While displaying the first interactive application icon in the second area of the display, the processing unit 6306 is configured to detect (e.g., with detecting unit 6310) a first swipe gesture that includes horizontal movement of a first contact at a location that corresponds to the second area of the display. In accordance with a determination that the first swipe gesture satisfies one or more interactive application icon switching criteria, the processing unit 6306 is configured to replace display of (e.g., with replacing unit 6322) the first interactive application icon with display of the plurality of electronic stickers in the second area of the display.

In some embodiments, the processing unit 6306 is further configured to: prior to displaying the plurality of electronic stickers: enable display of (e.g., with enabling unit 6308) the messaging user interface including the conversation transcript of the messaging session between the user of the electronic device and the at least one other user and an application affordance. While displaying the messaging user interface, the processing unit 6306 is configured to detect (e.g., with detecting unit 6310) an input that activates the application affordance. In response to detecting the input that activates the application affordance, the processing unit 6306 is configured to: maintain display of (e.g., with maintaining unit 6320) at least a portion of the conversation transcript in a first area of the display, and enable display of (e.g., with enabling unit 6308), in a second area of the display that includes a plurality of application launch icons, an application launch icon for a sticker pack. While displaying the plurality of application launch icons, the processing unit 6306 is configured to detect (e.g., with detecting unit 6310) an input that activates the application launch icon for the sticker pack. In response to a detecting that the input that activates the application launch icon for the sticker pack, the processing unit 6306 is configured to replace display of (e.g., with replacing unit 6322) the plurality of application launch icons with display of the plurality of electronic stickers in the second area of the display.

In some embodiments, the plurality of electronic stickers is a plurality of objects contained within a digital image, wherein: the first electronic sticker corresponds to an object displayed at the first location at the start of the first drag gesture; and moving the first electronic sticker includes displaying an animation of peeling the first electronic sticker from the digital image.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 62A-62C are, optionally, implemented by components depicted in FIGS. 1A-1B or FIG. 63. For example, detection operation 6204 and move operation 6206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 64A:
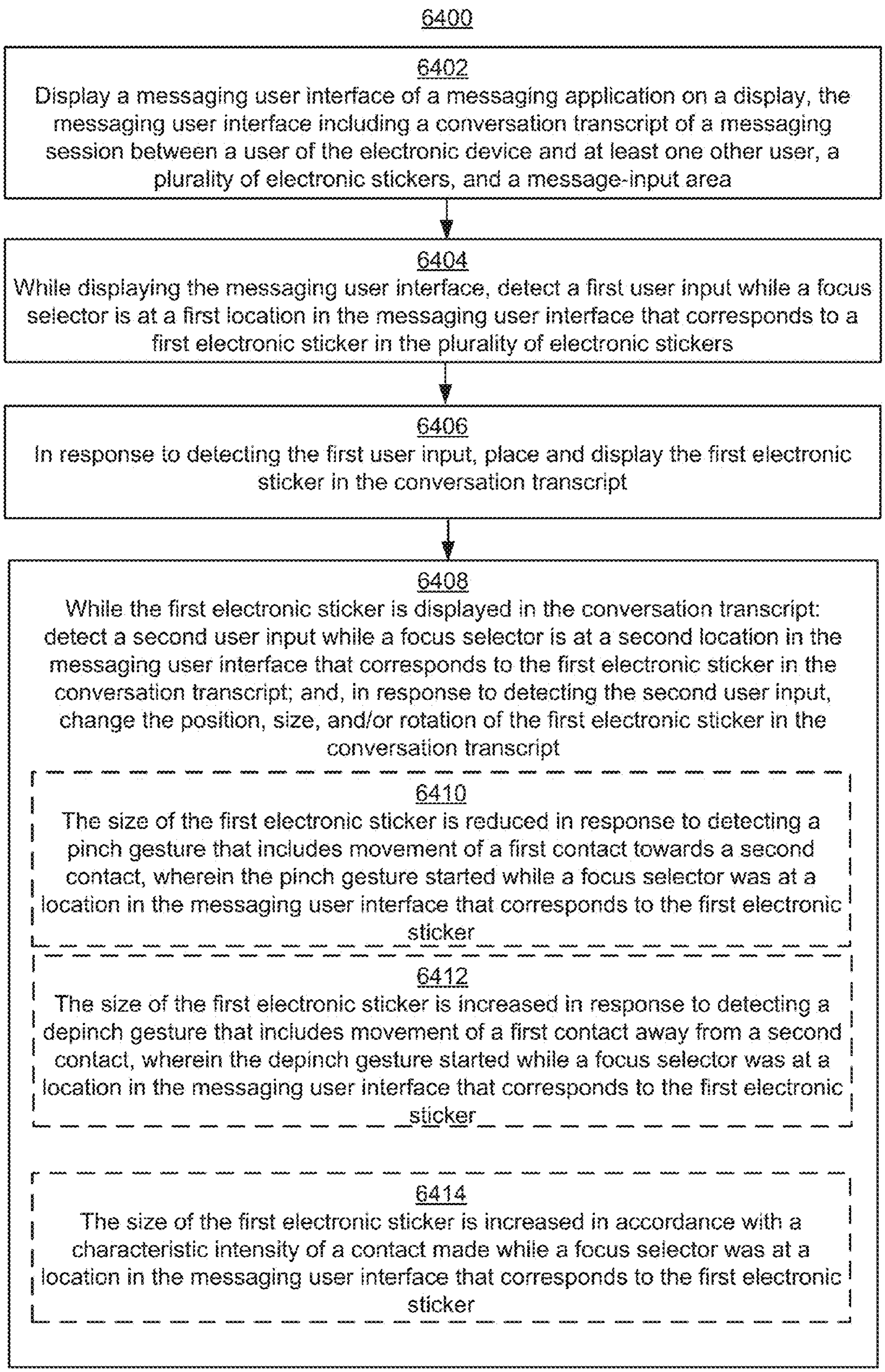

FIGS. 64A-64C are flow diagrams illustrating a method 6400 of modifying display of electronic stickers in a messaging application in accordance with some embodiments. The method 6400 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6400 are, optionally, combined and/or the order of some operations is, optionally, changed.

As described below, the method 6400 provides an intuitive way to modify display of electronic stickers in a messaging application. The method reduces the number, extent, and/or nature of the inputs from a user when modifying display of electronic stickers in a messaging application, thereby creating a more efficient human-machine interface. For battery-operated electronic devices, enabling a user to modify display of electronic stickers in a messaging application faster and more efficiently conserves power and increases the time between battery charges.

The device displays (6402) a messaging user interface of a messaging application on the display, the messaging user interface including a conversation transcript (e.g., displayed in a first area of the display) of a messaging session between a user of the electronic device and at least one other user (e.g., of another electronic device), a plurality of electronic stickers (e.g., a sticker pack displayed in a second area of the display), and a message-input area. For example in FIG. 39AF, device 100-1 displays messaging user interface 3500, including conversation transcript 3700, electronic sticker pack 3892, including electronic stickers 3906, 3908, and 3910, and message-input area 3502.

While displaying the messaging user interface (e.g., user interface 3500), the device detects (6404) a first user input (e.g., by a first contact on a touch-sensitive surface, such as a drag gesture or a tap gesture) while a focus selector is at a first location in the messaging user interface that corresponds to a first electronic sticker in the plurality of electronic stickers (e.g., detect a drag gesture by a contact on a touch-sensitive display that starts at the first electronic sticker and moves in a first direction, or detect a drag gesture by a contact on a touch-sensitive surface that starts while a cursor or other pointer is at the first electronic sticker on the display and moves the pointer in a first direction on the display). In some embodiments, the first electronic sticker is initially not within the conversation transcript (e.g., the first electronic sticker is in a sticker pack displayed in a second area of the display).

For example, device 100-1 detects an input including: a drag gesture, including movement 3942 of contact 3940 from position 3940-*a*, over electronic snowman sticker 3906 displayed in sticker pack 3904, in FIG. 39AG, through position 3940-*b*, in FIG. 39AH, to position 3940-*c*, in FIG. 39AI; increases in a characteristic intensity of contact 3940 between FIGS. 39AG-39AH and 39AH-39AI, respectively; a decrease in a characteristic intensity of contact 3940 between FIG. 39AI and FIG. 39AJ; and a rotation gesture, including rotation 3944 of contact 3940 from orientation (e.g., position) 3940-*c*, in FIG. 39AK, to orientation (e.g., position) 3940-*d*, in FIG. 39AL.

In response to detecting the first user input, the device (6406) places and displays the first electronic sticker in the conversation transcript. For example, device 100-1 displays electronic sticker 3906 at position (e.g., location and orientation) 3906-*f*, in FIG. 39AM.

While the first electronic sticker is displayed in the conversation transcript, the device (6408): detects a second user input while a focus selector is at a second location in the messaging user interface that corresponds to the first electronic sticker in the conversation transcript (e.g., detect a drag gesture, a portion of a depinch gesture, or a rotate gesture by a contact on a touch-sensitive display that starts at the location of the first electronic sticker in the transcript, or detect a drag gesture, a portion of a depinch gesture, or a rotate gesture by a contact on a touch-sensitive surface that starts while a cursor or other pointer is at the location of the first electronic sticker in the transcript).

Figure 39R:
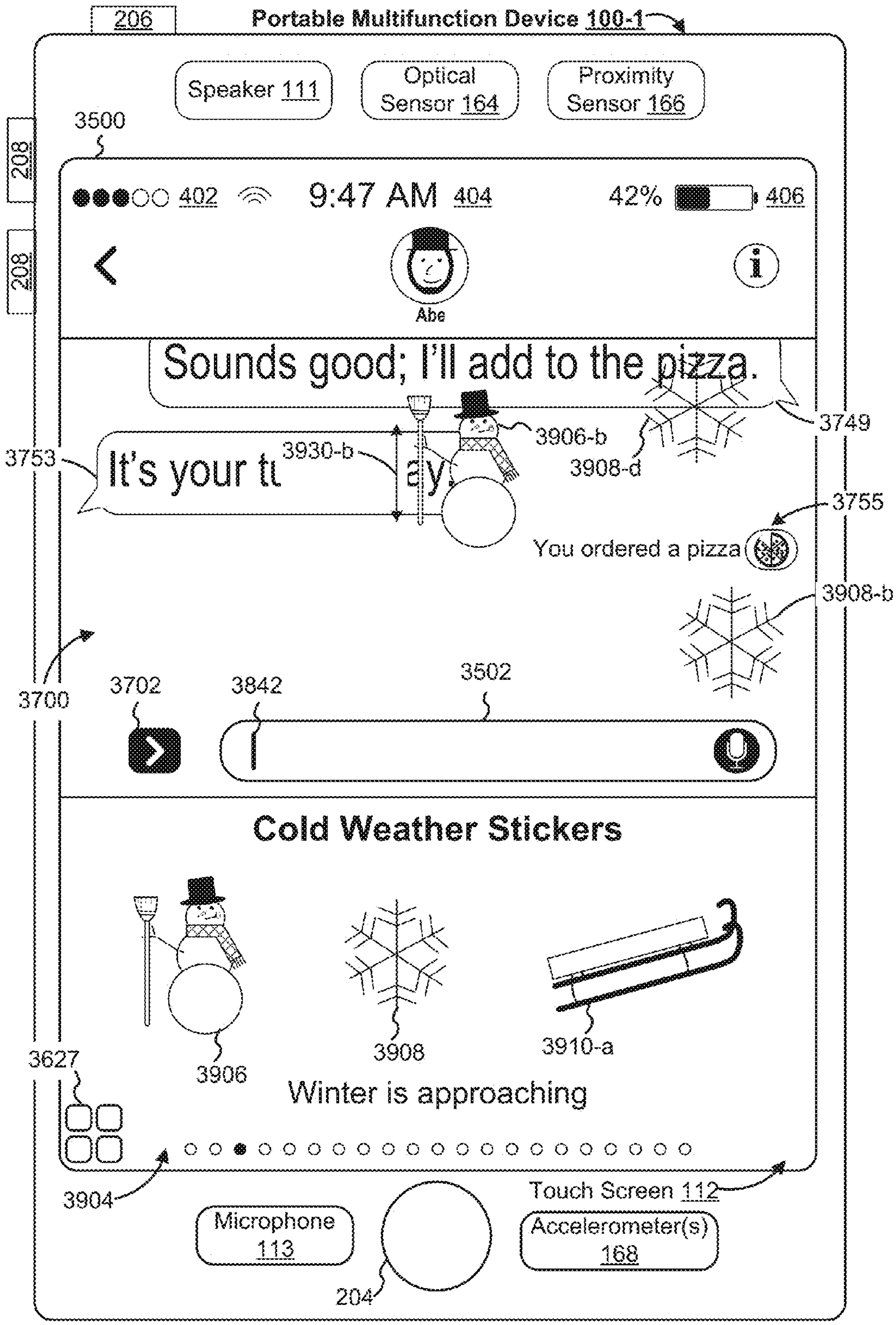
Figure 39S:
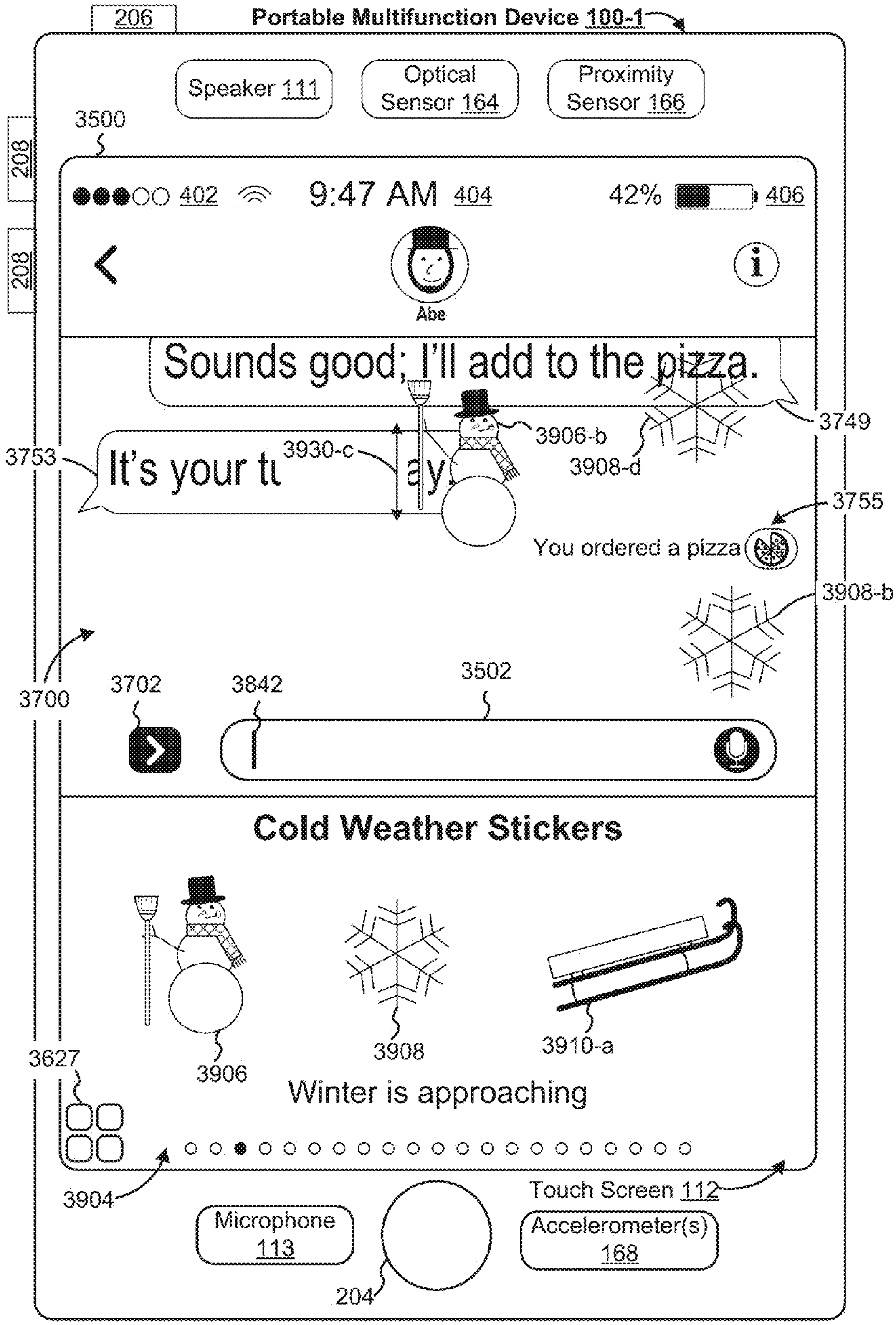
Figure 39T:
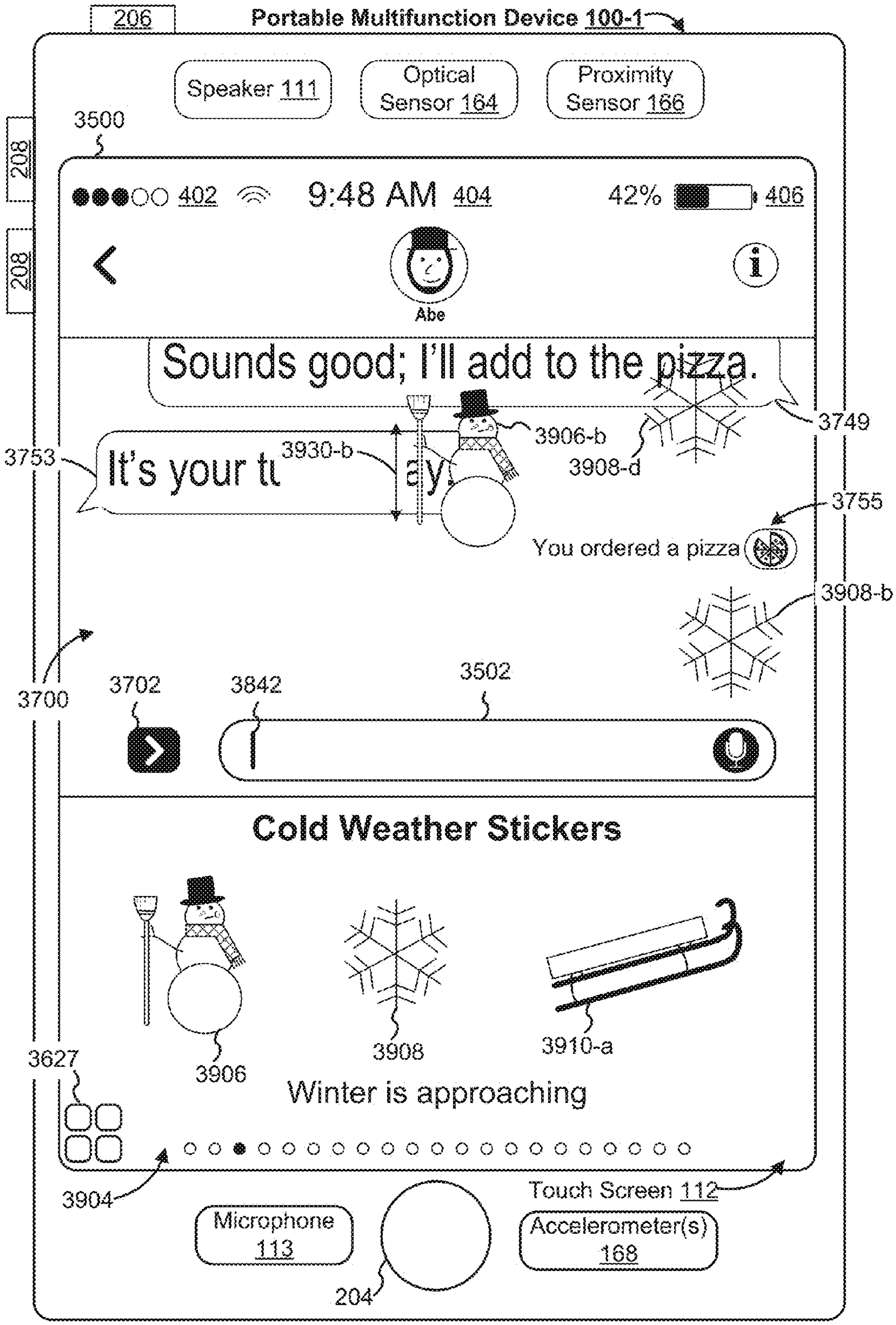
Figure 39U:
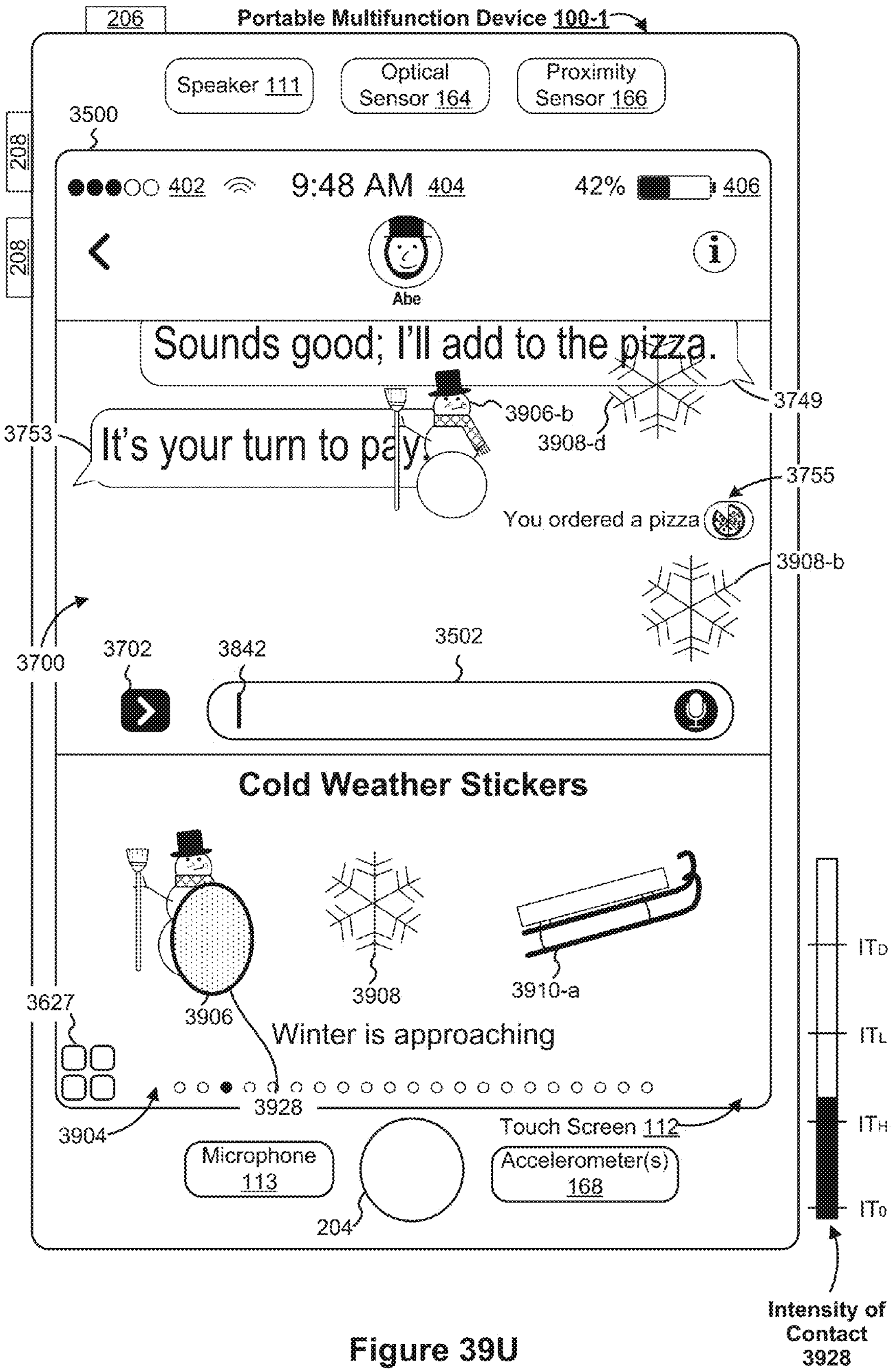
Figure 39V:
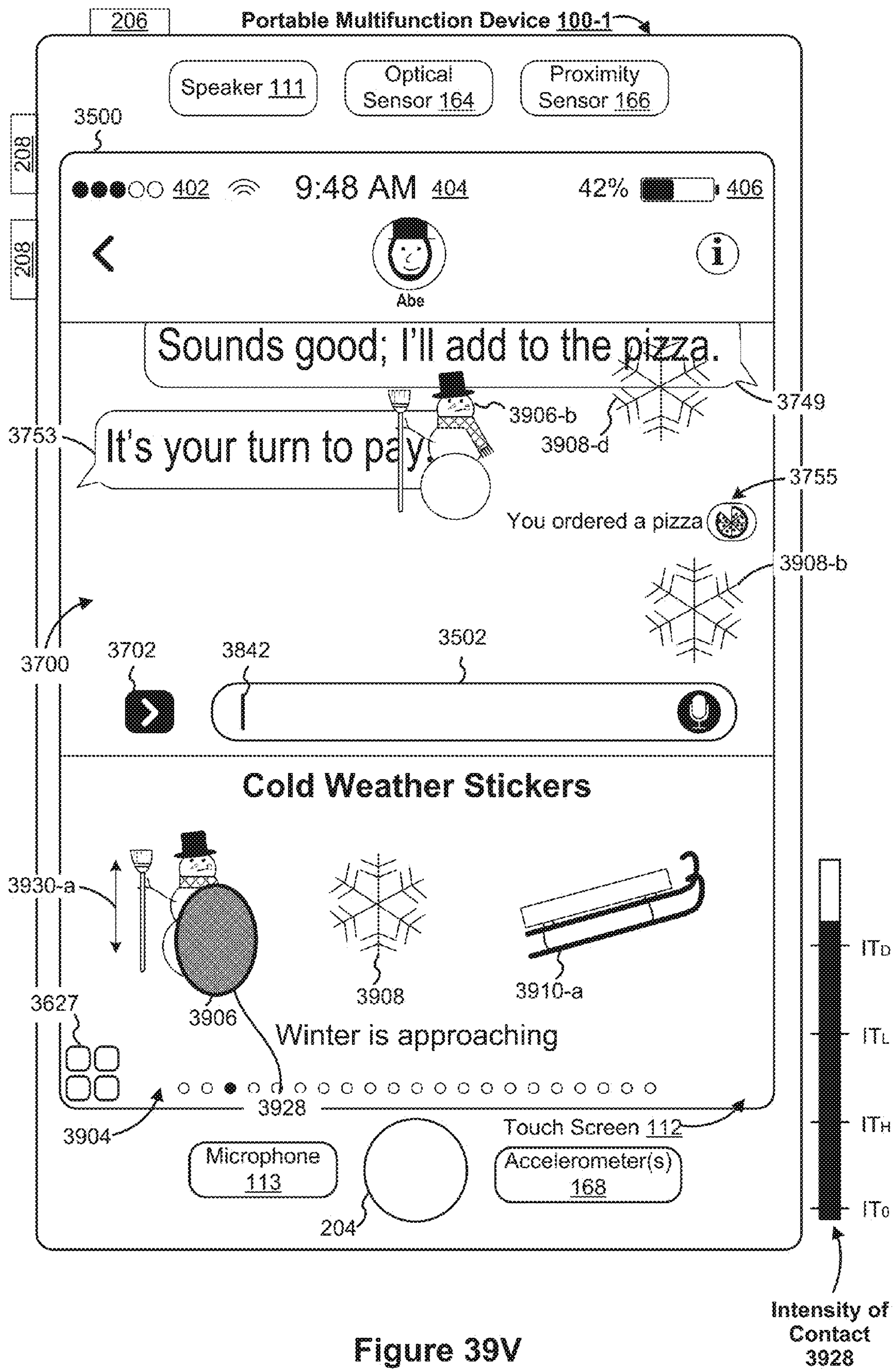
Figure 39W:
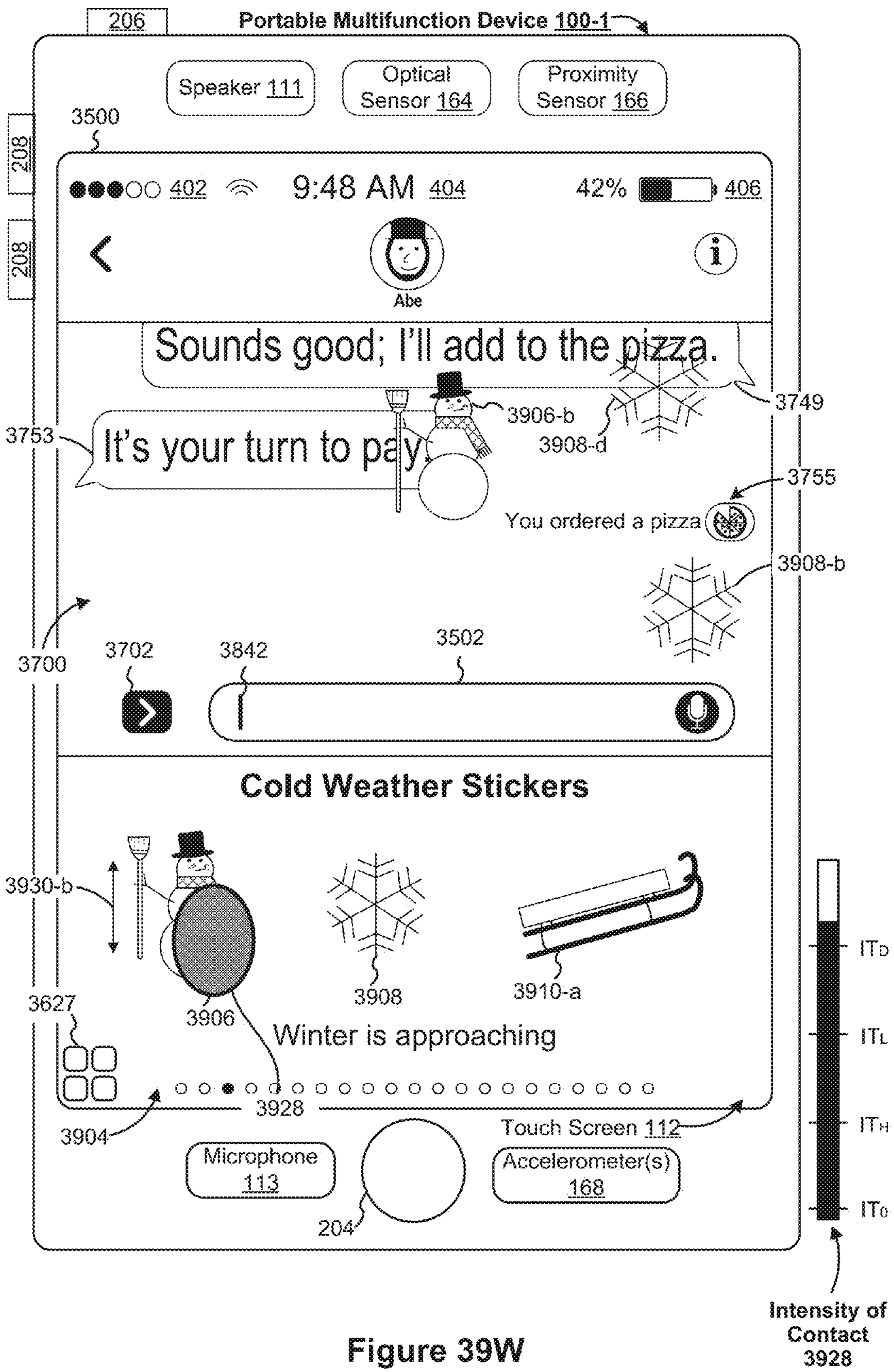
Figure 39X:
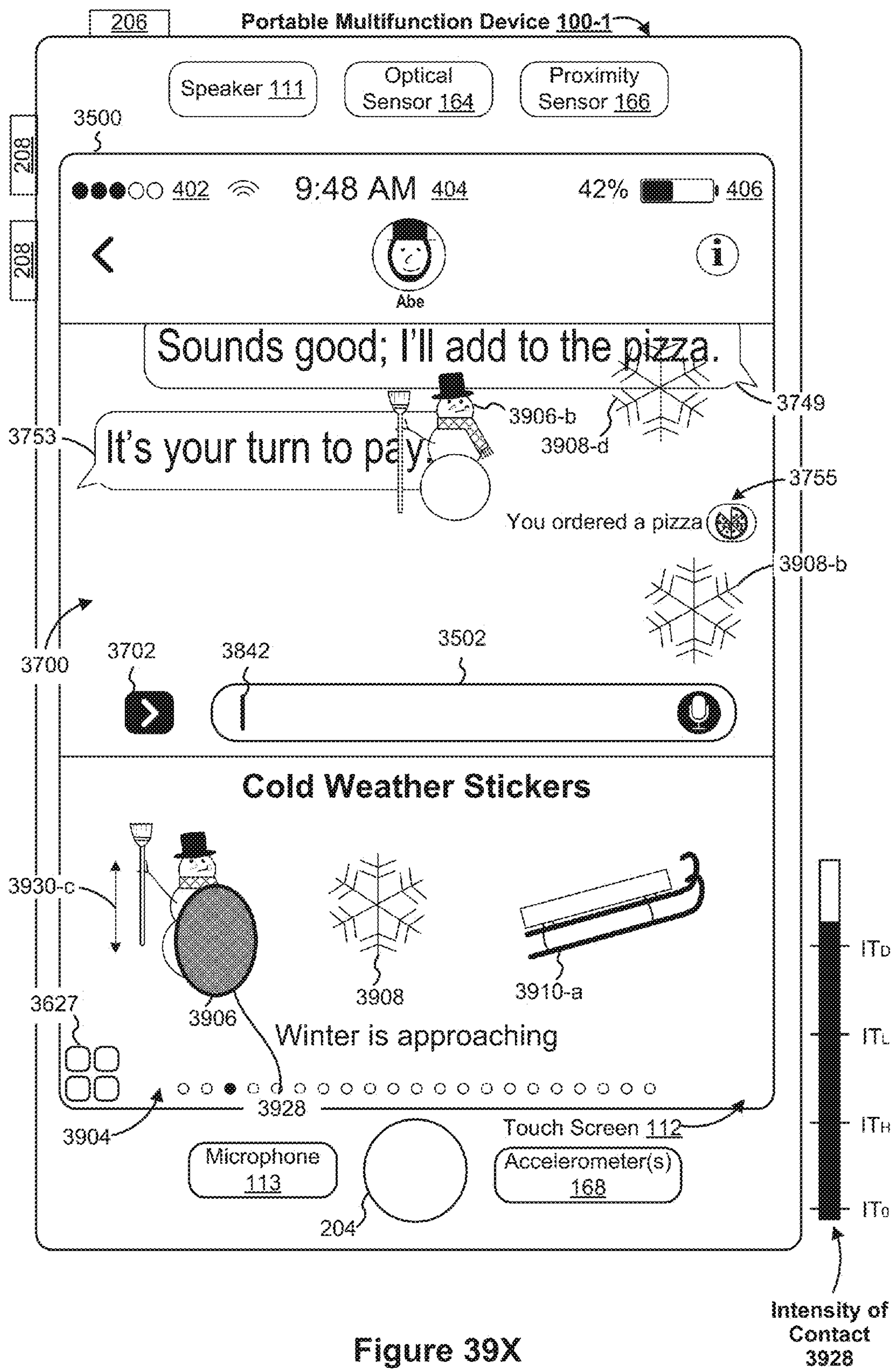
Figure 39Y:
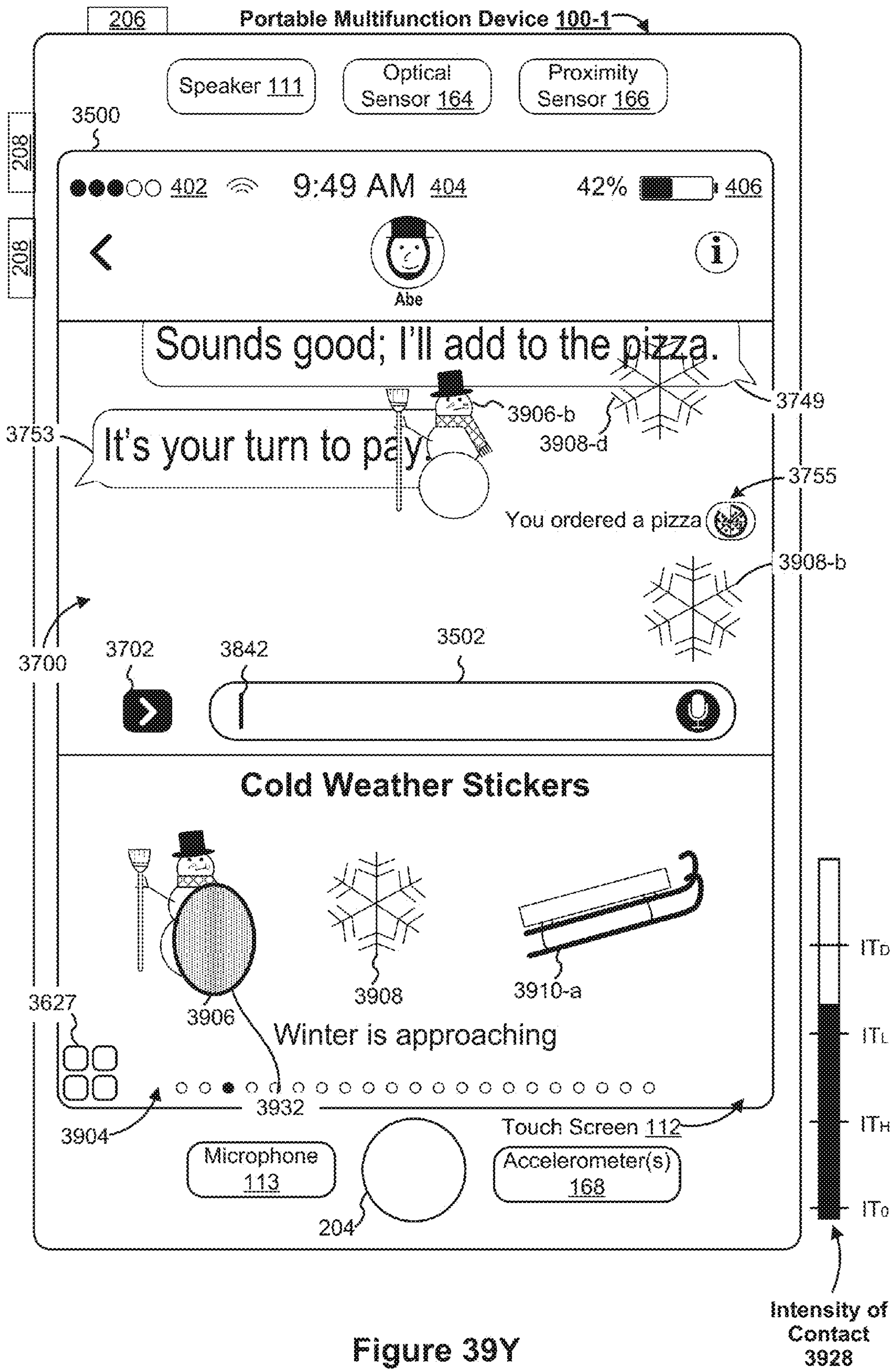
Figure 39Z:
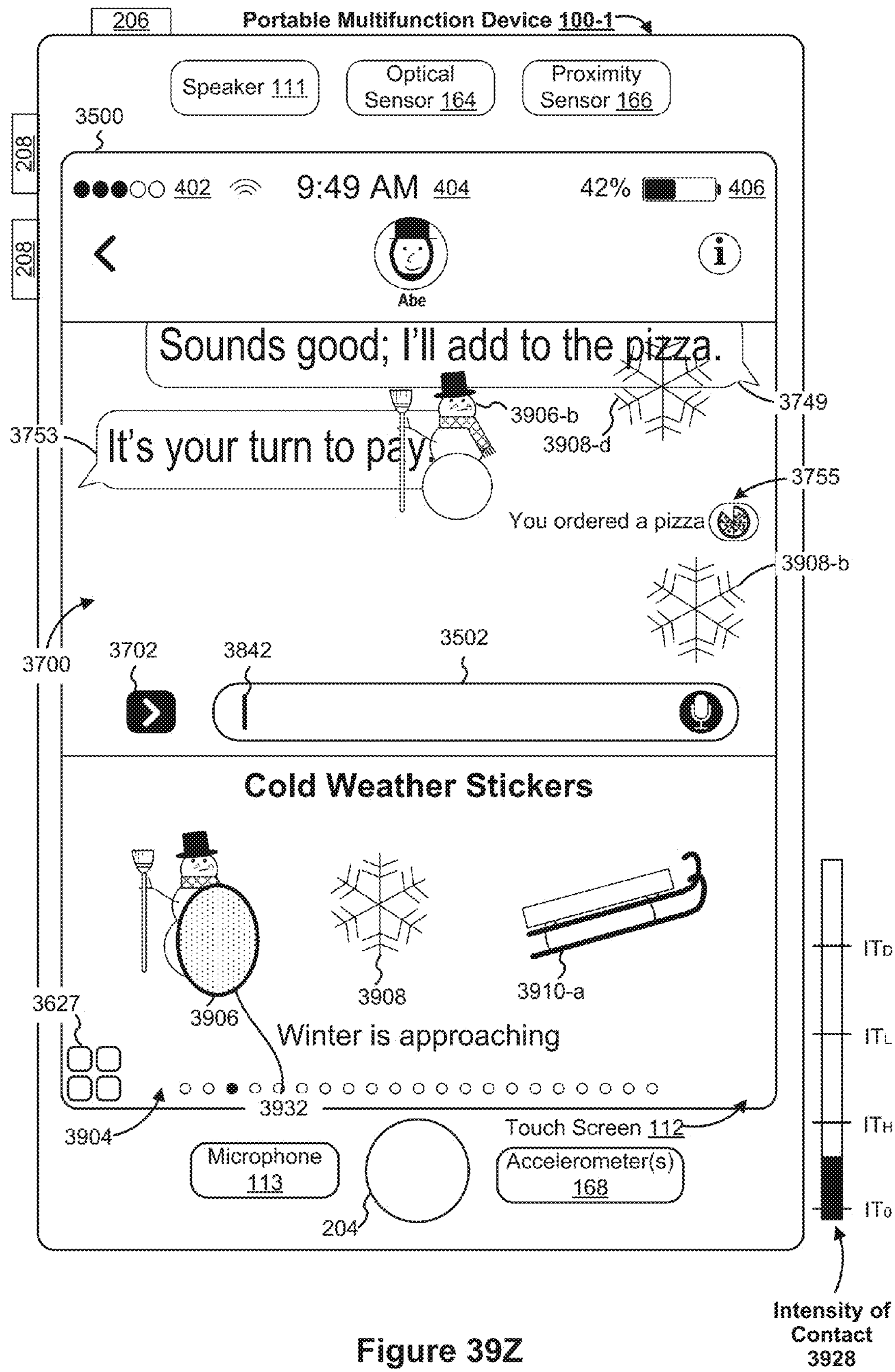
Figure 39A:
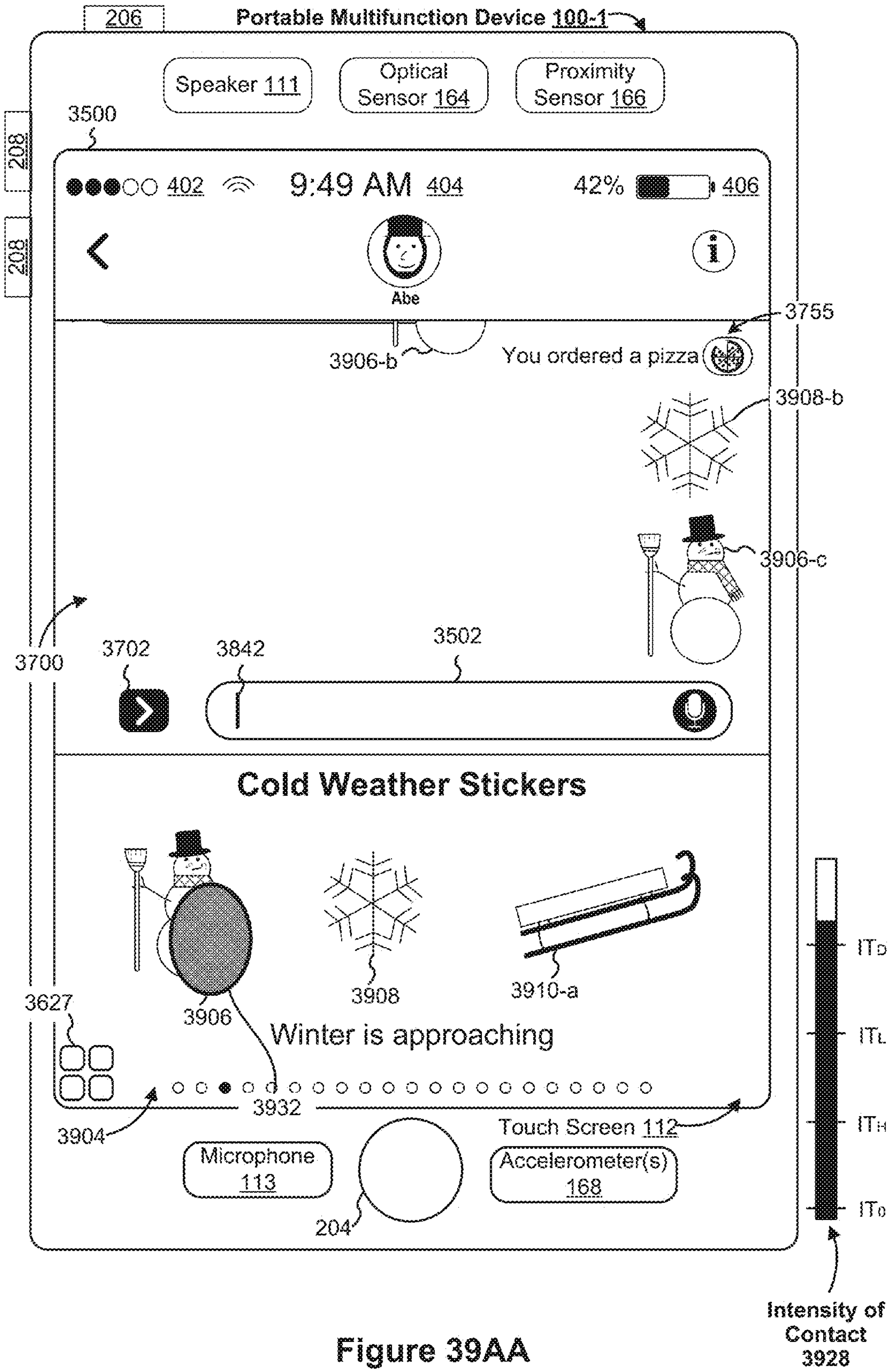
Figure 39A:
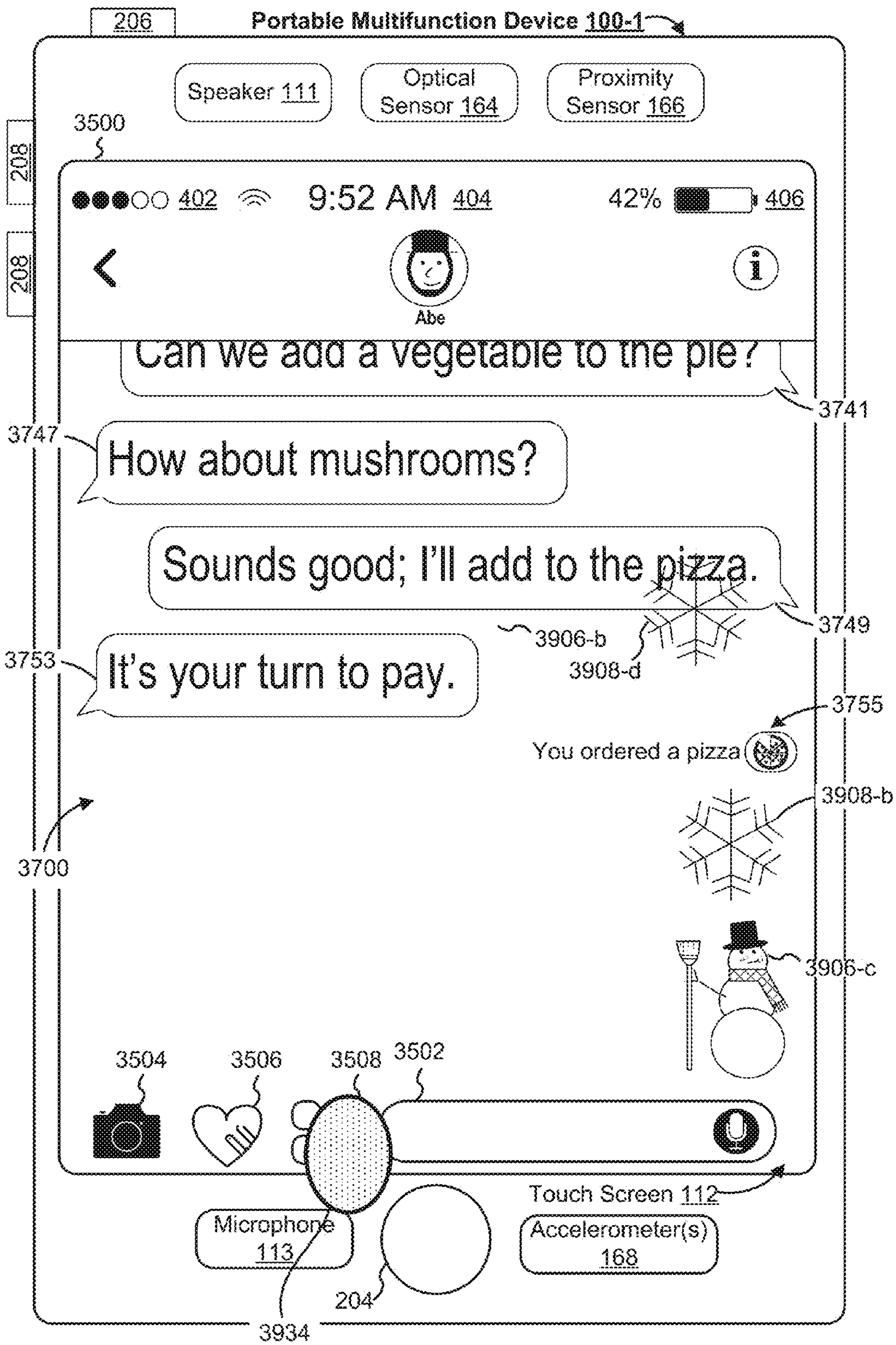
Figure 39A:
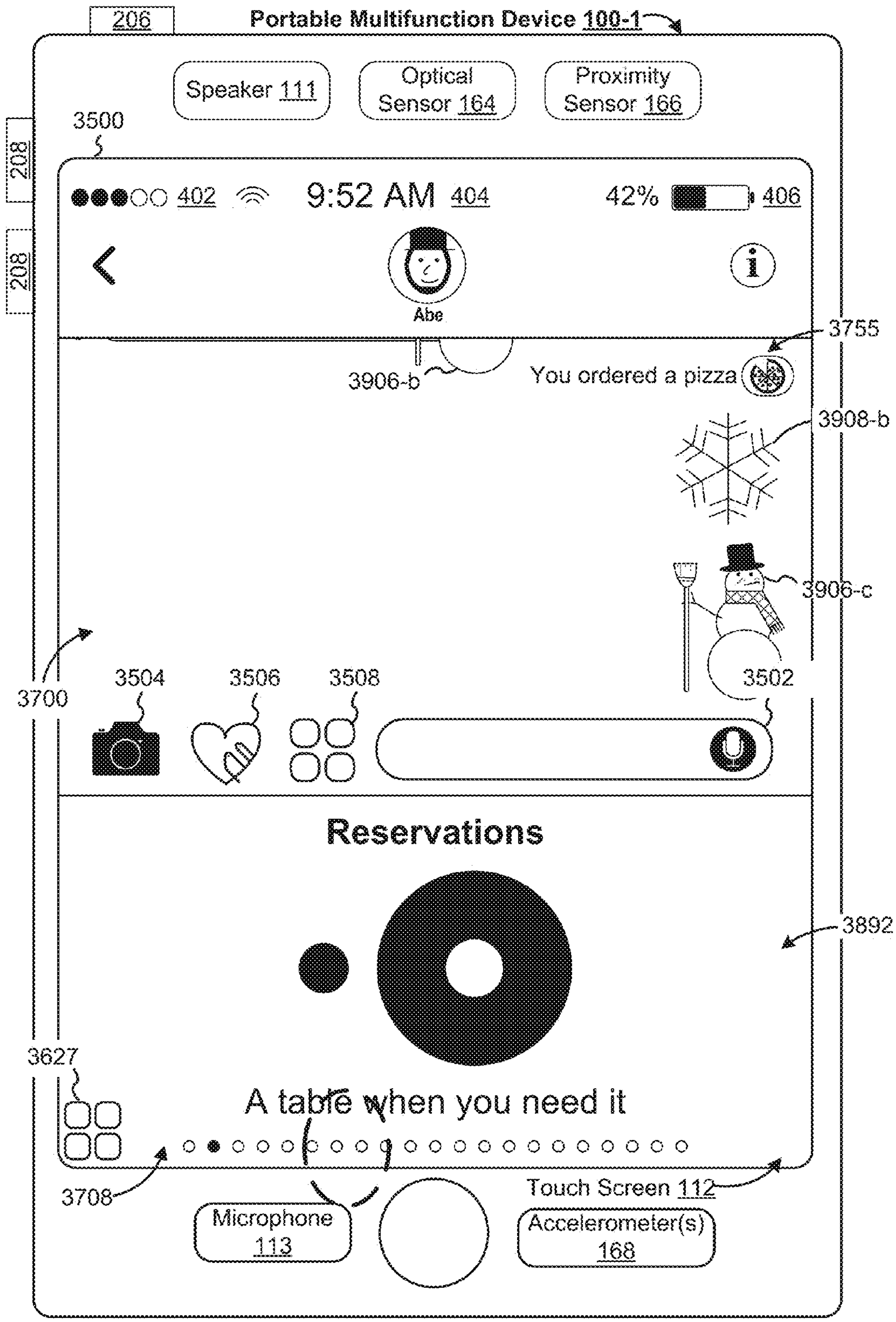
Figure 39A:
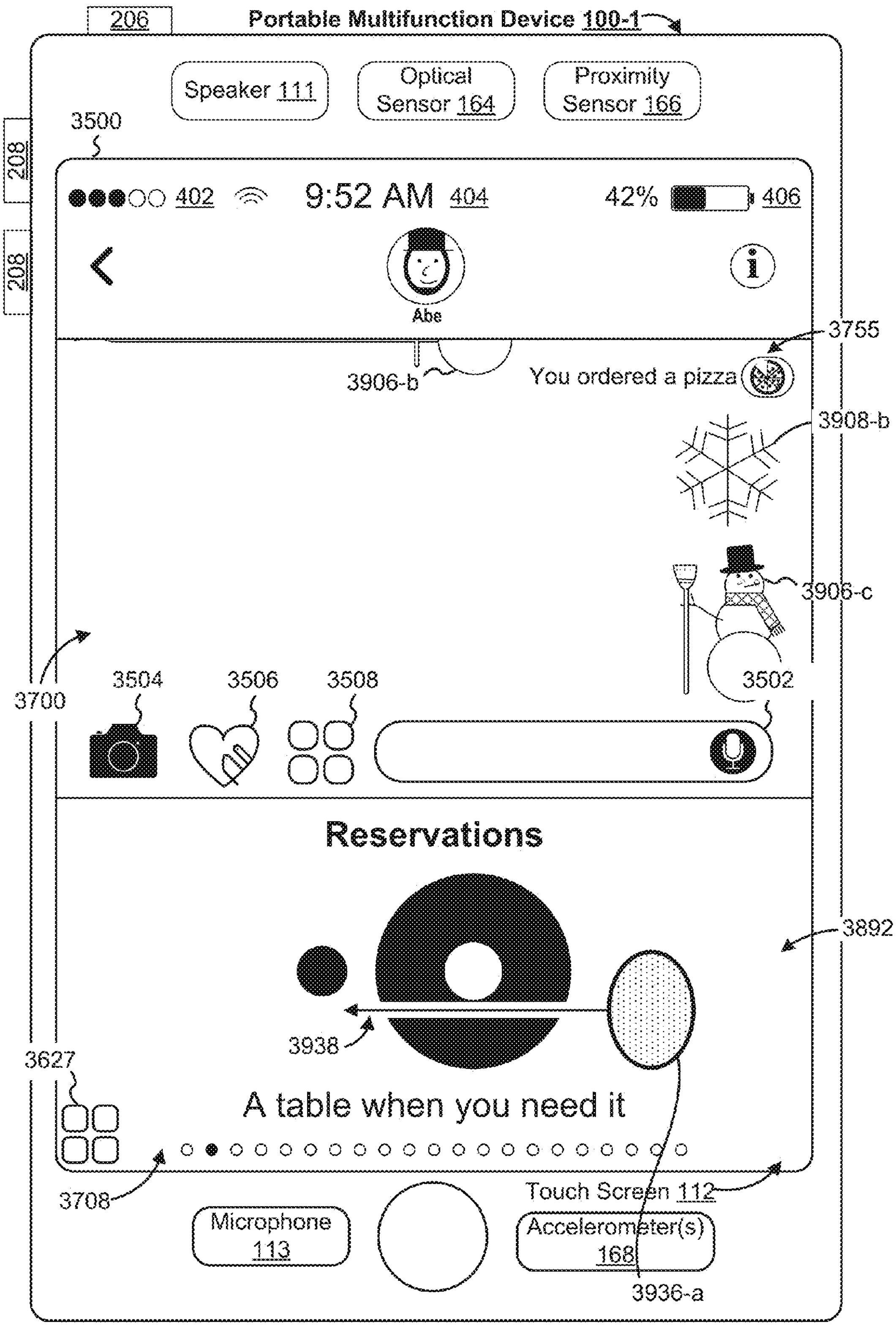
Figure 39A:
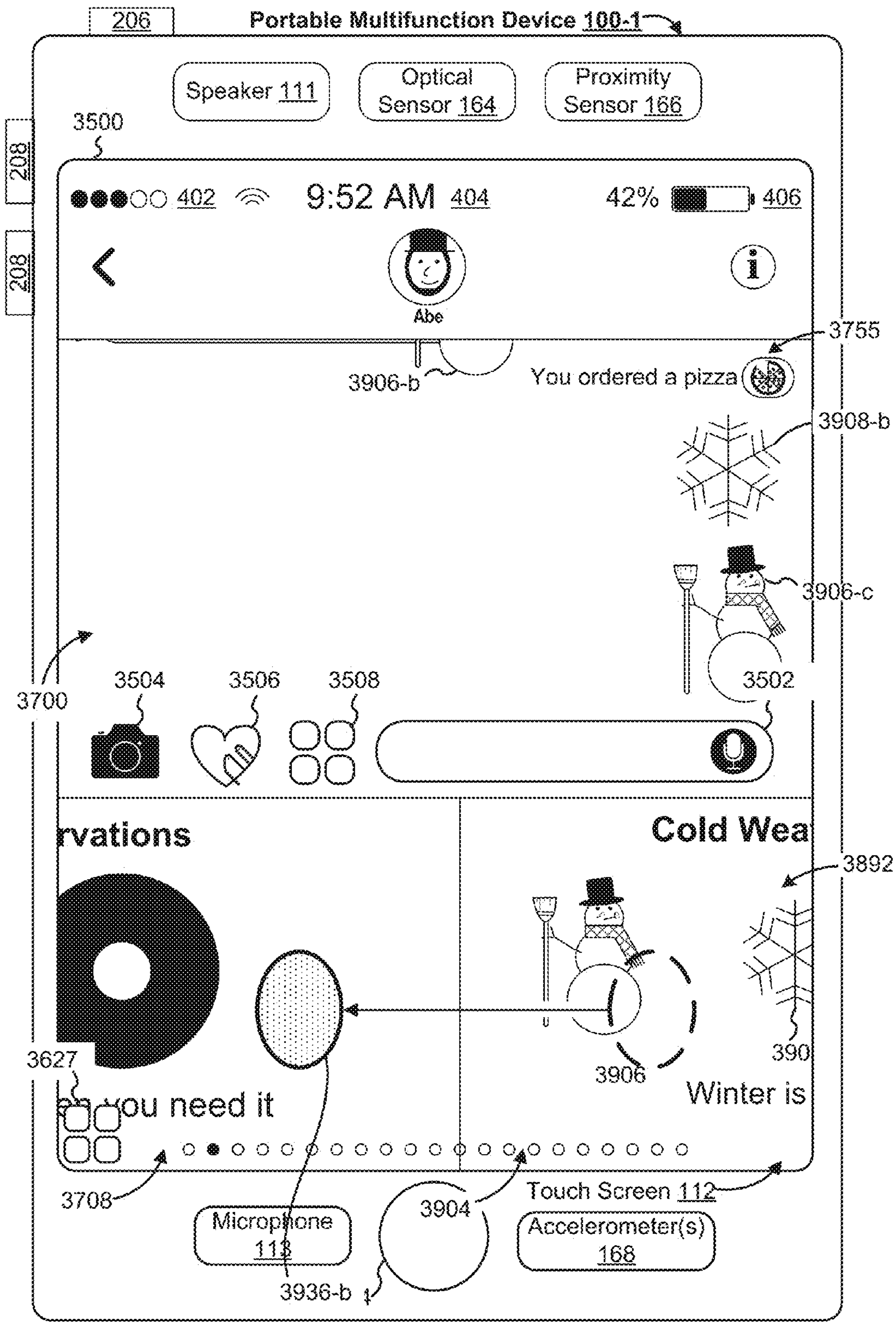
Figure 39A:
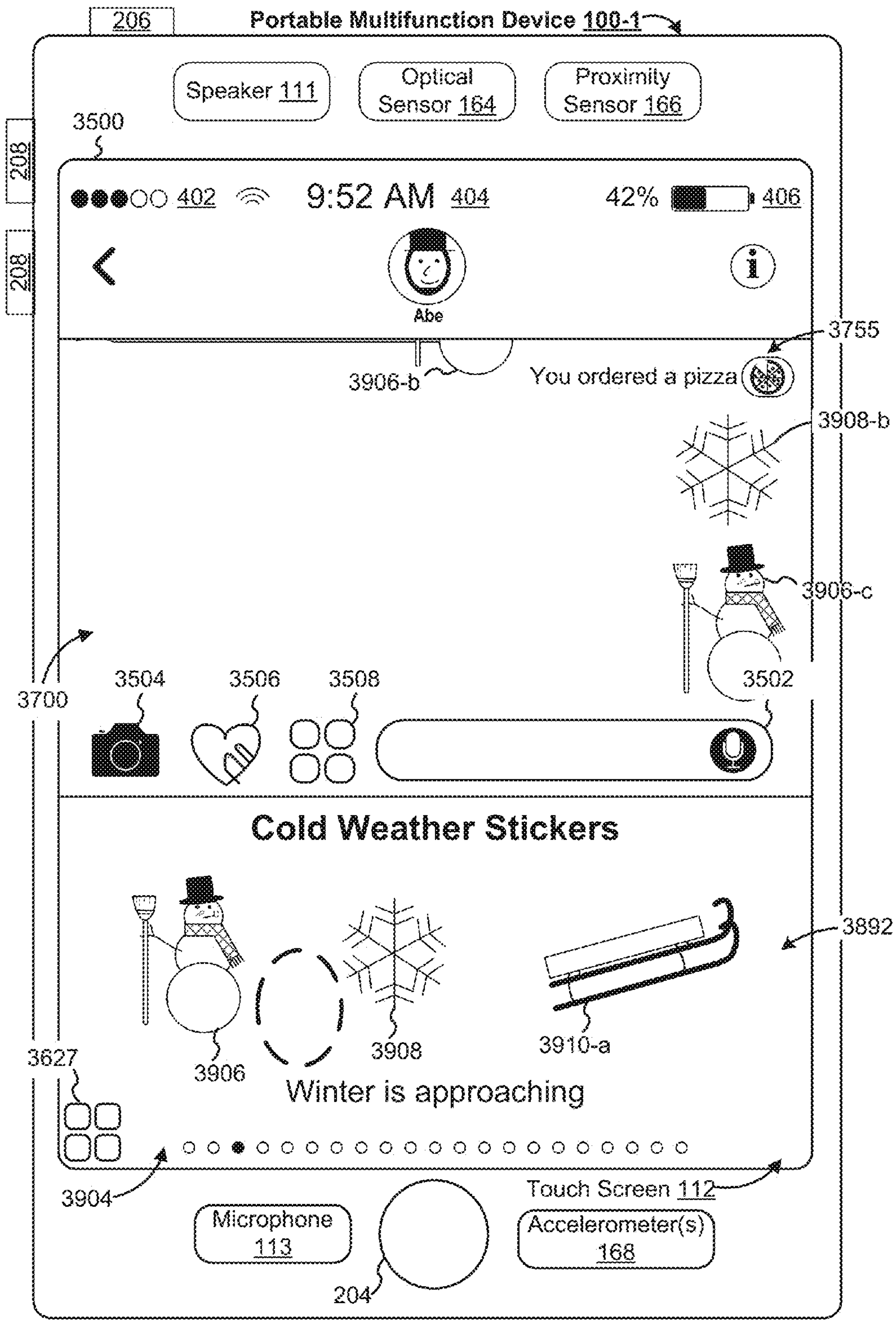
Figure 39A:
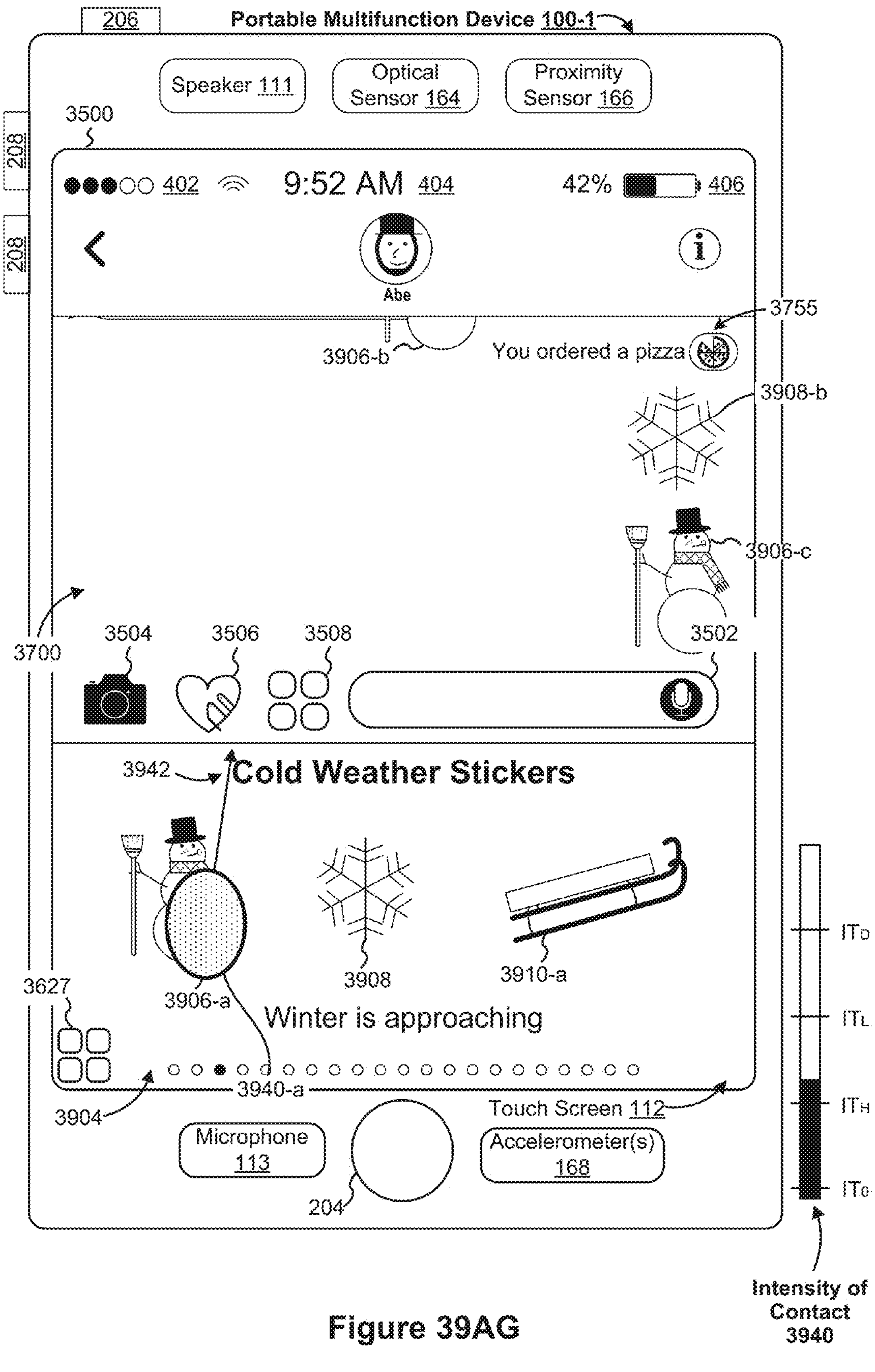
Figure 39A:
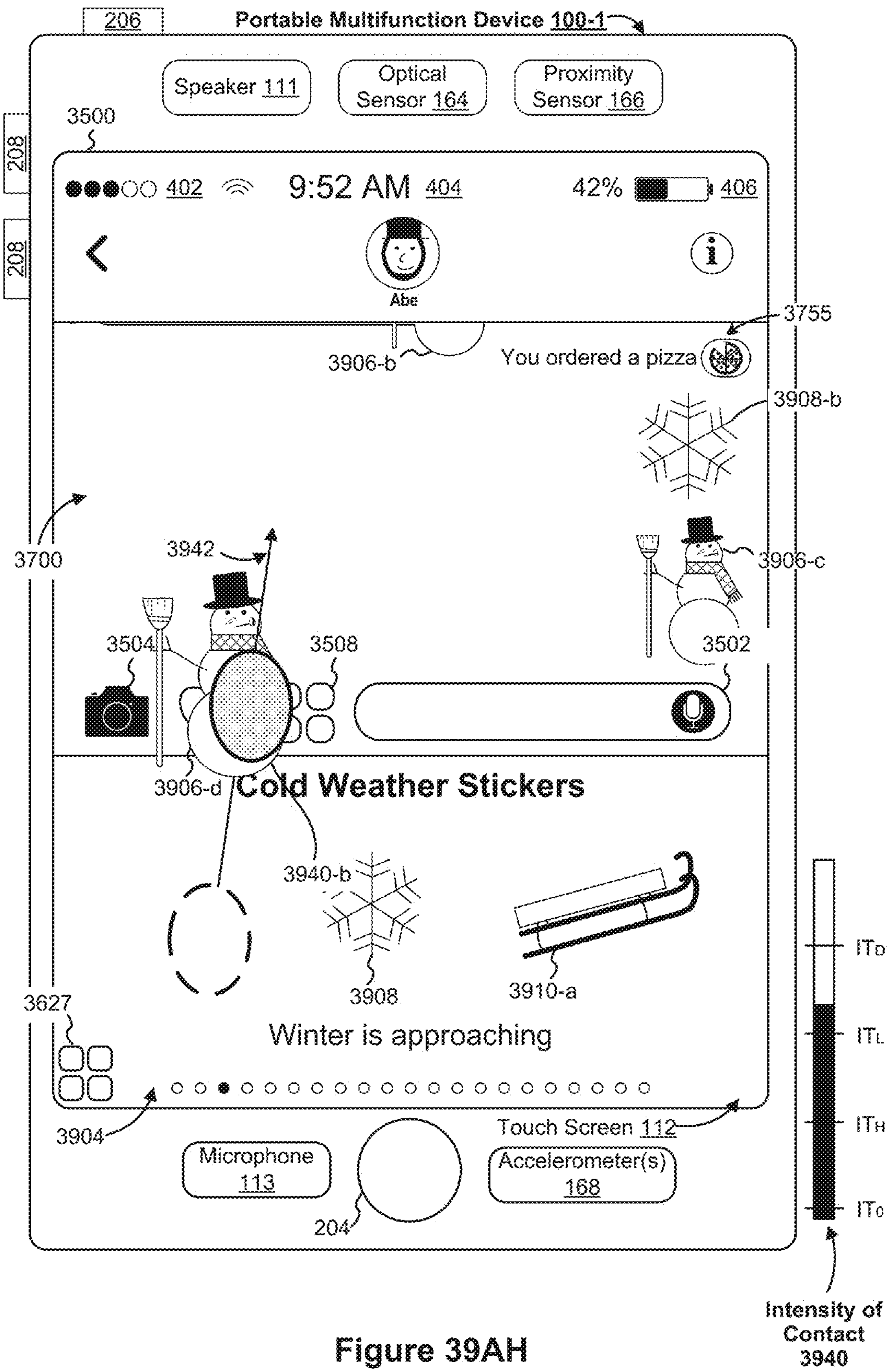
Figure 39A:
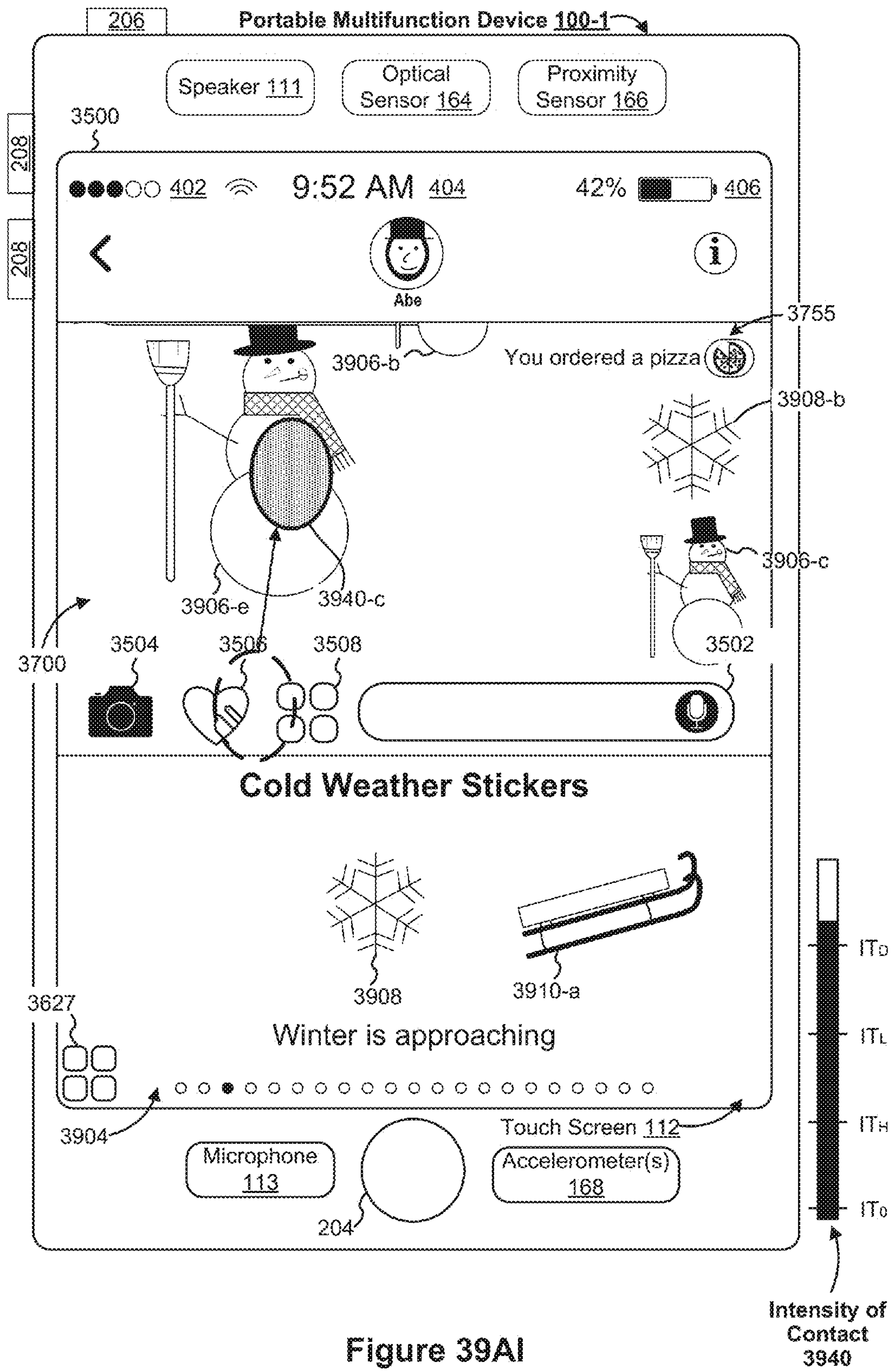
Figure 39A:
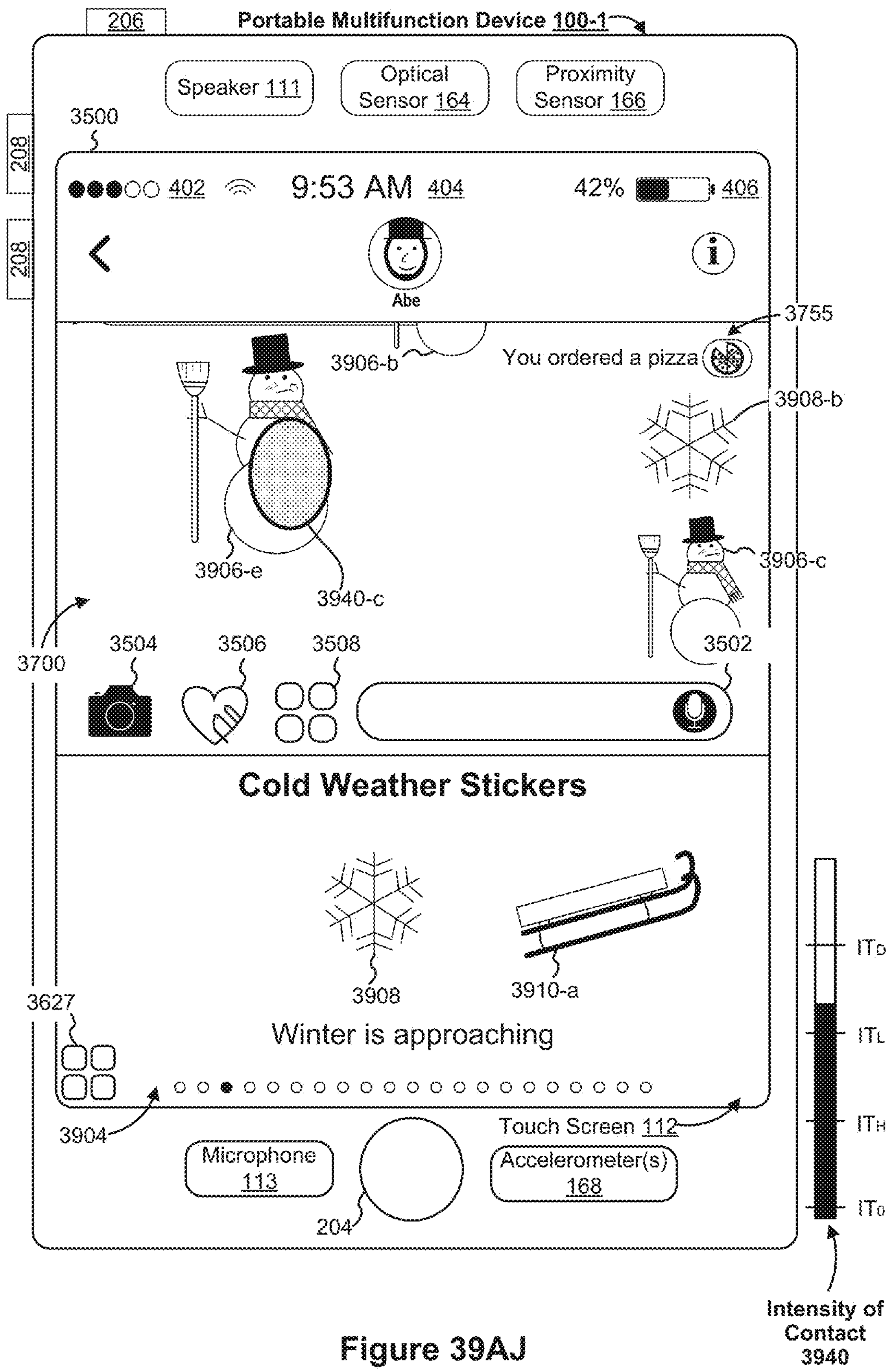
Figure 39A:
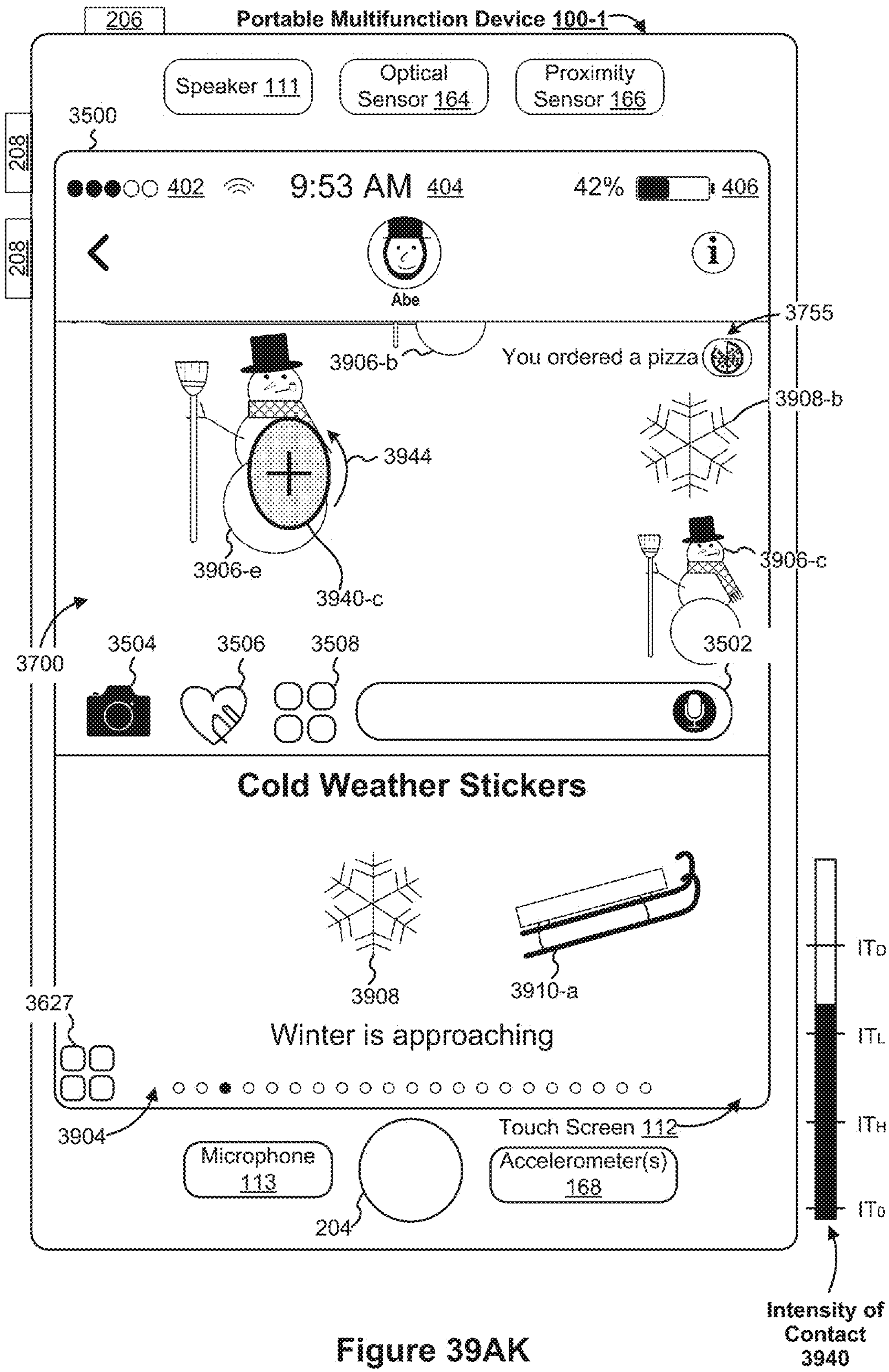
Figure 39A:
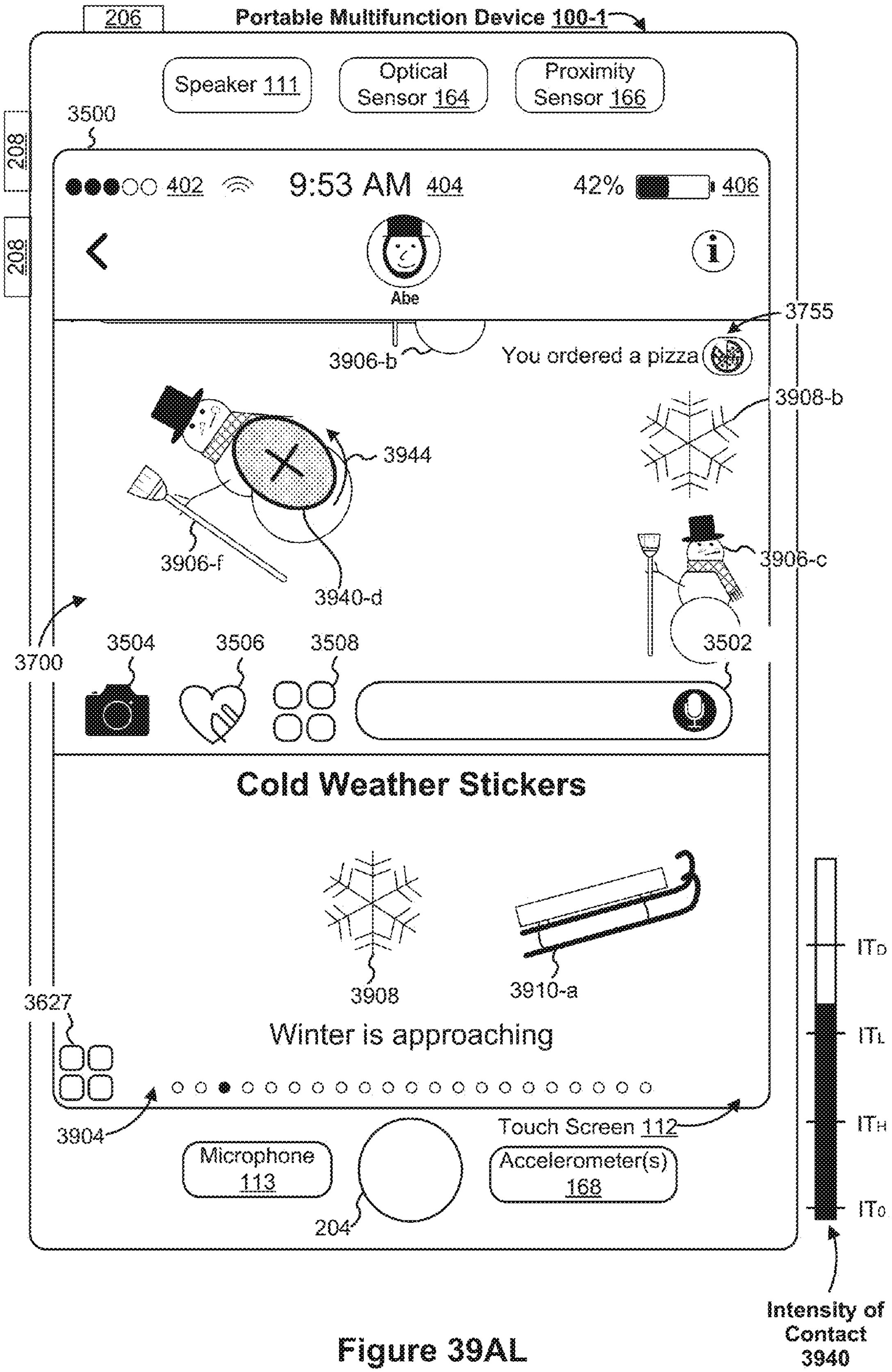
Figure 39A:
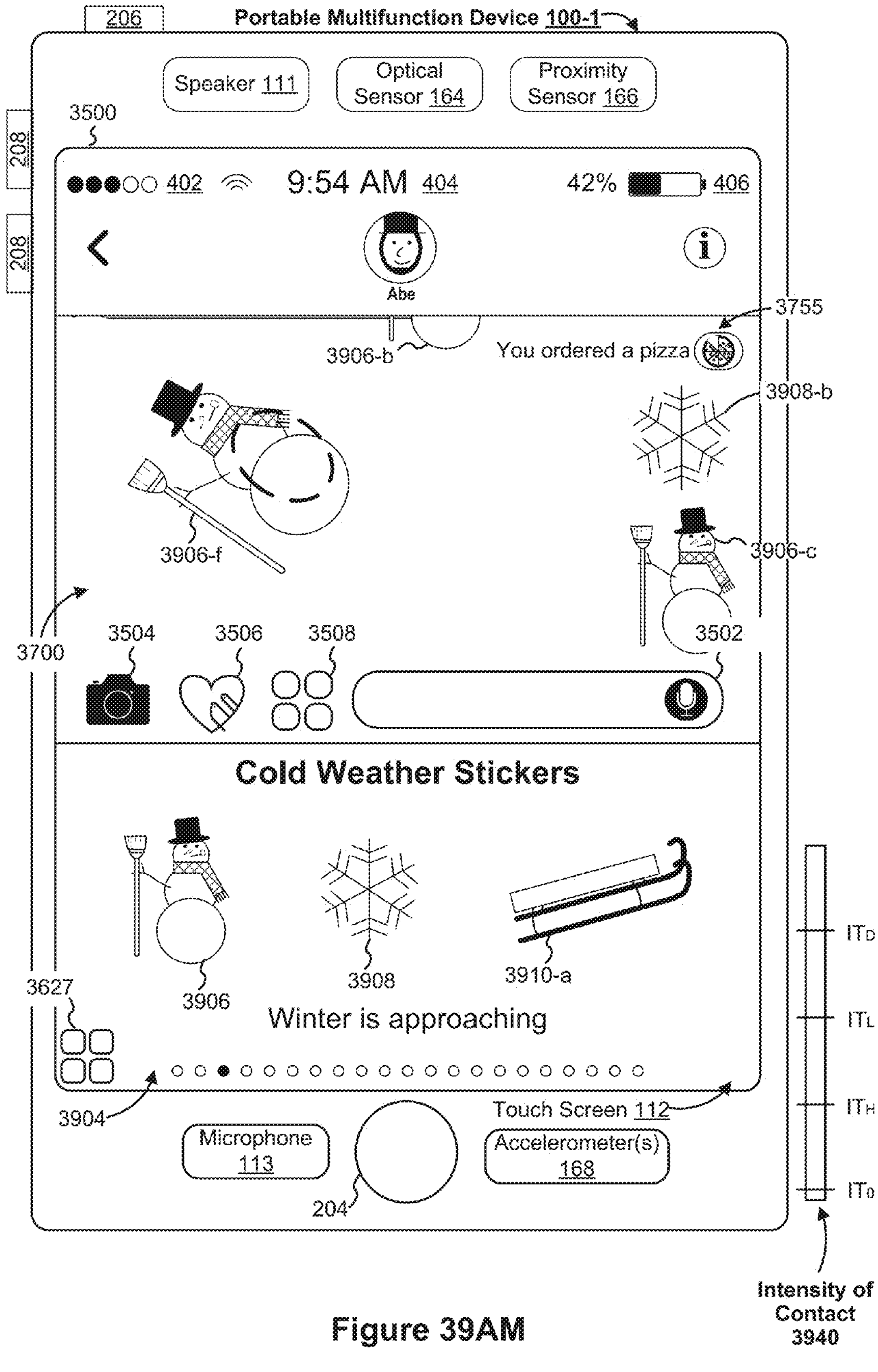
Figure 39A:
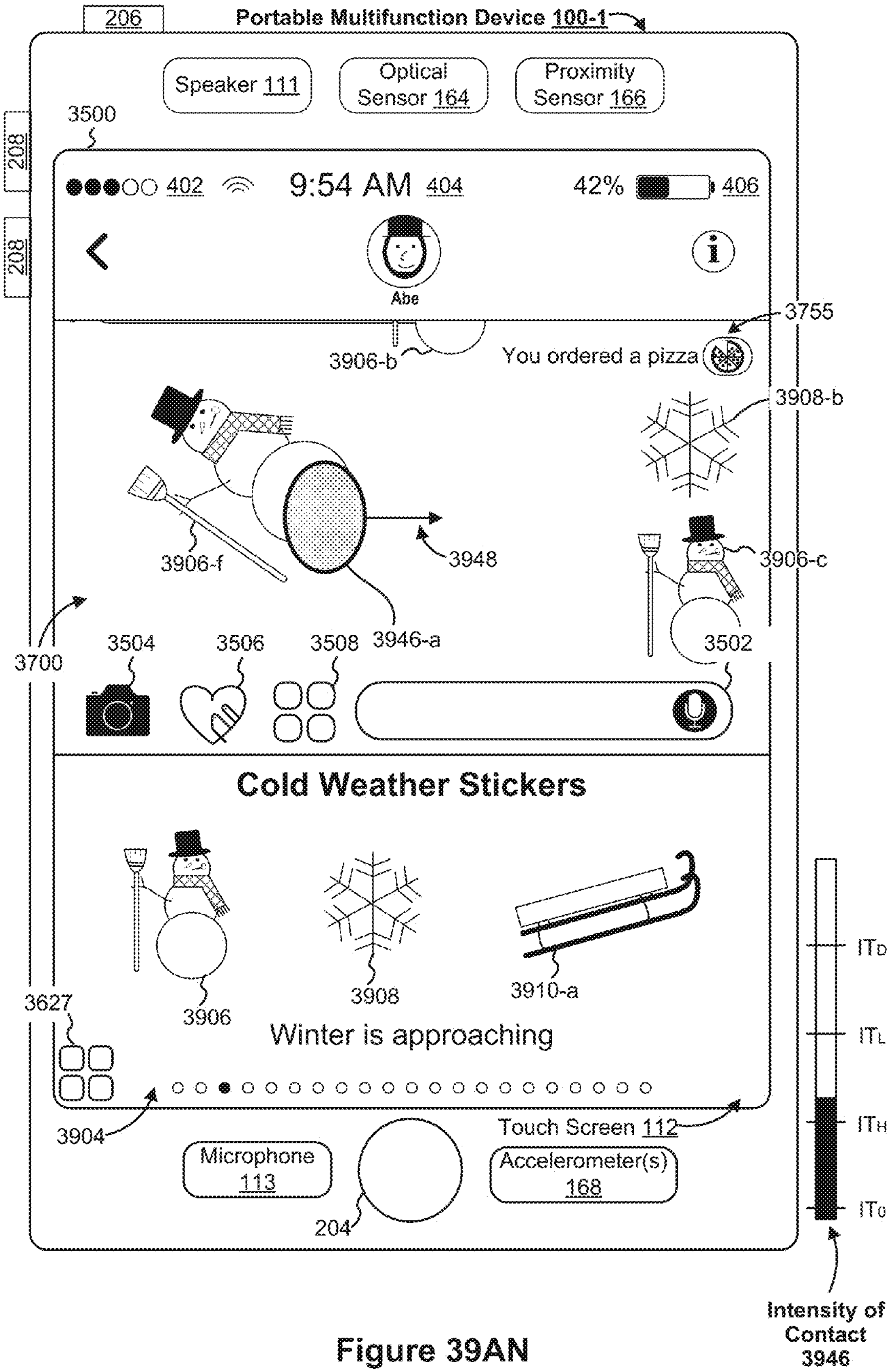
Figure 39A:
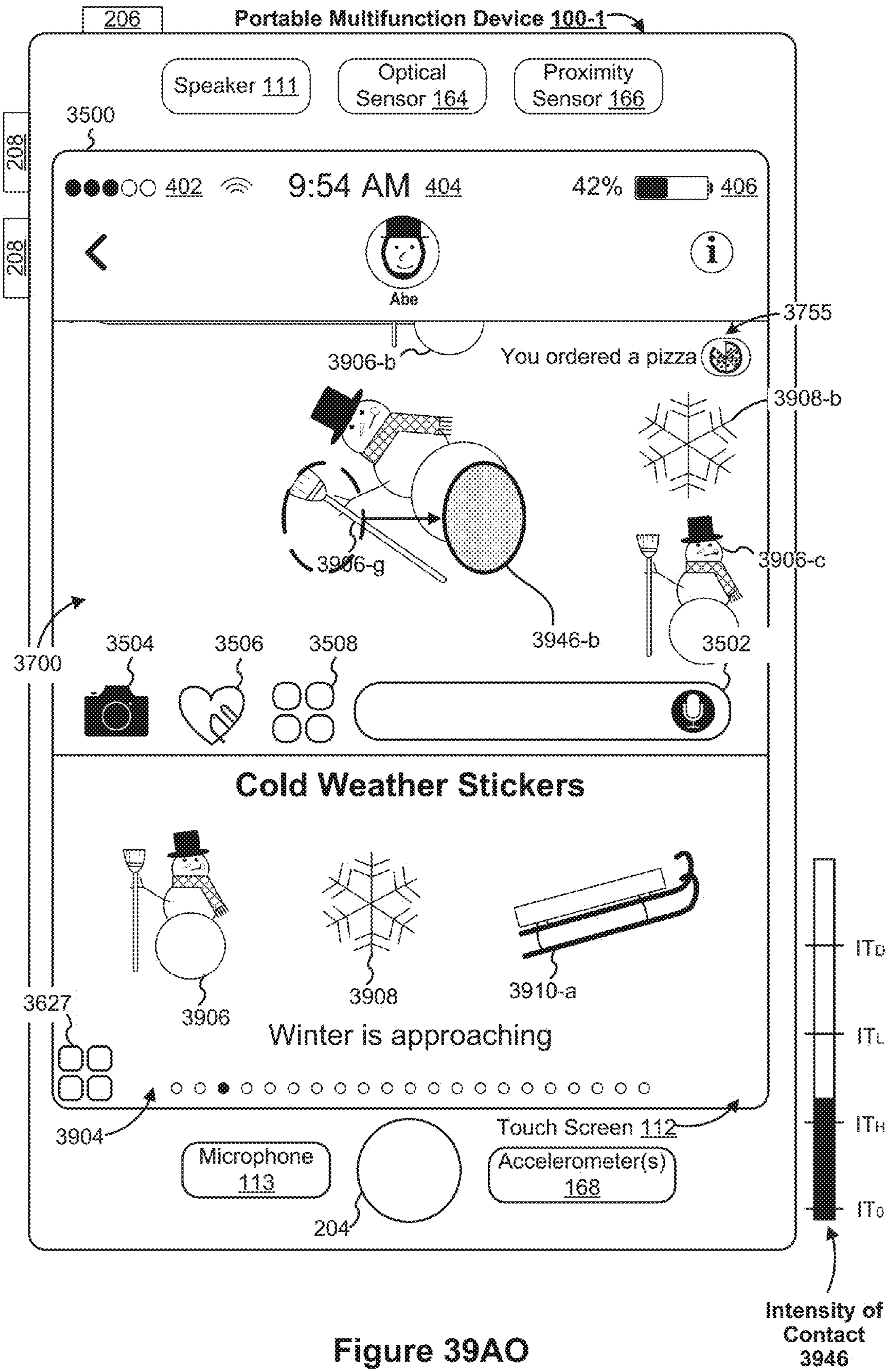
Figure 39A:
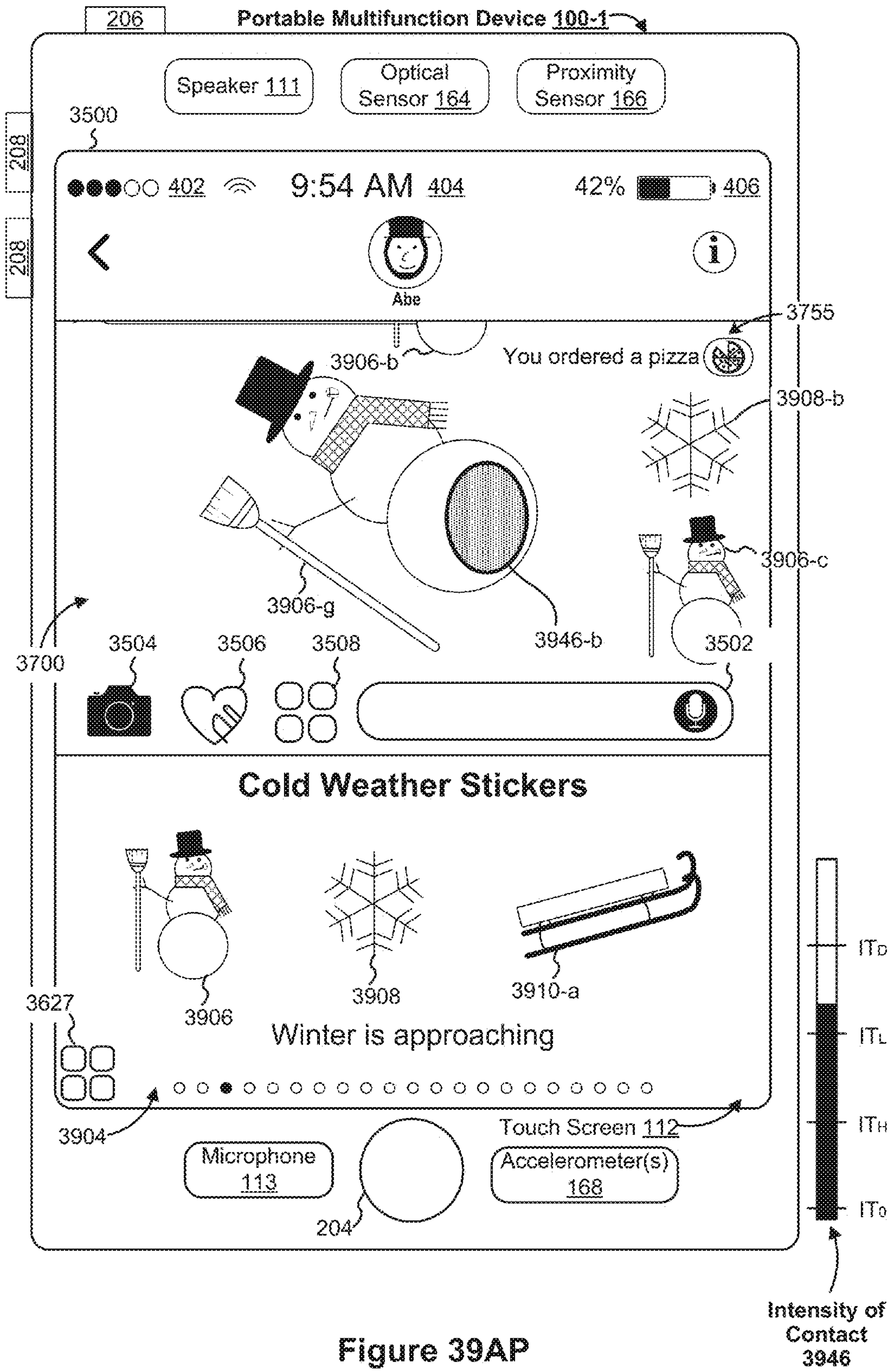
Figure 39A:
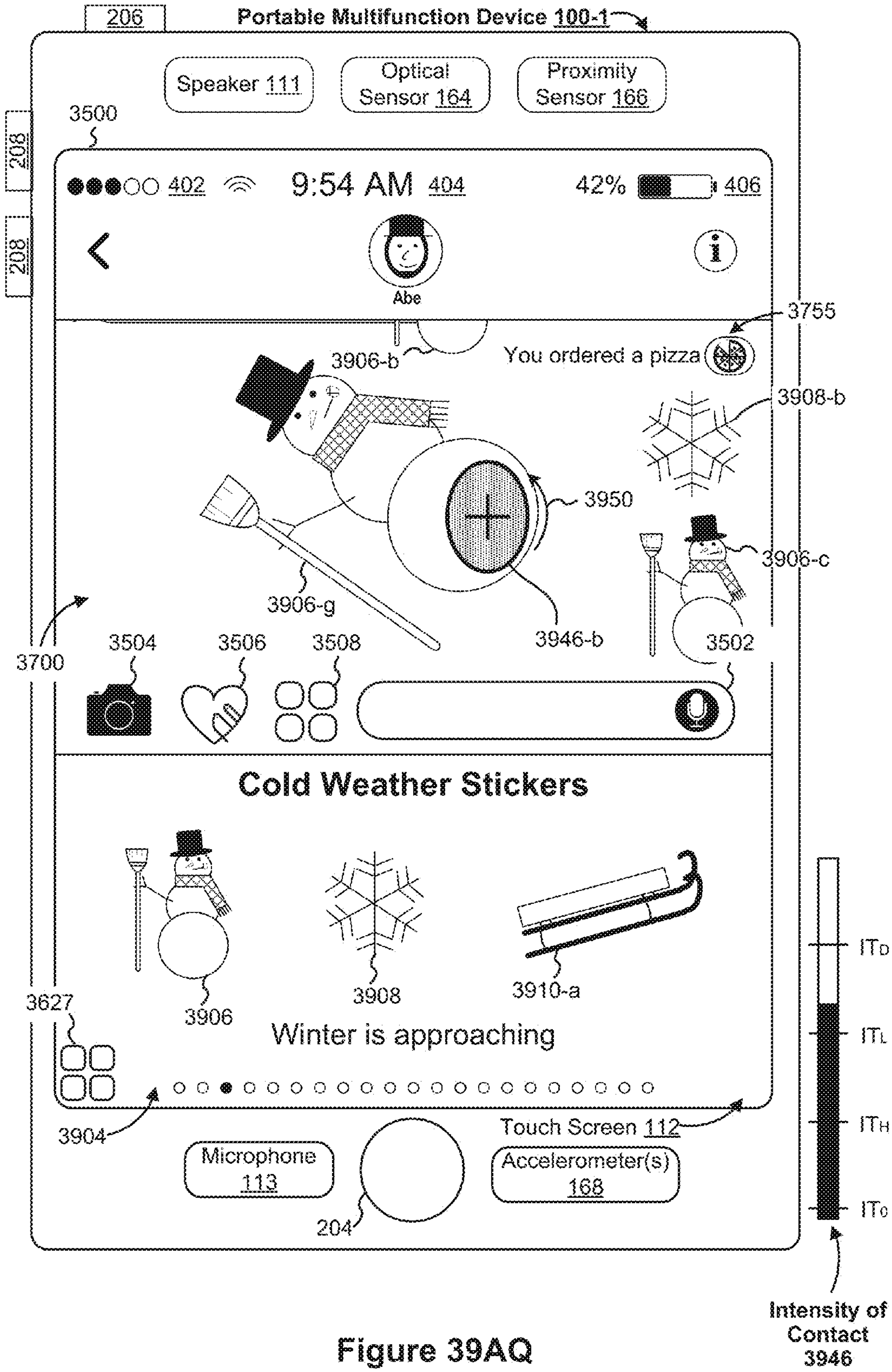
Figure 39A:
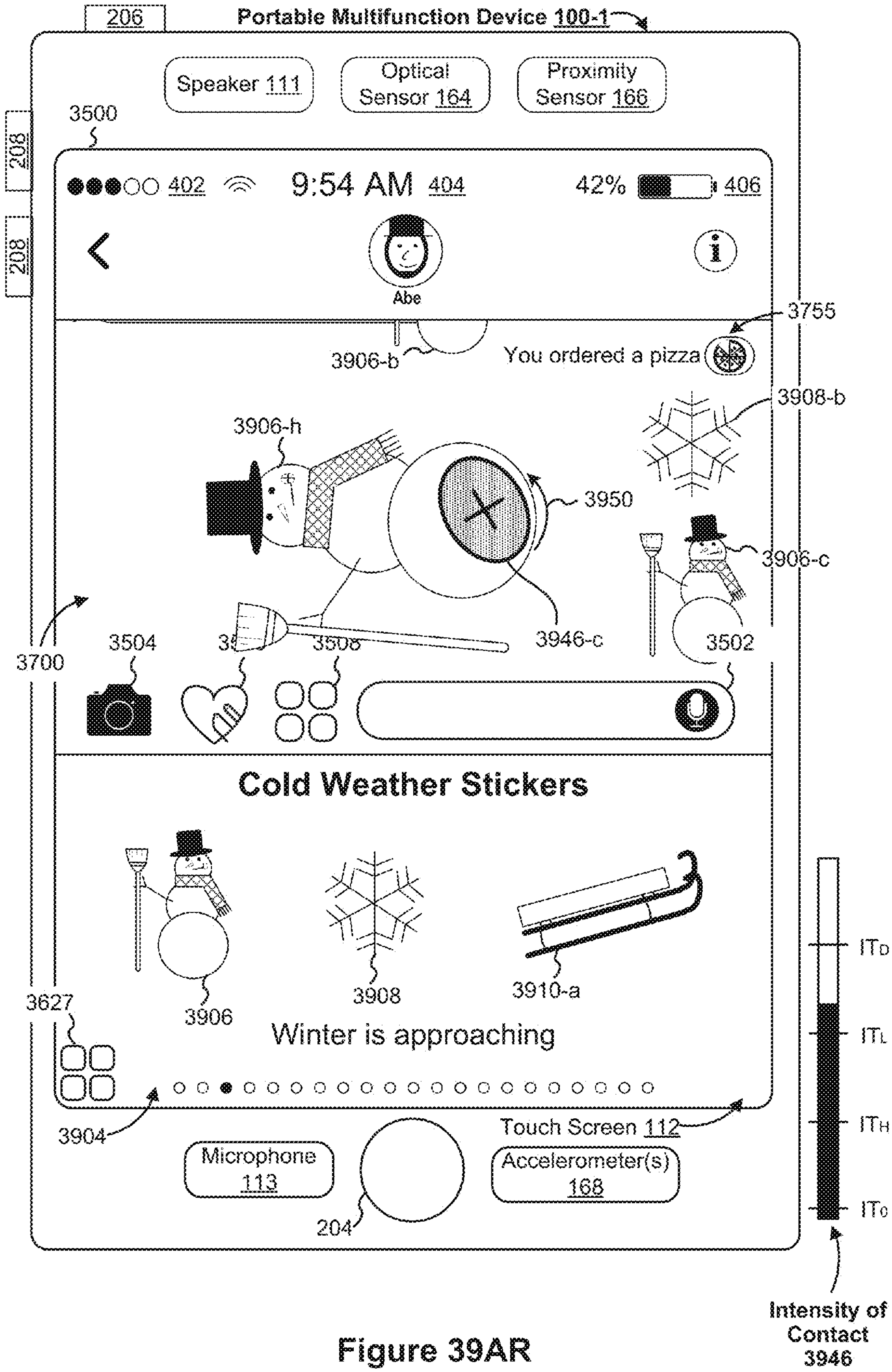
Figure 39A:
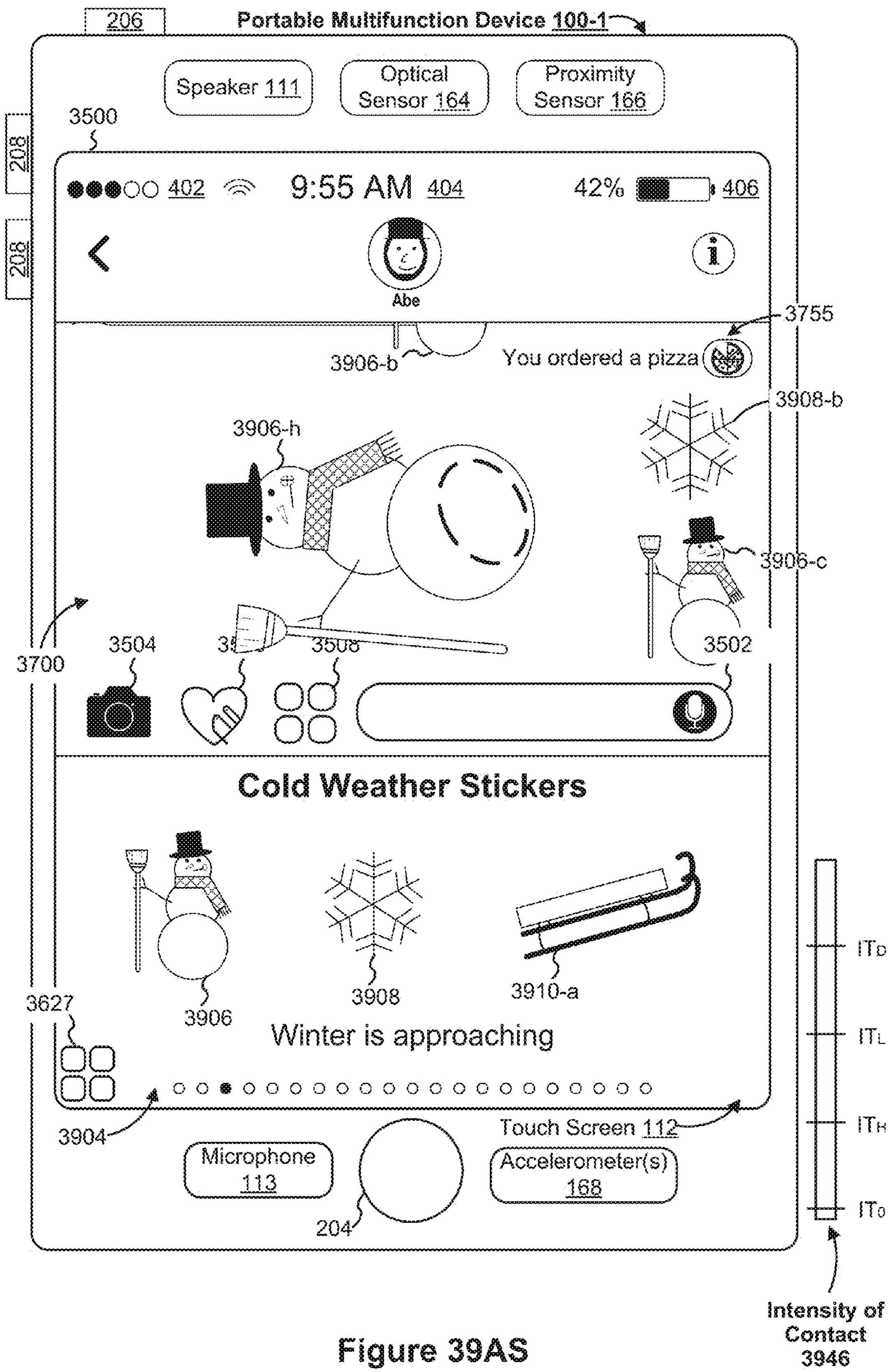
Figure 39A:
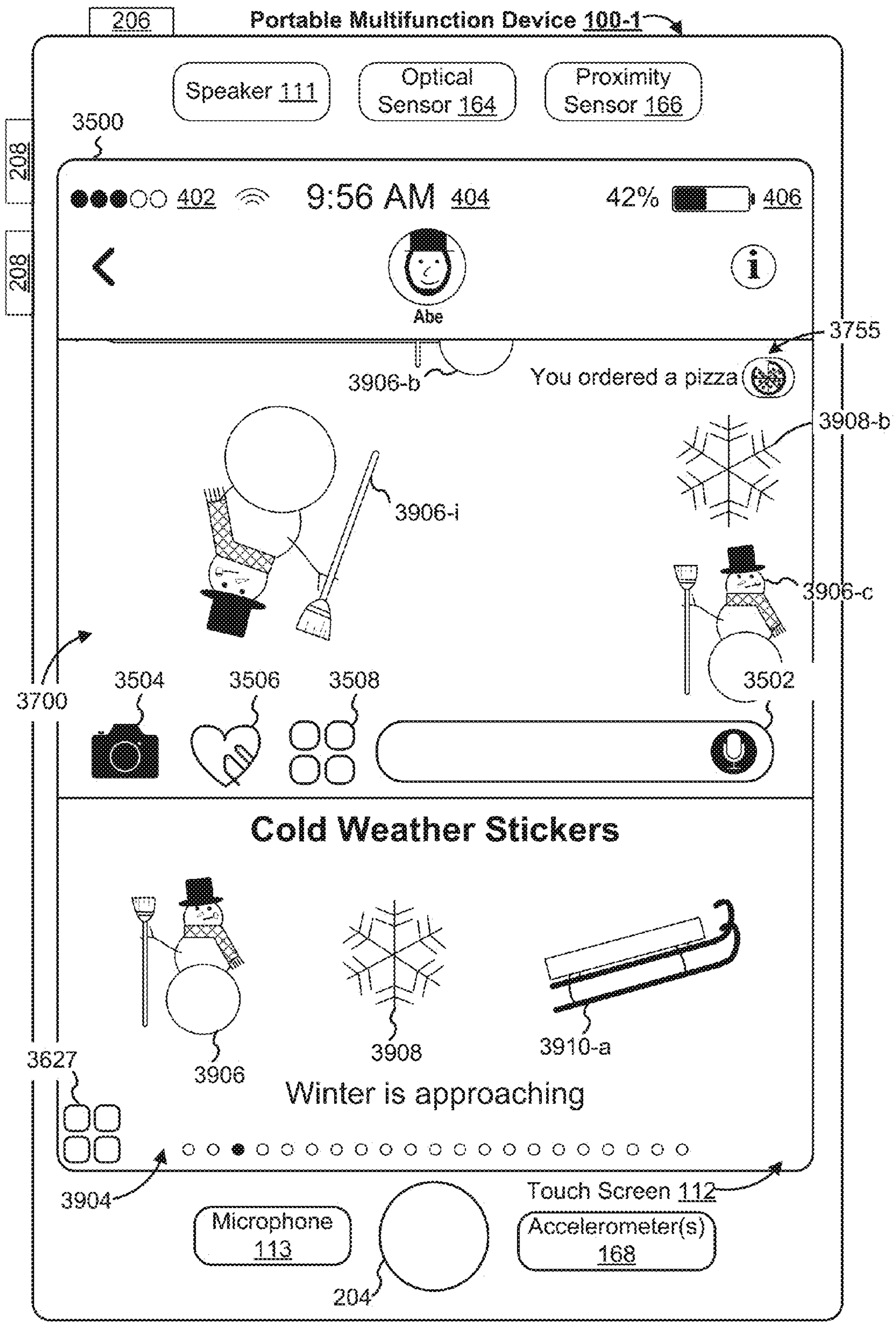
Figure 39A:
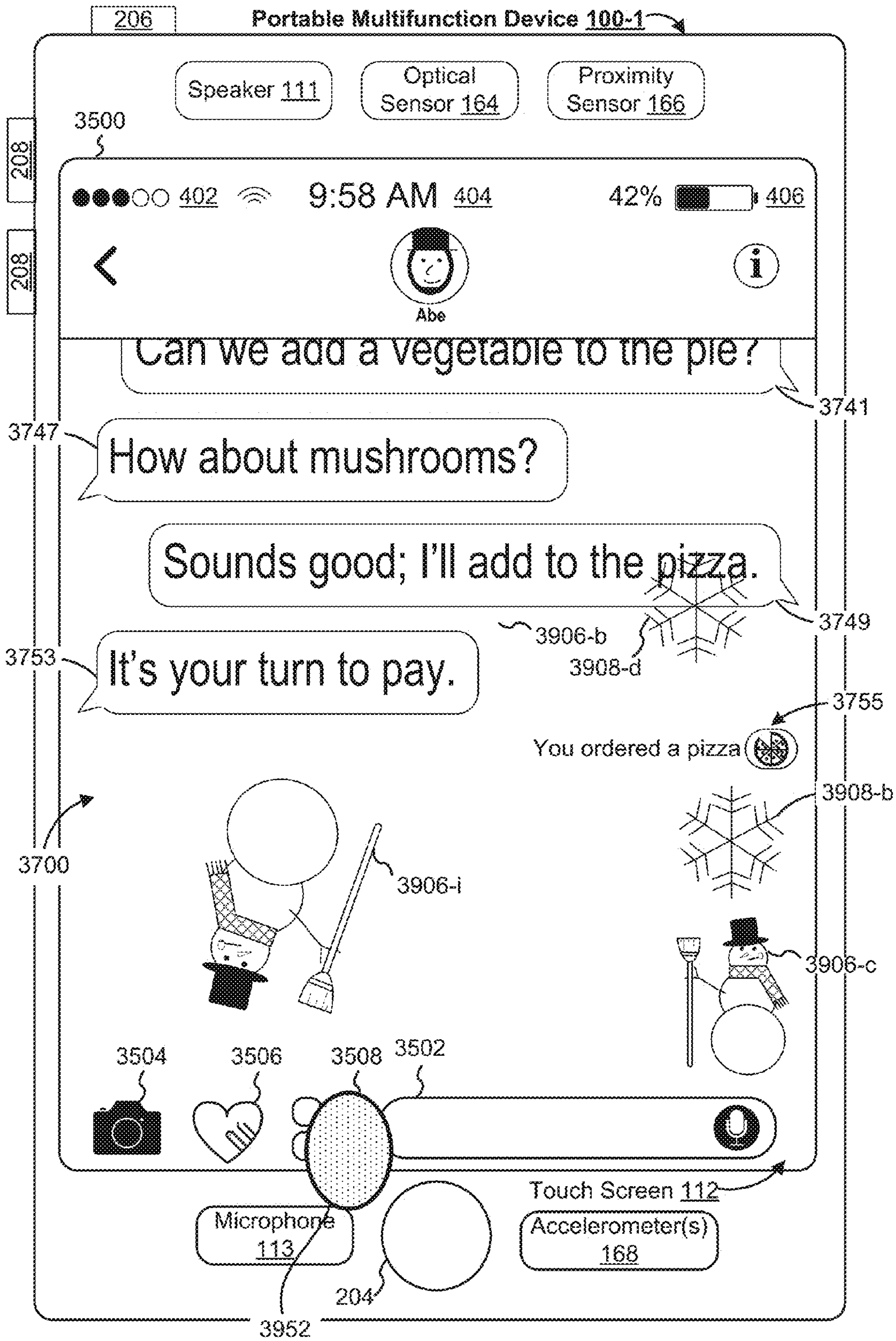
Figure 39A:
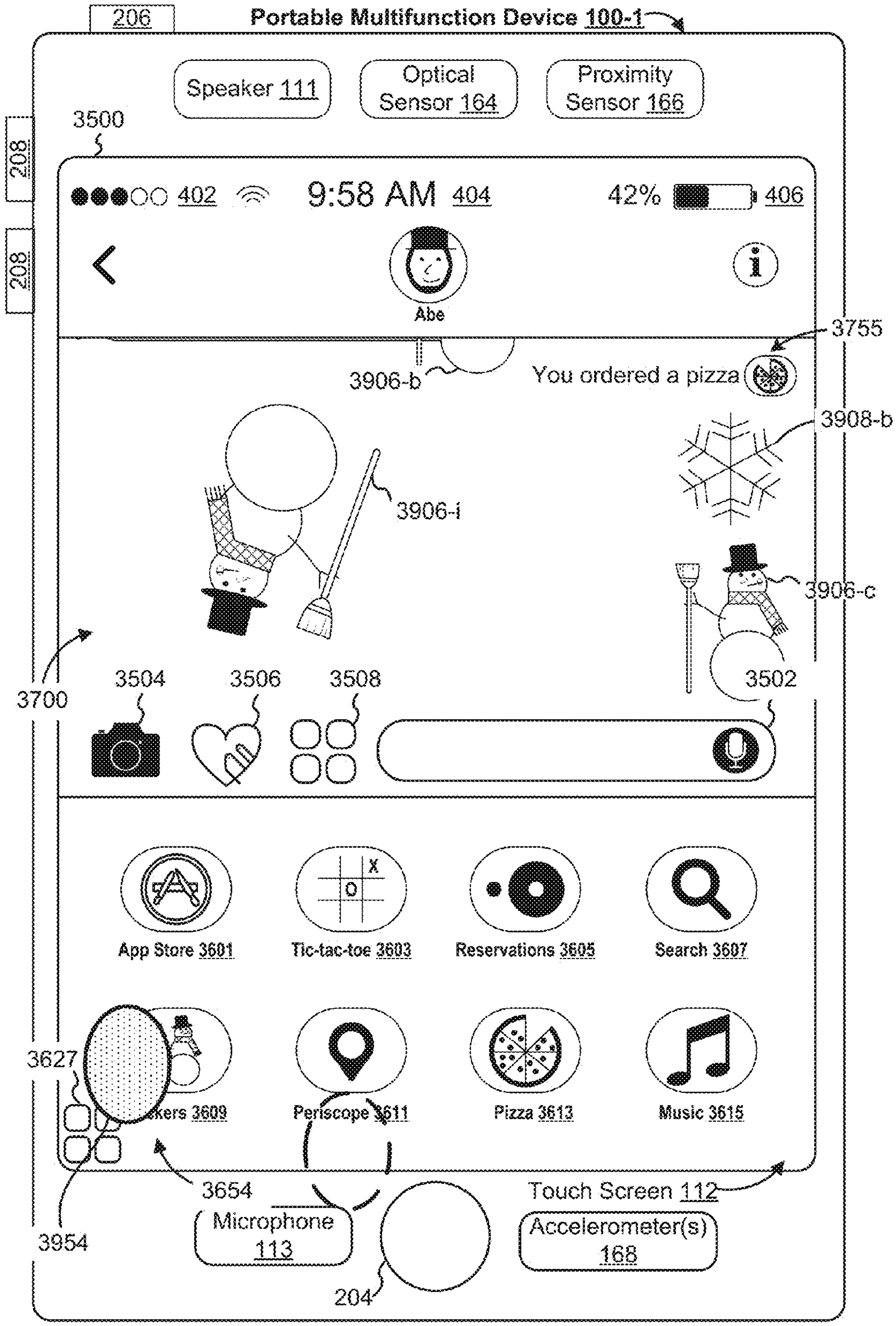
Figure 39A:
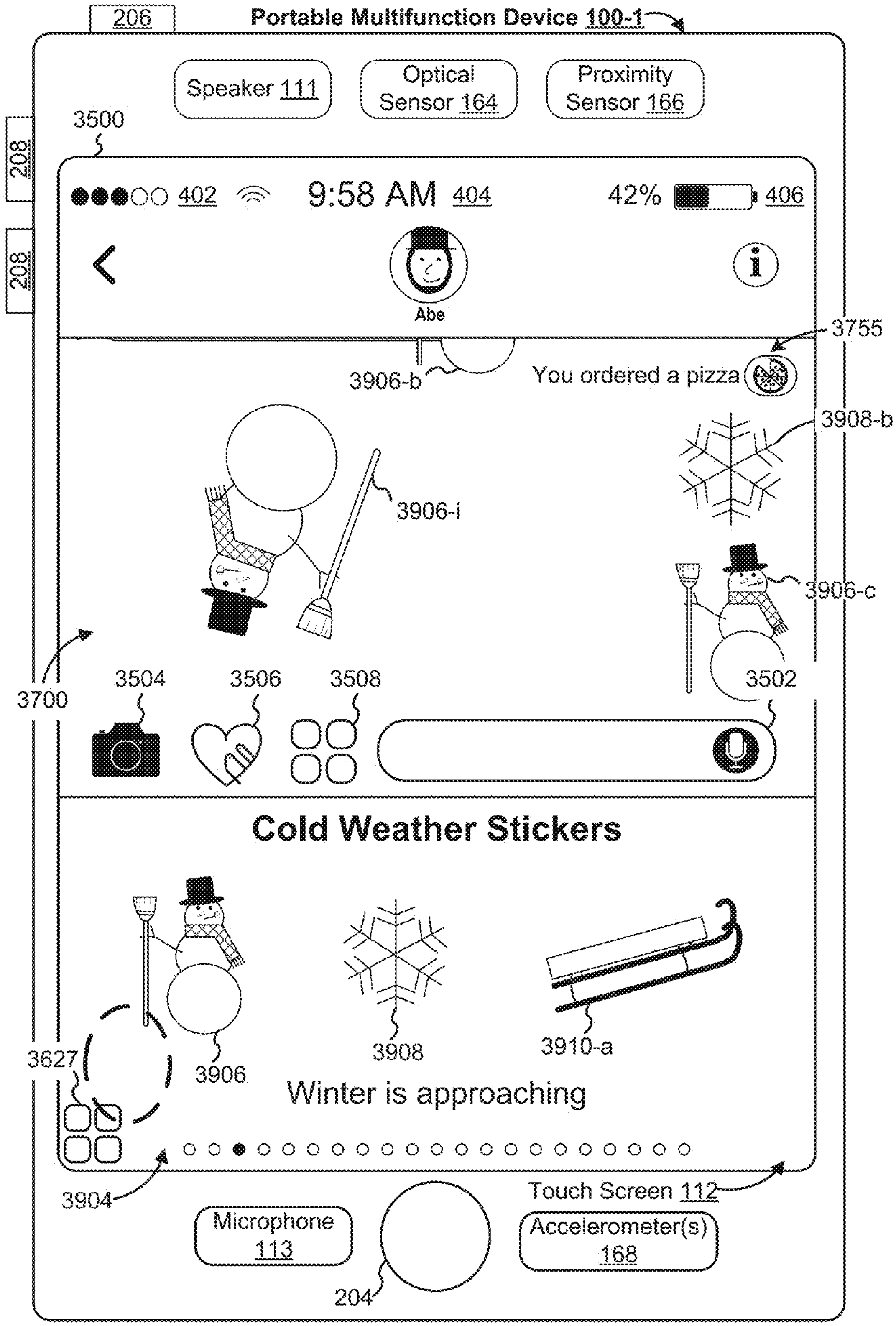

For example, device 100-1 detects an input including: movement 3948 of contact 3946, within conversation transcript 3700, from position 3946-*a*, in FIG. 39AN, to position 3946-*b*, in FIG. 39A0; an increase in a characteristic intensity of contact 3946 between FIG. 39A0 and FIG. 39AP; and rotation 3950 of contact 3946 from orientation (e.g., position) 3946-*b*, in FIG. 39AQ, to orientation (e.g., position) 3946-*c*, in FIG. 39R.

In some embodiments, the first and second user inputs are first and second parts of a single continuous input, e.g., a drag gesture followed by a pinch or rotation gesture made with the same contact.

In response to detecting the second user input, the device (6408) changes the position, size, and/or rotation of the first electronic sticker in the conversation transcript (e.g., while maintaining a constant display of the conversation transcript behind the first electronic sticker).

For example, device 100-1 moves electronic snowman sticker 3906 from position 3906-*f*, in FIG. 39AN, to position 3906-*g*, in FIG. 39A0. In another example, device 100-1 increases the size of electronic snowman sticker 3906, displayed in transcript 3700, between FIG. 39A0 and Figure AP. In another example, device 100-1 rotates electronic snowman sticker 3906 from orientation (e.g., position) 3906-*g*, in FIG. 39AQ, to orientation (e.g., position) 3906-*h*, in FIG. 39AR.

In some embodiments, the size of the first electronic sticker is reduced (6410) in response to detecting a pinch gesture that includes movement of a first contact towards a second contact, wherein the pinch gesture started while a focus selector was at a location in the messaging user interface that corresponds to the first electronic sticker (e.g., pinching while over the electronic sticker reduces the display size of the sticker without changing the display size of the conversation transcript).

In some embodiments, the size of the first electronic sticker is increased (6412) in response to detecting a depinch gesture that includes movement of a first contact away from a second contact, wherein the depinch gesture started while a focus selector was at a location in the messaging user interface that corresponds to the first electronic sticker (e.g., depinching while over the electronic sticker increases the display size of the sticker without changing the display size of the conversation transcript).

In some embodiments, the size of the first electronic sticker is increased (6414) in accordance with a (e.g., change in a) characteristic intensity of a contact made while a focus selector was at a location in the messaging user interface that corresponds to the first electronic sticker. For example, the size of electronic snowman sticker 3906 is increased between FIGS. 39AG-39AH, 39AH-39AI, and 39AO-39AP, respectively.

In some embodiments, the size of the first electronic sticker is decreased in accordance with a (e.g., change in a) characteristic intensity of a contact made while a focus selector was at a location in the messaging user interface that corresponds to the first electronic sticker. For example, the size of electronic snowman sticker 3906 is decreased between FIG. 39AI and FIG. 39AJ.

In some embodiments, the orientation of the first electronic sticker is changed (6416) in response to detecting a rotation gesture that started while a focus selector was at a location in the messaging user interface that corresponds to the first electronic sticker. For example, the orientation (e.g., position) of electronic snowman sticker 3906 is rotated from orientation 3906-*e*, in FIG. 39AK, to orientation 3906-*f*, in FIG. 39AL. In another example, the orientation (e.g., position) of electronic snowman sticker 3906 is rotated from orientation 3906-*g*, in FIG. 39AQ, to orientation 3906-*h*, in FIG. 39AR.

In some embodiments, the rotation gesture includes rotation of a single user contact. In some embodiments, the rotation gesture includes rotation of a first contact relative to a second contact.

In some embodiments, after detecting the first user input, the device transmits (6418) information that represents the first electronic sticker to one or more (e.g., second) electronic devices that correspond to the at least one other user included in the messaging session, wherein the one or more electronic devices display a corresponding representation of the first electronic sticker in a corresponding location (e.g., a corresponding location, size, and rotation) within a corresponding conversation transcript (e.g., corresponding to the messaging session).

In some embodiments, information that represents the first electronic sticker is sent in response to detecting the first user input (e.g., upon detection of lift-off of contact 3940 in FIG. 39AM), and subsequent movement, resizing, and/or rotation of the sticker causes the device to send subsequent information that represents the first electronic sticker (e.g., the position, including location, size, and/or orientation) (e.g., upon detection of lift-off of contact 3946 in FIG. 39AS).

In some embodiments, information that represents the first electronic sticker is not sent until the user has finally positioned, sized, and/or rotated the sticker within the conversation transcript (e.g., with the second user input). For example, information is sent upon detection of lift-off of contact 3946 in FIG. 39AS, but not upon detection of lift-off of contact 3940 in FIG. 39AM.

In some embodiments, once the user places, sizes, and/or rotates the electronic sticker, further modifications to the sticker in the transcript cannot be made (e.g., detection of a second input, including second contact 3946, in FIG. 39AN, would not cause device 100-1 to move, resize, or rotate electronic snowman sticker 3906 within conversation transcript 3700).

In some embodiments, once the user places, sizes, and/or rotates the electronic sticker, further modifications to the sticker in the transcript can only be made within a predetermined time period (e.g., initiation of further modifications) beginning at termination of the first input, placing the sticker in the conversation transcript. For example, detection of a second input, including second contact 3946, in FIG. 39AN, would only cause device 100-1 to move, resize, or rotate electronic snowman sticker 3906 within conversation transcript 3700 if the second input was first detected within the predefined time period.

In some embodiments, after transmitting the information that represents the first electronic sticker to the one or more electronic devices, the device (6420) detects a third user input while a focus selector is at a third location in the messaging user interface that corresponds to the first electronic sticker in the conversation transcript and, in response to detecting the third user input: changes the position of the first electronic sticker in the conversation transcript for a second time, and sends information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript (e.g., to match or mirror the changes made in the first user's conversation transcript).

In some embodiments, only the user who posted the sticker to the messaging session can change the position, size, or rotation of the sticker. In some embodiments, any user included in the messaging session can change the position, size, and/or rotation of the sticker. In some embodiments, no user can change the position, size and/or rotation of the sticker once it has been posted to the messaging session.

In some embodiments, after transmitting the information that represents the first electronic sticker to the one or more electronic devices, the device (6422) detects a third user input while a focus selector is at a third location in the messaging user interface that corresponds to the first electronic sticker in the conversation transcript and, in response to detecting the third user input: changes the rotation (e.g., orientation) of the first electronic sticker in the conversation transcript for a second time, and sends information to the one or more electronic devices that correspond to the at least one other user included in the messaging session that the rotation (e.g., orientation) of the first electronic sticker was changed in the conversation transcript, wherein the one or more electronic devices make corresponding changes to the rotation (e.g., orientation) of the first electronic sticker within the corresponding conversation transcript (e.g., to match or mirror the changes made in the first user's conversation transcript).

In some embodiments, only the user who posted the sticker to the messaging session can change the position, size, or rotation of the sticker. In some embodiments, any user included in the messaging session can change the position, size, and/or rotation of the sticker. In some embodiments, no user can change the position, size and/or rotation of the sticker once it has been posted to the messaging session.

In some embodiments, after transmitting the information that represents the first electronic sticker to the one or more electronic devices, the device (6424) detects a third user input while a focus selector is at a third location in the messaging user interface that corresponds to the first electronic sticker in the conversation transcript and, in response to detecting the third user input: changes the size of the first electronic sticker in the conversation transcript for a second time, and sends information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript (e.g., to match or mirror the changes made in the first user's conversation transcript).

In some embodiments, only the user who posted the sticker to the messaging session can change the position, size, or rotation of the sticker. In some embodiments, any user included in the messaging session can change the position, size, and/or rotation of the sticker. In some embodiments, no user can change the position, size and/or rotation of the sticker once it has been posted to the messaging session.

In some embodiments, after transmitting the information that represents the first electronic sticker to the one or more electronic devices, the device receives information from an electronic device that corresponds to another user included in the messaging session that the position, size, and/or orientation of a corresponding representation of the first electronic sticker was changed in a corresponding conversation transcript and, in response, changes the position, size, and/or orientation of the first electronic sticker in the conversation transcript. For example, device 100-1 receives information from device 100-2 at 9:56 AM and, in response, changes the position, size, and orientation of electronic snowman sticker 3906 from location 3906-*h*, in FIG. 39AS, to location 3906-*i*, in FIG. 39AT.

In some embodiments, in response to detecting the first user input, the device changes (6426) the position, of the first electronic sticker (e.g., the size, position, and orientation of the sticker can be changes while still displayed in the sticker pack and/or while being dragged into the conversation transcript). For example, movement of electronic snowman sticker 3906 from position 3906-*a*, in FIG. 39AG, through position 3906-*d*, in FIG. 39AH, to position 3906-*e*, in FIG. 39AI.

In some embodiments, in response to detecting the first user input, the device changes (6428) the size of the first electronic sticker (e.g., the size, position, and orientation of the sticker can be changes while still displayed in the sticker pack and/or while being dragged into the conversation transcript). For example, the size of electronic snowman sticker 3906 is increased between FIGS. 39AG-39AH and 39AH-39AI, respectively. In another example, the size of electronic snowman sticker 3906 is decreased between FIG. 39AI and FIG. 39AJ.

In some embodiments, in response to detecting the first user input, the device changes (6430) the rotation of the first electronic sticker (e.g., the size, position, and orientation of the sticker can be changes while still displayed in the sticker pack and/or while being dragged into the conversation transcript). For example, electronic snowman sticker 3906 is rotated from orientation (e.g., position) 3906-*e*, in FIG. 39AK, to orientation (e.g., position) 3906-*f*, in FIG. 39AL.

It should be understood that the particular order in which the operations in FIGS. 64A-64C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6600, 6800, and 7000) are also applicable in an analogous manner to method 6400 described above with respect to FIGS. 64A-64C. For example, the contacts, gestures, user interface objects, tactile outputs, intensity thresholds, focus selectors, and animations described above with reference to method 6400 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6600, 6800, and 7000). For brevity, these details are not repeated here.

Figure 65:
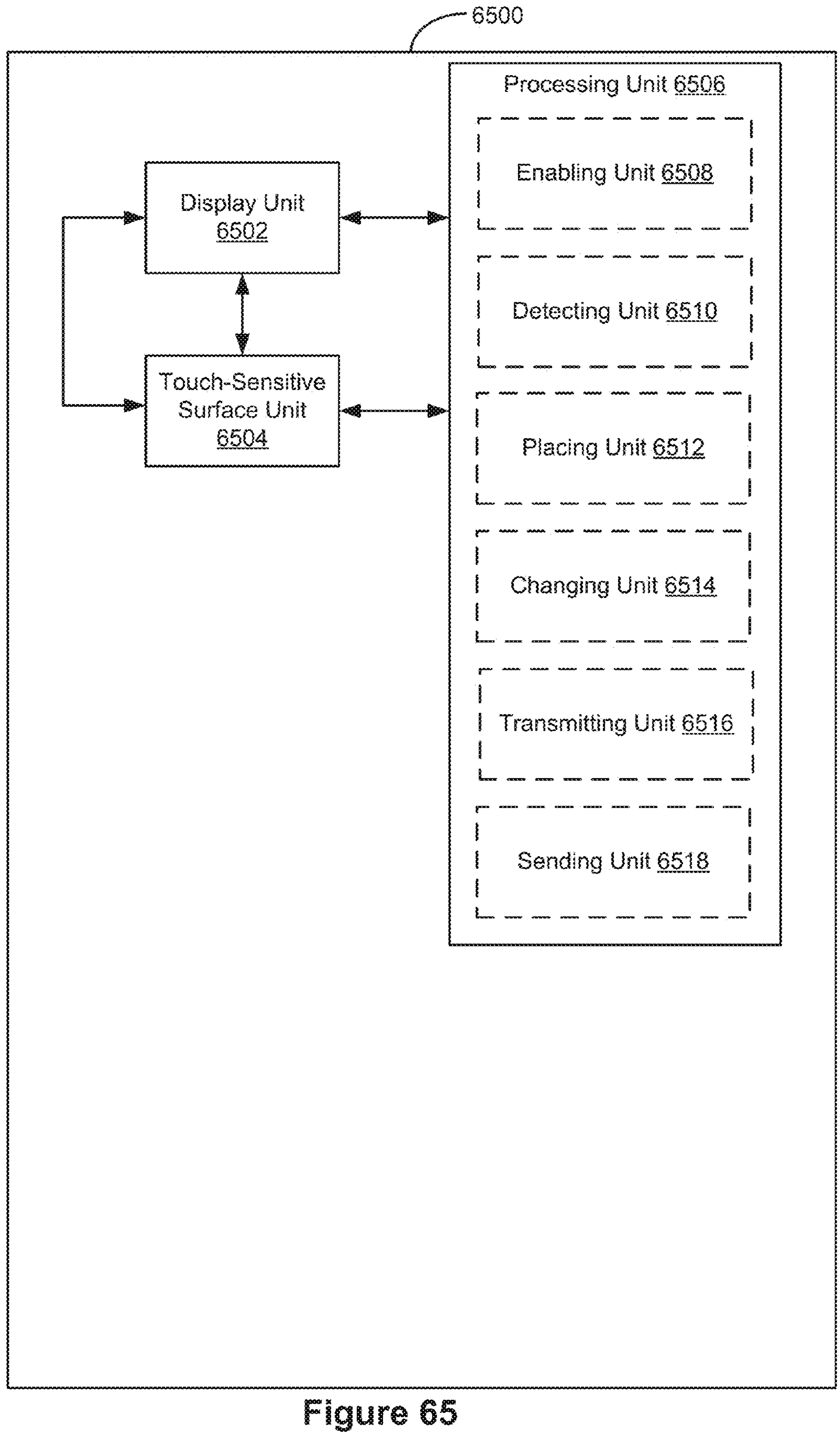
FIG. 65 is a functional block diagram of an electronic device in accordance with some embodiments.

In accordance with some embodiments, FIG. 65 shows a functional block diagram of an electronic device 6500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 65 are, optionally, combined or separated into sub-blocks to implement the principles of the various described embodiments. Therefore, the description herein optionally supports any possible combination or separation or further definition of the functional blocks described herein.

As shown in FIG. 65, an electronic device 6500 includes a display unit 6502 configured to display user interfaces; a touch-sensitive surface unit 6504 configured to detect contacts; and a processing unit 6506 coupled with the display unit 6502 and the touch-sensitive surface unit 6504. The processing unit 6506 including an enabling unit 6508, a detecting unit 6510, a placing unit 6512, a changing unit 6514, a transmitting unit 6516, and a sending unit 6518.

The processing unit 6506 is configured to: enable display of (e.g., with enabling unit 6508) a messaging user interface of a messaging application on the display unit 6502, the messaging user interface including a conversation transcript of a messaging session between a user of the electronic device and at least one other user, a plurality of electronic stickers, and a message-input area. While displaying the messaging user interface, the processing unit 6506 is configured to detect (e.g., with detecting unit 6510) a first user input while a focus selector is at a first location in the messaging user interface that corresponds to a first electronic sticker in the plurality of electronic stickers. In response to detecting the first user input, the processing unit 6506 is configured to place (e.g., with placing unit 6512) and enable display of (e.g., with enabling unit 6508) the first electronic sticker in the conversation transcript. While the first electronic sticker is displayed in the conversation transcript: the processing unit 6506 is configured to detect (e.g., with detecting unit 6510) a second user input while a focus selector is at a second location in the messaging user interface that corresponds to the first electronic sticker in the conversation transcript. In response to detecting the second user input, the processing unit 6506 is configured to change (e.g., with changing unit 6514) the position, size, and/or rotation of the first electronic sticker in the conversation transcript.

In some embodiments, the processing unit 6506 is further configured to: after detecting the first user input: transmit (e.g., with transmitting unit 6516) information that represents the first electronic sticker to one or more electronic devices that correspond to the at least one other user included in the messaging session, wherein the one or more electronic devices display a corresponding representation of the first electronic sticker in a corresponding location within a corresponding conversation transcript.

In some embodiments, the processing unit 6506 is further configured to: after transmitting the information that represents the first electronic sticker to the one or more electronic devices: detect (e.g., with detecting unit 6510) a third user input while a focus selector is at a third location in the messaging user interface that corresponds to the first electronic sticker in the conversation transcript. In response to detecting the third user input, the processing unit 6506 is configured to: change (e.g., with changing unit 6514) the position of the first electronic sticker in the conversation transcript for a second time; and send (e.g., with sending unit 6518) information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript.

In some embodiments, the processing unit 6506 is further configured to: after transmitting the information that represents the first electronic sticker to the one or more electronic devices: detect (e.g., with detecting unit 6510) a third user input while a focus selector is at a third location in the messaging user interface that corresponds to the first electronic sticker in the conversation transcript; and, in response to detecting the third user input: change (e.g., with changing unit 6514) the rotation of the first electronic sticker in the conversation transcript for a second time; and send (e.g., with sending unit 6518) information to the one or more electronic devices that correspond to the at least one other user included in the messaging session that the rotation of the first electronic sticker was changed in the conversation transcript, wherein the one or more electronic devices make corresponding changes to the rotation of the first electronic sticker within the corresponding conversation transcript.

In some embodiments, the processing unit 6506 is further configured to: after transmitting information that represents the first electronic sticker to the one or more electronic devices: detect (e.g., with detecting unit 6510) a third user input while a focus selector is at a third location in the messaging user interface that corresponds to the first electronic sticker in the conversation transcript; and, in response to detecting the third user input: change (e.g., with changing unit 6514) the size of the first electronic sticker in the conversation transcript for a second time; and send (e.g., with sending unit 6518) information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript.

In some embodiments, the processing unit 6506 is further configured to: in response to detecting the first user input, change (e.g., with changing unit 6514) the position, of the first electronic sticker.

In some embodiments, the processing unit 6506 is further configured to: in response to detecting the first user input, change (e.g., with changing unit 6514) the size of the first electronic sticker.

In some embodiments, the processing unit 6506 is further configured to: in response to detecting the first user input, change (e.g., with changing unit 6514) the rotation of the first electronic sticker.

In some embodiments, the size of the first electronic sticker is reduced in response to detecting a pinch gesture that includes movement of a first contact towards a second contact, wherein the pinch gesture started while a focus selector was at a location in the messaging user interface that corresponds to the first electronic sticker.

In some embodiments, the size of the first electronic sticker is increased in response to detecting a depinch gesture that includes movement of a first contact away from a second contact, wherein the depinch gesture started while a focus selector was at a location in the messaging user interface that corresponds to the first electronic sticker.

In some embodiments, the size of the first electronic sticker is increased in accordance with a characteristic intensity of a contact made while a focus selector was at a location in the messaging user interface that corresponds to the first electronic sticker.

In some embodiments, the orientation of the first electronic sticker is changed in response to detecting a rotation gesture that started while a focus selector was at a location in the messaging user interface that corresponds to the first electronic sticker.

The operations described above with reference to FIGS. 64A-64C are, optionally, implemented by components depicted in FIGS. 1A-1B or FIG. 65. For example, detection operations 6404 and 6408 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Making Payments

FIG. 66 is a flow diagram illustrating a method 6600 of making payments from a messaging application in accordance with some embodiments. The method 6600 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6600 are, optionally, combined and/or the order of some operations is, optionally, changed.

As described below, the method 6600 provides an intuitive way to make payments from a messaging application. The method reduces the number, extent, and/or nature of the inputs from a user when making payments from a messaging application, thereby creating a more efficient human-machine interface. For battery-operated electronic devices, enabling a user to make payments from a messaging application faster and more efficiently conserves power and increases the time between battery charges.

The device displays (6602) a messaging user interface of a messaging application on the display, the messaging user interface including a conversation transcript (e.g., displayed in a first area of the display) of a messaging session between a user of the electronic device and at least one other user (e.g., of another electronic device) and a message-input area, wherein each of the other users included in the messaging session has a corresponding avatar (e.g., displayed in a second area of the display). For example, messaging user interface 3500, in FIG. 40F, includes conversation transcript 3503, message-input area 3502. Conversation transcript 3503 includes messages from participants of a corresponding messaging session, including the user of portable multifunction device 100-1 and other users included in the messaging session. Each of the other users included in the messaging transcript are represented by an avatar (e.g., avatar 4008 for "Mary Todd") displayed in stack of avatars 4002, in FIG. 40F.

While displaying the messaging user interface, the device detects (6604) a first user input (e.g., a tap, light press, or deep press gesture by a contact on a touch-sensitive surface) while a focus selector is at a first location in the messaging user interface that corresponds to an avatar of a first other user included in the messaging session, (e.g., detect a gesture by a contact on a touch-sensitive display at the location of the avatar of the first other user, or detect a gesture by a contact on a touch-sensitive surface while a cursor or other pointer is at the location of the avatar of the first other user). For example, device 100-1 detects an input including contact 4010, on Mary Todd's avatar 4010, in FIG. 40G.

In response to detecting the first user input, the device displays (6006) a menu that contains activatable menu items associated with the first other user overlaid on the messaging user interface, the displayed menu including an activatable menu item for initiating a payment action with the first other user (e.g., a menu item for paying, or requesting payment from, the first other user). For example, in response to detecting an input including an increase in a characteristic intensity of contact 4010, meeting a predefined intensity threshold, the device displays action menu 3882 that includes activatable action 3884-6 for making a payment to another user (e.g., Mary Todd) included in the messaging session, in FIG. 40H.

While displaying the menu that contains activatable menu items associated with the first other user (e.g., action menu 3882 in FIG. 40J), the device detects (6008) a second user input (e.g., by a contact on a touch-sensitive surface, such as an input including contact 4012, in FIG. 40J) while a focus selector is at a second location in the messaging user interface that corresponds to the activatable menu item for initiating a payment action with the first other user (e.g., activatable menu action 3884-6 for a payment, in FIG. 40J). For example, the device detects a gesture by a contact on a touch-sensitive display at the location of the activatable menu item for initiating a payment action with the first other user, or detects a gesture by a contact on a touch-sensitive surface while a cursor or other pointer is at the location of the activatable menu item for initiating a payment action with the first other user.

In response to detecting the second user input, the device displays (6610) a user interface configured to initiate sending of a payment to, and/or requesting a payment from, the first other user. For example, in response to detecting an input including contact 4012 on activatable payment action 3884-6, in FIG. 40J, device 100-1 displays payment user interface 4014, in FIG. 40K.

It should be understood that the particular order in which the operations in FIG. 66 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6800, and 7000) are also applicable in an analogous manner to method 6600 described above with respect to FIG. 66. For example, the contacts, gestures, user interface objects, tactile outputs, intensity thresholds, focus selectors, and animations described above with reference to method 6600 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6800, and 7000). For brevity, these details are not repeated here.

Figure 67:
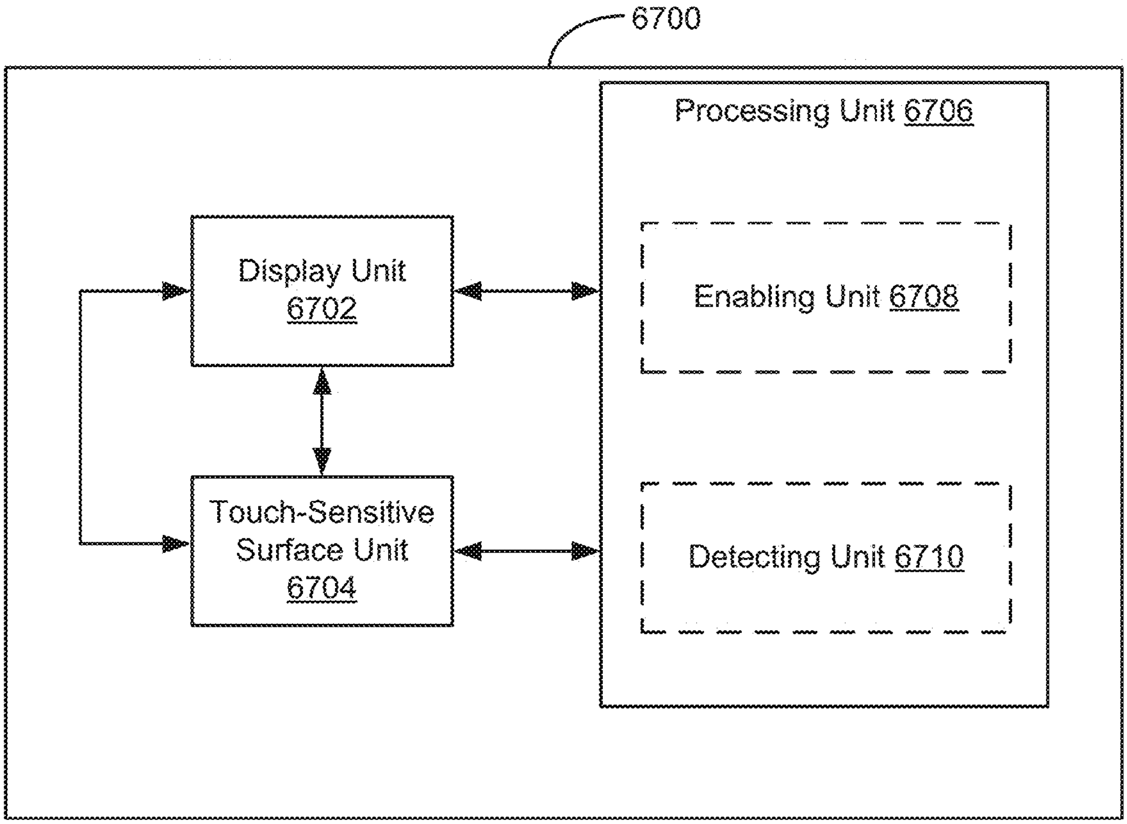
FIG. 67 is a functional block diagram of an electronic device in accordance with some embodiments.

In accordance with some embodiments, FIG. 67 shows a functional block diagram of an electronic device 6700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 67 are, optionally, combined or separated into sub-blocks to implement the principles of the various described embodiments. Therefore, the description herein optionally supports any possible combination or separation or further definition of the functional blocks described herein.

As shown in FIG. 67, an electronic device 6700 includes a display unit 6702 configured to display user interfaces; a touch-sensitive surface unit 6704 configured to detect contacts; and a processing unit 6706 coupled with the display unit 6702 and the touch-sensitive surface unit 6704. The processing unit 6706 includes an enabling unit 6708 and a detecting unit 6710.

The processing unit 6706 is configured to enable display of (e.g., with enabling unit 6708) a messaging user interface of a messaging application on the display unit 6702, the messaging user interface including a conversation transcript of a messaging session between a user of the electronic device and at least one other user and a message-input area, wherein each of the other users included in the messaging session has a corresponding avatar. While displaying the messaging user interface, the processing unit 6706 is configured to detect (e.g., with detecting unit 6710) a first user input while a focus selector is at a first location in the messaging user interface that corresponds to an avatar of a first other user included in the messaging session. In response to detecting the first user input, enable display of (e.g., with enabling unit 6708) a menu that contains activatable menu items associated with the first other user overlaid on the messaging user interface, the displayed menu including an activatable menu item for initiating a payment action with the first other user. While displaying the menu that contains activatable menu items associated with the first other user, detect (e.g., with detecting unit 6710) a second user input while a focus selector is at a second location in the messaging user interface that corresponds to the activatable menu item for initiating a payment action with the first other user. In response to detecting the second user input, enable display of (e.g., with enabling unit 6708)

a user interface configured to initiate sending of a payment to, and/or requesting a payment from, the first other user.

The operations described above with reference to FIG. 66 are, optionally, implemented by components depicted in FIGS. 1A-1B or FIG. 67. For example, detection operations 6604 and 6608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Interacting with Avatars in a Group Messaging Session

FIGS. 68A-68B are flow diagrams illustrating a method 6800 of interacting with a single user included in a group messaging session in accordance with some embodiments. The method 6800 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 6800 are, optionally, combined and/or the order of some operations is, optionally, changed.

As described below, the method 6800 provides an intuitive way to interact with a single user included in a group messaging session. The method reduces the number, extent, and/or nature of the inputs from a user when interacting with a single user included in a group messaging session, thereby creating a more efficient human-machine interface. For battery-operated electronic devices, enabling a user to interact with a single user included in a group messaging session faster and more efficiently conserves power and increases the time between battery charges.

The device displays (6802) a messaging user interface of a messaging application on the display, the messaging user interface including a conversation transcript (e.g., displayed in a first area of the display) of a messaging session between a user of the electronic device and a plurality of other users (e.g., of respective other electronic devices), a message-input area, and a plurality of avatars, each respective avatar in the plurality of avatars corresponding to a respective other user in the plurality of other users included in the messaging session, wherein the plurality of avatars are displayed as a stack of (e.g., overlapping) avatars, with a first avatar in the plurality of avatars displayed on the top of the stack of avatars. For example, messaging user interface 3500, in FIG. 40S, includes conversation transcript 3503 and message-input area 3502. Conversation transcript 3503 includes messages from participants of a corresponding messaging session, including the user of portable multifunction device 100-1 and other users included in the messaging session. Each of the other users included in the messaging transcript are represented by an avatar (e.g., avatar 3510 for "Abe") displayed on top of stack of avatars 4002, in FIG. 40S.

While displaying the messaging user interface, the device detects an input by a first contact on the touch-sensitive surface while a focus selector is at a first location in the messaging user interface that corresponds to the first avatar (e.g., detect a gesture by a contact on a touch-sensitive display at the location of the first avatar, or detect a gesture by a contact on a touch-sensitive surface while a cursor or other pointer is at the location of the first avatar). For example, device 100-1 detects an input including contact 4030 on Abe's avatar (e.g., displayed on top of stack of avatars 4002), in FIG. 40S. In another example, device 100-1 detects an input including contact 4038 on Mary Todd's avatar 4008, in FIG. 40U.

in response to detecting the input by the first contact, in accordance with a determination that the input meets menu-activation-criteria, wherein the menu-activation-criteria require that a characteristic intensity of the contact on the touch-sensitive surface meet a respective intensity threshold in order for the menu-activation criteria to be met, the device displays (6806) a menu that contains activatable menu items associated with the first avatar overlaid on the messaging user interface. For example, in response to detecting an increase in a characteristic intensity of contact 4038 on Mary Todd's avatar 4008, meeting a predetermined intensity threshold (e.g., $IT_L$ or $IT_D$), between FIGS. 40U and 40V, device 100-1 displays action menu 3882, including actions 3884 for directly interacting with Mary Todd (e.g., interacting only with Mary Todd), in FIG. 40V.

in response to detecting the input by the first contact, in accordance with a determination that the input meets avatar-spreading-criteria, wherein the avatar-spreading-criteria do not require that a characteristic intensity of the contact on the touchscreen meet the respective intensity threshold in order for the selection criteria to be met, the device displays (6906) the plurality of avatars in an array (e.g., a substantially or completely non-overlapping array). For example, in response to detecting an input including contact 4030 on Abe's avatar 3510, in FIG. 40S, where a characteristic intensity of contact 4030 does not meet a predetermined intensity threshold (e.g., $IT_L$ or $IT_D$), device 100-1 displays an array of avatars in avatar stack 4002—e.g., Abe's avatar 3510, Mary Todd's avatar 4008, Chuck's avatar 4032, Issac's avatar 4034, and Edwin—s avatar 4036—in FIG. 40T.

In some embodiments, in accordance with a determination that a characteristic (e.g., a maximum) intensity of the first contact met a predefined intensity threshold (e.g., was between a first intensity threshold and a second intensity threshold), the device replaces display of the first avatar on top of the stack of avatars with display of a second avatar in the plurality of avatars on top of the stack of avatars. For example, in response to detecting an increase in a characteristic intensity of contact 4006 on Abe's avatar 3510, meeting a predetermined intensity threshold (e.g., $IT_L$ or $IT_D$), between FIGS. 40D and 40E, device 100-1 cycles (e.g., switches or shuffles) stack of avatars 4002 to display Mary Todd's avatar 4008 on top of stack of avatars 4002 in FIGS. 40E-40F (e.g., Mary Todd's avatar 4008 replaces Abe's avatar 3510 on top of stack of avatars 4002).

In some embodiments, in accordance with a determination that a characteristic (e.g., a maximum) intensity of the first contact did not meet a predetermined intensity threshold (e.g., was between the second intensity threshold and a third intensity threshold), the device displays a menu that contains activatable menu items associated with the first avatar overlaid on the messaging user interface. For example, in response to detecting an input including contact 4004 on Abe's avatar 3510, in FIG. 40B, where a characteristic intensity of contact 4004 does not meet a predetermined intensity threshold (e.g., $IT_L$ or $IT_D$), device 100-1 displays action menu 3882, including actions 3884 for directly interacting with Abe (e.g., interacting only with Abe), in FIG. 40C.

In some embodiments, the second intensity threshold is above the first intensity threshold and the third intensity threshold is above the second intensity threshold (e.g., tap to cycle through the avatars and light press or deep press to call up a quick action menu for the avatar at the top of the stack).

In some embodiments, the second intensity threshold is below the first intensity threshold and the third intensity threshold is below the second intensity threshold (e.g., deep press or light press to cycle through the avatars and tap to call up the quick action menu for the avatar at the top of the stack).

In some embodiments, the avatar-spreading-criteria are met (6810) upon detection of a tap gesture on the touch-sensitive surface. For example, avatars 3510, 4008, 4032, 4034, and 4036, in avatar stack 4002, displayed in FIG. 40S, are displayed as a spread array (e.g., a substantially or completely non-overlapping array), in FIG. 40T, in response to detecting a tap gesture including contact 4030 on Abe's avatar 3510, in FIG. 40S.

In some embodiments, the menu that contains activatable menu items associated with the first avatar (e.g., action menu 3882 in FIG. 40V) includes (6812) a menu item that when activated initiates a canvas for sharing digital drawings with the other user (e.g., digital touch action 3884-5 in FIG. 40V).

In some embodiments, the menu that contains activatable menu items associated with the first avatar (e.g., action menu 3882 in FIG. 40V) includes (6814) a menu item that when activated initiates messaging with only the first other user (e.g., message action 3884-3 in FIG. 40V).

For example, in some embodiments, selecting a messaging menu item (e.g., activatable action 3884-3) causes the electronic device to display a private messaging user interface between the user of the electronic device and the first other user. For example, in response to detecting an input including contact 3886 on activatable message action 3884-3, in FIG. 38AY, while messaging user interface 3500 is displaying conversation transcript 3503 corresponding to a messaging session between the user of device 100-1 (e.g., "Andrew") and a plurality of other users, each represented by an avatar in the stack of avatars 4002, in FIG. 38AY, device 100-1 replaces display of conversation transcript 3503, in FIG. 38AY, with conversation transcript 3700, corresponding to a messaging session between only Abe and Andrew, in FIG. 38AZ.

In some embodiments, the menu that contains activatable menu items associated with the first avatar (e.g., action menu 3882 in FIG. 40V) includes (6816) a menu item that when activated initiates an email with the first other user (e.g., mail action 3884-4 in FIG. 40V).

In some embodiments, the menu that contains activatable menu items associated with the first avatar (e.g., action menu 3882 in FIG. 40V) includes (6818) a menu item that when activated initiates a call with the first other user (e.g., call action 3884-1 in FIG. 40V).

In some embodiments, the menu that contains activatable menu items associated with the first avatar (e.g., action menu 3882 in FIG. 40V) includes (6820) a menu item that when activated initiates a video conference with the first other user (e.g., video call action 3884-2 in FIG. 40V).

In some embodiments, the menu that contains activatable menu items associated with the first avatar (e.g., action menu 3882 in FIG. 40V) includes (6822) a menu item that when activated initiates a payment action with the first other user (e.g., payment action 3884-6 in FIG. 40V).

It should be understood that the particular order in which the operations in FIGS. 68A-68B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6600, and 7000) are also applicable in an analogous manner to method 6800 described above with respect to FIGS. 68A-68B. For example, the contacts, gestures, user interface objects, tactile outputs, intensity thresholds, focus selectors, and animations described above with reference to method 6800 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6600, and 7000). For brevity, these details are not repeated here.

Figure 69:
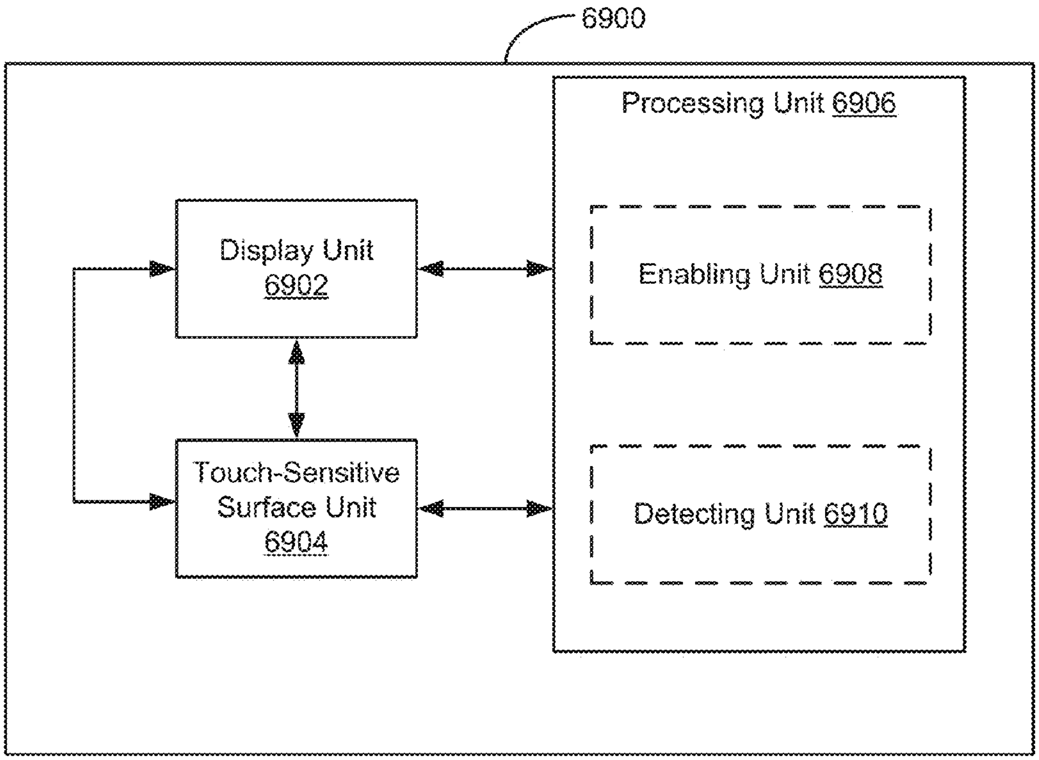
FIG. 69 is a functional block diagram of an electronic device in accordance with some embodiments.

In accordance with some embodiments, FIG. 69 shows a functional block diagram of an electronic device 6900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 69 are, optionally, combined or separated into sub-blocks to implement the principles of the various described embodiments. Therefore, the description herein optionally supports any possible combination or separation or further definition of the functional blocks described herein.

As shown in FIG. 69, an electronic device 6900 includes a display unit 6902 configured to display user interfaces; a touch-sensitive surface unit 6904 configured to detect contacts; and a processing unit 6906 coupled with the display unit 6902 and the touch-sensitive surface unit 6904. The processing unit 6906 including: an enabling unit 6908 and detecting unit 6910.

The processing unit 6906 is configured to: enable display of (e.g., with enabling unit 6908) a messaging user interface of a messaging application on the display unit 6902, the messaging user interface including a conversation transcript of a messaging session between a user of the electronic device and a plurality of other users, a message-input area, and a plurality of avatars, each respective avatar in the plurality of avatars corresponding to a respective other user in the plurality of other users included in the messaging session, wherein the plurality of avatars are displayed as a stack of avatars, with a first avatar in the plurality of avatars displayed on the top of the stack of avatars. While displaying the messaging user interface, the processing unit 6906 is configured to detect (e.g., with detecting unit 6910) an input by a first contact on the touch-sensitive surface unit 6904 while a focus selector is at a first location in the messaging user interface that corresponds to the first avatar. In response to detecting the input by the first contact: in accordance with a determination that the input meets menu-activation-criteria, wherein the menu-activation-criteria require that a characteristic intensity of the contact on the touch-sensitive surface unit 6904 meet a respective intensity threshold in order for the menu-activation criteria to be met, the processing unit 6906 is configured to enable display of (e.g., with enabling unit 6908) a menu that contains activatable menu items associated with the first avatar overlaid on the messaging user interface. In accordance with a determination that the input meets avatar-spreading-criteria, wherein the avatar-spreading-criteria do not require that a characteristic intensity of the contact on the touchscreen meet the respective intensity threshold in order for the selection criteria to be met, the processing unit 6906 is configured to enable display of (e.g., with enabling unit 6908) the plurality of avatars in an array.

In some embodiments, the avatar-spreading-criteria are met upon detection of a tap gesture on the touch-sensitive surface unit.

In some embodiments, the menu that contains activatable menu items associated with the first avatar includes a menu item that when activated initiates a canvas for sharing digital drawings with the other user.

In some embodiments, the menu that contains activatable menu items associated with the first avatar includes a menu item that when activated initiates messaging with only the first other user, In some embodiments, the menu that contains activatable menu items associated with the first avatar includes a menu item that when activated initiates an email with the first other user, In some embodiments, the menu that contains activatable menu items associated with the first avatar includes a menu item that when activated initiates a call with the first other user, In some embodiments, the menu that contains activatable menu items associated with the first avatar includes a menu item that when activated initiates a video conference with the first other user, and/or In some embodiments, the menu that contains activatable menu items associated with the first avatar includes a menu item that when activated initiates a payment action with the first other user.

The operations described above with reference to FIGS. 68A-68B are, optionally, implemented by components depicted in FIGS. 1A-1B or FIG. 69. For example, detection operation 6804 and display operation 6806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Making Suggestions in a Messaging Session

FIGS. 70A-70B are flow diagrams illustrating a method 7000 of displaying additional information in a messaging session in accordance with some embodiments. The method 7000 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 7000 are, optionally, combined and/or the order of some operations is, optionally, changed.

As described below, the method 7000 provides an intuitive way to display additional information in a messaging session. The method reduces the number, extent, and/or nature of the inputs from a user when displaying additional information in a messaging session, thereby creating a more efficient human-machine interface. For battery-operated electronic devices, enabling a user to display additional information in a messaging session faster and more efficiently conserves power and increases the time between battery charges.

The device displays (7002) a messaging user interface of a messaging application on the display, the messaging user interface including a conversation transcript (e.g., displayed in a first area of the display) of a messaging session between a user of the electronic device and at least one other user (e.g., of another electronic device), and a message-input area. For example, messaging user interface 3500, in FIGS. 41A and 41C, include conversation transcript 3503 and message-input area 3502.

While displaying the messaging user interface, the device receives (7004) a first message within the messaging session from an (e.g., second) electronic device that corresponds to another user included in the messaging session. For example device 100-1 receives message 4102 from Mary Todd, in FIG. 41A.

In response to receiving the first message, the device (7006): displays the first message within a first message region (e.g., bubble) in the conversation transcript on the display (e.g., message 4102 is displayed within a message region in transcript 3503 in FIG. 41A), In response to receiving the first message, the device (7006): detects, in the first message, a word or phrase associated with additional content available on the Internet (e.g., information about a detected business/restaurant, music, movie, television show, current event, public figure, politician, celebrity, university, athlete, sporting event, or sports league/team). For example, device 100-1 recognizes the phrase "Meteorite Catcher" 4101 as the title of a movie, in FIG. 41A. In some embodiments, the device uses a data detector stored in the memory of the device and/or stored remotely. In some embodiments, the device compares words/phrases in received messages to a predefined list of words and/or phrases stored within the memory or the device and/or stored remotely.

In response to detecting the word or phrase associated with additional content available on the internet, the device (7006): displays proximate to the first message region (e.g., bubble; for example, directly above or below the message), a selectable indication that additional content associated with the word or phrase is available (e.g., selectable text relating to the additional content, such as "see local show times," "make a reservation now"). For example, in response to recognizing the phrase "Meteorite Catcher" 4101 as the title of a movie, device 100-1 displays selectable indication 4104 ("See movie info") below message 4102, in FIG. 41A.

In some embodiments, the word or phrase associated with additional content available is associated (7008) with a movie (e.g., a movie title, a distinctive or context-identifiable character name from the movie, or a famous line from a movie, such as, "show me the money"), and the additional content includes biographical data about the movie (e.g., the name of an actor/actress, the length of the move, the year the movie was released, or the studio that produced and/or distributed the movie), information on local performances of the movie (e.g., show times, theatre information, or a link to purchase tickets), ratings information for the movie (e.g., critic or user-contributed ratings, individual or compiled), and/or multi-media content about the movie (e.g., movie clips, streaming performances, or audio clips).

In some embodiments, the word or phrase associated with additional content available is associated (7010) with a television show (e.g., a show title, a distinctive or context-identifiable character name from the show, or an identifiable catch phrase, such as, "don't have a cow, man"), and the additional content includes biographical data about the show (e.g., the name of an actor/actress, the length of the series, information on the network, channel, and/or time the show is broadcasted; or the network that produced the show), ratings information about the show (e.g., critic or user-contributed ratings, individual or compiled), and/or multi-media content about the show (e.g., show clips, streaming performances, or audio clips).

In some embodiments, the word or phrase associated with additional content available is associated (7012) with a song or album (e.g., a song or album title, an artist name, or an identifiable line from the song or album, such as, "bye, bye, Miss American Pie"), and the additional content includes biographical data about the song or album (e.g., the name of an artist, composer, or producer of the song or album, the length of the song or album, songs on the album, the year the song or album was released, or the studio that produced and/or distributed the song or album), ratings information about the song or album (e.g., critic or user-contributed ratings, individual or compiled), and/or multi-media content about the song or album (e.g., audio clips or streaming performances).

In some embodiments, the word or phrase associated with additional content available is associated (7014) with a business (e.g., a particular type of business, such as restaurant, store, salon, or golf course, a business name, a distinctive or context-identifiable employee/owner name, or an identifiable slogan, such as, "pizza, pizza"), and the additional content includes biographical data about the business (e.g., an address, local street map, phone number, email address, or business hours), ratings information about the business (e.g., critic or user-contributed ratings (individual or compiled), and/or interactive content about the business (e.g., a website, an interactive ordering platform, or an interactive application associated with the business). In some embodiments, the business is a particular business, e.g., a specific restaurant. In some embodiments, the business is a class of businesses, e.g., a restaurant.

In some embodiments, the device (7016) detects an input that activates the selectable indication (e.g., detecting a tap gesture on the selectable indication) and, in response to detecting the input that activates the selectable indication, displaying additional content within the conversation transcript (e.g., displaying a drop-down window below the message bubble with additional content from the Internet). For example, in response to detecting an input that includes contact 4106 on selectable indication 4104, in FIG. 41B, device 100-1 displays area 4108 including additional information (e.g., movie poster 4110 and biographical information 4112) about the "Meteorite Catcher" movie available on the Internet (e.g., device 100-1 displays selected Internet search results relating to the detected phrase).

In some embodiments, the additional content includes a link to a web content associated with the detected word or phrase (e.g., a link to a movie website or a link to a digital video that may be viewed and/or posted within the conversation transcript).

In some embodiments, the activatable indication is a stylized display of the recognized word or phrase within display of the received message (e.g., highlighting or coloring of the recognized word or phrase).

In some embodiments, the device detects in the first message, a word or phrase associated with additional content available on the Internet (e.g., information about a detected business/restaurant, music, movie, television show, current event, public figure, politician, celebrity, university, athlete, sporting event, or sports league/team). For example, device 100-1 recognizes the phrase "Astron Omer" 4103, in received message 4114, as the name of an actor, in FIG. 41D. In some embodiments, the device uses a data detector stored in the memory of the device and/or stored remotely. In some embodiments, the device compares words/phrases in received messages to a predefined list of words and/or phrases stored within the memory or the device and/or stored remotely.

In some embodiments, in response to detecting the word or phrase associated with additional content available on the internet, the device stylizes the word or phrase within the message region and enables activation of the word or phrase in the message region. For example, in response to recognizing the phrase "Astron Omer" 4103 as the name of an actor, device 100-1 displays highlighting 4116 of "Astron Omer" within message 4114, in FIG. 41D.

In some embodiments, the device detects an input that activates the stylized word or phrase in the message region (e.g., detecting a tap gesture on a highlighted word or phrase) and, in response, replaces display of the messaging user interface with display of an internet (and/or memory) search user interface for an internet search of the detected word or phrase, including a plurality of (e.g., categorized) search results. For example, in response to detecting an input, including contact 4118 on stylized phrase "Astron Omer," in FIG. 41E, device 100-1 replaces display of messaging user interface with display of internet search user interface 3661, in FIG. 41F, for an internet search of detected phrase "Astron Omer" 4103. Internet search user interface 3661 including a plurality of categorized search results relating to phrase "Astron Omer" 4103 (e.g., news articles 3664, 3678, 3680 and movie trailers 3670, 3682, and 3684).

In some embodiments, the device detects an input on a first search result in the plurality of search results in the Internet (and/or memory) search user interface and, in response, replaces display of the Internet (and/or memory) search user interface with the messaging user interface, displays a representation of the first search result in the conversation transcript of the messaging user interface, and transmits a representation of the first search result to the one or more electronic devices associated with other users of the messaging session (e.g., posts the search result to the messaging session).

Figure 41G:
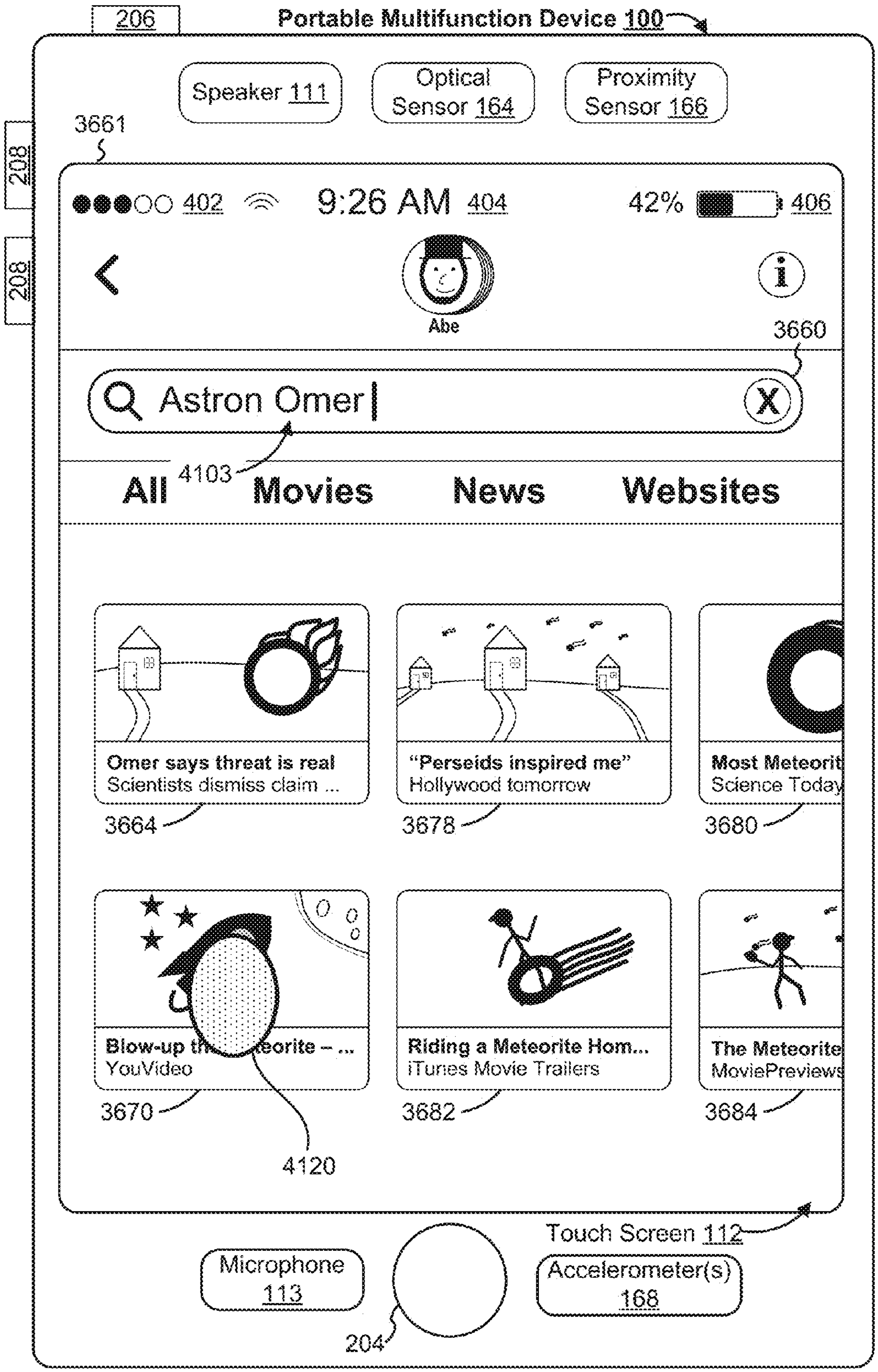
Figure 41H:
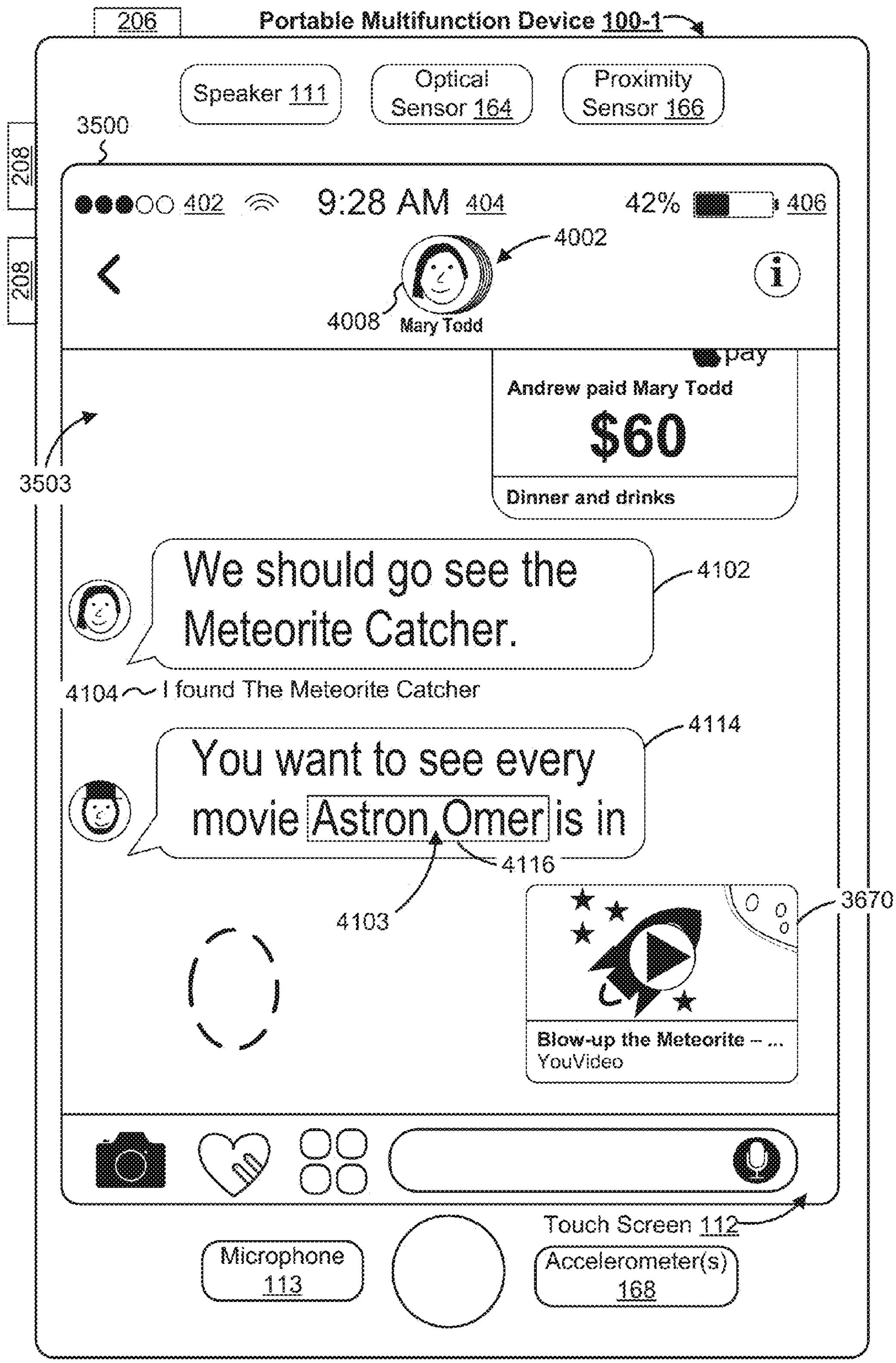
Figure 42A:
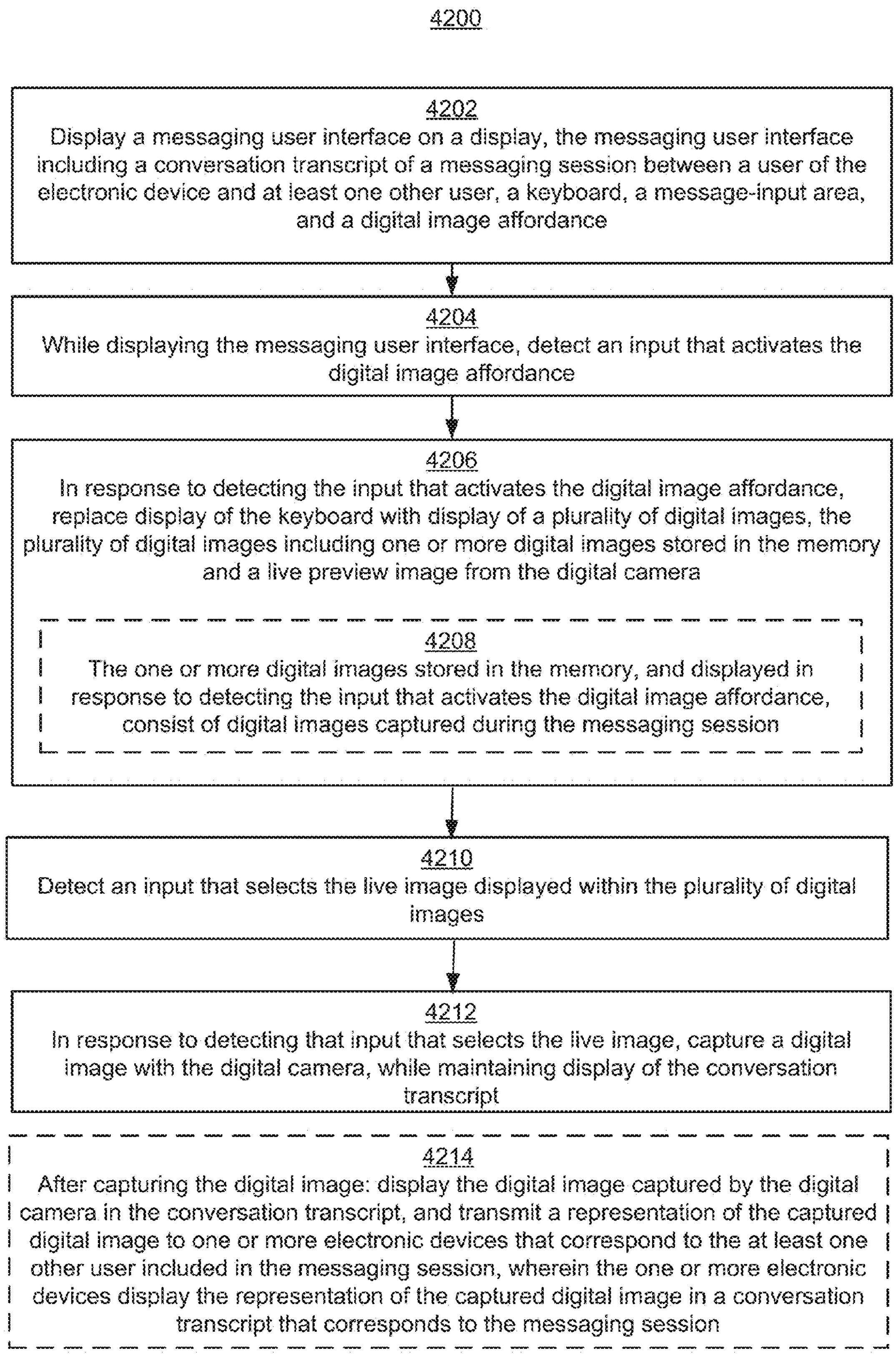

For example, device 100-1 detects an input including contact 4120 on search result 3670, in FIG. 41G, and, in response, replaces Internet search interface 3661 with messaging user interface 3500, including conversation transcript 3503 displaying representation of search result 3670.

It should be understood that the particular order in which the operations in FIGS. 70A-70B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6600, and 6800) are also applicable in an analogous manner to method 7000 described above with respect to FIGS. 70A-70B. For example, the contacts, gestures, user interface objects, tactile outputs, intensity thresholds, focus selectors, and animations described above with reference to method 7000 optionally have one or more of the characteristics of the contacts, gestures, user interface objects, tactile outputs, intensity thresholds, focus selectors, and animations described herein with reference to other methods described herein (e.g., methods 600, 800, 1000, 1200, 1400, 1600, 1800, 2100, 2400, 2600, 2800, 3100, 3300, 4200, 4400, 4600, 4800, 5000, 5200, 5400, 5600, 5800, 6000, 6200, 6400, 6600, and 6800). For brevity, these details are not repeated here.

Figure 71:
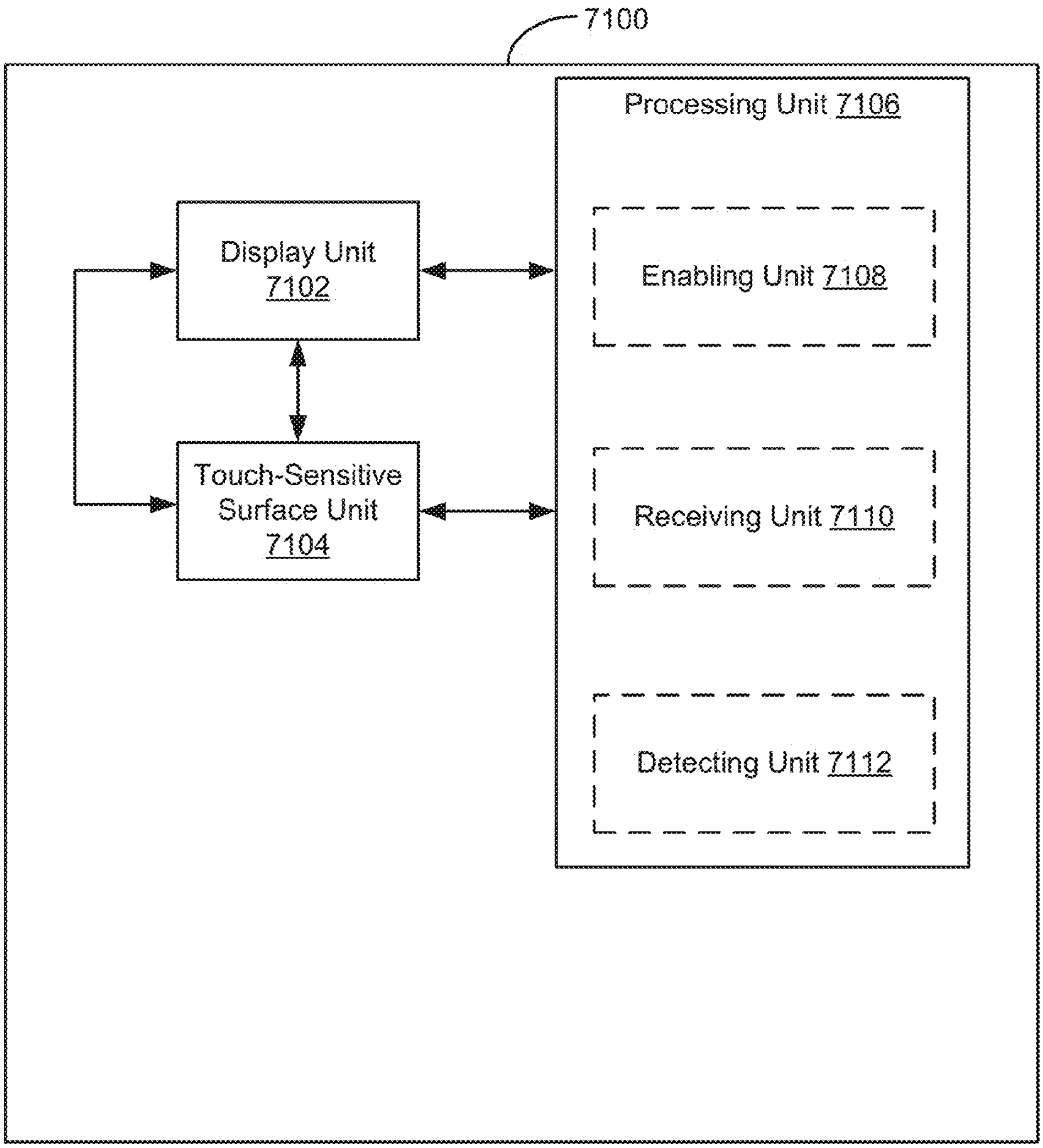
FIG. 71 is a functional block diagram of an electronic device in accordance with some embodiments.

In accordance with some embodiments, FIG. 71 shows a functional block diagram of an electronic device 7100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 71 are, optionally, combined or separated into sub-blocks to implement the principles of the various described embodiments. Therefore, the description herein optionally supports any possible combination or separation or further definition of the functional blocks described herein.

As shown in FIG. 71, an electronic device 7100 includes a display unit 7102 configured to display user interfaces; a touch-sensitive surface unit 7104 configured to detect contacts; and a processing unit 7106 coupled with the display unit 7102 and the touch-sensitive surface unit 7104, the processing unit 7106 including a detecting unit 7108, a receiving unit 7110 and a detecting unit 7112.

The processing unit 7106 is configured to enable display of (e.g., with enabling unit 7108) a messaging user interface of a messaging application on the display unit 7102, the messaging user interface including a conversation transcript of a messaging session between a user of the electronic device and at least one other user, and a message-input area. While displaying the messaging user interface, the processing unit 7106 is configured to receive (e.g., with receiving unit 7110) a first message within the messaging session from an electronic device that corresponds to another user included in the messaging session. In response to receiving the first message: the processing unit 7106 is configured to enable display of (e.g., with enabling unit 7108) the first message within a first message region in the conversation transcript on the display unit 7102. The processing unit 7106 is configured to detect (e.g., with detecting unit 7112), in the first message, a word or phrase associated with additional content available on the Internet. In response to detecting the word or phrase associated with additional content available on the internet, the processing unit 7106 is configured to enable display of (e.g., with enabling unit 7108), proximate to the first message region, a selectable indication that additional content associated with the word or phrase is available.

In some embodiments, the processing unit 7106 is further configured to: detect (e.g., with detecting unit 7112) an input that activates the selectable indication; in response to detecting the input that activates the selectable indication, enable display of (e.g., with enabling unit 7108) additional content within the conversation transcript.

In some embodiments, the word or phrase associated with additional content available is associated with a movie, and the additional content includes biographical data about the movie, information on local performances of the movie, ratings information for the movie, and/or multi-media content about the movie.

In some embodiments, the word or phrase associated with additional content available is associated with a television show, and the additional content includes biographical data about the show, ratings information about the show, and/or multi-media content about the show.

In some embodiments, the word or phrase associated with additional content available is associated with a song or album, and the additional content includes biographical data about the song or album, ratings information about the song or album, and/or multi-media content about the song or album.

In some embodiments, the word or phrase associated with additional content available is associated with a business, and the additional content includes biographical data about the business, ratings information about the business, and/or interactive content about the business.

The operations described above with reference to FIGS. 70A-70B are, optionally, implemented by components depicted in FIGS. 1A-1B or FIG. 71. For example, detection operation 7016 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, and a touch-sensitive surface, cause the device to:

display a messaging user interface of a messaging application on the display, the messaging user interface including:

a conversation transcript of a messaging session between a user of the electronic device and at least one other user, wherein a displayed portion of the conversation transcript includes a plurality of concurrently displayed messages, a plurality of electronic stickers, and a message-input area;

while displaying the messaging user interface, detect a first user input that corresponds to a first electronic sticker in the plurality of electronic stickers;

in response to detecting the first user input, place and display the first electronic sticker in the displayed portion of the conversation transcript that includes the plurality of concurrently displayed messages;

while the first electronic sticker is displayed in the displayed portion of the conversation transcript that includes the plurality of concurrently displayed messages:

detect a second user input that corresponds to the first electronic sticker in the displayed portion of the conversation transcript that includes the plurality of concurrently displayed messages; and, in response to detecting the second user input:

change position, size, and/or rotation of the first electronic sticker in the displayed portion of the conversation transcript that includes the plurality of concurrently displayed messages, and transmit, to another participant in the conversation, instructions to display the first electronic sticker at a position, size, and/or rotation determined based on the second user input.

2. The non-transitory computer readable storage medium of claim 1, the one or more programs further comprising instructions that cause the device to:

after detecting the first user input:

transmit information that represents the first electronic sticker to one or more electronic devices that correspond to the at least one other user included in the messaging session, wherein the one or more electronic devices display a corresponding representation of the first electronic sticker in a corresponding location within a corresponding conversation transcript.

3. The non-transitory computer readable storage medium of claim 2, the one or more programs further comprising instructions that cause the device to:

after transmitting the information that represents the first electronic sticker to the one or more electronic devices:

detect a third user input while a focus selector is at a third location in the messaging user interface that corresponds to the first electronic sticker in the conversation transcript; and, in response to detecting the third user input:

change the position of the first electronic sticker in the conversation transcript for a second time; and send information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript.

4. The non-transitory computer readable storage medium of claim 2, the one or more programs further comprising instructions that cause the device to:

after transmitting the information that represents the first electronic sticker to the one or more electronic devices:

detect a third user input while a focus selector is at a third location in the messaging user interface that corresponds to the first electronic sticker in the conversation transcript; and, in response to detecting the third user input:

change the rotation of the first electronic sticker in the conversation transcript for a second time; and send information to the one or more electronic devices that correspond to the at least one other user included in the messaging session that the rotation of the first electronic sticker was changed in the conversation transcript, wherein the one or more electronic devices make corresponding changes to the rotation of the first electronic sticker within the corresponding conversation transcript.

5. The non-transitory computer readable storage medium of claim 2, the one or more programs further comprising instructions that cause the device to:

after transmitting information that represents the first electronic sticker to the one or more electronic devices:

detect a third user input while a focus selector is at a third location in the messaging user interface that corresponds to the first electronic sticker in the conversation transcript; and, in response to detecting the third user input:

change the size of the first electronic sticker in the conversation transcript for a second time; and send information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript.

6. The non-transitory computer readable storage medium of claim 1, the one or more programs further comprising instructions that cause the device to:

in response to detecting the first user input, change the position, of the first electronic sticker.

7. The non-transitory computer readable storage medium of claim 1, the one or more programs further comprising instructions that cause the device to:

in response to detecting the first user input, change the size of the first electronic sticker.

8. The non-transitory computer readable storage medium of claim 1, the one or more programs further comprising instructions that cause the device to:

in response to detecting the first user input, change the rotation of the first electronic sticker.

9. The non-transitory computer readable storage medium of claim 1, wherein the size of the first electronic sticker is reduced in response to detecting a pinch gesture that includes movement of a first contact towards a second contact, wherein the pinch gesture started while a focus selector was at a location in the messaging user interface that corresponds to the first electronic sticker.

10. The non-transitory computer readable storage medium of claim 1, wherein the size of the first electronic sticker is increased in response to detecting a depinch gesture that includes movement of a first contact away from a second contact, wherein the depinch gesture started while a focus selector was at a location in the messaging user interface that corresponds to the first electronic sticker.

11. The non-transitory computer readable storage medium of claim 1, wherein the size of the first electronic sticker is increased in accordance with a characteristic intensity of a contact made while a focus selector was at a location in the messaging user interface that corresponds to the first electronic sticker.

12. The non-transitory computer readable storage medium of claim 1, wherein an orientation of the first electronic sticker is changed in response to detecting a rotation gesture that started while a focus selector was at a location in the messaging user interface that corresponds to the first electronic sticker.

13. The non-transitory computer readable storage medium of claim 1, wherein:

the first electronic sticker is displayed at a location in the conversation transcript that at least partially overlaps a respective message in the conversation transcript; and the instructions to display the first electronic sticker at the position, size, and/or rotation determined based on the second user input include instructions to display the first electronic sticker at a location in the conversation transcript that at least partially overlaps the respective message in the conversation transcript.

14. An electronic device, comprising:

a display;

a touch-sensitive surface;

one or more processors;

memory; and one or more programs, wherein the one or more programs are stored in the memory and configured to be executed by the one or more processors, the one or more programs including instructions for:

displaying a messaging user interface of a messaging application on the display, the messaging user interface including:

a conversation transcript of a messaging session between a user of the electronic device and at least one other user, wherein a displayed portion of the conversation transcript includes a plurality of concurrently displayed messages, a plurality of electronic stickers, and a message-input area;

while displaying the messaging user interface, detecting a first user input that corresponds to a first electronic sticker in the plurality of electronic stickers;

in response to detecting the first user input, placing and displaying the first electronic sticker in the displayed portion of the conversation transcript that includes the plurality of concurrently displayed messages;

while the first electronic sticker is displayed in the displayed portion of the conversation transcript that includes the plurality of concurrently displayed messages:

detecting a second user input that corresponds to the first electronic sticker in the displayed portion of the conversation transcript that includes the plurality of concurrently displayed messages; and, in response to detecting the second user input:

changing position, size, and/or rotation of the first electronic sticker in the displayed portion of the conversation transcript that includes the plurality of concurrently displayed messages, and transmitting, to another participant in the conversation, instructions to display the first electronic sticker at a position, size, and/or rotation determined based on the second user input.

15. The electronic device of claim 14, the one or more programs further comprising instructions for:

after detecting the first user input:

transmitting information that represents the first electronic sticker to one or more electronic devices that correspond to the at least one other user included in the messaging session, wherein the one or more electronic devices display a corresponding representation of the first electronic sticker in a corresponding location within a corresponding conversation transcript.

16. The electronic device of claim 15, the one or more programs further comprising instructions for:

after transmitting the information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the position of the first electronic sticker in the conversation transcript for a second time; and sending information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript.

17. The electronic device of claim 15, the one or more programs further comprising instructions for:

after transmitting the information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the rotation of the first electronic sticker in the conversation transcript for a second time; and sending information to the one or more electronic devices that correspond to the at least one other user included in the messaging session that the rotation of the first electronic sticker was changed in the conversation transcript, wherein the one or more electronic devices make corresponding changes to the rotation of the first electronic sticker within the corresponding conversation transcript.

18. The electronic device of claim 15, the one or more programs further comprising instructions for:

after transmitting information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the size of the first electronic sticker in the conversation transcript for a second time; and sending information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript.

19. The electronic device of claim 14, the one or more programs further comprising instructions for:

in response to detecting the first user input, changing the position of the first electronic sticker.

20. The electronic device of claim 14, the one or more programs further comprising instructions for:

in response to detecting the first user input, changing the size of the first electronic sticker.

21. The electronic device of claim 14, the one or more programs further comprising instructions for:

in response to detecting the first user input, changing the rotation of the first electronic sticker.

22. The electronic device of claim 14, wherein the size of the first electronic sticker is reduced in response to detecting a pinch gesture that includes movement of a first contact towards a second contact, wherein the pinch gesture started while a focus selector was at a location in the messaging user interface that corresponds to the first electronic sticker.

23. The electronic device of claim 14, wherein the size of the first electronic sticker is increased in response to detecting a depinch gesture that includes movement of a first contact away from a second contact, wherein the depinch gesture started while a focus selector was at a location in the messaging user interface that corresponds to the first electronic sticker.

24. The electronic device of claim 14, wherein the size of the first electronic sticker is increased in accordance with a characteristic intensity of a contact made while a focus selector was at a location in the messaging user interface that corresponds to the first electronic sticker.

25. The electronic device of claim 14, wherein an orientation of the first electronic sticker is changed in response to detecting a rotation gesture that started while a focus selector was at a location in the messaging user interface that corresponds to the first electronic sticker.

26. The electronic device of claim 14, wherein:

the first electronic sticker is displayed at a location in the conversation transcript that at least partially overlaps a respective message in the conversation transcript; and the instructions for displaying the first electronic sticker at the position, size, and/or rotation determined based on the second user input include instructions for displaying the first electronic sticker at a location in the conversation transcript that at least partially overlaps the respective message in the conversation transcript.

27. A method, comprising:

at an electronic device having one or more processors, memory, a touch-sensitive surface, and a display:

displaying a messaging user interface of a messaging application on the display, the messaging user interface including:

a conversation transcript of a messaging session between a user of the electronic device and at least one other user, wherein a displayed portion of the conversation transcript includes a plurality of concurrently displayed messages, a plurality of electronic stickers, and a message-input area;

while displaying the messaging user interface, detecting a first user input that corresponds to a first electronic sticker in the plurality of electronic stickers;

in response to detecting the first user input, placing and displaying the first electronic sticker in the displayed portion of the conversation transcript that includes the plurality of concurrently displayed messages;

while the first electronic sticker is displayed in the displayed portion of the conversation transcript that includes the plurality of concurrently displayed messages:

detecting a second user input that corresponds to the first electronic sticker in the displayed portion of the conversation transcript that includes the plurality of concurrently displayed messages; and, in response to detecting the second user input:

changing position, size, and/or rotation of the first electronic sticker in the displayed portion of the conversation transcript that includes the plurality of concurrently displayed messages, and transmitting, to another participant in the conversation, instructions to display the first electronic sticker at a position, size, and/or rotation determined based on the second user input.

28. The method of claim 27, further comprising:

after detecting the first user input:

transmitting information that represents the first electronic sticker to one or more electronic devices that correspond to the at least one other user included in the messaging session, wherein the one or more electronic devices display a corresponding representation of the first electronic sticker in a corresponding location within a corresponding conversation transcript.

29. The method of claim 28, further comprising:

after transmitting the information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the position of the first electronic sticker in the conversation transcript for a second time; and sending information to the one or more electronic devices that correspond to the at least one other user included in the messaging session that the position of the first electronic sticker was changed in the conversation transcript, wherein the one or more electronic devices make corresponding changes to the position of the first electronic sticker within the corresponding conversation transcript.

30. The method of claim 28, further comprising:

after transmitting the information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the rotation of the first electronic sticker in the conversation transcript for a second time; and sending information to the one or more electronic devices that correspond to the at least one other user included in the messaging session that the rotation of the first electronic sticker was changed in the conversation transcript, wherein the one or more electronic devices make corresponding changes to the rotation of the first electronic sticker within the corresponding conversation transcript.

31. The method of claim 28, further comprising:

after transmitting information that represents the first electronic sticker to the one or more electronic devices:

detecting a third user input while a focus selector is at a third location in the messaging user interface that corresponds to the first electronic sticker in the conversation transcript; and, in response to detecting the third user input:

changing the size of the first electronic sticker in the conversation transcript for a second time; and sending information to the one or more electronic devices that correspond to the at least one other user included in the messaging session that the size of the first electronic sticker was changed in the conversation transcript, wherein the one or more electronic devices make corresponding changes to the size of the first electronic sticker within the corresponding conversation transcript.

32. The method of claim 27, further comprising:

in response to detecting the first user input, changing the position of the first electronic sticker.

33. The method of claim 27, further comprising:

in response to detecting the first user input, changing the size of the first electronic sticker.

34. The method of claim 27, further comprising:

in response to detecting the first user input, changing the rotation of the first electronic sticker.

35. The method of claim 27, wherein the size of the first electronic sticker is reduced in response to detecting a pinch gesture that includes movement of a first contact towards a second contact, wherein the pinch gesture started while a focus selector was at a location in the messaging user interface that corresponds to the first electronic sticker.

36. The method of claim 27, wherein the size of the first electronic sticker is increased in response to detecting a depinch gesture that includes movement of a first contact away from a second contact, wherein the depinch gesture started while a focus selector was at a location in the messaging user interface that corresponds to the first electronic sticker.

37. The method of claim 27, wherein the size of the first electronic sticker is increased in accordance with a characteristic intensity of a contact made while a focus selector was at a location in the messaging user interface that corresponds to the first electronic sticker.

38. The method of claim 27, wherein an orientation of the first electronic sticker is changed in response to detecting a rotation gesture that started while a focus selector was at a location in the messaging user interface that corresponds to the first electronic sticker.

39. The method of claim 27, wherein:

the first electronic sticker is displayed at a location in the conversation transcript that at least partially overlaps a respective message in the conversation transcript; and the instructions for displaying the first electronic sticker at the position, size, and/or rotation determined based on the second user input include instructions for displaying the first electronic sticker at a location in the conversation transcript that at least partially overlaps the respective message in the conversation transcript.

* * * * *